US006137473A

United States Patent [19]

Cortopassi et al.

[11] Patent Number: 6,137,473

[45] Date of Patent: *Oct. 24, 2000

[54] SYSTEM AND METHOD FOR SWITCHING CONTROL BETWEEN A HOST COMPUTER AND A REMOTE INTERFACE DEVICE

[75] Inventors: Michael Cortopassi, Buffalo Grove; Jose T. George, Bloomingdale; S. Christopher Gladwin, Chicago, all of Ill.; Harry Hsiung, Hillsboro, Oreg.; Peng Lim; John Allan Parham, both of Buffalo Grove, Ill.; Derick W. Voegeli, Wheeling, Ill.; James Y. Wilson, Crystal Lake, Ill.

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/551,936

[22] Filed: Oct. 16, 1995

Related U.S. Application Data

[63] Continuation-in-part of application No. 08/300,500, Sep. 2, 1994.

[51] Int. Cl.[7] .................................................. G09G 5/00

[52] U.S. Cl. ......................... 345/156; 345/163; 345/179; 709/217; 709/208

[58] Field of Search .................................... 395/827, 275, 395/500, 200.54; 345/158, 173, 179, 348, 163, 168, 156; 178/18, 19; 455/151, 2; 709/217, 208, 224; 710/7

[56] References Cited

U.S. PATENT DOCUMENTS

| | | | |
|---|---|---|---|
| 4,005,388 | 1/1977 | Morley et al. | 340/172.5 |
| 4,310,720 | 1/1982 | Check, Jr. | 178/22.08 |
| 4,876,742 | 10/1989 | Vacon et al. | 455/66 |
| 4,878,051 | 10/1989 | Andros et al. | 340/825.44 |
| 4,916,441 | 4/1990 | Gombrich | 340/712 |

(List continued on next page.)

FOREIGN PATENT DOCUMENTS 0 279 558 8/1988 European Pat. Off. .

OTHER PUBLICATIONS

"The Norton pcAnywhere, Using Norton pcAnywhere for DOS", Version 5, Symantec Corp., pp. 1–1 thru 1–6 and 7–18 thru 7–32, 1994.

Henderson, Tom and Marcus, Ann M.; "Remote control Software: now you can be in two places at the same time." InfoWorld, v15. n11. p7218), Mar. 15, 1993.

"Norton pcAnywhere for Windows (v.1.0) Symantec Corp.", Data Source Report, Ziff–Davis Publishing Co., Nov. 1993.

Strom, David, "Making the decision: five questions to ask before choosing a remote access setup", InforWorld, v.15, n. 37, p553(1), Sep. 13, 1993.

"Real–Time Extension to X–Windows Provide Deterministic Graphics," by Computer Technology Review, May 1993, vol. 13 No. 6, pp. 27–31.

"Flash Memory Bios for PC and Notebook Computers," Jerry Jex, IEEE, pp. 692–695 (1991).

"Embedded Processor Applications for Sonet Telecommunications Systems," Dough Bush, WESCON/95 Conference, IEEE, pp. 377–381, (1995).

*Primary Examiner*—Do Hyun Yoo
*Assistant Examiner*—Hong Kim
*Attorney, Agent, or Firm*—Katten Muchin Zavis

[57] ABSTRACT

The present invention relates to a wireless interface device and more particularly to a wireless interface device for interfacing with a host computer connected in either a wired or wireless local area network. Once a connection is made between the wireless interface device and a host computer, the host computer is under the control of the wireless interface device. In order to provide a convenient way to return control back to the host computer, a hot icon is provided on the wireless interface device which, in response to a pen-down event, automatically returns the control back to the host computer.

16 Claims, 75 Drawing Sheets

U.S. PATENT DOCUMENTS

| | | | |
|---|---|---|---|
| 4,942,534 | 7/1990 | Yokoyama et al. | 364/468 |
| 4,974,173 | 11/1990 | Stefik et al. | 364/521 |
| 5,047,958 | 9/1991 | Comins et al. | 364/521 |
| 5,049,862 | 9/1991 | Dao et al. | 340/706 |
| 5,148,155 | 9/1992 | Martin et al. | 345/173 |
| 5,155,837 | 10/1992 | Liu et al. | 395/500 |
| 5,157,384 | 10/1992 | Greanias et al. | 345/156 |
| 5,194,852 | 3/1993 | More et al. | 340/712 |
| 5,204,768 | 4/1993 | Tsakins et al. | 359/148 |
| 5,210,854 | 5/1993 | Beaverton et al. | 395/500 |
| 5,239,652 | 8/1993 | Seibert et al. | 395/750 |
| 5,241,303 | 8/1993 | Register et al. | 340/706 |
| 5,260,697 | 11/1993 | Barrett et al. | 345/173 |
| 5,261,055 | 11/1993 | Moran et al. | 395/275 |
| 5,276,839 | 1/1994 | Robb et al. | 395/425 |
| 5,307,297 | 4/1994 | Iguchi et al. | 364/708.1 |
| 5,309,351 | 5/1994 | McCain et al. | 364/132 |
| 5,313,051 | 5/1994 | Brigida et al. | 235/375 |
| 5,315,711 | 5/1994 | Barone et al. | 395/275 |
| 5,329,625 | 7/1994 | Kannan et al. | 395/275 |
| 5,341,503 | 8/1994 | Gladstein et al. | 395/750 |
| 5,347,295 | 9/1994 | Agulnick et al. | 345/156 |
| 5,355,414 | 10/1994 | Hale et al. | 380/25 |
| 5,355,503 | 10/1994 | Soffel et al. | 395/750 |
| 5,371,738 | 12/1994 | Moelard et al. | 370/85.1 |
| 5,372,161 | 12/1994 | Logan et al. | 345/157 |
| 5,375,230 | 12/1994 | Fujimori | 395/575 |
| 5,396,443 | 3/1995 | Mese et al. | 364/707 |
| 5,404,458 | 4/1995 | Zetts | 395/893 |
| 5,421,009 | 5/1995 | Platt | 395/600 |
| 5,423,045 | 6/1995 | Kannan et al. | 395/750 |
| 5,430,877 | 7/1995 | Naylor | 395/700 |
| 5,434,972 | 7/1995 | Hamlin | 395/200 |
| 5,440,449 | 8/1995 | Scheer | 361/686 |
| 5,440,502 | 8/1995 | Register | 364/708.1 |
| 5,455,822 | 10/1995 | Dixon et al. | 370/18 |
| 5,457,478 | 10/1995 | Frank | 345/158 |
| 5,461,667 | 10/1995 | Remillard | 379/96 |
| 5,467,102 | 11/1995 | Kuno et al. | 345/1 |
| 5,485,171 | 1/1996 | Copper et al. | 345/160 |
| 5,508,713 | 4/1996 | Okouchi | 345/1 |
| 5,526,023 | 6/1996 | Sugimoto et al. | 345/173 |
| 5,533,147 | 7/1996 | Arai et al. | 382/179 |
| 5,534,893 | 7/1996 | Hansen, Jr. et al. | 345/179 |
| 5,553,296 | 9/1996 | Forrest et al. | 395/750.05 |
| 5,559,501 | 9/1996 | Barzegar et al. | 340/825 |
| 5,561,446 | 10/1996 | Montlick | 347/173 |
| 5,583,542 | 12/1996 | Capps et al. | 345/173 |
| 5,594,462 | 1/1997 | Fishman et al. | 345/2 |
| 5,597,307 | 1/1997 | Redford et al. | 434/118 |
| 5,636,371 | 6/1997 | Yu | 395/500 |
| 5,701,515 | 12/1997 | Gradeter | 710/14 |
| 5,732,212 | 3/1998 | Perholtz et al. | 395/200.54 |

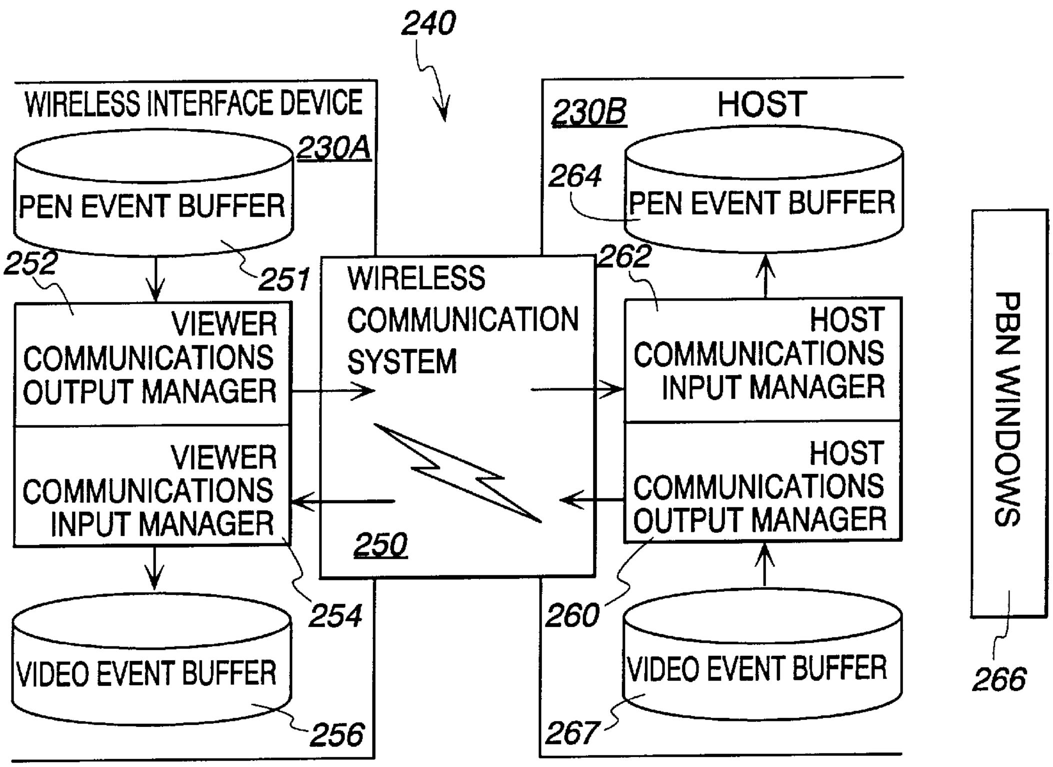
Fig. 7
Fig. 8
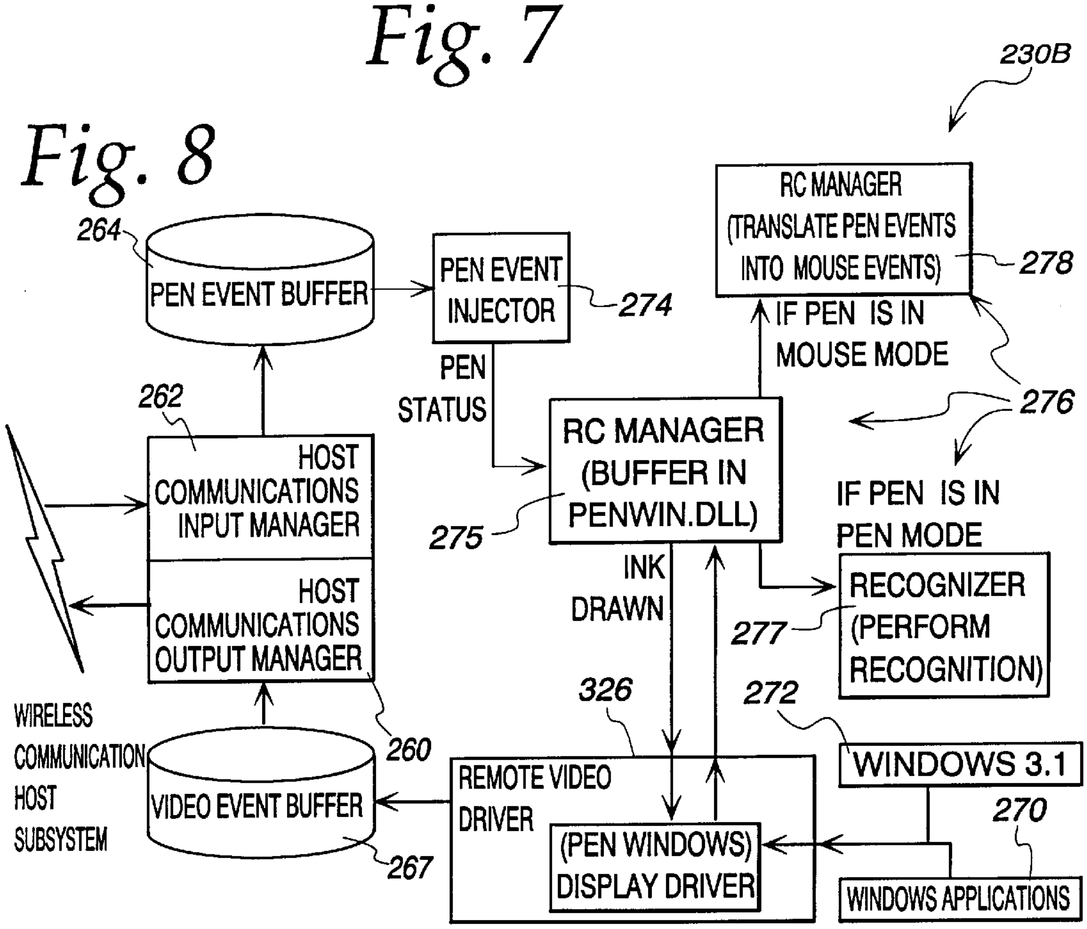

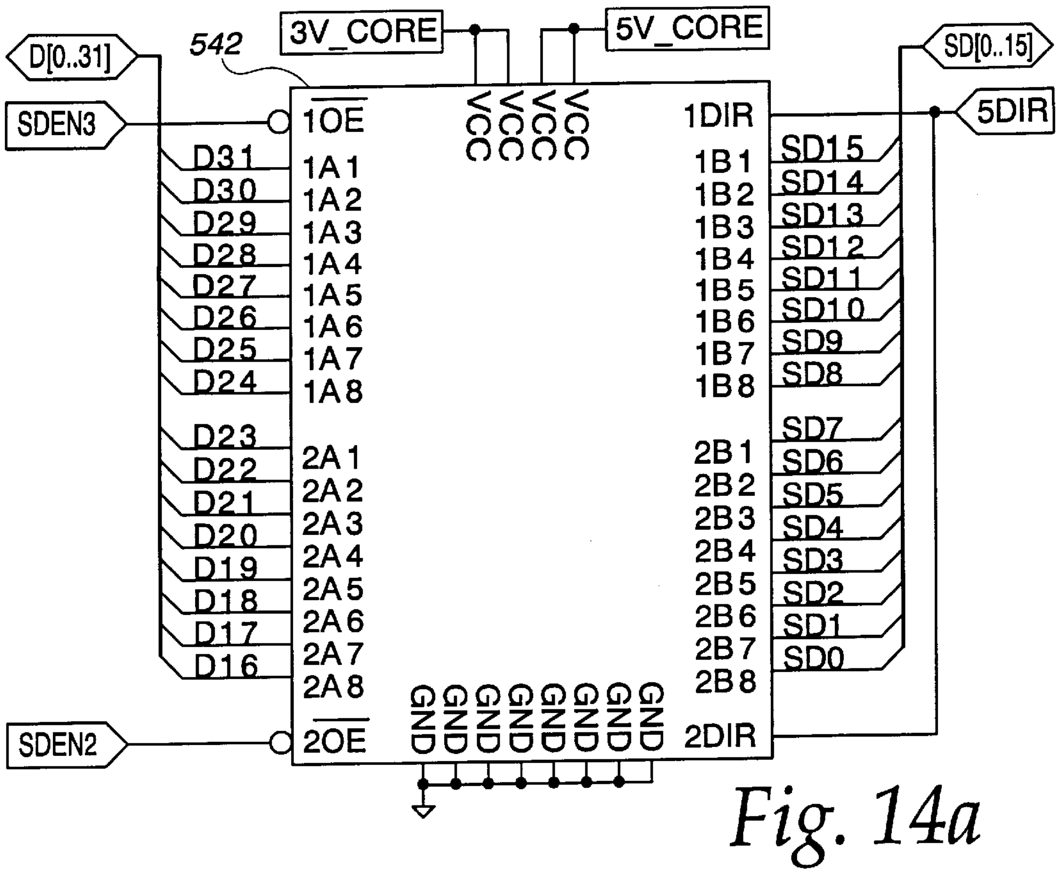
*Fig. 14a*
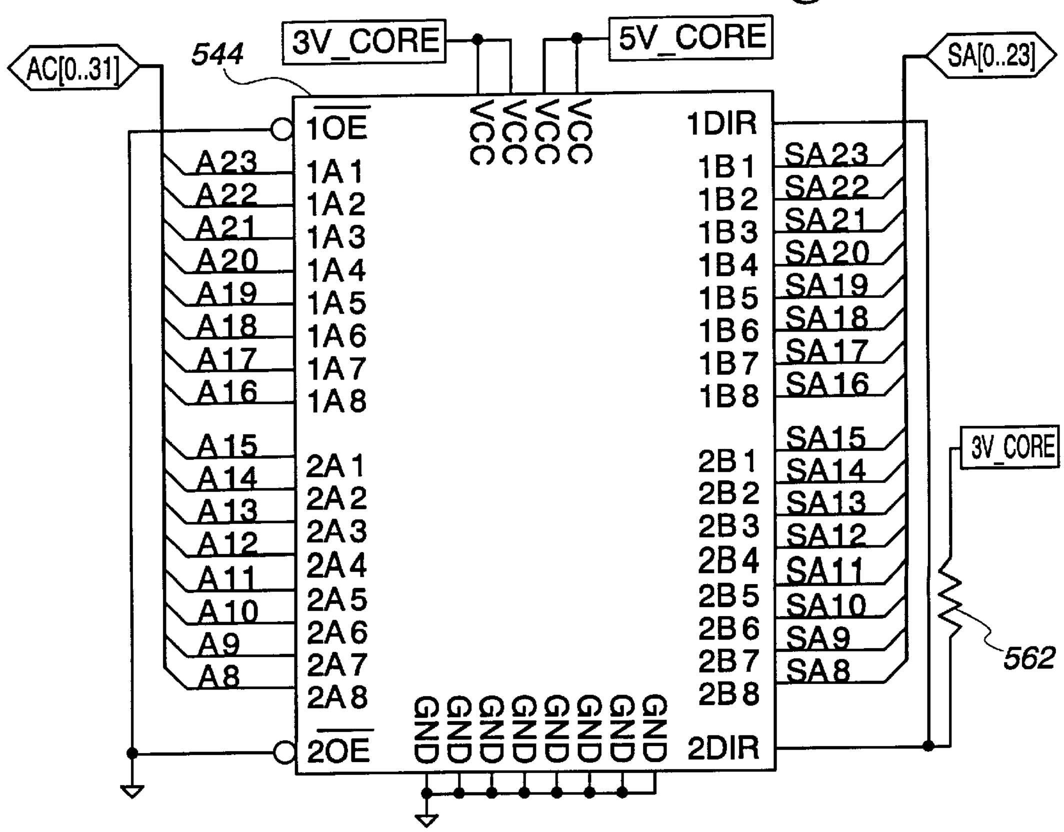

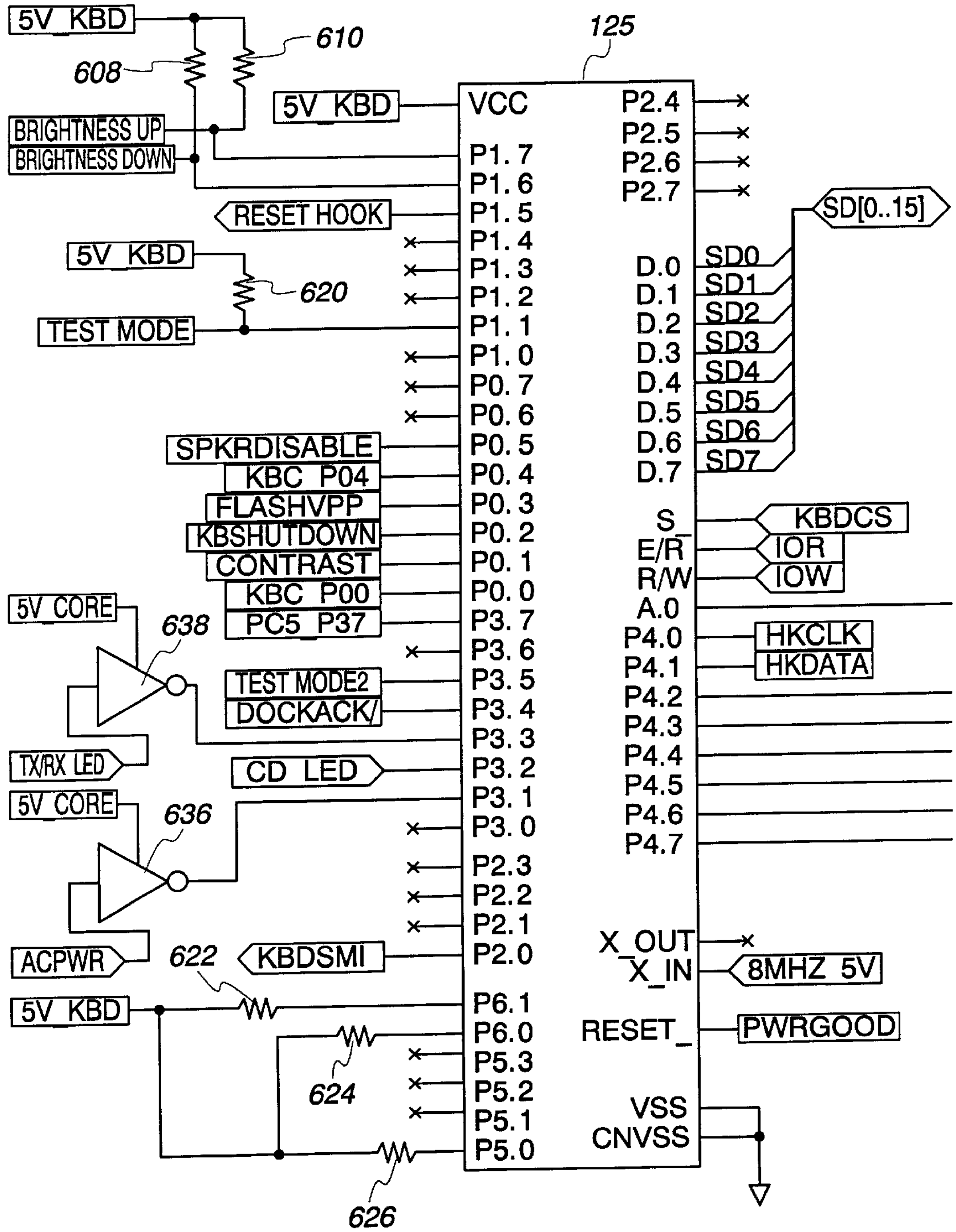
*Fig. 15a*
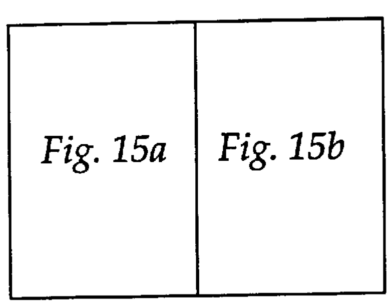

110A
986
XPLUS
992
LEAKAGE
999
YPLUS
PEN_AVCC
PEN_VCC
1030
1004
PEN_AVCC
PEN_AGND
PEN_AGND
1026
1028
1030
1033
PENACT_5V
1042
PENACT_3V
1044
1034
LEAKAGE
PEN_AVCC
1018
1022
1016
1006
PEN_AGND
1008
1022
1024
PEN_AGND
1000
PEN_AVCC
1010
1014
1012
1002

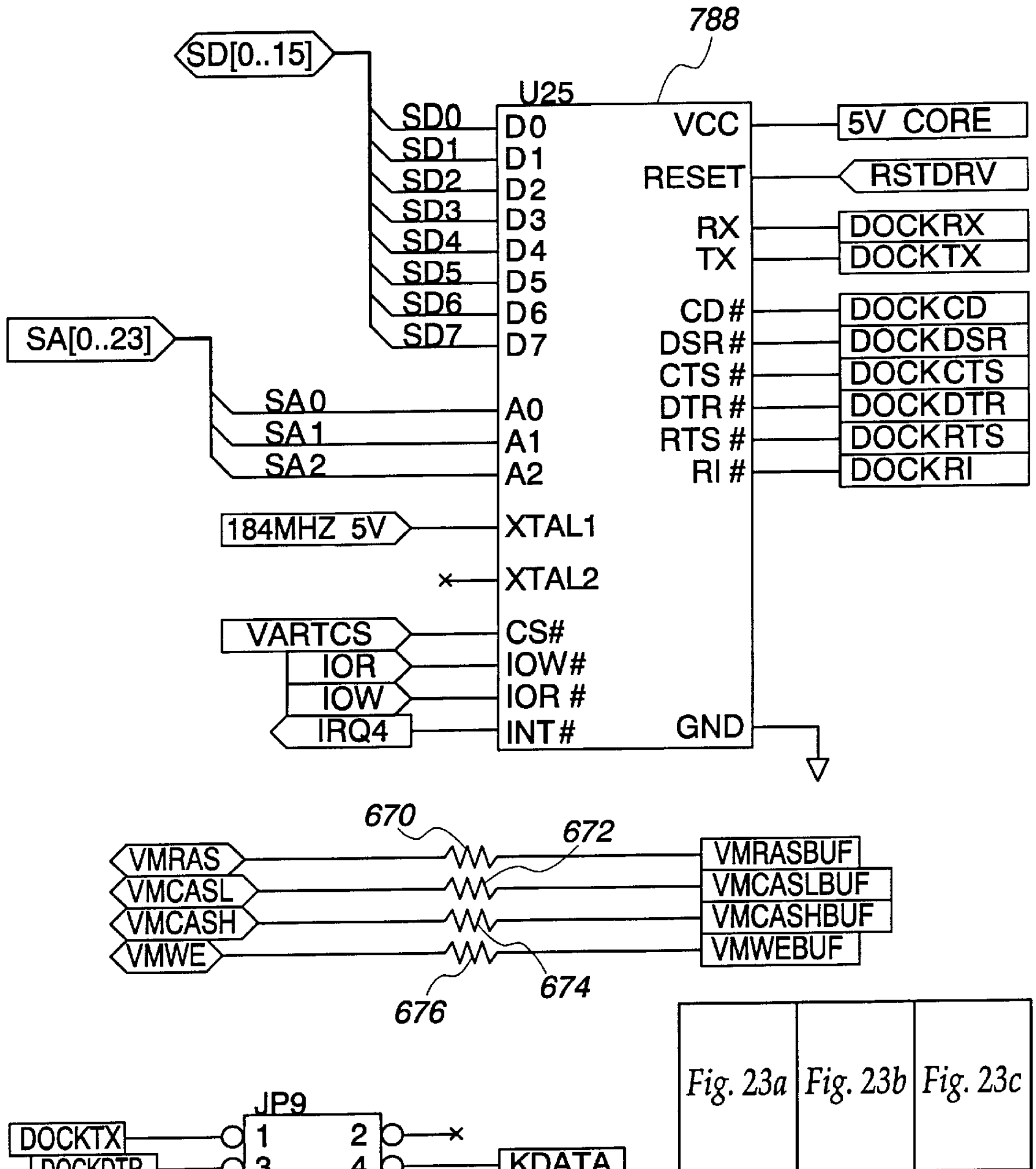
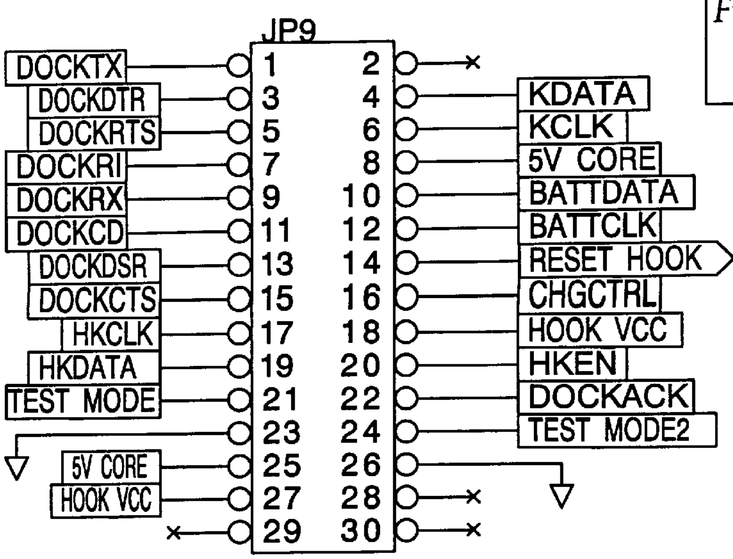
Fig. 23a

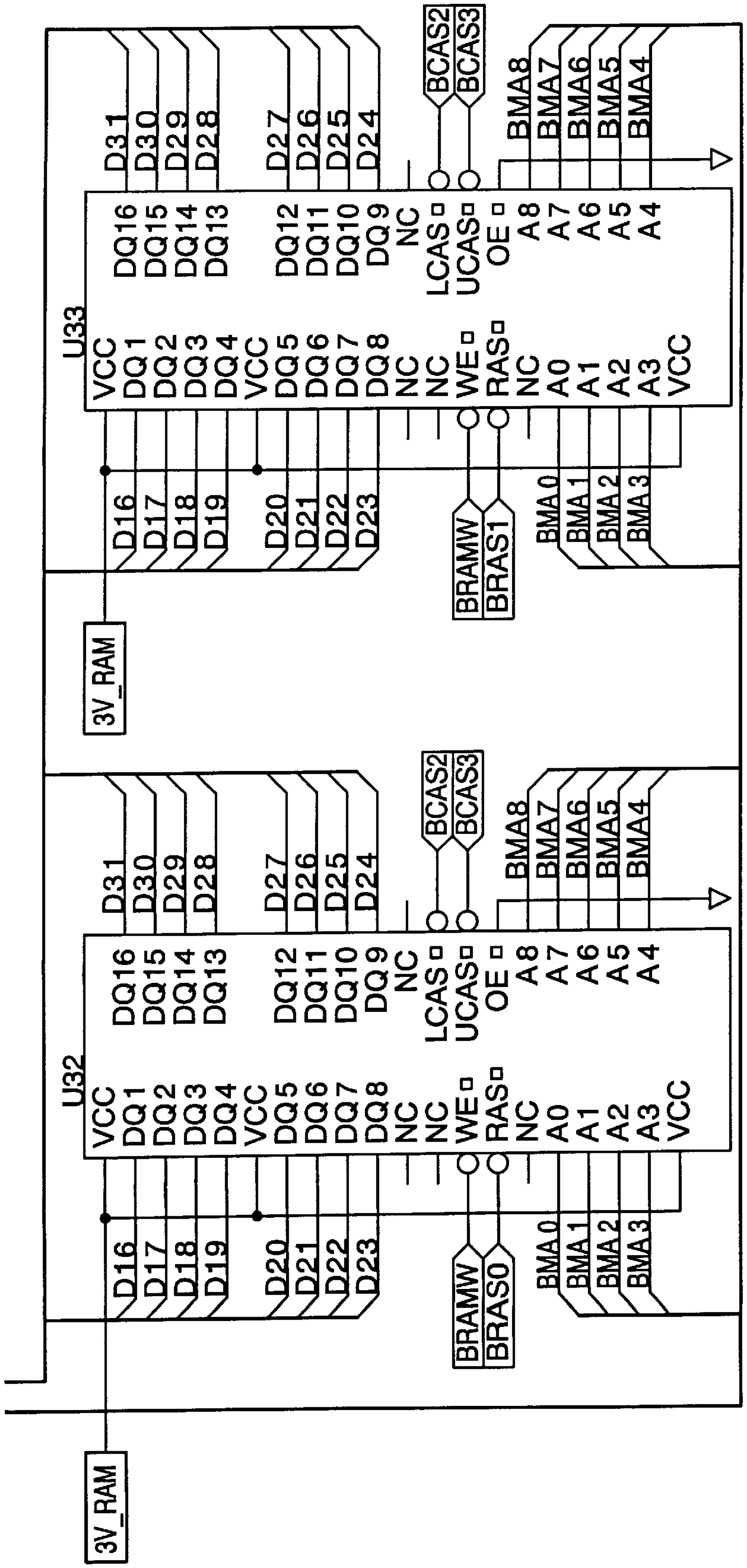
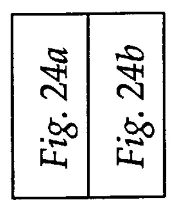
Fig. 24b

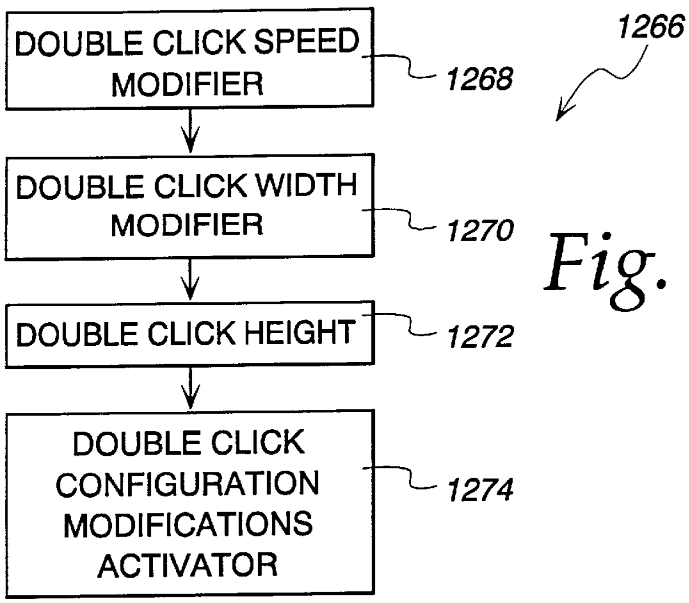
Fig. 35
Fig. 36
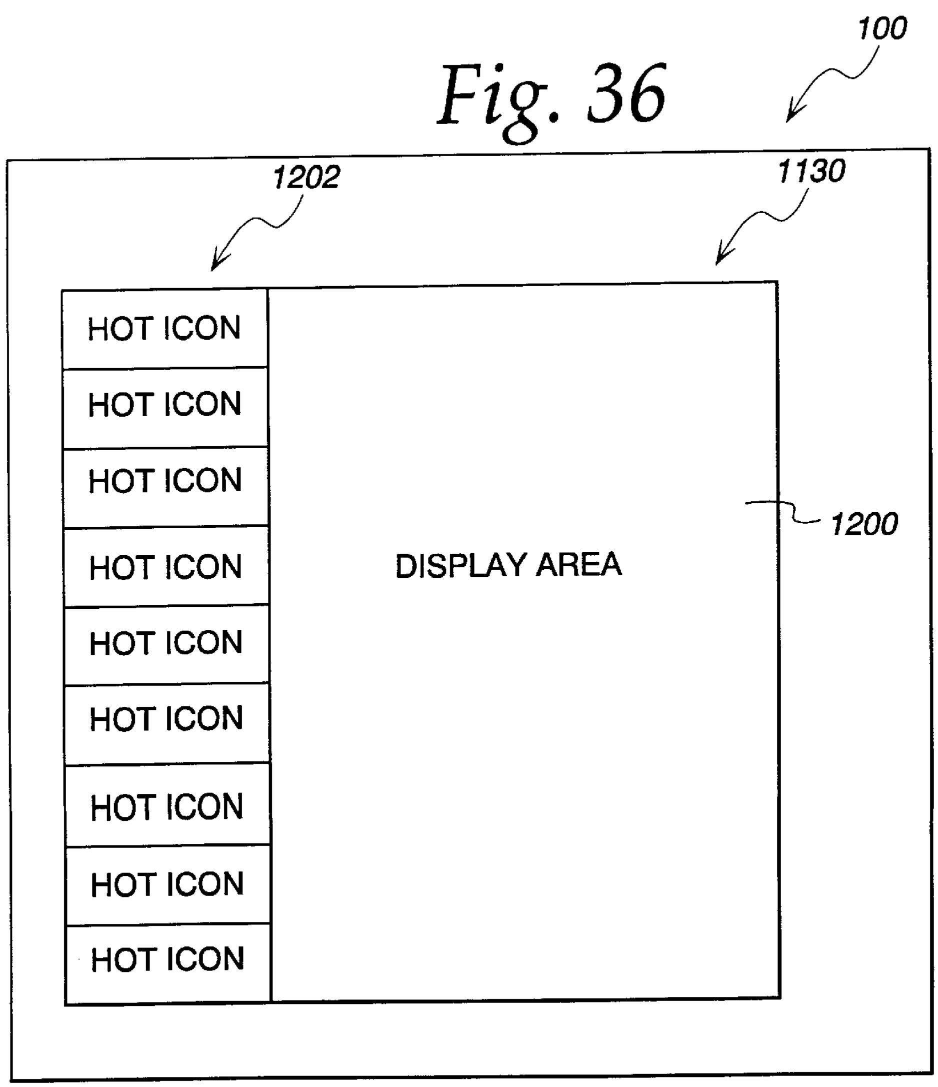

*Fig. 37*

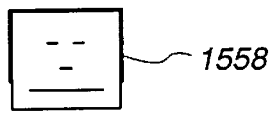

Maintains RF connection with the host computer while placing CruisePAD in a low-power sleep mode. (Turns off backlit display). Also "wakes" it up again.

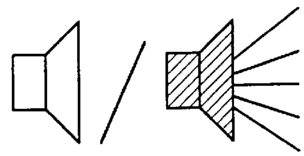

Turns the internal speaker on and off.

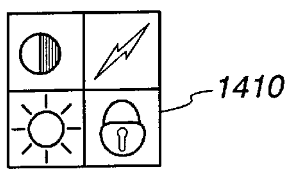

Accesses the CruisePAD Setup Window for configuring settings and connections to the host computer.

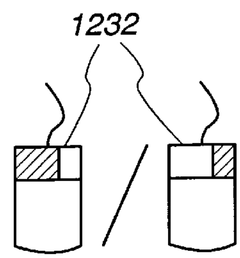

Converts the pen tap to right mouse button function. (Left button is the default setting).

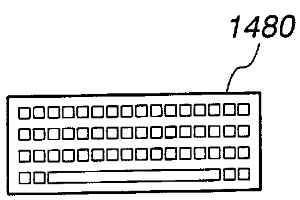

Brings up the onscreen keyboard for direct data input.

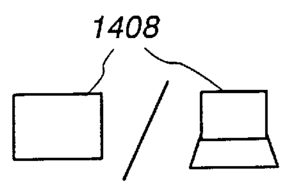

Switches host PC control between CruisePAD and host PC.

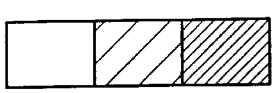

Cycles the CruisePAD's greyscale display through different mappings of the host PC's color palette.

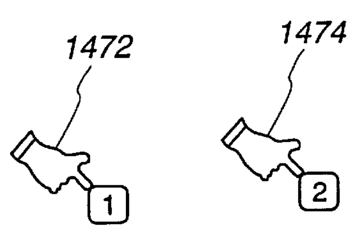

Two keys are reserved for the user's own frequently used commands.

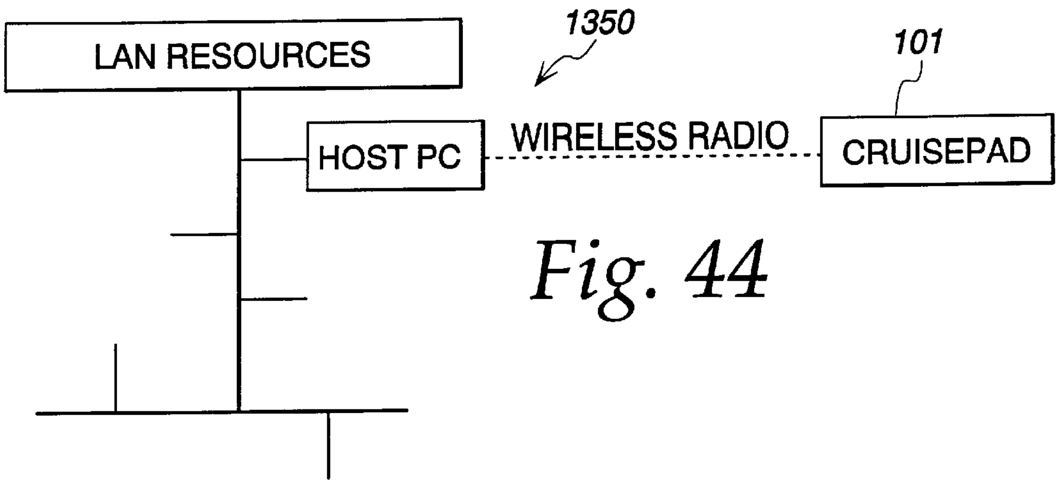
Fig. 44
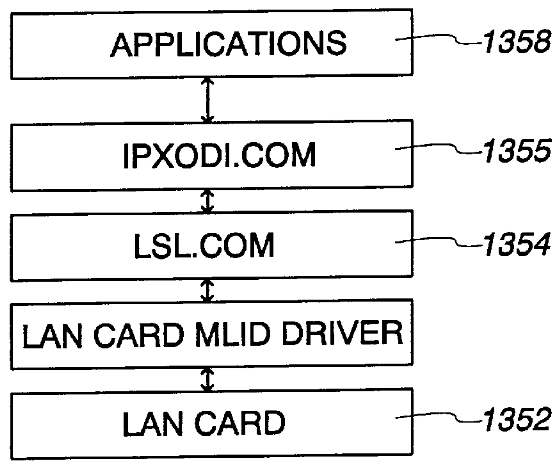
Fig. 45
PRIOR ART
Fig. 46
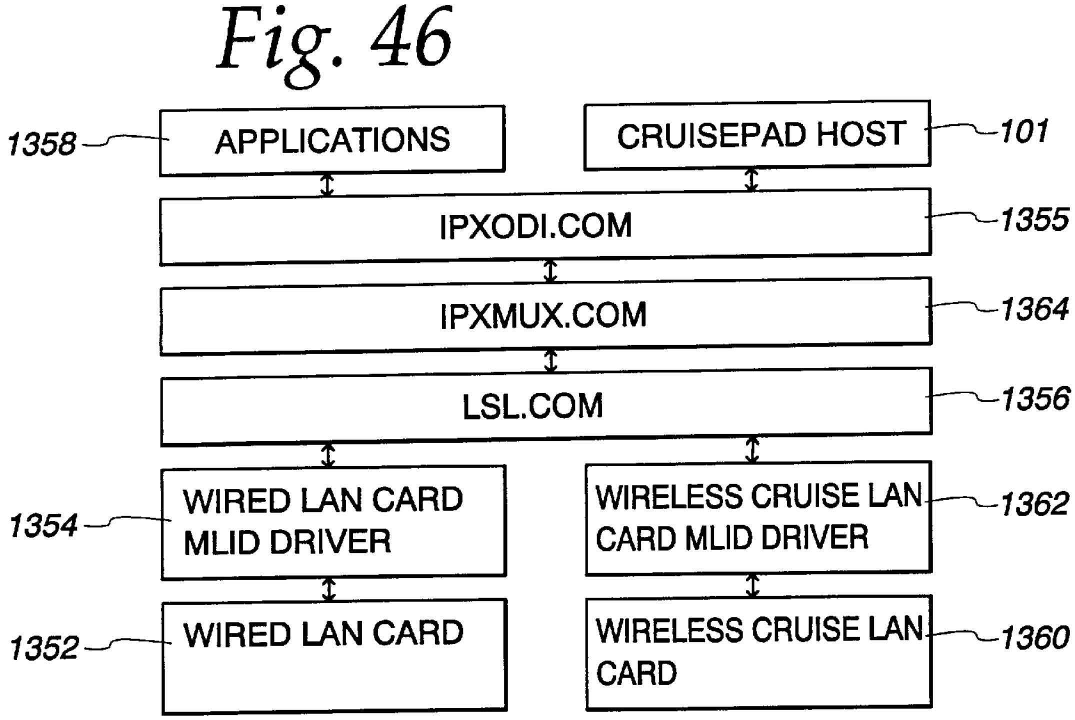

SYSTEM AND METHOD FOR SWITCHING CONTROL BETWEEN A HOST COMPUTER AND A REMOTE INTERFACE DEVICE

CROSS-REFERENCE TO RELATED CASES

This case is a continuation-in-part of the following copending application: STRUCTURE AND METHOD FOR CONTROLLING A HOST COMPUTER USING A REMOTE HAND-HELD INTERFACE DEVICE, by B. R. Banerjee, S. C. Gladwin, A. Maskatia and A. Soucy, filed Sep. 2, 1994, Ser. No. 08/300,500. This case is also related to the following copending applications, all filed on even date: REMOTE CONTROL INTERFACE, by B. R. Banerjee, S. C. Gladwin, A. Maskatia and A. Soucy Ser. No. 08/543,700; RADIO FLASH UPDATE, by D. Bi, H. Hsiung and J. Wilson, Ser. No. 08/543,463; MOUSE EMULATION WITH PASSIVE PEN, by D. Bi, G. Cohen, M. Cortopassi, J. George, S. C. Gladwin, H. Hsiung, P. Lim, J. Parham, A. Soucy, D. Voegeli and J. Wilson, Ser. No. 08/543,786 now abandoned in favor of continuation U.S. patent application Ser. No. 08/957,398, filed on Oct. 23, 1997; RESUME ON PEN CONTACT, by M. Cortopassi, S. C. Gladwin and D. Voegeli, Ser. No. 08/543,510; SCREEN SAVER DISABLER, by D. Bi, S. C. Gladwin and J. Wilson, Ser. No. 08/543,698; IPX DRIVER FOR MULTIPLE LAN ADAPTERS, by D. Bi, Ser. No. 08/553,803; DISASTER RECOVERY JUMPER, by M. Cortopassi, J. George, J. Parham and D. Voegeli, Ser. No. 08/543,423; RC TIME CONSTANT, by M. Cortopassi, Ser. No. 08/543,697; DOUBLE PEN UP EVENT, by D. Bi and J. George, Ser. No. 08/543,787; REMOTE OCCLUSION REGION, by J. Wilson, Ser. No. 08/543,701; BROADCAST SEARCH FOR AVAILABLE HOST, by D. Bi, S. C. Gladwin and J. Wilson, Ser. No. 08/543,599; REMOTE KEYBOARD MACROS ACTIVATED BY HOT ICONS, by S. C. Gladwin and J. Wilson, Ser. No. 08/543,788; PASSWORD SWITCH TO OVERRIDE REMOTE CONTROL, by D. Bi, S. C. Gladwin and J. Wilson, Ser. No. 08/543,785; AUTOMATIC RECONNECT ON REQUIRED SIGNAL, by S. C. Gladwin and J. Wilson, Ser. No. 08/543,425; and PORTABLE TABLET, by G. Cohen, S. C. Gladwin, P. Lim, J. Smith, A. Soucy, K. Swev T. Wous, K. Wood and G. Wu, Ser. No. 29/045,319 now U.S. Design Pat. No. 385,857 issued on Nov. 14, 1997.

BACKGROUND OF THE INVENTION

1. Field of the Invention

The present invention relates to a wireless interface device and more particularly to a wireless interface device for interfacing with a host computer in either a stand-alone configuration or connected in either a wired or wireless local area network (LAN). Once connected, the wireless interface device, which includes a display, takes control of the host computer and mirrors whatever is being displayed on the host computer on its display. In order to facilitate return of the control to the host computer, the wireless interface device is provided with a hot icon which, in response to a pen-down event, transfers control back to the host computer.

2. Description of the Prior Art

Both wired and wireless LAN systems are known in the art. Such systems enable various desktop and/or portable personal computers to be connected in a local area network in order to share resources. Wireless LAN systems are normally used in an office environment to enable the various users to share common resources while obviating the need for direct wire connections between the personal computers connected to the LAN.

The personal computers connected to a wireless LAN configuration are normally equipped with a wireless LAN card and a radio interface which typically includes a spread-spectrum type radio to reduce interference.

As mentioned above, portable personal computers have been known to be used in such wireless LAN systems. However, portable personal computers, even such notebook-size portable personal computers, are cumbersome to transport in an office environment. Unfortunately, the resources of the LAN system are often needed at locations other than where the personal computers connected to the LAN are located.

SUMMARY

It is an object of the present invention to solve various problems in the prior art.

It is yet another object of the present invention to provide a relatively convenient access to a LAN.

Briefly, the present invention relates to a wireless interface device and more particularly to a wireless interface device for interfacing with a host computer connected in either a wired or wireless local area network. Once a connection is made between the wireless interface device and a host computer, the host computer is under the control of the wireless interface device. In order to provide a convenient way to return control back to the host computer, a hot icon is provided on the wireless interface device which, in response to a pen-down event, automatically returns the control back to the host computer.

BRIEF DESCRIPTION OF THE DRAWING

These and other objects of the present invention will be readily understood upon consideration of the following detailed description and attached drawing, wherein:

FIG. 7 is a block diagram of the software environment under which the wireless interface device and the host computer operate to provide remote control of the host computer;

FIG. 8 is a block diagram which shows in further detail the software environment in the host computer, running an application program under a Windows environment;

FIGS. 31–35 are flow charts relating to mouse emulation with a passive pen;

FIG. 36 is a plan view of the wireless interface device illustrating the hot icon area and viewing area of the display;

FIG. 37 illustrates the hot icons in the hot icon area of the display;

FIG. 44 is a configuration diagram illustrating the wireless interface device interfacing with a wired LAN system;

FIG. 45 is a diagram of the software structure of a known network system;

FIG. 46 is a diagram of the software structure of network system which enables the wireless interface device to interface with the wired LAN system, illustrated in FIG. 44;

DETAILED DESCRIPTION OF THE INVENTION

1. General

The present invention relates to a system which allows wireless access and control of a remote host computer, which may be either a desktop, tower or portable computer to enable remote access of the various files and programs on the host computer. The system not only allows access to remote host computers that are configured as stand-alone units but also provides access to both wired and wireless local area networks (LAN).

The system includes a wireless interface device which includes a graphical user interface (GUI) which allows various types of input. In particular, input to the wireless interface device is primarily by way of a passive stylus, which can be used in a pen mode or a mouse mode. In a pen mode, a trail of ink tracking the path of the stylus (pen paradigm) provides visual feedback to the user by way of a pen digitizer. In a mouse mode, however, a cursor may be generated which follows the “tip” of the pen, but the path of cursor motion is not inked.

A virtual keyboard is also provided as part of the GUI. Activation of the keys on the virtual keyboard is by way of the stylus or by finger input. In addition, the system also supports a full-size external keyboard.

Figure 1:
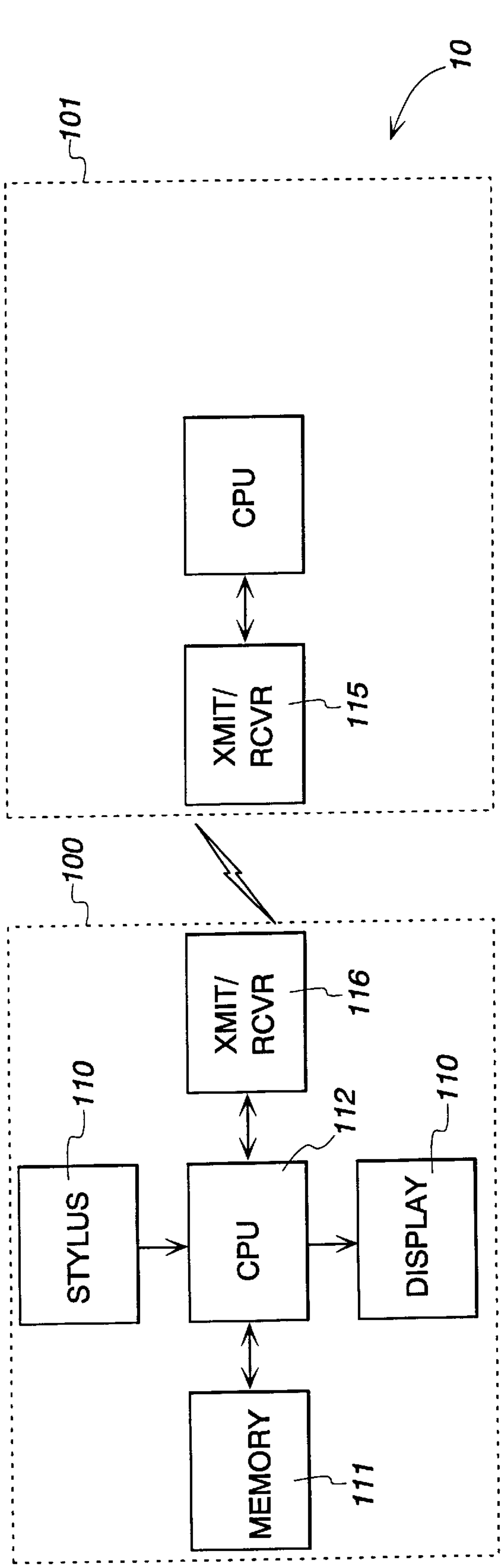
FIG. 1 is a block diagram of the hardware configuration of a wireless interface device in accordance with the present invention and a host computer.

FIG. 1 illustrates a block diagram of the system 10 in accordance with the present invention. In particular, a wireless interface device 100, in accordance with the present invention, enables wireless access of a remote host computer 101, configured as either a stand-alone unit or as a part of a wired or wireless local area network (LAN). When the remote host computer 101 is in a stand-alone configuration, as illustrated in FIG. 1, communication between the remote host computer 101 and the wireless interface device 100 is by way of a wireless communication link, provided by a communication subsystem 118 in which the remote host computer 101 is provided with a transceiver 115 for radio communication with a transceiver 116 in the wireless interface device 100. For example, the desktop or remote host computer 101 can be provided with a PCMCIA interface which can be used with a wireless transceiver card to communicate with the transceiver 116 in the wireless interface device 100. Alternatively, an Industry Standard Architecture (ISA) card transceiver can be installed in the host computer 101 in a spare ISA expansion slot. In particular, the transceivers 115 and 116 may be implemented as 2.4 GHz radio frequency (RF) transceiver modules with a Wireless Media Access Control function, available from Proxim Inc., Mountain View, Calif., configured with either an ISA or PCMCIA interface.

Figure 2:
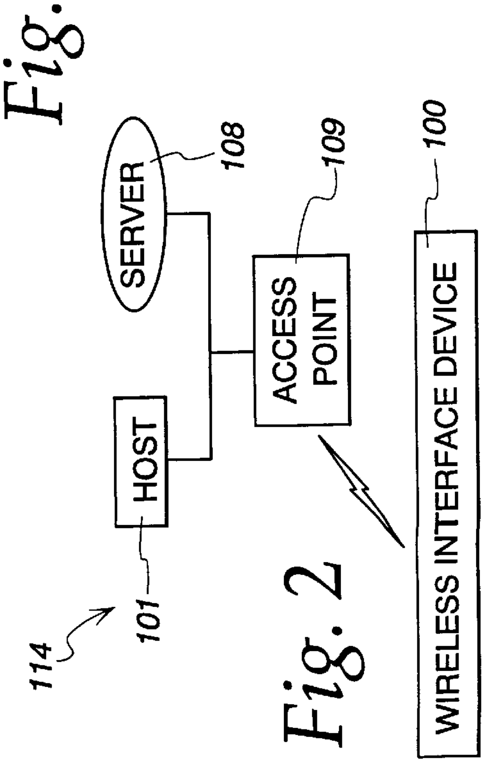
FIG. 2 is a block diagram illustrating the access of the wireless interface device in accordance with the present invention and a wired local area network.

As mentioned above, the wireless interface device 100 can also be used with a wireless LAN in a peer-to-peer network or a wired LAN. FIG. 2 illustrates the communication between the wireless interface device 100 and a wired LAN 114, which includes a server 108 in a, for example, Novell Netware or Microsoft LAN Manager environment. In this mode, the transceiver 116 in the wireless interface device 100 communicates with an access point 109 by way of a transceiver (not shown), which interfaces the wireless interface device 100 with a wired LAN 114 which includes a server 108. Alternatively, the wireless interface device 100 can be used in a wireless network in a Windows for Workgroups or Personal Netware environment, for example.

Figure 3:
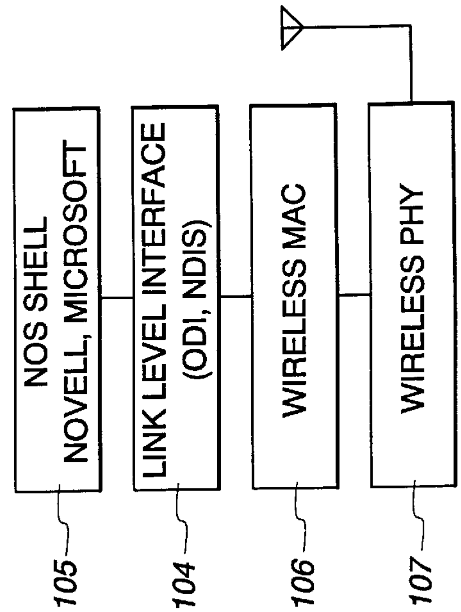
FIG. 3 is a diagram illustrating the software structure for the wireless interface device in accordance with the present invention.

The configuration of the radio communication subsystem between the wireless interface device 100 and the remote host computer 101 or access point 109 conforms to the Open System Interconnection (OSI) reference model for data communications and implements the lower two layers of the seven-layer OSI model. In particular, with reference to FIG. 3, the physical layer 107 (WIRELESS PHY) may be a 2.4 GHz spread spectrum frequency hopping radio which replaces the LAN cable normally connected between workstations. The radio operates within the 2.4000–2.4835 GHz band, the unlicensed Industrial Scientific and Medial (ISM) band, and is divided into eighty-two 1 MHz channels. In a spread-spectrum, frequency-hopping radio, data is broadcast on one particular channel for a predetermined time (i.e. 400 msec); and then the system hops to another channel in a predetermined pattern to avoid interference.

The wireless media access control (WIRELESS MAC) 106 is used to interface to higher level software 105 (i.e. NOS SHELL, NOVELL, MICROSOFT) through network drivers 104 (i.e. LINK LEVEL INTERFACE (ODI, NDIS)). The MAC conforms to the industry standard protocol is in accordance with IEEE 802.11.

As shown in FIG. 1, the wireless interface device 100 includes a central processing unit (CPU) 112, a local memory system 111, a pen-based input subsystem (STYLUS) 110, a display subsystem 113 and a transceiver 116. As will be discussed in more detail below, the wireless interface device 100 includes a Viewer Manager software 200 (FIG. 6) which performs three (3) basic functions: (i) collecting and transmitting input positional information from a stylus input subsystem 110 to the host computer 101, (ii) receiving from the host computer 101 a video image to be displayed on the display subsystem 113, and (iii) managing the communications link between the wireless interface device 100 and the host computer 101.

The wireless interface device 100 is thus able to control and access various programs such as Windows and Windows application programs and files residing at the host computer 101 and display the results in its display 113.

2. Description of the Block Diagram

Figure 4:
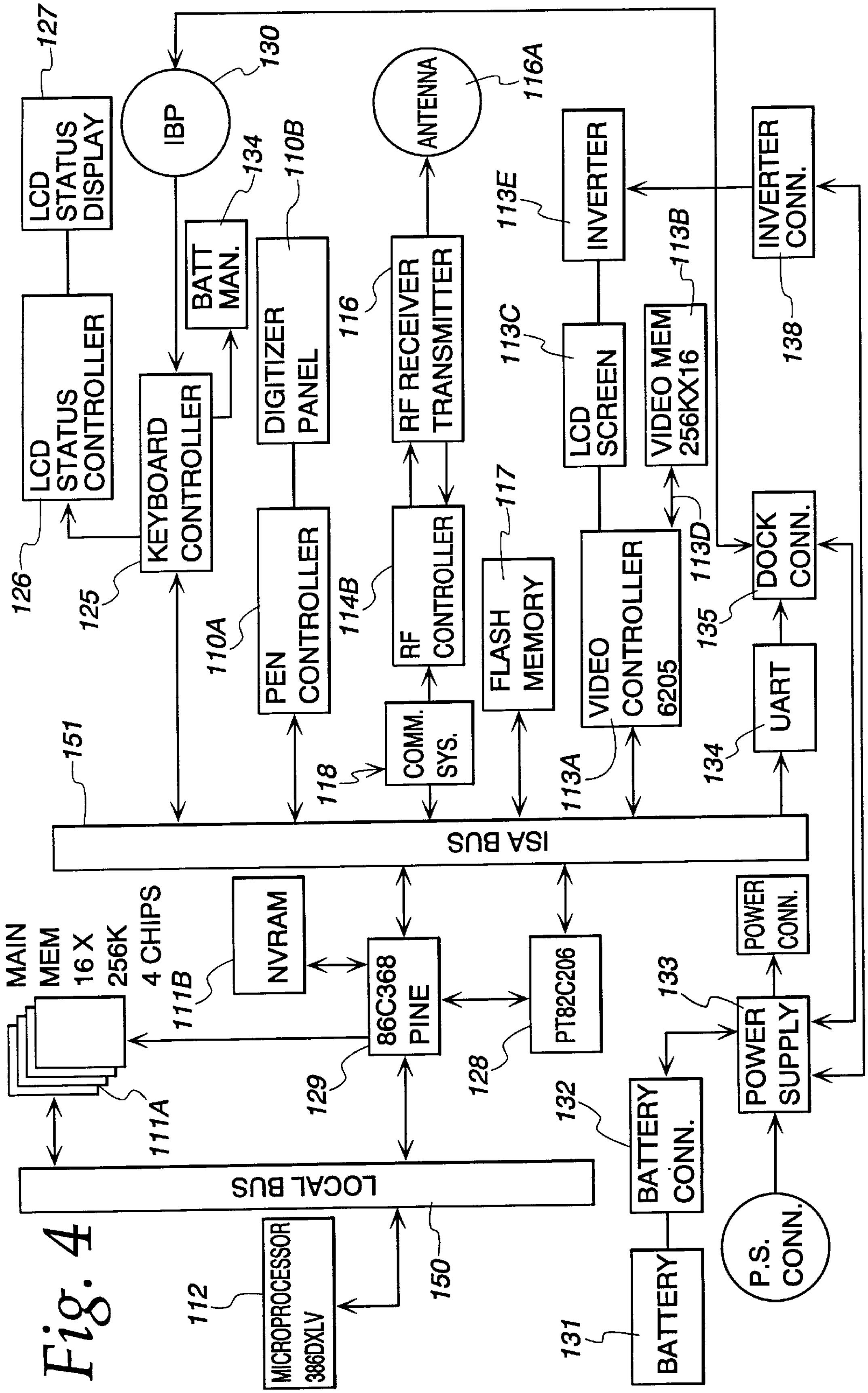
FIG. 4 is a block diagram showing one implementation of the wireless interface device of FIG. 1.

FIG. 4 is a block diagram of the wireless interface device 100. As shown in FIG. 4, the wireless interface device 100 has both a processor or "local bus" 150 and an ISA bus 151. The local bus 150 operates at the clock rate of the CPU 112, while the ISA bus 151 operates at the industry standard 8 MHz clock rate. The CPU 112 may be implemented by a microprocessor, which allows suspension and resumption of operation by halting and restarting the system clock to reduce battery consumption. Because power management in a portable device is important, the CPU 112 should preferably support power management functions, such as System Management Mode (SMM) and System Management Interrupt (SMI) techniques known in the industry. One example of a suitable microprocessor is the AMD386DXLV, available from Advanced Micro Devices, Inc., Sunnyvale, Calif., which operates at up to 25 MHz at a 3.0V supply voltage.

The CPU 112 interfaces over local bus 150 with a system controller 129. The system controller 129 manages (i) system operation, including the local and ISA buses 150 and 151, (ii) memory, and (iii) power to the system. The system controller 129 may be, for example, a Model No. 86C368 integrated circuit, available from PicoPower Technology, Inc., San Jose, Calif.

The present implementation takes advantage of the several levels of power management supported by the system controller 129. Power management in the present implementation is described in further detail below.

The system controller 129 provides a dynamic random access memory (DRAM) controller and a non-volatile random access memory (NVRAM) controller to control the DRAM 111A and a non-volatile RAM, NVRAM 111B, which form a portion of the memory subsystem 111 (FIG. 1) in the wireless interface device 100. As shown in FIG. 4, the DRAM 111A in the wireless interface device 100 may be provided by four 16-bit by 256K DRAM memory chips, to provide a total of 2 megabytes of memory, while the NVRAM 111B, used to store configuration data and passwords, for example, may be implemented using $E^2$PROM technology to provide permanent storage.

All devices on the ISA bus 151 are managed by an integrated peripheral controller (IPC) 128. The IPC 128 provides various functions including direct memory access (DMA) control, interrupt control, a timer, a real time clock (RTC) controller, and a memory mapper for mapping peripheral devices to the system memory space as illustrated in Table 4 below. The IPC 128 may be implemented by a Model No. PT82C206 integrated circuit, also available from the aforementioned PicoPower Technology, Inc.

The stylus input subsystem 110 is implemented by a stylus, a pen controller 110A and a digitizer panel 110B. The pen controller 110A controls the digitizer panel 110B and provides positional information of pen or stylus contact. The pen controller 110A can be implemented, for example by a Model No. MC68HC705J2 microcontroller, available from Motorola, Inc. In this implementation, the digitizer panel 110B can be, for example, an analog-resistive touch screen, so that the stylus is sensed by mechanical pressure. Using a digitizer panel which senses mechanical pressure allows a "dumb" stylus, or even the human finger, to be used as an input device. When using a dumb stylus, switching between mouse and pen modes is accomplished by selecting an icon as discussed below. Alternately, other styli, such as a "light pen" or an electronic stylus with various operating modes, can also be used. In some electronic stylus', switching between pen and mouse modes can be achieved by pushing a "barrel button" (i.e. a switch located on the barrel of the stylus).

As mentioned above, the wireless interface device 100 includes a display subsystem 113 which, in turn, includes a liquid crystal display (LCD) 113C. The LCD 113C is controlled by a video controller 113A, and supported by video memory 113B. The video controller 113A can be implemented by a Model No. CL-GD6205 video controller, available from Cirrus Logic Corporation, Milpitas, Calif. The LCD 113C can be, for example, a monochrome display, such as the Epson EG9015D-NZ (from Epson Corporation), or an active matrix color display. The video memory 113B may be implemented as DRAMs, organized as 256K by 16 bits.

The video controller 113A communicates with video memory 113B over a separate 16-bit video bus 113D. In this implementation, the video controller 113A provides "backlighting" support through a backlight control pin BACKLITEON that is de-asserted to conserve power under certain power management conditions as discussed below.

As discussed above, the communication subsystem 118 allows communication with a remote host computer 101 in either a stand-alone configuration or connected to either a wired or wireless LAN. The communication system 118 includes the transceiver 116, an antenna 116A, and an RF controller 114A for interfacing with the local ISA bus 151.

The wireless interface device 100 also includes a keyboard controller 125 which performs, in addition to controlling an optional keyboard by way of a connector, various other functions including battery monitoring and LCD status control. The keyboard controller 125 can be implemented by a Model No. M38802M2 integrated circuit from Mitsubishi Corporation, Tokyo, Japan. Battery power to the wireless interface device 100 may be provided by an intelligent battery pack (IBP) 131, for example, as described in U.S. patent application Ser. No. 07/975,879, filed on Nov. 13, 1992, hereby incorporated by reference, connected to a system power supply module 133 by way of a battery connector 132. The IBP 131 maintains and provides information about the remaining useful battery life of IBP 131, monitored by keyboard controller 125. Upon the occurrence of a significant event relative to the IBP 130, e.g. battery remaining life falling below a preset value, the keyboard controller 125 generates an interrupt signal.

A serial port is provided and implemented by way of a universal asynchronous receiver transmitter (UART) 134, which can be accessed externally via a serial port connector 135. As will be discussed in more detail below, the serial port connector 135 allows for disaster recovery for the flash memory 117, which may be used to store the basic input/output (BIOS) for the CPU 112.

3. Power Management

Figure 5:
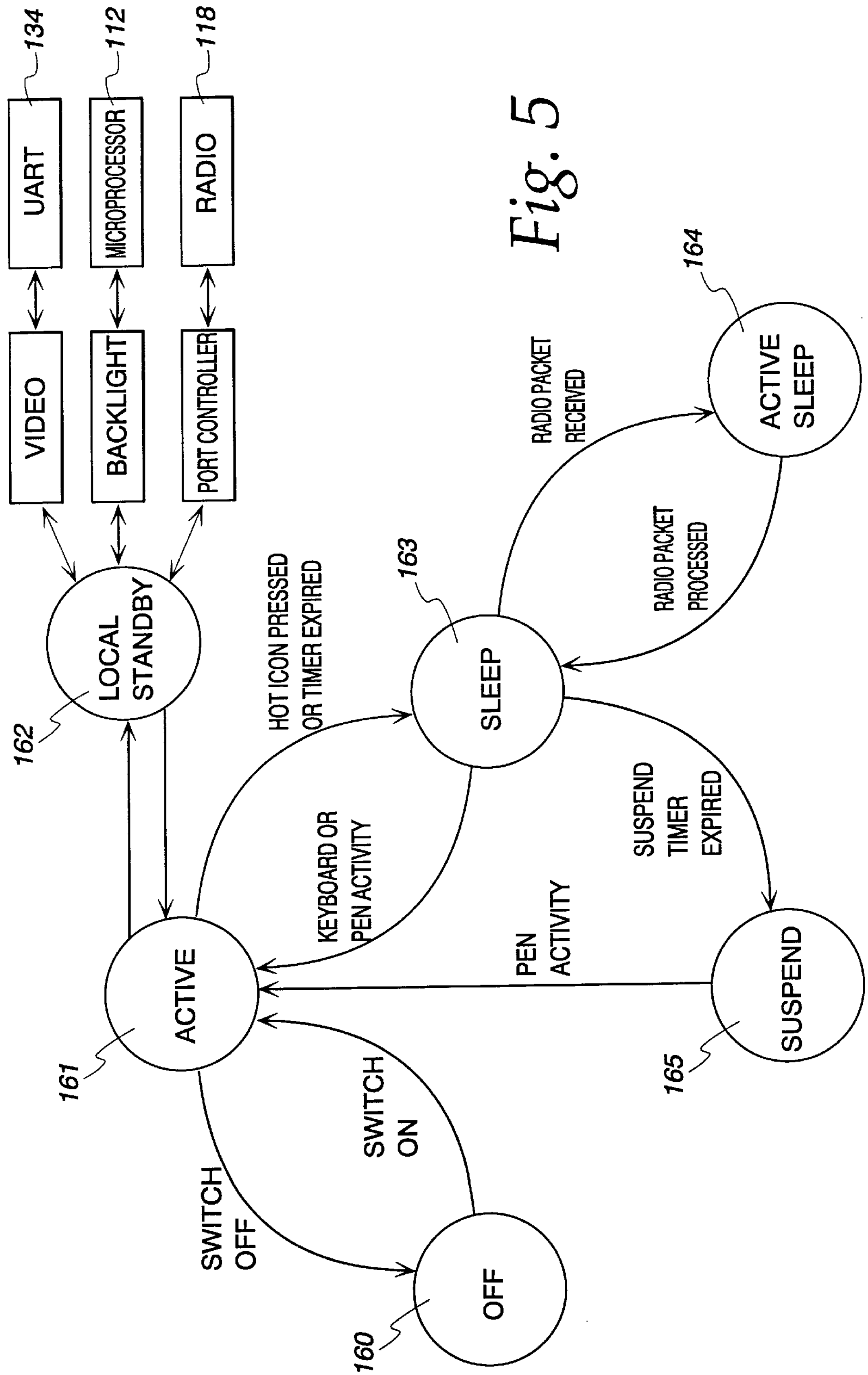
FIG. 5 is a state diagram illustrating the six internal power management states of the wireless interface device.

In order to conserve battery power, the wireless interface device 100 incorporates power management. While a user of the wireless interface device 100 would normally only be aware of four power management states: "off"; "active";

"suspend"; and "sleep" modes, internally six power management states are implemented as shown in FIG. 5. More particularly, with reference to FIG. 5, before the wireless interface device 100 is powered up, the wireless interface device 100 is in an "off" state, indicated by the reference numeral 160. In an "off" state 160, no power is supplied to the system. A state 161 (the "active" state) is entered when the power switch (FIG. 28) to the wireless interface device 100 is turned to the "on" position. In the active state 161, all components of wireless interface device 100 are active. From active state 161, the wireless interface device 100 enters a "local standby" state 162. The local standby state 162 is transparent to the user of the wireless interface device 100. From the user's point of view, in the local standby state 162, the wireless interface device 100 is in active mode. In this state 162, specific inactive devices are each put into a static state after a predetermined time-out period of inactivity for that device. In a static state, each device consumes minimal power. In the local standby state 162, devices that can be put into static states include the CPU 112, the video controller 113A, the pen controller 110A, the UART 134, and the transceiver 116. Backlighting of the LCD video display is also disabled in local standby state 162. If not, input activities are detected by the keyboard controller 125 or pen controller 110A. After the later of their respective present time-out periods, these devices are placed in a static state. These devices emerge from the static state once an activity relevant to its operation is detected, e.g. a pen event is detected.

The user of the wireless interface device 100 can place the wireless interface device 100 in a "sleep" mode 163 by selecting an icon (FIG. 37) labelled "sleep" from the GUI as will be discussed below. Alternatively, the "sleep" mode may be entered from the active state 161 after a preset period of inactivity. In a "sleep" mode, corresponding to either "sleep" state 163 or "active sleep" state 164, the display subsystem 113 is switched off; and most devices are placed in static states. When a keyboard or pen event is detected, the sleep state 163 and active sleep state 164 are exited, and the wireless interface device 100 enters the active state 161. From the sleep state 163, an active sleep state 164 is entered when a communication packet is received from the host computer 101. Although the display subsystem 113 is turned off, the received communication packet can result in an update to an image stored in the video memory 113B. The CPU 112 handles the communication packet from the host computer 101 and activates the video controller 113A to update such an image. The active sleep state 164 is transparent to the user of the wireless interface device 100, since the updated image is not displayed on the LCD screen 113C. When the communication packet is handled, the wireless interface 100 returns to a sleep state 163. The device activities in wireless interface device 100 in "sleep" mode 163 are illustrated in Table 1 below.

TABLE 1

| DEVICE | STATE | CLOCKS DISABLED | COMMENTS | WAKEUP SOURCE |
|---|---|---|---|---|
| Microprocessor | Static Suspend | Clock Stop Control by the system controller | Static Mode entered when clock stopped | Clock Restarted and Controlled by the system controller |
| System Controller | Static Suspend | Clock Stopped/32 KHz Left on | | Activity on EXACT, SWITCH, or RING pins |

TABLE 1-continued

| DEVICE | STATE | CLOCKS DISABLED | COMMENTS | WAKEUP SOURCE |
|---|---|---|---|---|
| Peripheral Controller | Static | 32 KHz Source | | Any Interrupts |
| Main Memory | Slow Refresh | System controller 38 KHz | Memory Refreshed at 128 mS | |
| Video | Static | 14 MHz disconnected | Controlled through use of system controller power management pins | When system is resumed |
| Video Memory | Slow Refresh | 32 KHz | Memory Refreshed at 128 mS | Video Controller automatically adjusts refresh rate depending on mode |
| LCD Module | OFF | NA | Power to Module will never be applied in Sleep | Controlled by Video controller power up sequencing |
| LCD Backlight | OFF | NA | Backlight will never be on in Sleep | Controlled by Video controller power up sequencing |
| UART | Static | 1.84 MHz | Part has no direct power management | |
| UART Trans. | Off | NA | Part turned off, until access to UART. Inactivity timer will start, and look for a time-out of two minutes before turning off transceiver | Access to serial port |
| ROM | Static | NA | After ROM is shadowed, the CS and $\overline{OE}$ line will be driven high to keep these parts in a static mode | |
| NVRAM | Static | NA | After NVRAM is read, the CS line will be high which forces part into a static mode | |
| Pen Controller | Sleep | Own 4.0 MHz | Sleeps after each point is processed as long as the pen is not pressing the screen | Pen Down wakes up Pen controller. Pen controller asserts the PEN_ACTIVITY signal which will wake up the entire system. |
| Hook | Active | Own 32 KHz | Keeps the last display as told by the keyboard controller | NA |

TABLE 1-continued

| DEVICE | STATE | CLOCKS DISABLED | COM-MENTS | WAKEUP SOURCE |
|---|---|---|---|---|
| Clock Generator | Active | All Clocks Running | Clocks needed in order to wake system back up | |
| Radio | Sleep | Internal | Radio Handles its own power management | Wakes up on periodic basis in order to keep SYNC. When a packet is ready, the Radio will assert the activity pm to the EXPACT input of the system controller which will wake up the system |

Upon expiration of a timer, the wireless interface device 100 enters into an internal state "suspend" mode 165. In a suspend mode, the wireless interface device 100 is essentially turned off and communication packets from the host computer 101 are not handled. The wireless interface device 100 emerges from suspend state 165 into active state 161 when a pen event is detected.

As mentioned above, the video controller 113A supports various power management modes internal to the display subsystem 113. Power is conserved in display subsystem 113 by entering "standby" and "suspend" modes. In the video controller 113A's "standby" mode, which can be entered by (i) expiration of a timer internal to the video controller 113A, (ii) firmware in the video controller 113A, or (iii) a signal received from system controller 129 on the video controller 113A's "STANDBY" pin. In the video controller 113A's standby mode, the LCD 113C is powered down and the video clock is suspended. The video controller 113A exits the standby mode either under firmware control, or upon system controller 129's de-asserting video controller 113A's STANDBY pin. Upon exiting standby mode, the LCD 113C is powered and the video clock becomes active. In this implementation, the LCD 113C includes multiple power planes ("panels"). For reliability reasons, in a powering up or powering down operation, these panels in the LCD display are preferably powered in a predetermined sequence specified by the manufacturer.

Maximum power is conserved in the display subsystem 113 when video controller 113A enters the "suspend" mode. The suspend mode can be entered either by asserting a signal from the system controller 129 on the SUSPEND pin of video controller 113A, or under firmware control. In this implementation, if the suspend mode is entered from the SUSPEND pin, the CPU 112 is prevented from accessing the video RAM 113B and video bus 113D. In that state, the contents of configuration registers in the video controller 113A are saved, to be restored when suspend mode is exited. In the suspend mode, the video RAM 113B is refreshed using the lowest possible refresh clock rate.

4. General Description of Operation

Figure 6:
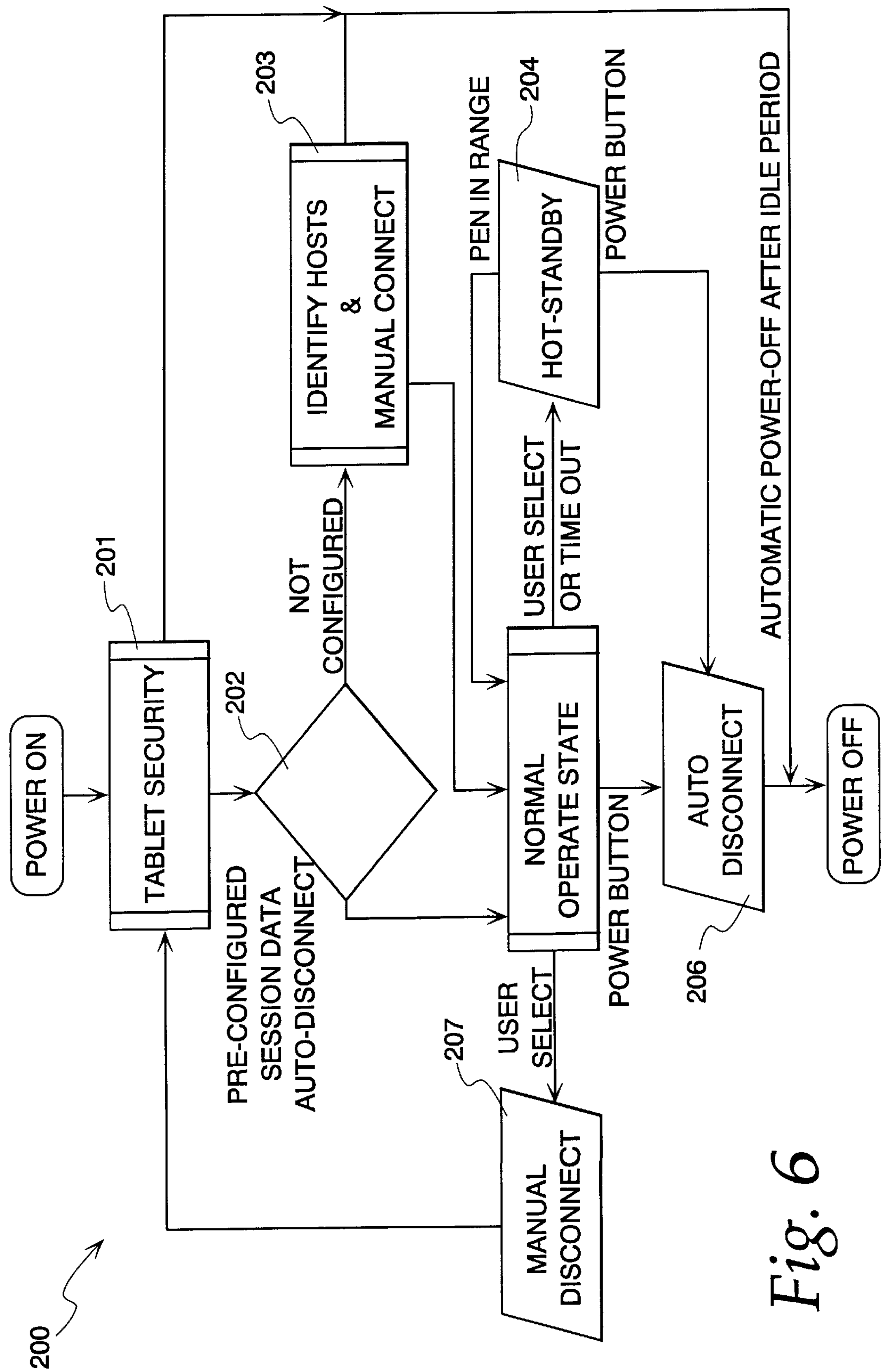
FIG. 6 is a block diagram illustrating the operational states of the wireless interface device under the control of dedicated Viewer Manager software in accordance with the present invention.

FIG. 6 is a block diagram illustrating the operational states of wireless interface device 100 under the control of the Viewer Manager software 200. As shown in FIG. 6, on power up, the wireless interface device 100 enters into a "TABLET SECURITY" state 201, in which an optional security step is performed. In the state 201, either the device 100 automatically shuts off after an idle period or the user performs a "log on" procedure which, as a security measure, identifies and validates the user. Then, at decision point 202, the Viewer Manager software 200 then determines if a procedure to set up a communication link is preconfigured. If so, a communication link is established automatically with the host computer 101 and the Viewer Manager software 200 goes into the normal operation state 205, which is described in further detail below. If a communication link is not preconfigured, a manual procedure is performed in state 203, in which the desired host computer 101 is identified and connected. From state 203, either the device 100 automatically shuts off after an idle period or the user continues on and enters normal operation state 205.

In normal operation state 205, the wireless interface device 100 controls the program running in the host computer 101, in accordance with the input data received from stylus input subsystem 110. The positions of the stylus in stylus input subsystem 110 are delivered to the host computer 101, which generates display commands to the wireless interface device 100. The CPU 112 executes the display commands received, which may result in an update of the LCD 113C. In this embodiment, either a direct user command or inactivity over a predetermined time period causes the wireless interface device 100 to enter a "HOT-STANDBY" minimum power state ("sleep" mode), represented in FIG. 6 by block 204. In the minimum power state 204, to preserve battery power, the various operations of the wireless interface device 100's functional units are placed on standby status. If the status is put in contact with the digitizer panel, the wireless interface device 100 is reactivated, and control of the host computer 101 is resumed by re-entering state 205. Thereupon, wireless interface device 100 enters into a state 206, in which an auto-disconnect procedure is executed, which releases control of the host computer 101 and powers down the wireless interface device 100.

The user may also relinquish control of the host computer 101 from state 205 by selecting a manual disconnect function. When the manual disconnect function is selected, the wireless interface device 100 enters manual disconnect state 207, in which the connection to the host computer 101 is terminated. The wireless interface device 100 is then returned to state 201 to accept the next user validation.

FIG. 7 is a block diagram of the software environment 240 in which the wireless interface device 100 and the host computer 101 operate to provide the wireless interface device 100 remote control of the host computer 101. As shown in FIG. 7, a wireless communication system 250 is provided for communication between the host computer 101 and the wireless interface device 100. On the side of the wireless interface device 100, i.e. software environment 230A, a communication output manager software routine 252 controls transmissions of pen events over the wireless communication link 250 to a host communication input manager 262 in the host computer 101 (i.e. software environment 230B). The pen events include the position information of the stylus and tip-up and tip-down information. A pen event buffer 251 queues the pen events for transmission through a communications manager 252. In the software environment 230A, the communications input manager 254 receives from the wireless communication system 250 video events transmitted by host communication output manager 260 in the software environment 230B. These video events include graphical commands for controlling the LCD 113C. In the software environment 230A, the received video commands are queued in the video event buffer 256 to be processed by the CPU 112 as graphical instructions to the LCD 113C.

In the software environment 230B, i.e. in host computer 101, pen events are queued in pen event buffer 264, which may then be provided to the Pen Windows module 266. The Pen Windows module 266 processes the pen events and creates video events in a video event buffer 267, which is then transmitted to the wireless interface device 100 over wireless communication system 250.

FIG. 8 is a block diagram which shows in further detail the software environment 230B (FIG. 7) in the host computer 101; running an application program 270 under a Windows operating system 272. As shown in FIG. 8, the pen events queued in the pen event buffer 264 are provided to a pen event injector 274, which provides the pen events from the pen event buffer 264, one pen event at a time, to a buffer ("RC buffer") 275 of the Recognition Context Manager module (the "RC manager") 276 in Pen Windows. The RC buffer 275 holds a maximum of four pen events. The RC Manager 276 assumes that pen events are received at RC buffer 275 as they occur. Thus, if the Pen Windows system is presented with pen events faster than they are retrieved from RC buffer 275 without pen event injector 274, the pen events that arrive at RC buffer 275 when it is full are lost. The pen event injector 274 prevents such data loss. To provide this capability, the pen event injector 274 includes both Windows virtual device (V×D) and device driver (DRV) codes (not shown). The DRV portion removes a single pen event from pen event buffer 264 and delivers it to the RC buffer 275 using the normal Pen Windows add and process pen event mechanisms, Then the V×D portion reactivates the DRV code after a minimum time delay using a virtual machine manager service to retrieve the next pen event from pen event buffer 264. Those of ordinary skill in the art would appreciate that, under the terminology used in Windows, DRV code refers to a dynamically linked library in Windows which interacts with a hardware device (in this case, pen device buffer 264), and V×D code refers to a dynamically lined library which manages a sharable resource (in this case, the DRV code).

The RC Manager 276 examines each pen event in the RC buffer 275, and according to the context of the pen event in its possession, the RC Manager 276 determines whether the stylus is in the pen mode or in the mouse mode. In this embodiment, as will be discussed in more detail below, an icon allows the user to use the stylus as a "mouse" device. The icon, called "mouse button toggle", allows the user to switch between a "left" button and a "right" button as used in an industry standard mouse device. The selected button is deemed depressed when the stylus makes contact with the pressure-sensitive digitizer panel. A rapid succession of two contacts with the display is read by the RC Manager 276 as a "double click", and dragging the stylus along the surface of the display is read by the RC Manager 276 as the familiar operation of dragging the mouse device with the selected button depressed.

If the stylus is in the pen mode, the RC Manager 276 provides the pen event to a recognizer 277 to interpret the "gesture". Alternatively, if the pen event is a mouse event, the RC Manager 276 provides the pen event as a mouse event for further processing in a module 278. The interpreted gestures or mouse events are further processed as input data to the Windows operating system 272 or the application program 270.

The output data from an application program, such as Windows 272 or application program 270, is provided to the video event buffer 267. These video events are transmitted to the host communications output manager 260 for transmission to the wireless interface device 100.

Figure 9:
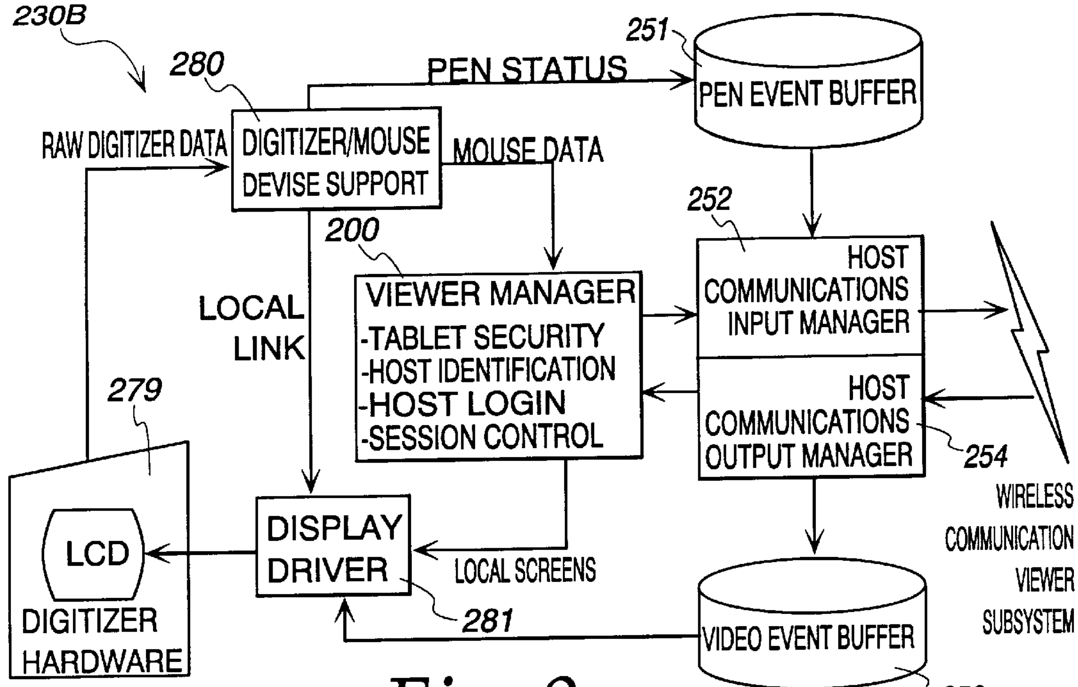
FIG. 9 is a block diagram which shows in further detail the software environment in the wireless interface device, running in a normal operation state.

FIG. 9 is a block diagram which shows in further detail the software environment 230A in the wireless interface device 100 in the normal operation state 205 of the Viewer Manager 200. In FIG. 9, the stylus in the stylus input subsystem 110 and LCD video display 113C in the video display subsystem 113 are shown collectively as a digitizer-display device 279. In a normal operation state 205, the Viewer Manager 200 interacts with the application program 270 in the wireless interface device 100 by way of the Communications Output Manager 252 and the Communications Input Manager software 254. In addition, the Viewer Manager software 200 also receives digitized data from a digitizer 280, which, in turn, receives digitized data from stylus input subsystem 110. The Viewer Manager software 200 uses the digitized data to provide visual feedback to the user, which is discussed in further detail below. The Viewer Manager software 200 generates local video commands to a display driver 281. The display driver 281 also receives from video event buffer 256 video display commands from the host computer system 101.

At the core of the wireless interface device 100's user interface is the stylus's behavior under Pen Windows. Of significance in wireless interface device 100's design is the emulation of the natural "pen-and-shaper" interaction with the user. That is, in a pen mode, the stylus must leave ink as it moves across the surface of the screen in the same way that a pen leaves ink on paper. However, using Pen Windows software, the RC Manager 276, residing in the host computer 101, determines for each pen event whether the mouse or the pen mode is used.

If the wireless interface device 100 simplistically accesses the host computer 101 as a local device access, the wireless link between the host computer 101 and the wireless interface device 100 would be required to carry a minimum of 200 inking messages per second (100 stylus tip locations plus 100 line drawing commands). To maintain the pen-and-paper emulation, the wireless interface device 100 is further required to have a total processing delay (hence response time), including the overhead of the communication protocols, which is near or below the human perception level. In addition, noise in the transmission medium often leads to momentarily interruption of data transmission, or results in data corruption that requires re-transmission, thereby further reducing the throughput of the wireless link. To provide an acceptable level of performance, i.e., a high message-per-second communication rate and an acceptable propagation delay, a technique referred to as "local inking" is developed and applied to the wireless interface device 100's design, in accordance with the present invention. Without local inking, a high bandwidth communication link is required to meet the propagation delay requirement. Such a high bandwidth communication link is impractical, both in terms of cost and its impact on the portability of the resulting wireless access device.

With local inking, the Viewer Manager software 200 provides inking on the LCD 113C locally before the corresponding inking video events are received from the host computer 101. In this manner, visual feedback is provided virtually immediately without requiring either highly complex networking equipment, or very high performance and costly components in both the wireless interface device 100 and the host computer 101. Local inking provides both a real time response and an orderly handling of the stylus's data stream. Since local inking reduces the need for processing at the peak pen event rate of the stylus's data stream, the host computer 101 can thus apply normal buffering techniques, thereby reducing the bandwidth requirement on the communication network.

In one proposed industry standard for a stylus or pen-based system, namely the Microsoft Windows for Pen Computing system ("Pen Windows"), the pen mode requires (i) a pen driver that can deliver stylus tip locations every five to ten milliseconds (100 to 200 times per second), so as to achieve a resolution of two hundred dots per inch (200 dpi), and (ii) a display driver than can connect these dots in a timely manner. By these requirements, Pen Windows attempts to provide a real time response to maintain the pen paradigm. The Windows for Pen Computing system is promoted by Microsoft Corporation, Redmond, Wash. Details of the Pen Windows system are also provided in Windows version 3.1 Software Developer Kit obtainable from Microsoft Corporation. Under one implementation of the Pen Windows, a maximum of four stylus locations can be stored in a buffer of a module called "PENWIN.DLL" (for "Pen Window Dynamically Linked Library")). Consequently, in that implementation, the maximum latency allowed is twenty to forty milliseconds before any queue tip location is written. Each time the system fails to process a pen event within twenty to forty milliseconds of queuing, a stylus tip location is lost and there is a corresponding impact on the accuracy of the line being traced.

As mentioned above, the stylus is used in both pen mode and mouse mode. Since the RC Manager 276, running on the host computer 101, rather than a software module on the wireless interface device 100, determines whether a given pen event is a mouse mode event or a pen mode event, the Viewer Manager software 200 must anticipate which of these modes is applicable for that pen event. Further, should the anticipated mode prove to be incorrect, the Viewer Manager software 200 is required to correct the incorrectly inked image in video display subsystem 113.

Figure 10:
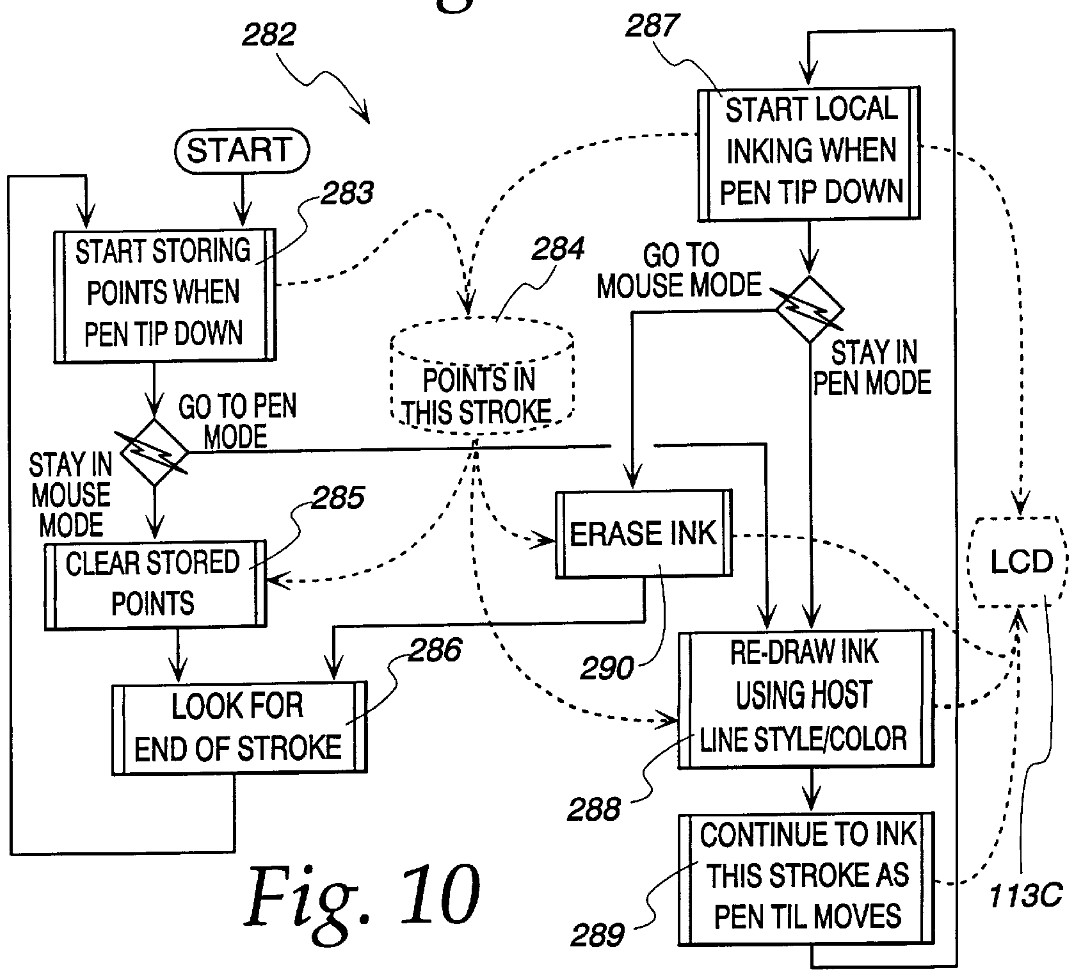
FIG. 10 is a block diagram illustrating the method used in the wireless interface device to anticipate a pen/mouse mode decision.

FIG. 10 illustrates the method used in the wireless interface device 100 to anticipate the RC Manager 276's mode decision and to correct the image in the video display subsystem 113 when a local inking error occurs. As shown in FIG. 10, when the normal operational state 205 is entered, a pen control program (represented by the state diagram 282) in the Viewer Manager software 200 is initially in the mouse mode in state 283. However, even in the mouse mode, the trajectory of the stylus in contact with the pen digitizer is stored in the pen event buffer 284 until a mode message is received from the host computer 101. The pen event buffer 284 is separate from pen event buffer 251, which is used to transmit the pen events to the host computer 101. If the RC Manager 276 confirms that the stylus 110 is in a mouse mode, the accumulated pen events are discarded and the pen control program 282 waits for the last point on which the pen tip is in contact with the pen digitizer. Then the pen control program 282 returns to a state 283, in which the trajectory of the pen is again accumulated in the pen event buffer 284 until receipt of a mode message from the host computer 101. In state 283, the control program 282 assumes that the stylus will continue to be in the mouse mode.

Alternatively, while in state 283, if a mode message is received indicating the stylus is in the pen mode, the control program 282 enters state 288, in which the accumulated pen events are drawn locally onto the LCD screen of the video display subsystem 113 in accordance with the line style and color specified in the mode message. After all accumulated pen events in the pen event buffer 284 are drawn, the control program 282 enters a state 289, in which control program 282 continues to ink the trajectory of the tip of the stylus for as long as contact with the pen digitizer is maintained. Once the tip of the stylus breaks contact with the pen digitizer, the control program 282 enters state 287.

In state 287 the control program 282 assumes that the stylus will continue to be in the pen mode. Thus, local ink will follow the trajectory of the stylus while the top of the stylus remains in contact with the pen digitizer, or until a mode message is received from the host computer 101, whichever arrives earlier. Since the initial policy decision is a guess, the local inking is drawn using a single pixel-wide style and an XOR ("exclusive OR") operation, in which the pixels along the trajectory of the stylus are inverted. While in state 287, the pen events associated with the trajectory of the stylus are accumulated in the pen event buffer 284.

If the mode message received in state 287 indicates that the stylus is in mouse mode, i.e. the policy decision was wrong, the control program 282 then enters a state 290, in which the accumulated pen events in pen event buffer 284 are used to erase the stylus stroke. Since the initial draw is accomplished by a bit XOR ("exclusive OR") operation at the appropriate positions of the frame buffer, erasure is simply provided by the same XOR operation at the same positions of the frame buffer. The control program 282 then enters state 286. However, if the mode message received in state 287 confirms that the stylus is in pen mode, the accumulated pen events of pen event buffer 284 are used to redraw on the LCD 113C, using the line style and color specified on the mode message.

Under a convention of the Pen Windows software, starting a stroke of the stylus with the barrel button depressed (for active stylus systems) indicates an erase ink operation in pen mode. The control program 282 recognizes this convention and refrains from inking during this stroke without waiting for confirmation from the host computer 101. In addition, the control program 282 does not change modes across an erasing stroke: i.e., if the stylus is in the pen mode prior to the erase stroke, the stylus remains in the pen mode after the erase stroke; conversely, if the stylus is in the mouse mode prior to the erase stroke, the stylus remains in the mouse mode after the erase stroke.

Since all the pen events used in local inking on the wireless interface device 100 are also processed in the host computer 101, the trajectory of local inking must coincide identically with the line drawn at the host computer 101. Because of local inking, processing by the host computer 101 within the human perceptual response time is rendered unnecessary. Thus, in the host computer 101, the pen events can be queued at pen event buffer 264, to be retrieved one at a time by pen event injector 274. Hence, when pen event buffer 264 is suitably sized, data loss due to overflow by RC buffer 275 is prevented.

Alternatively, the control program 282 can also be implemented to follow a "retractable ball-point pen" paradigm. Under this paradigm, the user controls a local stylus mode of the stylus, such that inking occurs when the stylus is set to be in the local pen mode, and no inking occurs when the stylus is in the local mouse mode. If the local stylus mode conforms with the mode expected by Pen Windows, the image seen on the LCD display of the video display subsystem 113 is the same as described above with respect to state 287 of the control program 282. If the local stylus mode is the mouse mode, and Pen Windows software expects stylus 110 to be in the pen mode, the subsequent video events from host computer 101 would provide the required inking. Finally, if the local stylus mode is the pen mode and Pen Windows software expects the stylus to be in the mouse mode, inking would be left on the screen of video display subsystem 113. Under this paradigm, the user would eliminate the erroneous inking by issuing a redraw command to Pen Windows.

5. Detailed Description of the Schematic Diagrams

Figure 11A:
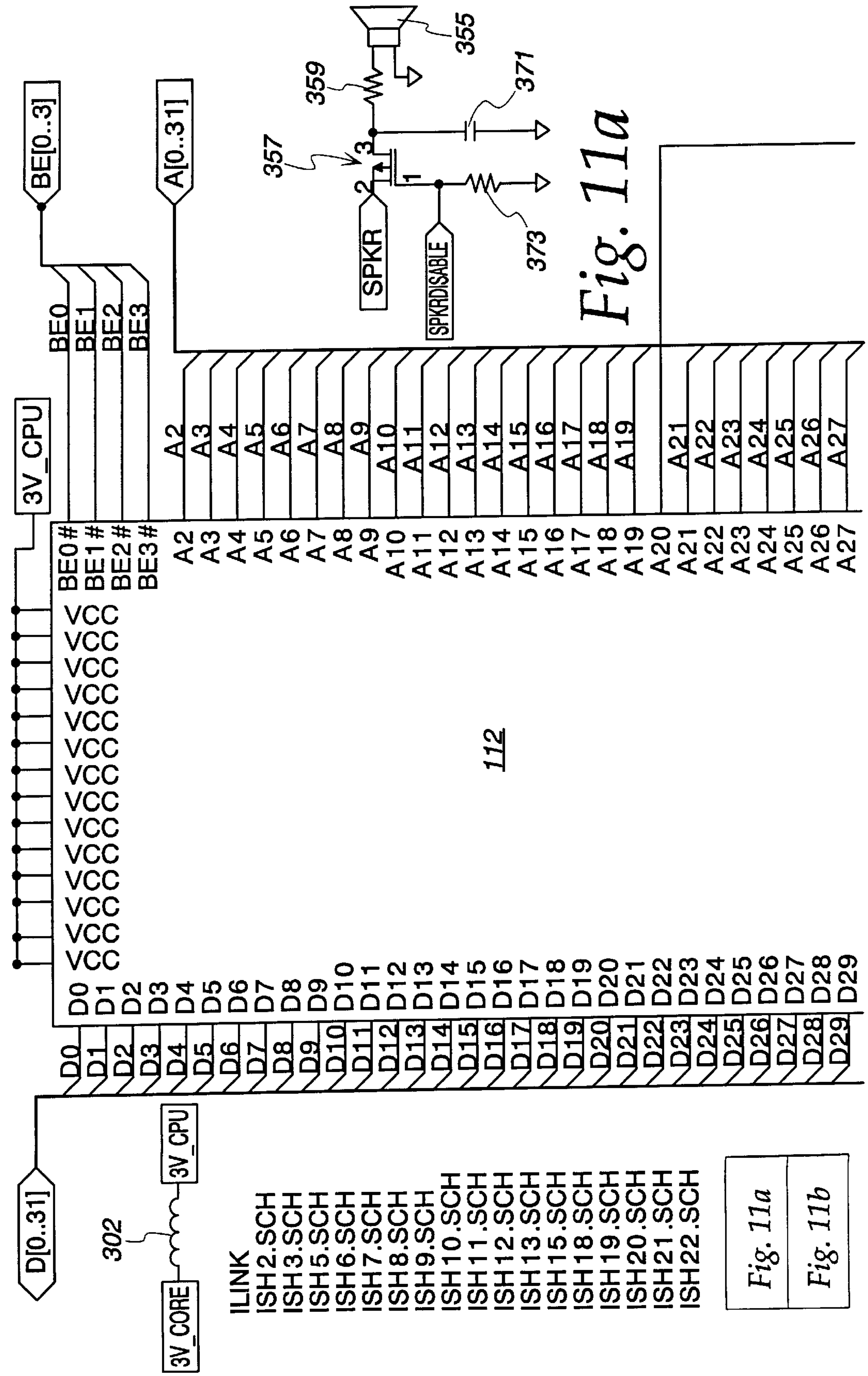
FIGS. 11–30 are schematic diagrams of the wireless interface device in accordance with the present invention.
Figure 11B:
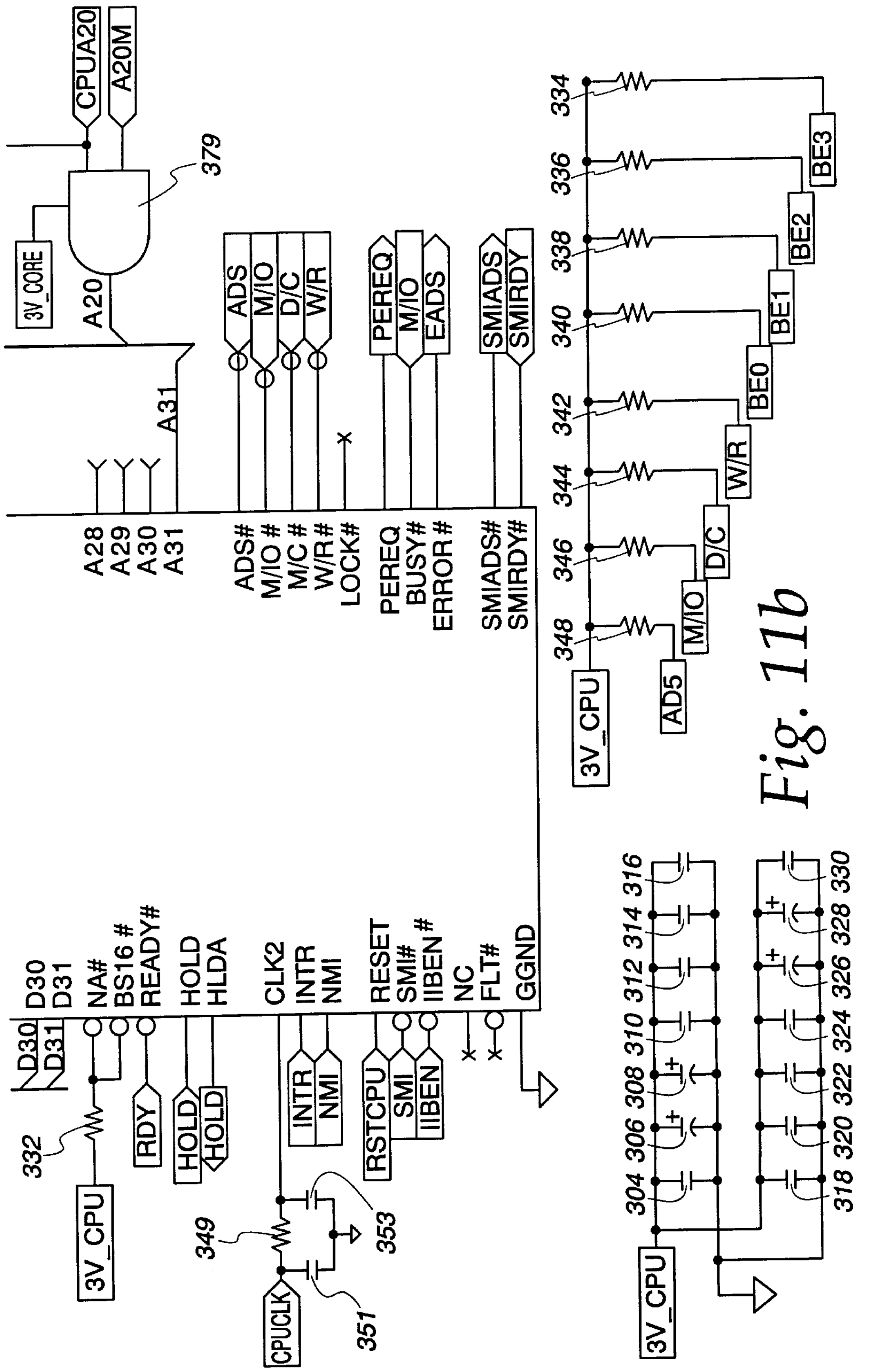
Figure 12A:
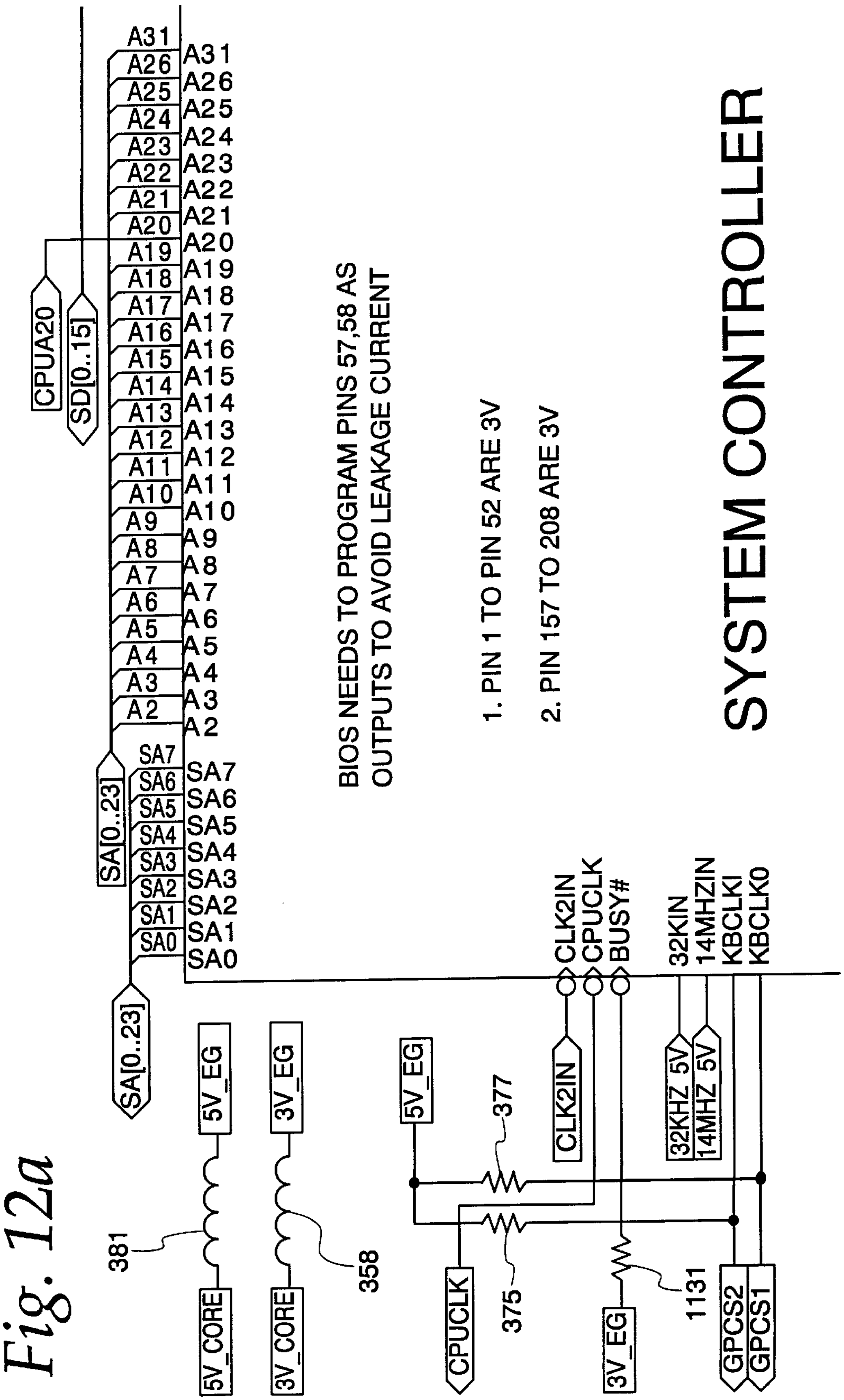
Figure 12B:
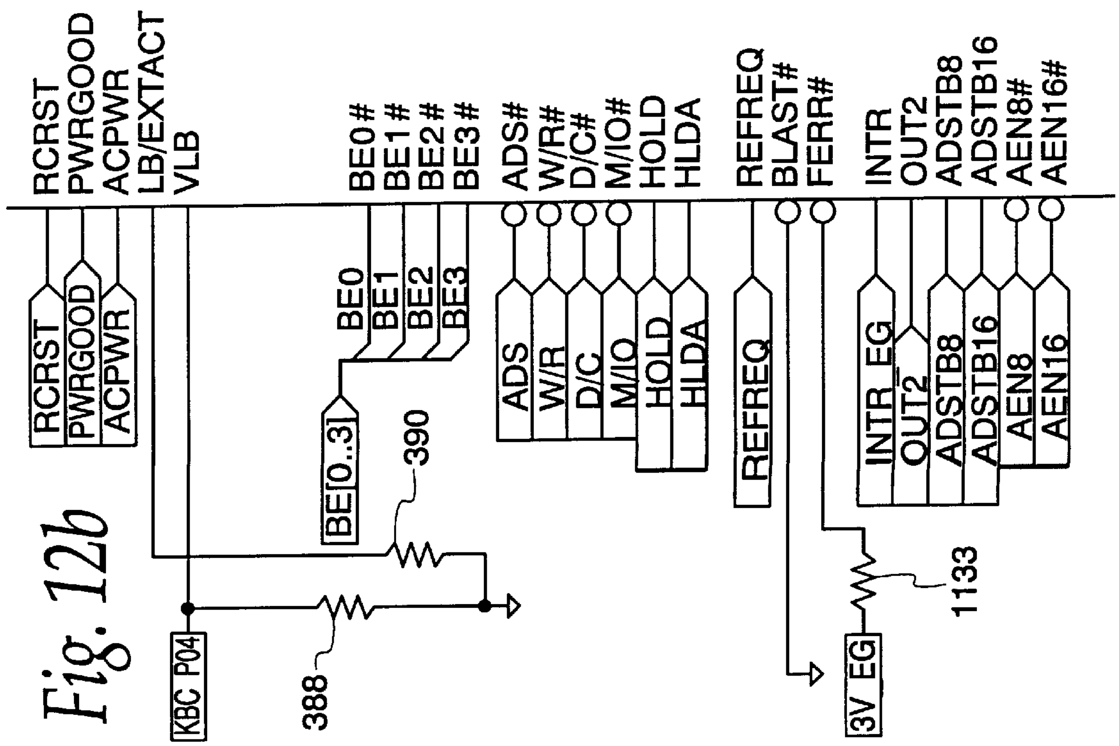
Figure 12C:
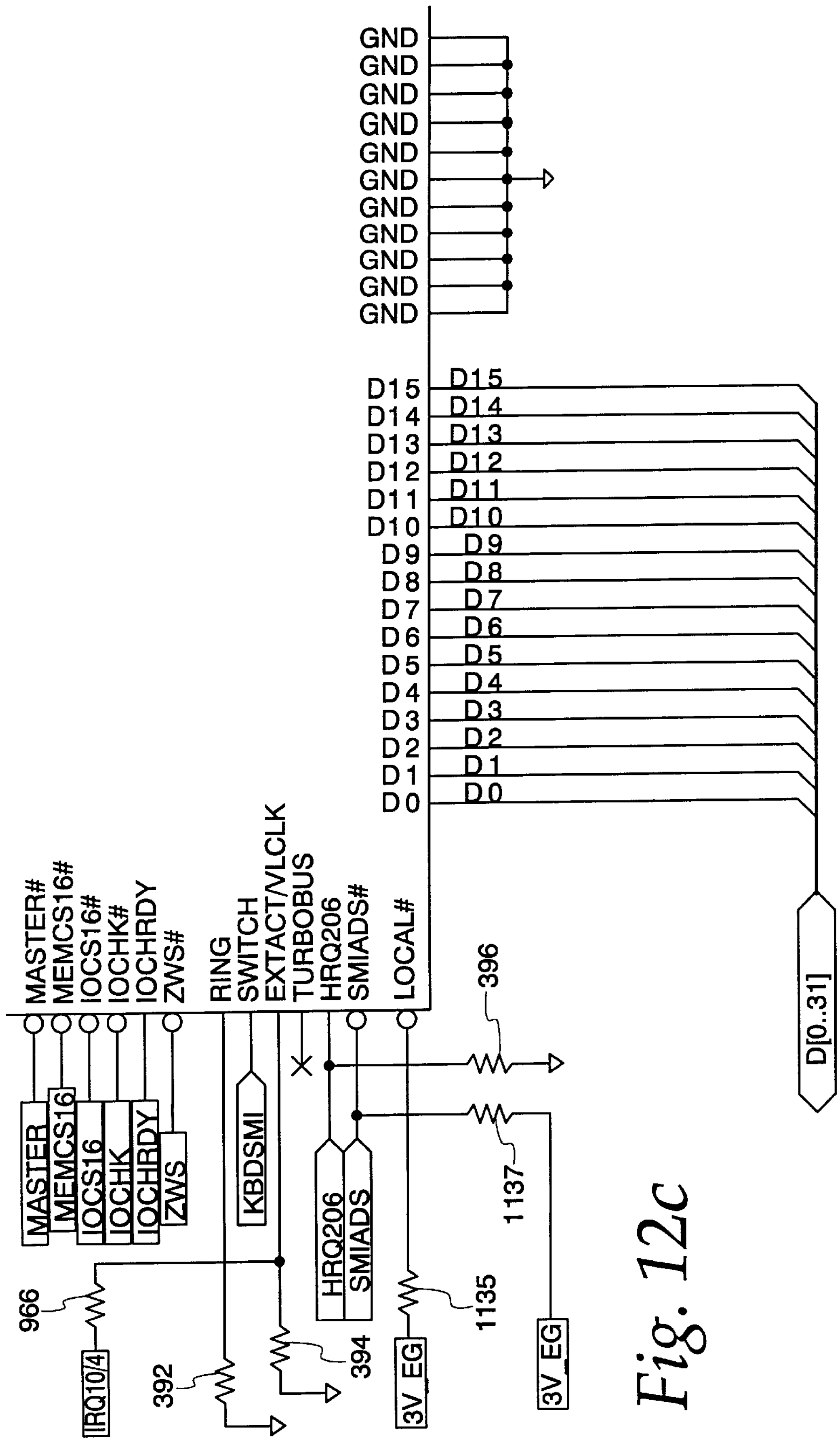
Figure 12D:
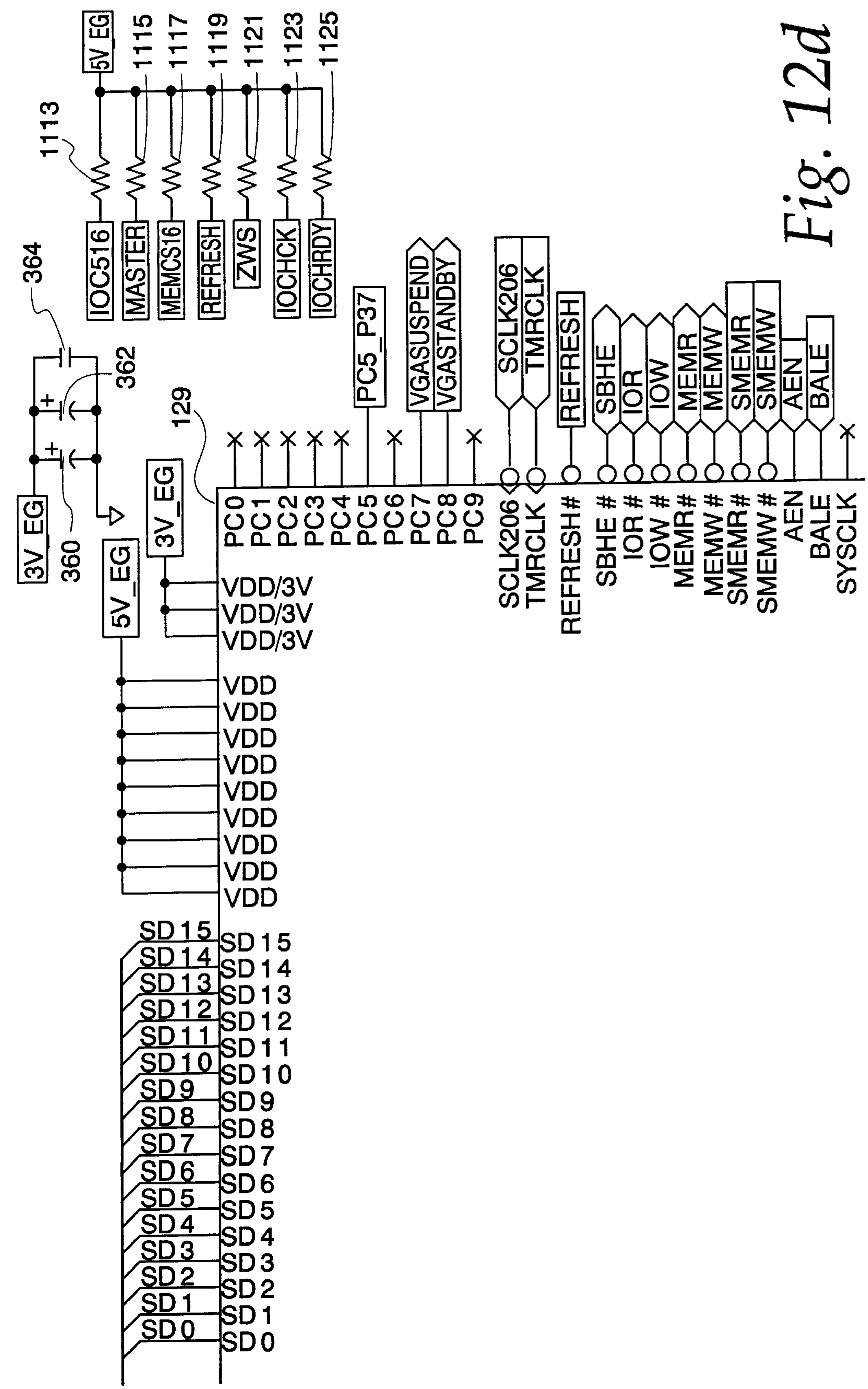
Figure 12E:
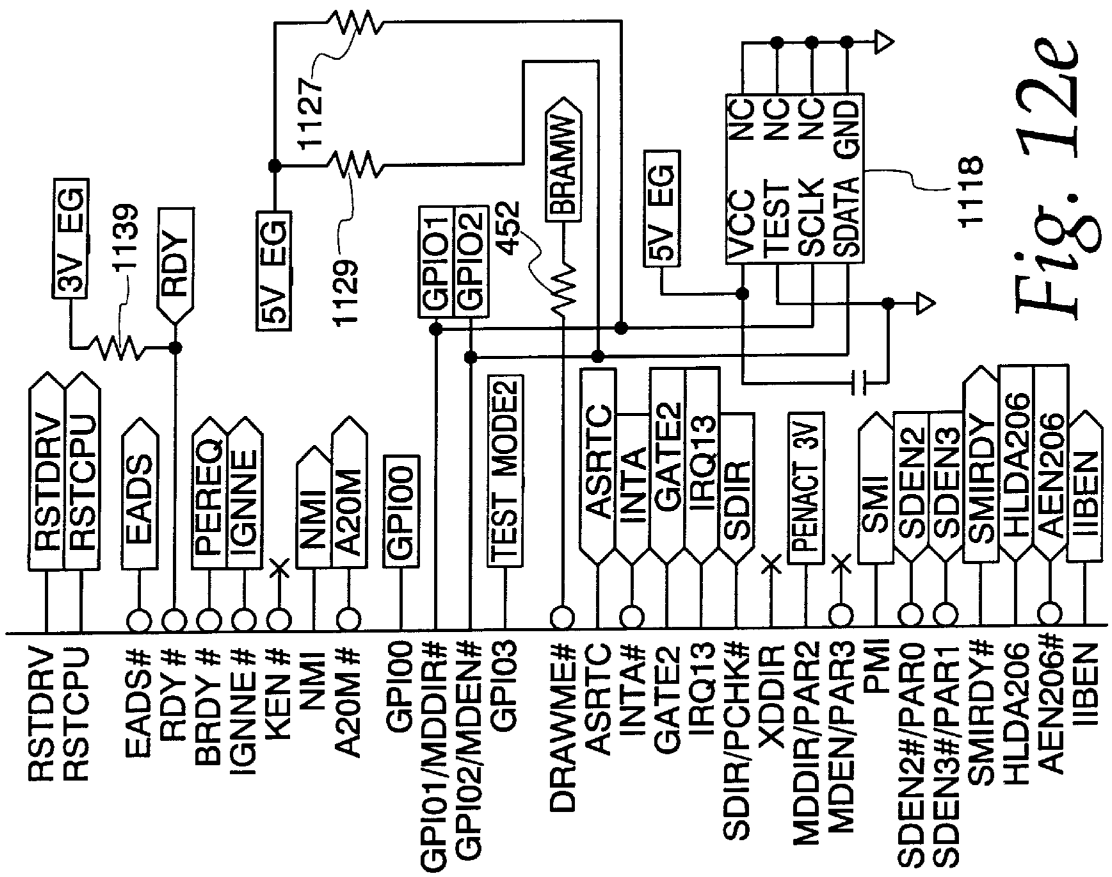
Figure 12F:
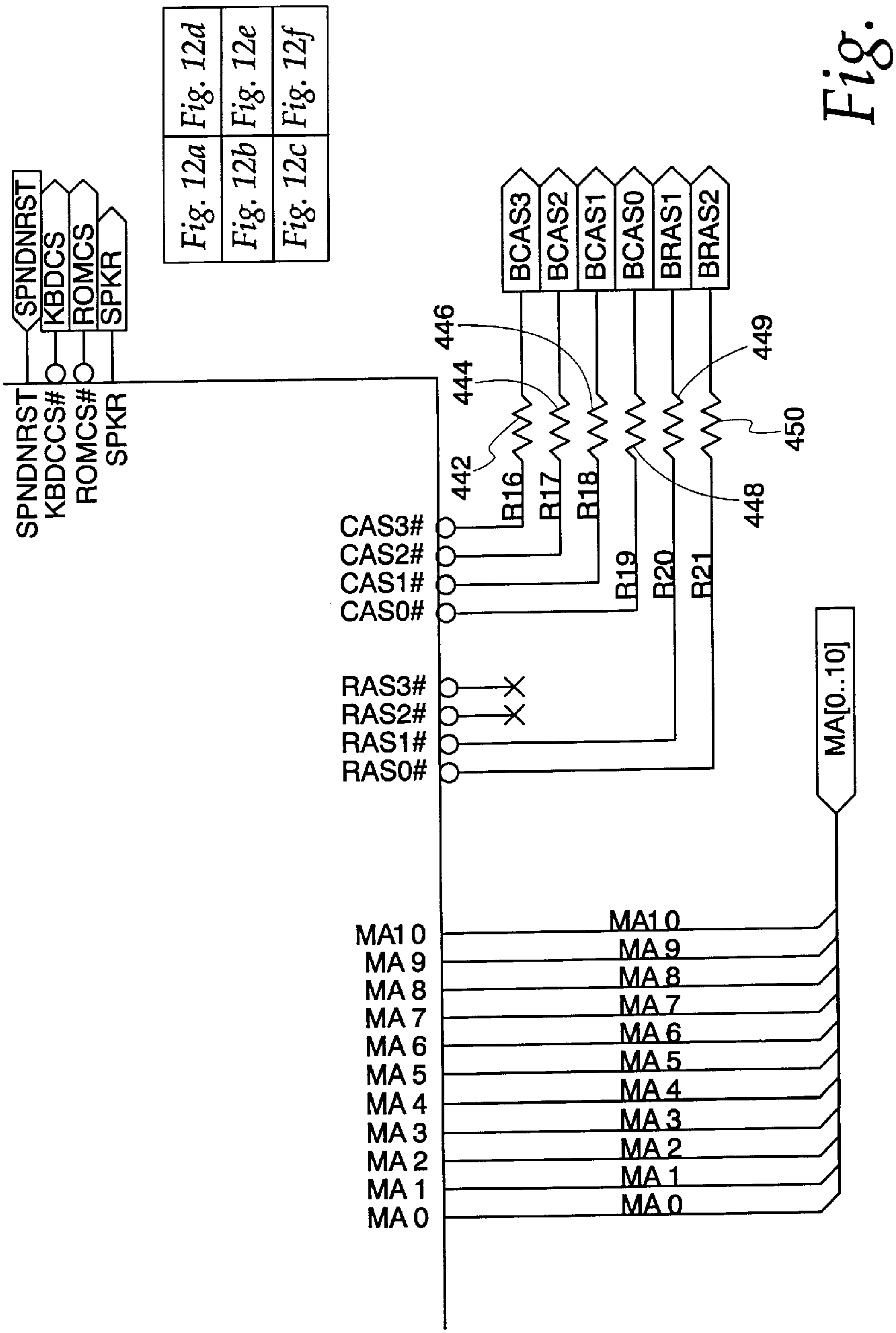

One embodiment of the invention is illustrated in the schematic drawings, FIGS. 11–30. Referring to FIG. 11, the system may include a CPU 112, such as an AMD Model No. AM386DXLV microprocessor. The CPU 112 includes a 32-bit data bus D[0 . . . 31] as well as a 32-bit address bus A[2 . . . 31]. Both the data bus D[0 . . . 31] as well as the address bus A[2 . . . 31] are connected to the processor bus 150 (FIG. 4), for example, an AT bus. As will be discussed in more detail below, the system controller 129 (FIG. 4) performs various functions including management of the processor bus 150. In order to conserve power, a 3-volt microprocessor may be used for the CPU 112. As such, a 3-volt supply 3V CPU is applied to the power supply VCC pins on the CPU 112. The 3-volt supply 3V_CPU is available from a DC-to-DC converter 300 (FIG. 26) by way of a ferrite bead inductor 302. In particular, the DC-to-DC converter 300 includes a 3-volt output, 3V_CORE. This output, 3V_CORE, is applied to the ferrite bead inductor 302 and, in turn, to the power supply pins VCC of the CPU 112. In order to prevent noise and fluctuations in the power supply voltage from affecting the operation of the CPU 112, the power supply voltage 3V CPU is filtered by a plurality of bypass capacitors 304 through 330.

The 3-volt supply 3V_CPU is also used to disable unused inputs as well as to pull various control pins high for proper operation. For example, the 3-volt power supply 3V_CPU is applied to the active low N/A and BS16 pins of the CPU 112 by way of a pull-up resistor 332. In addition, the signals BE[0 . . . 3], W/R, D/C, M/IO and ADS are pulled up by a plurality of pull-up resistors 334 through 348.

The CPU 112 is adapted to operate at 25 megahertz (MHz) at 3.0 volts. A 25 MHz clock signal, identified as CPU CLK, available from a clock generator 398 (FIG. 13), is applied to a clock input CLK2 on the CPU 112 by way of a resistor 349 and a pair of capacitors 351 and 353. The AMD Model No. AMD386DXLV microprocessor supports a static state, which enables the clock to be halted and restarted at any time.

Figure 15B:
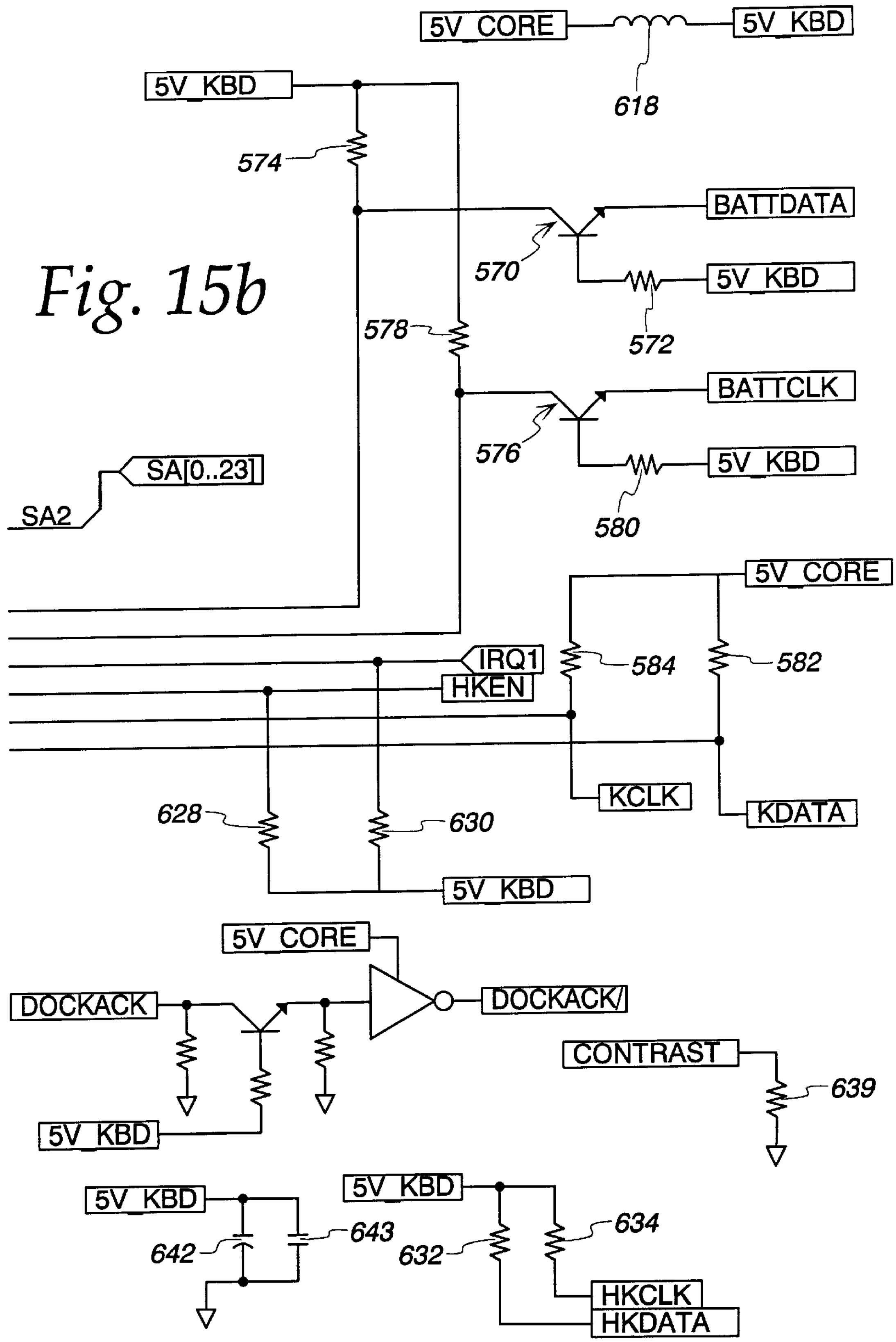

The wireless interface device 100 includes a speaker 355. The speaker 355 is under the control of the system controller 129 (FIG. 12). In particular, a speaker control signal SPKR from the system controller 129 is applied to a source terminal of a field-effect transistor (FET) 357 for direct control of the speaker 355. The drain terminal is connected to the speaker 355 by way of a current-limiting resistor 359 and a bypass capacitor 371. Normally, the speaker 355 is active all the time. In particular, the gate terminal of the FET 357 is connected to the system ground by way of a resistor 373. The gate terminal of the FET 357 is also under the control of a speaker disable signal SPKRDISABLE, available from the keyboard controller 125 (FIG. 15). The speaker disable signal SPKRDISABLE is active high. Thus, when the speaker disable signal SPKRDISABLE signal is low, the FET 357 is turned on to enable the speaker signal SPKR from the system controller 129 to control the speaker 355. When the speaker disable signal SPKRDISABLE is high, the FET 357 is turned off to disable the speaker 355.

Referring to FIG. 12, the system controller 129 is connected between the local processor or AT bus 150 and the system ISA bus 151. The system controller 129 performs a variety of functions including that of system controller, DRAM controller, power management, battery management and management of the local AT bus 150. The system controller 129, preferably a PicoPower Pine Evergreen 3, Model No. 86C368 system controller, is a 208-pin device that operates at 33 MHz with a full 5-volt input or a hybrid 5-volt/3.3-volt input. At 3.3 volts the system controller 129 is adapted to reliably operate at 20 Mhz and perhaps up to 25 Mhz.

The system controller 129 includes several system features including support of several clock speeds from 16 to 33 MHz. In addition, the system controller 129 includes two programmable non-cacheable regions and two programmable chip selects, used for universal asynchronous receiver transmitter (UART) interface 134 and the radio interface 114B as discussed below.

The system controller 129 supports both fast GATE A20 and a fast reset control of the CPU 112. In particular, the system controller 129 includes a 32-bit address bus A[0 . . . 31] that is connected to the local AT bus 150. The address line A[20] is used to develop a signal CPUA20, which is applied to the A20 pin on the CPU 112 and also applied to an AND gate 379 (FIG. 11) to support a port 92H for a fast GATE A20 signal. A fast reset signal RSTCPU is also generated by the system controller 129. The fast reset signal RSTCPU is applied to the reset pin RESET of the CPU 112 for fast reset control.

The system controller 129 also provides various other system level functions. For example, the system controller 129 includes a register at address 300H. By setting bit 12 of this register, a ROM chip select signal ROMCS is generated, which enables writes to the flash memory system 117 (FIG. 25), which will be discussed below. A keyboard controller chip select signal KBDCS for the keyboard controller 125 (FIG. 15), as well as general purpose chip select signals GPCS1 and GPCS2 for selecting between the RF controller 114A, the UART 134 (FIG. 16) or the pen controller 110A (FIG. 21), are generated by the system controller 129.

The system controller 129 is connected to the system ISA bus 151 by way of a 16-bit system data bus SD[0 . . . 15] and a 24-bit system address bus SA[0 . . . 23] of which only 8-bits SA[0 . . . 7] are used. The system controller 129 is also connected to the 32-bit local processor data bus D[0 . . . 31], as well as the local processor address bus A[0 . . . 31].

All of the ground pins GND on the system controller 129 are tied to the system ground. Both 3-volt and 5-volt power supplies are applied to the system controller 129. In particular, a 5-volt supply 5V_EG is applied to the power supply pins VDD of the system controller 129. The 5-volt supply 5V_EG is available from DC-to-DC converter 300 (FIG. 26) by way of a ferrite bead inductor 381 (FIG. 12). More particularly, a 5-volt supply signal 5V_CORE from the DC-to-DC converter is applied to the ferrite bead inductor 381, which, in turn, is used to generate the 5-volt supply signal 5V_EG. In order to stabilize the 5-volt supply signal 5V_EG, a plurality of bypass capacitors 1101–1111 (FIG. 13) are connected between the 5-volt supply 5V_EG and system ground.

A 3-volt power supply 3V_EG is also applied to the system controller 129 and, in particular, to the power supply pins VDD/3V. This 3-volt supply 3V_EG is also obtained from the DC-to-DC converter 300 (FIG. 26) by way of a ferrite bead inductor 358. More particularly, 3-volt supply 3V_CORE, available at the DC-to-DC converter 300, is applied to the ferrite bead inductor 358, which, in turn, is used to generate the 3-volt power supply signal 3V-EG. A plurality of bypass capacitors 360, 362 and 364 are connected between the 3-volt supply 3V_EG and system ground for stabilizing.

The system controller 129 is reset by a reset signal RCRST (FIG. 20) on power up. The reset signal RCRST is developed by the 3-volt power supply 3V_EG, available from the DC-to-DC converter 300 (FIG. 26) and circuitry which includes a resistor 359, a capacitor 361 and a diode 363. Initially on power up, the capacitor 361 begins charging up from the 3-volt supply 3V_EG through the resistor 359. During this state, the diode 363 is non-conducting. As the capacitor charges, the level of the reset signal RCRST rises to reset the system controller 129. Should the system be turned off or the 3-volt supply 3V_EG be lost, the diode 363 provides a discharge path for the capacitor 361.

In order to assure proper operation of the system controller 129, a number of signals are pulled up to either five volts or three volts or pulled down by way of various pull-down resistors. More specifically, the signals IOCS16, MASTER, MEMCS16, REFRESH, ZWS, IOCHCK, GPIOl/MDDIR and GPI02/MDEN are pulled up to the 5-volt supply 5V_EG by way of a plurality of pull-up resistors 1113–1129, respectively. Similarly, the signals BUSY, FERR, LOCAL, SMIADS and RDY are pulled up by a plurality of pull-up resistors 1131 through 1139. In addition, the general purpose chip select signals GPCS1 and GPCS2 are pulled up to the 5-volt power supply signal 5V_EG by way of a pair of pull-up resistors 375 and 377. Certain signals are pulled low by way of pull-down resistors in order to assure their operating state. In particular, the signals KBC-PO4, LB/EXTACT, RING, EXTACT/VLCLK and HRQ206 are pulled down by the pull-down resistors 388 to 396. The signal BLAST is tied directly to the system ground.

As mentioned above, the system controller 129 is capable of running at different clock frequencies, depending upon the voltage applied, while supplying a clock signal to the CPU 112. Even though the system controller 129 can supply either a 1X or a 2X clock signal to the CPU 112, the system controller 129 requires a 2X clock for proper operation. Thus, a 2X clock signal CLK2IN, available from a clock generator circuit 398 (FIG. 13), is applied to the clock 2X pin CLK2IN of the system controller 129. In addition, 32 kilohertz (KHz) and 14 megahertz (MHz) clock signals are also applied to the system controller 129, available from the clock generator circuit 398, for proper operation. The system controller 129, in turn, provides a CPU clock signal CPU-CLK to the CPU 112 and in particular to its clock 2-pin CLK2 by way of a resistor 1141 and the capacitors 1143 and 1145.

Figure 17:
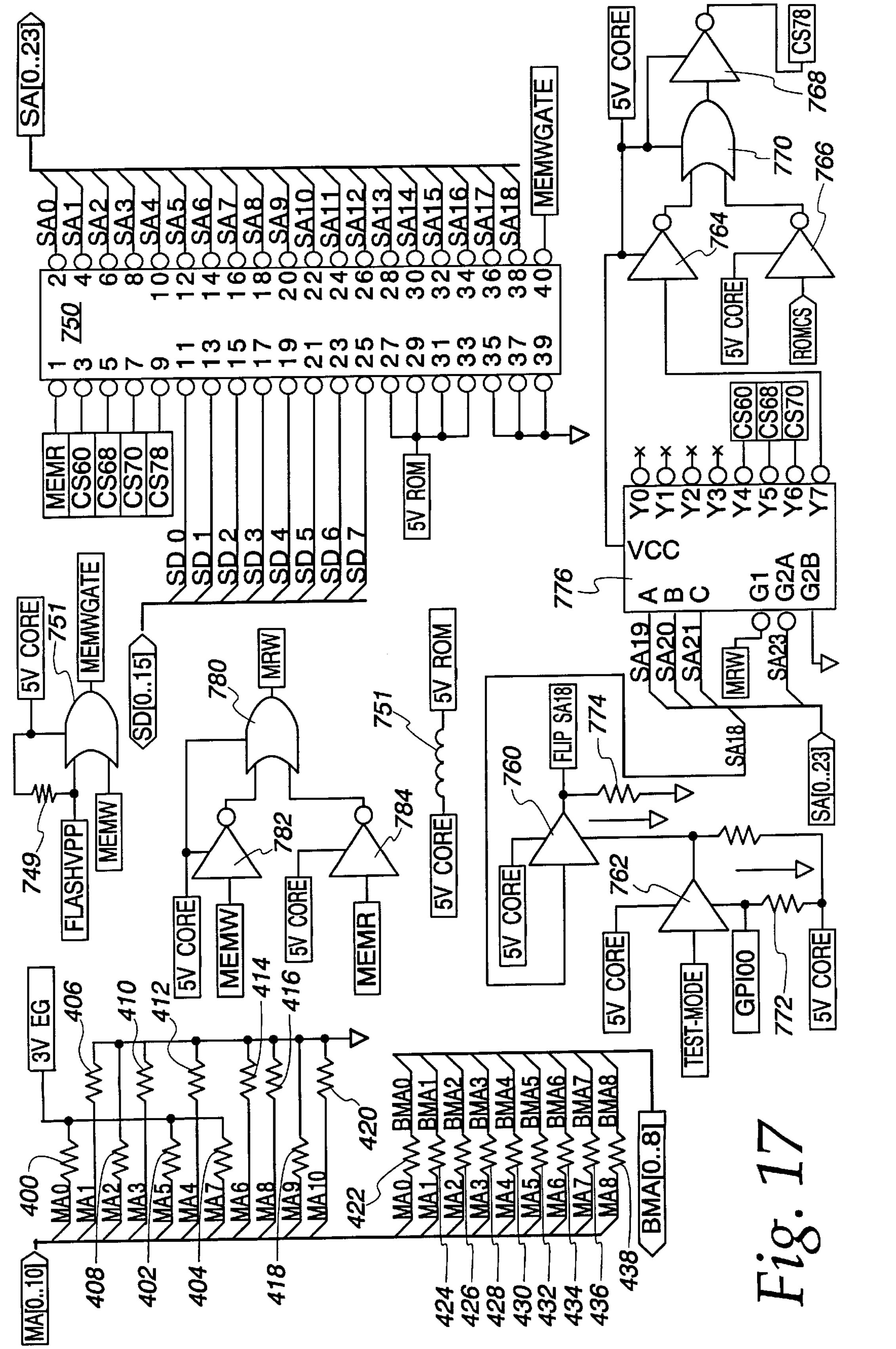

The system controller 129 is adapted to be configured during an RC-RESET mode. In particular, the DRAM memory address lines MA[0 . . . 10], normally used for addressing the DRAM 111A (FIGS. 18 and 24), are pulled high or low in order to configure the system controller 129. More particularly, the DRAM memory address lines MA[0 . . . 10] are applied to either pull-up or pull-down resistors for configuration as illustrated in FIG. 17. Table 2 below illustrates the configuration shown.

TABLE 2

System Controller Configuration Table

| NAME | FUNCTION | DEFAULT STATE |
|---|---|---|
| MA0 | 386 Select (Low = 46) | High |
| MA1 | Low Power Select (High Selects Intel LP CPU, Low For Other) | Low |
| MA2 | 1× CPU Clock Select Low = 2× CPU CLK | Low |
| MA3 | Not Used | Low |
| MA4 | Not Used | Low |
| MA5 | 368 Pin Select (Low = pin compatible with 268) | High |

TABLE 2-continued

System Controller Configuration Table

| NAME | FUNCTION | DEFAULT STATE |
|---|---|---|
| MA6 | Miscellaneous Configuration - 0 | Low |
| MA7 | Not Used | High |
| MA8 | Not Used | Low |
| MA9 | Not Used | Low |
| MA10 | Not Used | Low |

As shown, the DRA memory address lines MA[0 . . . 10] are shown with bits MA0, MA5 and MA7 pulled high to the 3-volt power supply voltage 3V_EG by way of a plurality of pull-up resistors 400, 402 and 404. The remaining DRAM address line bits MA1, MA2, MA3, MA,4, MA6, MA.8, MA9 and MA10 are pulled low by a plurality of pull-down resistors 406 through 420, respectively. The DPA memory address lines MA[0 . . . 8] are also coupled to a plurality of coupling resistors 422 to 438 form a 9-bit DRAM address bus BMA[0 . . . 8].

Figure 18A:
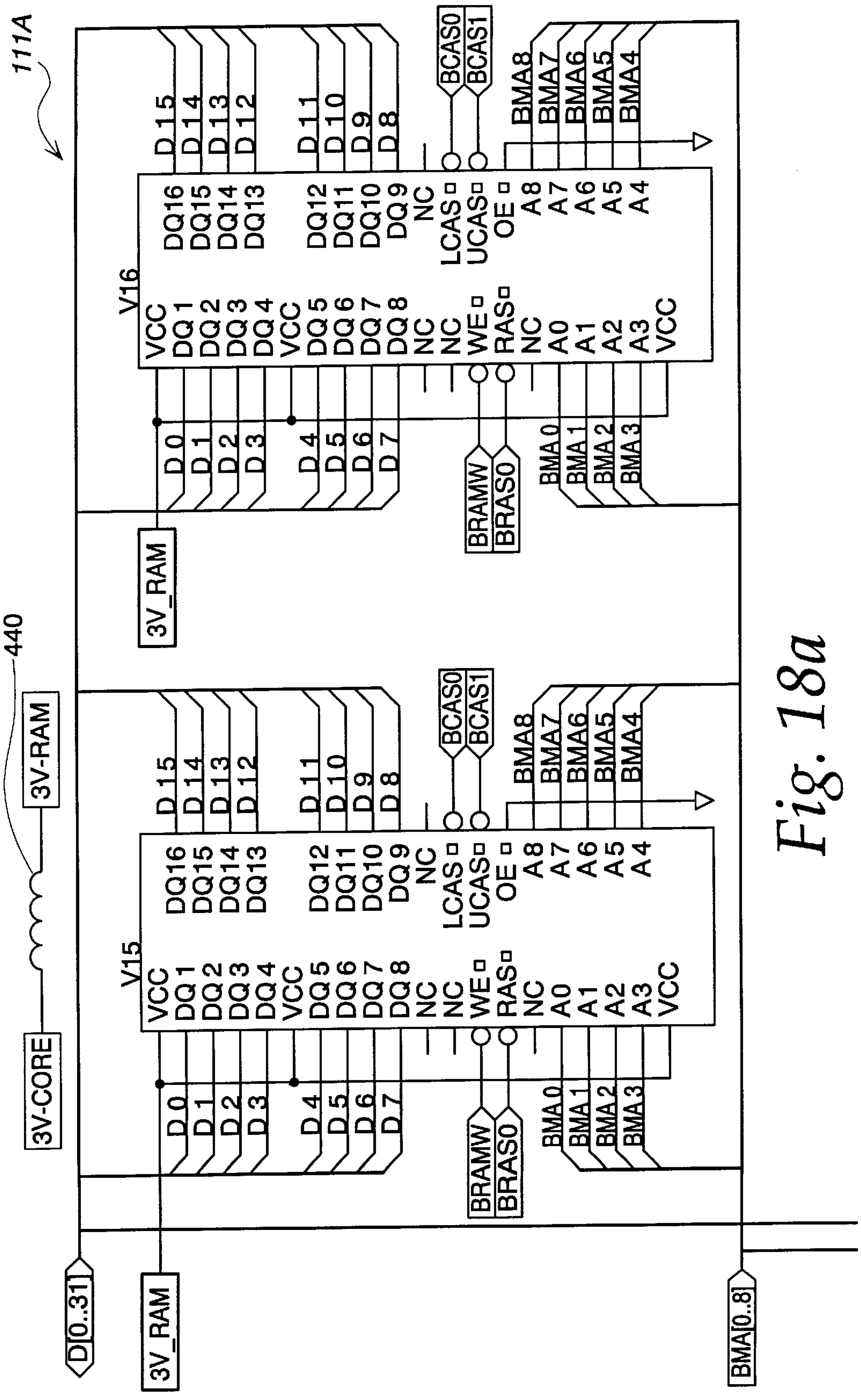
Figure 18B:
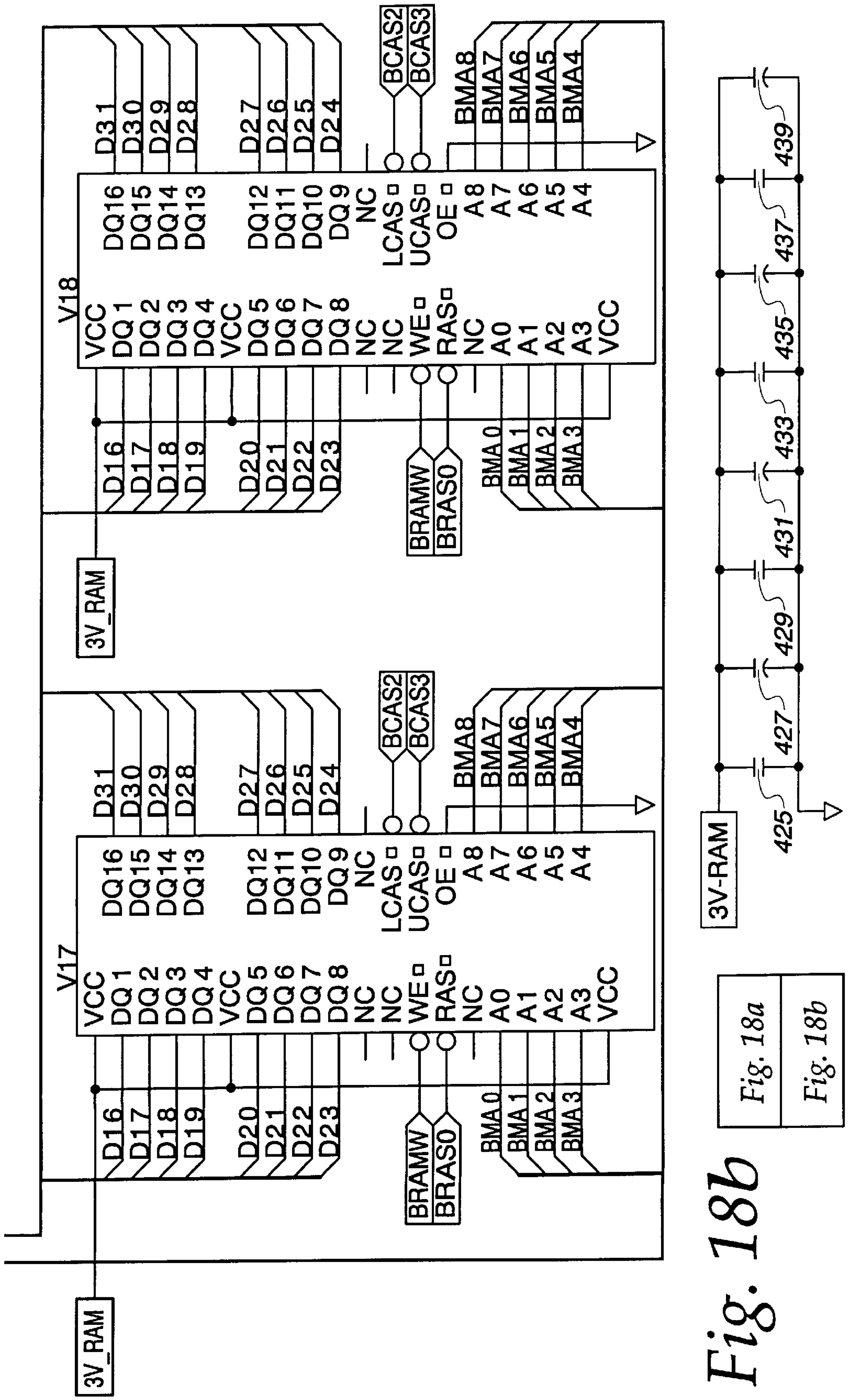
Figure 19A:
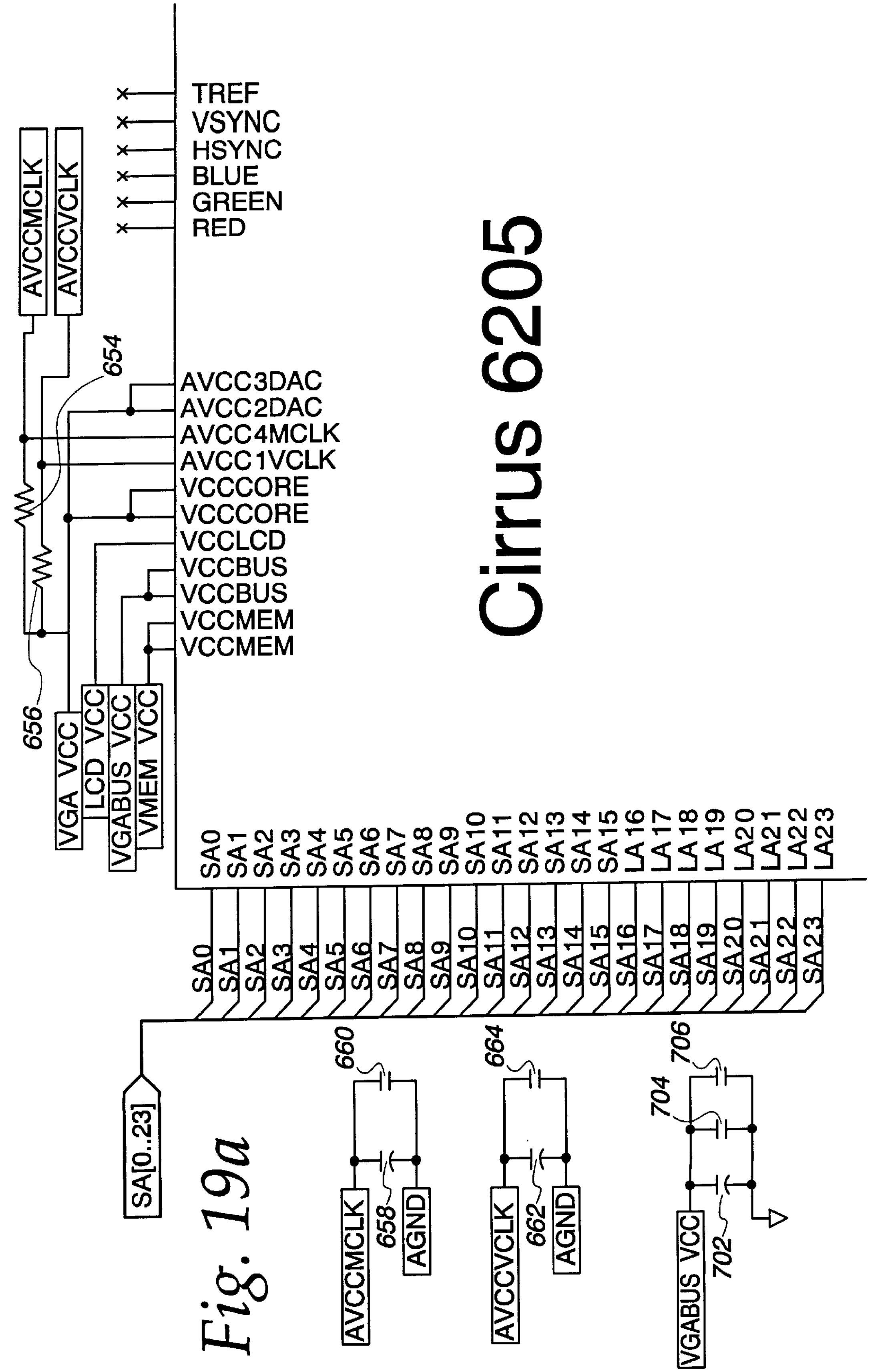
Figure 19B:
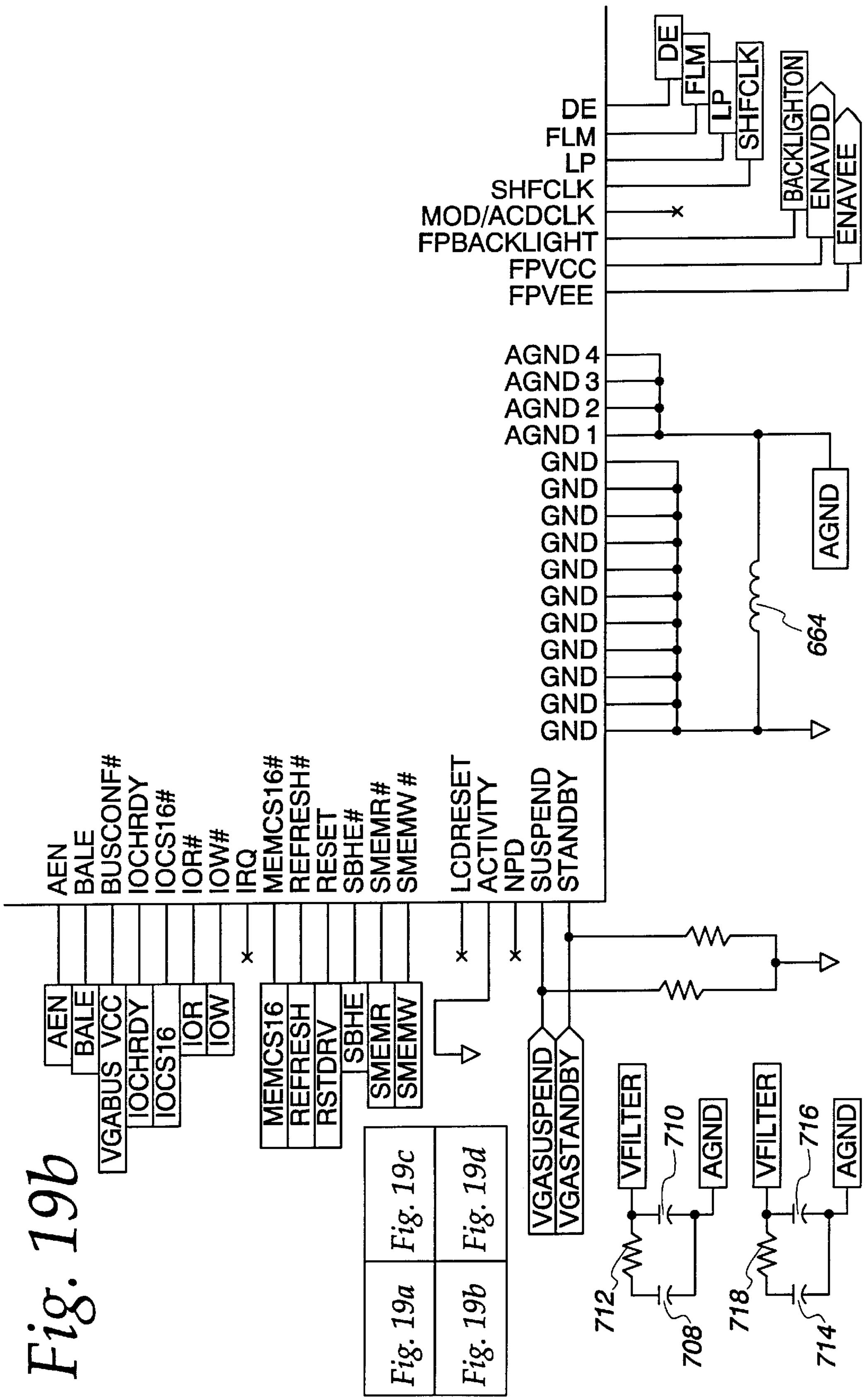
Figure 19C:
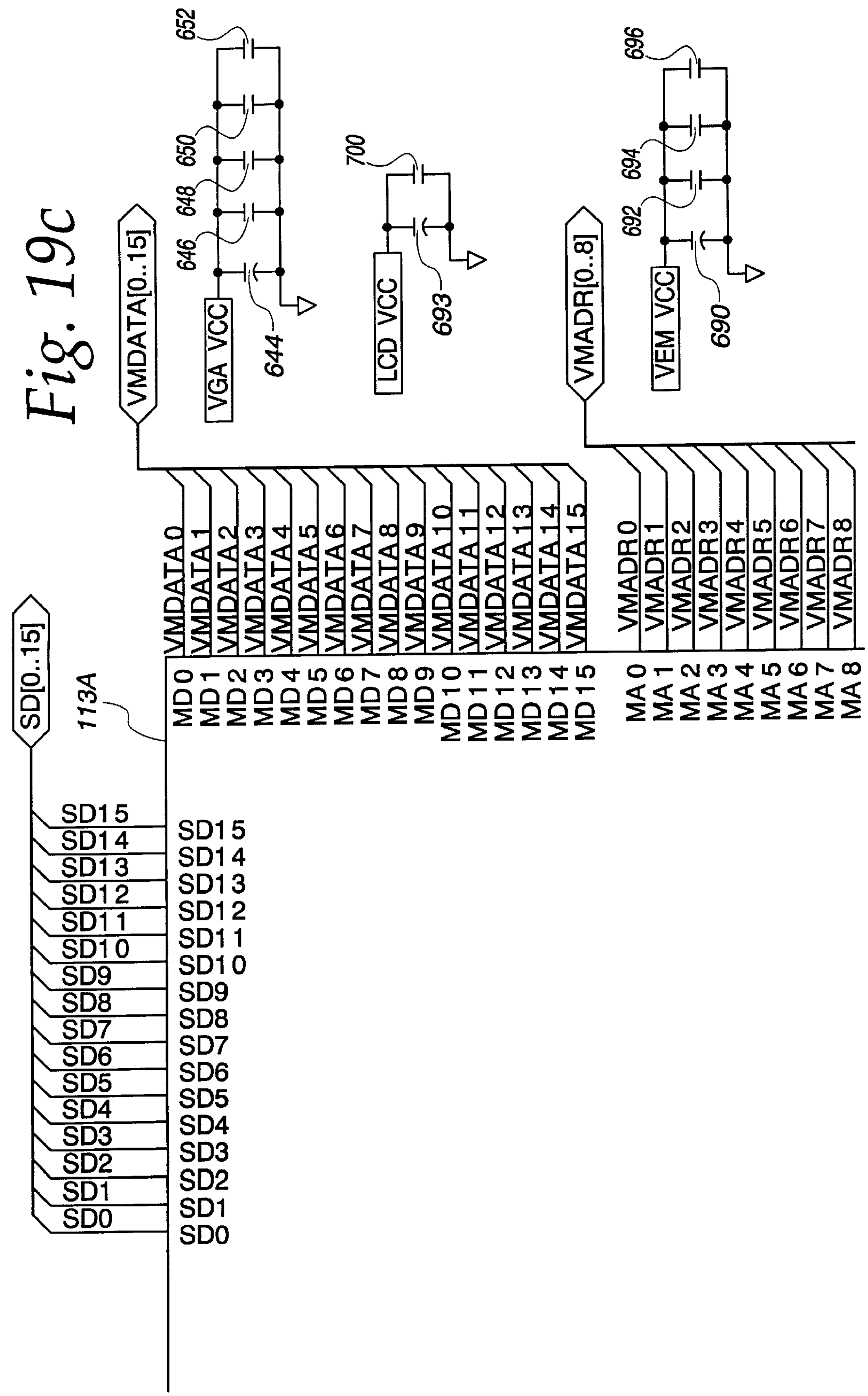
Figure 19D:
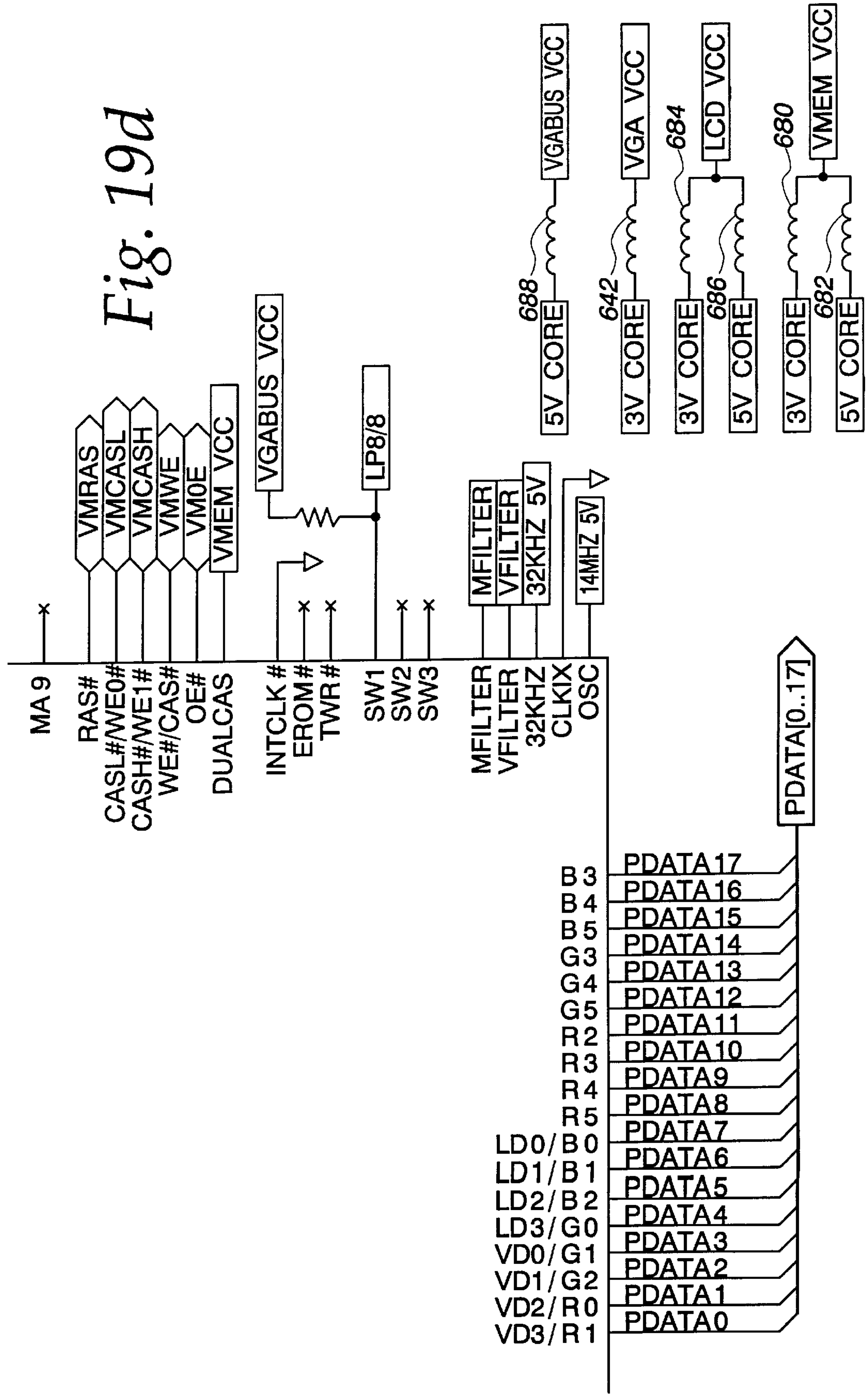
Figure 24A:
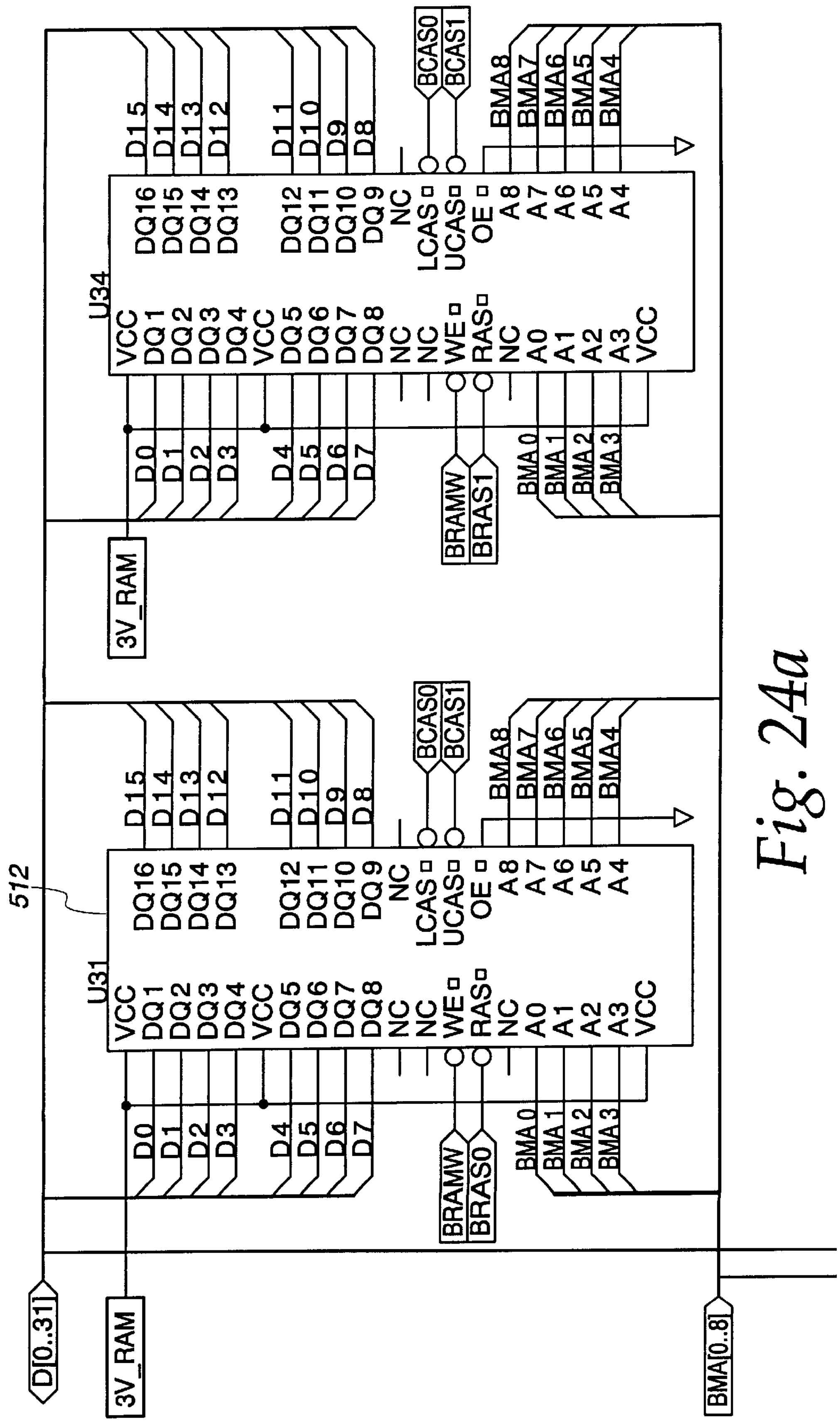

The system controller 129 functions as a DRAM controller and is capable of supporting up to 64 megabytes of memory, divided among one of four banks and can support 256K, 512K, 1M, 2M and 4M of memory in any width. The system controller 129 includes a pair of registers associated with each bank of DRAM. The first register stores the total amount of DRAM connected to the system while the second identifies the starting address for each bank. Referring to FIGS. 18 and 24, two 1 Mbyte banks are connected to the DRAM memory address bus BMA[0 . . . 8] and to the processor data bus 150, D[0 . . . 31].

In order to conserve power, 3-volt DRAM 111A is used. The 3-volt power supply 3V_RAM is applied to the VCC terminals of each of the DRAMS 111A. The 3-volt power supply 3V_RAM is available from the DC-to-DC converter 300 (FIG. 26) by way of a ferrite bead inductor 440 (FIG. 18). In particular, a 3-volt supply 3V_CORE available at the DC-to-DC converter 300 is applied to the ferrite bead inductor 440 to generate the 3-volt DRAM supply 3V_RAM. A plurality of bypass capacitors 425–439 (FIG. 18) are connected between the DRAM supply voltage 3V_RAM and system ground.

The system controller 129 generates the appropriate row address strobes (RAS) and column address strobes for the DRAM 111A. In particular, the column address strobe lines CAS0[0 . . . 3] are applied to the upper and lower column address strobe pins (UCAS and LCAS) on the DRAM 111A by way of a plurality of coupling resistors 442 to 450 (FIG. 12). Similarly, the row address signals RAS0 and RAS1 are applied to the row address strobe pins on the DRAM 111A by way of a plurality of coupling resistors 448 and 450. Writing to the DRAMS 111A is under the control of a DRAM write enable signal BRAMW, applied to the write enable pin WE on the DRAM 111A. The DRAM write enable signal BRAMW is generated by the system controller 129 by way of a coupling resistor 452.

An EEPROM or NVRAM 111B (FIG. 12) may be used to maintain system configuration parameters when the system is powered off. All user changeable parameters are stored in the EEPROM 111B. For example, pen calibration data and passwords, used during boot up, may be used in the EEPROM 452. The contents of the EEPROM 111B may be shadowed into a CMOS memory when the system is active. Communication with the EEPROM 111B is under the control of the system controller 129 and in particular, a pair of programmable input/output pins GPI01 and GPI02. The GPI01 provides a clock signal to the EEPROM 111B while the pin GPI02 is used for data transfer.

As discussed above, the wireless interface device 100 also includes the flash memory 117 (FIG. 25), which is used for storing the BIOS. The system controller 129 allows for direct shadowing of the BIOS by enabling the appropriate address space to read the FLASH/DRAM write mode which allows all reads to come from the flash device with writes to the DRAM 111A memory devices.

A main memory map as well as an I/O memory map are provided in Tables 3 and 4.

TABLE 3

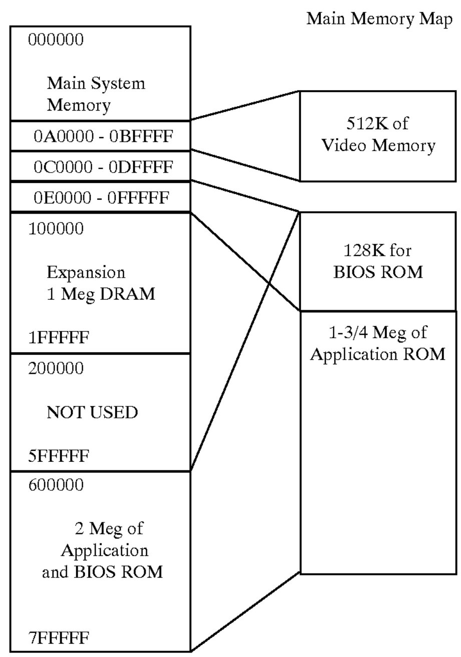

TABLE 4

I/O MEMORY MAP

| Memory Space Description | Memory Locations (HEX) |
|---|---|
| DMA Controller #1 | 00–0F |
| Not Used | 10–1F |
| Interrupt Controller #1 | 20–21 |
| Not Used | 22–23 |
| Evergreen Configuration Address | 24 |
| Not Used | 25 |
| Evergreen Configuration Data | 26 |
| Not Used | 27–3F |
| Counter/Timer | 40–43 |
| Not Used | 44–5F |
| Keyboard Controller | 60 |
| Port B | 61 |
| Not Used | 62–63 |
| Keyboard Controller | 64 |
| Not Used | 65–6F |
| NMI Enable, Real-Time Clock | 70, 71 |
| Not Used | 72–7F |
| DMA Page Registers | 80–8F |
| Not Used | 90–91 |
| Port A | 92 |
| Not Used | 93–9F |
| Interrupt Controller #2 | A0–A1 |
| Not Used | A2–CF |
| DMA Controller #2 | D0–DE |
| Not Used | DF–2FF |

TABLE 4-continued

I/O MEMORY MAP

| Memory Space Description | Memory Locations (HEX) |
|---|---|
| Pen Controller | 300 |
| Not Used | 301–3AF |
| Graphics Controller | 3B0–3DF |
| RF Controller | 3E0–3E7 |
| UART COM1 | 3E8–3EF |
| Not Used | 3F0–3FF |

In addition to system control features and DRAM control, the system controller 129 provides various other functions. The power management function and NVRAM controller have been discussed above. The system controller 129 also controls all operations on the local AT bus 150. The AT bus clock is derived from the clock CLK2IN pin that is divided to achieve an 8 MHz bus rate.

The system controller 129 also includes a number of programmable pins which enhance its flexibility. For example, four general purpose input/output pins GPIO[0 . . . 3] are provided; each of which may be independently set for input or output. The GPIO1 and GPIO2 pins are used for the EEPROM 111B as discussed above. The GPIO0 pin and GPIO3 pin may be used for various purposes. In addition to the programmable input/output pins, the system controller 129 includes two general purpose chip select pins GPCS1 and GPCS2 as well as a plurality of programmable output pins PC[0 . . . 9]. The programmable chip selects GPCS1 and GPCS2 are used for the pen controller 110A, UART 134 and the radio interface 114B.

Peripheral devices connected to the system ISA bus 151 are controlled by an integrated peripheral controller 128 as discussed above. The integrated peripheral controller 128 may be a PicoPower Model No. PT82C206F which can be operated at either 3.3 or 5 volts. As will be discussed in more detail below, the integrated peripheral controller 128 includes several subsystems such as: DMA Control; Interrupt Control; Timer Counter; RTC Controller; CMOS RAM and Memory Mapper.

The IPC 128 includes two type 8259A compatible interrupt controllers which provide 16 channels of interrupt levels, one of which is used for cascading. The interrupt controller processes all incoming interrupts in order as set forth in Table 5.

TABLE 5

INTERRUPT TABLE

| INTERRUPT | DESCRIPTION |
|---|---|
| Level 0 | Timer Channel 0 |
| Level 1 | Keyboard Controller 2 Cascade |
| Level 2 | Second Interrupt Controller |
| Level 3 | Not Used |
| Level 4 | COM1 |
| Level 5 | Pen Controller |
| Level 6 | Not Used |
| Level 7 | Not Used |
| Level 8 | RTC Controller |
| Level 9 | Not Used |
| Level 10 | Radio Controller |
| Level 11 | Not Used |
| Level 12 | Not Used |
| Level 13 | Not Used |
| Level 14 | Not Used |
| Level 15 | Not Used |

The integrated peripheral controller (IPC) 128 (FIG. 14) is connected to the system data bus SD[0 . . . 15]. Addressing of the IPC 128 is accomplished by two bits SA0 and SA1 from the system address bus SA[0 . . . 23] and eight bits A[2 . . . 9] from the local address bus A[0 . . . 31]. The address bits from the local address bus A[2 . . . 8] are converted to 5 volts by way of a 3- to 5-volt signal converter 453 (FIG. 14) to develop the 5-volt address signals XA[2 . . . 8]. A 32-kilohertz clock signal 32-KHz from the clock generator 398 (FIG. 13) is applied to the clock input OSC1 of the IPC 128.

Figure 20:
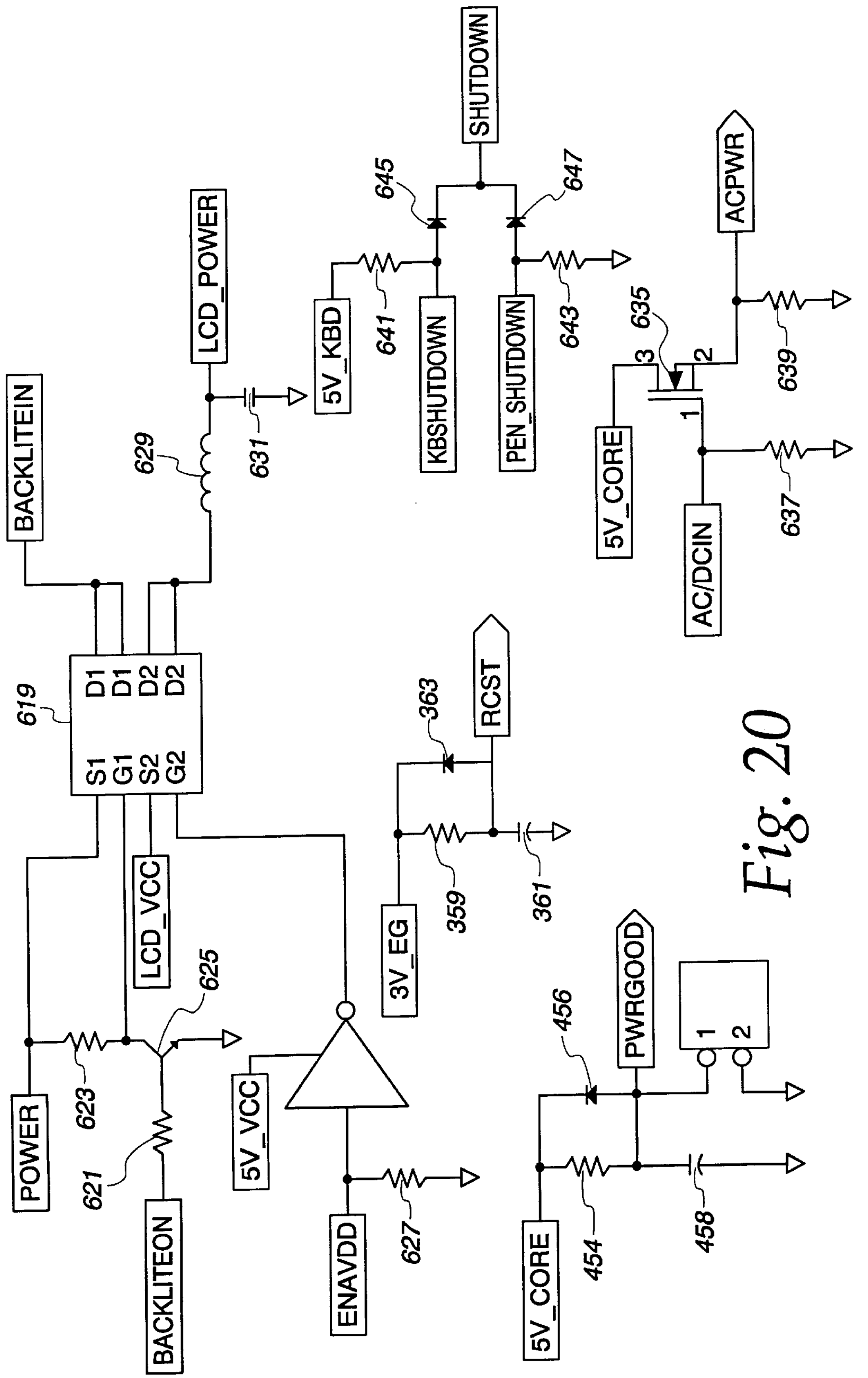

Referring to FIG. 20, in order to prevent spurious operation of the IPC 128 before the system power supply is stabilized, a power good signal PWRGOOD is applied to a power good pin PWRGD. The power good signal PWRGOOD is a delayed signal which assures that the 5-volt power supply has stabilized before the IPC 128 is activated. In particular, a 5-volt power supply 5V_CORE is applied to a delay circuit which includes a resistor 454, a diode 456 and a capacitor 458. Initially, the 5-volt power supply signal 5V_CORE is dropped across the resistor 454. While the capacitor 458 is charging, the diode 456 is in a non-conducting state. As the capacitor 458 begins to charge, the voltage at the anode of the diode 456 increases as a function of the RC time constant. When the capacitor 458 is fully charged, it approaches the value of the power supply voltage 5V_CORE. When the capacitor 458 becomes fully charged, the power good signal PWRGOOD is applied to a power good pin PWRGD at the IPC 128 for enabling the IPC 128 after the power supply has stabilized. The diode 456 provides a discharge path for the capacitor 458 when the power supply is shut off. The power good signal PWRGOOD is also used to reset the keyboard controller 125.

A 5-volt power supply 5V_CORE from the DC-to-DC converter 300 (FIG. 26) is applied to a ferrite bead inductor 460 (FIG. 13) to develop a 5-volt power supply 5V_206, which, in turn, is applied to the power supply pins VCC of the IPC 128. In order to delay application of the 5-volt power supply 5V_206 as discussed below, a charging circuit which includes a serially coupled resistor 462 and a capacitor 464 are connected between the power supply voltage 5V_206 and the system ground. A power supply reset signal PSRSTB, an active low signal, is applied to the junction between the resistor 462 and the capacitor 464 to discharge the capacitor 464 when the power supply is reset. Moreover, in order to stabilize the voltage of the power supply 5V_206, a plurality of bypass capacitors 466 and 468 are connected between the power supply 5V_206 and system ground.

In order to assure proper operation of the circuit, various pins of the IPC 128 are pulled low while various other pins are pulled high. In particular, the input/output read and write signals IOR and IOW are pulled up to the power supply voltage 5V_206 by a pair of pull-up resistors 470 and 472. In addition, the interrupt request pin IRQ10 is pulled up to the power supply voltage 5V_CORE by a pull-up resistor 474. The signals OUT2, REFREQ, AEN16 and AEN8 are pulled low by pull-down resistors 455–461 while the signal TEST_MODE2 is pulled up to the supply voltage 5V_CORE by a pull-up resistor 463.

Even though the IPC 128 includes a direct memory access (DMA) controller, this function is not required by the system. As such, the direct memory access request pins DREQ[0 . . . 7] are pulled low by a pull-down resistor 476 to system ground. In addition, as set forth in Table 5 above, various interrupt levels are unused. For example, as shown in Table 5, interrupt levels IRQ3, IRQ6, IRQ7, IRQ9, IRQ11, IRQ12, IRQ14, and IRQ15 are not used. Thus, these interrupt levels are pulled low by a pull-down resistor 478.

As illustrated in Table 5, interrupt levels IRQ4 and IRQ5 are used for the COM1 and pen controller interrupt levels, IRQ4 and IRQ5. To assure that these levels are proper, the IRQ4 and IRQ5, which are active high, are pulled low by pull-down resistors 480 and 482.

Figure 14B:
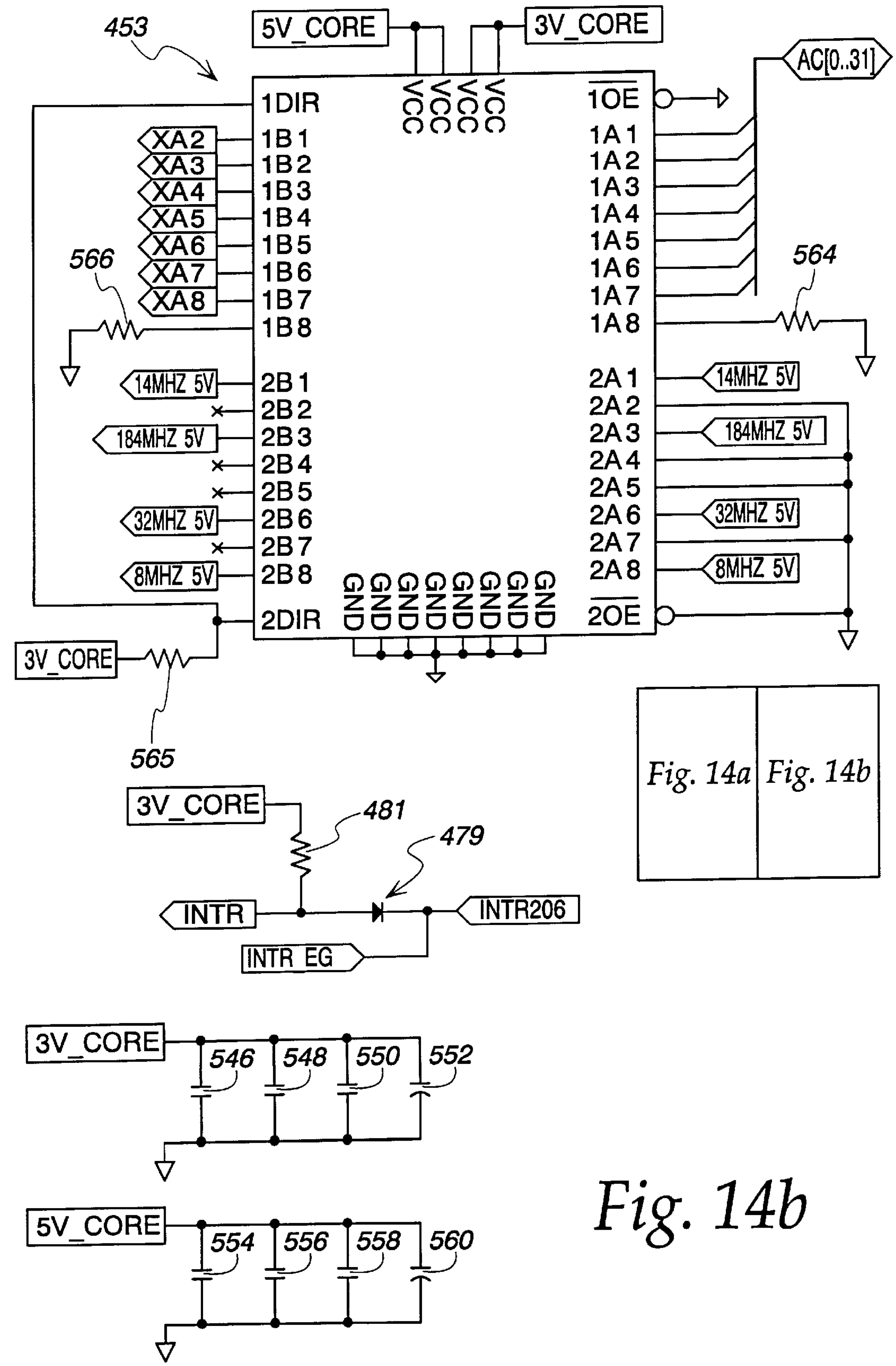

Interrupts by the system controller 129 and IPC 128 INTR_EG and INTR206 are applied to the CPU 112 by way of a diode 479 and pull-up resistor 481 (FIG. 14). In particular, the interrupt signals INTR_EG and INTR206 from the system controller 129 and IPC 128, respectively, are applied to the cathode of the diode 479 while the anode is pulled up to the power supply voltage 3V_CORE by the pull-up resistor 481. The logic level of the anode is set by the interrupt signal INTR, which is applied to the CPU 112. When the interrupt signals INTR206 and INTR_EG are high, the diode 479 does not conduct and the CPU 112 interrupt signal INTR will be high. When either of the interrupt signals INTR_EG or INTR206 are low, the diode 479 conducts, forcing the CPU 112 interrupt signal INTR low.

The IPC 128 also includes a type 8254 compatible counter/timer which, in turn, contains three 16-bit counters that can be programmed to count in either binary or binary-coded decimal. The zero counter output is tied internally to the highest interrupt request level IRQ0 so that the CPU 112 is interrupted at regular intervals. The outputs of the timers 1 and 2 are available for external connection. In particular, internal timer 1 generates one signal, OUT1, which is used to generate a DRAM refresh request signal REFREQ to the CPU 112. The internal timer 2 generates an output signal OUT2 that is used to generate speaker timing. All three internal timers are clocked from a timer clock input TMRCLK at 1.2 megahertz from the system controller 129.

As mentioned above, the IPC 128 includes a real time clock (RTC) controller which maintains the real time. The real operational time is maintained in a CMOS RAM that can be accessed through registers 70H and 71H. The memory map for the CMOS memory is provided in Table 6 as shown below:

TABLE 6

CMOS MEMORY MAP

| INDEX | FUNTION |
|---|---|
| 00H | Seconds |
| 01H | Seconds Alarm |
| 02H | Minutes |
| 03H | Minutes Alarm |
| 04H | Hours |
| 05H | Hours Alarm |
| 06H | Day of Week |
| 07H | Day of Month |
| 08H | Month |
| 09H | Year |
| 0AH | Registry |
| 0BH | Register B |
| 0CH | Register C |
| 0DH | Register D |
| 0EH–7EH | User RAM |

The area designated as User RAM is used by the system BIOS to save the status of the system configuration registers. The alarm bytes may be used to set and generate an interrupt at a specific time. When periodic interrupt is required, the two most significant bits in the alarm register can be set high.

Figure 13A:
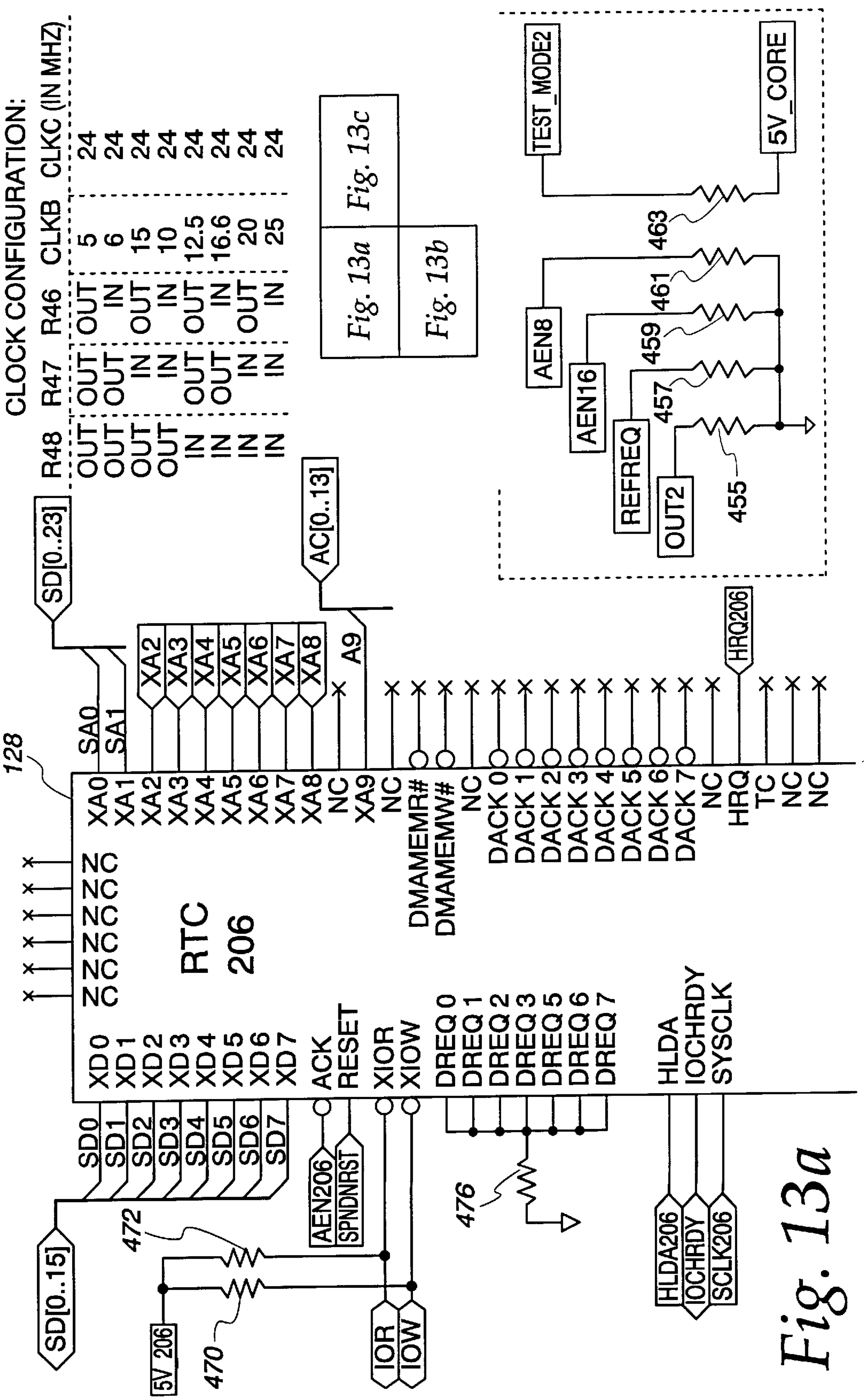
Figure 13B:
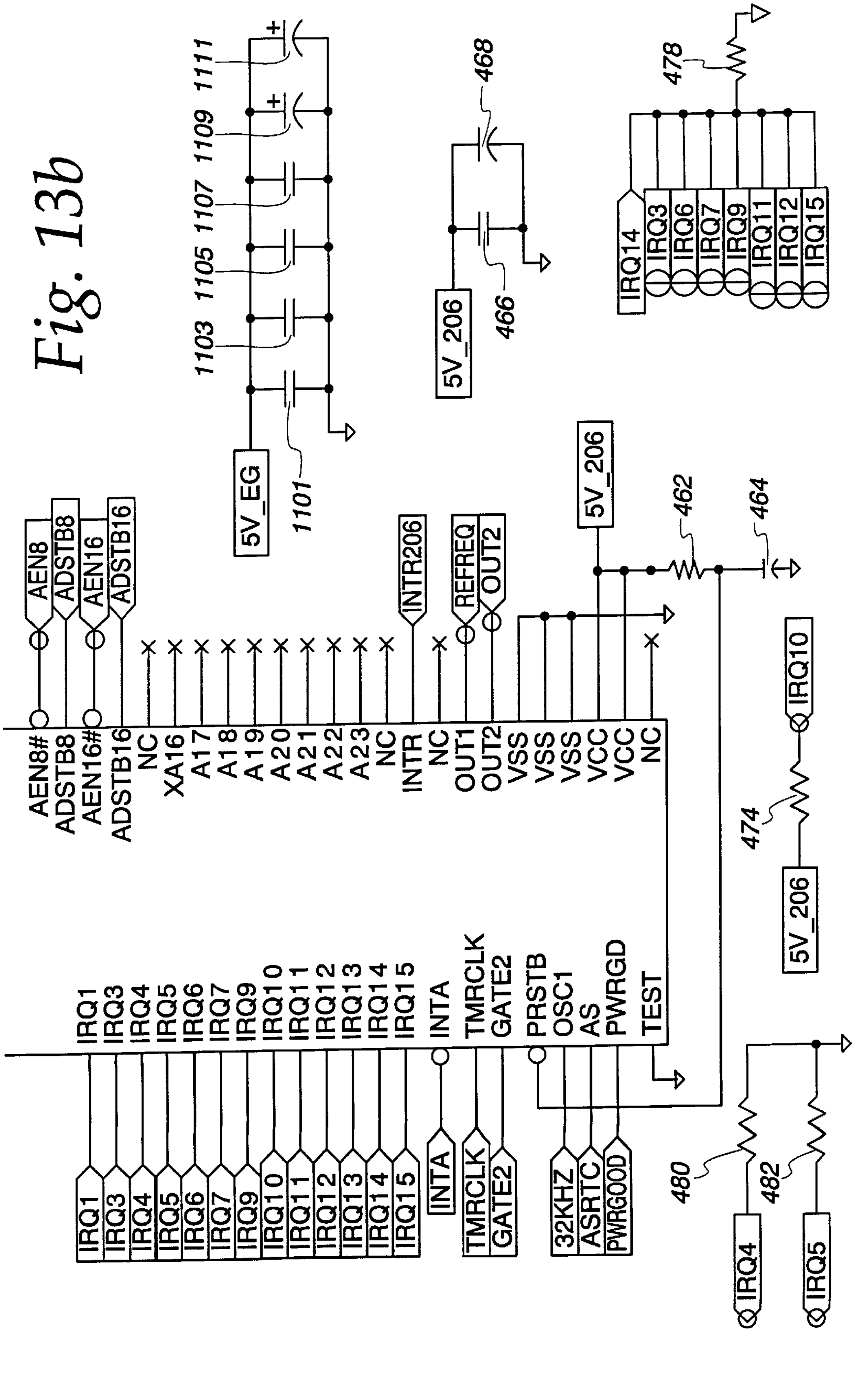
Figure 13C:
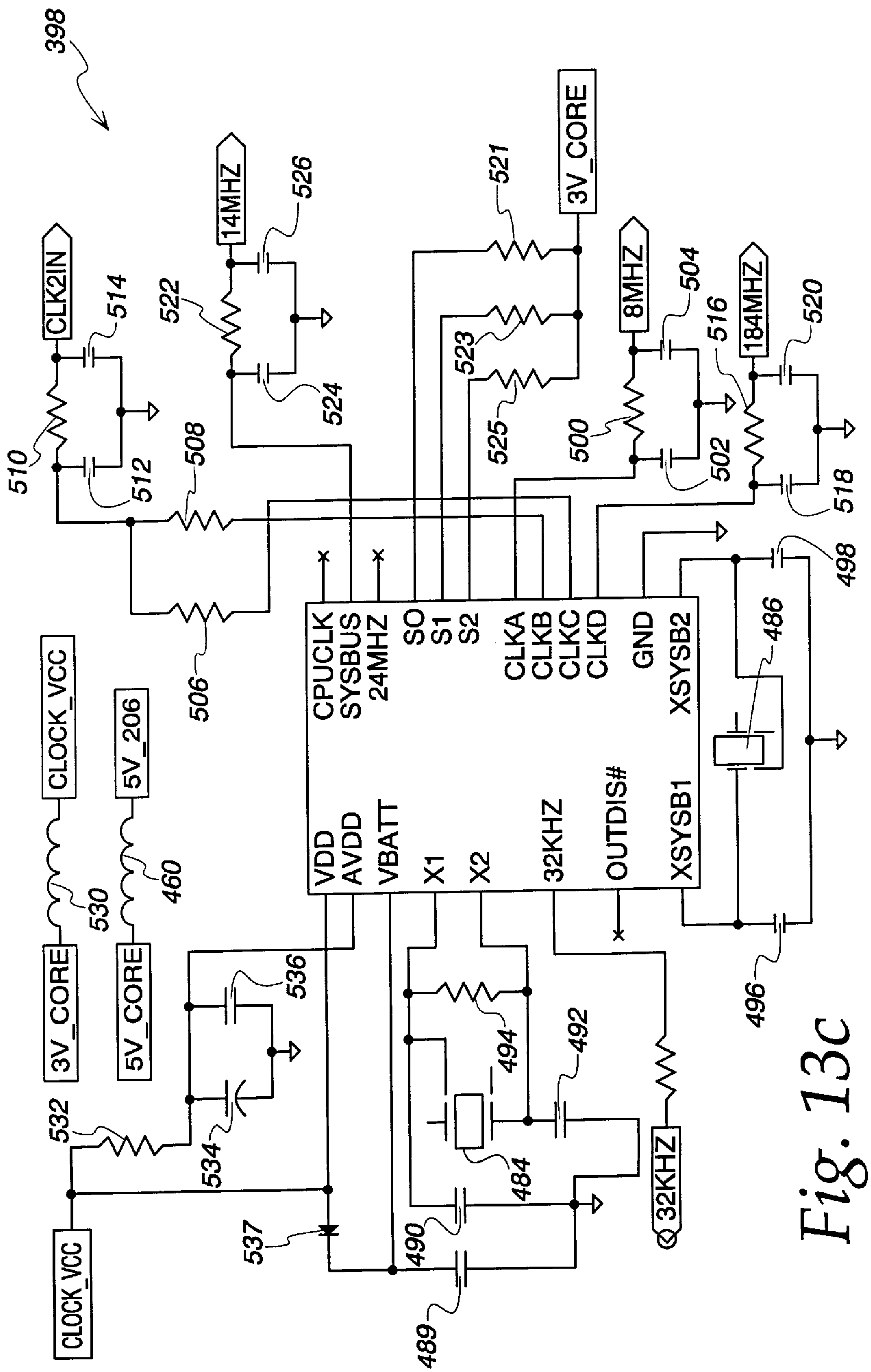

The various clock signals used for the system are provided by the clock generator circuit 398 (FIG. 13). The clock circuit 398 includes a clock generator, for example, an Integrated Circuit Designs Model No. ICD2028. A 14.318

MHz crystal 484 and a 32.768 KHz crystal 486 are applied to the clock generator 488. In particular, the crystal 484 is applied to a pair of X1 and X2 input pins along with a plurality of capacitors 489, 490, 492 and an input resistor 494. Similarly, the crystal 486 is applied to input pins XSYSB1 and XSYSB2. A pair of capacitors 496 and 498 are connected across the crystal 486.

The clock generator IC 488 provides three clock outputs CLKA, CLKB and CLKD. The clock A output CLKA is used to develop an 8-MHz clock signal for the keyboard controller 125 by way of a resistor 500 and capacitors 502 and 504. The clock B output CLKB is used to develop a clock 2X output signal CLK2IN for the system controller 129 by way the resistors 506, 508 and 510 and a pair of capacitors 512 and 514. The clock D output signal CLKD is used to generate a 1.84 MHz signal for use by the Universal Asynchronous Receiver Transmitter (UART) 134 by way of a resistor 516 and capacitors 518 and 520. As mentioned above, the system controller 129 also requires a 14 MHz clock signal. This clock signal is developed by way of a system bus output pin SYSBUS, a resistor 522 and a pair of capacitors 524 and 526.

Figure 26A:
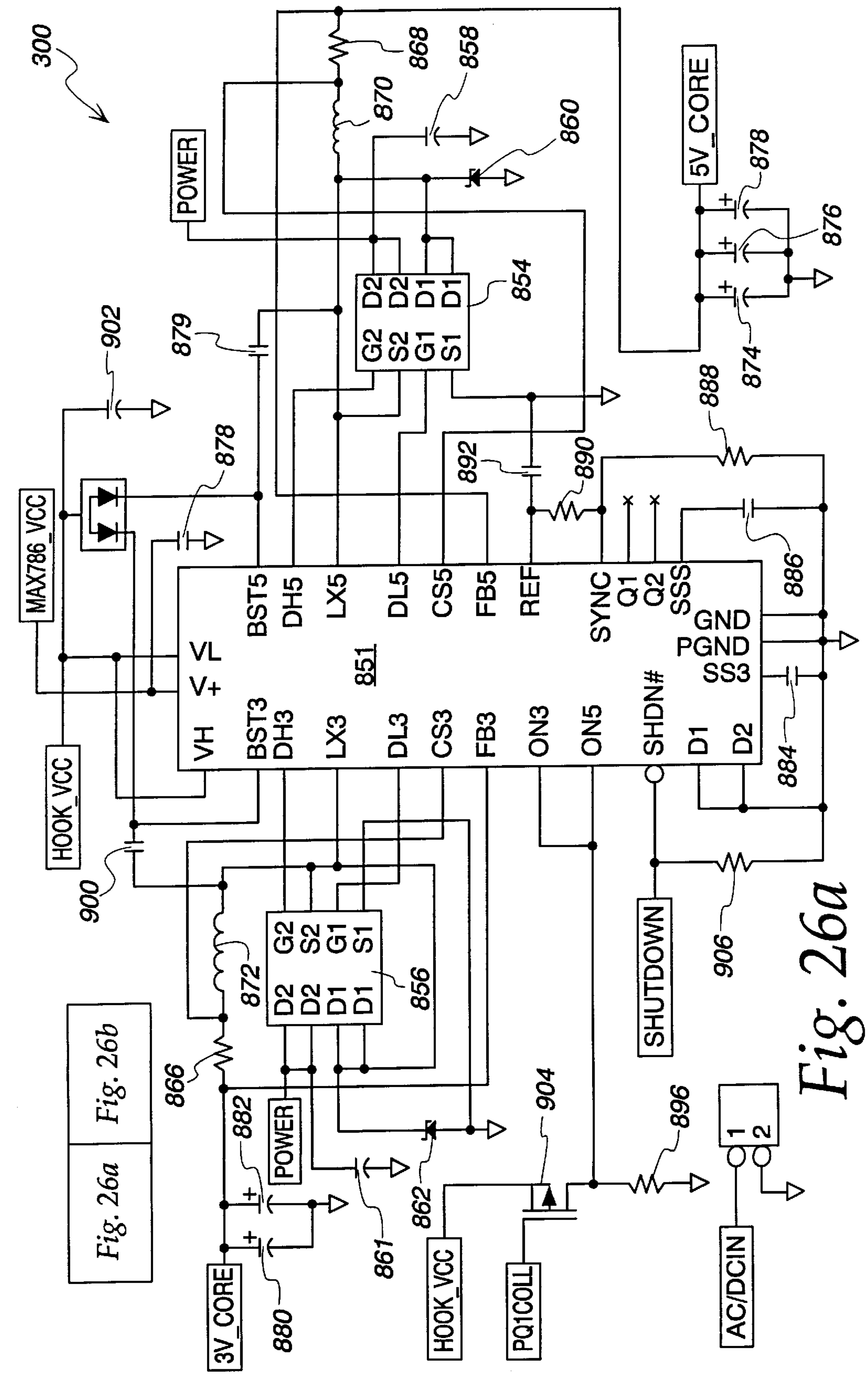

Selection of the various clock output signals is available by way of the select pins S0, S1 and S2. These pins S0, S1 and S2 are pulled up to the 3-volt power supply 3V_CORE by way of pull-up resistors 521, 523 and 525. The 3-volt power supply signal 3V_CORE is available from the DC-DC converter 300 (FIG. 26).

The clock generator 488 utilizes a 3-volt power supply CLOCK_VCC (FIG. 13). The 3-volt power supply CLOCK_VCC is available from the DC-to-DC converter 300 (FIG. 26) by way of an in-line ferrite bead inductor 530. In particular, the 3-volt power supply 3V_CORE is applied to the ferrite bead inductor 530 to generate the power supply for the CLOCK_VCC for the clock generator 488. This power supply CLOCK_VCC is applied to the power supply pin VDD. The power supply signal CLOCK_VCC is also used as analog supply AVDD to the clock generator IC 488 and is applied to the analog supply AVDD by way of the resistor 532 and a pair of capacitors 534 and 536. The power supply signal CLOCK_VCC is also applied to the battery pin VBATT of the clock generator IC 488 by way of a diode 537 to prevent any back feeding.

A number of the circuits in the system operate at either 3.3 volts or 5 volts. Thus, a plurality of bi-directional signal level translators 542 and 544 (FIG. 14) are provided, as well as the translator 453 previously discussed. The signal level translators 453, 542 and 544 may be as supplied by Integrated Circuit Technology, Model No. FCT164245T. Each of the signal level translators 453, 542 and 544 includes a 3-volt supply 3V_CORE and a 5-volt supply 5V_CORE, available from the DC-to-DC converter 300 (FIG. 26). In order to stabilize the voltage of the 3- and 5-volt power supplies, 3V_CORE and 5V_CORE, a plurality of bypass capacitors are utilized. In particular, the bypass capacitors 546 through 552 are connected between the 3-volt supply 3V_CORE and system ground. Similarly, the bypass capacitors 554 through 560 are connected between the 5-volt supply 5V_CORE and system ground. The ground terminals of each of the signal level translators 542, 544 and 453 are also tied to system ground.

Each of the signal level translators 542, 544 and 453 includes two 8-bit programmable input/output pins. More particularly, the first 8-bit group 1A/1B[1 . . . 8] is under the control of an operate/enable pin $\overline{10E}$, which is active low, while the second bank 2A/2B[1 . . . 8] is under the control of an output/enable pin $\overline{20E}$, also active low. The direction of the input pins and output pins (i.e., A relative to B) is under the control of direction pins 1DIR and 2DIR. The direction pin 1DIR controls the direction of the pins 1A/1B[1 . . . 8], while the pin 2DIR controls the direction of the pins 2A/2B[1 . . . 8].

The signal level translator 453 is used to convert the local data bus bits D[16 . . . 31] and the system data bus bits SD[0 . . . 15]. Both the local data bus D[16 . . . 31] as well as the system data bus SD[0 . . . 15] are bi-directional. In this application the processor bus 150 data bits D[31 . . . 16] are being mapped to the system data bus bits SD[15 . . . 0].

The direction of the signal level translator 542 is under the control of a signal direction signal SDIR, available at the system controller 129. The signal direction signal SDIR is applied to both the direction control pins 1DIR and 2DIR of the signal level translator 542. The operate/enable inputs $\overline{10E}$ and $\overline{20E}$ are under the control of system data enable inputs signals, SDEN3 and SDEN2, respectively; also under the control of the system controller 129.

The signal level translator 544 is used to map the signal levels of the local address bus bits A[23 . . . 8] to the system address bus bits SA[23 . . . 8]. More particularly, the local address bits A[23 . . . 16] are applied to pins 1A[1 . . . 8] while the local address bits A[15 . . . 8] are applied to the pins 2A[1 . . . 8]. Similarly, the system address bits SA[23 . . . 16] are connected to the pins 1B[1 . . . ], while the system address bits SA[15 . . . 8] are applied to the pins 2B[1 . . . 8]. In this case, the operate/enable pins $\overline{10E}$ and $\overline{20E}$, both active low, are connected to system ground in order to permanently enable the signal level translator 544. The direction control pins 1DIR and 2DIR are permanently set such that the data always flows from A to B. In particular, the directional pins 1DIR and 2DIR are connected to the 3-volt power supply 3V_CORE by way of a pull-up resistor 562.

The signal level translator 542 is used to convert the signal levels of the 3-volt clock output signals 14 Mhz, 1.84 Mhz, 32 Khz and 8 Mhz to 5-volt levels, as well as to convert the 3-volt local address bits A[2 . . . 8] to 5-volt address bits XA[2 . . . 8] for use by the IPC 128, as discussed above. More particularly, the system address bits, A[2 . . . 8] are applied to the pins 1A[1 . . . 8]. The clock signals 14 MHz, 1.84 MHz, 32 KHz and 8 MHz are applied to the pins 2A1, 2A3, 2A6 and 2A8, respectively, to produce corresponding 5-volt level signals 14 MHz_5V, 1.84 MHz_5V, 32 KHz_5V and 8 MHz_5V signals at pins 2B1, 2B3, 2B6 and 2B8, respectively. The unused pins 1A8 and 2B8 are pulled low by way of pull-down resistors 564 and 565, respectively. The operate/enable pins $\overline{10E}$ and $\overline{20E}$ are tied to system ground to permanently enable the signal level translator 542. The directional pins 1DIR and 2DIR are pulled up to the 3-volt power supply voltage 3V_CORE by way of a pull-up resistor 566 to permanently force the direction from A to B.

Referring to FIG. 15, the system includes a keyboard controller 125, which performs several functions, including battery monitoring, LCD status control, brightness and contrast control, as well as keyboard control. In addition, the system also maintains the status of the remaining battery life, and also provides information to the system controller 129 when the battery voltage is low or other critical battery condition has occurred. In operation, the keyboard controller 125 will maintain the current status of the battery level until data is requested. When a critical battery condition event occurs, the keyboard controller 125 generates an SMI interrupt. As discussed above, the intelligent battery pack (IBP) 130 provides an indication of the percentage of remaining battery capacity. Communication between the IBP 130 and the keyboard controller 125 is by way of a bi-directional serial data bus, which includes a clock line BATCLK and a data line BATDATA. The data line BATDATA is a bi-directional line, which allows for bi-directional communication with the IBP 130. The clock line BATCLK is driven by the IBP 130, but may be pulled low by the keyboard controller 125.

The bi-directional serial data bus is connected to the port pins P4.2 and P4.3 on the keyboard controller 125. In particular, the port pin P4.2 is used for the serial battery data BATTDATA. An NPN transistor 570 is connected to the port pin P4.2 to disconnect the keyboard controller 125 from the IBP 130 during power down. In particular, the collector terminal of the NPN transistor 570 is connected to the port pin P4.2, while the emitter terminal forms a battery data signal BATTDATA. The base of the NPN transistor 570 is biased on by way of a biasing resistor 572 that is connected to a 5-volt power supply 5V_KBD. The collector is pulled high by way of a pull-up resistor 574 connected to the 5-volt power supply 5V_KBD.

Similarly, the battery clock signal BATTCLK is connected to the port 4.3 on the keyboard controller 125 by way of an NPN transistor 576. The collector terminal of the NPN transistor 576 is connected to the port 4.3 as well as to a pull-up resistor 578 and the 5-volt power supply 5V_KBD. The NPN transistor 576 is turned on anytime the power supply to the keyboard 5V_KBD is powered up by way of a biasing resistor 580. The emitter of the NPN transistor 576 forms the battery clock signal BATTCLK.

Figure 29A:
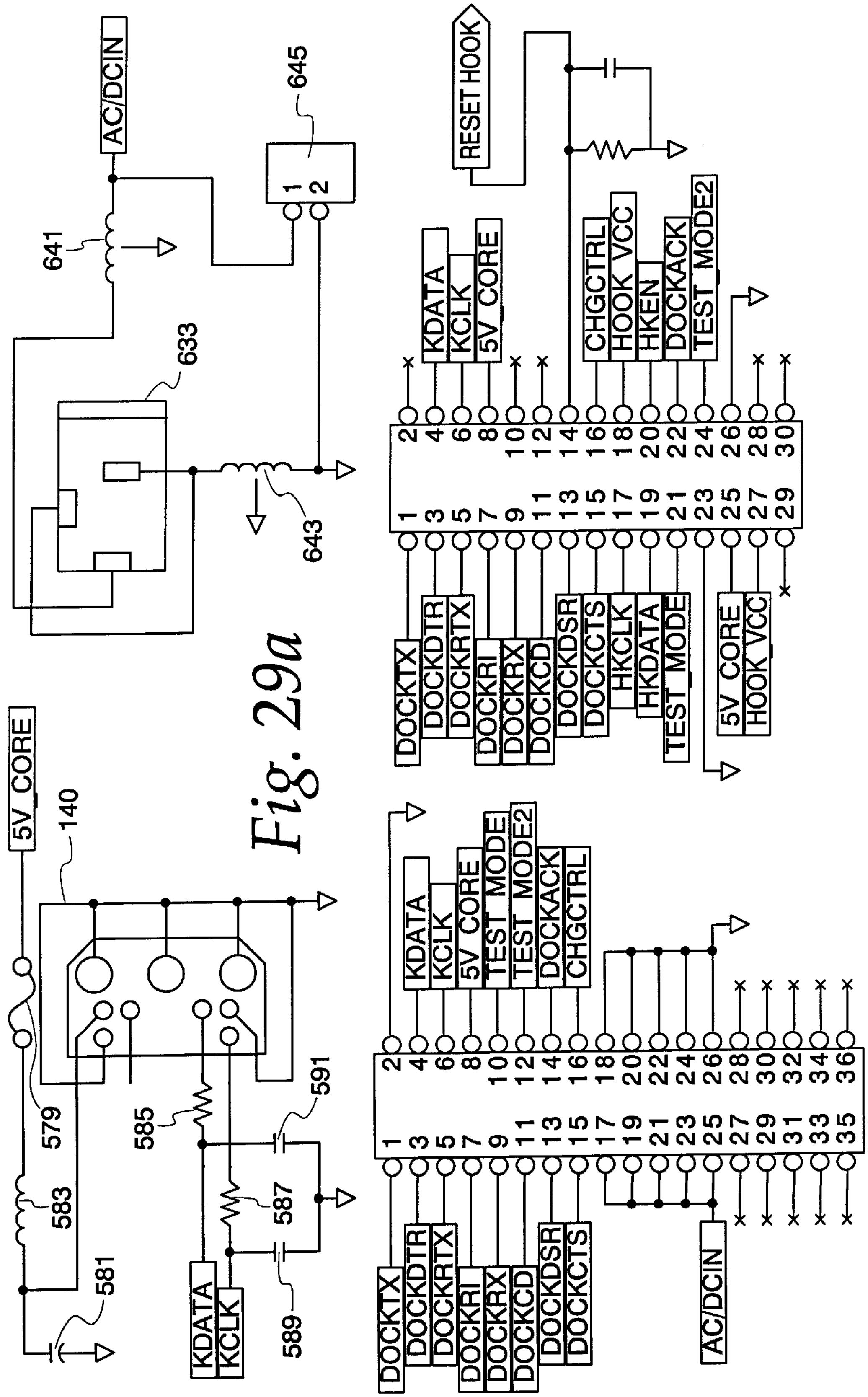
Figure 29B:
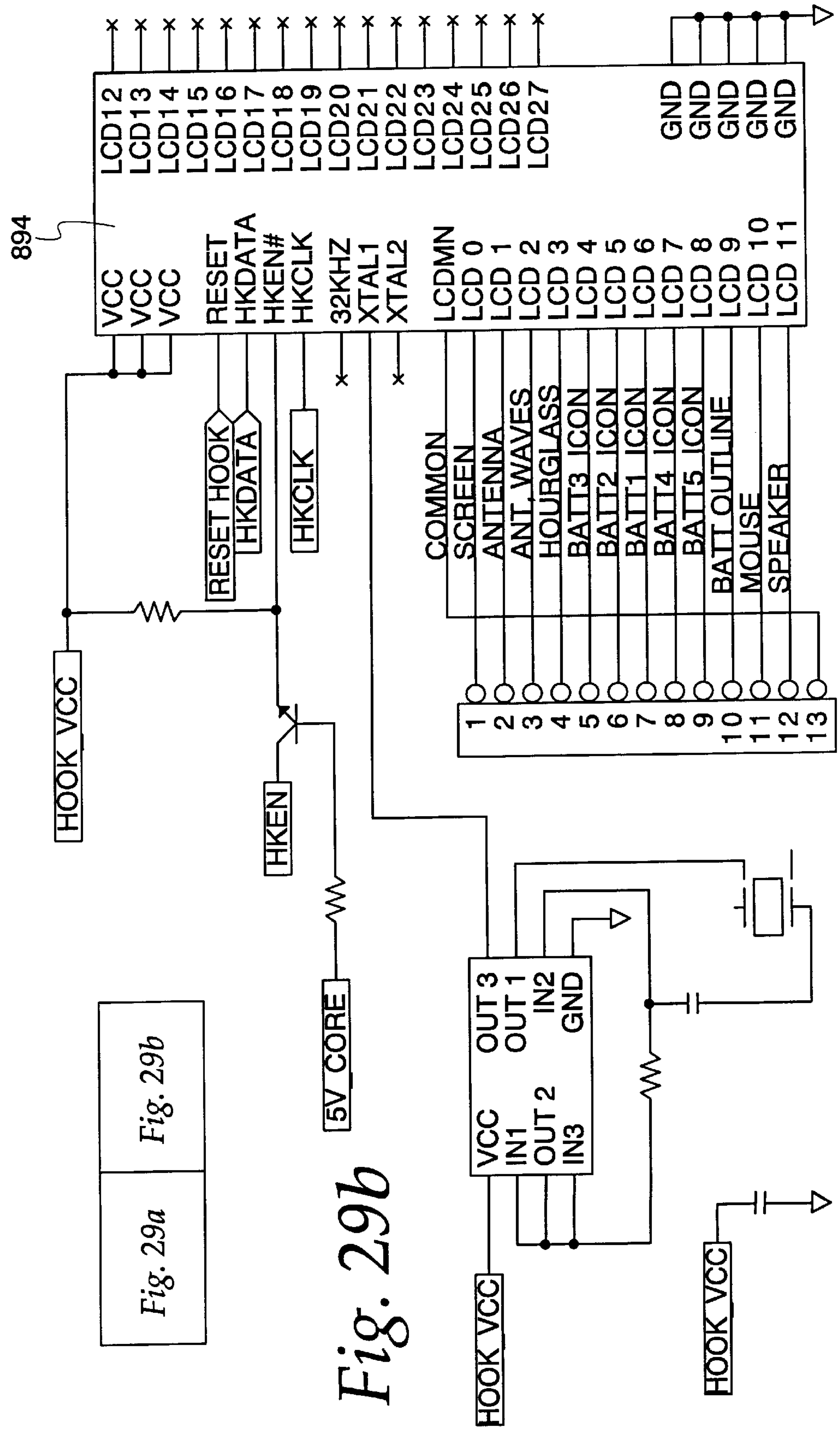

In addition to battery management, the keyboard controller 125 also supports an external PS/2-type keyboard, as well as a PS/2-type bar code reader, connected to a keyboard connector 140 (FIG. 29). Communication between the keyboard or bar code reader (not shown) is by way of a standard type PS-2 two-wire bus connected to serial ports P4.6 and P4.7. In particular, the keyboard data KDATA is pulled up to the 5-volt voltage supply 5V_CORE by way of a pull-up resistor 582 while the keyboard clock signal KCLK is pulled up the 5-volt supply 5V_CORE by way of a pull-up resistor 584.

Referring to FIG. 29, the keyboard connector 140 may be a 6-pin MINI-DIN connector or a DB-8 connector as shown. Pins 6–9 are connected to system ground. Pin 4 of the connector 140 is pulled up to the power supply voltage 5V_CORE by way of a fuse 579 and is filtered by a capacitor 581 and an inductor 583. The data signal KDATA is applied to pin 1 by way of a current-limiting resistor 585, while the clock signal KCLK is applied to pin 5 by way of a current-limiting resistor 587 and a pair of capacitors 589 and 591. These clock and data signals KCLK and KDATA are connected to the ports P4.6 and P4.7, respectively, for serial communication with an external keyboard or bar code reader.

Additionally, the keyboard controller 125 may be used to control the brightness level as well as the contrast level of the LCD display. More particularly, referring to FIG. 27, a contrast signal CONTRAST, available at port 0, pin 1 of the keyboard controller 125 (FIG. 15) is used to adjust the contrast level of the LCD display. The contrast signal CONTRAST is applied to an adjustment terminal ADJ of a negative 24-volt DC voltage supply, which can be incrementally adjusted in steps by a 24-volt DC supply 586 (FIG. 27), for example, a Maxim Model No. 749, which provides for 64-step adjustment. Thus, each high pulse will increment the contrast of the LCD display by one step. With a 64-step device, sixty-three pulses rolls the counter over and decreases the contrast by 1. The 24-volt DC supply 586 is under the control of an enable signal ENAVEE, available from the video controller 113A (FIG. 19).

Figures 26B, 27:
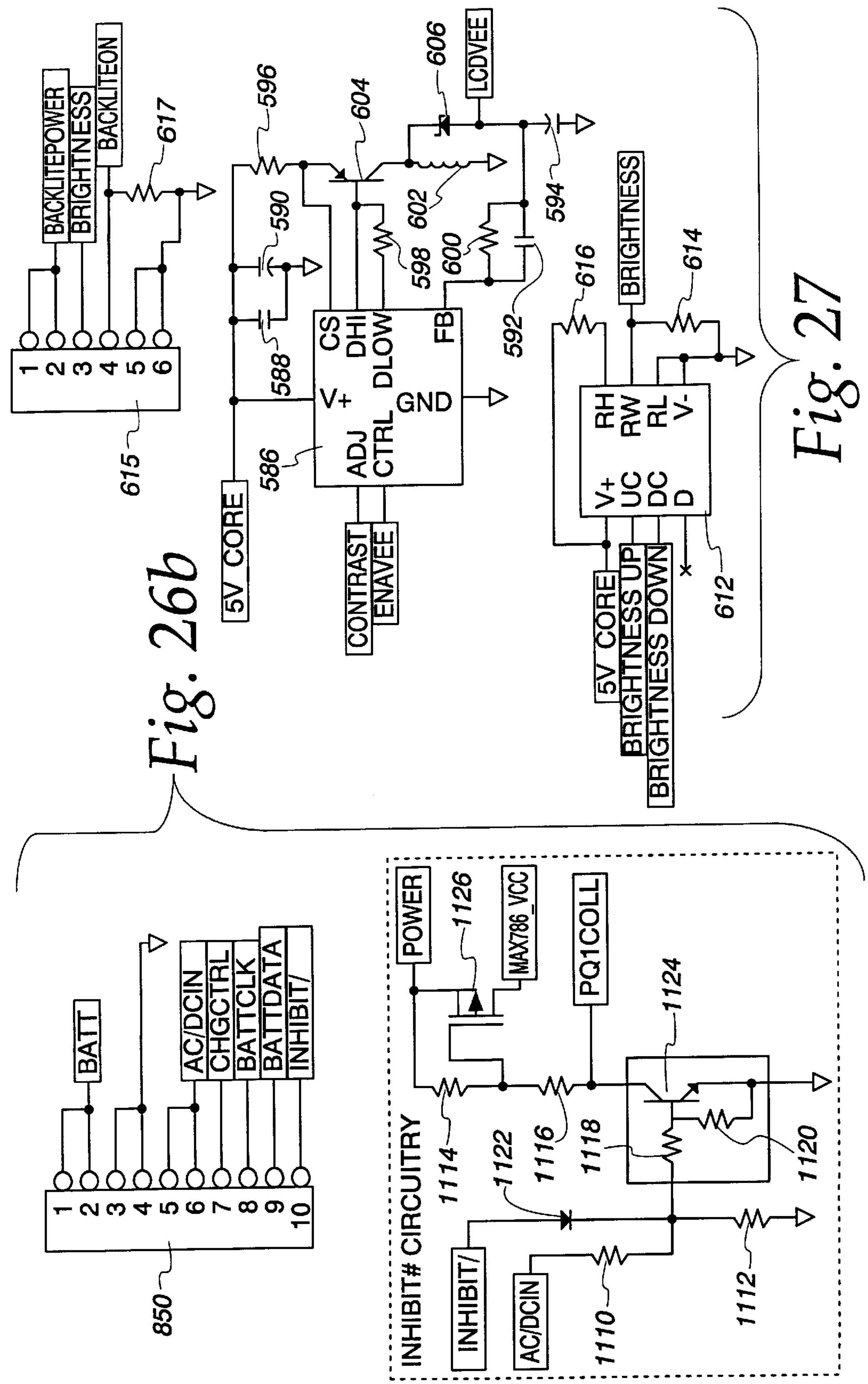

In order to assure proper operation, the 24-volt supply 586 is connected in a circuit as shown in FIG. 27, which includes a plurality of capacitors 588, 590, 592, 594; a plurality of resistors 596, 598, 600 an inductor 602; a PNP transistor 604; and a zener diode 606. The output of the circuitry is a nominal negative 24-volt signal LCDVEE, which is adjustable in 64 increments by way of the CONTRAST signal, as discussed above, to vary the contrast level of the LCD display.

The keyboard controller 125 also controls the brightness of the LCD display. In particular, brightness adjustment signals BRIGHTNESS_UP, BRIGHTNESS_DOWN (FIG. 15) are available at port 1, pins 6 and 7. These signals BRIGHTNESS_UP and BRIGHTNESS_DOWN are normally pulled up to the 5-volt supply 5V_KBD by way of a pair of pull-up resistors 608 and 610. These signals BRIGHTNESS_UP and BRIGHTNESS_DOWN are applied to a digital output potentiometer 612 (FIG. 27), for example a Dallas Semiconductor Model No. DS1669-50. The digital output potentiometer 612 is powered by a 5-volt power supply 5V_CORE, which is also used to pull up an unused output terminal, RH.

The brightness control signals BRIGHTNESS_UP and BRIGHTNESS_DOWN are applied to the increment and decrement terminals, UC and DC of the digital output potentiometer 612. The output of the digital output potentiometer 612 is a variable resistance signal, which forms the brightness control signal BRIGHTNESS. This brightness control signal BRIGHTNESS is pulled down by a pull-down resistor 614.

The brightness control signal BRIGHTNESS from the digital output potentiometer 612, as well as a backlight control signal BACKLITEON and a backlight power signal BACKLITEPOWER are connected to the system by way of a 6-pin connector 615 (FIG. 27). The backlight control signal BACKLITEON is connected to pin 4 of the connector 615 and pulled low by way of a pull-down resistor 617. The power control signal BACKLITEPOWER is applied to pins 1 and 2 while the backlight brightness control signal BRIGHTNESS is applied to pin 3. The backlight control signal BACKLITEON is available from the video controller 113A (FIG. 19) and is used to power the backlight on the LCD. The backlight power signal BACKLITEPOWER, available from an FET 619 (FIG. 20), is under the control of the backlight power control signal BACKLITEON, available from the video controller 113A (FIG. 19).

The FET 619 (FIG. 20) is used to control power to both the LCD as well as the backlight. In particular, referring to FIG. 20, the backlight power control BACKLITEON, is used to control an NPN transistor 617 by way of a current-limiting resistor 621. The NPN transistor 621, in turn, is used to control the FET 619 to generate the backlight power signal BACKLITEPOWER at the drain terminal D1. The main power signal POWER (FIG. 28) is connected to the collector of the NPN transistor 617 by way of a resistor 623. The main power signal POWER is also applied to a source terminal 51 of the FET 615. A gate terminal G1 of the FET 615 is connected between the resistor 623 and the collector of the NPN transistor 625. The backlight power control signal BACKLITEON is used to conserve power under certain power management conditions discussed above. This signal BACKLITEON controls the NPN transistor 625. In particular, in a normal state, the backlight power control signal BACKLITEON is high, which turns ON the NPN transistor 625. When the NPN transistor 625 is ON, the gate terminal G1 of the FET 619 is connected to system ground, which turns the FET 619 ON, thereby connecting the main power signal POWER to the drain terminal D1 of the FET 619 to provide a power signal BACKLITEIN, which is filtered by a ferrite bead inductor 625 (FIG. 28) to provide the backlight power signal BACKLITEPOWER, that is applied to the LCD by way of the connector 615 (FIG. 27). When the backlight power control signal is low, for example, during a power management mode, the NPN transistor 625 turns OFF, thereby connecting the gate G1 of the FET 619 to the main power signal POWER by way of the resistor 623, thereby turning the FET 619 OFF, disconnecting power to the LCD.

Figure 22:
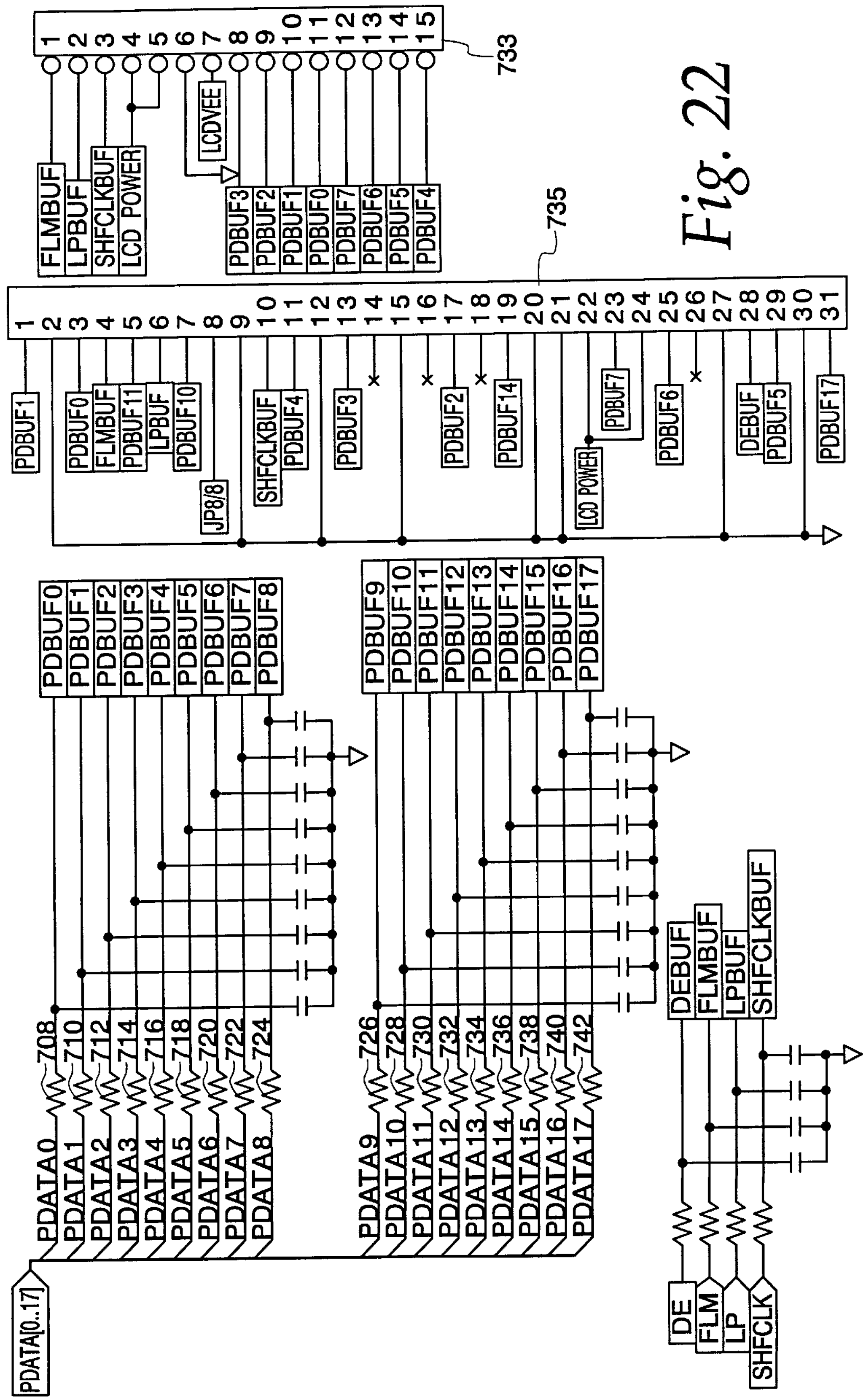

The FET 619 may be supplied as a dual element with two FETs in a single package. As shown in FIG. 20, the gate G2, source S2 and drain D2 terminals of the FET 619 are used to control power to the LCD, under the control of an LCD enable signal ENAVDD, available from the video controller 113A (FIG. 19). In particular, the LCD enable signal ENAVDD is normally high and is de-asserted to disable the LCD power supply LCD_POWER. This LCD enable signal ENAVDD is pulled low by a pull-down resistor 627 and applied to an inverter 629, whose output is connected to the gate terminal G2 of the FET 619. The LCD power supply signal LCD_VCC (FIG. 19) is applied to the source terminal S2 of the FET 619, while the drain terminal D2 represents the LCD power signal LCD_POWER, filtered by an inductor 629 and a capacitor 631. The LCD power signal LCD_POWER is connected to the LCD by way of the connectors 732 or 734 (FIG. 22). In operation, the LCD power enable signal ENAVDD is high, which turns on the FET 619 to enable the LCD power supply LCD_POWER. When the LCD power enable signal ENAVDD is de-asserted, the FET 619 is turned OFF.

The keyboard controller 125 (FIG. 15) is connected to the system data bus SD [0 . . . 7]. The system address bit SA2 is used for addressing the keyboard controller 125. In particular, the address terminal of the keyboard controller 125 is connected to bit SA2 of the system address bus SA[0 . . . 23].

Power to the keyboard controller 125 is provided by way of a 5-volt supply 5V_KBD, supplied to the power supply terminal VCC. The 5-volt supply 5V_KBD, provided by the DC-to-DC converter 300 (FIG. 26) by way of an in-line ferrite bead inductor 618. In addition to supplying power to the keyboard controller 125, the 5-volt supply 5V_KBD is used to pull-up various pins by way of pull-up resistors 620, 622, 624, 626, 628, 630, 632 and 634. In order to stabilize the 5-volt power supply 5V_KBD, a plurality of bypass capacitors 636 and 638 are connected between the power supply 5V_KBD and system ground.

As mentioned above, the keyboard controller 125 has various functions. One of those functions is to monitor when AC power is plugged into the machine from an AC adapter plug 633 (FIG. 29), connected to the external power supply signal AC/DCIN by way of a pair of EM1 filters 641 and 643, and a connector 645. In particular, an AC power signal ACPWR, available from an FET 635 (FIG. 20), is applied to port 3, pin 1 (FIG. 15) by way of an inverter 636. The external power supply signal AC/DCIN, available from the AC plug 633, is used to control the gate terminal of the FET 635, normally pulled down a pull-down resistor 637. A 5-volt supply 5V_CORE is connected to the drain terminal while the source terminal is used for the AC power signal ACPWR, pulled down by a pull-down resistor 639. When an external power source is not connected to the FET 635, the signal ACPWR will be low. Once external power is connected to the connector 633, the signal AC/DCIN from the IBP 130 goes low, which, in turn, turns on the FET 635 to cause the signal ACPWR to go high.

The keyboard controller 125 also monitors the status of the radio. As such, an output from the radio TX/RX_LED pin is applied to pin 2 of port 3 of the keyboard controller 125 by way of an inverter 638. When pin 1 of port 3 is high, the keyboard controller 125 interprets that the radio is in a transmit mode. Another signal from the radio CD_LED is used to provide an indication to the keyboard controller 125 that that radio is in a receive mode. This signal CD_LED is applied to pin 2 of port 3.

An 8 MHz clock signal 8 MHz_5V is used to drive the keyboard controller 125. The clock signal 8 MHz_5V is developed by the clock generator 398 and converted to a 5-volt level by way of the translator signal level translator 452.

The video controller 113A (FIG. 19) controls the video functions. The video controller 113A, for example, a model number CL-GD 6205 from Cirrus Logic, can support various video modes including a mono STN and a color TFT panel with up to 640×480 with 64 shades of gray. In addition, the video controller 113A will support 1024 by 768 resolution with 16 colors on a CRT through the aid of its on-board digital to analog converter.

The video controller 113A utilizes two clock sources for timing, generated by an internal clock generator to produce the required frequencies for the display and memory timing. Two separate analog power supply sources AVCCMCLK and AVCCVCLK are provided to the analog power supply inputs AVCC1VCLK and AVCC4MCOK on the video controller 113A. These analog power supply sources AVCCMCLK and AVCCVCLK are derived from the 3-volt power supply 3V_CORE, available at the DC-to-DC converter 300 (FIG. 26). In particular, the 3-volt power supply 3V_CORE is used to develop a 3-volt power supply VGA_VCC by way of an in-line ferrite bead inductor 642. The power supply VGA_VCC, in turn, is filtered by a plurality of bypass capacitors 644–642, connected between the power supply VGA_VCC and system ground. The 3-volt power supply VGA_VCC is used to develop the analog power supplies AVCCMCLK and AVCCVCLK by way of a plurality of resistors 654 and 656 as well as a plurality of by pass capacitors 658 to 664, connected to an analog ground AGND. The analog ground AGND is tied to the digital ground GND by way of a ferrite bead conductor 664.

The keyboard controller 125 also provides various miscellaneous system functions by way of its I/O ports 0, 1, and 3. Five port bits P0.0–P0.5 of port 0 are used for system control. Bit 0 is used to generate a signal KBC-P00, an active high signal, which disables the general purpose chip select signals GPCS1 and GPCS2, available at the system controller 129 (FIG. 12) during boot-up, until the signals GPCS1 and GPCS2 are properly configured. As discussed above, the general purpose chip select signals GPCS1 and GPCS2 are used for selecting the pen controller 110A (FIG. 21), the radio interface 114B (FIG. 16) and the UART (134). Bit P0.1 is used to generate a contrast signal CONTRAST, normally pulled low down by a pull-down resistor 639 (FIG. 5) for contrast control of the LCD as discussed above. Briefly, the contrast signal CONTRAST is used to step the 24-volt supply 586 (FIG. 27). Bit P0.2 is used to generate a keyboard shutdown signal KBSHUTDOWN. This signal KBSHUTDOWN, discussed below, is active low, and in conjunction a pen shutdown signal PEN_SHUTDOWN, available at the pen controller 110A (FIG. 21), is used to generate a shutdown signal SHUTDOWN to shutdown the AC-to-DC converter 300 (FIG. 26) during low power conditions. More particularly, the keyboard shutdown signal KBSHUTDOWN, pulled up by a pull-up resistor 641, and the pen shutdown signal PEN_SHUTDOWN, pulled low by a pull-down resistor 643, are diode ORed by a pair of diodes 645 and 647. The cathodes of the diodes 645 and 647 are joined to form the active low shutdown signal SHUTDOWN. If the keyboard shutdown signal KBSHUTDOWN is asserted, the shutdown signal SHUTDOWN will be forced low, which, in turn, is used to disable the DC-to-DC converter 300 (FIG. 26). Bit P0.3 is used to generate a signal FLASHVPP to enable the flash memory devices 742–748 (FIG. 25) to be programmed. In particular, when the signal FLASHVPP is low, the flash memory devices 742–748 can be programmed. Bit P0.4 is used to generate a signal KBC_P04. The signal KBC_P04 is an active high signal and is used to indicate to the system controller 129 (FIG. 12) that a low battery condition has occurred. Bit P0.5 is used for speaker control as discussed above. The pen PO.5 is used to generate the speaker disable signal SPKRDISABLE, an active high signal.

Port 1, bits P1.1, P1.5, P1.6, and P1.7 of the keyboard controller 125 are used for system functions. Bit P1.1 is configured as an input and is used to indicate to the keyboard controller 125 that the system is in a test mode. As discussed above, the test mode signal TEST_MODE is used to enable the flash memory device 742 (FIG. 25) to be programmed. In particular, as discussed above, the test mode signal TEST_MODE is used to generate a decode signal FLIP_SA18 (FIG. 17) for decoding of the flash memory device 742. Port 1, bits P1.5, P1.6, and P1.7 are used for LCD control. In particular, the pen P1.5 may be used for LCD status control. the pens P1.6 and P1.7 are used for brightness control of the LCD as discussed above.

Port 3, bits P3.1, P3.2, P3.3, P3.4, P3.5, and P3.7 are configured as inputs. As discussed above, a signal ACPWR, available from the source of the FET 635 (FIG. 20), is applied to the pin P3.1. This signal ACPWR notifies the keyboard controller 125 that an external power source is connected to the system. The signal CD_LED is applied to the pin P3.2. This signal, CD_LED, available from the radio interface (FIG. 16), indicates that the radio is receiving a signal. A signal TX/RX_LED, also available from the radio interface, is applied to the pin P3.3. This signal TX/RX_LED indicates that the radio is in a transmit mode. A signal DOCKACK/: may be applied to the pin P3.4. This signal may be used to indicate to the keyboard controller 125 that a device is docked to the UART 134. The development of the signal DOCKACK/: does not form a part of the present invention. A second test mode signal TEST MODE_2 may be applied to the pin P3.5 for added functions. A signal PC5_P37 is applied to the pen P3.7. This signal PC5_P37 is available from the system controller 129 (FIG. 12) and indicates that the system is in a sleep state as discussed above.

The video controller 113A is connected to the system database SD[0 . . . 15] as well as the system address bus SA[0 . . . 23] and is adapted to support the video memory 113B of either 256K by 16-bit or 256K by 4-bit video memory chips 666 or 668. These video memory chips 666 and 668, for example 256K by 16 dram memory chips, as manufactured by Toshiba Model No. NE4244170-70, are connected to a 16-bit video memory databus VMDATA[0 . . . 15] and the 9-bit video memory address bus VMADR[0 . . . 8]. The video memory chips 666 and 668 are accessed in the range from A000H-BFFFFH and are switched to allow access to a full 512 kilobyte range. The video memory chips 666 and 668 are provided with dual column address strobe (CAS) pins to allow byte selection. The video memory column address strobes LCAS and UCAS are under the control of the high and low video memory column address strobe low and high signals, VMCASL and VMCASH, which are applied to the LCAS and UCAS pins by way of a pair of current-limiting resistors 670 and 672 to generate the buffered CAS the lower and high CAS signals VMCISLBUF and VMCASHBUF. The row address strobe signal VMRAS from the video controller 113A, as well as the write/enable signal VMWE, are also applied to the video memory 666 and 668 by way of current limiting resistors 674 and 676 respectively. The output/enable pin on the video memory chips 666 and 668 is under the control of a video memory operate/enable signal VM$\overline{\text{OE}}$. This video memory operate enable signal VM$\overline{\text{OE}}$ is generated by the video controller 113 and is applied directly to the video memory chip 666 and 668.

Various power supply signals VGA_VCC, LCD_VCC, VGABUS_VCC and VMEM_VCC are applied to the video controller 113A. The power supply VMEM_VCC is applied to the VMEM_VCC pins on the video controller 113A and is also used as the power supply for the video memory chips 666 and 668. The video memory power supply VMEM_VCC may be supplied as either a 3-volt or 5-volt power supply. More particularly, both a 3-volt and 5-volt power supply 3V_CORE and 5V_CORE. Depending on whether 3-volt or 5-volt operation is selected, only one of the component positions illustrated as ferrite bead inductors 680 or 682 will be populated to produce the power supply VMEM_VCC.

As will be discussed in more detail below, the system also includes an LCD controller to control the LCD screen 113C. The power supply for the LCD controller LCD_VCC can likewise be supplied as either three volt or five volt by way of the 3- and 5-volt power supply voltages 3V_CORE and 5V_CORE, available at the DC-to-DC converter 320 (FIG. 26). Depending on the voltage selected, only one of the component locations 684 and 686 will be populated to provide the LCD power supply voltage LCD_VCC. In addition, a power supply voltage VGABUS_VCC is used for the VGA bus. This power supply voltage VGABUS_VCC is generated by the DC-to-DC converter 320 by way of a ferrite bead inductor 688.

In order to filter noise out of the power supply signals, various bypass capacitors are connected between the power supply signals and system ground. For example, a plurality bypass capacitors 690–696 are coupled between the power supply signal VMEM_VCC and the system ground. Similarly, a pair of bypass capacitors 698 and 700 are connected between the power supply signal LCD_VCC and the system ground. Lastly, a plurality of bypass capacitors 702 to 706 is connected between the power supply signal VGABUS_VCC and the system ground.

Additional filtering is provided for the analog subsystem. In particular, a filter consisting of a pair of capacitors 708 and 710 and a resistor 712 is connected to a filter terminal VFILTER and analog ground AGND. Similarly, another pair of capacitors 714 and 716 and a resistor 718 are connected between a signal MFILTER and analog ground AGND.

The video controller 113A requires two separate clock signals: 14 MHz; and 32 KHz. The 14 MHz clock signal is used for most timing including the LCD panel memory and the bus cycle while the 32 KHz clock signal is used for video memory refreshing when the system is suspended. These clock signals are supplied by the clock generator 398 (FIG. 13) by way of the signal level translator 452 (FIG. 14). More particularly, 32 KHz and 14 MHz clock signals 32 KHz and 14 MHz from the clock generator 398, respectively, are applied to the signal level translator 452 to transform these respective signals into 5-volt signals 32 KHz_5V an 14 MHz_5V to provide a suitable clock signal voltage for the video controller 113A.

RGB data from the video controller 113A (FIG. 19) is supplied to the LCD screen 113C by way of a data bus PDATA[0 . . . 17]. This data bus PDATA[0 . . . 17] is applied to a plurality of current limiting resistors 708–742, respectively, to generate the buffer signals PDBUF[0 . . . 17]. These buffer signals PDBUF[0 . . . 17] are connected to the LCD panel 113 along with various control signals by way of a pair of connectors 732 and 734.

Figure 25A:
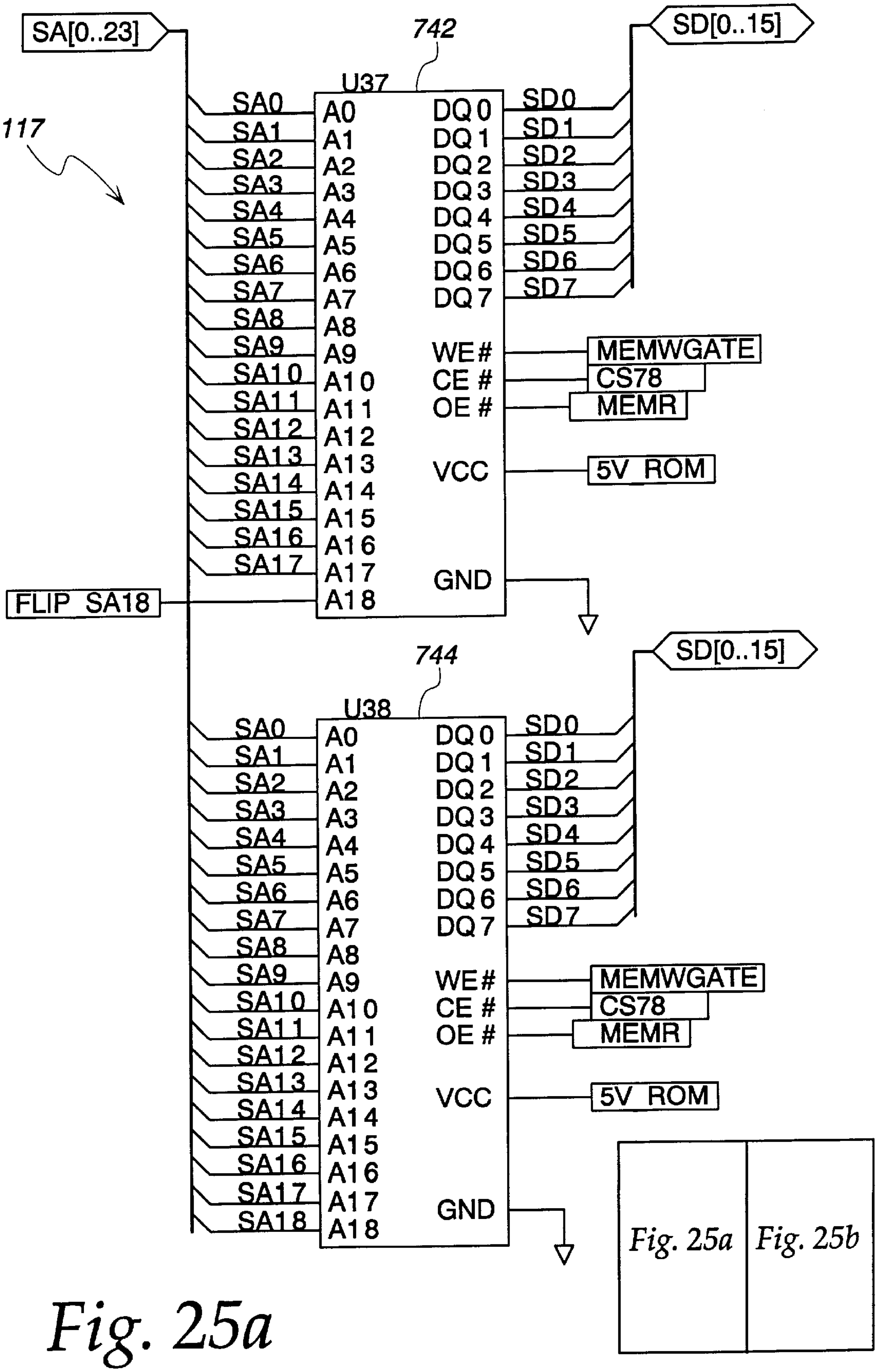
Figure 25B:
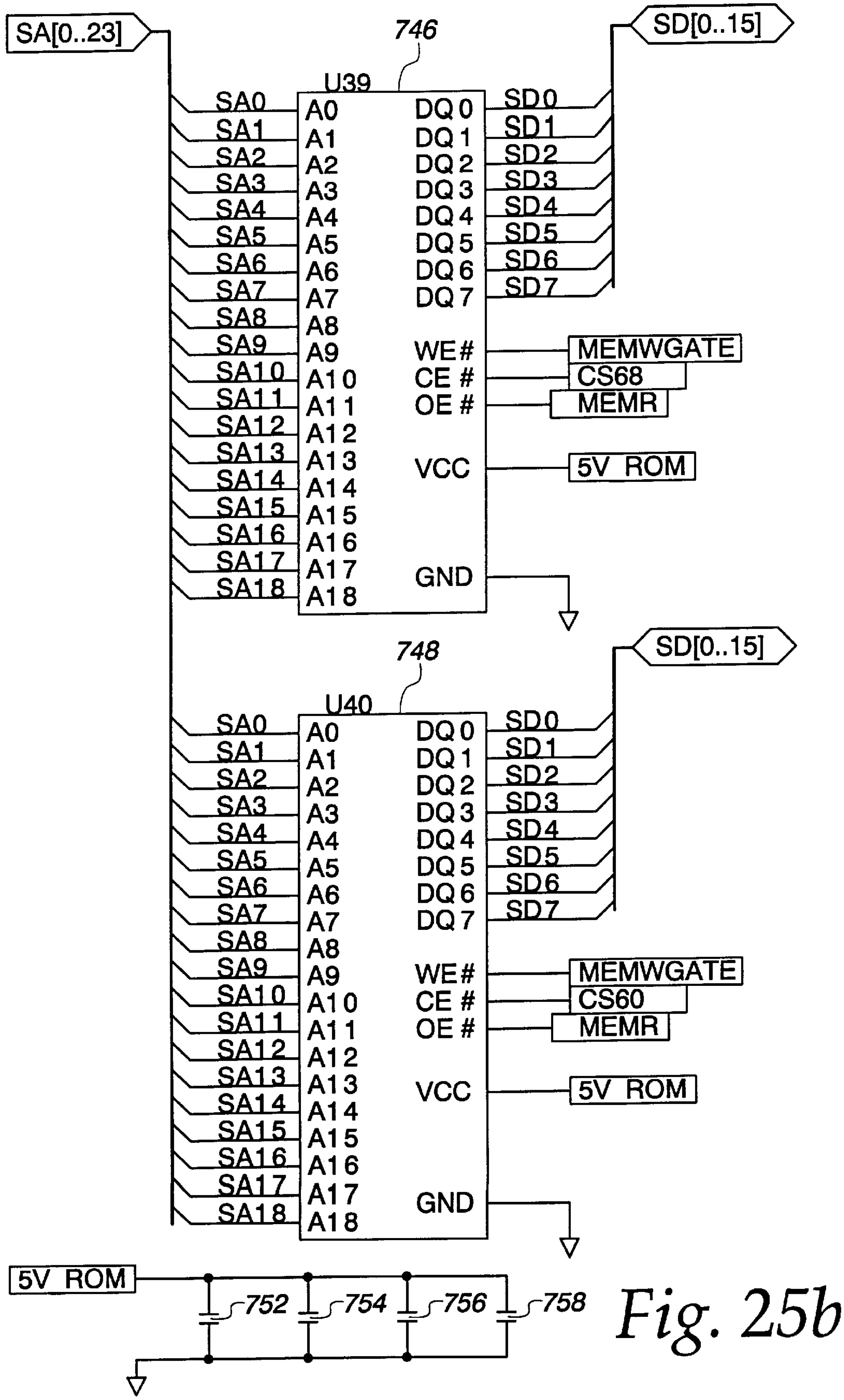

The BIOS as well as other data is stored in flash memory, for example, 512K by 8-bit memory devices 742–748 (FIG. 25). These flash memory devices 742–748 are connected to the local ISA bus 150 by way of the system address bus SA[0 . . . 23] and the system data bus SD[0 . . . 15]. The chip enable pins CE of the flash memory devices 742–748 are selected by a decoder circuit (FIG. 17), as will be discussed in more detail below. The output enable pins $\overline{OE}$ on the flash memory devices 742–748 are under the control of a memory read signal MEMR. The memory read signal MEMR is under the control of the system controller 129. The write/enable pins WE, which are active low, are under the control of a memory right gate signal MEMWGATE. This signal MEMIJGATE is only enabled when the flash memory devices 742–748 are being programmed. As discussed above, programming of the flash memory devices 742–748 is under the control of a flash program signal FLASHVPP, available at port 0.3 of the keyboard controller 125 (FIG. 15). This programming signal FLASHVPP, normally pulled high by a pull-up resistor 749 (FIG. 17), is ORed with a memory write signal MEMW by way of an OR gate 751 to generate a signal MEMGATE, an active low signal.

The power supply for the flash memory devices 742–748 is developed by a 5-volt power supply signal 5V_ROM. The 5-volt power supply signal 5V_ROM is available from the DC converter 300 (FIG. 20) by way of a ferrite bead inductor 751. This power supply signal 5V_ROM is also connected to a plurality of by-pass capacitors 752–758, for stabilization.

Decoding of the flash memory devices 742–748 is provided by the circuitry that includes the buffers 760, 762, the inverters, 764, 766, and 768 and OR 770 and a 3- to 8-bit multiplexer, Model No. 74HCT138, for example, as manufactured by Motorola and a pair of resistors 772 and 774 (FIG. 17). In particular, the system address bits SA[19 . . . 21] are applied to a 3- to 8-bit multiplexer 776. The system address bit SA18 is applied to the inverter 760 to develop a FLIP_SA18 signal that is pulled down by the pull-down resistor 774. During a normal boot-up, the FLIP_SA18 signal will be same as the system address bit SA18. However, during a test mode boot-up, the FLIP_SA18 signal will be low until a control signal available at the control signal GPI00, available at the system controller 129, goes low in order to enable the system to boot from the BIOS in the flash memory device 742 as will be discussed in more detail below. Once the GPI00 signal goes low, the FLIP_SA18 signal will be the same as the system address bit SA18.

The multiplexer 776 is under the control of a flash memory rewrite signal MRW. This signal MRW and the system address bit SA[23]. The flash memory read write signal MRW is under the control of an OR gate 780. The OR gate 780, in turn, is under the control of memory read and write signals MEMN and MER, which are applied to a pair of inverters 782 and 784, respectively, and, in turn, to the OR gate 780. The memory read MEMR and memory write MEMW signals are available from the system controller 129.

The output of the multiplexer 776 is used to generate the chip select signals CS60, CS68 and CS70. In order to provide the ability of the flash memory device 742 to be addressed during a test mode, the chip select signal CS78 is under the control of an OR gate 770 and a plurality of inverters 764–768. During a normal mode of operation, the chip select signal CS78 will be under the control of the multiplexer 776. During a normal boot up, the chip select signal CS78 for the flash memory device 742 will be under the control of a ROM chip select signal ROMCS, available at the system controller 129 in order to enable the system BIOS to be shadowed into the DRAM 111A.

In order to provide the ability of the system to update the BIOS in the flash memory device 742 and to recover from a corruption of the BIOS data in the flash memory device 742, a uniform asynchronous receiver transmitter (UART) 788 (FIG. 23) is provided. The UART 788 is connected to the system data bus SD[0 . . . 15] and the system address bus bits SA[0 . . . 2]. The UART 788 is powered by the 5-volt power signal 5V_CORE, available at the DC-to-DC converter 320 (FIG. 26). A 1.84 MHz clock signal, 1.84 MHz_5V, available at the signal level translator 452, is used to drive the UART 788.

Figure 23B:
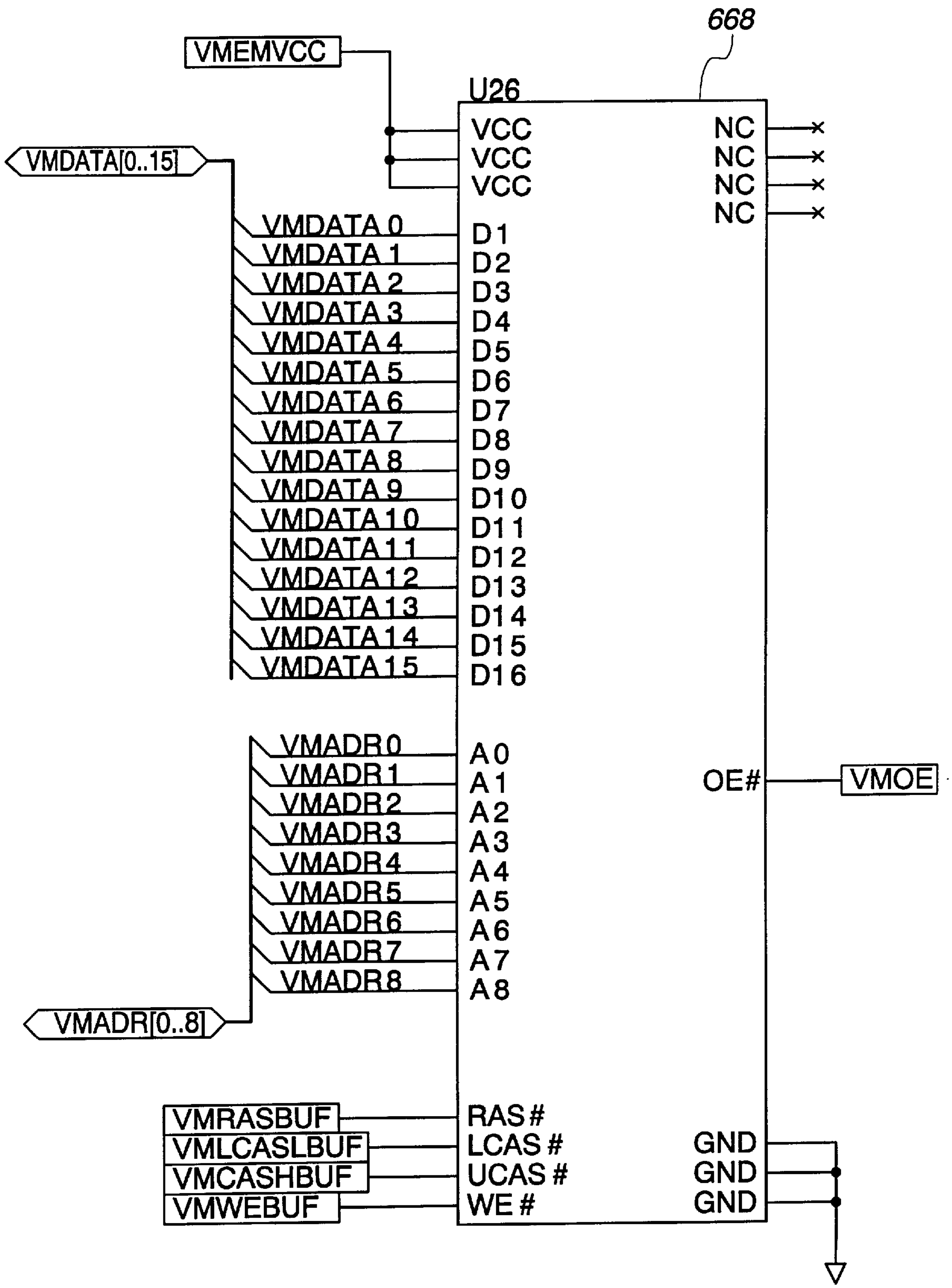
Figure 23C:
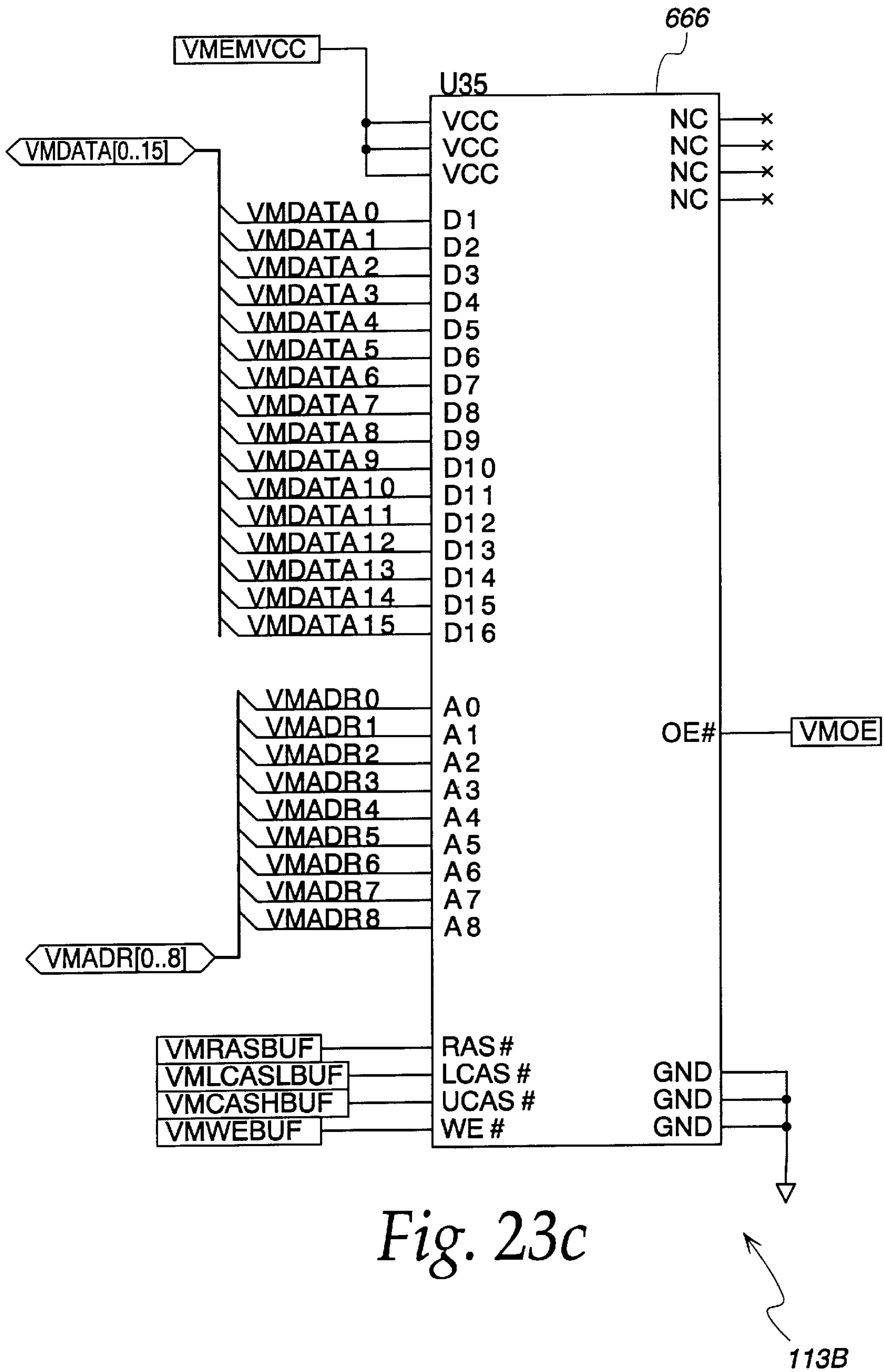

A serial interface 790 (FIG. 30), consisting of a standard DB-9 connector, enables external serial data to be received by the UART 788 (FIG. 23). The UART signals are filtered by way of a plurality of resistors 792–806 and bypass capacitors 802–822 and applied to an optional disaster recovery adapter 824, an RS-232 interface, connected to the rear of the DB-9 connector 790 and permits the flash memory devices 742–748 (FIG. 25) to be updated by an external source in the event of a flash disaster. The flash recovery adapter 824 may be implemented as a DB-9 connector and is connected to the 5-volt power supply 5V_CORE, which, in turn, is connected to a plurality of bypass capacitors 826 and 828. An additional four capacitors 830–836 are connected to the module 824 as shown.

The power supply for the system includes the DC-to-DC converter 300 which has the ability to provide both 3-volt and 5-volt power supplies signals to the various subsystems as discussed. The DC-to-DC converter includes a switching power supply 850, for example, a Maxim type 786. One source of power to the DC-to-DC converter 300 is the IBP 130, for example, 7.2 volts nominal, as well as from an external source of AC power connected to the plug 633 (FIG. 29).

Figure 28:
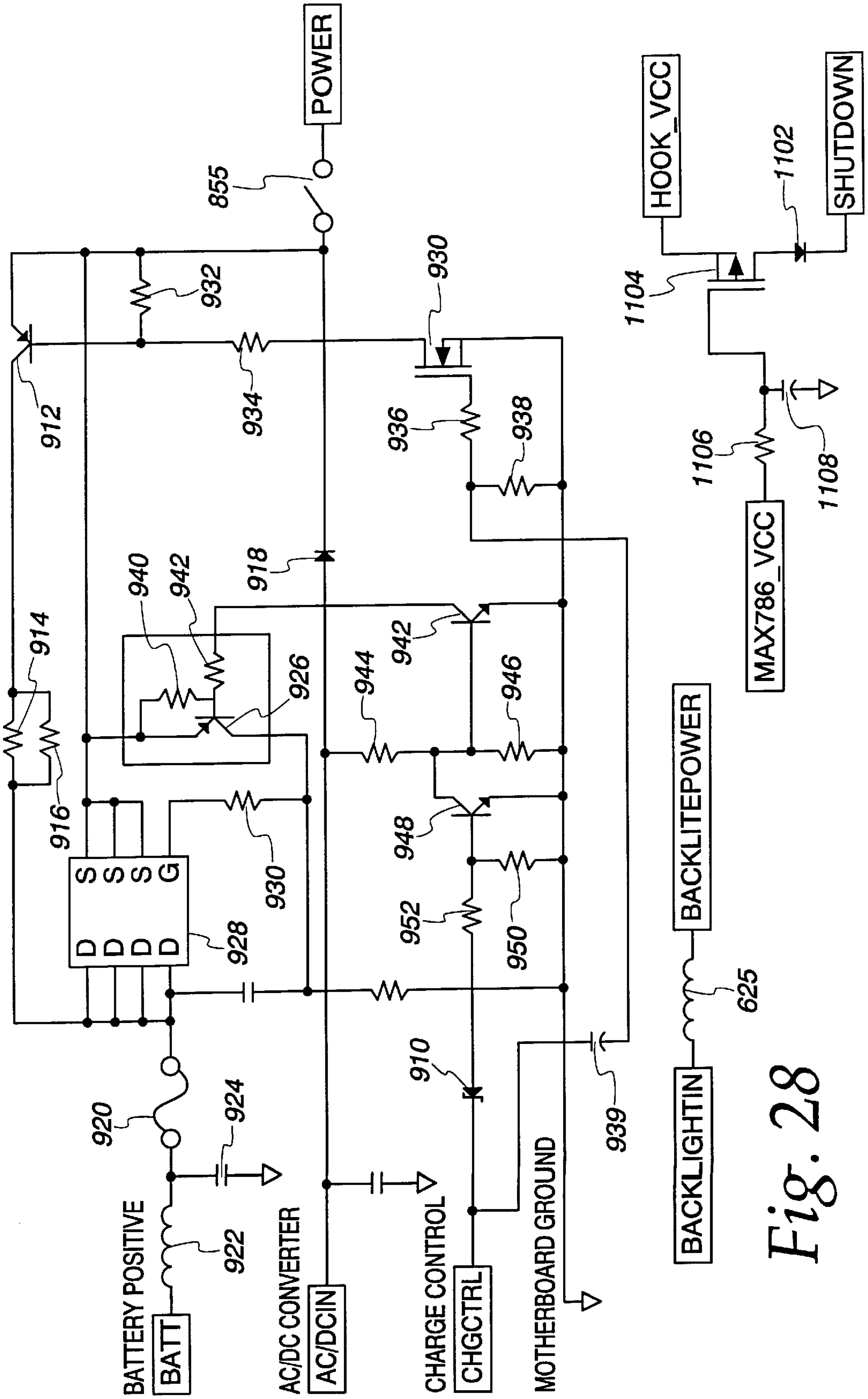

Input power to the DC-to-DC converter 300 may be from an AC/DC converter (not shown) connected to the plug 633, which has a DC output voltage between 5.5–15 volts DC, applied to a power supply terminal AC/DCIN (FIG. 28) as well as internal batteries, for example, the IBP 130, connected to the system by way of a connector 850 (FIG. 26). The battery supply voltage from the IBP 130 is connected to the battery positive terminal BATT (FIG. 28). The two supplies BATT and AC/DCIN are alternatively used to develop a main power signal POWER (FIG. 28), that is applied to a switching power supply 851, for example, a Maxim type 786 by way of a pair of FETS 854 and 856 (IL. 26), under the control of a main power switch 855 (FIG. 28). The main power signal POWER is applied to a drain input D2 on each of the FETS 854 and 856. A bypass capacitor 860 is connected to the drain terminal D2 of the FET 856 and system ground. The source terminals S2 of each of the FETS 854 and 856 is connected to the switching power supply 851 to provide 5- and 3-volt references by way of the zener diodes 860 and 862, respectively. The gate terminals G1 and G2 of the FETS 854 and 856 are under the control of the switching power supply 851.

The switching power supply 851 provides both a 3-volt and 5-volt output voltages 3V-CORE and 5V-CORE by way of filters which include a plurality of resistors 866 and 868, a plurality of inductors 870 and 872, and a plurality of capacitors 874–882 as well as a capacitor 879. For proper operation, the D1 and D2 terminals on the switching power supply 851 are connected to the system ground along with the ground pins PGND and GND. The SS3 and SS5 pins are connected to system ground by way of a pair of capacitors 884 and 886.

The frequency of the switching power supply 851 is under the control of a pair resistors 888 and 890 and a capacitor 892, connected to the SYNC and reference terminals on the switching power supply 851. A HOOK-VCC signal is applied to the VH and VL pins of the switching power supply 851. This signal HOOK-VCC is available from the module 894 (FIG. 29), discussed above. The signal HOOK-VCC signal is connected to the switching power supply 851 by way of a resistor 896 (FIG. 26); a plurality of capacitors 898, 900 and 902; and an FET 904.

As mentioned above, both the pen controller 110A (FIG. 21) and keyboard controller 125 (FIG. 15) are used to develop a shutdown signal SHUTDOWN. The shutdown signal SHUTDOWN is pulled low by a pull-down resistor 906 and applied to an active low shutdown pen SHDN* on the switching power supply 851. The shutdown signal SHUTDOWN (FIG. 20) is indicative of a shutdown by the keyboard controller 125 (FIG. 15).

As mentioned above, one source of power for the system is the IBP 130 which accounts for temperature and discharge rates and sends it to the keyboard controller 125 (FIG. 15). Two predefined levels are set in the IBP 130 to indicate low battery and critical battery. The IBP 130 will inform the keyboard controller 125 of a low battery when there is approximately five minutes left. When the battery charge is between 5 minutes to 2 minutes, the IBP 130 will report a battery critical condition. Within the final thirty seconds the IBP 130 will force an immediate shutdown. The IBP 130 will report the battery status approximately once every 2.5 seconds. If the system is changing to a power savings mode, a command will be sent to the IBP 130 to put the IBP 130 into a power-saving state. The IBP 130 will tri-state its communication lines and discontinue reporting battery status to the system.

A charge control signal CHGCTRL from the IBP 130 is used to control charging. Referring to FIG. 28, the charge control signal CHGCTRL is applied to a zener diode 910, for example, a 5.1V zener diode. The zener diode 910 controls whether the IBP 130 is fast charged or trickle charged as a function of the magnitude of the charge control signal CHGCTRL.

In particular, if the magnitude of the charge control signal CHGCRL is less than the zener breakdown voltage (i.e., less than 5.1 volts), the IBP 130 is trickle-charged by way of series pass transistor 912, a pair of resistors 914 and 916 from the external power signal POWER by way of a diode 918, a fuse 920 and a filter consisting of an inductor 922 and a capacitor 924.

Should the charge control signal CHGCTRL be greater than the zener breakdown voltage of the zener diode 910, the IBP 130 will be fast charged by way of an FET 928 whose source terminal is connected to the AC/DC converter by way of the diode 918 and drain terminal, connected to the battery positive terminal BATT by way of the fuse 920 and the inductor 922.

The series pass transistor 912 that controls trickle charging is under the control of an FET 930. The drain terminal of the FET 930 is connected to the system ground while the source terminal is connected to the base terminal of the PNP series pass transistor 912. Normally, the series pass transistor 912 is turned off with its base terminal being high by way of its connection to a pair of biasing resistors 932 and 934, which, in turn, are connected to the main power signal POWER by way of the diode 918. When the charge control signal CHGCTRL is less than the breakdown voltage of the zener diode 910, the charge control signal CHGCTRL turns on the FET 930 by way of the biasing resistors 936 and 938 a coupling capacitor, connected to its gate terminal. Once the FET 930 is turned on, it turns on the series pass transistor 912 to provide a charging path between the main power signal POWER and the battery positive terminal BATT.

As mentioned above, fast charging of the battery is under the control of the FET 928. The FET 928, in turn, is under the control of a PNP transistor 926. The PNP transistor 926, which includes a pair of biasing resistors 940 and 942, is connected to the collector terminal of an NPN transistor 942. The base of the NPN transistor 942 is connected to a pair of biasing resistors 944 and 946 and, in turn, to a collector terminal of another NPN transistor 948 and the main power signal POWER. The NPN transistor 948 is biased by way of a pair of biasing resistors 950 and 952 and, in turn, to the anode of the zener diode 910.

In operation, when the charge control signal CHGCTRL exceeds the breakdown voltage of the zener diode 910, the zener diode 910 conducts thereby biasing the NPN transistors 942 and 948, turning them ON. Once the NPN transistor 942 is turned ON, the base terminal of the PNP transistor 926 is connected to ground, thereby turning the PNP transistor 926 ON. The PNP transistor 926, in turn, connects the main power signals POWER to the gate terminal of the FET 928 by way of the diode 918, thereby turning the FET 928 ON to enable the battery positive terminal BATT to be fast charged from the AC-to-DC converter.

As mentioned above, the wireless interface device 100 includes a radio system which allows for wireless interfacing with a host computer and also wireless interfacing to both a wired local area network (LAN) and a wireless LAN. The radio subsystem has been discussed above. It is implemented by way of an interface 960 (FIG. 16), implemented by way of a 25×2 header, which connects the radio subsystem to the balance of the circuitry in the wireless interface device 100. In particular, the system data bus SD[0 . . . 15], as well as the system address bus bits SA[0 . . . 2] are connected to the interface 960. The radio interface 960 is under the control of the system controller 129 (FIG. 12), such as I/O write (IOW), I/O read (IOR) and an address enable signal (AEN).

Output signals from the radio interface 960 include the signals CD_LED, TX/RX_LED, IRQ10 and IOCS16. As discussed above, the signal CD_LED indicates a connection has been made with a host computer 101. The signal TX/RX_LED indicates that a signal is either being sent or received through the radio interface 960. As mentioned above, the peripheral controller 128 (FIG. 13) is responsible for interrupt control. Thus, the radio subsystem interrupt IRQ10 is applied to the peripheral controller 128. Power supply for the radio interface 960 is by way of a 5-volt power supply signal 5V_CORE, available at the DC-to-DC converter 300 (FIG. 26), which is filtered by a pair of bypass capacitors 962 and 964.

The interrupts for both the radio interface 960 IRQ10, as well as the UART 788 (FIG. 23) IRQ4, are formed into a common signal IRQ10/4 and applied to the system controller 129 by way of a resistor 966. In particular, the radio interface interrupt signal IRQ10 is applied to an inverter 962, whose output is ORed by way of the OR gate 964 with the UART 788 interrupt signal IRQ4. The output of the OR gate 964 forms the combined interrupt signal IRQ10/4.

The radio interface 960, as well as the UART 788 (FIG. 23), are selected by the chip select signals RADIOCS and URTCS. These signals are available at the output of a pair of the OR gates 968 and 970, respectively. The system address bit SA3 is inverted by way of an inverter 972 and ORed with a general purpose chip select gate signal GPCS1GATE by way of the OR gate 970 to generate the UART chip select signal UARTCS. The system address bit SA3 is applied directly to the OR gate 968 and ORed with the general purpose chip select gate signal GPCS1GATE to generate the radio chip select signal RADIOCS. The general purpose chip select signal gate signal GPCS1GATE is available at the output of an OR gate 974. In particular, a general purpose chip select signal GPCS1, available from the system controller 129 (FIG. 12), is ORed with an output from pin 0 of port 0 of the keyboard controller 125 (FIG. 15) to cause the radio interface 960 to be addressed at addressed 3EO-3E7 and the UART 788 to be addressed at address 3EA-3EF. The signal KBC_P00 is normally pulled up to the 5-volt power supply voltage 5V_CORE by way of a pull-up resistor 976.

Figure 21A:
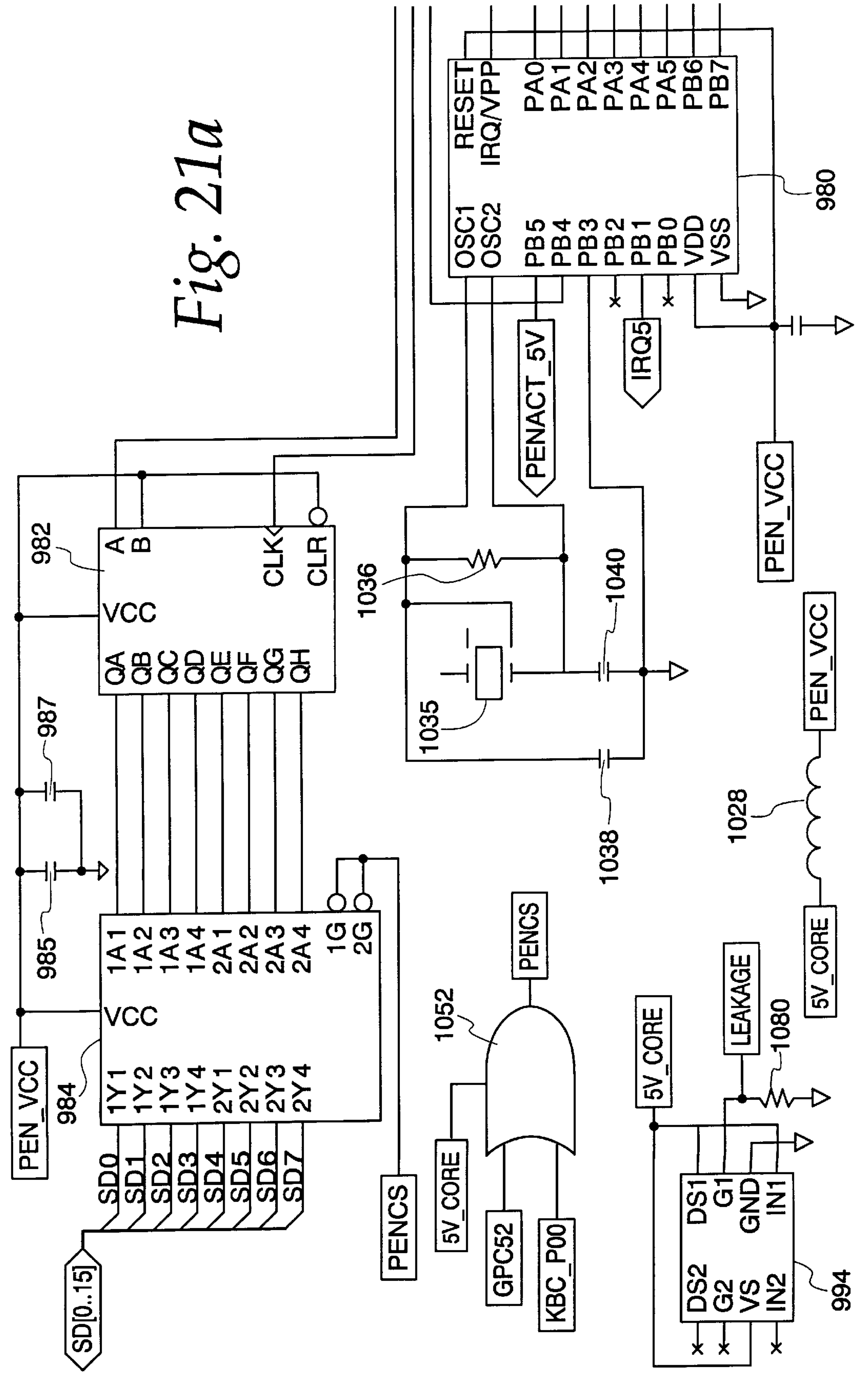
Figure 21B:
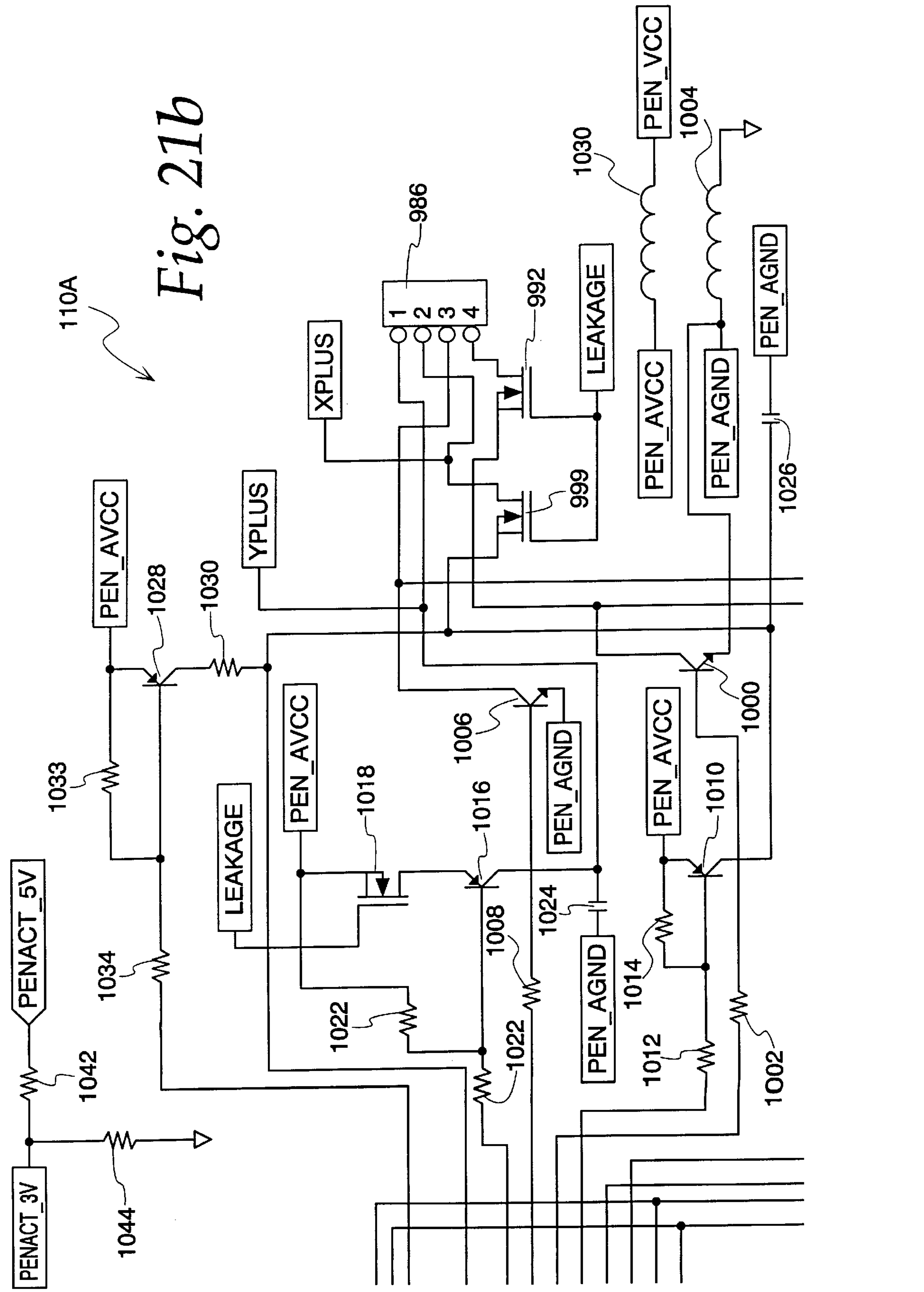
Figure 21C:
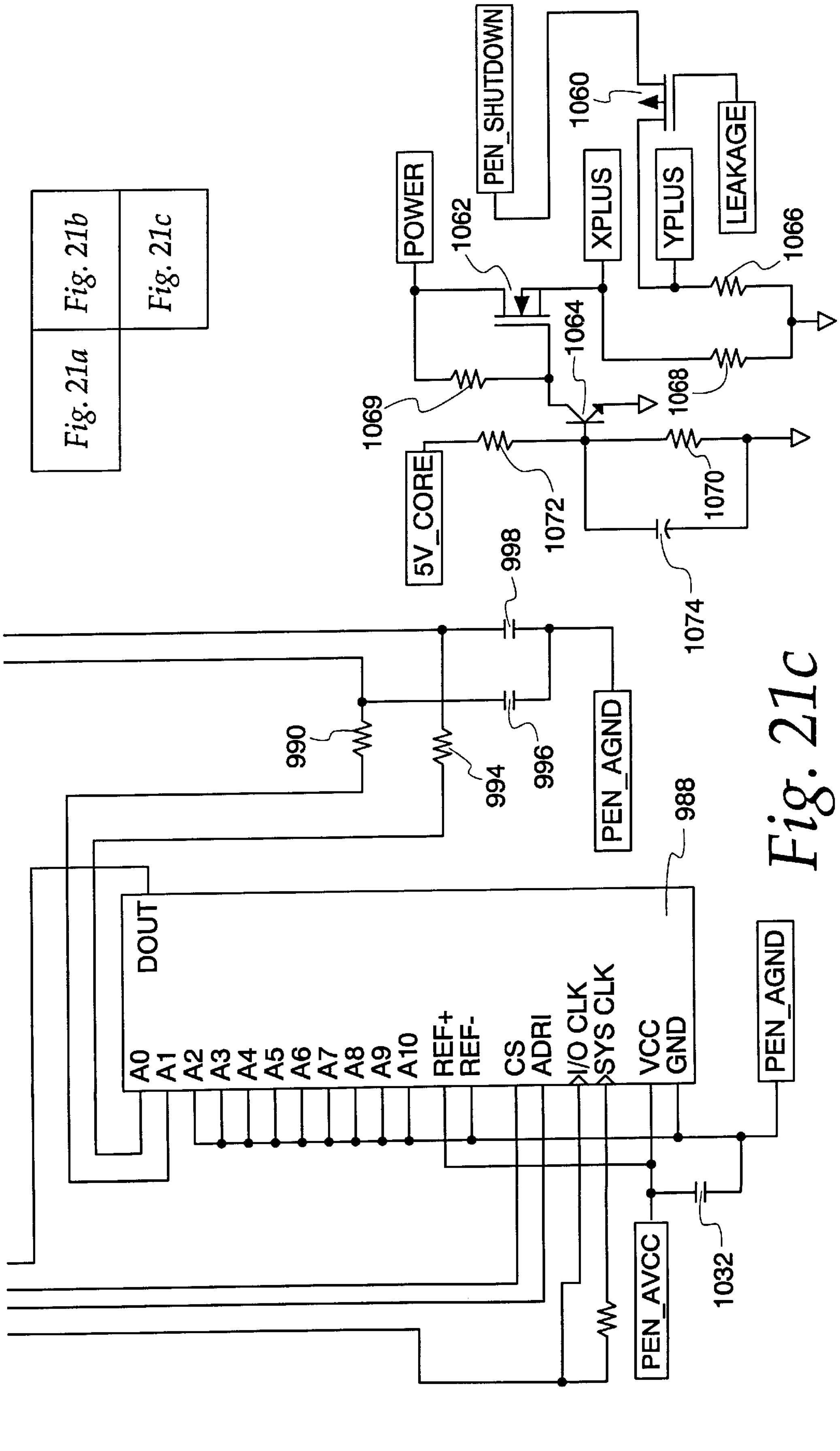

The pen controller 110A is illustrated in FIG. 21 and is adapted to cooperate with an analog-resistive type digitizer 106. The pen controller 110A includes a controller 980, for example a Motorola type MC68HC705J2 microcontroller, with the firmware being programmed within the part. The controller 980 communicates with the system by way of the system data bus SD[0 . . . 15]. In particular, serial data from a port PB6 on the controller 980 is applied to a shift register 982, which, in turn, is connected to an 8-bit parallel buffer 984, which, in turn, is connected to the serial data bus SD[0 . . . 15]. The controller 980 is adapted to be used with an analog-resistive touch screen digitizer, for example a drawing No. 8313-34 Rev. C4, as manufactured by Dynapro. XY information from the digitizer 106 is received by the controller 980 by way of a connector 986. The X and Y information from the digitizer is connected to a 12-bit analog-to-digital (A/D) converter and also applied to port PA5 of the microcontroller 980. In particular, the X- data from the digitizer is applied to the A1 terminal of the A/D converter 988 by way of a pull-up resistor 990 and an FET 992. The FET 992 is under the control of a charge pump 994, for example a Linear Technology Model No. LTC1157C58. The Y- data from the digitizer is applied to the terminal A1 of the A/D converter 988 by way of a current-limiting resistor 994. A pair of bypass capacitors 996 and 998 are tied between the terminals A0 and A1 of the A/D converter 988 and an analog ground PEN_AGND. The X+, Y+, X−, Y− inputs from the digitizer are also applied to the controller ports PA[0 . . . 4] by way of a plurality of transistors 1000, 1006, 1010, 1016 and 1018; a plurality of resistors 1002, 1008, 1012, 1014, 1020, 1022, 1028, 1032 and 1034; an inductor 1004; and a plurality of capacitors 1024 and 1026. The transistor 1018, as well as the transistors 992 and 998, are used to prevent leakage in a suspend state.

Power from both analog and digital power supply and grounds are supplied to the system. In particular, a 5-volt digital power supply PEN_VCC, developed from the 5-volt supply 5V_CORE, is available from the DC-to-DC converter 300 (FIG. 26) by way of an in-line ferrite bead inductor 1028. An analog power supply PEN_AVCC is developed from the digital supply PEN_VCC by way of an in-line ferrite bead inductor 1030. The digital power supply PEN_VCC is applied to the microcontroller 980 and filtered by a bypass capacitor 1030. The analog supply PEN_AVC is utilized by the 12-bit analog-to-digital converter 988 and filtered by way of a bypass capacitor 1032.

A separate clock supply is used for the microcontroller 980. This clock supply includes a 4.0 MHz crystal 1034, a resistor 1036 and a pair of parallel coupled capacitors 1038 and 1040. The clock supply is applied to the oscillator terminals OSC1 and OSC2 of the microcontroller 980.

A 5-volt signal PENACT_5V, available at the port P5V pin of the microcontroller is converted to a 3-volt signal PENACT_3V by way of a pair of voltage dividing resistors 1042 and 1044. This signal PENACT_3V is applied to a 3-volt terminal of the system controller 129 (FIG. 12). As discussed above, the power supply for the FETs 992 and 1018 is provided by the charge pump 994. The power supply for the charge pump 994 is a 5-volt power supply signal 5V_CORE, available at the DC-to-DC converter 300 (FIG. 26). A ground terminal of the charge pump 994 is connected to system ground by way of a pull-down resistor 1050. The 5-volt power supply PEN_VCC is also utilized by the shift register 982 and the data buffer 984 and buffered by way of a pair of bypass capacitors 985 and 987.

The chip select signal PENCS for the data buffer 984 is generated by an OR gate 1052. The general purpose chip select signal GPCS2 is available from the system controller 129 (FIG. 12), as well as a signal KBC_P00, available from the keyboard controller 125 (FIG. 15) are applied to the inputs of the OR gate 1052.

A pen shut-down signal PEN_SHUTDOWN is used to develop a shut-down signal SHUTDOWN as discussed above for turning on the switching power supply 851 (FIG. 26). The pen shutdown signal PEN_SHUTDOWN is developed by the circuit that includes the transistors 1060, 1062 and 1064; a plurality of resistors 1066, 1068, 1069, 1070 and 1072; and a capacitor 1074. In particular, a 5-volt power supply signal 5V_CORE is applied to a pair of voltage-dividing resistors 1070 and 1072, which, in turn, is used to bias the transistor 1064 on. The base-emitter voltage is held fairly constant by the capacitor 1074. Once the transistor 1064 is turned on, it is used to control the FET 1062. A main power supply signal POWER is applied to the gate of the FET 1062 by way of the resistor 1069. Wake up of the system by way of the pen subsystem is discussed below.

6. Flash Disaster Recovery

Figure 16:
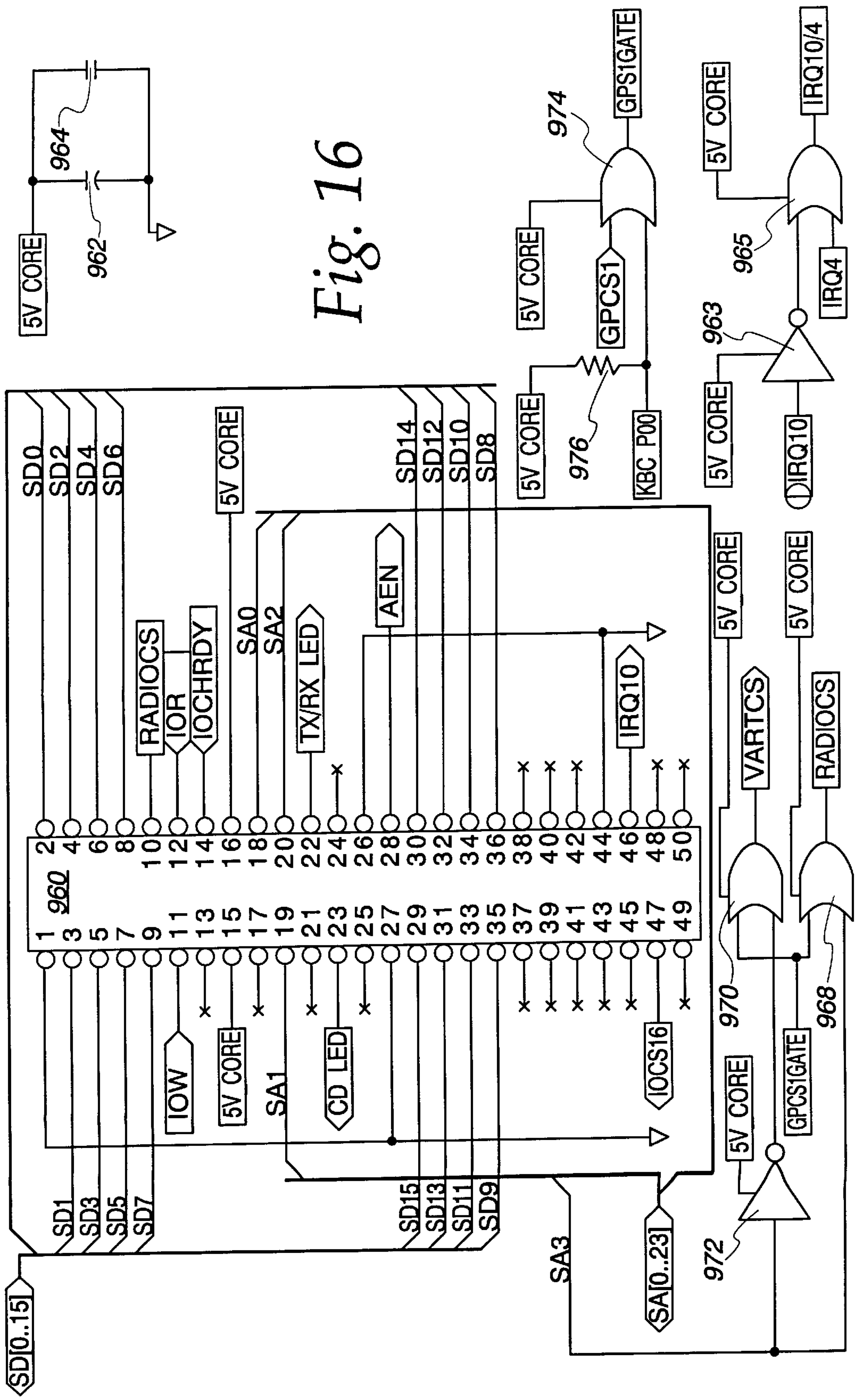

As mentioned above, the wireless interface device 100 includes the flash memory devices 742–748 (FIG. 25). As will be discussed in more detail below, the flash memory devices enable user software upgrades by way of the radio interface 960 (FIG. 16). Should power be lost during the programming, the data within the flash memory devices 742–748 will be corrupted, which could result in the system failing to boot.

In order to enable recovery from such a condition, recovery BIOS is stored in a protected sector of the flash memory device 742, which will be unaffected during reprogramming. In addition, a serial port interface 790 (FIG. 30) is provided to enable the flash memory devices 742–748 to be programmed in such a condition by an alternative wired source following a normal boot-up. Unfortunately, the configuration of the flash memory device 742 may result in the system failing to boot. More particularly, disaster recovery BIOS is not stored at the uppermost address of the flash memory device 742. Each flash memory device 742–748 are 512K×8-bit devices. With reference to Table 5 above, the flash memory device 742 is mapped to the address range $0C0000-$0FFFFF. The recovery BIOS is contained in the lower half of that range (i.e. $0E0000-$0FFFF).

On a normal boot-up, the system begins executing code at the top of the address range (i.e. $0C0000-ODFFFF) flash memory device 742 by way of the system address bit SA18. More particularly, on a normal boot-up a test mode signal TEST_MODE, available at port 1.1 of the keyboard controller 125 (FIG. 15) is pulled high by the keyboard controller 125 during boot-up, which enables the buffer 762 (FIG. 17) which, in turn, enables another buffer 760 to enable the system address bit SA18 during boot-up. When the system address bit SA18 is enabled, the system begins executing code at the top of the address range ($0C0000) of the flash memory device 742. However, during a condition when the data in the top half of the address range ($0C00000-0DFFFFF) becomes corrupt as a result of a problem occurring during reprogramming, the system may not boot during such a condition.

In order to solve this problem, the system address bit SA18 is forced low. By forcing the system address bit SA18 low, the system will begin executing code from the protected area of the flash device 742 in the address range ($0E0000-$0FFFF) during such a condition where the disaster recovery BIOS resides in a protected sector. In particular, the system address bit SA18 is applied to the buffer 760 (FIG. 17), which is under the control of the test mode signal TEST_MODE by way of the buffer 762. The output of the buffer 760 is a signal FLIP_SA18, which is applied to the address pin A18 (FIG. 25) on the flash memory device 742.

Figure 30A:
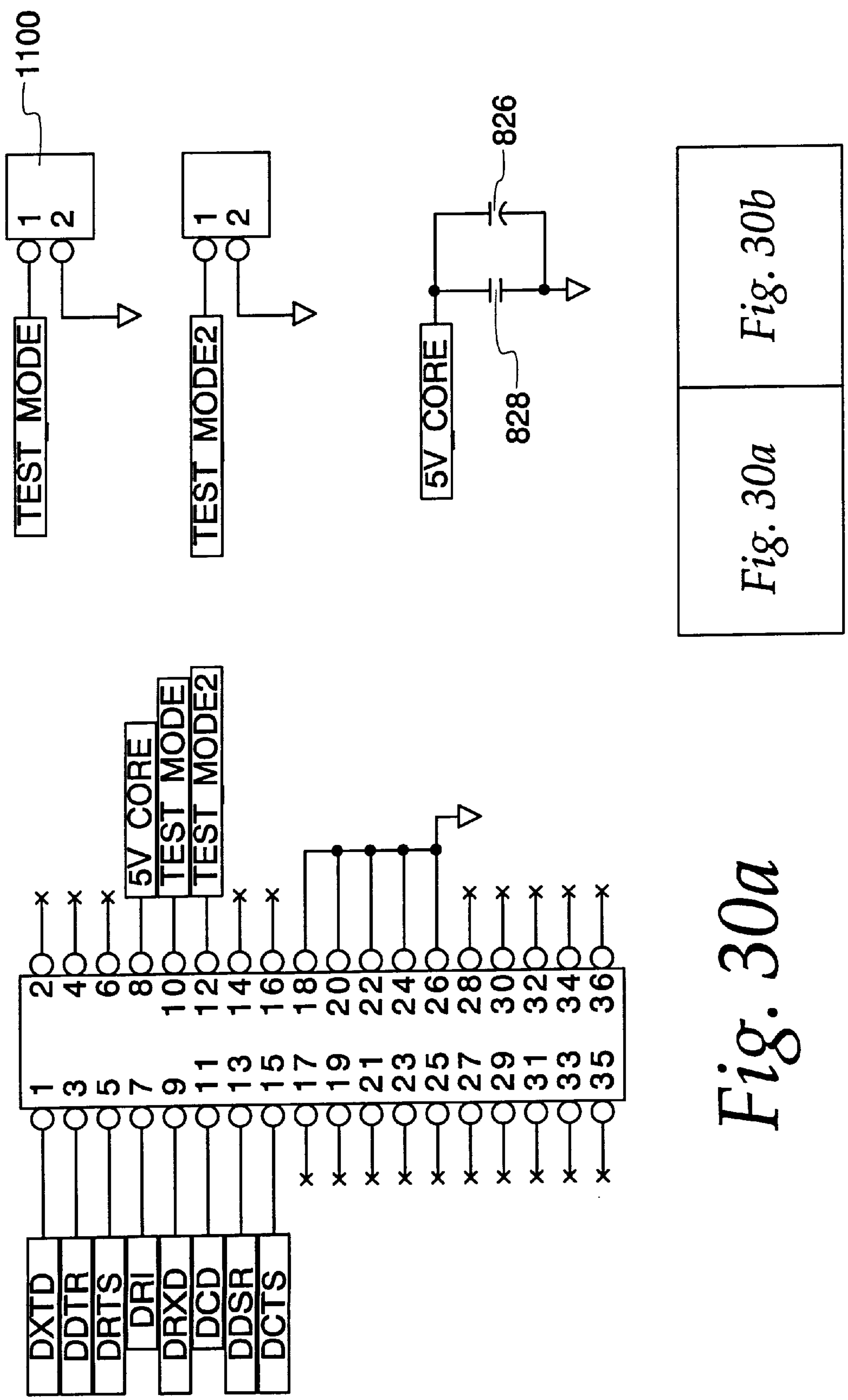
Figure 30B:
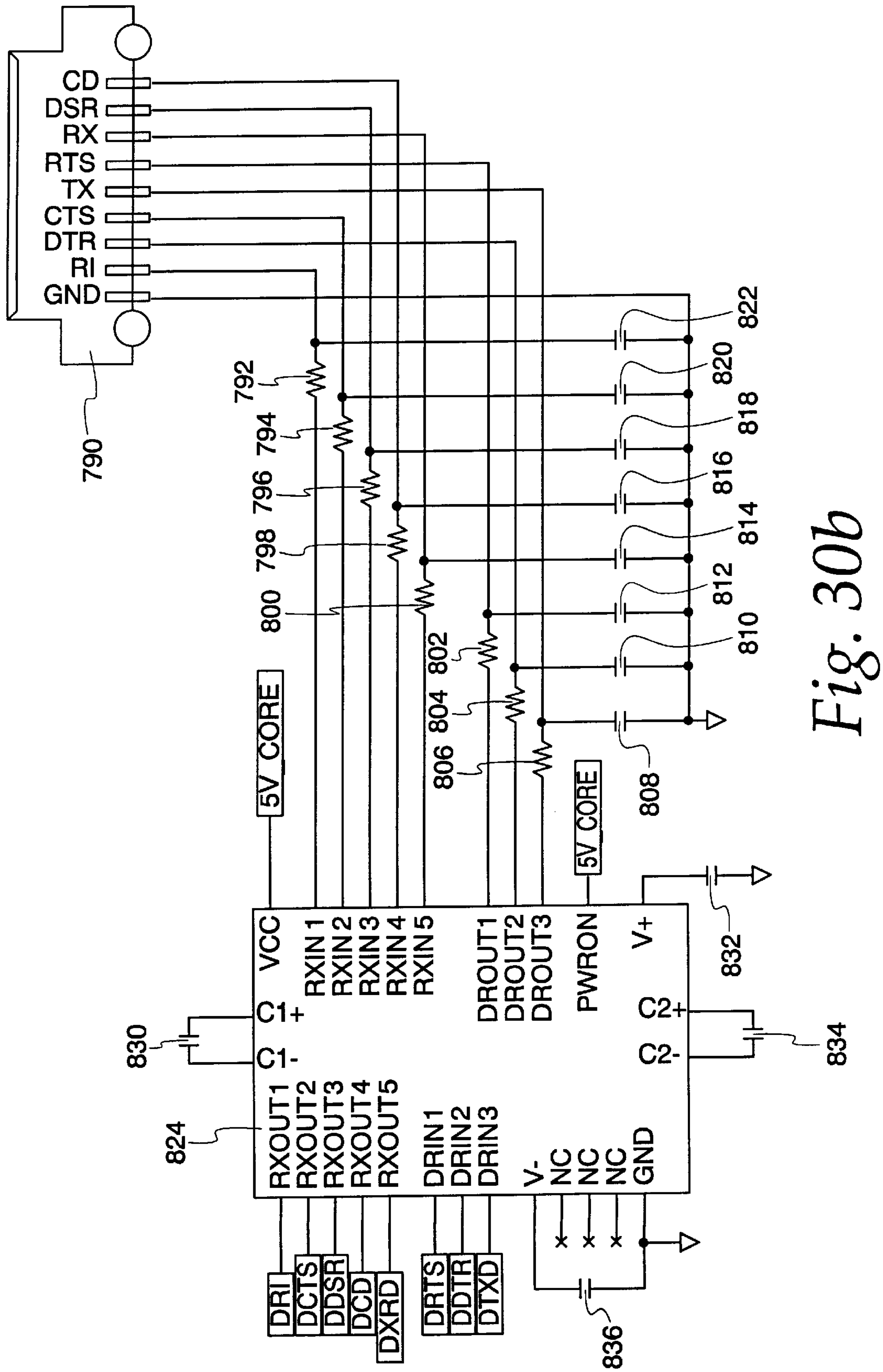

During a normal boot-up, the test mode signal TEST_MODE will enable the buffer 762 (FIG. 17) and, in turn, the buffer 760 to cause the system address bit SA18 to drive the signal FLIP_SA18. During a condition when the code in the flash memory device 742 becomes corrupt, the test mode signal TEST_MODE is forced low, which, in turn, forces the signal FLIP_SA18 low, resulting in the system executing code from the protected area (i.e. $0E0000-0FFFF) of the flash memory device 742 during such a condition to enable the flash memory device 742 (FIG. 25) to be reprogrammed by way of the serial interface 790 (FIG. 30).

There are various ways in which to force the test mode signal TEST_MODE low during reprogramming of the flash memory device 742 by way of the serial interface 790. One way is to externally ground the test mode signal TEST_MODE during such a condition. In particular, the test mode signal TEST_MODE may be connected to one pin of a two-pin header 1100 (FIG. 30). The other pin of the header 1100 is connected to system ground. During programming of the flash memory device 742, an external jumper (not shown) is inserted into the header 1100 to shunt the test mode signal TEST_MODE to system ground to enable the system to execute code from the protected or boot block area of the flash memory device 742 in order to enable the system to be booted. Once the system is booted, the flash memory device 742 is reprogrammed by way of the serial interface 894 (FIG. 29). Once reprogramming is complete, the shunt is removed from the header 1100 (FIG. 30) and the adapter plug 790 is removed, restoring the system to normal operation.

7. Resume on Pen Contact

In order to conserve battery power, the wireless interface device 100 goes into a suspend mode when the system is not in use. As discussed above, a shut down signal SHUTDOWN (FIGS. 20 and 26) is used to shut down the power supply 851 (FIG. 26) during such a condition, which essentially disables the power to all but the circuitry required to detect a pen down event by way of the main power signal POWER (FIG. 28).

Three sources control the shut down signal SHUTDOWN: the keyboard controller 125 (FIG. 15); the pen controller 110A (FIG. 21) and a signal HOOK_VCC, connected to the switching power supply 851 (FIG. 26) by way of the FET 904. These sources are diode ORed to the shut down signal SHUTDOWN by way of the diodes 645 and 647 (FIG. 20) and a diode 1102 (FIG. 28). During a normal state, the shut down signal SHUTDOWN is high, which enables the power supply 851 (FIG. 26). When the shut down signal SHUTDOWN goes low, the power supply 851 goes into an inactive state. During the inactive state, minimum power is supplied to the pen detection circuitry as discussed above.

As will be discussed in more detail below, once the system is turned on by the main power switch 855 (FIG. 28), the shut down signal SHUTDOWN will be under the control of the pen shutdown signal PEN_SHUTDOWN, available from the pen controller 110A (FIG. 21) and the keyboard controller shut down signal KBSHUTDOWN (FIG. 20).

The keyboard controller 125 (FIG. 15) can place the system in a suspend state by way of a command, which, in turn, causes the keyboard controller shut down signal KBSHUTDOWN, available at port PO.2, to go low. More particularly, during normal operation, only the keyboard shutdown signal KBSHUTDOWN is high, placing control of the suspend state solely in the keyboard controller 125. The keyboard controller 125 can then force the system into a suspend state by forcing port P0.2 low, which, in turn, places the power supply 851 (FIG. 26) in an inactive state.

The pen shut down control signal PEN_SHUTDOWN is used to wake the system from a suspend state. More particularly, as mentioned above, during a suspend state, power from the main power supply POWER (FIG. 28) is applied to the collector of the transistor 1064 (FIG. 21) and to the drain of the FET 1062. Since the 5-volt power supply 5V_CORE is unavailable during a suspend state, the transistor 1064 will be OFF, allowing power to appear at the gate of the FET 1062, thus turning the FET 1062 ON. Once the FET 1062 is turned ON, the main power signal POWER is applied to the XPLUS terminal of the digitizer panel. Thus, a pen (or finger) down event will result in the YPLUS terminal being connected to the XPLUS terminal by way of a finite resistance (i.e. 500–1500 Ohms) to apply power to the YPLUS terminal, which, in turn, is connected to the drain of the P-channel FET 1060 while its source is used as the pen shutdown signal PEN_SHUTDOWN. The FET 1060 is under the control of a leakage signal LEAKAGE, available at the output of the charge pump 994. Since the leakage signal LEAKAGE will be low during a suspend state, the FET 1060 will turn on in response to the pen down event, thereby connecting the YPLUS terminal to the pen shut down signal PEN_SHUTDOWN. As mentioned above, the YPLUS terminal will be high in response to a pen down event following a suspend state. As such, the pen shut down signal PEN_SHUTDOWN will go high. Since the pen shut down signal PEN_SHUTDOWN is diode ORed with the shut down signal SHUTDOWN, the shut down signal SHUTDOWN will thus be forced high in response to a pen down event following a suspend state, which, in turn, will wake up the power supply 851 (FIG. 26). Once the system is wakened, the keyboard controller shutdown line KB_SHUTDOWN goes high, latching the system ON. The resistors 1070, 1072 and the capacitor 1074 are used to delay turning ON the transistor 1064 and the turning OFF of the FET 1062 before the keyboard shutdown signal KB_SHUTDOWN is pulled high which would cause the pen shut down signal PEN_SHUTDOWN to go low before the keyboard shutdown signal KB_SHUTDOWN goes high.

The FETs 992, 998 and 1018 are used to prevent current leakage in a suspend state. In particular, these FETs 992, 998 and 1018 are under the control of the leakage control signal LEAKAGE, available at the charge pump 994, which turns the FETs 992, 998 and 1018 ON in normal operate and OFF in a suspend state.

The sensing of suspend state is done by the charge pump 994, which monitors the 5-volt power supply signal 5V_CORE. When the 5-volt power supply signal 5V_CORE goes low, indicating a suspend state, the leakage control signal LEAKAGE goes high, turning off the FETs 992, 998 and 1018, blocking leakage into the pen circuitry from the XPLUS terminal.

8. RC Time Constant

The system ON/OFF switch 855 (FIG. 28) enables the system to be completely shut off. When the switch 855 is closed, power from either the IBP 130 or the external AC-to-DC converter supplies power to the system. In order to wake up the system from an OFF state, a shutdown line SHUTDOWN must be held high until the keyboard controller 125 pulls its shutdown pin KB_SHUTDOWN high. As discussed above, the keyboard shutdown signal KB_SHUTDOWN is diode ORed relative to the shutdown signal SHUTDOWN, which controls the power supply 851 (FIG. 26). Until the time when the keyboard shutdown signal KB_SHUTDOWN is pulled high, a signal HOOK_VCC is used to force the shut down signal SHUTDOWN high. As mentioned above, the HOOK_VCC signal is also diode ORed relative to the shutdown signal SHUTDOWN by way of the diode 1102 (FIG. 28). However, for proper operation of the system, the shutdown signal SHUTDOWN will be under the control of the keyboard controller 125 (FIG. 15) after the system is turned on. Thus, a 5-volt power supply signal HOOK_VCC, available at the power supply 851 (FIG. 26), forces the shut down signal SHUTDOWN high until the keyboard controller 125 (FIG. 15) has time to pull its keyboard shutdown signal KB_SHUTDOWN high. The 5-volt power supply signal HOOK_VCC is always high when the main power switch 855 is turned on. On power-up, the 5-volt power supply signal HOOK_VCC forces the shutdown signal SHUTDOWN (FIG. 28) high by way of an FET 1104 and the diode 1102, which, in turn, wakes up the power supply 851 (FIG. 26). Once the power supply 851 is enabled, a power supply signal MAX 786_VCC is used to turn off the FET 1104 to place the control of the shut down signal SHUTDOWN under the control of the keyboard controller 125 as discussed above. In order to provide sufficient time for the keyboard controller 125 to pull its keyboard shutdown signal KB_SHUTDOWN high, the turn OFF of the FET 1104 is delayed by way of a resistor 1106 and a capacitor 1108. In particular, once the main power switch 855 is closed, the power supply signal MAX786_VCC will be low, thereby causing the FET 1104 to be turned ON, which connects the power supply signal HOOK_VCC to the shutdown signal SHUTDOWN by way of the diode 1107. Once the power supply 851 is enabled, the signal MAX786_VCC, applied to the gate of the FET 1104, turns off the FET 1104, placing the shutdown signal SHUTDOWN under the control of the keyboard controller shutdown signal KB_SHUTDOWN as discussed above. The resistor 1106 and capacitor 1108 delay the turning off of the FET 1104 after the signal MAX786_VCC goes high for a sufficient time to allow the keyboard controller 125 to pull its keyboard shut down signal KB_SHUTDOWN high.

An inhibit circuit (FIG. 26), which includes a plurality of resistors 1110–1120, a diode 1122, a transistor 1124 and an FET 1126, is used to prevent the system from being turned ON during low battery conditions when the system is being supplied solely by the IBP 130. During a normal condition (i.e, when the system is being supplied power by the AC/DC converter or by the battery, the signal MAX786_VCC is connected to the main power signal POWER by way of the FET 1126. The FET 1126 is under the control of the transistor 1124. During conditions when the AC/DC converter is supplying power to the system, a signal AC/DCIN will be high, thereby turning ON the transistor 1124, which, in turn, turns ON the FET 1126, connecting the main power signal POWER to the signal MAX786_VCC. The collector of the transistor 1124, in turn, controls the FET 904, which connects the power supply signal HOOK_VCC to the enable terminals ON3 and ON5 on the power supply 851. When AC power is not available, the AC/DCIN goes low, leaving the control of the transistor 1124 under the control of an inhibit signal INHIBIT, available from the IBP 130 by way of the connector 850. During a normal battery condition, the inhibit signal is high, keeping the transistor 1124 turned ON, thereby enabling the power supply 851 by way of the FET 904. Should a low battery condition occur, the inhibit signal goes low, turning OFF the transistors 904, 1124, as well as the FET 1126, to prevent the system from being turned ON.

9. Mouse Emulation with Passive Pen

As mentioned above, the wireless interface device 100 includes a digitizer 110B and utilizes a passive pen as an input device. FIGS. 31–35 illustrate a method for emulating the functions of a mouse, for example a two-button mouse, to provide standard mouse functions with the passive pen.

There are three aspects of the mouse emulation. One aspect relates to emulation of a double click of a mouse button, required by some application programs. Another aspect relates to emulating both the left and right buttons of a two-button mouse. The third aspect relates to emulating both the movement of the mouse (MOVE MODE) and the clicking of a mouse button (TOUCH MODE) with a passive pen as an input device.

Figure 31:
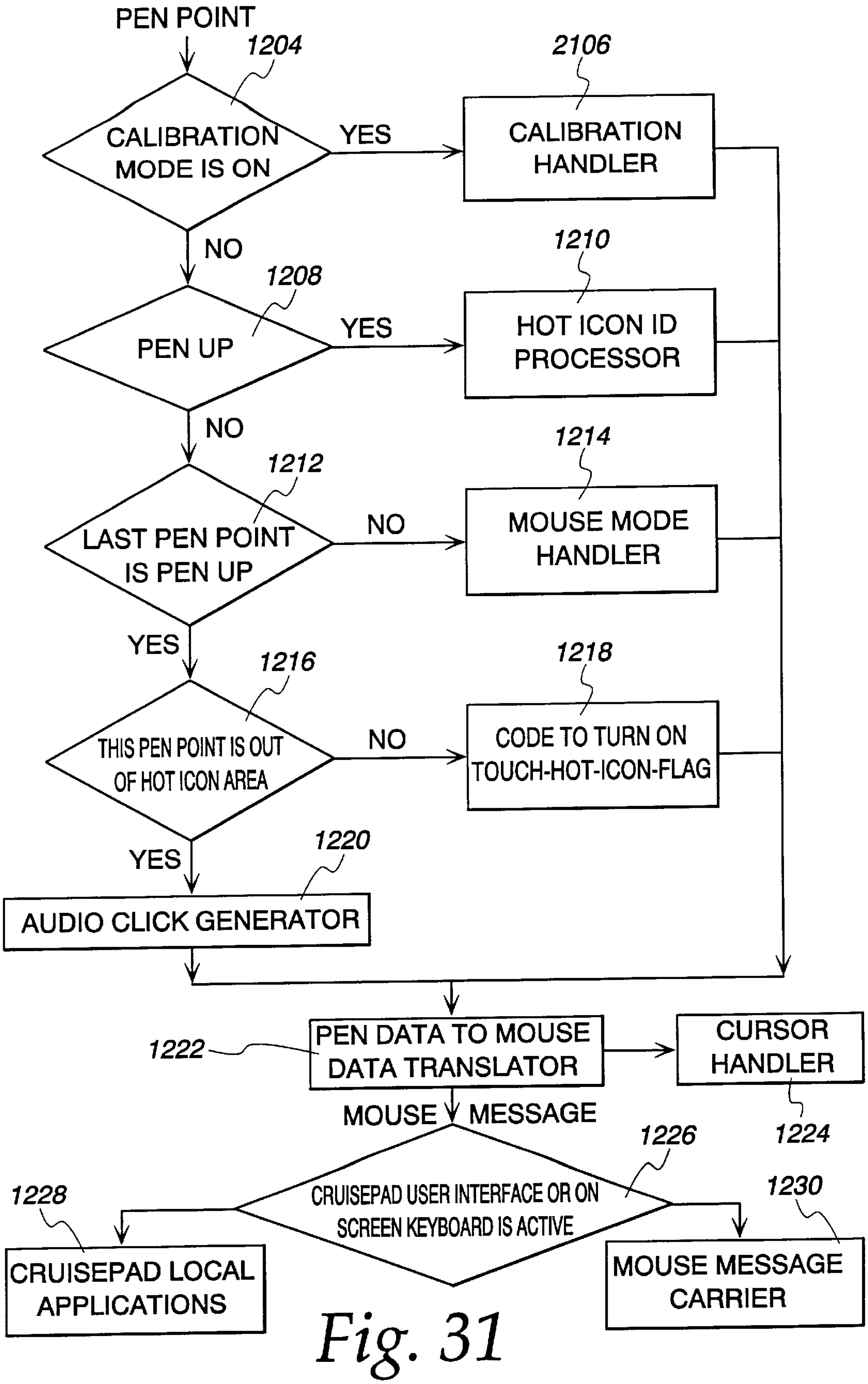

Referring first to FIG. 31, the mouse emulation system is event-driven by the passive pen. Initially the system checks to see if the passive pen has touched anywhere on the LCD 113C (FIG. 36), which includes a display area 1200 and a hot icon area 1202. If a pen-down event has been detected, the system checks in step 1204 if the wireless interface device 100 has been placed in a calibration mode. If so, a calibration handler is called in step 1206. The calibration handler does not form part of the present invention. If the wireless interface device 100 is not in the calibration mode, the system then checks to determine if the pen has been lifted from the LCD 113C in step 1208. If a pen-up event occurs subsequent to a pen-down event, control is passed to a hot icon identification (ID) processor (FIG. 32) in step 1210, which, as will be discussed below, processes the pen position to determine which of the hot icons in the hot icon area 1202 of the LCD screen 113C was selected. If the pen was not lifted from the LCD 113C, the system checks in step 1212 if the previous event in a previous cycle was a pen-up event. If the previous pen event in the previous cycle was a pen-down event, the current pen event is processed by a mouse mode handler (FIG. 33) in step 1214, which, as will be discussed in more detail below, determines if the pen is being used in a mouse MOVE or mouse TOUCH MODE. In step 1216, the coordinates of the current pen-down event are processed to determine if the current pen-down event occurred in the hot icon area 1202 of the LCD 113C. If the pen-down event occurred in the hot icon area 1202 (FIG. 36), a flag is turned on indicating the hot icon area 1202 was selected in step 1218. If the system determines the current pen-down event occurred in the display area 1200 (FIG. 36) of the LCD screen 113C, an audio click is generated in step 1220; different from the hot icon audio click.

Steps 1204–1220 are driven by each pen event in order to determine the location of the pen-down event (i.e. hot icon area 1202 or display area 1200). Once the system determines where the pen event occurred, the pen data is converted to mouse data in step 1222 and a cursor is displayed in the viewing area 1200, corresponding to the location of the pen touch in step 1224. After the cursor is displayed, the system determines in step 1226 whether the mouse data is to be used locally by the wireless interface device 100 for local applications or the application running on the host computer 101. As mentioned above, the wireless interface device 100, through its graphical user interface, provides a virtual or on-screen keyboard (OSK). Thus, if the OSK has been activated and the pen event occurs in the OSK area, the mouse data is used locally by the wireless interface device 100 in step 1228. If the wireless interface device 100 is running a host application, the mouse data is sent to the host computer 101 application over the wireless interface as discussed above in step 1230.

As mentioned above, the system is able to emulate both left and right mouse buttons. This emulation is accomplished by way of left/right mouse button hot icon 1232 (FIG. 37). A left mouse button is configured to be the default setting. This hot icon 1232 is set up as a toggle. Thus, when the system is first turned on, the pen events from the mouse mode handler are translated to be left mouse button events. Anytime the left/right mouse button hot icon 1232 is selected, the system will toggle and translate subsequent pen events to be right mouse button events. A subsequent pen-down event on the hot icon 1232 causes subsequent pen events from the mouse mode handler to be translated as left mouse button events and so on.

The hot icons in the hot icon area 1202 (FIG. 36) are triggered by a pen-down event followed by a pen-up event. As discussed above, such a sequence of pen events is processed by hot icon ID processor 1210, illustrated in FIG. 32. The hot icon ID processor 1210 first determines if the pen event occurred in the viewing area 1200 (FIG. 36) of the LCD 113C by determining from the mouse mode handler 1214 (FIG. 33) whether the system is in the TOUCH in step 1234, since this mode only occurs for pen events in the viewing area 1200 of the LCD display 113C. If the system is not in a TOUCH mode, the system checks in step 1236 whether the system is in the MOVE mode. If the pen event (i.e. pen-down followed by a pen-up event) did not occur in the viewing area 1200 of the LCD display 113C, the system compares the coordinates of the pen-down event with the locations of the various hot icons displayed in FIG. 37 in step 1238. In step 1240 (FIG. 32), the system determines if the left/right mouse button hot icon 1232 was selected. If not, the system proceeds directly to step 1242 to uplevel software for processing. If the system determines that the left/right mouse hot icon 1232 was selected, the system emulates a left or right mouse button in step 1244, depending on the last status of the left/right mouse button emulation and utilizes the emulated left or right mouse button status in the uplevel software in step 1242.

Figure 32:
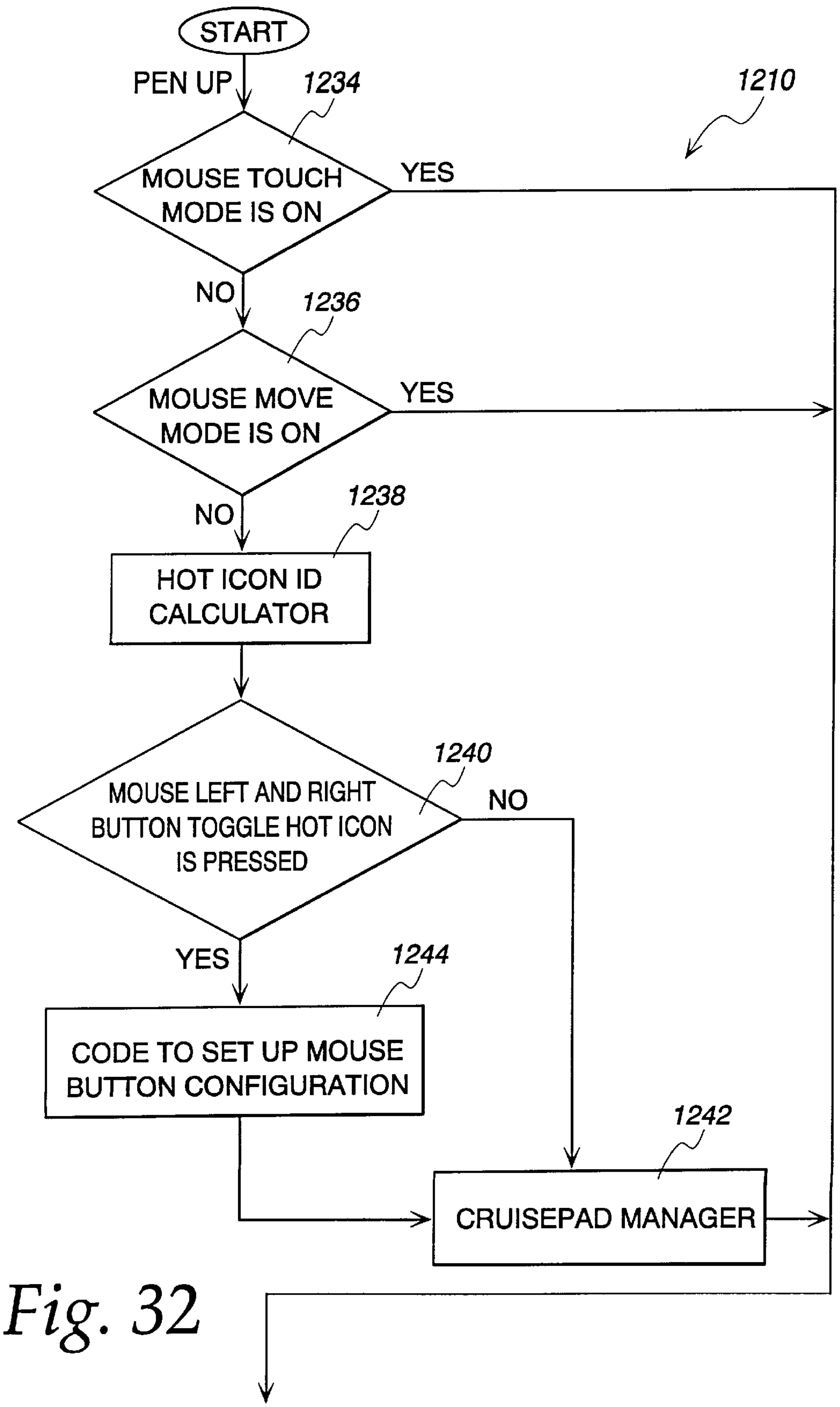
Figure 33:
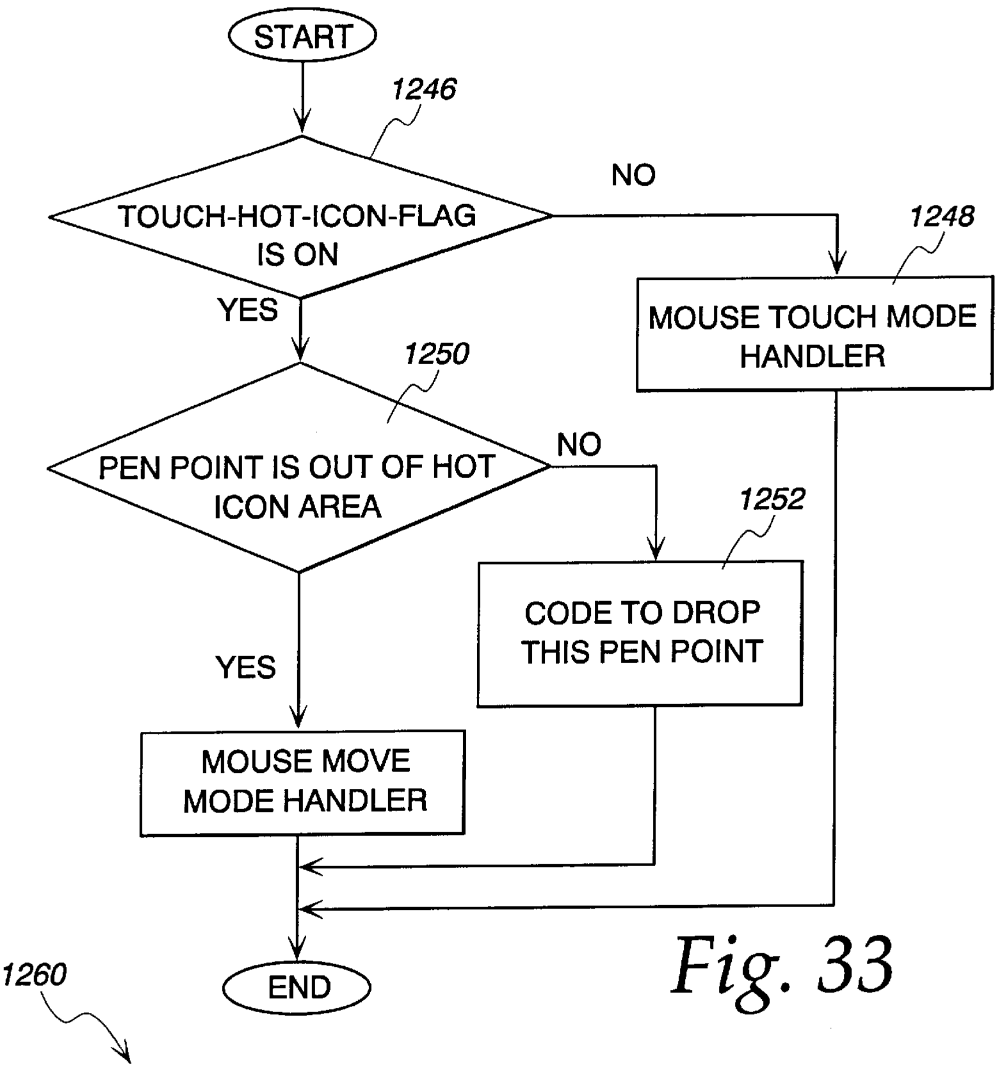
Figure 34:
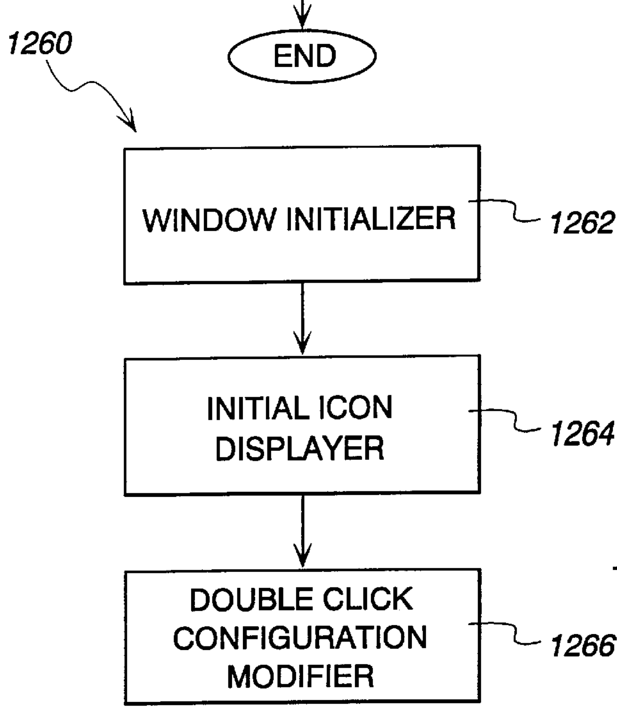

Pen events in the hot icon area 1202 of the LCD display 113C are handled by the hot icon ID processor 1210 (FIG. 32), while pen events in the viewing area 1200 are handled by the mouse mode handler 1214 (FIG. 33). The mouse mode handler 1214 emulates two mouse actions: moving without either button being depressed and released (MOVE); and button depression and release events (TOUCH). As discussed above, both left and right mouse button events can be emulated in the TOUCH.

As discussed above, a current pen-down event preceded by a pen-down event activates the mouse mode handler 1214 (FIG. 33). In step 1246, the system first determines if the hot icon flag is on. As discussed above, the hot icon flag is turned on anytime a pen-down event occurs in the hot icon area 1202 (FIG. 36) of the LCD display 113C. If the hot icon flag is not on, the pen-down event is translated to a mouse button down event by a mouse TOUCH handler in step 1248. If the hot icon flag is on, the system determines in step 1250 whether the coordinates of the current pen-down event to determine if the current pen-down event occurred in the hot icon area 1202. If so, the pen coordinate data is dropped in step 1252 since such data will be processed by the hot icon ID processor 1210 (FIG. 32), discussed above. If the current pen event occurred in the viewing area 1200, the pen coordinate data is translated to mouse move data.

A mouse button double click is emulated by two pen-down events separated by a pen-up event in the viewing area 1200 of the LCD 113C. In particular, when the host computer 101 is running a Windows application, a pen driver translates the two pen-down events separated by a pen-up event and passes four mouse messages: mouse button down; mouse button release, mouse button down and mouse button release to the host Windows application.

As will be discussed in more detail below, the host manager Windows module 1260 modifies a Windows configuration file. (WIN.INI) and, in particular, the distance and time limitations for a mouse button double click. In particular, the Windows system checks the Windows configuration file WIN.INI in order to compare the distance between the mouse locations for each of the clicks as well as the time between clicks. More particularly, the Windows systems will only pass double click data to a Windows application program if the distance (i.e. height and width) between mouse locations for the two clicks is less than 16 for both height and width and the time between the clicks is less than 1.0 seconds.

With a pen-based system two pen-down events separated by a pen-up event normally take longer and occur at greater distances between pen-down events than allowed by the Windows system to generate a double click. Thus, the host manager Windows module 1260 modifies the time and distance parameters to enable two pen-down events separated by a pen-up event to enable Windows to emulate a mouse double click that can be passed on to the Windows application program running in the host computer 101. In particular, the host manager Windows module 1260 includes an initializer 1262 which loads the host manager Windows module 1260, and an initial icon displayer 1264, which displays that the host manager Windows module 1264 has been loaded. The host manager Windows module 1260 also includes a double click configuration modifier 1266. The double click configuration modifier 1266 modifies the configuration of the Windows systems file WIN.INI by modifying the time or speed in step 1268. The distance, broken down into width and length, between the successive pendown events, is modified by a double click width modifier and a double click height modifier in steps 1270 and 1272. The modified speed, width and height parameters are set in the Windows system file WIN.INI running in the host computer 101 in step 1274 to enable a mouse button double click to be emulated by two successive pen-down events.

Normally, the Window system file WIN.INI is in cache. The host manager Windows manager disables the in cache copy of the Windows system file WIN.INI, which allows the Windows system to go to the modified configuration file with the modified parameters.

10. Disable Screen Saver to Reduce LAN Traffic

As mentioned above, the wireless interface device 100 connects to a host computer 101 and displays whatever is being displayed on the host computer 101. In particular, after a connection is made, all of the screen images on the host computer 101 are passed on to the LCD display 113C on the wireless interface device 100. Whenever the host computer 101 is running a screen saver, the host display will continually change, passing on all of the images to the LCD 113C on the wireless interface 100, which creates a lot of unnecessary traffic on the LAN. In order to reduce this unnecessary LAN traffic, a host manager Windows module 1278 (FIG. 39) disables the screen saver on the host computer 101 anytime a connection is made between the host computer 101 and the wireless interface device 100. Anytime the connection between the host computer 101 and the wireless interface device 100 is broken, the host manager Windows module re-enables the screen saver on the host computer 101.

Figure 38:
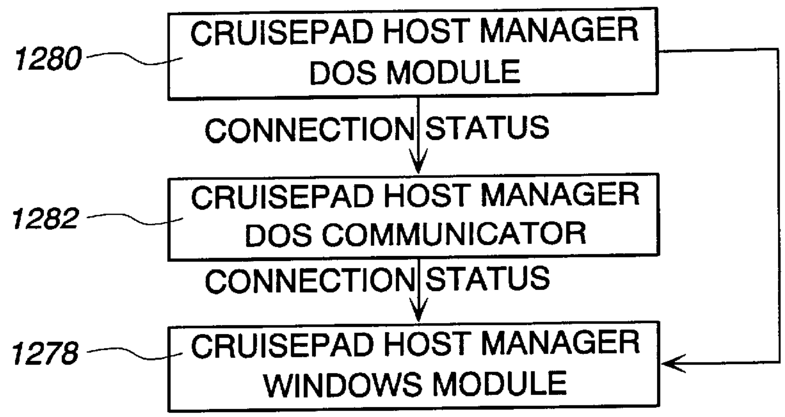
FIGS. 38, 39 and 40 are flow charts relating to a system for disabling the screen saver to reduce LAN traffic.

The connection status between the host computer 101 and the wireless interface device 100 is under the control of a host manager DOS module 1280 (FIG. 38), a terminate and stay resident program. The host manager DOS module 1280 is driven by a timer tick interrupt and checks the connection status at each timer tick interrupt. If the connection status has changed, the host manager DOS module 1280 calls a host manager communicator 1282, which passes the new status to the host manager Windows module 1278.

Figure 39:
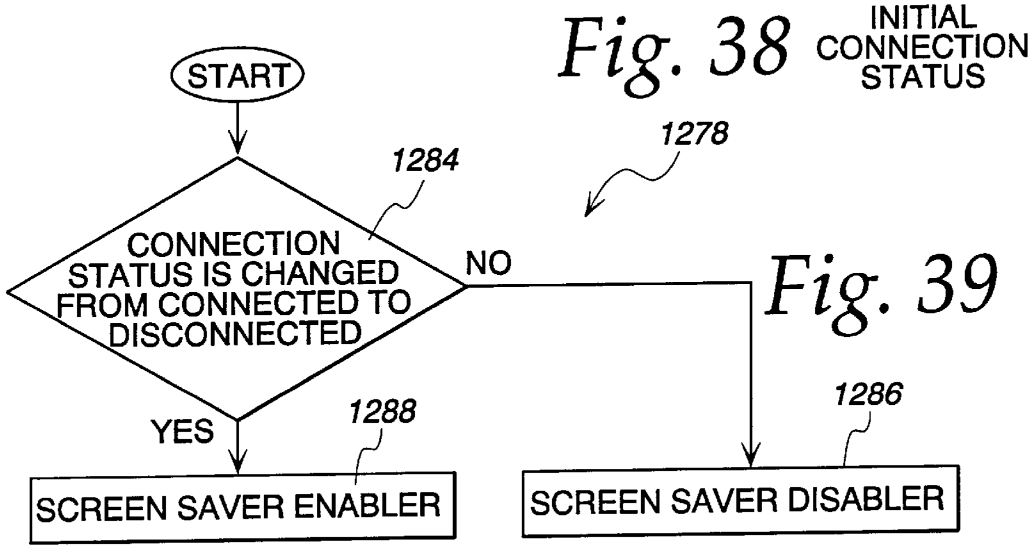

Referring to FIG. 39, anytime the connection status between the host computer 101 and the wireless interface device 100 changes, the host manager Windows module 1278 checks the new status in step 1284. If the connection has been lost, a screen saver disable module 128G is called, which, in turn, calls several Windows modules: Windows Software Development kit functions; SystemParameters-Info; and WritePrivateProfileString to disable the screen saver. Should the current status indicate that the wireless interface device 100 is connected to the host computer 101, the system proceeds to step 1288, which calls the various Windows module.

Figure 40:
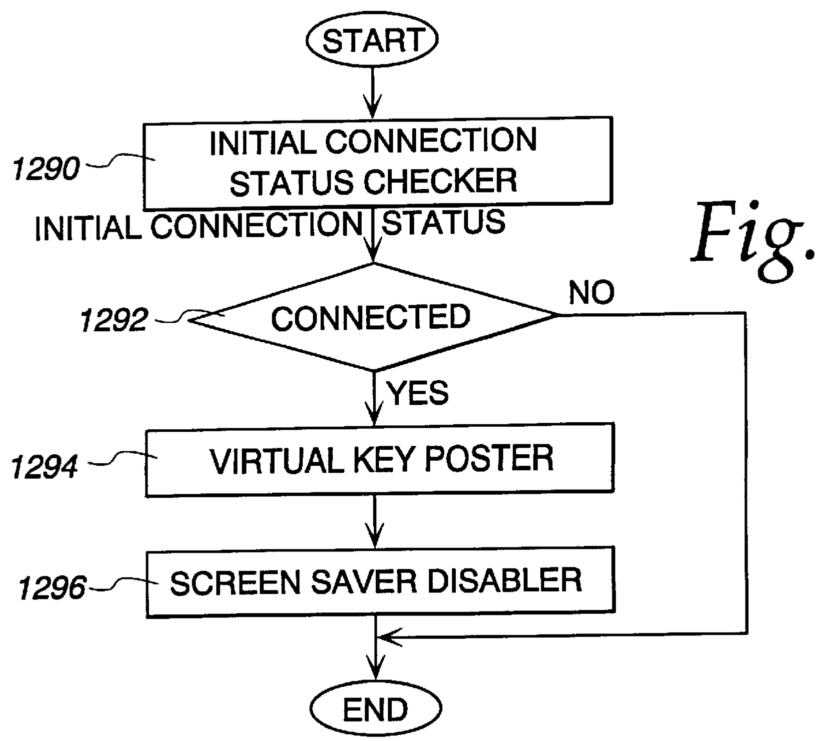

Referring to FIG. 40, anytime the host manager DOS module 1280 is loaded, an initial connection status checker 1290 calls the host manager DOS module 1280 to obtain the current connection status between the wireless interface device 100 and the host computer 101. Next, the system checks in step 1292 whether a connection exists between the host computer 101 and the wireless interface device 100. If not, the system returns. If there is a connection, a virtual key poster 1294 posts a virtual key V_TAB into the Windows Systems queue to force the Windows program to disable the current active screen saver automatically, which, in essence, simulates the press of a key on a keyboard. Once the current active screen saver is disabled, the screen saver on/off flag in a Windows configuration file is turned off in step 1296 to disable the screen saver until there is a change in the connection status.

11. Host Access Protection Password

Whenever a connection is made between wireless interface device 100 and the host computer 101, the user can optionally blank the screen on the host computer 101 and disable the keyboard and mouse inputs connected to the host computer 101. These features prevent the host computer 101 from being accessed while the host computer 101 is under the control of the wireless interface device 100 at a remote location. Once the connection between the host computer 101 and the wireless interface device 100 is lost, the keyboard and mouse inputs on the host computer 101 are re-enabled under the control of the host manager program residing in the host computer 101.

Figure 40A:
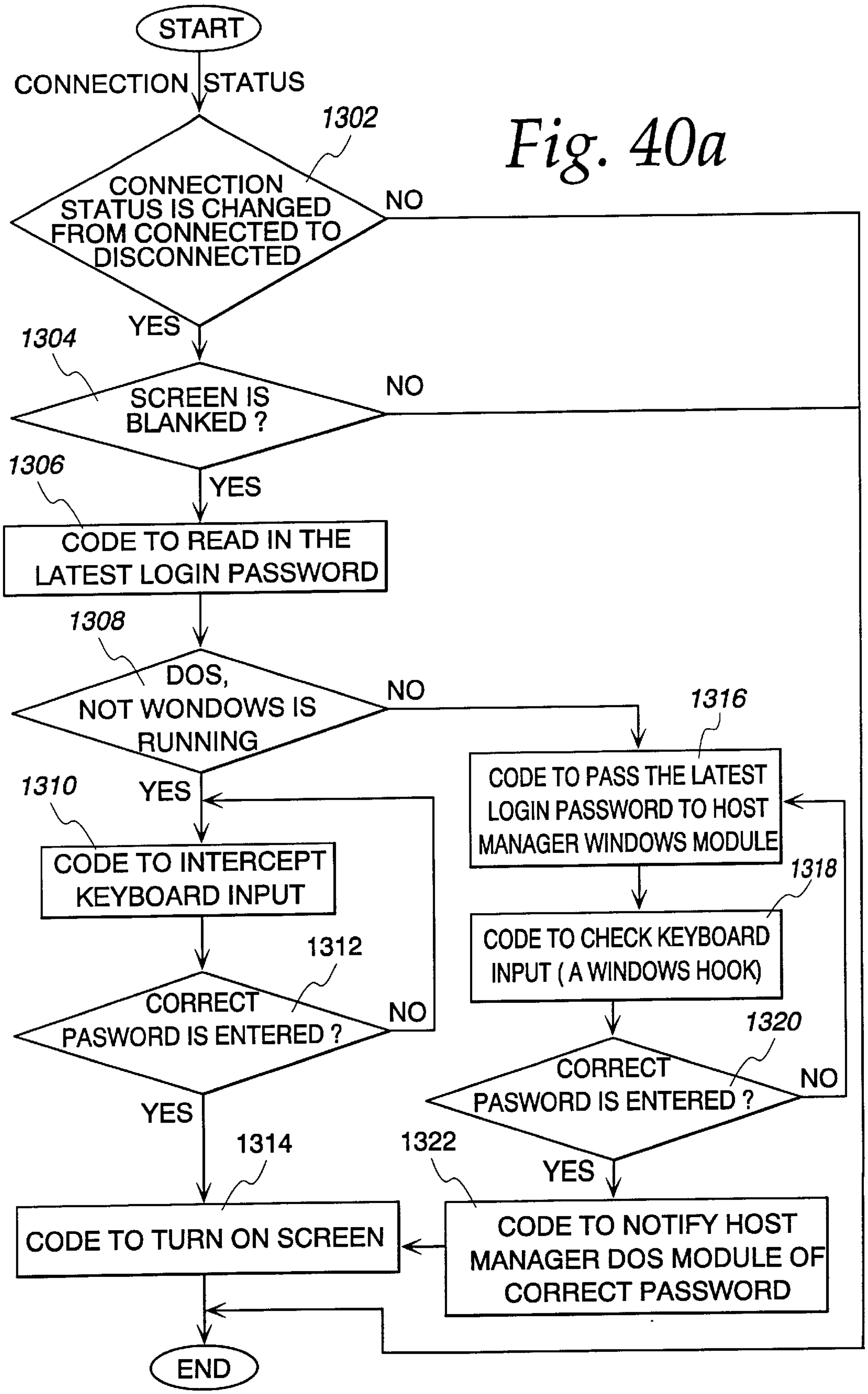
FIG. 40A is a flow chart relating to a host access protection password system.

There are certain situations where the screen to the host computer 101 may not be enabled on disconnection, for example, when the disconnection occurs because the wireless interface device 100 is either out of power or out of range. In order to enable the user to access the host computer 101 in such a situation, a host manager 1300 (FIG. 40A) first checks whether the connection status has changed in step 1302 in the manner as discussed above. If the system is connected, no action is required. However, if the connection has been broken, the system checks in step 1304 whether the screen is enabled. If not, the user will have normal access to the host computer 101. If so, the latest log-in password by the user is stored in by the system in step 1306. Since the host manager DOS module controls the screen, the system checks in step 1308 to determine whether Windows is running in the host computer 101. If DOS is running, the system compares the password entered on the keyboard with the latest log-in password in steps 1310 and 1312. If the password entered does not match the correct password, the system returns to step 1310 and awaits another keyboard input. If the correct password is entered, the screen is turned on in step 1314.

Should the host computer 101 be running Windows, as determined in step 1308, the latest log-in password is passed to a host manager Windows module in step 1316. The system next checks in steps 1318 and 1320 whether the correct password was entered in a similar manner as discussed above. If so, since DOS handles the enabling of the screen on the host computer 101, the host manager DOS module is notified that the correct password was entered in step 1322, which, in turn, enables the screen in step 1314.

12. Double Pen-Up Events

The pen controller 110A (FIG. 21) normally generates a series of interrupts and, in turn, a series of pen packets whenever the pen touches the LCD 113C (a pen-down event) and is lifted from the LCD 113C (a pen-up event) and generates an interrupt. For each interrupt, a single packet is generated. The format of the possible packets is illustrated in Table 7 below, where x0 is bit 0 of the x coordinate of the pen location and y0 is bit 0 of the y coordinate of the pen location, etc.

TABLE 7

| PACKET NAME | BIT 7 | BIT 6 | BIT 5 | BIT 4 | BIT 3 | BIT 2 | BIT 1 | BIT 0 |
|---|---|---|---|---|---|---|---|---|
| P1 | 1 | 1 | 0 | x11 | x10 | x9 | x8 | x7 |
| P2 | 0 | x6 | x5 | x4 | x3 | x2 | x1 | x0 |
| P3 | 0 | 0 | 0 | y11 | y10 | y9 | y8 | y7 |
| P4 | 0 | y6 | y5 | y4 | y3 | y2 | y1 | y0 |
| P5 | 1 | 0 | 0 | 0 | 0 | 0 | 0 | 0 |

The packets are generated in the following sequence (p1, p2, p3, p4), (p1, p2, p3, p4) . . . (p1, p2, p3, p4), (p5). The packets pi, p2, p3, p4 relate to pen-down events (a pen point); each group of packets (p1, p3, p3, p4) relating to one x-y coordinate of the pen. The packet p5 relates to a pen-up event. Thus, anytime the pen is lifted from the digitizer, one packet p5 is generated. Thus, when the pen first touches the digitizer panel and is moved across the digitizer, a plurality of pen points (p1, p2, p3, p4) are generated which correspond to the x, y locations of the points touched by the pen. Normally 110 pen points per second are generated by the pen controller 110A.

Whenever a 12-bit serial pen packet is generated by the pen controller 110A and read by a firmware module in step 1330 (FIG. 41), an interrupt is generated in step 1332. A pen packet assembler assembles the packets into pen points (p1, p2, p3, p4). These pen points (p1, p2, p3, p4) are processed and passed to the applications program. In order to process each pen point (p1, p2, p3, p4), the interrupts must be disabled. During the time when the interrupts are disabled, the pen point packets (p1, p2, p3, p4) and the pen-up packets p5 are generated by the pen controller 110A but not processed and thus are garbled or lost. Lost or garbled pen point packets (p1, p2, p3, p4) do not affect mouse emulation. However, since mouse emulation is based on both pen-down and pen-up events, lost pen-up packets p5 can result in the mouse emulation being hampered, possibly resulting in the system being stuck in the state preceding the pen-up event.

Figure 41:
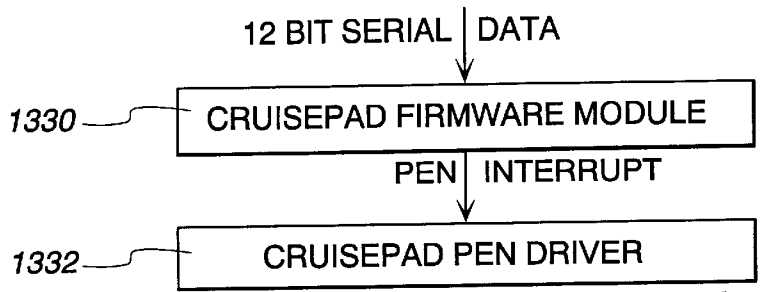
FIGS. 41–43 are flow charts relating to a system for handling pen-up events.
Figure 42:
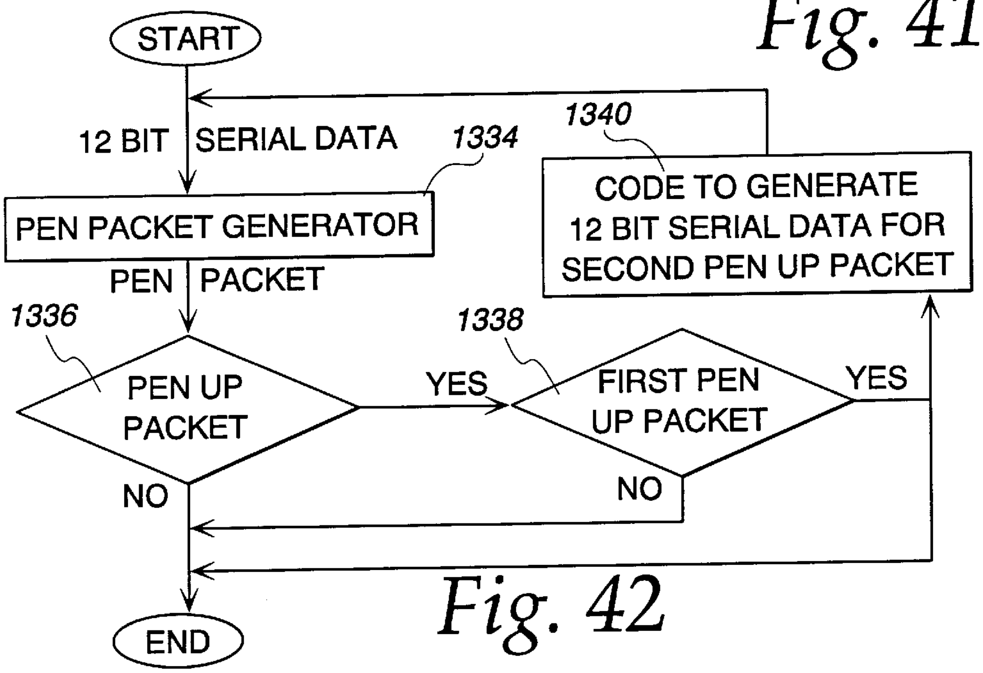

In order to solve this problem, a firmware module 1330 generates two pen-up packets p5. More particularly, with reference to FIG. 42, the firmware module 1330 reads in the 12-bit serial data from the pen controller 110A into packets in step 1334. Next, the system checks in step 1336 whether the packet was a pen-up packet p5. If not, the system proceeds to the pen driver in step 1332 (FIG. 41). If the packet is a pen-up packet p5, the system checks to determine if the pen-up packet p5 is the first pen-up packet in step 1338. If not, the system passes the packet to the pen driver in step 1332 as discussed above. If the system determines in step 1338 that the pen-up packet p5 is the first pen-up packet p5, the serial data for second pen-up packet p5 is generated in step 1340 and assembled in step 1334. In addition, the first pen-up packet p5 is passed to the pen driver.

Figure 43:
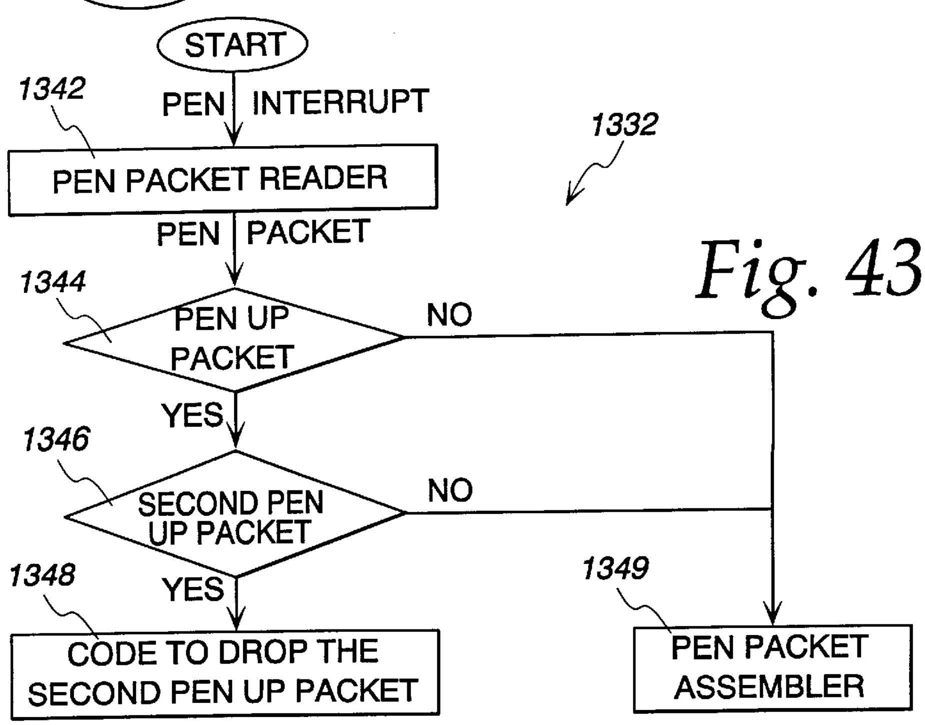

The pen driver 1332 (FIG. 43) is responsive to an interrupt that is generated each time a packet is assembled. In response to an interrupt, the pen driver reads the packet in step 1342. In step 1344, the pen driver determines whether the packet is a pen-up packet p5. If not, the pen packet assembler processes the packet in step 1346. If the system determines in step 1344 that the packet is a pen-up packet, it next checks in step 1346 whether the packet is the second pen-up packet. If so, indicating that the first pen-up packet was processed, the second pen-up packet is dropped in step 1348. If not, the packet is determined to be a first pen packet, which is processed by the pen packet assembler in step 1346.

13. Seamless Integration of Wired and Wireless LANS

The wireless interface device 100 may be connected to host computer 101 by way of a wireless LAN. The wireless LAN protocol is Novell open data link interface IPXODI protocol. Since the IPXODI protocol is also used for wired LAN's, it would be desirable to connect the wireless interface device 100 to a wired LAN system and utilize the Novell IPXODI protocol. Unfortunately, the IPXODI protocol can only communicate with a single LAN card at a time, either a wired LAN card or a wireless LAN card at one time.

The standard Novell LAN stack configuration is illustrated in FIG. 45. The LAN card is identified with the reference numeral 1352. Communication between the LAN card 1352 and the IPXODI protocol is by way of a driver 1354. The driver 1354 communicates with the IPXODI protocol (IPXODI.COM) 1355 by way of a link support layer LSL.COM 1356. The Novell IPXODI protocol passes data between the applications programs 1358 and the link support layer LSL.COM 1356. Even though the link support layer LSL.COM can support multiple LAN cards, the IPXODI protocol only supports a single LAN card.

In order to enable the Novell IPXODI protocol to support a configuration as illustrated in FIG. 44 to enable the wireless interface device 100 to connect to both a wired LAN card 1352 and a wireless LAN card 1360, an additional layer IPXMUX.COM (FIG. 46) is provided for multiplexing incoming and outgoing packets to and from the wired LAN card 1352 and the wireless LAN card 1360. The multiplexer IPXMUX.COM manipulates the data packet source and destination addresses to simulate a single LAN card so as to be compatible with the IPXODI protocol. By providing the additional layer IPXMUX.COM, the host computer 101, as well as the wireless interface device 100, will be able to access all of the LAN resources 1350 (FIG. 44).

Referring to FIG. 46, the additional layer IPXMUX.COM is stacked between the Novell IPXODI protocol IPXODI-.COM 1355 and the link support layer LSL.COM 1356. As mentioned above, the link support layer LSL.COM 1356 can support two LAN cards. Thus, a wireless LAN card 1360 and a corresponding wireless LAN card driver 1362, which communicates with the link support layer LSL.COM 1356 along with the wired LAN card 1352 and its corresponding driver 1354, can communicate with IPXODI.COM by way of the driver.

The multiplexer IPXMUX.COM 1364 multiplexes or interleaves the data from both the wireless LAN card driver 1354 and the wired LAN card driver 1362 to the IPXODI protocol by manipulating the source and destination addresses of incoming and outgoing packets, so that as far as the Novell IPXODI protocol is concerned, it is only communicating with a single LAN card. Similarly, communication from the host computer 101, as well as applications 1358, which may be running on the wireless interface device 100, to both the wired LAN card 1352 and the wireless LAN card is formatted by the IPXODI.COM and multiplexed to either the wireless LAN card 1360 or wired LAN card 1352 by the multiplexer IPXMUX.COM by way of the link support layer. The multiplexer IPYMUX.COM 1364 is loaded after the wired LAN card driver 1354 and the wireless LAN card driver 1362 are loaded and before IPXODI.COM 1355.

Figure 47:
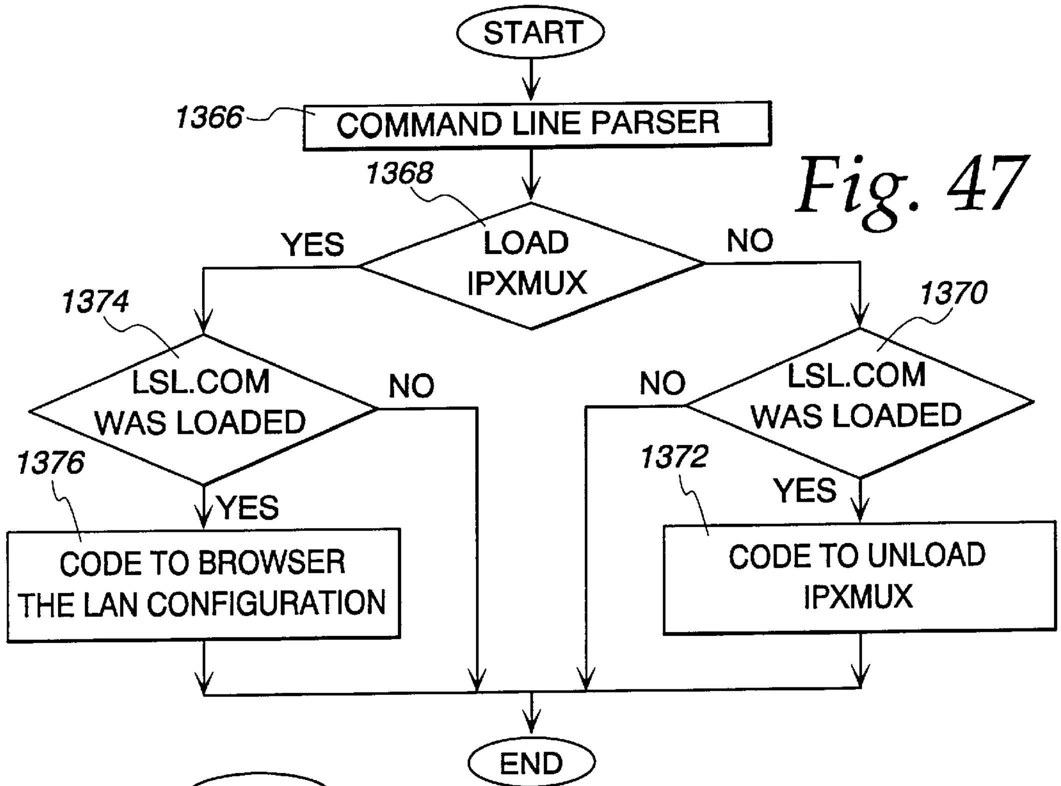
FIGS. 47–52 are flow charts relating to the seamless integration of wired and wireless LANS.
Figure 48:
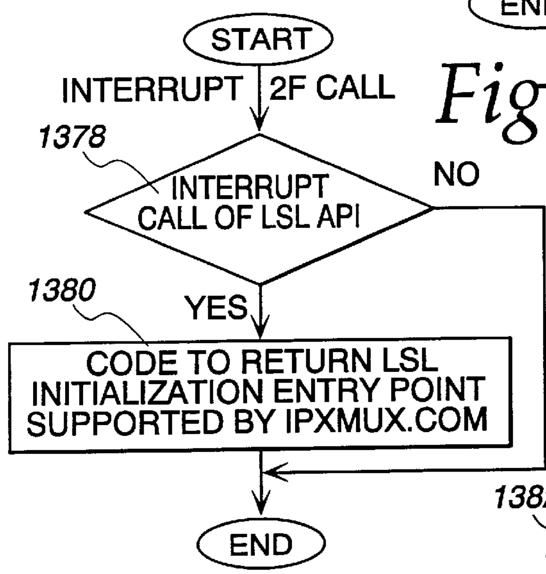

The Novell LAN software includes a configuration file which checks the particular LAN cards 1352 being run by the LAN card driver 1354. The system is initialized by the routine illustrated in FIG. 47, which is run each time the multiplexer IPXMUX.COM 1364 is loaded. Initially, a command line parser 1366 is used to determine whether the user has issued commands to either load or unload IPXMUX.COM command in step 1368. If the command is an unload command, the system checks whether IPXMUX-.COM 1364 has already been loaded in step 1370. If so, the system unloads IPXMUX.COM 1364 in step 1372. If IPXMUX.COM 1364 has not been loaded, the system exits the initialization routine.

If the command was to load IPXMUX, the system checks in step 1374 to determine if the link support layer LSL.COM 1356 has been loaded. If not, the system exits the initialization routine since IPXMUX.COM cannot be loaded until the link support layer LSL.COM has been loaded. If the link support layer LSL.COM 1356 was loaded, control is passed to a LAN configuration browser in step 1376 to browse the LAN configuration for the number of LAN cards and the frame types of the cards and the number of frame types (i.e. IEEE 802.2, 802.3, etc.) to find out which LAN card drivers are running. In addition, the browser finds and saves all relevant application program interface entry points to the link support layer LSL.COM and sets to those supported by IPXMUX.COM. The browser also sets the LSL interrupt vector to the interrupt vector supported by IPXMUX.COM, as well as finds and saves all logical board numbers.

In order to interleave the data from the wired LAN card 1352 (FIG. 46) and the wireless LAN card 1360 to IPX-ODI.COM to emulate a single LAN card, 2F interrupt calls from the application program by way of IPXODI.COM are trapped and handled by a separate routine. In particular, 2F interrupt calls are checked in step 1378 to determine if such calls are interrupt calls to LSL.COM. If not, the system exits. If so, the address of the LSL protocol support API handler supported by IPXMUX.COM is returned. Interrupt calls to LSL.COM from an application program are handled by a special interrupt handler. If the interrupt call is to LSL.COM, a LSL initialization entry point, supported by IPXMUX-.COM is returned in step 1380. The LSL initialization entry point represents an address of the protocol initialization routine into LSL.COM.

Figure 49:
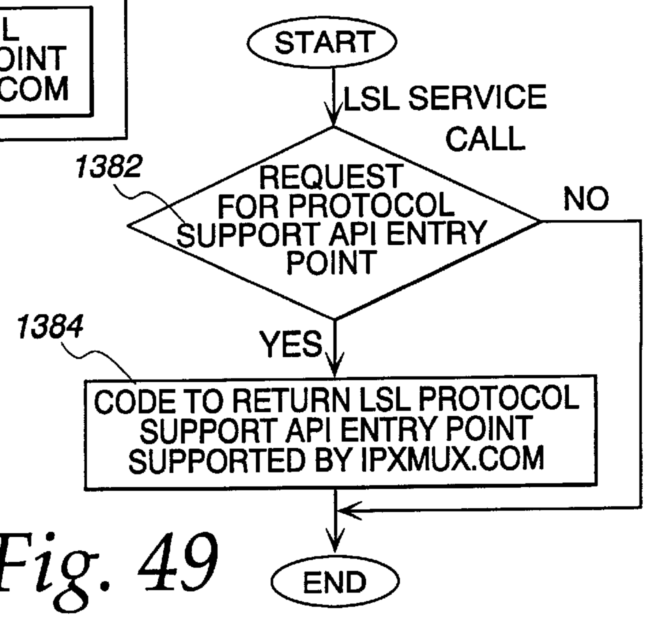

Once the address of the LSL initialization entry point is known by the IPXODI protocol, the IPXODI protocol will call that address for service. Thus, all LSL service calls are checked in step 1382 (FIG. 49) to determine if the call is a request for protocol support API entry point. If not, the multiplexer IPXMUX.COM will direct that call into LSL.COM. If so, an address of a special 2F interrupt handler (LSL Protocol Support API Handler) supported by IPXMUX.COM is returned to IPXODI.COM in step 1384.

Figure 50:
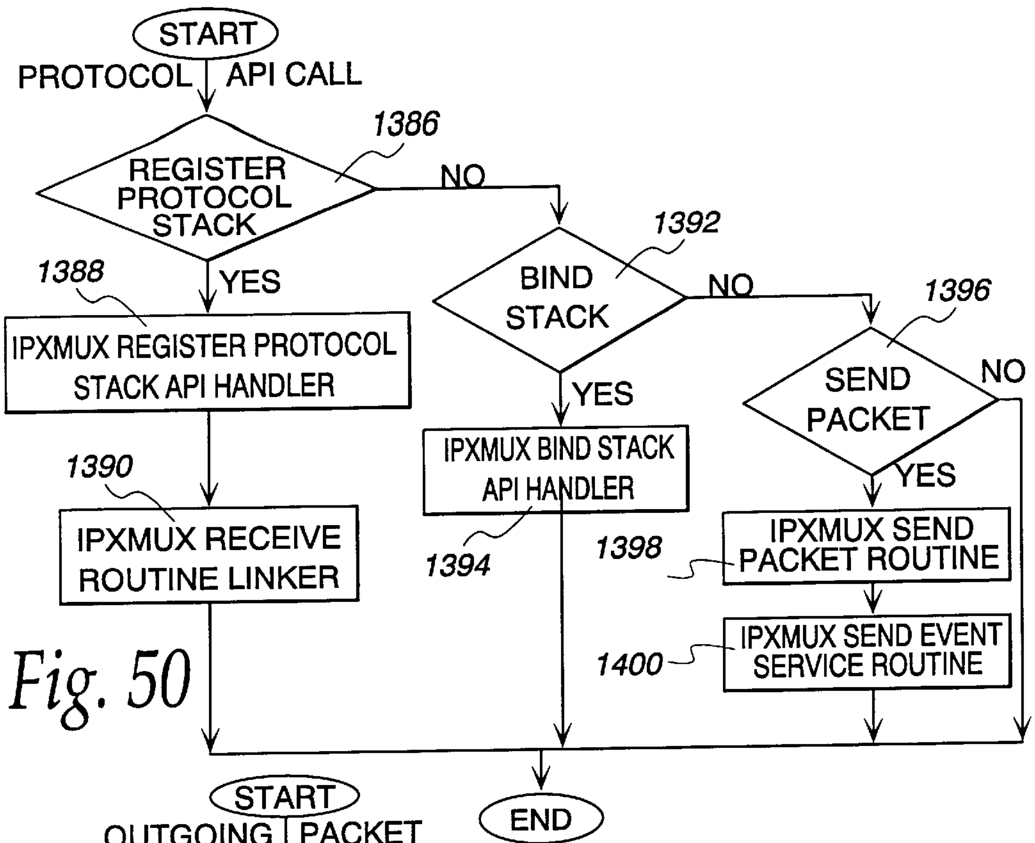

The special interrupt handler, LSL Protocol Support API Handler, which forms a part of IPXMUX.COM, is illustrated in FIG. 50. Three services are handled by the LSL Protocol Support Handler, which is supported by the multiplexer IPXMUX.COM to set up an address for communication with a host on the network. These services are register protocol stack, bind stack and send a packet. The balance of the services are handled by LSL.COM.

The entry point of the LSL Protocol Support API Handler in IPMMUX.COM from the standpoint of IPXODI.COM is the protocol support API within the link support layer LSL. Since the link support layer LSL.COM supports various protocols, such as IPXODI and TCPIP, registration of the IPXODI.COM protocol is checked in step 1386. If the call to the link support layer LSL is to register a protocol stack, an IPXMUX register protocol stack application program interface (API) handler in step 1388 checks whether the protocol stack is IPXODI. If the protocol stack is IPXODI, the protocol stack handler sets a packet receive handler, supported by IPXMUX.COM and calls LSL.COM's protocol stack API to register the protocol. The protocol stack handler also saves the stack ID. Subsequently, in step 1390, an IPXMUX Receive Routine Linker sets the protocol stack IPXODI's receive routine address to the packet receive address supported by IPXMUX.COM.

If the protocol API call is not to register the protocol stack, the system then checks in step 1392 whether a special registration service, a bind stack service, is requested. A bind stack service, normally done before registration, is used to set up a protocol for communication, i.e. packet length, etc. If bind stack service is requested, an IPXMUX Bind Stack API handler in step 1394 is called, which forces IPXODI to bind to the wired LAN card 1352 to which IPXODI is bound before the wireless LAN card 1360 was installed in order to be compatible with the IPXODI protocol. The IPXMUX bind stack handler also saves the process ID of the binding for sending and receiving packets.

Figure 51:
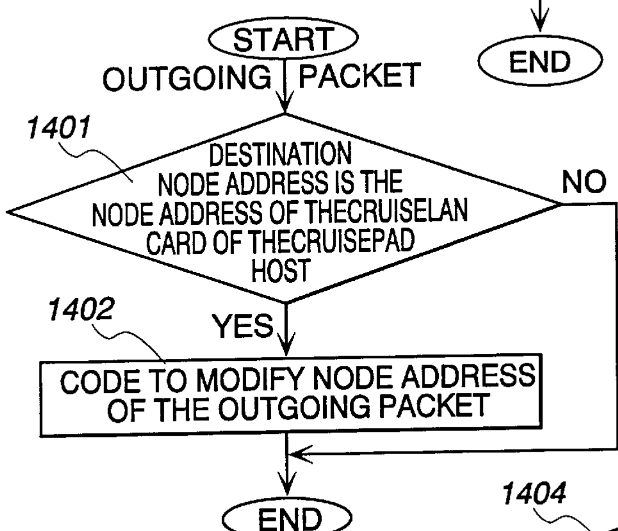
Figure 52:
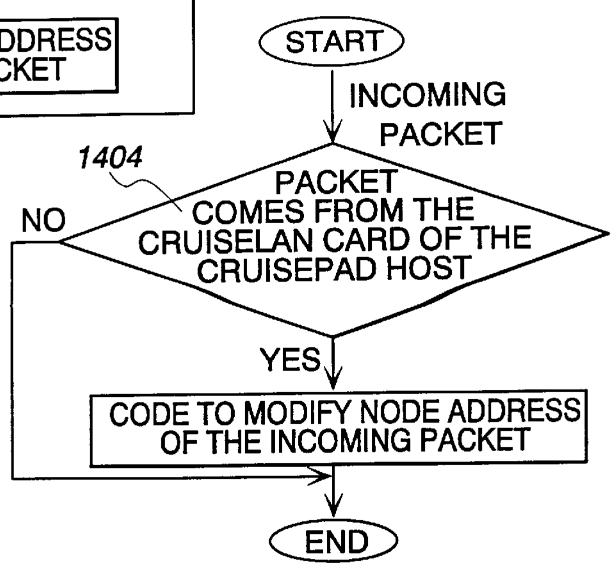

If the protocol API call is not a register protocol stack or a bind stack service, the system checks in step 1396 whether send packet service is requested. If not, the system exits and the service call is handled by LSL.COM. If so, an IPXMUX send packet routine is called in step 1398 and 1400 (FIG. 51), which sets the address of the wireless LAN card 1360 as the source node address in step 1402. The packet modifier also sets the node address of the wireless interface device 100 as the packet's destination mode address in step 1400 (FIG. 51). The send event service routine address is set to the address of the send event service routine in IPXMUX.COM before it returns.

Incoming packets are handled by an incoming packet handler illustrated in FIG. 32. In particular, incoming packets are checked in step 1404 whether the source address of the packet is from the wireless LAN card 1360. If not, the system returns. If so, the packet's source mode address is saved and set to the mode address of the wireless LAN card 1360 while the pocket destination address is set to the address of the wired LAN card 1352 to which IPOXDI is bound.

14. Host Control Mode

Figure 53:
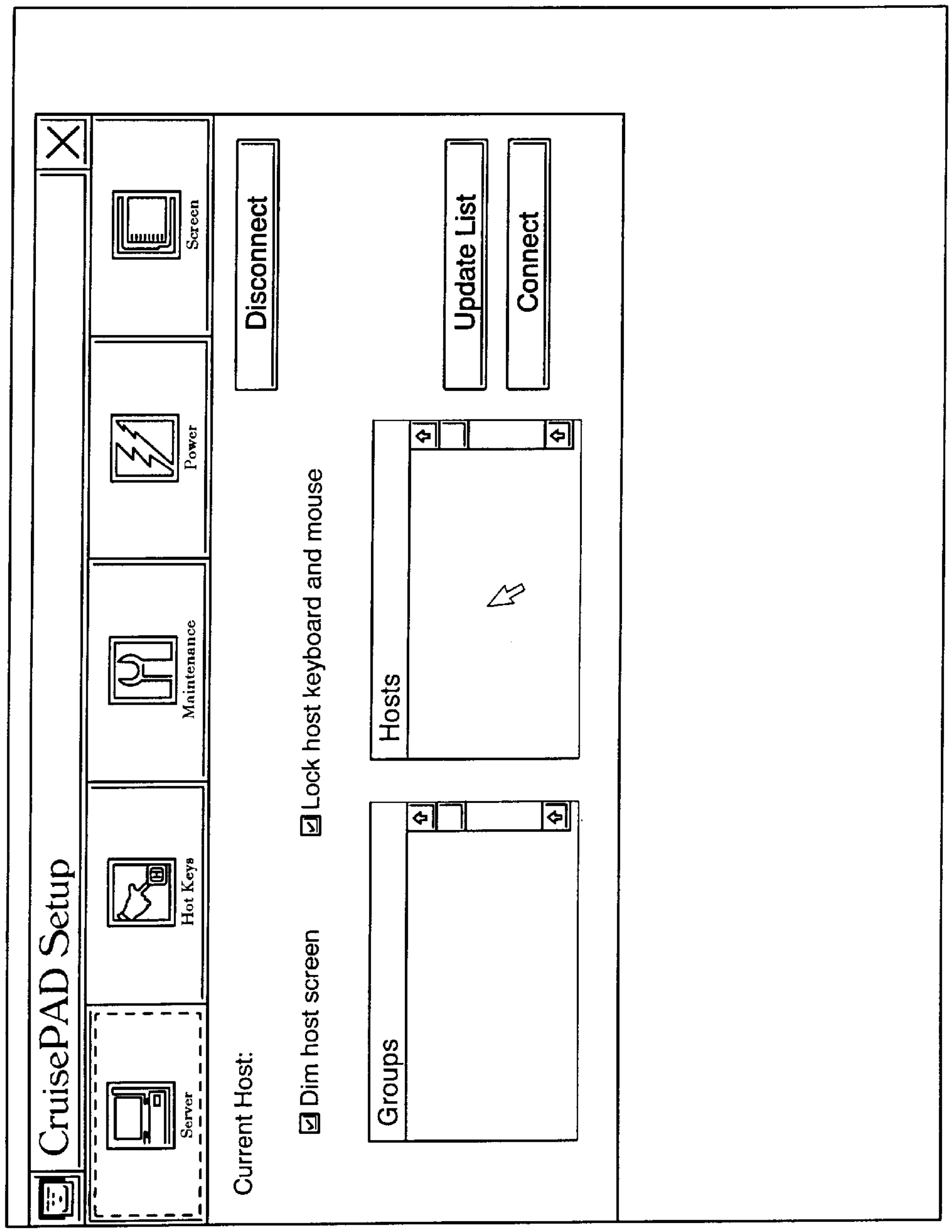
FIGS. 53–57 are illustrations of various set-up dialog boxes available on the wireless interface device.
Figure 54:
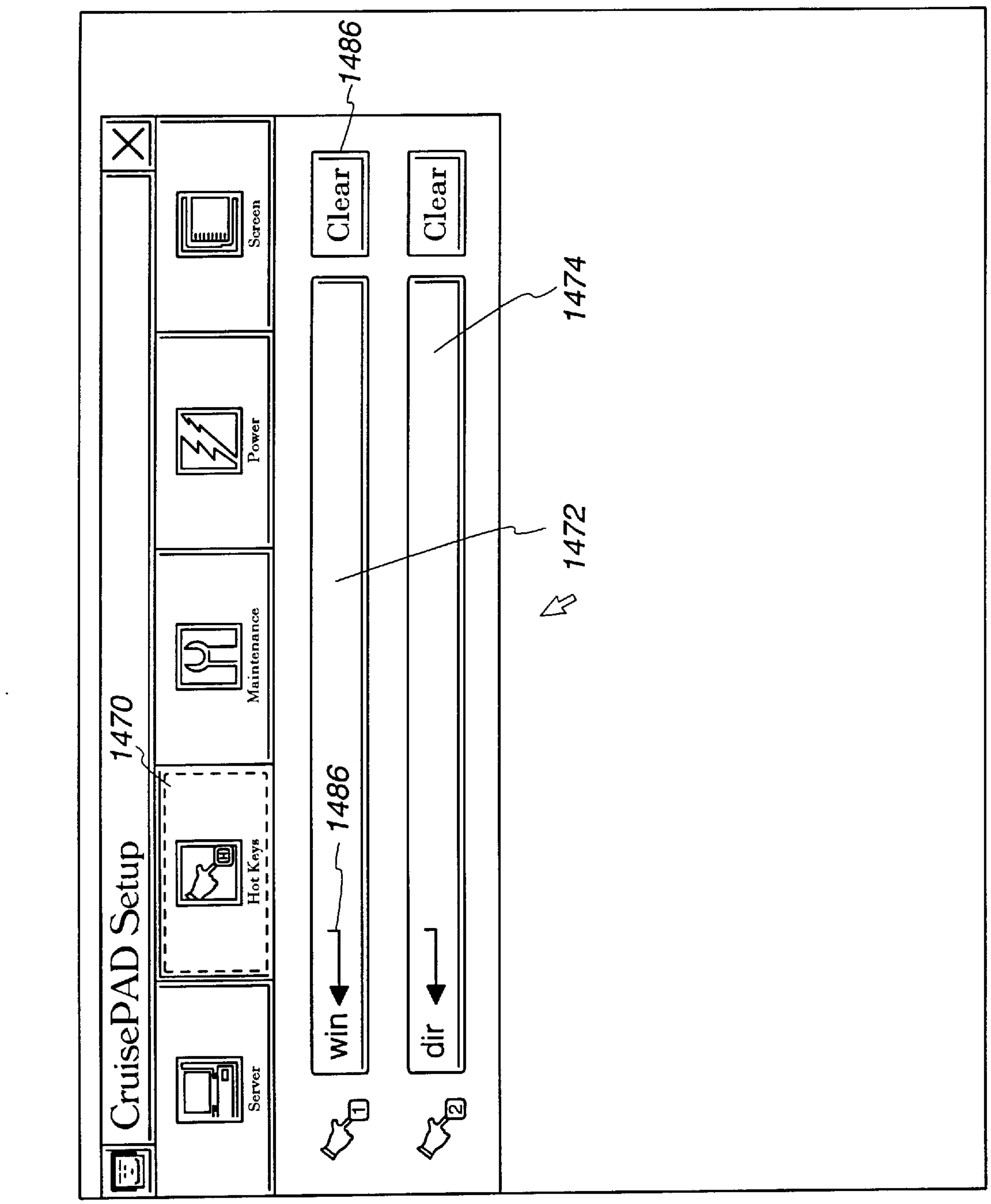
Figure 55:
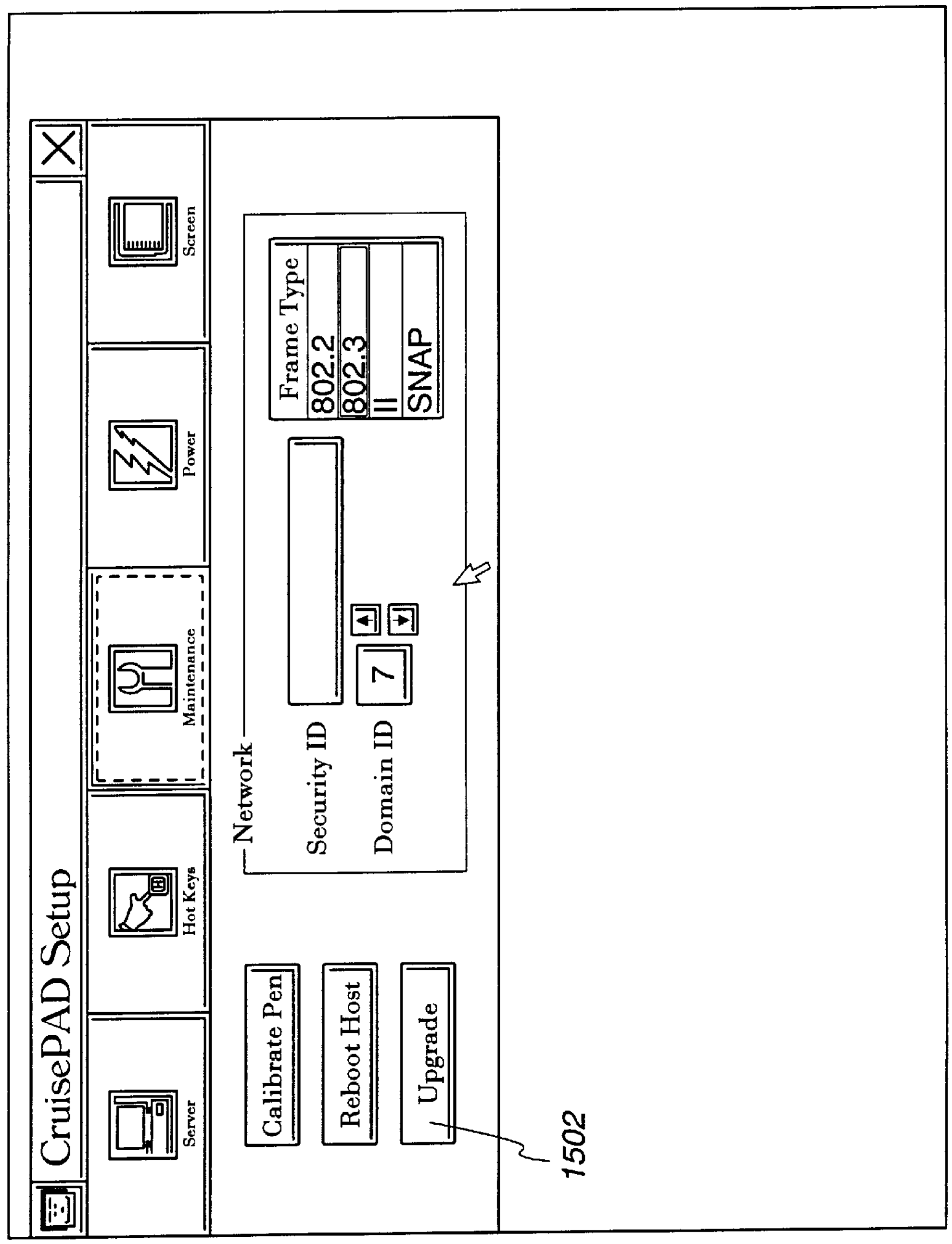
Figure 56:
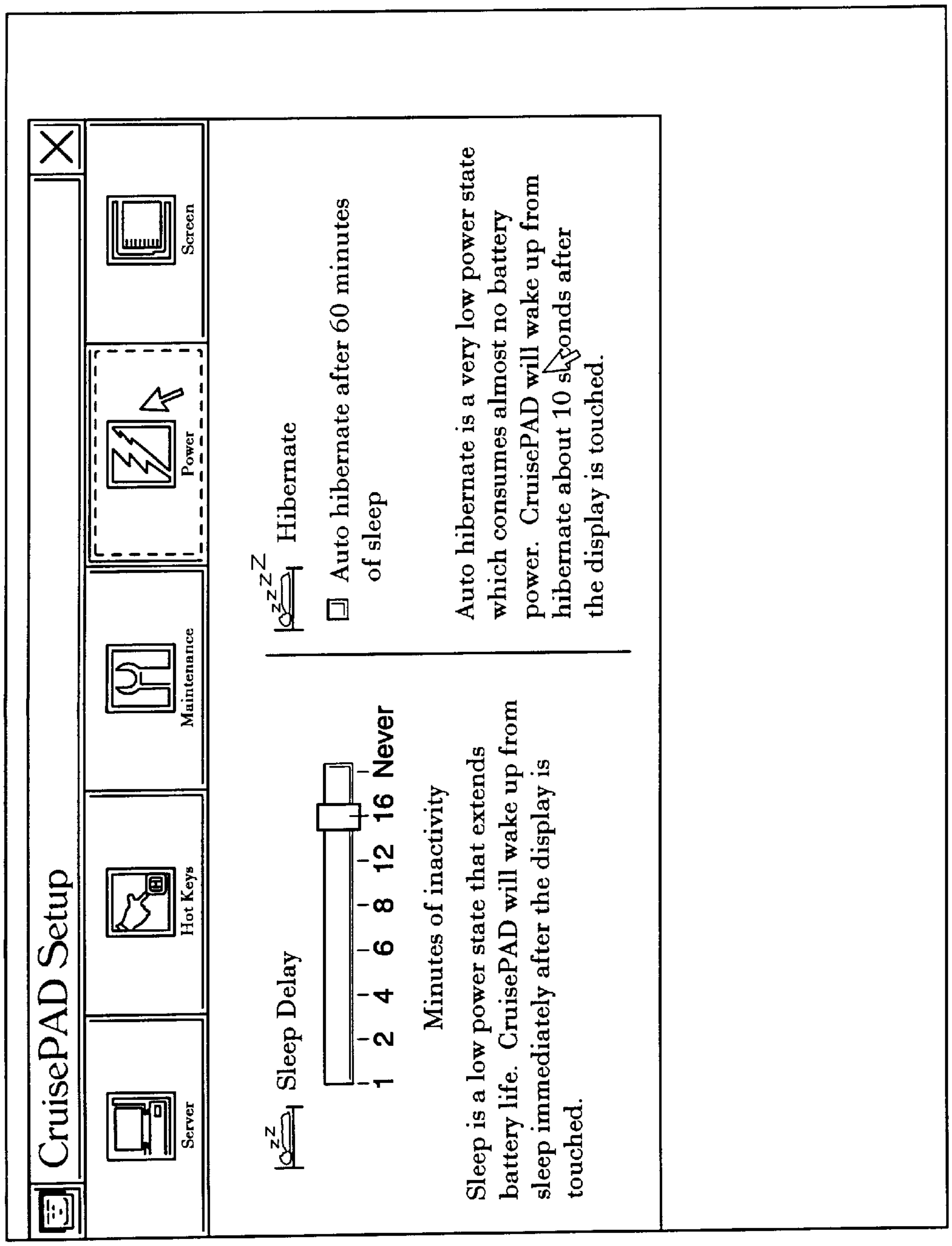
Figure 57:
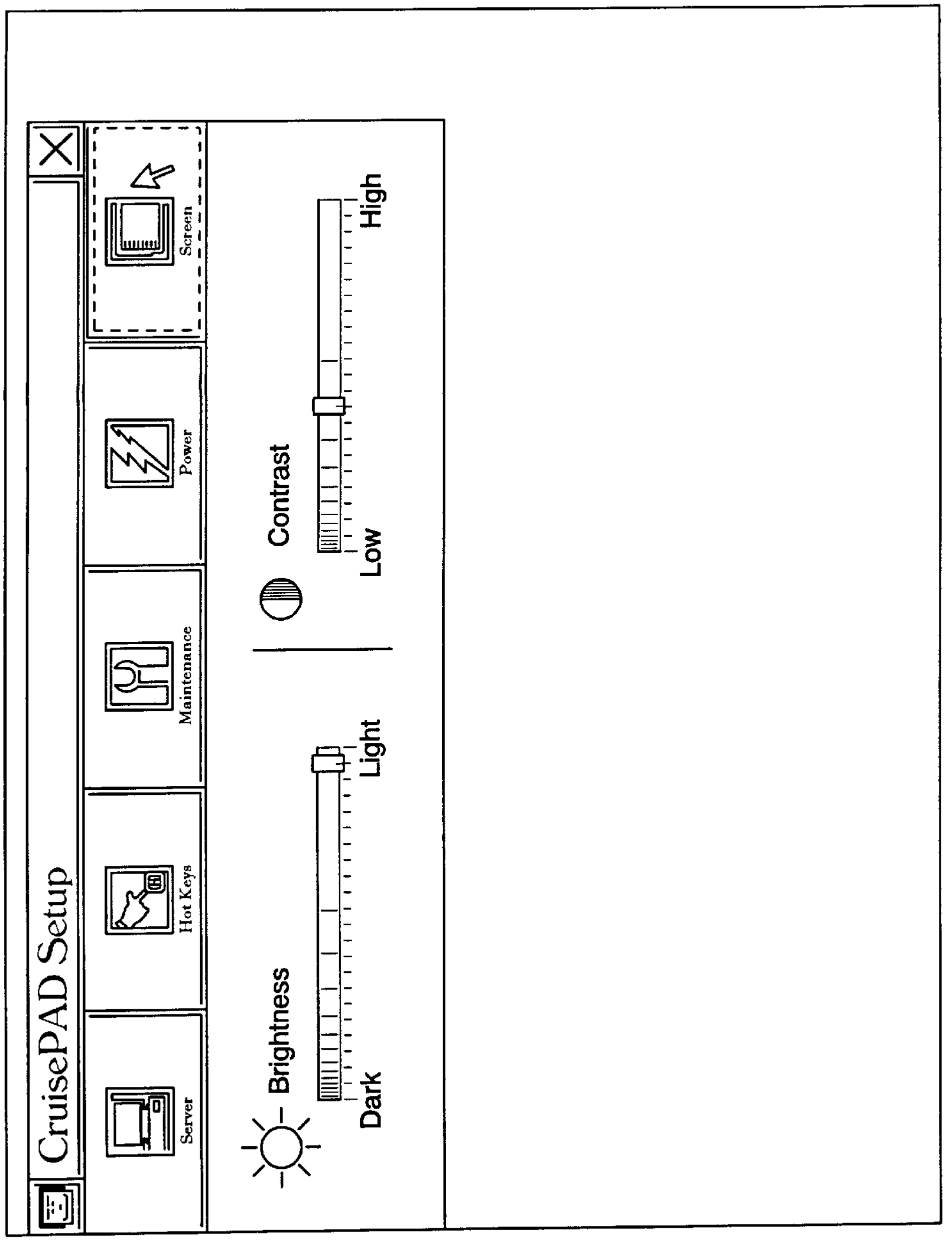

The wireless interface device 100 includes a hot icon 1408 (FIG. 37) in the hot icon area 1202 (FIG. 36) of the LCD 113C for switching control of the host computer 101 from the wireless interface device 100 and the host computer 101. While the wireless interface device 100 has control of the host computer 101, the user has the option to dim the screen of the host computer 101, as well as lock out the keyboard and mouse inputs. In particular, with reference to FIG. 37, a set-up window hot icon 1410 may be selected. Activation of the set-up window icon causes one of five selectable set-up dialog boxes to be displayed in the viewing area 1200 (FIG. 36) of the LCD 113C on the wireless interface device 100. These dialog boxes are illustrated in FIGS. 53–57, which can be selected by a graphical button bar 1412 (FIG. 53). When the "host" button is selected, a list of host computer groups that are accessible by the wireless interface device 100 as well as the specific host to which the wireless interface device 100 is connected are displayed. When the wireless interface device 100 has control of the host computer 101, the host computer screen can be dimmed and the host keyboard and mouse can be locked out by placing the pen down in the box next to those functions in the dialog box illustrated in FIG. 53. FIG. 54 relates to setting up remote keyboard macros. FIG. 55 is a maintenance dialog box which enables various maintenance functions, such as calibration of the pen, rebooting of the host, and the like. FIG. 56 relates to power settings, and in particular includes an inactivity timer for timing periods of inactivity in order to place the wireless interface device 100 in a low-power state. FIG. 57 is selectable by the screen button and enables the brightness and contrast of the LCD 113C on the wireless interface device 100 to be adjusted.

Figure 58:
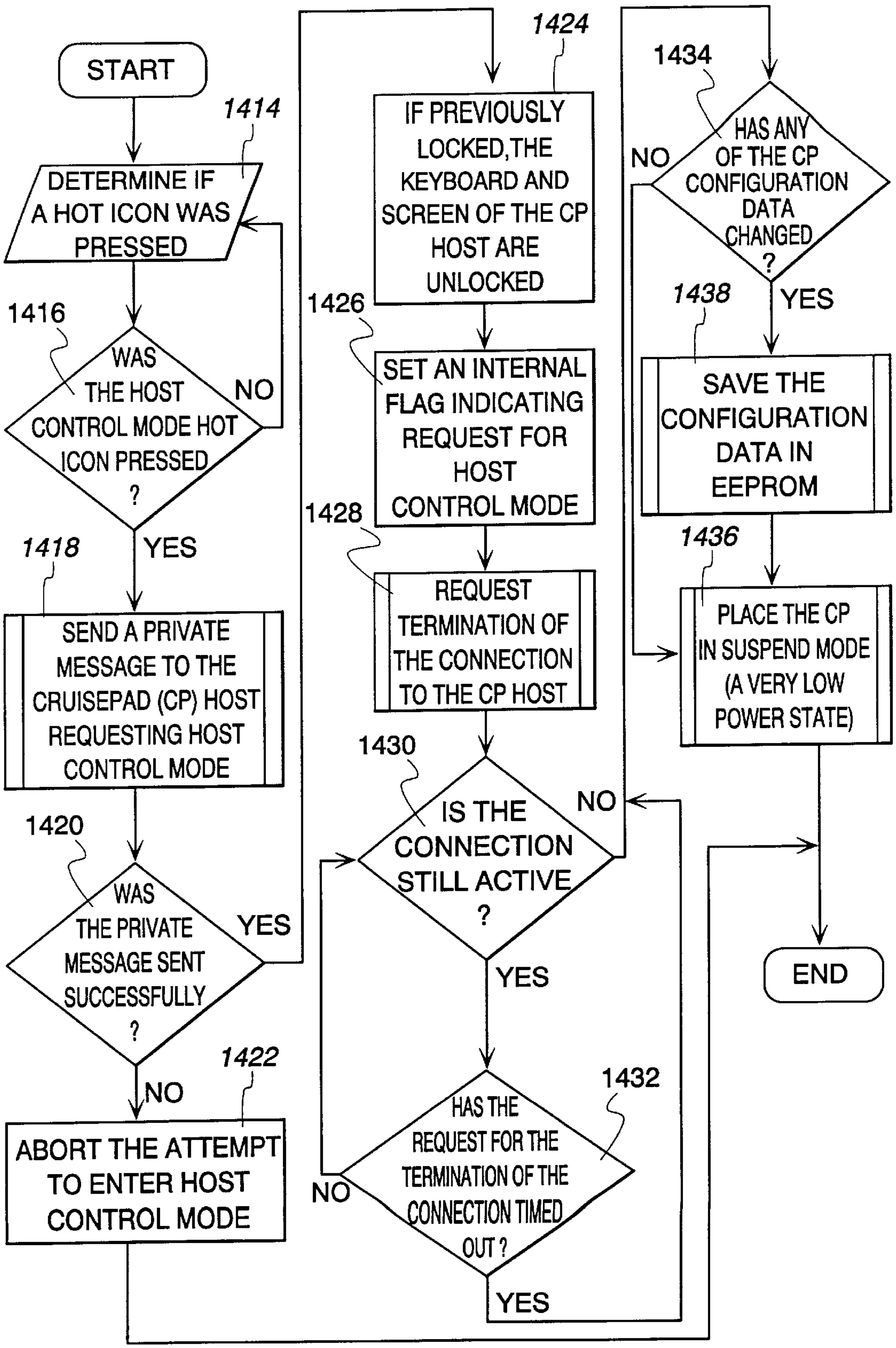
FIG. 58 is a flow chart relating to the host control mode.

FIG. 58 illustrates a method for disconnecting the host computer 101 from the wireless interface device 100 and automatically returning control of host screen, keyboard and mouse to the host computer 101. In addition, any configuration settings of the wireless interface device, such as contrast and brightness adjustment, are also saved in order to obviate the need to readjust the wireless interface device 100, the next time it is connected.

Initially in step 1414 (FIG. 58), the system determines if the hot icon area 1202 of the LCD 113C on the wireless interface device 100 was pressed. As illustrated in FIG. 37, the hot icon area 1202 includes several hot icons. Thus, the system checks in step 1416 whether the host control mode hot icon 1408 (FIG. 37) was selected. If not, the system loops back to step 1414 and waits for the hot icon area to be pressed. If the host control mode hot icon 1408 was selected, the wireless interface device 100 sends a private message (i.e. pocket) to the host computer 101 in step 1418, requesting host control mode.

The system then checks in step 1420 whether the host computer 101 returned an acknowledgement that the private message was received. If an acknowledgement of the private message is not received by the wireless interface device 100, the attempt to enter the host control mode is aborted in step 1422. If an acknowledgement is received, the system checks in step 1424 if the mouse keyboard and mouse had been previously locked out by the wireless interface device 100 as discussed above. If so, the host keyboard and mouse are unlocked. Subsequently in step 1426, an internal flag is set indicating a request for termination of the connection with the host computer 101 in step 1428. The request for termination initiates a timer, which, when timed out, disconnects the wireless interface device 100 from the host computer 101. Thus, the system checks to determine if the host computer 101 is still connected to the wireless interface device 100 in step 1430. If so, the system determines if the request for termination has timed out in step 1432. If not, the system waits for the timer to time out and disconnects the wireless interface device 100 from the host computer 100. Once the wireless interface device 100 is disconnected, control of the host computer 101 is returned to the host computer 101.

In order to obviate the need to reconfigure the wireless interface device 100 the next time the wireless interface device 100 is connected to the host computer 101, the system checks in step 1434 whether any of the configuration data (i.e. contrast, brightness (FIG. 57) was changed. If not, the wireless interface device 100 is placed in a suspend mode in step 1436. If the configuration data did change, the new configuration data is saved in the EEPROM 111B (FIG. 12) in step 1438.

15. Broadcast for Available Hosts

The wireless interface device 100 can determine the available hosts within range for wireless connection. The user can then select a host by way of a dialog box (FIG. 53), which will be discussed in more detail below. An important aspect of the wireless interface device 100 is that it can be connected to virtually any available hosts without any physical connections and without knowing the host address or node address beforehand, unlike known wireless and wired LAN systems where the node addresses of each of the personal computers in the network have a preassigned node address and are therefore known prior to any communications being established.

Figure 59:
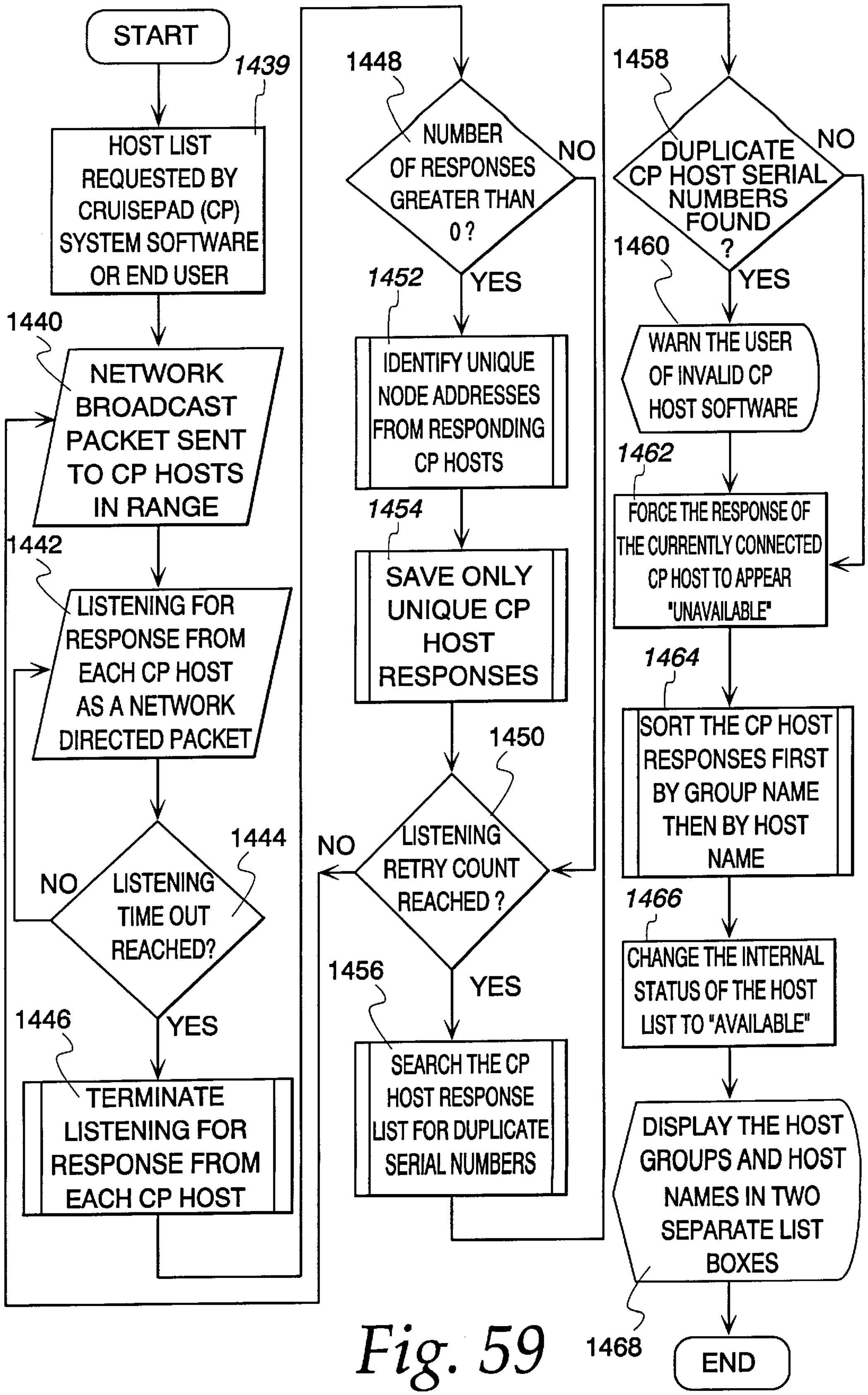
FIG. 59 is a flow chart relating to a system for broadcasting for available hosts.

In order to initiate connection of the wireless interface device 100 to an available host 101, the set-up hot icon 1410 (FIG. 37) is selected in step 1439 (FIG. 59) which causes a set-up dialog box, as illustrated in FIG. 53 to be displayed in the viewing area 1202 (FIG. 36) of the LCD 113C. Subsequently, in step 1440, the wireless interface device 100 broadcasts network packets to be received by all available hosts 101 in range that are on the same channel and domain as the wireless interface device 100. After the network packets are broadcast, the wireless interface device 100 listens for a predetermined time period in steps 1442 and 1444 for return acknowledgement packets from the available hosts 101, which contain, among other things, the node addresses of the available hosts 101. After the time-out period the wireless interface device 100 terminates listening for responses from the available hosts 101 in step 1446. After listening is terminated, the system checks the number of responses received in step 1448. If no responses are received, the wireless interface device 100 repeats the cycle (i.e. returns to step 1440) for a predetermined number of retries as determined in step 1450.

If a response is received, the system identifies the unique node address from the responding hosts 101 in step 1452 and saves the unique host node addresses in step 1454. The list of available hosts 101 is searched in step 1456 for duplicate serial numbers. Should duplicate serial numbers be found in step 1458, a warning is generated in step 1460, warning the user that a duplicate copy of software is running on one of the responding hosts 101. In step 1462, the currently connected host is forced to appear as unavailable on the dialog box illustrated in FIG. 53.

The responding hosts 101 are sorted first by group name and then by host name in step 1464. After the sorting, an internal status list of the available hosts 101 in designated as available in step 1466. Subsequently, the available hosts and groups are displayed in the dialog box illustrated in FIG. 53 in step 1468. Movement of the cursor (by a pen-down event) to the desired host 101 selects that host 101. A "connect" button on the dialog box is then selected to connect the wireless interface device 100 to the selected host 101.

16. Remote Keyboard Macros

Figure 60:
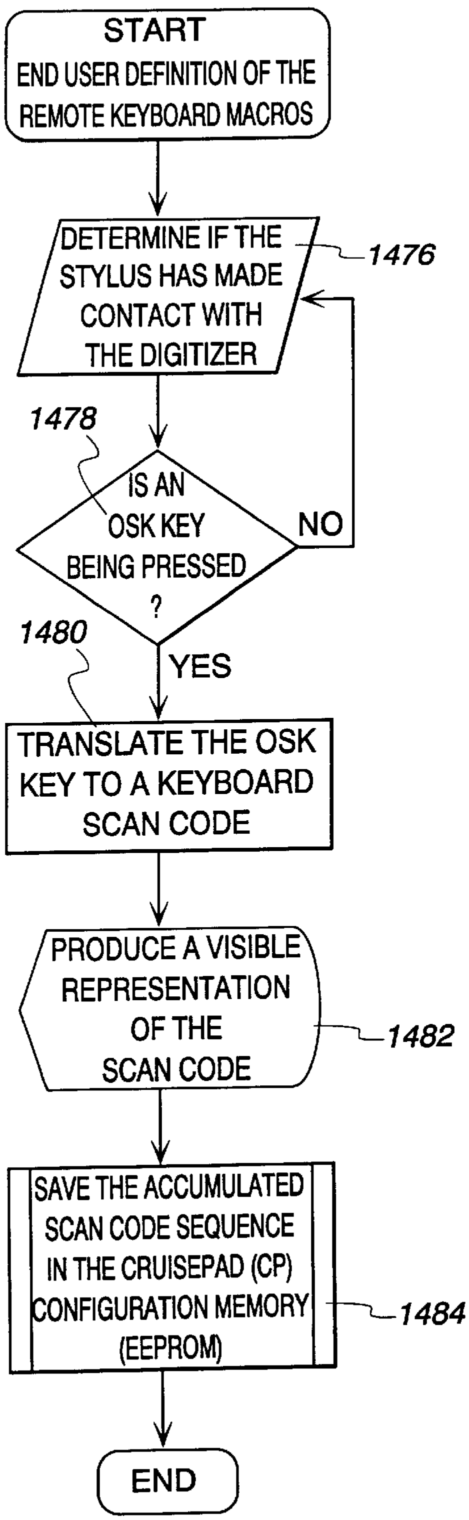
FIGS. 60 and 61 are flow charts relating to a system for providing remote keyboard macros on the wireless interface device.
Figure 61:
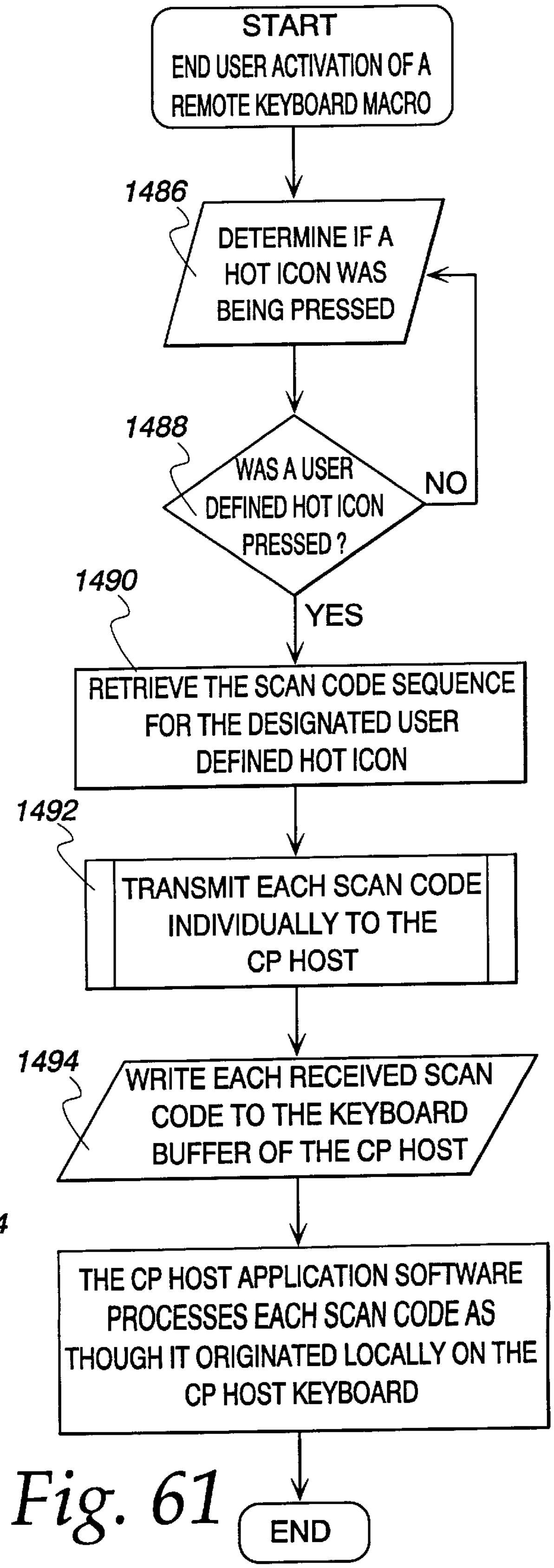

FIGS. 60 and 61 relate to remote keyboard macros on the wireless interface device 100. An important aspect of the wireless interface device 100 is that the remote keyboard macros are provided by way of a wireless connection. FIG. 60 relates to developing the macros while FIG. 61 is directed to using the macro.

Referring to FIG. 37, the wireless interface device 100 includes two user-defined hot icons 1472 and 1474, located in the hot icon area 1202 (FIG. 36) of the LCD 113C, that can be used for the macros. These hot icons 1472 and 1474 are configurable in a set-up mode, which, as discussed above, is under the control of the set-up hot icon 1410 (FIG. 37). Once the set-up hot icon 1410 is selected, a hot key button 1470 on the dialog box illustrated in FIG. 54 is selected. As noted in FIG. 54, the dialog box includes two configurable macros. These macros are configured by way of the two edit fields 1472 and 1474 (FIG. 54). In order to configure the macros, the icon for the desired edit field 1472 or 1474 is selected. These edit fields 1472 and 1474 are configurable by way of a virtual on-screen keyboard (OSK), selectable by way of a hot icon 1480 (FIG. 37).

Referring to FIG. 60, the system checks in step 1476 whether there has been a pen-down event in the viewing area 1202 (FIG. 36) of the LCD 113C and, in step 1478, whether the OSK hot icon 1480 (FIG. 37) was selected. If not, the system loops back to step 1476. If so, the selected key on the OSK is translated into a keyboard scan code in step 1480 and a visual indication of the key selected in the edit field 1472 or 1474 in step 1482. The process is repeated until the macro (i.e. WIN, DIR), followed by a carriage return 1486, is complete and the macro is saved in the EEPROM 111B (FIG. 12) in step 1484. A clear button 1486 is provided in the dialog box illustrated in FIG. 54 for each edit field 1472 and 1474. These clear buttons 1486 enable the edit fields to be cleared in the EEPROM 111B (FIG. 12).

Activation of the remote keyboard macros is accomplished by pressing down on the user-defined hot icons 1472 or 1474, located in the hot icon area 1202 (FIG. 36) of the LCD 113C. The system checks in steps 1486 and 1488, whether the user defined hot icons 1472 or 1474 are selected. If the user-defined hot icons 1472 or 1474 are not selected, the system returns to step 1486. Once one of the user-defined hot icons 1472 or 1474 is selected, the keyboard scan code sequence, stored in the EEPROM 111B (FIG. 12), is retrieved for the selected hot icon 1472 or 1474 in step 1490, which are then individually transmitted to the host 101 in step 1492. These scan codes are then written to the keyboard buffer on the host 101 in step 1494. Subsequently, in step 1496, the host 101 processes the scan codes as though they originated from the host keyboard.

17. Wireless Flash Programmer As mentioned above, the wireless interface device 100 includes several flash memory devices 742–748 (FIG. 25). The flash memory device 742 includes a protected area which contains the system BIOS, and a sufficient amount of functionality to enable the wireless interface device 100 to be rebooted to enable reprogramming of the flash memory devices 742–748 by way of the serial port 788 (FIG. 23) in the event of a flash disaster.

Figure 62:
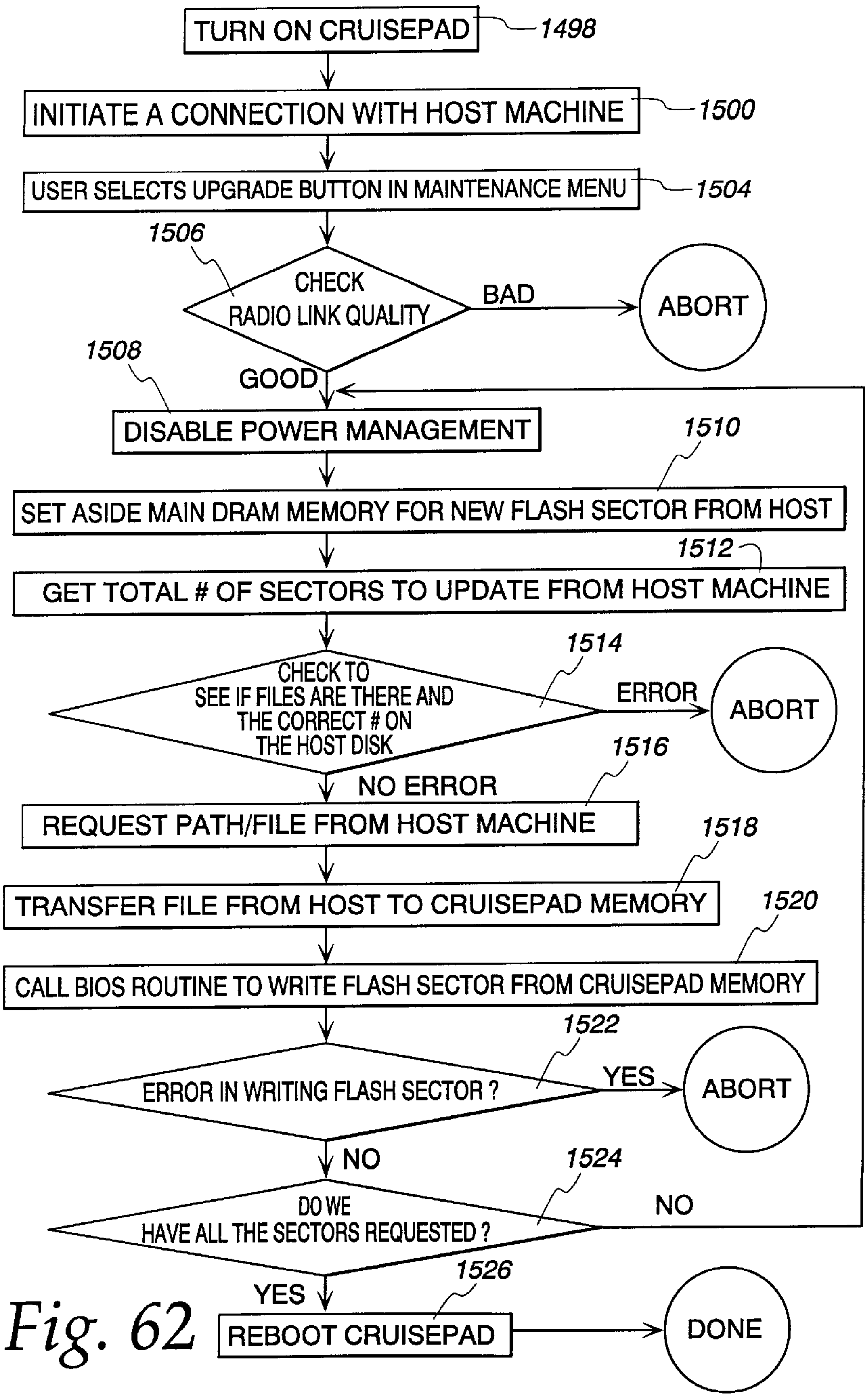
FIGS. 62 and 63 are flow charts relating to a wireless flash ROM programmer.

In order to upgrade the flash memory devices 742–748, the upgrade disks are installed in an available host computer 101. In particular, the flash upgrade software is written to a predetermined directory on the host's 101 hard disk. After the flash upgrade disks are installed, the wireless interface device 100 is turned on in step 1498 (FIG. 62A) by way of the main power switch 855 (FIG. 28). Subsequently, in step 1500, a connection between the host computer 101 and wireless interface device 100 is initiated in step 1500 by first selecting the configuration hot icon 1410 (FIG. 37).

Subsequently, the maintenance button on the dialog box is selected to get to the dialog box illustrated in FIG. 55. An upgrade button 1502 on the dialog box illustrated in FIG. 55 is selected in step 1504. In order to prevent programming errors, the radio quality is checked in step 1506 before proceeding. If the radio quality is poor, the upgrade is aborted. If the radio quality is adequate, power management is disabled in step 1508 to prevent the wireless interface device 100 from going into a reduced power state as discussed above during programming of the flash memory devices 742–748. After the power management is disabled, a portion of the DRAM memory 111A (FIGS. 18 and 24) in the wireless interface device 100 is set aside to receive a flash sector from the host computer 101 in step 1510. Subsequently, the wireless interface device 100 polls the host computer 101 to determine the correct numbers of sectors in the flash update and whether the sectors are available on the hard disk of the host computer 101 in steps 1512 and 1514. If the flash update files are not on the host hard drive or an incorrect number of sectors are available on the host hard disk, the update is aborted. Otherwise, the system requests the path/file data from the host computer 101 in step 1516. Subsequently, each sector (file) in the flash update is read by the host computer 101 and uploaded over the radio to the DRAM 111A in the wireless interface device 100 in step 1518. After the sectors are written to the DRAM 111A in the wireless interface device 100, a BIOS call is made to write the sectors in the DRAM 111A to the flash memory devices 742–748 in step 1520.

In step 1522 the system checks for errors in writing to the flash memory devices 742–748. Should any errors be detected, the update is aborted. If no errors are detected, the system checks in step 1524 whether all of the sectors from the DRAM 111A have been written to the flash memory devices 742–748 in the wireless interface device 100. If not, the system loops back to step 1516. Once all of the files have been transferred to the flash memory devices 742–748, the wireless interface device 100 is rebooted in step 1526. Once the wireless interface device is rebooted, the system will be able to utilize the updated software in the flash memory devices 742–748.

Figure 63:
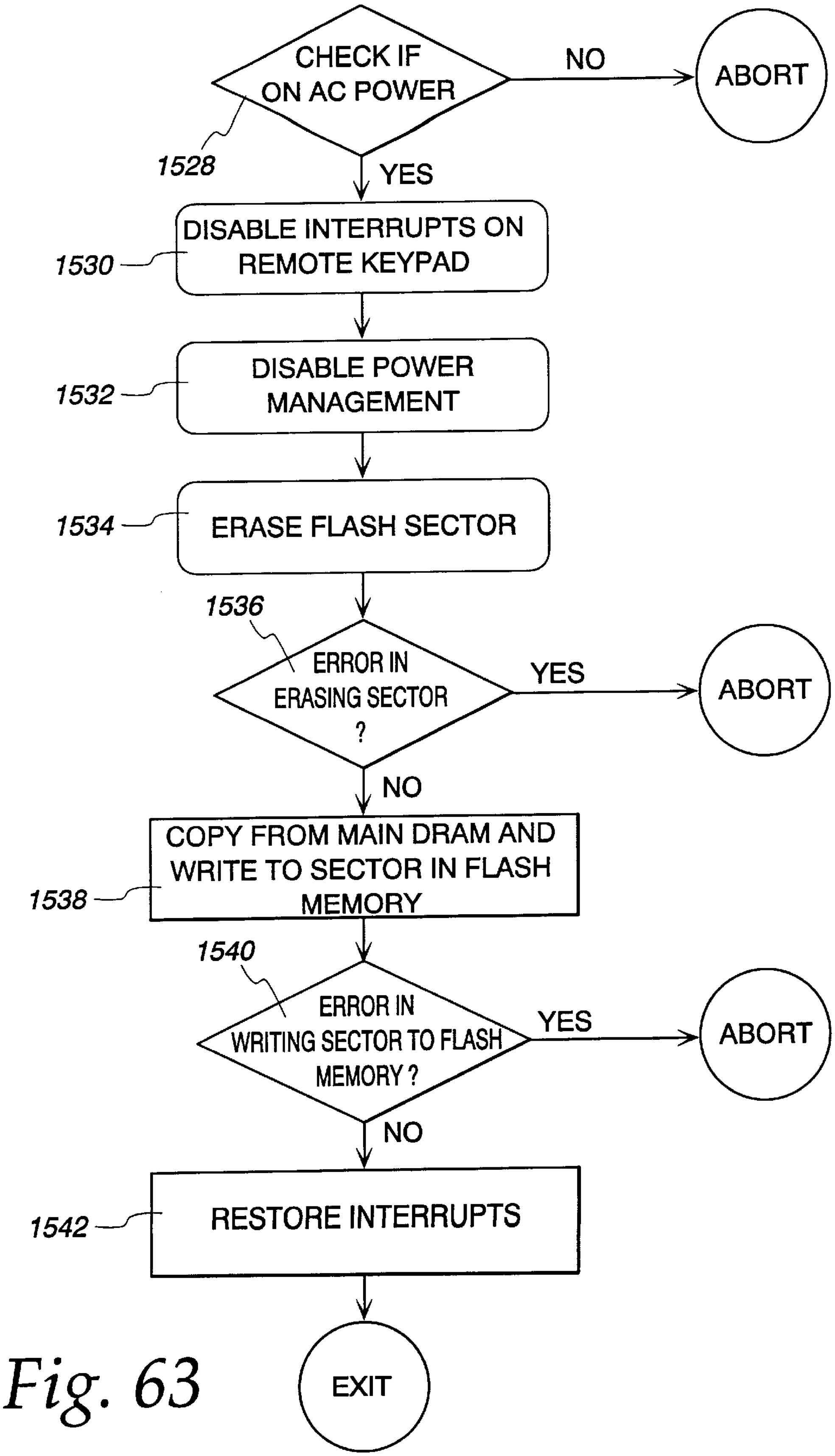

FIGS. 63A and 63B illustrate the routine for writing the flash update sectors from the DRAM 111A to the flash memory devices 742–748. Since the flash updates are stored in the DRAM memory 11A, the programming is aborted if the AC power is turned off as determined in step 1528 since the flash update data in the DRAM 111A will be lost when the battery is exhausted. In order to prevent errors during programming, interrupts, as well as the power management, are disabled on the wireless interface device 100 in steps 1530 and 1532. After the interrupts and the power management are disabled, the flash memory device is erased in step 1534. If errors occur during erasure, as determined in step 1536, updating of the particular flash memory device 742–748 is aborted. If not, a sector from the DRAM 111A is written to the flash memory devices 742–748 in step 1538. After the sector is written to the flash memory devices 742–748, the system checks in step 1540 whether any errors occurred. If so, the update is aborted. If not, the interrupts, as well as the power management, are enabled in step 1542 when all sectors have been reflashed.

18. Automatic Reconnect

Figure 64A:
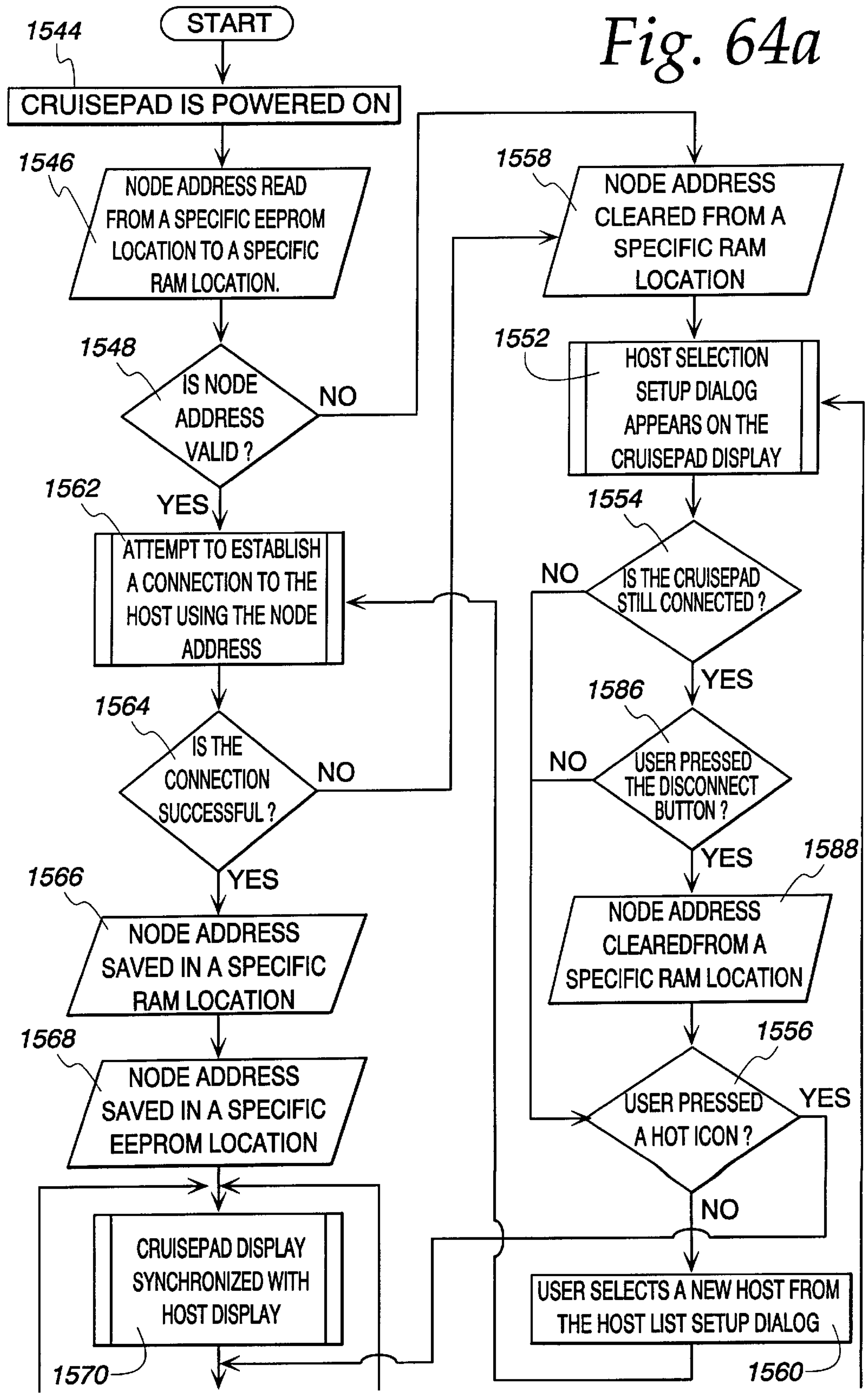
FIGS. 64A and 64B are flow charts relating to a system for providing automatic reconnection of the host.
Figure 64B:
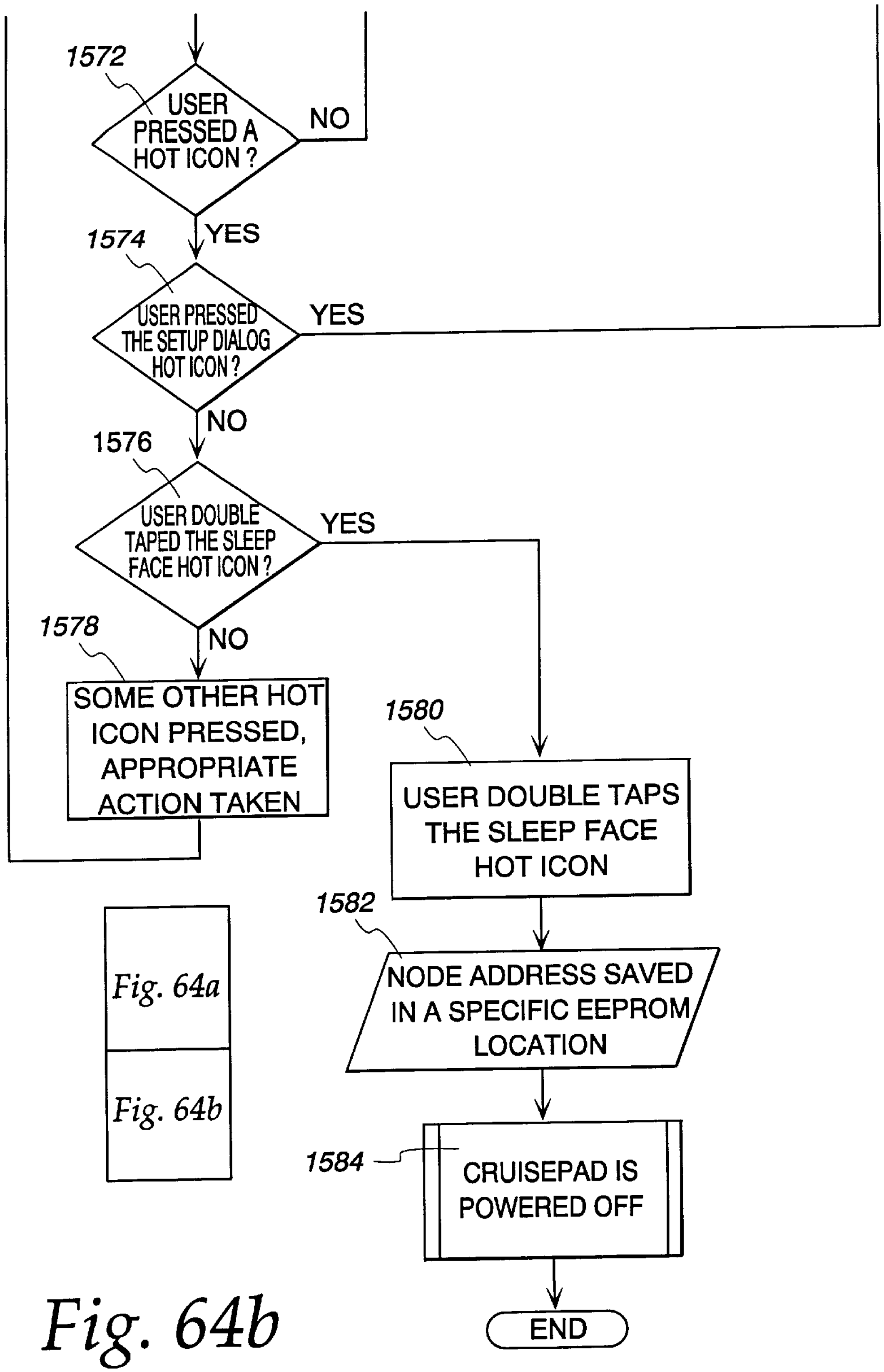

As mentioned above, the wireless interface device 100 can be connected to any of the available hosts 101 that appear in the dialog box illustrated in FIG. 53 in the manner described above. The system illustrated in FIGS. 64A and 64B obviates the need for the user to select a host 101 for connection each time the wireless interface device 100 is powered up, by automatically connecting the wireless interface device 100 to the last host 101 to which it was successfully connected. As will be discussed in more detail below, when a host 101 is selected from the dialog box illustrated in FIG. 53 for connection to the wireless interface device 100 and a connection is successfully achieved, the node address of that host 101 is stored in the EEPROM 111B (FIG. 12). Subsequently, once the wireless interface device 100 is powered up in step 1544, the system reads the node address from the EEPROM 111B, and reads it to a specific location in DRAM 111A (FIGS. 18 and 24) in step 1546. After the node address is written to the DRAM 111A, the system checks the node address to determine whether it is valid in step 1548. Invalid node addresses occur anytime the wireless interface device 100 makes an attempt to connect to a host 101, which fails during automatic reconnecting or is later disconnected by the end user. Thus, if a successful connection is not made or if there is a manual disconnection, the node address is cleared from the DRAM 111A in step 1550 and thus will be invalid. Subsequently, if the automatic reconnect fails in order to facilitate connection of the wireless interface device 100 to another available host 101, the set-up dialog box illustrated in FIG. 53 is displayed on the display 113C of the wireless interface device 100 in step 1552. After the host selection set-up dialog box is displayed on the wireless interface device 100, the system checks in step 1554 whether the wireless interface device 100 is connected to an available host 101. Normally, if an invalid address is found in step 1548 and the host selection set-up dialog box appears on the display 113C of the wireless interface device 100, there will be no connection to an available host 101 and the system will jump to step 1556, where it checks if the hot icon area 1202 (FIG. 37) has been depressed. Normally in this situation, since the host selection dialog box is already being displayed on the screen 113C of the wireless interface device 100, the only hot icon that can affect the situation is a sleep-face hot icon 1558

(FIG. 37), which places the wireless interface device 100 in a low-power sleep mode. In a normal situation when the wireless interface device 100 is first powered up, the sleep-faced hot icon 1558 is not depressed and the system waits for the user to select an available host 101 from the host set-up dialog box illustrated in FIG. 53 as discussed above in step 1560. Once an available host 101 is selected, the system loops back to step 1562 and attempts to establish connection with the selected host 101.

In step 1564 the system checks whether or not the connection was successful. If not, the system goes to step 1550 and clears the node address for the selected host 101 from the DRAM 111A and displays the host selection set-up dialog box in step 1552. If the connection between the wireless interface device 100 and the host 101 is successful, the node address of the host 101 is saved in a specific DRAM location in step 1566, and in turn, written to the EEPROM 111B (FIG. 12) in step 1568. After the node address of the selected host 101 is stored in EEPROM 111B, the wireless interface device 100 will display whatever is being displayed on the host 101 in step 1570.

After a connection is established between the host 101 and the wireless interface device 100, the system continuously checks for hot icons being selected in step 1572. If no hot icons are selected, the system will loop back and continue to check for the selection of a hot icon. If the system determines that a hot icon is selected, the system checks in step 1574 whether the set-up dialog hot icon 1410 (FIG. 37) was selected. If so, the system loops back to step 1552 and displays the host selection set-up dialog box illustrated in FIG. 53 on the display 113C of the wireless interface device 100. If the set-up dialog hot icon 1410 is not selected, the system checks in step 1576 whether the sleep-face hot icon 1558 is selected in step 1576. If not, the system checks in step 1578 whether other hot icons in the hot icon area 1202 (FIG. 36) were selected and the appropriate action is taken. The system then goes to step 1570 and, in turn, and continually checks for the selection of other hot icons in step 1572.

If it is determined in step 1576 that the sleep-face hot icon 1410 is selected, the system checks in step 1580 whether a double pen-down event occurred at the location of the sleep-face hot icon 1410. As mentioned above, the sleep-face hot icon 1410 causes the wireless interface device 100 to go into a low-power mode. However, before placing the wireless interface device 100 in a low-power mode, the node address of the host 101 to which the wireless interface device 100 is connected is saved in a specific location of the DRAM 111A and, in turn, written to the EEPROM 111B in step 1582. After the node address is saved, the wireless interface device 100 is powered down in step 1584.

The system discussed above is thus able to automatically connect the wireless interface device 100 to the last host 101 to which it was connected. After the automatic reconnect, should the set-up window hot icon 1410 (FIG. 37) be selected, the host selection set-up dialog box illustrated in FIG. 53 will be displayed on the screen 113C of the wireless interface device 100. Subsequently, the system will go to step 1554 and check whether the wireless interface device 100 is connected to a host 101. In this case, since the wireless interface device 100 will still be connected to the available host, the system then checks in step 1586 whether a disconnect button on the host selection dialog box illustrated in FIG. 53 has been depressed. If not, the system goes to step 1556 and continuously waits for a hot icon in the hot icon area 1202 (FIG. 36) of the LCD 113C to be depressed. If the disconnect button in the host selection set-up dialog box illustrated in FIG. 53 is depressed, the node address for the host 101 to which the wireless interface device 100 is connected is erased from the specific location in the DRAM 111B in step 1588. Subsequently, the system goes to step 1556 and waits for a hot icon in the hot icon area 1202 (FIG. 37) to be depressed.

19. Remote Occlusion Region

As mentioned above, the wireless interface device 100 includes a virtual on-screen keyboard (OSK), as illustrated in FIG. 66. More particularly, the OSK is configurable by the buttons 1590, 1592, 1594 and 1596 in a control box located at the top of the OSK. These buttons 1590, 1592, 1594 and 1596 enable the OSK to be configured. For example, a button 1590 displays the OSK as illustrated in FIG. 66A with a full keyboard and numeric keypad. The button 1592 is a toggle which displays the keyboard without the numeric keyboard as illustrated in FIG. 66B. The button 1594 displays the numeric keypad with the NUM LOCK off as illustrated in FIG. 66C, or alternatively displays the OSK as a numeric keyboard NUM LOCK on as illustrated in FIG. 66D. The button 1596 allows the size of the OSK to be varied. The "X" button closes the window displaying the OSK.

As mentioned above, the display 113C on the wireless interface device 100 displays whatever is being displayed on the host 101 when a connection is made. Since the graphics for the OSK is generated locally at the wireless interface device 100, a remote occlusion region is generated at the host 101 to prevent the host 101 from painting over the OSK on the display 113C of the wireless interface device 100. The remote occlusion region is analogous to a window in the display of the host 101 in which the host 101 is prevented from using.

Figure 65A:
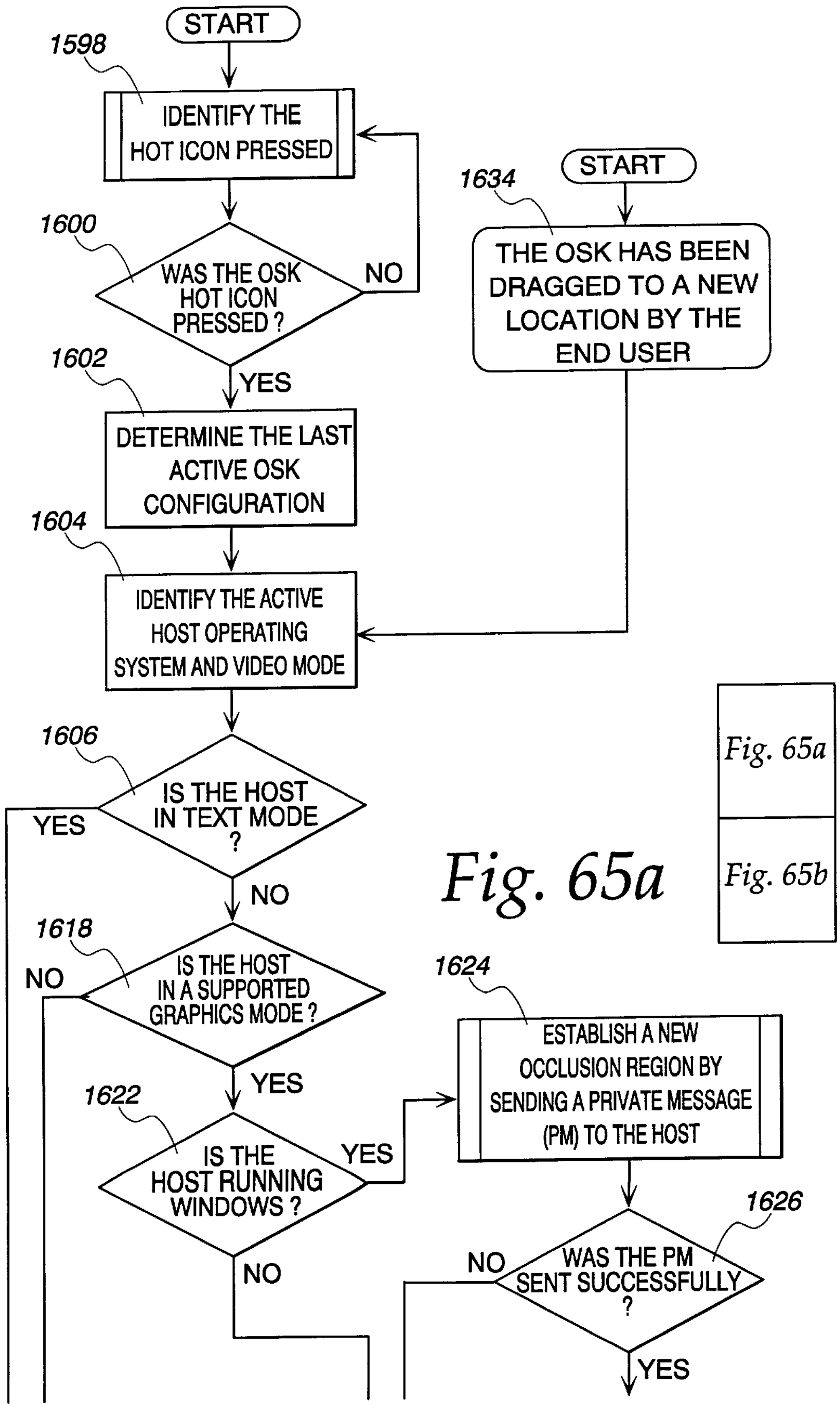
FIGS. 65A and 65B are flow charts relating to providing a remote occlusion region on the wireless interface device.
Figure 65B:
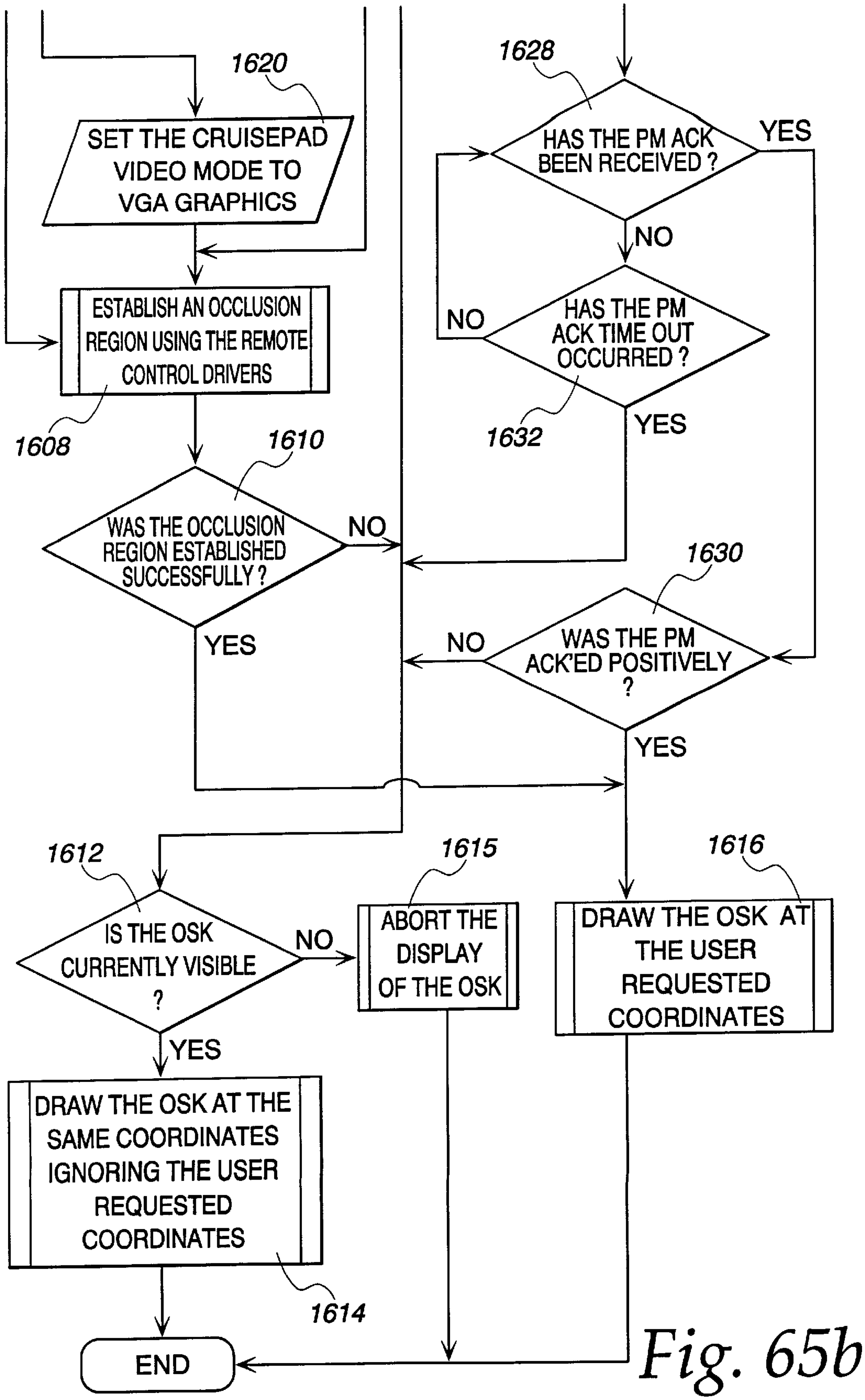

Referring to FIG. 65A, the system monitors the hot icon area 1202 (FIG. 36) to determine if any of the hot icons have been pressed. As discussed above, the system includes an OSK hot icon 1480 (FIG. 37), which displays the OSK on the LCD 113C of the wireless interface device 100 when depressed. If the system determines in step 1598 that a hot icon has been depressed, it checks in step 1600 whether the OSK hot icon 1480 was pressed. If not, the system loops back to 1598 and continually checks for hot icons being pressed. If the OSK hot icon 1480 has been depressed, the system determines the last configuration for the OSK in step 1602 (i.e. FIGS. 66A–66D). Once the configuration of the last OSK is determined in step 1602, the system then checks the operating system and video mode of the host 101 in step 1604. Depending on whether the host 101 is in text or graphics mode will determine whether the OSK image on the wireless interface device 100 is merely shadowed onto the display of the host 101 by way of a private message, as will be discussed in more detail below, or whether the remote occlusion region at the host 101 is established by drivers in the host software, which create the remote occlusion region by way of ASCII characters. Thus, in step 1606, if the system determines that the host 101 is in the text mode, an occlusion region on the display of the host 101 is created using the host control drivers in step 1608. In step 1610, the system checks whether the occlusion region was successfully established. If not, the system then checks in step 1612 whether the OSK is currently visible on the display 113C of the wireless interface device 100. If not, the display of the OSK is aborted in step 1614. If it is determined in step 1612 that the OSK is currently visible on the LCD 113C of the wireless interface device 100, any reconfiguration of the OSK is ignored and the configuration of the last OSK is continuously displayed in step 1614. If it is determined in step 1610 that the remote occlusion region is successfully established, the system goes to step 1616, which enables the OSK to be used.

If it is determined in step 1606 that the host 101 is not in a text mode, the system checks in step 1618 whether the host 101 is in a graphics mode. If not, the system goes to step 1620 and sets the video mode to VGA graphics in the wireless interface device 100 and subsequently proceeds to step 1608 to establish the occlusion region in the host 101 by host control drivers. If the host is in a graphics mode, the system next checks in step 1622 whether the host 101 is running a Windows application. If not, the system returns to step 1608 and establishes the occlusion region on the display of the host 101 using the host control drivers.

If it is determined in step 1622 that the host 101 is running a Windows application, the occlusion region on the host 101 is established by way of a private message sent by the wireless interface device 100 to the host 101 in step 1624. After the private message is sent, the system checks in step 1626 to determine if it was successfully sent. If not, the system proceeds to step 1612 and checks to determine if an OSK is currently visible. If the private message is successfully sent, the system checks in step 1628 whether the private message was successfully received by the host 101. If so, the system goes to step 1630 and checks whether the private message was acknowledged by the host 101. If so, the system goes to step 1616 and draws the OSK at the user-requested coordinates. If not, the system goes to 1612. If it is determined in step 1628 that the private message has not been received, the system continually checks for receipt of the private message for a predetermined time-out period in step 1632. Should a time-out occur before the private message is acknowledged by the host 101, the system again will go to step 1612.

Figure 66A:
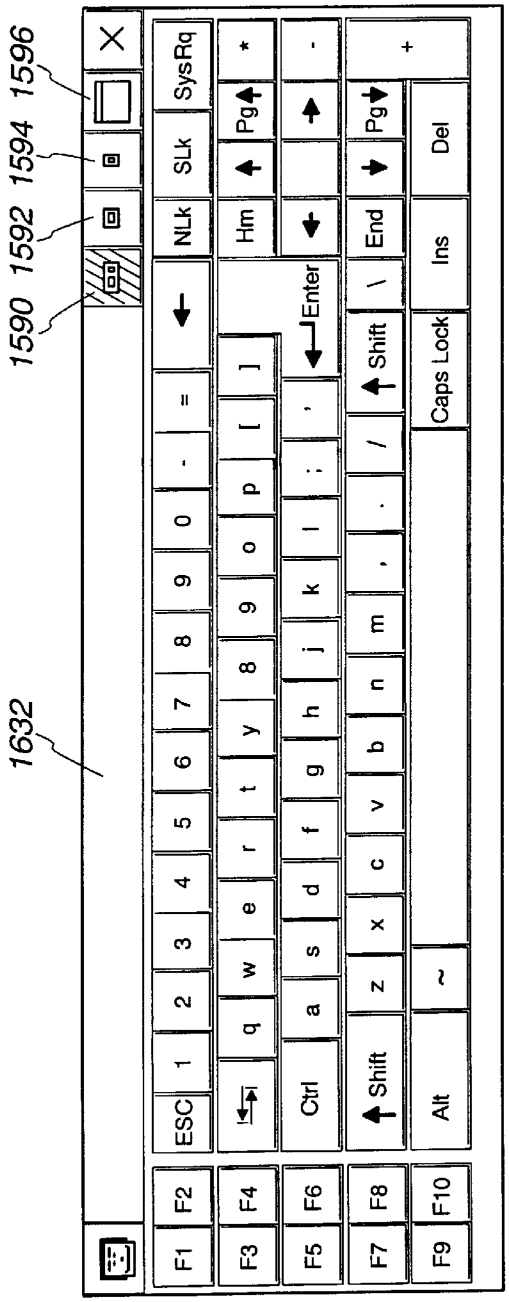
FIGS. 66A–66D illustrate the various configurations of an on-screen keyboard available on the wireless interface device.
Figure 66B:
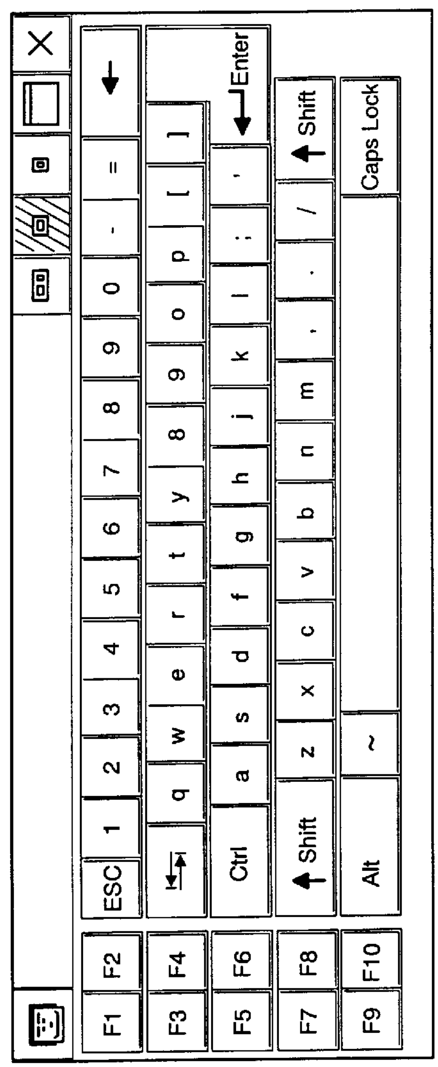
Figure 66C:
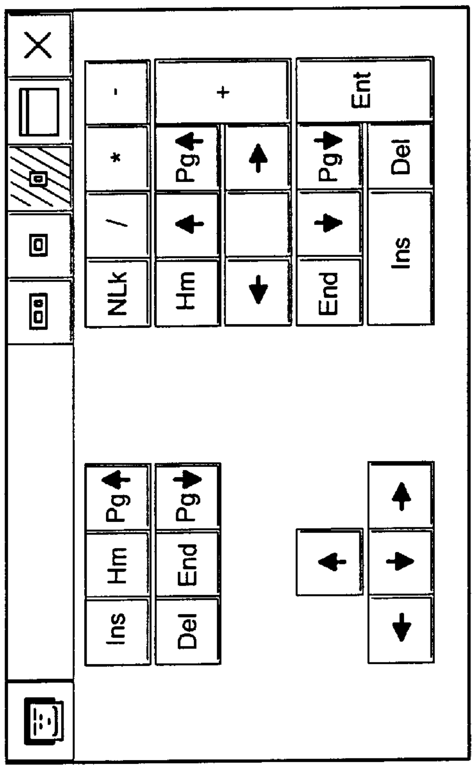
Figure 66D:
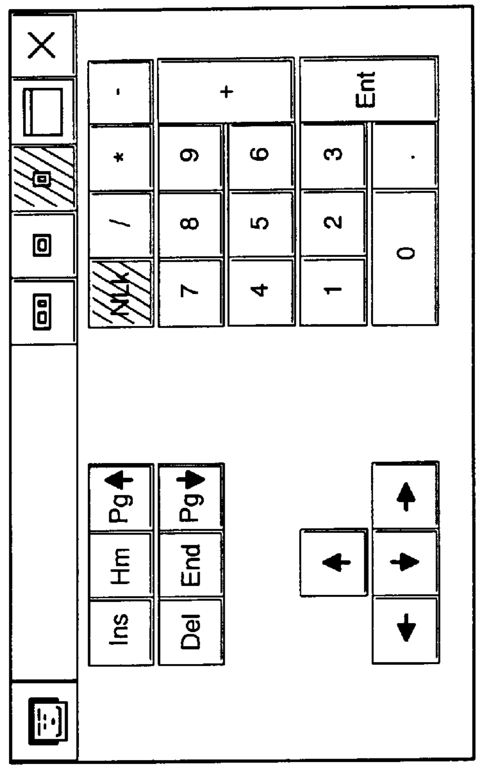

The OSK includes a control bar 1632 (FIG. 66A). The control bar 1632 enables the location of the OSK on the LCD 113C of the wireless interface device 100 to be changed by touching the control bar 1632 with the pen and dragging it to the desired location on the LCD 113C of the wireless interface device 100. Anytime the user changes the location of the OSK on the LCD 113C of the wireless interface device 100 as acknowledged by the system in step 1634, the system then returns to step 1604 to determine the video mode of the host computer 101. As discussed above, the video mode determines whether the remote occlusion region on the display of the host 100 is created by shadowing the OSK on the display of the host by way of the private message or whether the occlusion region on the display of the host is created by local drivers using ASCII characters. The system then goes to step 1606.

Obviously, many modifications and variations of the present invention are possible in light of the above teachings. Thus, it is to be understood that, within the scope of the appended claims, the invention may be practiced otherwise than as specifically described above.

What is claimed and desired to be secured by letters patent of the United States is:

1. A wireless interface device for use with one or more host computers and a wireless communications link, said one or more host computers having a CPU and a storage device for running and storing programs and an associated display for displaying images, the wireless interface device comprising:

a display;

input means for receiving inputs to said wireless interface device;

means for displaying on said display any images that are being displayed on said host computer and for displaying locally generated images once a wireless connection is established;

means for wirelessly communicating with a plurality of host computers and establishing a wireless connection between one of said plurality of host computers and said wireless interface device;

means for enabling said wireless interface device to take control of and access said host computer to which a wireless connection has been established with said wireless interface device and said programs on said host computers;

means for disabling predetermined input and output devices of said host computer; and means for returning control to said host computer.

2. The wireless interface device as recited in claim 1, wherein said communicating means employs a radio link.

3. The wireless interface device as recited in claim 1, wherein said input means is configured to be responsive to a passive stylus.

4. The wireless interface device as recited in claim 3, wherein said input means includes means for operating in first and second modes.

5. The wireless interface device as recited in claim 4, wherein said first mode is a mouse mode.

6. The wireless interface device as recited in claim 4, wherein said second mode is a pen mode.

7. The wireless interface device as recited in claim 1, wherein said enabling means is configured to display a virtual keypad, said virtual keypad operable to receive inputs for controlling said host computer.

8. The wireless interface device as recited in claim 1, wherein said disabling means is user selectable.

9. A wireless interface device for communicating with a remote host computer having a CPU and a CPU input device including a keyboard, a mouse and a wireless communication link and a storage device for running and storing programs, the wireless interface device comprising:

a display adapted to display whatever images that are being displayed on said remote host computer and for displaying locally generated images when said communication link is established;

a transceiver configured for communicating with said host computer by way of said communication link; and means for enabling said wireless interface device to communicate with one or more host computers and establishing a wireless connection with one of said host computers;

means for enabling said wire control of and access said host computer to which a wireless connection has been established with said wireless interface device and said programs on said host computer in addition said CPU input devices, said means for enabling including means for disabling predetermined input and output devices of said host computer.

10. The wireless interface device as recited in claim 9, wherein said remote link is a radio link.

11. The wireless interface device as recited in claim 9, wherein said viewer manager is configured to be responsive to a passive stylus.

12. The wireless interface device as recited in claim 11, wherein said viewer manager is configured to operate in first and second modes.

13. The wireless interface device as recited in claim 12, wherein said first mode is a mouse mode.

14. The wireless interface device as recited in claim 12, wherein said second mode is a pen mode.

15. The wireless interface device as recited in claim 9, wherein said viewer manager is configured to display a virtual keyboard, said virtual keyboard operable to receive inputs for controlling said host computer.

16. A method for allowing a wireless interface device to communicate with a remote host computer having a CPU and a storage device for running and storing programs and an associated display for displaying images, the method comprising:

communicating wirelessly with one or more said host computers;

establishing a wireless connection with one of said one or more host computers;

receiving input into said wireless interface device;

displaying on a display on said wireless interface device images being displayed on said host computer to which a wireless connection has been established with said wireless interface device and for displaying locally generated images once a wireless connection is established between said wireless interface device and said host computer; and enabling said wireless interface device to take control of and access said host computer and said programs on said host computer after communication is established;

disabling one or more host computer input and display devices when said wireless interface device thus control of said host computer.

* * * * *

UNITED STATES PATENT AND TRADEMARK OFFICE

CERTIFICATE OF CORRECTION

PATENT NO. : 6,137,473
DATED : October 24, 2000
INVENTOR(S) : Cotopassi et al.

It is certified that error appears in the above-identified patent and that said Letters Patent is hereby corrected as shown below:

Column 56,
Line 43, delete "and".
Line 47, insert "and" after semicolon.

Column 58,
Line 12, delete "thus" and insert -- is in --.

Please add the attached appendix after column 58, line 13.

Signed and Sealed this

Fifth Day of February, 2002

*Attest:*

JAMES E. ROGAN

*Attesting Officer*

*Director of the United States Patent and Trademark Office*

APPENDIX

Copr 1995 Zenith Data Systems Corp

```
#include "cr.h"
#include "sio.h"
#include "spawn.h"
#include "frame.h"
#include "sm.h"
#include "sl.h"

#if defined( _MSC_VER )
#pragma warning( disable : 4704 )
#endif

static char szPrompt[] = STR_PROMPT;
static char szLSLProg[] = STR_LSL;
static char szLSLProgParm[
SL_LSL_CMD_LENGTH ];
static char szIPXODIProg[] = STR_IPXODI;
static char szProximProg[] = STR_PROXIM;
static char szSMANProg[] =
STR_SMANPROGNAME;
static char szSViewProg[] =
STR_SVIEWPROGNAME;
static char szSViewParm[] =
STR_WELCOMESCREEN;
static char szPenDrvProg[] =
STR_PDRVPROGNAME;
static char szSDrvNetProg[] =
STR_SDRVNETPROGNAME;
static char szRWinProg[] = STR_RWINPROGNAME;
static char szCommandProg[] =
STR_COMMANDPROGNAME;
static char szCommandParm[] =
STR_COMMANDPARM;
static char szCommandDir[] = STR_COMMANDDIR;
static char szFormatPrompt[ 10 ];
static char szCommandLine[ 80 ];
static char szNullStr[] = "\0";
static char szOutStr[ 80 ];
static char szProgParmsStr[ 80 ];

static BOOL fExit, fNextCommand, fAutoStart =
FALSE, fError =
FALSE;
static BYTE fVIDRedir = FALSE, fTitleScreen =
FALSE, fLoadSMLow =
FALSE,
        fAllowAbort = FALSE;
static char *cToken, *szProgName, *szProgParms;

static int iErrorCode = ERR_SUCCESS;
static int iCol;
static WORD wParms;
static word aiwrStack[ MAX_STACKSIZE + 1 ];

static GENERALSTATEIDXS iGeneralState;
static COMMANDSTATEIDXS iCommandState;
static TRAPREC VIDTrapRec;
static TRAPREC SMTrapRec;

void main()
{
  int iCmdLineIdx;
  BYTE nLenCmdLine;

  sprintf( szFormatPrompt, "\n%s", szPrompt );

  chk_video();
  get_crs();
  crs_x = bcrs_x;
  crs_y = bcrs_y;
  mv_crs();

  fExit = FALSE;

  iCmdLineIdx = str_pos( '-', cmd_line );
  nLenCmdLine = str_len( cmd_line );

  while ( iCmdLineIdx > 0 && iCmdLineIdx <
nLenCmdLine )
  {
    switch ( cmd_line[ iCmdLineIdx ] | 0x20 )
    {
      case 'g':
        fAutoStart = TRUE;

        if ( ( ( cmd_line[ iCmdLineIdx + 1 ] | 0x20 ) ==
'Y' ) )
        {
          fTitleScreen = TRUE;
          fVIDRedir = TRUE;
        }
        break;

      case 'l':
        fLoadSMLow = TRUE;
        break;

      case 'a':
        fAllowAbort = TRUE;
        break;

      default:
        printf( "\nERROR: invalid parameter\n" );
        break;
    }

    *( cmd_line + iCmdLineIdx - 1 ) = ' ';

    iCmdLineIdx = str_pos( '-', cmd_line );
  }

  if ( fVIDRedir )
  {
    printf( "Saratoga Loader, Copyright (c) 1994-1995
Zenith Data
Systems\n" );
    printf( "Mobile Systems Engineering, Version
1.1\n" );
  }

  if ( fAutoStart )
  {
    clr_scr();

    crs_x = 0;
    crs_y = 0;
    mv_crs();

    if ( fTitleScreen )
    {
      RunProgram( szSViewProg, szSViewParm );
    }

    if ( KeyPressedIn( 2 ) )
    {
      switch( GetActionKey() )
      {
        case KBD_DIAG:
          change_dir( szCommandDir );
          RunProgram( szCommandProg,
szCommandParm );
          DoExit( 1 );
          break;

        case KBD_ABORTLOAD:
          if ( fAllowAbort )
            DoExit( 1 );
          break;
      }
    }
  }

  do
  {
    iCol = 0;

    if ( fError )
      fil_chr( szCommandLine, 0, sizeof (
szCommandLine ) );
    else
      fError = FALSE;

    if ( !fAutoStart )
    {
      printf( szFormatPrompt );
      edit_str( szCommandLine,
MAX_WIDTHOFSCREEN - sizeof (
szPrompt ), &iCol, pckey );
      up_case( szCommandLine );
    }
    else
    {
      szCommandLine[0] = 'C';
      szCommandLine[1] = 'W';
      fAutoStart = FALSE;
    }

    cToken = szCommandLine;
    iGeneralState = STM_COMMAND;
    iCommandState = COM_UNKNOWN;
    fNextCommand = FALSE;

    while ( *cToken != NULL && !fNextCommand &&
!fExit )
    {
      if ( iGeneralState > STM_UNKNOWN )
        iGeneralState = STM_UNKNOWN;

      if ( ( iErrorCode = ( *InStateTableProcs[
iGeneralState ]
)() ) == ERR_INTERNAL )
        fExit = TRUE;
    }
  } while ( !fExit );

  DoExit( 0 );
}

void DoExit( int iStatus )
{
  RemoveVidTrap();
  SetVideoMode( SUI_TEXTVIDMODE | 0x80 );

  exit( iStatus );
}

int ProcessIdle( void )
{
  return ( ERR_SUCCESS );
}

int ParseCommand( void )
{
  switch ( *cToken )
  {
    case 'R':
      if ( *( cToken + 1 ) == VAL_SPACE )
      {
        iGeneralState = STM_PARM;
        iCommandState = COM_RUNPROG;
        cToken += 2;
      }
      else if ( *( cToken + 1 ) == NULL )
      {
        iGeneralState = STM_EXECUTE;
        iCommandState = COM_RUNSM;
      }
      else
        goto com_unknown;
      break;

    case 'C':
      if ( *( cToken + 2 ) == NULL )
      {
        iGeneralState = STM_EXECUTE;

        if ( *( cToken + 1 ) == 'D' )
          iCommandState = COM_RUNDOSCOS;
        else if ( *( cToken + 1 ) == 'W' )
          iCommandState = COM_RUNWINCOS;
        else
          goto com_unknown;
      }
      else
        goto com_unknown;
      break;

    case 'X':
      if ( *( cToken + 1 ) == 'X' )
        iGeneralState = STM_EXIT;
      else
        goto com_unknown;
      break;

    default:
com_unknown:
      printf( "\nERROR: command unknown" );
      fError = fNextCommand = TRUE;
  }

  return ( ERR_SUCCESS );
}

int ParseParameters( void )
{
  switch ( iCommandState )
  {
    case COM_RUNPROG:
      if ( ( wParms = str_pos( VAL_SPACE, cToken ) )
) > 0 )
      {
        *( cToken + ( wParms - 1 ) ) = NULL;
        szProgName = cToken;
        cToken += wParms;
        sprintf( szProgParmsStr, " %s\r", cToken );
        szProgParms = szProgParmsStr;
      }
      else
      {
        szProgName = cToken;
        szProgParms = szNullStr;
      }

      iGeneralState = STM_EXECUTE;
      break;

    default:
      fError = TRUE;
      printf( "\nERROR: unknown command in the
parse parameter
state" );
      break;
  }

  return ( ERR_SUCCESS );
}

int ExecuteCommand( void )
{
  if ( fVIDRedir )
    printf( "\n" );

  switch ( iCommandState )
  {
    case COM_RUNSM:
      fNextCommand = TRUE;
      RunProgram( szSMANProg, szNullStr );
      break;

    case COM_RUNDOSCOS:
    case COM_RUNWINCOS:
      fNextCommand = TRUE;

      if ( fVIDRedir )
        InitTraps( ITR_SETVIDTRAP );
      else
        InitTraps( ITR_NOSETVIDTRAP );

      if ( LoadSM( fLoadSMLow ?
SMD_ALLOCFIRSTFIT :
SMD_ALLOCBESTFIT ) != ERR_SUCCESS )
        break;

      strcpy( szLSLProgParm, " " );

      switch ( GetFrameType() )
      {
        case SL_FT_E802_2:
          strcat( szLSLProgParm,
SL_LSL_CMD_E802_2 );
          break;

        case SL_FT_EII:
          strcat( szLSLProgParm, SL_LSL_CMD_EII );
          break;

        case SL_FT_ESNAP:
          strcat( szLSLProgParm,
SL_LSL_CMD_ESNAP );
          break;

        case SL_FT_E802_3:
          strcat( szLSLProgParm,
SL_LSL_CMD_E802_3 );
          break;

        default:
          if ( fVIDRedir )
            printf( "ERROR: Invalid Frame Type
detected. The
default Frame Type 802.3 will be used.\n" );
          strcat( szLSLProgParm,
SL_LSL_CMD_E802_3 );
          break;
      }

      if (
#if defined( MOUSE )
          RunProgram( "mouse.com", szNullStr ) !=
ERR_SUCCESS
||
#else
          RunProgram( szPenDrvProg, szNullStr ) !=
ERR_SUCCESS
||
#endif
          LoadNetwork() != ERR_SUCCESS ||
          RunProgram( szSDrvNetProg, " -N1
-O2048 -WT20V" ) !=
ERR_SUCCESS )
        break;

      if ( iCommandState == COM_RUNWINCOS )
        RunProgram( szRWinProg, szNullStr );

      KickSUI();
      break;

    case COM_RUNPROG:
      fNextCommand = TRUE;
      RunProgram( szProgName, szProgParms );
      break;

    default:
      fError = TRUE;
```

```
        printf( "\nERROR: unknown command in the
execution state"
);
        break;
    }

  return ( ERR_SUCCESS );
}

int ProcessSLExit( void )
{
  fExit = TRUE;

  return ( ERR_SUCCESS );
}

int ProcessStateUnknown( void )
{
  printf( "\nERROR: unknown state" );

  return ( ERR_INTERNAL );
}

int RunProgram( char *szProgName, char
*szProgParms )
{
  int iSpawnReturn;

  if ( ( iSpawnReturn = spawn_ar( szProgName,
szProgParms ) ) >=
0 )
    iSpawnReturn = ERR_SUCCESS;
  else
  {
    if ( !fVIDRedir )
      printf( "\nERROR: %s, spawn error %d",
szProgName,
              iSpawnReturn );
    fError = TRUE;
  }

  return ( iSpawnReturn );
}

int LoadMLID( char *szProgName )
{
  int iLoadIdx;

  for ( iLoadIdx = 0; iLoadIdx <
MAX_MLIDLOADRETRY; ++iLoadIdx )
  {
    if ( RunProgram( szProgName, szNullStr ) !=
ERR_SUCCESS )
      return ( ERR_INTERNAL );

    if ( GetMLIDStatus() == TRUE )
      return ( ERR_SUCCESS );
  }

  sprintf( szOutStr,
        "\nERROR: The load sequence was aborted
due to a
failure in the loading of:\n%s.\n",
        szProximProg );

  DisplayError( szOutStr );

  return ( ERR_INTERNAL );
}

int EnableKbd( void )
{
  REG_W InArgs, OutArgs;

  fil_chr( &InArgs, 0, sizeof ( InArgs ) );

  InArgs.ax = SMI_SLENABLEKBD;

  intn( &InArgs, &OutArgs, SMI_SCSINTNUM );

  return ( 0 );
}

int GetFrameType( void )
{
  REG_W InArgs, OutArgs;

  fil_chr( &InArgs, 0, sizeof ( InArgs ) );

  InArgs.ax = SMI_SLGETFRAMETYPE;

  intn( &InArgs, &OutArgs, SMI_SCSINTNUM );

  return ( OutArgs.ax );
}

int GetMLIDStatus( void )
{
  REG_W InArgs, OutArgs;

  fil_chr( &InArgs, 0, sizeof ( InArgs ) );

  InArgs.ax = SMI_SLGETMLIDSTATUS;

  intn( &InArgs, &OutArgs, SMI_SCSINTNUM );

  return ( OutArgs.ax );
}

void SetOldVidVector( LONG lOldVidVector )
{
  REG_W InArgs, OutArgs;

  fil_chr( &InArgs, 0, sizeof ( InArgs ) );

  InArgs.ax = SMI_SLDEFINEOLDVIDVECTOR;
  InArgs.bx = OFF( lOldVidVector );
  InArgs.dx = SEG( lOldVidVector );
  intn( &InArgs, &OutArgs, SMI_SCSINTNUM );
}

int KickSUI( void )
{
  REG_W InArgs, OutArgs;

  RemoveVidTrap();

  fil_chr( &InArgs, 0, sizeof ( InArgs ) );

  InArgs.ax = SMI_SLLOADSUI;

  intn( &InArgs, &OutArgs, SMI_SCSINTNUM );

  EnableKbd();

  return ( 0 );
}

int LoadSM( int iMemStrategy )
{
  int iRunStatus;

  if ( iMemStrategy != SMD_ALLOCFIRSTFIT )
  {
    PatchMCB();
    SetMemStrategy( iMemStrategy );
  }

  iRunStatus = RunProgram( szSMANProg
szNullStr );

  SetMemStrategy( SMD_ALLOCFIRSTFIT );

  return ( iRunStatus );
}

int LoadNetwork( void )
{
  if ( RunProgram( szLSLProg, szLSLProgParm ) !=
ERR_SUCCESS ||
      LoadMLID( szProximProg )              !=
ERR_SUCCESS ||
      RunProgram( szIPXODIProg, szNullStr ) !=
ERR_SUCCESS )
    return ( ERR_INTERNAL );

  return ( ERR_SUCCESS );
}

int KeyPressedIn( int iDelay )
{
  int iTickCount;
  long lSyncCount;

  kbflag = 0;

  if ( !fVIDRedir )
  {
    if ( fAllowAbort )
      printf( "\n[CTRL]+[ALT]+A to abort load
sequence or
[CTRL]+[ALT]+D to load diagnostic...\n" );
    else
      printf( "\n[CTRL]+[ALT]+D to load
diagnostic...\n" );
  }

  for ( iTickCount = 0; iTickCount < iDelay;
++iTickCount )
  {
    lSyncCount = sync_ticks();

    while ( TRUE )
    {
      if ( sync_ticks() - lSyncCount >= 20 )
        break;

      if ( anykey() )
        return ( TRUE );
    }
  }

  return ( FALSE );
}

ACTIONKEYS GetActionKey( void )
{
  WORD wKey;

  if ( anykey() )
  {
    wKey = getkey();

    if ( kbflag & KBD_CTRLMASK &&
         kbflag & KBD_ALTMASK )
    {
      switch( wKey )
      {
        case KBD_DSCAN:
          return ( KBD_DIAG );

        case KBD_ASCAN:
          return ( KBD_ABORTLOAD );
      }
    }
  }

  return ( KBD_NOACTIONKEY );
}

void InitTraps( BYTE nVidTrapStatus )
{
  install_trap( ( fp )TrapService, MAX_STACKSIZE *
sizeof ( int
), SMD_FULLREENTER );
  enable_tsr( alsrStack, MAX_STACKSIZE * sizeof (
int ) );

  if ( nVidTrapStatus == ITR_SETVIDTRAP )
  {
    VIDTrapRec.tr_int = SBS_VIDINTNUM;
    VIDTrapRec.tr_asm_srv =
CRU_ONBUSYOLDINT;

    add_trap( &VIDTrapRec );

    fVIDRedir = TRUE;
  }

  SMTrapRec.tr_int = SBS_SLINTNUM;
  SMTrapRec.tr_asm_srv = CRU_ONBUSYOLDINT;

  add_trap( &SMTrapRec );
}

BOOL RemoveVidTrap( void )
{
  BOOL fReturn = FALSE;
  DWORD dwCurrVidTrap;
  DWORD dwOldVidTrap = VIDTrapRec.tr_old_int;

  PCB_BEGINCRITICAL;

  if ( VIDTrapRec.tr_int > 0 )
  {
    SetOldVidVector( dwOldVidTrap );
    if ( ( dwCurrVidTrap = clr_trap( &VIDTrapRec ) )
!=
dwOldVidTrap )
      set_int_vec( SBS_VIDINTNUM, dwCurrVidTrap
);


    VIDTrapRec.tr_int = 0;

    fReturn = TRUE;
    fVIDRedir = FALSE;
  }

  PCB_ENDCRITICAL;

  return ( fReturn );
}

void DisplayError( char *szErrStr )
{
  RemoveVidTrap();
  SetVideoMode( SUI_TEXTVIDMODE | 0x80 );

  printf( szErrStr );
}

WORD TrapService( struct trap_rec *CurrTrapRec )
{
  struct REGW InRegs, OutRegs;
  WORD wFlags;

  GetForegroundRegs( &InRegs );

  switch ( CurrTrapRec->tr_int )
  {
    case SBS_VIDINTNUM
      switch ( HIBYTE( InRegs.ax ) )
      {
        case SBS_TELETYPE:
          break;

        case SBS_RELOCATEDSCRADD:

          wFlags = intn( &InRegs, &OutRegs,
SBS_VIDINTNUM );
          SetForegroundRegsFlags( &OutRegs,
SFR_SETFLAGS, wFlags
);
          SetVideoMode( SUI_INITIALVIDMODE );

          break;

        default:
          return ( ( WORD )CurrTrapRec );
      }
      break;

    case SBS_SLINTNUM
      wFlags = intn( &InRegs, &OutRegs,
SBS_INTNUM );
      SetForegroundRegsFlags( &OutRegs,
SFR_SETFLAGS, wFlags );
      break;

    default:
      return ( ( WORD )CurrTrapRec );
  }

  return ( 0 );
}

void GetForegroundRegs( struct REGW *InRegs )
{
  register struct ereg *s;
  register struct REGW *r;
  struct glob_stk far *p;

  r = InRegs;
  s = _int_frame;

  r->es = s->es;
  r->bp = s->bp;
  r->di = s->di;
  r->si = s->si;
  r->cx = s->cx;

  *(word*)&p = s->saved_sp;
  *(((word*)&p)+1) = s->saved_ss;

  r->ds = p->ds;
  r->dx = p->dx;
  r->bx = p->bx;
  r->ax = p->ax;
}

void SetForegroundRegsFlags( struct REGW
*OutRegs, BYTE
fSetFlags, WORD wFlags )
{
  struct ereg *s;
  struct REGW *r;
  struct glob_stk far *p;

  r = OutRegs;
  s = _int_frame;

  s->es = r->es;
  s->bp = r->bp;
  s->di = r->di;
  s->si = r->si;
  s->cx = r->cx;

  p = ( struct glob_stk far * )MK_FP( s->saved_ss,
s->saved_sp );


   p->ds = r->ds;
   p->dx = r->dx;
   p->bx = r->bx;
   p->ax = r->ax;

   if ( fSetFlags == SFR_SETFLAGS )
     p->Flags = wFlags;
}

WORD SetVideoMode( BYTE nRequestedMode )
{
  int AX;

  AX = MAKEWORD( nRequestedMode, 0 );
```

```
 int10( AX );

 return ( 0 );
}

#if defined( _MSC_VER )
#pragma warning( default : 4704 )
#endif
Copr 1995 Zenith Data Systems Corp.

#include "cr.h"
#include "sio.h"
#include "spawn.h"
#include "frame.h"
#include "sm.h"

#define MCB_TARGETSEGMENT 0xC000
#define MCB_TARGETSEGSIZE 0x1000
#define MCB_OWNERDOS 0x0008

MCB far *GetFirstMCB( void );
MCB far *GetNextMCB( MCB far *lpCurrMCB );
MCB far *GetLastMCB( void );

int PatchMCB( void )
{
 MCB far *lpLastMCB;
 MCB far *lpBeyondLastMCB;
 MCB far *lpTargetMCB;

 PCB_BEGINCRITICAL

 if ( ( lpLastMCB = GetLastMCB() ) == NULL )
  return ( ERR_INTERNAL );

 lpLastMCB->cType = 'M';
 lpLastMCB->wSize -= 1;

 if ( ( lpBeyondLastMCB = GetNextMCB(
lpLastMCB ) ) == NULL )
  return ( ERR_INTERNAL );

 lpBeyondLastMCB->cType = 'M'
 lpBeyondLastMCB->wSize =
MCB_TARGETSEGMENT - SEG(
lpBeyondLastMCB ) - 1;
 lpBeyondLastMCB->wOwner =
MCB_OWNERDOS;

 lpTargetMCB = ( MCB far * )MK_FP(
MCB_TARGETSEGMENT, 0 );
 lpTargetMCB->cType = 'Z';
 lpTargetMCB->wOwner = 0;
 lpTargetMCB->wSize = ( WORD
)MCB_TARGETSEGSIZE - 1;

 return ( ERR_SUCCESS );
}

int SetMemStrategy( int iStatCode )
{
 REG_W inRegs, OutRegs;
 WORD wFlags;

 fil_chr( ( NPSTR )&inRegs, 0, sizeof( REG_W ) );

 inRegs.ax = SMD_GETSETALLOCSTRAT |
SMD_SETALLOCSTRAT;
 inRegs.bx = iStatCode;

 wFlags = intn( &inRegs, &OutRegs, SMD_DOSINT
);

 if ( !( wFlags & GEN_CARRYFLAG ) )
  return ( ERR_SUCCESS );
 else
  return ( ERR_INTERNAL );
}

MCB far *GetFirstMCB( void )
{
 REG_W inRegs, OutRegs;
 WORD wFlags;
 unsigned far *lpListOfLists;

 fil_chr( ( NPSTR )&inRegs, 0, sizeof( REG_W ) );

 inRegs.ax = SMD_GETLISTOFLISTS;

 wFlags = intn( &inRegs, &OutRegs, SMD_DOSINT
);

 if ( !( wFlags & GEN_CARRYFLAG ) )
 {
  lpListOfLists = ( unsigned far * ) MK_FP(
OutRegs.es,
OutRegs.bx - 2 );
  return ( ( MCB far * ) MK_FP( *lpListOfLists, 0 ) );
 }
 else
  return ( NULL );
}

MCB far *GetNextMCB( MCB far *lpCurrMCB )
{
 return ( MK_FP( SEG( lpCurrMCB ) +
lpCurrMCB->wSize + 1, 0 ) );

}

MCB far *GetLastMCB( void )
{
 MCB far *lpLastMCB = GetFirstMCB();

 while ( TRUE )
 {
  if ( lpLastMCB == NULL )
   return ( NULL );

  lpLastMCB = GetNextMCB( lpLastMCB );

  if ( lpLastMCB->cType == 'Z' )
   return ( lpLastMCB );
 }
}

Copr. 1995 Zenith Data Systems Corp.

#include "cr.h"
#include "spawn.h"
#include "sm.h"
#include "lm.h"

BOOL f2MegFlash = FALSE;
static BYTE nCurrVidPallette = 0;
static BYTE nCurrSpeakerState = FON;
static BYTE nCurrRightMouseButton = FOFF;
static BYTE fSuspendInProgress = FOFF;

BYTE aBrightValues[] =
{
0,
3,
6,
9,
18,
21,
25,
27,
29,
31,
33
35,
37,
39,
41,
43,
45,
47,
49,
51,
53,
55,
57,
59,
};

BYTE aContrastValues[] =
{
26,
27,
28,
29,
30,
31,
32,
34,
36,
38,
39,
40,
41,
42,
43,
44,
45,
46,
47,
48,
49,
50
51,
52,
};

int SetContrast( BYTE nContrastIdx )
{
 REG_W inRegs, OutRegs;
 WORD wFlags;

 fil_chr( ( NPSTR )&inRegs, 0, sizeof( REG_W ) );

 inRegs.ax = SBS_SARATOGAFUNC;
 inRegs.bx = SBS_ADJUSTCONTRAST;
 inRegs.ax |= aContrastValues[ nContrastIdx ];

#if !defined( NOINT15 )
 wFlags = intn( &inRegs, &OutRegs,
SBS_SLINTNUM );
#else
 wFlags = 0;
#endif

 if ( !( wFlags & GEN_CARRYFLAG ) )
  return ( ERR_SUCCESS );
 else
  return ( ERR_INTERNAL );
}

int SetBrightness( BYTE nBrightnessIdx )
{
 REG_W inRegs, OutRegs;
 WORD wFlags;

 fil_chr( ( NPSTR )&inRegs, 0, sizeof( REG_W ) );

 inRegs.ax = SBS_SARATOGAFUNC;
 inRegs.bx = SBS_ADJUSTBRIGHTNESS;
 inRegs.ax |= aBrightValues[ nBrightnessIdx ];

#if !defined( NOINT15 )
 wFlags = intn( &inRegs, &OutRegs,
SBS_SLINTNUM );
#else
 wFlags = 0;
#endif

 if ( !( wFlags & GEN_CARRYFLAG ) )
  return ( ERR_SUCCESS );
 else
  return ( ERR_INTERNAL );
}

int SetPowerEnable( BYTE nPowerMonIdx )
{
 REG_W inRegs, OutRegs;
 WORD wFlags;

 fil_chr( ( NPSTR )&inRegs, 0, sizeof( REG_W ) );

 inRegs.ax = SBS_SARATOGAFUNC;
 inRegs.bx = SBS_SETPOWERENABLE;
 inRegs.ax |= ( WORD )nPowerMonIdx;

#if !defined( NOINT15 )
 wFlags = intn( &inRegs, &OutRegs,
SBS_SLINTNUM );
#else
 wFlags = 0;
#endif

 if ( !( wFlags & GEN_CARRYFLAG ) )
  return ( ERR_SUCCESS );
 else
  return ( ERR_INTERNAL );
}

int SetDozeTimeout( BYTE nDozeIdx )
{
 REG_W inRegs, OutRegs;
 WORD wFlags;

 fil_chr( ( NPSTR )&inRegs, 0, sizeof( REG_W ) );

 inRegs.ax = SBS_SARATOGAFUNC;
 inRegs.bx = SBS_SETDOZETIMEOUT;
 inRegs.ax |= ( WORD )nDozeIdx;

#if !defined( NOINT15 )
 wFlags = intn( &inRegs, &OutRegs,
SBS_SLINTNUM );
#else
 wFlags = 0;
#endif

 if ( !( wFlags & GEN_CARRYFLAG ) )
  return ( ERR_SUCCESS );
 else
  return ( ERR_INTERNAL );
}

int SetSleepTimeout( BYTE nSleepIdx )
{
 REG_W inRegs, OutRegs;
 WORD wFlags;

 fil_chr( ( NPSTR )&inRegs, 0, sizeof( REG_W ) );

 inRegs.ax = SBS_SARATOGAFUNC;
 inRegs.bx = SBS_SETSLEEPTIMEOUT;
 inRegs.ax |= nSleepIdx;

#if !defined( NOINT15 )
 wFlags = intn( &inRegs, &OutRegs,
SBS_SLINTNUM );
#else
 wFlags = 0;
#endif

 if ( !( wFlags & GEN_CARRYFLAG ) )
  return ( ERR_SUCCESS );
 else
  return ( ERR_INTERNAL );
}

int SetSuspendTimeout( BYTE nSuspendIdx )
{
 REG_W inRegs, OutRegs;
 WORD wFlags;

 fil_chr( ( NPSTR )&inRegs, 0, sizeof( REG_W ) );

 inRegs.ax = SBS_SARATOGAFUNC;
 inRegs.bx = SBS_SETSUSPENDTIMEOUT;
 inRegs.ax |= nSuspendIdx;

#if !defined( NOINT15 )
 wFlags = intn( &inRegs, &OutRegs,
SBS_SLINTNUM );
#else
 wFlags = 0;
#endif

 if ( !( wFlags & GEN_CARRYFLAG ) )
  return ( ERR_SUCCESS );
 else
  return ( ERR_INTERNAL );
}

void Set2MegFlash( BOOL fNew2MegFlash )
{
 f2MegFlash = fNew2MegFlash;
}

BOOL IsFlashSupported( void )
{
 REG_W inRegs, OutRegs;

 fil_chr( ( NPSTR )&inRegs, 0, sizeof ( inRegs ) );

 inRegs.ax  = SBS_SARATOGAFLASH;
 inRegs.ax |= SBS_FLASHAVAILABLE;

#if !defined( FLASHTEST )
 intn( &inRegs, &OutRegs, SBS_SLINTNUM );
#else
 return ( TRUE );
#endif

 return ( OutRegs.ax ==
SBS_FLASHAVAILRETCODE );
}

int FlashSector( LPSTR sFlashImageBuff, int
iCurrFlashFile )
{
 REG_W inRegs, OutRegs;
 int iFlashSector, iReturn;
 WORD wFlags;
 LONG l20BitEffAdd;

 if ( iCurrFlashFile <= 0 || sFlashImageBuff ==
NULL )
   return ( ERR_INVALIDPARM );

 if ( EnableFlashWrite( TRUE ) != ERR_SUCCESS
)
   return ( ERR_INTERNAL );

 fil_chr( &inRegs, 0, sizeof ( inRegs ) );

 if ( f2MegFlash )
  iFlashSector = SBS_2MEGBASESECTOR + (
iCurrFlashFile - 1 );
 else
  iFlashSector = SBS_1MEGBASESECTOR + (
iCurrFlashFile - 1 );

 l20BitEffAdd = ( ( LONG )SEG( sFlashImageBuff )
* 16 ) + OFF(
sFlashImageBuff );
```

```
 inRegs.ax = MAKEWORD( SBS_FLASHNOTEXT,
HIBYTE(
SBS_SARATOGAFLASH ) );
 inRegs.bx = MAKEWORD( LOBYTE( HIWORD(
l20BitEffAdd ) ),
                LOBYTE( iFlashSector ) );
 inRegs.di = LOWORD( l20BitEffAdd );

#if !defined( FLASHTEST )
 wFlags = intn( &inRegs, &OutRegs,
SBS_SLINTNUM ),
#else
 wFlags = 0,
#endif

 if ( !( wFlags & GEN_CARRYFLAG ) )
  iReturn = SBS_FLASHSUCCESS,
 else
  iReturn = HIBYTE( OutRegs.ax );

 EnableFlashWrite( FALSE );

 return ( iReturn );
}

int EnableFlashWrite( BOOL fEnable )
{
 REG_W inRegs, OutRegs,
 WORD wFlags.

 fil_chr( &inRegs, 0, sizeof ( inRegs ) ),

 inRegs.ax = MAKEWORD( LOBYTE( ( fEnable ?
SBS_ENABLEWRITE :
SBS_DISABLEWRITE ) ),
                HIBYTE( SBS_SARATOGAFUNC
) ),
 inRegs.bx = SBS_ENABLEDISABLEWRITE,

#if !defined( FLASHTEST )
 wFlags = intn( &inRegs, &OutRegs,
SBS_SLINTNUM ),
#else
 wFlags = 0;
#endif

 if ( !( wFlags & GEN_CARRYFLAG ) )
  return ( ERR_SUCCESS ),
 else
  return ( ERR_INTERNAL ),
}

int RotatePallette( void )
{
 REG_W inRegs, OutRegs;
 int iCurrVideoMode = GetCurrVidMode(),
 BYTE nNewVidPallette;

 fil_chr( ( NPSTR )&inRegs, 0, sizeof( REG_W ) );

 if ( iCurrVideoMode == SUI_INITIALVIDMODE )
 {
  if ( nCurrVidPallette != SBS_INVVIDPALLETTE )
   nNewVidPallette = SBS_INVVIDPALLETTE,
  else
   nNewVidPallette = SBS_DEFVIDPALLETTE;
 }
 else
 {
  if ( ( nNewVidPallette = nCurrVidPallette + 1 ) >
     SBS_MAXNUMVIDPAL )
   nNewVidPallette = SBS_DEFVIDPALLETTE,
 }

 inRegs.ax = ( WORD )( SBS_VIDEO |
nNewVidPallette ),
 inRegs.bx = ( WORD )( SBS_VIDEOPALLETTE );

#if !defined( NOINT15 )
 intn( &inRegs, &OutRegs, SBS_VIDINTNUM );
#else
#endif

 nCurrVidPallette = nNewVidPallette;

 return ( ERR_SUCCESS );
}

int ToggleSpeaker( void )
{
 REG_W inRegs, OutRegs;
 WORD wFlags;
 BYTE nNewSpeakerState;

 fil_chr( ( NPSTR )&inRegs, 0, sizeof( REG_W ) );

 if ( nCurrSpeakerState == FON )
  nNewSpeakerState = FOFF,
 else
  nNewSpeakerState = FON;

 inRegs.ax = SBS_SARATOGAFUNC |
nNewSpeakerState;
 inRegs.bx = SBS_ENADISSPEAKER,

#if !defined( NOINT15 )
 wFlags = intn( &inRegs, &OutRegs,
SBS_SLINTNUM );
#else
 wFlags = 0;
#endif

 if ( !( wFlags & GEN_CARRYFLAG ) )
 {
  nCurrSpeakerState = nNewSpeakerState;
  return ( ERR_SUCCESS );
 }
 else
  return ( ERR_INTERNAL );
}

BYTE GetRightMouseStatus( void )
{
 return ( nCurrRightMouseButton );
}

int EnableRightMouseButton( BYTE
nNewRightMouseButton )
{
 REG_W inRegs, OutRegs;
 WORD wFlags;

 fil_chr( ( NPSTR )&inRegs, 0, sizeof( REG_W ) );

 inRegs.ax = SBS_SARATOGAFUNC |
nNewRightMouseButton,
 inRegs.bx = SBS_ENADISRIGHTMOUSE;

#if !defined( NOINT15 )
 wFlags = intn( &inRegs, &OutRegs,
SBS_SLINTNUM );
#else
 wFlags = 0,
#endif

 if ( !( wFlags & GEN_CARRYFLAG ) )
 {
  nCurrRightMouseButton =
nNewRightMouseButton,
  return ( ERR_SUCCESS );
 }
 else
  return ( ERR_INTERNAL );
}

int SetTowerIcon( BYTE nTowerStatus, BYTE
nWavesStatus )
{
 REG_W inRegs, OutRegs,
 WORD wFlags;

 fil_chr( ( NPSTR )&inRegs, 0, sizeof( REG_W ) );

 inRegs.ax = SBS_SARATOGAFUNC |
nTowerStatus;
 inRegs.bx = SBS_TOWERWAVESICON,
 inRegs.cx = ( WORD )nWavesStatus;

#if !defined( NOINT15 )
 wFlags = intn( &inRegs, &OutRegs,
SBS_SLINTNUM );
#else
 wFlags = 0;
#endif

 if ( !( wFlags & GEN_CARRYFLAG ) )
  return ( ERR_SUCCESS ),
 else
  return ( ERR_INTERNAL );
}

int DoSleep( void )
{
 REG_W inRegs, OutRegs;
 WORD wFlags;

 fil_chr( ( NPSTR )&inRegs, 0, sizeof( REG_W ) );

 inRegs.ax = SBS_SARATOGAFUNC;
 inRegs.bx = SBS_GOTOSLEEP;

#if !defined( NOINT15 )
 wFlags = intn( &inRegs, &OutRegs,
SBS_SLINTNUM );
#else
 wFlags = 0;
#endif

 if ( !( wFlags & GEN_CARRYFLAG ) )
  return ( ERR_SUCCESS );
 else
  return ( ERR_INTERNAL );
}

int DoSuspend( BOOL fSaveEEROMData )
{
 REG_W inRegs, OutRegs;

 fil_chr( ( NPSTR )&inRegs, 0, sizeof( REG_W ) );

 if ( fSaveEEROMData )
  SetEEUIData();

 inRegs.ax = SBS_SARATOGAFUNC;
 inRegs.bx = SBS_GOTOSUSPEND;

#if !defined( NOINT15 )
 intn( &inRegs, &OutRegs, SBS_SLINTNUM );
#else
#endif

 return ( ERR_INTERNAL );
}

int SetSuspendFlagPointer( void )
{
 REG_W inRegs, OutRegs;
 WORD wFlags;

 fil_chr( ( NPSTR )&inRegs, 0, sizeof( REG_W ) );

 inRegs.ax = SBS_SARATOGAFUNC,
 inRegs.bx = SBS_SUSPENDFLAGPTR;
 inRegs.es = SEG( &fSuspendInProgress );
 inRegs.dx = OFF( &fSuspendInProgress );

#if !defined( NOINT15 )
 wFlags = intn( &inRegs, &OutRegs,
SBS_SLINTNUM );
#else
 wFlags = 0;
#endif

 if ( !( wFlags & GEN_CARRYFLAG ) )
 {
  SetSuspendFlag( FOFF );
  return ( ERR_SUCCESS );
 }
 else
  return ( ERR_INTERNAL ),
}

void SetSuspendFlag( BOOL fStatus )
{
 PCB_BEGINCRITICAL;
 fSuspendInProgress = LOBYTE( fStatus );
 PCB_ENDCRITICAL,
}

BOOL GetSuspendFlag( void )
{
 BOOL fReturn;

 PCB_BEGINCRITICAL;
 fReturn = fSuspendInProgress;
 PCB_ENDCRITICAL;

 return ( fReturn );
}

int GetSystemResumeBit( void )
{
 REG_W inRegs, OutRegs;
 WORD wFlags;

 fil_chr( ( NPSTR )&inRegs, 0, sizeof( REG_W ) );

 inRegs.ax = SBS_SARATOGAFUNC;
 inRegs.bx = SBS_GETSYSRESUMEBIT;

#if !defined( NOINT15 )
 wFlags = intn( &inRegs, &OutRegs,
SBS_SLINTNUM );
#else
 wFlags = 0;
#endif

 if ( !( wFlags & GEN_CARRYFLAG ) )
  return ( OutRegs.ax & 0x00FF );
 else
  return ( ERR_INTERNAL );
}

int ClearSystemResumeBit( void )
{
 REG_W inRegs, OutRegs;
 WORD wFlags,

 fil_chr( ( NPSTR )&inRegs, 0, sizeof( REG_W ) );

 inRegs.ax = SBS_SARATOGAFUNC;
 inRegs.bx = SBS_CLEARSYSRESUMEBIT;

#if !defined( NOINT15 )
 wFlags = intn( &inRegs, &OutRegs,
SBS_SLINTNUM );
#else
 wFlags = 0;
#endif

 if ( !( wFlags & GEN_CARRYFLAG ) )
  return ( ERR_SUCCESS );
 else
  return ( ERR_INTERNAL ),
}

int SetWaitingIcon( BYTE nWaitingIconStatus, BYTE
fBusyCursor )
{
 REG_W inRegs, OutRegs;
 WORD wFlags;

 fil_chr( ( NPSTR )&inRegs, 0, sizeof( REG_W ) );

 inRegs.ax = SBS_SARATOGAFUNC,
 inRegs.bx = SBS_WAITINGICON;
 inRegs.ax |= nWaitingIconStatus,

#if !defined( NOINT15 )
 wFlags = intn( &inRegs, &OutRegs,
SBS_SLINTNUM );
#else
 wFlags = 0;
#endif

 if ( nWaitingIconStatus ==
SBS_WAITINGICONOFF )
 {
  if ( fBusyCursor )
   EnableBusyCursor( SUI_BUSYCURSOROFF );

  GetHelIcon();
 }
 else
 {
  if ( fBusyCursor )
   EnableBusyCursor( SUI_BUSYCURSORON );

 }

 if ( !( wFlags & GEN_CARRYFLAG ) )
  return ( ERR_SUCCESS );
 else
  return ( ERR_INTERNAL );
}

int EnableKbdAfterBoot( void )
{
 REG_W inRegs, OutRegs;
 WORD wFlags,

 fil_chr( ( NPSTR )&inRegs, 0, sizeof( REG_W ) );

 inRegs.ax = SBS_SARATOGAFUNC;
 inRegs.bx = SBS_ENABLEKBD;

#if !defined( NOINT15 )
 wFlags = intn( &inRegs, &OutRegs,
SBS_SLINTNUM );
#else
 wFlags = 0,
#endif

 if ( !( wFlags & GEN_CARRYFLAG ) )
  return ( ERR_SUCCESS );
 else
  return ( ERR_INTERNAL );
}

LONG GetBatteryInfo( void )
{
 REG_W inRegs, OutRegs;
 WORD wFlags;

 fil_chr( ( NPSTR )&inRegs, 0, sizeof( REG_W ) );

 inRegs.ax = SBS_SARATOGAFUNC;
 inRegs.bx = SBS_GETBATTERYINFO,

#if !defined( NOINT15 )
 wFlags = intn( &inRegs, &OutRegs,
SBS_SLINTNUM );
#else
 wFlags = 0;
#endif
```

```
  if ( !( wFlags & GEN_CARRYFLAG ) )
#if !defined( NOINT15 )
    return ( MAKELONG( OutRegs.ax, OutRegs.bx )
);
#else
    return ( SBS_NOINT15BATTERYINFO );
#endif
  else
    return ( SBS_GETBATTERYINFOERROR );

}

WORD GetSizeOfExtendedMem( void )
{
  BYTE nExtMemHigh, nExtMemLow;

  PCB_BEGINCRITICAL

  outbl SBS_CMOSPORT,
SBS_CMOSREADHIGHBYTE );
  nExtMemHigh = inputb(
SBS_CMOSEXTENDEDMEM );
  outb( SBS_CMOSPORT
SBS_CMOSREADLOWBYTE );
  nExtMemLow = inputb(
SBS_CMOSEXTENDEDMEM );

  PCB_ENDCRITICAL

  return ( MAKEWORD( nExtMemLow,
nExtMemHigh ) );
}

int GetBIOSVersion( void )
{
  REG_W inRegs, OutRegs;
  WORD wFlags;

  fil_chr( ( NPSTR )&inRegs, 0, sizeof( REG_W ) );

  inRegs.ax = SBS_SARATOGAFUNC;
  inRegs.bx = SBS_GETBIOSVERSION;

#if !defined( NOINT15 )
  wFlags = intin( &inRegs, &OutRegs,
SBS_SLINTNUM );
#else
  wFlags = 0;
#endif

  if ( !( wFlags & GEN_CARRYFLAG ) )
#if !defined( NOINT15 )
    return ( OutRegs.ax );
#else
    return ( 0 );
#endif
  else
    return ( 0 );
}
Copr. 1995 Zenith Data Systems Corp.


#include "cr.h"
#include "sio.h"
#include "spawn.h"
#include "sm.h"

#define SMD_MAXGEARIMAGES 8

#if defined( _MSC_VER )
#pragma warning( disable : 4704 )
#endif

static char sGearImages[] = { "|/-\\|/-\\" };

static BYTE nClockReenterCount = 0;
static WORD wLastKey;
static BOOL fDispatchActive = FALSE;
static BOOL fRecsInstalled = FALSE;
static int  aEventStack[ SMD_EVENTSTACKLIMIT ];
static int  iEventStackPtr =
SMD_EVENTSTACKLIMIT - 1;
static int  iTempThreadIdx = -1;


EVENT EventQueue[ SMD_MAXTHREADS ];

int AddThread( int iIdx, NEARPROC fpThread,
APIFUNC
aAPIFuncTable[],
          THREADTYPEID ThreadTypeId, BOOL
fReentrant, LONG
lTimeLimit,
          int iRetryLimit )
{
  if ( iIdx >= SMD_MAXTHREADS )
    return ( ERR_INTERNAL );

  PCB_BEGINCRITICAL
  EventQueue[ iIdx ].fpThread = fpThread;
  EventQueue[ iIdx ].aAPIFuncTable =
aAPIFuncTable;
  EventQueue[ iIdx ].ThreadTypeId = ThreadTypeId;
  EventQueue[ iIdx ].lTimeLimit = lTimeLimit;
  EventQueue[ iIdx ].lTimeCurrent = 0L;
  EventQueue[ iIdx ].iRetryLimit = iRetryLimit;
  EventQueue[ iIdx ].iInitRetryLimit = iRetryLimit;
  EventQueue[ iIdx ].nReenterCount = 0;
  EventQueue[ iIdx ].bReentrant = fReentrant;
  PCB_ENDCRITICAL

  return ( ERR_SUCCESS );
}

BYTE IsThreadActive( int iIdx )
{
  BYTE fThreadStatus;
  NEARPROC fpThread;

  if ( iIdx >= SMD_MAXTHREADS )
    return ( FALSE );

  fpThread = EventQueue[ iIdx ].fpThread;

  PCB_BEGINCRITICAL

  fThreadStatus = ( fpThread != NULL && fpThread
!= ( NEARPROC
)SMD_THREADACTIVE );

  PCB_ENDCRITICAL

  return ( fThreadStatus );
}

void ResetTime( int iIdx )
{
  if ( iIdx >= SMD_MAXTHREADS )
    return;

  EventQueue[ iIdx ].lTimeCurrent = 0;
}

int SetRetryLimit( int iIdx, int iNewRetryLimit )
{
  if ( iIdx >= SMD_MAXTHREADS )
    return ( ERR_INTERNAL );

  PCB_BEGINCRITICAL
  EventQueue[ iIdx ].iRetryLimit = iNewRetryLimit;
  EventQueue[ iIdx ].lTimeCurrent = 0;
  PCB_ENDCRITICAL

  return ( ERR_SUCCESS );
}

BYTE GetRetryLimit( int iIdx )
{
  int iReturn;

  if ( iIdx >= SMD_MAXTHREADS )
    return ( 0 );

  if ( ( iReturn = EventQueue[ iIdx ].iRetryLimit ) < 0
)
    iReturn = 0;

  return ( iReturn );
}

BYTE GetInitRetryLimit( int iIdx )
{
  int iReturn;

  if ( iIdx >= SMD_MAXTHREADS )
    return ( 0 );

  if ( ( iReturn = EventQueue[ iIdx ].iInitRetryLimit ) <
0 )
    iReturn = 0;

  return ( iReturn );
}

int ResetRetryLimit( int iIdx )
{
  if ( iIdx >= SMD_MAXTHREADS )
    return ( ERR_INTERNAL );

  PCB_BEGINCRITICAL
  EventQueue[ iIdx ].iRetryLimit = EventQueue[ iIdx
].iInitRetryLimit;
  EventQueue[ iIdx ].lTimeCurrent = 0;
  PCB_ENDCRITICAL

  return ( ERR_SUCCESS );
}

int SetTimeLimit( int iIdx, LONG lNewTimeLimit )
{
  if ( iIdx >= SMD_MAXTHREADS )
    return ( ERR_INTERNAL );


  PCB_BEGINCRITICAL
  EventQueue[ iIdx ].lTimeLimit = lNewTimeLimit;
  PCB_ENDCRITICAL

  return ( ERR_SUCCESS );
}

THREADTYPEID GetThreadType( int iIdx )
{
  if ( iIdx >= SMD_MAXTHREADS )
    return ( ERR_INTERNAL );


  return ( EventQueue[ iIdx ].ThreadTypeId );
}

NEARPROC GetThreadAddress( int iIdx )
{
  if ( iIdx >= SMD_MAXTHREADS )
    return ( ( NEARPROC )NULL );


  return ( EventQueue[ iIdx ].fpThread );
}

int DelThread( int iIdx )
{
  int iReturn = 0;

  if ( iIdx >= SMD_MAXTHREADS || iIdx < 0 )
  {
    TRACE( "ERROR: invalid thread ID passed to
DelThread()\n" );
    return ( ERR_INTERNAL );
  }

  PCB_BEGINCRITICAL
  EventQueue[ iIdx ].fpThread = NULL;
  PCB_ENDCRITICAL

#if !defined( PROD )
  sprintf( szTempStr, "NOTICE: Temp thread
deallocated - %d\n",
iIdx );
  TRACE( szTempStr );
#endif

  return ( iReturn );
}

int InitDispatcher( void )
{
  iTempThreadIdx = GetTempEventNum();

  if ( iTempThreadIdx < 0 )
    return ( ERR_INTERNAL );

  fil_chr( ( NPSTR )EventQueue, 0, sizeof(
EventQueue ) );

  AddThread( iTempThreadIdx, InstallRecs, NULL,
SMD_ONETIME,
FALSE, INI_POLLFREQ,
          0 );

  InitVIDTrapRec();
  add_trap( GetVIDTrapRec() );

  InitPNDTrapRec();
  add_trap( GetPNDTrapRec() );

  InitSCSTrapRec();
  add_trap( GetSCSTrapRec() );

  InitPRXTrapRec();
  add_trap( GetPRXTrapRec() );

  AddThread( SMI_PNDEVENTNUM, NULL,
GetPNDFuncTable(),
SMD_ONDEMAND, FALSE,
          SMI_PNDPOLLFREQ, 0 );
  AddThread( SMI_SUIEVENTNUM, NULL,
GetSUIFuncTable(),
SMD_ONDEMAND, FALSE,
          SMI_SUIPOLLFREQ, 0 );
  AddThread( SMI_SCSEVENTNUM, NULL,
GetSCSFuncTable(),
SMD_ONDEMAND, TRUE,
          SMI_SCSPOLLFREQ, 0 );
  AddThread( SMI_PRXEVENTNUM, NULL,
GetPRXFuncTable(),
SMD_ONDEMAND, FALSE,
          SMI_PRXPOLLFREQ, 0 );
}

int ShutDownDispatcher( void )
{
  RestoreOldSUIntVec();
  return ( 0 );
}

void InstallRecs( void )
{
  DelThread( iTempThreadIdx );

  AddThread( PND_EVENTNUM, CheckPenDriver,
NULL, SMD_POLLED,
FALSE,
          PND_POLLFREQ, 0 );
  AddThread( PRX_EVENTNUM, CheckSystem,
NULL, SMD_POLLED,
          FALSE, PRX_POLLFREQ, 0 );

  InitSUICallRec();
  InitSCSCallRec();

  SetSuspendFlagPointer();
  add_trap( GetSUIMouseTrapRec() );

  fRecsInstalled = TRUE;
}


void Dispatch( THREADTYPEID ActiveThreadId, int
iEventThreadIdx )
{
  int iThreadIdx;
  BOOL fNextEntry = FALSE;
  EVENT *ev;
  NEARPROC fpOriginalThread = NULL;

  struct REGW Regs;

  if ( iEventThreadIdx >= SMD_MAXTHREADS )
    goto Exit;

  SetDispatchActive( TRUE );

  ev = &EventQueue[ iEventThreadIdx ];

  if ( ActiveThreadId == SMD_ONDEMAND )
  {
    if ( ev->bReentrant || ev->nReenterCount == 0 )
    {
      PCB_BEGINCRITICAL
      ++ev->nReenterCount;
      PCB_ENDCRITICAL

      if ( ev->aAPIFuncTable != NULL )
        CallAPIFunction( ev->aAPIFuncTable );
      else
        TRACE( "ERROR: Function table is NULL in
dispatcher" );

      PCB_BEGINCRITICAL
      --ev->nReenterCount;
      PCB_ENDCRITICAL
    }
    else
    {
      GetForegroundRegs( &Regs );
      Regs.ax = ( WORD )ERR_INTERNAL;
      SetForegroundRegs( &Regs );
    }

    goto Exit;
  }


  for ( iThreadIdx = 0; iThreadIdx <
SMD_MAXTHREADS; ++iThreadIdx
)
  {
    ev = &EventQueue[ iThreadIdx ];

    if ( ev->fpThread != NULL )
    {
      if ( ev->ThreadTypeId == ActiveThreadId ||
           ActiveThreadId ==
SMD_ALLTHREADTYPES )
      {
```

```
    if ( ev->bReentrant || ev->nReenterCount == 0
)
      {
       PCB_BEGINCRITICAL
       ++ev->nReenterCount;
       PCB_ENDCRITICAL
      }
      else
      {
#if !defined( PROD )
        sprintf( szTempStr, "NOTICE: Thread #%d reentered, but returned\n", iThreadIdx );
        TRACE( szTempStr );
#endif
        goto Exit;
      }

    switch ( ev->ThreadTypeId )
     {
      case SMD_ONETIME:
       if ( ev->lTimeCurrent >= 0 )
        {
         if ( ++ev->lTimeCurrent >= ev->lTimeLimit )
          {
           ev->lTimeCurrent = -1;
           TRACE( "NOTICE: ONETIME thread expired\n" );
          }
         else
          fNextEntry = TRUE;
        }
       else
        fNextEntry = TRUE;
       break;

      case SMD_MANYTIMES:
       if ( ev->lTimeCurrent >= 0 )
        {
         if ( ++ev->lTimeCurrent >= ev->lTimeLimit )
          {
           if ( --ev->lRetryLimit <= 0 )
            {
             ev->lTimeCurrent = -1;
             TRACE( "NOTICE: MANYTIMES thread expired\n" );
            }
           else
            ev->lTimeCurrent = 0;
          }
         else
          fNextEntry = TRUE;
        }
       else
        fNextEntry = TRUE;
       break;

      case SMD_POLLED:
       if ( ++ev->lTimeCurrent >= ev->lTimeLimit )
        ev->lTimeCurrent = 0;
       else
        fNextEntry = TRUE;
       break;

      default:
       fNextEntry = TRUE;
       break;
     }
   }
  else
   fNextEntry = TRUE;

  if ( fNextEntry )
   {
    fNextEntry = FALSE;
    PCB_BEGINCRITICAL
    --ev->nReenterCount;
    PCB_ENDCRITICAL
   }
  else
   {
    if ( ev->fpThread != NULL && ev->fpThread != ( NEARPROC )SMD_THREADACTIVE )
     {
      fpOriginalThread = ev->fpThread;
      ( *ev->fpThread )();

      PCB_BEGINCRITICAL
      if ( fpOriginalThread == ev->fpThread &&
         ( WORD )( ev->nReenterCount - 1 ) <
         ( WORD )ev->nReenterCount )
       --ev->nReenterCount;
      PCB_ENDCRITICAL
     }
   }
 }

}

Exit:
 SetDispatchActive( FALSE );
}

WORD TrapService( struct trap_rec *CurrTrapRec )
{
 REG_W Regs;
 MREG MinArgs;
 WORD wReturn = 0;

 switch ( CurrTrapRec->tr_int )
 {
  case SMI_SUIINTNUM:
   Dispatch( SMD_ONDEMAND, SMI_SUIEVENTNUM );
   break;

  case SMI_SCSINTNUM:
   Dispatch( SMD_ONDEMAND, SMI_SCSEVENTNUM );
   break;

  case SMI_PNDINTNUM:
   Dispatch( SMD_ONDEMAND, SMI_PNDEVENTNUM );
   break;

  case SMI_PRXINTNUM:
   Dispatch( SMD_ONDEMAND, SMI_PRXEVENTNUM );
   break;

  case SBS_VIDINTNUM:
   VIDTrapService();
   return ( ( WORD )CurrTrapRec );
   break;

  case PND_INTNUM:
   GetForegroundRegs( &Regs );

   if ( Regs.ax == PND_SETEVENTHANDLER && !GetPNDActiveStatus() )
    {
     MinArgs.ax = 0x000C;
     MinArgs.es = Regs.es;
     MinArgs.dx = Regs.dx;
     MinArgs.cx = Regs.cx;

     mouse( &MinArgs, &MEventOutArgs );
    }
   else
    return ( ( WORD )CurrTrapRec );

  default:
   return ( ( WORD )CurrTrapRec );
 }
 return ( wReturn );
}

void FCallService( WORD wAX )
{
 switch ( PopEventNum() )
  {
   case SMI_SUIEVENTNUM:
    Dispatch( SMD_ONDEMAND, SMI_SUIEVENTNUM );
    break;

   case SMI_SCSEVENTNUM:
    Dispatch( SMD_ONDEMAND, SMI_SCSEVENTNUM );
    break;



  }
}

void ClockTick( void )
{

 add_isr_event( SMD_DISPATFREQ );



 Dispatch( SMD_ALLTHREADTYPES, 0 );

}

void DecClockReCount( void )
{
 PCB_BEGINCRITICAL;
 --nClockReenterCount;
 PCB_ENDCRITICAL;

}

#if !defined( NDEBUG )
void KbdService( WORD wHotKey )
{

 wLastKey = wHotKey;

}

WORD GetLastKey( void )
{
 WORD wTempLastKey = wLastKey;
 wLastKey = 0;

 return ( wTempLastKey );
}
#endif

void SetDispatchActive( BOOL bNewDispatchActive )
{
 PCB_BEGINCRITICAL
 fDispatchActive = bNewDispatchActive;
 PCB_ENDCRITICAL
}

BOOL GetDispatchActive( void )
{
 BOOL fCurrentDisActive;

 PCB_BEGINCRITICAL
 fCurrentDisActive = fDispatchActive;
 PCB_ENDCRITICAL

 return ( fCurrentDisActive );
}

void CrankGear( BYTE *bGearIdx, char *szLabel )
{
 BYTE bNewGearIdx = *bGearIdx;
 if ( ++bNewGearIdx >= SMD_MAXGEARIMAGES )
  bNewGearIdx = 0;

 ++crs_x;

 *bGearIdx = bNewGearIdx;
}

void PushEventNum( int iEventNum )
{
 aEventStack[ iEventStackPtr ] = iEventNum;
 iEventStackPtr = iEventStackPtr > 0 ? iEventStackPtr - 1 : iEventStackPtr;
}

int PopEventNum( void )
{
 int iReturn;

 PCB_BEGINCRITICAL
 iEventStackPtr = iEventStackPtr < SMD_EVENTSTACKLIMIT - 1 ? iEventStackPtr + 1 : iEventStackPtr;
 iReturn = aEventStack[ iEventStackPtr ];
 PCB_ENDCRITICAL

 return ( iReturn );
}

int GetTempEventNum( void )
{
 register int iThreadIdx;
 int iReturn = ERR_INTERNAL;

 PCB_BEGINCRITICAL

 for ( iThreadIdx = SMD_REUSETHREADS - 1; iThreadIdx < SMD_MAXTHREADS;
       ++iThreadIdx )
  {
   if ( EventQueue[ iThreadIdx ].fpThread == NULL )
    {
#if !defined( PROD )
     sprintf( szTempStr, "NOTICE: Temp thread allocated - %d\n", iThreadIdx );
     TRACE( szTempStr );
#endif
     iReturn = iThreadIdx;
     EventQueue[ iThreadIdx ].fpThread = ( NEARPROC )SMD_THREADACTIVE;
     break;
    }
  }

 PCB_ENDCRITICAL

#if !defined( PROD )
 if ( iReturn == ERR_INTERNAL )
  TRACE( "ERROR: Out of temporary threads" );
#endif

 return ( iReturn );
}

#if defined( _MSC_VER )
#pragma warning( default : 4704 )
#endif
Copr. 1995 Zenith Data Systems Corp.

#include "cr.h"
#include "sio.h"
#include "spawn.h"
#include "k2.h"
#include "frame.h"
#include "sm.h"

#if defined( _MSC_VER )
#pragma warning( disable : 4704 )
#endif

THREADTYPEID ActiveThreadType = SMD_NOTHREAD;

char          szSMSignature[] = SIG_SMSIGNATURE;
char          szSMVersionName[] = STR_SMVERSIONNAME;
char          szSMVersionNum[] = STR_SMVERSIONNUM;
char          szSMModuleName[] = STR_SMMODULENAME;
char          szSUIExecName[] = SUI_EXECNAME;
char          szSCSAbortConn[] = SMI_SCSABORTCONN;
char          szTempStr[ GEN_MAXLENTEMPSTR ];
char          szTempMsgStr[ GEN_MAXLENTEMPSTR * 2 ];
char          szNullStr[] = "\0";
SCANCODE      aUDHotIcon1Def[] = SUI_UDHOTICON1DEF;
char          szPassword[ SUI_MAXLENPASSWORD + 1 ];
char          nRLNInitNum = 0;
char          fEEPROMInited = FALSE;
WORD          wScreenCode = SUI_NOSCREEN;
WORD          wOldScreenCode = SUI_NOSCREEN;
MREG          MEventOutArgs;
FARCALLENTRY  lpfnFarCallEntry = NULL;
SUICB         lpfnSUICallBack = NULL;
UICONFIGDATA  UIConfigData;
LISTBOXENTRY  ListBoxEntry;
MSGBOXBUFF    MsgBoxBuff[ SMI_SUIMAXMSGBOXLINES ];
BUFFHEADER    BuffHead;

BOOL fConnectRequested = FALSE;

char GetEEPROMInited( void )
{
 return ( fEEPROMInited );
}

void InitUIConfigData( void )
{
 if ( GetEEUIData( &UIConfigData ) == ERR_SUCCESS )
  {
   if ( UIConfigData.nMajorVersionNum == GEN_SMMAJORVERSIONNUM &&
        UIConfigData.nMinorVersionNum == GEN_SMMINORVERSIONNUM )
    {
     if ( ( ( int )UIConfigData.wXLowerPenCalib -
            ( int )UIConfigData.wXUpperPenCalib ) >= 200 )
      {
       if ( UIConfigData.wXUpperPenCalib == PND_XUPPERPENCALIB &&
            UIConfigData.wYUpperPenCalib == PND_YUPPERPENCALIB &&
            UIConfigData.wXLowerPenCalib == PND_XLOWERPENCALIB &&
            UIConfigData.wYLowerPenCalib == PND_YLOWERPENCALIB )
         InitEEPROM();
      }
     else
```

```
    initEEPROM().

  }
  else
    initEEPROM().
}
else
  initEEPROM().

fil_chr( &MEventOutArgs, 0, sizeof ( MREG ) ),
lpfnFarCallEntry = MK_FP( _ccode, _fcall_entry );
}

void initEEPROM( void )
{
  TRACE( "ERROR: Invalid values or unable to read
from EEPROM\r"
).

  fil_chr( &UIConfigData, 0, sizeof ( UICONFIGDATA
) );

  UIConfigData.wBuffLen        = sizeof (
UICONFIGDATA );
  UIConfigData.nMajorVersionNum =
GEN_SMMAJORVERSIONNUM,
  UIConfigData.nMinorVersionNum =
GEN_SMMINORVERSIONNUM,
  UIConfigData.bConnectType    =
SMI_NETWORKCONNECT;
  UIConfigData.nDomainID       = PRX_DOMAIN0

  UIConfigData.nContrastIdx    =
SHC_DEFCONTRASTIDX,
  UIConfigData.nBrightnessIdx  =
SHC_DEFBRIGHTNESSIDX,

  UIConfigData.nSleepTimeIdx   =
SBS_SLEEPDISABLED;
  UIConfigData.bAutoShutoff    = FALSE,

  UIConfigData.wUILanguage     =
SMI_UIUSENGLISH.
  UIConfigData.nFrameType      =
PRX_FRAME8023;

  UIConfigData.nLastOSKScreen     =
SUI_BIGALPHA
  UIConfigData.nLastOSKDlgScreen  =
SUI_BIGALPHA.
  UIConfigData.nLastSetupDlgScreen =
SUI_HOSTSELECTION.

  UIConfigData.xPosLastOSKScreen  =
SUI_XULBIGALPHA,
  UIConfigData.yPosLastOSKScreen  =
SUI_YULBIGALPHA.

  mem_cp( sUDHoticon1Def,
UIConfigData.sUDHoticon1.
SUI_MAXLENDEFHOTICON ),

  TRACE( "NOTICE: Using pen calibration values
set to zero.\r" );

  UIConfigData.wXUpperPenCalib =
PND_XUPPERPENCALIB,
  UIConfigData.wYUpperPenCalib =
PND_YUPPERPENCALIB.
  UIConfigData.wXLowerPenCalib =
PND_XLOWERPENCALIB.
  UIConfigData.wYLowerPenCalib =
PND_YLOWERPENCALIB;

  fEEPROMInited = TRUE;

  SetEEUIData();

  SetContrast( UIConfigData.nContrastIdx ),
  SetBrightness( UIConfigData.nBrightnessIdx );
}

void initSUI( void )
{
  SetDomainWarning( FALSE );
  SetSecurityWarning( FALSE ),
}

void initSaratoga( BYTE nInitType )
{
  if ( nInitType == SBS_DRIVERSLOADING )
  {
    TRACE( "NOTICE: Power management disabled
for driver load
sequence.\r" );
    SetPowerEnable( SBS_POWERMANDISABLED
);
  }
  else if ( nInitType == SBS_SUILOADING )
  {
    if ( SetSleepTimeout(
UIConfigData.nSleepTimeIdx ) ==
ERR_SUCCESS )
    {
      if ( UIConfigData.nSleepTimeIdx ==
SBS_SLEEPDISABLED )
      {
        TRACE( "NOTICE: Power management now
disabled, DOZE
disabled\r" );
        SetPowerEnable(
SBS_POWERMANDISABLED );
        SetDozeTimeout( SBS_DOZEDISABLED ).
      }
      else
      {
        TRACE( "NOTICE: Power management now
enabled, DOZE
disabled\r" ).
        SetPowerEnable(
SBS_POWERMANENABLED );
        SetDozeTimeout( SBS_DOZEDISABLED );

      }

      if ( UIConfigData.bAutoShutoff )
      {
        TRACE( "NOTICE: Suspend after 60 minutes
enabled\r" ),
        SetSuspendTimeout( SBS_SUSPENDIN60MIN
);
      }
      else
      {
        TRACE( "NOTICE: Suspend disabled\r" );
        SetSuspendTimeout(
SBS_SUSPENDDISABLED );
      }
    }
  }

}

int GetEEMouseConfig( void )
{
  REG_W InRegs, OutRegs.
  PENCALIB pc.
  WORD wFlags;

  fil_chr( &InRegs, 0, sizeof ( REG_W ) );
  fil_chr( &pc, 0, sizeof ( PENCALIB ) );

  InRegs.ax = SBS_SARATOGAFUNC;
  InRegs.bx = SBS_EEPROMTOMEMORY;
  InRegs.cx = SBS_LENMOUSECFGDATA;
  InRegs.dx = PND_OFFCALIB.

  InRegs.es = SEG( &pc ).
  InRegs.di = OFF( &pc );

#if !defined( NOINT15 )
  wFlags = Inin( &InRegs, &OutRegs
SBS_SLINTNUM ).
#else
  wFlags = 0;
#endif

  if ( !( wFlags & GEN_CARRYFLAG ) )
  {
    UIConfigData.wXUpperPenCalib =
pc.wXUpperPenCalib;
    UIConfigData.wYUpperPenCalib =
pc.wYUpperPenCalib;
    UIConfigData.wXLowerPenCalib =
pc.wXLowerPenCalib;
    UIConfigData.wYLowerPenCalib =
pc.wYLowerPenCalib;

    return ( ERR_SUCCESS );
  }
  else
    return ( ERR_INTERNAL );
}

int SetEEMouseConfig( PENCALIB *pc )
{
  UIConfigData.wXUpperPenCalib =
pc->wXUpperPenCalib;
  UIConfigData.wYUpperPenCalib =
pc->wYUpperPenCalib;
  UIConfigData.wXLowerPenCalib =
pc->wXLowerPenCalib;
  UIConfigData.wYLowerPenCalib =
pc->wYLowerPenCalib;

  return ( SetEEUIData() );
}

int SetEEUIData( void )
{
  REG_W InRegs, OutRegs;
  WORD wFlags;
  UICONFIGDATA OldUIConfigData,
  int iReturn = ERR_SUCCESS.

  fil_chr( &OldUIConfigData, 0, sizeof (
UICONFIGDATA ) );

  if ( GetEEUIData( &OldUIConfigData ) ==
ERR_SUCCESS )
  {
    if ( mem_cmp( ( NPSTR )&OldUIConfigData, (
NPSTR
)&UIConfigData,
        sizeof( UICONFIGDATA ) ) != sizeof(
UICONFIGDATA ) )

    {
      fil_chr( &InRegs, 0, sizeof ( REG_W ) );

      InRegs.ax = SBS_SARATOGAFUNC;
      InRegs.bx = SBS_MEMORYTOEEPROM;
      InRegs.cx = sizeof ( UICONFIGDATA );
      InRegs.dx = SBS_OFFUICFGDATA;
      InRegs.es = SEG( &UIConfigData );
      InRegs.di = OFF( &UIConfigData );

#if !defined( NOINT15 )
      PCB_BEGINCRITICAL
      wFlags = Inin( &InRegs, &OutRegs,
SBS_SLINTNUM );
      PCB_ENDCRITICAL
#else
      wFlags = 0;
#endif
      if ( !( wFlags & GEN_CARRYFLAG ) )
        iReturn = ERR_SUCCESS;
      else
        iReturn = ERR_INTERNAL;
    }
  }
  else
    iReturn = ERR_INTERNAL;

#if !defined( PROD )
  if ( iReturn == ERR_INTERNAL )
    TRACE( "ERROR: SetEEUIData() error returned
from extended
BIOS call to save EEPROM data\r" );
#endif

  return ( iReturn );
}

int GetEEUIData( UICONFIGDATA
*CurrUIConfigData )
{
  REG_W InRegs, OutRegs.
  WORD wFlags
  UICONFIGDATA TempUIConfigData;

  fil_chr( &InRegs, 0, sizeof ( REG_W ) );

  InRegs.ax = SBS_SARATOGAFUNC;
  InRegs.bx = SBS_EEPROMTOMEMORY.
  InRegs.cx = sizeof ( UICONFIGDATA );
  InRegs.dx = SBS_OFFUICFGDATA.
  InRegs.es = SEG( &TempUIConfigData );
  InRegs.di = OFF( &TempUIConfigData );

#if !defined( NOINT15 )
  PCB_BEGINCRITICAL
  wFlags = Inin( &InRegs, &OutRegs,
SBS_SLINTNUM );
  PCB_ENDCRITICAL
#else
  wFlags = 0;
#endif

  if ( !( wFlags & GEN_CARRYFLAG ) )
  {
    *CurrUIConfigData = TempUIConfigData;

    return ( ERR_SUCCESS );
  }
  else
    return ( ERR_INTERNAL );
}

int ClearEEPROM( void )
{
  REG_W InRegs, OutRegs.
  WORD wFlags;
  UICONFIGDATA UINullData;

  fil_chr( &InRegs, 0, sizeof ( InRegs ) );
  fil_chr( &UINullData, 0, sizeof ( UINullData ) );

  InRegs.ax = SBS_SARATOGAFUNC;
  InRegs.bx = SBS_MEMORYTOEEPROM;
  InRegs.cx = sizeof ( UICONFIGDATA );
  InRegs.dx = SBS_OFFUICFGDATA.
  InRegs.es = SEG( &UINullData );
  InRegs.di = OFF( &UINullData );

#if !defined( FLASHTEST )
  wFlags = Inin( &InRegs, &OutRegs.
SBS_SLINTNUM );
#else
  wFlags = 0;
#endif

  if ( !( wFlags & GEN_CARRYFLAG ) )
    return ( ERR_SUCCESS );
  else
    return ( ERR_INTERNAL );
}

#if defined( _MSC_VER )
#pragma warning( default : 4704 )
#endif
Copr. 1995 Zenith Data Systems Corp.

#include "cr.h"
#include "spawn.h"
#include "h2.h"
#include "sm.h"
#include "um.h"

#if defined( _MSC_VER )
#pragma warning( disable : 4704 )
#endif

HOSTLISTENTRIES HostListEntries = { 0, 0 };
static HOSTLISTENTRIES BroadcastHLEntries = {
0, 0 };
static int          iHLStatus = SMI_BLANK;
static int          iHLThreadId = -1;
static int          iWaitForHLThreadIdx;
static int          iLBCurrHost = 0;
static int          iLBCurrGroup = 0;
static int          iCurrGroupIdx = 0;
static int          iNumGroups = 0;
static char         szWorkAroundNodeAdd[
SCS_MAXLENNODEADD ];
static char         szSerialDup[
SCS_MAXLENSERIALNUM ],
static char         szCurrHostName[
SCS_MAXLENHOSTNAME + 1 ];

static char         fRequestHostList = FALSE;

void SetCurrHostName( char *szNewCurrHostName
)
{
  strcpy( szCurrHostName, szNewCurrHostName );
}

char *GetCurrHostName( void )
{
  return ( szCurrHostName ).
}

int GetLBCurrHost( void )
{
  return ( iLBCurrHost );
}

void SetLBCurrHost( int iNewLBCurrHost )
{
  iLBCurrHost = iNewLBCurrHost;
}

char GetRequestHostList( void )
{
  return ( fRequestHostList );
}

void SetRequestHostList( int iNewRequestHostList )
{
  PCB_BEGINCRITICAL.
  fRequestHostList = LOBYTE( iNewRequestHostList
);
  PCB_ENDCRITICAL;
}

int GetLBCurrGroup( void )
{
  return ( iLBCurrGroup );
}

void SetLBCurrGroup( int iNewLBCurrGroup )
{
  if ( iLBCurrGroup != iNewLBCurrGroup )
    iCurrGroupIdx = GetGroupIdx( iNewLBCurrGroup
);
```

```
  iLBCurrGroup = iNewLBCurrGroup;
}

char *GetLBGroup( int lGroupNum )
{
  int iUseGroup;
  char *szReturn;
  int iLBGroupIdx;

  if ( iHLStatus != SMI_AVAILABLE ||
HostListEntries.iNumEntries
== 0 )
    return ( szNullStr );

  iUseGroup = ( lGroupNum ==
SUI_LBCURRENTRY ? iLBCurrGroup :
lGroupNum );

  iLBGroupIdx = GetGroupIdx( iUseGroup );

  szReturn = HostListEntries.aHostListBuff[
iLBGroupIdx
].HostDataBuff.szGroupName;

  return ( szReturn == NULL ? szNullStr : szReturn
);
}

char *GetLBHost( int iHostNum )
{
  char *szReturn;

  if ( GetCurrActionCode() ==
SUI_LASTCONNECTION )
    return ( UIConfigData.szLastHostName );

  if ( iHLStatus != SMI_AVAILABLE ||
HostListEntries.iNumEntries
== 0 )
    return ( szNullStr );

  szReturn = HostListEntries.aHostListBuff[
GetHostIdx( iHostNum
) ].HostDataBuff.szHostName;

  return ( szReturn == NULL ? szNullStr : szReturn
);
}

int GetLBHostStatus( int iHostNum )
{
  int iReturn;

  if ( iHLStatus != SMI_AVAILABLE ||
HostListEntries.iNumEntries
== 0 )
    return ( SUI_LBENTRYENABLED );

  iReturn = HostListEntries.aHostListBuff[
GetHostIdx( iHostNum )
].HostDataBuff.nHostStatus;

  if ( iReturn == SCS_HOSTAVAILABLE )
    iReturn = SUI_LBENTRYENABLED;
  else
    iReturn = SUI_LBENTRYDISABLED;

  return ( iReturn );
}

int SetLBHostStatus( int iHostNum, BYTE
nNewHostStatus )
{
  if ( iHLStatus != SMI_AVAILABLE ||
HostListEntries.iNumEntries
== 0 )
    return ( ERR_INTERNAL );

  HostListEntries.aHostListBuff[ GetHostIdx(
iHostNum )
].HostDataBuff.nHostStatus = nNewHostStatus;

  return ( ERR_SUCCESS );
}

char *GetCurrNodeAddress( void )
{
  int iHostIdx;
  char *szReturn = NULL;

  if ( GetCurrActionCode() ==
SUI_LASTCONNECTION )
    return ( UIConfigData.szLastNodeAddress );

  if ( iHLStatus != SMI_AVAILABLE ||
HostListEntries.iNumEntries
== 0 )
    return ( szNullStr );

  if ( iLBCurrHost > 0 )
  {
    iHostIdx = GetGroupIdx( iLBCurrGroup ) + (
iLBCurrHost - 1 );
    szReturn = HostListEntries.aHostListBuff[
iHostIdx
].szNodeAddress;
  }

  return ( szReturn == NULL ? szNullStr : szReturn
);
}

WORD GetCurrHostVersionNum( void )
{
  int iHostIdx;
  BYTE nMinorVersion;
  BYTE nMajorVersion;

  if ( iHLStatus != SMI_AVAILABLE ||
HostListEntries.iNumEntries
== 0 )
    return ( 0 );

  if ( iLBCurrHost > 0 )
    iHostIdx = GetHostIdx( SUI_LBCURRENTRY );
  else
    return ( 0 );

  nMinorVersion = HostListEntries.aHostListBuff[
iHostIdx
].HostDataBuff.nMinorVersion;
  nMajorVersion = HostListEntries.aHostListBuff[
iHostIdx
].HostDataBuff.nMajorVersion;

  return ( MAKEWORD( nMinorVersion,
nMajorVersion ) );
}

BOOL IsPWRequired( void )
{
  BOOL fReturn = FALSE;

  if ( GetCurrActionCode() ==
SUI_LASTCONNECTION )
    return ( UIConfigData.bLastConnPassword );

  if ( iHLStatus != SMI_AVAILABLE ||
HostListEntries.iNumEntries
== 0 )
    return ( FALSE );

  if ( iLBCurrHost > 0 )
    fReturn = HostListEntries.aHostListBuff[
GetHostIdx(
SUI_LBCURRENTRY ) ].HostDataBuff.
            bPasswordProtect;

  return ( fReturn );
}

int GetNumHostEntries( void )
{
  int iNextGroupIdx;

  if ( iHLStatus != SMI_AVAILABLE )
    return ( ERR_INTERNAL );

  if ( ( iNextGroupIdx = GetGroupIdx( iLBCurrGroup
+ 1 ) ) >= 0 )
    return ( iNextGroupIdx - iCurrGroupIdx );
  else
    return ( HostListEntries.iNumEntries -
iCurrGroupIdx );
}

int GetNumGroupEntries( void )
{
  if ( iHLStatus != SMI_AVAILABLE )
    return ( ERR_INTERNAL );

  return ( iNumGroups );
}

int GetGroupIdx( int lGroupNum )
{
  LONG lGroupIdx;

  lGroupIdx = GetEntryOffset(
HostListEntries.iNumEntries,
            sizeof ( HOSTLISTBUFF ),
SCS_MAXLENNODEADD,
            lGroupNum, ( NPSTR
)HostListEntries.aHostListBuff );

  if ( lGroupIdx >= 0 )
    return ( ( int )lGroupIdx / sizeof (
HOSTLISTBUFF ) );
  else
    return ( ERR_INTERNAL );
}

int GetGroupNum( int iHostIdx )
{
  LONG lLowGroupIdx = 0L;
  LONG lHighGroupIdx = 0L;
  int iGroupNum;

  for ( iGroupNum = 1; lHighGroupIdx >= 0;
++iGroupNum )
  {
    lLowGroupIdx = lHighGroupIdx;
    lHighGroupIdx = GetEntryOffset(
HostListEntries.iNumEntries,
              sizeof ( HOSTLISTBUFF
),
SCS_MAXLENNODEADD,
              iGroupNum, ( NPSTR
)HostListEntries.aHostListBuff );
    lHighGroupIdx /= sizeof ( HOSTLISTBUFF );

    if ( ( LONG )iHostIdx >= lLowGroupIdx && (
LONG )iHostIdx <=
lHighGroupIdx )
      return ( iGroupNum );
  }

  return ( HLD_NOTINGROUP );
}

int GetHostIdx( int iHostNum )
{
  int iUseHost;
  int iHostIdx;

  iUseHost = ( iHostNum == SUI_LBCURRENTRY ?
iLBCurrHost :
iHostNum );
  iHostIdx = iCurrGroupIdx + ( iUseHost - 1 );

  return ( iHostIdx );
}

int SortGroupHost( void )
{
  int iGroupNum;
  int iSortStatus;

  iSortStatus =
    SortList( HostListEntries.iNumEntries, sizeof (
HOSTLISTBUFF
),
        SCS_OFFGROUPKEY,
SCS_OFFHOSTKEY,
        ( NPSTR )HostListEntries.aHostListBuff );

  if ( iSortStatus == ERR_SUCCESS )
  {
    for ( iNumGroups = 0, iGroupNum = 1;
iGroupNum <=
HostListEntries.iNumEntries;
        ++iGroupNum )
    {
      if ( GetGroupIdx( iGroupNum ) >= 0 )
        iNumGroups++;
    }
  }

  return ( iSortStatus );
}

int SortSerialNums( void )
{
  int iEntryIdx;

  if ( HostListEntries.aHostListBuff == NULL ||
HostListEntries.iNumEntries <= 0 )
    return ( ERR_INTERNAL );

  for ( iEntryIdx = 0; iEntryIdx <
HostListEntries.iNumEntries;
++iEntryIdx )
    HostListEntries.aHostListBuff[ iEntryIdx ].
      HostDataBuff.sHostSerial[
SCS_MAXLENSERIALNUM - 1 ] = 0;

  return ( SortList( HostListEntries.iNumEntries,
sizeof (
HOSTLISTBUFF ),
        SCS_OFFSERIALNUM, NULL, ( NPSTR
)HostListEntries.aHostListBuff ) );
}

int ValidateSerialNums( void )
{
  int iEntryIdx, iNextEntryIdx;
  int iSerialStatus = HLD_VALIDSERIALS;

  szSerialDup[0] = '\0';

  if ( SortSerialNums() != ERR_SUCCESS )
    return ( FALSE );

  for ( iEntryIdx = 0; iEntryIdx <
HostListEntries.iNumEntries;
++iEntryIdx )
  {
    if ( IsZeroString( HostListEntries.aHostListBuff[
iEntryIdx
].
                HostDataBuff.sHostSerial ) )
      iSerialStatus = HLD_INVALIDSERIALS;
    else
    {
      if ( ( iNextEntryIdx = iEntryIdx + 1 ) <
HostListEntries.iNumEntries )
      {
        if ( !strcmp( HostListEntries.aHostListBuff[
iEntryIdx
].HostDataBuff.sHostSerial,
                HostListEntries.aHostListBuff[
iNextEntryIdx ]
                .HostDataBuff.sHostSerial ) )
          iSerialStatus = HLD_DUPLICATESERIALS;
      }
    }

    if ( iSerialStatus != HLD_VALIDSERIALS )

    {
      strcpy( szSerialDup,
HostListEntries.aHostListBuff[
iEntryIdx ].
                HostDataBuff.sHostSerial );
      break;
    }
  }

  return ( iSerialStatus );
}

int RequestHostList( void )
{
  SetRequestHostList( TRUE );

  if ( !GetSCSActiveStatus() )
    return ( ERR_INTERNAL );

  if ( ( AllocHLMem( &HostListEntries,
HLD_MAXNUMHOSTENTRIES ) )
!= ERR_SUCCESS )
    return ( ERR_OUTOFMEM );

  if ( ( AllocHLMem( &BroadcastHLEntries,
HLD_MAXNUMHOSTENTRIES )
) != ERR_SUCCESS )
    return ( ERR_OUTOFMEM );

  HostListEntries.iNumEntries = 0;
  iLBCurrHost = iLBCurrGroup = 0;

  if ( ( SendRequestHostList() == ERR_SUCCESS )
&&
      ( ( iWaitForHLThreadIdx =
GetTempEventNum() ) >= 0 ) )
  {
    AddThread( iWaitForHLThreadIdx, WaitForHLD,
NULL,
SMD_MANYTIMES, FALSE,
            HLD_POLLFREQ, HLD_MAXRETRIES );

    SetStatusHLInMem( SMI_INPROGRESS );
  }
  else
  {
    FreeHLMem( &HostListEntries );
    FreeHLMem( &BroadcastHLEntries );
    SetStatusHLInMem( SMI_AVAILABLE );
    return ( ERR_INTERNAL );
  }

  return ( ERR_SUCCESS );
}

void WaitForHLD( void )
{
  int iNumEntries;
  int iSerialStatus;
  LONG lGroupHostNums;
  int iHostConnectIdx;

  CancelRequestHostList();
```

```
 if ( ( iNumEntries = *( int *
)BroadcastHLEntries.aHostListBuff
) > 0 )
 {
  BroadcastHLEntries.iNumEntries = iNumEntries;

  mem_mv( ( PVOID )( ( BYTE * )(
BroadcastHLEntries.aHostListBuff ) +
SCS_HOSTLISTNUMOFFSET ),
        ( PVOID )(
BroadcastHLEntries.aHostListBuff ),
iNumEntries *
        sizeof ( HOSTLISTBUFF ) + sizeof ( int ) );

  SaveNewHosts();
 }

 if ( GetRetryLimit( iWaitForHLThreadIdx ) > 0 &&
SendRequestHostList() == ERR_SUCCESS )
 {
  SetStatusHLInMem( SMI_INPROGRESS );
 }
 else
 {
  DelThread( iWaitForHLThreadIdx );

  if ( HostListEntries.iNumEntries > 0 )
  {
   AllocHLMem( &HostListEntries,
HostListEntries.iNumEntries
);

    if ( ( iSerialStatus = ValidateSerialNums() ) !=
HLD_VALIDSERIALS )
    {
     if ( iSerialStatus == HLD_INVALIDSERIALS )
      OpenMessageBox(
STR_HLDINVSERIALNUMS, 0,
SUI_LEFTJUSTIFIED, SUI_OK );
     else
      OpenMessageBox(
STR_HLDDUPSERIALNUMS, 0,
SUI_LEFTJUSTIFIED, SUI_OK );
    }

    SortGroupHost();

    if ( GetSCSCallProgress() !=
SMI_SCSDISCONNECTED )
    {
     if ( ( iHostConnectIdx = FindNodeAddress(
&HostListEntries,

UIConfigData.szLastNodeAddress )
) != FNA_NOTFOUND )
      HostListEntries.aHostListBuff[
iHostConnectIdx ].
               HostDataBuff.nHostStatus =
SCS_HOSTAVAILABLE;
    }

    if ( ( lGroupHostNums = FindFirstAvailHost(
&HostListEntries ) ) != HLD_NOHOSTAVAIL )
    {
     iLBCurrGroup = HIWORD( lGroupHostNums );
     iLBCurrHost = LOWORD( lGroupHostNums );
    }
    else
    {
     iLBCurrGroup = iNumGroups > 1 ? 1 : 0;
     iLBCurrHost = 0;
    }
   }
   else
   {
    FreeHLMem( &HostListEntries );
    iLBCurrGroup = 0;
    iLBCurrHost = 0;
   }

   FreeHLMem( &BroadcastHLEntries );

   SetStatusHLInMem( SMI_AVAILABLE );
   SetRequestHostList( FALSE );
  }
 }

 int SendRequestHostList( void )
 {
  WORD wSeg, wOff, wReturn;

  wSeg = SEG( BroadcastHLEntries.aHostListBuff );
  wOff = OFF( BroadcastHLEntries.aHostListBuff );

  _asm
  {
   push dx
   push di
   push bx

   mov ax, SCS_REQUESTHOSTLIST
   mov dx, wSeg
   mov di, wOff
   mov bx, HLD_MAXNUMHOSTENTRIES

   int SCS_INTNUM

   pop bx
   pop di
   pop dx

   mov wReturn, ax
  }

  if ( wReturn == SCS_ACCEPTED )
   return ( ERR_SUCCESS );
  else
   return ( ERR_INTERNAL );
}

int CancelRequestHostList( void )
{
 _asm
 {
  mov ax, SCS_CANCELREQHOSTLIST
  int SCS_INTNUM
 }

 return ( ERR_SUCCESS );
}

int SaveNewHosts( void )
{
 int iBCHostIdx;

 for ( iBCHostIdx = 0; iBCHostIdx <
BroadcastHLEntries.iNumEntries; ++iBCHostIdx )
 {
  if ( FindNodeAddress( &HostListEntries,
       BroadcastHLEntries.aHostListBuff[
iBCHostIdx
].szNodeAddress ) == FNA_NOTFOUND )
  {
   HostListEntries.aHostListBuff[
HostListEntries.iNumEntries++ ] =
       BroadcastHLEntries.aHostListBuff[ iBCHostIdx
];
  }
 }

 return ( ERR_SUCCESS );
}

int FindNodeAddress( HOSTLISTENTRIES
*pHostListEntries, char
*szKeyNodeAddress )
{
 int iHostIdx;
 int iMaxHostIdx = pHostListEntries->iNumEntries;

 for ( iHostIdx = 0; iHostIdx < iMaxHostIdx;
++iHostIdx )
 {
  if ( strcmp( pHostListEntries->aHostListBuff[
iHostIdx
].szNodeAddress,
           szKeyNodeAddress ) == 0 )
   return ( iHostIdx );
 }

 return ( FNA_NOTFOUND );
}

LONG FindFirstAvailHost( HOSTLISTENTRIES
*pHostListEntries )
{
 int iHostIdx;
 int iGroupNum, iHostNum;
 int iMaxHostIdx = pHostListEntries->iNumEntries;

 for ( iHostIdx = 0; iHostIdx < iMaxHostIdx;
++iHostIdx )
 {
  if ( pHostListEntries->aHostListBuff[ iHostIdx
].HostDataBuff.nHostStatus ==
       SCS_HOSTAVAILABLE )
  {
   iGroupNum = GetGroupNum( iHostIdx );
   iHostNum = ( iHostIdx - GetGroupIdx(
iGroupNum ) ) + 1;
   return ( MAKELONG( iHostNum, iGroupNum ) );

  }
 }

 return ( ( LONG )HLD_NOHOSTAVAIL );
}

int AllocHLMem( HOSTLISTENTRIES
*pHostListEntries, int
iNumEntries )
{
 if ( pHostListEntries->aHostListBuff == NULL )
 {
  if ( ( pHostListEntries->aHostListBuff = (
HOSTLISTBUFF *
)malloc(
        iNumEntries * sizeof ( HOSTLISTBUFF ) +
sizeof ( int )
) ) == NULL )
   {
    TRACE( "ERROR: malloc failed in
AllocHLMem()\n" );
    return ( ERR_INTERNAL );
   }
   else
    fill_chr( ( PVOID
)pHostListEntries->aHostListBuff, 0,
iNumEntries *
          sizeof ( HOSTDATABUFF ) + sizeof ( int
) );
 }
 else
 {
 }

 pHostListEntries->iNumEntries = iNumEntries;

 return ( ERR_SUCCESS );
}

int GetStatusHLInMem( void )
{
 if ( GetCurrActionCode() ==
SUI_LASTCONNECTION )
  return ( SMI_AVAILABLE );
 else
  return ( iHLStatus );
}

void SetStatusHLInMem( int iNewHostListStatus )
{
 if ( ( iHLStatus = iNewHostListStatus ) ==
SMI_INPROGRESS )
  SetWaitingIcon( SBS_WAITINGICONON, TRUE
);
 else
  SetWaitingIcon( SBS_WAITINGICONOFF, TRUE
);
}

void FreeHLMem( HOSTLISTENTRIES
*pHostListEntries )
{
 if ( pHostListEntries->aHostListBuff != NULL )
 {
  free( pHostListEntries->aHostListBuff );
  pHostListEntries->aHostListBuff = NULL;
 }
}

void FreeAllHLMem( void )
{
 FreeHLMem( &HostListEntries );
 FreeHLMem( &BroadcastHLEntries );
}

BOOL IsZeroString( char szString[] )
{
 int iStrIdx;
 int iStrLen;

 for ( iStrIdx = 0, iStrLen = strlen( szString );
   iStrIdx < iStrLen; ++iStrIdx )
  if ( szString[ iStrIdx ] != '0' )
   return ( FALSE );

 return ( TRUE );
}

#if defined( _MSC_VER )
#pragma warning( default : 4704 )
#endif
Copr. 1995 Zenith Data Systems Corp.

#include "cr.h"
#include "spawn.h"
#include "k2.h"
#include "sie.h"
#include "sm.h"

#if defined( _MSC_VER )
#pragma warning( disable : 4704 )
#endif

#define STK_SZ (5000)

word isr_stk[STK_SZ+1];


extern char sms[];
extern char attrc[],attrm[];
extern char already[];
extern char unloaddone[];
extern char unloadnot[];
extern word init_data_end;

extern BOOL fNetware;


main()
{
 int i;

 chk_video();
 get_crs();
 crs_x = bcrs_x;
 crs_y = bcrs_y;
 mv_crs();

 if ( second_load() )
 {
  i = str_pos( '-', cmd_line );
  if ( i && ( ( cmd_line[i] | 0x20 ) == 'u' ) )
  {
   if( remove_tsr() )
   {
    ShutDownDispatcher();
    dspl( unloaddone );
   }
   else
    dspl( unloadnot );
  }
  else
   dspl( already );

  mv_crs();

  return( 1 );
 }


  sprintf( szTempStr, sms, szSMVersionName );
  dspl( szTempStr );

  get_crs();
  crs_x = bcrs_x;
  crs_y = bcrs_y + 3;
  mv_crs();



  DEBUG_BREAK;

  InitUIConfigData();
  InitSarategs( SBS_DRIVERSLOADING );
  InitDispatcher();

  malloc_on( SHC_MAXLENHEAP );
  idata_end=&init_data_end;
  icode_beg=main;
  stay_resident(isr_stk,STK_SZ*2);



  install_tsc( ( fp )ClockTick, 3500,
         SMD_SCHEDULERS | SMD_HOTKEYS |

         SMD_FARCALLS |
SMD_GENERALTRAPS | SMD_COMMSVCS |
SMD_INTSSVCS | SMD_MOUSEKWATCH );

  install_trap( ( fp )TrapService, 2500,
SMD_FULLREENTER );
  install_fcall( ( fp )FCallService, 4000,
SMD_FULLREENTER, 0,
szNullStr, 0 );

  add_tsc_event( SMD_DISPATFREQ );

  return ( 0 );
}

#if defined( _MSC_VER )
#pragma warning( default : 4704 )
#endif




  Copr. 1995 Zenith Data Systems Corp
```

```
#include "cl.h"
#include "spawn.h"
#include "h2.h"
#include "sm.h"

#if !defined( NDEBUG )
WORD aHotKeys[] = { SMI_SF1, SMI_SF2,
SMI_SF3, SMI_SF4, SMI_SF5,
SMI_SF6,
                    SMI_SF7, SMI_SF8, SMI_SF9,
SMI_SF10,
SMI_SALTQ, 0 };
#endif


char attrc[]={0x17,0x1E,0x13,0x1F,0x19,0xA};
char attrm[]={0x07,0x0F,0x07,0x07,0x07,0xF};


char sms[] =
  "\nSaratoga Manager, (C) Copyright 1994,1995,
Zenith Data
Systems \n"
  "Mobile Systems Engineering, Version %s\n";

char already[] =
  "ERROR: SM already present.\n"
  "Enter SM -U to unload. \n";

char unloaddone[]="SM has been removed from
memory.";
char unloadnot[]="ERROR: SM could not be
removed from memory.";

char _tsr_name[]="Saratoga Manager (C) 1994-1995
ZDS";


struct cfg_rec config_block = {
    sizeof(config_block),
    'S','M','A','N',
    MAKEWORD( GEN_SMMINORVERSIONNUM,
GEN_SMMAJORVERSIONNUM ),
    };


#if !defined( NDEBUG )


fp
install_list[]={install_tsc,install_trap,install_hk,install_f
call
};

#else
fp
install_list[]={install_tsc,install_trap,install_dos_rdy,in
stall_
fcall};
#endif


word init_data_end=1;


Copr. 1995 Zenith Data Systems Corp.
#include "cr.h"
#include "h2.h"
#include "spawn.h"
#include "hm.h"
#include "sio.h"
#include "sm.h"

#if defined( _MSC_VER   )
#pragma warning( disable : 4704 )
#endif

static OCCLUDEUNION HostOcc;
static OCCLUDEUNION OldHostOcc = { -1, -1, -1,
-1 };
static OCCLUDEUNION *pSetOccData;
static int          iSetOccType;
static BYTE         fSCOSNotified;
static BYTE         fRepaintRequired = FALSE;
static char         nOccDefineAcked = PMI_NOACK;
static char         nOccCloseAcked = PMI_NOACK;
static int          iHostOccludeIdx =
SMD_NOACTIVETHREAD;
```

```
void SetSCOSNotified( BYTE fNewSCOSNotified )
{
  fSCOSNotified = fNewSCOSNotified;
}

void SetOccDefineAcked( char nOccDefineStatus )
{
  nOccDefineAcked = nOccDefineStatus;
}

char GetOccDefineAcked( void )
{
  return ( nOccDefineAcked );
}

void SetOccCloseAcked( char nOccCloseStatus )
{
  nOccCloseAcked = nOccCloseStatus;
}

char GetOccCloseAcked( void )
{
  return ( nOccCloseAcked );
}


int DrawSUIOSK( OCCLUDEUNION *NewOSKRect,
int iOccType )
{
  OCCLUDEUNION *OSKRect;
  int yDrawOSK, xDrawOSK;

  if ( NewOSKRect == NULL )
    OSKRect = &HostOcc;
  else
    OSKRect = NewOSKRect;

  switch ( iOccType )
  {
    case SUI_OCCRWIN:
      yDrawOSK = OSKRect->occRWin.yULWin;
      xDrawOSK = OSKRect->occRWin.xULWin;
      break;

    case SUI_OCCDOSTEXT:
      yDrawOSK = OSKRect->occText.yULRow *
SCS_OSKTEXTCHARHEIGHT;

      xDrawOSK = OSKRect->occText.xULCol *
SCS_OSKTEXTCHARWIDTH;
      break;

    case SUI_OCCDOSGRAPHICS:
      yDrawOSK = OSKRect->occDosGraph.yULDos;
      xDrawOSK = OSKRect->occDosGraph.xULDos;
      break;

    default:
      TRACE( "ERROR: invalid occlusion type
specified in
DrawSUIOSK()\n" );
      return ( ERR_INTERNAL );
  }

#if !defined( PROD )
  sprintf( szTempStr, "NOTICE: Request to draw
OSK at x:%d, y:%d,
sent to SUI\n",
         xDrawOSK, yDrawOSK );
  TRACE( szTempStr );
#endif

  AX( SUI_MOVEOSK );
  BX( yDrawOSK );
  CX( xDrawOSK );
  return ( ( *lpfnSUICallBack )() );
}

int CreateOccludedArea( OCCLUDEUNION
*OccMap, int iOccType, int
iNewCacheFreeMem )
{
  if ( !GetSCSActiveStatus() )
    return ( ERR_INTERNAL );

  if ( OldHostOcc.occRWin.xULWin == -1 &&
       OldHostOcc.occRWin.yULWin == -1 )
  {
    OldHostOcc.occRWin.xULWin =
UIConfigData.xPosLastOSKScreen;
    OldHostOcc.occRWin.yULWin =
UIConfigData.yPosLastOSKScreen;
  }

  switch ( iOccType )
  {
    case SUI_OCCRWIN:
```

```
      UIConfigData.xPosLastOSKScreen =
OccMap->occRWin.xULWin;
      UIConfigData.yPosLastOSKScreen =
OccMap->occRWin.yULWin;
      return ( SetWinHostOcclude(
&OccMap->occRWin ) );

    case SUI_OCCDOSTEXT:
      UIConfigData.xPosLastOSKScreen =
OccMap->occText.xULCol;
      UIConfigData.yPosLastOSKScreen =
OccMap->occText.yULRow;
      return ( SetDOSTextHostOcclude(
&OccMap->occText ) );

    case SUI_OCCDOSGRAPHICS:
      UIConfigData.xPosLastOSKScreen =
OccMap->occDosGraph.xULDos;
      UIConfigData.yPosLastOSKScreen =
OccMap->occDosGraph.yULDos;
      return ( SetDOSGraphHostOcclude(
&OccMap->occDosGraph ) );

    case SUI_NOOCCTYPE:
    default:
      TRACE( "ERROR: invalid occlusion type
specified in
CreateOccludeArea()\n" );
      return ( ERR_INTERNAL );
  }
}


int SetWinHostOcclude( OCCLUDERWIN *OccRWIN
)
{
  if ( iHostOccludeIdx != SMD_NOACTIVETHREAD )

  {
    TRACE( "NOTICE: Attempt to reenter
SetWinHostOcclude() before
it is done, returning error\n" );
    return ( ERR_SUCCESS );
  }

  SetOccDefineAcked( PMI_NOACK );

  HostOcc.occRWin.xULWin = OccRWIN->xULWin;
  HostOcc.occRWin.yULWin = OccRWIN->yULWin;
  HostOcc.occRWin.xLRWin = ( OccRWIN->xLRWin
- OccRWIN->xULWin )
+ 1;
  HostOcc.occRWin.yLRWin = ( OccRWIN->yLRWin
- OccRWIN->yULWin )
+ 1;

#if !defined( PROD )
  sprintf( szTempStr, "\nNOTICE: Occlusion Region
for Windows at
x:%d, y:%d, x:%d, y:%d\n",
         HostOcc.occRWin.xULWin,
HostOcc.occRWin.yULWin,
         HostOcc.occRWin.xLRWin,
HostOcc.occRWin.yLRWin );
  TRACE( szTempStr );
#endif

  if ( SendPrivateMessage( PMI_REQOCCDEFINE,
sizeof ( OCCLUDERWIN
),
                    ( char * )&HostOcc.occRWin ) !=
ERR_SUCCESS )
  {
    TRACE( "ERROR: PM for occlude region not
sent due to
SendPrivateMessage() error\n" );
    DrawSUIOSK( &OldHostOcc, SUI_OCCRWIN );
    return ( ERR_SUCCESS );
  }

  if ( ( iHostOccludeIdx = GetTempEventNum() ) < 0
)
  {
    TRACE( "ERROR: Out of temporary threads,
drawing OSK
anyway\n" );
    DrawSUIOSK( NULL, SUI_OCCRWIN );
    return ( ERR_INTERNAL );
  }

  AddThread( iHostOccludeIdx, ( NEARPROC
)WaitForDefineOcc, NULL
SMD_MANYTIMES, FALSE,
          SCS_WAITACKPOLLFREQ,
SCS_WAITACKMAXRETRY );

  return ( ERR_SUCCESS );
}
```

```
void WaitForDefineOcc( void )
{
  if ( GetOccDefineAcked() != PMI_NOACK )
  {
    DelThread( iHostOccludeIdx );

    if ( GetOccDefineAcked() == PMI_ACKEDTRUE )
    {
      TRACE( "NOTIFY: Message acknowledgement
detected, enable
SUI to begin OSK paint\n" );
      OldHostOcc = HostOcc;
      DrawSUIOSK( NULL, SUI_OCCRWIN );
    }
    else
    {
      TRACE( "ERROR: Message acknowledgement
detected, abort OSK
paint\n" );
      DrawSUIOSK( &OldHostOcc, SUI_OCCRWIN );

    }

    iHostOccludeIdx = SMD_NOACTIVETHREAD;

  }
  else if ( GetRetryLimit( iHostOccludeIdx ) == 0 )
  {
    TRACE( "ERROR: Timeout, define Occ message
acknowledgment not
received, allow draw anyway \n" );
    DelThread( iHostOccludeIdx );
    iHostOccludeIdx = SMD_NOACTIVETHREAD;
    DrawSUIOSK( NULL, SUI_OCCRWIN );
    SetOccDefineAcked( PMI_ACKEDFALSE );
  }
}

int CloseHostOcclude( void )
{
  if ( iHostOccludeIdx != SMD_NOACTIVETHREAD )

  {
    TRACE( "NOTICE: Attempt to reenter
CloseHostOcclude() before
it is done, returning error\n" );
    return ( ERR_INTERNAL );
  }

  if ( GetCurrHostMode() == PHD_DOSAPP )
  {
    TRACE( "NOTICE: Already at DOS not need to
close Windows
occlude\n" );
    return ( ERR_SUCCESS );
  }

  SetOccCloseAcked( PMI_NOACK );

  if ( IsOSKUniClose( GetCurrSerCode() ) )
  {
    if ( SendPrivateMessage( PMI_REQOCCCLOSE,
0, NULL ) !=
ERR_SUCCESS )
    {
      TRACE( "ERROR: PM for closure of occlude
region not sent
due to SendPrivateMessage() error\n" );

      return ( ERR_SUCCESS );
    }

    if ( ( iHostOccludeIdx = GetTempEventNum() ) <
0 )
      return ( ERR_INTERNAL );

    AddThread( iHostOccludeIdx, ( NEARPROC
)WaitForCloseOcc,
NULL, SMD_MANYTIMES, FALSE,
          SCS_WAITACKPOLLFREQ,
SCS_WAITACKMAXRETRY );
  }
  else
  {
    TRACE( "NOTICE: Unilateral closure of Windows
OSK identified,
no PM sent\n" );
    SetFullRepaint( ERR_SUCCESS );
  }

  return ( ERR_SUCCESS );
}

void WaitForCloseOcc( void )
{
  if ( GetOccCloseAcked() != PMI_NOACK )
  {
    DelThread( iHostOccludeIdx );
```

```
  if ( GetOccCloseAcked() == PMI_ACKEDTRUE )
  {
    TRACE( "NOTIFY: Message acknowledgement
for close of OCC
detected\r" );
    SetFullRepaint( ERR_SUCCESS );
  }
  else
  {
    TRACE( "ERROR: Message acknowledgement
for close of OCC
detected, failed close\r" );
    SetFullRepaint( ERR_INTERNAL );
  }

  iHostOccludeIdx = SMD_NOACTIVETHREAD;

 }
 else if ( GetRetryLimit( iHostOccludeIdx ) == 0 )
 {
  DelThread( iHostOccludeIdx );
  iHostOccludeIdx = SMD_NOACTIVETHREAD;

  TRACE( "ERROR: Close Occ acknowledgment
not received, set for
success anyway\r" );
  SetFullRepaint( ERR_SUCCESS );
 }
}


int SetDOSGraphHostOcclude(
OCCLUDEDOSGRAPHICS *OccDosGraphics )
{
 HostOcc = *( OCCLUDEUNION *
)OccDosGraphics;
 if ( !isOSKAsSetupDlg( GetCurrScrCode() ) )
 {
   TRACE( "NOTICE: Beginning immediate redraw
of DOS Graphics
OSK\r" );
   DrawSUIOSK( NULL, SUI_OCCDOSGRAPHICS
);

   TRACE( "NOTICE: Waiting for SUI video busy for
the DOS
Graphics OSK\r" );

   if ( SMVideoBusy( DoDOSGraphHostOcclude ) !=
ERR_SUCCESS )
     return ( ERR_INTERNAL );
 }
 else
 {
   TRACE( "NOTICE: OSK As Setup Dialog, no
SCOS calls, clearing
screen \r" );

   SetVideoMode( SUI_INITIALVIDMODE );
   DrawSUIOSK( NULL, SUI_OCCDOSGRAPHICS
);
 }
}

void DoDOSGraphHostOcclude( void )
{

#if !defined( PROD )
  sprintf( szTempStr, "NOTICE: Occlusion Region for
DOS Graphics
at x:%d, y:%d, x:%d, y:%d\r",
        HostOcc.occDosGraph.xULDos,
HostOcc.occDosGraph.yULDos,
        HostOcc.occDosGraph.xLRDos,
HostOcc.occDosGraph.yLRDos
);
  TRACE( szTempStr );
#endif

  SetSCSHostOcclude( &HostOcc,
SUI_OCCDOSGRAPHICS, TRUE );




}


int SetDOSTextHostOcclude( OCCLUDETEXT
*OccDosText )
{

  HostOcc.occText.yULRow =
OccDosText->yULRow /
SCS_OSKTEXTCHARHEIGHT;
  HostOcc.occText.xULCol = OccDosText->xULCol /
SCS_OSKTEXTCHARWIDTH;
 HostOcc.occText.yLRRow = ( (
OccDosText->yLRRow + 1 ) /
SCS_OSKTEXTCHARHEIGHT ) - 1;
 HostOcc.occText.xLRCol = ( (
OccDosText->xLRCol + 1 ) /
SCS_OSKTEXTCHARWIDTH ) - 1;

 *OccDosText = HostOcc.occText;

 TRACE( "NOTICE: Beginning immediate redraw of
DOS Text OSK\r"
);
 DrawSUIOSK( NULL, SUI_OCCDOSTEXT );

#if !defined( PROD )
 sprintf( szTempStr, "NOTICE: Occlusion Region for
DOS Text at
x:%d, y:%d, x:%d, y:%d\r",
        HostOcc.occText.xULCol,
HostOcc.occText.yULRow,
        HostOcc.occText.xLRCol,
HostOcc.occText.yLRRow );
 TRACE( szTempStr );
#endif

  return ( SetSCSHostOcclude( &HostOcc,
SUI_OCCDOSTEXT, TRUE ) );
}


int SetSCSHostOcclude( OCCLUDEUNION *occ,
OCCTYPE iNewOccType,
BYTE fNewRepaintRequired )
{
 if ( iHostOccludeIdx != SMD_NOACTIVETHREAD )

 {
   TRACE( "NOTICE: Attempt to reenter
SetSCSHostOcclude() before
it is done, returning error\r" );
   return ( ERR_INTERNAL );
 }

 SetFullRepaint( ERR_INPROGRESS );

 pSetOccData = occ;
 iSetOccType = iNewOccType;
 fRepaintRequired = fNewRepaintRequired;

 if ( ( iHostOccludeIdx = GetTempEventNum() ) < 0
)
   return ( ERR_INTERNAL );

 AddThread( iHostOccludeIdx, ( NEARPROC
)DoSCSHostOcclude, NULL,
SMD_MANYTIMES, FALSE,
        SCS_DOHOSTOCCPOLLFREQ,
SCS_DOHOSTOCCMAXRETRY );

 return ( ERR_SUCCESS );
}

void DoSCSHostOcclude( void )
{
 int iOccError;

 if ( ( iOccError = DefineSCSOcclude(
pSetOccData, iSetOccType,
fRepaintRequired ) ) != ERR_SUCCESS )
  {
   if ( iOccError != ERR_SCSBUSY )
   {
    SetFullRepaint( ERR_INTERNAL );
    DelThread( iHostOccludeIdx );
    iHostOccludeIdx = SMD_NOACTIVETHREAD;

    TRACE( "ERROR: Unrecoverable error occured
 in the call to
DefineSCSOcclude()\r" );
   }
   else if ( GetRetryLimit( iHostOccludeIdx ) == 0 )
   {
    SetFullRepaint( ERR_INTERNAL );
    DelThread( iHostOccludeIdx );
    iHostOccludeIdx = SMD_NOACTIVETHREAD;

    TRACE( "ERROR: Exhausted the max number
of retries in
DefineSCSOcclude()\r" );
   }
  }
  else
  {
   SetFullRepaint( ERR_SUCCESS );
   DelThread( iHostOccludeIdx );
   iHostOccludeIdx = SMD_NOACTIVETHREAD;
   TRACE( "NOTICE: Success in calling
DefineSCSOcclude()\r" );
  }
}

#if defined( _MSC_VER )
#pragma warning( default : 4704 )
#endif

Copr. 1995 Zenith Data Systems Corp.
#include "er.h"
#include "sio.h"
#include "spawn.h"
#include "sm.h"

#if defined( _MSC_VER )
#pragma warning( disable : 4704 )
#endif

 static BYTE      bGearIdx = 0;
 static int       iTempThreadIdx =
 SMD_NOACTIVETHREAD;
 static int       iSleepThreadIdx =
 SMD_NOACTIVETHREAD;
 static BOOL      fPNDActive = FALSE;
 static PENCALIB  CurrPenCalib;
 static ZDSTRAPREC PNDTrapRec;
 static BYTE      nCurrPenButtonMode =
 PND_LEFTMOUSE;
 static BYTE      nCurrHostMode = PND_DOSAPP;
 static BYTE      fSleepActive = FALSE;

 static APIFUNC aAPIFuncTable[] =
 {
  { SMI_PNDLOADING, PenDriverLoading },
  { 0, 0 },
 };

 APIFUNC *GetPNDFuncTable( void )
 {
  return ( aAPIFuncTable );
 }

 BYTE GetCurrHostMode( void )
 {
  BYTE nTmpHostMode;

  PCB_BEGINCRITICAL;

  nTmpHostMode = nCurrHostMode;

  PCB_ENDCRITICAL;

  return ( nTmpHostMode );
 }

 void CheckPenDriver( void )
 {
  int iHotIcon;

  if ( GetConnectRequested() &
 GetRequestHostList() )
    return;

  if ( GetPNDActiveStatus() )
  {
   if ( ( iHotIcon = GetHotIcon() ) >= 0 )
   {
    ErrorBeep();

    switch( iHotIcon )
    {
     case PND_ICONSLEEP:
      ActivateSleepMode();
      break;

     case PND_ICONSETUP:
      LoadSUI( SUI_LASTSETUPDLGSCREEN, 0
 );
      break;

     case PND_ICONOSK:
      if ( GetSCSCallProgress() ==
 SMI_SCSCONNECTED )
        LoadSUI( SUI_LASTOSKSCREEN, 0 );
      break;

     case PND_ICONPALLETTE:
      RotatePallette();
      break;

     case PND_ICONSPEAKER:
      ToggleSpeaker();
      break;

     case PND_ICONLRMOUSE:
      if ( nCurrPenButtonMode ==
 PND_LEFTMOUSE )
      {
       SetPenButtonMode( PND_RIGHTMOUSE );
       EnableRightMouseButton( FON );
      }
      else
      {
       SetPenButtonMode( PND_LEFTMOUSE );
       EnableRightMouseButton( FOFF );
      }
      break;

     case PND_ICONHOSTCTRLMODE:
      DoHostControlMode( TRUE );
      break;

     case PND_UDEF1:
     case PND_UDEF2:
      SendUDHotIcon( iHotIcon );
      break;
    }
   }
  }
 }

void SetPNDActiveStatus( BOOL fPenDriverStat )
{
 fPNDActive = fPenDriverStat;
}

BOOL GetPNDActiveStatus( void )
{
 return ( fPNDActive );
}

APIFUNCRET PenDriverLoading( struct REGW
*CallerRegs )
{
 if ( ( iTempThreadIdx = GetTempEventNum() ) ==
-1 )
 {
   CallerRegs->ax = ( UINT )ERR_PNDINTERNAL;
   goto exit;
 }

  CurrPenCalib.wXUpperPenCalib =
 UIConfigData.wXUpperPenCalib;
  CurrPenCalib.wYUpperPenCalib =
 UIConfigData.wYUpperPenCalib;
  CurrPenCalib.wXLowerPenCalib =
 UIConfigData.wXLowerPenCalib;
  CurrPenCalib.wYLowerPenCalib =
 UIConfigData.wYLowerPenCalib;
  CurrPenCalib.wHITopMargin = PND_TOPMARGIN;
  CurrPenCalib.wHIRightMargin =
 PND_RIGHTMARGIN;
  CurrPenCalib.wHIVertSpace =
 PND_VERTSPACING;
  CurrPenCalib.wHIXWidth = PND_WIDTH;
  CurrPenCalib.wHIYHeight = PND_HEIGHT;

  sprintf( szTempStr, "NOTICE: Using Calibration:
 %d,%d -
 %d,%d\r", UIConfigData.wXUpperPenCalib,
        UIConfigData.wYUpperPenCalib,
 UIConfigData.wXLowerPenCalib,
 UIConfigData.wYLowerPenCalib );
  TRACE( szTempStr );

  CallerRegs->dx = HIWORD( ( ( DWORD )( (
 PENCALIB FAR *
 )&CurrPenCalib ) ) );
  CallerRegs->si = LOWORD( ( ( DWORD )( (
 PENCALIB FAR *
 )&CurrPenCalib ) ) );

  AddThread( iTempThreadIdx, InitPND, NULL,
 SMD_ONETIME, FALSE,
 INI_POLLFREQ,
        0 );
 exit:
  SetPNDActiveStatus( TRUE );
  SetForegroundRegs( CallerRegs );
 }

 void InitPND( void )
 {
  #if !defined( NDEBUG )
  crs_x = 0;
  crs_y = 24;
  #endif

  DelThread( iTempThreadIdx );
  if ( SetDeviceMode( PND_MOUSEMODE ) != 0 )
    goto error;

  chk_video();

  if ( NotifyVideoMode( GetCurrVidMode() ) !=
 ERR_SUCCESS )
    goto error;
```

```
 if ( nCurrPenButtonMode == PND_LEFTMOUSE )
  EnableRightMouseButton( FOFF );
 else
  EnableRightMouseButton( FON );


 goto success;

error:
 TRACE( "ERROR: Pen Driver initialization failed \r"
);
 return;

success:
 TRACE( "NOTICE: Pen Driver successfully
initialized.\r" );
}

void initPNDTrapRec( void )
{
 fil_chr( ( NPSTR )&PNDTrapRec, 0, sizeof(
ZDSTRAPREC ) );

 PNDTrapRec.tr.tr_int = SMI_PNDINTNUM;

 PNDTrapRec.tr.tr_asm_srv =
CRU_ONBUSYEITHER;

 strcpy( PNDTrapRec.szSMAfterSignature,
szSMSignature );
}

TRAPREC *GetPNDTrapRec( void )
{
 return ( &PNDTrapRec.tr );
}

int GetHotIcon( void )
{
 REG_W inRegs, OutRegs;

 if ( !GetPNDActiveStatus() )
  return ( PND_NOICON );

 fil_chr( ( NPSTR )&inRegs, 0, sizeof( REG_W ) );

 inRegs.ax = PND_GETDATA;
 inRegs.es = NULL;
 inRegs.dx = NULL;
 inRegs.cx = 0;

 intn( &inRegs, &OutRegs, PND_INTNUM );

 return ( OutRegs.bx );
}

int SetDeviceMode( int iPenMode )
{
 REG_W inRegs, OutRegs;

 if ( !GetPNDActiveStatus() )
  return ( ERR_INTERNAL );

 fil_chr( ( NPSTR )&inRegs, 0, sizeof( REG_W ) );

 inRegs.ax = PND_SETDEVICEMODE;
 inRegs.bx = iPenMode;

 intn( &inRegs, &OutRegs, PND_INTNUM );

 return ( ERR_SUCCESS );
}

int NotifyVideoMode( int iVideoMode )
{
 REG_W inRegs, OutRegs;

 if ( !GetPNDActiveStatus() )
  return ( ERR_INTERNAL );

 fil_chr ( NPSTR )&inRegs, 0, sizeof( REG_W ) );

 inRegs.ax = PND_SETVIDEOMODE;
 inRegs.bx = iVideoMode;

 inRegs.si = GetXScreenRes( iVideoMode );
 inRegs.di = GetYScreenRes( iVideoMode );
 inRegs.cx = MAKEWORD( GetYCharRes(),
GetXCharRes() );

 intn( &inRegs, &OutRegs, PND_INTNUM );

 return ( ERR_SUCCESS );
}

int SetSetupDigMode( int iDigMode )
{
 REG_W inRegs, OutRegs;

 if ( !GetPNDActiveStatus() )
  return ( ERR_INTERNAL );

 fil_chr( ( NPSTR )&inRegs, 0, sizeof( REG_W ) );

 inRegs.ax = PND_SETUPDLGMODE;
 inRegs.bx = iDigMode;

 intn( &inRegs, &OutRegs, PND_INTNUM );

 return ( ERR_SUCCESS );
}

int SetOSKMode( OCCLUDEUNION *OccArea,
OCCTYPE OccType )
{
 REG_W inRegs, OutRegs;

 if ( !GetPNDActiveStatus() )
  return ( -1 );

 fil_chr( ( NPSTR )&inRegs, 0, sizeof( REG_W ) );

 inRegs.ax = PND_OSKDIMEN;

 if ( OccArea == NULL )
  inRegs.bx = inRegs.cx = inRegs.dx = inRegs.si =
0;
 else
 {
  switch ( OccType )
  {
   case SUI_OCCDOSTEXT:

    inRegs.cx = OccArea->occText.yULRow *
SCS_OSKTEXTCHARHEIGHT;
    inRegs.bx = OccArea->occText.xULCol *
SCS_OSKTEXTCHARWIDTH;
    inRegs.si = OccArea->occText.yLRRow *
SCS_OSKTEXTCHARHEIGHT;
    inRegs.dx = OccArea->occText.xLRCol *
SCS_OSKTEXTCHARWIDTH;
    break;

   case SUI_OCCDOSGRAPHICS:
    inRegs.bx = OccArea->occDosGraph.xULDos;
    inRegs.cx = OccArea->occDosGraph.yULDos;
    inRegs.dx = OccArea->occDosGraph.xLRDos;
    inRegs.si = OccArea->occDosGraph.yLRDos;
    break;

   case SUI_OCCRWIN:
    inRegs.bx = OccArea->occRWin.xULWin;
    inRegs.cx = OccArea->occRWin.yULWin;
    inRegs.dx = OccArea->occRWin.xLRWin;
    inRegs.si = OccArea->occRWin.yLRWin;
    break;

   default:
    return ( ERR_INTERNAL );
  }
 }

 intn( &inRegs, &OutRegs, PND_INTNUM );

 return ( ERR_SUCCESS );
}

int SetPenButtonMode( BYTE nNewPenButtonMode
)
{
 REG_W inRegs, OutRegs;

 if ( !GetPNDActiveStatus() )
  return ( -1 );

 if ( nNewPenButtonMode != nCurrPenButtonMode )
 {
  fil_chr( ( NPSTR )&inRegs, 0, sizeof( REG_W ) );

  inRegs.ax = PND_SETMOUSEBUTTON;

  intn( &inRegs, &OutRegs, PND_INTNUM );

  nCurrPenButtonMode = nNewPenButtonMode;
 }

 return ( ERR_SUCCESS );
}

int SetHostMode( int iHostMode )
{
 REG_W inRegs, OutRegs;

 if ( !GetPNDActiveStatus() )
  return ( ERR_INTERNAL );

 fil_chr( ( NPSTR )&inRegs, 0, sizeof( REG_W ) );

 inRegs.ax = PND_HOSTMODE;
 inRegs.bx = iHostMode;

 intn( &inRegs, &OutRegs, PND_INTNUM );

 nCurrHostMode = LOBYTE( iHostMode );

 return ( ERR_SUCCESS );
}

int SetCalibMode( int iCalibMode, int xCalibPnt, int
yCalibPnt )
{
 REG_W inRegs, OutRegs;

 if ( !GetPNDActiveStatus() )
  return ( ERR_INTERNAL );

 fil_chr( ( NPSTR )&inRegs, 0, sizeof( REG_W ) );

 inRegs.ax = PND_SETCALIBMODE;
 inRegs.bx = iCalibMode;
 inRegs.cx = xCalibPnt;
 inRegs.dx = yCalibPnt;

 intn( &inRegs, &OutRegs, PND_INTNUM );

 return ( ERR_SUCCESS );
}

int GetCalibState( int iCalibMode, int *xUpperCol, int
*yUpperRow,
          int *xLowerCol, int *yLowerRow )
{
 REG_W inArgs, OutArgs;
 int iCalibDone;
 int iReturn;

 fil_chr( ( NPSTR )&inArgs, 0, sizeof ( inArgs ) );

 inArgs.ax = PND_GETCALIBSTAT;

 intn( &inArgs, &OutArgs, PND_INTNUM );

 if ( iCalibMode == PND_CALIBLR )
  iCalibDone = OutArgs.bx & PND_CALIBLRSTAT;
 else
  iCalibDone = OutArgs.bx & PND_CALIBULSTAT;

 if ( iCalibDone )
 {
  if ( OutArgs.bx & PND_CALIBVALID )
   iReturn = PND_CALIBDONEVALID;
  else
   iReturn = PND_CALIBDONEINVALID;

  if ( iCalibMode == PND_CALIBLR )
  {
   *xUpperCol = OutArgs.cx;
   *yUpperRow = OutArgs.dx;
   *xLowerCol = OutArgs.si;
   *yLowerRow = OutArgs.di;
  }
 }
 else
  iReturn = PND_CALIBNOTDONE;

 return ( iReturn );
}

int EnableNewCalib( BOOL fEnableNewCalib )
{
 REG_W inArgs, OutArgs;

 fil_chr( ( NPSTR )&inArgs, 0, sizeof ( inArgs ) );

 inArgs.ax = PND_ENABLENEWCALIB;
 inArgs.bx = ( WORD )fEnableNewCalib;

 intn( &inArgs, &OutArgs, PND_INTNUM );

 return ( ERR_SUCCESS );
}

int ActivateSleepMode( void )
{
 if ( iSleepThreadIdx != SMD_NOACTIVETHREAD )
 {
  if ( GetSCSCallProgress() ==
SMI_SCSCONNECTED )
   DoHostControlMode( FALSE );
  else
   DoSuspend( TRUE );

  DelThread( iSleepThreadIdx );
  iSleepThreadIdx = SMD_NOACTIVETHREAD;
 }
 else
 {
  if ( ( iSleepThreadIdx = GetTempEventNum() ) ==
-1 )
   return ( ERR_INTERNAL );

  AddThread( iSleepThreadIdx, WaitForSleep,
NULL, SMD_ONETIME,
FALSE,
        PND_SLEEPPOLLFREQ, 0 );
 }

 return ( ERR_SUCCESS );
}

void WaitForSleep( void )
{
 if ( GetRetryLimit( iSleepThreadIdx ) == 0 )
 {
  DelThread( iSleepThreadIdx );
  iSleepThreadIdx = SMD_NOACTIVETHREAD;

  DoSleep();
 }
}


#if defined( _MSC_VER )
#pragma warning( default : 4704 )
#endif


Copr. 1995 Zenith Data Systems Corp

#include "sr.h"
#include "spawn.h"
#include "sio.h"
#include "sm.h"

#if defined( _MSC_VER )
#pragma warning( disable : 4704 )
#endif

static PROXIMTRAPREC PRXTrapRec;
static PROXIMVARIABLES PRXVariables;
static PROXIMVERSIONINFO PRXVersionInfo;
static PRXCB lpfnPRXCallBack = NULL;
static int iConnStrengthThreadIdx =
SMD_NOACTIVETHREAD;
static int iPRXSetupThreadIdx =
SMD_NOACTIVETHREAD;
static int iCurrLinkQuality = PRX_NOLINKQUALITY;

static APIFUNC aAPIFuncTable[] =
{
 { SMI_PRXPOWERMANCB, RegisterPowerManCB
},
 { SMI_PRXUNLOADING, ProximDriverUnload },
 { SMI_PRXNETCONFIG, NetConfigData },
 { SMI_PRXXCHGREVINFO, XchgRevInfo },
 { 0, 0 }
};

APIFUNC *GetPRXFuncTable( void )
{
 return ( aAPIFuncTable );
}

BOOL GetPRXActiveStatus( void )
{
 return ( lpfnPRXCallBack != NULL );
}

void initPRXTrapRec( void )
{
 fil_chr( ( NPSTR )&PRXTrapRec, 0, sizeof(
PROXIMTRAPREC ) );

  PRXTrapRec.tr.tr_int = SMI_PRXINTNUM;
  PRXTrapRec.tr.tr_asm_srv = CRU_REFLECTINT;


  mem_cp( SIG_RLNOEMSIGNATURE,
PRXTrapRec.szSMBeforeSignature,
      sizeof ( PRXTrapRec.szSMBeforeSignature )
);
}

TRAPREC *GetPRXTrapRec( void )
{
 return ( &PRXTrapRec.tr );
}

void CheckSystem( void )
{
 int iNewLinkQuality;

 if ( GetSuspendFlag() )
 {
  if ( GetSCSCallProgress() ==
SMI_SCSCONNECTED )
```

```
    DoHostControlMode( FALSE );
  else
    DoSuspend( TRUE );
 }

 if ( ( iNewLinkQuality = GetLinkQuality() ) !=
ERR_INTERNAL )
 {
  if ( iNewLinkQuality != iCurrLinkQuality )
  {
   switch( iNewLinkQuality )
   {
    case PRX_DISCONNECTED:
     SetTowerIcon( SBS_TOWERON,
SBS_WAVESOFF );
     break;

    case PRX_LOWQUALITY:
     SetTowerIcon( SBS_TOWERON,
SBS_WAVESHIGHBLINK );
     break;

    case PRX_HIGHQUALITY:
     SetTowerIcon( SBS_TOWERON,
SBS_WAVESON );
     break;
   }

   iCurrLinkQuality = iNewLinkQuality;
  }
 }
}


APIFUNCRET RegisterPowerManCB( struct REGW
*CallerRegs )
{
 lpfnPRXCallBack = MK_FP( CallerRegs->es,
CallerRegs->si );

 if ( ( iPRXSetupThreadIdx = GetTempEventNum() )
< 0 )
   return

 AddThread( iPRXSetupThreadIdx,
WaitForPRXSetup, NULL,
SMD_ONETIME, FALSE,
        1, 0 );

 CallerRegs->ax = ( WORD )ERR_SUCCESS;

 SetForegroundRegs( CallerRegs );
}

void WaitForPRXSetup( void )
{
 PROXIMVARIABLES far *NewPRXVariables;
 WORD wSegNewVars;
 WORD wOffNewVars;
 int iSizeNewVariables = 0;

 DelThread( iPRXSetupThreadIdx );
 iPRXSetupThreadIdx = SMD_NOACTIVETHREAD;

 if ( lpfnPRXCallBack != NULL )
 {
  AX( PRX_CBPRXVARIABLES );
  ( *lpfnPRXCallBack )();

  _asm
  {
   or  bx,ax
   jnz error

   mov iSizeNewVariables, cx
   mov wSegNewVars, es
   mov wOffNewVars, si
  error:
  }

  if ( iSizeNewVariables > 0 )
  {
   NewPRXVariables = MK_FP( wSegNewVars,
wOffNewVars );

   if ( iSizeNewVariables <= sizeof ( PRXVariables
) )
     PRXVariables = *NewPRXVariables;
  }
 }
}

APIFUNCRET ProximDriverUnload( struct REGW
*CallerRegs )
{
 lpfnPRXCallBack = NULL;

 CallerRegs->ax = ERR_SUCCESS;
```

```
 SetForegroundRegs( CallerRegs );
}

APIFUNCRET NetConfigData( struct REGW
*CallerRegs )
{
 PROXIMNETCONFIGDATA far *pPRXNetConfig =
  ( PROXIMNETCONFIGDATA far * )MK_FP(
CallerRegs->es,
CallerRegs->si );

 if ( CallerRegs->cx <= sizeof (
PROXIMNETCONFIGDATA ) )
 {
  pPRXNetConfig->nDomainID =
UIConfigData.nDomainID;
  CallerRegs->ax = ERR_SUCCESS;
 }
 else
  CallerRegs->ax = ( WORD )ERR_INTERNAL;

 SetForegroundRegs( CallerRegs );
}

APIFUNCRET XchgRevInfo( struct REGW
*CallerRegs )
{
 PROXIMVERSIONINFO far *NewPRXVersionInfo;

 if ( CallerRegs->cx <= sizeof (
PROXIMVERSIONINFO ) )
 {
  NewPRXVersionInfo = MK_FP( CallerRegs->es,
CallerRegs->di );


  PRXVersionInfo.wMajorVersion =
GEN_SMMAJORVERSIONNUM;
  PRXVersionInfo.wMinorVersion =
GEN_SMMINORVERSIONNUM
  PRXVersionInfo.lpszModuleName = ( LPSTR
)szSMModuleName;

  CallerRegs->es = SEG( &PRXVersionInfo );
  CallerRegs->si = OFF( &PRXVersionInfo );

  *:llerRegs->ax = ERR_SUCCESS;
 }
 else
  CallerRegs->ax = ( WORD )ERR_INTERNAL;

 SetForegroundRegs( CallerRegs );
}

int NotifySuspend( void )
{
 if ( lpfnPRXCallBack == NULL )
  return ( ERR_INTERNAL );

 AX( PRX_CBSUSPEND );
 return ( ( *lpfnPRXCallBack )() );
}

int NotifyResume( void )
{
 if ( lpfnPRXCallBack == NULL )
  return ( ERR_INTERNAL );

 AX( PRX_CBRESUME );
 return ( ( *lpfnPRXCallBack )() );
}

int SetSecurityID( char *szNewSecurityID )
{
 if ( lpfnPRXCallBack == NULL )
  return ( ERR_INTERNAL );

 _asm
 {
  mov ax, PRX_CBSETSECUREID
  push ds
  pop es
  mov si, szNewSecurityID
 }

 return ( ( *lpfnPRXCallBack )() );
}

BOOL IsSynchronized( void )
{
 BOOL fNewSynchronizeFlag;

 if ( PRXVariables.lpszSynchronizeFlag == NULL )
  return ( ERR_INTERNAL );

 PCB_BEGINCRITICAL;
 fNewSynchronizeFlag = ( BOOL
)*PRXVariables.lpszSynchronizeFlag;
```

```
 PCB_ENDCRITICAL;

 return ( fNewSynchronizeFlag );
}

LPSTR GetRomVersion( void )
{
 LPSTR lpszNewRomVersion;

 if ( PRXVariables.lpszRomVersion == NULL )
  return ( NULL );

 PCB_BEGINCRITICAL;
 lpszNewRomVersion = ( LPSTR
)PRXVariables.lpszRomVersion;
 PCB_ENDCRITICAL;

 return ( lpszNewRomVersion );
}

int GetLinkQuality( void )
{
 int iNewLinkQuality;

 if ( PRXVariables.lpszLinkQuality == NULL )
  return ( ERR_INTERNAL );

 PCB_BEGINCRITICAL;
 iNewLinkQuality = ( int
)*PRXVariables.lpszLinkQuality;
 PCB_ENDCRITICAL;

 return ( iNewLinkQuality );
}

#if defined( _MSC_VER )
#pragma warning( default : 4704 )
#endif


Copr. 1995 Zenith Data Systems Corp.

#include "cr.h"
#include "sm.h"
#include "k2.h"
#include "spawn.h"
#include "rparm.h"
#include "hm.h"
#include "sm.h"

#if defined( _MSC_VER )
#pragma warning( disable : 4704 )
#endif

static BYTE bGearIdx = 0;

static ZDSTRAPREC       SCSTrapRec;
static CALLREC          SCSRecvMsgRec;
static CALLREC          SCSEventLoopRec;
static BOOL             fSCSActive = FALSE;
static BOOL             fMonStatus = FALSE;
static BOOL             fLocalKbdStatus = FALSE;
static BOOL             fHostControlRequested =
FALSE;
static BOOL             fConnectRequested;
static BYTE             fSendPMRetryDone = FALSE;
static BYTE             fWaitVidUnblockActive =
FALSE;
static BYTE             fBadVideoMsgRecv = FALSE;

static BOOL             fUpdatingConnectStatus =
FALSE;

static int          iSetMonDone = FALSE;
static int          iSetMemDone = FALSE;
static int          iFailRepaintDone = FALSE;
static int          iFreeMemPercent = 0;
static BYTE         nOSKType;
static BYTE         fRepaintRequired = FALSE;
static CONNERROR    nConnectErrorCode =
SCS_NOCONNERROR;
static PRIVATEMSGBUFF   RecvPriMsgBuff;
static PRIVATEMSGBUFF   SendPriMsgBuff;
static SYSTEMSTATUSBUFF SystemStatusBuff;
static int          iSCOSErrNo;
static int          iTempThreadIdx;
static int          iSUIThreadIdx;
static int          iFileMonThreadIdx;
static int          iDecoThreadIdx;
static int          iHostControlThreadIdx;
static int          iCancelConnectThreadIdx;
static int          iOkThreadIdx;
static int          iPMRetryThreadIdx =
SMD_NOACTIVETHREAD;
static int          iWaitVidUnblockThreadIdx =
SMD_NOACTIVETHREAD;
static FARCALLENTRY   lpfnFarCallEntry = NULL;

static char         *szHostFileName = NULL;
```

```
static APIFUNC aAPIFuncTable[]=
{
 { SMI_SCSLOADING, SCSLoading },
 { SMI_SLLOADSUI, SLLoadSUI },
 { SMI_SLENABLEKBD, SLEnableKbd },
 { SMI_SLGETFRAMETYPE, SLGetFrameType },
 { SMI_SLDEFINEOLDVIDVECTOR,
SLDefineOldVidVector },
 { SMI_SLGETMLIDSTATUS, SLGetMLIDStatus },
 { SMI_UNLOADOSK, UnloadOSK },
 { SMI_CHANGETOBADVIDEO,
ChangeToBadVideo },
 { SMI_REQNOTIFYDOSWIN, NotifyDosWin },
 { SMI_REQUNIOCCCLOSE, NotifyUniOccClose },
 { SMI_ACKFLASHBREAK, AckFlashBreak },
 { SMI_ACKTOTALFILES, AckTotalFlashFiles },
 { SMI_ACKPATHASSTRING, AckPathFlashFile },
 { SMI_ACKACTIVEUPDATE, AckActiveUpdate },
 { SMI_ACKOCCDEFINE, AckOccDefine },
 { SMI_ACKOCCCLOSE, AckOccClose },
 { 0, 0 }
};

BOOL GetUpdatingConnectStatus( void )
{
 return ( fUpdatingConnectStatus );
}

void SetUpdatingConnectStatus( BOOL fNewStatus )
{
 fUpdatingConnectStatus = fNewStatus;
}

APIFUNC *GetSCSFuncTable( void )
{
 return ( aAPIFuncTable );
}

void SetSCSActiveStatus( BOOL fNewSCSActive )
{
 fSCSActive = fNewSCSActive;
}

BOOL GetSCSActiveStatus( void )
{
 return ( fSCSActive );
}

void SetConnectRequested( BOOL
fNewConnectRequested, BYTE
nUpdateIcon )
{
 if ( ( fConnectRequested = fNewConnectRequested
) ==
SCS_CONNECTREQUESTED )
 {
  if ( nUpdateIcon == SCS_UPDATEICON )
   SetWaitingIcon( SBS_WAITINGICONON, TRUE
);
 }
 else
 {
  if ( nUpdateIcon == SCS_UPDATEICON )
   SetWaitingIcon( SBS_WAITINGICONOFF,
TRUE );
 }
}

BOOL GetConnectRequested( void )
{
 return ( fConnectRequested );
}

NPSTR GetPrivateMsgBuff( int *iBuffLen )
{
 *iBuffLen = RecvPriMsgBuff.iBuffLen;

 return ( RecvPriMsgBuff.sMsgBuff );
}

char GetConnectErrCode( void )
{
 return ( nConnectErrorCode );
}

int GetSCOSErrNo( BYTE nClearError )
{
 int iNewSCOSErrNo = 0;

 PCB_BEGINCRITICAL;
 iNewSCOSErrNo = iSCOSErrNo;

 if ( nClearError == SCS_CLEARERROR )
  iSCOSErrNo = 0;

 PCB_ENDCRITICAL;

 return ( iNewSCOSErrNo );
}
```

```
void SetFullRepaint( int iNewFullRepaintDone )
{
 iFullRepaintDone = iNewFullRepaintDone;
}

void InitSCSTrapRec( void )
{
 fl_chr( ( NPSTR )&SCSTrapRec, 0, sizeof(
ZDSTRAPREC ) );

 SCSTrapRec.tr.tr_int = SMI_SCSINTNUM;
 SCSTrapRec.tr.tr_asm_srv = 2;

 strcpy( SCSTrapRec.szSMAfterSignature,
szSMSignature );
}

TRAPREC *GetSCSTrapRec( void )
{
 return ( &SCSTrapRec.tr );
}

void InitSCSCallRec( void )
{
 DWORD dwCallService = ( DWORD )( FARPROC
)SCSEventLoopService;

 fl_chr( ( NPSTR )&SCSEventLoopRec, 0, sizeof(
CALLREC ) );

 SCSEventLoopRec.cFarCallOpCode = ( BYTE
)SMD_CALLOPCODE;
 SCSEventLoopRec.aCallBack[0] = LOBYTE(
LOWORD( dwCallService )
);
 SCSEventLoopRec.aCallBack[1] = HIBYTE(
LOWORD( dwCallService )
);
 SCSEventLoopRec.aCallBack[2] = LOBYTE(
HIWORD( dwCallService )
);
 SCSEventLoopRec.aCallBack[3] = HIBYTE(
HIWORD( dwCallService )
);
 SCSEventLoopRec.cFarRetOpCode = ( BYTE
)SMD_RETOPCODE;
 strcpy( SCSEventLoopRec.szSMAfterSignature,
SIG_SMSIGNATURE );

 dwCallService = ( DWORD )( FARPROC
)SCSRecvMsgService;
 mem_cp( ( PVOID )&SCSEventLoopRec, ( PVOID
)&SCSRecvMsgRec,
sizeof( CALLREC ) );
 SCSRecvMsgRec.aCallBack[0] = LOBYTE(
LOWORD( dwCallService ) );
 SCSRecvMsgRec.aCallBack[1] = HIBYTE(
LOWORD( dwCallService ) );
 SCSRecvMsgRec.aCallBack[2] = LOBYTE(
HIWORD( dwCallService ) );
 SCSRecvMsgRec.aCallBack[3] = HIBYTE(
HIWORD( dwCallService ) );
}

void FAR SCSEventLoopService( void )
{
 _asm
 {
  or   ah,ah
  jnz  process
  jmp  exit

 process:
  cli

  push ds
  push ax
  push bx
  push cx
  push dx
  push si
  push di
  mov  ds,cs:000Ah
 };

 PushEventNum( SMI_SCSEVENTNUM );
 lpfnFarCallEntry = MK_FP( _ccode, _fcall_entry );

 _asm
 {
  pop di
  pop si
  pop dx
  pop cx
  pop bx
  pop ax
  mov al,ah
  xor ah,ah
  add ax, SMI_EVENTLOOPBASE

  sti

  call [lpfnFarCallEntry]

  pop ds
 };

exit:
 return;
}

void FAR SCSRecvMsgService( void )
{
 _asm
 {
  cli

  push ds
  push ax
  push bx
  push cx
  push dx
  push si
  push di
  mov  ds,cs:000Ah
 };

 PushEventNum( SMI_SCSEVENTNUM );
 lpfnFarCallEntry = MK_FP( _ccode, _fcall_entry );

 _asm
 {
  pop di
  pop si
  pop dx
  pop cx
  pop bx
  pop ax

  push ds
  pop ds
  mov ax, [di]
  add ax, SMI_PRIMSGBASE

  mov ds,cs:000Ah

  sti

  call [lpfnFarCallEntry]

  pop ds
 };
}

APIFUNCRET SCSLoading( struct REGW
*CallerRegs )
{
 CallerRegs->ax = 0x0001;

 CallerRegs->bx = SEG( &SCSRecvMsgRec );
 CallerRegs->si = OFF( &SCSRecvMsgRec );
 CallerRegs->dx = SEG( &SCSEventLoopRec );
 CallerRegs->di = OFF( &SCSEventLoopRec );

 CallerRegs->cx = SMD_DISPATFREQ;

 SetForegroundRegs( CallerRegs );

 if ( ( iTempThreadIdx = GetTempEventNum() ) < 0
 )
  return;

 AddThread( iTempThreadIdx, ( NEARPROC
)SetupSCOS, NULL,
SMD_ONETIME, FALSE,
        SCS_LOADSCSPOLLFREQ, 0 );
}

APIFUNCRET UnloadOSK( struct REGW
*CallerRegs )
{
 int iCurrScrCode = GetCurrScrCode();

 if ( GetSUIReady() && IsOSK( iCurrScrCode ) )
 {
  SetCurrScrCode( iCurrScrCode |
SUI_OSKVIDCHANGEMASK );
  UnloadSUI( SUI_NOUNLOADSUI );
 }
}

APIFUNCRET ChangeToBadVideo( struct REGW
*CallerRegs )
{
 if ( GetSCSCallProgress() ==
SMI_SCSCONNECTED )
 {
  fBadVideoMsgRecv = TRUE;
  DiscsDisableConnection();
 }
}

APIFUNCRET NotifyDosWin( struct REGW
*CallerRegs )
{
 int iMsgStatus;

 PCB_BEGINCRITICAL

 if ( ( iMsgStatus = PrepPrivateMessage(
CallerRegs ) ) ==
ERR_SUCCESS )
  SetHostMode( ( int )*RecvPriMsgBuff.sMsgBuff );

 PCB_ENDCRITICAL

 if ( iMsgStatus == ERR_SUCCESS )
  SendPrivateMessage(
PMI_ACKNOTIFYDOSWIN, 0, NULL );

 SetForegroundRegs( CallerRegs );
}

APIFUNCRET NotifyUniOscClose( struct REGW
*CallerRegs )
{
 int iMsgStatus;

 PCB_BEGINCRITICAL

 iMsgStatus = PrepPrivateMessage( CallerRegs );

 PCB_ENDCRITICAL

 if ( iMsgStatus == ERR_SUCCESS )
 {
  TRACE( "NOTICE: Received UNI close PM,
closing OSK\n" );
  SendPrivateMessage( PMI_ACKUNIOCCCLOSE,
0, NULL );

  if ( IsOSK( GetCurrScrCode() ) )
  {
   SetCurrScrCode( GetCurrScrCode() |
SUI_OSKUNICLOSEMASK );
   UnloadSUI( SUI_NOUNLOADSUI );
  }
 }

 SetForegroundRegs( CallerRegs );
}

APIFUNCRET AckFlashBreak( struct REGW
*CallerRegs )
{
 PCB_BEGINCRITICAL

 if ( PrepPrivateMessage( CallerRegs ) ==
ERR_SUCCESS )
  SetTmpFilePercent( *( int *
)RecvPriMsgBuff.sMsgBuff );

 PCB_ENDCRITICAL

 SetForegroundRegs( CallerRegs );
}

APIFUNCRET AckTotalFlashFiles( struct REGW
*CallerRegs )
{
 PCB_BEGINCRITICAL

 if ( PrepPrivateMessage( CallerRegs ) ==
ERR_SUCCESS )
  SetTotalFlashFiles( *( int *
)RecvPriMsgBuff.sMsgBuff );

 PCB_ENDCRITICAL

 SetForegroundRegs( CallerRegs );
}

APIFUNCRET AckPathFlashFile( struct REGW
*CallerRegs )
{
 PCB_BEGINCRITICAL

 if ( PrepPrivateMessage( CallerRegs ) ==
ERR_SUCCESS )
  SetPathFlashFile( ( LPSTR
)RecvPriMsgBuff.sMsgBuff );

 PCB_ENDCRITICAL

 SetForegroundRegs( CallerRegs );
}

APIFUNCRET AckActiveUpdate( struct REGW
*CallerRegs )
{
 PCB_BEGINCRITICAL

 if ( PrepPrivateMessage( CallerRegs ) ==
ERR_SUCCESS )
 {
  if ( RecvPriMsgBuff.iBuffLen > 1 )
   SetNameActiveUpdate( ( LPSTR
)RecvPriMsgBuff.sMsgBuff );
  else
   SetNameActiveUpdate( ( LPSTR )NULL );
 }

 PCB_ENDCRITICAL

 SetForegroundRegs( CallerRegs );
}

APIFUNCRET AckOccDefine( struct REGW
*CallerRegs )
{
 PCB_BEGINCRITICAL

 if ( PrepPrivateMessage( CallerRegs ) ==
ERR_SUCCESS )
 {
  if ( RecvPriMsgBuff.iBuffLen > 1 )
  {
   if ( LOBYTE( *( int * )RecvPriMsgBuff.sMsgBuff
) == TRUE )
    SetOccDefineAcked( PMI_ACKEDTRUE );
   else
    SetOccDefineAcked( PMI_ACKEDFALSE );
  }
  else
   SetOccDefineAcked( PMI_ACKEDFALSE );
 }

 PCB_ENDCRITICAL

 SetForegroundRegs( CallerRegs );
}

APIFUNCRET AckOccClose( struct REGW
*CallerRegs )
{
 PCB_BEGINCRITICAL

 if ( PrepPrivateMessage( CallerRegs ) ==
ERR_SUCCESS )
 {
  if ( RecvPriMsgBuff.iBuffLen > 1 )
  {
   if ( LOBYTE( *( int * )RecvPriMsgBuff.sMsgBuff
) == TRUE )
    SetOccCloseAcked( PMI_ACKEDTRUE );
   else
    SetOccCloseAcked( PMI_ACKEDFALSE );
  }
  else
   SetOccCloseAcked( PMI_ACKEDFALSE );
 }

 PCB_ENDCRITICAL

 SetForegroundRegs( CallerRegs );
}

int PrepPrivateMessage( struct REGW *CallerRegs )
{
 int iReturn;
 LPSTR lpsRecvMsg = ( LPSTR )MAKELONG(
CallerRegs->di,
CallerRegs->dx );

 fl_chr( ( PVOID )&RecvPriMsgBuff, 0, sizeof(
RecvPriMsgBuff )
);

 if ( lpsRecvMsg != NULL && CallerRegs->bx <
SCS_MAXLENMSGBUFF )
 {
  fmem_cp( ( LPSTR )lpsRecvMsg, ( LPSTR
)&RecvPriMsgBuff.iMsgID, CallerRegs->bx );
  CallerRegs->ax = 1;
  iReturn = 0;

 #if !defined( PROD )
  sprintf( szTempStr, "NOTICE: Received Private
Message
0:%d\n", RecvPriMsgBuff.iMsgID );
  TRACE( szTempStr );
  sprintf( szTempStr, "NOTICE: First byte of the
Private
Message: %d\n", *RecvPriMsgBuff.sMsgBuff );
  TRACE( szTempStr );
```

```
#endif
 }
 else
 {
  CallerRegs->ax = 0;
  iReturn = ERR_INTERNAL;
 }

 return ( iReturn );


}

void SetupSCOS( void )
{
 REG_W InArgs, OutArgs;

 if ( iTempThreadIdx >= 0 )
 {
  DelThread( iTempThreadIdx );
  iTempThreadIdx = -1;
 }

 fil_chr( ( NPSTR )&SystemStatusBuff, 0, sizeof (
SystemStatusBuff ) );
 fil_chr( ( NPSTR )&InArgs, 0, sizeof ( InArgs ) );

 InArgs.ax = ( WORD
)SCS_SETUPSYSSTATBUFF;
 InArgs.dx = SEG( &SystemStatusBuff );
 InArgs.di = OFF( &SystemStatusBuff );

 intm( &InArgs, &OutArgs, SCS_INTNUM );

 SetupSCOSErrNo( &SCOSErrNo );

 SetSCSActiveStatus( TRUE );
}

int SetupSCOSErrNo( int FAR *iMemLocation )
{
 REG_W InArgs, OutArgs;

 fil_chr( ( NPSTR )&InArgs, 0, sizeof ( InArgs ) );

 InArgs.ax = SCS_ERRNOLOCATION;
 InArgs.es = SEG( iMemLocation );
 InArgs.bx = OFF( iMemLocation );

 intm( &InArgs, &OutArgs, SCS_INTNUM );

 if ( OutArgs.ax != ERR_SUCCESS )
  return ( ERR_INTERNAL );

 return ( ERR_SUCCESS );
}

int BlockSCOSVideo( BYTE fVideoStatus )
{
 REG_W InArgs, OutArgs;

 InArgs.ax = SCS_SCOSVIDEO | ( fVideoStatus ?
SCS_SCOSVIDBLOCK :
SCS_SCOSVIDUNBLOCK );

 intm( &InArgs, &OutArgs, SCS_INTNUM );

 if ( OutArgs.ax == ERR_SUCCESS )
  return ( ERR_INTERNAL );

 return ( ERR_SUCCESS );
}



int DoHostControlMode( BOOL fHostControlStatus )
{
 if ( GetSCSCallProgress() ==
SMI_SCSDISCONNECTED )
  return ( ERR_INTERNAL );

 if ( ( iHostControlThreadIdx = GetTempEventNum()
) < 0 )
  return ( ERR_INTERNAL );

 AddThread( iHostControlThreadIdx,
WaitForHostControl, NULL,
SMD_MANYTIMES, FALSE,
        SCS_HOSTCTRLPOLLFREQ,
SCS_HOSTCTRLMAXRETRY );

 if ( fHostControlStatus )
 {
  if ( SendPrivateMessage(
PMI_REQHOSTCONTROL, 0, NULL ) !=
ERR_SUCCESS )
   return ( ERR_INTERNAL );
 }

 fHostControlRequested = TRUE;

 SetWaitingIcon( SBS_WAITINGICONON, TRUE );
}

void WaitForHostControl( void )
{
 static BYTE fDisconnectRequested = FALSE;

 if ( fDisconnectRequested )
 {
  DiscoDisableConnection();
  fDisconnectRequested = TRUE;
 }

 if ( GetSCSCallProgress() ==
SMI_SCSDISCONNECTED )
  DelThread( iHostControlThreadIdx );
 else if ( GetRetryLimit( iHostControlThreadIdx ) ==
0 )
 {
  DelThread( iHostControlThreadIdx );
  DoSuspend( TRUE );
 }
}

int TakeTheConnection( BOOL fNewMonStatus,
BO
fNewLocalKbdStatus )
{
 int iHostVersionNum = GetCurrHostVersionNum();
 char *szCurrNodeAddress =
GetCurrNodeAddress();

 if ( *szCurrNodeAddress == NULL ||
iHostVersionNum == 0 )
  return ( ERR_INTERNAL );

 if ( iHostVersionNum < MAKEWORD(
GEN_HMEXPMINORVERSIONNUM,
GEN_HMEXPMAJORVERSIONNUM ) )
 {
  SMVideoBusy( DoVersionMsgBox );
  return ( ERR_SUCCESS );
 }

 SetConnectRequested(
SCS_CONNECTREQUESTED, SCS_UPDATEICON
);

 if ( GetSUIReady() )
  SMVideoBusy( DoExecConnect );
 else
 {
  if ( SMDosBusy( CBExecConnect ) !=
ERR_SUCCESS )
   return ( ERR_INTERNAL );
 }

 return ( ERR_SUCCESS );
}

void DoVersionMsgBox( void )
{
 char szTempStr[ STR_STRMAXLENERR ];

 sprintf( szTempStr, STR_SUIHOSTVERTOOLOW,
szSMVersionName );
 OpenMessageBox( szTempStr, 0,
SUI_CENTERJUSTIFIED, SUI_OK );
}

int ResumeTheConnection( void )
{
 if ( IsPWRequired() )
  DoMessageBox( NULL, SUI_LOGIN,
SUI_LEFTJUSTIFIED, SUI_OK |
SUI_CANCEL,
        CBLoginButtonPressed,
SUI_LOGINTIMEOUT );
 else
 {
  OpenMessageBox( STR_SUIRESUMINGCONN,
0, SUI_LEFTJUSTIFIED, 0
);

  SetConnectRequested(
SCS_CONNECTREQUESTED,
SCS_NOUPDATEICON
);

  if ( ( iCancelConnectThreadIdx =
GetTempEventNum() ) ==
ERR_INTERNAL )
   return( ERR_INTERNAL );

  TimerManager( TF_SET,
iCancelConnectThreadIdx, 30L );

  AddThread( iCancelConnectThreadIdx,
WaitForCancelConnect,
NULL, SMD_MANYTIMES,
        FALSE, SUI_CANCELCONNPOLLFREQ,
SUI_CANCELCONNMAXRETRY );

  if ( SMDosBusy( CBExecConnect ) !=
ERR_SUCCESS )
   return( ERR_INTERNAL );
 }

 return ( ERR_SUCCESS );
}

void CBLoginButtonPressed( int iButtonCode )
{
 if ( iButtonCode == SUI_OK )
 {
  SetConnectRequested(
SCS_CONNECTREQUESTED,
SCS_NOUPDATEICON
);

  OpenMessageBox( STR_SUIRESUMINGCONN2,
0, SUI_LEFTJUSTIFIED, 0
);

  if ( ( iCancelConnectThreadIdx =
GetTempEventNum() ) ==
ERR_INTERNAL )
   return;

  TimerManager( TF_SET,
iCancelConnectThreadIdx, 30L );

  AddThread( iCancelConnectThreadIdx,
WaitForCancelConnect,
NULL, SMD_MANYTIMES,
        FALSE, SUI_CANCELCONNPOLLFREQ,
SUI_CANCELCONNMAXRETRY );

  SMDosBusy( CBExecConnect );
 }
 else
  CBMsgBoxButtonPressed( iButtonCode );
}

void CBMsgBoxButtonPressed( int iButtonCode )
{
 int iActionCode = GetCurrActionCode();

 HideMessageBox();

 if ( iActionCode == SUI_LASTCONNECTION ||
iActionCode ==
SUI_BADVIDEOMSG )
  SMVideoBusy( DoNextScreen );

}

void DoNextScreen( void )
{
 LoadSUI( SUI_SPECIFIEDSCREEN,
SUI_HOSTSELECTION );
}

void DoExecConnect( void )
{
 SMDosBusy( CBExecConnect );
}


void CBExecConnect( void )
{
 REG_W InArgs, OutArgs;
 RPARM *SCSRParm;
 char *szCurrNodeAddress =
GetCurrNodeAddress();
 char *szCurrHostName = GetLBHost( -1 );

 nConnectErrorCode = SCS_NOCONNERROR;


 if ( ( SCSRParm = ( RPARM * )malloc( sizeof (
RPARM ) ) ) ==
NULL )
  return;

 fil_chr( ( NPSTR )SCSRParm, 0, sizeof( RPARM )
);

 SCSRParm->rplermtyp = 0;
 SCSRParm->rpprotocol = SCS_SPX;
 strcpy( SCSRParm->rpinternet,
szCurrNodeAddress );

 if ( IsPWRequired() )
 {
  strcpy( SCSRParm->rpdoprw, szPassword );
  strcpy( SCSRParm->rpdeid,
SCS_STRDEFUSERID );

  UIConfigData.bLastConnPassword = TRUE;

 }
 else
  UIConfigData.bLastConnPassword = FALSE;



#if defined( IPTEST )
 #pragma message( "Warning: IP Address is fixed."
)
 strcpy( SCSRParm->rpinternet,
"000000000020A60010E8" );
#endif

#if idefined( PROD )
 sprintf( szTempStr, "NOTICE: pw - %s\r     uid -
%s\r
nid - %s\r", SCSRParm->rpdoprw,
       SCSRParm->rpdeid, SCSRParm->rpinternet
);
 TRACE( szTempStr );
#endif

 InArgs.ax = SCS_SMAKECON;
 InArgs.es = SEG( SCSRParm );
 InArgs.bx = OFF( SCSRParm );

 SetSCSAbortFlag( FALSE );
 SetMsgBoxReturnCode( SUI_NOBUTTONS );

 _and_ier_flg( ~SMD_SCHEDULERS );

 intm( &InArgs, &OutArgs, SCS_INTNUM );

 DelThread( iCancelConnectThreadIdx );

 SetConnectRequested(
SCS_NOCONNECTREQUESTED,
SCS_NOUPDATEICON
);

 if ( OutArgs.ax == SCS_ACCEPTED ||
    GetSCOSErrNo( SCS_RETAINERROR ) ==
SCS_NOLOGINERROR )
 {
  nConnectErrorCode = SCS_NOCONNERROR;
  strcpy( UIConfigData.szLastNodeAddress,
szCurrNodeAddress );
  strcpy( UIConfigData.szLastHostName,
szCurrHostName );
  SetCurrHostName( szCurrHostName );

  if ( ( iSUIThreadIdx = GetTempEventNum() ) ==
ERR_INTERNAL )
   return;

  AddThread( iSUIThreadIdx, ( NEARPROC
)WaitForSUIUnload, NULL,
        SMD_POLLED, FALSE,
SCS_WAITSUIPOLLFREQ, 0 );

  AddThread( SCS_DISCOEVENTNUM,
WaitForStatusChange, NULL,
        SMD_POLLED, FALSE,
SCS_DISCOPOLLFREQ, 0 );

  UnloadSUI( SUI_NOUNLOADSUI );
 }
 else
 {
  SetWaitingIcon( SBS_WAITINGICONOFF,
SCS_UPDATEICON );

  *UIConfigData.szLastNodeAddress = NULL;

  if ( nConnectErrorCode ==
SCS_NOCONNERROR )
   nConnectErrorCode = TranslateConnectError();

  switch ( nConnectErrorCode )
  {
   case SCS_ERRTIMEOUT:
    DoMessageBox(
STR_SUICONNECTTIMEOUT, 0,
SUI_CENTERJUSTIFIED, SUI_OK,
CBMsgBoxButtonPressed, 0 );
    break;

   case SCS_ERRPASSWORD:
```

```
      DoMessageBox(
STR_SUIPASSWORDREJECTED, 0,
SUI_CENTERJUSTIFIED, SUI_OK,
CBMsgBoxButtonPressed, 0 );
      break;

     case SCS_ERRLOGINID:
      DoMessageBox(
STR_SUILOGINIDREJECTED, 0,
SUI_CENTERJUSTIFIED, SUI_OK,
CBMsgBoxButtonPressed, 0 );
      break;

     case SCS_ERRUNSUPVIDMODE:
      DoMessageBox( STR_SUIUNSUPVIDMODE,
0,
SUI_CENTERJUSTIFIED, SUI_OK,
CBMsgBoxButtonPressed, 0 );
      break;

     case SCS_ERRUSERABORT:
      CBMsgBoxButtonPressed( SUI_CANCEL );
      break;

     case SCS_ERRUNKNOWN:
     default:
      DoMessageBox(
STR_SUICONNECTERRUNKNOWN, 0,
SUI_CENTERJUSTIFIED, SUI_OK,
CBMsgBoxButtonPressed, 0 );
      break;
   }
  }

  free( SCSRParm );
 }

 void WaitForCancelConnect( void )
 {
  static int iWaitForSUI = 0;

  if ( GetMsgBoxReturnCode() == SUI_CANCEL )
   nConnectErrorCode = SCS_ERRUSERABORT
  else if ( GetRetryLimit( iCancelConnectThreadIdx )
== 0 )
   nConnectErrorCode = SCS_ERRTIMEOUT;

  if ( nConnectErrorCode != SCS_NOCONNERROR
)
  {
   SetSCSAbortFlag( TRUE );
   DelThread( iCancelConnectThreadIdx );
  }

  if (TimerManager (TF_CHECK,
iCancelConnectThreadIdx, 0) ==
TIMEOUT_FIRED)
  {
   switch (iWaitForSUI)
   {
    case 0:
    TimerManager (TF_RESET,
iCancelConnectThreadIdx, 0);

     HideMessageBox ();

     if (TimerManager (TF_CHECK,
iCancelConnectThreadIdx, 0L) ==
TIMEOUT_AVAILABLE)
     {
      TimerManager (TF_SET,
iCancelConnectThreadIdx, 1L);
      iWaitForSUI = 1;
     }
     break;

    case 1:
    TimerManager (TF_RESET,
iCancelConnectThreadIdx, 0);

     OpenMessageBox( STR_SUIRESUMINGCONN,
0, SUI_LEFTJUSTIFIED,
SUI_CANCEL );

      iWaitForSUI = 0;
      break;
   }
  }

 }

 void WaitForStatusChange( void )
 {
  static char nOldVideoMode = -1;
  char nCurrVideoMode = GetCurrVidMode();
  int iCurrScrCode;
  int nSUIStatus;

  if ( nOldVideoMode == -1 )
   nOldVideoMode = nCurrVideoMode;

  if ( GetSCSCallProgress() ==
SMI_SCSDISCONNECTED )
  {
   nSUIStatus = GetSUIStatus();

   if ( fHostControlRequested || ( DoSuspend(
TRUE ) !=
ERR_SUCCESS ) )
   {
    fHostControlRequested = FALSE;

    if ( nSUIStatus != SMI_SUIUNLOADING &&
nSUIStatus !=
SMI_SUIDEACTIVATING )
    {
     DelThread( SCS_DISCOEVENTNUM );

     SetCurrHostName( szNullStr );
     SetWaitingIcon( SBS_WAITINGICONOFF,
TRUE );

     if ( IsSetupDlg( GetCurrScrCode() ) )
      UpdateSUIConnectStatus();
     else
     {

      if ( fBadVideoMsgRecv )
      {
       fBadVideoMsgRecv = FALSE;

       LoadSUI( SUI_BADVIDEOMSG,
SUI_NOSCREEN );
      }
      else
       LoadSUI( SUI_SPECIFIEDSCREEN,
SUI_HOSTSELECTION );
     }
    }
   }
  }
  else
  {
   iCurrScrCode = GetCurrScrCode();

   if ( nCurrVideoMode != nOldVideoMode )

   {
    if ( GetSUIReady() &&
       IsOSK( iCurrScrCode ) &&
!IsOSKAsSetupDlg(
iCurrScrCode ) )
     UnloadSUI( SUI_NOUNLOADSUI );
   }
  }

  nOldVideoMode = nCurrVideoMode;
 }

 void WaitForSUIUnload( void )
 {
  if ( !GetSUIReady() )
   DelThread( iSUIThreadIdx );
 }

 int SetMonitor( BOOL fNewMonStatus, BOOL
fNewLocalKbdStatus )
 {
  iSetMonDone = ERR_INPROGRESS;

  if ( !GetSCSActiveStatus() )
   return ( ERR_INTERNAL );

  if ( GetSCSCallProgress() !=
SMI_SCSCONNECTED )
   iSetMonDone = ERR_SUCCESS;
  else
  {
   fMonStatus = fNewMonStatus;
   fLocalKbdStatus = fLocalKbdStatus;

   if ( SMDosBusy( CBExecMonitor ) !=
ERR_SUCCESS )
   {
    iSetMonDone = ERR_INTERNAL;
    return ( ERR_INTERNAL );
   }
  }

  return ( ERR_SUCCESS );
 }

 void CBExecMonitor( void )
 {
  REG_W InArgs, OutArgs;

  InArgs.ax = ( fMonStatus ? SCS_MONITORON :
SCS_MONITOROFF );
  InArgs.ax |= ( fLocalKbdStatus ?
SCS_LOCALKBDON :
SCS_LOCALKBDOFF );

  SetReentrancy( FALSE );
  intx( &InArgs, &OutArgs, SCS_INTNUM );
  SetReentrancy( TRUE );

  if ( OutArgs.ax == SCS_ACCEPTED )
  {
   nConnectErrorCode = SCS_NOCONNERROR;
   iSetMonDone = ERR_SUCCESS;
  }
  else
  {
   nConnectErrorCode =
SCS_ERRFULLSCRPAINT;
   iSetMonDone = ERR_SUCCESS;
   TRACE( "ERROR: CoSession monitor call was
not accepted.
Reported as accepted anyway \r" );
  }
 }

 int CheckMonitor( void )
 {
  return ( iSetMonDone );
 }

 int SetSCSMemory( int iNewFreeMemPercent, int
iNewOSKType, BYTE
nDosBusy )
 {
  iSetMemDone = ERR_INPROGRESS;
  nOSKType = LOBYTE( iNewOSKType );

  if ( !GetSCSActiveStatus() )
   return ( ERR_INTERNAL );

  iFreeMemPercent = iNewFreeMemPercent;

  if ( nDosBusy == SMI_SCSWAITFORDOS )
  {
   if ( SMDosBusy( CBExecSCSMemory ) != 0 )
    return ( ERR_INTERNAL );
  }
  else
   CBExecSCSMemory();

  return ( ERR_SUCCESS );
 }

 void CBExecSCSMemory( void )
 {
  REG_W InArgs, OutArgs;

  if ( nOSKType == SUI_WINDOWSOSK )
   InArgs.ax = SCS_FREEOSKMEM;
  else
   InArgs.ax = SCS_FREEMEM;

  InArgs.dx = iFreeMemPercent;

 #if ldefined( PROD )
  sprintf( szTempStr, "NOTICE: Memory call
number#: %x,
requesting allocation of %d%% of SRWIN
memory.\r",
       InArgs.ax, InArgs.dx );
  TRACE( szTempStr );
 #endif

  SetReentrancy( FALSE );
  intx( &InArgs, &OutArgs, SCS_INTNUM );
  SetReentrancy( TRUE );

  if ( OutArgs.ax == SCS_ACCEPTED )
   iSetMemDone = ERR_SUCCESS;
  else
   iSetMemDone = ERR_INTERNAL;
 }

 BOOL CheckSCSMemory( void )
 {
  return ( iSetMemDone );
 }



 int RequestFullRepaint( BYTE fRepaintRequired,
 WORD wScreenCode )
 {
  iFullRepaintDone = ERR_INPROGRESS;

  if ( !GetSCSActiveStatus() )
   return ( ERR_INTERNAL );

 if ( IsOSKWinGraphics( wScreenCode ) )
 {
  TRACE( "NOTICE: Closing the Windows Host No
Paint Zone\r" );

  if ( CloseHostOcclude() != ERR_SUCCESS )

  {
   TRACE( "NOTICE: Attempt to close No Paint
Zone on Host
failed, continuing anyway\r" );
   return ( iFullRepaintDone = ERR_SUCCESS );

  }
 }
 else
 {
  TRACE( "NOTICE: Closing the DOS or DOS
Graphics occlusion
region\r" );

  if ( SetSCSHostOcclude( ( OCCLUDEUNION *
)NULL,
SUI_NOOCCTYPE, fRepaintRequired ) !=
ERR_SUCCESS )
  {
   TRACE( "ERROR: an error occured in calling
SetSCSHostOcclude(), continuing anyway\r" );
   return ( iFullRepaintDone = ERR_SUCCESS );
  }
 }

 return ( ERR_SUCCESS );
 }



 int CheckFullRepaint( void )
 {
  return ( iFullRepaintDone );
 }

 int DiscoDisableConnection( void )
 {
  if ( !GetSCSActiveStatus() )
   return ( ERR_INTERNAL );

  if ( ( iDiscoThreadIdx = GetTempEventNum() ) < 0
 )
   return ( ERR_INTERNAL );

  AddThread( iDiscoThreadIdx, WaitForDisco, NULL,
SMD_ONETIME,
FALSE,
        1, 0 );

  SetWaitingIcon( SBS_WAITINGICONON, TRUE );

  return ( ERR_SUCCESS );
 }

 void WaitForDisco( void )
 {
  REG_W InArgs, OutArgs;

  DelThread( iDiscoThreadIdx );

  InArgs.ax = SCS_DISCODISABLECON;

  intx( &InArgs, &OutArgs, SCS_INTNUM );

 }

 int SendPrivateMessage( int iMsgID, int iBuffLen,
 char *sMsgBuff
 )
 {
  REG_W InArgs, OutArgs;

  fil_chr( &InArgs, 0, sizeof ( InArgs ) );
  fil_chr( &SendPriMsgBuff, 0, sizeof (
SendPriMsgBuff ) );

  SendPriMsgBuff.iMsgID = iMsgID;

  if ( ( SendPriMsgBuff.iBuffLen = iBuffLen ) > 0 )
   mem_cp( sMsgBuff, SendPriMsgBuff.sMsgBuff,
iBuffLen );
  InArgs.ax = SCS_SENDPRIMSG;

  InArgs.dx = SEG( &SendPriMsgBuff );
  InArgs.di = OFF( &SendPriMsgBuff );

  InArgs.bx = SendPriMsgBuff.iBuffLen + sizeof (
SendPriMsgBuff.iBuffLen ) +
         sizeof ( SendPriMsgBuff.iMsgID );
```

```
#if !defined( PROD )
  sprintf( szTempStr, "NOTICE: Sent Private
Message #:%d\r",
SendPriMsgBuff.iMsgID );
  TRACE( szTempStr );
#endif

  intn( &inArgs, &OutArgs, SCS_INTNUM );

  if ( OutArgs.ax != SCS_ACCEPTED )
  {
    TRACE( "ERROR: CoSession Send Private
Message function
returned an error\r" );




  }

  return ( OutArgs.ax == SCS_ACCEPTED ?
ERR_SUCCESS :
ERR_INTERNAL );
}

void WaitForSendPM( void )
{
  REG_W inArgs, OutArgs;

  inArgs.ax = SCS_SENDPRIMSG;

  inArgs.dx = SEG( &SendPriMsgBuff );
  inArgs.di = OFF( &SendPriMsgBuff );

  inArgs.bx = SendPriMsgBuff.iBuffLen + sizeof (
SendPriMsgBuff.iBuffLen ) +
            sizeof ( SendPriMsgBuff.iMsgID );

#if !defined( PROD )
  sprintf( szTempStr, "NOTICE: Sent Private
Message #:%d\r",
SendPriMsgBuff.iMsgID );
  TRACE( szTempStr );
#endif

  intn( &inArgs, &OutArgs, SCS_INTNUM );

  if ( OutArgs.ax == SCS_ACCEPTED )
  {
    TRACE( "NOTICE: Send PM retry succeeded!" );

    PCB_BEGINCRITICAL;

    SendPriMsgBuff.iMsgID = 0;

    PCB_ENDCRITICAL;
  }
  else
    TRACE( "NOTICE: Send PM retry failed\r" );

  if ( GetRetryLimit( IPMRetryThreadIdx ) == 0 ||
SendPriMsgBuff.iMsgID == 0 )
  {
    TRACE( "NOTICE: Send PM retry thread
expired\r" );
    DelThread( IPMRetryThreadIdx );
    iPMRetryThreadIdx = SMD_NOACTIVETHREAD;

    PCB_BEGINCRITICAL;
    fSendPMRetryDone = TRUE;
    PCB_ENDCRITICAL;
  }
}

int GetSCSCallProgress( void )
{
  BYTE nCallProgress;
  PCB_BEGINCRITICAL
  nCallProgress = SystemStatusBuff.nCallProgress;
  PCB_ENDCRITICAL

  return ( nCallProgress );
}

int GetSCSProtocolId( void )
{
  BYTE nProtocolId;

  PCB_BEGINCRITICAL
  nProtocolId = SystemStatusBuff.nProtocolId
  PCB_ENDCRITICAL

  return ( nProtocolId );
}

int GetSCSVideoMode( void )
{
  BYTE nCurrentVidMode;

  PCB_BEGINCRITICAL
  nCurrentVidMode =
SystemStatusBuff.nCurrentVidMode;
  PCB_ENDCRITICAL

  return ( nCurrentVidMode );
}

void SetSCSAbortFlag( BYTE fNewAbortRequest )
{
  PCB_BEGINCRITICAL
  SystemStatusBuff.fAbortRequestConnect =
fNewAbortRequest;
  PCB_ENDCRITICAL
}

int ReceiveHostFile( char *szHostFileName, LPSTR
sFileBuff, LONG
lFileSize )
{
  REG_W inArgs, OutArgs;

  fil_chr( ( NPSTR )&inArgs, 0, sizeof ( inArgs ) );

  inArgs.ax = SCS_XFERFILE |
SCS_TOSARATOGA;
  inArgs.ds = SEG( szHostFileName );
  inArgs.si = OFF( szHostFileName );
  inArgs.es = SEG( sFileBuff );
  inArgs.di = OFF( sFileBuff );
  inArgs.dx = HIWORD( lFileSize );
  inArgs.cx = LOWORD( lFileSize );

#if !defined( FLASHTEST )
  intn( &inArgs, &OutArgs, SCS_INTNUM );

  return ( OutArgs.ax == SCS_ACCEPTED ?
ERR_SUCCESS :
ERR_INTERNAL );
#else
  return ( ERR_SUCCESS );
#endif
}

int SendUDHotIcon( int iHotIconID )
{
  int iScanCodeIdx, iNumCodes;
  int iReturn = ERR_SUCCESS;
  BYTE nHiScanByte, nLoScanByte;
  SCANCODE *pScanCodes;

  if ( iHotIconID == PND_UDEF1 )
    pScanCodes = UIConfigData.aUDHotIcon1;
  else
    pScanCodes = UIConfigData.aUDHotIcon2;

  iNumCodes = GetNumScanCodes( pScanCodes );

  for ( iScanCodeIdx = 0; iScanCodeIdx <
iNumCodes;
++iScanCodeIdx )
  {
    if ( ( nHiScanByte = HIBYTE( pScanCodes[
iScanCodeIdx
].wScanCode ) ) > 0 )
    {
      if ( SendScanCode( nHiScanByte ) ==
ERR_INTERNAL )
      {
        iReturn = ERR_INTERNAL;
        break;
      }
    }

    if ( ( nLoScanByte = LOBYTE( pScanCodes[
iScanCodeIdx
].wScanCode ) ) > 0 )
    {
      if ( SendScanCode( nLoScanByte ) ==
ERR_INTERNAL )
      {
        iReturn = ERR_INTERNAL;
        break;
      }
    }
  }

  return ( iReturn );
}

int GetNumScanCodes( SCANCODE FAR
*pScanCodes )
{
  int iNumCodes, iScanCodeIdx;

  for ( iNumCodes = 0, iScanCodeIdx = 0;
iScanCodeIdx <
SUI_MAXNUMSCANCODES;
      ++iScanCodeIdx )
  {
    if ( LOBYTE( pScanCodes[ iScanCodeIdx
].wScanCode ) == 0 )
      break;

    iNumCodes++;
  }

  return ( iNumCodes );
}

int SendScanCode( BYTE nScanCode )
{
  REG_W inArgs, OutArgs;

  PCB_BEGINCRITICAL;

  fil_chr( ( NPSTR )&inArgs, 0, sizeof ( inArgs ) );

  inArgs.ax = MAKEWORD( nScanCode, HIBYTE(
SCS_SENDKBDSCANCODE )
);

  intn( &inArgs, &OutArgs, SCS_INTNUM );

  PCB_BEGINCRITICAL;

  return ( OutArgs.ax );
}

int SendLockKbdMouse( BOOL bLocked )
{
  if ( bLocked )
    return ( SendPrivateMessage(
PMI_REQSCSLOCKKBMO, 0, NULL ) );
  else
    return ( SendPrivateMessage(
PMI_REQSCSUNLOCKKBMO, 0, NULL )
);
}

int SendDimScreen( BOOL bDimmed )
{
  if ( bDimmed )
    return ( SendPrivateMessage(
PMI_REQSCSBLANKSCR, 0, NULL ) );
  else
    return ( SendPrivateMessage(
PMI_REQSCSUNBLANKSCR, 0, NULL )
);
}

CONNERROR TranslateConnectError( void )
{
  switch ( ( SCOSCONNERROR )GetSCOSErrNo(
SCS_CLEARERROR ) )
  {
    case SCS_PASSWORDREJECTED:
      return ( SCS_ERRPASSWORD );

    case SCS_LOGINIDREJECTED:
    case SCS_LOGINUSERREJECTED:
      return ( SCS_ERRLOGINID );

    case SCS_REMOTEDISCONNECTED:
    case SCS_RESPONSETIMEOUT:
      return ( SCS_ERRTIMEOUT );

    case SCS_UNSUPPORTEDVIDMODE:
      return ( SCS_ERRUNSUPVIDMODE );

    default:
      return ( SCS_ERRUNKNOWN );
  }
}

#if defined( _MSC_VER )
#pragma warning( default : 4704 )
#endif
Copr. 1995 Zenith Data Systems Corp.
#include "sr.h"
#include "sio.h"
#include "k2.h"
#include "spawn.h"
#include "iparm.h"
#include "hm.h"
#include "sm.h"

#if defined( _MSC_VER )
#pragma warning( disable : 4704 )
#endif

int SetSCSSaraStatus( int iNewStatus )
{
  REG_W inArgs, OutArgs;

  fil_chr( ( NPSTR )&inArgs, 0, sizeof ( inArgs ) );

  inArgs.ax = iNewStatus;

#if !defined( PROD )
  if ( iNewStatus == SCS_SETBUSY )
    TRACE( "NOTICE: Attempting to set the SCS
busy flag\r" );
  else
    TRACE( "NOTICE: Attempting to set the SCS
idle flag\r" );
#endif

  intn( &inArgs, &OutArgs, SCS_INTNUM );

  return ( OutArgs.ax == SCS_ACCEPTED ?
ERR_SUCCESS :
ERR_INTERNAL );
}

int SetSCSFullRepaint( void )
{
  REG_W inArgs, OutArgs;

  fil_chr( ( NPSTR )&inArgs, 0, sizeof ( inArgs ) );

  inArgs.ax = SCS_FULLREPAINT;

  TRACE( "NOTICE: Requesting full repaint from
SCS\r" );

  intn( &inArgs, &OutArgs, SCS_INTNUM );

  return ( OutArgs.ax == SCS_ACCEPTED ?
ERR_SUCCESS :
ERR_INTERNAL );
}

int SetSCSScrolling( BYTE nScrollStatus )
{
  REG_W inArgs, OutArgs;

  fil_chr( ( NPSTR )&inArgs, 0, sizeof ( inArgs ) );

  inArgs.ax = SCS_SETSCROLLING | nScrollStatus;

#if !defined( PROD )
  if ( nScrollStatus == SCS_DISABLESCROLL )
    TRACE( "NOTICE: Requesting the disabling of
scroll from
SCS\r" );
  else
    TRACE( "NOTICE: Requesting the enabling of
scroll from SCS\r"
);
#endif

  intn( &inArgs, &OutArgs, SCS_INTNUM );

  return ( OutArgs.ax == SCS_ACCEPTED ?
ERR_SUCCESS :
ERR_INTERNAL );
}

int SetSCSOcclude( OCCLUDEUNION *occ, int
iOccType )
{
  REG_W inArgs, OutArgs;

  fil_chr( ( NPSTR )&inArgs, 0, sizeof ( inArgs ) );

  if ( occ != NULL )
  {
    switch ( iOccType )
    {
      case SUI_NOOCCTYPE:
      case SUI_OCCDOSTEXT:
        inArgs.bx = AbsToZero(
occ->occText.yULRow );
        inArgs.cx = AbsToZero( occ->occText.xULCol
);
        inArgs.si = occ->occText.yLRRow;

        inArgs.di = occ->occText.xLRCol;
        break;

      case SUI_OCCDOSGRAPHICS:
        inArgs.bx = AbsToZero(
occ->occDosGraph.xULDos );
        inArgs.cx = AbsToZero(
occ->occDosGraph.yULDos );
        inArgs.si = occ->occDosGraph.xLRDos;
        inArgs.di = occ->occDosGraph.yLRDos;
        break;

      default:
        return ( ERR_INTERNAL );
    }
  }
```

```
else
  TRACE( "NOTICE. Clipping region at zero\r" );

 inArgs.ax = SCS_OCCLUDE2;

 TRACE( "NOTICE: Requesting the establishment
of a clipping
region from SCS\r" );

 intr( &inArgs, &OutArgs, SCS_INTNUM );

 return ( OutArgs.ax == SCS_ACCEPTED ?
ERR_SUCCESS :
ERR_INTERNAL );
}

int DefineSCSOcclude( OCCLUDEUNION *occ, int
iOccType, BYTE
fRepaint )
{
 if ( SetSCSSemStatus( SCS_SETBUSY ) !=
ERR_SUCCESS )
 {
   TRACE( "ERROR. Attempt to secure SCS busy
flag failed\r" );
   return ( ERR_SCSBUSY );
 }

 if ( SetSCSOcclude( occ, iOccType ) !=
ERR_SUCCESS )
 {
   TRACE( "ERROR Attempt to define SCS
clipping region
failed\r" );
   return ( ERR_SCSOCCFAILED );
 }

 if ( occ == NULL )
 {
   if ( SetSCSScrolling( SCS_ENABLESCROLL ) !=
ERR_SUCCESS )
   {
    TRACE( "ERROR. Attempt to enable scrolling
failed\r" );
    return ( ERR_SCSSCROLLING );
   }
 }
 else
 {
   if ( SetSCSScrolling( SCS_DISABLESCROLL ) !=
ERR_SUCCESS )
   {
    TRACE( "ERROR: Attempt to disable scrolling
failed\r" );
    return ( ERR_SCSSCROLLING );
   }
 }

 if ( SetSCSSemStatus( SCS_SETIDLE ) !=
ERR_SUCCESS )
 {
   TRACE( "ERROR Attempt to secure SCS busy
flag failed\r" );
   return ( ERR_SCSIDLE );
 }

 if ( fRepaint )
 {
   if ( SetSCSFullRepaint() != ERR_SUCCESS )
   {
    TRACE( "ERROR: Repaint request in SCS
failed\r" );
    return ( ERR_SCSFULLREPAINT );
   }
 }

 TRACE( "NOTICE: Occlusion region definition for
DOS Text or
Graphics was successful\r" );

 return ( ERR_SUCCESS );
}

#if defined( _MSC_VER )
#pragma warning( default : 4704 )
#endif

Copr. 1995 Zenith Data Systems Corp.
#include "cr.h"
#include "sio.h"
#include "k2.h"
#include "spawn.h"
#include "rparm.h"
#include "hm.h"
#include "sm.h"

#if defined( _MSC_VER )
#pragma warning( disable : 4704 )
#endif

static int iSLLoadThreadIdx;
static LONG lOldVidVector;

LONG GetOldVidVector( void )
{
 return ( lOldVidVector );
}

APIFUNCRET SLDefineOldVidVector( struct REGW
*CallerRegs )
{
 TRAPREC *tr = GetVIDTrapRec();

 lOldVidVector = MAKELONG( CallerRegs->bx,
CallerRegs->dx );

 PCB_BEGINCRITICAL;

 tr->tr_old_int = lOldVidVector;

 PCB_ENDCRITICAL;
}

APIFUNCRET SLEnableKbd( struct REGW
*CallerRegs )
{
 EnableKbdAfterBoot();
}

APIFUNCRET SLGetFrameType( struct REGW
*CallerRegs )
{
 CallerRegs->ax = ( WORD
)UIConfigData.aFrameType;

 SetForegroundRegs( CallerRegs );
}

APIFUNCRET SLGetMLIDStatus( struct REGW
*CallerRegs )
{
 CallerRegs->ax = GetPRXActiveStatus();

 SetForegroundRegs( CallerRegs );
}

APIFUNCRET SLLoadSUI( struct REGW
*CallerRegs )
{
 if ( ( iSLLoadThreadIdx = GetTempEventNum() ) <
0 )
   return;

 AddThread( iSLLoadThreadIdx, ( NEARPROC
)CBExecLoadSUI, NULL,
SMD_ONETIME, FALSE,
        SM_SLPOLLFREQ, 0 );
}

void CBExecLoadSUI( void )
{
 DelThread( iSLLoadThreadIdx );

 InitSemlogo( SBS_SUILOADING );

 if ( GetEEPROMInited() )
 {
  TRACE( "NOTICE: Beginning pen calibration due
to EEPROM
initialization\r" );
  LoadSUI( SUI_DOPENCALIBRATION,
SUI_NOSCREEN );
 }
 else
 {
  if ( !IsNodeAddressBlank(
UIConfigData.szLastNodeAddress ) &&

      GetSystemResumeBit() )
   LoadSUI( SUI_LASTCONNECTION,
SUI_NOSCREEN );
   else
    LoadSUI( SUI_SPECIFIEDSCREEN,
SUI_HOSTSELECTION );
 }

 ClearSystemResumeBit();
}

#if defined( _MSC_VER )
#pragma warning( default : 4704 )
#endif
Copr. 1995 Zenith Data Systems Corp.
#include "cr.h"
#include "spawn.h"
#include "k2.h"
#include "sio.h"
#include "sm.h"

int SortList(int wTotalEntries, int wEntrySize, int
wPrimeOffset,
        int wSecondOffset,  char *cpEntryBuff)

{
 int winnerLoop;
 int wOutLoop;
 int winnerOffset;
 int wOutOffset,
 int wResult;

 if( (wTotalEntries <= 0) || (wEntrySize <= 0) ||
(wPrimeOffset
== wSecondOffset)
   || (wPrimeOffset >= wEntrySize) ||
(wSecondOffset >=
wEntrySize)
   || (wPrimeOffset < 0 ) || (wSecondOffset < 0) )
  return(ERR_INVALIDPARM);

 wOutOffset = 0;
 for(wOutLoop = 0; wOutLoop < (wTotalEntries - 1);
wOutLoop++)
 {
  winnerOffset = wOutOffset + wEntrySize;
  for(winnerLoop = (wOutLoop + 1); winnerLoop <
wTotalEntries;
winnerLoop++)
   {

 wResult=strncmp(cpEntryBuff+wOutOffset+wPrimeOff
set,
cpEntryBuff+winnerOffset+wPrimeOffset),
     if(wResult > 0)
      SwapEntries(cpEntryBuff+wOutOffset,
cpEntryBuff+winnerOffset, wEntrySize),
    if(wResult == 0)
    {

 wResult=strncmp(cpEntryBuff+wOutOffset+wSecond
Offset,
cpEntryBuff+winnerOffset+wSecondOffset),
      if(wResult > 0)
       SwapEntries(cpEntryBuff+wOutOffset,
cpEntryBuff+winnerOffset, wEntrySize);
    }
    winnerOffset = winnerOffset + wEntrySize,
   }
   wOutOffset = wOutOffset + wEntrySize;
 }
 return(ERR_SUCCESS);
}

int SwapEntries(char *cpEntry1, char *cpEntry2, int
wEntrySize)
{
 char cSwapBuff[SRT_MAXLENSWAPBUFF];
 int  wRestSize;
 int  wCopyUnit;

 if( wEntrySize <= 0 )
  return(ERR_INVALIDPARM);

 wRestSize = wEntrySize;
 do
 {
  if(wRestSize >= SRT_MAXLENSWAPBUFF)
   wCopyUnit = SRT_MAXLENSWAPBUFF,
  else
   wCopyUnit = wRestSize;
  mem_cp(cpEntry1+(wEntrySize-wRestSize),
cSwapBuff,
wCopyUnit);
  mem_cp(cpEntry2+(wEntrySize-wRestSize),
cpEntry1+(wEntrySize-wRestSize), wCopyUnit);
  mem_cp(cSwapBuff,
cpEntry2+(wEntrySize-wRestSize),
wCopyUnit);
  wRestSize -= SRT_MAXLENSWAPBUFF;
 } while (wRestSize > 0);

 return(ERR_SUCCESS);
}

long GetEntryOffset(int wTotalEntries, int
wEntrySize, int
wKeyOffset,
           int wKeyNumber, char *cpEntryBuff)

{
 int wLoop;
 int wKeyCount;
 int wOffset;

  if( (wTotalEntries <= 0) || (wEntrySize <= 0) ||
(wKeyNumber
<= 0)
   || (wKeyOffset >= wEntrySize) || (wKeyOffset < 0
)
   || (wKeyNumber > wTotalEntries) )
  return((long)ERR_INVALIDPARM);

 wKeyCount=1;
 wOffset=0.

 if(wKeyCount == wKeyNumber)
  return(0L),

 for(wLoop = 1; wLoop < wTotalEntries; wLoop++)
 {
  if( (strncmp(cpEntryBuff+wOffset+wKeyOffset,
cpEntryBuff+wOffset+wEntrySize+wKeyOffset)) != 0)
    wKeyCount++:
  wOffset = wOffset + wEntrySize:
  if(wKeyCount == wKeyNumber)
   return((long)wOffset);
 }

 return((long)ERR_INVALIDPARM);
}
Copr. 1995 Zenith Data Systems Corp

#include "cr.h"
#include "sio.h"
#include "spawn.h"
#include "k2.h"
#include "sm.h"

#if defined( _MSC_VER )
#pragma warning( disable . 4704 )
#endif

static TRAPREC        SUIMouseTrapRec,
static CALLREC        SUICallRec;
static SUICB          lpfnTempProc,
static SUIACTIONCODE  ActionCode = 0,
static DWORD          dwOldSUIIntVec;
static int            iTempThreadIdx;
static int            iPrepSUIThreadIdx;
static int            iUnloadSUIThreadIdx;
static int            iCleanupSUIThreadIdx;
static WORD           pJmpBuf[ 5 ];
static BOOL           fVideoBlocked = FALSE;
static char           nSUIStatus =
SMI_SUINOTLOADED;
static BYTE           nResidentStatus;
static WORD           wSUIPSP;
static WORD           wSavedSP;
static WORD           wSavedBP;
static CURRHOSTNAME   CurrHostName;

static APIFUNC aAPIFuncTable[] =
[
 { SMI_SETCONTRAST, GetSetContrast },
 { SMI_SETBRIGHTNESS, GetSetBrightness },
 { SMI_CALIBUPLEFT, CalibratePen },
 { SMI_CALIBCANCEL, CalibrateCancel },
 { SMI_SETAUTOSHUTOFF, GetSetAutoShutOff },
 { SMI_SETSLEEPTIME, GetSetSleepTime },
 { SMI_REBOOTHOST, RebootHost },
 { SMI_ACTIVEUPDATE, RequestActiveUpdate },

 { SMI_DOUPDATE, DoUpdate },
 { SMI_UPDATEHOSTLIST, UpdateHostList },
 { SMI_GETHOSTLISTSTAT, GetHostListStatus },
 { SMI_GETCONNECTSTAT, GetConnectStatus },
 { SMI_REQUESTCONNECT, RequestConnDiscc },
 { SMI_GETPASSWORDSTAT, GetPasswordStatus
},
 { SMI_LBSETNETGROUP, LBGetSetNetGroup },
 { SMI_LBSETNETHOST, LBGetSetNetHost },
 { SMI_LBSETNETFRAMETYPE,
LBGetSetNetFrameType },
 { SMI_SETCONNECTTYPE, GetSetConnectType
},
 { SMI_SETPASSWORD, GetSetPassword },
 { SMI_UPDATEDIMLOC, UpdateDimerLoc },
 { SMI_REQUESTUNLOAD, RequestUnload },
 { SMI_SETMSGBOXRETCODE,
SetSUIMBRetCode },
 { SMI_SETUILANGUAGE, GetSetUILanguage },
 { SMI_SETACTIVESTAT, SetActiveStatus },
 { SMI_SETKEYSTROKE, SetKeyStroke },
 { SMI_GETKEYBOARDSTAT, GetKeyBoardStatus
},
 { SMI_GETABOUTDIALOG, GetAboutDialog },
 { SMI_SETUDHOTICON, GetSetUDHotIcon },
 { SMI_SETSECURITYID, GetSetSecurityID },
 { SMI_SETDOMAINID, GetSetDomainID },
 { SMI_SETLOCKKBDMOUSE,
GetSetLockKbdMouse },
 { SMI_SETDIMSCREEN, GetSetDimScreen },
 { SMI_SETVIDEOBLOCK, BlockUnblockVideo },
 { SMI_NOTIFYSCRCODE, NotifyScreenCode },
 { 0, 0 }
];
```

```
APIFUNC *GetSUIFuncTable( void )
{
 return ( aAPIFuncTable );
}

CALLREC FAR *GetSUICallRec( void )
{
 return ( ( CALLREC FAR *)&SUICallRec );
}

TRAPREC *GetSUIMouseTrapRec( void )
{
 SUIMouseTrapRec.tr_int = PND_INTNUM;
 SUIMouseTrapRec.tr_asm_srv =
CRU_REFLECTINT;

 return ( &SUIMouseTrapRec );
}

int GetCurrActionCode( void )
{
 return ( ActionCode );
}

WORD GetCurrScrCode( void )
{
 return ( wScreenCode );
}

void SetCurrScrCode( WORD wNewScreenCode )
{
 wScreenCode = wNewScreenCode;
}

char GetSUIStatus( void )
{
 return ( nSUIStatus );
}

void InitSUICallRec( void )
{
 DWORD dwCallService = ( DWORD )( FARPROC
)SUICallService,
 fil_chr( ( NPSTR )&SUICallRec, 0, sizeof(
CALLREC ) );

 SUICallRec.cFarCallOpCode =
SMD_CALLOPCODE,
 SUICallRec.aCallBack[0] = LOBYTE( LOWORD(
dwCallService ) );
 SUICallRec.aCallBack[1] = HIBYTE( LOWORD(
dwCallService ) ),
 SUICallRec.aCallBack[2] = LOBYTE( HIWORD(
dwCallService ) );
 SUICallRec.aCallBack[3] = HIBYTE( HIWORD(
dwCallService ) );
 SUICallRec.cFarRetOpCode =
SMD_RETOPCODE;
 strcpy( SUICallRec.szSMAfterSignature,
SIG_SMSIGNATURE );

 dwOldSUIIntVec = set_int_vec( SMI_SUIINTNUM,
( DWORD )( (
FARPROC )&SUICallRec ) );
}

void RestoreOldSUIIntVec( void )
{
 set_int_vec( SMI_SUIINTNUM, dwOldSUIIntVec ).
}

BOOL GetSUIReady( void )
{
 return ( lpfnSUICallBack != ( SUICB )NULL &&
nSUIStatus ==
SMI_SUILOADED );
}

APIFUNCRET SetActiveStatus( struct REGW
*CallerRegs )
{
 PCB_BEGINCRITICAL
 lpfnSUICallBack = ( SUICB )MK_FP(
CallerRegs->dx,
CallerRegs->si );
 PCB_ENDCRITICAL

 wSUIPSP = get_cur_psp();

 CallerRegs->ax = SUI_PARTIALDIALOGSET;
 SetForegroundRegs( CallerRegs );

 nSUIStatus = SMI_SUILOADED;
}

APIFUNCRET RequestUnload( struct REGW
*CallerRegs )
{
 if ( !GetRequestHostList() &&
   GetConnectRequested() ==
SCS_NOCONNECTREQUESTED &&
   GetSCSCallProgress() ==
SMI_SCSCONNECTED )
 {
  CallerRegs->ax = SMI_UNLOADACCEPTED;
  UnloadSUI( SUI_NOUNLOADSUI );
 }
 else
  CallerRegs->ax = SMI_UNLOADDENIED;

 SetForegroundRegs( CallerRegs );
}

APIFUNCRET RequestConnDisco( struct REGW
*CallerRegs )
{
 if ( GetConnectRequested() )
  CallerRegs->ax = ERR_SUCCESS;
 else
 {
  if ( IsGetFunction( CallerRegs ) )
  {
   if ( GetSCSCallProgress() ==
SMI_SCSCONNECTED )
     CallerRegs->ax = DiscoDisableConnection();
   else
     CallerRegs->ax = ( WORD )ERR_INTERNAL;
  }
  else
  {
   if ( GetLBCurrHost() ==
HLD_NOHOSTSELECTED )
   {
     OpenMessageBox(
STR_SUINOHOSTSELECTED, 0,
SUI_CENTERJUSTIFIED, SUI_OK );
     CallerRegs->ax = ( WORD )ERR_INTERNAL;
   }
   else
     CallerRegs->ax = MakeTheConnection( TRUE,
FALSE );
  }
 }

 SetForegroundRegs( CallerRegs );
}

APIFUNCRET GetConnectStatus( struct REGW
*CallerRegs )
{
 char *szHostName;
 int iCallProgress;
 int iProtocolId,
 int iReturn;


 if ( !GetSCSActiveStatus() )
 {
  iReturn = ERR_NOTSUPPORTED;
  goto exit;
 }

 iProtocolId = GetSCSProtocolId();
 iCallProgress = GetSCSCallProgress();

 fil_chr( &CurrHostName, 0, sizeof (
CURRHOSTNAME ) );
 CurrHostName.lpszHostName = szNullStr,

 BuffHead.lStructLen = sizeof ( CURRHOSTNAME
);
 BuffHead.lBuffLen = sizeof ( CURRHOSTNAME );
 BuffHead.buff = ( LPVOID )&CurrHostName;

 CallerRegs->dx = SEG( &BuffHead );
 CallerRegs->si = OFF( &BuffHead );

 switch ( iCallProgress )
 {
  case SMI_SCSCONNECTED:
   iReturn = SMI_CONNECTED;

   if ( ( szHostName = GetCurrHostName() ) !=
NULL )
     CurrHostName.lpszHostName = ( LPSTR
)szHostName;
   break;

  case SMI_SCSWAITINGFORCONNECT:
   iReturn = SMI_CONNECTED;
   break;

  case SMI_SCSDIALING:
   iReturn = SMI_CONNECTED;
   break;

  case SMI_SCSLOGGINGIN:
   iReturn = SMI_LOGGINGIN;
   break;

  case SMI_SCSDISCONNECTED
   iReturn = SMI_DISCONNECTED.
   break;

  default:
   iReturn = ERR_INTERNAL;
   break;
 }

 CallerRegs->ax = iReturn;

 switch ( iProtocolId )
 {
  case SMI_SCSNETWARESPX:
   iReturn = SMI_NETWARESPX;
   break;

  case SMI_SCSASYNC:
   iReturn = SMI_MODEM,
   break,

  default:
   iReturn = ERR_INTERNAL;
   break;
 }

exit:
 CallerRegs->bx = iReturn;
 SetForegroundRegs( CallerRegs );
}

APIFUNCRET BlockUnblockVideo( struct REGW
*CallerRegs )
{
 PCB_BEGINCRITICAL;
 fVideoBlocked = IsGetFunction( CallerRegs );
 PCB_ENDCRITICAL;

 CallerRegs->ax = BlockSCOSVideo( ( BYTE
)fVideoBlocked );

 SetForegroundRegs( CallerRegs ).
}

BOOL GetVideoBlocked( void )
{
 return ( fVideoBlocked );
}


int LoadSUI( SUIACTIONCODE NewActionCode,
WORD wNewScreenCode )
{
 WORD wCurrVidMode;
 BYTE nCurrHostMode,

 if ( NewActionCode == SUI_LASTOSKSCREEN )
 {
  if ( IsNoScreen( UIConfigData.nLastOSKScreen )
)
    wNewScreenCode = SUI_BIGALPHA,
  else
    wNewScreenCode =
UIConfigData.nLastOSKScreen;
 }
 else if ( NewActionCode ==
SUI_LASTSETUPDLGSCREEN )
 {
  if ( IsNoScreen(
UIConfigData.nLastSetupDlgScreen ) )
    wNewScreenCode = SUI_HOSTSELECTION;
  else
    wNewScreenCode =
UIConfigData.nLastSetupDlgScreen;
 }

 if ( ( IsSetupDlg( wScreenCode ) && IsSetupDlg(
wNewScreenCode
) ) ||
    ( IsOSK( wScreenCode ) && IsOSK(
wNewScreenCode ) ) )
   return ( ERR_INTERNAL );
 else if ( IsSetupDlg( wScreenCode ) && IsOSK(
wNewScreenCode )
)
   return ( ERR_INTERNAL ).

 ActionCode = NewActionCode;

 if ( nSUIStatus == SMI_SUINOTLOADED )
  nSUIStatus = SMI_SUILOADING;

 if ( GetSUIReady() )
  wOldScreenCode = wScreenCode;

 if ( ( iPrepSUIThreadIdx = GetTempEventNum() )
== ERR_INTERNAL
)
   return ( ERR_INTERNAL ).

 AddThread( iPrepSUIThreadIdx. WaitForPrepSUI,
NULL, SMD_POLLED,
FALSE,
     SUI_LOADSUIPOLLFREQ, 0 );

 wScreenCode = wNewScreenCode;

 if ( IsOSK( wScreenCode ) )
 {
  wCurrVidMode = GetCurrVidMode(),
  nCurrHostMode = GetCurrHostMode();

  if ( IsOSKVideoSupported( wCurrVidMode ) &&
nCurrHostMode ==
PND_DOSAPP )
    wScreenCode |=
SUI_OSKASSETUPDIALOGMASK;

  if ( wCurrVidMode != SUI_TEXTVIDMODE &&
nCurrHostMode !=
PND_DOSAPP )
    wScreenCode |=
SUI_OSKINWINGRAPHICSMASK;
 }

 return ( ERR_SUCCESS );
}



void WaitForPrepSUI( void )
{
 static PREPSUISTATES iStatePrepSUI =
SUI_NOPREPSTATE;
 int iCheck;

 switch ( iStatePrepSUI )
 {
  case SUI_NOPREPSTATE:
   if ( IsSetupDlg( wScreenCode ) || IsNoScreen(
wScreenCode )
)
    {

     TRACE( "NOTICE: Setup Dialogs or No
Screen'
requested.\r" ).

     SetMonitor( FALSE, TRUE );
     iStatePrepSUI = SUI_CHECKMONITOROFF;


    }
    else if ( IsOSKAsSetupDlg( wScreenCode ) )
    {
     TRACE( "NOTICE: OSK as Setup Dialog
requested.\r" );
     SetMonitor( FALSE, FALSE );
     iStatePrepSUI = SUI_CHECKMONITOROFF;


    }
    else
    {
     TRACE( "NOTICE: DOS or Windows OSK
requested, nothing
else to do\r" ):
     iStatePrepSUI = SUI_PREPSUCCESS;
    }
    break;

   case SUI_CHECKMONITOROFF:
    iCheck = CheckMonitor();

    if ( iCheck == ERR_SUCCESS )
    {
     if ( IsOSKAsSetupDlg( wOldScreenCode ) )
     {
      TRACE( "NOTICE: Monitor off complete, old
screen - OSK
as setup dialog\r" );
      iStatePrepSUI = SUI_PREPSUCCESS;
     }
     else if ( IsOSK( wOldScreenCode ) )
     {
      TRACE( "NOTICE: Monitor off complete, old
screen -
OSK\r" );
      RequestFullRepaint( FALSE,
wOldScreenCode );
      iStatePrepSUI = SUI_CHECKFULLREPAINT;
     }
     else
     {
      TRACE( "NOTICE: Monitor off complete, no
old screen\r"
```

```
).
      iStatePrepSUI = SUI_PREPSUCCESS;
    }
   }
   else if ( iCheck == ERR_INTERNAL )
    iStatePrepSUI = SUI_PREPERROR;
   break;

  case SUI_CHECKFULLREPAINT:
   iCheck = CheckFullRepaint();

   if ( iCheck == ERR_SUCCESS )
   {
    TRACE( "NOTICE: Occlusion region in SCOS
closed through
Full Repaint\r" );
     iStatePrepSUI = SUI_PREPSUCCESS;
   }
   else if ( iCheck == ERR_INTERNAL )
   {
    TRACE( "ERROR: Closure of occlusion region
failed in SCOS
through Full Repaint\r" );
     iStatePrepSUI = SUI_PREPERROR;
   }
   break;

  case SUI_PREPSUCCESS
   TRACE( "NOTICE: We're here, we're here!\r" );

   InitSUI();
   SMDosBusy( CBExecSUI );
   goto exit;

  case SUI_PREPERROR:
   TRACE( "ERROR: SUI Load Prep failed\r" );

   if ( nSUIStatus == SMI_SUILOADING )
    nSUIStatus = SMI_SUINOTLOADED;
   else
    nSUIStatus = SMI_SUIINACTIVE;

  default
 exit:
    iStatePrepSUI = SUI_NOPREPSTATE;
    DelThread( iPrepSUIThreadIdx );
    break;
 }
}

void CBExecSUI( void )
{
 int iVideoMode = GetCurrVidMode();

 if ( GetSCSCallProgress() ==
SMI_SCSCONNECTED )
 {
  if ( IsSetupDlg( wScreenCode ) || IsNoScreen(
wScreenCode ) )

  {
   if ( iVideoMode != SUI_INITIALVIDMODE )
    SetVideoMode( SUI_INITIALVIDMODE );
  }
  else
  {
   if ( IsOSKVideoSupported( iVideoMode ) &&
GetCurrHostMode() == PND_DOSAPP )
   {
    SetVideoMode( SUI_INITIALVIDMODE );
   }
  }
 }
 else
  SetVideoMode( SUI_INITIALVIDMODE );

 if ( nSUIStatus == SMI_SUILOADING )
 {
  if ( hi_dos_prompt() )
  {
   _and_isr_flg( ~SMD_SCHEDULERS );

   if ( JimExec( szSUIExecName, NULL ) !=
ERR_SUCCESS )
   {
    SetVideoMode( SUI_TEXTVIDMODE );
    dspl( STR_SUILOADERROR1 );
   }
   else
   {
    if ( ( iTempThreadIdx = GetTempEventNum() )
< 0 )
      return;

     AddThread( iTempThreadIdx
WaitForSUILoad, NULL,
SMD_POLLED, FALSE,
          SUI_LOADSUIPOLLFREQ,
SUI_LOADSUIMAXRETRY );
    }
   }
   else
   {
    SetVideoMode( SUI_TEXTVIDMODE );
    dspl( STR_SUILOADERROR2 );
   }
  }
  else
  {
   nSUIStatus = SMI_SUILOADED;
   SMDosBusy( CBExecLoadScreen );
  }
}

void WaitForSUILoad( void )
{
 if ( GetSUIReady() )
 {
  DelThread( iTempThreadIdx );
  iTempThreadIdx = SMD_NOACTIVETHREAD;

  SMDosBusy( CBExecLoadScreen );
 }
}

void CBExecLoadScreen( void )
{
 if ( !GetSUIReady() )
  return;

 switch ( ActionCode )
 {
  case SUI_DOPENCALIBRATION
   SetSetupDlgMode( PND_SETUPDLGON );
   DoMessageBox( NULL,
SUI_PENCALIBRATION, SUI_LEFTJUSTIFIED,
SUI_CANCEL,
          CBMsgBoxButtonPressed, 0 );
   break;

  case SUI_LASTCONNECTION
   SetSetupDlgMode( PND_SETUPDLGON );
   ResumeTheConnection();
   break;

  case SUI_BADVIDEOMSG:
   SetSetupDlgMode( PND_SETUPDLGON );
   DoMessageBox( STR_SUIBADVIDEOMSG, 0,
SUI_CENTERJUSTIFIED,
SUI_OK,
          CBMsgBoxButtonPressed, 0 );
   break;

  default:
   if ( IsSetupDlg( wOldScreenCode ) )
    SetSetupDlgMode( PND_SETUPDLGOFF );
   else if ( IsOSK( wOldScreenCode ) &&
!IsOSKAsSetupDlg(
wOldScreenCode ) )
    SetOSKMode( NULL, SUI_NOOCCTYPE );

   if ( IsSetupDlg( wScreenCode ) ||
IsOSKAsSetupDlg(
wScreenCode ) )
    SetSetupDlgMode( PND_SETUPDLGON );
   DoLoadScreen();
   break;
 }
}

void DoLoadScreen( void )
{
 int iNewScreenCode = LOBYTE( wScreenCode );
 int iOSKConfig;
 int xPosOSK, yPosOSK;

 if ( IsSetupDlg( wScreenCode ) || IsNoScreen(
wScreenCode ) )
 {
  iOSKConfig = UIConfigData.nLastOSKDlgScreen,
  xPosOSK = 0;
  yPosOSK = 0;
 }
 else
 {
  iOSKConfig = 0;
  xPosOSK = UIConfigData.xPosLastOSKScreen;
  yPosOSK = UIConfigData.yPosLastOSKScreen,
 }

 if ( !IsNoScreen( wScreenCode ) )
 {
  EnableBusyCursor( SUI_BUSYCURSOROFF );


  PCB_BEGINCRITICAL
  AX( SUI_DISPLAYDIALOG );
  BX( iNewScreenCode );
  CX( iOSKConfig );
  SI( yPosOSK );
  DI( xPosOSK );

  ( *lpfnSUICallBack )();
  PCB_ENDCRITICAL
 }
}

int UnloadSUI( BYTE nNewResidentStatus )
{
 if ( !GetSUIReady() )
  return ( ERR_INTERNAL );

 SetWaitingIcon( SBS_WAITINGICONON, TRUE );


 if ( nNewResidentStatus == SUI_UNLOADSUI )
  nSUIStatus = SMI_SUIUNLOADING;
 else
  nSUIStatus = SMI_SUIDEACTIVATING;

 nResidentStatus = nNewResidentStatus;

 if ( IsNoScreen( wScreenCode ) )
  HideMessageBox();

 if ( ( iUnloadSUIThreadIdx = GetTempEventNum()
) < 0 )
  return ( ERR_INTERNAL );

 AddThread( iUnloadSUIThreadIdx,
WaitForUnloadSUI, NULL,
SMD_POLLED, FALSE,
      SUI_UNLOADSUIPOLLFREQ, 0 );

 if ( GetThreadAddress( SCS_DISCOEVENTNUM )
== NULL )
  AddThread( SCS_DISCOEVENTNUM,
WaitForStatusChange, NULL,
       SMD_POLLED, FALSE,
SCS_DISCOPOLLFREQ, 0 );

 return ( ERR_SUCCESS );
}

void WaitForUnloadSUI( void )
{
 static UNLOADSUISTATES iStateUnloadSUI =
SUI_NOUNLOADSUISTATE;

 switch ( iStateUnloadSUI )
 {
  case SUI_NOUNLOADSUISTATE:
   if ( IsOSK( wScreenCode ) )
   {
    SetEEUIData();
    iStateUnloadSUI = SUI_GETACTIVEUPDATE;
   }
   else
    iStateUnloadSUI =
SUI_UNLOADSUISUCCESS;
   break;

  case SUI_GETACTIVEUPDATE:
   GetActiveUpdate();
   SetTimeLimit( iUnloadSUIThreadIdx,
SUI_PRIMSGPOLLFREQ );
   iStateUnloadSUI = SUI_DIMSCREEN;
   break;

  case SUI_DIMSCREEN:
   TRACE( "NOTICE: In the SUI_DIMSCREEN
state.\r" );
   SendDimScreen( UIConfigData.bDimScreen );
   SetTimeLimit( iUnloadSUIThreadIdx,
SUI_PRIMSGPOLLFREQ );
   iStateUnloadSUI = SUI_LOCKKBDMOUSE;

   break;

  case SUI_LOCKKBDMOUSE:
   TRACE( "NOTICE: In the
SUI_LOCKKBDMOUSE state.\r" );
   SendLockKbdMouse(
UIConfigData.bLockKbdMouse );
   SetTimeLimit( iUnloadSUIThreadIdx,
SUI_LOADSUIPOLLFREQ );
   iStateUnloadSUI =
SUI_UNLOADSUISUCCESS;
   break;

  case SUI_UNLOADSUISUCCESS:
  default:
   DelThread( iUnloadSUIThreadIdx );
   SMDosBusy( CBExecUnloadSUI );
   iStateUnloadSUI = SUI_NOCLEANUPSTATE;
   break;
 }
}

void CBExecUnloadSUI( void )
{
 lpfnTempProc = lpfnSUICallBack;

 if ( IsSetupDlg( wScreenCode ) || IsNoScreen(
wScreenCode ) ||
    IsOSKAsSetupDlg( wScreenCode ) )
  SetSetupDlgMode( PND_SETUPDLGOFF );
 else if ( IsOSK( wScreenCode ) )
  SetOSKMode( NULL, SUI_NOOCCTYPE );

 if ( nResidentStatus == SUI_UNLOADSUI )
  lpfnSUICallBack = NULL;

 PSP_TERMINATE( wSUIPSP ) = ( LONG )(
FARPROC
)SUITerminateAddress.

 _asm
 {
  cli

  mov wSavedSP, sp
  mov wSavedBP, bp
  mov ax, SUI_CLOSEDIALOG
  xor bx,bx
  mov bl, nResidentStatus

  sti
 };

 ( *lpfnTempProc )( ).

 if ( nResidentStatus == SUI_NOUNLOADSUI )
  CleanupUnloadSUI();

}

void SUITerminateAddress( void )
{
 _asm
 {
  mov ds, es:000Ah
  mov ss, es:000Ah
  mov sp, wSavedSP
  mov bp, wSavedBP
 };

 CleanupUnloadSUI();
}

void CleanupUnloadSUI( void )
{
 MREG MinArgs;

 if ( nResidentStatus == SUI_UNLOADSUI )
 {
  if ( !GetPNDActiveStatus() )
  {
   MinArgs = MEventOutArgs;
   MinArgs.ax = 0x000C;
   mouse( &MinArgs, &MEventOutArgs );
  }
 }

 AddThread( SUI_CLEANUPEVENTNUM,
WaitForCleanupSUI, NULL,
SMD_POLLED, FALSE,
      SUI_LOADSUIPOLLFREQ, 0 );
}

void WaitForCleanupSUI( void )
{
 static CLEANUPSUISTATES iStateCleanupSUI =
SUI_NOCLEANUPSTATE;
 int iCheck;

 switch ( iStateCleanupSUI )
 {
  case SUI_NOCLEANUPSTATE:
   if ( IsSetupDlg( wScreenCode ) || IsNoScreen(
wScreenCode )
   ||
      IsOSKAsSetupDlg( wScreenCode ) )
   {
    TRACE( "NOTICE: Unload of Setup Dialogs or
OSK-As-Setup-Dialog identified.\r" );
    SetMonitor( TRUE, FALSE );
    iStateCleanupSUI =
SUI_CHECKMONITORON;
   }
   else if ( IsOSKVidChange( wScreenCode ) )

   {
    TRACE( "NOTICE: Unload of OSK due to vid
change from DOS
or Windows identified.\r" );
```

```
      RequestFullRepaint( FALSE, wScreenCode );

      iStateCleanupSUI =
SUI_CHECKFULLPAINTCLEANUP;
    }
    else
    {
      TRACE( "NOTICE: Manual unload of OSK
from DOS or Windows
identified \r" );
      RequestFullRepaint( TRUE, wScreenCode );

      iStateCleanupSUI =
SUI_CHECKFULLPAINTCLEANUP;
    }
    break;

   case SUI_CHECKMONITORON:
    iCheck = CheckMonitor();

    if ( iCheck == ERR_SUCCESS )
    {
      TRACE( "NOTICE: CoSession monitor on
mode successful.\r"
);
      iStateCleanupSUI =
SUI_CLEANUPSUCCESS;
    }
    else if ( iCheck == ERR_INTERNAL )
    {
      TRACE( "NOTICE: CoSession monitor on
mode failed \r" );
      iStateCleanupSUI = SUI_CLEANUPERROR;
    }
    break;

   case SUI_CHECKFULLPAINTCLEANUP:
    iCheck = CheckFullRepaint();

    if ( iCheck == ERR_SUCCESS )
    {
      if ( isOSKVidChange( wScreenCode ) )

      {
        if ( isOSKWinGraphics( wScreenCode ) )

        {
          TRACE( "NOTICE: Full Repaint successful
for vid
change in SRWIN for Windows OSK\r" );
          iStateCleanupSUI =
SUI_CLEANUPSUCCESS;
        }
        else
        {
          TRACE( "NOTICE: Full Repaint successful
for vid
change in DOS or DOS Graphics OSK\r" );
          SetMonitor( TRUE, FALSE );
          iStateCleanupSUI =
SUI_CHECKMONITORON;
        }
      }
      else
      {
#if !defined( PROD )
        if ( isOSKWinGraphics( wScreenCode ) )

        {
          TRACE( "NOTICE: Full Repaint successful
for Windows
OSK\r" );
        }
        else
        {
          TRACE( "NOTICE: Repaint successful for
DOS or DOS
Graphics OSK\r" );
        }
#endif
        iStateCleanupSUI =
SUI_CLEANUPSUCCESS;
      }
    }
    else if ( iCheck == ERR_INTERNAL )
    {
      TRACE( "NOTICE: Full Repaint failed for OSK
of unknown
type\r" );
      iStateCleanupSUI = SUI_CLEANUPERROR;
    }
    break;

   case SUI_CLEANUPSUCCESS:
    TRACE( "NOTICE: SUI cleanup successful\r" );

   case SUI_CLEANUPERROR:
   default:
    if ( nResidentStatus == SUI_UNLOADSUI )
      nSUIStatus = SMI_SUINOTLOADED;
    else
      nSUIStatus = SMI_SUIINACTIVE;

    fil_chr( szPassword, 0, sizeof ( szPassword ) );

    wScreenCode = wOldScreenCode =
SUI_NOSCREEN;
    iStateCleanupSUI = SUI_NOCLEANUPSTATE;
    DefThread( SUI_CLEANUPEVENTNUM );
    SetWaitingIcon( SBS_WAITINGICONOFF,
TRUE );
    break;
  }
}

#if defined( _MSC_VER )
#pragma warning( default : 4704 )
#endif
Copr. 1995 Zenith Data Systems Corp.
#include "cr.h"
#include "sio.h"
#include "spawn.h"
#include "k2.h"
#include "fm.h"
#include "sm.h"

#if defined( _MSC_VER )
#pragma warning( disable : 4704 )
#endif

static BYTE fSecurityWarning = FALSE;
static BYTE fDomainWarning = FALSE;
static BYTE nMsgBoxReturnCode = 0;
static int iProcMsgBoxThreadIdx = -1;

void SetDomainWarning( BYTE
fNewDomainWarning )
{
  fDomainWarning = fNewDomainWarning;
}

void SetSecurityWarning( BYTE
fNewSecurityWarning )
{
  fSecurityWarning = fNewSecurityWarning;
}

void SetMsgBoxReturnCode( BYTE
nNewReturnCode )
{
  PCB_BEGINCRITICAL;
  nMsgBoxReturnCode = nNewReturnCode;
  PCB_ENDCRITICAL;
}

BYTE GetMsgBoxReturnCode( void )
{
  BYTE nReturnCode = nMsgBoxReturnCode;

  nMsgBoxReturnCode = 0;

  return ( nReturnCode );
}

APIFUNCRET SetSUIMBRetCode( struct REGW
*CallerRegs )
{
  SetMsgBoxReturnCode( LOBYTE( CallerRegs->bx
) );

  CallerRegs->ax = ERR_SUCCESS;

  SetForegroundRegs( CallerRegs );
}

APIFUNCRET SetKeyStroke( struct REGW
*CallerRegs )
{
  BYTE nHiScanByte;

  if ( ( nHiScanByte = HIBYTE( CallerRegs->bx ) ) >
0 )
    SendScanCode( nHiScanByte );

  SendScanCode( LOBYTE( CallerRegs->bx ) );

  CallerRegs->ax = ERR_SUCCESS;

  SetForegroundRegs( CallerRegs );
}

APIFUNCRET GetSetLockKbdMouse( struct REGW
*CallerRegs )
{
  BOOL bLockKbdMouse;

  if ( IsGetFunction( CallerRegs ) )
    CallerRegs->ax = UIConfigData.bLockKbdMouse
?
SMI_ENABLEDLOCKKBDMOUSE :
               SMI_DISABLEDLOCKKBDMOUSE;
  else
  {
    bLockKbdMouse = ( CallerRegs->bx == ( WORD
)SMI_ENABLEDLOCKKBDMOUSE );
    CallerRegs->ax = ERR_SUCCESS;

    if ( GetSCSCallProgress() ==
SMI_SCSCONNECTED )
    {
      if ( SendLockKbdMouse( bLockKbdMouse ) ==
ERR_SUCCESS )
        UIConfigData.bLockKbdMouse =
bLockKbdMouse;
      else
        CallerRegs->ax = ( WORD )ERR_INTERNAL;
    }
    else
      UIConfigData.bLockKbdMouse =
bLockKbdMouse;
  }

  SetForegroundRegs( CallerRegs );
}

APIFUNCRET GetSetDimScreen( struct REGW
*CallerRegs )
{

  BOOL bDimScreen;

  if ( IsGetFunction( CallerRegs ) )
    CallerRegs->ax = UIConfigData.bDimScreen ?
SMI_ENABLEDDIMSCREEN :
               SMI_DISABLEDDIMSCREEN;
  else
  {
    bDimScreen = ( CallerRegs->bx == ( WORD
)SMI_ENABLEDDIMSCREEN
);
    CallerRegs->ax = ERR_SUCCESS;

    if ( GetSCSCallProgress() ==
SMI_SCSCONNECTED )
    {
      if ( SendDimScreen( bDimScreen ) ==
ERR_SUCCESS )
        UIConfigData.bDimScreen = bDimScreen;
      else
        CallerRegs->ax = ( WORD )ERR_INTERNAL;
    }
    else
      UIConfigData.bDimScreen = bDimScreen;
  }

  SetForegroundRegs( CallerRegs );
}

APIFUNCRET GetSetConnectType( struct REGW
*CallerRegs )
{
  if ( CallerRegs->ax & 0x8000 )
    CallerRegs->ax = UIConfigData.bConnectType;
  else
    UIConfigData.bConnectType = CallerRegs->ax;

  SetForegroundRegs( CallerRegs );
}

APIFUNCRET GetKeyBoardStatus( struct REGW
*CallerRegs )
{
  CallerRegs->ax = SMI_KBDNOTPRESENT;
  SetForegroundRegs( CallerRegs );
}

APIFUNCRET GetAboutDialog( struct REGW
*CallerRegs )
{
  char szTempStr[ STR_STRMAXLENERR ];
  int iBIOSVersionNum = GetBIOSVersion();
  int iMsgBoxTotalLines;

  sprintf( szTempStr, STR_SMABOUTBOX,
szSMVersionName, HIBYTE(
iBIOSVersionNum ),
          LOBYTE( iBIOSVersionNum ) );

  iMsgBoxTotalLines = FillMsgBoxBuff( MsgBoxBuff,
szTempStr,
SUI_CENTERJUSTIFIED );

  BuffHead.iStructLen = sizeof ( MSGBOXBUFF );
  BuffHead.iBuffLen = sizeof ( MSGBOXBUFF ) *
iMsgBoxTotalLines;
  BuffHead.Buff = ( LPVOID )MsgBoxBuff;

  CallerRegs->ax = ( WORD )ERR_SUCCESS;
  CallerRegs->dx = SEG( &BuffHead );
  CallerRegs->si = OFF( &BuffHead );

  SetForegroundRegs( CallerRegs );
}

APIFUNCRET GetSetUDHotIcon( struct REGW
*CallerRegs )
{
  BUFFHEADER FAR *pBuffHeader;
  SCANCODE FAR *pScanCodes;
  int iBuffLen;


  if ( IsGetFunction( CallerRegs ) )
  {
    if ( CallerRegs->bx == SUI_UDHOTICON1 )
      pScanCodes = UIConfigData.aUDHotIcon1;
    else
      pScanCodes = UIConfigData.aUDHotIcon2;

    BuffHead.Buff = ( LPVOID )pScanCodes;
    BuffHead.iBuffLen = GetNumScanCodes(
pScanCodes ) * sizeof (
SCANCODE );
    BuffHead.iStructLen = sizeof ( SCANCODE );

    CallerRegs->dx = SEG( &BuffHead );
    CallerRegs->si = OFF( &BuffHead );
    CallerRegs->ax = ERR_SUCCESS;
  }
  else
  {
    pBuffHeader = MK_FP( CallerRegs->dx,
CallerRegs->si );
    pScanCodes = ( SCANCODE FAR *
)pBuffHeader->Buff;

    if ( pBuffHeader == NULL || pScanCodes ==
NULL )
      CallerRegs->ax = ( WORD )ERR_INTERNAL;
    else if ( pBuffHeader->iStructLen == 0 ||
pBuffHeader->iBuffLen == 0 )
      CallerRegs->ax = ( WORD )ERR_INTERNAL;
    else
    {
      iBuffLen = pBuffHeader->iBuffLen >
SUI_MAXNUMSCANCODES *
sizeof ( SCANCODE ) ?
              SUI_MAXNUMSCANCODES * sizeof (
SCANCODE ) :
pBuffHeader->iBuffLen;

      if ( CallerRegs->bx == SUI_UDHOTICON1 )
      {
        fil_chr( UIConfigData.aUDHotIcon1, 0,
              SUI_MAXNUMSCANCODES * sizeof (
SCANCODE ) );
        fmem_cp( ( LPVOID )pScanCodes, ( LPVOID
)UIConfigData.aUDHotIcon1,
              iBuffLen );
      }
      else
      {
        fil_chr( UIConfigData.aUDHotIcon2, 0,
              SUI_MAXNUMSCANCODES * sizeof (
SCANCODE ) );
        fmem_cp( ( LPVOID )pScanCodes, ( LPVOID
)UIConfigData.aUDHotIcon2,
              iBuffLen );
      }

      CallerRegs->ax = ERR_SUCCESS;
    }
  }

  SetForegroundRegs( CallerRegs );
}

APIFUNCRET GetSetSecurityID( struct REGW
*CallerRegs )
{
  LPSTR lpszNewSecurityID;
  int iLenSecurityID;

  if ( IsGetFunction( CallerRegs ) )
  {
```

```
  CallerRegs->dx = SEG(
UIConfigData.szSecurityID );
  CallerRegs->si = OFF( UIConfigData.szSecurityID
);
  CallerRegs->ax = ERR_SUCCESS;
 }
 else
 {
  if ( GetSCSCallProgress() ==
SMI_SCSDISCONNECTED )
  {
    lpszNewSecurityID = MK_FP( CallerRegs->dx,
CallerRegs->si
);
    iLenSecurityID = fstr_len( lpszNewSecurityID );

    if ( lpszNewSecurityID != NULL &&
         iLenSecurityID <=
SUI_MAXLENSECURITYSUI )
    {
      fmem_cp( ( LPVOID )lpszNewSecurityID, (
LPVOID
)UIConfigData.szSecurityID,
             iLenSecurityID + 1 );

      CallerRegs->ax = SetSecurityID(
UIConfigData.szSecurityID
);
    }
    else
      CallerRegs->ax = ( WORD )ERR_INTERNAL;
  }
  else
  {
    if ( !fSecurityWarning )
    {
      OpenMessageBox( STR_SUISECURITYID, 0,
SUI_LEFTJUSTIFIED,
SUI_OK );
      fSecurityWarning = TRUE;
    }

    CallerRegs->ax = ( WORD )ERR_INTERNAL;
  }
 }

 SetForegroundRegs( CallerRegs );
}

APIFUNCRET GetSetDomainID( struct REGW
*CallerRegs )
{
 char nNewDomainID;

 if ( IsGetFunction( CallerRegs ) )
 {
  CallerRegs->ax = ( WORD
)UIConfigData.nDomainID;
 }
 else
 {
  nNewDomainID = LOBYTE( CallerRegs->bx );

  if ( nNewDomainID >= PRX_MINDOMAINID &&
nNewDomainID <=
PRX_MAXDOMAINID )
  {
    UIConfigData.nDomainID = nNewDomainID;

    if ( !fDomainWarning )
    {
      OpenMessageBox( STR_SUIDOMAINID, 0,
SUI_LEFTJUSTIFIED,
SUI_OK );
      fDomainWarning = TRUE;
    }

    CallerRegs->ax = ERR_SUCCESS;
  }
  else
    CallerRegs->ax = ( WORD )ERR_INTERNAL;
 }

 SetForegroundRegs( CallerRegs );
}

APIFUNCRET GetSetUILanguage( struct REGW
*CallerRegs )
{
 CallerRegs->ax = ( WORD )SMI_UIUSENGLISH;

 SetForegroundRegs( CallerRegs );
}

APIFUNCRET RebootHost( struct REGW
*CallerRegs )
{
 REG_W InArgs, OutArgs;

 fil_chr( ( NPSTR )&InArgs, 0, sizeof ( InArgs ) );

 InArgs.ax = SCS_REBOOTHOST;

 inin( &InArgs, &OutArgs, SCS_INTNUM );

 if ( OutArgs.ax == SCS_ACCEPTED )
  CallerRegs->ax = ERR_SUCCESS;
 else
  CallerRegs->ax = ( WORD )ERR_INTERNAL;

 SetForegroundRegs( CallerRegs );
}

APIFUNCRET GetPasswordStatus( struct REGW
*CallerRegs )
{
 CallerRegs->ax = ( WORD )IsPWRequired();

 SetForegroundRegs( CallerRegs );
}

APIFUNCRET GetSetPassword( struct REGW
*CallerRegs )
{
 LPSTR szNewPassword;

 if ( IsGetFunction( CallerRegs ) )
 {
  CallerRegs->dx = SEG( szPassword );
  CallerRegs->si = OFF( szPassword );
 }
 else
 {
  szNewPassword = ( LPSTR )MAKELP(
CallerRegs->dx,
CallerRegs->si );
  fmem_cp( ( LPVOID )szNewPassword, ( LPVOID
)szPassword,
          SUI_MAXLENPASSWORD );
 }

 CallerRegs->ax = ERR_SUCCESS;

 SetForegroundRegs( CallerRegs );
}

APIFUNCRET UpdateHostList( struct REGW
*CallerRegs )
{
 CallerRegs->ax = ( WORD )RequestHostList();

 SetForegroundRegs( CallerRegs );
}

APIFUNCRET GetHostListStatus( struct REGW
*CallerRegs )
{

 if ( !GetSCSActiveStatus() )
  CallerRegs->ax = ( WORD
)ERR_NOTSUPPORTED;

 CallerRegs->ax = GetStatusHLInMem();

 SetForegroundRegs( CallerRegs );
}

APIFUNCRET LBGetSetNetGroup( struct REGW
*CallerRegs )
{
 if ( IsGetFunction( CallerRegs ) )
 {
  if ( GetStatusHLInMem() == SMI_BLANK )
  {
   CallerRegs->ax = ( WORD
)ERR_NOTSUPPORTED;
    goto exit;
  }

  if ( ( int )CallerRegs->bx > 0 )
  {
   ListBoxEntry.lpszEntry = ( LPSTR
)GetLBGroup(
CallerRegs->bx );
    ListBoxEntry.nAttribute =
SUI_LBENTRYENABLED;
    CallerRegs->dx = SEG( &ListBoxEntry );
    CallerRegs->si = OFF( &ListBoxEntry );
    CallerRegs->ax = ERR_SUCCESS;

  }
  else if ( ( int )CallerRegs->bx == 0 )
  {
   ListBoxEntry.lpszEntry = ( LPSTR
)GetLBGroup( -1 );
    ListBoxEntry.nAttribute =
SUI_LBENTRYENABLED;
    CallerRegs->dx = SEG( &ListBoxEntry );
    CallerRegs->si = OFF( &ListBoxEntry );
    CallerRegs->ax = GetLBCurrGroup();
  }
  else
   CallerRegs->ax = GetNumGroupEntries();
 }
 else
 {
  SetLBCurrGroup( CallerRegs->bx );
  CallerRegs->ax = ERR_SUCCESS;
 }

exit:
 SetForegroundRegs( CallerRegs );
}

APIFUNCRET LBGetSetNetHost( struct REGW
*CallerRegs )
{
 if ( IsGetFunction( CallerRegs ) )
 {
  if ( GetStatusHLInMem() == SMI_BLANK )
  {
   CallerRegs->ax = ( WORD
)ERR_NOTSUPPORTED;
    goto exit;
  }

  if ( ( int )CallerRegs->bx > 0 )
  {
   ListBoxEntry.lpszEntry = ( LPSTR )GetLBHost(
CallerRegs->bx
);
   ListBoxEntry.nAttribute = GetLBHostStatus(
CallerRegs->bx
);
    CallerRegs->dx = SEG( &ListBoxEntry );
    CallerRegs->si = OFF( &ListBoxEntry );
    CallerRegs->ax = 0;
  }
  else if ( ( int )CallerRegs->bx == 0 )
  {
   ListBoxEntry.lpszEntry = ( LPSTR )GetLBHost(
SUI_LBCURRENTRY );
   ListBoxEntry.nAttribute = GetLBHostStatus(
SUI_LBCURRENTRY
);
    CallerRegs->dx = SEG( &ListBoxEntry );
    CallerRegs->si = OFF( &ListBoxEntry );
    CallerRegs->ax = ( WORD )GetLBCurrHost();
  }
  else
   CallerRegs->ax = GetNumHostEntries();
 }
 else
 {
  SetLBCurrHost( CallerRegs->bx );
  CallerRegs->ax = 0;
 }

exit:
 SetForegroundRegs( CallerRegs );
}

APIFUNCRET UpdateDimenLoc( struct REGW
*CallerRegs )
{
 OCCLUDEUNION OccUnion;
 int iActualVidMode;

 CallerRegs->ax = ( WORD )ERR_SUCCESS;
 iActualVidMode = GetCurrVidMode();

 if ( !GetSCSActiveStatus() || IsSetupDlg(
wScreenCode ) ||
IsNoScreen( wScreenCode ) )
 {
  CallerRegs->ax = ( WORD
)ERR_NOTSUPPORTED;
  goto exit;
 }

 if ( CallerRegs->bx == 0xFFFF && CallerRegs->cx
== 0xFFFF &&
    CallerRegs->si == 0xFFFF && CallerRegs->di
== 0xFFFF )
 {
  UnloadSUI( SUI_NOUNLOADSUI );
 }
 else
 {
  if ( iActualVidMode > SUI_TEXTVIDMODE )
  {
   if ( IsOSKWinGraphics( wScreenCode ) )
   {
    OccUnion.occRWin.yULWin = CallerRegs->bx;
    OccUnion.occRWin.xULWin = CallerRegs->cx;
    OccUnion.occRWin.yLRWin = CallerRegs->si;
    OccUnion.occRWin.xLRWin = CallerRegs->di;

    CallerRegs->ax = CreateOccludedArea(
&OccUnion,
SUI_OCCRWIN, SCS_OSKFREEMEMPERCENT );
    SetOSKMode( &OccUnion, SUI_OCCRWIN );
   }
   else
   {
    OccUnion.occDosGraph.yULDos =
CallerRegs->bx;
    OccUnion.occDosGraph.xULDos =
CallerRegs->cx;
    OccUnion.occDosGraph.yLRDos =
CallerRegs->si;
    OccUnion.occDosGraph.xLRDos =
CallerRegs->di;

    CallerRegs->ax = CreateOccludedArea(
&OccUnion,
SUI_OCCDOSGRAPHICS,
SCS_OSKFREEMEMPERCENT );

     if ( IsOSKAsSetupDlg( wScreenCode ) )

      SetOSKMode( &OccUnion,
SUI_OCCDOSGRAPHICS );
    }
   }
  else
  {
   OccUnion.occText.yULRow = CallerRegs->bx;
   OccUnion.occText.xULCol = CallerRegs->cx;
   OccUnion.occText.yLRRow = CallerRegs->si;
   OccUnion.occText.xLRCol = CallerRegs->di;

   CallerRegs->ax = CreateOccludedArea(
&OccUnion,
SUI_OCCDOSTEXT,
SCS_OSKFREEMEMPERCENT );
   SetOSKMode( &OccUnion, SUI_OCCDOSTEXT
);
  }
 }

exit:
 SetForegroundRegs( CallerRegs );
}

APIFUNCRET GetSetContrast( struct REGW
*CallerRegs )
{
 BYTE nContrastIdx;

 if ( IsGetFunction( CallerRegs ) )
  CallerRegs->ax = ( WORD
)UIConfigData.nContrastIdx;
 else
 {
  nContrastIdx = LOBYTE( CallerRegs->bx );

  if ( ( CallerRegs->ax = ( WORD )SetContrast(
nContrastIdx ) )
       == ERR_SUCCESS )
    UIConfigData.nContrastIdx = nContrastIdx;
 }

 SetForegroundRegs( CallerRegs );
}

APIFUNCRET GetSetBrightness( struct REGW
*CallerRegs )
{
 BYTE nBrightnessIdx;

 if ( IsGetFunction( CallerRegs ) )
  CallerRegs->ax = ( WORD
)UIConfigData.nBrightnessIdx;
 else
 {
  nBrightnessIdx = LOBYTE( CallerRegs->bx );

  if ( ( CallerRegs->ax = ( WORD )SetBrightness(
nBrightnessIdx
) )
       == ERR_SUCCESS )
    UIConfigData.nBrightnessIdx = nBrightnessIdx;
 }

 SetForegroundRegs( CallerRegs );
}

APIFUNCRET GetSetAutoShutOff( struct REGW
*CallerRegs )
```

```
{
 if ( IsGetFunction( CallerRegs ) )
   CallerRegs->ax = ( WORD
)UIConfigData.bAutoShutoff;
 else
 {
   if ( LOBYTE( CallerRegs->bx ) == TRUE )
   {
     CallerRegs->ax = SetSuspendTimeout(
SBS_SUSPENDIN60MIN );
     UIConfigData.bAutoShutoff = TRUE;
   }
   else
   {
     CallerRegs->ax = SetSuspendTimeout(
SBS_SUSPENDDISABLED );

     UIConfigData.bAutoShutoff = FALSE;
   }
 }

 SetForegroundRegs( CallerRegs );
}

APIFUNCRET GetSetSleepTime( struct REGW
*CallerRegs )
{
 BYTE nSleepTimeIdx;

 if ( IsGetFunction( CallerRegs ) )
 {
   if ( UIConfigData.nSleepTimeIdx ==
SBS_SLEEPDISABLED )
     CallerRegs->ax = ( WORD
)SUI_NOSLEEPSLIDERIDX - 1;
   else
     CallerRegs->ax = ( WORD
)UIConfigData.nSleepTimeIdx - 1;
 }
 else
 {
   nSleepTimeIdx = LOBYTE( CallerRegs->bx ) + 1;

   if ( nSleepTimeIdx == SUI_NOSLEEPSLIDERIDX
)
     nSleepTimeIdx = ( BYTE
)SBS_SLEEPDISABLED;

   if ( ( CallerRegs->ax = SetSleepTimeout(
nSleepTimeIdx ) )
       == ERR_SUCCESS )
   {
     if ( nSleepTimeIdx == SBS_SLEEPDISABLED )
     {
       if ( ( CallerRegs->ax = SetPowerEnable(
SBS_POWERMANDISABLED ) )
         == ERR_SUCCESS )
       {
         if ( ( CallerRegs->ax = SetDozeTimeout(
SBS_DOZEDISABLED ) )
           == ERR_SUCCESS )
           UIConfigData.nSleepTimeIdx =
nSleepTimeIdx;
       }
     }
     else
     {
       if ( ( CallerRegs->ax = SetPowerEnable(
SBS_POWERMANENABLED ) )
         == ERR_SUCCESS )
       {
         if ( ( CallerRegs->ax = SetDozeTimeout(
SBS_DOZEDISABLED ) )
           == ERR_SUCCESS )
           UIConfigData.nSleepTimeIdx =
nSleepTimeIdx;
       }
     }
   }
 }

 SetForegroundRegs( CallerRegs );
}

int EnableBusyCursor( int iStatus )
{
 int iReturn;

 AX( SUI_SHOWHIDEBUSYCURSOR );
 BX( iStatus );

 iReturn = ( *lpfnSUICallBack )();

 return ( iReturn );
}

int DoMessageBox( NPSTR szMsgText, int
iScrNumber, char
nAlignment, int iButtons,
           MODALMSGBOXCB fnCallBack, int
iMsgBoxTimeOut )
{
 if ( !GetSUIReady() )
   return ( ERR_INTERNAL );

 if ( iMsgBoxTimeOut > 0 )
   iMsgBoxTimeOut += 2;

 if ( ( iProcMsgBoxThreadIdx =
GetTempEventNum() ) < ERR_SUCCESS
)
   return ( ERR_INTERNAL );

 AddThread( iProcMsgBoxThreadIdx, ( NEARPROC
)ProcessMessageBox,
NULL, SMD_POLLED,
           FALSE, SUI_PROCMSGBOXPOLLFREQ,
0 );

 if ( fnCallBack != NULL )
   DoModalMsgBox( fnCallBack, iMsgBoxTimeOut );

 ProcessMessageBox( szMsgText, iScrNumber,
nAlignment, iButtons
);

 return ( ERR_SUCCESS );
}

void ProcessMessageBox( NPSTR szNewMsgText,
int iNewScrNumber,
char nNewAlignment, int iNewButtons )
{
 static NPSTR szMsgText;
 static char nAlignment;
 static int iButtons;
 static int iScrNumber;
 static int iProcMsgBoxState =
SUI_NOPROCMSGBOXSTATE;

 switch ( iProcMsgBoxState )
 {
  case SUI_NOPROCMSGBOXSTATE:
    szMsgText = szNewMsgText;
    iScrNumber = iNewScrNumber;
    nAlignment = nNewAlignment;
    iButtons = iNewButtons;
    iProcMsgBoxState = SUI_HIDEMSGBOX;
    break;

  case SUI_HIDEMSGBOX:
    HideMessageBox();
    iProcMsgBoxState = SUI_SHOWMSGBOX;
    break;

  case SUI_SHOWMSGBOX:
    OpenMessageBox( szMsgText, iScrNumber,
nAlignment, iButtons
);
    iProcMsgBoxState =
SUI_NOPROCMSGBOXSTATE;
    DelThread( iProcMsgBoxThreadIdx );
    break;
 }
}

int OpenMessageBox( NPSTR szMsgText, int
iScrNumber, char
nAlignment, int iButtons )
{
 int iSeg = 0, iOff = 0,
 int iMsgBoxTotalLines;

 if ( !GetSUIReady() )
   return ( ERR_INTERNAL );

 if ( szMsgText != NULL )
   iScrNumber = 0;
 else
   goto exit;

 if ( strlen( szMsgText ) > STR_STRMAXLENERR -
1 )
   return ( ERR_INTERNAL );

 iMsgBoxTotalLines = FillMsgBoxBuff( MsgBoxBuff,
szMsgText,
nAlignment );

 if ( *MsgBoxBuff[ 0 ].lpszText == NULL )
   return ( ERR_INTERNAL );

 BuffHead.iStructLen = sizeof ( MSGBOXBUFF );
 BuffHead.iBuffLen = sizeof ( MSGBOXBUFF ) *
iMsgBoxTotalLines;
 BuffHead.Buff = ( LPVOID )MsgBoxBuff;

 iSeg = SEG( &BuffHead );
 iOff = OFF( &BuffHead );

exit:

 AX( SUI_SHOWMSGBOX );
 BX( iButtons );
 CX( iScrNumber );
 DX( iSeg );
 SX( iOff );

 return ( ( *lpfnSUICallBack )() );
}

int FillMsgBoxBuff( MSGBOXBUFF MsgBoxBuff[],
char *szMsgText,
char nAlignment )
{
 int iTerminator, iMsgBoxLineIdx,
iMsgBoxTotalLines,
 char *szPtrTempStr = szTempMsgStr;

 strcpy( szTempMsgStr, szMsgText );

 fil_char( MsgBoxBuff, 0, sizeof ( MSGBOXBUFF ) *
SMI_SUIMAXMSGBOXLINES );

 for ( iMsgBoxLineIdx = 0, iMsgBoxTotalLines = 0;
       iMsgBoxLineIdx <
SMI_SUIMAXMSGBOXLINES; ++iMsgBoxLineIdx
)
 {
   if ( ( iTerminator = str_pos( STR_SEPARATOR,
szPtrTempStr ) )
> 0 )
   {
     *( szPtrTempStr + ( iTerminator - 1 ) ) = NULL;
     MsgBoxBuff[ iMsgBoxLineIdx ].lpszText = (
LPSTR
)szPtrTempStr;
     MsgBoxBuff[ iMsgBoxLineIdx ].nAlignment =
nAlignment;
     szPtrTempStr += iTerminator;
     iMsgBoxTotalLines++;
   }
   else
     MsgBoxBuff[ iMsgBoxLineIdx ].lpszText =
szNullStr;
 }

 return ( iMsgBoxTotalLines );
}

int HideMessageBox( void )
{
 if ( !GetSUIReady() )
   return ( ERR_INTERNAL );

 AX( SUI_HIDEMSGBOX );

 return ( ( *lpfnSUICallBack )() );
}

int UpdateSUIConnectStatus( void )
{
 if ( !GetSUIReady() )
   return ( ERR_INTERNAL );

 SetUpdatingConnectStatus( TRUE );

 AX( SUI_UPDATECONNECTSTATUS );

 return ( ( *lpfnSUICallBack )() );
}

#if defined( _MSC_VER )
#pragma warning( default : 4704 )
#endif
Copr. 1995 Zenith Data Systems Corp.
#include "cr.h"
#include "frame.h"
#include "spawn.h"
#include "sm.h"

static BYTE fFrameWarning = FALSE;

static char sFrameTypes[][6]=
{
 "802.2",
 "802.3",
 "II",
 "SNAP",
};

APIFUNCRET LBGetSetNetFrameType( struct
REGW *CallerRegs )
{
 if ( IsGetFunction( CallerRegs ) )
 {
   int iCurrFrameIdx = UIConfigData.nFrameType -
PRX_FRAMEBASE,
   CallerRegs->dx = SEG( &ListBoxEntry );
   CallerRegs->si = OFF( &ListBoxEntry );

   if ( ( int )CallerRegs->bx > 0 )
   {
     ListBoxEntry.lpszEntry = ( LPSTR
)sFrameTypes[
CallerRegs->bx - 1 ];
     ListBoxEntry.nAttribute =
SUI_LBENTRYENABLED;
     CallerRegs->ax = ERR_SUCCESS;

   }
   else if ( ( int )CallerRegs->bx == 0 )
   {
     ListBoxEntry.lpszEntry =
       ( LPSTR )sFrameTypes[ iCurrFrameIdx ];
     ListBoxEntry.nAttribute =
SUI_LBENTRYENABLED;
     CallerRegs->ax = iCurrFrameIdx + 1;
   }
   else
     CallerRegs->ax =
PRX_NUMOFAVAILFRAMES;
 }
 else
 {
   if ( !fFrameWarning )
   {
     OpenMessageBox( STR_SUIFRAMETYPE, 0,
SUI_LEFTJUSTIFIED,
SUI_OK );
     fFrameWarning = TRUE;
   }

   UIConfigData.nFrameType = PRX_FRAMEBASE
+ ( CallerRegs->bx -
1 );
   CallerRegs->ax = ERR_SUCCESS;
 }

 SetForegroundRegs( CallerRegs );
}

APIFUNCRET NotifyScreenCode( struct REGW
*CallerRegs )
{
 BYTE nLastOSKScreen;
 BYTE nLastSetupDlgScreen;

 if ( ( nLastOSKScreen = LOBYTE( CallerRegs->bx
) & SUI_OSKMASK
) > 0 )
 {
   if ( IsSetupDlg( GetCurrScrCode() ) )

     UIConfigData.nLastOSKDlgScreen =
nLastOSKScreen;
   else
     UIConfigData.nLastOSKScreen =
nLastOSKScreen;
 }

 if ( ( nLastSetupDlgScreen = LOBYTE(
CallerRegs->bx ) &
SUI_SETUPDLGMASK ) > 0 )
   UIConfigData.nLastSetupDlgScreen =
nLastSetupDlgScreen;

 CallerRegs->ax = ERR_SUCCESS;

 SetForegroundRegs( CallerRegs );
}
Copr. 1995 Zenith Data Systems Corp.
#include "cr.h"
#include "sio.h"
#include "spawn.h"
#include "k2.h"
#include "sm.h"

#if defined( _MSC_VER )
#pragma warning( disable : 4704 )
#endif

static int iCalibMode = -1;
static int iCalibThreadIdx = 0;
static int xCalibCol, yCalibRow;
static BOOL fCalibLowRight;

static CALIBPENSTATES PenCalibStates;

APIFUNCRET CalibratePen( struct REGW
*CallerRegs )
{
 if ( fCalibLowRight )
 {
   CallerRegs->ax = SMI_CALIBLOWRIGHT;
```

```
    CallerRegs->cx = SHC_XVGARES -
SUI_XCALIBPOINT,
    CallerRegs->bx = SHC_YVGARES -
SUI_YCALIBPOINT;
   fCalibLowRight = FALSE.
  }

  if ( IsGetFunction( CallerRegs ) )
   iCalibMode = PND_CALIBLR.
  else
  {
   fCalibLowRight = TRUE,
   iCalibMode = PND_CALIBUL.
  }

  if ( ( iCalibThreadIdx = GetTempEventNum() ) < 0 )
  {
   CallerRegs->ax = ( WORD )ERR_INTERNAL;
  }
  else
  {
   PenCalibStates = SUI_INITIALCALIBSTATE,
   xCalibCol = CallerRegs->cx,
   yCalibRow = CallerRegs->bx;
   CallerRegs->ax = ERR_SUCCESS;

   AddThread( iCalibThreadIdx, WaitForPenCalib,
NULL.
SMD_POLLED, FALSE
          SMI_CALIBPOLLFREQ. 0 );

  }

  SetForegroundRegs( CallerRegs );
}

APIFUNCRET CalibrateCancel( struct REGW
*CallerRegs )
{
  DelThread( iCalibThreadIdx );
  EnableNewCalib( FALSE );

  CallerRegs->ax = ERR_SUCCESS;

  SetForegroundRegs( CallerRegs );

  if ( GetCurrActionCode() ==
SUI_LASTCONNECTION )
    LoadSUI( SUI_SPECIFIEDSCREEN,
SUI_HOSTSELECTION );
}

void WaitForPenCalib( void )
{
  int xUpperCol, yUpperRow xLowerCol,
yLowerRow;
  int iCalibState;
  PENCALIB CurrPenCalib;

  switch( PenCalibStates )
  {
   case SUI_INITIALCALIBSTATE:
    if ( SetCalibMode( iCalibMode, xCalibCol,
yCalibRow ) == 0
)
       PenCalibStates = SUI_CHECKCALIB,
     else
       PenCalibStates = SUI_CALIBERROR,
     break;

    case SUI_CHECKCALIB.
     iCalibState = GetCalibState( iCalibMode,
&xUpperCol,
&yUpperRow,
                     &xLowerCol, &yLowerRow
);

      if ( iCalibState != PND_CALIBNOTDONE )
      {
       if ( iCalibMode == PND_CALIBLR )
       {
        if ( iCalibState == PND_CALIBDONEVALID )
        {
          CurrPenCalib.wXUpperPenCalib =
xUpperCol;
          CurrPenCalib.wYUpperPenCalib =
yUpperRow
          CurrPenCalib.wXLowerPenCalib =
xLowerCol;
          CurrPenCalib.wYLowerPenCalib =
yLowerRow.

           SetEEMouseConfig( &CurrPenCalib );
           EnableNewCalib( TRUE );

           PenCalibStates = SUI_CALIBSUCCESS.
         }
         else
           PenCalibStates = SUI_CALIBERROR;
       }
        else
          PenCalibStates = SUI_CALIBSUCCESS:
       }
       break;

     case SUI_CALIBERROR:
     case SUI_CALIBSUCCESS:
      AX( SUI_CALIBPOINTDONE );
      ( *lpfnSUICallBack )();
      DelThread( iCalibThreadIdx );

      if ( iCalibMode == PND_CALIBLR &&
GetCurrActionCode() ==
SUI_DOPENCALIBRATION )
        LoadSUI( SUI_SPECIFIEDSCREEN,
SUI_HOSTSELECTION );
      break;
   }
}

#if defined( _MSC_VER  )
#pragma warning( default : 4704 )
#endif
```

Copr. 1995 Zenith Data Systems Corp.

```
#include "st.h"
#include "sio.h"
#include "spawn.h"
#include "k2.h"
#include "hm.h"
#include "lm.h"
#include "sm.h"

#if defined( _MSC_VER  )
#pragma warning( disable : 4704 )
#endif

static FLASHUPDATESTATES FlashUpdateState,
FlashStateOnError.
static MEM_REC MemRec;
static char far *cFlashImageBuff = NULL;
static char *szPathFlashFile = NULL;
static char *szNameActiveUpdate = NULL;
static int iDoUpdateThreadIdx,
iActiveUpdateThreadIdx;
static int iFlashUpdateState;
static int iTmpFilePersent, iOldTmpFilePersent,
iOldTmpDispPersent;

static int iTotalFlashFiles;
static int iCurrFlashFile,
static LONG lLenCurrFlashFile,
static int iSectorFlashStatus.

APIFUNCRET DoUpdate( struct REGW *CallerRegs
)
{
  if ( GetSCSCallProgress() !=
  SMI_SCSCONNECTED )
    CallerRegs->ax = ( WORD )ERR_INTERNAL,
  else
  {
   if ( ( iDoUpdateThreadIdx = GetTempEventNum()
  ) ==
  ERR_INTERNAL )
    {
     CallerRegs->ax = ( WORD )ERR_INTERNAL;
    }
    else
    {
     if ( IsFlashSupported() )
     {
      FlashUpdateState = FLU_SAFETYCHECK;
      AddThread( iDoUpdateThreadIdx,
 WaitForFlashUpdate, NULL,
 SMU_MANYTIMES, FALSE,
             FLU_POLLFREQ, FLU_MAXRETRY );

       CallerRegs->ax = ( WORD )ERR_SUCCESS:
      }
      else
       CallerRegs->ax = ( WORD )ERR_INTERNAL;

    }
  }

  SetForegroundRegs( CallerRegs );
}

APIFUNCRET RequestActiveUpdate( struct REGW
*CallerRegs )
{
  char *szCurrentUpdate = GetNameActiveUpdate();
  int iMsgBoxTotalLines;
  WORD wReturn,
  FLASHUPDATESTATES PowerState:

  if ( *szCurrentUpdate != ' ' && *szCurrentUpdate !=
NULL )
  {
   if ( ( PowerState = CheckFlashPowerState() ) !=
FLU_NOFLUSTATE )
    {
     switch( PowerState )
     {
      case FLU_GETBATTERYINFOERROR:
       iMsgBoxTotalLines = FillMsgBoxBuff(
MsgBoxBuff,
STR_FLUGETBATINFOERROR,

SUI_CENTERJUSTIFIED
);
        break;

      case FLU_NOTONACERROR:
       iMsgBoxTotalLines = FillMsgBoxBuff(
MsgBoxBuff,
STR_FLUNOAC, SUI_CENTERJUSTIFIED );
       break;

      case FLU_BATNOTATTACHEDERROR:
       iMsgBoxTotalLines = FillMsgBoxBuff(
MsgBoxBuff,
STR_FLUNOBATERROR, SUI_CENTERJUSTIFIED
);
        break;

      case FLU_BATCAPTOOLOWERROR:
       iMsgBoxTotalLines = FillMsgBoxBuff(
MsgBoxBuff,
STR_FLUBATTOOLOWERROR,
SUI_CENTERJUSTIFIED ).
        break:

      default:
       iMsgBoxTotalLines = FillMsgBoxBuff(
MsgBoxBuff,
STR_FLUUNKNOWNBATERROR,
SUI_CENTERJUSTIFIED );
     }

     wReturn = ( WORD
)ERR_UPGRADENOTAVAIL;
    }
    else if ( GetSCSCallProgress() !=
SMI_SCSCONNECTED )
    {
     iMsgBoxTotalLines = FillMsgBoxBuff(
MsgBoxBuff,
STR_FLUNOCONNECTERROR,
SUI_CENTERJUSTIFIED );
      wReturn = ( WORD
)ERR_UPGRADENOTAVAIL;
    }
    else if ( GetLinkQuality() != PRX_HIGHQUALITY
)
    {
     iMsgBoxTotalLines = FillMsgBoxBuff(
MsgBoxBuff,
STR_FLULINKTOOLOWERROR,
SUI_CENTERJUSTIFIED );
      wReturn = ( WORD
)ERR_UPGRADENOTAVAIL;
    }
    else if ( GetCurrHostMode() != PND_DOSAPP )
    {
     iMsgBoxTotalLines = FillMsgBoxBuff(
MsgBoxBuff,
STR_FLUNOTINDOSAPP, SUI_CENTERJUSTIFIED
);
      wReturn = ( WORD
)ERR_UPGRADENOTAVAIL;
    }
    else
    {
     MsgBoxBuff[0].lpszText = ( LPSTR
)szCurrentUpdate,
      MsgBoxBuff[0].nAlignment =
SUI_CENTERJUSTIFIED.
      iMsgBoxTotalLines = 1;
      wReturn = ERR_SUCCESS;
      TRACE( "NOTICE: Flash upgrade safety checks
passed.\r" );
    }
  }
  else
  {
   iMsgBoxTotalLines = FillMsgBoxBuff(
MsgBoxBuff,
STR_FLUNOFLASHFILES,
SUI_CENTERJUSTIFIED ).
   wReturn = ( WORD )ERR_UPGRADENOTAVAIL;

  }

  BuffHead.iStructLen = sizeof( MSGBOXBUFF );
  BuffHead.iBuffLen = sizeof( MSGBOXBUFF ) *
iMsgBoxTotalLines;
  BuffHead.Buff = ( LPVOID )MsgBoxBuff,

  CallerRegs->dx = SEG( &BuffHead );
  CallerRegs->si = OFF( &BuffHead );
  CallerRegs->ax = wReturn;

  SetForegroundRegs( CallerRegs );
}


void WaitForFlashUpdate( void )
{
  int iSizeFlashSector;
  int iNumberOfFlash;
  int iNewTmpFilePercent, iNewTmpDispPercent;
  int iRetryLimit = GetRetryLimit(
iDoUpdateThreadIdx );
  FlashStateOnError = FlashUpdateState.

  switch ( FlashUpdateState )
  {
   case FLU_NOFLUSTATE:

   case FLU_SAFETYCHECK:
    FlashUpdateState = FLU_INITMEM,

    SetWaitingIcon( SBS_WAITINGICONON, TRUE
);

    if ( UIConfigData.nSleepTimeIdx !=
SBS_SLEEPDISABLED )
     {
      SetPowerEnable(
SBS_POWERMANDISABLED );
      TRACE( "NOTICE: Disabled powerman for
flash update\r" );
     }
     break;


   case FLU_INITMEM:
    TRACE( "NOTICE: Initializing and allocating
memory\r" );

    if ( ( szPathFlashFile = ( NPSTR )malloc(
SCS_MAXLENFILENAME + 1 ) ) == NULL )
      FlashUpdateState = FLU_MEMERROR;
     else
     {
      if ( SMDosBusy( GetFlashImageBuff ) !=
ERR_SUCCESS )
        FlashUpdateState = FLU_MEMERROR;
       else
       {
        FlashUpdateState = FLU_ALLOCDOSMEM;
        ResetRetryLimit( iDoUpdateThreadIdx );
       }
      }
      break;

    case FLU_ALLOCDOSMEM:
     if ( cFlashImageBuff == NULL )
     {
      if ( iRetryLimit == FLU_MAXDOSBUSY )
      {
       TRACE( "ERROR: Failed to allocate required
buffers\r" );
        FlashUpdateState = FLU_MEMERROR;
      }
     }
     else
     {
      TRACE( "NOTICE: Successfully acquired
memory\r" );

       iTotalFlashFiles = FLU_NUMBERUNKNOWN.
       iCurrFlashFile = 0;

       fil_chr( szPathFlashFile, 0,
SCS_MAXLENFILENAME );

       FlashUpdateState =
FLU_SENDREQFLASHUPD;
       ResetRetryLimit( iDoUpdateThreadIdx );

      }
      break;
```

```
  case FLU_SENDREQFLASHUPD:
    TRACE( "NOTICE: Requesting the flash
upgrade from the
Host\r" );
    iSizeFlashSector = FLU_SIZEFLASHSECTOR /
1024;

    if ( SendPrivateMessage(
PMI_REQFLASHUPD, sizeof( int ),
        ( NPSTR )&iSizeFlashSector ) !=
ERR_SUCCESS )
      FlashUpdateState =
FLU_SENDPRIMSGERROR;
    else
    {
      if ( iRetryLimit == 0 )
        SetRetryLimit( iDoUpdateThreadIdx, 1 );

      SetTmpFilePercent( 0 );
      SetTimeLimit( iDoUpdateThreadIdx,
FLU_PRIMSGPOLLFREQ );
      FlashUpdateState =
FLU_WAITFORTMPFLASHFILES;
    }
    break;

  case FLU_WAITFORTMPFLASHFILES:
    iNewTmpFilePercent = GetTmpFilePercent();

    if ( iNewTmpFilePercent == 0 )
    {
      if ( iRetryLimit <= FLU_MAXPCNTTMPFILE )

      {
        TRACE( "ERROR: Timeout waiting for first
percent of
temp files \r" );
        FlashUpdateState =
FLU_NOACKTEMPFILESERROR;
      }
      else if ( iRetryLimit %
FLU_MODPCNTTMPFILE == 0 )
      {
        TRACE( "ERROR: Requesting flash update
from host once
again\r" );
        FlashUpdateState =
FLU_SENDREQFLASHUPD;
      }
    }
    else
    {
      UpdateTmpFilePercentage(
iNewTmpFilePercent );
      iOldTmpFilePercent = iNewTmpFilePercent;
      iOldTmpDispPercent = iNewTmpDispPercent =
(
iNewTmpFilePercent * 2 ) / 100;
      FlashUpdateState =
FLU_UPDATETMPFILEPERCENT;
      ResetRetryLimit( iDoUpdateThreadIdx );
    }
    break;

  case FLU_UPDATETMPFILEPERCENT:
    iNewTmpFilePercent = GetTmpFilePercent();

    iNewTmpDispPercent = ( iNewTmpFilePercent *
2 ) / 100
    if ( iNewTmpFilePercent == iOldTmpFilePercent
)
    {
      if ( iRetryLimit <= FLU_MAXPCNTTMPFILE ||
          iNewTmpFilePercent == 100 )
      {
        ResetRetryLimit( iDoUpdateThreadIdx );
        FlashUpdateState =
FLU_WAITFORNUMFILES;
        TRACE( "NOTICE: Done waiting for number
of files,
onward\r" );

#if defined( PROD )
        if ( iNewTmpFilePercent != 100 )
          TRACE( "ERROR: Timeout waiting for next
percent of
temp files \r" );
#endif
      }
    }
    else
    {
      ResetRetryLimit( iDoUpdateThreadIdx );
      iOldTmpFilePercent = iNewTmpFilePercent;

      if ( iNewTmpDispPercent !=
iOldTmpDispPercent )
      {
        TRACE( "NOTICE: Updating percentage of
tmp file
processing\r" );
        UpdateTmpFilePercentage(
iNewTmpFilePercent );
        iOldTmpDispPercent =
iNewTmpDispPercent;
      }
    }
    break;

  case FLU_WAITFORNUMFILES:
    TRACE( "NOTICE: Waiting for total number of
flash files\r"
);

    iNumberOfFlash = GetTotalFlashFiles();

    if ( iNumberOfFlash ==
FLU_NUMBERUNKNOWN )
    {
      if ( iRetryLimit == FLU_MAXUPDREQ )

      {
        TRACE( "ERROR: Timeout waiting for
number of flash
files \r" );
        FlashUpdateState =
FLU_NOACKNUMFILESERROR;
      }
    }
    else if ( iNumberOfFlash <=
FLU_ERRHOSTBASE )
    {
#if defined( PROD )
      sprintf( szTempStr, "NOTICE: Number of flash
files
returned as an error code - %d\r", iNumberOfFlash );

      TRACE( szTempStr );
#endif
      switch ( iNumberOfFlash )
      {
        case FLU_ERRREADHOSTDAT:
          FlashUpdateState = FLU_READHOSTDAT;
          break;

        case FLU_ERRMISSINGFILE:
          FlashUpdateState = FLU_MISSINGFILE;
          break;

        case FLU_ERRNOFLASHFILES:
          FlashUpdateState = FLU_NOFLASHFILES;
          break;

        case FLU_ERROUTOFDISKSPACE:
          FlashUpdateState =
FLU_OUTOFDISKSPACE;
          break;

        case FLU_ERRFILECORRUPTED:
          FlashUpdateState =
FLU_FILECORRUPTED;
          break;

        case FLU_ERRNOCHECKSUM:
          FlashUpdateState = FLU_NOCHECKSUM;

          break;

        default:
          FlashUpdateState =
FLU_HOSTUNKNOWNERR;
          break;
      }
    }
    else
    {
      WORD wExtendedMem =
GetSizeOfExtendedMem();

#if defined( PROD )
      sprintf( szTempStr, "NOTICE: Number of flash
files - %d
\r", iNumberOfFlash );
      TRACE( szTempStr );
#endif
      if ( iNumberOfFlash >
FLU_2MEGTHREASHHOLD &&
          wExtendedMem <
FLU_1MEGEXTENDEDRAM )
      {
        FlashUpdateState =
FLU_1MEGSYSTEMERROR;
      }
      else if ( iNumberOfFlash ==
FLU_2MEGTHREASHHOLD &&
          wExtendedMem ==
FLU_1MEGEXTENDEDRAM )
      {
        FlashUpdateState =
FLU_2MEGSYSTEMERROR;
      }
      else
      {
        iCurrFlashFile = 1;

        FlashUpdateState = FLU_SENDREQPATH;
        Set2MegFlash( ( iNumberOfFlash >
FLU_2MEGTHREASHHOLD )
);
        SetTimeLimit( iDoUpdateThreadIdx,
FLU_POLLFREQ );
        ResetRetryLimit( iDoUpdateThreadIdx );
      }
    }
    break;

  case FLU_SENDREQPATH:
    *szPathFlashFile = NULL;

    if ( SendPrivateMessage(
PMI_REQPATHFROMIDX, sizeof( int
),
        ( NPSTR )&iCurrFlashFile )
!=
ERR_SUCCESS )
      FlashUpdateState =
FLU_SENDPRIMSGERROR;
    else
    {
      if ( iRetryLimit == 0 )
        SetRetryLimit( iDoUpdateThreadIdx, 1 );

      FlashUpdateState =
FLU_WAITFORPATHFLASHFILE;
      SetTimeLimit( iDoUpdateThreadIdx,
FLU_PRIMSGPOLLFREQ );
    }
    break;

  case FLU_WAITFORPATHFLASHFILE:
    if ( *GetPathFlashFile() == NULL )
    {
      if ( iRetryLimit < FLU_MAXPATHREQ )
      {
        TRACE( "ERROR: Timeout waiting for
response to path
request\r" );
        FlashUpdateState =
FLU_NOACKPATHERROR;
      }
      else if ( iRetryLimit % FLU_MODPATHREQ
== 0 )
      {
        TRACE( "NOTICE: Trying again to receive
the next path
name\r" );
        FlashUpdateState = FLU_SENDREQPATH;
      }
    }
    else
    {
      if ( *ParseForFileName( GetPathFlashFile() )
==
FLU_FLASHFILEID )
      {
        FlashUpdateState =
FLU_RECEIVEHOSTFILE;
        ResetRetryLimit( iDoUpdateThreadIdx );
        SetTimeLimit( iDoUpdateThreadIdx,
FLU_POLLFREQ );
      }
      else
      {
        TRACE( "NOTICE: Protected file
encountered, skipping to
the next file\r" );
        goto after_flash;
      }
    }
    break;

  case FLU_RECEIVEHOSTFILE:
#if defined( PROD )
    sprintf( szTempStr, "NOTICE: File name
received - %s \r",
        GetPathFlashFile() );
    TRACE( szTempStr );
#endif
    if ( ReceiveHostFile( GetPathFlashFile(),
sFlashImageBuff,
FLU_SIZEFLASHSECTOR )
        != ERR_SUCCESS )
    {
      if ( iRetryLimit <= FLU_MAXRECVFILEREQ )
      {
        if ( iCurrFlashFile > 1 )
        {
          TRACE( "ERROR: Timeout waiting for
successful
ReceiveHostFile() request, from sector\r" );
          FlashUpdateState =
FLU_NOACKRECEIVEFATALERROR;
        }
        else
        {
          TRACE( "ERROR: Timeout waiting for
successful
ReceiveHostFile() request\r" );
          FlashUpdateState =
FLU_NOACKRECEIVEFILEERROR;
        }
      }
    }
    else
    {
      TRACE( "NOTICE: Finally beginning reflash of
the
specified sector\r" );
      FlashUpdateState = FLU_FLASHIT;
      ResetRetryLimit( iDoUpdateThreadIdx );
    }
    break;

  case FLU_FLASHIT:
    if ( ( iSectorFlashStatus = FlashSector(
sFlashImageBuff,
          iCurrFlashFile ) ) !=
SBS_FLASHSUCCESS )
    {
      if ( iSectorFlashStatus ==
SBS_FLASHACNOTATTACHED [illegible]
          iRetryLimit <= FLU_MAXFLASHIT )

        FlashUpdateState =
FLU_FLASHFATALERROR;
    }
    else
    {
after_flash:
      UpdateFlashPercentage( iCurrFlashFile );
      ResetRetryLimit( iDoUpdateThreadIdx );

      if ( ++iCurrFlashFile > iTotalFlashFiles )
        FlashUpdateState = FLU_CLEAREEROM;
      else
        FlashUpdateState = FLU_SENDREQPATH;

    }
    break;

  case FLU_CLEAREEROM:
    TRACE( "NOTICE: Clearing EEPROM\r" );

    if ( ClearEEPROM() != ERR_SUCCESS )
    {
      if ( iRetryLimit == FLU_MAXCLEAREEROM )

        FlashUpdateState =
FLU_EEROMNOCLRERROR;
    }
    else
    {
      ResetRetryLimit( iDoUpdateThreadIdx );
      FlashUpdateState =
FLU_FLASHUPDATECOMPLETE;
      SendPrivateMessage( PMI_REQFLASHDONE,
0, NULL );
    }
    break;

  case FLU_FLASHUPDATECOMPLETE:
    SendPrivateMessage( PMI_REQFLASHDONE,
0, NULL );
    FlashUpdateState = FLU_REBOOT;
    SetTimeLimit( iDoUpdateThreadIdx,
FLU_PRIMSGPOLLFREQ );
    break;

  case FLU_REBOOT:
    reboot( CRU_COLDBOOT );
    break;

  default:
    WaitForFlashError();
  }

  if ( FlashUpdateState >
FLU_BEGINERRORSTATES )
    WaitForFlashError();
}

void WaitForFlashError( void )
{
```

```
  SendPrivateMessage( PMI_REQFLASHDONE, 0,
NULL );

  if ( sFlashImageBuff == NULL )
  {
    DelThread( iDoUpdateThreadIdx );
    SetWaitingIcon( SBS_WAITINGICONOFF, TRUE
);
  }
  else
  {
    SetRetryLimit( iDoUpdateThreadIdx, 1 );
    HideMessageBox();
    SMDosBusy( ReleaseFlashMem );
    return;
  }

  switch ( FlashUpdateState )
  {
    case FLU_NOFLASHFILES:
      OpenMessageBox( STR_FLUNOFLASHFILES,
0, SUI_LEFTJUSTIFIED,
SUI_OK );
      break;

    case FLU_READHOSTDAT:
      OpenMessageBox( STR_FLUREADHOSTDAT,
0, SUI_LEFTJUSTIFIED
SUI_OK );
      break;

    case FLU_MISSINGFILE:
      OpenMessageBox( STR_FLUMISSINGFLASH,
0, SUI_LEFTJUSTIFIED,
SUI_OK );
      break;

    case FLU_OUTOFDISKSPACE:
      OpenMessageBox(
STR_FLUOUTOFDISKSPACE, 0,
SUI_LEFTJUSTIFIED, SUI_OK );
      break;

    case FLU_FILECORRUPTED:
      OpenMessageBox(
STR_FLUFILECORRUPTED, 0,
SUI_LEFTJUSTIFIED,
SUI_OK );
      break;

    case FLU_NOCHECKSUM:
      OpenMessageBox( STR_FLUNOCHECKSUM,
0, SUI_LEFTJUSTIFIED,
SUI_OK );
      break;

    case FLU_NOACKTEMPFILESERROR:
      OpenMessageBox(
STR_FLUNOACKTMPERROR, 0,
SUI_LEFTJUSTIFIED,
SUI_OK );
      break;

    case FLU_NOACKNUMFILESERROR:
      OpenMessageBox(
STR_FLUNOACKNUMFILEERR, 0,
SUI_LEFTJUSTIFIED, SUI_OK );
      break;

    case FLU_NOACKPATHERROR:
      OpenMessageBox(
STR_FLUNOACKPATHERROR, 0,
SUI_LEFTJUSTIFIED, SUI_OK );
      break;

    case FLU_NOACKRECEIVEFILEERROR:
      OpenMessageBox(
STR_FLUNOACKRECVFILEERR, 0,
SUI_LEFTJUSTIFIED, SUI_OK );
      break;

    case FLU_NOACKRECEIVEFATALERROR:
      OpenMessageBox(
STR_FLUNOACKRECVFATAL, 0,
SUI_LEFTJUSTIFIED, SUI_OK );
      break;

    case FLU_SENDPRIMSGERROR:
      OpenMessageBox( STR_FLUSENDPRIMSG, 0,
SUI_LEFTJUSTIFIED,
SUI_OK );
      break;

    case FLU_1MEGSYSTEMERROR:
      OpenMessageBox(
STR_FLU1MEGSYSERROR, 0,
SUI_LEFTJUSTIFIED,
SUI_OK );
      break;

    case FLU_2MEGSYSTEMERROR:
      OpenMessageBox(
STR_FLU2MEGSYSERROR, 0,
SUI_LEFTJUSTIFIED,
SUI_OK );
      break;

    case FLU_FLASHFATALERROR:
      switch ( iSectorFlashStatus )
      {
        case SBS_FLASHACNOTATTACHED:
          OpenMessageBox( STR_FLUNOAC, 0,
SUI_LEFTJUSTIFIED,
SUI_OK );
          break;

        case SBS_FLASHERASEERROR:
          OpenMessageBox( STR_FLUFLASHERASE,
0,
SUI_LEFTJUSTIFIED, SUI_OK );
          break;

        case SBS_FLASHPROGERROR:
          OpenMessageBox( STR_FLUFLASHPROG,
0, SUI_LEFTJUSTIFIED,
SUI_OK );
          break;

        default:
          OpenMessageBox(
STR_FLUFLASHUNKNOWN, 0,
SUI_LEFTJUSTIFIED, SUI_OK );
          break;
      }
      break;

    case FLU_EEROMNOCLRERROR:
      OpenMessageBox( STR_FLUEEROMNOCLR,
0, SUI_LEFTJUSTIFIED,
SUI_OK );
      break;

    case FLU_HOSTUNKNOWNERR:
      OpenMessageBox(
STR_FLUUNKNOWNHOSTERR, 0,
SUI_LEFTJUSTIFIED, SUI_OK );
      break;

    case FLU_MEMERROR:
      OpenMessageBox(
STR_FLURAMALLOCATION, 0,
SUI_LEFTJUSTIFIED,
SUI_OK );
      break;

    default:
      OpenMessageBox(
STR_FLUUNKNOWNERROR, 0,
SUI_LEFTJUSTIFIED,
SUI_OK );
  }
}

void GetFlashImageBuff( void )
{
  WORD wSector;

  TRACE( "NOTICE: Allocating memory from
CoSession for the
reflash buffer\r" );

  SetSCSMemory( SCS_DLGFREEMEMPERCENT,
SCS_FREEMEM, ( BYTE
)SMI_SCSNOWAITFORDOS );

  if ( ( wSector = GetFreeMCB( ( WORD )(
FLU_SIZEFLASHSECTOR / 16
) ) ) != 0 )
    sFlashImageBuff = MK_FP( wSector, 0 );
}

void ReleaseFlashMem( void )
{
  if ( szPathFlashFile != NULL )
  {
    free( szPathFlashFile );
    szPathFlashFile = NULL;
  }

  if ( sFlashImageBuff != NULL )
  {
    SetFreeMCB( SEG( sFlashImageBuff ) );
    sFlashImageBuff = NULL;
  }

  TRACE( "NOTICE: Returning memory to
CoSession, used by the
reflash buffer\r" );

  SetSCSMemory( 0, SCS_FREEMEM, ( BYTE
)SMI_SCSNOWAITFORDOS );

  if ( UIConfigData.nSleepTimeIdx !=
SBS_SLEEPDISABLED )
    SetPowerEnable( SBS_POWERMANENABLED );

}

int UpdateTmpFilePercentage( int
iNewTmpFilePercent )
{
  int iPercentage;

  iPercentage = ( iNewTmpFilePercent * 2 ) / 100;

  AX( SUI_UPDATEFLASHPRCNT );
  BX( iPercentage );

  ( *lpfnSUICallBack )();

  return ( ERR_SUCCESS );
}

int UpdateFlashPercentage( int iFlashFileNum )
{
  int iPercentage;

  if ( iTotalFlashFiles <= 0 )
    return ( ERR_INTERNAL );

  iPercentage = ( iFlashFileNum * 100 ) /
iTotalFlashFiles;

  AX( SUI_UPDATEFLASHPRCNT );
  BX( iPercentage );

  ( *lpfnSUICallBack )();

  return ( ERR_SUCCESS );
}

int GetActiveUpdate( void )
{
  if ( GetSCSCallProgress() !=
SMI_SCSCONNECTED )
    TRACE( "NOTICE: Not currently connected for
GetActiveUpdate(), sending PM anyway\r" );

  if ( IsFlashSupported() )
  {
    if ( szNameActiveUpdate == NULL )
      if ( ( szNameActiveUpdate = ( NPSTR )malloc(
SUI_MAXLENACTIVEUPD + 1 ) ) == NULL )
        return ( ERR_INTERNAL );

    fil_chr( szNameActiveUpdate, 0,
SUI_MAXLENACTIVEUPD + 1 );

    if ( SendPrivateMessage(
PMI_REQACTIVEUPGRADE, 0, NULL ) !=
ERR_SUCCESS )
      return ( ERR_INTERNAL );

    TRACE( "NOTICE: Sent Private Message to
determine the name of
the active upgrade on the Host.\r" );

    if ( ( iActiveUpdateThreadIdx =
GetTempEventNum() ) ==
ERR_INTERNAL )
      return ( ERR_INTERNAL );

    AddThread( iActiveUpdateThreadIdx,
WaitForActiveUpdate, NULL,
SMO_MANYTIMES,
           FALSE, FLU_PRIMSGPOLLFREQ,
FLU_MAXRETRY );


  }
  else
  {
    TRACE( "ERROR: Flash not supported\r" );
    return ( ERR_INTERNAL );
  }

  return ( ERR_SUCCESS );
}

void WaitForActiveUpdate( void )
{
  int iRetryLimit = GetRetryLimit(
iActiveUpdateThreadIdx );

  if ( *GetNameActiveUpdate() == NULL )
  {
    if ( iRetryLimit < FLU_MAXACTUPDREQ )

      DelThread( iActiveUpdateThreadIdx );
    else if ( iRetryLimit % FLU_MODACTUPDREQ
== 0 )
    {
      if ( SendPrivateMessage(
PMI_REQACTIVEUPGRADE, 0, NULL ) !=
ERR_SUCCESS )
        DelThread( iActiveUpdateThreadIdx );
    }
  }
  else
    DelThread( iActiveUpdateThreadIdx );
}

int SetPathFlashFile( LPSTR szNewPathFlashFile )
{
  if ( szPathFlashFile == NULL )
    return ( ERR_INTERNAL );
  PCB_BEGINCRITICAL;
  fmem_cp( ( LPVOID )szNewPathFlashFile, (
LPVOID
)szPathFlashFile,
         fstr_len( szNewPathFlashFile ) + 1 );
  PCB_ENDCRITICAL;

  return ( ERR_SUCCESS );
}

char *GetPathFlashFile( void )
{
  return ( szPathFlashFile );
}

int SetTotalFlashFiles( int iNewTotalFlashFiles )
{
  iTotalFlashFiles = iNewTotalFlashFiles;

  return ( ERR_SUCCESS );
}

int GetTotalFlashFiles( void )
{
  int iReturn;

  PCB_BEGINCRITICAL;
  iReturn = iTotalFlashFiles;
  PCB_ENDCRITICAL;

  return ( iReturn );
}

int SetNameActiveUpdate( LPSTR
szNewActiveUpdate )
{
  if ( szNameActiveUpdate == NULL )
    return ( ERR_INTERNAL );

  PCB_BEGINCRITICAL;
  if ( szNewActiveUpdate == NULL )
    *szNameActiveUpdate = ' ';
  else
    fmem_cp( ( LPVOID )szNewActiveUpdate, (
LPVOID
)szNameActiveUpdate,
           SUI_MAXLENACTIVEUPD );
  PCB_ENDCRITICAL;

  return ( ERR_SUCCESS );
}

char *GetNameActiveUpdate( void )
{
  if ( szNameActiveUpdate == NULL )
    return ( szNullStr );
  else
    return ( szNameActiveUpdate );
}

int SetTmpFilePercent( int iNewPercent )
{
  iTmpFilePercent = iNewPercent;

  return ( ERR_SUCCESS );
}

int GetTmpFilePercent( void )
{
  int iReturn;

  PCB_BEGINCRITICAL;
  iReturn = iTmpFilePercent;
  PCB_ENDCRITICAL;

  return ( iReturn );
}
```

```
FLASHUPDATESTATES CheckFlashPowerState(
void )
{
 LONG lBatteryInfo = GetBatteryInfo();

 if ( lBatteryInfo ==
SBS_GETBATTERYINFOERROR )
   return ( FLU_GETBATTERYINFOERROR );

 if ( ( lBatteryInfo & SBS_ACDCSTATEMASK ) !=
SBS_ACDCSTATEMASK
)
   return ( FLU_NOTONACERROR );

 if ( ( lBatteryInfo &
SBS_BATTERYATTACHEDMASK ) !=
SBS_BATTERYATTACHED )
   return ( FLU_BATNOTATTACHEDERROR );

 if ( HIBYTE( LOWORD( ( lBatteryInfo &
SBS_BATTERYCAPACITYMASK )
) ) < SBS_BATTERYFLASHMINCAP )
   return ( FLU_BATCAPTOOLOWERROR );

 return ( FLU_NOFLUSTATE );
}

#if defined( _MSC_VER )
#pragma warning( default : 4704 )
#endif
Copr 1995 Zenith Data Systems Corp
#include "cr.h"
#include "sio.h"
#include "spawn.h"
#include "sm.h"

#if defined( _MSC_VER )
#pragma warning( disable : 4704 )
#endif


TIMEOUT timeoutStatus = TIMEOUT_AVAILABLE;


static void TimeoutFire ( void );


static DOSBUSYCB fnDosBusyCallBack = NULL;
static VIDBUSYCB fnVidBusyCallBack1 = NULL;
static VIDBUSYCB fnVidBusyCallBack2 = NULL;
static MODALMSGBOXCB fnMsgBoxCallBack =
NULL;
static int iTempThreadIdx =
SMD_NOACTIVETHREAD;
static int iOkThreadIdx;
static int iVideoBusyThreadIdx =
SMD_NOACTIVETHREAD;
static int iSpkrThreadIdx =
SMD_NOACTIVETHREAD;
BYTE aDummyFCB1[] = "\0          ";
BYTE aDummyFCB2[] = "\0          ";

static char *sVideoStateBuff;


void GetForegroundRegs( struct REGW *inRegs )
{
 register struct sreg *s;
 register struct REGW *r;
 struct glob_stk far *p;

 r = inRegs;
 s = _int_frame;

 r->es = s->es;
 r->bp = s->bp;
 r->di = s->di;
 r->si = s->si;
 r->cx = s->cx;

 *(word*)&p = s->saved_sp;
 *(((word*)&p)+1) = s->saved_ss;

 r->ds = p->ds;
 r->dx = p->dx;
 r->bx = p->bx;
 r->ax = p->ax;
}

void SetForegroundRegs( struct REGW *OutRegs )
{
 struct sreg *s;
 struct REGW *r;
 struct glob_stk far *p;

 r = OutRegs;
 s = _int_frame;

 s->es = r->es;
 s->bp = r->bp;
 s->di = r->di;
 s->si = r->si;
 s->cx = r->cx;

 p = ( struct glob_stk far * )MK_FP( s->saved_ss,
s->saved_sp );


 p->ds = r->ds;
 p->dx = r->dx;
 p->bx = r->bx;
 p->ax = r->ax;
}

#if !defined( PROD )
void Trace( char *szOutStr )
{
 REG_W inRegs, OutRegs;

 fil_chr( ( NPSTR )&inRegs, 0, sizeof( REG_W ) );

 inRegs.ax = SID_FUNCNUM | SID_OUTSTRING;
 inRegs.si = SID_SISIG;
 inRegs.di = SID_DISIG;
 inRegs.ds = SEG( szOutStr );
 inRegs.dx = OFF( szOutStr );

 intn( &inRegs, &OutRegs, SID_INTNUM );
}
#endif

void CallAPIFunction( APIFUNC aAPIFuncTable[] )
{
 APIFUNCPTR fpAPIFunction;
 struct REGW CallerRegs;

 PCB_BEGINCRITICAL
 GetForegroundRegs( &CallerRegs );
 PCB_ENDCRITICAL

 fpAPIFunction = ( APIFUNCPTR )GetAPIFunction(
aAPIFuncTable,
&CallerRegs );

 if ( fpAPIFunction != NULL )
  ( *fpAPIFunction )( &CallerRegs );
 else
 {
  CallerRegs.ax = ( WORD
)ERR_NOTSUPPORTED;
  SetForegroundRegs( &CallerRegs );
 }
}

NEARPROC GetAPIFunction( APIFUNC
aAPIFuncTable[], struct REGW
*pCallerRegs )
{
 WORD wFuncCode = pCallerRegs->ax & 0x7FFF;
 int iFuncIdx = 0;

 if ( aAPIFuncTable == NULL )
  return ( NULL );

 while ( TRUE )
 {
  if ( wFuncCode == aAPIFuncTable[ iFuncIdx
].wFuncCode )
    return( aAPIFuncTable[ iFuncIdx ].fpAPIFunc );

  if ( aAPIFuncTable[ ++iFuncIdx ].wFuncCode ==
0 &&
      aAPIFuncTable[ iFuncIdx ].fpAPIFunc ==
NULL )
    return ( NULL );
 }
}

int ErrorBeep( void )
{
 sound( SMU_ERRORFREQ, SMU_ERRORDUR );

 if ( iSpkrThreadIdx >= 0 )
 {
  TRACE( "NOTICE: ErrorBeep() reentered\r" );
  return ( ERR_SUCCESS );
 }

 if ( ( iSpkrThreadIdx = GetTempEventNum() ) < 0 )
  return ( ERR_INTERNAL );

 AddThread( iSpkrThreadIdx, DoSpkrRestore,
NULL, SMD_ONETIME,
FALSE, SHC_SPKRPOLLFREQ,
        0 );

 return ( ERR_SUCCESS );
}

void DoSpkrRestore( void )
{
 DelThread( iSpkrThreadIdx );

 iSpkrThreadIdx = SMD_NOACTIVETHREAD;

 TRACE( "NOTICE: Speaker frequency restored for
PDV" );

 SetPenSpkFreq();
}

int SMDosBusy( DOSBUSYCB fnCallBack )
{
 if ( iTempThreadIdx >= 0 )
 {
  TRACE( "ERROR: SMDosBusy was reentered\r"
);
  DEBUG_BREAK;
  return ( 0 );
 }

 if ( ( iTempThreadIdx = GetTempEventNum() ) < 0
)
  return ( ERR_INTERNAL );

 fnDosBusyCallBack = fnCallBack

 AddThread( iTempThreadIdx, SMCheckDosBusy,
NULL, SMD_MANYTIMES,
FALSE, DBT_POLLFREQ,
       DBT_MAXRETRY );

 return ( ERR_SUCCESS );
}

void SMCheckDosBusy( void )
{
 BOOL fMadeDosBusy = FALSE;

 if ( *_isr_flg_ptr & ~SMD_SCHEDULERS )
  return;

 if ( dos_busy( 0 ) )
 {
  if ( GetRetryLimit( iTempThreadIdx ) == 0 )
  {
   TRACE( "ERROR: Timed out waiting for DOS
busy\r" );
   DEBUG_BREAK;
  }
  else
   return;
 }

 DelThread( iTempThreadIdx );
 iTempThreadIdx = SMD_NOACTIVETHREAD;

 ( *fnDosBusyCallBack )();
}

int SMVideoBusy( VIDBUSYCB fnCallBack )
{
 if ( fnVidBusyCallBack1 != NULL )
 {
  if ( fnVidBusyCallBack2 != NULL )
  {
   TRACE( "NOTICE: SMVideoBusy() reentered
more than twice,
waiting for SUI video busy\r" );
   DEBUG_BREAK;
   return ( ERR_INTERNAL );
  }
  else
  {
   TRACE( "NOTICE: SMVideoBusy() reentered
waiting for SUI
video busy\r" );
   fnVidBusyCallBack2 = fnCallBack;
  }
 }
 else
  fnVidBusyCallBack1 = fnCallBack;

 if ( iVideoBusyThreadIdx ==
SMD_NOACTIVETHREAD )
 {
  if ( ( iVideoBusyThreadIdx =
GetTempEventNum() ) < 0 )
    return ( ERR_INTERNAL );

  AddThread( iVideoBusyThreadIdx,
SMCheckVideoBusy, NULL,
SMD_POLLED, FALSE,
        SCS_VIDBLOCKPOLLFREQ, 0 );
 }

 return ( ERR_SUCCESS );
}

void SMCheckVideoBusy( void )
{
 static BYTE nCntVideoBlocked = 0;

 if ( !GetVideoBlocked() )
 {
  if ( ++nCntVideoBlocked >= 3 )
  {
   nCntVideoBlocked = 0;
   DelThread( iVideoBusyThreadIdx );
   iVideoBusyThreadIdx =
SMD_NOACTIVETHREAD;
   TRACE( "NOTICE: SUI video not busy, notify
the threads\r"
);

    if ( fnVidBusyCallBack1 != NULL )
    {
     ( *fnVidBusyCallBack1 )();
     fnVidBusyCallBack1 = NULL;
    }

    if ( fnVidBusyCallBack2 != NULL )
    {
     ( *fnVidBusyCallBack2 )();
     fnVidBusyCallBack2 = NULL;
    }
   }
  }
  else
   nCntVideoBlocked = 0;
 }

 void SetReentrancy( BOOL fEnable )
 {
  static BYTE bOldIsrFlg;

  if ( fEnable )
  {
   PCB_BEGINCRITICAL;
   bOldIsrFlg = *_isr_flg_ptr;
   *_isr_flg_ptr = SMD_NOREENTRANCE;
   PCB_ENDCRITICAL;
  }
  else
  {
   PCB_BEGINCRITICAL;
   *_isr_flg_ptr = bOldIsrFlg;
   PCB_ENDCRITICAL;
  }
 }

int RestoreVideoMode( void )
{

 if ( sVideoStateBuff == NULL )
  return ( ERR_INTERNAL );


 VideoState( sVideoStateBuff,
SHC_VIDEOHARDWARE |
SHC_VIDEODATAAREA | SHC_COLORPALREGS,
        SHC_RESTOREVIDEO );

 free( sVideoStateBuff );

 sVideoStateBuff = NULL;

 return ( ERR_SUCCESS );

}

WORD SetVideoMode( BYTE nRequestedMode )
{
 int AX;

 AX = MAKEWORD( nRequestedMode, 0 );
 int10( AX );

 return ( ERR_SUCCESS );
}
```

```
int VideoState( char *sVidBuff, char nDataType, char
nOperation )
{
  REG_W InRegs, OutRegs;

  fil_chr( ( NPSTR )&InRegs, 0, sizeof( REG_W ) );

  if ( nOperation != SHC_SIZEOFBUFF )
  {
    if ( sVidBuff != NULL )
    {
      InRegs.es = SEG( sVidBuff );
      InRegs.bx = OFF( sVidBuff );
    }
    else
      return ( ERR_INTERNAL );
  }

  InRegs.cx = ( int )nDataType;
  InRegs.ax = MAKEWORD( nOperation,
SHC_VIDSTATEFUNC );

  intdo( &InRegs, &OutRegs, 0x10 );

  if ( nOperation == SHC_SIZEOFBUFF )
    return ( OutRegs.bx );
  else
    return ( ERR_SUCCESS );
}

int JimExec( char szProgName[], char
sCmdLineParm[] )
{
  int iReturn = 0;
  EXECPARMS ep;
  BYTE aCmdLineTail[] = "\0\r";
  WORD wSegEP, wOffEP, wSegPN, wOffPN;
  WORD wOldPSP;

  ep.wSegEnv = 0;

  if ( sCmdLineParm == NULL )
  {
    ep.wOffCmdLineTail = OFF( aCmdLineTail );
    ep.wSegCmdLineTail = SEG( aCmdLineTail );
  }
  else
  {
    ep.wOffCmdLineTail = OFF( sCmdLineParm );
    ep.wSegCmdLineTail = SEG( sCmdLineParm );
  }

  ep.wOffFCB1 = OFF( aDummyFCB1 );
  ep.wSegFCB1 = SEG( aDummyFCB1 );
  ep.wOffFCB2 = OFF( aDummyFCB2 );
  ep.wSegFCB2 = SEG( aDummyFCB2 );

  wSegEP = SEG( &ep );
  wOffEP = OFF( &ep );
  wSegPN = SEG( szProgName );
  wOffPN = OFF( szProgName );

  wOldPSP = set_my_psp();

  AX( SMD_DOSEXEC );
  ES( wSegEP );
  BX( wOffEP );
  DS( wSegPN );
  DX( wOffPN );

  _asm
  {
    int 21h
    jnc success
    mov iReturn,ax
  };

success:
  restore_psp( wOldPSP );
  return ( iReturn );
}

WORD GetFreeMCB( WORD wNumPara )
{
  REG_W InRegs, OutRegs;
  WORD wReturn = 0, wFlags;

  fil_chr( ( NPSTR )&InRegs, 0, sizeof( REG_W ) );

  InRegs.ax = SMD_DOSALLOCMEM;
  InRegs.bx = wNumPara;

  PCB_BEGINCRITICAL;

  wFlags = intn( &InRegs, &OutRegs, SMD_DOSINT
);

  PCB_ENDCRITICAL;

  if ( !( wFlags & GEN_CARRYFLAG ) )
    return ( OutRegs.ax );
  else
    return ( 0 );
}

int SetFreeMCB( WORD wSegment )
{
  REG_W InRegs, OutRegs;
  WORD wFlags;

  fil_chr( ( NPSTR )&InRegs, 0, sizeof( REG_W ) );

  InRegs.ax = SMD_DOSFREEMEM;
  InRegs.es = wSegment;

  PCB_BEGINCRITICAL;

  wFlags = intn( &InRegs, &OutRegs, SMD_DOSINT
);

  PCB_ENDCRITICAL;

  if ( !( wFlags & GEN_CARRYFLAG ) )
    return ( ERR_SUCCESS );
  else
    return ( OutRegs.ax );
}

int StuffKeyStr( char *szStr )
{
  char *cKey = szStr;

  if ( strlen( szStr ) > SHC_MAXLENKBBUFF )
    return ( ERR_INTERNAL );

  while ( TRUE )
  {
    if ( *cKey )
      stuff_key( MAKEWORD( *cKey++, 0 ) );
    else
      return ( ERR_SUCCESS );
  }
}


BOOL IsGetFunction( struct REGW *CallerRegs )
{
  return ( CallerRegs->ax & 0x8000 );
}

char *ParseForFileName( char *szPathName )
{
  int iChar;

  for ( iChar = strlen( szPathName ) - 1; iChar >= 0;
--iChar )
  {
    if ( szPathName[ iChar ] == '\\' )
      return ( szPathName + iChar + 1 );
  }

  return ( NULL );
}

BOOL IsNodeAddressBlank( char *szNodeAddress )
{

  return ( strlen( szNodeAddress ) == 0 );


}

int DoModalMsgBox( MODALMSGBOXCB
fnCallBack, int iMsgBoxTimeOut )
{
  if ( ( fnMsgBoxCallBack = fnCallBack ) == NULL )
    return ( ERR_INTERNAL );

  if ( ( iOkThreadIdx = GetTempEventNum() ) <
ERR_SUCCESS )
    return ( ERR_INTERNAL );

  SetMsgBoxReturnCode( SUI_NOBUTTONS );

  if ( iMsgBoxTimeOut > 0 )
    AddThread( iOkThreadIdx, WaitForOK, NULL,
SMD_MANYTIMES,
FALSE, SUI_MSGBOXPOLLFREQ,
            iMsgBoxTimeOut );
  else
    AddThread( iOkThreadIdx, WaitForOK, NULL,
SMD_POLLED, FALSE,
SUI_MSGBOXPOLLFREQ,
            0 );

  return ( ERR_SUCCESS );
}

void WaitForOK( void )
{
  int iButtonCode;

  if ( ( iButtonCode = GetMsgBoxReturnCode() ) !=
SUI_NOBUTTONS )
  {
    DelThread( iOkThreadIdx );
    ( *fnMsgBoxCallBack )( iButtonCode );
  }
  else if ( GetThreadType( iOkThreadIdx ) ==
SMD_MANYTIMES )
  {
    if ( GetRetryLimit( iOkThreadIdx ) == 0 )
    {
      DelThread( iOkThreadIdx );
      ( *fnMsgBoxCallBack )( SUI_NOBUTTONS );
    }
  }
}

int AbsToZero( int iValue )
{
  return ( iValue < 0 ? 0 : iValue );
}

TIMEOUT TimerManager (TIMEOUT_FLAG
fTimeout, int iThreadIdx, long
lTicks)
{
    static int  iTimeoutThreadIdx;
    static int  iThreadInUseIdx = -1;
    TIMEOUT  timeoutReply;

    switch (fTimeout)
    {
      case TF_SET:
      if (timeoutStatus == TIMEOUT_AVAILABLE)
      {
        if ( ( iTimeoutThreadIdx =
GetTempEventNum() ) !=
ERR_INTERNAL )
        {
          AddThread( iTimeoutThreadIdx,
TimeoutFire, NULL,
SMD_ONETIME, FALSE,
                  lTicks, 0 );
          timeoutStatus = TIMEOUT_RUNNING;
          iThreadInUseIdx = iThreadIdx;

          timeoutReply = timeoutStatus;
        }
        else
          timeoutReply = TIMEOUT_ERROR;
      }
      break;

      case TF_RESET:
      if (iThreadInUseIdx == iThreadIdx)
      {
        timeoutStatus = TIMEOUT_AVAILABLE;
        timeoutReply = timeoutStatus;
        iThreadInUseIdx = -1;
      }
      else
        timeoutReply = TIMEOUT_NOTAVAILABLE;
      break;

      case TF_CHECK:
      if (iThreadInUseIdx == iThreadIdx &&
timeoutStatus ==
TIMEOUT_AVAILABLE)
        timeoutReply = timeoutStatus;
      else
        timeoutReply = TIMEOUT_NOTAVAILABLE;
      break;
    }

    return timeoutReply;
}

static void TimeoutFire ( void )
{
    timeoutStatus = TIMEOUT_FIRED;
}

#if defined( _MSC_VER  )
#pragma warning( default : 4704 )
#endif


Copr. 1995 Zenith Data Systems Corp.
#include "cr.h"
#include "sie.h"
#include "spawn.h"
#include "sm.h"

#if defined( _MSC_VER  )
#pragma warning( disable : 4704 )
#endif

static ZDSTRAPREC VIDTrapRec;
static char nXCharRes = -1;
static char nYCharRes = -1;
static int  iYScreenRes = -1;
static iCurrVidMode = 0;

static iPenNotifyThreadIdx = -1;

void InitVIDTrapRec( void )
{
  fil_chr( ( NPSTR )&VIDTrapRec, 0, sizeof(
ZDSTRAPREC ) );

  VIDTrapRec.tr.tr_int = SBS_VIDINTNUM;

  VIDTrapRec.tr.tr_asm_srv =
CRU_ONBUSYOLDINT;

  strcpy( VIDTrapRec.szSMAfterSignature,
szSMSignature );
}

TRAPREC *GetVIDTrapRec( void )
{
  return ( &VIDTrapRec.tr );
}

char GetYCharRes( void )
{
  if ( nYCharRes > 0 )
    return ( nYCharRes );
  else
    return ( SCS_HEIGHTOFTEXTCHAR );
}

char GetXCharRes( void )
{
  if ( nXCharRes > 0 )
    return ( nXCharRes );
  else
    return ( SCS_WIDTHOFTEXTCHAR );
}

int GetXScreenRes( int iVideoMode )
{
  switch ( iVideoMode )
  {
    case 0x00:
    case 0x01:
      return ( 320 );

    case 0x02:
    case 0x03:
      return ( 640 );

    case 0x04:
    case 0x05:
      return ( 320 );

    case 0x06:
      return ( 640 );

    case 0x07:
      return ( 720 );

    case 0x08:
    case 0x09:
    case 0x0A:
    case 0x0B:
    case 0x0C:
      return ( ERR_INTERNAL );

    case 0x0D:
      return ( 320 );

    case 0x0E:
    case 0x0F:
    case 0x10:
    case 0x11:
    case 0x12:
      return ( 640 );

    default:
      return ( ERR_INTERNAL );
  }
}

int GetYScreenRes( int iVideoMode )
{
  if ( iVideoMode == SBS_HIGHTEXTVIDMODE &&
iYScreenRes > 0 )
    return ( iYScreenRes );
  else
  {
    switch ( iVideoMode )
```

```
{
  case 0x00:
  case 0x01:
  case 0x02:
  case 0x03:
  case 0x04:
  case 0x05:
  case 0x06:
    return ( 400 );

  case 0x07:
    return ( 350 );

  case 0x08:
  case 0x09:
  case 0x0A:
  case 0x0B:
  case 0x0C:
    return ( ERR_INTERNAL );

  case 0x0D:
  case 0x0E:
    return ( 200 );

  case 0x0F:
  case 0x10:
    return ( 350 );

  case 0x11:
  case 0x12:
    return ( 480 )

  default:
    return ( ERR_INTERNAL );
  }
 }
}

int GetCurrVidMode( void )
{
  return ( iCurrVidMode );
}

BOOL VIDTrapService( void )
{
  struct REGW Regs;
  BOOL fReturn = TRUE;

  GetForegroundRegs( &Regs );

  switch ( HIBYTE( Regs.ax ) )
  {
    case SBS_SETVIDEOMODEFUNCS:
      TRACE( "NOTICE: Set video mode
intercepted\n" );

      iCurrVidMode = LOBYTE( Regs.ax ) &
~SBS_VIDMODEMASK;

      AfterModePenNotify();
      break;

    case SBS_CHARACTERGENFUNCS:
      TRACE( "NOTICE: Set text font after mode set
intercepted\n"
);

      if ( iCurrVidMode <=
SBS_HIGHTEXTVIDMODE )
        AfterModePenNotify()
        break;

    default:
      return ( FALSE );
  }

  return ( TRUE );
}

void AfterModePenNotify( void )
{
  if ( iPenNotifyThreadIdx >= 0 )
    return;

  if ( ( iPenNotifyThreadIdx = GetTempEventNum() )
< 0 )
    return;

  AddThread( iPenNotifyThreadIdx,
WaitForPenNotify, NULL,
SMD_ONETIME, FALSE,
        SBS_PENNOTIFYPOLLFREQ, 0 );
}

void WaitForPenNotify( void )
{
  char FAR *pNumScreenRows = ( char FAR *
)SHC_ADDSCREENROWS;
  char FAR *pNumCharScans = ( char FAR *
)SHC_ADDCHARSCANLINES;

  DelThread( iPenNotifyThreadIdx );
  iPenNotifyThreadIdx = -1;

  if ( iCurrVidMode <= SBS_HIGHTEXTVIDMODE )
  {
    nYCharRes = *pNumCharScans;
    iYScreenRes = nYCharRes * (
*pNumScreenRows + 1 );
  }
  else
    iYScreenRes = -1;

  NotifyVideoMode( iCurrVidMode );
}

#if defined( _MSC_VER )
#pragma warning( default : 4704 )
#endif


Copr. 1995 Zenith Data Systems Corp.

MAX_STK_TOP   =   01780h

CMD_LINE_SZ   =   80h
MIN_STK_SZ    =   100h

_TEXT    segment  byte public 'CODE'
_TEXT    ends
_VTX segment byte public 'CODE'
_VTX ends
_ITEXT   segment  byte public 'CODE'
_ITEXT   ends
_ZTEXT   segment  byte public 'CODE'
_ZTEXT   ends
_FITEXT SEGMENT PARA PUBLIC 'CODE'
_FITEXT ENDS
_FXDATA  segment word public 'DATA'
_FXDATA  ends
_FDATA   segment word public 'DATA'
_FDATA   ends
_VDATA   segment word public 'DATA'
_VDATA   ends
_RDATA   segment word public 'DATA'
_RDATA   ends
_IDATA   segment word public 'DATA'
_IDATA   ends
_DATA    segment word public 'DATA'
_DATA    ends
_BSS segment word public 'BSS'
_BSS ends
_BSSEND segment byte public 'BSSEND'
_BSSEND ends


CGROUP   group _TEXT,_VTX,_ITEXT,_ZTEXT
DGROUP   group
_FLATA,_FXDATA,_VDATA,_RDATA,_IDATA,_DAT
A,_BSS,_BSSEND
    assume
cs:CGROUP,ds:DGROUP,ss:DGROUP

_STACK  SEGMENT WORD STACK 'STACK'
_STACK  ENDS

__acrtused    =   09876h
public __acrtused


dly     MACRO    n
    REPT n
        jmp  short $+2
    ENDM
        ENDM

inc2    MACRO    reg
        inc  reg
        inc  reg
        ENDM

dec2    MACRO    reg
        dec  reg
        dec  reg
        ENDM

OP_RET   =   0C3h
OP_CALN  =   0E8h

gel MACRO    seg_reg
    push ss
    pop seg_reg
    ENDM


_DATA    segment word public 'DATA'
extrn
data_beg:byte,_nul_ptr:byte,fdata_beg:byte,fxdata_b
eg:byte
extrn vdata_beg:byte,rdata_beg:byte,bss_top:byte

public __cdata,__ccode
public __dummy_iret,exit_rdy,put_iret,__isr_9g_ptr
__isr_9g_ptr  dw  offset CGROUP:__isr_9g
__ccode       dw  CGROUP
__cdata       dw  DGROUP


put_iret  dw  offset CGROUP:__dummy_iret
_DATA   ends

_IDATA   segment word public 'DATA'
__heap      dw  offset DGROUP:bss_top
__env       dw  0
_cmd_line dw  0
_icode_beg   dw  0
_idata_end   dw  0
vtx_size dw  0
vtx_target   dw  0
vtx_ovl      dw  offset CGROUP:__dummy_ret
exit_vec  dw  offset CGROUP:__dummy_ret
target_data   dw  0
source_data   dw  0
data_gap  dw  0
res_size  dw  0
exit_rdy  dw  offset CGROUP:__dummy_ret
res_enabled   db  0
extrn _config_block:byte
extrn __tsr_name:byte
extrn idata_beg:byte
extrn __max_stack:word
public res_enabled,exit_rdy,__heap,__env
public
target_data,source_data,data_gap,res_size,exit_vec
public
_cmd_line,_icode_beg,_idata_end,vtx_size,vtx_target
,vtx_ovl

_IDATA ends

_BSS segment word public 'BSS'
extrn bss_beg:byte
_resident db   2 dup(?)
__my_psp  dw   1 dup(?)
psp_tbl      dw   1 dup(?)

__emt_list    dw   1 dup(?)
_res_stack_beg dw  1 dup(?)
_res_free_stack    dw   1 dup(?)
public _res_stack_beg,_res_free_stack,__emt_list

public __my_psp,_cmd_line,_resident,psp_tbl
_BSS ends


_ITEXT   segment   byte public 'CODE'
   ASSUME
CS:CGROUP,DS:DGROUP,SS:DGROUP

extrn isr_psp:word,isr_eblk:byte
extrn vtx_beg:byte
extrn itext_beg:byte
extrn gtx_beg:byte
extrn scode_top:byte

public set_cmem
set_cmem  proc near
        cld
        pop  si
        mov  dx,ds
        mov  es,word ptr ds:[2ch]
        mov  bp,DGROUP
        mov  ds,bp
        mov  ss,bp
        mov  [__env],ax
        mov  cx,offset DGROUP:bss_top
        mov  di,offset DGROUP:bss_beg
        sub  cx,di
        xor  ax,ax
        mov  cs:[__lim_ctl],ax
        shr  cx,1
        rep  stosw
        mov  [__my_psp],dx


        mov  es,dx
        mov  bx,MAX_STK_TOP
        mov  ax,[__max_stack]
        add  ax,di
        jnc  scm0
scm0_1:     mov  ax,bx
scm0:       cmp  ax,bx
        ja   scm0_1
        mov  cl,4
        shr  ax,cl
        add  ax,CMD_LINE_SZ/16
        xchg ax,bx
        add  bx,bp
        sub  bx,dx
        mov  ah,4Ah
        int  21h
        jnc  scm1
        mov  ah,4Ah
        int  21h
        jc   scm_err

scm1:       mov  ss,bp
        add  bx,dx
        sub  bx,bp
        shl  bx,cl
        sub  bx,CMD_LINE_SZ
        mov  [_cmd_line],bx
        cli
        mov  ss,bp
        mov  sp,bx
        sti
        cmp  sp,offset
DGROUP:bss_top+MIN_STK_SZ
        jb   scm_err
        add  dx,8
        mov  cs:[isr_psp],dx
        mov  [psp_tbl],dx
        mov  ax,offset CGROUP:gtx_beg
        sub  ax,offset CGROUP:vtx_beg
        mov  [vtx_size],ax
        jmp  si

scm_err:  mov  ax,4c01h
        int  21h

set_cmem  endp

_FITEXT   segment
assume cs:_FITEXT

public get_cmd_arg
get_cmd_arg    proc far
        cld


        mov  di,[_cmd_line]
        mov  ds,[__my_psp]
        gel  es
        mov  si,80h
        mov  cx,7fh
        and  cl,[si]
        inc  si
        rep  movsb
        xor  ax,ax
        stosb


        push ds
        pop  es
        gel  ds
        mov  di,102h
        mov  si,offset DGROUP:_config_block+2
        movsw
        movsw
        movsw


        mov  cl,32
        mov  di,8ch
        mov  si,offset DGROUP:__tsr_name
        rep  movsb

        ret
get_cmd_arg    endp
_FITEXT   ends

assume cs:CGROUP

init_fdata:    cld


        mov  si,offset DGROUP:fxdata_beg
        mov  di,offset DGROUP:vdata_beg
ifd_fx:       cmp  si,offset DGROUP:fdata_beg
        jae  ifd1
        lodsw
        xchg ax,bx
        lodsw
        sub  ax,bx
        mov  cs:[bx-2],ax
        mov  byte ptr cs:[bx-3],OP_CALN
        jmp  ifd_fx

public init_rdata
init_rdata:    mov  si,offset DGROUP:rdata_beg
        mov  di,offset DGROUP:data_beg


ifd1:         cli
        cld
```

```
        cmp  si,di
        jae  rld_ex
        lodsw
        mov  word ptr [si-2],offset
CGROUP:__dummy_ret
        push si
        push di
        call ax
        pop  di
        pop  si
        get  ds
        jmp  rld1

rld_ex:     ret

_TEXT   SEGMENT
public start
start:      jmp  start1

public go_res
go_res:     rep  movsb
        int  21h
__dummy_ret    ret
__dummy_iret   iret
public __dummy_ret,__dummy_iret
extrn __isr_flg:byte,__lim_ctl:word
_TEXT   ENDS


extrn isr_data:word
extrn _main:near
start1      call sel_cmem
        call get_cmd_arg
        call init_fdata
        call _main
        push ax
        mov  byte ptr cs:[__isr_flg],078h
        mov  es,[__env]
        mov  ah,49h
env_patch label word
public env_patch
        int  21h
        cmp  [res_enabled],1
        je   ist2

ist1        xor  bx,bx
        mov  es:[bx],bx
        call word ptr [exit_rdy]
        pop  ax
        mov  ah,4ch
        int  21h
public _exit
_exit:      pop  ax
        jmp  short ist1


ist2:       mov  ax,[__heap]
        add  ax,0fh
        mov  cl,4
        shr  ax,cl
        add  ax,DGROUP
        sub  ax,[__my_psp]
        xchg ax,dx


        mov  si,offset DGROUP:data_beg
        mov  ax,_DATA
        mov  bp,[_idata_end]
        inc2 bp
        sub  bp,offset DGROUP:data_beg
        jbe  ist3
        shr  bp,cl
        add  ax,bp
        shl  bp,cl
        add  si,bp

ist3:       mov  bx,offset CGROUP:vtx_beg
        mov  bp,[vtx_size]
        mov  di,[_icode_beg]
        or   di,di
        jnz  ist3_1
        mov  di,bx
ist3_1:     cmp  di,bx
        jbe  ist3_2
        mov  di,bx
ist3_2      mov  [vtx_target],di
        add  di,bp
        add  di,0fh
        shr  di,cl
        mov  bx,cs
        add  bx,di

ist4:       mov  [target_data],bx
        mov  [source_data],si
        sub  ax,bx
        mov  [data_gap],ax
        sub  dx,ax
        mov  [res_size],dx
        sub  [__cdata],ax
```

```
        mov  byte ptr [_resident],0ffh
        call init_rdata


        cli
        call word ptr [vtx_ovl]
        cli


        nop
        xchg bx,bx
fx_graph  label    word


        nop
        xchg bx,bx
fx_tmem_mv    label    word


        nop
        xchg bx,bx
fx_ega_gr label word


        nop
        xchg bx,bx
fx_uptraps    label word


        nop
        xchg bx,bx
fx_ sw_app    label    word


        nop
        xchg bx,bx
fx_swptk  label word



        nop
        xchg bx,bx
fx_spw_fx    label    word

        mov  ax,[__cdata]
        mov  cs:[isr_data],ax
        mov  es,[target_data]
        mov  si,[source_data]
        mov  dx,[res_size]
        xor  di,di
        mov  ax,[__heap]
        add  ax,0fh
        and  al,0f0h
        mov  [__heap],ax
        xchg ax,cx
        sub  cx,si
        cld
        cli
        mov  cs:[__isr_flg],0
        pop  ax
        mov  ah,31h
        nop
        xchg bx,bx
fx_lim_res    label word
        call go_res
fx_go_res label word

public
fx_go_res,fx_lim_res,fx_spw_fx,fx_spw_app,fx_uptra
ps fx_graph
public fx_tmem_mv,fx_ega_gr,fx_swptk

_ITEXT    ends

end start
Copr. 1995 Zenith Data Systems Corp.
tLISTBOXENTRY struc
lpszEntry dd 0
cAttribute db 0
ends

MB_LEFTJUSTIFIED equ 0
MB_CENTERED equ 1
MB_RIGHTJUSTIFIED equ 2

PENDRIVER_INTERRUPT equ 67h
SM_FUNCTION_INTERRUPT equ 68h

SM_GET_KEYBOARD_STATUS equ 062h
SM_GET_USER_INTERFACE_LANGUAGE equ
058h
SM_SET_ACTIVE_STATUS equ 060h
SM_GET_INITIAL_SCREEN equ 08050h
SM_GET_ABOUT_DIALOG equ 063h
SM_GET_NEXT_CREDITS_DIALOG equ 64h
SM_UPDATE_DIMENSIONS equ 052h
SM_REQUEST_UNLOAD equ 08053h
SM_REPORT_BUTTON_CLICKED equ 8055H
SM_CALIBRATE_UPPERLEFT equ 0ch
```

```
SM_CALIBRATE_LOWERRIGHT equ 800Ch
SM_CANCEL_CALIBRATION equ 00eh
SM_REBOOT_HOST equ 011h
SM_SET_KEYSTROKE equ 001h
SM_REQUEST_ACTIVE_FLASH_UPGRADE equ
12h
SM_PERFORM_FLASH_UPDATE equ 13h
SM_GET_CONNECTION_STATUS equ 22h
SM_GET_HOST_LIST_STATUS equ 21h
SM_UPDATE_HOST_LIST equ 20h
SM_GET_PASSWORD_STATUS equ 25h
SM_REQUEST_CONNECTION equ 23h
SM_REQUEST_DISCONNECTION equ 8023h
SM_ABORT_REQUEST_CONNECTION equ 24h

SM_TEST_FUNCTION equ 0FFFFh

UI_REQUEST_CLOSURE equ 053h
UI_REQUEST_DISPLAY equ 051h
UI_SHOW_MESSAGE_BOX equ 055h
UI_HIDE_MESSAGE_BOX equ 056h
UI_CALIBRATION_COMPLETE equ 0Dh
UI_FLASH_UPDATE_PERCENTAGE equ 14h
UI_GET_SUI_VERSION_NUMBER equ 18h
GET_HOST_LIST_STATUS      equ 021h


RES_NO_SCREEN        EQU 0
RES_OSK_ALPHA        EQU 1
RES_OSK_NUM          EQU 2
RES_OSK_FULL         EQU 3
RES_OSK_BIG          EQU 4
RES_OSK_BIG_ALPHA    EQU 5
RES_OSK_BIG_NUM      EQU 6
RES_OSK_BIG_FULL     EQU 7
RES_SETUPS_HOST      EQU 8h
RES_SETUPS_HOTKEYS   EQU 16h
RES_SETUPS_MAINTENANCE EQU 24h
RES_SETUPS_MODEM     EQU 32h
RES_SETUPS_POWER     EQU 40h
RES_SETUPS_SCREEN    EQU 48h


GETSET_AUTOMATIC_SHUTOFF        equ 0fh
GETSET_BRIGHTNESS               equ 0bh
GETSET_CONTRAST                 equ 0ah
GETSET_CUSTOM_AUTOANSWER_STRING equ
36h
GETSET_CUSTOM_CONNECT_STRING    equ 38h
GETSET_CUSTOM_DISCONNECT_STRING equ
37h
GETSET_CUSTOM_INIT_STRING       equ 035h
GETSET_HOST_CONNECTION_TYPE     equ 02ch
GETSET_MODEM_ANSWER_ON_RING     equ
032h
GETSET_MODEM_BAUD_RATE_ENTRY    equ
29h
GETSET_MODEM_HOST_DESC_ENTRY    equ
26h
GETSET_MODEM_HOST_PHONE_ENTRY   equ
27h
GETSET_MODEM_MANUFACTURER_ENTRY equ
28h
GETSET_MODEM_PREFIX             equ 030h
GETSET_MODEM_RETRY_DELAY        equ 034h
GETSET_MODEM_RETRY_LIMIT        equ 033h
GETSET_MODEM_SUFFIX             equ 031h
GETSET_MODEM_TONE_OR_PULSE      equ 02fh
GETSET_NETWORK_GROUP_ENTRY      equ 2ah
GETSET_NETWORK_HOST_ENTRY       equ 2bh
GETSET_PASSWORD                 equ 02eh
GETSET_SLEEPMODE_PERIOD         equ 10h
GETSET_SECURITY_ID              equ 66h
GETSET_DOMAIN_ID                equ 67h
GETSET_LOCK_HOST_KEYBOARD       equ 68h
GETSET_DIM_HOST_SCREEN          equ 6Ah
GETSET_USER_DEFINED_HOT_ICON    equ 65h
GETSET_USER_ID                  equ 02dh



Copr. 1995 Zenith Data Systems Corp.
      .MODEL  small

SMI_SUIEVENTNUM EQU 0

extrn _PushEventNum:near
extrn _lpfnFarCallEntry:near

_TEXT SEGMENT WORD PUBLIC 'CODE'
ASSUME DS: DGROUP, SS: DGROUP

ASSUME CS: _TEXT

public _SUICallService
_SUICallService PROC far

        push    bp
```

```
        mov     bp,sp

        cli

        push    ds
        push    ax
        push    bx
    push cx
        push    dx
        mov     ds, cs:000Ah

        mov     ax, SMI_SUIEVENTNUM
    push ax
        call    _PushEventNum
    add  sp,2

        pop     dx
        pop     cx
        pop     bx
        pop     ax

        sti

        call    DWORD PTR _lpfnFarCallEntry

        pop     ds
        mov     sp,bp
        pop     bp
        ret

_SUICallService     ENDP

public _GetPendingEvent
_GetPendingEvent PROC near

        push    bp
        mov     bp,sp

        mov     ax, cs:0010h

        mov     sp,bp
        pop     bp
        ret

_GetPendingEvent ENDP

_TEXT ENDS

END
Copr. 1995 Zenith Data Systems Corp.
include pd.inc

        .MODEL  small

_TEXT SEGMENT WORD PUBLIC 'CODE'
ASSUME DS: DGROUP, SS: DGROUP

ASSUME CS: _TEXT

public _SetPenSpkFreq
_SetPenSpkFreq proc near
    push    bp
    mov     bp,sp

    mov     al, PD_TIMER2_16BIT_MODE
    cli
    out     43h, al
    jmp     short $+2
    mov     ax, PD_PSEO_FREQUENCY
    out     42h, al
    jmp     short $+2
    mov     al, ah
    out     42h, al
    sti

    mov     sp,bp
    pop     bp
    ret
_SetPenSpkFreq endp

_TEXT ENDS

END

Copr. 1995 Zenith Data Systems Corp.
#include "cr.h"
#include "sio.h"
#include "spawn.h"
#include "frame.h"
#include "sm.h"
#include "st.h"

#if defined( _MSC_VER )
#pragma warning( disable : 4704 )
#endif

static char szPrompt[] = STR_PROMPT;
static char szLSLProg[] = STR_LSL;
```

```
static char szLSLProgParm[
SL_LSL_CMD_LENGTH ];
static char szIPXODIProg[] = STR_IPXODI;
static char szProximProg[] = STR_PROXIM;
static char szSMANProg[] =
STR_SMANPROGNAME;
static char szSViewProg[] =
STR_SVIEWPROGNAME;
static char szSViewParm[] =
STR_WELCOMESCREEN;
static char szPenDrvProg[] =
STR_PDRVPROGNAME;
static char szSDrvNetProg[] =
STR_SDRVNETPROGNAME;
static char szRWinProg[] = STR_RWINPROGNAME;
static char szCommandProg[] =
STR_COMMANDPROGNAME;
static char szCommandParm[] =
STR_COMMANDPARM;
static char szCommandDir[] = STR_COMMANDDIR;
static char szFormatPrompt[ 10 ];
static char szCommandLine[ 80 ];
static char szNullStr[] = "\0";
static char szOutStr[ 80 ];
static char szProgParmsStr[ 80 ];

static BOOL fExit, fNextCommand, fAutoStart =
FALSE, fError =
FALSE
static BYTE fVIDRedir = FALSE, fTitleScreen =
FALSE, fLoadSMLow =
FALSE
        fAllowAbort = FALSE;
static char *cToken, *szProgName, *szProgParms;

static int iErrorCode = ERR_SUCCESS;
static int iCol
static WORD wParms;
static word alsrStack[ MAX_STACKSIZE + 1 ];

static GENERALSTATEIDXS iGeneralState;
static COMMANDSTATEIDXS iCommandState;
static TRAPREC VIDTrapRec;
static TRAPREC SMTrapRec;

void main()
{
  int iCmdLineIdx;
  BYTE nLenCmdLine;

  sprintf( szFormatPrompt, "\n%s", szPrompt );

  chk_video();
  get_crs();
  crs_x = bcrs_x;
  crs_y = bcrs_y;
  mv_crs();

  fExit = FALSE;

  iCmdLineIdx = str_pos( '-', cmd_line );
  nLenCmdLine = str_len( cmd_line );

  while ( iCmdLineIdx > 0 && iCmdLineIdx <
nLenCmdLine )
  {
    switch ( cmd_line[ iCmdLineIdx ] | 0x20 )
    {
      case 'g':
        fAutoStart = TRUE;

        if ( ( ( cmd_line[ iCmdLineIdx + 1 ] | 0x20 ) ==
'r' ) )
        {
          fTitleScreen = TRUE;
          fVIDRedir = TRUE;
        }
        break;

      case 'l':
        fLoadSMLow = TRUE;
        break;

      case 'a':
        fAllowAbort = TRUE;
        break;

      default:
        printf( "\nERROR: invalid parameters" );
        break;
    }

    *( cmd_line + iCmdLineIdx - 1 ) = ' ';

    iCmdLineIdx = str_pos( '-', cmd_line );
  }

  if ( fVIDRedir )
  {
    printf( "Saratoga Loader, Copyright (c) 1994-1995
Zenith Data
Systems\n" );
    printf( "Mobile Systems Engineering, Version
1.1\n" );
  }

  if ( fAutoStart )
  {
    clr_scr();

    crs_x = 0;
    crs_y = 0;
    mv_crs();

    if ( fTitleScreen )
    {
      RunProgram( szSViewProg, szSViewParm );
    }

    if ( KeyPressedIn( 2 ) )
    {
      switch( GetActionKey() )
      {
        case KBD_DIAG:
          change_dir( szCommandDir );
          RunProgram( szCommandProg,
szCommandParm );
          DoExit( 1 );
          break;

        case KBD_ABORTLOAD:
          if ( fAllowAbort )
            DoExit( 1 );
          break;
      }
    }
  }

  do
  {
    iCol = 0;

    if ( fError )
      fill_chr( szCommandLine, 0, sizeof (
szCommandLine ) );
    else
      fError = FALSE;

    if ( !fAutoStart )
    {
      printf( szFormatPrompt );
      edit_str( szCommandLine,
MAX_WIDTHOFSCREEN - sizeof (
szPrompt ), &iCol, pckey );
      up_case( szCommandLine );
    }
    else
    {
      szCommandLine[0] = 'C';
      szCommandLine[1] = 'W';
      fAutoStart = FALSE;
    }

    cToken = szCommandLine;
    iGeneralState = STM_COMMAND;
    iCommandState = COM_UNKNOWN;
    fNextCommand = FALSE;

    while ( *cToken != NULL && !fNextCommand &&
!fExit )
    {
      if ( iGeneralState > STM_UNKNOWN )
        iGeneralState = STM_UNKNOWN;

      if ( ( iErrorCode = ( *fnStateTableProcs[
iGeneralState ]
)() ) == ERR_INTERNAL )
        fExit = TRUE;
    }
  } while ( !fExit );

  DoExit( 0 );
}

void DoExit( int iStatus )
{
  RemoveVidTrap();
  SetVideoMode( SUI_TEXTVIDMODE | 0x80 );

  exit( iStatus );
}

int ProcessIdle( void )
{
  return ( ERR_SUCCESS );
}

int ParseCommand( void )
{
  switch ( *cToken )
  {
    case 'R':
      if ( *( cToken + 1 ) == VAL_SPACE )
      {
        iGeneralState = STM_PARM;
        iCommandState = COM_RUNPROG;
        cToken += 2;
      }
      else if ( *( cToken + 1 ) == NULL )
      {
        iGeneralState = STM_EXECUTE;
        iCommandState = COM_RUNSM;
      }
      else
        goto com_unknown;
      break;

    case 'C':
      if ( *( cToken + 2 ) == NULL )
      {
        iGeneralState = STM_EXECUTE;

        if ( *( cToken + 1 ) == 'D' )
          iCommandState = COM_RUNDOSCOS;
        else if ( *( cToken + 1 ) == 'W' )
          iCommandState = COM_RUNWINCOS;
        else
          goto com_unknown;
      }
      else
        goto com_unknown;
      break;

    case 'X':
      if ( *( cToken + 1 ) == 'X' )
        iGeneralState = STM_EXIT;
      else
        goto com_unknown;
      break;

    default:
com_unknown:
      printf( "\nERROR: command unknown" );
      fError = fNextCommand = TRUE;
  }

  return ( ERR_SUCCESS );
}

int ParseParameters( void )
{
  switch ( iCommandState )
  {
    case COM_RUNPROG:
      if ( ( wParms = str_pos( VAL_SPACE, cToken )
) > 0 )
      {
        *( cToken + ( wParms - 1 ) ) = NULL;
        szProgName = cToken;
        cToken += wParms;
        sprintf( szProgParmsStr, " %s\r", cToken );
        szProgParms = szProgParmsStr;
      }
      else
      {
        szProgName = cToken;
        szProgParms = szNullStr;
      }

      iGeneralState = STM_EXECUTE;
      break;

    default:
      fError = TRUE;
      printf( "\nERROR: unknown command in the
parse parameter
state" );
      break;
  }

  return ( ERR_SUCCESS );
}

int ExecuteCommand( void )
{
  if ( fVIDRedir )
    printf( "\n" );

  switch ( iCommandState )
  {
    case COM_RUNSM:
      fNextCommand = TRUE;
      RunProgram( szSMANProg, szNullStr );
      break;

    case COM_RUNDOSCOS:
    case COM_RUNWINCOS:
      fNextCommand = TRUE;

      if ( fVIDRedir )
        InitTraps( ITR_SETVIDTRAP );
      else
        InitTraps( ITR_NOSETVIDTRAP );

      if ( LoadSM( fLoadSMLow ?
SMD_ALLOCFIRSTFIT :
SMD_ALLOCBESTFIT ) != ERR_SUCCESS )
        break;

      strcpy( szLSLProgParm, " " );

      switch ( GetFrameType() )
      {
        case SL_FT_E802_2:
          strcat( szLSLProgParm,
SL_LSL_CMD_E802_2 );
          break;

        case SL_FT_EII:
          strcat( szLSLProgParm, SL_LSL_CMD_EII );
          break;

        case SL_FT_ESNAP:
          strcat( szLSLProgParm,
SL_LSL_CMD_ESNAP );
          break;

        case SL_FT_E802_3:
          strcat( szLSLProgParm,
SL_LSL_CMD_E802_3 );
          break;

        default:
          if ( fVIDRedir )
            printf( "ERROR: invalid Frame Type
detected. The
default Frame Type 802.3 will be used.\n" );
          strcat( szLSLProgParm,
SL_LSL_CMD_E802_3 );
          break;
      }

      if (
#if defined( MOUSE )
            RunProgram( "mouse.com", szNullStr ) !=
ERR_SUCCESS
||
#else
            RunProgram( szPenDrvProg, szNullStr ) !=
ERR_SUCCESS
||
#endif
            LoadNetwork() != ERR_SUCCESS ||
            RunProgram( szSDrvNetProg, " -H1
-O2048 -WT20\r" ) !=
ERR_SUCCESS )
        break;

      if ( iCommandState == COM_RUNWINCOS )
        RunProgram( szRWinProg, szNullStr );

      KickSUI();
      break;

    case COM_RUNPROG:
      fNextCommand = TRUE;
      RunProgram( szProgName, szProgParms );
      break;

    default:
      fError = TRUE;
      printf( "\nERROR: unknown command in the
execution state"
);
      break;
  }

  return ( ERR_SUCCESS );
}

int ProcessSLExit( void )
{
  fExit = TRUE;

  return ( ERR_SUCCESS );
}

int ProcessStateUnknown( void )
{
  printf( "\nERROR: unknown state" );

  return ( ERR_INTERNAL );
}

int RunProgram( char *szProgName, char
*szProgParms )
```

```
{
 int iSpawnReturn;

 if ( ( iSpawnReturn = spawn_nr( szProgName,
szProgParms ) ) ==
0 )
  iSpawnReturn = ERR_SUCCESS;
 else
 {
  if ( fVIDRedir )
   printf( "\nERROR: %s  spawn error %d",
szProgName,
          iSpawnReturn );
  fError = TRUE;
 }

 return ( iSpawnReturn );
}

int LoadMLID( char *szProgName )
{
 int iLoadIdx;

 for ( iLoadIdx = 0; iLoadIdx <
MAX_MLIDLOADRETRY; ++iLoadIdx )
 {
  if ( RunProgram( szProgName, szNullStr ) !=
ERR_SUCCESS )
    return ( ERR_INTERNAL );

  if ( GetMLIDStatus() == TRUE )
   return ( ERR_SUCCESS );
 }

 sprintf( szOutStr,
        "\nERROR: The load sequence was aborted
due to a
failure in the loading of \n%s.\n",
        szProxmProg );

 DisplayError( szOutStr );

 return ( ERR_INTERNAL );
}

int EnableKbd( void )
{
 REG_W InArgs, OutArgs;

 fil_chr( &InArgs, 0, sizeof ( InArgs ) );

 InArgs.ax = SMI_SLENABLEKBD;

 intn( &InArgs, &OutArgs, SMI_SCSINTNUM );

 return ( 0 );
}

int GetFrameType( void )
{
 REG_W InArgs, OutArgs;

 fil_chr( &InArgs, 0, sizeof ( InArgs ) );

 InArgs.ax = SMI_SLGETFRAMETYPE;

 intn( &InArgs, &OutArgs, SMI_SCSINTNUM );

 return ( OutArgs.ax );
}

int GetMLIDStatus( void )
{
 REG_W InArgs, OutArgs;

 fil_chr( &InArgs, 0, sizeof ( InArgs ) );

 InArgs.ax = SMI_SLGETMLIDSTATUS;

 intn( &InArgs, &OutArgs, SMI_SCSINTNUM );

 return ( OutArgs.ax );
}

void SetOldVidVector( LONG lOldVidVector )
{
 REG_W InArgs, OutArgs;

 fil_chr( &InArgs, 0, sizeof ( InArgs ) );

 InArgs.ax = SMI_SLDEFINEOLDVIDVECTOR;
 InArgs.bx = OFF( lOldVidVector );
 InArgs.dx = SEG( lOldVidVector );
 intn( &InArgs, &OutArgs, SMI_SCSINTNUM );
}

int KickSUI( void )
{
 REG_W InArgs, OutArgs;

 RemoveVidTrap();

 fil_chr( &InArgs, 0, sizeof ( InArgs ) );

 InArgs.ax = SMI_SLLOADSUI;

 intn( &InArgs, &OutArgs, SMI_SCSINTNUM );

 EnableKbd();

 return ( 0 );
}

int LoadSM( int iMemStrategy )
{
 int iRunStatus;

 if ( iMemStrategy != SMD_ALLOCFIRSTFIT )
 {
  PatchMCB();
  SetMemStrategy( iMemStrategy );
 }

 iRunStatus = RunProgram( szSMANProg,
szNullStr );

 SetMemStrategy( SMD_ALLOCFIRSTFIT );

 return ( iRunStatus );
}

int LoadNetwork( void )
{
 if ( RunProgram( szLSLProg, szLSLProgParm ) !=
ERR_SUCCESS ||
      LoadMLID( szProxmProg )           !=
ERR_SUCCESS ||
      RunProgram( szIPXODIProg, szNullStr ) !=
ERR_SUCCESS )
   return ( ERR_INTERNAL );

 return ( ERR_SUCCESS );
}

int KeyPressedIn( int iDelay )
{
 int iTickCount;
 long lSyncCount;

 kbflag = 0;

 if ( fVIDRedir )
 {
  if ( fAllowAbort )
   printf( "\n[CTRL]+[ALT]+A to abort load
sequence or
[CTRL]+[ALT]+D to load diagnostic...\n" );
  else
   printf( "\n[CTRL]+[ALT]+D to load
diagnostic...\n" );
 }

 for ( iTickCount = 0; iTickCount < iDelay;
++iTickCount )
 {
  lSyncCount = sync_ticks();

  while ( TRUE )
  {
   if ( sync_ticks() - lSyncCount >= 20 )
    break;

   if ( anykey() )
    return ( TRUE );
  }
 }

 return ( FALSE );
}

ACTIONKEYS GetActionKey( void )
{
 WORD wKey;

 if ( anykey() )
 {
  wKey = getkey();

  if ( kbflag & KBD_CTRLMASK &&
       kbflag & KBD_ALTMASK )
  {
   switch( wKey )
   {
    case KBD_DSCAN:
     return ( KBD_DIAG );

    case KBD_ASCAN:
     return ( KBD_ABORTLOAD );
   }
  }
 }

 return ( KBD_NOACTIONKEY );
}

void InitTraps( BYTE nVidTrapStatus )
{
 install_trap( ( fp )TrapService, MAX_STACKSIZE *
sizeof ( int
), SMD_FULLREENTER );
 enable_tsr( alerStack, MAX_STACKSIZE * sizeof (
int ) );

 if ( nVidTrapStatus == ITR_SETVIDTRAP )
 {
  VIDTrapRec.tr_int = SBS_VIDINTNUM;
  VIDTrapRec.tr_asm_srv =
CRU_ONBUSYOLDINT;

  add_trap( &VIDTrapRec );

  fVIDRedir = TRUE;
 }

 SMTrapRec.tr_int = SBS_SLINTNUM;
 SMTrapRec.tr_asm_srv = CRU_ONBUSYOLDINT;

 add_trap( &SMTrapRec );
}

BOOL RemoveVidTrap( void )
{
 BOOL fReturn = FALSE;
 DWORD dwCurrVidTrap;
 DWORD dwOldVidTrap = VIDTrapRec.tr_old_int;

 PCB_BEGINCRITICAL;

 if ( VIDTrapRec.tr_int > 0 )
 {
  SetOldVidVector( dwOldVidTrap );
  if ( ( dwCurrVidTrap = clr_trap( &VIDTrapRec ) )
!=
dwOldVidTrap )
   set_int_vec( SBS_VIDINTNUM, dwCurrVidTrap
);

  VIDTrapRec.tr_int = 0;

  fReturn = TRUE;
  fVIDRedir = FALSE;
 }

 PCB_ENDCRITICAL;

 return ( fReturn );
}

void DisplayError( char *szErrStr )
{
 RemoveVidTrap();
 SetVideoMode( SUI_TEXTVIDMODE | 0x80 );

 printf( szErrStr );
}

WORD TrapService( struct trap_rec *CurrTrapRec )
{
 struct REGW InRegs, OutRegs;
 WORD wFlags;

 GetForegroundRegs( &InRegs );

 switch ( CurrTrapRec->tr_int )
 {
  case SBS_VIDINTNUM:
   switch ( HIBYTE( InRegs.ax ) )
   {
    case SBS_TELETYPE:
     break;

    case SBS_RELOCATEDSCRADD:

     wFlags = intn( &InRegs, &OutRegs,
SBS_VIDINTNUM );
     SetForegroundRegsFlags( &OutRegs,
SFR_SETFLAGS, wFlags
);
     SetVideoMode( SUI_INITIALVIDMODE );

     break;

    default:
     return ( ( WORD )CurrTrapRec );
   }
   break;

  case SBS_SLINTNUM:
   wFlags = intn( &InRegs, &OutRegs,
SBS_INTNUM );
    SetForegroundRegsFlags( &OutRegs,
SFR_SETFLAGS, wFlags );
    break;

  default:
   return ( ( WORD )CurrTrapRec );
 }

 return ( 0 );
}

void GetForegroundRegs( struct REGW *InRegs )
{
 register struct sreg *s;
 register struct REGW *r;
 struct glob_stk far *p;

 r = InRegs;
 s = _int_frame;

 r->es = s->es;
 r->bp = s->bp;
 r->di = s->di;
 r->si = s->si;
 r->cx = s->cx;

 *(word*)&p = s->saved_sp;
 *(((word*)&p)+1) = s->saved_ss;

 r->ds = p->ds;
 r->dx = p->dx;
 r->bx = p->bx;
 r->ax = p->ax;
}

void SetForegroundRegsFlags( struct REGW
*OutRegs, BYTE
fSetFlags, WORD wFlags )
{
 struct sreg *s;
 struct REGW *r;
 struct glob_stk far *p;

 r = OutRegs;
 s = _int_frame;

 s->es = r->es;
 s->bp = r->bp;
 s->di = r->di;
 s->si = r->si;
 s->cx = r->cx;

 p = ( struct glob_stk far * )MK_FP( s->saved_ss,
s->saved_sp );

 p->ds = r->ds;
 p->dx = r->dx;
 p->bx = r->bx;
 p->ax = r->ax;

 if ( fSetFlags == SFR_SETFLAGS )
  p->Flags = wFlags;
}

WORD SetVideoMode( BYTE nRequestedMode )
{
 int AX;

 AX = MAKEWORD( nRequestedMode, 0 );
 int10( AX );

 return ( 0 );
}

#if defined( _MSC_VER )
#pragma warning( default : 4704 )
#endif
Copr. 1995 Zenith Data Systems Corp.

#include "cr.h"
#include "sio.h"
#include "spawn.h"
#include "frame.h"
#include "sm.h"

#define MCB_TARGETSEGMENT 0xC000
#define MCB_TARGETSEGSIZE 0x1000
#define MCB_OWNERDOS 0x0008

MCB far *GetFirstMCB( void );
MCB far *GetNextMCB( MCB far *lpCurrMCB );
MCB far *GetLastMCB( void );
```

```
int PatchMCB( void )
{
  MCB far *lpLastMCB,
  MCB far *lpBeyondLastMCB,
  MCB far *lpTargetMCB.

  PCB_BEGINCRITICAL

  if ( ( lpLastMCB = GetLastMCB() ) == NULL )
    return ( ERR_INTERNAL );

  lpLastMCB->cType = 'M';
  lpLastMCB->wSize -= 1;

  if ( ( lpBeyondLastMCB = GetNextMCB(
lpLastMCB ) ) == NULL )
    return ( ERR_INTERNAL ).

  lpBeyondLastMCB->cType = 'M',
  lpBeyondLastMCB->wSize =
MCB_TARGETSEGMENT - SEG(
lpBeyondLastMCB ) - 1,
  lpBeyondLastMCB->wOwner =
MCB_OWNERDOS;

  lpTargetMCB = ( MCB far * )MK_FP(
MCB_TARGETSEGMENT, 0 );
  lpTargetMCB->cType = 'Z';
  lpTargetMCB->wOwner = 0,
  lpTargetMCB->wSize = ( WORD
)MCB_TARGETSEGSIZE - 1;

  return ( ERR_SUCCESS ).
}

int SetMemStrategy( int iStatCode )
{
  REG_W inRegs, OutRegs.
  WORD wFlags.

  fil_chr( ( NPSTR )&inRegs 0, sizeof( REG_W ) );

  inRegs ax = SMD_GETSETALLOCSTRAT |
SMD_SETALLOCSTRAT,
  inRegs.bx = iStatCode.

  wFlags = intn( &inRegs, &OutRegs, SMD_DOSINT
);

  if ( !( wFlags & GEN_CARRYFLAG ) )
    return ( ERR_SUCCESS ).
  else
    return ( ERR_INTERNAL ),
}

MCB far *GetFirstMCB( void )
{
  REG_W inRegs, OutRegs;
  WORD wFlags.
  unsigned far *lpListOfLists.

  fil_chr( ( NPSTR )&inRegs, 0, sizeof( REG_W ) );

  inRegs ax = SMD_GETLISTOFLISTS

  wFlags = intn( &inRegs, &OutRegs SMD_DOSINT
);

  if ( !( wFlags & GEN_CARRYFLAG ) )
  {
    lpListOfLists = ( unsigned far * ) MK_FP(
OutRegs es
OutRegs bx - 2 );

    return ( ( MCB far * ) MK_FP( *lpListOfLists, 0 ) );
  }
  else
    return ( NULL ).
}

MCB far *GetNextMCB( MCB far *lpCurrMCB )
{
  return ( MK_FP( SEG( lpCurrMCB ) +
lpCurrMCB->wSize + 1, 0 ) ).

}

MCB far *GetLastMCB( void )
{
  MCB far *lpLastMCB = GetFirstMCB(),

  while ( TRUE )
  {
    if ( lpLastMCB == NULL )
      return ( NULL );

    lpLastMCB = GetNextMCB( lpLastMCB );

    if ( lpLastMCB->cType == 'Z' )
      return ( lpLastMCB ).
  }
}


Copr. 1995 Zenith Data Systems Corp.

#include "cr.h"
#include "spawn.h"
#include "sm.h"
#include "lm.h"

BOOL f2MegFlash = FALSE;
static BYTE nCurrVidPalette = 0;
static BYTE nCurrSpeakerState = FON.
static BYTE nCurrRightMouseButton = FOFF;
static BYTE fSuspendInProgress = FOFF,

BYTE aBrightValues[] =
(
0.
3,
6,
9,
18,
21,
25,
27
29,
31,
33.
35,
37,
39,
41,
43,
45,
47,
49.
51,
53,
55.
57,
59,
);

BYTE aContrastValues[] =
(
26,
27,
28.
29.
30
31,
32.
34,
36,
38.
39
40,
41.
42,
43
44.
45
46
47.
48.
49.
50,
51,
52,
);

int SetContrast( BYTE nContrastIdx )
{
  REG_W inRegs, OutRegs;
  WORD wFlags;

  fil_chr( ( NPSTR )&inRegs, 0, sizeof( REG_W ) );

  inRegs ax = SBS_SARATOGAFUNC;
  inRegs.bx = SBS_ADJUSTCONTRAST;
  inRegs.ax |= aContrastValues[ nContrastIdx ];

#if !defined( NOINT15 )
  wFlags = intn( &inRegs, &OutRegs,
SBS_SLINTNUM );
#else
  wFlags = 0;
#endif

  if ( !( wFlags & GEN_CARRYFLAG ) )
    return ( ERR_SUCCESS );
  else
    return ( ERR_INTERNAL );
}

int SetBrightness( BYTE nBrightnessIdx )
{
  REG_W inRegs, OutRegs.
  WORD wFlags;

  fil_chr( ( NPSTR )&inRegs, 0, sizeof( REG_W ) );

  inRegs.ax = SBS_SARATOGAFUNC;
  inRegs.bx = SBS_ADJUSTBRIGHTNESS;
  inRegs.ax |= aBrightValues[ nBrightnessIdx ].

#if !defined( NOINT15 )
  wFlags = intn( &inRegs, &OutRegs,
SBS_SLINTNUM ).
#else
  wFlags = 0;
#endif

  if ( !( wFlags & GEN_CARRYFLAG ) )
    return ( ERR_SUCCESS );
  else
    return ( ERR_INTERNAL ),
}

int SetPowerEnable( BYTE nPowerManIdx )
{
  REG_W inRegs, OutRegs:
  WORD wFlags.

  fil_chr( ( NPSTR )&inRegs, 0, sizeof( REG_W ) ).

  inRegs ax = SBS_SARATOGAFUNC.
  inRegs.bx = SBS_SETPOWERENABLE;
  inRegs ax |= ( WORD )nPowerManIdx;


#if !defined( NOINT15 )
  wFlags = intn( &inRegs, &OutRegs,
SBS_SLINTNUM );
#else
  wFlags = 0;
#endif

  if ( !( wFlags & GEN_CARRYFLAG ) )
    return ( ERR_SUCCESS );
  else
    return ( ERR_INTERNAL );
}

int SetDozeTimeout( BYTE nDozeIdx )
{
  REG_W inRegs, OutRegs.
  WORD wFlags.

  fil_chr( ( NPSTR )&inRegs, 0, sizeof( REG_W ) );

  inRegs.ax = SBS_SARATOGAFUNC;
  inRegs.bx = SBS_SETDOZETIMEOUT.
  inRegs.ax |= ( WORD )nDozeIdx,

#if !defined( NOINT15 )
  wFlags = intn( &inRegs, &OutRegs,
SBS_SLINTNUM );
#else
  wFlags = 0;
#endif

  if ( !( wFlags & GEN_CARRYFLAG ) )
    return ( ERR_SUCCESS ).
  else
    return ( ERR_INTERNAL );
}

int SetSleepTimeout( BYTE nSleepIdx )
{
  REG_W inRegs, OutRegs;
  WORD wFlags;

  fil_chr( ( NPSTR )&inRegs, 0, sizeof( REG_W ) );

  inRegs.ax = SBS_SARATOGAFUNC;
  inRegs.bx = SBS_SETSLEEPTIMEOUT.
  inRegs.ax |= nSleepIdx;

#if !defined( NOINT15 )
  wFlags = intn( &inRegs, &OutRegs,
SBS_SLINTNUM );
#else
  wFlags = 0;
#endif

  if ( !( wFlags & GEN_CARRYFLAG ) )
    return ( ERR_SUCCESS );
  else
    return ( ERR_INTERNAL );
}

int SetSuspendTimeout( BYTE nSuspendIdx )
{
  REG_W inRegs, OutRegs.
  WORD wFlags.

  fil_chr( ( NPSTR )&inRegs 0, sizeof( REG_W ) );

  inRegs.ax = SBS_SARATOGAFUNC.
  inRegs.bx = SBS_SETSUSPENDTIMEOUT,
  inRegs.ax |= nSuspendIdx.

#if !defined( NOINT15 )
  wFlags = intn( &inRegs, &OutRegs.
SBS_SLINTNUM ).
#else
  wFlags = 0;
#endif

  if ( !( wFlags & GEN_CARRYFLAG ) )
    return ( ERR_SUCCESS );
  else
    return ( ERR_INTERNAL );
}

void Set2MegFlash( BOOL fNew2MegFlash )
{
  f2MegFlash = fNew2MegFlash;
}

BOOL IsFlashSupported( void )
{
  REG_W inRegs, OutRegs;

  fil_chr( ( NPSTR )&inRegs, 0, sizeof ( inRegs ) ).

  inRegs ax  = SBS_SARATOGAFLASH;
  inRegs ax |= SBS_FLASHAVAILABLE;

#if !defined( FLASHTEST )
  intn( &inRegs, &OutRegs, SBS_SLINTNUM );
#else
  return ( TRUE );
#endif

  return ( OutRegs ax ==
SBS_FLASHAVAILRETCODE );
}

int FlashSector( LPSTR sFlashImageBuff, int
iCurrFlashFile )
{
  REG_W inRegs, OutRegs.
  int iFlashSector, iReturn;
  WORD wFlags;
  LONG l20BitERAdd.

  if ( iCurrFlashFile == 0 || sFlashImageBuff ==
NULL )
    return ( ERR_INVALIDPARM ).

  if ( EnableFlashWrite( TRUE ) != ERR_SUCCESS
)
    return ( ERR_INTERNAL ).

  fil_chr( &inRegs, 0, sizeof ( inRegs ) );

  if ( f2MegFlash )
    iFlashSector = SBS_2MEGBASESECTOR + (
iCurrFlashFile - 1 );
  else
    iFlashSector = SBS_1MEGBASESECTOR + (
iCurrFlashFile - 1 );

  l20BitERAdd = ( ( LONG )SEG( sFlashImageBuff )
* 16 ) + OFF(
sFlashImageBuff );

  inRegs.ax = MAKEWORD( SBS_FLASHNOTEXT,
HIBYTE(
SBS_SARATOGAFLASH ) );
  inRegs.bx = MAKEWORD( LOBYTE( HIWORD(
l20BitERAdd ) ),
                        LOBYTE( iFlashSector ) );
  inRegs.di = LOWORD( l20BitERAdd );

#if !defined( FLASHTEST )
  wFlags = intn( &inRegs, &OutRegs,
SBS_SLINTNUM );
#else
  wFlags = 0;
#endif

  if ( !( wFlags & GEN_CARRYFLAG ) )
    iReturn = SBS_FLASHSUCCESS;
  else
    iReturn = HIBYTE( OutRegs.ax );

  EnableFlashWrite( FALSE );

  return ( iReturn )
}
```

```
int EnableFlashWrite( BOOL fEnable )
{
 REG_W InRegs, OutRegs;
 WORD wFlags;

 fil_chr( &InRegs, 0, sizeof ( InRegs ) );

 InRegs.ax = MAKEWORD( LOBYTE( ( fEnable ?
SBS_ENABLEWRITE :
SBS_DISABLEWRITE ) ),
                    HIBYTE( SBS_SARATOGAFUNC
) );
 InRegs.bx = SBS_ENABLEDISABLEWRITE;

#if !defined( FLASHTEST )
 wFlags = intn( &InRegs, &OutRegs,
SBS_SLINTNUM );
#else
 wFlags = 0;
#endif

 if ( !( wFlags & GEN_CARRYFLAG ) )
  return ( ERR_SUCCESS );
 else
  return ( ERR_INTERNAL );
}

int RotatePallette( void )
{
 REG_W InRegs, OutRegs;
 int iCurrVideoMode = GetCurrVidMode();
 BYTE nNewVidPallette;

 fil_chr( ( NPSTR )&InRegs, 0, sizeof( REG_W ) );

 if ( iCurrVideoMode == SUI_INITIALVIDMODE )
 {
  if ( nCurrVidPallette != SBS_INVVIDPALLETTE )
   nNewVidPallette = SBS_INVVIDPALLETTE;
  else
   nNewVidPallette = SBS_DEFVIDPALLETTE;
 }
 else
 {
  if ( ( nNewVidPallette = nCurrVidPallette + 1 ) >
     SBS_MAXNUMVIDPAL )
   nNewVidPallette = SBS_DEFVIDPALLETTE;
 }

 InRegs.ax = ( WORD )( SBS_VIDEO |
nNewVidPallette );
 InRegs.bx = ( WORD )( SBS_VIDEOPALLETTE );

#if !defined( NOINT15 )
 intn( &InRegs, &OutRegs, SBS_VIDINTNUM );
#else
#endif

 nCurrVidPallette = nNewVidPallette;

 return ( ERR_SUCCESS );
}

int ToggleSpeaker( void )
{
 REG_W InRegs, OutRegs;
 WORD wFlags;
 BYTE nNewSpeakerState;

 fil_chr( ( NPSTR )&InRegs, 0, sizeof( REG_W ) );

 if ( nCurrSpeakerState == FON )
  nNewSpeakerState = FOFF;
 else
  nNewSpeakerState = FON;

 InRegs.ax = SBS_SARATOGAFUNC |
nNewSpeakerState;
 InRegs.bx = SBS_ENADISSPEAKER;

#if !defined( NOINT15 )
 wFlags = intn( &InRegs, &OutRegs,
SBS_SLINTNUM );
#else
 wFlags = 0;
#endif

 if ( !( wFlags & GEN_CARRYFLAG ) )
 {
  nCurrSpeakerState = nNewSpeakerState;
  return ( ERR_SUCCESS );
 }
 else
  return ( ERR_INTERNAL );
}

BYTE GetRightMouseStatus( void )
{
 return ( nCurrRightMouseButton );
}

int EnableRightMouseButton( BYTE
nNewRightMouseButton )
{
 REG_W InRegs, OutRegs;
 WORD wFlags;

 fil_chr( ( NPSTR )&InRegs, 0, sizeof( REG_W ) );

 InRegs.ax = SBS_SARATOGAFUNC |
nNewRightMouseButton;
 InRegs.bx = SBS_ENADISRIGHTMOUSE;

#if !defined( NOINT15 )
 wFlags = intn( &InRegs, &OutRegs,
SBS_SLINTNUM );
#else
 wFlags = 0;
#endif

 if ( !( wFlags & GEN_CARRYFLAG ) )
 {
  nCurrRightMouseButton =
nNewRightMouseButton;
  return ( ERR_SUCCESS );
 }
 else
  return ( ERR_INTERNAL );
}

int SetTowerIcon( BYTE nTowerStatus, BYTE
nWavesStatus )
{
 REG_W InRegs, OutRegs;
 WORD wFlags;

 fil_chr( ( NPSTR )&InRegs, 0, sizeof( REG_W ) );

 InRegs.ax = SBS_SARATOGAFUNC |
nTowerStatus;
 InRegs.bx = SBS_TOWERWAVESICON;
 InRegs.cx = ( WORD )nWavesStatus;

#if !defined( NOINT15 )
 wFlags = intn( &InRegs, &OutRegs,
SBS_SLINTNUM );
#else
 wFlags = 0;
#endif

 if ( !( wFlags & GEN_CARRYFLAG ) )
  return ( ERR_SUCCESS );
 else
  return ( ERR_INTERNAL );
}

int DoSleep( void )
{
 REG_W InRegs, OutRegs;
 WORD wFlags;

 fil_chr( ( NPSTR )&InRegs, 0, sizeof( REG_W ) );

 InRegs.ax = SBS_SARATOGAFUNC;
 InRegs.bx = SBS_GOTOSLEEP;

#if !defined( NOINT15 )
 wFlags = intn( &InRegs, &OutRegs,
SBS_SLINTNUM );
#else
 wFlags = 0;
#endif

 if ( !( wFlags & GEN_CARRYFLAG ) )
  return ( ERR_SUCCESS );
 else
  return ( ERR_INTERNAL );
}

int DoSuspend( BOOL fSaveEEROMData )
{
 REG_W InRegs, OutRegs;

 fil_chr( ( NPSTR )&InRegs, 0, sizeof( REG_W ) );


 if ( fSaveEEROMData )
  SetEEUIData();

 InRegs.ax = SBS_SARATOGAFUNC;
 InRegs.bx = SBS_GOTOSUSPEND;

#if !defined( NOINT15 )
 intn( &InRegs, &OutRegs, SBS_SLINTNUM );
#else
#endif

 return ( ERR_INTERNAL );
}

int SetSuspendFlagPointer( void )
{
 REG_W InRegs, OutRegs;
 WORD wFlags;

 fil_chr( ( NPSTR )&InRegs, 0, sizeof( REG_W ) );

 InRegs.ax = SBS_SARATOGAFUNC;
 InRegs.bx = SBS_SUSPENDFLAGPTR;
 InRegs.es = SEG( &fSuspendInProgress );
 InRegs.dx = OFF( &fSuspendInProgress );

#if !defined( NOINT15 )
 wFlags = intn( &InRegs, &OutRegs,
SBS_SLINTNUM );
#else
 wFlags = 0;
#endif

 if ( !( wFlags & GEN_CARRYFLAG ) )
 {
  SetSuspendFlag( FOFF );
  return ( ERR_SUCCESS );
 }
 else
  return ( ERR_INTERNAL );
}

void SetSuspendFlag( BOOL fStatus )
{
 PCB_BEGINCRITICAL;
 fSuspendInProgress = LOBYTE( fStatus );
 PCB_ENDCRITICAL;
}

BOOL GetSuspendFlag( void )
{
 BOOL fReturn;

 PCB_BEGINCRITICAL;
 fReturn = fSuspendInProgress;
 PCB_ENDCRITICAL;

 return ( fReturn );
}

int GetSystemResumeBit( void )
{
 REG_W InRegs, OutRegs;
 WORD wFlags;

 fil_chr( ( NPSTR )&InRegs, 0, sizeof( REG_W ) );

 InRegs.ax = SBS_SARATOGAFUNC;
 InRegs.bx = SBS_GETSYSRESUMEBIT;

#if !defined( NOINT15 )
 wFlags = intn( &InRegs, &OutRegs,
SBS_SLINTNUM );
#else
 wFlags = 0;
#endif

 if ( !( wFlags & GEN_CARRYFLAG ) )
  return ( OutRegs.ax & 0x00FF );
 else
  return ( ERR_INTERNAL );
}

int ClearSystemResumeBit( void )
{
 REG_W InRegs, OutRegs;
 WORD wFlags;

 fil_chr( ( NPSTR )&InRegs, 0, sizeof( REG_W ) );

 InRegs.ax = SBS_SARATOGAFUNC;
 InRegs.bx = SBS_CLEARSYSRESUMEBIT;

#if !defined( NOINT15 )
 wFlags = intn( &InRegs, &OutRegs,
SBS_SLINTNUM );
#else
 wFlags = 0;
#endif

 if ( !( wFlags & GEN_CARRYFLAG ) )
  return ( ERR_SUCCESS );
 else
  return ( ERR_INTERNAL );
}

int SetWaitingIcon( BYTE nWaitingIconStatus, BYTE
fBusyCursor )
{
 REG_W InRegs, OutRegs;
 WORD wFlags;

 fil_chr( ( NPSTR )&InRegs, 0, sizeof( REG_W ) );

 InRegs.ax = SBS_SARATOGAFUNC;
 InRegs.bx = SBS_WAITINGICON;
 InRegs.ax |= nWaitingIconStatus;

#if !defined( NOINT15 )
 wFlags = intn( &InRegs, &OutRegs,
SBS_SLINTNUM );
#else
 wFlags = 0;
#endif

 if ( nWaitingIconStatus ==
SBS_WAITINGICONOFF )
 {
  if ( fBusyCursor )
   EnableBusyCursor( SUI_BUSYCURSOROFF );

  GetHotIcon();
 }
 else
 {
  if ( fBusyCursor )
   EnableBusyCursor( SUI_BUSYCURSORON );

 }

 if ( !( wFlags & GEN_CARRYFLAG ) )
  return ( ERR_SUCCESS );
 else
  return ( ERR_INTERNAL );
}

int EnableKbdAfterBoot( void )
{
 REG_W InRegs, OutRegs;
 WORD wFlags;

 fil_chr( ( NPSTR )&InRegs, 0, sizeof( REG_W ) );

 InRegs.ax = SBS_SARATOGAFUNC;
 InRegs.bx = SBS_ENABLEKBD;

#if !defined( NOINT15 )
 wFlags = intn( &InRegs, &OutRegs,
SBS_SLINTNUM );
#else
 wFlags = 0;
#endif

 if ( !( wFlags & GEN_CARRYFLAG ) )
  return ( ERR_SUCCESS );
 else
  return ( ERR_INTERNAL );
}

LONG GetBatteryInfo( void )
{
 REG_W InRegs, OutRegs;
 WORD wFlags;

 fil_chr( ( NPSTR )&InRegs, 0, sizeof( REG_W ) );

 InRegs.ax = SBS_SARATOGAFUNC;
 InRegs.bx = SBS_GETBATTERYINFO;

#if !defined( NOINT15 )
 wFlags = intn( &InRegs, &OutRegs,
SBS_SLINTNUM );
#else
 wFlags = 0;
#endif

 if ( !( wFlags & GEN_CARRYFLAG ) )
#if !defined( NOINT15 )
   return ( MAKELONG( OutRegs.ax, OutRegs.bx )
);
#else
   return ( SBS_NOINT15BATTERYINFO );
#endif
  else
   return ( SBS_GETBATTERYINFOERROR );

}

WORD GetSizeOfExtendedMem( void )
{
 BYTE nExtMemHigh, nExtMemLow;

 PCB_BEGINCRITICAL
```

```
  outb( SBS_CMOSPORT,
SBS_CMOSREADHIGHBYTE );
  nExtMemHigh = inputb(
SBS_CMOSEXTENDEDMEM );
  outb( SBS_CMOSPORT,
SBS_CMOSREADLOWBYTE )
  nExtMemLow = inputb(
SBS_CMOSEXTENDEDMEM );

  PCB_ENDCRITICAL

  return ( MAKEWORD( nExtMemLow,
nExtMemHigh ) );
}

int GetBIOSVersion( void )
{
  REG_W inRegs, OutRegs;
  WORD wFlags;

  fl_chr( ( NPSTR )&inRegs, 0, sizeof( REG_W ) );

  inRegs.ax = SBS_SARATOGAFUNC;
  inRegs.bx = SBS_GETBIOSVERSION;

#if !defined( NOINT15 )
  wFlags = intx( &inRegs, &OutRegs
SBS_SLINTNUM );
#else
  wFlags = 0;
#endif

  if ( !( wFlags & GEN_CARRYFLAG ) )
#if !defined( NOINT15 )
    return ( OutRegs.ax );
#else
    return ( 0 );
#endif
  else
    return ( 0 );
}
Copr 1995 Zenith Data Systems Corp



#include "cr.h"
#include "sio.h"
#include "spawn.h"
#include "sm.h"

#define SMD_MAXGEARIMAGES 8

#if defined( _MSC_VER )
#pragma warning( disable : 4704 )
#endif

static char aGearImages[] = { "|-\\|/-\\" };

static BYTE nClockReenterCount = 0;
static WORD wLastKey;
static BOOL fDispatchActive = FALSE;
static BOOL fRecsInstalled = FALSE;
static int  aEventStack[ SMD_EVENTSTACKLIMIT ];
static int  iEventStackPtr =
SMD_EVENTSTACKLIMIT - 1;
static int  iTempThreadIdx = -1;



EVENT EventQueue[ SMD_MAXTHREADS ];

int AddThread( int iIdx, NEARPROC fpThread,
APIFUNC
aAPIFuncTable[],
          THREADTYPEID ThreadTypeId, BOOL
fReentrant, LONG
lTimeLimit,
          int iRetryLimit )
{
  if ( iIdx >= SMD_MAXTHREADS )
    return ( ERR_INTERNAL );

  PCB_BEGINCRITICAL
  EventQueue[ iIdx ].fpThread = fpThread;
  EventQueue[ iIdx ].aAPIFuncTable =
aAPIFuncTable;
  EventQueue[ iIdx ].ThreadTypeId = ThreadTypeId;
  EventQueue[ iIdx ].lTimeLimit = lTimeLimit;
  EventQueue[ iIdx ].lTimeCurrent = 0L;
  EventQueue[ iIdx ].iRetryLimit = iRetryLimit;
  EventQueue[ iIdx ].iInitRetryLimit = iRetryLimit;
  EventQueue[ iIdx ].nReenterCount = 0;
  EventQueue[ iIdx ].bReentrant = fReentrant;
  PCB_ENDCRITICAL

  return ( ERR_SUCCESS );
}

BYTE IsThreadActive( int iIdx )
{
  BYTE fThreadStatus;
  NEARPROC fpThread;

  if ( iIdx >= SMD_MAXTHREADS )
    return ( FALSE );

  fpThread = EventQueue[ iIdx ].fpThread;

  PCB_BEGINCRITICAL

  fThreadStatus = ( fpThread != NULL && fpThread
!= ( NEARPROC
)SMD_THREADACTIVE );

  PCB_ENDCRITICAL

  return ( fThreadStatus );
}

void ResetTime( int iIdx )
{
  if ( iIdx >= SMD_MAXTHREADS )
    return;

  EventQueue[ iIdx ].lTimeCurrent = 0;
}

int SetRetryLimit( int iIdx, int iNewRetryLimit )
{
  if ( iIdx >= SMD_MAXTHREADS )
    return ( ERR_INTERNAL );

  PCB_BEGINCRITICAL
  EventQueue[ iIdx ].iRetryLimit = iNewRetryLimit;
  EventQueue[ iIdx ].lTimeCurrent = 0;
  PCB_ENDCRITICAL

  return ( ERR_SUCCESS );
}

BYTE GetRetryLimit( int iIdx )
{
  int iReturn;

  if ( iIdx >= SMD_MAXTHREADS )
    return ( 0 );

  if ( ( iReturn = EventQueue[ iIdx ].iRetryLimit ) < 0
)
    iReturn = 0;

  return ( iReturn );
}

BYTE GetInitRetryLimit( int iIdx )
{
  int iReturn;

  if ( iIdx >= SMD_MAXTHREADS )
    return ( 0 );

  if ( ( iReturn = EventQueue[ iIdx ].iInitRetryLimit ) <
0 )
    iReturn = 0;

  return ( iReturn );
}

int ResetRetryLimit( int iIdx )
{
  if ( iIdx >= SMD_MAXTHREADS )
    return ( ERR_INTERNAL );

  PCB_BEGINCRITICAL
  EventQueue[ iIdx ].iRetryLimit = EventQueue[ iIdx
].iInitRetryLimit;
  EventQueue[ iIdx ].lTimeCurrent = 0;
  PCB_ENDCRITICAL

  return ( ERR_SUCCESS );
}

int SetTimeLimit( int iIdx, LONG lNewTimeLimit )
{
  if ( iIdx >= SMD_MAXTHREADS )
    return ( ERR_INTERNAL );


  PCB_BEGINCRITICAL
  EventQueue[ iIdx ].lTimeLimit = lNewTimeLimit;
  PCB_ENDCRITICAL

  return ( ERR_SUCCESS );
}

THREADTYPEID GetThreadType( int iIdx )
{
  if ( iIdx >= SMD_MAXTHREADS )
    return ( ERR_INTERNAL );


  return ( EventQueue[ iIdx ].ThreadTypeId );
}

NEARPROC GetThreadAddress( int iIdx )
{
  if ( iIdx >= SMD_MAXTHREADS )
    return ( ( NEARPROC )NULL );


  return ( EventQueue[ iIdx ].fpThread );
}

int DelThread( int iIdx )
{
  int iReturn = 0;

  if ( iIdx >= SMD_MAXTHREADS || iIdx < 0 )
  {
    TRACE( "ERROR: invalid thread ID passed to
DelThread()\r" );
    return ( ERR_INTERNAL );
  }

  PCB_BEGINCRITICAL
  EventQueue[ iIdx ].fpThread = NULL;
  PCB_ENDCRITICAL

#if !defined( PROD )
  sprintf( szTempStr, "NOTICE: Temp thread
deallocated - %d\r",
iIdx );
  TRACE( szTempStr );
#endif

  return ( iReturn );
}

int InitDispatcher( void )
{
  iTempThreadIdx = GetTempEventNum();

  if ( iTempThreadIdx < 0 )
    return ( ERR_INTERNAL );

  fl_chr( ( NPSTR )EventQueue, 0, sizeof(
EventQueue ) );

  AddThread( iTempThreadIdx, InstallRecs, NULL,
SMD_ONETIME,
FALSE, INI_POLLFREQ,
        0 );

  InitVIDTrapRec();
  add_trap( GetVIDTrapRec() );

  InitPNDTrapRec();
  add_trap( GetPNDTrapRec() );

  InitSCSTrapRec();
  add_trap( GetSCSTrapRec() );

  InitPRXTrapRec();
  add_trap( GetPRXTrapRec() );

  AddThread( SMI_PNDEVENTNUM, NULL,
GetPNDFuncTable(),
SMD_ONDEMAND, FALSE,
        SMI_PNDPOLLFREQ, 0 );
  AddThread( SMI_SUIEVENTNUM, NULL,
GetSUIFuncTable(),
SMD_ONDEMAND, FALSE,
        SMI_SUIPOLLFREQ, 0 );
  AddThread( SMI_SCSEVENTNUM, NULL,
GetSCSFuncTable(),
SMD_ONDEMAND, TRUE,
        SMI_SCSPOLLFREQ, 0 );
  AddThread( SMI_PRXEVENTNUM, NULL,
GetPRXFuncTable(),
SMD_ONDEMAND, FALSE,
        SMI_PRXPOLLFREQ, 0 );
}

int ShutDownDispatcher( void )
{
  RestoreOldSUIIntVec();
  return ( 0 );
}

void InstallRecs( void )
{
  DelThread( iTempThreadIdx );

  AddThread( PND_EVENTNUM, CheckPenDriver,
NULL, SMD_POLLED,
FALSE,
        PND_POLLFREQ, 0 );
  AddThread( PRX_EVENTNUM, CheckSystem,
NULL, SMD_POLLED,
        FALSE, PRX_POLLFREQ, 0 );

  InitSUICallRec();
  InitSCSCallRec();

  SetSuspendFlagPointer();
  add_trap( GetSUIMouseTrapRec() );

  fRecsInstalled = TRUE;
}


void Dispatch( THREADTYPEID ActiveThreadId, int
iEventThreadIdx )
{
  int iThreadIdx;
  BOOL fNextEntry = FALSE;
  EVENT *ev;
  NEARPROC fpOriginalThread = NULL;

  struct REGW Regs;

  if ( iEventThreadIdx >= SMD_MAXTHREADS )
    goto Exit;

  SetDispatchActive( TRUE );

  ev = &EventQueue[ iEventThreadIdx ];

  if ( ActiveThreadId == SMD_ONDEMAND )
  {
    if ( ev->bReentrant || ev->nReenterCount == 0 )
    {
      PCB_BEGINCRITICAL
      ++ev->nReenterCount;
      PCB_ENDCRITICAL

      if ( ev->aAPIFuncTable != NULL )
        CallAPIFunction( ev->aAPIFuncTable );
      else
        TRACE( "ERROR: Function table is NULL in
dispatcher" );

      PCB_BEGINCRITICAL
      --ev->nReenterCount;
      PCB_ENDCRITICAL
    }
    else
    {
      GetForegroundRegs( &Regs );
      Regs.ax = ( WORD )ERR_INTERNAL;
      SetForegroundRegs( &Regs );
    }

    goto Exit;
  }


  for ( iThreadIdx = 0; iThreadIdx <
SMD_MAXTHREADS; ++iThreadIdx
)
  {
    ev = &EventQueue[ iThreadIdx ];

    if ( ev->fpThread != NULL )
    {
      if ( ev->ThreadTypeId == ActiveThreadId ||
          ActiveThreadId ==
SMD_ALLTHREADTYPES )
      {

        if ( ev->bReentrant || ev->nReenterCount == 0
)
        {
          PCB_BEGINCRITICAL
          ++ev->nReenterCount;
          PCB_ENDCRITICAL
        }
        else
        {
#if !defined( PROD )
          sprintf( szTempStr, "NOTICE: Thread #%d
reentered, but
returned\r", iThreadIdx );
          TRACE( szTempStr );
#endif
          goto Exit;
        }

        switch ( ev->ThreadTypeId )
        {
          case SMD_ONETIME:
            if ( ev->lTimeCurrent >= 0 )
            {
              if ( ++ev->lTimeCurrent >= ev->lTimeLimit
    )
```

```
      {
        ev->lTimeCurrent = -1;
        TRACE( "NOTICE: ONETIME thread
expired\r" );
      }
      else
        fNextEntry = TRUE;
    }
    else
      fNextEntry = TRUE;
    break;

  case SMD_MANYTIMES:
    if ( ev->lTimeCurrent >= 0 )
    {
      if ( ++ev->lTimeCurrent >= ev->lTimeLimit
)
      {
        if ( --ev->iRetryLimit <= 0 )
        {
          ev->lTimeCurrent = -1;
          TRACE( "NOTICE: MANYTIMES
thread expired\r" );
        }
        else
          ev->lTimeCurrent = 0;
      }
      else
        fNextEntry = TRUE;
    }
    else
      fNextEntry = TRUE;
    break;

  case SMD_POLLED:
    if ( ++ev->lTimeCurrent >= ev->lTimeLimit )
      ev->lTimeCurrent = 0;
    else
      fNextEntry = TRUE;
    break;

  default:
    fNextEntry = TRUE;
    break;
  }
}
else
  fNextEntry = TRUE;

if ( fNextEntry )
{
  fNextEntry = FALSE;
  PCB_BEGINCRITICAL
  --ev->nReenterCount
  PCB_ENDCRITICAL
}
else
{
  if ( ev->fpThread != NULL && ev->fpThread !=
( NEARPROC
)SMD_THREADACTIVE )
  {
    fpOriginalThread = ev->fpThread;
    ( *ev->fpThread )();

    PCB_BEGINCRITICAL
    if ( fpOriginalThread == ev->fpThread &&
        ( WORD )( ev->nReenterCount - 1 ) <
        ( WORD )ev->nReenterCount )
      --ev->nReenterCount;
    PCB_ENDCRITICAL
  }
 }
}

}

Exit:
  SetDispatchActive( FALSE );
}

WORD TrapService( struct trap_rec *CurrTrapRec )
{
  REG_W Regs;
  MREG MinArgs;
  WORD wReturn = 0;

  switch ( CurrTrapRec->tr_int )
  {
    case SMI_SUIINTNUM:
      Dispatch( SMD_ONDEMAND,
SMI_SUIEVENTNUM );
      break;

    case SMI_SCSINTNUM:
      Dispatch( SMD_ONDEMAND,
SMI_SCSEVENTNUM );
      break;

    case SMI_PNDINTNUM:
      Dispatch( SMD_ONDEMAND,
SMI_PNDEVENTNUM );
      break;

    case SMI_PRXINTNUM:
      Dispatch( SMD_ONDEMAND,
SMI_PRXEVENTNUM );
      break;

    case SSS_VIDINTNUM:
      VIDTrapService();
      return ( ( WORD )CurrTrapRec );
      break;

    case PND_INTNUM:
      GetForegroundRegs( &Regs );

      if ( Regs.ax == PND_SETEVENTHANDLER &&
!GetPNDActiveStatus() )
      {
        MinArgs.ax = 0x000C;
        MinArgs.es = Regs.es;
        MinArgs.dx = Regs.dx;
        MinArgs.cx = Regs.cx;

        mouse( &MinArgs, &MEventOutArgs );
      }
      else
        return ( ( WORD )CurrTrapRec );

    default:
      return ( ( WORD )CurrTrapRec );
  }
  return ( wReturn );
}

void FCallService( WORD wAX )
{
  switch ( PopEventNum() )
  {
    case SMI_SUIEVENTNUM:
      Dispatch( SMD_ONDEMAND,
SMI_SUIEVENTNUM );
      break;

    case SMI_SCSEVENTNUM:
      Dispatch( SMD_ONDEMAND,
SMI_SCSEVENTNUM );
      break;



  }
}

void ClockTick( void )
{


  add_tsc_event( SMD_DISPATFREQ );



  Dispatch( SMD_ALLTHREADTYPES, 0 );

}

void DecClockReCount( void )
{
  PCB_BEGINCRITICAL;
  --nClockReenterCount;
  PCB_ENDCRITICAL;
}

#if !defined( NDEBUG )
void KbdService( WORD wHotKey )
{

  wLastKey = wHotKey;

}

WORD GetLastKey( void )
{
  WORD wTempLastKey = wLastKey;
  wLastKey = 0;

  return ( wTempLastKey );
}
#endif

void SetDispatchActive( BOOL bNewDispatchActive
)
{
  PCB_BEGINCRITICAL
  fDispatchActive = bNewDispatchActive;
  PCB_ENDCRITICAL
}

BOOL GetDispatchActive( void )
{
  BOOL fCurrentDisActive;

  PCB_BEGINCRITICAL
  fCurrentDisActive = fDispatchActive;
  PCB_ENDCRITICAL

  return ( fCurrentDisActive );
}

void CrankGear( BYTE *bGearIdx, char *szLabel )
{
  BYTE bNewGearIdx = *bGearIdx;
  if ( ++bNewGearIdx >= SMD_MAXGEARIMAGES )
    bNewGearIdx = 0;

  ++crs_x;

  *bGearIdx = bNewGearIdx;
}

void PushEventNum( int iEventNum )
{
  aEventStack[ iEventStackPtr ] = iEventNum;
  iEventStackPtr = iEventStackPtr > 0 ?
iEventStackPtr - 1 :
iEventStackPtr;
}

int PopEventNum( void )
{
  int iReturn;

  PCB_BEGINCRITICAL
  iEventStackPtr = iEventStackPtr <
SMD_EVENTSTACKLIMIT - 1 ?
iEventStackPtr + 1 : iEventStackPtr;
  iReturn = aEventStack[ iEventStackPtr ];
  PCB_ENDCRITICAL

  return ( iReturn );
}

int GetTempEventNum( void )
{
  register int iThreadIdx;
  int iReturn = ERR_INTERNAL;

  PCB_BEGINCRITICAL

  for ( iThreadIdx = SMD_REUSETHREADS - 1;
iThreadIdx <
SMD_MAXTHREADS;
      ++iThreadIdx )
  {
    if ( EventQueue[ iThreadIdx ].fpThread == NULL )

    {
#if !defined( PROD )
      sprintf( szTempStr, "NOTICE: Temp thread
allocated - %d\r",
iThreadIdx );
      TRACE( szTempStr );
#endif
      iReturn = iThreadIdx;
      EventQueue[ iThreadIdx ].fpThread = (
NEARPROC
)SMD_THREADACTIVE;
      break;
    }
  }

  PCB_ENDCRITICAL

#if !defined( PROD )
  if ( iReturn == ERR_INTERNAL )
    TRACE( "ERROR: Out of temporary threads" );
#endif

  return ( iReturn );
}

#if defined( _MSC_VER )
#pragma warning( default : 4704 )
#endif
Copr. 1995 Zenith Data Systems Corp.

#include "cr.h"
#include "sio.h"
#include "spawn.h"
#include "k2.h"
#include "frame.h"
#include "sm.h"

#if defined( _MSC_VER )
#pragma warning( disable : 4704 )
#endif

THREADTYPEID ActiveThreadType =
SMD_NOTHREAD;

char        szSMSignature[] =
SIG_SMSIGNATURE;
char        szSMVersionName[] =
STR_SMVERSIONNAME;
char        szSMVersionNum[] =
STR_SMVERSIONNUM;
char        szSMModuleName[] =
STR_SMMODULENAME;
char        szSUIExecname[] = SUI_EXECNAME;
char        szSCSAbortConn[] =
SMI_SCSABORTCONN;
char        szTempStr[ GEN_MAXLENTEMPSTR ];
char        szTempMsgStr[
GEN_MAXLENTEMPSTR * 2 ];
char        szNullStr[] = "\0";
SCANCODE    aUDHotIcon1Def[] =
SUI_UDHOTICON1DEF;
char        szPassword[ SUI_MAXLENPASSWORD
+ 1 ];
char        nRLNInitNum = 0;
char        fEEPROMInited = FALSE;
WORD        wScreenCode = SUI_NOSCREEN;
WORD        wOldScreenCode =
SUI_NOSCREEN;
MREG        MEventOutArgs;
FARCALLENTRY lpfnFarCallEntry = NULL;
SUICB       lpfnSUICallBack = NULL;
UICONFIGDATA UIConfigData;
LISTBOXENTRY ListBoxEntry;
MSGBOXBUFF  MsgBoxBuff[
SMI_SUIMAXMSGBOXLINES ];
BUFFHEADER  BuffHead;

BOOL fConnectRequested = FALSE;

char GetEEPROMInited( void )
{
  return ( fEEPROMInited );
}

void InitUIConfigData( void )
{
  if ( GetEEUIData( &UIConfigData ) ==
ERR_SUCCESS )
  {
    if ( UIConfigData.nMajorVersionNum ==
GEN_SMMAJORVERSIONNUM
&&
        UIConfigData.nMinorVersionNum ==
GEN_SMMINORVERSIONNUM )
    {
      if ( ( ( int )UIConfigData.wXLowerPenCalib -
          ( int )UIConfigData.wXUpperPenCalib ) >=
200 )
      {
        if ( UIConfigData.wXUpperPenCalib ==
PND_XUPPERPENCALIB
&&
            UIConfigData.wYUpperPenCalib ==
PND_YUPPERPENCALIB
&&
            UIConfigData.wXLowerPenCalib ==
PND_XLOWERPENCALIB
&&
            UIConfigData.wYLowerPenCalib ==
PND_YLOWERPENCALIB )
          InitEEPROM();
      }
      else
        InitEEPROM();


    }
    else
      InitEEPROM();
  }
  else
    InitEEPROM();

  fill_chr( &MEventOutArgs, 0, sizeof ( MREG ) );
  lpfnFarCallEntry = MK_FP( _ccode, _fcall_entry );
}

void InitEEPROM( void )
{
  TRACE( "ERROR: invalid values or unable to read
from EEPROM\r"
  );

  fill_chr( &UIConfigData, 0, sizeof ( UICONFIGDATA
) );

  UIConfigData.wBuffLen        = sizeof (
UICONFIGDATA );
```

```
 UIConfigData.nMajorVersionNum =
GEN_SMMAJORVERSIONNUM.
 UIConfigData.nMinorVersionNum =
GEN_SMMINORVERSIONNUM.
 UIConfigData.bConnectType   =
SMI_NETWORKCONNECT;
 UIConfigData.nDomainID      = PRX_DOMAIN0;

 UIConfigData.nContrastIdx    =
SHC_DEFCONTRASTIDX;
 UIConfigData.nBrightnessIdx  =
SHC_DEFBRIGHTNESSIDX;

 UIConfigData.nSleepTimeIdx   =
SBS_SLEEPDISABLED;
 UIConfigData.bAutoShutoff    = FALSE.

 UIConfigData.wUILanguage     =
SMI_UIUSENGLISH.
 UIConfigData.nFrameType      =
PRX_FRAME8023,

 UIConfigData.nLastOSKScreen     =
SUI_BIGALPHA,
 UIConfigData.nLastOSKDigScreen  =
SUI_BIGALPHA,
 UIConfigData.nLastSetupDigScreen =
SUI_HOSTSELECTION.

 UIConfigData.xPosLastOSKScreen  =
SUI_XULBIGALPHA
 UIConfigData.yPosLastOSKScreen  =
SUI_YULBIGALPHA;

 mem_cpy( aUDHotIcon1Def,
UIConfigData.aUDHotIcon1.
SUI_MAXLENDEFHOTICON )

 TRACE( "NOTICE: Using pen calibration values
set to zero.\r" ).

 UIConfigData wXUpperPenCalib =
PND_XUPPERPENCALIB.
 UIConfigData wYUpperPenCalib =
PND_YUPPERPENCALIB;
 UIConfigData wXLowerPenCalib =
PND_XLOWERPENCALIB;
 UIConfigData.wYLowerPenCalib =
PND_YLOWERPENCALIB.

 fEEPROMInited = TRUE,

 SetEEUIData()

 SetContrast( UIConfigData.nContrastIdx );
 SetBrightness( UIConfigData.nBrightnessIdx );
}

void InitSUI( void )
{
 SetDomainWarning( FALSE );
 SetSecurityWarning( FALSE ).
}

void InitSaratoga( BYTE nInitType )
{
 if ( nInitType == SBS_DRIVERSLOADING )
 {
  TRACE( "NOTICE: Power management disabled
for driver load
sequence.\r" );
  SetPowerEnable( SBS_POWERMANDISABLED
).
 }
 else if ( nInitType == SBS_SUILOADING )
 {
  if ( SetSleepTimeout(
UIConfigData.nSleepTimeIdx ) ==
ERR_SUCCESS )
  {
   if ( UIConfigData.nSleepTimeIdx ==
SBS_SLEEPDISABLED )
   {
    TRACE( "NOTICE: Power management now
disabled, DOZE
disabled\r" );
    SetPowerEnable(
SBS_POWERMANDISABLED );
    SetDozeTimeout( SBS_DOZEDISABLED );
   }
   else
   {
    TRACE( "NOTICE: Power management now
enabled, DOZE
disabled\r" );
    SetPowerEnable(
SBS_POWERMANENABLED ).
    SetDozeTimeout( SBS_DOZEDISABLED );
   }

  if ( UIConfigData.bAutoShutoff )
  {
   TRACE( "NOTICE: Suspend after 60 minutes
enabled\r" );
   SetSuspendTimeout( SBS_SUSPENDIN60MIN
);
  }
  else
  {
   TRACE( "NOTICE: Suspend disabled\r" ).
   SetSuspendTimeout(
SBS_SUSPENDDISABLED );
  }
 }
 }

}

int GetEEMouseConfig( void )
{
 REG_W InRegs, OutRegs;
 PENCALIB pc,
 WORD wFlags;

 fi_chr( &InRegs. 0, sizeof ( REG_W ) );
 fi_chr( &pc, 0, sizeof ( PENCALIB ) ).

 InRegs.ax = SBS_SARATOGAFUNC,
 InRegs.bx = SBS_EEPROMTOMEMORY;
 InRegs.cx = SBS_LENMOUSECFGDATA
 InRegs.dx = PND_OFFCALIB;

 InRegs.es = SEG( &pc );
 InRegs.di = OFF( &pc );

#if !defined( NOINT15 )
 wFlags = intn( &InRegs, &OutRegs,
SBS_SLINTNUM );
#else
 wFlags = 0,
#endif

 if ( !( wFlags & GEN_CARRYFLAG ) )
 {
  UIConfigData wXUpperPenCalib =
pc.wXUpperPenCalib.
  UIConfigData.wYUpperPenCalib =
pc.wYUpperPenCalib;
  UIConfigData.wXLowerPenCalib =
pc.wXLowerPenCalib;
  UIConfigData.wYLowerPenCalib =
pc.wYLowerPenCalib;

  return ( ERR_SUCCESS ).
 }
 else
  return ( ERR_INTERNAL );
}

int SetEEMouseConfig( PENCALIB *pc )
{
 UIConfigData.wXUpperPenCalib =
pc->wXUpperPenCalib.
 UIConfigData.wYUpperPenCalib =
pc->wYUpperPenCalib.
 UIConfigData.wXLowerPenCalib =
pc->wXLowerPenCalib.
 UIConfigData wYLowerPenCalib =
pc->wYLowerPenCalib.

 return ( SetEEUIData() );
}

int SetEEUIData( void )
{
 REG_W InRegs, OutRegs;
 WORD wFlags;
 UICONFIGDATA OldUIConfigData;
 int iReturn = ERR_SUCCESS,

 fi_chr( &OldUIConfigData, 0, sizeof (
UICONFIGDATA ) ).

 if ( GetEEUIData( &OldUIConfigData ) ==
ERR_SUCCESS )
 {
  if ( mem_cmp( ( NPSTR )&OldUIConfigData, (
NPSTR
)&UIConfigData,
    sizeof( UICONFIGDATA ) ) != sizeof(
UICONFIGDATA ) )

  {
   fi_chr( &InRegs. 0, sizeof ( REG_W ) );

   InRegs.ax = SBS_SARATOGAFUNC;
   InRegs.bx = SBS_MEMORYTOEEPROM;
   InRegs.cx = sizeof ( UICONFIGDATA );
   InRegs.dx = SBS_OFFUICFGDATA;
   InRegs.es = SEG( &UIConfigData );
   InRegs.di = OFF( &UIConfigData );

#if !defined( NOINT15 )
   PCB_BEGINCRITICAL
   wFlags = intn( &InRegs, &OutRegs,
SBS_SLINTNUM );
   PCB_ENDCRITICAL
#else
   wFlags = 0,
#endif
   if ( !( wFlags & GEN_CARRYFLAG ) )
    iReturn = ERR_SUCCESS;
   else
    iReturn = ERR_INTERNAL;
  }
 }
 else
  iReturn = ERR_INTERNAL;

#if !defined( PROD )
 if ( iReturn == ERR_INTERNAL )
  TRACE( "ERROR: SetEEUIData() error returned
from extended
BIOS call to save EEPROM data\r" ).
#endif

 return ( iReturn );
}

int GetEEUIData( UICONFIGDATA
*CurrUIConfigData )
{
 REG_W InRegs, OutRegs.
 WORD wFlags.
 UICONFIGDATA TempUIConfigData;

 fi_chr( &InRegs, 0, sizeof ( REG_W ) );

 InRegs.ax = SBS_SARATOGAFUNC;
 InRegs.bx = SBS_EEPROMTOMEMORY;
 InRegs.cx = sizeof ( UICONFIGDATA );
 InRegs.dx = SBS_OFFUICFGDATA;
 InRegs.es = SEG( &TempUIConfigData );
 InRegs.di = OFF( &TempUIConfigData );

#if !defined( NOINT15 )
 PCB_BEGINCRITICAL
 wFlags = intn( &InRegs, &OutRegs,
SBS_SLINTNUM ).
 PCB_ENDCRITICAL
#else
 wFlags = 0;
#endif

 if ( !( wFlags & GEN_CARRYFLAG ) )
 {
  *CurrUIConfigData = TempUIConfigData.

  return ( ERR_SUCCESS );
 }
 else
  return ( ERR_INTERNAL ).
}

int ClearEEPROM( void )
{
 REG_W InRegs, OutRegs;
 WORD wFlags;
 UICONFIGDATA UINullData;

 fi_chr( &InRegs, 0, sizeof ( InRegs ) );
 fi_chr( &UINullData, 0, sizeof ( UINullData ) );

 InRegs.ax = SBS_SARATOGAFUNC;
 InRegs.bx = SBS_MEMORYTOEEPROM;
 InRegs.cx = sizeof ( UICONFIGDATA );
 InRegs.dx = SBS_OFFUICFGDATA;
 InRegs.es = SEG( &UINullData );
 InRegs.di = OFF( &UINullData );

#if !defined( FLASHTEST )
 wFlags = intn( &InRegs, &OutRegs,
SBS_SLINTNUM );
#else
 wFlags = 0;
#endif

 if ( !( wFlags & GEN_CARRYFLAG ) )
  return ( ERR_SUCCESS );
 else
  return ( ERR_INTERNAL );
}

#if defined( _MSC_VER )
#pragma warning( default : 4704 )
#endif

Copr. 1995 Zenith Data Systems Corp

#include "cr.h"
#include "spawn.h"
#include "k2.h"
#include "sio.h"
#include "sm.h"

#if defined( _MSC_VER )
#pragma warning( disable : 4704 )
#endif

HOSTLISTENTRIES HostListEntries = { 0, 0 };
static HOSTLISTENTRIES BroadcastHLEntries = {
0, 0 }.
static int        iHLStatus = SMI_BLANK,
static int        iHLThreadId = -1;
static int        iWaitForHLThreadIdx;
static int        iLBCurrHost = 0;
static int        iLBCurrGroup = 0;
static int        iCurrGroupIdx = 0;
static int        iNumGroups = 0;
static char       szWorkAroundNodeAdd[
SCS_MAXLENNODEADD ].
static char       szSerialDup[
SCS_MAXLENSERIALNUM ].
static char       szCurrHostName[
SCS_MAXLENHOSTNAME + 1 ];

static char       fRequestHostList = FALSE.

void SetCurrHostName( char *szNewCurrHostName
)
{
 strcpy( szCurrHostName, szNewCurrHostName );
}

char *GetCurrHostName( void )
{
 return ( szCurrHostName ).
}

int GetLBCurrHost( void )
{
 return ( iLBCurrHost );
}

void SetLBCurrHost( int iNewLBCurrHost )
{
 iLBCurrHost = iNewLBCurrHost;
}

char GetRequestHostList( void )
{
 return ( fRequestHostList );
}

void SetRequestHostList( int iNewRequestHostList )
{
 PCB_BEGINCRITICAL;
 fRequestHostList = LOBYTE( iNewRequestHostList
);
 PCB_ENDCRITICAL;
}

int GetLBCurrGroup( void )
{
 return ( iLBCurrGroup ).
}

void SetLBCurrGroup( int iNewLBCurrGroup )
{
 if ( iLBCurrGroup != iNewLBCurrGroup )
  iCurrGroupIdx = GetGroupIdx( iNewLBCurrGroup
);

 iLBCurrGroup = iNewLBCurrGroup;
}

char *GetLBGroup( int iGroupNum )
{
 int iUseGroup;
 char *szReturn,
 int iLBGroupIdx;

 if ( iHLStatus != SMI_AVAILABLE ||
HostListEntries.iNumEntries
== 0 )
  return ( szNullStr );

 iUseGroup = ( iGroupNum ==
SUI_LBCURRENTRY ? iLBCurrGroup :
iGroupNum ),

 iLBGroupIdx = GetGroupIdx( iUseGroup );

 szReturn = HostListEntries.aHostListBuff[
iLBGroupIdx
].HostDataBuff.szGroupName:
```

```
  return ( szReturn == NULL ? szNullStr : szReturn
);
}

char *GetLBHost( int iHostNum )
{
  char *szReturn;

  if ( GetCurrActionCode() ==
SUI_LASTCONNECTION )
    return ( UIConfigData.szLastHostName );

  if ( iHLStatus != SMI_AVAILABLE ||
HostListEntries.iNumEntries
== 0 )
    return ( szNullStr );

  szReturn = HostListEntries.aHostListBuff[
GetHostIdx( iHostNum
) ].HostDataBuff.szHostName;

  return ( szReturn == NULL ? szNullStr : szReturn
);
}

int GetLBHostStatus( int iHostNum )
{
  int iReturn;

  if ( iHLStatus != SMI_AVAILABLE ||
HostListEntries.iNumEntries
== 0 )
    return ( SUI_LBENTRYENABLED );

  iReturn = HostListEntries.aHostListBuff[
GetHostIdx( iHostNum )
].HostDataBuff.nHostStatus;

  if ( iReturn == SCS_HOSTAVAILABLE )
    iReturn = SUI_LBENTRYENABLED;
  else
    iReturn = SUI_LBENTRYDISABLED;

  return ( iReturn );
}

int SetLBHostStatus( int iHostNum, BYTE
nNewHostStatus )
{
  if ( iHLStatus != SMI_AVAILABLE ||
HostListEntries.iNumEntries
== 0 )
    return ( ERR_INTERNAL );

  HostListEntries.aHostListBuff[ GetHostIdx(
iHostNum )
].HostDataBuff.nHostStatus = nNewHostStatus;

  return ( ERR_SUCCESS );
}

char *GetCurrNodeAddress( void )
{
  int iHostIdx;
  char *szReturn = NULL;

  if ( GetCurrActionCode() ==
SUI_LASTCONNECTION )
    return ( UIConfigData.szLastNodeAddress );

  if ( iHLStatus != SMI_AVAILABLE ||
HostListEntries.iNumEntries
== 0 )
    return ( szNullStr );

  if ( iLBCurrHost > 0 )
  {
    iHostIdx = GetGroupIdx( iLBCurrGroup ) + (
iLBCurrHost - 1 );
    szReturn = HostListEntries.aHostListBuff[
iHostIdx
].szNodeAddress;
  }

  return ( szReturn == NULL ? szNullStr : szReturn
);
}

WORD GetCurrHostVersionNum( void )
{
  int iHostIdx,
  BYTE nMinorVersion,
  BYTE nMajorVersion;

  if ( iHLStatus != SMI_AVAILABLE ||
HostListEntries.iNumEntries
== 0 )
    return ( 0 );

  if ( iLBCurrHost > 0 )
    iHostIdx = GetHostIdx( SUI_LBCURRENTRY );
  else
    return ( 0 );

  nMinorVersion = HostListEntries.aHostListBuff[
iHostIdx
].HostDataBuff.nMinorVersion;
  nMajorVersion = HostListEntries.aHostListBuff[
iHostIdx
].HostDataBuff.nMajorVersion;

  return ( MAKEWORD( nMinorVersion,
nMajorVersion ) );
}

BOOL IsPWRequired( void )
{
  BOOL fReturn = FALSE;

  if ( GetCurrActionCode() ==
SUI_LASTCONNECTION )
    return ( UIConfigData.bLastConnPassword );

  if ( iHLStatus != SMI_AVAILABLE ||
HostListEntries.iNumEntries
== 0 )
    return ( FALSE );

  if ( iLBCurrHost > 0 )
    fReturn = HostListEntries.aHostListBuff[
GetHostIdx(
SUI_LBCURRENTRY ) ].HostDataBuff.
            bPasswordProtect;

  return ( fReturn );
}

int GetNumHostEntries( void )
{
  int iNextGroupIdx;

  if ( iHLStatus != SMI_AVAILABLE )
    return ( ERR_INTERNAL );

  if ( ( iNextGroupIdx = GetGroupIdx( iLBCurrGroup
+ 1 ) ) >= 0 )
    return ( iNextGroupIdx - iCurrGroupIdx );
  else
    return ( HostListEntries.iNumEntries -
iCurrGroupIdx );
}

int GetNumGroupEntries( void )
{
  if ( iHLStatus != SMI_AVAILABLE )
    return ( ERR_INTERNAL );

  return ( iNumGroups );
}

int GetGroupIdx( int iGroupNum )
{
  LONG lGroupIdx;

  lGroupIdx = GetEntryOffset(
HostListEntries.iNumEntries,
              sizeof ( HOSTLISTBUFF ),
SCS_MAXLENNODEADD,
              iGroupNum, ( NPSTR
)HostListEntries.aHostListBuff );

  if ( lGroupIdx >= 0 )
    return ( ( int )lGroupIdx / sizeof (
HOSTLISTBUFF ) );
  else
    return ( ERR_INTERNAL );
}

int GetGroupNum( int iHostIdx )
{
  LONG lLowGroupIdx = 0L,
  LONG lHighGroupIdx = 0L;
  int iGroupNum;

  for ( iGroupNum = 1; lHighGroupIdx >= 0;
++iGroupNum )
  {
    lLowGroupIdx = lHighGroupIdx;
    lHighGroupIdx = GetEntryOffset(
HostListEntries.iNumEntries,
                                sizeof ( HOSTLISTBUFF
),
SCS_MAXLENNODEADD,
                              iGroupNum, ( NPSTR
)HostListEntries.aHostListBuff ),
    lHighGroupIdx /= sizeof ( HOSTLISTBUFF ),

    if ( ( LONG )iHostIdx >= lLowGroupIdx && (
LONG )iHostIdx <
lHighGroupIdx )
      return ( iGroupNum );
  }

  return ( HLD_NOTINGROUP );
}

int GetHostIdx( int iHostNum )
{
  int iUseHost;
  int iHostIdx;

  iUseHost = ( iHostNum == SUI_LBCURRENTRY ?
iLBCurrHost :
iHostNum );
  iHostIdx = iCurrGroupIdx + ( iUseHost - 1 );

  return ( iHostIdx );
}

int SortGroupHost( void )
{
  int iGroupNum,
  int iSortStatus;

  iSortStatus =
    SortList( HostListEntries.iNumEntries, sizeof (
HOSTLISTBUFF
),
              SCS_OFFGROUPKEY,
SCS_OFFHOSTKEY,
              ( NPSTR )HostListEntries.aHostListBuff );

  if ( iSortStatus == ERR_SUCCESS )
  {
    for ( iNumGroups = 0, lGroupNum = 1;
lGroupNum <=
HostListEntries.iNumEntries;
        ++lGroupNum )
    {
      if ( GetGroupIdx( lGroupNum ) >= 0 )
        iNumGroups++;
    }
  }

  return ( iSortStatus );
}

int SortSerialNums( void )
{
  int iEntryIdx;

  if ( HostListEntries.aHostListBuff == NULL ||
HostListEntries.iNumEntries <= 0 )
    return ( ERR_INTERNAL );

  for ( iEntryIdx = 0; iEntryIdx <
HostListEntries.iNumEntries;
++iEntryIdx )
    HostListEntries.aHostListBuff[ iEntryIdx ].
      HostDataBuff.aHostSerial[
SCS_MAXLENSERIALNUM - 1 ] = 0;

  return ( SortList( HostListEntries.iNumEntries,
sizeof (
HOSTLISTBUFF ),
          SCS_OFFSERIALNUM, NULL, ( NPSTR
)HostListEntries.aHostListBuff ) );
}

int ValidateSerialNums( void )
{
  int iEntryIdx, iNextEntryIdx;
  int iSerialStatus = HLD_VALIDSERIALS;

  szSerialDup[0] = '\0';

  if ( SortSerialNums() != ERR_SUCCESS )
    return ( FALSE );

  for ( iEntryIdx = 0; iEntryIdx <
HostListEntries.iNumEntries;
++iEntryIdx )
  {
    if ( isZeroString( HostListEntries.aHostListBuff[
iEntryIdx
]
                    .HostDataBuff.aHostSerial ) )
      iSerialStatus = HLD_INVALIDSERIALS;
    else
    {
      if ( ( iNextEntryIdx = iEntryIdx + 1 ) <
HostListEntries.iNumEntries )
      {
        if ( !strcmp( HostListEntries.aHostListBuff[
iEntryIdx
].HostDataBuff.aHostSerial,
                    HostListEntries.aHostListBuff[
iNextEntryIdx ].
                    HostDataBuff.aHostSerial ) )
          iSerialStatus = HLD_DUPLICATESERIALS;
      }
    }

    if ( iSerialStatus != HLD_VALIDSERIALS )

    {
      strcpy( szSerialDup,
HostListEntries.aHostListBuff[
iEntryIdx ].
                        HostDataBuff.aHostSerial );
      break;
    }
  }

  return ( iSerialStatus );
}

int RequestHostList( void )
{
  SetRequestHostList( TRUE );

  if ( !GetSCSActiveStatus() )
    return ( ERR_INTERNAL );

  if ( ( AllocHLMem( &HostListEntries,
HLD_MAXNUMHOSTENTRIES ) )
!= ERR_SUCCESS )
    return ( ERR_OUTOFMEM );

  if ( ( AllocHLMem( &BroadcastHLEntries,
HLD_MAXNUMHOSTENTRIES )
) != ERR_SUCCESS )
    return ( ERR_OUTOFMEM );

  HostListEntries.iNumEntries = 0,
  iLBCurrHost = iLBCurrGroup  = 0;

  if ( ( SendRequestHostList() == ERR_SUCCESS )
&&
      ( ( iWaitForHLThreadIdx =
GetTempEventNum() ) >= 0 ) )
  {
    AddThread( iWaitForHLThreadIdx, WaitForHLD,
NULL,
SMD_MANYTIMES, FALSE,
            HLD_POLLFREQ, HLD_MAXRETRIES );

    SetStatusHLInMem( SMI_INPROGRESS );
  }
  else
  {
    FreeHLMem( &HostListEntries );
    FreeHLMem( &BroadcastHLEntries );
    SetStatusHLInMem( SMI_AVAILABLE );
    return ( ERR_INTERNAL );
  }

  return ( ERR_SUCCESS );
}

void WaitForHLD( void )
{
  int iNumEntries;
  int iSerialStatus;
  LONG lGroupHostNums;
  int iHostConnectIdx;

  CancelRequestHostList();

  if ( ( iNumEntries = *( int *
)BroadcastHLEntries.aHostListBuff
) > 0 )
  {
    BroadcastHLEntries.iNumEntries = iNumEntries;

    mem_mv( ( PVOID )( ( BYTE * )(
BroadcastHLEntries.aHostListBuff ) +
SCS_HOSTLISTNUMOFFSET ),
          ( PVOID )(
BroadcastHLEntries.aHostListBuff ),
iNumEntries *
          sizeof ( HOSTLISTBUFF ) + sizeof ( int ) );

    SaveNewHosts();
  }

  if ( GetRetryLimit( iWaitForHLThreadIdx ) > 0 &&
SendRequestHostList() == ERR_SUCCESS )
  {
    SetStatusHLInMem( SMI_INPROGRESS );
  }
  else
  {
    DelThread( iWaitForHLThreadIdx );
```

```
  if ( HostListEntries.iNumEntries > 0 )
  {
    AllocHLMem( &HostListEntries,
HostListEntries.iNumEntries
);

    if ( ( iSerialStatus = ValidateSerialNums() ) !=
HLD_VALIDSERIALS )
    {
      if ( iSerialStatus == HLD_INVALIDSERIALS )
        OpenMessageBox(
STR_HLDINVSERIALNUMS, 0,
SUI_LEFTJUSTIFIED, SUI_OK );
      else
        OpenMessageBox(
STR_HLDDUPSERIALNUMS, 0,
SUI_LEFTJUSTIFIED, SUI_OK );
    }

    SortGroupHost();

    if ( GetSCSCallProgress() !=
SMI_SCSDISCONNECTED )
    {
      if ( ( iHostConnectIdx = FindNodeAddress(
&HostListEntries,

UiConfigData.szLastNodeAddress )
) != FNA_NOTFOUND )
        HostListEntries.aHostListBuff[
iHostConnectIdx ].
                    HostDataBuff.nHostStatus =
SCS_HOSTAVAILABLE;
    }

    if ( ( lGroupHostNums = FindFirstAvailHost(
&HostListEntries ) ) != HLD_NOHOSTAVAIL )
    {
      iLBCurrGroup = HIWORD( lGroupHostNums );
      iLBCurrHost = LOWORD( lGroupHostNums );
    }
    else
    {
      iLBCurrGroup = iNumGroups > 0 ? 1 : 0;
      iLBCurrHost = 0;
    }
  }
  else
  {
    FreeHLMem( &HostListEntries );
    iLBCurrGroup = 0;
    iLBCurrHost = 0;
  }

  FreeHLMem( &BroadcastHLEntries );

  SetStatusHLInMem( SMI_AVAILABLE );
  SetRequestHostList( FALSE );
 }
}

int SendRequestHostList( void )
{
 WORD wSeg, wOff, wReturn;

 wSeg = SEG( BroadcastHLEntries.aHostListBuff );
 wOff = OFF( BroadcastHLEntries.aHostListBuff );

 _asm
 {
  push dx
  push di
  push bx

  mov ax, SCS_REQUESTHOSTLIST
  mov dx, wSeg
  mov di, wOff
  mov bx, HLD_MAXNUMHOSTENTRIES

  int SCS_INTNUM

  pop bx
  pop di
  pop dx

  mov wReturn, ax
 }

 if ( wReturn == SCS_ACCEPTED )
  return ( ERR_SUCCESS );
 else
  return ( ERR_INTERNAL );
}

int CancelRequestHostList( void )
{
 _asm
 {
  mov ax, SCS_CANCELREQHOSTLIST
  int SCS_INTNUM
 }

 return ( ERR_SUCCESS );
}

int SaveNewHosts( void )
{
 int iBCHostIdx;

 for ( iBCHostIdx = 0; iBCHostIdx <
BroadcastHLEntries.iNumEntries; ++iBCHostIdx )
 {
  if ( FindNodeAddress( &HostListEntries,
       BroadcastHLEntries.aHostListBuff[
iBCHostIdx
].szNodeAddress ) == FNA_NOTFOUND )
   {
    HostListEntries.aHostListBuff[
HostListEntries.iNumEntries++ ] =
      BroadcastHLEntries.aHostListBuff[ iBCHostIdx
];
   }
 }

 return ( ERR_SUCCESS );
}

int FindNodeAddress( HOSTLISTENTRIES
*pHostListEntries, char
*szKeyNodeAddress )
{
 int iHostIdx;
 int iMaxHostIdx = pHostListEntries->iNumEntries;

 for ( iHostIdx = 0; iHostIdx < iMaxHostIdx;
++iHostIdx )
 {
  if ( strcmp( pHostListEntries->aHostListBuff[
iHostIdx
].szNodeAddress,
             szKeyNodeAddress ) == 0 )
     return ( iHostIdx );
 }

 return ( FNA_NOTFOUND );
}

LONG FindFirstAvailHost( HOSTLISTENTRIES
*pHostListEntries )
{
 int iHostIdx;
 int iGroupNum, iHostNum;
 int iMaxHostIdx = pHostListEntries->iNumEntries;

 for ( iHostIdx = 0; iHostIdx < iMaxHostIdx;
++iHostIdx )
 {
  if ( pHostListEntries->aHostListBuff[ iHostIdx
].HostDataBuff.nHostStatus ==
       SCS_HOSTAVAILABLE )
   {
    iGroupNum = GetGroupNum( iHostIdx );
    iHostNum = ( iHostIdx - GetGroupIdx(
iGroupNum ) ) + 1;
    return ( MAKELONG( iHostNum, iGroupNum ) );

   }
 }

 return ( ( LONG )HLD_NOHOSTAVAIL );
}

int AllocHLMem( HOSTLISTENTRIES
*pHostListEntries, int
iNumEntries )
{

  if ( pHostListEntries->aHostListBuff == NULL )
  {
   if ( ( pHostListEntries->aHostListBuff = (
HOSTLISTBUFF *
)malloc(
          iNumEntries * sizeof ( HOSTLISTBUFF ) +
sizeof ( int )
) ) == NULL )
    {
     TRACE( "ERROR: malloc failed in
AllocHLMem()\n" );
     return ( ERR_INTERNAL );
    }
    else
     fil_chr( ( PVOID
)pHostListEntries->aHostListBuff, 0,
iNumEntries *
           sizeof ( HOSTDATABUFF ) + sizeof ( int
) );
  }
  else
  {
  }

  pHostListEntries->iNumEntries = iNumEntries

  return ( ERR_SUCCESS );
}

int GetStatusHLInMem( void )
{
 if ( GetCurrActionCode() ==
SUI_LASTCONNECTION )
   return ( SMI_AVAILABLE );
 else
   return ( iHLStatus );
}

void SetStatusHLInMem( int iNewHostListStatus )
{
 if ( ( iHLStatus = iNewHostListStatus ) ==
SMI_INPROGRESS )
   SetWaitingIcon( SBS_WAITINGICONON, TRUE
);
 else
   SetWaitingIcon( SBS_WAITINGICONOFF, TRUE
);
}

void FreeHLMem( HOSTLISTENTRIES
*pHostListEntries )
{
 if ( pHostListEntries->aHostListBuff != NULL )
 {
  free( pHostListEntries->aHostListBuff );
  pHostListEntries->aHostListBuff = NULL;
 }
}

void FreeAllHLMem( void )
{
 FreeHLMem( &HostListEntries );
 FreeHLMem( &BroadcastHLEntries );
}

BOOL IsZeroString( char szString[] )
{
 int iStrIdx;
 int iStrLen;

 for ( iStrIdx = 0, iStrLen = strlen( szString );
      iStrIdx < iStrLen; ++iStrIdx )
  if ( szString[ iStrIdx ] != '0' )
    return ( FALSE );

 return ( TRUE );
}

#if defined( _MSC_VER )
#pragma warning( default : 4704 )
#endif
Copr. 1995 Zenith Data Systems Corp.

#include "sr.h"
#include "spawn.h"
#include "k2.h"
#include "sio.h"
#include "sm.h"

#if defined( _MSC_VER )
#pragma warning( disable : 4704 )
#endif

#define STK_SZ (5000)
word isr_stk[STK_SZ+1];


 extern char sms[];
 extern char attrc[],attrm[];
 extern char already[];
 extern char unloaddone[];
 extern char unloadnot[];
 extern word init_data_end;

 extern BOOL fNetware;


 main()
 {
  int i;

  chk_video();
  get_crs();
  crs_x = bcrs_x;
  crs_y = bcrs_y;
  mv_crs();

if ( second_load() )
{
 i = str_pos( '-', cmd_line );
 if ( i && ( ( cmd_line[i] | 0x20 ) == 'u' ) )
 {
  if( remove_tsr() )
  {
   ShutDownDispatcher();
   dspf( unloaddone );
  }
  else
   dspf( unloadnot );
 }
 else
  dspf( already );

 mv_crs();

 return( 1 );
}

sprintf( szTempStr, sms, szSMVersionName );
dspf( szTempStr );

get_crs();
crs_x = bcrs_x;
crs_y = bcrs_y + 3;
mv_crs();


 DEBUG_BREAK

 initUIConfigData();
 InitSamlogo( SBS_DRIVERSLOADING );
 InitDispatcher();

 malloc_on( SHC_MAXLENHEAP );
 idata_end=&init_data_end;
 icode_beg=main;
 stay_resident(isr_stk,STK_SZ*2);


 install_tsc( ( fp )ClockTick, 3500,
          SMD_SCHEDULERS | SMD_HOTKEYS |

          SMD_FARCALLS |
SMD_GENERALTRAPS | SMD_COMMSVCS |
SMD_INTSSVCS | SMD_MOUSEKWATCH );

 install_trap( ( fp )TrapService, 2500,
SMD_FULLREENTER );
 install_fcall( ( fp )FCallService, 4000,
SMD_FULLREENTER, 0,
szNullStr, 0 );

 add_tsc_event( SMD_DISPATFREQ );

 return ( 0 );
}

#if defined( _MSC_VER )
#pragma warning( default : 4704 )
#endif



 Copr. 1995 Zenith Data Systems Corp.


 #include "sr.h"
 #include "spawn.h"
 #include "k2.h"
 #include "sm.h"

 #if !defined( NDEBUG )
 WORD aHotKeys[] = { SMI_SF1, SMI_SF2,
 SMI_SF3, SMI_SF4, SMI_SF5,
 SMI_SF6,
                SMI_SF7, SMI_SF8, SMI_SF9,
 SMI_SF10,
 SMI_SALTQ, 0 };
 #endif


  char attrc[]={0x17,0x1E,0x13,0x1F,0x18,0xA};
  char attrm[]={0x07,0x0F,0x07,0x07,0x07,0xF};


  char sms[] =
```

```
"\mSaratoga Manager, (C) Copyright 1994,1995,
Zenith Data
Systems \n"
"Mobile Systems Engineering, Version %s \n",

char already[] =
 "ERROR: SM already present \n"
 "Enter SM -U to unload. \n";

char unloaddone[]="SM has been removed from
memory.";
char unloadnot[]="ERROR: SM could not be
removed from memory.";

char _tsr_name[]="Saratoga Manager (C) 1994-1995
ZDS";


struct cfg_rec config_block = {
    sizeof(config_block),
    'S','M','A','N',
    MAKEWORD( GEN_SMMINORVERSIONNUM,
GEN_SMMAJORVERSIONNUM ),
    };



#if !defined( NDEBUG )


fp
install_list[]={install_tsc,install_trap,install_hk,install_f
call
};

#else
fp
install_list[]={install_tsc,install_trap,install_dos_rdy,in
stall_
fcall};
#endif



word ins_data_end=1;



Copr 1995 Zenith Data Systems Corp.
#include "cr.h"
#include "k2.h"
#include "spawn.h"
#include "hm.h"
#include "sio.h"
#include "sm.h"

#if defined( _MSC_VER )
#pragma warning( disable : 4704 )
#endif

static OCCLUDEUNION HostOcc,
static OCCLUDEUNION OldHostOcc = { -1, -1, -1,
-1 };
static OCCLUDEUNION *pSetOccData;
static int          iSetOccType,
static BYTE         fSCOSNotified;
static BYTE         fRepaintRequired = FALSE;
static char         nOccDefineAcked = PMI_NOACK;
static char         nOccCloseAcked = PMI_NOACK,
static int          iHostOccludeIdx =
SMD_NOACTIVETHREAD;



void SetSCOSNotified( BYTE fNewSCOSNotified )
{
  fSCOSNotified = fNewSCOSNotified;
}

void SetOccDefineAcked( char nOccDefineStatus )
{
  nOccDefineAcked = nOccDefineStatus;
}

char GetOccDefineAcked( void )
{
  return ( nOccDefineAcked );
}

void SetOccCloseAcked( char nOccCloseStatus )
{
  nOccCloseAcked = nOccCloseStatus;
}

char GetOccCloseAcked( void )
{
  return ( nOccCloseAcked );
}


int DrawSUIOSK( OCCLUDEUNION *NewOSKRect,
int iOccType )
{
  OCCLUDEUNION *OSKRect,
  int yDrawOSK, xDrawOSK;

  if ( NewOSKRect == NULL )
    OSKRect = &HostOcc,
  else
    OSKRect = NewOSKRect;

  switch ( iOccType )
  {
    case SUI_OCCRWIN:
      yDrawOSK = OSKRect->occRWin.yULWin;
      xDrawOSK = OSKRect->occRWin.xULWin;
      break;

    case SUI_OCCDOSTEXT:
      yDrawOSK = OSKRect->occText.yULRow *
SCS_OSKTEXTCHARHEIGHT;

      xDrawOSK = OSKRect->occText.xULCol *
SCS_OSKTEXTCHARWIDTH;
      break,

    case SUI_OCCDOSGRAPHICS:
      yDrawOSK = OSKRect->occDosGraph.yULDos,
      xDrawOSK = OSKRect->occDosGraph.xULDos;
      break;

    default.
      TRACE( "ERROR: Invalid occlusion type
specified in
DrawSUIOSK()\r" );
      return ( ERR_INTERNAL ).
  }

#if !defined( PROD )
  sprintf( szTempStr, "NOTICE: Request to draw
OSK at x:%d, y:%d,
sent to SUI\r",
          xDrawOSK, yDrawOSK );
  TRACE( szTempStr );
#endif

  AX( SUI_MOVEOSK );
  BX( yDrawOSK );
  CX( xDrawOSK );
  return ( ( *lpfnSUICallBack )() );
}

int CreateOccludedArea( OCCLUDEUNION
*OccMap, int iOccType, int
iNewCacheFreeMem )
{
  if ( !GetSCSActiveStatus() )
    return ( ERR_INTERNAL );

  if ( OldHostOcc.occRWin.xULWin == -1 &&
       OldHostOcc.occRWin.yULWin == -1 )
  {
    OldHostOcc.occRWin.xULWin =
UIConfigData.xPosLastOSKScreen;
    OldHostOcc.occRWin.yULWin =
UIConfigData.yPosLastOSKScreen;
  }

  switch ( iOccType )
  {
    case SUI_OCCRWIN:
      UIConfigData.xPosLastOSKScreen =
OccMap->occRWin.xULWin;
      UIConfigData.yPosLastOSKScreen =
OccMap->occRWin.yULWin;
      return ( SetWinHostOcclude(
&OccMap->occRWin ) );

    case SUI_OCCDOSTEXT:
      UIConfigData.xPosLastOSKScreen =
OccMap->occText.xULCol;
      UIConfigData.yPosLastOSKScreen =
OccMap->occText.yULRow;
      return ( SetDOSTextHostOcclude(
&OccMap->occText ) );

    case SUI_OCCDOSGRAPHICS:
      UIConfigData.xPosLastOSKScreen =
OccMap->occDosGraph.xULDos;
      UIConfigData.yPosLastOSKScreen =
OccMap->occDosGraph.yULDos,
      return ( SetDOSGraphHostOcclude(
&OccMap->occDosGraph ) );

    case SUI_NOOCCTYPE:
    default:
      TRACE( "ERROR: Invalid occlusion type
specified in
CreateOccludeArea()\r" );
      return ( ERR_INTERNAL );
  }
}


int SetWinHostOcclude( OCCLUDERWIN *OccRWin
)
{
  if ( iHostOccludeIdx != SMD_NOACTIVETHREAD )

  {
    TRACE( "NOTICE: Attempt to reenter
SetWinHostOcclude() before
it is done, returning error\r" );
    return ( ERR_SUCCESS );
  }

  SetOccDefineAcked( PMI_NOACK );

  HostOcc.occRWin.xULWin = OccRWin->xULWin;
  HostOcc.occRWin.yULWin = OccRWin->yULWin;
  HostOcc.occRWin.xLRWin = ( OccRWin->xLRWin
- OccRWin->xULWin )
+ 1;
  HostOcc.occRWin.yLRWin = ( OccRWin->yLRWin
- OccRWin->yULWin )
+ 1;

#if !defined( PROD )
  sprintf( szTempStr, "NOTICE: Occlusion Region
for Windows at
x:%d, y:%d, x:%d, y:%d\r",
          HostOcc.occRWin.xULWin,
HostOcc.occRWin.yULWin,
          HostOcc.occRWin.xLRWin,
HostOcc.occRWin.yLRWin );
  TRACE( szTempStr );
#endif

  if ( SendPrivateMessage( PMI_REQOCCDEFINE,
sizeof( OCCLUDERWIN
),
                ( char * )&HostOcc.occRWin ) !=
ERR_SUCCESS )
  {
    TRACE( "ERROR: PM for occlude region not
sent due to
SendPrivateMessage() error\r" );
    DrawSUIOSK( &OldHostOcc, SUI_OCCRWIN );
    return ( ERR_SUCCESS );
  }

  if ( ( iHostOccludeIdx = GetTempEventNum() ) < 0
)
  {
    TRACE( "ERROR: Out of temporary threads,
drawing OSK
anyway\r" );
    DrawSUIOSK( NULL, SUI_OCCRWIN );
    return ( ERR_INTERNAL );
  }

  AddThread( iHostOccludeIdx, ( NEARPROC
)WaitForDefineOcc, NULL,
SMD_MANYTIMES, FALSE,
          SCS_WAITACKPOLLFREQ,
SCS_WAITACKMAXRETRY );

  return ( ERR_SUCCESS );
}

void WaitForDefineOcc( void )
{
  if ( GetOccDefineAcked() != PMI_NOACK )
  {
    DelThread( iHostOccludeIdx );

    if ( GetOccDefineAcked() == PMI_ACKEDTRUE )
    {
      TRACE( "NOTIFY: Message acknowledgement
detected, enable
SUI to begin OSK paint\r" );
      OldHostOcc = HostOcc;
      DrawSUIOSK( NULL, SUI_OCCRWIN );
    }
    else
    {
      TRACE( "ERROR: Message acknowledgement
detected, abort OSK
paint\r" );
      DrawSUIOSK( &OldHostOcc, SUI_OCCRWIN );

    }

    iHostOccludeIdx = SMD_NOACTIVETHREAD;

  }
  else if ( GetRetryLimit( iHostOccludeIdx ) == 0 )
  {
    TRACE( "ERROR: Timeout, define Occ message
acknowledgment not
received, allow draw anyway.\r" );
    DelThread( iHostOccludeIdx );
    iHostOccludeIdx = SMD_NOACTIVETHREAD;
    DrawSUIOSK( NULL, SUI_OCCRWIN );
    SetOccDefineAcked( PMI_ACKEDFALSE );
  }
}

int CloseHostOcclude( void )
{
  if ( iHostOccludeIdx != SMD_NOACTIVETHREAD )

  {
    TRACE( "NOTICE: Attempt to reenter
CloseHostOcclude() before
it is done, returning error\r" );
    return ( ERR_INTERNAL );
  }

  if ( GetCurrHostMode() == PHD_DOSAPP )
  {
    TRACE( "NOTICE: Already at DOS not need to
close Windows
occlude\r" );
    return ( ERR_SUCCESS ).
  }

  SetOccCloseAcked( PMI_NOACK );

  if ( !IsOSKUnlClose( GetCurrScrCode() ) )
  {
    if ( SendPrivateMessage( PMI_REQOCCCLOSE,
0, NULL ) !=
ERR_SUCCESS )
    {
      TRACE( "ERROR: PM for closure of occlude
region not sent
due to SendPrivateMessage() error\r" );

      return ( ERR_SUCCESS );
    }

    if ( ( iHostOccludeIdx = GetTempEventNum() ) <
0 )
      return ( ERR_INTERNAL );

    AddThread( iHostOccludeIdx, ( NEARPROC
)WaitForCloseOcc,
NULL, SMD_MANYTIMES, FALSE,
          SCS_WAITACKPOLLFREQ,
SCS_WAITACKMAXRETRY );
  }
  else
  {
    TRACE( "NOTICE: Unilateral closure of Windows
OSK identified,
no PM sent\r" );
    SetFullRepaint( ERR_SUCCESS );
  }

  return ( ERR_SUCCESS );
}

void WaitForCloseOcc( void )
{
  if ( GetOccCloseAcked() != PMI_NOACK )
  {
    DelThread( iHostOccludeIdx );

    if ( GetOccCloseAcked() == PMI_ACKEDTRUE )
    {
      TRACE( "NOTIFY: Message acknowledgement
for close of OCC
detected\r" );
      SetFullRepaint( ERR_SUCCESS );
    }
    else
    {
      TRACE( "ERROR: Message acknowledgement
for close of OCC
detected, failed close\r" );
      SetFullRepaint( ERR_INTERNAL );
    }

    iHostOccludeIdx = SMD_NOACTIVETHREAD;

  }
  else if ( GetRetryLimit( iHostOccludeIdx ) == 0 )
  {
    DelThread( iHostOccludeIdx );
    iHostOccludeIdx = SMD_NOACTIVETHREAD;
```

```
  TRACE( "ERROR  Close Occ acknowledgment
not received, set for
success anyway\r" ).
  SetFullRepaint( ERR_SUCCESS );
 }
}


int SetDOSGraphHostOcclude(
OCCLUDEDOSGRAPHICS *OccDosGraphics )
{
 HostOcc = *( OCCLUDEUNION *
)OccDosGraphics.
 if ( IsOSKAsSetupDlg( GetCurrScrCode() ) )
 {
  TRACE( "NOTICE: Beginning immediate redraw
of DOS Graphics
OSK\r" ).
  DrawSUIOSK( NULL, SUI_OCCDOSGRAPHICS
).

  TRACE( "NOTICE: Waiting for SUI video busy for
the DOS
Graphics OSK\r" ).

  if ( SMVideoBusy( DoDOSGraphHostOcclude ) !=
ERR_SUCCESS )
    return ( ERR_INTERNAL );
 }
 else
 {
  TRACE( "NOTICE: OSK As Setup Dialog, no
SCOS calls, clearing
screen.\r" ).

  SetVideoMode( SUI_INITIALVIDMODE );
  DrawSUIOSK( NULL, SUI_OCCDOSGRAPHICS
).
 }
}

void DoDOSGraphHostOcclude( void )
{

#if !defined( PROD )
 sprintf( szTempStr  "NOTICE: Occlusion Region for
DOS Graphics
at x:%d, y:%d, x:%d, y:%d\r",
        HostOcc.occDosGraph.xULDos,
HostOcc.occDosGraph.yULDos,
        HostOcc.occDosGraph.xLRDos,
HostOcc.occDosGraph.yLRDos
).
 TRACE( szTempStr );
#endif

 SetSCSHostOcclude( &HostOcc,
SUI_OCCDOSGRAPHICS, TRUE ).





}

int SetDOSTextHostOcclude( OCCLUDETEXT
*OccDosText )
{

 HostOcc.occText.yULRow =
OccDosText->yULRow /
SCS_OSKTEXTCHARHEIGHT.
 HostOcc.occText.xULCol = OccDosText->xULCol /
SCS_OSKTEXTCHARWIDTH;
 HostOcc.occText.yLRRow = ( (
OccDosText->yLRRow + 1 ) /
SCS_OSKTEXTCHARHEIGHT ) - 1;
 HostOcc.occText.xLRCol = ( (
OccDosText->xLRCol + 1 ) /
SCS_OSKTEXTCHARWIDTH ) - 1;

 *OccDosText = HostOcc.occText;

 TRACE( "NOTICE: Beginning immediate redraw of
DOS Text OSK\r"
);
 DrawSUIOSK( NULL, SUI_OCCDOSTEXT );

#if !defined( PROD )
 sprintf( szTempStr, "NOTICE: Occlusion Region for
DOS Text at
x:%d, y:%d, x:%d, y:%d\r",
       HostOcc.occText.xULCol,
HostOcc.occText.yULRow,
       HostOcc.occText.xLRCol
HostOcc.occText.yLRRow );
 TRACE( szTempStr ).
#endif

 return ( SetSCSHostOcclude( &HostOcc,
SUI_OCCDOSTEXT, TRUE ) );
}


int SetSCSHostOcclude( OCCLUDEUNION *occ,
OCCTYPE iNewOccType,
BYTE fNewRepaintRequired )
{
 if ( iHostOccludeIdx != SMD_NOACTIVETHREAD )

 {
  TRACE( "NOTICE. Attempt to reenter
SetSCSHostOcclude() before
it is done, returning error\r" );
  return ( ERR_INTERNAL );
 }

 SetFullRepaint( ERR_INPROGRESS ).

 pSetOccData = occ
 iSetOccType = iNewOccType,
 fRepaintRequired = fNewRepaintRequired;

 if ( ( iHostOccludeIdx = GetTempEventNum() ) < 0
)
  return ( ERR_INTERNAL ).

 AddThread( iHostOccludeIdx, ( NEARPROC
)D..'CSHostOcclude, NULL,
SM.'_MANYTIMES, FALSE,
        SCS_DOHOSTOCCPOLLFREQ.
SCS_DOHOSTOCCMAXRETRY );

 return ( ERR_SUCCESS );
}

void DoSCSHostOcclude( void )
{
 int iOccError,

 if ( ( iOccError = DefineSCSOcclude(
pSetOccData, iSetOccType,
fRepaintRequired ) ) != ERR_SUCCESS )
 {
  if ( iOccError != ERR_SCSBUSY )
  {
   SetFullRepaint( ERR_INTERNAL );
   DelThread( iHostOccludeIdx );
   iHostOccludeIdx = SMD_NOACTIVETHREAD;

   TRACE( "ERROR: Unrecoverable error occured
in the call to
DefineSCSOcclude()\r" ).
  }
  else if ( GetRetryLimit( iHostOccludeIdx ) == 0 )
  {
   SetFullRepaint( ERR_INTERNAL );
   DelThread( iHostOccludeIdx );
   iHostOccludeIdx = SMD_NOACTIVETHREAD,

   TRACE( "ERROR: Exhausted the max number
of retries in
DefineSCSOcclude()\r" );
  }
 }
 else
 {
  S.tFullRepaint( ERR_SUCCESS );
  !'alThread( iHostOccludeIdx );
  iHostOccludeIdx = SMD_NOACTIVETHREAD.
  TRACE( "NOTICE. Success in calling
DefineSCSOcclude()\r" );
 }


}

#if defined( _MSC_VER  )
#pragma warning( default : 4704 )
#endif

Copr. 1995 Zenith Data Systems Corp.
#include "cr.h"
#include "sie.h"
#include "spawn.h"
#include "sm.h"

#if defined( _MSC_VER  )
#pragma warning( disable : 4704 )
#endif

static BYTE     bGearIdx = 0;
static int      iTempThreadIdx =
SMD_NOACTIVETHREAD;
static int      iSleepThreadIdx =
SMD_NOACTIVETHREAD.
static BOOL     fPNDActive = FALSE;
static PENCALIB  CurrPenCalib;
static ZDSTRAPREC PNDTrapRec;
static BYTE     nCurrPenButtonMode =
PND_LEFTMOUSE;
static BYTE     nCurrHostMode = PND_DOSAPP;
static BYTE     fSleepActive = FALSE.

static APIFUNC sAPIFuncTable[] =
{
 { SMI_PNDLOADING, PenDriverLoading },
 { 0, 0 },
};

APIFUNC *GetPNDFuncTable( void )
{
 return ( sAPIFuncTable );
}

BYTE GetCurrHostMode( void )
{
 BYTE nTmpHostMode.

 PCS_BEGINCRITICAL.

 nTmpHostMode = nCurrHostMode.

 PCS_ENDCRITICAL.

 return ( nTmpHostMode );
}

void CheckPenDriver( void )
{
 int iHotIcon;

 if ( GetConnectRequested() &
GetRequestHostList() )
  return.

 if ( GetPNDActiveStatus() )
 {
  if ( ( iHotIcon = GetHotIcon() ) >= 0 )
  {
   ErrorBeep();

   switch( iHotIcon )
   {
    case PND_ICONSLEEP.
     ActivateSleepMode().
     break;

    case PND_ICONSETUP
     LoadSUI( SUI_LASTSETUPDLGSCREEN, 0
);
     break;

    case PND_ICONOSK.
     if ( GetSCSCallProgress() ==
SMI_SCSCONNECTED )
      LoadSUI( SUI_LASTOSKSCREEN, 0 );
     break;

    case PND_ICONPALLETTE:
     RotatePallette().
     break;

    case PND_ICONSPEAKER:
     ToggleSpeaker();
     break;

    case PND_ICONLRMOUSE:
     if ( nCurrPenButtonMode ==
PND_LEFTMOUSE )
     {
      SetPenButtonMode( PND_RIGHTMOUSE );
      EnableRightMouseButton( FON );
     }
     else
     {
      SetPenButtonMode( PND_LEFTMOUSE );
      EnableRightMouseButton( FOFF );
     }
     break;

    case PND_ICONHOSTCTRLMODE:
     DoHostControlMode( TRUE );
     break;

    case PND_UDEF1:
    case PND_UDEF2.
     SendUDHotIcon( iHotIcon );
     break;
   }
  }
 }
}

void SetPNDActiveStatus( BOOL fPenDriverStat )
{
 fPNDActive = fPenDriverStat,
}

BOOL GetPNDActiveStatus( void )
{
 return ( fPNDActive );
}

APIFUNCRET PenDriverLoading( struct REGW
*CallerRegs )
{
 if ( ( iTempThreadIdx = GetTempEventNum() ) ==
-1 )
 {
  CallerRegs->ax = ( UINT )ERR_PNDINTERNAL.
  goto exit,
 }

 CurrPenCalib.wXUpperPenCalib =
UIConfigData.wXUpperPenCalib,
 CurrPenCalib.wYUpperPenCalib =
UIConfigData.wYUpperPenCalib;
 CurrPenCalib.wXLowerPenCalib =
UIConfigData.wXLowerPenCalib.
 CurrPenCalib.wYLowerPenCalib =
UIConfigData.wYLowerPenCalib.
 CurrPenCalib.wHITopMargin = PND_TOPMARGIN;
 CurrPenCalib.wHIRightMargin =
PND_RIGHTMARGIN;
 CurrPenCalib.wHIVertSpace =
PND_VERTSPACING.
 CurrPenCalib.wHIXWidth = PND_WIDTH,
 CurrPenCalib.wHIYHeight = PND_HEIGHT:

 sprintf( szTempStr, "NOTICE: Using Calibration:
%d,%d -
%d,%d\r", UIConfigData.wXUpperPenCalib,
       UIConfigData.wYUpperPenCalib,
UIConfigData.wXLowerPenCalib,
UIConfigData.wYLowerPenCalib );
 TRACE( szTempStr );

 CallerRegs->dx = HIWORD( ( ( DWORD )( (
PENCALIB FAR *
)&CurrPenCalib ) ) );
 CallerRegs->si = LOWORD( ( ( DWORD )( (
PENCALIB FAR *
)&CurrPenCalib ) ) );

 AddThread( iTempThreadIdx, InitPND, NULL,
SMD_ONETIME, FALSE,
INI_POLLFREQ.
       0 );
exit:
 SetPNDActiveStatus( TRUE );
 SetForegroundRegs( CallerRegs );
}

void InitPND( void )
{
 #if !defined( NDEBUG )
 crs_x = 0;
 crs_y = 24;
 #endif

 DelThread( iTempThreadIdx ).
 if ( SetDeviceMode( PND_MOUSEMODE ) != 0 )
  goto error.

 chk_video();

 if ( NotifyVideoMode( GetCurrVidMode() ) !=
ERR_SUCCESS )
  goto error;

 if ( nCurrPenButtonMode == PND_LEFTMOUSE )
  EnableRightMouseButton( FOFF );
 else
  EnableRightMouseButton( FON );


 goto success.

error:
 TRACE( "ERROR: Pen Driver initialization failed.\r"
);
 return;

success:
 TRACE( "NOTICE: Pen Driver successfully
initialized.\r" ).
}

void InitPNDTrapRec( void )
{
```

```
 fil_chr( ( NPSTR )&PNDTrapRec, 0, sizeof(
ZDSTRAPREC ) );

 PNDTrapRec.tr.tr_int = SMI_PNDINTNUM;

 PNDTrapRec.tr.tr_asm_srv =
CRU_ONBUSYEITHER;

 strcpy( PNDTrapRec.szSMARarSignature,
szSMSignature );
}

TRAPREC *GetPNDTrapRec( void )
{
 return ( &PNDTrapRec.tr );
}

int GetHoticon( void )
{
 REG_W inRegs, OutRegs;

 if ( !GetPNDActiveStatus() )
  return ( PND_NOICON );

 fil_chr( ( NPSTR )&inRegs, 0, sizeof( REG_W ) );

 inRegs.ax = PND_GETDATA;
 inRegs.es = NULL;
 inRegs.ds = NULL;
 inRegs.cx = 0;

 intn( &inRegs, &OutRegs, PND_INTNUM );

 return ( OutRegs.bx );
}

int SetDeviceMode( int iPenMode )
{
 REG_W inRegs, OutRegs;

 if ( !GetPNDActiveStatus() )
  return ( ERR_INTERNAL );

 fil_chr( ( NPSTR )&inRegs, 0, sizeof( REG_W ) );

 inRegs.ax = PND_SETDEVICEMODE;
 inRegs.bx = iPenMode;

 intn( &inRegs, &OutRegs, PND_INTNUM );

 return ( ERR_SUCCESS );
}

int NotifyVideoMode( int iVideoMode )
{
 REG_W inRegs, OutRegs;

 if ( !GetPNDActiveStatus() )
  return ( ERR_INTERNAL );

 fil_chr( ( NPSTR )&inRegs, 0, sizeof( REG_W ) );

 inRegs.ax = PND_SETVIDEOMODE;
 inRegs.bx = iVideoMode;

 inRegs.si = GetXScreenRes( iVideoMode );
 inRegs.di = GetYScreenRes( iVideoMode );
 inRegs.cx = MAKEWORD( GetYCharRes(),
GetXCharRes() );

 intn( &inRegs, &OutRegs, PND_INTNUM );

 return ( ERR_SUCCESS );
}

int SetSetupDlgMode( int iDlgMode )
{
 REG_W inRegs, OutRegs;

 if ( !GetPNDActiveStatus() )
  return ( ERR_INTERNAL );

 fil_chr( ( NPSTR )&inRegs, 0, sizeof( REG_W ) );

 inRegs.ax = PND_SETUPDLGMODE;
 inRegs.bx = iDlgMode;

 intn( &inRegs, &OutRegs, PND_INTNUM );

 return ( ERR_SUCCESS );
}

int SetOSKMode( OCCLUDEUNION *OccArea
OCCTYPE OccType )
{
 REG_W inRegs, OutRegs;

 if ( !GetPNDActiveStatus() )
  return ( -1 );

 fil_chr( ( NPSTR )&inRegs, 0, sizeof( REG_W ) );

 inRegs.ax = PND_OSKDIMEN;

 if ( OccArea == NULL )
  inRegs.bx = inRegs.cx = inRegs.dx = inRegs.si =
0;
 else
 {
  switch ( OccType )
  {
   case SUI_OCCDOSTEXT:

     inRegs.cx = OccArea->occText.yULRow *
SCS_OSKTEXTCHARHEIGHT;
     inRegs.bx = OccArea->occText.xULCol *
SCS_OSKTEXTCHARWIDTH;
     inRegs.si = OccArea->occText.yLRRow *
SCS_OSKTEXTCHARHEIGHT;
     inRegs.dx = OccArea->occText.xLRCol *
SCS_OSKTEXTCHARWIDTH;
     break;

    case SUI_OCCDOSGRAPHICS:
     inRegs.bx = OccArea->occDosGraph.xULDos;
     inRegs.cx = OccArea->occDosGraph.yULDos;
     inRegs.dx = OccArea->occDosGraph.xLRDos;
     inRegs.si = OccArea->occDosGraph.yLRDos;
     break;

    case SUI_OCCRWIN:
     inRegs.bx = OccArea->occRWin.xULWin;
     inRegs.cx = OccArea->occRWin.yULWin;
     inRegs.dx = OccArea->occRWin.xLRWin;
     inRegs.si = OccArea->occRWin.yLRWin;
     break;

    default:
     return ( ERR_INTERNAL );
  }
 }

 intn( &inRegs, &OutRegs, PND_INTNUM );

 return ( ERR_SUCCESS );
}

int SetPenButtonMode( BYTE nNewPenButtonMode
)
{
 REG_W inRegs, OutRegs;

 if ( !GetPNDActiveStatus() )
  return ( -1 );

 if ( nNewPenButtonMode != nCurrPenButtonMode )
 {
  fil_chr( ( NPSTR )&inRegs, 0, sizeof( REG_W ) );

  inRegs.ax = PND_SETMOUSEBUTTON;

  intn( &inRegs, &OutRegs, PND_INTNUM );

  nCurrPenButtonMode = nNewPenButtonMode;
 }

 return ( ERR_SUCCESS );
}

int SetHostMode( int iHostMode )
{
 REG_W inRegs, OutRegs;

 if ( !GetPNDActiveStatus() )
  return ( ERR_INTERNAL );

 fil_chr( ( NPSTR )&inRegs, 0, sizeof( REG_W ) );

 inRegs.ax = PND_HOSTMODE;
 inRegs.bx = iHostMode;

 intn( &inRegs, &OutRegs, PND_INTNUM );

 nCurrHostMode = LOBYTE( iHostMode );

 return ( ERR_SUCCESS );
}

int SetCalibMode( int iCalibMode, int xCalibPnt, int
yCalibPnt )
{
 REG_W inRegs, OutRegs;

 if ( !GetPNDActiveStatus() )
  return ( ERR_INTERNAL );

 fil_chr( ( NPSTR )&inRegs, 0, sizeof( REG_W ) );

 inRegs.ax = PND_SETCALIBMODE;
 inRegs.bx = iCalibMode;
 inRegs.cx = xCalibPnt;
 inRegs.dx = yCalibPnt;

 intn( &inRegs, &OutRegs, PND_INTNUM );

 return ( ERR_SUCCESS );
}

int GetCalibState( int iCalibMode, int *xUpperCol, int
*yUpperRow,
          int *xLowerCol, int *yLowerRow )
{
 REG_W inArgs, OutArgs;
 int iCalibDone;
 int iReturn;

 fil_chr( ( NPSTR )&inArgs, 0, sizeof ( inArgs ) );

 inArgs.ax = PND_GETCALIBSTAT;

 intn( &inArgs, &OutArgs, PND_INTNUM );

 if ( iCalibMode == PND_CALIBLR )
  iCalibDone = OutArgs.bx & PND_CALIBLRSTAT;
 else
  iCalibDone = OutArgs.bx & PND_CALIBULSTAT;

 if ( iCalibDone )
 {
  if ( OutArgs.bx & PND_CALIBVALID )
   iReturn = PND_CALIBDONEVALID;
  else
   iReturn = PND_CALIBDONEINVALID;

  if ( iCalibMode == PND_CALIBLR )
  {
   *xUpperCol = OutArgs.ax;
   *yUpperRow = OutArgs.dx;
   *xLowerCol = OutArgs.si;
   *yLowerRow = OutArgs.di;
  }
 }
 else
  iReturn = PND_CALIBNOTDONE;

 return ( iReturn );
}

int EnableNewCalib( BOOL fEnableNewCalib )
{
 REG_W inArgs, OutArgs

 fil_chr( ( NPSTR )&inArgs, 0, sizeof ( inArgs ) );

 inArgs.ax = PND_ENABLENEWCALIB;
 inArgs.bx = ( WORD )fEnableNewCalib;

 intn( &inArgs, &OutArgs, PND_INTNUM );

 return ( ERR_SUCCESS );
}

int ActivateSleepMode( void )
{
 if ( iSleepThreadIdx != SMD_NOACTIVETHREAD )
 {
  if ( GetSCSCallProgress() ==
SMI_SCSCONNECTED )
    DoHostControlMode( FALSE );
  else
    DoSuspend( TRUE );

   DelThread( iSleepThreadIdx );
   iSleepThreadIdx = SMD_NOACTIVETHREAD;
 }
 else
 {
  if ( ( iSleepThreadIdx = GetTempEventNum() ) ==
-1 )
    return ( ERR_INTERNAL );

   AddThread( iSleepThreadIdx, WaitForSleep,
NULL, SMD_ONETIME,
FALSE,
          PND_SLEEPPOLLFREQ, 0 );
 }

 return ( ERR_SUCCESS );
}

void WaitForSleep( void )
{
 if ( GetRetryLimit( iSleepThreadIdx ) == 0 )
 {
   DelThread( iSleepThreadIdx );
   iSleepThreadIdx = SMD_NOACTIVETHREAD;

   DoSleep();
 }
}


#if defined( _MSC_VER )
#pragma warning( default : 4704 )
#endif


Copr. 1995 Zenith Data Systems Corp.

#include "cr.h"
#include "spawn.h"
#include "sio.h"
#include "sm.h"

#if defined( _MSC_VER )
#pragma warning( disable : 4704 )
#endif

static PROXIMTRAPREC PRXTrapRec;
static PROXIMVARIABLES PRXVariables;
static PROXIMVERSIONINFO PRXVersionInfo;
static PRXCB lpfnPRXCallBack = NULL;
static int iConnStrengthThreadIdx =
SMD_NOACTIVETHREAD;
static int iPRXSetupThreadIdx =
SMD_NOACTIVETHREAD
static int iCurrLinkQuality = PRX_NOLINKQUALITY;

static APIFUNC aAPIFuncTable[] =
{
 { SMI_PRXPOWERMANCB, RegisterPowerManCB
},
 { SMI_PRXUNLOADING, PrasmDriverUnload },
 { SMI_PRXNETCONFIG, NetConfigData },
 { SMI_PRXXCHGREVINFO, XchgRevInfo },
 { 0, 0 }
};

APIFUNC *GetPRXFuncTable( void )
{
 return ( aAPIFuncTable );
}

BOOL GetPRXActiveStatus( void )
{
 return ( lpfnPRXCallBack != NULL );
}

void InitPRXTrapRec( void )
{
 fil_chr( ( NPSTR )&PRXTrapRec, 0, sizeof(
PROXIMTRAPREC ) );

  PRXTrapRec.tr.tr_int = SMI_PRXINTNUM;
  PRXTrapRec.tr.tr_asm_srv = CRU_REFLECTINT;


 mem_cp( SIG_RLNOEMSIGNATURE,
PRXTrapRec.szSMBeforeSignature,
     sizeof ( PRXTrapRec.szSMBeforeSignature )
);
}

TRAPREC *GetPRXTrapRec( void )
{
 return ( &PRXTrapRec.tr );
}

void CheckSystem( void )
{
 int iNewLinkQuality;

 if ( GetSuspendFlag() )
 {
  if ( GetSCSCallProgress() ==
SMI_SCSCONNECTED )
    DoHostControlMode( FALSE );
  else
    DoSuspend( TRUE );
 }

 if ( ( iNewLinkQuality = GetLinkQuality() ) !=
ERR_INTERNAL )
 {
  if ( iNewLinkQuality != iCurrLinkQuality )
  {
   switch( iNewLinkQuality )
   {
    case PRX_DISCONNECTED:
     SetTowerIcon( SBS_TOWERON,
SBS_WAVESOFF );
     break;

    case PRX_LOWQUALITY:
     SetTowerIcon( SBS_TOWERON,
SBS_WAVESHIGHBLINK );
     break;
```

```
      case PRX_HIGHQUALITY
        SetTowerIcon( SBS_TOWERON,
SBS_WAVESON );
        break;
    }

    iCurrLinkQuality = iNewLinkQuality;
  }
 }
}

APIFUNCRET RegisterPowerManCB( struct REGW
*CallerRegs )
{
 lpfnPRXCallBack = MK_FP( CallerRegs->es,
CallerRegs->si );

 if ( ( iPRXSetupThreadIdx = GetTempEventNum() )
< 0 )
   return;

 AddThread( iPRXSetupThreadIdx,
WaitForPRXSetup, NULL,
SMD_ONETIME, FALSE
         1, 0 );

 CallerRegs->ax = ( WORD )ERR_SUCCESS;

 SetForegroundRegs( CallerRegs );
}

void WaitForPRXSetup( void )
{
 PROXIMVARIABLES far *NewPRXVariables;
 WORD wSegNewVars
 WORD wOffNewVars;
 int iSizeNewVariables = 0;

 DelThread( iPRXSetupThreadIdx );
 iPRXSetupThreadIdx = SMD_NOACTIVETHREAD;

 if ( lpfnPRXCallBack != NULL )
 {
  AX( PRX_CBPRXVARIABLES );
  ( *lpfnPRXCallBack )();

  _asm
  {
   or  ax,ax
   jnz error

   mov iSizeNewVariables, cx
   mov wSegNewVars, es
   mov wOffNewVars, si
  error:
  }

  if ( iSizeNewVariables > 0 )
  {
   NewPRXVariables = MK_FP( wSegNewVars
wOffNewVars );

   if ( iSizeNewVariables <= sizeof ( PRXVariables
) )
     PRXVariables = *NewPRXVariables;
  }
 }
}

APIFUNCRET ProximDriverUnload( struct REGW
*CallerRegs )
{
 lpfnPRXCallBack = NULL;

 CallerRegs->ax = ERR_SUCCESS;

 SetForegroundRegs( CallerRegs );
}

APIFUNCRET NetConfigData( struct REGW
*CallerRegs )
{
 PROXIMNETCONFIGDATA far *pPRXNetConfig =
  ( PROXIMNETCONFIGDATA far * )MK_FP(
CallerRegs->es,
CallerRegs->si );

 if ( CallerRegs->cx <= sizeof (
PROXIMNETCONFIGDATA ) )
 {
   pPRXNetConfig->nDomainID =
UIConfigData.nDomainID;
   CallerRegs->ax = ERR_SUCCESS;
 }
 else
   CallerRegs->ax = ( WORD )ERR_INTERNAL;

 SetForegroundRegs( CallerRegs );
}

APIFUNCRET XchgRevInfo( struct REGW
*CallerRegs )
{
 PROXIMVERSIONINFO far *NewPRXVersionInfo;

 if ( CallerRegs->cx <= sizeof (
PROXIMVERSIONINFO ) )
 {
   NewPRXVersionInfo = MK_FP( CallerRegs->es,
CallerRegs->di );

   PRXVersionInfo.wMajorVersion =
GEN_SMMAJORVERSIONNUM;
   PRXVersionInfo.wMinorVersion =
GEN_SMMINORVERSIONNUM;
   PRXVersionInfo.lpszModuleName = ( LPSTR
)szSMModuleName;

   CallerRegs->es = SEG( &PRXVersionInfo );
   CallerRegs->si = OFF( &PRXVersionInfo );

   CallerRegs->ax = ERR_SUCCESS;
 }
 else
   CallerRegs->ax = ( WORD )ERR_INTERNAL;

 SetForegroundRegs( CallerRegs );
}

int NotifySuspend( void )
{
 if ( lpfnPRXCallBack == NULL )
   return ( ERR_INTERNAL );

 AX( PRX_CBSUSPEND );
 return ( ( *lpfnPRXCallBack )() );
}

int NotifyResume( void )
{
 if ( lpfnPRXCallBack == NULL )
   return ( ERR_INTERNAL );

 AX( PRX_CBRESUME );
 return ( ( *lpfnPRXCallBack )() );
}

int SetSecurityID( char *szNewSecurityID )
{
 if ( lpfnPRXCallBack == NULL )
   return ( ERR_INTERNAL );

 _asm
 {
   mov ax, PRX_CBSETSECUREID
   push ds
   pop es
   mov si, szNewSecurityID
 }

 return ( ( *lpfnPRXCallBack )() );
}

BOOL IsSynchronized( void )
{
 BOOL fNewSynchronizeFlag;

 if ( PRXVariables.lpszSynchronizeFlag == NULL )
   return ( ERR_INTERNAL );

 PCB_BEGINCRITICAL;
 fNewSynchronizeFlag = ( BOOL
)*PRXVariables.lpszSynchronizeFlag;
 PCB_ENDCRITICAL;

 return ( fNewSynchronizeFlag );
}

LPSTR GetRomVersion( void )
{
 LPSTR lpszNewRomVersion;

 if ( PRXVariables.lpszRomVersion == NULL )
   return ( NULL );

 PCB_BEGINCRITICAL;
 lpszNewRomVersion = ( LPSTR
)PRXVariables.lpszRomVersion;
 PCB_ENDCRITICAL;

 return ( lpszNewRomVersion );
}

int GetLinkQuality( void )
{
 int iNewLinkQuality;

 if ( PRXVariables.lpszLinkQuality == NULL )
   return ( ERR_INTERNAL );

 PCB_BEGINCRITICAL;
 iNewLinkQuality = ( int
)*PRXVariables.lpszLinkQuality;
 PCB_ENDCRITICAL;

 return ( iNewLinkQuality );
}

#if defined( _MSC_VER )
#pragma warning( default : 4704 )
#endif

Copr. 1995 Zenith Data Systems Corp

#include "zr.h"
#include "sio.h"
#include "lt2.h"
#include "spawn.h"
#include "sparm.h"
#include "hm.h"
#include "sm.h"

#if defined( _MSC_VER )
#pragma warning( disable : 4704 )
#endif

static BYTE bGearIdx = 0;

static ZDSTRAPREC      SCSTrapRec;
static CALLREC         SCSRecvMsgRec;
static CALLREC         SCSEventLoopRec;
static BOOL            fSCSActive = FALSE;
static BOOL            fMonStatus = FALSE;
static BOOL            fLocalKbdStatus = FALSE;
static BOOL            fHostControlRequested =
FALSE;
static BOOL            fConnectRequested;
static BYTE            fSendPMRetryDone = FALSE;
static BYTE            fWaitVidUnblockActive =
FALSE;
static BYTE            fBadVideoMsgRecv = FALSE;

static BOOL            fUpdatingConnectStatus =
FALSE;

static int             iSetMonDone = FALSE;
static int             iSetMemDone = FALSE;
static int             iFullRepaintDone = FALSE;
static int             iFreeMemPercent = 0;
static BYTE            nOSKType;
static BYTE            fRepaintRequired = FALSE;
static CONNERROR       nConnectErrorCode =
SCS_NOCONNERROR;
static PRIVATEMSGBUFF  RecvPrMsgBuff;
static PRIVATEMSGBUFF  SendPrMsgBuff;
static SYSTEMSTATUSBUFF SystemStatusBuff;
static int             iSCOSErrNo;
static int             iTempThreadIdx;
static int             iSUIThreadIdx;
static int             iFileMonThreadIdx;
static int             iDiscoThreadIdx;
static int             iHostControlThreadIdx;
static int             iCancelConnectThreadIdx;
static int             iOkThreadIdx;
static int             iPMRetryThreadIdx =
SMD_NOACTIVETHREAD;
static int             iWaitVidUnblockThreadIdx =
SMD_NOACTIVETHREAD;
static FARCALLENTRY    lpfnFarCallEntry = NULL;

static char            *szHostFileName = NULL;

static APIFUNC aAPIFuncTable[] =
{
 { SMI_SCSLOADING, SCSLoading },
 { SMI_SLLOADSUI, SLLoadSUI },
 { SMI_SLENABLEKBD, SLEnableKbd },
 { SMI_SLGETFRAMETYPE, SLGetFrameType },
 { SMI_SLDEFINEOLDVIDVECTOR,
SLDefineOldVidVector },
 { SMI_SLGETMLIDSTATUS, SLGetMLIDStatus },
 { SMI_UNLOADOSK, UnloadOSK },
 { SMI_CHANGETOBADVIDEO,
ChangeToBadVideo },
 { SMI_REQNOTIFYDOSWIN, NotifyDosWin },
 { SMI_REQUNIOCCCLOSE, NotifyUniOccClose },
 { SMI_ACKFLASHBREAK, AckFlashBreak },
 { SMI_ACKTOTALFILES, AckTotalFlashFiles },
 { SMI_ACKPATHASSTRING, AckPathFlashFile },
 { SMI_ACKACTIVEUPDATE, AckActiveUpdate },
 { SMI_ACKOCCDEFINE, AckOccDefine },
 { SMI_ACKOCCCLOSE, AckOccClose },
 { 0, 0 }
};

BOOL GetUpdatingConnectStatus( void )
{
 return ( fUpdatingConnectStatus );
}

void SetUpdatingConnectStatus( BOOL fNewStatus )
{
 fUpdatingConnectStatus = fNewStatus;
}

APIFUNC *GetSCSFuncTable( void )
{
 return ( aAPIFuncTable );
}

void SetSCSActiveStatus( BOOL fNewSCSActive )
{
 fSCSActive = fNewSCSActive
}

BOOL GetSCSActiveStatus( void )
{
 return ( fSCSActive );
}

void SetConnectRequested( BOOL
fNewConnectRequested, BYTE
nUpdateIcon )
{
 if ( ( fConnectRequested = fNewConnectRequested
) ==
 SCS_CONNECTREQUESTED )
 {
   if ( nUpdateIcon == SCS_UPDATEICON )
     SetWaitingIcon( SBS_WAITINGICONON, TRUE
 );
 }
 else
 {
   if ( nUpdateIcon == SCS_UPDATEICON )
     SetWaitingIcon( SBS_WAITINGICONOFF,
 TRUE );
 }
}

BOOL GetConnectRequested( void )
{
 return ( fConnectRequested );
}

NPSTR GetPrivateMsgBuff( int *iBuffLen )
{
 *iBuffLen = RecvPrMsgBuff.iBuffLen;

 return ( RecvPrMsgBuff.sMsgBuff );
}

char GetConnectErrCode( void )
{
 return ( nConnectErrorCode );
}

int GetSCOSErrNo( BYTE nClearError )
{
 int iNewSCOSErrNo = 0;

 PCB_BEGINCRITICAL;
 iNewSCOSErrNo = iSCOSErrNo;

 if ( nClearError == SCS_CLEARERROR )
   iSCOSErrNo = 0;

 PCB_ENDCRITICAL;

 return ( iNewSCOSErrNo );
}

void SetFullRepaint( int iNewFullRepaintDone )
{
 iFullRepaintDone = iNewFullRepaintDone;
}

void InitSCSTrapRec( void )
{
 fill_char( ( NPSTR )&SCSTrapRec, 0, sizeof(
ZDSTRAPREC ) );

 SCSTrapRec.tr.tr_int = SMI_SCSINTNUM;
 SCSTrapRec.tr.tr_asm_srv = 2;

 strcpy( SCSTrapRec.szSMAfterSignature,
szSMSignature );
}

TRAPREC *GetSCSTrapRec( void )
{
```

```
return ( &SCSTrapRec.tr );
}

void InitSCSCallRec( void )
{
 DWORD dwCallService = ( DWORD )( FARPROC
)SCSEventLoopService;

 fil_chr( ( NPSTR )&SCSEventLoopRec, 0, sizeof(
CALLREC ) );

 SCSEventLoopRec.cFarCallOpCode = ( BYTE
)SMD_CALLOPCODE;
 SCSEventLoopRec.aCallBack[0] = LOBYTE(
LOWORD( dwCallService )
);
 SCSEventLoopRec.aCallBack[1] = HIBYTE(
LOWORD( dwCallService )
);
 SCSEventLoopRec.aCallBack[2] = LOBYTE(
HIWORD( dwCallService )
);
 SCSEventLoopRec.aCallBack[3] = HIBYTE(
HIWORD( dwCallService )
);
 SCSEventLoopRec.cFarRetOpCode = ( BYTE
)SMD_RETOPCODE;
 strcpy( SCSEventLoopRec.szSMAfterSignature,
SIG_SMSIGNATURE );

 dwCallService = ( DWORD )( FARPROC
)SCSRecvMsgService;
 mem_cp( ( PVOID )&SCSEventLoopRec, ( PVOID
)&SCSRecvMsgRec,
sizeof ( CALLREC ) );
 SCSRecvMsgRec.aCallBack[0] = LOBYTE(
LOWORD( dwCallService ) );
 SCSRecvMsgRec.aCallBack[1] = HIBYTE(
LOWORD( dwCallService ) );
 SCSRecvMsgRec.aCallBack[2] = LOBYTE(
HIWORD( dwCallService ) );
 SCSRecvMsgRec.aCallBack[3] = HIBYTE(
HIWORD( dwCallService ) );
}

void FAR SCSEventLoopService( void )
{
 _asm
 {
   or   ah,ah
   jnz  process
   jmp  exit

 process
   cli

   push  ds
   push  ax
   push  bx
   push  cx
   push  dx
   push  si
   push  di
   mov   ds,cs:000Ah
 };

 PushEventNum( SMI_SCSEVENTNUM );
 lpfnFarCallEntry = MK_FP( _ccode, _fcall_entry );

 _asm
 {
   pop  di
   pop  si
   pop  dx
   pop  cx
   pop  bx
   pop  ax
   mov  al,ah
   xor  ah,ah
   add  ax, SMI_EVENTLOOPBASE

   sti

   call [lpfnFarCallEntry]

   pop  ds
 };

exit
 return,
}

void FAR SCSRecvMsgService( void )
{
 _asm
 {
   cli

   push  ds
   push  ax
   push  bx
   push  cx
   push  dx
   push  si
   push  di
   mov   ds,cs:000Ah
};

PushEventNum( SMI_SCSEVENTNUM );
lpfnFarCallEntry = MK_FP( _ccode, _fcall_entry );

_asm
{
  pop  di
  pop  si
  pop  dx
  pop  cx
  pop  bx
  pop  ax

  push dx
  rcp  ds
  mov  ax, [di]
  add  ax, SMI_PRIMSGBASE

  mov  ds,cs:000Ah


  sti

  call [lpfnFarCallEntry]

  pop  ds
 };
}

APIFUNCRET SCSLoading( struct REGW
*CallerRegs )
{
 CallerRegs->ax = 0x0001;

 CallerRegs->bx = SEG( &SCSRecvMsgRec );
 CallerRegs->si = OFF( &SCSRecvMsgRec );
 CallerRegs->dx = SEG( &SCSEventLoopRec );
 CallerRegs->di = OFF( &SCSEventLoopRec );

 CallerRegs->cx = SMD_DISPATFREQ;

 SetForegroundRegs( CallerRegs );

 if ( ( iTempThreadIdx = GetTempEventNum() ) < 0
)
   return;

 AddThread( iTempThreadIdx, ( NEARPROC
)SetupSCOS, NULL,
SMD_ONETIME, FALSE,
          SCS_LOADSCSPOLLFREQ, 0 ).
}

AP:"JNCRET UnloadOSK( struct REGW
*CallerRegs )
{
 int iCurrScrCode = GetCurrScrCode();

 if ( GetSUIReady() && IsOSK( iCurrScrCode ) )
 {
   SetCurrScrCode( iCurrScrCode |
SUI_OSKVIDCHANGEMASK ).
   UnloadSUI( SUI_NOUNLOADSUI ).
 }
}

APIFUNCRET ChangeToBadVideo( struct REGW
*CallerRegs )
{
 if ( GetSCSCallProgress() ==
SMI_SCSCONNECTED )
 {
   fBadVideoMsgRecv = TRUE;
   DiscoDisableConnection();
 }
}

APIFUNCRET NotifyDosWin( struct REGW
*CallerRegs )
{
 int iMsgStatus,

 PCB_BEGINCRITICAL

 if ( ( iMsgStatus = PrepPrivateMessage(
CallerRegs ) ) ==
ERR_SUCCESS )
   SetHostMode( ( int )*RecvPriMsgBuff.sMsgBuff );

 PCB_ENDCRITICAL

 if ( iMsgStatus == ERR_SUCCESS )
   SendPrivateMessage(
PMI_ACKNOTIFYDOSWIN, 0, NULL );

 SetForegroundRegs( CallerRegs );
}

APIFUNCRET NotifyUniOccClose( struct REGW
*CallerRegs )
{
 int iMsgStatus,

 PCB_BEGINCRITICAL

 iMsgStatus = PrepPrivateMessage( CallerRegs );

 PCB_ENDCRITICAL

 if ( iMsgStatus == ERR_SUCCESS )
 {
   TRACE( "NOTICE: Received UNI close PM,
closing OSK\r" );
   SendPrivateMessage( PMI_ACKUNIOCCCLOSE,
0, NULL );

   if ( IsOSK( GetCurrScrCode() ) )
   {
     SetCurrScrCode( GetCurrScrCode() |
SUI_OSKUNICLOSEMASK );
     UnloadSUI( SUI_NOUNLOADSUI );
   }
 }

 SetForegroundRegs( CallerRegs );
}

APIFUNCRET AckFlashBreak( struct REGW
*CallerRegs )
{
 PCB_BEGINCRITICAL

 if ( PrepPrivateMessage( CallerRegs ) ==
ERR_SUCCESS )
   SetTmpFilePercent( *( int *
)RecvPriMsgBuff.sMsgBuff );

 PCB_ENDCRITICAL

 SetForegroundRegs( CallerRegs );
}

APIFUNCRET AckTotalFlashFiles( struct REGW
*CallerRegs )
{
 PCB_BEGINCRITICAL

 if ( PrepPrivateMessage( CallerRegs ) ==
ERR_SUCCESS )
   SetTotalFlashFiles( *( int *
)RecvPriMsgBuff.sMsgBuff );

 PCB_ENDCRITICAL

 SetForegroundRegs( CallerRegs );
}

APIFUNCRET AckPathFlashFile( struct REGW
*CallerRegs )
{
 PCB_BEGINCRITICAL

 if ( PrepPrivateMessage( CallerRegs ) ==
ERR_SUCCESS )
   SetPathFlashFile( ( LPSTR
)RecvPriMsgBuff.sMsgBuff );

 PCB_ENDCRITICAL

 SetForegroundRegs( CallerRegs );
}

APIFUNCRET AckActiveUpdate( struct REGW
*CallerRegs )
{
 PCB_BEGINCRITICAL

 if ( PrepPrivateMessage( CallerRegs ) ==
ERR_SUCCESS )
 {
   if ( RecvPriMsgBuff.iBuffLen > 1 )
     SetNameActiveUpdate( ( LPSTR
)RecvPriMsgBuff.sMsgBuff );
   else
     SetNameActiveUpdate( ( LPSTR )NULL );
 }

 PCB_ENDCRITICAL

 SetForegroundRegs( CallerRegs ).
}

APIFUNCRET AckOccDefine( struct REGW
*CallerRegs )
{
 PCB_BEGINCRITICAL

 if ( PrepPrivateMessage( CallerRegs ) ==
ERR_SUCCESS )
 {
   if ( RecvPriMsgBuff.iBuffLen > 1 )
   {
     if ( LOBYTE( *( int * )RecvPriMsgBuff.sMsgBuff
) == TRUE )
       SetOccDefineAcked( PMI_ACKEDTRUE );
     else
       SetOccDefineAcked( PMI_ACKEDFALSE );
   }
   else
     SetOccDefineAcked( PMI_ACKEDFALSE );
 }

 PCB_ENDCRITICAL

 SetForegroundRegs( CallerRegs );
}

APIFUNCRET AckOccClose( struct REGW
*CallerRegs )
{
 PCB_BEGINCRITICAL

 if ( PrepPrivateMessage( CallerRegs ) ==
ERR_SUCCESS )
 {
   if ( RecvPriMsgBuff.iBuffLen > 1 )
   {
     if ( LOBYTE( *( int * )RecvPriMsgBuff.sMsgBuff
) == TRUE )
       SetOccCloseAcked( PMI_ACKEDTRUE );
     else
       SetOccCloseAcked( PMI_ACKEDFALSE );
   }
   else
     SetOccCloseAcked( PMI_ACKEDFALSE );
 }

 PCB_ENDCRITICAL

 SetForegroundRegs( CallerRegs ).
}

int PrepPrivateMessage( struct REGW *CallerRegs )
{
 int iReturn;
 LPSTR lpsRecvMsg = ( LPSTR )MAKELONG(
CallerRegs->di,
CallerRegs->dx ).

 fil_chr( ( PVOID )&RecvPriMsgBuff, 0, sizeof(
RecvPriMsgBuff )
);

 if ( lpsRecvMsg != NULL && CallerRegs->bx <
SCS_MAXLENMSGBUFF )
 {
   fmem_cp( ( LPSTR )lpsRecvMsg, ( LPSTR
)&RecvPriMsgBuff.iMsgID, CallerRegs->bx );
   CallerRegs->ax = 1;
   iReturn = 0;

#if !defined( PROD )
   sprintf( szTempStr, "NOTICE: Received Private
Message
#:%d\r", RecvPriMsgBuff.iMsgID );
   TRACE( szTempStr );
   sprintf( szTempStr, "NOTICE: First byte of the
Private
Message: %d\r", *RecvPriMsgBuff.sMsgBuff );
   TRACE( szTempStr );
#endif
 }
 else
 {
   CallerRegs->ax = 0;
   iReturn = ERR_INTERNAL;
 }

 return ( iReturn );


}

void SetupSCOS( void )
{
 REG_W InArgs, OutArgs,

 if ( iTempThreadIdx >= 0 )
```

```
{
  DelThread( iTempThreadIdx );
  iTempThreadIdx = -1;
}

fill_chr( ( NPSTR )&SystemStatusBuff, 0, sizeof (
SystemStatusBuff ) );
fill_chr( ( NPSTR )&inArgs, 0, sizeof ( inArgs ) );

inArgs.ax = ( WORD
)SCS_SETUPSYSSTATBUFF;
inArgs.dx = SEG( &SystemStatusBuff );
inArgs.di = OFF( &SystemStatusBuff );

intm( &inArgs, &OutArgs, SCS_INTNUM );

SetupSCOSErrNo( &iSCOSErrNo );

SetSCSActiveStatus( TRUE );
}

int SetupSCOSErrNo( int FAR *iMemLocation )
{
  REG_W inArgs, OutArgs;

  fill_chr( ( NPSTR )&inArgs, 0, sizeof ( inArgs ) );

  inArgs.ax = SCS_ERRNOLOCATION;
  inArgs.es = SEG( iMemLocation );
  inArgs.bx = OFF( iMemLocation );

  intm( &inArgs, &OutArgs, SCS_INTNUM );

  if ( OutArgs.ax != ERR_SUCCESS )
    return ( ERR_INTERNAL );

  return ( ERR_SUCCESS );
}

int BlockSCOSVideo( BYTE fVideoStatus )
{
  REG_W inArgs, OutArgs;

  inArgs.ax = SCS_SCOSVIDEO | ( fVideoStatus ?
SCS_SCOSVIDBLOCK :
SCS_SCOSVIDUNBLOCK );

  intm( &inArgs, &OutArgs, SCS_INTNUM );

  if ( OutArgs.ax != ERR_SUCCESS )
    return ( ERR_INTERNAL );

  return ( ERR_SUCCESS );
}


int DoHostControlMode( BOOL fHostControlStatus )
{
  if ( GetSCSCallProgress() ==
SMI_SCSDISCONNECTED )
    return ( ERR_INTERNAL );

  if ( ( iHostControlThreadIdx = GetTempEventNum()
) < 0 )
    return ( ERR_INTERNAL );

  AddThread( iHostControlThreadIdx,
WaitForHostControl, NULL,
SMD_MANYTIMES, FALSE,
        SCS_HOSTCTRLPOLLFREQ,
SCS_HOSTCTRLMAXRETRY );

  if ( fHostControlStatus )
  {
    if ( SendPrivateMessage(
PMI_REQHOSTCONTROL, 0, NULL ) !=
ERR_SUCCESS )
      return ( ERR_INTERNAL );
  }

  fHostControlRequested = TRUE;

  SetWaitingIcon( SBS_WAITINGICONON, TRUE );
}

void WaitForHostControl( void )
{
  static BYTE fDisconnectRequested = FALSE;

  if ( !fDisconnectRequested )
  {
    DiscoDisableConnection();
    fDisconnectRequested = TRUE;
  }

  if ( GetSCSCallProgress() ==
SMI_SCSDISCONNECTED )
    DelThread( iHostControlThreadIdx );
  else if ( GetRetryLimit( iHostControlThreadIdx ) ==
0 )
  {
    DelThread( iHostControlThreadIdx );
    DoSuspend( TRUE );
  }
}

int MakeTheConnection( BOOL fNewMonStatus,
BOOL
fNewLocalKbdStatus )
{
  int iHostVersionNum = GetCurrHostVersionNum();
  char *szCurrNodeAddress =
GetCurrNodeAddress();

  if ( *szCurrNodeAddress == NULL ||
iHostVersionNum == 0 )
    return ( ERR_INTERNAL );

  if ( iHostVersionNum < MAKEWORD(
GEN_HMEXPMINORVERSIONNUM,
GEN_HMEXPMAJORVERSIONNUM ) )
  {
    SMVideoBusy( DoVersionMsgBox );
    return ( ERR_SUCCESS );
  }

  SetConnectRequested(
SCS_CONNECTREQUESTED, SCS_UPDATEICON
);

  if ( GetSUIReady() )
    SMVideoBusy( DoExecConnect );
  else
  {
    if ( SMDosBusy( CBExecConnect ) !=
ERR_SUCCESS )
      return ( ERR_INTERNAL );
  }

  return ( ERR_SUCCESS );
}

void DoVersionMsgBox( void )
{
  char szTempStr[ STR_STRMAXLENERR ];

  sprintf( szTempStr, STR_SUIHOSTVERTOOLOW,
szSMVersionName );
  OpenMessageBox( szTempStr, 0,
SUI_CENTERJUSTIFIED, SUI_OK );
}

int ResumeTheConnection( void )
{
  if ( IsPWRequired() )
    DoMessageBox( NULL, SUI_LOGIN,
SUI_LEFTJUSTIFIED, SUI_OK |
SUI_CANCEL,
          CBLoginButtonPressed,
SUI_LOGINTIMEOUT );
  else
  {
    OpenMessageBox( STR_SUIRESUMINGCONN,
0, SUI_LEFTJUSTIFIED, 0
);

    *etConnectRequested(
SC- _CONNECTREQUESTED,
SCS_NOUPDATEICON
);

    if ( ( iCancelConnectThreadIdx =
GetTempEventNum() ) ==
ERR_INTERNAL )
      return( ERR_INTERNAL );

    TimerManager( TF_SET,
iCancelConnectThreadIdx, 30L );

    AddThread( iCancelConnectThreadIdx,
WaitForCancelConnect,
NULL, SMD_MANYTIMES,
          FALSE, SUI_CANCELCONNPOLLFREQ,
SUI_CANCELCONNMAXRETRY );

    if ( SMDosBusy( CBExecConnect ) !=
ERR_SUCCESS )
      return( ERR_INTERNAL );
  }

  return ( ERR_SUCCESS );
}

void CBLoginButtonPressed( int iButtonCode )
{
  if ( iButtonCode == SUI_OK )
  {
    SetConnectRequested(
SCS_CONNECTREQUESTED,
SCS_NOUPDATEICON
);

    OpenMessageBox( STR_SUIRESUMINGCONN2,
0, SUI_LEFTJUSTIFIED, 0
);

    if ( ( iCancelConnectThreadIdx =
GetTempEventNum() ) ==
ERR_INTERNAL )
      return;

    TimerManager( TF_SET,
iCancelConnectThreadIdx, 30L );

    AddThread( iCancelConnectThreadIdx,
WaitForCancelConnect,
NULL, SMD_MANYTIMES,
          FALSE, SUI_CANCELCONNPOLLFREQ,
SUI_CANCELCONNMAXRETRY );

    SMDosBusy( CBExecConnect );
  }
  else
    CBMsgBoxButtonPressed( iButtonCode );
}

void CBMsgBoxButtonPressed( int iButtonCode )
{
  int iActionCode = GetCurrActionCode();

  HideMessageBox();

  if ( iActionCode == SUI_LASTCONNECTION ||
iActionCode ==
SUI_BADVIDEOMSG )
    SMVideoBusy( DoNextScreen );

}

void DoNextScreen( void )
{
  LoadSUI( SUI_SPECIFIEDSCREEN,
SUI_HOSTSELECTION );
}

void DoExecConnect( void )
{
  SMDosBusy( CBExecConnect );
}

void CBExecConnect( void )
{
  REG_W inArgs, OutArgs;
  RPARM *SCSRParm;
  char *szCurrNodeAddress =
GetCurrNodeAddress();
  char *szCurrHostName = GetLBHost( -1 );

  nConnectErrorCode = SCS_NOCONNERROR;

  if ( ( SCSRParm = ( RPARM * )malloc( sizeof (
RPARM ) ) ) ==
NULL )
    return;

  fill_chr( ( NPSTR )SCSRParm, 0, sizeof( RPARM )
);

  SCSRParm->rpterrntyp = 0;
  SCSRParm->rpprotocol = SCS_SPX;

  strcpy( SCSRParm->rpinternet,
szCurrNodeAddress );

  if ( IsPWRequired() )
  {
    strcpy( SCSRParm->rpdopw, szPassword );
    strcpy( SCSRParm->rpdoid,
SCS_STRDEFUSERID );

    UIConfigData.bLastConnPassword = TRUE;

  }
  else
    UIConfigData.bLastConnPassword = FALSE;


#if defined( IPTEST )
#pragma message( "Warning: IP Address is fixed "
)
  strcpy( SCSRParm->rpinternet,
"000000000020A60010E6" );
#endif

#if !defined( PROD )
  sprintf( szTempStr, "NOTICE: pw - %s\r\n      uid -
%s\r\n
nid - %s\r\n", SCSRParm->rpdopw,
        SCSRParm->rpdoid, SCSRParm->rpinternet
);
  TRACE( szTempStr );
#endif

  inArgs.ax = SCS_SMAKECON;
  inArgs.es = SEG( SCSRParm );
  inArgs.bx = OFF( SCSRParm );

  SetSCSAbortFlag( FALSE );
  SetMsgBoxReturnCode( SUI_NOBUTTONS );

  _and_isr_flg( ~SMD_SCHEDULERS );

  intm( &inArgs, &OutArgs, SCS_INTNUM );

  DelThread( iCancelConnectThreadIdx );

  SetConnectRequested(
SCS_NOCONNECTREQUESTED,
SCS_NOUPDATEICON
);

  if ( OutArgs.ax == SCS_ACCEPTED ||
      GetSCOSErrNo( SCS_RETAINERROR ) ==
SCS_NOLOGINERROR )
  {
    nConnectErrorCode = SCS_NOCONNERROR;
    strcpy( UIConfigData.szLastNodeAddress,
szCurrNodeAddress );
    strcpy( UIConfigData.szLastHostName,
szCurrHostName );
    SetCurrHostName( szCurrHostName );

    if ( ( iSUIThreadIdx = GetTempEventNum() ) ==
ERR_INTERNAL )
      return;

    AddThread( iSUIThreadIdx, ( NEARPROC
)WaitForSUIUnload, NULL,
          SMD_POLLED, FALSE,
SCS_WAITSUIPOLLFREQ, 0 );

    AddThread( SCS_DISCOEVENTNUM,
WaitForStatusChange, NULL,
          SMD_POLLED, FALSE,
SCS_DISCOPOLLFREQ, 0 );

    UnloadSUI( SUI_NOUNLOADSUI );
  }
  else
  {
    SetWaitingIcon( SBS_WAITINGICONOFF,
SCS_UPDATEICON );

    *UIConfigData.szLastNodeAddress = NULL;

    if ( nConnectErrorCode ==
SCS_NOCONNERROR )
      nConnectErrorCode = TranslateConnectError();

    switch ( nConnectErrorCode )
    {
      case SCS_ERRTIMEOUT:
        DoMessageBox(
STR_SUICONNECTTIMEOUT, 0,
SUI_CENTERJUSTIFIED, SUI_OK,
CBMsgBoxButtonPressed, 0 );
        break;

      case SCS_ERRPASSWORD:
        DoMessageBox(
STR_SUIPASSWORDREJECTED, 0,
SUI_CENTERJUSTIFIED, SUI_OK,
CBMsgBoxButtonPressed, 0 );
        break;

      case SCS_ERRLOGINID:
        DoMessageBox(
STR_SUILOGINIDREJECTED, 0,
SUI_CENTERJUSTIFIED, SUI_OK,
CBMsgBoxButtonPressed, 0 );
        break;

      case SCS_ERRUNSUPVIDMODE:
        DoMessageBox( STR_SUIUNSUPVIDMODE,
0,
SUI_CENTERJUSTIFIED, SUI_OK,
CBMsgBoxButtonPressed, 0 );
```

```
      break;

    case SCS_ERRUSERABORT:
      CBMsgBoxButtonPressed( SUI_CANCEL );
      break;

    case SCS_ERRUNKNOWN:
    default:
      DoMessageBox(
STR_SUICONNECTERRUNKNOWN, 0,
SUI_CENTERJUSTIFIED, SUI_OK,
CBMsgBoxButtonPressed, 0 );
      break;
   }
  }

  free( SCSRParm );
}

void WaitForCancelConnect( void )
{
  static int iWaitForSUI = 0;

  if ( GetMsgBoxReturnCode() == SUI_CANCEL )
    nConnectErrorCode = SCS_ERRUSERABORT;
  else if ( GetRetryLimit( iCancelConnectThreadidx )
== 0 )
    nConnectErrorCode = SCS_ERRTIMEOUT;

  if ( nConnectErrorCode != SCS_NOCONNERROR
)
  {
    SetSCSAbortFlag( TRUE );
    DelThread( iCancelConnectThreadidx );
  }

  if (TimerManager (TF_CHECK,
iCancelConnectThreadidx, 0) ==
TIMEOUT_FIRED)
  {
    switch (iWaitForSUI)
    {
      case 0:
      TimerManager (TF_RESET,
iCancelConnectThreadidx, 0);

      HideMessageBox ();

      if (TimerManager (TF_CHECK,
iCancelConnectThreadidx, 0L) ==
TIMEOUT_AVAILABLE)
      {
        TimerManager (TF_SET,
iCancelConnectThreadidx, 1L);
        iWaitForSUI = 1;
      }
      break;

      case 1:
      TimerManager (TF_RESET,
iCancelConnectThreadidx, 0);

      OpenMessageBox( STR_SUIRESUMINGCONN,
0, SUI_LEFTJUSTIFIED,
SUI_CANCEL );

      iWaitForSUI = 0;
      break;
    }
  }

  }

void WaitForStatusChange( void )
{
  static char nOldVideoMode = -1;
  char nCurrVideoMode = GetCurrVidMode();
  int iCurrScrCode;
  int nSUIStatus;

  if ( nOldVideoMode == -1 )
    nOldVideoMode = nCurrVideoMode;

  if ( GetSCSCallProgress() ==
SMI_SCSDISCONNECTED )
  {
    nSUIStatus = GetSUIStatus();

    if ( fHostControlRequested || ( DoSuspend(
TRUE ) !=
ERR_SUCCESS ) )
    {
      fHostControlRequested = FALSE;

      if ( nSUIStatus != SMI_SUIUNLOADING &&
nSUIStatus !=
SMI_SUIDEACTIVATING )
      {
        DelThread( SCS_DISCOEVENTNUM );
        SetCurrHostName( szNullStr );
        SetWaitingIcon( SBS_WAITINGICONOFF,
TRUE );

        if ( IsSetupDlg( GetCurrScrCode() ) )
          UpdateSUIConnectStatus();
        else
        {

          if ( fBadVideoMsgRecv )
          {
            fBadVideoMsgRecv = FALSE;

            LoadSUI( SUI_BADVIDEOMSG,
SUI_NOSCREEN );
          }
          else
            LoadSUI( SUI_SPECIFIEDSCREEN,
SUI_HOSTSELECTION );
        }
      }
    }
  }
  else
  {
    iCurrScrCode = GetCurrScrCode();

    if ( nCurrVideoMode != nOldVideoMode )

    {
      if ( GetSUIReady() &&
          IsOSK( iCurrScrCode ) &&
!IsOSKAsSetupDlg(
iCurrScrCode ) )
        UnloadSUI( SUI_NOUNLOADSUI );
    }
  }

  nOldVideoMode = nCurrVideoMode;
}

void WaitForSUIUnload( void )
{
  if ( !GetSUIReady() )
    DelThread( iSUIThreadidx );
}

int SetMonitor( BOOL fNewMonStatus, BOOL
fNewLocalKbdStatus )
{
  iSetMonDone = ERR_INPROGRESS;

  if ( !GetSCSActiveStatus() )
    return ( ERR_INTERNAL );

  if ( GetSCSCallProgress() !=
SMI_SCSCONNECTED )
    iSetMonDone = ERR_SUCCESS;
  else
  {
    fMonStatus = fNewMonStatus;
    fLocalKbdStatus = fLocalKbdStatus;

    if ( SMDosBusy( CBExecMonitor ) !=
ERR_SUCCESS )
    {
      iSetMonDone = ERR_INTERNAL;
      return ( ERR_INTERNAL );
    }
  }

  return ( ERR_SUCCESS );
}

void CBExecMonitor( void )
{
  REG_W InArgs, OutArgs;

  InArgs.ax = ( fMonStatus ? SCS_MONITORON :
SCS_MONITOROFF );
  InArgs.ax |= ( fLocalKbdStatus ?
SCS_LOCALKBDON :
SCS_LOCALKBDOFF );

  SetReentrancy( FALSE );
  intx( &InArgs, &OutArgs, SCS_INTNUM );
  SetReentrancy( TRUE );

  if ( OutArgs.ax == SCS_ACCEPTED )
  {
    nConnectErrorCode = SCS_NOCONNERROR;
    iSetMonDone = ERR_SUCCESS;
  }
  else
  {
    nConnectErrorCode =
SCS_ERRFULLSCRPAINT;
    iSetMonDone = ERR_SUCCESS;
    TRACE( "ERROR: CoSession monitor call was
not accepted.
Reported as accepted anyway.\r" );
  }
}

int CheckMonitor( void )
{
  return ( iSetMonDone );
}

int SetSCSMemory( int iNewFreeMemPercent, int
iNewOSKType, BYTE
nDosBusy )
{
  iSetMemDone = ERR_INPROGRESS;
  nOSKType = LOBYTE( iNewOSKType );

  if ( !GetSCSActiveStatus() )
    return ( ERR_INTERNAL );

  iFreeMemPercent = iNewFreeMemPercent;

  if ( nDosBusy == SMI_SCSWAITFORDOS )
  {
    if ( SMDosBusy( CBExecSCSMemory ) != 0 )
      return ( ERR_INTERNAL )
  }
  else
    CBExecSCSMemory();

  return ( ERR_SUCCESS );
}

void CBExecSCSMemory( void )
{
  REG_W InArgs, OutArgs;

  if ( nOSKType == SUI_WINDOWSOSK )
    InArgs.ax = SCS_FREEOSKMEM;
  else
    InArgs.ax = SCS_FREEMEM;

  InArgs.dx = iFreeMemPercent;

#if !defined( PROD )
  sprintf( szTempStr, "NOTICE: Memory call
number#: %x,
requesting allocation of %d%% of SRWIN
memory.\r",
        InArgs.ax, InArgs.dx );
  TRACE( szTempStr );
#endif

  SetReentrancy( FALSE );
  intx( &InArgs, &OutArgs, SCS_INTNUM );
  SetReentrancy( TRUE );

  if ( OutArgs.ax == SCS_ACCEPTED )
    iSetMemDone = ERR_SUCCESS;
  else
    iSetMemDone = ERR_INTERNAL;
}

BOOL CheckSCSMemory( void )
{
  return ( iSetMemDone );
}



int RequestFullRepaint( BYTE fRepaintRequired,
WORD wScreenCode )
{
  iFullRepaintDone = ERR_INPROGRESS;


  if ( !GetSCSActiveStatus() )
    return ( ERR_INTERNAL );

  if ( IsOSKWinGraphics( wScreenCode ) )
  {
    TRACE( "NOTICE: Closing the Windows Host No
Paint Zone\r" );

    if ( CloseHostOcclude() != ERR_SUCCESS )

    {
      TRACE( "NOTICE: Attempt to close No Paint
Zone on Host
failed, continuing anyway\r" );
      return ( iFullRepaintDone = ERR_SUCCESS );

    }
  }
  else
  {
    TRACE( "NOTICE: Closing the DOS or DOS
Graphics occlusion
region\r" );

    if ( SetSCSHostOcclude( ( OCCLUDEUNION *
)NULL,
SUI_NOOCCTYPE, fRepaintRequired ) !=
ERR_SUCCESS )
    {
      TRACE( "ERROR: an error occured in calling
SetSCSHostOcclude(), continuing anyway\r" );
      return ( iFullRepaintDone = ERR_SUCCESS );
    }
  }

  return ( ERR_SUCCESS );
}



int CheckFullRepaint( void )
{
  return ( iFullRepaintDone );
}

int DiscoDisableConnection( void )
{
  if ( !GetSCSActiveStatus() )
    return ( ERR_INTERNAL );

  if ( ( iDiscoThreadidx = GetTempEventNum() ) < 0
)
    return ( ERR_INTERNAL );

  AddThread( iDiscoThreadidx, WaitForDisco, NULL,
SMD_ONETIME,
FALSE,
          1, 0 );

  SetWaitingIcon( SBS_WAITINGICONON, TRUE );

  return ( ERR_SUCCESS );
}

void WaitForDisco( void )
{
  REG_W InArgs, OutArgs;

  DelThread( iDiscoThreadidx );

  InArgs.ax = SCS_DISCODISABLECON;

  intx( &InArgs, &OutArgs, SCS_INTNUM );

}

int SendPrivateMessage( int iMsgID, int iBuffLen,
char *sMsgBuff
)
{
  REG_W InArgs, OutArgs;

  fl_chr( &InArgs, 0, sizeof ( InArgs ) );
  fl_chr( &SendPriMsgBuff, 0, sizeof (
SendPriMsgBuff ) );

  SendPriMsgBuff.iMsgID = iMsgID;

  if ( ( SendPriMsgBuff.iBuffLen = iBuffLen ) > 0 )
    mem_cp( sMsgBuff, SendPriMsgBuff.sMsgBuff,
iBuffLen );
  InArgs.ax = SCS_SENDPRIMSG;

  InArgs.ds = SEG( &SendPriMsgBuff );
  InArgs.di = OFF( &SendPriMsgBuff );

  InArgs.bx = SendPriMsgBuff.iBuffLen + sizeof (
SendPriMsgBuff.iBuffLen ) +
          sizeof ( SendPriMsgBuff.iMsgID );

#if !defined( PROD )
  sprintf( szTempStr, "NOTICE: Sent Private
Message #:%d\r",
SendPriMsgBuff.iMsgID );
  TRACE( szTempStr );
#endif

  intx( &InArgs, &OutArgs, SCS_INTNUM );

  if ( OutArgs.ax != SCS_ACCEPTED )
  {
    TRACE( "ERROR: CoSession Send Private
Message function
returned an error\r" );
```

```
}

 return ( OutArgs.ax == SCS_ACCEPTED ?
ERR_SUCCESS :
ERR_INTERNAL );
}

void WaitForSendPM( void )
{
 REG_W InArgs, OutArgs;

 InArgs.ax = SCS_SENDPRIMSG;

 InArgs.bx = SEG( &SendPrMsgBuff );
 InArgs.di = OFF( &SendPrMsgBuff );

 InArgs.bx = SendPrMsgBuff.iBuffLen + sizeof (
SendPrMsgBuff.iBuffLen ) +
        sizeof ( SendPrMsgBuff.iMsgID );

#if !defined( PROD )
 sprintf( szTempStr, "NOTICE: Sent Private
Message #:%d\r",
SendPrMsgBuff.iMsgID );
 TRACE( szTempStr );
#endif

 intn( &InArgs, &OutArgs, SCS_INTNUM );

 if ( OutArgs.ax == SCS_ACCEPTED )
 {
  TRACE( "NOTICE: Send PM retry succeeded\r" );

  PCB_BEGINCRITICAL;

  SendPrMsgBuff.iMsgID = 0;

  PCB_ENDCRITICAL;
 }
 else
  TRACE( "NOTICE: Send PM retry failed\r" );

 if ( GetRetryLimit( iPMRetryThreadIdx ) == 0 ||
SendPrMsgBuff.iMsgID == 0 )
 {
  TRACE( "NOTICE: Send PM retry thread
expired\r" );
  DelThread( iPMRetryThreadIdx );
  iPMRetryThreadIdx = SMD_NOACTIVETHREAD;

  PCB_BEGINCRITICAL;
  fSendPMRetryDone = TRUE;
  PCB_ENDCRITICAL;
 }
}


int GetSCSCallProgress( void )
{
 BYTE nCallProgress;
 PCB_BEGINCRITICAL
 nCallProgress = SystemStatusBuff.nCallProgress;
 PCB_ENDCRITICAL

 return ( nCallProgress );
}

int GetSCSProtocolId( void )
{
 BYTE nProtocolId

 PCB_BEGINCRITICAL
 nProtocolId = SystemStatusBuff.nProtocolId;
 PCB_ENDCRITICAL

 return ( nProtocolId );
}

int GetSCSVideoMode( void )
{
 BYTE nCurrentVidMode;

 PCB_BEGINCRITICAL
 nCurrentVidMode =
SystemStatusBuff.nCurrentVidMode;
 PCB_ENDCRITICAL

 return ( nCurrentVidMode );
}

void SetSCSAbortFlag( BYTE fNewAbortRequest )
{
 PCB_BEGINCRITICAL
 SystemStatusBuff.fAbortRequestConnect =
fNewAbortRequest;
 PCB_ENDCRITICAL

}

int ReceiveHostFile( char *szHostFileName, LPSTR
sFileBuff, LONG
lFileSize )
{
 REG_W InArgs, OutArgs;

 fi_chr( (NPSTR )&InArgs, 0, sizeof ( InArgs ) );

 InArgs.ax = SCS_XFERFILE |
SCS_TOSARATOGA;
 InArgs.ds = SEG( szHostFileName );
 InArgs.si = OFF( szHostFileName );
 InArgs.es = SEG( sFileBuff );
 InArgs.di = OFF( sFileBuff );
 InArgs.dx = HIWORD( lFileSize );
 InArgs.cx = LOWORD( lFileSize );

#if !defined( FLASHTEST )
 intn( &InArgs, &OutArgs, SCS_INTNUM );

 return ( OutArgs.ax == SCS_ACCEPTED ?
ERR_SUCCESS :
ERR_INTERNAL );
#else
 return ( ERR_SUCCESS );
#endif
}

int SendUDHotIcon( int iHotIconID )
{
 int iScanCodeIdx, iNumCodes;
 int iReturn = ERR_SUCCESS;
 BYTE nHiScanByte, nLoScanByte;
 SCANCODE *pScanCodes;

 if ( iHotIconID == PND_UDEF1 )
  pScanCodes = UIConfigData.aUDHotIcon1;
 else
  pScanCodes = UIConfigData.aUDHotIcon2;

 iNumCodes = GetNumScanCodes( pScanCodes );

 for ( iScanCodeIdx = 0; iScanCodeIdx <
iNumCodes;
++iScanCodeIdx )
 {
  if ( ( nHiScanByte = HIBYTE( pScanCodes[
iScanCodeIdx
].wScanCode ) ) > 0 )
  {
   if ( SendScanCode( nHiScanByte ) ==
ERR_INTERNAL )
   {
    iReturn = ERR_INTERNAL;
    break;
   }
  }

  if ( ( nLoScanByte = LOBYTE( pScanCodes[
iScanCodeIdx
].wScanCode ) ) > 0 )
  {
   if ( SendScanCode( nLoScanByte ) ==
ERR_INTERNAL )
   {
    iReturn = ERR_INTERNAL;
    break;
   }
  }
 }

 return ( iReturn );
}

int GetNumScanCodes( SCANCODE FAR
*pScanCodes )
{
 int iNumCodes, iScanCodeIdx;

 for ( iNumCodes = 0, iScanCodeIdx = 0;
iScanCodeIdx <
SUI_MAXNUMSCANCODES;
     ++iScanCodeIdx )
 {
  if ( LOBYTE( pScanCodes[ iScanCodeIdx
].wScanCode ) == 0 )
   break;

  iNumCodes++;
 }

 return ( iNumCodes );
}

int SendScanCode( BYTE nScanCode )
{
 REG_W InArgs, OutArgs;

 PCB_BEGINCRITICAL;

 fi_chr( (NPSTR )&InArgs, 0, sizeof ( InArgs ) );

 InArgs.ax = MAKEWORD( nScanCode, HIBYTE(
SCS_SENDKBDSCANCODE )
);

 intn( &InArgs, &OutArgs, SCS_INTNUM );

 PCB_BEGINCRITICAL;

 return ( OutArgs.ax );
}

int SendLockKbdMouse( BOOL bLocked )
{
 if ( bLocked )
  return ( SendPrivateMessage(
PMI_REQSCSLOCKKBMO, 0, NULL ) );
 else
  return ( SendPrivateMessage(
PMI_REQSCSUNLOCKKBMO, 0, NULL )
);
}

int SendDimScreen( BOOL bDimmed )
{
 if ( bDimmed )
  return ( SendPrivateMessage(
PMI_REQSCSBLANKSCR, 0, NULL ) );
 else
  return ( SendPrivateMessage(
PMI_REQSCSUNBLANKSCR, 0, NULL )
);
}

CONNERROR TranslateConnectError( void )
{
 switch ( ( SCOSCONNERROR )GetSCOSErrNo(
SCS_CLEARERROR ) )
 {
  case SCS_PASSWORDREJECTED:
   return ( SCS_ERRPASSWORD );

  case SCS_LOGINIDREJECTED:
  case SCS_LOGINUSERREJECTED:
   return ( SCS_ERRLOGINID );

  case SCS_REMOTEDISCONNECTED:
  case SCS_RESPONSETIMEOUT:
   return ( SCS_ERRTIMEOUT );

  case SCS_UNSUPPORTEDVIDMODE:
   return ( SCS_ERRUNSUPVIDMODE );

  default:
   return ( SCS_ERRUNKNOWN );
 }
}

#if defined( _MSC_VER )
#pragma warning( default : 4704 )
#endif
Copr. 1995 Zenith Data Systems Corp.
#include "sr.h"
#include "sio.h"
#include "k2.h"
#include "spawn.h"
#include "rperm.h"
#include "hm.h"
#include "sm.h"

#if defined( _MSC_VER )
#pragma warning( disable : 4704 )
#endif

int SetSCSBusyStatus( int iNewStatus )
{
 REG_W InArgs, OutArgs;

 fi_chr( (NPSTR )&InArgs, 0, sizeof ( InArgs ) );

 InArgs.ax = iNewStatus;

#if !defined( PROD )
 if ( iNewStatus == SCS_SETBUSY )
  TRACE( "NOTICE: Attempting to set the SCS
busy flag\r" );
 else
  TRACE( "NOTICE: Attempting to set the SCS
idle flag\r" );
#endif

 intn( &InArgs, &OutArgs, SCS_INTNUM );

 return ( OutArgs.ax == SCS_ACCEPTED ?
ERR_SUCCESS :
ERR_INTERNAL );
}

int SetSCSFullRepaint( void )
{
 REG_W InArgs, OutArgs;

 fi_chr( (NPSTR )&InArgs, 0, sizeof ( InArgs ) );

 InArgs.ax = SCS_FULLREPAINT;

 TRACE( "NOTICE: Requesting full repaint from
SCSV" );

 intn( &InArgs, &OutArgs, SCS_INTNUM );

 return ( OutArgs.ax == SCS_ACCEPTED ?
ERR_SUCCESS :
ERR_INTERNAL );
}

int SetSCSScrolling( BYTE nScrollStatus )
{
 REG_W InArgs, OutArgs;

 fi_chr( (NPSTR )&InArgs, 0, sizeof ( InArgs ) );

 InArgs.ax = SCS_SETSCROLLING | nScrollStatus;

#if !defined( PROD )
 if ( nScrollStatus == SCS_DISABLESCROLL )
  TRACE( "NOTICE: Requesting the disabling of
scroll from
SCSV" );
 else
  TRACE( "NOTICE: Requesting the enabling of
scroll from SCSV"
);
#endif

 intn( &InArgs, &OutArgs, SCS_INTNUM );

 return ( OutArgs.ax == SCS_ACCEPTED ?
ERR_SUCCESS :
ERR_INTERNAL );
}

int SetSCSOcclude( OCCLUDEUNION *occ, int
iOccType )
{
 REG_W InArgs, OutArgs;

 fi_chr( (NPSTR )&InArgs, 0, sizeof ( InArgs ) );

 if ( occ != NULL )
 {
  switch ( iOccType )
  {
   case SUI_NOOCCTYPE:
   case SUI_OCCDOSTEXT:
    InArgs.bx = AbsToZero(
occ->occText.yULRow );
    InArgs.cx = AbsToZero( occ->occText.xULCol
);
    InArgs.si = occ->occText.yLRRow;

    InArgs.di = occ->occText.xLRCol;
    break;

   case SUI_OCCDOSGRAPHICS:
    InArgs.bx = AbsToZero(
occ->occDosGraph.xULDos );
    InArgs.cx = AbsToZero(
occ->occDosGraph.yULDos );
    InArgs.si = occ->occDosGraph.xLRDos;
    InArgs.di = occ->occDosGraph.yLRDos;
    break;

   default:
    return ( ERR_INTERNAL );
  }
 }
 else
  TRACE( "NOTICE: Clipping region at zero\r" );

 InArgs.ax = SCS_OCCLUDE2;

 TRACE( "NOTICE: Requesting the establishment
of a clipping
region from SCSV" );

 intn( &InArgs, &OutArgs, SCS_INTNUM );

 return ( OutArgs.ax == SCS_ACCEPTED ?
ERR_SUCCESS :
ERR_INTERNAL );
}

int DefineSCSOcclude( OCCLUDEUNION *occ, int
iOccType, BYTE
```

```
fRepaint )
{
  if ( SetSCSSaraStatus( SCS_SETBUSY ) !=
ERR_SUCCESS )
  {
    TRACE( "ERROR: Attempt to secure SCS busy
flag failed\r" );
    return ( ERR_SCSBUSY );
  }

  if ( SetSCSOcclude( occ, lOccType ) !=
ERR_SUCCESS )
  {
    TRACE( "ERROR: Attempt to define SCS
clipping region
failed\r" )
    return ( ERR_SCSOCCFAILED );
  }

  if ( occ == NULL )
  {
    if ( SetSCSScrolling( SCS_ENABLESCROLL ) !=
ERR_SUCCESS )
    {
      TRACE( "ERROR: Attempt to enable scrolling
failed\r" );
      return ( ERR_SCSSCROLLING );
    }
  }
  else
  {
    if ( SetSCSScrolling( SCS_DISABLESCROLL ) !=
ERR_SUCCESS )
    {
      TRACE( "ERROR: Attempt to disable scrolling
failed\r" );
      return ( ERR_SCSSCROLLING );
    }
  }

  if ( SetSCSSaraStatus( SCS_SETIDLE ) !=
ERR_SUCCESS )
  {
    TRACE( "ERROR: Attempt to secure SCS busy
flag failed\r" );
    return ( ERR_SCSIDLE );
  }

  if ( fRepaint )
  {
    if ( SetSCSFullRepaint() != ERR_SUCCESS )
    {
      TRACE( "ERROR: Repaint request in SCS
failed\r" );
      return ( ERR_SCSFULLREPAINT );
    }
  }

  TRACE( "NOTICE: Occlusion region definition for
DOS Text or
Graphics was successful\r" );

  return ( ERR_SUCCESS );
}

#if defined( _MSC_VER )
#pragma warning( default : 4704 )
#endif

Copr. 1995 Zenith Data Systems Corp
#include "cr.h"
#include "sio.h"
#include "k2.h"
#include "spawn.h"
#include "rparm.h"
#include "hm.h"
#include "sm.h"

#if defined( _MSC_VER )
#pragma warning( disable : 4704 )
#endif

static int iSLLoadThreadIdx;
static LONG lOldVidVector;


LONG GetOldVidVector( void )
{
  return ( lOldVidVector );
}

APIFUNCRET SLDefineOldVidVector( struct REGW
*CallerRegs )
{
  TRAPREC *tr = GetVIOTrapRec();

  lOldVidVector = MAKELONG( CallerRegs->bx,
CallerRegs->dx );

  PCB_BEGINCRITICAL;

  tr->tr_old_int = lOldVidVector;

  PCB_ENDCRITICAL;
}

APIFUNCRET SLEnableKbd( struct REGW
*CallerRegs )
{
  EnableKbdAfterBoot();
}

APIFUNCRET SLGetFrameType( struct REGW
*CallerRegs )
{
  CallerRegs->ax = ( WORD
)UIConfigData.nFrameType;

  SetForegroundRegs( CallerRegs );
}

APIFUNCRET SLGetMLIDStatus( struct REGW
*CallerRegs )
{
  CallerRegs->ax = GetPRXActiveStatus();

  SetForegroundRegs( CallerRegs );
}

APIFUNCRET SLLoadSUI( struct REGW
*CallerRegs )
{
  if ( ( iSLLoadThreadIdx = GetTempEventNum() ) <
0 )
    return;

  AddThread( iSLLoadThreadIdx, ( NEARPROC
)CBExecLoadSUI, NULL,
SMD_ONETIME, FALSE,
          SMI_SLPOLLFREQ, 0 );
}

void CBExecLoadSUI( void )
{
  DelThread( iSLLoadThreadIdx );

  InitSaratoga( SBS_SUILOADING );

  if ( GetEEPROMInited() )
  {
    TRACE( "NOTICE: Beginning pen calibration due
to EEPROM
initialization\r" );
    LoadSUI( SUI_DOPENCALIBRATION,
SUI_NOSCREEN );
  }
  else
  {
    if ( !IsNodeAddressBlank(
UIConfigData.szLastNodeAddress ) &&

        GetSystemResumeBit() )
      LoadSUI( SUI_LASTCONNECTION,
SUI_NOSCREEN );
    else
      LoadSUI( SUI_SPECIFIEDSCREEN,
SUI_HOSTSELECTION );
  }

  ClearSystemResumeBit();
}

#if defined( _MSC_VER )
#pragma warning( default : 4704 )
#endif
Copr. 1995 Zenith Data Systems Corp.
#include "cr.h"
#include "spawn.h"
#include "k2.h"
#include "sio.h"
#include "sm.h"



int SortList(int wTotalEntries, int wEntrySize, int
wPrimeOffset,
          int wSecondOffset, char *cpEntryBuff)
{
  int winnerLoop;
  int wOutLoop;
  int winnerOffset;
  int wOutOffset;
  int wResult;

  if( (wTotalEntries == 0) || (wEntrySize == 0) ||
(wPrimeOffset
== wSecondOffset)
    || (wPrimeOffset >= wEntrySize) ||
(wSecondOffset >=
wEntrySize)
    || (wPrimeOffset < 0 ) || (wSecondOffset < 0) )
    return(ERR_INVALIDPARM);

  wOutOffset = 0;
  for(wOutLoop = 0; wOutLoop < (wTotalEntries - 1);
wOutLoop++)
  {
    winnerOffset = wOutOffset + wEntrySize;
    for(winnerLoop = (wOutLoop + 1); winnerLoop <
wTotalEntries;
winnerLoop++)
    {

wResult=stricmp(cpEntryBuff+wOutOffset+wPrimeOff
set,
cpEntryBuff+winnerOffset+wPrimeOffset);
      if(wResult > 0)
        SwapEntries(cpEntryBuff+wOutOffset,
cpEntryBuff+winnerOffset, wEntrySize);
      if(wResult == 0)
      {

wResult=stricmp(cpEntryBuff+wOutOffset+wSecond
Offset,
cpEntryBuff+winnerOffset+wSecondOffset);
        if(wResult > 0)
          SwapEntries(cpEntryBuff+wOutOffset,
cpEntryBuff+winnerOffset, wEntrySize);
      }
      winnerOffset = winnerOffset + wEntrySize;
    }
    wOutOffset = wOutOffset + wEntrySize;
  }
  return(ERR_SUCCESS);
}

int SwapEntries(char *cpEntry1, char *cpEntry2, int
wEntrySize)
{
  char cSwapBuff[SRT_MAXLENSWAPBUFF];
  int wRestSize;
  int wCopyUnit;

  if( wEntrySize <= 0 )
    return(ERR_INVALIDPARM);

  wRestSize = wEntrySize;
  do
  {
    if(wRestSize >= SRT_MAXLENSWAPBUFF)
      wCopyUnit = SRT_MAXLENSWAPBUFF;
    else
      wCopyUnit = wRestSize;
    mem_cp(cpEntry1+(wEntrySize-wRestSize),
cSwapBuff,
wCopyUnit);
    mem_cp(cpEntry2+(wEntrySize-wRestSize),
cpEntry1+(wEntrySize-wRestSize), wCopyUnit);
    mem_cp(cSwapBuff,
cpEntry2+(wEntrySize-wRestSize),
wCopyUnit);
    wRestSize -= SRT_MAXLENSWAPBUFF;
  } while (wRestSize > 0);

  return(ERR_SUCCESS);
}

long GetEntryOffset(int wTotalEntries, int
wEntrySize, int
wKeyOffset,
          int wKeyNumber, char *cpEntryBuff)
{
  int wLoop;
  int wKeyCount;
  int wOffset;

  if( (wTotalEntries == 0) || (wEntrySize == 0) ||
(wKeyNumber
== 0)
    || (wKeyOffset >= wEntrySize) || (wKeyOffset < 0
)
    || (wKeyNumber > wTotalEntries) )
    return((long)ERR_INVALIDPARM);

  wKeyCount=1;
  wOffset=0;

  if(wKeyCount == wKeyNumber)
    return(0L);

  for(wLoop = 1; wLoop < wTotalEntries; wLoop++)
  {
    if( (stricmp(cpEntryBuff+wOffset+wKeyOffset,
cpEntryBuff+wOffset+wEntrySize+wKeyOffset)) != 0)
      wKeyCount++;
    wOffset = wOffset + wEntrySize;
    if(wKeyCount == wKeyNumber)
      return((long)wOffset);
  }

  return((long)ERR_INVALIDPARM);
}
Copr. 1995 Zenith Data Systems Corp


#include "cr.h"
#include "sio.h"
#include "spawn.h"
#include "k2.h"
#include "sm.h"

#if defined( _MSC_VER )
#pragma warning( disable : 4704 )
#endif

static TRAPREC        SUIMouseTrapRec;
static CALLREC        SUICallRec;
static SUICB          lpfnTempProc;
static SUIACTIONCODE  ActionCode = 0;
static DWORD          dwOldSUIIntVec;
static int            iTempThreadIdx;
static int            iPrepSUIThreadIdx;
static int            iUnloadSUIThreadIdx;
static int            iCleanupSUIThreadIdx;
static WORD           pJmpBuf[ 5 ];
static BOOL           fVideoBlocked = FALSE;
static char           nSUIStatus =
SMI_SUINOTLOADED;
static BYTE           nResidentStatus;
static WORD           wSUIPSP;
static WORD           wSavedSP;
static WORD           wSavedBP;
static CURRHOSTNAME   CurrHostName;

static APIFUNC nAPIFuncTable[] =
{
  { SMI_SETCONTRAST, GetSetContrast },
  { SMI_SETBRIGHTNESS, GetSetBrightness },
  { SMI_CALIBUPLEFT, CalibratePen },
  { SMI_CALIBCANCEL, CalibrateCancel },
  { SMI_SETAUTOSHUTOFF, GetSetAutoShutOff },
  { SMI_SETSLEEPTIME, GetSetSleepTime },
  { SMI_REBOOTHOST, RebootHost },
  { SMI_ACTIVEUPDATE, RequestActiveUpdate },

  { SMI_DOUPDATE, DoUpdate },
  { SMI_UPDATEHOSTLIST, UpdateHostList },
  { SMI_GETHOSTLISTSTAT, GetHostListStatus },
  { SMI_GETCONNECTSTAT, GetConnectStatus },
  { SMI_REQUESTCONNECT, RequestConnDisco },
  { SMI_GETPASSWORDSTAT, GetPasswordStatus
},
  { SMI_LBSETNETGROUP, LBGetSetNetGroup },
  { SMI_LBSETNETHOST, LBGetSetNetHost },
  { SMI_LBSETNETFRAMETYPE,
LBGetSetNetFrameType },
  { SMI_SETCONNECTTYPE, GetSetConnectType
},
  { SMI_SETPASSWORD, GetSetPassword },
  { SMI_UPDATEDIMLOC, UpdateDimentLoc },
  { SMI_REQUESTUNLOAD, RequestUnload },
  { SMI_SETMSGBOXRETCODE,
SetSUIMBRetCode },
  { SMI_SETUILANGUAGE, GetSetUILanguage },
  { SMI_SETACTIVESTAT, SetActiveStatus },
  { SMI_SETKEYSTROKE, SetKeyStroke },
  { SMI_GETKEYBOARDSTAT, GetKeyBoardStatus
},
  { SMI_GETABOUTDIALOG, GetAboutDialog },
  { SMI_SETUDHOTICON, GetSetUDHotIcon },
  { SMI_SETSECURITYID, GetSetSecurityID },
  { SMI_SETDOMAINID, GetSetDomainID },
  { SMI_SETLOCKKBDMOUSE,
GetSetLockKbdMouse },
  { SMI_SETDIMSCREEN, GetSetDimScreen },
  { SMI_SETVIDEOBLOCK, BlockUnblockVideo },
  { SMI_NOTIFYSCRCODE, NotifyScreenCode },
  { 0, 0 }
};

APIFUNC *GetSUIFuncTable( void )
{
  return ( nAPIFuncTable );
}

CALLREC FAR *GetSUICallRec( void )
{
  return ( ( CALLREC FAR * )&SUICallRec );
}

TRAPREC *GetSUIMouseTrapRec( void )
{
  SUIMouseTrapRec.tr_int = PND_INTNUM;
  SUIMouseTrapRec.tr_sem_srv =
CRU_REFLECTINT;
```

```
 return ( &SUIMouseTrapRec );
}

int GetCurrActionCode( void )
{
 return ( ActionCode );
}

WORD GetCurrScrCode( void )
{
 return ( wScreenCode );
}

void SetCurrScrCode( WORD wNewScreenCode )
{
 wScreenCode = wNewScreenCode;
}

char GetSUIStatus( void )
{
 return ( nSUIStatus );
}

void InitSUICallRec( void )
{
 DWORD dwCallService = ( DWORD )( FARPROC
)SUICallService,
 ti_chrl ( NPSTR )&SUICallRec, 0, sizeof(
CALLREC ) );

 SUICallRec.cFarCallOpCode =
SMD_CALLOPCODE;
 SUICallRec.aCallBack[0] = LOBYTE( LOWORD(
dwCallService ) );
 SUICallRec.aCallBack[1] = HIBYTE( LOWORD(
dwCallService ) );
 SUICallRec.aCallBack[2] = LOBYTE( HIWORD(
dwCallService ) );
 SUICallRec.aCallBack[3] = HIBYTE( HIWORD(
dwCallService ) );
 SUICallRec.cFarRetOpCode =
SMD_RETOPCODE;
 strcpy( SUICallRec.szSMAfterSignature,
SIG_SMSIGNATURE );

 dwOldSUIIntVec = set_int_vec( SMI_SUIINTNUM,
( DWORD )( (
FARPROC )&SUICallRec ) );
}

void RestoreOldSUIIntVec( void )
{
 set_int_vec( SMI_SUIINTNUM, dwOldSUIIntVec );
}

BOOL GetSUIReady( void )
{
 return ( lpfnSUICallBack != ( SUICB )NULL &&
nSUIStatus ==
SMI_SUILOADED );
}

APIFUNCRET SetActiveStatus( struct REGW
*CallerRegs )
{
 PCB_BEGINCRITICAL
 lpfnSUICallBack = ( SUICB )MK_FP(
CallerRegs->dx,
CallerRegs->si )
 PCB_ENDCRITICAL

 wSUIPSP = get_cur_psp();

 CallerRegs->ax = SUI_PARTIALDIALOGSET,
 SetForegroundRegs( CallerRegs );

 nSUIStatus = SMI_SUILOADED;
}

APIFUNCRET RequestUnload( struct REGW
*CallerRegs )
{
 if ( *GetRequestHostList() &&
     GetConnectRequested() ==
SCS_NOCONNECTREQUESTED &&
     GetSCSCallProgress() ==
SMI_SCSCONNECTED )
 {
  CallerRegs->ax = SMI_UNLOADACCEPTED,
  UnloadSUI( SUI_NOUNLOADSUI );
 }
 else
  CallerRegs->ax = SMI_UNLOADDENIED;

 SetForegroundRegs( CallerRegs );
}

APIFUNCRET RequestConnDisco( struct REGW
*CallerRegs )
{
 if ( GetConnectRequested() )
  CallerRegs->ax = ERR_SUCCESS;
 else
 {
  if ( IsGetFunction( CallerRegs ) )
  {
   if ( GetSCSCallProgress() ==
SMI_SCSCONNECTED )
    CallerRegs->ax = DiscoDisableConnection();
   else
    CallerRegs->ax = ( WORD )ERR_INTERNAL;
  }
  else
  {
   if ( GetLBCurrHost() ==
HLD_NOHOSTSELECTED )
   {
    OpenMessageBox(
STR_SUINOHOSTSELECTED, 0,
SUI_CENTERJUSTIFIED, SUI_OK );
    CallerRegs->ax = ( WORD )ERR_INTERNAL,
   }
   else
    CallerRegs->ax = MakeTheConnection( TRUE,
FALSE );
  }
 }

 SetForegroundRegs( CallerRegs );
}

APIFUNCRET GetConnectStatus( struct REGW
*CallerRegs )
{
 char *szHostName,
 int iCallProgress;
 int iProtocolId,
 int iReturn;

 if ( !GetSCSActiveStatus() )
 {
  iReturn = ERR_NOTSUPPORTED;
  goto exit;
 }

 iProtocolId = GetSCSProtocolId();
 iCallProgress = GetSCSCallProgress();

 ti_chrl( &CurrHostName, 0, sizeof(
CURRHOSTNAME ) );
 CurrHostName.lpszHostName = szNullStr;

 BuffHead.iStructLen = sizeof( CURRHOSTNAME
);
 BuffHead.iBuffLen = sizeof( CURRHOSTNAME );
 BuffHead.Buff = ( LPVOID )&CurrHostName;

 CallerRegs->dx = SEG( &BuffHead );
 CallerRegs->si = OFF( &BuffHead );

 switch ( iCallProgress )
 {
  case SMI_SCSCONNECTED:
   iReturn = SMI_CONNECTED;

   if ( ( szHostName = GetCurrHostName() ) !=
NULL )
    CurrHostName.lpszHostName = ( LPSTR
)szHostName,
   break;

  case SMI_SCSWAITINGFORCONNECT:
   iReturn = SMI_CONNECTED;
   break;

  case SMI_SCSDIALING:
   iReturn = SMI_CONNECTED;
   break;

  case SMI_SCSLOGGINGIN:
   iReturn = SMI_LOGGINGIN;
   break;

  case SMI_SCSDISCONNECTED:
   iReturn = SMI_DISCONNECTED;
   break;

  default:
   iReturn = ERR_INTERNAL;
   break;
 }

 CallerRegs->ax = iReturn;

 switch ( iProtocolId )
 {
  case SMI_SCSNETWARESPX:
   iReturn = SMI_NETWARESPX;
   break;

  case SMI_SCSASYNC:
   iReturn = SMI_MODEM;
   break;

  default:
   iReturn = ERR_INTERNAL;
   break;
 }

exit:
 CallerRegs->bx = iReturn;
 SetForegroundRegs( CallerRegs );
}

APIFUNCRET BlockUnblockVideo( struct REGW
*CallerRegs )
{
 PCB_BEGINCRITICAL;
 fVideoBlocked = IsGetFunction( CallerRegs );
 PCB_ENDCRITICAL;

 CallerRegs->ax = BlockSCOSVideo( ( BYTE
)fVideoBlocked );

 SetForegroundRegs( CallerRegs );
}

BOOL GetVideoBlocked( void )
{
 return ( fVideoBlocked );
}


int LoadSUI( SUIACTIONCODE NewActionCode,
WORD wNewScreenCode )
{
 WORD wCurrVidMode,
 BYTE nCurrHostMode;

 if ( NewActionCode == SUI_LASTOSKSCREEN )
 {
  if ( IsNoScreen( UIConfigData.nLastOSKScreen )
)
    wNewScreenCode = SUI_BIGALPHA;
   else
    wNewScreenCode =
UIConfigData.nLastOSKScreen;
 }
 else if ( NewActionCode ==
SUI_LASTSETUPDLGSCREEN )
 {
  if ( IsNoScreen(
UIConfigData.nLastSetupDlgScreen ) )
    wNewScreenCode = SUI_HOSTSELECTION;
   else
    wNewScreenCode =
UIConfigData.nLastSetupDlgScreen;
 }

 if ( ( IsSetupDlg( wScreenCode ) && IsSetupDlg(
wNewScreenCode
) ) ||
     ( IsOSK( wScreenCode ) && IsOSK(
wNewScreenCode ) ) )
   return ( ERR_INTERNAL );
  else if ( IsSetupDlg( wScreenCode ) && IsOSK(
wNewScreenCode )
)
   return ( ERR_INTERNAL );

 ActionCode = NewActionCode;

 if ( nSUIStatus == SMI_SUINOTLOADED )
  nSUIStatus = SMI_SUILOADING;

 if ( GetSUIReady() )
  wOldScreenCode = wScreenCode;

 if ( ( iPrepSUIThreadIdx = GetTempEventNum() )
== ERR_INTERNAL
)
   return ( ERR_INTERNAL );

 AddThread( iPrepSUIThreadIdx, WaitForPrepSUI,
NULL, SMD_POLLED,
FALSE,
          SUI_LOADSUIPOLLFREQ, 0 ),

 wScreenCode = wNewScreenCode;

 if ( IsOSK( wScreenCode ) )
 {
  wCurrVidMode = GetCurrVidMode(),
  nCurrHostMode = GetCurrHostMode(),

  if ( IsOSKVideoSupported( wCurrVidMode ) &&
nCurrHostMode ==
PND_DOSAPP )
     wScreenCode |=
SUI_OSKASSETUPDIALOGMASK;

  if ( wCurrVidMode != SUI_TEXTVIDMODE &&
nCurrHostMode !=
PND_DOSAPP )
     wScreenCode |=
SUI_OSKINWINGRAPHICSMASK,
 }

 return ( ERR_SUCCESS ),
}



void WaitForPrepSUI( void )
{
 static PREPSUISTATES iStatePrepSUI =
SUI_NOPREPSTATE,
 int iCheck;

 switch ( iStatePrepSUI )
 {
  case SUI_NOPREPSTATE.
   if ( IsSetupDlg( wScreenCode ) || IsNoScreen(
wScreenCode )
)
    {

     TRACE( "NOTICE: Setup Dialogs or No
Screen'
requested.\r" );

     SetMonitor( FALSE, TRUE ),
     iStatePrepSUI = SUI_CHECKMONITOROFF;


    }
    else if ( IsOSKAsSetupDlg( wScreenCode ) )
    {
     TRACE( "NOTICE. OSK as Setup Dialog
requested \r" );
     SetMonitor( FALSE, FALSE );
     iStatePrepSUI = SUI_CHECKMONITOROFF;


    }
    else
    {
     TRACE( "NOTICE: DOS or Windows OSK
requested, nothing
else to do\r" );
     iStatePrepSUI = SUI_PREPSUCCESS;
    }
    break;

   case SUI_CHECKMONITOROFF:
    iCheck = CheckMonitor();

    if ( iCheck == ERR_SUCCESS )
    {
     if ( IsOSKAsSetupDlg( wOldScreenCode ) )
     {
      TRACE( "NOTICE: Monitor off complete, old
screen - OSK
as setup dialog\r" );
      iStatePrepSUI = SUI_PREPSUCCESS;
     }
     else if ( IsOSK( wOldScreenCode ) )
     {
      TRACE( "NOTICE: Monitor off complete, old
screen -
OSK\r" );
      RequestFullRepaint( FALSE,
wOldScreenCode );
      iStatePrepSUI = SUI_CHECKFULLREPAINT;
     }
     else
     {
      TRACE( "NOTICE: Monitor off complete, no
old screen\r"
);
      iStatePrepSUI = SUI_PREPSUCCESS;
     }
    }
    else if ( iCheck == ERR_INTERNAL )
     iStatePrepSUI = SUI_PREPERROR;
    break;

   case SUI_CHECKFULLREPAINT:
    iCheck = CheckFullRepaint|);

    if ( iCheck == ERR_SUCCESS )
    {
```

```
      TRACE( "NOTICE: Occlusion region in SCOS
closed through
Full Repaint\r" );
        iStatePrepSUI = SUI_PREPSUCCESS;
      }
      else if ( iCheck == ERR_INTERNAL )
      {
        TRACE( "ERROR: Closure of occlusion region
failed in SCOS
through Full Repaint\r" );
        iStatePrepSUI = SUI_PREPERROR;
      }
      break;

    case SUI_PREPSUCCESS:
      TRACE( "NOTICE: We're here, we're here!\r" );

      InitSUI();
      SMDosBusy( CBExecSUI );
      goto exit;

    case SUI_PREPERROR:
      TRACE( "ERROR: SUI Load Prep failed\r" );

      if ( nSUIStatus == SMI_SUILOADING )
        nSUIStatus = SMI_SUINOTLOADED;
      else
        nSUIStatus = SMI_SUIINACTIVE;

    default:
  exit:
      iStatePrepSUI = SUI_NOPREPSTATE;
      DelThread( iPrepSUIThreadIdx );
      break;
  }
}

void CBExecSUI( void )
{
  int iVideoMode = GetCurrVidMode();

  if ( GetSCSCallProgress() ==
SMI_SCSCONNECTED )
  {
    if ( IsSetupDlg( wScreenCode ) || IsNoScreen(
wScreenCode ) )

    {
      if ( iVideoMode != SUI_INITIALVIDMODE )
        SetVideoMode( SUI_INITIALVIDMODE );
    }
    else
    {
      if ( IsOSKVideoSupported( iVideoMode ) &&
GetCurrHostMode() == PND_DOSAPP )
      {
        SetVideoMode( SUI_INITIALVIDMODE );
      }
    }
  }
  else
    SetVideoMode( SUI_INITIALVIDMODE );

  if ( nSUIStatus == SMI_SUILOADING )
  {
    if ( !at_dos_prompt() )
    {
      _sno_ior_flg( ~SMD_SCHEDULERS );

      if ( JenExec( szSUIExecName, NULL ) !=
ERR_SUCCESS )
      {
        SetVideoMode( SUI_TEXTVIDMODE );
        dsprt( STR_SUILOADERROR1 );
      }
      else
      {
        if ( ( iTempThreadIdx = GetTempEventNum() )
< 0 )
          return;

        AddThread( iTempThreadIdx,
WaitForSUILoad, NULL,
SMD_POLLED, FALSE,
              SUI_LOADSUIPOLLFREQ,
SUI_LOADSUIMAXRETRY );
      }
    }
    else
    {
      SetVideoMode( SUI_TEXTVIDMODE );
      dsprt( STR_SUILOADERROR2 );
    }
  }
  else
  {
    nSUIStatus = SMI_SUILOADED;
    SMDosBusy( CBExecLoadScreen );
  }
}

void WaitForSUILoad( void )
{
  if ( GetSUIReady() )
  {
    DelThread( iTempThreadIdx );
    iTempThreadIdx = SMD_NOACTIVETHREAD;

    SMDosBusy( CBExecLoadScreen );
  }
}

void CBExecLoadScreen( void )
{
  if ( !GetSUIReady() )
    return;

  switch ( ActionCode )
  {
    case SUI_DOPENCALIBRATION:
      SetSetupDlgMode( PND_SETUPDLGON );
      DoMessageBox( NULL,
SUI_PENCALIBRATION, SUI_LEFTJUSTIFIED,
SUI_CANCEL,
              CBMsgBoxButtonPressed, 0 );
      break;

    case SUI_LASTCONNECTION:
      SetSetupDlgMode( PND_SETUPDLGON );
      ResumeTheConnection();
      break;

    case SUI_BADVIDEOMSG:
      SetSetupDlgMode( PND_SETUPDLGON );
      DoMessageBox( STR_SUIBADVIDEOMSG, 0,
SUI_CENTERJUSTIFIED,
SUI_OK,
              CBMsgBoxButtonPressed, 0 );
      break;

    default:
      if ( IsSetupDlg( wOldScreenCode ) )
        SetSetupDlgMode( PND_SETUPDLGOFF );
      else if ( IsOSK( wOldScreenCode ) &&
!IsOSKAsSetupDlg(
wOldScreenCode ) )
        SetOSKMode( NULL, SUI_NOOCCTYPE );

      if ( IsSetupDlg( wScreenCode ) ||
IsOSKAsSetupDlg(
wScreenCode ) )
        SetSetupDlgMode( PND_SETUPDLGON );
      DoLoadScreen();
      break;
  }
}

void DoLoadScreen( void )
{
  int iNewScreenCode = LOBYTE( wScreenCode );
  int iOSKConfig;
  int xPosOSK, yPosOSK;

  if ( IsSetupDlg( wScreenCode ) || IsNoScreen(
wScreenCode ) )
  {
    iOSKConfig = UIConfigData.nLastOSKDlgScreen;
    xPosOSK = 0;
    yPosOSK = 0;
  }
  else
  {
    iOSKConfig = 0;
    xPosOSK = UIConfigData.xPosLastOSKScreen;
    yPosOSK = UIConfigData.yPosLastOSKScreen;
  }

  if ( !IsNoScreen( wScreenCode ) )
  {
    EnableBusyCursor( SUI_BUSYCURSOROFF );


    PCB_BEGINCRITICAL
    AX( SUI_DISPLAYDIALOG );
    BX( iNewScreenCode );
    CX( iOSKConfig );
    SI( yPosOSK );
    DI( xPosOSK );

    ( *lpfnSUICallBack )();
    PCB_ENDCRITICAL
  }
}

int UnloadSUI( BYTE nNewResidentStatus )
{
  if ( !GetSUIReady() )
    return ( ERR_INTERNAL );

  SetWaitingIcon( SBS_WAITINGICONON, TRUE );

  if ( nNewResidentStatus == SUI_UNLOADSUI )
    nSUIStatus = SMI_SUIUNLOADING;
  else
    nSUIStatus = SMI_SUIDEACTIVATING;

  nResidentStatus = nNewResidentStatus;

  if ( IsNoScreen( wScreenCode ) )
    HideMessageBox();

  if ( ( iUnloadSUIThreadIdx = GetTempEventNum()
) < 0 )
    return ( ERR_INTERNAL );

  AddThread( iUnloadSUIThreadIdx,
WaitForUnloadSUI, NULL,
SMD_POLLED, FALSE,
        SUI_UNLOADSUIPOLLFREQ, 0 );

  if ( GetThreadAddress( SCS_DISCOEVENTNUM )
== NULL )
    AddThread( SCS_DISCOEVENTNUM,
WaitForStatusChange, NULL,
          SMD_POLLED, FALSE,
SCS_DISCOPOLLFREQ, 0 );

  return ( ERR_SUCCESS );
}

void WaitForUnloadSUI( void )
{
  static UNLOADSUISTATES iStateUnloadSUI =
SUI_NOUNLOADSUISTATE;

  switch ( iStateUnloadSUI )
  {
    case SUI_NOUNLOADSUISTATE:
      if ( IsOSK( wScreenCode ) )
      {
        SetEEUIData();
        iStateUnloadSUI = SUI_GETACTIVEUPDATE;
      }
      else
        iStateUnloadSUI =
SUI_UNLOADSUISUCCESS;
      break;

    case SUI_GETACTIVEUPDATE:
      GetActiveUpdate();
      SetTimeLimit( iUnloadSUIThreadIdx,
SUI_PRIMSGPOLLFREQ );
      iStateUnloadSUI = SUI_DIMSCREEN;
      break;

    case SUI_DIMSCREEN:
      TRACE( "NOTICE: In the SUI_DIMSCREEN
state.\r" );
      SendDimScreen( UIConfigData.bDimScreen );
      SetTimeLimit( iUnloadSUIThreadIdx,
SUI_PRIMSGPOLLFREQ );
      iStateUnloadSUI = SUI_LOCKKBDMOUSE;

      break;

    case SUI_LOCKKBDMOUSE:
      TRACE( "NOTICE: In the
SUI_LOCKKBDMOUSE state.\r" );
      SendLockKbdMouse(
UIConfigData.bLockKbdMouse );
      SetTimeLimit( iUnloadSUIThreadIdx,
SUI_LOADSUIPOLLFREQ );
      iStateUnloadSUI =
SUI_UNLOADSUISUCCESS;
      break;

    case SUI_UNLOADSUISUCCESS:
    default:
      DelThread( iUnloadSUIThreadIdx );
      SMDosBusy( CBExecUnloadSUI );
      iStateUnloadSUI = SUI_NOCLEANUPSTATE;
      break;
  }
}

void CBExecUnloadSUI( void )
{
  lpfnTempProc = lpfnSUICallBack;

  if ( IsSetupDlg( wScreenCode ) || IsNoScreen(
wScreenCode ) ||
      IsOSKAsSetupDlg( wScreenCode ) )
    SetSetupDlgMode( PND_SETUPDLGOFF );
  else if ( IsOSK( wScreenCode ) )
    SetOSKMode( NULL, SUI_NOOCCTYPE );

  if ( nResidentStatus == SUI_UNLOADSUI )
    lpfnSUICallBack = NULL;

  PSP_TERMINATE( wSUIPSP ) = ( LONG )(
FARPROC
)SUITerminateAddress;

  _asm
  {
    cli

    mov wSavedSP, sp
    mov wSavedBP, bp
    mov ax, SUI_CLOSEDIALOG
    xor bx,bx
    mov bl, nResidentStatus

    sti
  };

  ( *lpfnTempProc )( );

  if ( nResidentStatus == SUI_NOUNLOADSUI )
    CleanupUnloadSUI();

}

void SUITerminateAddress( void )
{
  _asm
  {
    mov ds, cs:000Ah
    mov ss, cs:000Ah
    mov sp, wSavedSP
    mov bp, wSavedBP
  };

  CleanupUnloadSUI();
}

void CleanupUnloadSUI( void )
{
  MREG MInArgs;

  if ( nResidentStatus == SUI_UNLOADSUI )
  {
    if ( !GetPNDActiveStatus() )
    {
      MInArgs = MEventOutArgs;
      MInArgs.ax = 0x000C;
      mouse( &MInArgs, &MEventOutArgs );
    }
  }

  AddThread( SUI_CLEANUPEVENTNUM,
WaitForCleanupSUI, NULL,
SMD_POLLED, FALSE,
          SUI_LOADSUIPOLLFREQ, 0 );
}

void WaitForCleanupSUI( void )
{
  static CLEANUPSUISTATES iStateCleanupSUI =
SUI_NOCLEANUPSTATE;
  int iCheck;

  switch ( iStateCleanupSUI )
  {
    case SUI_NOCLEANUPSTATE:
      if ( IsSetupDlg( wScreenCode ) || IsNoScreen(
wScreenCode )
||
          IsOSKAsSetupDlg( wScreenCode ) )
      {
        TRACE( "NOTICE: Unload of Setup Dialogs or
OSK-As-Setup-Dialog identified.\r" );
        SetMonitor( TRUE, FALSE );
        iStateCleanupSUI =
SUI_CHECKMONITORON;
      }
      else if ( IsOSKVidChange( wScreenCode ) )

      {
        TRACE( "NOTICE: Unload of OSK due to vid
change from DOS
or Windows identified.\r" );
        RequestFullRepaint( FALSE, wScreenCode );

        iStateCleanupSUI =
SUI_CHECKFULLPAINTCLEANUP;
      }
      else
      {
        TRACE( "NOTICE: Manual unload of OSK
from DOS or Windows
identified.\r" );
        RequestFullRepaint( TRUE, wScreenCode );
```

```
        iStateCleanupSUI =
SUI_CHECKFULLPAINTCLEANUP.
      }
      break;

    case SUI_CHECKMONITORON
      iCheck = CheckMonitor().

      if ( iCheck == ERR_SUCCESS )
      {
        TRACE( "NOTICE: CoSession monitor on
mode successful.\r"
);
        iStateCleanupSUI =
SUI_CLEANUPSUCCESS.
      }
      else if ( iCheck == ERR_INTERNAL )
      {
        TRACE( "NOTICE: CoSession monitor on
mode failed.\r" ).
        iStateCleanupSUI = SUI_CLEANUPERROR.
      }
      break,

    case SUI_CHECKFULLPAINTCLEANUP
      iCheck = CheckFullRepaint().

      if ( iCheck == ERR_SUCCESS )
      {
        if ( IsOSKVidChange( wScreenCode ) )

        {
          if ( IsOSKWinGraphics( wScreenCode ) )

          {
            TRACE( "NOTICE: Full Repaint successful
for vid
change in ERWIN for Windows OSK\r" ).
            iStateCleanupSUI =
SUI_CLEANUPSUCCESS.
          }
          else
          {
            TRACE( "NOTICE: Full Repaint successful
for vid
change in DOS or DOS Graphics OSK\r" ).
            SetMonitor( TRUE, FALSE ):
            iStateCleanupSUI =
SUI_CHECKMONITORON
          }
        }
        else
        {
#if !defined( PROD )
          if ( IsOSKWinGraphics( wScreenCode ) )

          {
            TRACE( "NOTICE: Full Repaint successful
for Windows
OSK\r" ).
          }
          else
          {
            TRACE( "NOTICE: Repaint successful for
DOS or DOS
Graphics OSK\r" ).
          }
#endif
          iStateCleanupSUI =
SUI_CLEANUPSUCCESS.
        }
      }
      else if ( iCheck == ERR_INTERNAL )
      {
        TRACE( "NOTICE: Full Repaint failed for OSK
of unknown
type\r" ).
        iStateCleanupSUI = SUI_CLEANUPERROR;
      }
      break;

    case SUI_CLEANUPSUCCESS:
      TRACE( "NOTICE: SUI cleanup successful\r" );

    case SUI_CLEANUPERROR:
    default.
      if ( nResidentStatus == SUI_UNLOADSUI )
        nSUIStatus = SMI_SUINOTLOADED;
      else
        nSUIStatus = SMI_SUIINACTIVE;

      fil_chr( szPassword, 0, sizeof ( szPassword ) ).

      wScreenCode = wOldScreenCode =
SUI_NOSCREEN
      iStateCleanupSUI = SUI_NOCLEANUPSTATE;
      DelThread( SUI_CLEANUPEVENTNUM ):
      SetWaitingIcon( SBS_WAITINGICONOFF,
TRUE ).
      break.
  }
}

#if defined( _MSC_VER )
#pragma warning( default : 4704 )
#endif
Copr. 1995 Zenith Data Systems Corp.
#include "er.h"
#include "sio.h"
#include "spawn.h"
#include "k2.h"
#include "hm.h"
#include "sm.h"

#if defined( _MSC_VER )
#pragma warning( disable : 4704 )
#e : %

static BYTE fSecurityWarning = FALSE,
static BYTE fDomainWarning = FALSE;
static BYTE nMsgBoxReturnCode = 0;
static int iPrevMsgBoxThreadIdx = -1;

void SetDomainWarning( BYTE
fNewDomainWarning )
{
  fDomainWarning = fNewDomainWarning.
}

void SetSecurityWarning( BYTE
fNewSecurityWarning )
{
  fSecurityWarning = fNewSecurityWarning:
}

void SetMsgBoxReturnCode( BYTE
nNewReturnCode )
{
  PCB_BEGINCRITICAL;
  nMsgBoxReturnCode = nNewReturnCode.
  PCB_ENDCRITICAL;
}

BYTE GetMsgBoxReturnCode( void )
{
  BYTE nReturnCode = nMsgBoxReturnCode:

  nMsgBoxReturnCode = 0:

  return ( nReturnCode ):
}

APIFUNCRET SetSUIMBRetCode( struct REGW
*CallerRegs )
{
  SetMsgBoxReturnCode( LOBYTE( CallerRegs->bx
)).

  CallerRegs->ax = ERR_SUCCESS:

  SetForegroundRegs( CallerRegs ):
}

APIFUNCRET SetKeyStroke( struct REGW
*CallerRegs )
{
  BYTE nHiScanByte,

  if ( ( nHiScanByte = HIBYTE( CallerRegs->bx ) ) >
0 )
    SendScanCode( nHiScanByte ):

  SendScanCode( LOBYTE( CallerRegs->bx ) ):

  CallerRegs->ax = ERR_SUCCESS,

  SetForegroundRegs( CallerRegs ):
}

APIFUNCRET GetSetLockKbdMouse( struct REGW
*CallerRegs )
{
  BOOL bLockKbdMouse;

  if ( IsGetFunction( CallerRegs ) )
    CallerRegs->ax = UIConfigData.bLockKbdMouse
?
SMI_ENABLEDLOCKKBDMOUSE :
                    SMI_DISABLEDLOCKKBDMOUSE;
  else
  {
    bLockKbdMouse = ( CallerRegs->bx == ( WORD
)SMI_ENABLEDLOCKKBDMOUSE ).
    CallerRegs->ax = ERR_SUCCESS.

    if ( GetSCSCallProgress() ==
SMI_SCSCONNECTED )
    {
      if ( SendLockKbdMouse( bLockKbdMouse ) ==
ERR_SUCCESS )
        UIConfigData.bLockKbdMouse =
bLockKbdMouse.
      else
        CallerRegs->ax = ( WORD )ERR_INTERNAL.
    }
    else
      UIConfigData.bLockKbdMouse =
bLockKbdMouse.
  }

  SetForegroundRegs( CallerRegs ).
}

APIFUNCRET GetSetDimScreen( struct REGW
*CallerRegs )
{

  BOOL bDimScreen;

  if ( IsGetFunction( CallerRegs ) )
    CallerRegs->ax = UIConfigData.bDimScreen ?
SMI_ENABLEDDIMSCREEN :
                    SMI_DISABLEDDIMSCREEN.
  else
  {
    bDimScreen = ( CallerRegs->bx == ( WORD
)SMI_ENABLEDDIMSCREEN
);
    CallerRegs->ax = ERR_SUCCESS.

    if ( GetSCSCallProgress() ==
SMI_SCSCONNECTED )
    {
      if ( SendDimScreen( bDimScreen ) ==
ERR_SUCCESS )
        UIConfigData.bDimScreen = bDimScreen:
      else
        CallerRegs->ax = ( WORD )ERR_INTERNAL.
    }
    else
      UIConfigData.bDimScreen = bDimScreen;
  }

  SetForegroundRegs( CallerRegs ):
}

APIFUNCRET GetSetConnectType( struct REGW
*CallerRegs )
{
  if ( CallerRegs->ax & 0x8000 )
    CallerRegs->ax = UIConfigData.bConnectType;
  else
    UIConfigData.bConnectType = CallerRegs->ax;

  SetForegroundRegs( CallerRegs ):
}

APIFUNCRET GetKeyBoardStatus( struct REGW
*CallerRegs )
{
  CallerRegs->ax = SMI_KBDNOTPRESENT;
  SetForegroundRegs( CallerRegs ).
}

APIFUNCRET GetAboutDialog( struct REGW
*CallerRegs )
{
  char szTempStr[ STR_STRMAXLENERR ];
  int iBIOSVersionNum = GetBIOSVersion().
  int iMsgBoxTotalLines;

  sprintf( szTempStr, STR_SMABOUTBOX,
szSMVersionName, HIBYTE(
iBIOSVersionNum ),
          LOBYTE( iBIOSVersionNum ) ):

  iMsgBoxTotalLines = FillMsgBoxBuff( MsgBoxBuff,
szTempStr,
SUI_CENTERJUSTIFIED ):

  BuffHead.iStructLen = sizeof ( MSGBOXBUFF ):
  BuffHead.iBuffLen = sizeof ( MSGBOXBUFF ) *
iMsgBoxTotalLines.
  BuffHead.Buff = ( LPVOID )MsgBoxBuff.

  CallerRegs->ax = ( WORD )ERR_SUCCESS:
  CallerRegs->dx = SEG( &BuffHead ),
  CallerRegs->si = OFF( &BuffHead ):

  SetForegroundRegs( CallerRegs ).
}

APIFUNCRET GetSetUDHotIcon( struct REGW
*CallerRegs )
{
  BUFFHEADER FAR *pBuffHeader.
  SCANCODE FAR *pScanCodes.
  int iBuffLen,


  if ( IsGetFunction( CallerRegs ) )
  {
    if ( CallerRegs->bx == SUI_UDHOTICON1 )
      pScanCodes = UIConfigData.aUDHotIcon1;
    else
      pScanCodes = UIConfigData.aUDHotIcon2;

    BuffHead.Buff = ( LPVOID )pScanCodes;
    BuffHead.iBuffLen = GetNumScanCodes(
pScanCodes ) * sizeof (
SCANCODE ):
    BuffHead.iStructLen = sizeof ( SCANCODE ):

    CallerRegs->dx = SEG( &BuffHead ).
    CallerRegs->si = OFF( &BuffHead ).
    CallerRegs->ax = ERR_SUCCESS.
  }
  else
  {
    pBuffHeader = MK_FP( CallerRegs->dx,
CallerRegs->si ):
    pScanCodes = ( SCANCODE FAR *
)pBuffHeader->Buff.

    if ( pBuffHeader == NULL || pScanCodes ==
NULL )
      CallerRegs->ax = ( WORD )ERR_INTERNAL;
    else if ( pBuffHeader->iStructLen == 0 ||
pBuffHeader->iBuffLen == 0 )
      CallerRegs->ax = ( WORD )ERR_INTERNAL;
    else
    {
      iBuffLen = pBuffHeader->iBuffLen >
SUI_MAXNUMSCANCODES *
sizeof ( SCANCODE ) ?
              SUI_MAXNUMSCANCODES * sizeof (
SCANCODE ) :
pBuffHeader->iBuffLen;

      if ( CallerRegs->bx == SUI_UDHOTICON1 )
      {
        fil_chr( UIConfigData.aUDHotIcon1, 0,
              SUI_MAXNUMSCANCODES * sizeof (
SCANCODE ) ).
        fmem_cpy( ( LPVOID )pScanCodes, ( LPVOID
)UIConfigData.aUDHotIcon1,
              iBuffLen ):
      }
      else
      {
        fil_chr( UIConfigData.aUDHotIcon2, 0,
              SUI_MAXNUMSCANCODES * sizeof (
SCANCODE ) ).
        fmem_cpy( ( LPVOID )pScanCodes, ( LPVOID
)UIConfigData.aUDHotIcon2,
              iBuffLen ):
      }

      CallerRegs->ax = ERR_SUCCESS;
    }
  }

  SetForegroundRegs( CallerRegs ).
}

APIFUNCRET GetSetSecurityID( struct REGW
*CallerRegs )
{
  LPSTR lpszNewSecurityID;
  int iLenSecurityID;

  if ( IsGetFunction( CallerRegs ) )
  {
    CallerRegs->dx = SEG(
UIConfigData.szSecurityID ).
    CallerRegs->si = OFF( UIConfigData.szSecurityID
);
    CallerRegs->ax = ERR_SUCCESS.
  }
  else
  {
    if ( GetSCSCallProgress() ==
SMI_SCSDISCONNECTED )
    {
      lpszNewSecurityID = MK_FP( CallerRegs->dx,
CallerRegs->si
```

```
).
    iLenSecurityID = fstr_len( lpszNewSecurityID );

    if ( lpszNewSecurityID != NULL &&
         iLenSecurityID <=
SUI_MAXLENSECURITYSUI )
    {
      fmem_cp( ( LPVOID )lpszNewSecurityID, (
LPVOID
)UIConfigData.szSecurityID,
              iLenSecurityID + 1 ).

      CallerRegs->ax = SetSecurityID(
UIConfigData.szSecurityID
).
      }
      else
        CallerRegs->ax = ( WORD )ERR_INTERNAL;
    }
    else
    {
      if ( !fSecurityWarning )
      {
        OpenMessageBox( STR_SUISECURITYID, 0.
SUI_LEFTJUSTIFIED.
SUI_OK ).
        fSecurityWarning = TRUE;
      }

      CallerRegs->ax = ( WORD )ERR_INTERNAL
    }
  }

  SetForegroundRegs( CallerRegs );
}

APIFUNCRET GetSetDomainID( struct REGW
*CallerRegs )
{
  char nNewDomainID;

  if ( isGetFunction( CallerRegs ) )
  {
    CallerRegs->ax = ( WORD
)UIConfigData.nDomainID;
  }
  else
  {
    nNewDomainID = LOBYTE( CallerRegs->bx ).

    if ( nNewDomainID >= PRX_MINDOMAINID &&
nNewDomainID <=
PRX_MAXDOMAINID )
    {
      UIConfigData.nDomainID = nNewDomainID.

      if ( !fDomainWarning )
      {
        OpenMessageBox( STR_SUIDOMAINID, 0
SUI_LEFTJUSTIFIED,
SUI_OK );
        fDomainWarning = TRUE;
      }

      CallerRegs->ax = ERR_SUCCESS.
    }
    else
      CallerRegs->ax = ( WORD )ERR_INTERNAL.
  }

  SetForegroundRegs( CallerRegs );
}

APIFUNCRET GetSetUILanguage( struct REGW
*CallerRegs )
{
  CallerRegs->ax = ( WORD )SMI_UIUSENGLISH;

  SetForegroundRegs( CallerRegs );
}

APIFUNCRET RebootHost( struct REGW
*CallerRegs )
{
  REG_W inArgs, OutArgs;

  fil_chr( ( NPSTR )&inArgs, 0, sizeof ( inArgs ) );

  inArgs.ax = SCS_REBOOTHOST;

  intn( &inArgs, &OutArgs, SCS_INTNUM ).

  if ( OutArgs.ax == SCS_ACCEPTED )
    CallerRegs->ax = ERR_SUCCESS.
  else
    CallerRegs->ax = ( WORD )ERR_INTERNAL;

  SetForegroundRegs( CallerRegs ).
}

APIFUNCRET GetPasswordStatus( struct REGW
*CallerRegs )
{
  CallerRegs->ax = ( WORD )isPWRequired();

  SetForegroundRegs( CallerRegs );
}

APIFUNCRET GetSetPassword( struct REGW
*CallerRegs )
{
  LPSTR szNewPassword;

  if ( isGetFunction( CallerRegs ) )
  {
    CallerRegs->dx = SEG( szPassword );
    CallerRegs->si = OFF( szPassword );
  }
  else
  {
    szNewPassword = ( LPSTR )MAKELP(
CallerRegs->dx,
CallerRegs->si );
    fmem_cp( ( LPVOID )szNewPassword, ( LPVOID
)sz~ ssword
             SUI_MAXLENPASSWORD ).
  }

  CallerRegs->ax = ERR_SUCCESS.

  SetForegroundRegs( CallerRegs ).
}

APIFUNCRET UpdateHostList( struct REGW
*CallerRegs )
{
  CallerRegs->ax = ( WORD )RequestHostList().

  SetForegroundRegs( CallerRegs ).
}

APIFUNCRET GetHostListStatus( struct REGW
*CallerRegs )
{

  if ( !GetSCSActiveStatus() )
    CallerRegs->ax = ( WORD
)ERR_NOTSUPPORTED;

  CallerRegs->ax = GetStatusHLInMem();

  SetForegroundRegs( CallerRegs );
}

APIFUNCRET LBGetSetNetGroup( struct REGW
*CallerRegs )
{
  if ( isGetFunction( CallerRegs ) )
  {
    if ( GetStatusHLInMem() == SMI_BLANK )
    {
      CallerRegs->ax = ( WORD
)ERR_NOTSUPPORTED;
      goto exit,
    }

    if ( ( int )CallerRegs->bx > 0 )
    {
      ListBoxEntry.lpszEntry = ( LPSTR
)GetLBGroup(
CallerRegs->bx );
      ListBoxEntry.nAttribute =
SUI_LBENTRYENABLED,
      CallerRegs->dx = SEG( &ListBoxEntry );
      CallerRegs->si = OFF( &ListBoxEntry );
      CallerRegs->ax = ERR_SUCCESS;

    }
    else if ( ( int )CallerRegs->bx == 0 )
    {
      ListBoxEntry.lpszEntry = ( LPSTR
)GetLBGroup( -1 );
      ListBoxEntry.nAttribute =
SUI_LBENTRYENABLED;
      CallerRegs->dx = SEG( &ListBoxEntry );
      CallerRegs->si = OFF( &ListBoxEntry );
      CallerRegs->ax = GetLBCurrGroup();
    }
    else
      CallerRegs->ax = GetNumGroupEntries().
  }
  else
  {
    SetLBCurrGroup( CallerRegs->bx );
    CallerRegs->ax = ERR_SUCCESS.
  }

exit:
  SetForegroundRegs( CallerRegs );
}

APIFUNCRET LBGetSetNetHost( struct REGW
*CallerRegs )
{
  if ( isGetFunction( CallerRegs ) )
  {
    if ( GetStatusHLInMem() == SMI_BLANK )
    {
      CallerRegs->ax = ( WORD
)ERR_NOTSUPPORTED;
      goto exit;
    }

    if ( ( int )CallerRegs->bx > 0 )
    {
      ListBoxEntry.lpszEntry = ( LPSTR )GetLBHost(
CallerRegs->bx
);
      ListBoxEntry.nAttribute = GetLBHostStatus(
CallerRegs->bx
);
      CallerRegs->dx = SEG( &ListBoxEntry );
      CallerRegs->si = OFF( &ListBoxEntry ).
      CallerRegs->ax = 0;
    }
    else if ( ( int )CallerRegs->bx == 0 )
    {
      ListBoxEntry.lpszEntry = ( LPSTR )GetLBHost(
SUI_LBCURRENTRY );
      ListBoxEntry.nAttribute = GetLBHostStatus(
SUI_LBCURRENTRY
);
      CallerRegs->dx = SEG( &ListBoxEntry ).
      CallerRegs->si = OFF( &ListBoxEntry ).
      CallerRegs->ax = ( WORD )GetLBCurrHost().
    }
    else
      CallerRegs->ax = GetNumHostEntries().
  }
  else
  {
    SetLBCurrHost( CallerRegs->bx ).
    CallerRegs->ax = 0.
  }

exit:
  SetForegroundRegs( CallerRegs );
}

APIFUNCRET UpdateDimenLoc( struct REGW
*CallerRegs )
{
  OCCLUDEUNION OccUnion,
  int iActualVidMode;

  CallerRegs->ax = ( WORD )ERR_SUCCESS,
  iActualVidMode = GetCurrVidMode();

  if ( !GetSCSActiveStatus() || isSetupDlg(
wScreenCode ) ||
isNoScreen( wScreenCode ) )
  {
    CallerRegs->ax = ( WORD
)ERR_NOTSUPPORTED;
    goto exit,
  }

  if ( CallerRegs->bx == 0xFFFF && CallerRegs->cx
== 0xFFFF &&
       CallerRegs->si == 0xFFFF && CallerRegs->di
== 0xFFFF )
  {
    UnloadSUI( SUI_NOUNLOADSUI );
  }
  else
  {
    if ( iActualVidMode > SUI_TEXTVIDMODE )
    {
      if ( isOSKWinGraphics( wScreenCode ) )
      {
        OccUnion.occRWin.yULWin = CallerRegs->bx;
        OccUnion.occRWin.xULWin = CallerRegs->cx;
        OccUnion.occRWin.yLRWin = CallerRegs->si;
        OccUnion.occRWin.xLRWin = CallerRegs->di;

        CallerRegs->ax = CreateOccludedArea(
&OccUnion,
SUI_OCCRWIN, SCS_OSKFREEMEMPERCENT );
        SetOSKMode( &OccUnion, SUI_OCCRWIN );
      }
      else
      {
        OccUnion.occDosGraph.yULDos =
CallerRegs->bx,
        OccUnion.occDosGraph.xULDos =
CallerRegs->cx;
        OccUnion.occDosGraph.yLRDos =
CallerRegs->si;
        OccUnion.occDosGraph.xLRDos =
CallerRegs->di;

        CallerRegs->ax = CreateOccludedArea(
&OccUnion,
SUI_OCCDOSGRAPHICS.
SCS_OSKFREEMEMPERCENT );

        if ( !isOSKAsSetupDlg( wScreenCode ) )

          SetOSKMode( &OccUnion,
SUI_OCCDOSGRAPHICS );
        }
      }
      else
      {
        OccUnion.occText.yULRow = CallerRegs->bx;
        OccUnion.occText.xULCol = CallerRegs->cx;
        OccUnion.occText.yLRRow = CallerRegs->si;
        OccUnion.occText.xLRCol = CallerRegs->di,

        CallerRegs->ax = CreateOccludedArea(
&OccUnion,
SUI_OCCDOSTEXT,
SCS_OSKFREEMEMPERCENT ).
        SetOSKMode( &OccUnion, SUI_OCCDOSTEXT
);
      }
    }

exit:
  SetForegroundRegs( CallerRegs ).
}

APIFUNCRET GetSetContrast( struct REGW
*CallerRegs )
{
  BYTE nContrastIdx.

  if ( isGetFunction( CallerRegs ) )
    CallerRegs->ax = ( WORD
)UIConfigData.nContrastIdx;
  else
  {
    nContrastIdx = LOBYTE( CallerRegs->bx );

    if ( ( CallerRegs->ax = ( WORD )SetContrast(
nContrastIdx ) )
         == ERR_SUCCESS )
      UIConfigData.nContrastIdx = nContrastIdx;
  }

  SetForegroundRegs( CallerRegs );
}

APIFUNCRET GetSetBrightness( struct REGW
*CallerRegs )
{
  BYTE nBrightnessIdx;

  if ( isGetFunction( CallerRegs ) )
    CallerRegs->ax = ( WORD
)UIConfigData.nBrightnessIdx;
  else
  {
    nBrightnessIdx = LOBYTE( CallerRegs->bx );

    if ( ( CallerRegs->ax = ( WORD )SetBrightness(
nBrightnessIdx
) )
         == ERR_SUCCESS )
      UIConfigData.nBrightnessIdx = nBrightnessIdx;
  }

  SetForegroundRegs( CallerRegs );
}

APIFUNCRET GetSetAutoShutOff( struct REGW
*CallerRegs )
{
  if ( isGetFunction( CallerRegs ) )
    CallerRegs->ax = ( WORD
)UIConfigData.bAutoShutoff;
  else
  {
    if ( LOBYTE( CallerRegs->bx ) == TRUE )
    {
      CallerRegs->ax = SetSuspendTimeout(
SBS_SUSPENDIN80MIN ).
      UIConfigData.bAutoShutoff = TRUE;
    }
    else
    {
```

```
    CallerRegs->ax = SetSuspendTimeout(
SBS_SUSPENDDISABLED ).

    UIConfigData.bAutoShutoff = FALSE;
   }
  }

  SetForegroundRegs( CallerRegs );
}

APIFUNCRET GetSetSleepTime( struct REGW
*CallerRegs )
{
  BYTE nSleepTimeIdx:

  if ( IsGetFunction( CallerRegs ) )
  {
   if ( UIConfigData.nSleepTimeIdx ==
SBS_SLEEPDISABLED )
     CallerRegs->ax = ( WORD
)SUI_NOSLEEPSLIDERIDX - 1;
   else
     CallerRegs->ax = ( WORD
)UIConfigData.nSleepTimeIdx - 1;
  }
  else
  {
   nSleepTimeIdx = LOBYTE( CallerRegs->bx ) + 1;

   if ( nSleepTimeIdx == SUI_NOSLEEPSLIDERIDX
 )
     nSleepTimeIdx = ( BYTE
)SBS_SLEEPDISABLED.

   if ( ( CallerRegs->ax = SetSleepTimeout(
nSleepTimeIdx ) )
        == ERR_SUCCESS )
    {
     if ( nSleepTimeIdx == SBS_SLEEPDISABLED )
     {
      if ( ( CallerRegs->ax = SetPowerEnable(
SBS_POWERMANDISABLED ) )
        == ERR_SUCCESS )
      {
       if ( ( CallerRegs->ax = SetDozeTimeout(
SBS_DOZEDISABLED ) )
         == ERR_SUCCESS )
         UIConfigData.nSleepTimeIdx =
nSleepTimeIdx.
      }
     }
     else
     {
      if ( ( CallerRegs->ax = SetPowerEnable(
SBS_POWERMANENABLED ) )
        == ERR_SUCCESS )
      {
       if ( ( CallerRegs->ax = SetDozeTimeout(
SBS_DOZEDISABLED ) )
         == ERR_SUCCESS )
         UIConfigData.nSleepTimeIdx =
nSleepTimeIdx;
      }
     }
    }
  }

  SetForegroundRegs( CallerRegs ).
}

int EnableBusyCursor( int iStatus )
{
  int iReturn

  AX( SUI_SHOWHIDEBUSYCURSOR ).
  BX( iStatus ).

  iReturn = ( *lpfnSUICallBack )();

  return ( iReturn ).
}

int DoMessageBox( NPSTR szMsgText, int
iScrNumber, char
nAlignment, int iButtons,
                MODALMSGBOXCB fnCallBack, int
iMsgBoxTimeOut )
{
  if ( !GetSUIReady() )
    return ( ERR_INTERNAL ).

  if ( iMsgBoxTimeOut > 0 )
    iMsgBoxTimeOut += 2;

  if ( ( iProcMsgBoxThreadIdx =
GetTempEventNum() ) < ERR_SUCCESS
  )
    return ( ERR_INTERNAL );

  A 'i Thread( iProcMsgBoxThreadIdx, ( NEARPROC
)ProcessMessageBox,
NULL, SMD_POLLED,
          FALSE, SUI_PROCMSGBOXPOLLFREQ,
0 ),

  if ( fnCallBack != NULL )
    DoModalMsgBox( fnCallBack, iMsgBoxTimeOut ).

  ProcessMessageBox( szMsgText, iScrNumber,
nAlignment, iButtons
);

  return ( ERR_SUCCESS );
}

void ProcessMessageBox( NPSTR szNewMsgText,
int iNewScrNumber,
char nNewAlignment, int iNewButtons )
{
  static NPSTR szMsgText;
  static char nAlignment;
  static int iButtons;
  static int iScrNumber;
  static int iProcMsgBoxState =
 SUI_NOPROCMSGBOXSTATE;

  switch ( iProcMsgBoxState )
  {
   case SUI_NOPROCMSGBOXSTATE:
    szMsgText = szNewMsgText.
    iScrNumber = iNewScrNumber
    nAlignment = nNewAlignment
    iButtons = iNewButtons.
    iProcMsgBoxState = SUI_HIDEMSGBOX.
    break;

   case SUI_HIDEMSGBOX:
    HideMessageBox();
    iProcMsgBoxState = SUI_SHOWMSGBOX,
    break

   case SUI_SHOWMSGBOX.
    OpenMessageBox( szMsgText, iScrNumber,
nAlignment, iButtons
);
     iProcMsgBoxState =
SUI_NOPROCMSGBOXSTATE.
     DelThread( iProcMsgBoxThreadIdx ).
     break;
  }
}

int OpenMessageBox( NPSTR szMsgText, int
iScrNumber, char
nAlignment, int iButtons )
{
  int iSeg = 0, iOff = 0;
  int iMsgBoxTotalLines;

  if ( !GetSUIReady() )
    return ( ERR_INTERNAL );

  if ( szMsgText != NULL )
    iScrNumber = 0;
  else
    goto exit;

  if ( strlen( szMsgText ) > STR_STRMAXLENERR -
1 )
    return ( ERR_INTERNAL );

  iMsgBoxTotalLines = FillMsgBoxBuff( MsgBoxBuff,
szMsgText,
nAlignment );

  if ( *MsgBoxBuff[ 0 ].lpszText == NULL )
    return ( ERR_INTERNAL );

  BuffHead.iStructLen = sizeof ( MSGBOXBUFF );
  BuffHead.iBuffLen = sizeof ( MSGBOXBUFF ) *
iMsgBoxTotalLines;
  BuffHead.Buff = ( LPVOID )MsgBoxBuff,

  iSeg = SEG( &BuffHead );
  iOff = OFF( &BuffHead ).

 exit.

  AX( SUI_SHOWMSGBOX );
  BX( iButtons );
  CX( iScrNumber );
  DX( iSeg );
  SI( iOff );

  return ( ( *lpfnSUICallBack )() );
}

int FillMsgBoxBuff( MSGBOXBUFF MsgBoxBuff[]
char *szMsgText.
char nAlignment )
{
  int iTerminator, iMsgBoxLineIdx,
iMsgBoxTotalLines.
  char *szPtrTempStr = szTempMsgStr,

  strcpy( szTempMsgStr, szMsgText );

  fil_chr( MsgBoxBuff, 0, sizeof ( MSGBOXBUFF ) *
SMI_SUIMAXMSGBOXLINES );

  for ( iMsgBoxLineIdx = 0, iMsgBoxTotalLines = 0,
       iMsgBoxLineIdx <
SMI_SUIMAXMSGBOXLINES; ++iMsgBoxLineIdx
)
  {
   if ( ( iTerminator = str_pos( STR_SEPARATOR,
szPtrTempStr ) )
> 0 )
    {
     *( szPtrTempStr + ( iTerminator - 1 ) ) = NULL;
     MsgBoxBuff[ iMsgBoxLineIdx ].lpszText = (
LPSTR
)szPtrTempStr,
     MsgBoxBuff[ iMsgBoxLineIdx ].nAlignment =
nAlignment.
     szPtrTempStr += iTerminator:
     iMsgBoxTotalLines++;
    }
    else
     MsgBoxBuff[ iMsgBoxLineIdx ].lpszText =
szNullStr,
  }

  return ( iMsgBoxTotalLines ),
}

int HideMessageBox( void )
{
  if ( !GetSUIReady() )
    return ( ERR_INTERNAL ).

  AX( SUI_HIDEMSGBOX );

  return ( ( *lpfnSUICallBack )() ).
}

int UpdateSUIConnectStatus( void )
{
  if ( !GetSUIReady() )
    return ( ERR_INTERNAL );

  SetUpdatingConnectStatus( TRUE );

  AX( SUI_UPDATECONNECTSTATUS ).

  return ( ( *lpfnSUICallBack )() );
}

#if defined( _MSC_VER )
#pragma warning( default : 4704 )
#endif
Copr. 1995 Zenith Data Systems Corp.
#include "cr.h"
#include "frame.h"
#include "spawn.h"
#include "sm.h"

static BYTE fFrameWarning = FALSE.

static char aFrameTypes[][6]=
{
  "802.2",
  "802.3",
  "II",
  "SNAP",
};

APIFUNCRET LBGetSetNetFrameType( struct
REGW *CallerRegs )
{
  if ( IsGetFunction( CallerRegs ) )
  {
   int iCurrFrameIdx = UIConfigData.nFrameType -
PRX_FRAMEBASE;
    CallerRegs->dx = SEG( &ListBoxEntry ).
    CallerRegs->si = OFF( &ListBoxEntry ).

    if ( ( int )CallerRegs->bx > 0 )
    {
     ListBoxEntry.lpszEntry = ( LPSTR
)aFrameTypes[
CallerRegs->bx - 1 ];
      ListBoxEntry.nAttribute =
SUI_LBENTRYENABLED,
      CallerRegs->ax = ERR_SUCCESS;
   }
   else if ( ( int )CallerRegs->bx == 0 )
   {
    ListBoxEntry.lpszEntry =
     ( LPSTR )aFrameTypes[ iCurrFrameIdx ]
    ListBoxEntry.nAttribute =
SUI_LBENTRYENABLED.
    CallerRegs->ax = iCurrFrameIdx + 1;
   }
   else
    CallerRegs->ax =
PRX_NUMOFAVAILFRAMES,
  }
  else
  {
   if ( !fFrameWarning )
   {
    OpenMessageBox( STR_SUIFRAMETYPE, 0,
SUI_LEFTJUSTIFIED,
SUI_OK ).
    fFrameWarning = TRUE,
   }

   UIConfigData.nFrameType = PRX_FRAMEBASE
+ ( CallerRegs->bx -
1 ).
   CallerRegs->ax = ERR_SUCCESS.
  }

  SetForegroundRegs( CallerRegs ).
}

APIFUNCRET NotifyScreenCode( struct REGW
*CallerRegs )
{
  BYTE nLastOSKScreen,
  BYTE nLastSetupDlgScreen;

  if ( ( nLastOSKScreen = LOBYTE( CallerRegs->bx
) & SUI_OSKMASK
) > 0 )
  {
   if ( IsSetupDlg( GetCurrScrCode() ) )

     UIConfigData.nLastOSKDlgScreen =
nLastOSKScreen,
   else
     UIConfigData.nLastOSKScreen =
nLastOSKScreen.
  }

  if ( ( nLastSetupDlgScreen = LOBYTE(
CallerRegs->bx ) &
SUI_SETUPDLGMASK ) > 0 )
    UIConfigData.nLastSetupDlgScreen =
nLastSetupDlgScreen.

  CallerRegs->ax = ERR_SUCCESS;

  SetForegroundRegs( CallerRegs );
}
Copr. 1995 Zenith Data Systems Corp.
#include "cr.h"
#include "sio.h"
#include "spawn.h"
#include "k2.h"
#include "sm.h"

#if defined( _MSC_VER )
#pragma warning( disable : 4704 )
#endif

static int iCalibMode = -1;
static int iCalibThreadIdx = 0,
static int xCalibCol, yCalibRow;
static BOOL fCalibLowRight;

static CALIBPENSTATES PenCalibStates;

APIFUNCRET CalibratePen( struct REGW
*CallerRegs )
{
  if ( fCalibLowRight )
  {
    CallerRegs->ax = SMI_CALIBLOWRIGHT;
    CallerRegs->cx = SHC_XVGARES -
SUI_XCALIBPOINT;
    CallerRegs->bx = SHC_YVGARES -
SUI_YCALIBPOINT;
    fCalibLowRight = FALSE;
  }

  if ( IsGetFunction( CallerRegs ) )
    iCalibMode = PND_CALIBLR;
  else
  {
    fCalibLowRight = TRUE.
    iCalibMode = PND_CALIBUL;
  }
```

```
if ( ( iCalibThreadIdx = GetTempEventNum() ) < 0 )
{
  CallerRegs->ax = ( WORD )ERR_INTERNAL;
}
else
{
  PenCalibStates = SUI_INITIALCALIBSTATE;
  xCalibCol = CallerRegs->cx;
  yCalibRow = CallerRegs->bx;
  CallerRegs->ax = ERR_SUCCESS;

  AddThread( iCalibThreadIdx, WaitForPenCalib,
NULL,
SMD_POLLED, FALSE,
           SMI_CALIBPOLLFREQ, 0 );
 }

 SetForegroundRegs( CallerRegs );
}

APIFUNCRET CalibrateCancel( struct REGW
*CallerRegs )
{
  DelThread( iCalibThreadIdx );
  EnableNewCalib( FALSE );

  CallerRegs->ax = ERR_SUCCESS;

  SetForegroundRegs( CallerRegs );

  if ( GetCurrActionCode() ==
SUI_LASTCONNECTION )
    LoadSUI( SUI_SPECIFIEDSCREEN,
SUI_HOSTSELECTION );
}

void WaitForPenCalib( void )
{
  int xUpperCol, yUpperRow, xLowerCol,
yLowerRow
  int iCalibState
  PENCALIB CurrPenCalib;

  switch( PenCalibStates )
  {
    case SUI_INITIALCALIBSTATE
      if ( SetCalibMode( iCalibMode, xCalibCol,
yCalibRow ) == 0
)
        PenCalibStates = SUI_CHECKCALIB;
      else
        PenCalibStates = SUI_CALIBERROR;
      break;

    case SUI_CHECKCALIB:
      iCalibState = GetCalibState( iCalibMode,
&xUpperCol,
&yUpperRow,
                      &xLowerCol, &yLowerRow
);

      if ( iCalibState != PND_CALIBNOTDONE )
      {
        if ( iCalibMode == PND_CALIBLR )
        {
          if ( iCalibState == PND_CALIBDONEVALID )
          {
            CurrPenCalib.wXUpperPenCalib =
xUpperCol
            CurrPenCalib.wYUpperPenCalib =
yUpperRow;
            CurrPenCalib.wXLowerPenCalib =
xLowerCol;
            CurrPenCalib.wYLowerPenCalib =
yLowerRow;

            SetEEMouseConfig( &CurrPenCalib );
            EnableNewCalib( TRUE );

            PenCalibStates = SUI_CALIBSUCCESS;
          }
          else
            PenCalibStates = SUI_CALIBERROR;
        }
        else
          PenCalibStates = SUI_CALIBSUCCESS;
      }
      break;

    case SUI_CALIBERROR
    case SUI_CALIBSUCCESS:
      AX( SUI_CALIBPOINTDONE );
      ( *lpfnSUICallBack )();
      DelThread( iCalibThreadIdx );

      if ( iCalibMode == PND_CALIBLR &&
GetCurrActionCode() ==
SUI_DOPENCALIBRATION )
        LoadSUI( SUI_SPECIFIEDSCREEN,
SUI_HOSTSELECTION );
      break;
  }
}

#if defined( _MSC_VER )
#pragma warning( default : 4704 )
#endif
```

Copr 1995 Zenith Data Systems Corp.

```
#include "sr.h"
#include "sio.h"
#include "spawn.h"
#include "k2.h"
#include "hm.h"
#include "lm.h"
#include "sm.h"

#if defined( _MSC_VER )
#pragma warning( disable : 4704 )
#endif

static FLASHUPDATESTATES FlashUpdateState,
FlashStateOnError;
static MEM_REC MemRec
static char far *sFlashImageBuff = NULL;
static char *szPathFlashFile = NULL;
static char *szNameActiveUpdate = NULL;
static int iDoUpdateThreadIdx,
iActiveUpdateThreadIdx;
static int iFlashUpdateState;
static int iTmpFilePercent, iOldTmpFilePercent,
iOldTmpDispPercent;

static int iTotalFlashFiles,
static int iCurrFlashFile,
static LONG lLenCurrFlashFile
static int iSectorFlashStatus;

APIFUNCRET DoUpdate( struct REGW *CallerRegs
)
{
  if ( GetSCSCallProgress() !=
SMI_SCSCONNECTED )
    CallerRegs->ax = ( WORD )ERR_INTERNAL;
  else
  {
    if ( ( iDoUpdateThreadIdx = GetTempEventNum()
) ==
ERR_INTERNAL )
    {
      CallerRegs->ax = ( WORD )ERR_INTERNAL;
    }
    else
    {
      if ( IsFlashSupported() )
      {
        FlashUpdateState = FLU_SAFETYCHECK;
        AddThread( iDoUpdateThreadIdx,
WaitForFlashUpdate, NULL,
SMD_MANYTIMES, FALSE,
                FLU_POLLFREQ, FLU_MAXRETRY );

        CallerRegs->ax = ( WORD )ERR_SUCCESS;
      }
      else
        CallerRegs->ax = ( WORD )ERR_INTERNAL;

    }
  }

  SetForegroundRegs( CallerRegs );
}

APIFUNCRET RequestActiveUpdate( struct REGW
*CallerRegs )
{
  char *szCurrentUpdate = GetNameActiveUpdate();
  int iMsgBoxTotalLines;
  WORD wReturn;
  FLASHUPDATESTATES PowerState;

  if ( *szCurrentUpdate != ' ' && *szCurrentUpdate !=
NULL )
  {
    if ( ( PowerState = CheckFlashPowerState() ) !=
FLU_NOFLUSTATE )
    {
      switch( PowerState )
      {
        case FLU_GETBATTERYINFOERROR
          iMsgBoxTotalLines = FillMsgBoxBuff(
MsgBoxBuff,
STR_FLUGETBATINFOERROR,

SUI_CENTERJUSTIFIED
);
          break;

        case FLU_NOTONACERROR
          iMsgBoxTotalLines = FillMsgBoxBuff(
MsgBoxBuff,
STR_FLUNOAC, SUI_CENTERJUSTIFIED );
          break;

        case FLU_BATNOTATTACHEDERROR:
          iMsgBoxTotalLines = FillMsgBoxBuff(
MsgBoxBuff,
STR_FLUNOBATERROR, SUI_CENTERJUSTIFIED
);
          break;

        case FLU_BATCAPTOOLOWERROR:
          iMsgBoxTotalLines = FillMsgBoxBuff(
MsgBoxBuff,
STR_FLUBATTOOLOWERROR,
SUI_CENTERJUSTIFIED );
          break;

        default:
          iMsgBoxTotalLines = FillMsgBoxBuff(
MsgBoxBuff,
STR_FLUUNKNOWNBATERROR,
SUI_CENTERJUSTIFIED );
      }

      wReturn = ( WORD
)ERR_UPGRADENOTAVAIL;
    }
    else if ( GetSCSCallProgress() !=
SMI_SCSCONNECTED )
    {
      iMsgBoxTotalLines = FillMsgBoxBuff(
MsgBoxBuff,
STR_FLUNOCONNECTERROR,
SUI_CENTERJUSTIFIED );
      wReturn = ( WORD
)ERR_UPGRADENOTAVAIL;
    }
    else if ( GetLinkQuality() != PRX_HIGHQUALITY
)
    {
      iMsgBoxTotalLines = FillMsgBoxBuff(
MsgBoxBuff,
STR_FLULINKTOOLOWERROR,
SUI_CENTERJUSTIFIED );
      wReturn = ( WORD
)ERR_UPGRADENOTAVAIL;
    }
    else if ( GetCurrHostMode() != PND_DOSAPP )
    {
      iMsgBoxTotalLines = FillMsgBoxBuff(
MsgBoxBuff,
STR_FLUNOTINDOSAPP, SUI_CENTERJUSTIFIED
);
      wReturn = ( WORD
)ERR_UPGRADENOTAVAIL;
    }
    else
    {
      MsgBoxBuff[0].lpszText = ( LPSTR
)szCurrentUpdate;
      MsgBoxBuff[0].xAlignment =
SUI_CENTERJUSTIFIED;
      iMsgBoxTotalLines = 1;
      wReturn = ERR_SUCCESS;
      TRACE( "NOTICE: Flash upgrade safety checks
passed.\r" );
    }
  }
  else
  {
    iMsgBoxTotalLines = FillMsgBoxBuff(
MsgBoxBuff,
STR_FLUNOFLASHFILES,
SUI_CENTERJUSTIFIED );
    wReturn = ( WORD )ERR_UPGRADENOTAVAIL;

  }

  BuffHead.iStructLen = sizeof( MSGBOXBUFF );
  BuffHead.iBuffLen = sizeof( MSGBOXBUFF ) *
iMsgBoxTotalLines;
  BuffHead.Buff = ( LPVOID )MsgBoxBuff;

  CallerRegs->dx = SEG( &BuffHead );
  CallerRegs->si = OFF( &BuffHead );

  CallerRegs->ax = wReturn;

  SetForegroundRegs( CallerRegs );
}

void WaitForFlashUpdate( void )
{
  int iSizeFlashSector,
  int iNumberOfFlash,
  int iNewTmpFilePercent, iNewTmpDispPercent;
  int iRetryLimit = GetRetryLimit(
iDoUpdateThreadIdx );
  FlashStateOnError = FlashUpdateState.

  switch ( FlashUpdateState )
  {
    case FLU_NOFLUSTATE

    case FLU_SAFETYCHECK
      FlashUpdateState = FLU_INITMEM;

      SetWaitingIcon( SBS_WAITINGICONON, TRUE
);

      if ( UIConfigData.nSleepTimeIdx !=
SBS_SLEEPDISABLED )
      {
        SetPowerEnable(
SBS_POWERMANDISABLED );
        TRACE( "NOTICE: Disabled powerman for
flash update\r" );
      }
      break.

    case FLU_INITMEM
      TRACE( "NOTICE: Initializing and allocating
memory\r" );

      if ( ( szPathFlashFile = ( NPSTR )malloc(
SCS_MAXLENFILENAME + 1 ) ) == NULL )
        FlashUpdateState = FLU_MEMERROR;
      else
      {
        if ( SMDosBusy( GetFlashImageBuff ) !=
ERR_SUCCESS )
          FlashUpdateState = FLU_MEMERROR;
        else
        {
          FlashUpdateState = FLU_ALLOCDOSMEM;
          ResetRetryLimit( iDoUpdateThreadIdx );
        }
      }
      break;

    case FLU_ALLOCDOSMEM:
      if ( sFlashImageBuff == NULL )
      {
        if ( iRetryLimit == FLU_MAXDOSBUSY )
        {
          TRACE( "ERROR: Failed to allocate required
buffer\r" );
          FlashUpdateState = FLU_MEMERROR;
        }
      }
      else
      {
        TRACE( "NOTICE: Successfully acquired
memory\r" ).

        iTotalFlashFiles = FLU_NUMBERUNKNOWN;
        iCurrFlashFile = 0;

        str_chr( szPathFlashFile, 0,
SCS_MAXLENFILENAME );

        FlashUpdateState =
FLU_SENDREQFLASHUPD,
        ResetRetryLimit( iDoUpdateThreadIdx );

      }
      break.

    case FLU_SENDREQFLASHUPD:
      TRACE( "NOTICE: Requesting the flash
upgrade from the
Host\r" ).
      iSizeFlashSector = FLU_SIZEFLASHSECTOR /
1024,

      if ( SendPrivateMessage(
PMI_REQFLASHUPD, sizeof( int ),
          ( NPSTR )&iSizeFlashSector ) !=
ERR_SUCCESS )
        FlashUpdateState =
FLU_SENDPRIMSGERROR;
      else
```

```
      {
        if ( iRetryLimit == 0 )
          SetRetryLimit( iDoUpdateThreadIdx, 1 );

        SetTmpFilePercent( 0 );
        SetTimeLimit( iDoUpdateThreadIdx,
FLU_PRIMSGPOLLFREQ );
        FlashUpdateState =
FLU_WAITFORTMPFLASHFILES;
      }
      break;

    case FLU_WAITFORTMPFLASHFILES:
      iNewTmpFilePercent = GetTmpFilePercent();

      if ( iNewTmpFilePercent == 0 )
      {
        if ( iRetryLimit <= FLU_MAXPCNTTMPFILE )

        {
          TRACE( "ERROR: Timeout waiting for first
percent of
temp files.\r" );
          FlashUpdateState =
FLU_NOACKTEMPFILESERROR;
        }
        else if ( iRetryLimit %
FLU_MODPCNTTMPFILE == 0 )
        {
          TRACE( "ERROR: Requesting flash update
from host once
again\r" );
          FlashUpdateState =
FLU_SENDREQFLASHUPD;
        }
      }
      else
      {
        UpdateTmpFilePercentage(
iNewTmpFilePercent );
        iOldTmpFilePercent = iNewTmpFilePercent;
        iOldTmpDispPercent = iNewTmpDispPercent =
(
iNewTmpFilePercent * 2 ) / 100;
        FlashUpdateState =
FLU_UPDATETMPFILEPERCENT;
        ResetRetryLimit( iDoUpdateThreadIdx );
      }
      break;

    case FLU_UPDATETMPFILEPERCENT:
      iNewTmpFilePercent = GetTmpFilePercent();

      iNewTmpDispPercent = ( iNewTmpFilePercent *
2 ) / 100
      if ( iNewTmpFilePercent == iOldTmpFilePercent
)
      {
        if ( iRetryLimit <= FLU_MAXPCNTTMPFILE ||
            iNewTmpFilePercent == 100 )
        {
          ResetRetryLimit( iDoUpdateThreadIdx );
          FlashUpdateState =
FLU_WAITFORNUMFILES;
          TRACE( "NOTICE: Done waiting for number
of files,
onward\r" );

#if !defined( PROD )
          if ( iNewTmpFilePercent != 100 )
            TRACE( "ERROR: Timeout waiting for next
percent of
temp files.\r" );
#endif
        }
      }
      else
      {
        ResetRetryLimit( iDoUpdateThreadIdx );
        iOldTmpFilePercent = iNewTmpFilePercent;

        if ( iNewTmpDispPercent !=
iOldTmpDispPercent )
        {
          TRACE( "NOTICE: Updating percentage of
tmp file
processing\r" );
          UpdateTmpFilePercentage(
iNewTmpFilePercent );
          iOldTmpDispPercent =
iNewTmpDispPercent;
        }
      }
      break;

    case FLU_WAITFORNUMFILES:
      TRACE( "NOTICE: Waiting for total number of
flash files\r"
      );
```

```
      iNumberOfFlash = GetTotalFlashFiles();

      if ( iNumberOfFlash ==
FLU_NUMBERUNKNOWN )
      {
        if ( iRetryLimit <= FLU_MAXUPDREQ )

        {
          TRACE( "ERROR: Timeout waiting for
number of flash
files.\r" );
          FlashUpdateState =
FLU_NOACKNUMFILESERROR;
        }
      }
      else if ( iNumberOfFlash <=
FLU_ERRHOSTBASE )
      {
#if !defined( PROD )
        sprintf( szTempStr, "NOTICE: Number of flash
files
returned as an error code - %d\r", iNumberOfFlash );

        TRACE( szTempStr );
#endif
        switch ( iNumberOfFlash )
        {
          case FLU_ERRREADHOSTDAT:
            FlashUpdateState = FLU_READHOSTDAT;
            break;

          case FLU_ERRMISSINGFILE:
            FlashUpdateState = FLU_MISSINGFILE;
            break;

          case FLU_ERRNOFLASHFILES:
            FlashUpdateState = FLU_NOFLASHFILES;
            break;

          case FLU_ERROUTOFDISKSPACE:
            FlashUpdateState =
FLU_OUTOFDISKSPACE;
            break;

          case FLU_ERRFILECORRUPTED
            FlashUpdateState =
FLU_FILECORRUPTED;
            break;

          case FLU_ERRNOCHECKSUM
            FlashUpdateState = FLU_NOCHECKSUM;

            break;

          default:
            FlashUpdateState =
FLU_HOSTUNKNOWNERR;
            break;
        }
      }
      else
      {
        WORD wExtendedMem =
GetSizeOfExtendedMem();

#if !defined( PROD )
        sprintf( szTempStr, "NOTICE: Number of flash
files - %d
\r", iNumberOfFlash );
        TRACE( szTempStr );
#endif
        if ( iNumberOfFlash >
FLU_2MEGTHREASHHOLD &&
            wExtendedMem <
FLU_1MEGEXTENDEDRAM )
        {
          FlashUpdateState =
FLU_1MEGSYSTEMERROR;
        }
        else if ( iNumberOfFlash ==
FLU_2MEGTHREASHHOLD &&
            wExtendedMem ==
FLU_1MEGEXTENDEDRAM )
        {
          FlashUpdateState =
FLU_2MEGSYSTEMERROR;

        }
        else
        {
          iCurrFlashFile = 1;

          FlashUpdateState = FLU_SENDREQPATH,
          Set2MegFlash( ( iNumberOfFlash >
FLU_2MEGTHREASHHOLD )
);
          SetTimeLimit( iDoUpdateThreadIdx,
FLU_POLLFREQ );
```

```
          ResetRetryLimit( iDoUpdateThreadIdx );
        }
      }
      break;

    case FLU_SENDREQPATH
      *szPathFlashFile = NULL;

      if ( SendPrivateMessage(
PMI_REQPATHFROMIDX, sizeof ( int
),
                          ( NPSTR )&iCurrFlashFile )
!=
ERR_SUCCESS )
        FlashUpdateState =
FLU_SENDPRIMSGERROR;
      else
      {
        if ( iRetryLimit == 0 )
          SetRetryLimit( iDoUpdateThreadIdx, 1 );

        FlashUpdateState =
FLU_WAITFORPATHFLASHFILE,
        SetTimeLimit( iDoUpdateThreadIdx,
FLU_PRIMSGPOLLFREQ );
      }
      break;

    case FLU_WAITFORPATHFLASHFILE:
      if ( *GetPathFlashFile() == NULL )
      {
        if ( iRetryLimit < FLU_MAXPATHREQ )
        {
          TRACE( "ERROR: Timeout waiting for
response to path
requests" );
          FlashUpdateState =
FLU_NOACKPATHERROR;
        }
        else if ( iRetryLimit % FLU_MODPATHREQ
== 0 )
        {
          TRACE( "NOTICE: Trying again to receive
the next path
name\r" ),
          FlashUpdateState = FLU_SENDREQPATH,
        }
      }
      else
      {
        if ( *ParseForFileName( GetPathFlashFile() )
==
FLU_FLASHFILEID )
        {
          FlashUpdateState =
FLU_RECEIVEHOSTFILE;
          ResetRetryLimit( iDoUpdateThreadIdx );
          SetTimeLimit( iDoUpdateThreadIdx,
FLU_POLLFREQ );
        }
        else
        {
          TRACE( "NOTICE: Protected file
encountered, skipping to
the next file\r" );
          goto after_flash;
        }
      }
      break;

    case FLU_RECEIVEHOSTFILE:
#if !defined( PROD )
      sprintf( szTempStr, "NOTICE: File name
received - %s \r",
                GetPathFlashFile() );
      TRACE( szTempStr );
#endif
      if ( ReceiveHostFile( GetPathFlashFile(),
sFlashImageBuff,
FLU_SIZEFLASHSECTOR )
          != ERR_SUCCESS )
      {
        if ( iRetryLimit <= FLU_MAXRECVFILEREQ )
        {
          if ( iCurrFlashFile > 1 )
          {
            TRACE( "ERROR: Timeout waiting for
successful
ReceiveHostFile() request, from sector\r" );
            FlashUpdateState =
FLU_NOACKRECEIVEFATALERROR;
          }
          else
          {
            TRACE( "ERROR: Timeout waiting for
successful
ReceiveHostFile() request\r" );
            FlashUpdateState =
FLU_NOACKRECEIVEFILEERROR.
```

```
          }
        }
      }
      else
      {
        TRACE( "NOTICE: Finally beginning refresh of
the
specified sector\r" );
        FlashUpdateState = FLU_FLASHIT;
        ResetRetryLimit( iDoUpdateThreadIdx );
      }
      break.

    case FLU_FLASHIT:
      if ( ( iSectorFlashStatus = FlashSector(
sFlashImageBuff,
              iCurrFlashFile ) ) !=
SBS_FLASHSUCCESS )
      {
        if ( iSectorFlashStatus ==
SBS_FLASHACNOTATTACHED ||
              iRetryLimit <= FLU_MAXFLASHIT )

          FlashUpdateState =
FLU_FLASHFATALERROR.
      }
      else
      {
after_flash:
        UpdateFlashPercentage( iCurrFlashFile );
        ResetRetryLimit( iDoUpdateThreadIdx );

        if ( ++iCurrFlashFile > iTotalFlashFiles )
          FlashUpdateState = FLU_CLEAREEROM;
        else
          FlashUpdateState = FLU_SENDREQPATH,

      }
      break;

    case FLU_CLEAREEROM:
      TRACE( "NOTICE: Clearing EEPROM\r" );

      if ( ClearEEPROM() != ERR_SUCCESS )
      {
        if ( iRetryLimit <= FLU_MAXCLEAREEROM )

          FlashUpdateState =
FLU_EEROMNOCLRERROR;
      }
      else
      {
        ResetRetryLimit( iDoUpdateThreadIdx );
        FlashUpdateState =
FLU_FLASHUPDATECOMPLETE;
        SendPrivateMessage( PMI_REQFLASHDONE,
0, NULL );
      }
      break;

    case FLU_FLASHUPDATECOMPLETE:
      SendPrivateMessage( PMI_REQFLASHDONE,
0, NULL );
      FlashUpdateState = FLU_REBOOT;
      SetTimeLimit( iDoUpdateThreadIdx,
FLU_PRIMSGPOLLFREQ );
      break;

    case FLU_REBOOT:
      reboot( CRU_COLDBOOT );
      break;

    default:
      WaitForFlashError().
  }

  if ( FlashUpdateState >
FLU_BEGINERRORSTATES )
    WaitForFlashError();
}

void WaitForFlashError( void )
{
  SendPrivateMessage( PMI_REQFLASHDONE, 0,
NULL );

  if ( sFlashImageBuff == NULL )
  {
    DelThread( iDoUpdateThreadIdx );
    SetWaitingIcon( SBS_WAITINGICONOFF, TRUE
);
  }
  else
  {
    SetRetryLimit( iDoUpdateThreadIdx, 1 );
    HideMessageBox().
    SMDoBusy( ReleaseFlashMem );
    return,
  }
```

```
switch ( FlashUpdateState )
{
  case FLU_NOFLASHFILES
    OpenMessageBox( STR_FLUNOFLASHFILES,
0, SUI_LEFTJUSTIFIED,
SUI_OK ),
    break,

  case FLU_READHOSTDAT
    OpenMessageBox( STR_FLUREADHOSTDAT,
0, SUI_LEFTJUSTIFIED,
SUI_OK ),
    break;

  case FLU_MISSINGFILE
    OpenMessageBox( STR_FLUMISSINGFLASH,
0, SUI_LEFTJUSTIFIED,
SUI_OK ),
    break;

  case FLU_OUTOFDISKSPACE
    OpenMessageBox(
STR_FLUOUTOFDISKSPACE, 0,
SUI_LEFTJUSTIFIED, SUI_OK );
    break,

  case FLU_FILECORRUPTED
    OpenMessageBox(
STR_FLUFRLECORRUPTED, 0
SUI_LEFTJUSTIFIED,
SUI_OK ),
    break,

  case FLU_NOCHECKSUM
    OpenMessageBox( STR_FLUNOCHECKSUM
0, SUI_LEFTJUSTIFIED,
SUI_OK ),
    break,

  case FLU_NOACKTEMPFILESERROR
    OpenMessageBox(
STR_FLUNOACKTMPERROR, 0,
SUI_LEFTJUSTIFIED
SUI_OK ),
    break,

  case FLU_NOACKNUMFILESERROR
    OpenMessageBox(
STR_FLUNOACKNUMFILEERR, 0
SUI_LEFTJUSTIFIED, SUI_OK ),
    break,

  case FLU_NOACKPATHERROR:
    OpenMessageBox(
STR_FLUNOACKPATHERROR, 0,
SUI_LEFTJUSTIFIED, SUI_OK ),
    break,

  case FLU_NOACKRECEIVEFILEERROR
    OpenMessageBox(
STR_FLUNOACKRECVFILEERR, 0,
SUI_LEFTJUSTIFIED, SUI_OK ),
    break;

  case FLU_NOACKRECEIVEFATALERROR:
    OpenMessageBox(
STR_FLUNOACKRECVFATAL, 0,
SUI_LEFTJUSTIFIED, SUI_OK ),
    break

  case FLU_SENDPRIMSGERROR:
    OpenMessageBox( STR_FLUSENDPRIMSG, 0,
SUI_LEFTJUSTIFIED
SUI_OK ),
    break;

  case FLU_1MEGSYSTEMERROR:
    OpenMessageBox(
STR_FLU1MEGSYSERROR, 0,
SUI_LEFTJUSTIFIED,
SUI_OK ),
    break,

  case FLU_2MEGSYSTEMERROR:
    OpenMessageBox(
STR_FLU2MEGSYSERROR, 0,
SUI_LEFTJUSTIFIED,
SUI_OK );
    break;

  case FLU_FLASHFATALERROR
    switch ( iSectorFlashStatus )
    {
      case SBS_FLASHACNOTATTACHED:
        OpenMessageBox( STR_FLUNOAC, 0,
SUI_LEFTJUSTIFIED
SUI_OK );
        break;

      case SBS_FLASHERASEERROR:
        OpenMessageBox( STR_FLUFLASHERASE,
0,
SUI_LEFTJUSTIFIED, SUI_OK );
        break;

      case SBS_FLASHPROGERROR:
        OpenMessageBox( STR_FLUFLASHPROG,
0, SUI_LEFTJUSTIFIED,
SUI_OK );
        break;

      default
        OpenMessageBox(
STR_FLUFLASHUNKNOWN, 0,
SUI_LEFTJUSTIFIED, SUI_OK );
        break;
    }
    break;

  case FLU_EEROMNOCLRERROR:
    OpenMessageBox( STR_FLUEEROMNOCLR,
0, SUI_LEFTJUSTIFIED,
SUI_OK );
    break,

  case FLU_HOSTUNKNOWNERR
    OpenMessageBox(
STR_FLUUNKNOWNHOSTERR, 0,
SUI_LEFTJUSTIFIED, SUI_OK ),
    break

  case FLU_MEMERROR:
    OpenMessageBox(
STR_FLURAMALLOCATION, 0,
SUI_LEFTJUSTIFIED
SUI_OK ),
    break;

  default
    OpenMessageBox(
STR_FLUUNKNOWNERROR, 0,
SUI_LEFTJUSTIFIED,
SUI_OK );
  }
}

void GetFlashImageBuff( void )
{
  WORD wSector;

  TRACE( "NOTICE: Allocating memory from
CoSession for the
reflash buffer\r" );

  SetSCSMemory( SCS_DLGFREEMEMPERCENT,
SCS_FREEMEM, ( BYTE
)SMI_SCSNOWAITFORDOS );

  if ( ( wSector = GetFreeMCB( ( WORD )(
FLU_SIZEFLASHSECTOR / 16
) ) ) != 0 )
    sFlashImageBuff = MK_FP( wSector, 0 );
}

void ReleaseFlashMem( void )
{
  if ( szPathFlashFile != NULL )
  {
    free( szPathFlashFile );
    szPathFlashFile = NULL;
  }

  if ( sFlashImageBuff != NULL )
  {
    SetFreeMCB( SEG( sFlashImageBuff ) );
    sFlashImageBuff = NULL;
  }

  TRACE( "NOTICE: Returning memory to
CoSession, used by the
reflash buffer\r" );

  SetSCSMemory( 0, SCS_FREEMEM, ( BYTE
)SMI_SCSNOWAITFORDOS );

  if ( UIConfigData.nSleepTimeIdx !=
SBS_SLEEPDISABLED )
    SetPowerEnable( SBS_POWERMANENABLED );

}

int UpdateTmpFilePercentage( int
iNewTmpFilePercent )
{
  int iPercentage,

  iPercentage = ( iNewTmpFilePercent * 2 ) / 100;

  AX( SUI_UPDATEFLASHPRCNT );
  BX( iPercentage );

  ( *lpfnSUICallBack )();

  return ( ERR_SUCCESS );
}

int UpdateFlashPercentage( int iFlashFileNum )
{
  int iPercentage;

  if ( iTotalFlashFiles <= 0 )
    return ( ERR_INTERNAL );

  iPercentage = ( iFlashFileNum * 100 ) /
iTotalFlashFiles,

  AX( SUI_UPDATEFLASHPRCNT );
  BX( iPercentage );

  ( *lpfnSUICallBack )();

  return ( ERR_SUCCESS );
}

int GetActiveUpdate( void )
{
  if ( GetSCSCallProgress() !=
SMI_SCSCONNECTED )
    TRACE( "NOTICE: Not currently connected for
GetActiveUpdate(), sending PM anyway\r" );

  if ( IsFlashSupported() )
  {
    if ( szNameActiveUpdate == NULL )
      if ( ( szNameActiveUpdate = ( NPSTR )malloc(
SUI_MAXLENACTIVEUPD + 1 ) ) == NULL )
        return ( ERR_INTERNAL );

    fmemset( szNameActiveUpdate, 0,
SUI_MAXLENACTIVEUPD + 1 );

    if ( SendPrivateMessage(
PMI_REQACTIVEUPGRADE, 0, NULL ) !=
ERR_SUCCESS )
      return ( ERR_INTERNAL );

    TRACE( "NOTICE: Sent Private Message to
determine the name of
the active upgrade on the Host \r" );

    if ( ( iActiveUpdateThreadIdx =
GetTempEventNum() ) ==
ERR_INTERNAL )
      return ( ERR_INTERNAL );

    AddThread( iActiveUpdateThreadIdx,
WaitForActiveUpdate, NULL,
SMD_MANYTIMES,
          FALSE, FLU_PRIMSGPOLLFREQ,
FLU_MAXRETRY );


  }
  else
  {
    TRACE( "ERROR: Flash not supported\r" );
    return ( ERR_INTERNAL );
  }

  return ( ERR_SUCCESS );
}

void WaitForActiveUpdate( void )
{
  int iRetryLimit = GetRetryLimit(
iActiveUpdateThreadIdx );

  if ( *GetNameActiveUpdate() == NULL )
  {
    if ( iRetryLimit < FLU_MAXACTUPDREQ )
    {
      DelThread( iActiveUpdateThreadIdx );
      else if ( iRetryLimit % FLU_MODACTUPDREQ
== 0 )
      {
        if ( SendPrivateMessage(
PMI_REQACTIVEUPGRADE, 0, NULL ) !=
ERR_SUCCESS )
          DelThread( iActiveUpdateThreadIdx );
      }
    }
    else
      DelThread( iActiveUpdateThreadIdx );
}

int SetPathFlashFile( LPSTR szNewPathFlashFile )
{
  if ( szPathFlashFile == NULL )
    return ( ERR_INTERNAL );
  PCB_BEGINCRITICAL:
  fmem_cp( ( LPVOID )szNewPathFlashFile, (
LPVOID
)szPathFlashFile,
        fstr_len( szNewPathFlashFile ) + 1 );
  PCB_ENDCRITICAL,

  return ( ERR_SUCCESS ),
}

char *GetPathFlashFile( void )
{
  return ( szPathFlashFile );
}

int SetTotalFlashFiles( int iNewTotalFlashFiles )
{
  iTotalFlashFiles = iNewTotalFlashFiles;

  return ( ERR_SUCCESS );
}

int GetTotalFlashFiles( void )
{
  int iReturn

  PCB_BEGINCRITICAL;
  iReturn = iTotalFlashFiles,
  PCB_ENDCRITICAL;

  return ( iReturn );
}

int SetNameActiveUpdate( LPSTR
szNewActiveUpdate )
{
  if ( szNameActiveUpdate == NULL )
    return ( ERR_INTERNAL );

  PCB_BEGINCRITICAL;
  if ( szNewActiveUpdate == NULL )
    *szNameActiveUpdate = ' ';
  else
    fmem_cp( ( LPVOID )szNewActiveUpdate, (
LPVOID
)szNameActiveUpdate,
          SUI_MAXLENACTIVEUPD );
  PCB_ENDCRITICAL.

  return ( ERR_SUCCESS );
}

char *GetNameActiveUpdate( void )
{
  if ( szNameActiveUpdate == NULL )
    return ( szNullStr );
  else
    return ( szNameActiveUpdate );
}

int SetTmpFilePercent( int iNewPercent )
{
  iTmpFilePercent = iNewPercent,

  return ( ERR_SUCCESS );
}

int GetTmpFilePercent( void )
{
  int iReturn,

  PCB_BEGINCRITICAL;
  iReturn = iTmpFilePercent;
  PCB_ENDCRITICAL;

  return ( iReturn );
}

FLASHUPDATESTATES CheckFlashPowerState(
void )
{
  LONG lBatteryInfo = GetBatteryInfo();

  if ( lBatteryInfo ==
SBS_GETBATTERYINFOERROR )
    return ( FLU_GETBATTERYINFOERROR );

  if ( ( lBatteryInfo & SBS_ACDCSTATEMASK ) !=
SBS_ACDCSTATEMASK
  )
    return ( FLU_NOTONACERROR ).

  if ( ( lBatteryInfo &
SBS_BATTERYATTACHEDMASK ) !=
SBS_BATTERYATTACHED )
    return ( FLU_BATNOTATTACHEDERROR );
```

```
 if ( HIBYTE( LOWORD( ( lBatteryInfo &
SBS_BATTERYCAPACITYMASK )
) ) < SBS_BATTERYFLASHMINCAP )
   return ( FLU_BATCAPTOOLOWERROR );

 return ( FLU_NOFLUSTATE );
}

#if defined( _MSC_VER )
#pragma warning( default : 4704 )
#endif
Copr. 1995 Zenith Data Systems Corp.
#include "cr.h"
#include "sio.h"
#include "spawn.h"
#include "sm.h"

#if defined( _MSC_VER )
#pragma warning( disable : 4704 )
#endif


TIMEOUT timeoutStatus = TIMEOUT_AVAILABLE;


static void TimeoutFire ( void );


static DOSBUSYCB fnDosBusyCallBack = NULL;
static VIDBUSYCB fnVidBusyCallBack1 = NULL;
static VIDBUSYCB fnVidBusyCallBack2 = NULL
static MODALMSGBOXCB fnMsgBoxCallBack =
NULL;
static int iTempThreadIdx =
SMD_NOACTIVETHREAD;
static int iOkThreadIdx;
static int iVideoBusyThreadIdx =
SMD_NOACTIVETHREAD;
static int iSpkrThreadIdx =
SMD_NOACTIVETHREAD;
BYTE aDummyFCB1[] = "\0          ";
BYTE aDummyFCB2[] = "\0          ";

static char *sVideoStateBuff;


void GetForegroundRegs( struct REGW *InRegs )
{
  register struct sreg *s;
  register struct REGW *r;
  struct glob_stk far *p;

  r = InRegs ;
  s = _int_frame

  r->es = s->es;
  r->bp = s->bp;
  r->di = s->di;
  r->si = s->si;
  r->cx = s->cx;

  *(word*)&p = s->saved_sp;
  *(((word*)&p)+1) = s->saved_ss;

  r->ds = p->ds;
  r->dx = p->dx;
  r->bx = p->bx;
  r->ax = p->ax;
 }

 void SetForegroundRegs( struct REGW *OutRegs )
 {
  struct sreg *s;
  struct REGW *r;
  struct glob_stk far *p;

  r = OutRegs;
  s = _int_frame;

  s->es = r->es;
  s->bp = r->bp;
  s->di = r->di;
  s->si = r->si;
  s->cx = r->cx;

  p = ( struct glob_stk far * )MK_FP( s->saved_ss,
 s->saved_sp );


  p->ds = r->ds;
  p->dx = r->dx;
  p->bx = r->bx;
  p->ax = r->ax;
 }

 #if !defined( PROD )
 void Trace( char *szOutStr )
 {
  REG_W InRegs, OutRegs;

 fill_chr( ( NPSTR )&InRegs, 0, sizeof( REG_W ) );

 InRegs.ax = SID_FUNCNUM | SID_OUTSTRING;
 InRegs.si = SID_SISIG;
 InRegs.di = SID_DISIG;
 InRegs.ds = SEG( szOutStr );
 InRegs.dx = OFF( szOutStr );

 intr( &InRegs, &OutRegs, SID_INTNUM );
}
#endif

void CallAPIFunction( APIFUNC aAPIFuncTable[] )
{
 APIFUNCPTR fpAPIFunction;
 struct REGW CallerRegs;

 PCB_BEGINCRITICAL
 GetForegroundRegs( &CallerRegs );
 PCB_ENDCRITICAL

 fpAPIFunction = ( APIFUNCPTR )GetAPIFunction(
aAPIFuncTable,
&CallerRegs );

 if ( fpAPIFunction != NULL )
  ( *fpAPIFunction )( &CallerRegs );
 else
 {
  CallerRegs.ax = ( WORD
)ERR_NOTSUPPORTED;
  SetForegroundRegs( &CallerRegs );
 }
}

NEARPROC GetAPIFunction( APIFUNC
aAPIFuncTable[], struct REGW
*pCallerRegs )
{
 WORD wFuncCode = pCallerRegs->ax & 0x7FFF;
 int iFuncIdx = 0;

 if ( aAPIFuncTable == NULL )
  return ( NULL );

 while ( TRUE )
 {
  if ( wFuncCode == aAPIFuncTable[ iFuncIdx
].wFuncCode )
    return( aAPIFuncTable[ iFuncIdx ].fpAPIFunc );

  if ( aAPIFuncTable[ ++iFuncIdx ].wFuncCode ==
0 &&
     aAPIFuncTable[ iFuncIdx ].fpAPIFunc ==
NULL )
    return ( NULL );
 }
}

int ErrorBeep( void )
{
 sound( SMU_ERRORFREQ, SMU_ERRORDUR );

 if ( iSpkrThreadIdx >= 0 )
 {
  TRACE( "NOTICE: ErrorBeep() reentered\r" );
  return ( ERR_SUCCESS );
 }

 if ( ( iSpkrThreadIdx = GetTempEventNum() ) < 0 )
  return ( ERR_INTERNAL );

 AddThread( iSpkrThreadIdx, DoSpkrRestore,
NULL, SMD_ONETIME,
FALSE, SHC_SPKRPOLLFREQ,
        0 );

 return ( ERR_SUCCESS );
}

void DoSpkrRestore( void )
{
 DelThread( iSpkrThreadIdx );

 iSpkrThreadIdx = SMD_NOACTIVETHREAD;

 TRACE( "NOTICE: Speaker frequency restored for
PDV" );

 SetPenSpkFreq();
}

int SMDosBusy( DOSBUSYCB fnCallBack )
{
 if ( iTempThreadIdx >= 0 )
 {
  TRACE( "ERROR: SMDosBusy was reentered\r"
);
  DEBUG_BREAK;
  return ( 0 );
 }

 if ( ( iTempThreadIdx = GetTempEventNum() ) < 0
)
  return ( ERR_INTERNAL );

 fnDosBusyCallBack = fnCallBack;

 AddThread( iTempThreadIdx, SMCheckDosBusy,
NULL, SMD_MANYTIMES,
FALSE, DBT_POLLFREQ,
        DBT_MAXRETRY );

 return ( ERR_SUCCESS );
}

void SMCheckDosBusy( void )
{
 BOOL fMadeDosBusy = FALSE;

 if ( *_isr_flg_ptr & ~SMD_SCHEDULERS )
  return;

 if ( dos_busy( 0 ) )
 {
  if ( GetRetryLimit( iTempThreadIdx ) == 0 )
  {
   TRACE( "ERROR: Timed out waiting for DOS
busy\r" );
   DEBUG_BREAK
  }
  else
   return;
 }

 DelThread( iTempThreadIdx );
 iTempThreadIdx = SMD_NOACTIVETHREAD;

 ( *fnDosBusyCallBack )();
}

int SMVideoBusy( VIDBUSYCB fnCallBack )
{
 if ( fnVidBusyCallBack1 != NULL )
 {
  if ( fnVidBusyCallBack2 != NULL )
  {
   TRACE( "NOTICE: SMVideoBusy() reentered
more than twice,
waiting for SUI video busy\r" );
   DEBUG_BREAK;
   return ( ERR_INTERNAL );
  }
  else
  {
   TRACE( "NOTICE: SMVideoBusy() reentered
waiting for SUI
video busy\r" );
   fnVidBusyCallBack2 = fnCallBack;
  }
 }
 else
  fnVidBusyCallBack1 = fnCallBack;

 if ( iVideoBusyThreadIdx ==
SMD_NOACTIVETHREAD )
 {
  if ( ( iVideoBusyThreadIdx =
GetTempEventNum() ) < 0 )
   return ( ERR_INTERNAL );

  AddThread( iVideoBusyThreadIdx,
SMCheckVideoBusy, NULL,
SMD_POLLED, FALSE,
        SCS_VIDBLOCKPOLLFREQ, 0 );
 }

 return ( ERR_SUCCESS );
}

void SMCheckVideoBusy( void )
{
 static BYTE nCntVideoBlocked = 0;

 if ( !GetVideoBlocked() )
 {
  if ( ++nCntVideoBlocked >= 3 )
  {
   nCntVideoBlocked = 0;
   DelThread( iVideoBusyThreadIdx );
   iVideoBusyThreadIdx =
SMD_NOACTIVETHREAD;
   TRACE( "NOTICE: SUI video not busy, notify
the threads\r"
);

    if ( fnVidBusyCallBack1 != NULL )
    {
     ( *fnVidBusyCallBack1 )();
     fnVidBusyCallBack1 = NULL;
    }

    if ( fnVidBusyCallBack2 != NULL )
    {
     ( *fnVidBusyCallBack2 )();
     fnVidBusyCallBack2 = NULL;
    }
   }
  }
 else
  nCntVideoBlocked = 0;
}

void SetReentrancy( BOOL fEnable )
{
 static BYTE bOldIsrFlg;

 if ( fEnable )
 {
  PCB_BEGINCRITICAL;
  bOldIsrFlg = *_isr_flg_ptr;
  *_isr_flg_ptr = SMD_NOREENTRANCE;
  PCB_ENDCRITICAL;
 }
 else
 {
  PCB_BEGINCRITICAL;
  *_isr_flg_ptr = bOldIsrFlg;
  PCB_ENDCRITICAL
 }
}

int RestoreVideoMode( void )
{

 if ( sVideoStateBuff == NULL )
  return ( ERR_INTERNAL );


 VideoState( sVideoStateBuff,
SHC_VIDEOHARDWARE |
SHC_VIDEODATAAREA | SHC_COLORPALREGS,
        SHC_RESTOREVIDEO );

 free( sVideoStateBuff );

 sVideoStateBuff = NULL;

 return ( ERR_SUCCESS );


}

WORD SetVideoMode( BYTE nRequestedMode )
{
 int AX;

 AX = MAKEWORD( nRequestedMode, 0 );
 int10( AX );

 return ( ERR_SUCCESS );
}

int VideoState( char *sVidBuff, char nDataType, char
nOperation )
{
 REG_W InRegs, OutRegs;

 fill_chr( ( NPSTR )&InRegs, 0, sizeof( REG_W ) );

 if ( nOperation != SHC_SIZEOFBUFF )
 {
  if ( sVidBuff != NULL )
  {
   InRegs.es = SEG( sVidBuff );
   InRegs.bx = OFF( sVidBuff );
  }
  else
   return ( ERR_INTERNAL );
 }
```

```
 inRegs.cx = ( int )nDataType;
 inRegs.ax = MAKEWORD( nOperation,
SHC_VIDSTATEFUNC );

 intn( &inRegs, &OutRegs, 0x10 );

 if ( nOperation == SHC_SIZEOFBUFF )
  return ( OutRegs.bx );
 else
  return ( ERR_SUCCESS );
}

int JmExec( char szProgName[], char
sCmdLineParm[] )
{
 int iReturn = 0
 EXECPARMS ep.
 BYTE sCmdLineTail[] = "\0\r",
 WORD wSegEP, wOffEP, wSegPN, wOffPN;
 WORD wOldPSP;

 ep.wSegEnv = 0;

 if ( sCmdLineParm == NULL )
 {
  ep.wOffCmdLineTail = OFF( sCmdLineTail );
  ep.wSegCmdLineTail = SEG( sCmdLineTail );
 }
 else
 {
  ep.wOffCmdLineTail = OFF( sCmdLineParm );
  ep.wSegCmdLineTail = SEG( sCmdLineParm );
 }

 ep.wOffFCB1 = OFF( aDummyFCB1 ).
 ep.wSegFCB1 = SEG( aDummyFCB1 );
 ep.wOffFCB2 = OFF( aDummyFCB2 ).
 ep.wSegFCB2 = SEG( aDummyFCB2 );

 wSegEP = SEG( &ep );
 wOffEP = OFF( &ep );
 wSegPN = SEG( szProgName ).
 wOffPN = OFF( szProgName ).

 wOldPSP = set_my_psp()

 AX( SMD_DOSEXEC ).
 ES( wSegEP ).
 BX( wOffEP ).
 DS( wSegPN ).
 DX( wOffPN ).

 _asm
 {
  int 21h
  jnc success
  mov iReturn,ax
 };

success:
 restore_psp( wOldPSP );
 return ( iReturn );
}

WORD GetFreeMCB( WORD wNumPara )
{
 REG_W inRegs, OutRegs,
 WORD wReturn = 0, wFlags,

 fil_chr( ( NPSTR )&inRegs, 0, sizeof( REG_W ) );

 inRegs.ax = SMD_DOSALLOCMEM;
 inRegs.bx = wNumPara;

 PCB_BEGINCRITICAL;

 wFlags = intn( &inRegs, &OutRegs, SMD_DOSINT
);

 PCB_ENDCRITICAL;

 if ( !( wFlags & GEN_CARRYFLAG ) )
  return ( OutRegs.ax );
 else
  return ( 0 ).
}

int SetFreeMCB( WORD wSegment )
{
 REG_W inRegs, OutRegs,
 WORD wFlags.

 fil_chr( ( NPSTR )&inRegs, 0, sizeof( REG_W ) ).

 inRegs.ax = SMD_DOSFREEMEM,
 inRegs.es = wSegment;

 PCB_BEGINCRITICAL;

 wFlags = intn( &inRegs, &OutRegs, SMD_DOSINT
);

 PCB_ENDCRITICAL;

 if ( !( wFlags & GEN_CARRYFLAG ) )
  return ( ERR_SUCCESS ).
 else
  return ( OutRegs.ax ).
}

int StuffKeyStr( char *szStr )
{
 char *cKey = szStr;

 if ( strlen( szStr ) > SHC_MAXLENKBBUFF )
  return ( ERR_INTERNAL ).

 while ( TRUE )
 {
  if ( *cKey )
   stuff_key( MAKEWORD( *cKey++, 0 ) );
  else
   return ( ERR_SUCCESS );
 }
}


BOOL IsGetFunction( struct REGW *CallerRegs )
{
 return ( CallerRegs->ax & 0x8000 );
}

char *ParseForFileName( char *szPathName )
{
 int iChar,

 for ( iChar = strlen( szPathName ) - 1; iChar >= 0,
--iChar )
 {
  if ( szPathName[ iChar ] == '\\' )
   return ( szPathName + iChar + 1 );
 }

 return ( NULL ).
}

BOOL IsNodeAddressBlank( char *szNodeAddress )
{

 return ( strlen( szNodeAddress ) == 0 );


}

int DoModalMsgBox( MODALMSGBOXCB
fnCallBack, int iMsgBoxTimeOut )
{
 if ( ( fnMsgBoxCallBack = fnCallBack ) == NULL )
  return ( ERR_INTERNAL );

 if ( ( iOkThreadIdx = GetTempEventNum() ) <
ERR_SUCCESS )
  return ( ERR_INTERNAL ).

 SetMsgBoxReturnCode( SUI_NOBUTTONS ).

 if ( iMsgBoxTimeOut > 0 )
  AddThread( iOkThreadIdx WaitForOK, NULL,
SMD_MANYTIMES,
FALSE, SUI_MSGBOXPOLLFREQ,
       iMsgBoxTimeOut );
 else
  AddThread( iOkThreadIdx, WaitForOK, NULL,
SMD_POLLED, FALSE,
SUI_MSGBOXPOLLFREQ,
       0 );

 return ( ERR_SUCCESS );
}

void WaitForOK( void )
{
 int iButtonCode;

 if ( ( iButtonCode = GetMsgBoxReturnCode() ) !=
SUI_NOBUTTONS )
 {
  DelThread( iOkThreadIdx );
  ( *fnMsgBoxCallBack )( iButtonCode );
 }
 else if ( GetThreadType( iOkThreadIdx ) ==
SML_MANYTIMES )
 {
  if ( GetRetryLimit( iOkThreadIdx ) == 0 )
  {
   DelThread( iOkThreadIdx ).
   ( *fnMsgBoxCallBack )( SUI_NOBUTTONS );
  }
 }
}

int AbsToZero( int iValue )
{
 return ( iValue < 0 ? 0 : iValue ).
}

TIMEOUT TimerManager (TIMEOUT_FLAG
fTimeout, int iThreadIdx, long
lTicks)
{
  static int  iTimeoutThreadIdx;
  static int  iThreadInUseIdx = -1;
  TIMEOUT  timeoutReply;

  switch (fTimeout)
  {
   case TF_SET:
   if (timeoutStatus == TIMEOUT_AVAILABLE)
   {
    if ( ( iTimeoutThreadIdx =
GetTempEventNum() ) !=
ERR_INTERNAL )
    {
      AddThread( iTimeoutThreadIdx,
TimeoutFire, NULL,
SMD_ONETIME, FALSE,
          lTicks, 0 );
      timeoutStatus = TIMEOUT_RUNNING,
      iThreadInUseIdx = iThreadIdx;

      timeoutReply = timeoutStatus;
    }
    else
      timeoutReply = TIMEOUT_ERROR;
   }
   break;

   case TF_RESET:
   if (iThreadInUseIdx == iThreadIdx)
   {
    timeoutStatus = TIMEOUT_AVAILABLE;
    timeoutReply = timeoutStatus,
    iThreadInUseIdx = -1;
   }
   else
    timeoutReply = TIMEOUT_NOTAVAILABLE;
   break,

   case TF_CHECK:
   if (iThreadInUseIdx == iThreadIdx ||
timeoutStatus ==
TIMEOUT_AVAILABLE)
     timeoutReply = timeoutStatus,
   else
     timeoutReply = TIMEOUT_NOTAVAILABLE;
   break;
  }

  return timeoutReply.
}

static void TimeoutFire ( void )
{
  timeoutStatus = TIMEOUT_FIRED;
}

#if defined( _MSC_VER  )
#pragma warning( default : 4704 )
#endif



Copr. 1995 Zenith Data Systems Corp.
#include "cr.h"
#include "sio.h"
#include "spawn.h"
#include "sm.h"

#if defined( _MSC_VER  )
#pragma warning( disable : 4704 )
#endif

static ZDSTRAPREC VIDTrapRec;
static char nXCharRes = -1;
static char nYCharRes = -1;
static int  iYScreenRes = -1;
static iCurrVidMode = 0.

static iPanNotifyThreadIdx = -1,

void InitVIDTrapRec( void )
{
 fil_chr( ( NPSTR )&VIDTrapRec, 0, sizeof(
ZDSTRAPREC ) ).

 VIDTrapRec.tr.tr_int = SBS_VIDINTNUM,
 VIDTrapRec.tr.tr_asm_srv =
CRU_ONBUSYOLDINT;

 strcpy( VIDTrapRec.szSMAlterSignature,
szSMSignature ).
}

TRAPREC *GetVIDTrapRec( void )
{
 return ( &VIDTrapRec.tr ).
}

char GetYCharRes( void )
{
 if ( nYCharRes > 0 )
  return ( nYCharRes ).
 else
  return ( SCS_HEIGHTOFTEXTCHAR ).
}

char GetXCharRes( void )
{
 if ( nXCharRes > 0 )
  return ( nXCharRes ).
 else
  return ( SCS_WIDTHOFTEXTCHAR );
}

int GetXScreenRes( int iVideoMode )
{
 switch ( iVideoMode )
 {
  case 0x00:
  case 0x01:
   return ( 320 ).

  case 0x02.
  case 0x03.
   return ( 640 ).

  case 0x04:
  case 0x05:
   return ( 320 );

  case 0x06
   return ( 640 );

  case 0x07.
   return ( 720 );

  case 0x08.
  case 0x09:
  case 0x0A:
  case 0x0B:
  case 0x0C:
   return ( ERR_INTERNAL ).

  case 0x0D:
   return ( 320 );

  case 0x0E:
  case 0x0F:
  case 0x10:
  case 0x11:
  case 0x12:
   return ( 640 ):

  default:
   return ( ERR_INTERNAL ):
 }
}

int GetYScreenRes( int iVideoMode )
{
 if ( iVideoMode == SBS_HIGHTEXTVIDMODE &&
iYScreenRes > 0 )
  return ( iYScreenRes ):
 else
 {
  switch ( iVideoMode )
  {
   case 0x00:
   case 0x01:
   case 0x02:
   case 0x03:
   case 0x04:
   case 0x05:
   case 0x06:
    return ( 400 ).

   case 0x07:
    return ( 350 ).

   case 0x08:
   case 0x09.
   case 0x0A:
   case 0x0B.
   case 0x0C:
    return ( ERR_INTERNAL ):
```

```
      case 0x0D:
      case 0x0E:
        return ( 200 );

      case 0x0F:
      case 0x10:
        return ( 350 );

      case 0x11:
      case 0x12:
        return ( 480 );

      default:
        return ( ERR_INTERNAL );
    }
  }
}

int GetCurrVidMode( void )
{
  return ( iCurrVidMode );
}

BOOL VIDTrapService( void )
{
  struct REGW Regs;
  BOOL fReturn = TRUE;

  GetForegroundRegs( &Regs );

  switch ( HIBYTE( Regs.ax ) )
  {
    case SBS_SETVIDEOMODEFUNCS:
      TRACE( "NOTICE: Set video mode
intercepted\n" );

      iCurrVidMode = LOBYTE( Regs.ax ) &
~SBS_VIDMODEMASK;


      AfterModePenNotify();
      break;

    case SBS_CHARACTERGENFUNCS:
      TRACE( "NOTICE: Set text font after mode set
intercepted\n"
);

      if ( iCurrVidMode <=
SBS_HIGHTEXTVIDMODE )
        AfterModePenNotify();
      break;

    default:
      return ( FALSE );
  }

  return ( TRUE );
}

void AfterModePenNotify( void )
{
  if ( iPenNotifyThreadIdx >= 0 )
    return;

  if ( ( iPenNotifyThreadIdx = GetTempEventNum() )
< 0 )
    return;

  AddThread( iPenNotifyThreadIdx,
  WaitForPenNotify, NULL,
  SMC_ONETIME, FALSE,
            SBS_PENNOTIFYPOLLFREQ, 0 );
}

void WaitForPenNotify( void )
{
  char FAR *pNumScreenRows = ( char FAR *
)SHC_ADDSCREENROWS;
  char FAR *pNumCharScans = ( char FAR *
)SHC_ADDCHARSCANLINES;

  DelThread( iPenNotifyThreadIdx );
  iPenNotifyThreadIdx = -1;

  if ( iCurrVidMode <= SBS_HIGHTEXTVIDMODE )
  {
    nYCharRes = *pNumCharScans;
    iYScreenRes = nYCharRes * (
*pNumScreenRows + 1 );
  }
  else
    iYScreenRes = -1;

  NotifyVideoMode( iCurrVidMode );
}

#if defined( _MSC_VER )
#pragma warning( default : 4704 )
#endif


Copr 1985 Zenith Data Systems Corp.

MAX_STK_TOP   =   01780h

CMD_LINE_SZ   =   80h
MIN_STK_SZ    =   100h

_TEXT    segment   byte public 'CODE'
_TEXT    ends
_VTX segment byte public 'CODE'
_VTX ends
_ITEXT   segment   byte public 'CODE'
_ITEXT   ends
_ZTEXT   segment   byte public 'CODE'
_ZTEXT   ends
_FITEXT SEGMENT PARA PUBLIC 'CODE'
_FITEXT ENDS
_FXDATA   segment word public 'DATA'
_FXDATA   ends
_FDATA    segment word public 'DATA'
_FDATA    ends
_VDATA    segment word public 'DATA'
_VDATA    ends
_RDATA    segment word public 'DATA'
_RDATA    ends
_IDATA    segment word public 'DATA'
_IDATA    ends
_DATA     segment word public 'DATA'
_DATA     ends
_BSS segment word public 'BSS'
_BSS ends
_BSSEND segment byte public 'BSSEND'
_BSSEND ends


CGROUP   group _TEXT,_VTX,_ITEXT,_ZTEXT
DGROUP   group
_FDATA,_FXDATA,_VDATA,_RDATA,_IDATA,_DAT
A,_BSS,_BSSEND
    assume
cs:CGROUP,ds:DGROUP,ss:DGROUP

_STACK  SEGMENT WORD STACK 'STACK'
_STACK  ENDS

__acrtused   =   09876h
public __acrtused


dly    MACRO    n
    REPT n
        jmp short $+2
    ENDM
        ENDM

inc2    MACRO    reg
        inc reg
        inc reg
        ENDM

dec2    MACRO    reg
        dec reg
        dec reg
        ENDM

OP_RET   =   0C3h
OP_CALN  =   0E8h

get MACRO    seg_reg
    push ss
    pop seg_reg
    ENDM


_DATA     segment word public 'DATA'
extrn
data_beg:byte,_auf_ptr:byte,fdata_beg:byte,fxdata_b
eg:byte
extrn vdata_beg:byte,rdata_beg:byte,bss_top:byte

public __cdata,__ccode
public __dummy_iret,ext_rdy,put_iret,__isr_flg_ptr
__isr_flg_ptr  dw   offset CGROUP:__isr_flg
__ccode        dw   CGROUP
__cdata        dw   DGROUP


put_iret  dw   offset CGROUP:__dummy_iret
_DATA     ends

_IDATA    segment word public 'DATA'
__heap        dw   offset DGROUP:bss_top
__env         dw   0
_cmd_line dw   0
_icode_beg     dw   0
_idata_end     dw   0
vtx_size  dw   0
vtx_target     dw   0
vtx_ovl        dw   offset CGROUP:__dummy_ret
ext_vec   dw   offset CGROUP:__dummy_ret
target_data    dw   0
source_data    dw   0
data_gap  dw   0
res_size  dw   0
ext_rdy   dw   offset CGROUP:__dummy_ret
res_enabled    db   0
extrn _config_block:byte
extrn __tsr_name:byte
extrn idata_beg:byte
extrn __max_stack:word
public res_enabled,ext_rdy,__heap,__env
public
target_data,source_data,data_gap,res_size,ext_vec
public
_cmd_line,_icode_beg,_idata_end,vtx_size,vtx_target
,vtx_ovl

_IDATA ends

_BSS segment word public 'BSS'
extrn bss_beg:byte
_resident db   2 dup(?)
__my_psp  dw   1 dup(?)
psp_tbl        dw   1 dup(?)

__sinl_list    dw   1 dup(?)
_res_stack_beg dw   1 dup(?)
_res_free_stack     dw   1 dup(?)
public _res_stack_beg,_res_free_stack,__sinl_list

public __my_psp,_cmd_line,_resident,psp_tbl
_BSS ends


_ITEXT    segment   byte public 'CODE'
    ASSUME
CS:CGROUP,DS:DGROUP,SS:DGROUP

extrn isr_psp:word,isr_cblk:byte
extrn vtx_beg:byte
extrn itext_beg:byte
extrn gtx_beg:byte
extrn code_top:byte

public set_cmem
set_cmem  proc near
        cld
        pop  si
        mov  dx,ds
        mov  ax,word ptr ds:[2ch]
        mov  bp,DGROUP
        mov  ds,bp
        mov  es,bp
        mov  [__env],ax
        mov  cx,offset DGROUP:bss_top
        mov  di,offset DGROUP:bss_beg
        sub  cx,di
        xor  ax,ax
        mov  ss:[__lim_ctl],ax
        shr  cx,1
        rep  stosw
        mov  [__my_psp],dx


        mov  es,dx
        mov  bx,MAX_STK_TOP
        mov  ax,[__max_stack]
        add  ax,di
        jnc  scm0
scm0_1:        mov  ax,bx
scm0:          cmp  ax,bx
        ja   scm0_1
        mov  cl,4
        shr  ax,cl
        add  ax,CMD_LINE_SZ/16
        xchg ax,bx
        add  bx,bp
        sub  bx,dx
        mov  ah,4Ah
        int  21h
        jnc  scm1
        mov  ah,4Ah
        int  21h
        jc   scm_err

scm1:          mov  ss,bp
        add  bx,dx
        sub  bx,bp
        shl  bx,cl
        sub  bx,CMD_LINE_SZ
        mov  [_cmd_line],bx
        cli
        mov  ss,bp
        mov  sp,bx
        sti
        cmp  sp,offset
DGROUP:bss_top+MIN_STK_SZ
        jb   scm_err
        add  dx,8
        mov  cs:[isr_psp],dx
        mov  [psp_tbl],dx
        mov  ax,offset CGROUP:gtx_beg
        sub  ax,offset CGROUP:vtx_beg
        mov  [vtx_size],ax
        jmp  si

scm_err:  mov  ax,4c01h
        int  21h

set_cmem  endp

_FITEXT   segment
assume cs:_FITEXT

public get_cmd_arg
get_cmd_arg    proc far
        cld


        mov  di,[_cmd_line]
        mov  ds,[__my_psp]
        get  es
        mov  si,80h
        mov  cx,7fh
        and  cl,[si]
        inc  si
        rep  movsb
        xor  ax,ax
        stosb


        push ds
        pop  es
        get  ds
        mov  di,102h
        mov  si,offset DGROUP:_config_block+2
        movsw
        movsw
        movsw


        mov  cl,32
        mov  di,5ch
        mov  si,offset DGROUP:__tsr_name
        rep  movsb

        ret
get_cmd_arg    endp
_FITEXT   ends

assume cs:CGROUP

init_fdata:    cld


        mov  si,offset DGROUP:fxdata_beg
        mov  di,offset DGROUP:vdata_beg
ifd_fx:        cmp  si,offset DGROUP:fdata_beg
        jae  ifd1
        lodsw
        xchg ax,bx
        lodsw
        sub  ax,bx
        mov  es:[bx-2],ax
        mov  byte ptr es:[bx-3],OP_CALN
        jmp  ifd_fx

public init_rdata
init_rdata:    mov  si,offset DGROUP:rdata_beg
        mov  di,offset DGROUP:idata_beg

ifd1:          sti
        cld
        cmp  si,di
        jae  ifd_ex
        lodsw
        mov  word ptr [si-2],offset
CGROUP:__dummy_ret
        push si
        push di
        call ax
        pop  di
        pop  si
        get  ds
        jmp  ifd1

ifd_ex:        ret

_TEXT    SEGMENT
public start
start:        jmp  start1
```

```
public go_res
go_res      rep movsb
        int 21h
__dummy_ret   ret
__dummy_iret: iret
public __dummy_ret,__dummy_iret
extrn __isr_flg:byte,__lim_ctl:word
_TEXT    ENDS


extrn isr_data:word
extrn _main:near
start1      call set_cmem
        call get_cmd_arg
        call init_rdata
        call _main
        push ax
        mov byte ptr cs:[__isr_flg],07fh
        mov es,[__env]
        mov ah,49h
env_patch label word
public env_patch
        int 21h
        cmp [res_enabled],1
        jz  init2

init1       xor bx,bx
        mov cs:[bx],bx
        call word ptr [exit_rdy]
        pop ax
        mov ah,4ch
        int 21h
public _exit
_exit       pop ax
        jmp short init1


init2       mov ax,[__heap]
        add ax,0fh
        mov cl,4
        shr ax,cl
        add ax,DGROUP
        sub ax,[__my_psp]
        xchg ax,dx


        mov si,offset DGROUP:data_beg
        mov ax,_DATA
        mov bp,[_rdata_end]
        inc2 bp
        sub bp,offset DGROUP:data_beg
        jbe init3
        shr bp,cl
        add ax,bp
        shl bp,cl
        add si,bp

init3       mov bx,offset DGROUP:vtx_beg
        mov bp,[vtx_size]
        mov di,[_icode_beg]
        or  di,di
        jnz init3_1
        mov di,bx
init3_1     cmp di,bx
        jbe init3_2
        mov di,bx
init3_2     mov [vtx_target],di
        add di,bp
        add di,0fh
        shr di,cl
        mov bx,cs
        add bx,di

init4       mov [target_data],bx
        mov [source_data],si
        sub ax,bx
        mov [data_gap],ax
        sub dx,ax
        mov [res_size],dx
        sub [__cdata],ax
        mov byte ptr [_resident],0ffh
        call init_rdata


        cli
        call word ptr [vtx_ovl]
        cli


        nop
        xchg bx,bx
fx_graph  label    word


        nop
        xchg bx,bx
fx_fmem_mv     label    word
```

```
        nop
        xchg bx,bx
fx_ega_gr label word


        nop
        xchg bx,bx
fx_uptraps     label word


        nop
        xchg bx,bx
fx_spw_app     label    word


        nop
        xchg bx,bx
fx_swptk label word



        nop
        xchg bx,bx
fx_spw_fx     label    word

        mov ax,[__cdata]
        mov es:[isr_data],es
        mov es,[target_data]
        mov si,[source_data]
        mov dx,[res_size]
        xor di,di
        mov ax,[__heap]
        add ax,0fh
        and al,0f0h
        mov [__heap],ax
        xchg ax,cx
        sub cx,si
        cld
        cli
        mov es:[__isr_flg],0
        pop ax
        mov ah,31h
        nop
        xchg bx,bx
fx_lim_res     label word
        call go_res
fx_go_res label word

public
fx_go_res,fx_lim_res,fx_spw_fx,fx_spw_app,fx_uptra
ps,fx_graph
public fx_fmem_mv,fx_ega_gr,fx_swptk

_ITEXT    ends

end start
Copr. 1995 Zenith Data Systems Corp.
tLISTBOXENTRY struc
lpszEntry dd 0
cAttribute db 0
ends

MB_LEFTJUSTIFIED equ 0
MB_CENTERED equ 1
MB_RIGHTJUSTIFIED equ 2

PENDRIVER_INTERRUPT equ 67h
SM_FUNCTION_INTERRUPT equ 68h

SM_GET_KEYBOARD_STATUS equ 062h
SM_GET_USER_INTERFACE_LANGUAGE equ
050h
SM_SET_ACTIVE_STATUS equ 060h
SM_GET_INITIAL_SCREEN equ 00050h
SM_GET_ABOUT_DIALOG equ 063h
SM_GET_NEXT_CREDITS_DIALOG equ 64h
SM_UPDATE_DIMENSIONS equ 052h
SM_REQUEST_UNLOAD equ 00053h
SM_REPORT_BUTTON_CLICKED equ 0056H
SM_CALIBRATE_UPPERLEFT equ 0ch
SM_CALIBRATE_LOWERRIGHT equ 000Ch
SM_CANCEL_CALIBRATION equ 00eh
SM_REBOOT_HOST equ 011h
SM_SET_KEYSTROKE equ 061h
SM_REQUEST_ACTIVE_FLASH_UPGRADE equ
12h
SM_PERFORM_FLASH_UPDATE equ 13h
SM_GET_CONNECTION_STATUS equ 22h
SM_GET_HOST_LIST_STATUS equ 21h
SM_UPDATE_HOST_LIST equ 20h
SM_GET_PASSWORD_STATUS equ 25h
SM_REQUEST_CONNECTION equ 23h
SM_REQUEST_DISCONNECTION equ 8023h
SM_ABORT_REQUEST_CONNECTION equ 24h

SM_TEST_FUNCTION equ 0FFFFh

UI_REQUEST_CLOSURE equ 053h
UI_REQUEST_DISPLAY equ 051h
```

```
UI_SHOW_MESSAGE_BOX equ 055h
UI_HIDE_MESSAGE_BOX equ 056h
UI_CALIBRATION_COMPLETE equ 0Dh
UI_FLASH_UPDATE_PERCENTAGE equ 14h
UI_GET_SUI_VERSION_NUMBER equ 69h
GET_HOST_LIST_STATUS     equ 021h


RES_NO_SCREEN       EQU 0
RES_OSK_ALPHA       EQU 1
RES_OSK_NUM         EQU 2
RES_OSK_FULL        EQU 3
RES_OSK_BIG         EQU 4
RES_OSK_BIG_ALPHA     EQU 5
RES_OSK_BIG_NUM       EQU 6
RES_OSK_BIG_FULL      EQU 7
RES_SETUPS_HOST       EQU 8h
RES_SETUPS_HOTKEYS     EQU 18h
RES_SETUPS_MAINTENANCE EQU 24h
RES_SETUPS_MODEM      EQU 32h
RES_SETUPS_POWER      EQU 40h
RES_SETUPS_SCREEN     EQU 48h


GETSET_AUTOMATIC_SHUTOFF        equ 0fh
GETSET_BRIGHTNESS              equ 0bh
GETSET_CONTRAST                equ 0ah
GETSET_CUSTOM_AUTOANSWER_STRING equ
36h
GETSET_CUSTOM_CONNECT_STRING    equ 38h
GETSET_CUSTOM_DISCONNECT_STRING equ
37h
GETSET_CUSTOM_INIT_STRING       equ 035h
GETSET_HOST_CONNECTION_TYPE     equ 02ch
GETSET_MODEM_ANSWER_ON_RING     equ
032h
GETSET_MODEM_BAUD_RATE_ENTRY    equ
29h
GETSET_MODEM_HOST_DESC_ENTRY    equ
26h
GETSET_MODEM_HOST_PHONE_ENTRY   equ
27h
GETSET_MODEM_MANUFACTURER_ENTRY equ
28h
GETSET_MODEM_PREFIX            equ 030h
GETSET_MODEM_RETRY_DELAY        equ 034h
GETSET_MODEM_RETRY_LIMIT        equ 033h
GETSET_MODEM_SUFFIX            equ 031h
GETSET_MODEM_TONE_OR_PULSE      equ 02dh
GETSET_NETWORK_GROUP_ENTRY      equ 2ah
GETSET_NETWORK_HOST_ENTRY       equ 2bh
GETSET_PASSWORD               equ 02eh
GETSET_SLEEPMODE_PERIOD        equ 10h
GETSET_SECURITY_ID            equ 66h
GETSET_DOMAIN_ID              equ 67h
GETSET_LOCK_HOST_KEYBOARD       equ 69h
GETSET_DIM_HOST_SCREEN         equ 6Ah
GETSET_USER_DEFINED_HOT_ICON    equ 65h
GETSET_USER_ID               equ 02dh



Copr. 1995 Zenith Data Systems Corp.
    .MODEL  small

SMI_SUIEVENTNUM EQU 0

extrn _PushEventNum:near
extrn _lpfnFarCallEntry:near

_TEXT SEGMENT WORD PUBLIC 'CODE'
ASSUME DS: DGROUP, SS: DGROUP

ASSUME CS: _TEXT

public _SUICallService
_SUICallService PROC far

        push    bp
        mov     bp,sp

        cli

        push    ds
        push    ax
        push    bx
      push cx
        push    dx
        mov     ds, cs:000Ah

        mov     ax, SMI_SUIEVENTNUM
      push ax
        call  _PushEventNum
      add  sp,2

        pop     dx
        pop     cx
        pop     bx
```

```
        pop     ax

        sti

        call  DWORD PTR _lpfnFarCallEntry

        pop     ds
        mov     sp,bp
        pop     bp
        ret

_SUICallService    ENDP

public _GetPendingEvent
_GetPendingEvent PROC near

        push    bp
        mov     bp,sp

        mov     ax, cs:0010h

        mov     sp,bp
        pop     bp
        ret

_GetPendingEvent ENDP

_TEXT ENDS

END
Copr. 1995 Zenith Data Systems Corp
include pd.inc

        .MODEL  small

_TEXT SEGMENT WORD PUBLIC 'CODE'
ASSUME DS: DGROUP, SS: DGROUP

ASSUME CS: _TEXT

public _SetPenSpkFreq
_SetPenSpkFreq proc near
  push    bp
  mov     bp,sp

  mov     al, PD_TIMER2_16BIT_MODE
  cli
  out     43h, al
  jmp     short $+2
  mov     ax, PD_PSEO_FREQUENCY
  out     42h, al
  jmp     short $+2
  mov     al, ah
  out     42h, al
  sti

  mov     sp,bp
  pop     bp
  ret
_SetPenSpkFreq endp

_TEXT ENDS

END

Copr. 1995 Zenith Data Systems Corp.
#define STR_PROMPT          "SL>"
#define STR_SMANPROGNAME    "sm.exe"
#define STR_SVIEWPROGNAME   "sv.exe"
#define STR_LSL             "lsl.com"
#define STR_IPXODI          "ipxodi.com"

#if defined( PCMCIA )
  #define STR_PROXIM        "cipcm.com"
#elif defined( CLISA ) || defined( MOUSE )
  #define STR_PROXIM        "clisa.com"
#elif defined( PROD )
  #define STR_PROXIM        "rl2oem.com"
#else
  #define STR_PROXIM        "rl2oem.com"
#endif

#define STR_PDRVPROGNAME    "pd.exe"
#define STR_SDRVNETPROGNAME "sdrvnet.exe"
#define STR_RWINPROGNAME    "srwin.exe"
#define STR_COMMANDPROGNAME
"command.com"
#define STR_COMMANDPARM     " /c diag.bat\r"
#define STR_COMMANDDIR      "c:\\"
#define STR_WELCOMESCREEN   " welcome.pcx
0x12V"

#define VAL_SPACE           0x20
#define MAX_WIDTHOFSCREEN   80
#define MAX_STACKSIZE       1024
#define MAX_MLIDLOADRETRY   3

#define KBD_CTRLMASK        0x0004
#define KBD_ALTMASK         0x0008
```

```
#define KBD_DSCAN          0x2000
#define KBD_ASCAN          0x1E00

#define SFR_NOSETFLAGS     0x00
#define SFR_SETFLAGS       0x01

#define ITR_NOSETVIDTRAP   0x00
#define ITR_SETVIDTRAP     0x01

typedef enum _tagACTIONKEYS
{
  KBD_NOACTIONKEY,
  KBD_DIAG,
  KBD_ABORTLOAD,
} ACTIONKEYS.

typedef int ( * STATETABLEPROC )().

int exit( int ).

int      ProcessIdle( void );
int      ParseCommand( void );
int      ParseParameters( void ).
int      ExecuteCommand( void );
int      ProcessSLExit( void );
int      ProcessStateUnknown( void );
void      DoExit( int ).
int      GetFrameType( void ).
int      GetMLIDStatus( void );
void      SetOldVidVector( LONG lOldVidVector );
int      RunProgram( char *szProgName. char
*szProgParms ).
int      LoadMLID( char *szProgName ).
int      LoadNetwork( void ).
int      KeyPressedIn( int iDelay ).
int      KickSUN( void ).
int      EnableKbd( void ).
ACTIONKEYS GetActionKey( void );
BOOL      RemoveVidTrap( void ).
void      DisplayError( char *szErrStr ).
void      InitTraps( BYTE nVidTrapStatus );
WORD      TrapService( struct trap_rec
*CurrTrapRec )
void      GetForegroundRegs( struct REGW *InRegs
);
void      SetForegroundRegsFlags( struct REGW
*OutRegs, BYTE
fSetFlags, WORD wFlags )
WORD      SetVideoMode( BYTE nRequestedMode
).
int       LoadSM( int iMemStrategy ).

STATETABLEPROC fnStateTableProcs[] =
{
  ProcessIdle.
  ParseCommand,
  ParseParameters
  ExecuteCommand,
  ProcessSLExit,
  ProcessStateUnknown,
}.

typedef enum tagGENERALSTATEIDXS
{
  STM_IDLE.
  STM_COMMAND.
  STM_PARM.
  STM_EXECUTE,
  STM_EXIT.
  STM_UNKNOWN,
} GENERALSTATEIDXS.

typedef enum tagCOMMANDSTATEIDXS
{
  COM_UNKNOWN,
  COM_DISPDBUGSTRS,
  COM_RUNSM,
  COM_RUNPROG,
  COM_RUNDOSCOS,
  COM_RUNWINCOS,
} COMMANDSTATEIDXS;
Copr 1995 Zenith Data Systems Corp
int  SortingList(int, int, int, int, char *).
long GetEntryOffset(int, int, int, int, char *);
int  SwapEntries( char *, char *, int);

#define SH_SWAP_BUFF_LEN 35
```

```
Copr 1995 Zenith Data Systems Corp.

model small

MINOR_VERSION =30
MAJOR_VERSION =1

.code

extrn UseNormalColors:near
extrn DoClickEvent:near
extrn FindRegionForControl:near
extrn CancelPenDown:near
extrn Bin2ASCII:near
extrn BlackenScreen:near
extrn ClearScreen:near
extrn DeinstallInterrupts:near
extrn DoHideOSK:near
extrn DrawColor:near
extrn DrawMessageBox:near
extrn DrawString:near
extrn ForceTotalRepaint:near
extrn ForceTotalRepaint1:near
extrn GetBitMapHeight:near
extrn GetListData:near
extrn GetStringWidth:near
extrn GetVGAState:near
extrn GoFirstControl:near
extrn GoNextControl:near
extrn GoNextControl:near
extrn HandleDelayedSet:near
extrn HideOSK:near
extrn IsNumericKey:near
extrn JumpOnAL:near
extrn JumpOnAX:near
extrn PenEntry:near
extrn PenExit:near
extrn PointControlCaption:near
extrn PointError:near
extrn PrepareMessageBox:near
extrn ReGrayOSKTypeButtons:near
extrn RemoveMessageBox:near
extrn RepaintOSK:near
extrn Repaint:near
extrn RepaintAndSetTab:near
extrn RepaintForClick:near
extrn RepaintIndividualControl:near
extrn RepaintIndividualListBox:near
extrn RepaintUnderOSK:near
extrn RepaintWork:near
extrn ReportError:near
extrn RestVGAState:near
extrn RestoreRegion:near
extrn ReturnOSKRightAndShow:near
extrn SaveFormHeight:near
extrn SetInitialTab:near
extrn SetListCurrent:near
extrn SetNewTabItemWork:near
extrn SetOSKEnlargedButtons:near
extrn SetOSKReducedButtons:near
extrn StopProtecting:near
extrn UIMain:far
extrn UndoCurrentTabItem:near
extrn UnprotectOSK:near
extrn SearchActiveRegions:near
extrn StopCursor:near
extrn ResumeCursor:near
extrn DefineNewOskArea:near

extrn GetPhysicalKeyState:near

include uimclud.inc

DATASEG_BEGIN
extrn AboutIcon:word
extrn ColoredAboutIcon:byte
extrn ControlDataStorageArea:byte
extrn OSK:tControl
extrn ScanCodeHeader:tBUFFHEADER
extrn ScanCodePasser:tSCANCODES
extrn bAltNumberCount:byte
extrn bAwaitingMoveCompletion:byte
extrn bCurrentShadowColor:byte
extrn bCursorActive:byte
extrn bDoingEvents:byte
extrn bDontCenterOSK:byte
extrn bDontChangeProtection:byte
extrn bFormColor:byte
extrn bKeyChanged:byte
extrn bKeyState:byte
extrn bKeyboardCode:byte
extrn bLanguageToUse:byte
extrn bLeavePenOn:byte
extrn bLocalState:byte
extrn bMessageBoxID:byte
extrn bMessageBoxRequested:byte
extrn bModalFlag:byte
extrn bNewDisplayRequested:byte
extrn bNoDimensionUpdate:byte
extrn bOSKLastState:byte
extrn bPenShowing:byte
extrn bPopUpRequired:byte
extrn bRemoveMessageBoxRequested:byte
extrn bRepaintNeeded:byte
extrn bResetHotKeyDataLength:byte
extrn bScreenMode:byte
extrn bShadowColor:byte
extrn bSuppressHideShow:byte
extrn bTestMode:byte
extrn bTriggerPenOnForClick:byte
extrn cmdAbout:tControl
extrn cmdCalibratePen:tControl
extrn cmdClearHotKey1:tCONTROL
extrn cmdClearHotKey2:tCONTROL
extrn cmdDefault:tControl
extrn cmdDisconnect:tCONTROL
extrn cmdDisconnect:tControl
extrn cmdDomainIDSpinUp:tControl
extrn cmdEdit:tControl
extrn cmdHost:tCONTROL
extrn cmdHost:tControl
extrn cmdHotKeys:tCONTROL
extrn cmdHotKeys:tControl
extrn cmdMaintenance:tCONTROL
extrn cmdMaintenance:tControl
extrn cmdModem:tCONTROL
extrn cmdModem:tControl
extrn cmdModemConnect:tCONTROL
extrn cmdModemConnect:tControl
extrn cmdModemConnect:tControl
extrn cmdNetworkConnect:tCONTROL
extrn cmdNetworkConnect:tControl
extrn cmdNetworkUpdate:tCONTROL
extrn cmdNetworkUpdate:tControl
extrn cmdOSKAbout:tControl
extrn cmdOSKAlphaKeyboard:tControl
extrn cmdOSKEnlarge:tControl
extrn cmdOSKFullKeyboard:tControl
extrn cmdOSKNumKeyboard:tControl
extrn cmdOSKReduce:tCONTROL
extrn cmdOSKReduce:tControl
extrn cmdPasswordOKCancel_Cancel:tControl
extrn cmdPasswordOKCancel_OK:tControl
extrn cmdPhoneBookOKCancel_Cancel:tControl
extrn cmdPhoneBookOKCancel_OK:tControl
extrn cmdPower:tCONTROL
extrn cmdPower:tControl
extrn cmdRebootHost:tControl
extrn cmdScreen:tCONTROL
extrn cmdScreen:tControl
extrn cmdSerialConnect:tControl
extrn cmdToolBarClose:tControl
extrn cmdToolBarClose:tControl
extrn cmdToolbarClose:tCONTROL
extrn cmdUpgrade:tControl
extrn cmdUseridOKCancel_Cancel:tControl
extrn cmdUseridOKCancel_OK:tControl
extrn fraConnectionOptions:tCONTROL
extrn fraConnectionOptions:tControl
extrn fraModemConnection:tCONTROL
extrn fraModemConnection:tControl
extrn fraModemCustom:tCONTROL
extrn fraModemCustom:tControl
extrn fraNetworkConnection:tCONTROL
extrn fraNetworkConnection:tControl
extrn fraSerialConnection:tCONTROL
extrn fraSerialConnection:tControl
extrn frmAlphaKeyboard:tCONTROL
extrn frmHost:tCONTROL
extrn frmHost:tControl
extrn frmHotKey:tCONTROL
extrn frmHotKey:tControl
extrn frmMaintenance:tCONTROL
extrn frmMaintenance:tControl
extrn frmMessageBox:tCONTROL
extrn frmMessageBox:tControl
extrn frmMessageBox_End:byte
extrn frmModem:tCONTROL
extrn frmModem:tControl
extrn frmNumericKeyboard:tCONTROL
extrn frmNumericKeyboard:tControl
extrn frmPasswordBox:tCONTROL
extrn frmPasswordBox:tControl
extrn frmPhoneBookEdit:tCONTROL
extrn frmPhoneBookEdit:tControl
extrn frmPower:tCONTROL
extrn frmPower:tControl
extrn frmScreen:tCONTROL
extrn frmScreen:tControl
extrn frmUseridBox:tControl
extrn lblMessageBox0:tCONTROL
extrn lblMessageBox0:tControl
extrn lblMessageBox0:tCONTROL
extrn lblOSKBigCruzer:tControl
extrn lblOSKChiselLine:tCONTROL
extrn lblOSKChiselLine:tControl
extrn lblOSKSmallCruzer:tControl
extrn lblPasswordBox1:tControl
extrn lblUseridBox1:tControl
extrn lstHostPhones:tCONTROL
extrn lstHostPhones:tControl
extrn lstManufacturer:tControl
extrn lstNetworkGroups:tCONTROL
extrn lstNetworkGroups:tControl
extrn lstNetworkHosts:tCONTROL
extrn lstNetworkHosts:tControl
extrn MainForm:tControl
extrn mnuToolbar:tCONTROL
extrn mnuToolbar:tControl
extrn optModem:tControl
extrn optNetwork:tControl
extrn optPulse:tControl
extrn optSerial:tControl
extrn optTone:tControl
extrn pClickRegion:word
extrn pCurrentFont:word
extrn pCurrentToolBarButton:word
extrn pEditBoxFont:word
extrn pFirstControl:word
extrn pGraphicFont:word
extrn pNextActiveRegion:word
extrn pNormFont:word
extrn pOSKFirstRegion:word
extrn pPenDownActiveRegion:word
extrn pPenUpListRegion:word
extrn pPenUpListRegion:word
extrn pPenUpListRegion:word
extrn pTabRegion:word
extrn pszProgressTable:word
extrn pszProgressTable_End:word
extrn rActiveRegions:tRegion
extrn rCalibrateLRCHeader:tBUFFHEADER
extrn rCalibrateULCHeader:tBUFFHEADER
extrn rCallProgressHeader:tBUFFHEADER
extrn rCursorRegion:tREGION
extrn rErrorMess1Header:tBUFFHEADER
extrn rErrorMess2Header:tBUFFHEADER
extrn rErrorMess3Header:tBUFFHEADER
extrn rErrorMess4Header:tBUFFHEADER
extrn rREGION:tREGION
extrn rRebootHostHeader:tBUFFHEADER
extrn rUpgradeCompHeader:tBUFFHEADER
extrn rUpgradeHeader:tBUFFHEADER
extrn rUpgradeNAHeader:tBUFFHEADER
extrn rUpgradeProgHeader:tBUFFHEADER
extrn szCalibrationXString:byte
extrn szCallProgressFill:byte
extrn szCallProgressFill:byte
extrn szInvalidProgress:byte
extrn szInvalidProgress:byte
extrn szListItemBuffer1:byte
extrn szListItemBuffer2:byte
extrn szSerial:byte
extrn szUpgradeProgressPercent:byte
extrn txtCurrentHost:tCONTROL
extrn txtCurrentHost:tControl
extrn txtDomainID:tcontrol
extrn txtHotKey1:tCONTROL
extrn txtHotKey2:tCONTROL
extrn txtPBDescription:tCONTROL
extrn txtPBDescription:tControl
extrn txtPBPhoneNumber:tCONTROL
extrn txtPBPhoneNumber:tControl
extrn txtPassword:tControl
extrn txtSecurityID:tControl
extrn txtUserid:tControl
extrn urlenId:word
extrn wCurrentFormBottom:word
extrn wCurrentFormHeight:word
extrn wCurrentResource:word
extrn wCurrentResource:word
extrn wDisplayRequested:word
extrn wKeyPressed:word
extrn wListCurrentItem:word
extrn wMessageContinuationDX:word
extrn wMessageContinuationSI:word
extrn wNormFontHeight:word
extrn wPSPSegment:word
extrn wPenDownColumn:word
extrn wPreviousFormHeight:word
extrn wScreenSegment:word
extrn wShiftCaption:word

bOSKMoveRequested db 0

bSuppressDimensionUpdate db 0

bNextOSKConfiguration db 0
  public bNextOSKConfiguration

bHourGlassMode db 0
  public bHourGlassMode

bHourGlassCursor label byte
dw 1000000000000011b
dw 1111111111111111b
dw 1000000000000011b
dw 1100000000000111b
dw 1100000000000111b
dw 1110000000001111b
dw 1111000000011111b
dw 1111100000111111b
dw 1111100000111111b
dw 1111000000011111b
dw 1110000000001111b
dw 1100000000000111b
dw 1100000000000111b
dw 1000000000000011b
dw 1111111111111111b
dw 1000000000000011b
dw 0000000000000000b
dw 0111111111111100b
dw 0011111111111000b
dw 0001111111110000b
dw 0001111111110000b
dw 0000101010100000b
dw 0000010101000000b
dw 0000001010000000b
dw 0000001010000000b
dw 0000011111000000b
dw 0000110101100000b
dw 0001101010110000b
dw 0001010101010000b
dw 0011111111111000b
dw 0111111111111100b
dw 0000000000000000b

bArrowCursor label byte

dw 0011111111111111b
dw 0001111111111111b
dw 0000111111111111b
dw 0000011111111111b
dw 0000001111111111b
dw 0000000111111111b
dw 0000000011111111b
dw 0000000001111111b
dw 0000000000111111b
dw 0000000000011111b
dw 0000000111111111b
dw 0000000011111111b
dw 0011000001111111b
dw 1111100000111111b
dw 1111100001111111b
dw 1111110001111111b

dw 0000000000000000b
dw 0100000000000000b
dw 0110000000000000b
dw 0111000000000000b
dw 0111100000000000b
dw 0111110000000000b
dw 0111111000000000b
dw 0111111100000000b
dw 0111111110000000b
dw 0111110000000000b
dw 0110110000000000b
dw 0100011000000000b
dw 0000011000000000b
dw 0000001100000000b
dw 0000001100000000b
dw 0000000000000000b

bHandMode db 0
  public bHandMode

bHandCursor label byte
dw 1111100011111111b
dw 1111000001111111b
dw 1111000001111111b
dw 1111000001111111b
dw 1111000001111111b
dw 1001000000001111b
dw 0000000000000011b
dw 0000000000000011b
dw 1000000000000011b
dw 1000000000000011b
dw 1100000000000011b
dw 1100000000000011b
dw 1110000000000011b
dw 1110000000000011b
dw 1111000000000111b
dw 1111100000001111b

dw 0000000000000000b
dw 0000011000000000b
dw 0000011000000000b
dw 0000011000000000b
dw 0000011000000000b
dw 0001011000000000b
dw 0110011010100000b
dw 0110011010101000b
```

```
dw 0011011010101000b
dw 0011111110101000b
dw 0001111111111000b
dw 0001111111111000b
dw 0000111111111000b
dw 0000111111110000b
dw 0000011111100000b
dw 0000000000000000b


ourpalette db 00h,01h,02h,03h,04h,05h,14h,07h
        db 38h,39h,3ah,3bh,3ch,3dh,3eh,3fh,00h

ourcolors label byte
db 00h,  00h,  00h
db 00h,  2Ah,  00h
db 2Fh,  00h,  00h
db 2Ah,  2Ah,  00h
db 00h,  00h   2Ah
db 00h,  2Ah,  2Ah
db 1Eh,  00h,  2Ah
db 2Dh,  2Dh,  2Dh
db 10h,  10h,  10h
db 1Ah,  3Fh,  15h
db 3Fh,  15h,  15h
db 3Fh,  3Fh   15h
db 15h   15h   3Fh
db 0Eh,  3Fh,  3Fh
db 3Fh   15h,  3Fh
db 3Fh   3Eh,  3Fh
db 00h   00h   00h

wHotKeyWork dw 0
bHotKeyIsShifted db 0
bHotKeyBuild db 20 dup(0)

bHotKeyAscii db 0,0,0,0
bKeyWasShifted db 0
wHotKeyShiftKeyUps dw 7 dup(0)
bFinalWasAlt db 0
wHotKeyRightPixel dw 0
  public wHotKeyRightPixel

bCapsLockState db 0
bNumLockState db 0

bCalibrateOnly db 0

bPasswordOnly db 0

bConnectRequested db 0

bGetConnectionStatus db 0

wCurrentCallProgress dw 0

bFlashPercentageFlag db 0

wCountryCode  dw 0

bCalibrationCompleteFlag db 0

wAboutClickTimer  dw 0
bAboutClickActive db 0

bPollingTimer     db 0

bLastKeyboardState db 0
bUpdateOSKLockKeys db 0

wCurrentHostList dw 0


wClosureRequest dw 0

SMNotRunningError db 13,10,"SM Not
Running",13,10,"$"


SMFunctionDispatcher dd DummyFunction
  public SMFunctionDispatcher


bReportOskDimensions db 0
  public bReportOSKDimensions

DATASEG_END



.code

main proc far
  call UIMain

  mov ax,4c00h
  int 21h
main endp

DoCustomStartups proc far
 public DoCustomStartups

 mov al,SM_FUNCTION_INTERRUPT
 mov ah,035h
 int 21h

 cmp word ptr es:[bx+10],"s"+256*"a"
 jnz main1a
 cmp word ptr es:[bx+12],"Y"+256*"a"
 jnz main1a
 jmp main2
main1a:
 jmp invalidStartup

main2:
 mov word ptr SMFunctionDispatcher[0],bx
 mov word ptr SMFunctionDispatcher[2],es

 SM_FUNCTION SM_GET_KEYBOARD_STATUS
 jl main3
 mov bKeyboardCode,al

main3:
 SM_FUNCTION
SM_GET_USER_INTERFACE_LANGUAGE
 jl ~mand4
 m ·· bLanguageToUse,al

main4:
 mov si,offset UIFunctionDispatcher
 mov dx,cs
 SM_FUNCTION SM_SET_ACTIVE_STATUS
 jl main4

 test al,128
 jz main4a
 and al,not(128)
 mov bTestMode,-1

main4a:
 cmp ax,1
 jnz main6
 call HideModemOptions

main6:

 ret

invalidStartup:
 mov dx,offset SMNotRunningError
 mov ah,9
 int 21h
 mov ax,4c01h
 int 21h
DoCustomStartups endp


DoSMFunction proc far
 public DoSMFunction

 or al,al
 jnz dsmf1
 xor ah,ah
 dec ax
 jz dsmf2
dsmf1:
 call dword ptr SMFunctionDispatcher
dsmf2:
 cmp ax,0
 ret
DoSMFunction endp

UIFunctionDispatcher proc far
 public UIFunctionDispatcher

 push ds
 push ax
 mov ax,OURDATASEG
 mov ds,ax
 pop ax

 inc bDoingEvents
 push si
 push bx
 or ax,ax
 jz uifd1
 call JumpOnAX

 dw
UI_GET_SUI_VERSION_NUMBER,GetSuiVersionN
umber
 dw UI_HIDE_MESSAGE_BOX,HideMessageBox
 dw UI_REQUEST_CLOSURE,RequestClosure
 dw UI_REQUEST_DISPLAY,RequestDisplay
 dw
UI_SHOW_MESSAGE_BOX,ShowSMMessageBox
 dw
UI_CALIBRATION_COMPLETE,CalibrationComplete
 dw
UI_FLASH_UPDATE_PERCENTAGE,FlashUpdateP
ercentage
 dw
UI_UPDATE_CONNECTION_STATUS,UpdateConn
ectionStatus
 dw
UI_SHOW_HIDE_BUSY_CURSOR,ShowHideBusyC
ursor
 dw UI_MOVE_OSK,DoOSKMoveRequest
 dw 0

uifd1:
 mov ax,-1
 jmp ReturnWithAX

DoOSKMoveRequest:

 mov OSK.TopPixel,bx
 mov OSK.LeftPixel,cx
 mov bOSKMoveRequested,-1
 mov bPopupRequired,-1
 jmp ReturnSuccess


GetSuiVersionNumber:
 mov al,MINOR_VERSION
 mov ah,MAJOR_VERSION
 jmp ReturnWithAX

HideMessageBox:
 cmp bMessageBoxID,0
 jz hmb1

 mov bx,wCurrentResource
 test bx,0111111111111000b
 jnz hmb2

 call far ptr dsinstallint09

hmb2:
 mov bRemoveMessageBoxRequested,-1
 mov ax,0
 mov bPopupRequired,-1
 jmp ReturnWithAX
hmb1:
 mov ax,-7
 jmp ReturnWithAX

RequestDisplay:

 mov bLocalState,1
 test bx,not(111b)
 jnz qqq1

 mov osk.TopPixel,si
 mov osk.LeftPixel,di
 mov bDontCenterOSK,-1

 or mnuToolBar.ControlState,INVISIBLE
 mov pFirstControl,offset OSK

 push cx
 push bx
 call ResetForRestart
 pop bx
 pop cx
 jmp rrr1

qqq1:
 and al,111b
 mov bNextOSKConfiguration,al

rrr1:
 mov ax,bx
 and al,111b
 cmp al,4
 jnz rdis1
 jmp ReturnInvalidParm

rdis1:
 mov ax,bx
 shr ax,1
 shr ax,1
 shr ax,1

 cmp ax,MAX_TOOLBARBUTTONS
 jbe rb2q
 jmp ReturnInvalidParm

rb2q:
 push bx
 mov ah,0Fh
 int 10h
 and al,1111111b
 pop bx
 mov bScreenMode,al

 cmp al,VGA_MODE
 jz rd1
 cmp al,3
 jz rd2b
 cmp al,7
 jz rd2

 jmp ReturnInvalidParm

rd2:
 mov ax,0b000h
 jmp rd2a
rd2b:

 mov ax,0b800h
rd2a:
 mov wScreenSegment,ax
 cmp bx,7
 jbe rd1
 jmp ReturnInvalidParm

rd1:
 test bx,1111111111111000b
 jz rd1a
 call far ptr installint09
 jmp rd1b

rd1a
 mov bReportOSKDimensions,-1

rd1b
 mov bNewDisplayRequested,-1
 mov wDisplayRequested,BX
 mov bPopupRequired,-1

 test wDisplayRequested,111111000b
 jnz rd1bbx1

 mov bAwaitingMoveCompletion,-1
 mov bLeavePenOn,0
 jmp rd1bbx

rd1bbx1:
 cmp bLeavePenOn,0
 jnz rd1bbx
 mov bLeavePenOn,-1
 cmp bDoingEvents,1
 ja  rd1bbx
 call PenExit

rd1bbx:
 xor ax,ax
 jmp ReturnWithAX

ShowSMMessageBox:

 cmp bMessageBoxID,0
 jz smg2
 cmp bRemoveMessageBoxRequested,-1
 jz smg2

 jmp ssmb1

smg2:
 or cx,cx
 jz smg1
 cmp cx,8
 jz smg1
 cmp cx,9
 jz smg1
 mov ax,-2
 jmp ReturnWithAX

smg1:
 push bx
 push cx
 push dx
 push si
 push di
 push es
 or cx,cx
 jz smb1
 cmp cx,8
 jz smb3
 cmp cx,9
 jnz smb1

 mov bNewDisplayRequested,-1
 mov wDisplayRequested,8*1
 mov bPopupRequired,-1
 mov bPasswordOnly,-1
 jmp smb3xx

smb3:
 mov bNewDisplayRequested,-1
 mov wDisplayRequested,8*3
 mov bPopupRequired,-1
 mov bCalibrateOnly,-1
```

```
smb3ax:
  xor ax,ax
  xor bx,bx
  jmp smb2

smb1:
  cmp wCurrentResource,0
  jnz smb11a
  or wCurrentResource,256*128

smb11a:
  mov bMessageBoxID,-1
  call PrepareMessageBox
  mov bMessageBoxRequested,-1

smb2:
  pop es
  pop di
  pop si
  pop dx
  pop cx
  pop bx
  or bx,bx
  jz ssmb2
  call far ptr InstallInt09

ssmb2:
  mov bPopupRequired,-1
  jmp ReturnSuccess

ssmb1:
  mov ax,-6
  jmp ReturnWithAX

CalibrationComplete:
  cmp bMessageBoxId,MB_CALIBRATEULC
  jz cc1
  cmp bMessageBoxId,MB_CALIBRATELRC
  jz cc2
  mov ax,-2
  jmp ReturnWithAx

cc1:
  mov bCalibrationCompleteFlag,1
  mov bPopupRequired,-1
  jmp ReturnSuccess

cc2:
  mov bCalibrationCompleteFlag,2
  mov bPopupRequired,-1
  jmp ReturnSuccess

FlashUpdatePercentage:
  cmp bl,bFlashPercentageFlag
  jz fup1
  mov bPopupRequired,-1
fup1:
  mov bFlashPercentageFlag,bl
  jmp ReturnSuccess

RequestClosure:

  push es
  push bp
  push di
  mov wClosureRequest,bx
  cmp bx,1
  jnz rcl1

  call DisinstallInterrupts
  jmp rcl1a

rcl1:
  mov bRepaintNeeded,0
  call ForceTotalRepaint1
  mov ax,478
  mov wCurrentFormBottom,ax
  inc ax
  mov wCurrentFormHeight,ax

rcl1a:
  call far ptr disinstallInt09
  mov ah,0fh
  int 10h
  and al,1111111b
  cmp al,12h
  jnz rqc1a

  call GetVGAState
  push wCurrentResource
  call DoHideOSK
  pop wCurrentResource
  test wCurrentResource,not(111b)
  jz rqc1

  call unprotectosk
  call BlackenScreen

rqc1:
  call RestVGAState

rqc1a:
  call FreeScreen

  cmp wClosureRequest,1
  jnz rcl2
  mov bx,wPSPsegment
  mov ah,50h
  int 21h

rcl2:
  mov ax,wCurrentResource
  test al,111b
  jnz rc1

  mov ah,bOSKLastState
  and ah,111b
  or al,ah

rc1:
  cmp wClosureRequest,1
  jnz rcl3
  pop di
  pop bp
  pop es

  mov ah,04ch
  int 21h

rcl3:
  call ResetForRestart
  xor ah,ah
  pop di
  pop bp
  pop es

  test wCurrentResource,111111111b
  jnz rrc1

  mov bLeavePenOn,0
  cmp bDoingEvents,0
  jnz rrc1

  call PenEntry
rrc1:
  jmp ReturnWithAX

UpdateConnectionStatus:

  SM_FUNCTION SM_GET_HOST_LIST_STATUS
  call GrayNetworkLists
  cmp ax,1
  jle ucs2a

  SM_FUNCTION SM_UPDATE_HOST_LIST
  mov bRepaintNeeded, PAINTALL

ucs2:
  mov bPopUpRequired,-1
ucs2a:
  mov bLeavePenOn,-1
  jmp ReturnSuccess

ShowHideBusyCursor:
  cmp bx,1
  jb shbc1
  ja ReturnInvalidParm
  call SetArrowCursor
  jmp ReturnSuccess

shbc1:
  call SetHourGlassCursor
  jmp ReturnSuccess

ReturnSuccess:
  xor ax,ax
  jmp ReturnWithAX

ReturnInvalidParm:
  mov ax,-3
  jmp ReturnWithAX

ReturnWithAX:
  pop bx
ReturnWithBX:
  pop si
ReturnWithSI:
  dec bDoingEvents
  pop ds
  ret
UIFunctionDispatcher endp

ResetForRestart proc near

  mov wCurrentResource,0
  mov pTabRegion,0
  push ax
  mov bShadowColor,SHADOW_COLOR
  mov bCurrentShadowColor,SHADOW_COLOR
  mov pOSKFirstRegion,-1
  call UseNormalColors
  pop ax
  ret
resetforrestart endp

DoCustomEvents proc far
  public DoCustomEvents
  cmp bUpdateOSKLockKeys,0
  jz dee0
  mov bUpdateOSKLockKeys,0
  call GetPhysicalKeyState
dee0:

  cmp bAboutClickActive,0
  jz cfe4
  cmp wAboutClickTimer,8
  jb cfe4
  mov bAboutClickActive,0
  call DoHideOSK
  call ShowAbout
cfe4:

  cmp bOSKMoveRequested,0
  jz cfe0
  mov bOSKMoveRequested,0
  mov bSuppressDimensionUpdate,-1
  mov bx,offset OSK
  and [bx].ControlState,not(INVISIBLE)
  mov pNextActiveRegion,offset rActiveRegions
  mov pOSKFirstRegion,-1
  call UnprotectOSK
  mov bDontChangeProtection,-1
  call RepaintOSK
  mov bDontChangeProtection,0
  mov bSuppressDimensionUpdate,0
  call ReportCurrentResource
  mov bAwaitingMoveCompletion,0

  cmp bScreenMode,12h
  jnz lpo1
  mov bTriggerPenOnForCheck,-1
  jmp lpo2
lpo1:
  mov bLeavePenOn,-1
lpo2:

cfe0:

  cmp bNewDisplayRequested,0
  jz cfe1
  mov bAwaitingMoveCompletion,0
  call DoExternalDisplayRequest
cfe1:

  cmp bRemoveMessageBoxRequested,0
  jz de4a
  mov bRemoveMessageBoxRequested,0
  cmp bMessageBoxID,MB_CALIBRATELRC
  jz de4e1
  cmp bMessageBoxID,MB_CALIBRATEULC
  jz de4e1
  cmp bMessageBoxRequested,0
  jz nv1
  call StopProtecting
  mov pFirstControl,offset MainForm
  mov wPreviousFormHeight,480
  mov bFormColor,FORM_COLOR
  call Repaint
  jmp nv2
nv1:

  call RemoveMessageBox
de4a:

  cmp bMessageBoxRequested,0
  jz de4b
nv2:
  call DoHideOSK
  call DrawMessageBox
  mov bMessageBoxRequested,0
de4b:

  cmp bCalibrationCompleteFlag,1
  jb de4f
  je de4e1
  call DoCalibrateLRC
  jmp dce_quickexit

de4e1:
  mov bCalibrationCompleteFlag,0
  mov bMessageBoxID,0
  call StopProtecting

  cmp bCalibrateOnly,-1
  jnz de4e2
  call BlackenScreen
  mov bCalibrateOnly,0
  mov wCurrentResource,0
  call FreeScreen
  call far ptr disinstallInt09
  mov bMessageBoxId,0
  call UnprotectOSK
  call ForceTotalRepaint
  mov bRepaintNeeded,0
  jmp de4f
de4e2:

  call ClearScreen
  call ForceTotalRepaint
de4f:
  mov bLeavePenOn,-1
de4ff:

  cmp bFlashPercentageFlag,0
  jz de4g
  xor al,al
  xchg al,bFlashPercentageFlag
  xor ah,ah
  call ShowUpgradeProgress
de4g:

  call CheckUpdateHostList
  jnc de4h
  SM_FUNCTION SM_GET_HOST_LIST_STATUS
  jz de4h1
  jmp de4h
de4h1:
  call UngrayNetworkLists
  mov bRepaintNeeded,-1
de4h:

  cmp bGetConnectionStatus,0
  jz mcs1
  SM_FUNCTION
SM_GET_CONNECTION_STATUS

  cmp ax,wCurrentCallProgress
  jz mcs1

  or ax,ax
  jnz mcs3

  mov bGetConnectionStatus,0
  mov wCurrentCallProgress,ax
  mov bRepaintNeeded,0
  mov bPopUpRequired,0
  mov bLeavePenOn,0
  call far ptr disinstallInt09
  jmp mcs1

mcs3:
  cmp bMessageBoxID,0
  jz mcs2
  push ax
  call RemoveMessageBox
  pop ax
mcs2:
  call ShowCallProgress
mcs1:

  cmp bConnectRequested,0
  jz cfsrc1
  call RepaintAndSetTab

  mov wCurrentCallProgress,1234
  mov bGetConnectionStatus,-1
  mov bPopupRequired,-1
  mov bConnectRequested,0
  SM_FUNCTION SM_REQUEST_CONNECTION
  jge cfsrc1
cfsrc2:
  mov bGetConnectionStatus,0
  call ReportError
cfsrc1:

  cmp bMessageBoxRequested,0
  jz ndrq1
  jmp dce0
```

```
ndrq1

 clc
 ret
dce_quickexit:
 stc
 ret
DoCustomEvents endp

DoToolBarButtonClick proc far
 public DoToolBarButtonClick
 push si
 push ax

 cmp si,offset cmdHost
 jnz dtbc1a
 call InitializeDefaults
 call UpdateHostList
 test frmNetworkConnection.ControlState,INVISIBLE
 jnz darp1
 mov si,offset lstNetworkHosts
 mov ax,[si].id
 mov ax,-1
 call GetListData
 or dx,dx
 jnz darp1

 or cmdDisconnect.ControlState,DISABLED or
GRAYED
 or cmdToolBarClose.ControlState,DISABLED or
GRAYED
 and txtSecurityID.ControlState,not(GRAYED or
DISABLED)
 or cmdRebootHost.ControlState,GRAYED or
DISABLED
 or cmdUpgrade.ControlState GRAYED or
DISABLED
 or cmdNetworkConnect.ControlState,DISABLED or
GRAYED
darp1
 jmp dtbc1b

dtbc1a:
 call SetControlsForConnectState
 jmp dtbc1b

dtbc1c:
dtbc1b.

 pop ax
 pop si
 ret
DoToolBarButtonClick endp

DummyFunction proc far
 mov ax,-1
 ret
DummyFunction endp

CheckScreenUpdateNeeded proc far
 public CheckScreenUpdateNeeded
 call CheckUpdateHostList
 ret
CheckScreenUpdateNeeded endp

CheckUpdateHostList proc near

 cmp bMessageBoxID,0
 jnz de4ha
 cmp pCurrentToolBarButton,offset cmdHost
 jnz de4ha
 test frmNetworkConnection.ControlState,INVISIBLE
 jnz de4ha
 test cmdNetworkUpdate.Controlstate,GRAYED or
DISABLED
 jz de4ha
 stc
 ret
de4ha.
 clc
 ret
CheckUpdateHostList endp


DoCalibrate proc near

 call UndoCurrentTabItem
 mov pTabRegion,0
 call DoHideOSK
 mov si,offset rCalibrateULCHeader
 mov dx,seg rCalibrateULCHeader
 mov bMessageBoxId,MB_CALIBRATEULC
 call CalibrateAny
 mov bLeavePenOn,-1
 call penext
 mov bx,4
 mov cx,4
 SM_FUNCTION SM_CALIBRATE_UPPERLEFT
 ret
DoCalibrate endp

DoCalibrateLRC proc near
 mov si,offset rCalibrateLRCHeader
 mov dx,seg rCalibrateLRCHeader
 mov bMessageBoxId,MB_CALIBRATELRC
 mov bCalibrationCompleteFlag,0
 call CalibrateAny
 mov bx,480-8+4
 mov cx,640-11+4
 SM_FUNCTION SM_CALIBRATE_LOWERRIGHT
 ret
DoCalibrateLRC endp

CalibrateAny proc near
 push dx
 push si

 call blackenscreen
 xor cx,cx
 xor dx,dx
 mov si,offset szCalibrationXString
 mov pCurrentFont,offset UIFont
 mov bx,15
 call DrawString

 mov cx,640-11
 mov dx,480-8
 mov bx,15
 mov si,offset szCalibrationXString
 call DrawString
 pop si
 pop dx
 mov bx,MBX_CANCEL
 call PrepareMessageBox
 call DrawMessageBox
 ret
CalibrateAny endp

ShowUpgradeProgress proc near
 cmp bMessageBoxID,0
 jz sup3
 push ax
 call RemoveMessageBox
 pop ax
sup3:
 cmp ax,100
 jae sup4
 mov cl,3
 mov bx,offset szUpgradeProgressPercent
 call Bin2Ascii

sup2:
 cmp bx,offset szUpgradeProgressPercent+3
 jae sup1
 mov byte ptr [bx],' '
 inc bx
 jmp sup2

sup1:
 call DoHideOSK
 mov si,offset rUpgradeProgHeader
 mov dx,seg rUpgradeProgHeader
 mov bMessageBoxId,MB_UPGRADE_PROGRESS

 mov bx,MBX_NOBUTTON
 call PrepareMessageBox
 call DrawMessageBox
 ret

sup4:
 call DoHideOSK
 mov si,offset rUpgradeCompHeader
 mov dx,seg rUpgradeCompHeader
 mov bMessageBoxId,MB_UPGRADE_COMPLETE

 mov bx,MBX_NOBUTTON
 call PrepareMessageBox
 call DrawMessageBox
 ret
ShowUpgradeProgress endp

DoExternalDisplayRequest proc near

 mov pNextActiveRegion,offset rActiveRegions
 mov pOSKFirstRegion,-1
 call DoHideOSK
 cmp bMessageBoxID,0
 jz dedr1
 call RemoveMessageBox
dedr1:
 mov ax,wDisplayRequested
dedr2:
 test ax,not(111b)
 jz dedr2a

 push ax
 call RestoreOurColors
 pop ax
dedr2a:
 test wCurrentResource,not(111b)
 jnz cfe2
 test ax,not(111b)
 jz cfe2

 mov osk.pixelheight,0
 push ax
 xor bx,bx
 xor cx,cx
 mov di,SCREEN_WIDTH_PIXELS - 1
 mov si,SCREEN_HEIGHT_PIXELS - 1

 SM_FUNCTION SM_UPDATE_DIMENSIONS

 cmp bCalibrateOnly,-1
 jnz cfe2a
 pop ax
 mov wDisplayRequested,0
 mov wCurrentResource,0*256
 call far ptr Installint09
 call DoCalibrate
 jmp cfe6
cfe2a:

 cmp bPasswordOnly,-1
 jnz cfe2b
 pop ax
 mov wDisplayRequested 0
 mov wCurrentResource,0*256
 call far ptr Installint09
 call blackenscreen
 mov
wCurrentHostList,GETSET_NETWORK_HOST_ENT
RY
 call GetPassword
 jmp cfe6
cfe2b:

 call ClearScreen
 pop ax

cfe2:
 mov bl,not(ISDOWN)
 and cmdHost.ControlState,bl
 and cmdHotKeys.ControlState,bl
 and cmdMaintenance.ControlState,bl
 and cmdModem.ControlState,bl
 and cmdPower.ControlState,bl
 and cmdScreen ControlState,bl

 shr ax,1
 shr ax,1
 shr ax,1
 and ax,7
 jz cfe3
 mov pOSKFirstRegion,-1
 or OSK.ControlState,INVISIBLE
 call ForceTotalRepaint

 mov si,offset cmdHost
 dec ax
 jz cfe4
 mov si,offset cmdHotKeys
 dec ax
 jz cfe4
 mov si,offset cmdMaintenance
 dec ax
 jz cfe4
 mov si,offset cmdModem
 dec ax
 jz cfe4
 mov si,offset cmdPower
 dec ax
 jz cfe4
 mov si,offset cmdScreen
 dec ax
 jz cfe4
 jmp cfe3

cfe4:
 or [si].ControlState,ISDOWN
 and mnuToolbar.Controlstate,not(INVISIBLE)
 call SaveFormHeight
 mov bRepaintNeeded,-1
 call RepaintAndSetTab

 cmp bCalibrateOnly,-1
 jnz eoff
 mov bCalibrateOnly,0
 call DoCalibrate
 jmp cfe6
eoff.
 cmp bPasswordOnly,-1
 jnz eopg
 mov bPasswordOnly,0
 mov
wCurrentHostList,GETSET_NETWORK_HOST_ENT
RY
 call GetPassword
 jmp cfe6
eopg


 jmp cfe5

cfe3:
 test wCurrentResource,not(111b)
 jz cfe3a
 call BlackenScreen
cfe3a:
 or mnuToolbar.Controlstate,INVISIBLE

cfe5:
 mov ax,wDisplayRequested
 call ReconfigureOSK
cfe6:
 mov bNewDisplayRequested,0
 ret
DoExternalDisplayRequest endp

restoreourcolors proc near

 mov ax,1002h
 push ds
 pop es
 mov dx,offset ourpalette
 int 10h
 mov si,offset ourpalette
 mov bx,offset ourcolors
 mov cx,17
rrr
 push cx
 lodsb
 mov ch,[bx]
 mov cl,[bx+1]
 mov dh,[bx+2]
 add bx,3
 push bx
 mov bl,al
 xor bh,bh
 mov ax,1010h
 int 10h
 pop bx
 pop cx
 loop rrr
 ret
restoreourcolors endp

ReconfigureOSK proc near
 public ReconfigureOSK

 and ax,111b
 jz cfe6a
 mov bNextOSKConfiguration,0

 mov OSK.ID,ax
 test cmdOSKReduce.ControlState,INVISIBLE
 jnz cfe7
 call SetOSKReducedButtons

cfe7:
 test OSK.ID,RES_OSK_BIG
 jz cfe8
 call SetOSKEnlargedButtons

cfe8.
 mov ax,OSK.ID
 and al,11b
 cmp al,RES_OSK_ALPHA
 jz cfe8a
 cmp al,RES_OSK_NUM
 jz cfe8b
 cmp al,RES_OSK_FULL
 jmp cfe8c
 jmp cfe6a

cfe8a:
 mov si,offset cmdOSKAlphaKeyboard
 call far ptr DoOSKSmallKeyboard
 jmp cfe6a

cfe8b:
 mov si,offset cmdOSKNumKeyboard
 call far ptr DoOSKNumKeyboard
 jmp cfe6a

cfe8c:
 mov si,offset cmdOSKFullKeyboard
 call far ptr DoOSKFullKeyboard
 jmp cfe6a

cfe6a:
 ret
ReconfigureOSK endp
```

```
GetHostName proc near

 call ClearHostName
 or dx,dx
 jz ghn3
 push ds
 pop es
 mov di,txtCurrentHost.pStorageOffset
 mov cx,txtCurrentHost.wDataLength
 dec cx
 mov ds,dx
 cmp [si].iBuffLen,0
 jnz ghn1
 jmp ghn2

ghn1
 lds si,dword ptr [si].pBuffOff
 lds si,dword ptr [si].lpszHostName
 rep movsb
ghn2
 push es
 pop ds
ghn3
 ret
GetHostName endp

ClearHostName proc near

 push di
 mov di,txtCurrentHost.pStorageOffset
 mov byte ptr [di],0
 pop di
 ret
ClearHostName endp

GetPassword proc near

 mov bx,offset lblPasswordBox1
 mov si,offset frmPasswordBox
 call ShowPasswordIDBox
 mov si,offset txtPassword
 call SetInitialTab
 ret
GetPassword endp

GrayNetworkLists proc near
 or cmdNetworkUpdate.ControlState,DISABLED or
GRAYED
 or cmdNetworkConnect.ControlState,DISABLED or
GRAYED
 or lstNetworkGroups.ControlState,DISABLED or
GRAYED
 or lstNetworkHosts.ControlState,DISABLED or
GRAYED
 or cmdDisconnect.ControlState,DISABLED or
GRAYED
 or cmdToolBarClose.ControlState,DISABLED or
GRAYED
 and txtSecurityID.ControlState,not(GRAYED or
DISABLED)
 or cmdRebootHost.ControlState,GRAYED or
DISABLED
 or cmdUpgrade.ControlState,GRAYED or
DISABLED
 ret
GrayNetworkLists endp

UnGrayNetworkLists proc near
 and cmdNetworkUpdate.ControlState,not
(DISABLED or GRAYED)
 test cmdDisconnect.ControlState,DISABLED
 jz ugnl1
 and cmdNetworkConnect.ControlState,not
(DISABLED or GRAYED)

ugnl1:
 and lstNetworkGroups.ControlState,not (DISABLED
or GRAYED)
 and lstNetworkHosts.ControlState,not (DISABLED
or GRAYED)
 ret
UngrayNetworkLists endp

BlackenAndFree proc near

 call BlackenScreen
 call FreeScreen
 mov wCurrentResource,0
 ret
BlackenAndFree endp


HandleButtonClicks proc far
 public HandleButtonClicks


 mov si,pClickRegion
 mov di,si
 mov ax,[si].pCurrentControl
 mov si,ax
 call JumpOnAX

 dw offset cmdEdit,offset DoCmdEdit
 dw offset cmdPhoneBookOKCancel_OK,offset
DoCmdPhoneBookOK
 dw offset cmdPhoneBookOKCancel_Cancel,offset
DoCmdPhoneBookCancel
 dw offset cmdAbout,offset DoCmdAbout
 dw offset cmdOSKEnlarge,offset DoOSKEnlarge1
 dw offset cmdOSKReduce,offset DoOSKReduce1
 dw offset cmdOSKFullKeyboard,offset
DoOSKFullKeyboard1
 dw offset cmdOSKAlphaKeyboard,offset
DoOSKSmallKeyboard1
 dw offset cmdOSKNumKeyboard,offset
DoOSKNumKeyboard1
 dw offset cmdCalibratePen,offset StartCalibrate
 dw offset cmdRebootHost,offset DoReboot
 dw offset cmdUpgrade,offset DoUpgrade
 dw offset optNetwork,offset DoOptNetwork
 dw offset optModem,offset DoOptModem
 dw offset optSerial,offset DoOptSerial
 dw offset lstNetworkHosts,offset
DoLstNetworkHosts
 dw offset cmdNetworkUpdate,offset
DoNetWorkUpdate
 dw offset cmdNetworkConnect,offset
DoNetworkConnect
 dw offset cmdModemConnect,offset
DoModemConnect
 dw offset cmdSerialConnect,offset
DoSerialConnect
 dw offset cmdPasswordOKCancel_OK,offset
DoCmdPasswordOK
 dw offset cmdPasswordOKCancel_Cancel,offset
DoCmdPasswordCancel
 dw offset cmdDisconnect,offset DoDisconnect
 dw offset cmdDefault,offset DoDefault
 dw offset cmdClearHotKey1,offset ClearHotKey1
 dw offset cmdClearHotKey2,offset ClearHotKey2
 dw 0
 ret

DoDefault:
 SM_FUNCTION SM_GET_MODEM_DEFAULTS
 mov bRepaintNeeded,-1
 ret

DoCmdEdit:
 call DoHideOSK
 and
frmPhoneBookEdit.ControlState,not(INVISIBLE)

 mov ax,lstHostPhones.ID
 xor cx,cx
 call GetListData

 push ds
 pop es
 mov si,offset szListItemBuffer1
 mov di,txtPBDescription.pStorageOffset
 mov cx,txtPBDescription.wDataLength
 dec cx
 rep movsb

 mov si,offset szListItemBuffer2
 mov di,txtPBPhoneNumber.pStorageOffset
 mov cx,txtPBDescription.wDataLength
 dec cx
 rep movsb

 mov bModalFlag,-1
 call repaintwork

 mov si,offset txtPBDescription
 call SetInitialTab
 ret

DoCmdPhoneBookOK:
 push ds
 pop es
 mov di,offset szListItemBuffer1
 mov si,txtPBDescription.pStorageOffset
 mov cx,txtPBDescription.wDataLength
 dec cx
 rep movsb
 xor al,al
 stosb
 mov di,offset szListItemBuffer2
 mov si,txtPBPhoneNumber.pStorageOffset
 mov cx,txtPBPhoneNumber.wDataLength
 dec cx
 rep movsb
 xor al,al
 stosb
 mov ax,lstHostPhones.ID
 mov cx,wListCurrentItem
 call SetListCurrent
 jmp DoCmdPhoneBookCancel

DoCmdPhoneBookCancel:
 mov bModalFlag,0
 call DoHideOSK
 or frmPhoneBookEdit.ControlState,INVISIBLE
 call ClearScreen
 call ForceTotalRepaint
 ret

DoCmdPasswordCancel:
 mov bModalFlag,0
 call DoHideOSK
 or frmPasswordBox.ControlState,INVISIBLE
 cmp wCurrentResource,8*1
 jz dcc1

 cmp bPasswordOnly,-1
 jnz dcc1
 mov bPasswordOnly,0
 mov pTabRegion,0
 call BlackenAndFree
 call ForceTotalRepaint
 mov bRepaintNeeded,0
 call far ptr DeInstallInt08
 mov bl,MBB_CANCEL
 xor bh,bh
 SM_FUNCTION
SM_REPORT_BUTTON_CLICKED
 ret

dcc1:
 call ClearScreen
 call ForceTotalRepaint
 ret

DoCmdPasswordOK:
 mov bModalFlag,0
 call DoHideOSK
 or osk.Controlstate,INVISIBLE

 or frmPasswordBox.ControlState,INVISIBLE
 cmp wCurrentResource,1*8
 jz dcpo1

 cmp bPasswordOnly,-1
 jnz dcpo1
 mov bPasswordOnly,0
 call blackenandfree
 mov pTabRegion,0
 call forcetotalrepaint
 mov bRepaintNeeded,0
 call far ptr DeInstallInt08

 mov bl,MBB_OK
 xor bh,bh
 SM_FUNCTION
SM_REPORT_BUTTON_CLICKED
 ret

dcpo1:
 call ClearScreen
 call ForceTotalRepaint
 cmp bPasswordOnly,-1
 jnz dcpo2
 mov bPasswordOnly,0
 jmp dcpo3
dcpo2:

RequestConnection:
 SM_FUNCTION SM_REQUEST_CONNECTION
 jc dcpo2a
 SM_FUNCTION
SM_GET_CONNECTION_STATUS
 jnz dcpo2a

 mov bPopUpRequired,0
 mov bRepaintNeeded,0
 mov bLeavePenOn,0
 ret


dcpo2a:
 mov bGetConnectionStatus,-1
 mov wCurrentCallProgress,1234

dcpo3:
 mov bPopUpRequired,-1
 ret

DoNetworkUpdate:
 SM_FUNCTION SM_UPDATE_HOST_LIST
 call GrayNetworkLists
dnu1:
 mov bRepaintNeeded, PAINTALL AND (NOT
PAINTTOOLBARS)
 ret
DoNetworkConnect:
 mov
wCurrentHostList,GETSET_NETWORK_HOST_ENT
RY

DoAnyConnect
 SM_FUNCTION SM_GET_PASSWORD_STATUS

 jg dnc1
 jl dnc2
 jmp RequestConnection

dnc1
 call GetPassword
 ret
dnc2
 call ReportError
 ret

DoDisconnect:
 mov wCurrentCallProgress,1234
 mov bGetConnectionStatus,-1
 or cmdDisconnect.ControlState,GRAYED or
DISABLED
 or cmdToolBarClose.ControlState,DISABLED or
GRAYED
 and txtSecurityID.ControlState,not(GRAYED or
DISABLED)
 or cmdRebootHost.ControlState,GRAYED or
DISABLED
 or cmdUpgrade.ControlState,GRAYED or
DISABLED
 call RepaintCurrent
 mov si,pTabRegion
 call SetNewTabItemWork
 SM_FUNCTION
SM_REQUEST_DISCONNECTION
 ret


DoModemConnect:
 mov
wCurrentHostList,GETSET_MODEM_HOST_DESC_
ENTRY
 jmp DoAnyConnect

DoSerialConnect:
 mov wCurrentHostList,0
 jmp DoAnyConnect


DoOSKEnlarge1:
 call PrepUserResize
DoOSKEnlarge:
 or OSK.ID,RES_OSK_BIG
 or wCurrentResource,RES_OSK_BIG
 call SetOSKEnlargedButtons
 call HideOSK
 mov OSK.PixelHeight,0
 call RetainOSKRightAndShow
 call ReportCurrentResource
 ret

DoOSKReduce1:
 call PrepUserResize
DoOSKReduce:
 and OSK.ID,not(RES_OSK_BIG)
 and wCurrentResource,not(RES_OSK_BIG)
 call SetOSKReducedButtons
 call HideOSK
 call RepaintUnderOSK
 or OSK.ControlState,INVISIBLE
 call RetainOSKRightAndShow
 call ReportCurrentResource
 ret

DoOSKFullKeyboard1:
 call PrepUserResize
DoOSKFullKeyboard:
 or OSK.ID,RES_OSK_FULL
 or wCurrentResource,RES_OSK_FULL
 call ReGrayOSKTypeButtons

 cmp bScreenMode,VGA_MODE
 jz dofk2
 add ax,16
dofk2:

 ROUND_TO_BYTE_BOUNDARY ax
 mov OSK.PixelWidth,ax
 sub ax,bx
 sub ax,bx

 add ax,16
 mov lblOSKChrsetLine.PixelWidth,ax
 sub ax,16
 mov ax,frmAlphaKeyboard.PixelWidth
 add ax,bx
```

```
 call RetainOSKRightAndShow
 call ReportCurrentResource
 ret

DoOSKSmallKeyboard1.
 call PrepUserResize

DoOSKSmallKeyboard
 mov ax,OSK.ID
 and ax,not(RES_OSK_ALPHA + RES_OSK_NUM)

 or ax,RES_OSK_ALPHA
 mov OSK.ID,ax
 mov ax,wCurrentResource
 and ax,not(RES_OSK_ALPHA + RES_OSK_NUM)

 or ax,RES_OSK_ALPHA
 mov wCurrentResource,ax

 call ReGrayOSKTypeButtons
 or frmNumericKeyboard.ControlState,INVISIBLE
 call RetainOSKRightAndShow
 call ReportCurrentResource
 ret

DoOSKNumKeyboard1
 call PrepUserResize._

DoOSKNumKeyboard
 mov ax.OSK.ID
 and ax,not(RES_OSK_ALPHA + RES_OSK_NUM)

 or ax,RES_OSK_NUM
 mov OSK.ID,ax
 mov ax,wCurrentResource
 and ax,not(RES_OSK_ALPHA + RES_OSK_NUM)

 or ax,RES_OSK_NUM
 mov wCurrentResource,ax
 call ReGrayOSKTypeButtons
 or frmAlphaKeyboard.ControlState,INVISIBLE
 call RetainOSKRightAndShow
 call ReportCurrentResource
 ret

DoOptNetwork.
 call SetNetworkFrame
 call UpdateHostList
 call RepaintForClick
 ret

DoOptModem.
 call SetModemFrame
 call RepaintForClick
 ret

DoOptSerial
 call SetSerialFrame
 call RepaintForClick
 ret

DoListNetworkHosts:
 ret

DoCmdAbout:
 cmp bAboutClickActive,0
 jnz dca1
 mov wAboutClickTimer.0
 mov bAboutClickActive,-1
 ret
dca1

 mov bAboutClickActive,0
 test cmdToolBarClose.ControlState,DISABLED or
GRAYED
 jnz dca2
 call far ptr TryUnload
dca2:
 ret

DoUpgrade:
 call DoHideOSK
 SM_FUNCTION
SM_REQUEST_ACTIVE_FLASH_UPGRADE
 jge du1
 cmp ax,-8
 jnz du4

 or dx,dx
 jz du4a

 mov bMessageBoxID,-1
 mov bx,MBX_OK
 call PrepareMessageBox
 mov bMessageBoxRequested,-1
 mov bPopupRequired,-1
 call far ptr InstallInt08
 ret
```

```
du4:
 call ReportError
du4a:
 ret

du1:
 or dx,dx
 jnz du2
 mov bMessageBoxID,MB_NOUPGRADE
 mov si,offset rUpgradeNAHeader
 mov dx,seg rUpgradeNAHeader
 mov bx,MBX_OK
 jmp du3
du2.

 mov wMessageContinuationSI,offset
rUpgradeHeader
 mov wMessageContinuationDX,seg
rUpgradeHeader
 mov bMessageBoxId,MB_UPGRADE
 mov bx,MBX_YESNO

du3:
 call PrepareMessageBox
 call DrawMessageBox
 ret

StartCalibrate
 call DoCalibrate
 r .

DoReboot.
 call DoHideOSK
 mov si,offset rRebootHostHeader
 mov dx,seg rRebootHostHeader
 mov bMessageBoxId,MB_REBOOT
 mov bx,MBX_YESNO
 call PrepareMessageBox
 call DrawMessageBox
 ret

ClearHotKey1.
 mov bx,offset txtHotKey1
 xor ax,ax
 mov [bx].wDataLength,ax
 mov ScanCodeHeader.lBuffLen,2
 mov word ptr ScanCodePasser,ax

 push bx
 call PassScanCodeList
 pop si
 call FindRegionForControl
 jc chc1
 mov si,offset txtHotKey1
 call ResetHotKeyEditField
chc1:
 ret

ClearHotKey2:
 mov bx,offset txtHotKey2
 xor ax,ax
 mov [bx].wDataLength,ax
 mov ScanCodeHeader.lBuffLen,2
 mov word ptr ScanCodePasser,ax
 push bx
 call PassScanCodeList
 pop si
 call FindRegionForControl
 jc chc2
 mov si,offset txtHotKey2
 call ResetHotKeyEditField
chc2
 ret
HandleButtonClicks endp

ResetHotKeyEditField proc near
 mov pPenDownActiveRegion,bx
 mov pClickRegion,bx
 mov ax,[si]
 call RepaintIndividualControl
 mov bResetHotKeyDataLength,-1
 mov wHotKeyRightPixel,0
 mov wPenDownColumn,0
 call DoClickEvent
 ret
ResetHotKeyEditField endp

HandleMessageBoxClick proc far
 public HandleMessageBoxClick
 call JumpOnAX
 dw MB_CALIBRATEULC or (MBB_CANCEL *
256),offset
CancelCalibrateULC
 dw MB_CALIBRATELRC or (MBB_CANCEL *
256),offset
CancelCalibrateLRC
 dw MB_SHOWCALLPROGRESS or
(MBB_CANCEL * 256),offset
```

```
AbortConnection
 dw MB_REBOOT or (MBB_YES * 256),offset
DoRebootYes
 dw MB_UPGRADE or (MBB_YES * 256),offset
DoUpgradeYes
 dw MB_ABOUT or (MBB_OK * 256),offset
DoAboutOK
 dw MB_CREDITS or (MBB_OK * 256),offset
DoAboutOK
 dw 0
 call RemoveMessageBox
 ret

CancelCalibrateULC:
 cmp bCalibrateOnly,-1
 jnz ccu1
 SM_FUNCTION SM_CANCEL_CALIBRATION
 mov bCalibrationCompleteFlag,2
 mov bpopuprequired,-1
 ret
ccu1:
 mov bMessageBoxID,0
 call StopProtecting
 call ClearScreen
 SM_FUNCTION SM_CANCEL_CALIBRATION

 call ForceTotalRepaint
 call repaint
 ret

CancelCalibrateLRC:
 call RemoveMessageBox
 call DoCalibrate
 ret

AbortConnection.
 SM_FUNCTION
SM_ABORT_REQUEST_CONNECTION
 jge ac1
 cmp ax,-5
 jnz ac1
 ret
ac1:
 call RemoveMessageBox
 mov bGetConnectionStatus,0
 mov bRepaintNeeded,-1
 ret

DoRebootYes
 call RemoveMessageBox
 SM_FUNCTION SM_REBOOT_HOST
 jz dry1
 call ReportError
 ret
dry1:
 mov bNewDisplayRequested,-1
 mov wDisplayRequested,1*8
 ret

DoUpgradeYes:
 call RemoveMessageBox
 SM_FUNCTION SM_PERFORM_FLASH_UPDATE

 jz duy1
 call ReportError
 ret
duy1:
 xor ax,ax
 call ShowUpgradeProgress
 ret

DoAboutOK:
 call RemoveMessageBox
 SM_FUNCTION
SM_GET_NEXT_CREDITS_DIALOG
 jl dcmbok2
 mov ax,si
 or ax,dx
 jz dcmbok2
 mov bMessageBoxID,MB_CREDITS
 mov bx,MBX_OK
 call PrepareMessageBox
 call DrawMessageBox
dcmbok2:
 ret
HandleMessageBoxClick endp

HideModemOptions proc near

 or cmdModem.ControlState,INVISIBLE
 xor bx,bx
 mov cx,120

 mov cmdHost.PixelWidth,cx
 add bx,cx
 mov cmdHotKeys.LeftPixel,bx
 mov cmdHotKeys.PixelWidth,cx
```

```
add bx,cx
mov cmdMaintenance.LeftPixel,bx
mov cmdMaintenance.PixelWidth,cx
add bx,cx
mov cmdPower.LeftPixel,bx
mov cmdPower.PixelWidth,cx
add bx,cx
mov cmdScreen.LeftPixel,bx
mov cmdScreen.PixelWidth,cx
add bx,cx
mov mnuToolbar.PixelWidth,bx
mov frmHost.PixelWidth,bx
mov frmHotKey.PixelWidth,bx
mov frmMaintenance.PixelWidth,bx
mov frmScreen.PixelWidth,bx
mov frmPower.PixelWidth,bx

 sub bx,32
 mov cmdToolbarClose.LeftPixel,bx

 sub cmdDisconnect.LeftPixel,24
 sub cmdNetworkUpdate.LeftPixel,24
 sub cmdNetworkConnect.LeftPixel,24
 or fraConnectionOptions.ControlState,INVISIBLE
 sub fraNetworkConnection.TopPixel,40
 sub frmHost.PixelHeight,40
 sub lstNetworkHosts.LeftPixel,8

 ret
HideModemOptions endp

InitializeDefaults proc near

 mov ax,GETSET_HOST_CONNECTION_TYPE
 mov ah,80h
 SM_FUNCTION ax
 jl id1
 or al,al
 jz id1

 mov si,offset optModem
 call SetModemFrame
 cmp al,1
 jz id2

 mov si,offset optSerial
 call SetSerialFrame
 cmp al,2
 jz id2

id1:
 mov si,offset optNetwork
 call SetNetworkFrame

id2:
 mov bx,[si].pStorageOffset
 mov byte ptr [bx],1

 call SetControlsForConnectState
 ret
InitializeDefaults endp

SetControlsForConnectState proc near

 or cmdDisconnect.ControlState,GRAYED or
DISABLED
 or cmdToolBarClose.ControlState,DISABLED or
GRAYED
 or cmdNetWorkConnect.ControlState,GRAYED or
DISABLED
 or cmdModemConnect.ControlState,GRAYED or
DISABLED

 and txtSecurityID.ControlState,not (GRAYED or
DISABLED)
 or cmdRebootHost.ControlState,GRAYED or
DISABLED
 or cmdUpgrade.ControlState,GRAYED or
DISABLED


 SM_FUNCTION
SM_GET_CONNECTION_STATUS
 jl id3

 or ax,ax
 jnz id3a

 and cmdDisconnect.ControlState,not(GRAYED or
DISABLED)
 and cmdToolBarClose.ControlState,not(DISABLED
or GRAYED)
 or txtSecurityID.ControlState,GRAYED or
DISABLED
 and cmdRebootHost.ControlState,not(GRAYED or
DISABLED)
 and cmdUpgrade.ControlState,not(GRAYED or
DISABLED)
```

```
 call GetHostName
 jmp id3

id3a:
 call ClearHostName
 and
cmdNetworkConnect.ControlState,not(GRAYED or
DISABLED)
 and cmdModemConnect.ControlState,not(GRAYED
or DISABLED)
 jmp id3

id3:
 ret
SetControlsForConnectState endp

SetModemFrame proc near

 call UndoAllHostTypes
 and
fraModemConnection.ControlState,not(INVISIBLE)
 ret
SetModemFrame endp


SetNetworkFrame proc near

 call UndoAllHostTypes
 and
fraNetworkConnection.ControlState,not(INVISIBLE)
 ret
SetNetworkFrame endp

SetSerialFrame proc near

 call UndoAllHostTypes
 and
fraSerialConnection.ControlState,not(INVISIBLE)
 ret
SetSerialFrame endp

ShowAbout proc near

 mov bMessageBoxID,MB_ABOUT
 SM_FUNCTION SM_GET_ABOUT_DIALOG
 jge sa1
 call PointError
sa1:
 mov bx MBX_OK
 call PrepareMessageBox

 and lblMessageBox0.ControlState,not(INVISIBLE)
 call DrawMessageBox
 or lblMessageBox0.ControlState,INVISIBLE

 push word ptr bshadowcolor
 mov bshadowcolor,11

 mov si,offset abouticon
 mov cx frmMessageBox.LeftPixel
 mov dx frmMessageBox.TopPixel
 add dx,18
 add cx,32
 call drawicolor
 pop word ptr bshadowcolor
 ret
ShowAbout endp

ShowCallProgress proc near


 mov wCurrentCallProgress,ax
 cmp ax 4
 jnz setcp0
 mov bGetConnectionStatus,0
 mov bLeavePenOn -1
 mov bRepaintNeeded -1
 ret

setcp0
 mov si,ax
 add si,si
 add si,offset pszProgressTable
 cmp si,offset pszProgressTable_End
 jb  setcp1
 mov si,offset szInvalidProgress
 jmp setcp2
setcp1:
 mov si,[si]
setcp2
 push ds
 pop es
 mov di,offset szCallProgressFill
 mov cx,PROGRESS_MAXLEN
 rep movsb
 call DoHideOSK


 mov si,offset rCallProgressHeader
 mov dx,seg rCallProgressHeader
 a~ bMessageBoxId,MB_SHOWCALLPROGRESS

 mov bx,MBX_CANCEL
 call PrepareMessageBox
 call DrawMessageBox
 ret
ShowCallProgress endp

ShowPasswordIDBox proc near


 push si
 push bx
 mov ax,wCurrentHostList
 or ax,ax
 jnz spid1
 mov si,offset szSerial
 jmp spid2
spid1:
 xor cx,cx
 call GetListData
spid2:
 pop bx
 push si
 mov si,bx
 call pointcontrolcaption
 add bx,3+14
 mov ds,bx
 push ds
 pop es
 pop si
 mov cx,20
 rep movsb
 xor al,al
 stosb
 call DoHideOSK
 mov esk.tappixel,8

 pop si
 ar : [si].ControlState,not(INVISIBLE)
 cmp bPasswordOnly,-1
 jnz spid3
 cmp wCurrentResource,9*256
 jnz spid3
  call repaint
 mov si,offset txtPassword
 call setnibaktab


 ret
spid3
 mov bModelFlag,-1
 call repaintwork

 mov si,offset txtPassword
 call setinitialtab
 ret
ShowPasswordIDBox endp

TryUnload proc far
 public TryUnload

 push ax
 push bx
 mov bx,wCurrentResource
 SM_FUNCTION SM_REQUEST_UNLOAD
 cmp ax,1
 jz tu1

 mov bLocalState,0
 mov bLeavePenOn,0
tu1:
 pop bx
 pop ax
 ret
TryUnload endp

UndoAllHostTypes proc near

 or fraNetworkConnection.ControlState,INVISIBLE
 or fraSerialConnection.ControlState,INVISIBLE
 or fraModemConnection.ControlState,INVISIBLE
 ret
UndoAllHostTypes endp

UpdateDimensions proc near
 public updatedimensions


 cmp bSuppressDimensionUpdate,0
 jz ud00
 ret
ud00:
 cmp bNoDimensionUpdate,0
 jz ud0
 ret
ud0
 push bx
 push cx
 push di
 push si

 mov bx,rRegion.wCurrentTop
 mov cx,rRegion.wCurrentLeft
 mov di,rRegion.wCurrentRight
 mov si,rRegion.wCurrentBottom
 call UpdateDimensionsWork
 pop si
 pop di
 pop cx
 pop bx
 ret
UpdateDimensions endp


UpdateDimensionsWork proc near
 public UpdateDimensionsWork


 cmp bSuppressDimensionUpdate,0
 jz udx0
 ret

udx0:
 cmp bx,0
 jge ud1a
 xor bx,bx
ud1a:
 cmp si,0
 jge ud1b
 xor si,si
ud1b
 cmp di,0
 jge ud1c
 xor di,di
ud1c:
 cmp cx,0
 jge ud1
 mov cx,0
ud1:

 cmp bScreenMode,VGA_MODE
 jz ud4

 push bx
 push es
 xor bx,bx
 mov es,bx
 mov bx,0484h
 mov bl,es:[bx]
 inc bl
 xor bh,bh
 shl bx,1
 shl bx,1
 shl bx,1
 cmp si,bx
 jb ud4a
 dec bx
 mov si,bx
ud4a:
 pop es
 pop bx

ud4:
 cmp di,640
 jb ud2
 mov di,640-1
ud2:
 cmp si,480
 jb ud3
 mov si,480-1
ud3:
 call restvgastate

 mov ax,sm_update_dimensions
 SM_FUNCTION SM_UPDATE_DIMENSIONS

 call getvgastate
 ret
UpdateDimensionsWork endp


DrawAbouticon proc far
 public DrawAbouticon

 push si
 mov si,offset ColoredAbouticon
 mov cx,rRegion.wCurrentLeft
 mov dx,rRegion.wCurrentTop
 add dx,1
 add dx,wShiftCaption
 call drawicolor
 pop si
 ret
DrawAbouticon endp

DoCustomTimerProcedures proc far
 public DoCustomTimerProcedures


 inc wAboutClickTimer
 inc bPollingTimer


 cmp byte ptr es:bWeOwnInt09,0
 jnz dctp1
 cmp pOSKFirstRegion,-1
 jz dctp1
 push es
 push bx
 mov bx,040h
 mov es,bx
 mov bx,17h
 mov bl,es:[bx]
 and bl,(SCROLL_LOCK_DOWN or
NUM_LOCK_DOWN or CAPS_LOCK_DOWN)
 cmp bl,bLastKeyboardState
 jz dctp2
 mov bLastKeyboardState,bl
 mov bPopupRequired,-1
 mov bUpdateOSKLockKeys,-1
dctp2
 pop bx
 pop es
dctp1:


 ret
DoCustomTimerProcedures endp

GetCustomPopUpRequest proc far
 public GetCustomPopupRequest



 cmp bAboutClickActive,0
 jz gapur3
 cmp wAboutClickTimer,8
 jae gapur1
gapur3
 and bPollingTimer,1111b
 jnz gapur2

 call CheckUpdateHostList
 jc gapur1
 cmp bGetConnectionStatus,0
 jnz gapur1
 jmp gapur2

gapur1
 stc
 ret
gapur2:
 clc
 ret
GetCustomPopUpRequest endp

GetGraphicCaptionForScanCode proc near
 cmp bx,39h
 jnz gcsc1

 push pGraphicFont
 pop pCurrentFont
 mov si,spacebar_icon
 mov ah,0
 stosw
 dec di
 clc
 ret

gcsc1:
 push dx
 push cx
 push si
 push rRegion.pCurrentControl
 push pFirstControl
 mov pFirstControl,offset OSK
 call GoFirstControl

dkc4.
 cmp [si].ControlType,KEYBUTTON
 je dkc8
 cmp [si].ControlType,CAPSLOCKBUTTON
 je dkc8
 cmp [si].id,bx
 jnz dkc8

 mov dx,[si].wDataLength
 call PointControlCaption
 jcxz dkc5a

 mov ah,byte ptr [si].id
 call IsNumericKey
 jnz dkc5a
```

```
cmp bNumLockState,0
jz dkc5e
cmp bHotKeyIsShifted,0
jnz dkc5e

xchg dh,dl
jmp dkc5a

dkc5a:
 mov bx,cx
 mov al,[bx+3]
 stosb
 mov byte ptr es:[di],0
 push pGraphicFont
 pop pCurrentFont
 clc
 jmp dkc5

dkc5e
 mov ah,bHotKeyIsShifted
 push dx
 sub dl,32
 cmp dl,dh
 pop dx
 jnz dkc5c

 cmp bCapsLockState,0
 jz dkc5c
 not ah

dkc5c
 mov al,dl
 cmp ah,0
 jz dkc5b
 mov al,dh
dkc5b:
 stosb
 mov byte ptr es:[di],0
 push pNormFont
 pop pCurrentFont
 clc
 jmp dkc5
dkc6:
 call GoNextControl
 jnc dkc4
dkc5
 pop pFirstControl
 pop rRegion pCurrentControl
 pop si
 pop cx
 pop dx
 ret
GetGraphicCaptionForScanCode endp

ConvertSpecialKeys proc near


 cmp ah,0Fh
 jnz spk1
 mov ax 0F09h
 jmp spk2

spk1:
 cmp ah,54h
 jb spk8
 cmp ah,5dh
 ja spk8
 sub ah,(54h - 3bh)
spk2
 mov wHotKeyWork,ax
 mov al SHIFT_KEY
 stosb
 jmp spk9

spk8
 mov ax,wHotKeyWork

 cmp ah,78h
 jb spk9a
 cmp ah,83h
 ja spk9a
 mov al,ALT_KEY
 stosb
 cmp ah,78h+8
 ja spk9b
 je spk9c
 mov al,ah
 sub al,78h
 add al,"1"
 jmp spk9q
spk9c
 mov al,"0"
 jmp spk9q
spk9b:
 mov al,"-"
 cmp ah,83h
 jnz spk9q
 mov al,"="
spk9q
 mov wHotKeyWork,ax
 jmp spk30

spk9a:
 cmp ah,68h
 jb spk10
 cmp ah,71h
 ja spk10
 sub ah,(68h - 3bh)
 mov wHotKeyWork,ax
 mov al,ALT_KEY
 stosb
spk10:
 mov ax,wHotKeyWork
 cmp ah,5eh
 jb spk20
 cmp ah,67h
 ja spk20
 sub ah,(5eh - 3bh)
 mov wHotkeyWork,ax
 mov al,CTRL_KEY
 stosb

spk20:
 mov ax,wHotKeyWork
 mov al,ah
 call JumpOnAL
 db 77h
 dw offset CtrlHome
 db 84h
 dw offset CtrlPU
 db 73h
 dw offset CtrlLA
 db 74h
 dw offset CtrlRA
 db 75h
 dw offset CtrlEnd
 db 76h
 dw offset CtrlPD
 db 0
 mov ax,wHotKeyWork
 jmp spk30
CtrlHome
 mov ah,47h
 jmp spk29
CtrlPU:
 mov ah,49h
 jmp spk29
CtrlLA
 mov ah,4bh
 jmp spk29
CtrlRA:
 mov ah,4dh
 jmp spk29
CtrlEnd:
 mov ah,4fh
 jmp spk29
CtrlPD:
 mov ah,51h
 jmp spk29
spk29:
 mov al,CTRL_KEY
 stosb
 xor al,al
 mov wHotKeyWork,ax
spk30
 ret
ConvertSpecialKeys endp

InstallInt09 proc far


if need_tsr ne 0
 jmp short $ + 7
bWeOwnInt09 db 0

Old09Int dd 0
 push es
 push bx

 xor bx,bx
 mov es,bx
 mov ax,es:[bx+(4*9)]
 mov dx,es:[bx+(4*9)+2]
 mov cx,cs
 cmp dx,cx
 jnz ii9a
 cmp ax,offset new09int
 jz ii9a

 jmp ii9b
ii9a:
 mov word ptr cs:old09int,ax
 mov word ptr cs:old09int[2],dx
 mov dx,cs
 mov ax,offset new09int
 cli
 mov es:[bx+(4*9)],ax
 mov es:[bx+(4*9)+2],dx
 sti
 mov cs:bWeOwnInt09,-1
 call GetPhysicalKeyState

ii9b:
 pop bx
 pop es
endif
 ret
InstallInt09 endp


DeinstallInt09 proc far
 public DeinstallInt09
if need_tsr ne 0
 push es
 xor bx,bx
 mov es,bx
 mov ax,es:[bx+(4*9)]
 mov dx,es:[bx+(4*9)+2]
 cmp ax,offset new09int
 jnz di9a
 mov ax,cs
 cmp dx,ax
 jnz di9a
 mov ax,word ptr cs:old09int
 mov dx,word ptr cs:old09int[2]
 cli
 mov es:[bx+(4*9)],ax
 mov es:[bx+(4*9)+2],dx
 mov cs:bWeOwnInt09,0
 sti
di9a:
 pop es
endif
 ret
DeinstallInt09 endp

New09Int proc far

if need_tsr eq 0
 pushf
 call dword ptr cs:Old09int

 pushf
 push ax
 push ds
 mov ax,OURDATASEG
 mov ds,ax
 mov ah,1
 int 16h
 jz n9i2
 mov ah,0
 int 16h
 cmp bHourGlassMode,0
 jnz n9i2
 mov wKeyPressed,ax
 mov bKeyChanged,-1
 mov bPopupRequired,-1

n9i2:
 call GetPhysicalKeyState

 pop ds
 pop ax
 popf
endif
 iret
New09Int endp

UpdateHostList proc near


 test frsNetworkConnection.ControlState,INVISIBLE
 jnz dibc1

 call UngrayNetworkLists

 SM_FUNCTION SM_GET_HOST_LIST_STATUS
 jl dibc1
 jz dibc1
 call GrayNetworkLists
 cmp ax,1
 jz dibc1
 SM_FUNCTION SM_UPDATE_HOST_LIST
dibc1:
 ret
UpdateHostList endp


PrepUserResize proc near

 test wCurrentResource,not(111b)
 jnz pura1
 mov bReportOSKDimensions,-1
 mov bLeavePenOn,0
 mov bAwaitingMoveCompletion,-1
pura1:
 ret
PrepUserResize endp

DoBeforeRepaintingForm proc far
 public DoBeforeRepaintingForm

 push ax
 cmp si,offset osk
 jz rf0
 cmp si,offset frmMessageBox
 jz rf0
 mov ax,wCurrentResource
 and ax,1000000000000111b
 or ax,[si].ID
 mov wCurrentResource,ax
 call ReportCurrentResource
rf0:
 pop ax
 test wCurrentResource,0111111111111111b
 jnz rf0c
 cmp bMessageBoxID,-1
 jnz rf0c
 jmp rf0d
rf0c:
 test wCurrentResource,not(1000000000000111b)
 jnz rf1a
rf0d:
 call UpdateDimensions
rf1a
 ret
DoBeforeRepaintingForm endp


ReportCurrentResource proc near


 cmp bReportOSKDimensions,0
 jnz rcr1
 push ax
 push bx
 mov bx,wCurrentResource
 xor bh,bh
 SM_FUNCTION SM_NOTIFY_NEW_SETUP
 pop bx
 pop ax
rcr1:
 mov bReportOSKDimensions,0
 ret
ReportCurrentResource endp

DoAfterRepaintingList proc far
 public DoAfterRepaintingList
 ret
DoAfterRepaintingList endp


DoCustomListPenUp proc far
 public DoCustomListPenUp
 call JumpOnAX
 dw offset lstNetworkGroups,offset
DoLstNetworkGroups
 dw offset lstManufacturer,offset DoLstManufacturer
 dw 0
 jmp hlpu1x

DoLstNetworkGroups:
 mov si,offset lstNetworkHosts
 call RepaintIndividualListBox
 jmp hlpu1x

DoLstManufacturer:

 mov si,pPenUpListRegion
 test [si].bListItemFlags,4
 jz dim1
 test frsModemCustom.ControlState,INVISIBLE
 jz dim2

 and frsModemCustom.ControlState,not(INVISIBLE)

 mov ax,128
 jmp dim3
dim1:
 test frsModemCustom.ControlState,INVISIBLE
 jnz dim2

 or frsModemCustom.ControlState,INVISIBLE
 mov ax,-128

dim3
 push wCurrentFormHeight
 pop wPreviousFormHeight
 add frmModem.PixelHeight,ax

 call RepaintForClick
 mov si,pClickRegion
 call RestoreRegion
 call undocurrenttabitem
```

```
 mov pTabRegion,0
 mov si,pPenUpListRegion
 call SetNewTabItemWork
 mov pClickRegion,0
 jmp hipu1x

dim2
 jmp hipu1x

hipu1x:
 ret
DoCustomListPenUp endp

CheckListDataAvailable proc far
 public CheckListDataAvailable

 cmp ax,GETSET_NETWORK_HOST_ENTRY
 jz gld_wait
 cmp ax,GETSET_NETWORK_GROUP_ENTRY
 jz gld_wait
 jmp gld00
gld_wait
 test cmdNetworkUpdate.ControlState,DISABLED or
GRAYED
 jz gld00
 stc
 ret
gld00
 clc
 ret
CheckListDataAvailable endp

DoCustomControlPenDown proc far
 public DoCustomControlPenDown

 cmp al,KEYEDITBOX
 jnz dpd2a
 mov bResetHotKeyDataLength,-1
 mov wHotKeyRightPixel,0
dpd2a
 ret
DoCustomControlPenDown endp

DoHotKeyEdit proc far
 public DoHotKeyEdit
LEFT_SHIFT_SCANCODE equ 42
RIGHT_SHIFT_SCANCODE equ 54
LEFT_CONTROL_SCANCODE equ 29
RIGHT_CONTROL_SCANCODE equ 0E0h*256+29
LEFT_ALT_SCANCODE equ 56
RIGHT_ALT_SCANCODE equ 0E0h*256+56

 push bx
 mov bx,pTabRegion
 mov bx,[bx].pCurrentControl
 cmp bResetHotKeyDataLength,0
 jz qqx3
 mov bResetHotKeyDataLength,0
 mov [bx].wDataLength,0
qqx3
 mov ax,[si].ID

 cmp wHotKeyRightPixel,540-48-8
 jb dhke0
 jmp dhke99

dhke0:
 cmp bNumlockState,0
 jz dke0a
 test bKeyState,ALT_DOWN
 jz dke0a
 push ax
 call IsKNumericKey
 pop ax
 jnz dke0a
 jmp dke0b
dke0a:
 mov bAltNumberCount,0


dke0b:
 mov bKeyWasShifted,0
 push bx
 push ax
 mov di,offset wHotKeyShiftKeyups
 mov cx,[bx].wDataLength
 mov si,[bx].pStorageOffset
 add si,cx
dhk11:
 jcxz dhk10
 dec si
 dec si
 mov ax,[si]
 test al,80h
 jz dhk2
 and al,not(80h)
 call IsKShiftKey
 jz dhk9b
 mov bKeyWasShifted,-1

dhk2:
 inc si
 inc si
 jmp dhk10
dhk9b:
 mov bFinalWasAlt,0
 call IsKAltKey
 jnz dhk9a
 mov bFinalWasAlt,-1
dhk9a:
 cld
 movsw
 dec si
 dec si
 dec cx
 dec cx
 jmp dhk11
dhk10
 pop ax

 call IsKShiftKey
 jnz dhk12
dhk15
 add [bx].wDataLength,4
 mov [si],ax
 or al,80h
 inc si
 inc si
 mov [si],ax
 inc si
 inc si
 call RestoreShiftKeyups
 jmp dhk6

dhk12:
 cmp bKeyWasShifted,-1
 jz dhk16
 cmp di,offset wHotKeyShiftKeyups
 ja dhk15
dhk16:
 push ax
 call RestoreShiftKeyups
 pop ax
 mov [si],ax
 inc si
 inc si
 or al,80h
 mov [si],ax
 add [bx].wDataLength,4
 jmp dhk6

dhk6
 mov cx,[bx].wDataLength
 mov si,[bx].pStorageOffset
 push ds
 pop es

 mov ScanCodeHeader.iBuffLen,cx
 mov di,offset ScanCodePasser
 jcxz jke
 rep movsb
jke:
 pop bx
 mov si,bx
 push si

 call PassScanCodeList
 pop si

 call RepaintCurrent
dhke99:
 pop bx
 ret
DoHotKeyEdit endp


PassScanCodeList proc near

 mov ax,[bx].ID
 mov bl,ah
 xor bh,bh
 xor ah,ah
 mov dx,seg ScanCodeHeader
 mov si,offset ScanCodeHeader
 SM_FUNCTION ax
 ret
PassScanCodeList endp


RepaintCurrent proc near

 push pPenDownActiveRegion
 push pTabRegion
 pop pPenDownActiveRegion
 call RepaintIndividualControl
 pop pPenDownActiveRegion
 ret
RepaintCurrent endp

IsKShiftKey proc near
 call IsKLeftOrRightShift
 jz iisk1
 cmp ax,LEFT_CONTROL_SCANCODE
 jz iisk1
 cmp ax,RIGHT_CONTROL_SCANCODE
 jz iisk1
 call IsKAltKey
iisk1:
 ret
IsKShiftKey endp


IsKAltKey proc near

 cmp ax,LEFT_ALT_SCANCODE
 jz iiak1
 cmp ax,RIGHT_ALT_SCANCODE
iiak1:
 ret
IsKAltKey endp

IsKLeftOrRightShift proc near

 cmp ax,LEFT_SHIFT_SCANCODE
 jz iilor1
 cmp ax,RIGHT_SHIFT_SCANCODE
iilor1:
 ret
IsKLeftOrRightShift endp

GetCustomEditBoxContents proc far
 public GetCustomEditBoxContents

 cmp al,KEYEDITBOX
 jnz gcebc1
 call GetHotIcon
 stc
 ret
gcebc1:
 clc
 ret
GetCustomEditBoxContents endp

GetHotIcon proc near



 push di
 push si
 push ax
 push bx
 push dx
 push cx
 mov di,[si].pStorageOffset
 mov ax,[si].ID
 mov bl,ah
 xor bh,bh
 mov ah,80h
 push ds
 push si
 SM_FUNCTION ax
 jge ghi2
 pop si
 pop ds
 jmp ghi1
ghi2:
 push ds
 pop es

 mov ds,dx
 mov cx,word ptr [si].iBuffLen
 lds si,dword ptr [si].pBuffOff
 push cx
 jcxz ghi2a
 rep movsb
ghi2a:
 pop cx
 pop si
 pop ds
 mov [si].wDataLength,cx
ghi1:
 pop cx
 pop dx
 pop bx
 pop ax
 pop si
 pop di
 ret
GetHotIcon endp

RepaintCustomEditBoxContents proc far
 public RepaintCustomEditBoxContents


 cmp al,KEYEDITBOX
 jnz dcreb1
 call DrawKeyCombo
 cmp bCursorActive,0
 jz qqq
 mov di,offset rCursorRegion
 call resumecursor
qqq
 stc
 ret
dcreb1
 clc
 ret
RepaintCustomEditBoxContents endp


DrawKeyCombo proc near

 push bp
 mov bp,[si].wDataLength
 mov si,[si].pStorageOffset
 mov bHotKeyIsShifted,0
 mov bCapsLockState,0
 mov bNumLockState,0
dkk2:
 dec bp
 jl dkk1z
 dec bp
 jl dkk1z
 jmp dkk2a
dkk1z
 jmp dkk1


dkk2a
 lodsw
 test al,10000000b
 jz dkk2d
 and al,01111111b
 call IsKLeftOrRightShift
 jnz dkk2
 mov bHotKeyIsShifted,0
 jmp dkk2
dkk2d:
 cmp al,45h
 jnz dkk2e
 not bNumlockState
dkk2e
 cmp al,58
 jnz dkk2f
 not bCapsLockState
dkk2f:
 call IsKLeftOrRightShift
 jz dkk2b
 jmp dkk2c
dkk2b:
 mov bHotKeyIsShifted,-1
dkk2c:
 push bx
 mov bx,ax
 push ds
 pop es
 mov di,offset bHotKeyBuild
 call GetGraphicCaptionForScanCode
 pop bx

 jc dkk2
 push si
 mov si,offset bHotKeyBuild
 call getstringwidth
 push ax
 push cx
 push dx
 push bx
 add dx,4
 push bx
 push ax
 mov al,[si]
 mov bx,pCurrentFont
 cmp bx,pGraphicFont
 jnz dkk5
 push dx
 call GetBitMapHeight
 pop dx
 cmp ax,wNormFontHeight
 jae dkk5
 sub ax,wNormFontHeight
 neg ax
 shr ax,1
 add dx,ax
dkk5:
 pop ax
 pop bx

 push ax
 push bp
 call DrawString
 pop bp
 pop ax

 pop bx
 pop dx
 pop cx
 add cx,ax
```

```
add cx,4
pop ax
pop si
mov wHotKeyRightPixel,cx
jmp dkk2
dkk1:
pop bp
ret
DrawKeyCombo endp

RestoreShiftKeyups proc near

rsku1:
dec di
dec di
cmp di,offset wHotKeyShiftKeyups
jb rsku2
mov ax,[di]
mov [si],ax
inc si
inc si
jmp rsku1
rsku2:
ret
RestoreShiftKeyups endp

FreeScreen proc near
public freescreen

mov bx,-1
mov cx,bx
mov si,bx
mov di,bx
SM_FUNCTION SM_UPDATE_DIMENSIONS
ret
FreeScreen endp

SetArrowCursor proc near

push ax
push bx
push cx
push dx
push es
mov bHourGlassMode,0

mov bx,0
mov cx,0
push ds
pop es
mov dx,offset bArrowCursor
mov ax,9
int 33h
pop es
pop dx
pop cx
pop bx
pop ax
ret
SetArrowCursor endp

SetHourGlassCursor proc near

push ax
push bx
push cx
push dx
push es
mov bHourGlassMode,-1
mov bx 8
mov cx 8
push ds
pop es
mov dx,offset bHourGlassCursor
mov ax,9
int 33h
pop es
pop dx
pop cx
pop bx
pop ax
ret
SetHourGlassCursor endp

SetHandCursor proc near
public SetHandCursor

push ax
push bx
push cx
push dx
push si
push di
push es

cmp dx,OSK.toppixel
jl shc1
push dx
sub dx,OSK.pixelheight
cmp dx,OSK.toppixel
pop dx
jge shc1
cmp cx,OSK.leftpixel
jl shc1
push cx
sub cx,OSK.pixelwidth
cmp cx,OSK.leftpixel
pop cx
jge shc1

test OSK.ControlState,WVISIBLE
jnz shc1

cmp bHandMode,-1
mov bHandMode,-1
jz shc3
jmp shc2

shc1:
cmp bHandMode,0
jz shc3
mov bHandMode,0
cmp bHourGlassMode,0
jnz shc4
call SetArrowCursor
jmp shc3
shc4:
call SetHourGlassCursor
jmp shc3
shc2:
mov bx,5
mov cx,0
push ds
pop es
mov dx,offset bHandCursor
mov ax,9
int 33h
shc3:
pop es
pop di
pop si
pop dx
pop cx
pop bx
pop ax
ret
SetHandCursor endp
end main
```

Copr. 1995 Zenith Data Systems Corp.

```
tLISTBOXENTRY struc
lpszEntry dd 0
eAttribute db 0
ends

tMSGBOXBUFF struc
pTextOff dw 0
pTextSeg dw 0
cAlignment db 0
ends
tBUFFHEADER struc
iStructLen dw 0
iBuffLen dw 0
pB . Off dd 0
ends

tHOSTLIST struc
lpsNodeAddress dd 0
lpszGroupName dd 0
lpszHostName dd 0
iHostVersion dw 0
lpsSerial dd 0
lpsReserved dd 0
ends

tSCANCODES struc
tScanCode dw 0
ends

MB_LEFTJUSTIFIED equ 0
MB_CENTERED equ 1
MB_RIGHTJUSTIFIED equ 2

PENDRIVER_INTERRUPT equ 67h
SM_FUNCTION_INTERRUPT equ 68h

SM_GET_KEYBOARD_STATUS equ 082h
SM_SET_ACTIVE_STATUS equ 060h
SM_GET_INITIAL_SCREEN equ 08050h
SM_GET_ABOUT_DIALOG equ 053h
SM_GET_NEXT_CREDITS_DIALOG equ 54h
SM_UPDATE_DIMENSIONS equ 052h
SM_REQUEST_UNLOAD equ 08053h
SM_REPORT_BUTTON_CLICKED equ 8055H
SM_CALIBRATE_UPPERLEFT equ 0ch
SM_CALIBRATE_LOWERRIGHT equ 800Ch
SM_CANCEL_CALIBRATION equ 00eh
SM_REBOOT_HOST equ 011h
SM_SET_KEYSTROKE equ 061h
SM_REQUEST_ACTIVE_FLASH_UPGRADE equ
12h
SM_PERFORM_FLASH_UPDATE equ 13h
SM_GET_CONNECTION_STATUS equ 22h
SM_GET_HOST_LIST_STATUS equ 21h
SM_UPDATE_HOST_LIST equ 20h
SM_GET_PASSWORD_STATUS equ 25h
SM_REQUEST_CONNECTION equ 23h
SM_REQUEST_DISCONNECTION equ 8023h
SM_ABORT_REQUEST_CONNECTION equ 24h
SM_GET_MODEM_DEFAULTS equ 30h
SM_BLOCK_VIDEO_ACCESS equ 58h
SM_UNBLOCK_VIDEO_ACCESS equ 8058h

SM_TEST_FUNCTION equ 0FFFFh

UI_REQUEST_CLOSURE equ 053h
UI_REQUEST_DISPLAY equ 051h
UI_SHOW_MESSAGE_BOX equ 055h
UI_HIDE_MESSAGE_BOX equ 056h
UI_CALIBRATION_COMPLETE equ 0Dh
UI_FLASH_UPDATE_PERCENTAGE equ 14h
UI_GET_SUI_VERSION_NUMBER equ 59h
UI_UPDATE_CONNECTION_STATUS equ 3bh
GET_HOST_LIST_STATUS equ 021h
UI_MOVE_OSK equ 05bh

RES_NO_SCREEN EQU 0
RES_OSK_ALPHA EQU 1
RES_OSK_NUM EQU 2
RES_OSK_FULL EQU 3
RES_OSK_BIG EQU 4
RES_OSK_BIG_ALPHA EQU 5
RES_OSK_BIG_NUM EQU 6
RES_OSK_BIG_FULL EQU 7
RES_SETUPS_HOST EQU 1*8
RES_SETUPS_HOTKEYS EQU 2*8
RES_SETUPS_MAINTENANCE EQU 3*8
RES_SETUPS_MODEM EQU 4*8
RES_SETUPS_POWER EQU 5*8
RES_SETUPS_SCREEN EQU 6*8

GETSET_AUTOMATIC_SHUTOFF equ 0h
GETSET_BRIGHTNESS equ 0bh
GETSET_CONTRAST equ 0ah
GETSET_CUSTOM_AUTOANSWER_STRING equ
36h
GETSET_CUSTOM_CONNECT_STRING equ 38h
GETSET_CUSTOM_DISCONNECT_STRING equ
37h
GETSET_CUSTOM_INIT_STRING equ 035h
GETSET_HOST_CONNECTION_TYPE equ 02ch
GETSET_MODEM_ANSWER_ON_RING equ
032h
GETSET_MODEM_BAUD_RATE_ENTRY equ
29h
GETSET_MODEM_HOST_DESC_ENTRY equ
26h
GETSET_MODEM_HOST_PHONE_ENTRY equ
27h
GETSET_MODEM_MANUFACTURER_ENTRY equ
28h
GETSET_MODEM_PREFIX equ 030h
GETSET_MODEM_RETRY_DELAY equ 034h
GETSET_MODEM_RETRY_LIMIT equ 033h
GETSET_MODEM_SUFFIX equ 031h
GETSET_MODEM_TONE_OR_PULSE equ 02fh
GETSET_NETWORK_GROUP_ENTRY equ 2ah
GETSET_NETWORK_HOST_ENTRY equ 2bh
GETSET_PASSWORD equ 02ah
GETSET_SLEEPMODE_PERIOD equ 10h
GETSET_SECURITY_ID equ 66h
GETSET_DOMAIN_ID equ 67h
GETSET_LOCK_HOST_KEYBOARD equ 69h
GETSET_DIM_HOST_SCREEN equ 6Ah
GETSET_USER_DEFINED_HOT_ICON equ 65h
GETSET_USER_ID equ 02dh
GETSET_FRAME_TYPE_ENTRY equ 3ah
GETSET_USER_INTERFACE_LANGUAGE equ
057h
```

Copr. 1995 Zenith Data Systems Corp.

```
.model small
include suinclud.inc
DATASEG_BEGIN
extrn ControlDataStorageArea:byte
extrn bFormColor:byte
extrn bLightColor:byte
extrn bOutLineColor:byte
extrn bScreenMode:byte
extrn bShadowColor:byte

upbuttontable label word
db 0
dw offset upbuttonulc
dw offset upbuttontop
dw offset upbuttonurc
dw offset upbuttonleft
dw offset upbuttonmiddle
dw offset upbuttonright
dw offset upbuttonllc
dw offset upbuttonbottom
dw offset upbuttonlrc
UPBUTTONULC label byte
db 1
db 3
DB 00000000b,00000000b,00000000b,01111111b
DB 01111111b,00000000b,00000000b,10000000b
DB 01111111b,00000000b,00000000b,10000000b
UPBUTTONTOP label byte
db 1
db BUTTONTOPHEIGHT
DB 00000000b,00000000b,00000000b,11111111b
DB 11111111b,00000000b,00000000b,00000000b
DB 11111111b,00000000b,00000000b,00000000b
UPBUTTONURC label byte
db 1
db 3
DB 00000000b,00000000b,00000000b,11111110b
DB 11111100b,00000000b,00000010b,00000001b
DB 11111000b,00000000b,00000110b,00000001b
UPBUTTONLEFT label byte
db 1
db 1
DB 01100000b,00011111b,00000000b,10000000b

UPBUTTONMIDDLE label byte
db 1
db 1
DB 00000000b,11111111b,00000000b,00000000b
UPBUTTONRIGHT label byte
db 1
db 1
DB 00000000b,11111000b,00000110b,00000001b

UPBUTTONLLC label byte
db 1
db 3
DB 01000000b,00000000b,00111111b,10000000b
DB 00000000b,00000000b,01111111b,10000000b
DB 00000000b,00000000b,00000000b,01111111b
UPBUTTONBOTTOM label byte
db 1
db BUTTONBOTTOMHEIGHT
DB 00000000b,00000000b,11111111b,00000000b
DB 00000000b,00000000b,11111111b,00000000b
DB 00000000b,00000000b,00000000b,11111111b
UPBUTTONLRC label byte
db 1
db 3
DB 00000000b,00000000b,11111110b,00000001b
DB 00000000b,00000000b,11111110b,00000001b
DB 00000000b,00000000b,00000000b,11111110b
dnbuttontable label word
db 0
dw offset dnbuttonulc
dw offset dnbuttontop
dw offset dnbuttonurc
dw offset dnbuttonleft
dw offset dnbuttonmiddle
dw offset dnbuttonright
dw offset dnbuttonllc
dw offset dnbuttonbottom
dw offset dnbuttonlrc
DNBUTTONULC label byte
db 1
db 3
DB 00000000b,00000000b,00000000b,01111111b
DB 00000000b,00000000b,00000000b,11111111b
DB 00000000b,00000000b,00111111b,11000000b

DNBUTTONTOP label byte
db 1
db BUTTONTOPHEIGHT
DB 00000000b,00000000b,00000000b,11111111b
DB 00000000b,00000000b,00000000b,11111111b
DB 00000000b,00000000b,11111111b,00000000b
DNBUTTONURC label byte
```

```
db 1
db 3
DB 00000000b,00000000b,00000000b,11111110b
DB 00000000b,00000000b,00000000b,11111111b
DB 00000000b,00000000b,11111110b,00000001b

DNBUTTONLEFT label byte
db 1
db 1
DB 00000000b,00111111b,00000000b,11000000b

DNBUTTONMIDDLE label byte
db 1
db 1
DB 00000000b,11111111b,00000000b,00000000b

DNBUTTONRIGHT label byte
db 1
db 1
DB 00000000b,11111110b,00000000b,00000001b

DNBUTTONLLC label byte
db 1
db 3
DB 00000000b,00111111b,00000000b,11000000b
DB 00000000b,00111111b,00000000b,11000000b
DB 00000000b,00000000b,00000000b,11111111b
DNBUTTONBOTTOM label byte
db 1
db BUTTONBOTTOMHEIGHT
DB 00000000b,11111111b,00000000b,00000000b
DB 00000000b,11111111b,00000000b,00000000b
DB 00000000b,00000000b,00000000b,11111111b
DNBUTTONLRC label byte
db 1
db 3
DB 00000000b,11111110b,00000000b,00000001b
DB 00000000b,11111110b,00000000b,00000001b
DB 00000000b,00000000b,00000000b,11111110b

chiselboxtable label word
db 11b
dw offset chiselboxulc
dw offset chiselboxtop
dw offset chiselboxurc
dw offset chiselboxleft
dw offset chiselboxmiddle
dw offset chiselboxright
dw offset chiselboxllc
dw offset chiselboxbottom
dw offset chiselboxlrc
chiselboxulc label byte
db 1,3

db 00000000b,11111111b,00000000b,00000000b
db 00000000b,00000000b,11111111b,00000000b
db 01111111b,00000000b,10000000b,00000000b
chiselboxtop label byte
db 1,3
db 00000000b,11111111b,00000000b,00000000b
db 00000000b,00000000b,11111111b,00000000b
db 11111111b,00000000b,00000000b,00000000b
chiselboxurc label byte
db 1,3
db 00000000b,11110000b,00000000b,00000000b
db 00000000b,01110000b,10000000b,00000000b
db 11000000b,00110000b,00000000b,00000000b
chiselboxleft label byte
db 1,1

db 01000000b,00111111b,10000000b,00000000b
chiselboxmiddle label byte
db 1,1
db 00000000b,11111111b,00000000b,00000000b
chiselboxright label byte
db 1,1
db 01000000b,00110000b,10000000b,00000000b
chiselboxllc label byte
db 1,3
db 01000000b,00000000b,10111111b,00000000b
db 01111111b,10000000b,00000000b,00000000b
db 00000000b,11111111b,00000000b,00000000b
chiselboxbottom label byte
db 1,3
db 00000000b,00000000b,11111111b,00000000b
db 11111111b,00000000b,00000000b,00000000b
db 00000000b,11111111b,00000000b,00000000b
chiselboxlrc label byte
db 1,3
db 01000000b,00110000b,10000000b,00000000b
db 11000000b,00110000b,00000000b,00000000b
db 00000000b,11110000b,00000000b,00000000b

lineboxtable label word
db 11b
dw offset lineboxulc
dw offset lineboxtop
dw offset lineboxurc
dw offset lineboxleft
dw offset lineboxmiddle
dw offset lineboxright
dw offset lineboxllc
dw offset lineboxbottom
dw offset lineboxlrc
lineboxulc label byte
db 1,1
db 00000000b,00000000b,00000000b,00000000b
lineboxtop label byte
db 1,1
db 00000000b,00000000b,00000000b,11111111b
lineboxurc label byte
db 1,1
db 00000000b,00000000b,00000000b,00000000b
lineboxleft label byte
db 1,1
db 00000000b,00000000b,00000000b,10000000b
lineboxmiddle label byte
db 1,1
db 00000000b,00000000b,00000000b,00000000b
lineboxright label byte
db 1,1
db 00000000b,00000000b,00000000b,10000000b
lineboxllc label byte
db 1,1
db 00000000b,00000000b,00000000b,00000000b
lineboxbottom label byte
db 1,1
db 00000000b,00000000b,00000000b,00000000b

lineboxlrc label byte
db 1,1
db 00000000b,00000000b,00000000b,00000000b
textboxtable label word
db 0
dw offset textboxulc
dw offset textboxtop
dw offset textboxurc
dw offset textboxleft
dw offset textboxmiddle
dw offset textboxright
dw offset textboxllc
dw offset textboxbottom
dw offset textboxlrc
sliderboxtable label word
db 0
dw offset sliderboxulc
dw offset sliderboxtop
dw offset sliderboxurc
dw offset textboxleft
sliderboxmiddle label word
dw offset nomiddle
dw offset sliderboxright
dw offset sliderboxllc
dw offset sliderboxbottom
dw offset sliderboxlrc

sunkenframetable label word
db 0
dw offset textboxulc
dw offset textboxtop
dw offset textboxurc
dw offset textboxleft
dw offset nomiddle
dw offset textboxright
dw offset textboxllc
dw offset textboxbottom
dw offset textboxlrc

textboxulc label byte
db 1,3
db 00000000b,11111111b,00000000b,00000000b
db 00000000b,11111100b,00000011b,00000000b
db 00000000b,11111100b,00000010b,00000001b

Sliderboxulc label byte
db 1,5

db 00000000b,11111111b,00000000b,00000000b
db 00000000b,11111111b,00000000b,00000000b
db 00000000b,11111111b,00000000b,00000000b
db 00000000b,11111100b,00000011b,00000000b
db 00000000b,11111100b,00000010b,00000001b
textboxtop label byte
db 1,3
db 00000000b,11111111b,00000000b,00000000b
db 00000000b,00000000b,11111111b,00000000b
db 00000000b,11111111b,00000000b,00000000b

sliderboxtop label byte
db 1,5
db 00000000b,11111111b,00000000b,00000000b
db 00000000b,11111111b,00000000b,00000000b
db 00000000b,11111111b,00000000b,00000000b
db 00000000b,00000000b,11111111b,00000000b
db 00000000b,11111111b,00000000b,00000000b
textboxurc label byte
db 1,3

db 00000000b,11100000b,00000000b,00000000b
db 01000000b,00100000b,10000000b,00000000b
db 01000000b,10100000b,00000000b,00000000b

sliderboxurc label byte
db 1,5
db 00000000b,11111111b,00000000b,00000000b
db 00000000b,11111111b,00000000b,00000000b
db 00000000b,11111111b,00000000b,00000000b
db 01000000b,00111111b,10000000b,00000000b
db 01000000b,10111111b,00000000b,00000000b
textboxleft label byte
db 1,1
db 00000000b,11111100b,00000010b,00000001b
textboxmiddle label byte
db 1,1
db 11111111b,00000000b,00000000b,00000000b
textboxright label byte
db 1,1
db 01000000b,10100000b,00000000b,00000000b

sliderboxright label byte
db 1,1
db 01000000b,10111111b,00000000b,00000000b
textboxllc label byte
db 1,3
db 00000000b,11111101b,00000010b,00000000b
db 00000011b,11111100b,00000000b,00000000b
db 00000000b,11111111b,00000000b,00000000b
sliderboxllc label byte
db 1,5
db 00000000b,11111101b,00000010b,00000000b
db 00000011b,11111100b,00000000b,00000000b
db 00000000b,11111111b,00000000b,00000000b
db 00000000b,11111111b,00000000b,00000000b
db 00000000b,11111111b,00000000b,00000000b
textboxbottom label byte
db 1,3
db 00000000b,11111111b,00000000b,00000000b
db 11111111b,00000000b,00000000b,00000000b
db 00000000b,11111111b,00000000b,00000000b

sliderboxbottom label byte
db 1,5
db 00000000b,11111111b,00000000b,00000000b
db 11111111b,00000000b,00000000b,00000000b
db 00000000b,11111111b,00000000b,00000000b
db 00000000b,11111111b,00000000b,00000000b
db 00000000b,11111111b,00000000b,00000000b
textboxlrc label byte
db 1,3
db 01000000b,10100000b,00000000b,00000000b
db 11000000b,00100000b,00000000b,00000000b
db 00000000b,11100000b,00000000b,00000000b

sliderboxlrc label byte
db 1,5
db 01000000b,10111111b,00000000b,00000000b
db 11000000b,00111111b,00000000b,00000000b
db 00000000b,11111111b,00000000b,00000000b
db 00000000b,11111111b,00000000b,00000000b
db 00000000b,11111111b,00000000b,00000000b

sliderbutton label byte
public SliderButton
db 2
db 18

db 00111111b,00000000b,00000000b,00000000b
db 11000000b,00000000b,00000000b,00000000b
db 01000000b,00111111b,00000000b,00000000b
db 00000000b,11000000b,00100000b,00000000b
db 10000000b,01111111b,00000000b,00000000b
db 00000000b,11100000b,00010000b,00000000b
db 10000000b,01111111b,00000000b,00000000b
db 00000000b,11100000b,00010000b,00000000b
db 10000000b,01111111b,00000000b,00000000b
db 00000000b,11100000b,00010000b,00000000b
db 10000000b,01111111b,00000000b,00000000b
db 00000000b,11100000b,00010000b,00000000b
db 10000000b,01111111b,00000000b,00000000b
db 00000000b,11100000b,00010000b,00000000b
db 10000000b,01111111b,00000000b,00000000b
db 00000000b,11100000b,00010000b,00000000b
db 10000000b,01111111b,00000000b,00000000b
db 00000000b,11100000b,00010000b,00000000b
db 10000000b,01111111b,00000000b,00000000b
db 00000000b,11100000b,00010000b,00000000b
db 10000000b,01111111b,00000000b,00000000b
db 00000000b,11100000b,00010000b,00000000b
db 10000000b,01111111b,00000000b,00000000b
db 00000000b,11100000b,00010000b,00000000b
db 10000010b,01111001b,00000100b,00000000b
db 00000000b,11100000b,00010000b,00000000b
db 10000010b,01111001b,00000100b,00000000b
db 00000000b,11100000b,00010000b,00000000b
db 10000010b,01111001b,00000100b,00000000b
db 00000000b,11100000b,00010000b,00000000b
db 10000010b,01111001b,00000100b,00000000b
db 00000000b,11100000b,00010000b,00000000b
db 00000010b,00111001b,01000100b,00000000b
db 00000000b,11000000b,00100000b,00000000b
db 00000000b,00000000b,00111111b,00000000b
db 00000000b,00000000b,11000000b,00000000b
nomiddle label byte
db 1,1
db 00000000b,00000000b,00000000b,00000000b

CHECKEDBOX label byte
public CheckedBox
if CHECKMARK_CHECKBOXES eq 0

db 2
db 16
DB 00000000b,11111111b,00000000b,00000000b
DB 00000000b,11111111b,00000000b,00000000b
DB 00000000b,10000000b,01111111b,00000000b
DB 00000000b,00000111b,11111000b,00000000b
DB 00000000b,10000000b,01000000b,00111111b
DB 00000100b,00001011b,00000000b,11110000b
DB 00011111b,10000000b,01000000b,00100000b
DB 11110100b,00001011b,00000000b,00000000b
DB 00010011b,10000000b,01000000b,00101100b
DB 10010100b,00001011b,00000000b,01100000b
DB 00010001b,10000000b,01000000b,00101110b
DB 00010100b,00001011b,00000000b,11100000b
DB 00011000b,10000000b,01000000b,00100111b
DB 00110100b,00001011b,00000000b,11000000b
DB 00011100b,10000000b,01000000b,00100011b
DB 01110100b,00001011b,00000000b,10000000b
DB 00011000b,10000000b,01000000b,00100111b
DB 00110100b,00001011b,00000000b,11000000b
DB 00010001b,10000000b,01000000b,00101110b
DB 00010100b,00001011b,00000000b,11100000b
DB 00010011b,10000000b,01000000b,00101100b
DB 10010100b,00001011b,00000000b,01100000b
DB 00011111b,10000000b,01000000b,00100000b
DB 11110100b,00001011b,00000000b,00000000b
DB 00000000b,10011111b,01000000b,00100000b
DB 00000100b,11111011b,00000000b,00000000b
DB 00111111b,11000000b,00000000b,00000000b
DB 11111100b,00000011b,00000000b,00000000b
DB 00000000b,11111111b,00000000b,00000000b
DB 00000000b,11111111b,00000000b,00000000b
DB 00000000b,11111111b,00000000b,00000000b
DB 00000000b,11111111b,00000000b,00000000b

else
db 2
db 18
DB 00000000b,11111111b,00000000b,00000000b
DB
00000000b,11111110b,00000000b,00000000b
DB 00000000b,10000000b,01111111b,00000000b
DB
00000000b,00000110b,11111000b,00000000b
DB 00000000b,10000000b,01000000b,00111111b
DB
00000100b,00001010b,00000000b,11110000b
DB 00011111b,10000000b,01000000b,00100000b
DB
11110100b,00001010b,00000000b,00000000b
DB 00011111b,10000000b,01000000b,00100000b
DB
11010100b,00001010b,00000000b,00100000b
DB 00011111b,10000000b,01000000b,00100000b
DB
10010100b,00001010b,00000000b,01100000b
DB 00011111b,10000000b,01000000b,00100000b
DB
00010100b,00001010b,00000000b,11100000b
DB 00010010b,10000000b,01000000b,00101101b
DB
00110100b,00001010b,00000000b,11000000b
DB 00010000b,10000000b,01000000b,00101111b
DB
01110100b,00001010b,00000000b,10000000b
DB 00011000b,10000000b,01000000b,00100111b
DB
11110100b,00001010b,00000000b,00000000b
DB 00011101b,10000000b,01000000b,00100010b
DB
11110100b,00001010b,00000000b,00000000b
DB 00011111b,10000000b,01000000b,00100000b
DB
11110100b,00001010b,00000000b,00000000b
DB 00000000b,10011111b,01000000b,00100000b
```

```
  DB
00000100b,11111010b,00000000b,00000000b
DB 00111111b,11000000b,00000000b,00000000b
  DB
11111100b,00000010b,00000000b,00000000b
DB 00000000b,11111111b,00000000b,00000000b
  DB
00000000b,11111110b,00000000b,00000000b
DB 00000000b,11111111b,00000000b,00000000b
  DB
00000000b,11111110b,00000000b,00000000b

endif
UNCHECKEDBOX label byte
  public UnCheckedBox

db 2
db 16
DB 00000000b,11111111b,00000000b,00000000b
DB 00000000b,11111110b,00000000b,00000000b
DB 00000000b,10000000b,01111111b,00000000b
DB 00000000b,00000110b,11111000b,00000000b
DB 00000000b,10000000b,01000000b,00111111b
DB 00000100b,00001010b,00000000b,11110000b
DB 00011111b,10000000b,01000000b,00100000b
DB 11110100b,00001010b,00000000b,00000000b
DB 00011111b,10000000b,01000000b,00100000b
DB 11110100b,00001010b,00000000b,00000000b
DB 00011111b,10000000b,01000000b,00100000b
DB 11110100b,00001010b,00000000b,00000000b
DB 00011111b,10000000b,01000000b,00100000b
DB 11110100b,00001010b,00000000b,00000000b
DB 00011111b,10000000b,01000000b,00100000b
DB 11110100b,00001010b,00000000b,00000000b
DB 00011111b,10000000b,01000000b,00100000b
DB 11110100b,00001010b,00000000b,00000000b
DB 00011111b,10000000b,01000000b,00100000b
DB 11110100b,00001010b,00000000b,00000000b
DB 00011111b,10000000b,01000000b,00100000b
DB 11110100b,00001010b,00000000b,00000000b
DB 00011111b,10000000b,01000000b,00100000b
DB 11110100b,00001010b,00000000b,00000000b
DB 00000000b,10011111b,01000000b,00100000b
DB 00000100b,11111010b,00000000b,00000000b
DB 00111111b,11000000b,00000000b,00000000b
DB 11111100b,00000010b,00000000b,00000000b
DB 00000000b,11111111b,00000000b,00000000b
DB 00000000b,11111110b,00000000b,00000000b
DB 00000000b,11111111b,00000000b,00000000b
DB 00000000b,11111110b,00000000b,00000000b
if DIAMOND_OPTBUTTONS eq 0
unselaptbutton label byte
  public UnSelOptButton
db 2
db 15
db 00000000b,11111111b,00000000b,00000000b
 db 00000000b,00000000b,00000000b,00000000b
db 00000000b,11111000b,00000111b,00000000b
 db 00000000b,01000000b,10000000b,00000000b
db 00000000b,11100000b,00010000b,00001111b
 db 00000000b,00010000b,00100000b,11000000b
db 00000111b,11000000b,00101000b,00010000b
 db 11000000b,00001000b,00010000b,00100000b
db 00001111b,11000000b,00010000b,00100000b
 db 11100000b,00001000b,00010000b,00000000b
db 00011111b,10000000b,01000000b,00100000b
 db 11110100b,00000010b,00001000b,00000000b
db 00011111b,10000000b,01000000b,00100000b
 db 11110100b,00000010b,00001000b,00000000b
db 00011111b,10000000b,01000000b,00100000b
 db 11110100b,00000010b,00001000b,00000000b
db 00011111b,10000000b,01000000b,00100000b
 db 11110100b,00000010b,00001000b,00000000b
db 00001111b,11000000b,00100000b,00010000b
 db 11101000b,00000100b,00010000b,00000000b
db 00000111b,11100000b,00011000b,00000000b
 db 11001000b,00010100b,00100000b,00000000b
db 00000000b,11111000b,00000111b,00000000b
 db 00110000b,00001000b,11000000b,00000000b
db 00000111b,11111000b,00000000b,00000000b
 db 11000000b,00100000b,00000000b,00000000b
db 00000000b,10000000b,00000000b,00000000b
 db 00000000b,00000000b,00000000b,00000000b
seloptbutton label byte
  public SelOptButton
db 2
db 15
db 00000000b,11111111b,00000000b,00000000b
 db 00000000b,10000000b,00000000b,00000000b
db 00000000b,11111000b,00000111b,00000000b
 db 00000000b,01000000b,10000000b,00000000b
db 00000000b,11100000b,00010000b,00001111b
 db 00000000b,00010000b,00100000b,11000000b
db 00000111b,11000000b,00101000b,00010000b
db 11000000b,00001000b,00010000b,00100000b
db 00001100b,11000000b,00010011b,00100000b
db 01100000b,00001000b,10010000b,00000000b
db 00011000b,10000000b,01000000b,00100011b
 db 00110100b,00000010b,00001000b,11000000b
db 00010000b,10000000b,01001000b,00100011b
 db 00010100b,00000010b,00101000b,11000000b
db 00010000b,10000000b,01001000b,00100011b
 db 00010100b,00000010b,00101000b,11000000b
db 00010000b,10000000b,01001000b,00100011b
 db 00010100b,00000010b,00101000b,11000000b
db 00010000b,10000000b,01001000b,00100011b
 db 00110100b,00000010b,00001000b,11000000b
db 00001100b,11000000b,00100011b,00010000b
 db 01101000b,00000100b,10010000b,00000000b
db 00000111b,11000000b,00011000b,00000000b
 db 11001000b,00010100b,00100000b,00000000b
db 00000000b,11111000b,00000111b,00000000b
 db 00110000b,00001000b,11000000b,00000000b
db 00000111b,11111000b,00000000b,00000000b
 db 11000000b,00100000b,00000000b,00000000b
db 00000000b,11111111b,00000000b,00000000b
 db 00000000b,10000000b,00000000b,00000000b
else
unselaptbutton label byte
  public UnSelOptButton

db 2
db 15
db 00000001b,11111110b,00000000b,00000000b
 db 00000000b,11111110b,00000000b,00000000b
db 00000000b,11111110b,00000010b,00000001b
 db 10000000b,01111110b,00000000b,00000000b
db 00000001b,11111000b,00000100b,00000010b
 db 01000000b,00111110b,10000000b,00000000b
db 00000011b,11110000b,00001000b,00000100b
 db 10100000b,00011110b,01000000b,00000000b
db 00000011b,11100000b,00010000b,00001000b
 db 11010000b,00001110b,00100000b,00000000b
db 00000111b,11000000b,00100000b,00010000b
 db 11101000b,00000110b,00010000b,00000000b
db 00001111b,10000000b,01000000b,00100000b
 db 11110100b,00000010b,00001000b,00000000b
db 00011111b,00000000b,10000000b,01000000b
 db 11110100b,00000010b,00001000b,00000000b
db 00001111b,10000000b,01000000b,00100000b
 db 11101000b,00000110b,00010000b,00000000b
db 00000111b,11000000b,00100000b,00010000b
 db 11010000b,00001110b,00100000b,00000000b
db 00000011b,11100000b,00010000b,00001000b
 db 10100000b,00011110b,01000000b,00000000b
db 00000011b,11110000b,00001000b,00000100b
 db 01000000b,00111110b,10000000b,00000000b
db 00000001b,11111000b,00000100b,00000010b
 db 10000000b,01111110b,00000000b,00000000b
db 00000000b,11111110b,00000010b,00000001b
 db 00000000b,11111110b,00000000b,00000000b
seloptbutton label byte
  public SelOptButton

db 2
db 15
db 00000001b,11111110b,00000000b,00000000b
 db 00000000b,11111110b,00000000b,00000000b
db 00000000b,11111110b,00000010b,00000001b
 db 10000000b,01111110b,00000000b,00000000b
db 00000001b,11111000b,00000100b,00000010b
 db 01000000b,00111110b,10000000b,00000000b
db 00000011b,11110000b,00001000b,00000100b
 db 10100000b,00011110b,01000000b,00000000b
db 00000011b,11100000b,00010000b,00001000b
 db 11010000b,00001110b,00100000b,00000000b
db 00000111b,11000000b,00100000b,00010000b
 db 11101000b,00000110b,00010000b,00000000b
db 00001111b,10000000b,01000000b,00100000b
 db 11110100b,00000010b,00001000b,00000000b
db 00011111b,00000000b,10000000b,01000000b
 db 11110100b,00000010b,00001000b,00000000b
db 00001111b,10000000b,01000000b,00100000b
 db 11101000b,00000110b,00010000b,00000000b
db 00000111b,11000000b,00100000b,00010000b
 db 11010000b,00001110b,00100000b,00000000b
db 00000011b,11100000b,00010000b,00001000b
 db 10100000b,00011110b,01000000b,00000000b
db 00000001b,11111000b,00000100b,00000010b
 db 10000000b,01111110b,00000000b,00000000b
db 00000000b,11111110b,00000001b,00000000b

endif
bSpectrumPattern label byte
  public bSpectrumPattern
db 21+2
db 2
db 00000000b,00000000b,00000000b,11111111b
db 00000000b,00000000b,00000000b,11111111b
db 00000000b,00000000b,00100100b,11011011b
db 00000000b,00000000b,10101010b,01010101b
db 00000000b,00000000b,10101010b,01010101b
db 00000000b,00000000b,11011011b,00100100b
db 00000000b,00000000b,11111111b,00000000b
db 00000000b,00000000b,11111111b,00000000b
db 00000000b,00100100b,11011011b,00000000b
db 00000000b,01010101b,10101010b,00000000b
db 00000000b,01010101b,10101010b,00000000b
db 00000000b,01010101b,10101010b,00000000b
db 00000000b,11011011b,00100100b,00000000b
db 00000000b,11111111b,00000000b,00000000b
db 00000000b,11111111b,00000000b,00000000b
db 00100100b,11011011b,00000000b,00000000b
db 01010101b,10101010b,00000000b,00000000b
db 01010101b,10101010b,00000000b,00000000b
db 01010101b,10101010b,00000000b,00000000b
db 11011011b,00100100b,00000000b,00000000b
db 11111111b,00000000b,00000000b,00000000b
db 11111111b,00000000b,00000000b,00000000b
db 11111111b,00000000b,00000000b,00000000b
db 00000000b,00000000b,00000000b,11111111b
db 00000000b,00000000b,00000000b,11111111b
db 00000000b,00000000b,00010010b,11101101b
db 00000000b,00000000b,01010101b,10101010b
db 00000000b,00000000b,01010101b,10101010b
db 00000000b,00000000b,11101101b,00010010b
db 00000000b,00000000b,11111111b,00000000b
db 00000000b,00000000b,11111111b,00000000b
db 00000000b,00010010b,11101101b,00000000b
db 00000000b,10101010b,01010101b,00000000b
db 00000000b,10101010b,01010101b,00000000b
db 00000000b,10101010b,01010101b,00000000b
db 00000000b,11101101b,00010010b,00000000b
db 00000000b,11111111b,00000000b,00000000b
db 00000000b,11111111b,00000000b,00000000b
db 00010010b,11101101b,00000000b,00000000b
db 10101010b,01010101b,00000000b,00000000b
db 10101010b,01010101b,00000000b,00000000b
db 10101010b,01010101b,00000000b,00000000b
db 11101101b,00010010b,00000000b,00000000b
db 11111111b,00000000b,00000000b,00000000b
db 11111111b,00000000b,00000000b,00000000b
db 11111111b,00000000b,00000000b,00000000b
bTallNotchPattern label byte
  public bTallNotchPattern
db 1
db 8
db 00000001b,00000000b,00000010b,00000000b
db 00000001b,00000000b,00000010b,00000000b
db 00000001b,00000000b,00000010b,00000000b
db 00000001b,00000000b,00000010b,00000000b
db 00000001b,00000000b,00000010b,00000000b
db 00000001b,00000000b,00000010b,00000000b
db 00000001b,00000000b,00000010b,00000000b
db 00000011b,00000000b,00000000b,00000000b
bShortNotchPattern label byte
  public bShortNotchPattern
db 1
db 5
db 00000001b,00000000b,00000010b,00000000b
db 00000001b,00000000b,00000010b,00000000b
db 00000001b,00000000b,00000010b,00000000b
db 00000001b,00000000b,00000010b,00000000b
db 00000011b,00000000b,00000000b,00000000b

rectanglepointers label word
rectlags   db 0
recule     dw 0
rectop     dw 0
recure     dw 0
recleft    dw 0
recmiddle  dw 0
recright   dw 0
recile     dw 0
recbottom  dw 0
recirc     dw 0
recend label word
buttonflags db 0
buttoncolumn dw 0
buttonrow dw 0
buttonheight db 0
buttonlength db 0
DATASEG_END
.code
extrn CheckIfCovered:near
extrn FillScreenArea:near
extrn NewRowForCheckIfCovered:near
extrn PointScreenDest:near

DrawColor proc near
  public DrawColor
  cmp bScreenMode,VGA_MODE
  jz d4c0
  ret
d4c0:
  push word ptr bLightColor
  push word ptr bFormColor
  push word ptr bShadowColor
  push word ptr bOutlineColor
  cmp byte ptr [si],-1
  jnz d4c10
  lodsb
  lodsb
  mov bLightColor,al
  lodsb
  mov bFormColor,al
  lodsb
  mov bShadowColor,al
  lodsb
  mov bOutlineColor,al

d4c10:
  call pointscreendest
  lodsw

  mov bx,ax
  xor ah,ah
  mov bp,80
  sub bp,ax

  vgaloadlatches
d4e:
if need_ock ne 0
  call checkifcovered
  jnc d4e1

  lodsb
  lodsb
  lodsb
  lodsb
  jmp d4d
endif
d4e1:
  mov al,es:[di]
  lodsb
  or al,al
  jz d4a
  vgawritecolor bLightColor
d4a:
  mov al,es:[di]
  lodsb
  or al,al
  jz d4b
  vgawritecolor bFormColor
d4b:
  mov al,es:[di]
  lodsb
  or al,al
  jz d4c
  vgawritecolor bShadowColor
d4c:
  mov al,es:[di]
  lodsb
  or al,al
  jz d4d
  vgawritecolor bOutlineColor
d4d:
  inc di
  dec bl
  jnz d4e
  add di,bp
  dec bh
  jz d4f
  mov ax,80
  sub ax,bp
  mov bl,al
 if need_ock ne 0
  call NewRowForCheckIfCovered
 endif
  jmp d4e
d4f:
  pop word ptr bOutlineColor
  pop word ptr bShadowColor
  pop word ptr bFormColor
  pop word ptr bLightColor
  ret
drawcolor endp

DrawRectangle proc near
  mov buttoncolumn,cx
  mov buttonrow,dx
  mov buttonheight,bh
  mov buttonlength,bl
  push ds
  pop es
  mov di,offset rectanglepointers
  mov cx,offset recend - offset rectanglepointers
  rep movsb
  mov si,recmiddle
  or si,si
```

```
jz drnomid
lodsb
lodsb

mov bl,11111111b
mov bh,bLightColor
lodsb
cmp al,bl
jz dre1
mov bh,bFormColor
lodsb
cmp al,bl
jz dre1
mov bh,bShadowColor
lodsb
cmp al,bl
jz dre1
mov bh,bOutlineColor
lodsb
cmp al,bl
jnz drnomid
dre1
 mov recmiddle,0
 mov si,recleft
 mov al,[si]
 xor ah,ah
 sal ax,1
 sal ax,1
 sal ax,1

 add ax,buttoncolumn
 mov cx,ax
 mov dx,buttonrow
 mov si,rectop
 mov al,[si+1]
 xor ah,ah
 add dx,ax
 mov al,buttonlength
 xor ah,ah
 mov si,ax
 mov al,buttonheight
 xor ah,ah
 add ax,ax
 jz drnomid


 call fillscreenarea
drnomid
 cmp bScreenMode,VGA_MODE
 jz dre0
 ret
dre0
 mov dx,buttonrow
 cmp buttonheight,0
 jnz drx1
 test recflags,1
 jz drx1
 mov cx,buttoncolumn
 sub cx,8
 jmp drx3
drx1
 mov cx,buttoncolumn
 mov si,reculc
 call draw4color
drx2:
 mov cx,buttoncolumn
drx3
 mov bl,buttonlength
 or bl,bl
 jz drb1a
drb1
 add cx,8
 push bx
 push cx
 mov dx,buttonrow
 mov si,rectop
 call draw4color
 pop cx
 pop bx
 dec bl
 jnz drb1
drb1a:
 add cx,8
 cmp buttonheight,0
 jnz drx4
 test recflags,1
 jz drx4
 jmp drb99
drx4
 mov dx,buttonrow
 mov si,securc
 call draw4color
 mov dx,buttonrow
 add dx,3
 mov bh,buttonheight
 or bh,bh
 jz drb4
 push bx

call rectanglebody
pop bx
call rectanglebody
drb4:
mov cx,buttoncolumn
push cx
push dx
mov si,recllc
call draw4color
pop dx
pop cx
add cx,8
mov bl,buttonlength
or bl,bl
jz drb5a
drb5:
push bx
push cx
push dx
mov si,recbottom
call draw4color
pop dx
pop cx
pop bx
add cx,8
dec bl
jnz drb5
drb5a:
 mov si,reclrc
 call draw4color
drb99
 ret
drawrectangle endp

rectanglebody proc near
drb3:
 push bx
 push dx
 mov cx,buttoncolumn
 push cx
 mov si,recleft
 call draw4color
 pop cx
 pop dx
 pop bx
 add cx,8
 mov bl,buttonlength
 or bl,bl
 jz drb2a
drb2:
 cmp recmiddle,0
 jnz drb2b
 mov al,buttonlength
 xor ah,ah
 sal ax,1
 sal ax,1
 sal ax,1
 add cx,ax
 jmp drb2a
drb2b
 push bx
 push cx
 push dx
 mov si,recmiddle
 call draw4color
 pop dx
 pop cx
 pop bx
 add cx,8
 dec bl
 jnz drb2
drb2a
 push bx
 push dx
 mov si,recright
 call draw4color
 pop dx
 pop bx
 inc dx
 dec bh
 jz drb4q
 jmp drb3
drb4q:
 ret

rectanglebody endp

DrawUpButton proc near
 public DrawUpButton
 public drawupbutton
 push si
 mov si,offset upbuttontable
 call drawrectangle
 pop si
 ret
drawupbutton endp

DrawDnButton proc near

 public DrawDnButton
public drawdnbutton
 push si
 mov si,offset dnbuttontable
 call drawrectangle
 pop si
 ret
drawdnbutton endp

DrawChiselBox proc near
 public DrawChiselBox
 public drawchiselbox
 mov si,offset chiselboxtable
 call drawrectangle
 ret
drawchiselbox endp


DrawTextLine proc near
 public DrawTextLine
 push bx
 call PointScreenDest
 pop bx
dtl2:
if need_osk ne 0
 call CheckIfCovered
 jc dtl1
endif
 mov ax,196+256*7
 mov word ptr es:[di],ax
dtl1:
 inc di
 inc di
 dec bl
 jnz dtl2

 ret
DrawTextLine endp

DrawTextForm proc near
 public DrawTextForm
 mov ax,223+15*256
 push bx
 call DrawTextHorizontalBar
 pop bx
 mov al,bh
 xor ah,ah
 add ax,ax
 DIVIDE_BY_8 ax
 mov bh,al
 dec bh
dtxf2:
 add dx,8
 cmp bh,0
 jle dtxf1
 push bx
 mov ax,' '+15*256
 call DrawTextHorizontalBar
 pop bx
 dec bh
 jmp dtxf2
dtxf1
 mov ax,220+15*256
 call DrawTextHorizontalBar
 ret
DrawTextForm endp

DrawTextHorizontalBar proc near
 push ax
 push dx
 push cx
 push bx
 call PointScreenDest
 pop bx
 pop cx
 pop dx
 pop ax

if need_osk ne 0
 call CheckIfCovered
 jc dtf1
endif
 push ax
 mov al,222
 mov es:[di],ax
 pop ax
dtf1:
 inc di
 inc di

 push bx
dtf3:
if need_osk ne 0
 call CheckIfCovered
 jc dtf2
endif
 mov es:[di],ax
dtf2:

 inc di
 inc di
 dec bl
 jnz dtf3
if need_osk ne 0
 call CheckIfCovered
 jc dtf4

endif
 mov al,221
 mov es:[di],ax
dtf4:
 pop bx
 ret
DrawTextHorizontalBar endp

DrawSunkenFrame proc near
 public DrawSunkenFrame
 public drawsunkenframe
 mov si,offset sunkenframetable
 call drawrectangle
 ret
drawsunkenframe endp

DrawTextBox proc near
 public DrawTextBox
 public drawtextbox
 push si
 mov si,offset textboxtable
 call drawrectangle
 pop si
 ret
drawtextbox endp


DrawSliderBox proc near
 public DrawSliderBox
 mov sliderboxmiddle,offset textboxmiddle
 push si
 mov si,offset sliderboxtable
 call drawrectangle
 pop si
 ret
DrawSliderBox endp

DrawSpectrumBox proc near
 public DrawSpectrumBox
 mov sliderboxmiddle,offset nomiddle
 push si
 mov si,offset sliderboxtable
 call drawrectangle
 pop si
 ret
DrawSpectrumBox endp

DrawLinebox proc near
 public DrawLineBox
public drawlinebox
 mov si,offset lineboxtable
 call drawrectangle
 ret
drawlinebox endp
end
```

Copr. 1995 Zenith Data Systems Corp.

```
.model small
.code
extrn BlockVideo:near
extrn CancelOSKPenDown:near
extrn CheckHotKeyEdit:near
extrn CheckPenDownCoordinates:near
extrn DeinstallInt09:far
extrn DoCloseOSK:near
extrn DoHideOSK:near
extrn DoListSlide:near
extrn DoMessageBoxClick:near
extrn DoSlideBarPenDown:near
extrn DoSpinDown:near
extrn DoSpinUp:near
extrn DoVSBDnArrow:near
extrn DoVSBDnArrow:near
extrn DoVSBUpArrow:near
extrn DrawSolidXorBox:near
extrn FindRegionForControl:near
extrn GetTabControlType:near
extrn GetTypeAndState:near
extrn GoNextControl:near
extrn GoNextControl:near
extrn GoPreviousControl:near
extrn GoPreviousControl:near
extrn HandleDelayedSel:near
extrn HandleOSKAlreadyDown:near
extrn HandleOSKKeyPenDown:near
extrn HandleOSKKeyPenUp:near
extrn HideForm:near
```

```
extrn HidePen:near
extrn ignorePen:near
extrn IsItButton:near
extrn IsItCheckBox:near
extrn IsItEditBox:near
extrn IsItListBox:near
extrn IsItSlideBar:near
extrn ListItemClick:near
extrn ListItemClick:near
extrn ListItemClick:near
extrn Repaint:near
extrn RepaintIndividualControl:near
extrn RepaintUnderOSK:near
extrn RestorePenRegion:near
extrn RestoreRegion:near
extrn ResumeCursor:near
extrn ResumePen:near
extrn SaveFormHeight:near
extrn SearchActiveRegions:near
extrn SetNewTabItemWork:near
extrn SetPenColumnRegion:near
extrn SetPenRowRegion:near
extrn SetHandCursor:near


extrn SetTypaMatic:near
extrn ShowOSK:near
extrn ShowOSKForClick:near
extrn ShowPen:near
extrn ShowTabBox:near
extrn UnlockVideo:near
extrn UndoCurrentTabItem:near
extrn UnprotectOSK:near
extrn UpdateDimensions:near
extrn UpdateDimensionsWork:near


include wincludi.inc


DATASEG_BEGIN
extrn bEnlargeFlag:byte


extrn ControlDataStorageArea:byte
extrn OSK:tControl
extrn VSBBacking:tControl
extrn VSBDnArrow:tControl
extrn VSBSlider:tControl
extrn VSBUpArrow:tControl
extrn bAutoScrollMode:byte
extrn bAutoScrollMode:byte
extrn bAutoScrollMode:byte
extrn bDontShowOSK:byte
extrn bDrawStringPWFlag:byte
extrn bGetDataFromLocalStorage:byte
extrn bIgnoringMove:byte
extrn bIgnoringPen:byte
extrn bLeavePenOn:byte
extrn bMoveMode:byte
extrn bMoveMode:byte
extrn bPenEventHappened:byte
extrn bPenEventType:byte
extrn bPopUpRequired:byte
extrn bRepaintNeeded:byte
extrn bScreenMode:byte
extrn bShadowColor:byte
extrn bSuppressHideShow:byte
extrn bTypamaticState:byte
extrn frmMessageBox:tCONTROL
extrn frmMessageBox_end:tCONTROL
extrn pClickRegion:word
extrn pCurrentToolBarButton:word
extrn pDelayedSetControl:word
extrn pNextActiveRegion:word
extrn pOSKFirstRegion:word
extrn pPenDownActiveRegion:word
extrn pPenDownLegendRegion:word
extrn pPenDownListItem:word
extrn pPenDownListItem:word
extrn pPenDownListItem:word
extrn pPenDownListRegion:word
extrn pPenDownListRegion:word
extrn pPenDownListRegion:word
extrn pPenUpListRegion:word
extrn pPenUpListRegion:word
extrn pPenUpListRegion:word
extrn pTabRegion:word
extrn rActiveRegions:tRegion
extrn rCursorRegion:tREGION
extrn rMoveStartRegion:tRegion
extrn rMoveStartRegion:tRegion
extrn rREGION:tREGION
extrn vsbBacking:tControl
extrn vsbSlider:tControl
extrn vsbUparrow:tControl
extrn wAutoScrollTimer:word
extrn wAutoScrollTimer:word
extrn wCurrentResource:word
extrn wHotKeyRightPixel:word
extrn wListSlideRow:word
extrn wListSlideRow:word
extrn wListSlideRow:word
extrn wMoveModePenColumn:word
extrn wMoveModePenRow:word
extrn wOSKTitleBarBottomRow:word
extrn wPenCurrentColumn:word
extrn wPenCurrentRow:word
extrn wPenDownColumn:word
extrn wPenDownRow:word
extrn wPenUpColumn:word
extrn wPenUpRow:word


wHotKeyRightPixelSave dw 0


wPenColumnMin dw 0
wPenColumnMax dw 0
wPenRowMin dw 0
wPenRowMax dw 0

bAwaitingMoveCompletion db 0
  public bAwaitingMoveCompletion
bMoveModeBusy db 0
bBoxShowing db 0
rBoxRegion label tRegion

DATASEG_END

.code
DoToolBarButtonDown  proc near
  call HandleDelayedSet
  mov si,pCurrentToolBarButton
  and [si].ControlState,not(ISDOWN)
  call SaveFormHeight
  mov pPenDownActiveRegion,0
  mov bRepaintNeeded, PAINTALL AND (NOT
PAINTTOOLBARS)
  mov bPopupRequired,-1
  ret
DoToolBarButtonDown  endp


CancelPenDown proc near
  public CancelPenDown

  mov si,pPenDownActiveRegion
  or si,si
  jz cpd1
  mov wPenUpRow,-1
  mov wPenUpColumn,-1
  call dopenupevent
cpd1:
  ret
CancelPenDown endp


DoButtonPenDown proc near

  cmp si,offset vsbBacking
  jz dpe7c
  cmp si,offset vsbSlider
  jz dpe7c
  or ah,ISDOWN
  mov [si].ControlState ah
  call RepaintIndividualControl
dpe7c

  cmp si,offset vsbUpArrow
  jnz dpe7d
  call UndoCurrentTabItem
  mov pTabRegion,0
  call SetTypaMatic
  mov di,pPenDownActiveRegion
  call DoVSBUpArrow
  jmp dpe7x
dpe7d:

  cmp si,offset vsbDnArrow
  jnz dpe7e
  call UndoCurrentTabItem
  mov pTabRegion,0
  call SetTypaMatic
  mov di,pPenDownActiveRegion
  call DoVSBDnArrow
  jmp dpe7x
dpe7e:

  cmp al,SPINUPBUTTON
  jnz dpe7a
  call SetTypaMatic
  call DoSpinUp
  jmp dpe7x
dpe7a:
  cmp al,SPINDOWNBUTTON
  jnz dpe7b
  call SetTypaMatic
  call DoSpinDown
  jmp dpe7x
dpe7b:

if need_osk ne 0
  call HandleOSKKeyPenDown
endif
dpe7x:
  ret
DoButtonPenDown endp


DoClickEvent proc near
  public DoClickEvent

  mov si,pClickRegion
  call PrepareClickRegisters

  call IsItEditBox
  jnz dce3
  push ax
  call ShowTabBox
  pop ax
if need_osk ne 0

  call ShowOSKForClick
endif
  ret
dce3:


  call IsItButton
  jnz dce4
  push si
  push di
  call ShowTabBox
  pop di
  pop si
  cmp si,offset frmMessageBox
  jb dce1a
  cmp si,offset frmMessageBox_end
  ja dce1a

  call DoMessageBoxClick
  ret

dce1a:
  cmp si,offset vsbBacking
  jz DoVsbBacking
  cmp si,offset vsbSlider
  jnz dce1b

DoVsbSlider:
  sub di,type rRegion * 3
DoVsbBacking:
  push wPenUpRow
  pop wListSlideRow
  call DoListSlide
  ret

dce1b:
  call HandleButtonClicks
  ret
dce4:

  call IsItCheckbox
  jnz dce2
dce4b:
  cmp al,OPTIONBUTTON
  jnz dce4f
  call UnsetAllOptionButtons
dce4f:
  mov bx,[si].pStorageOffset
  not byte ptr [bx]
  and byte ptr [bx],1

  push ax
  cmp al,CHECKBOX
  jz dce4h
  mov ax,[si].ID
  mov bl,ah
  xor ah,ah
  jmp dce4i
dce4h:

  mov ax,[si].ID
  mov bl,[bx]

dce4i:
  xor bh,bh
  SM_FUNCTION ax
  pop ax

  call RepaintIndividualControl
  call ShowTabBox
  call HandleButtonClicks
  ret

dce2:
  call IsItListBox
  jnz dce5
  call ListItemClick
  jnc dec2a
if need_osk ne 0
  call DoHideOSK
endif
  call HandleButtonClicks
dec2a
  ret
dce5:

  ret
DoClickEvent endp


DoMoveQuit proc near

if need_osk ne 0
  test wCurrentResource,1111110000b
  jnz lx0
  mov bAwaitingMoveCompletion,-1
lx0:
  mov bLeavePenOn,0
  call ignorePen

  mov dx,wPenUpRow
  cmp dx,wPenRowMin
  ja lx1
  mov dx,wPenRowMin
  mov wPenUpRow,dx
lx1:
  cmp dx,wPenRowMax
  jb lx2
  mov dx,wPenRowMax
  mov wPenUpRow,dx
lx2:
  mov cx,wPenUpColumn
  cmp cx,wPenColumnMin
  ja ex1
  mov cx,wPenColumnMin
  mov wPenUpColumn,cx
ex1
  cmp cx,wPenColumnMax
  jb ex2
  mov cx,wPenColumnMax
  mov wPenUpColumn,cx
ex2:
  call ShowMovedFormDestination

  call HideBox
  mov si,pPenDownActiveRegion

  test wCurrentResource,not(111b)
  jnz eeff1

  cmp [si].wCurrentLeft,0
  jge ndl
  mov [si].wCurrentLeft,0
ndl:

  cmp bScreenMode,12h
  jnz eeqq1
  mov ax,[si].wCurrentTop
  round_to_byte_boundary ax
  add ax,[si].wCurrentHeight
  dec ax
  dec ax
  mov [si].wCurrentBottom,ax

  mov ax,[si].wCurrentLeft
  round_to_byte_boundary ax
  add ax,[si].wCurrentWidth
  dec ax
  mov [si].wCurrentRight,ax

eeqq1:

  call passOSKDimensions
  mov di,offset rMoveStartRegion
  call HideForm
  jmp dou3


eeff1:
  mov di,offset rMoveStartRegion
  call HideForm
  call RepaintUnderOSK
  mov si,pPenDownActiveRegion

  mov ax,[di].wCurrentTop
  sub ax,[si].wCurrentTop
  sub [bx].TopPixel,ax
  mov ax,[di].wCurrentLeft
  sub ax,[si].wCurrentLeft
  ROUND_TO_BYTE_BOUNDARY ax
```

```
 mov cx,[bx].LeftPixel
 test ch,100b
 jz hpu1
 or ch,11111000b
hpu1
 sub cx,ax

 cmp cx,0
 jge fos1
 mov cx,0
fos1:

 ROUND_TO_BYTE_BOUNDARY cx
 mov [bx].LeftPixel,cx

 cmp bx,offset osk
 jnz dpu3
 or [bx].ControlState,INVISIBLE


 call ShowOSK
 mov bLeavePenOn,-1


 push wHotKeyRightPixelSave
 pop wHotKeyRightPixel

 mov si,pTabRegion
 push rCursorRegion.wCurrentLeft
 pop  wPenDownColumn
 call SetNewTabItemWork

dpu3
 mov pPenDownActiveRegion,0
 mov bMoveMode,0
 call RestorePenRegion
 call ResumePen
endif
 mov cx,wPenCurrentColumn
 mov dx,wPenCurrentRow
 call SetHandCursor

 ret
DoMoveQuit endp

PassOSKDimensions proc near
public passOSKDimensions

 mov bx,[si].wCurrentTop
 ROUND_TO_BYTE_BOUNDARY bx
 mov cx,[si].wCurrentLeft
 ROUND_TO_BYTE_BOUNDARY cx
 mov di,[si].wCurrentRight
 mov si,[si].wCurrentBottom
       cmp bScreenMode,12h
       jnz pod1
       test wCurrentResource,4
       jnz pod1
       inc si
pod1:
 call UpdateDimensionsWork
 ret
PassOSKDimensions endp

DoPenDownEvent proc near

 call CancelPendown

if need_osk ne 0

 mov bDontShowOSK,0

endif

 call CheckPenDownCoordinates
 or si,si
 jnz dpe5a
 jmp dpdExit
dpe5a:

 cmp [si].wCurrentHeight,-1
 jnz dpe1a
 cmp [si].wListHandle,0
 jz dpe1b

dpe21:
 mov pPenDownListRegion,si
 cmp [si].wListItemIndex,0
 jnz dpe21a
 jmp dpdignore
dpe21a
 mov pClickRegion,si
 mov pPenDownListItem,si
 jmp dpdExit

dpe1b
 mov pPenDownLegendRegion,si
 sub si,type rActiveRegions
 mov pPenDownActiveRegion,si
```

```
dpe1a:
 call GetTypeAndState

 cmp al,FORM
 jr. dpe1e
 test ah,MOVEABLE
 jnz dpe8e1
 jmp dpdignore
dpe8e1:

 push ax
 mov ax,[si].TopPixel
 add ax,16
 cmp dx,ax
 pop ax
 jbe dpe8a2
 cmp dx,wOSKTitleBarBottomRow
 jbe dpe8e2
 jmp dpdignore
dpe8e2:
 call PrepareToMoveForm
 jmp dpdExit

dpe1e:
 call IsItButton
 jnz dpe8
 test ah,GRAYED
 jz dpe1g
 jmp dpdignore
dpe1g:
 mov bDrawStringPWFlag,0
 test ah,ISDOWN
 jz dpe8a1

dpe8a:
if need_osk ne 0
 push ax
 call HandleOSKAlreadyDown
 pop ax
 jnc dpe8a2
 jmp dpdexit
endif
dpe8a2:
 jr. dpdignore

dpe8a1
 mov bx,pPenDownActiveRegion
 cmp bx,pTabRegion
 jnz dpe11
dpe1d:
 mov pTabRegion,0
dpe11:
 push si
 push ax
 call DoButtonPenDown
 pop ax
 pop si

 cmp al,TOOLBARBUTTON
 jnz dce1
 cmp si,pCurrentToolBarButton
 jz dce1
 call ForceDelayedSet
 call DoToolBarButtonClick
 call DoToolBarButtonDown
dce1:
 jmp dpdExit
dpe8.

 call IsItSlideBar
 jnz dpd2
 mov cx,wPenDownColumn
 call DoSlideBarPenDown
 jmp dpdExit
dpd2:

 call IsItCheckBox
 jnz dpd3
 call DoButtonPenDown
 jmp dpdExit

dpd3:
 c-- DoCustomControlPenDown
 jmp dpdExit

dpdignore
 mov pPenDownActiveRegion,0
dpdExit:
 ret
DoPenDownEvent endp

ForceDelayedSel proc near

 push pTabRegion
 mov pTabRegion,0
 call HandleDelayedSet
 pop pTabRegion
 ret
ForceDelayedSel endp
```

```
DoPenEvent proc near
 public DoPenEvent
dpe1.
 xor al,al
 xchg al,bPenEventType
 mov bPenEventHappened,0

 cmp bIgnoringPen,0
 jz dpe0
 jmp dpe99
dpe0:

 test al,PENUP
 jz  dpe2
 call DoPenUpEvent
 jmp dpe4

dpe2:
 test al,PENDOWN
 jz  dpe3
 cmp bMoveMode,0
 jz dpe3z
 and al,not(PENDOWN)
 jmp dpe3
dpe3z:
 call DoPenDownEvent
 jmp dpe4

dpe3.
 test al,PENMOVED
 jz dpe4
 cmp bIgnoringMove,0
 jnz dpe99
dpe3y:
 cmp bMoveModeBusy,0
 jnz dpemmb
 mov bMoveModeBusy,-1


 call DoPenMoveEvent

 mov bMoveModeBusy,0
 and bPenEventType,not PENMOVED
dpemmb:


 jmp dpe4

dpe4
 cmp bPenEventHappened,0
 jz dpe99
 jmp dpe1

dpe99
 ret
DoPenEvent endp


DoPenMoveEvent proc near

 mov dx,wPenCurrentRow
 mov cx,wPenCurrentColumn

 cmp bMoveMode,-1
 jnz dpe25

 call ShowMovedFormDestination
 jmp dpmExit

dpe25:
 cmp pPenDownListRegion,0
 jz dpe20
 mov bAutoScrollMode,0
 call SearchActiveRegions
 mov si,pPenDownListRegion
 cmp di,si
 jnz dpe25a
 jmp dpmExit
dpe25a.
 or di,di
 jz dpe22
 mov ax,[si].wListHandle
 cmp ax,[di].wListHandle
 jnz dpe22
 mov si,di
 mov pPenDownActiveRegion,si
 mov pPenDownLegendRegion,0
 jmp dpe21

dpe22:
 mov si,pPenDownListRegion
 cmp dx,[si].wCurrentTop
 jb dpe23
 cmp dx,[si].wCurrentBottom
 ja dpe24
 jmp dpmExit

dpe23:
```

```
 mov wAutoScrollTimer,0
 mov bAutoScrollMode -1
 jmp dpmExit

dpe24
 mov wAutoScrollTimer,0
 mov bAutoScrollMode,1
 jmp dpmExit

dpe20:
 mov si,pPenDownActiveRegion
 or si,si
 jz dpmExit
 call GetTypeAndState

 call IsItSlideBar
 jnz dpe26
 call DoSlideBarPenDown
 jmp dpdExit
dpe26:

 cmp si,offset vsbSlider
 jnz dpe27
 mov wListSlideRow,dx
 call UndoCurrentTabItem
 mov di,pPenDownActiveRegion
 mov pTabRegion,di
 sub di,type rRegion * 3
 call DoListSlide
 jmp dpmExit
dpe27.
dpmExit:

 ret
DoPenMoveEvent endp


DoPenUpEvent proc near
 public DoPenUpEvent

 mov bTypamaticState,0
 push pPenDownListItem
 pop pPenUpListRegion
 mov pPenDownListRegion,0
 mov pPenDownListItem,0
 mov bAutoScrollMode,0

if need_osk ne 0
  cmp bMoveMode,-1
  jnz dpu1
  call DoMoveQuit
  call unblackvideo

  jmp dpuExit
dpu1:
endif

  mov si,pPenDownActiveRegion
  or si,si
  jnz dpe8c
  jmp dpuExit
dpe8c

  mov di,si
  mov si,[si].pCurrentControl
  mov ax,[si]

  cmp al,CLOSEBUTTON
  jnz dpu4
  push pTabRegion
  mov pTabRegion,0
  call HandleDelayedSet
  pop pTabRegion
 if need_osk ne 0
  cmp di,pOSKFirstRegion
  jb dpu4a
  call DoCloseOSK
  jmp dpuExit
 dpu4a:
 endif

   call TryUnload
   call UndoButtonDown
   jmp dpuExit
 dpu4:


 if need_osk ne 0
   call HandleOSKKeyPenUp
   jc dpuExit
 endif

   cmp si,offset vsbBacking
   jz dpe10
   cmp si,offset vsbSlider
   jz dpe10
   cmp al,TOOLBARBUTTON
   jz dpe10
   call UndoButtonDown
```

```
dpe10

 mov dx,wPenUpRow
 mov cx,wPenUpColumn
 mov si,pPenDownLegendRegion
 or si,si
 jz dpe11
 cmp dx,[si].wCurrentTop
 jb dpe11
 cmp dx,[si].wCurrentBottom
 ja dpe11
 cmp cx,[si].wCurrentLeft
 jb dpe11
 cmp cx,[si].wCurrentRight
 ja dpe11
 jmp dpe12

dpe11:
 mov si,pPenDownActiveRegion
 cmp dx,[si].wCurrentTop
 jb dpe9
 cmp dx,[si].wCurrentBottom
 ja dpe9
 cmp cx,[si].wCurrentLeft
 jb dpe9
 cmp cx,[si].wCurrentRight
 ja dpe9

dpe12
 push pPenDownActiveRegion
 pop pClickRegion
 jmp dpuExit

dpe9
 cmp al,TOOLBARBUTTON
 jnz dpe9b
 mov si,pPenDownActiveRegion
 mov si,[si].pCurrentControl
 cmp si,pCurrentToolBarButton
 jz dpe9b
 call UndoButtonDown
dpe9b

dpuExit
 mov pPenDownActiveRegion,0
 ret
DoPenUpEvent endp


DoSpacebar proc near
 public DoSpaceBar

 call GetTabControlType
 jnz dsb0c
 ret
dsb0c

 call IsItButton
 jnz dsb1

 cmp al,TOOLBARBUTTON
 jnz dsb0d
 test ah,ISDOWN
 jz dsb0a
 ret
dsb0a

 test ah,SKIPTAB
 jz dsb0b
 ret
dsb0b

 if need_osk ne 0
 call CancelOSKPenDown
 endif

 or [bx].ControlState,ISDOWN
 cmp [bx].ControlType,ToolbarButton
 jz dsb0

 mov pPenDownActiveRegion,si
 push si
 call RepaintIndividualControl
 pop si
 mov pPenDownActiveRegion,0
 jmp dsb0d
dsb0
 call DoToolBarButtonDown
 ret
dsb0d
 mov pClickRegion,si
 ret

dsb1:
 call IsItCheckBox
 jnz dsb2
 if need_osk ne 0
 call CancelOSKPenDown
endif
 mov pClickRegion,si
 ret
dsb2
 ret
DoSpacebar endp


PrepareClickRegisters proc near
 public PrepareClickRegisters
 mov pPenDownActiveRegion,si
 mov di,si
 mov si,[si].pCurrentControl
 mov ax,[si]
 ret
PrepareClickRegisters endp

PrepareToMoveForm proc near

 push wHotKeyRightPixel
 pop wHotKeyRightPixelSave
 if need_osk ne 0
 pam1:
 mov bMoveMode,-1
 mov bLeavePenOn,0
 call UndoCurrentTabItem
 push si
 mov si,pPenDownActiveRegion
 push si
 push ds
 pop es
 mov di,offset rMoveStartRegion
 mov cx,type rMoveStartRegion
 rep movsb
 pop si
 mov dx,wPenDownRow
 sub dx,[si].wCurrentTop
 mov wMoveModePenRow,dx

 mov cx,wPenDownColumn
 sub cx,[si].wCurrentLeft
 mov wMoveModePenColumn,cx
 push si
 call UnprotectOSK
 call blockvideo
 pop si
 call ShowBox
 mov cx,0
 add cx,wPenDownColumn
 sub cx,[si].wCurrentLeft

 mov dx,639-16
 mov wPenColumnMax,dx
 mov wPenColumnMin,cx
 cmp wPenDownColumn,dx
 jae eeex
 call SetPenColumnRegion
eeex:
 mov cx,wMoveModePenRow
 call getmaxvalidscreenrow
 mov wPenRowMin,cx
 mov wPenRowMax,dx
 cmp wPenDownRow,dx
 jae ptxx1
 call SetPenRowRegion
ptxx1
 pop si
endif
 ret
PrepareToMoveForm endp


GetMaxValidScreenRow proc near
 public GetMaxValidScreenRow


 mov dx,479-16
 cmp bScreenMode,VGA_MODE
 jz ptmf1z

 push bx
 push es
 xor bx,bx
 mov es,bx
 mov bx,0484h
 mov bl,byte ptr es:[bx]
 xor bh,bh
 shl bx,1
 shl bx,1
 shl bx,1
 mov dx,bx
 sub dx,16
 pop es
 pop bx
ptmf1z:
 ret
GetMaxValidScreenRow endp

ShowMovedFormDestination proc near
 mov si,pPenDownActiveRegion
 mov bx,[si].pCurrentControl
 sub dx,wMoveModePenRow
 mov [si].wCurrentTop,dx
 add dx,[si].wCurrentHeight
 dec dx
 mov [si].wCurrentBottom,dx
 sub cx,wMoveModePenColumn
 mov [si].wCurrentLeft,cx
 add cx,[si].wCurrentWidth
 dec cx
 mov [si].wCurrentRight,cx
 call ShowBox
 ret
ShowMovedFormDestination endp


UndoAllOptionButtons proc near

 push si
 mov si,pPenDownActiveRegion
 mov si,[si].pCurrentControl
 mov rRegion.pCurrentControl,si

uaob2:
 call GoPreviousControl
 jc uaob1a
 cmp [si].ControlType,LAST_ENDOFOBJECT
 ja uaob2
uaob1:
 call GoNextControl
 jmp uaob1b
uaob1a
 clc
uaob1b
 jc uaob3
 mov al,[si].Controltype
 cmp al,LAST_ENDOFOBJECT
 jbe uaob3
 cmp [si].ControlType,OPTIONBUTTON
 jnz uaob1

 mov bx,[si].pStorageOffset
 mov byte ptr [bx],0
 call FindRegionForControl
 jc uaob1

 push pPenDownActiveRegion
 mov pPenDownActiveRegion,bx
 mov si,[bx].pCurrentControl
 mov ax,[si]
 mov bGetDataFromLocalStorage,-1
 call RepaintIndividualControl
 mov bGetDataFromLocalStorage,0
 pop pPenDownActiveRegion
 jmp uaob1

uaob3
 mov si,pPenDownActiveRegion
 call RestoreRegion
 pop si
 ret
UndoAllOptionButtons endp


UndoButtonDown proc near
 public UndoButtonDown
 test ah,ISDOWN
 jz dpe10a
 and ah,not(ISDOWN)
 mov [si].ControlState,ah
 call RepaintIndividualControl
dpe10a:
 ret
UndoButtonDown endp

ShowBox proc near
 push si
 cmp bBoxShowing,0
 jz shb1
 push si
 call HideBox
 pop si
shb1:
 push ds
 pop es
 mov di,offset rBoxRegion
 mov cx,size rBoxRegion
 cld
 rep movsb
 mov bBoxShowing,-1
 mov si,offset rBoxRegion
 call DrawSolidXORBox
 pop si
 ret
ShowBox endp
HideBox proc near
 cmp bBoxShowing,0
 jz hb1
 mov si,offset rBoxRegion
 call DrawSolidXORBox
 mov bBoxShowing,0
hb1:
 ret
HideBox endp


end
```

Copr. 1995 Zenith Data Systems Corp.

```
.MODEL SMALL
.code
extrn getvgastate:near
extrn blockvideo:near
extrn unblockvideo:near
extrn FillScreenArea:near
extrn AddControlToActiveList:near
extrn AddLegendToActiveList:near
extrn AdjustBoxDimensions:near
extrn AdjustButtonDimensions:near
extrn AdjustFormHeight:near
extrn DrawLColor:near
extrn DrawButtonCaption:near
extrn DrawCheckBox:near
extrn DrawOnButton:near
extrn DrawEditBoxCaption:near
extrn DrawLabel:near
extrn DrawLineBox:near
extrn DrawNotches:near
extrn DrawOSKLegend:near
extrn DrawSliderBox:near
extrn DrawSpectrum:near
extrn DrawSpectrumBox:near
extrn DrawString:near
extrn DrawSunkenFrame:near
extrn DrawTextBox:near
extrn DrawTextForm:near
extrn DrawTextLine:near
extrn DrawUpButton:near
extrn GetCaptionHeight:near
extrn GetControlRegion:near
extrn GetNumericControl:near
extrn GetTextControl:near
extrn IsItButton:near
extrn IsItCheckBox:near
extrn IsItEditBox:near
extrn IsItLegend:near
extrn IsItListBox:near
extrn IsItSlideBar:near
extrn PaintGraphicCaption:near
extrn PaintControlCaption:near
extrn PaintControlMiscItem:near
extrn PositionGraphicCaption:near
extrn Repaint:near
extrn RepaintListBox:near
extrn RestoreRegion:near
extrn SetColorsForControl:near
extrn SetFontForCaption:near
extrn SetProtectionForControl:near
extrn StartNewObjectLevel:near
extrn StartToolButtonObjectLevel:near
extrn UpdateLegendRegion:near
extrn UseGrayedColors:near
extrn UseNormalColors:near
extrn RestVGAState:near


include uiinclud.inc
DATASEG_BEGIN
wOSKTitleBarBottomRow dw 0
 public wOSKTitleBarBottomRow
extrn ControlDataStorageArea:byte
extrn rLegendRegion:REGION
extrn CheckedBox:byte
extrn DrawStringTextModeColor:byte
extrn OSK:tControl
extrn SelOptButton:byte
extrn SliderButton:byte
extrn UnCheckedBox:byte
extrn UnSelOptButton:byte
extrn bCaptionBackgroundColor:byte
extrn bCaptionForegroundColor:byte
extrn bCaptionForegroundColor:byte
extrn bDeskTopColor:byte
extrn bDoingSpin:byte
extrn bDrawStringFWFlag:byte
extrn bDummyBlank:byte
extrn bEditBoxFGColor:byte
extrn bEnlargeFlag:byte
```

```
extrn bFormColor:byte
extrn bGetDataFromLocalStorage:byte
extrn bModalFlag:byte
extrn bPreviewMode:byte
extrn bPreviewMode:byte
extrn bRepaintMode:byte
extrn bRepaintNeeded:byte
extrn bScreenMode:byte
extrn bTitleForegroundColor:byte
extrn bUnderlinedCharacter:byte
extrn iIgnoreLevel:word
extrn iLeftAdders:word
extrn iTopAdders:word
extrn pCurrentFont:word
extrn pCurrentToolBarButton:word
extrn pCurrentToolButtonRegion:word
extrn pCurrentToolButtonRegion:word
extrn pEditBoxFont:word
extrn pNextActiveRegion:word
extrn pNormFont:word
extrn pPenDownActiveRegion:word
extrn pPenUpListRegion:word
extrn pPenUpListRegion:word
extrn pPenUpListRegion:word
extrn rActiveRegions:tRegion
extrn rREGION:tREGION
extrn wCurrentFormBottom:word
extrn wCurrentFormHeight:word
extrn wCurrentFormLeft:word
extrn wCurrentFormRight:word
extrn wCurrentResource:word
extrn wCurrentResource:word
extrn wGraphicLegendRight:word
extrn wGraphicLegendRight:word
extrn wGraphicLegendRight:word
extrn wNextTop:word
extrn wPreviousFormHeight:word
extrn wToolBarHeight:word
extrn wToolBarHeight:word
extrn pDelayedSetControl:word
extrn oskseconarow:tcontrol
DATASEG_END


.code

RepaintControl proc near
  public RepaintControl
  test ah,INVISIBLE
  jz rc1

  cmp al,TOOLBARBUTTON
  jnz rc1C
  inc iIgnoreLevel
rc1D
  ret

rc1
  call SetColorsForControl

  call GetControlRegion

  cmp bPreviewMode,0
  jz rc1a
  cmp al,TOOLBARBUTTON
  jnz rc0a
  call StartToolButtonObjectLevel
  mov pCurrentToolBarButton,si
 rc0a:
  call AdjustFormHeight
  ret


 rc1a:
  cmp al,FIRSTBUTTONTYPE
  jb rc2
  cmp al,LASTBUTTONTYPE
  ja rc2

  push ax
  push si
  call RepaintButton
  pop si
  pop ax


 rc1b
  cmp al,TOOLBARBUTTON
  jnz rc9
  test ah,ISDOWN
  jnz rc9a
  inc iIgnoreLevel
  jmp rc9
 rc9a
  mov pCurrentToolBarButton,si
  call DoToolBarButtonClick
  call StartToolButtonObjectLevel
  push pNextActiveRegion
  pop pCurrentToolButtonRegion

rc9

  call AddControlToActiveList
  cmp al,FIRSTFOCUSABLEBUTTONTYPE
  jb rc9b
  cmp al,LASTFOCUSABLEBUTTONTYPE
  ja rc9b
  call AddLegendToActiveList
rc9b
  ret

rc2:
  call IsItCheckBox
  jnz rc4
  call RepaintCheckBox
  call AddControlToActiveList
  call AddLegendToActiveList
  ret

rc4:
  call IsItEditBox
  jnz rc5
  call RepaintEditBox
  call AddControlToActiveList
  ret

rc5:
  c  IsItListBox
  jnz rc6
  push si
  call RepaintListBox
  pop ax
  mov si,pPenUpListRegion
  push rRegion.pCurrentControl
  call DoAfterRepaintingList
  pop  rRegion.pCurrentControl
  ret

rc6.
  call IsItLegend
  jnz rc7
  call RepaintLegend
  ret

rc7
  cmp al,PROGRESSBAR
  jnz rc7a
  call repaintspectrumbar
  call addcontroltoactivelist
  ret
rc7a:
  call IsItSlidebar
  jnz rc8
  call RepaintSpectrumBar
  call AddControlToActiveList
  call AddLegendToActiveList
  ret

rc8.
  cmp al,LINEBOX
  jnz rc12
  call RepaintLineBox
  ret

rc12
  cmp al,CHISELBOX
  jnz rc14
  call RepaintChiselBox
  ret

rc14:

  cmp al,ICON
  jnz rc15
  call RepaintIcon
  call AddControlToActiveList

  ret

rc15.
  cmp al,SUNKENFRAME
  jnz rc16
  call RepaintSunkenFrame
  ret

rc16:
  ret
RepaintControl endp

RepaintIndividualControl proc near
  public RepaintIndividualControl

  push ax
  push si
  call SetProtectionForControl
  call blockvideo
  call getvgastate
  push ax
  mov ax,REMOVE_PEN_CURSOR

  int pen_function
  pop ax

  mov si,pPenDownActiveRegion
  call RestoreRegion
  call SetColorsForControl

  cmp al,ICON
  jnz ric1
  call repainticon
  jmp sr9
ric1:

  cmp al,CHECKBOX
  jz sr1
  cmp al,OPTIONBUTTON
  jz sr1
  jmp sr2
sr1.
  call RepaintCheckBox
  jmp sr9
sr2

  call IsItButton
  jnz sr3

if need_osk ne 0
  cmp si,offset OSK
  jb sr2a
  test OSK.ID,4
  jz sr2a
  mov bEnlargeFlag,-1
sr2a.
endif

  call RepaintButton
if need_osk ne 0
  mov bEnlargeFlag,0
endif
  jmp sr9
sr3:

  cmp al,SLIDEBAR
  jz sr3a
  cmp al,SPECTRUMBAR
  jz sr3a
  jmp sr4
sr3a
  call RepaintSpectrumBar
sr4:


  cmp bDoingSpin,-1
  jnz sr4a
  call IsItEditBox
  jz sr4b
sr4a.
  cmp al,UNFRAMEDEDITBOX
  jz sr4b
  cmp al,KEYEDITBOX
  jnz sr6
sr4b:
  call RepaintEditBox
sr5
  jmp sr8

sr6
sr8
  call restvgastate
  push ax
  mov ax,DISPLAY_PEN_CURSOR
  INT PEN_FUNCTION
  pop ax
  call unblockvideo
  call UseNormalColors
  pop si
  pop ax
  ret
RepaintIndividualControl endp

RepaintGroupObject proc near
  public RepaintGroupObject
  test ah,INVISIBLE
  jz rgo1

  inc iIgnoreLevel
  ret

rgo1:

rgo0a:
  call GetControlRegion


rgo0:
  cmp al,TOOLBAR
  jnz rgo4
  push word ptr [si].PixelHeight
  pop wToolbarHeight

rgo4:
  call StartNewObjectLevel
  cmp bPreviewMode,0
  jz rgo4a
  call AdjustFormHeight
  ret

rgo4a
  mov ax,word ptr [si].controltype

  cmp al,TOOLBAR
  jnz rgo2
  call RepaintToolbar
  ret

rgo2.
  cmp al,FORM
  jnz rgo3
  push ax
  push si
  call RepaintForm
  pop si
  pop ax

  test ah,MOVEABLE
  jz rgo2a
  call AddControlToActiveList
 rgo2a.
  ret

 rgo3.
  cmp al,GROUPBOX
  jnz rgo5
  call RepaintGroupBox
  ret

 rgo5
  ret
 RepaintGroupObject endp

 RepaintButton proc near
  public RepaintButton
  call AdjustButtonDimensions
  test ah,ISDOWN
  jnz rb1

  mov
 DrawStringTextModeColor,TEXTMODE_KEY_UP_C
 OLOR
  push dx
  call DrawUpbutton
  pop dx
  xor al,al
  jmp short rb2

 rb1.
  mov
 DrawStringTextModeColor,TEXTMODE_KEY_DOW
 N_COLOR
  call DrawDnbutton
  mov al,2

 rb2:
  push word ptr bDrawStringPWFlag
  mov bDrawStringPWFlag,0
  call DrawButtonCaption
  pop word ptr bDrawStringPWFlag
 rb99.
  ret
 RepaintButton endp

 RepaintCheckBox proc near
  push ax
  test ah,ISDOWN
  jz rpcb3
  call UseGrayedColors
 rpcb3:
  push si
  cmp bGetDataFromLocalStorage,0
  jz rpcb3d
  mov bx,[si].pStorageOffset
  jmp rpcb3e

 rpcb3d
  push ax
  push cx
  mov cl,al
  mov ax,[si].ID
  mov ch,ah
  mov ah,80h
  SM_FUNCTION ax
  mov bx,[si].pStorageOffset
  jl rpcb3e

  cmp cl,OPTIONBUTTON
  jnz rpcb3b
  cmp al,ch
  jnz rpcb3c
  mov al,1
```

```
 jmp rpcb3b
rpcb3c
 xor al,al

rpcb3b
 mov [bx],al
rpcb3a
 pop cx
 pop ax

rpcb3e

 cmp byte ptr [bx],0
 jnz rpcb1

 mov si,offset UncheckedBox
 cmp al,CHECKBOX
 jz rpcb2
 mov si,offset UnselOptButton
 jmp rpcb2

rpcb1
 mov si,offset CheckedBox
 cmp al,CHECKBOX
 jz rpcb2
 mov si,offset SelOptButton

rpcb2
 call drawtcolor
 pop si

 call PointControlCaption
 jz rpcb99
 or cx,cx
 jz rpcb4

 mov bx,cx
 jmp dlc

rpcb4
 or bx,bx
 jz rpcb99

dlc:
 push si
 mov si,bx
 add si,3
 call SetFontForCaption
 call GetCaptionHeight
 mov dx,rRegion.wCurrentTop
 add ax,dx
 mov rLegendRegion.wCurrentBottom,ax
 mov cx,rRegion.wCurrentLeft
 add cx,20
 mov bl,bCaptionForegroundColor
 xor bh,bh

 sub cx,4
 call UpdateLegendRegion
 add cx,4
 add rLegendRegion.wCurrentRight,4
 call DrawLabel
 pop si

rpcb99:
 pop ax
 ret
RepaintCheckBox endp

RepaintChiselBox proc near
 dec rRegion.wCurrentHeight
 call AdjustBoxDimensions

 cmp si,offset osk
 jb rcb2
 push rRegion.wCurrentTop
 pop wOSKTitleBarBottomRow

rcb2

 cmp bScreenMode,VGA_MODE
 jz rcb1
 sub wOSKTitleBarBottomRow,8

 add wNextTop,7
 call DrawTextLine
 ret

rcb1:
 call DrawChiselBox
 ret
RepaintChiselBox endp

RepaintEditBox proc near
 push ax
 call AdjustButtonDimensions
 cmp al,UNFRAMEDEDITBOX
 jz reb99a
 call DrawTextBox
reb99a:
 call DrawEditBoxCaption

reb4:
 push si
 mov al,[si].ControlType
 cmp al,NUMEDITBOX
 jnz reb7

 call GetNumericControl
 jmp reb8

reb7:
 call GetCustomEditBoxContents
 jnc reb8a
 jmp reb5aa
reb8a:
 cmp pDelayedSetControl,0
 jnz reb8
 call GetTextControl
reb8:
 cmp al,PWEDITBOX
 jnz reb5
 mov bDrawstringPWFlag,-1
reb5
 mov si,[si].pStorageOffset
reb5aa:
 mov bl,bEditBoxFGColor
 xor bh,bh
 push pEditBoxFont
 pop pCurrentFont
 mov dx,rRegion.wCurrentTop
 cmp al,UNFRAMEDEDITBOX
 jz reb5a
 inc dx
 inc dx
 inc dx
 inc dx
reb5a:
 mov cx,rRegion.wCurrentLeft
 add cx,9
 call RepaintCustomEditBoxContents
 jc reb9

 cmp al,UNFRAMEDEDITBOX
 jnz reb6
 sub cx,5
 mov bh,bFormColor
 or bh,WITHBACKCOLOR
 mov ax,rRegion.wCurrentRight
 sub ax,cx
reb6
 push word ptr bUnderlinedCharacter
 call DrawString
 pop word ptr bUnderlinedCharacter
reb9:
 pop si
reb99:
 pop ax
 ret
RepaintEditBox endp

RepaintForm proc near
 call DoBeforeRepaintingForm
 call AdjustButtonDimensions

 push rRegion.wCurrentRight
 pop wCurrentFormRight
 push rRegion.wCurrentLeft
 pop wCurrentFormLeft

if need_osk ne 0
 cmp si,offset osk
 jz rf1
endif
 push word ptr [si].PixelHeight
 pop wCurrentFormHeight
 push rRegion.wCurrentBottom
 pop wCurrentFormBottom

rf1:
 test bRepaintMode,1
 jz rf99a
 jmp rf99
rf99a:

 cmp bScreenMode,VGA_MODE
 jz rf9
 push ax
 mov ax,rRegion.wCurrentHeight
 sub ax,8
 sar ax,1
 mov bh,al
 pop ax
 call DrawTextForm
 jmp rf10

rf9:
 call DrawUpbutton

rf10:
if need_osk ne 0
 cmp si,offset osk
 jnz rf100
 cmp bScreenMode,VGA_MODE
 jnz rf101
 mov bl,byte ptr OSK ID
 and bl,11b
 cmp bl,10b
 jz rf101
 call DrawOskLegend
rf101
 jmp rf99
endif

rf100:
 cmp bModalFlag,0
 ja rf100z
 or wCurrentResources,8000h
 mov
wPreviousFormHeight,SCREEN_HEIGHT_PIXELS
rf100z:

 mov ax,wPreviousFormHeight
 sub ax,wCurrentFormHeight
 jl rf99

 push si
 mov dx,rRegion.wCurrentBottom
 push word ptr bDeskTopColor
 test wCurrentResources,not(111b)
 jnz rf98
 mov bDeskTopColor,BLACK
rf98.
 CLEAR_RECTANGLE 0,dx,80,ax,bDeskTopColor
 pop word ptr bDeskTopColor
 pop si
rf99:
 ret
RepaintForm endp

RepaintGroupBox proc near
 call AdjustButtonDimensions
 push si
 call DrawChiselbox
 pop si

 call PointControlCaption
 jz rgb99
 or bx,bx
 jz rgb99
 call SetFontForCaption

 push si
 mov si,bx
 add si,3
 mov bl,bCaptionForegroundColor
 mov bh,bCaptionBackgroundColor
 or bh,16
 mov dx,rRegion.wCurrentTop
 sub dx,4
 mov cx,rRegion.wCurrentLeft
 add cx,8
 call DrawString
 pop si
rgb99:
 ret
RepaintGroupBox endp

RepaintIcon proc near

 push si
 mov si,[si].id
 or si,si
 jz ri1
 push ax
 call Draw4Color
 pop ax
ri1:
 pop si
 ret
RepaintIcon endp

RepaintLegend proc near

 call PointControlCaption
 jnz rl1a
 jmp rl1
rl1a:
 or bx,bx
 jnz rl3
 cmp bScreenMode,VGA_MODE
 jz rl1aa

 push si
 push ax
 mov ah,15+1
 call PointControlMiscItem
 pop ax
 pop si
 or bx,bx
 jnz rl3n
 jmp rl1
rl3n.
 push si
 push ax
 mov DrawStringTextModeColor,15
 mov si,bx
 mov dx,rRegion.wCurrentTop

 sub dx,8
 mov cx,rRegion.wCurrentLeft
 call DrawString
 pop ax
 pop si
 jmp rl1

rl1aa.
 mov bx,cx
 call SetFontForCaption
 xor cx,cx
 push cx
 jmp rl3a
rl3.
 push cx
 call SetFontForCaption
rl3a:
 add bx,3
 push si
 push bx
 mov bl,bCaptionForegroundColor
 mov al,[si].ControlType
 mov bh,32

 cmp al,LEFTLEGEND
 jz rl2
 shl bh,1
 cmp al,CENTEREDLEGEND
 jz rl2
 shl bh,1
rl2:
 test [si].ControlState,BACKFILL
 jz rl4
 or bh,bCaptionBackgroundColor
 or bh,16
rl4:
 mov ax,[si].PixelWidth
 pop si
 mov dx,rRegion.wCurrentTop
 mov cx,rRegion.wCurrentLeft
 call DrawString
 pop si
 pop cx

 jcxz rl1
rl5:

 push rRegion.wCurrentLeft
 pop wGraphicLegendRight
 mov bx,ax
 call PositionGraphicCaption
rl6:
 call PaintGraphicCaption
rl1:
 ret
RepaintLegend endp

RepaintLineBox proc near
 call AdjustBoxDimensions
 call drawlinebox
 ret
RepaintLineBox endp

RepaintSpectrumBar proc near

 call AdjustButtonDimensions
 cmp [si].controltype,progressbar
 jz rsb21
 cmp [si].ControlType,SLIDEBAR
 jz rsb21
 call DrawSpectrumBox
 call DrawSpectrum
```

```
 jmp rsb20
rsb21:
 call DrawSliderBox
rsb20

 call DrawEditBoxCaption
 call DrawNotches
 mov ax,[si].ID
 mov ah,080h
 SM_FUNCTION ax
 mov bx,[si].pStorageOffset
 jl rsb20a
 mov [bx],al
rsb20a
 mov al,[bx]
 cmp [si].controltype,progressbar
 jz rsb20b
 mov ah,byte ptr [si].id[1]
 dec ah
 cmp al,ah
 jbe rsb20b
 mov al,ah
rsb20b:

 cmp ah,8-1
 jz rsb20c
 mov ah,9
 jmp rsb20d
rsb20c
 mov ah,24
rsb20d
 mul ah
 mov cx,rRegion.wCurrentLeft
 ADD CX,ax
 mov dx,rRegion.wCurrentTop
 cmp [si].controltype PROGRESSBAR
 jz rsb99

 push pNormFont
 pop pCurrentFont
 mov si,offset bdummyblank
 mov ax,10
 mov bh,CENTERED
 add dx,3
 call UpdateLegendRegion
 sub dx,3
 mov ax,rLegendRegion.wCurrentTop
 add ax,7
 mov rLegendRegion.wCurrentBottom,ax

 mov si,offset sliderbutton
 call drawicolor

rsb99
 ret
RepaintSpectrumBar endp

RepaintSunkenFrame proc near
 push si
 call AdjustButtonDimensions
 call DrawSunkenFrame
 pop si
 ret
RepaintSunkenFrame endp

RepaintToolbar proc near

 call AdjustButtonDimensions

 test bRepaintNeeded,PAINTTOOLBARS
 jz rtb99

 push bx
 push cx
 push dx
 call DrawUpbutton
 pop dx
 pop cx
 pop bx

 sub bl,64/8
 mov bh,13
 add cx,32
 call DrawUpButton

 call PaintControlCaption
 jz rtb99
 or cx,cx
 jz rt1
 mov bx cx
 jmp rt2
rt1
 or bx,bx
 jz rtb99

rt2
 call SetFontForCaption
 push si
 add bx,3
 mov si,bx
 mov cx,rRegion.wCurrentLeft
 mov dx,rRegion.wCurrentTop
 add cx,32+8
 add dx,8

 mov bl,bTitleForegroundColor
 xor bh,bh
 call drawstring
 pop si
rtb99:
 ret
RepaintToolbar endp

end

Copr. 1995 Zenith Data Systems Corp.

.model small

SPTR = 8
include winclud.inc

DATASEG_BEGIN
extrn ControlDataStorageArea:byte
extrn bScreenMode:byte
extrn pGraphicFont:word
extrn wScreenSegment:word
wScanAdder dw 0

bXORFill db 0
bPatternToUse db 10101010b
dashpattern db 10101010b
rightdashpattern db 10101010b

ColoredAbouticon label byte
 public ColoredAbouticon
db -1,WHITE,GRAY,CYAN,BLACK
Abouticon label byte
 public Abouticon
db 4,26
db 00000000b,00000000b,00111111b,00000000b
db 00000000b,00000000b,11111111b,00000000b
db 00000000b,00000000b,11111111b,00000000b
db 00000000b,00000000b,11111100b,00000000b

db 10000000b,00000000b,00111111b,00000000b
db 00000000b,00000000b,11111111b,00000000b
db 00000000b,00000000b,11111111b,00000000b
db 00000000b,00000000b,11111100b,00000000b

db 00000000b,00000000b,00111111b,00000000b
db 00000000b,00000000b,11111111b,00000000b
db 00000000b,00000000b,11111111b,00000000b
db 00000000b,00000000b,11111100b,00000000b

db 00000000b,000000000,00111000b,00000111b
db 00000000b,000000000,00000000b,11111111b
db 00000000b,000000000,00000000b,11111111b
db 00000000b,000000000,00001100b,11110000b

db 00000000b,000000000,00110000b,00001111b
db 00000000b,000000000,00000000b,11111111b
db 00000000b,000000000,00000000b,11111111b
db 00000000b,000000000,00000100b,11111000b

db 00000000b,000000000,00110000b,00001111b
db 00000000b,000000000,00000000b,11111111b
db 00000000b,000000000,00000000b,11111111b
db 00000000b,000000000,00000100b,11111000b

db 00000000b,000000000,00110000b,00001111b
db 00000000b,000000000,00000000b,11111111b
db 00000000b,000000000,00000000b,11111111b
db 00000000b,000000000,00000100b,11111000b

db 00000000b,000000000,00110000b,00001111b
db 11111111b,000000000,00000000b,00000000b
db 11111111b,000000000,00000000b,00000000b
db 11100000b,000000000,00000100b,01111000b

db 00000000b,000000000,00110000b,00001111b
db 11111111b,000000000,00000000b,00000000b
db 11111111b,000000000,00000000b,00000000b
db 11100000b,000000000,00000100b,01111000b

db 00000000b,000000000,00110000b,00001111b
db 11111111b,000000000,00000000b,00000000b
db 11111111b,000000000,00000000b,00000000b
db 11100000b,000000000,00000100b,01111000b

db 00000000b,000000000,00110000b,00001111b
db 11111111b,000000000,00000000b,00011110b
db 11111111b,000000000,00000000b,00111100b
db 11100000b,000000000,00000100b,01111000b

db 00000000b,000000000,00110000b,00001111b
db 11111111b,00000000,00000000b,00000000b
db 11111111b,00000000,00000000b,00000000b
db 11100000b,00000000,00000100b,01111000b

db 00000000b,00000000,00110000b,00001111b
db 11111111b,00000000,00000000b,00000110b
db 11111111b,00000000,00000000b,00110000b
db 11100000b,00000000,00000100b,01111000b

db 00000000b,00000000,00110000b,00001111b
db 11111111b,00000000,00000000b,00000000b
db 11111111b,00000000,00000000b,00000000b
db 11100000b,00000000,00000100b,01111000b

db 00000000b,00000000,00110000b,00001111b
db 11111111b,00000000,00000000b,00000000b
db 11111111b,00000000,00000000b,00000000b
db 11100000b,00000000,00000100b,01111000b

db 00000000b,00000000,00110000b,00001111b
db 11111111b,00000000,00000000b,00000001b
db 11111111b,00000000,00000000b,11000000b
db 11100000b,00000000,00000100b,01111000b

db 00000000b,00000000,00110000b,00001111b
db 11111111b,00000000,00000000b,00110000b
db 11111111b,00000000,00000000b,00000000b
db 11100000b,00000000,00000100b,01111000b

db 00000000b,00000000,00110000b,00001111b
db 11111111b,00000000,00000000b,00110000b
db 11111111b,00000000,00000000b,00000110b
db 11100000b,00000000,00000100b,01111000b

db 00000000b,00000000,00111000b,00000111b
db 11111111b,00000000,00000000b,00011111b
db 11111111b,00000000,00000000b,11111100b
db 11100000b,00000000,00001100b,01110000b

db 00000000b,00000000,00111000b,00000111b
db 11111111b,00000000,00000000b,00000000b
db 11111111b,00000000,00000000b,00000000b
db 11100000b,00000000,00001100b,01110000b

db 00000000b,00000000,00111000b,00000111b
db 11111111b,00000000,00000000b,00000000b
db 11111111b,00000000,00000000b,00000000b
db 11100000b,00000000,00001100b,01110000b

db 00000000b,00000000,00111000b,00000111b
db 00000000b,00000000,00000000b,11111111b
db 00000000b,00000000,00000000b,11111111b
db 00000000b,00000000,00001100b,11100000b

db 00000000b,00000000,00111000b,00000011b
db 00000000b,00000000,00000000b,11111111b
db 00000000b,00000000,00000000b,11111111b
db 00000000b,00000000,00011100b,11000000b

db 00000000b,00000000,00111100b,00000001b
db 00000000b,00000000,00000000b,11111110b
db 00000000b,00000000,00000000b,11111110b
db 00000000b,00000000,00111100b,11000000b

db 00000000b,00000000b,00111111b,00000000b
db 00000000b,00000000b,11111111b,00000000b
db 00000000b,00000000b,11111111b,00000000b
db 00000000b,00000000b,11111100b,00000000b

db 00000000b,00000000b,00111111b,00000000b
db 00000000b,00000000b,11111111b,00000000b
db 00000000b,00000000b,11111111b,00000000b
db 00000000b,00000000b,11111100b,00000000b

db 00000000b,00000000b,00111111b,00000000b
db 00000000b,00000000b,11111111b,00000000b
db 00000000b,00000000b,11111111b,00000000b
db 00000000b,00000000b,11111100b,00000000b

db 00000000b,00000000b,00111111b,00000000b
db 00000000b,00000000b,11111111b,00000000b
db 00000000b,00000000b,11111111b,00000000b
db 00000000b,00000000b,11111100b,00000000b

SmallAbouticon label byte
 public SmallAbouticon
db 3,26-10

db 00000000b,00000000b,00111111b,00000000b
db 00000000b,00000000b,11111111b,00000000b
db 00000000b,00000000b,11111110b,00000000b

db 00000000b,000000000,00111000b,00000011b
db 00000000b,000000000,00000000b,11111111b
db 00000000b,000000000,00001110b,11110000b

db 00000000b,000000000,00110000b,00001111b
db 00000000b,000000000,00000000b,11111111b
db 00000000b,000000000,00000110b,11111000b

db 00000011b,000000000,00110000b,00001110b
db 11111111b,000000000,00000000b,00000000b
db 11100000b,000000000,00000110b,00111000b

db 00000011b,000000000,00110000b,00001110b
db 11111111b,000000000,00000000b,00000000b
db 11100000b,000000000,00000110b,00111000b

db 00000011b,000000000,00110000b,00001110b
db 11111111b,000000000,00000000b,01100011b
db 11100000b,000000000,00000110b,00111000b

db 00000011b,000000000,00110000b,00001110b
db 11111111b,000000000,00000000b,00000000b
db 11100000b,000000000,00000110b,00111000b

db 00000011b,000000000,00110000b,00001110b
db 11111111b,000000000,00000000b,00100010b
db 11100000b,000000000,00000110b,00111000b

db 00000011b,000000000,00110000b,00001110b
db 11111111b,000000000,00000000b,00000000b
db 11100000b,000000000,00000110b,00111000b

db 00000011b,000000000,00110000b,00001110b
db 11111111b,000000000,00000000b,00011100b
db 11100000b,000000000,00000110b,00111000b

db 00000011b,000000000,00110000b,00001110b
db 11111111b,000000000,00000000b,01000001b
db 11100000b,000000000,00000110b,00111000b

db 00000011b,000000000,00111000b,00000110b
db 11111111b,000000000,00000000b,00111111b
db 11100000b,000000000,00001110b,00110000b

db 00000011b,000000000,00111000b,00000110b
db 11111111b,000000000,00000000b,00000000b
db 11100000b,000000000,00001110b,00110000b

db 00000000b,000000000,00111000b,00000111b
db 00000000b,000000000,00000000b,11111111b
db 00000000b,000000000,00001110b,11110000b

db 00000000b,000000000,00111100b,00000011b
db 00000000b,000000000,00000000b,11111111b
db 00000000b,000000000,00011110b,11100000b

db 00000000b,00000000b,00111111b,00000000b
db 00000000b,00000000b,11111111b,00000000b
db 00000000b,00000000b,11111110b,00000000b

db 00000000b,00000000b,00111111b,00000000b
db 00000000b,00000000b,11111111b,00000000b
db 00000000b,00000000b,11111110b,00000000b

db 00000000b,00000000b,00111111b,00000000b
db 00000000b,00000000b,11111111b,00000000b
db 00000000b,00000000b,11111110b,00000000b

DATASEG_END
.code

PaintScreendest proc near
 public PaintScreenDest

if need_osk ne 0

 mov bx,479

 sub bx,dx
 mov wScansToBottom,bx
 mov bx,wCoveredAreaHeight
 mov wCoveredRowCountdown,bx
 mov bx,wCoveredAreaTop
 sub bx,dx
 jnb psd1
 mov bx,wCoveredAreaBottom
 sub bx,dx
 jae psd2
 mov bx,-1
 jmp psd1
psd2:
 mov wCoveredRowCountdown,bx
 xor bx,bx
psd1:
 mov wUncoveredRowCountdown,bx
endif
 DIVIDE_BY_8 cx
if need_osk ne 0
 mov wBytesToStart,cx
```

```
 mov wBytesToStartInit,cx

 mov bx,80
 sub bx,cx
 mov wBytesToRight,bx
 mov wBytesToRightInit,bx
 mov bx,wCoveredAreaWidth
 mov wCoveredByteCountdown,bx
 mov bx,wCoveredAreaLeft
 sub bx,cx
 jge psd1a
 mov bx,wCoveredAreaRight
 sub bx,cx
 jge psd2a
 mov bx,-1
 jmp psd1a
psd2a
 inc bx
 mov wCoveredByteCountdown,bx
 xor bx,bx
psd1a
 mov wUncoveredByteCountdown,bx
 mov wUncoveredByteInit,bx
 mov bx,wCoveredByteCountdown
 mov wCoveredByteInit,bx
psd1b
 cmp bScreenMode,VGA_MODE
 jnz psd20
endif

 mov ax,SCREEN_WIDTH_BYTES
 mul dx
 mov bx,ax

 add bx,cx
 mov ax,VGASEGMENT
 mov es,ax
 mov di,bx
 ret
psd20
 mov ax,dx
 mov bx,SPTR
 xor dx,dx
 div bx
 mov bx,160
 mul bx
 add ax,cx
 add ax,cx
 mov di,ax
 mov bx,ax

 mov es,wScreenSegment
 ret
pointscreendest endp

CheckIfCovered proc near
 public CheckIfCovered
 cmp wBytesToStart,0
 jge cic10
 inc wBytesToStart
 stc
 ret
cic10
 cmp wBytesToRight,0
 jg cic0
 stc
 ret
cic0
 dec wBytesToRight
 cmp wScansToBottom,0
 jg cic0a
 stc
 ret
cic0a
 cmp wUncoveredRowCountdown,0
 jnz cic1


 cmp wUncoveredByteCountdown,0
 jnz cic2
 dec wCoveredByteCountdown
 jnz cic3
 mov wUncoveredByteCountdown,-1
cic3:
 cmp bCoveredAreaOnly,0
 jz cic3a
 clc
 ret
cic3a:
 stc
 ret
cic2
 dec wUncoveredByteCountdown
cic1
 cmp bCoveredAreaOnly,0
 jz cic1a
 stc
 ret
cic1a
 clc
 ret
CheckIfCovered endp

NewRowForCheckIfCovered proc near
 public NewRowForCheckIfCovered
 dec wScansToBottom
 cmp wUncoveredRowCountdown,0
 jz nrfcic1
 dec wUncoveredRowCountdown
 jz nrfcic2
 push ax
 jmp nrfcic2b
 ret
nrfcic1:
 cmp wCoveredRowCountdown,0
 jz nrfcic3
 dec wCoveredRowCountdown

nrfcic2:
 push ax
 mov ax,wUncoveredByteInit
 mov wUncoveredByteCountdown,ax
 mov ax,wCoveredByteInit
 mov wCoveredByteCountdown,ax
 jmp nrfcic2b
nrfcic3:
 mov wUncoveredRowCountdown,-1
 push ax
nrfcic2b
 mov ax,wBytesToRightInit
 mov wBytesToRight,ax
 mov ax,wBytesToStartInit
 mov wBytesToStart,ax
 pop ax
 ret
NewRowForCheckIfCovered endp

FillScreenArea proc near
 public FillScreenArea

if need_osk ne 0
 cmp bScreenMode,VGA_MODE
 jz fsa0
fbms4:
 push ax
 push si

 push cx
 push bx
 push dx
 call PointScreenDest
 pop dx
 pop bx
 pop cx
fbms1
if need_osk ne 0
 call checkifcovered
 jc fbms2
endif
 mov al,' '
 mov ah,bh
 mov es:[di],ax
fbms2.
 inc di
 inc di
 dec si
 jnz fbms1

 pop si
 pop ax
 sub ax,SPTR
 jle fbms3
 add dx,SPTR
 jmp fbms4
fbms3.
 ret

endif
fsa0:


 or ax,ax
 jnz fsa2
 ret
fsa2:
 or si,si
 jnz fsa3
 ret
fsa3:
 push bp
 push di
 push ax
 push bx
 call pointscreendest
 pop bx
 mov bp,SCREEN_WIDTH_BYTES
 sub bp,si
 mov wScanAdder,bp

vgaloadlatches

 mov ax,011111111b*256+8
 out dx,ax


 mov al,bh
 pop bx
fsa1:
 mov cx,si
 mov bp,ax

fsa5:
if need_osk ne 0
 call CheckIfCovered
 jnc fsa4a
else
 jmp fsa4a
endif
 inc di
 loop fsa5
 jmp fsa4b
fsa4a:
 vgaloadlatches
 mov ax,011111111b*256+8
 out dx,ax
 mov ax,bp
 mov ah,es:[di]
 stosb
fsa4:
 loop fsa5
fsa4b.
 add di,wScanAdder
if need_osk ne 0
 call NewRowForCheckIfCovered
endif
 dec bx
 jnz fsa1
 pop di
 pop bp


 ret

fillscreenarea endp

DATASEG_BEGIN
bCoveredAreaOnly    db 0,0
 public bCoveredAreaOnly
wCoveredAreaTopHold dw -1
 public wCoveredAreaTopHold
wCoveredAreaTop     dw -1
 public wCoveredAreaTop
wCoveredAreaBottom dw 260
 public wCoveredAreaBottom
wCoveredAreaLeft   dw 40
 public wCoveredAreaLeft
wCoveredAreaRight  dw 60
 public wCoveredAreaRight
wCoveredAreaWidth  dw 21
 public wCoveredAreaWidth
wCoveredAreaHeight dw 121
 public wCoveredAreaHeight

wScansToBottom dw 0
wBytesToRight dw 0
wBytesToRightInit dw 0


wUncoveredRowCountdown dw 0
wCoveredRowCountdown   dw 0
wUncoveredByteCountdown dw 0
wCoveredByteCountdown dw 0
wUncoveredByteInit    dw 0
wCoveredByteInit      dw 0
wBytesToStart dw 0
wBytesToStartInit dw 0
bDrawStringPWFlag  db 0,0
 public bDrawStringPWFlag
pCurrentFont dw 0
 public pCurrentFont
wCurrentFontHeight dw 0
 public wCurrentFontHeight
pDrawStringTabList dw 0
 public pDrawStringTabList
pNextTabItem dw 0
drawstringwidth  dw 0
finaldh db 0
maxdi dw 0
maxsi dw 0
bytestowrite db 0
startingmask db 0
endingmask db 0
PixelsToPadLeft dw 0
PixelsToPadRight dw 0
LeftPaddingCountdown dw 0
RightPaddingCountdown dw 0
drawstringsegment dw 0

drawstringbitflags db 0
DrawstringTextModeColor db 0
 public DrawStringTextModeColor
drawstringbackcolor db 0
drawstringcolumn dw 0
drawstringrow    dw 0
drawstringcolor  db 0
drawstringptr    dw 0
drawstringspacewidth db 0
drawstringheight db 0
dsnextlineptr dw 0
scancountdown db 0
scansdone db 0
nextchrbitmap dw 0
allrowsdone db 0
bProcessUnderlines db 0
bUnderlinedCharacter db 0,0
 public bUnderlinedCharacter
bZeros db 5 dup(0)
bOnes  db 5 dup(-1)

scanbuffer db 80 dup(0)
DATASEG_END

.code

DrawLabel proc near
 public DrawLabel
 mov bProcessUnderlines,-1
 call drawstring
 mov bProcessUnderlines,0
 ret
DrawLabel endp

GetLabelWidth proc near
 public GetLabelWidth
 mov bProcessUnderlines,-1
 call GetStringWidth
 mov bProcessUnderlines,0
 ret
GetLabelWidth endp

DrawString proc near
 public DrawString


 mov bUnderlinedCharacter,0
 mov allrowsdone,0
 mov drawstringwidth,ax
 mov drawstringbitflags,bh
 and bh,1111b
 mov drawstringbackcolor,bh
 mov drawstringcolumn,cx
 mov drawstringrow,dx
 mov drawstringptr,si
 mov drawstringcolor,bl
 mov bx,pCurrentFont
 mov ax,[bx]
 mov drawstringspacewidth,al
 mov drawstringheight,ah
 cmp bScreenMode,VGA_MODE
 je ds1
 cmp bx,pGraphicsFont
 jnz dst1
 ret
dst1:
dst7
 push si
 push dx
 call PointScreenDest
 pop dx
 pop si
dst4:
 lodsb
 or al,al
 jz dst3
 cmp al,13
 jnz dst6
 add dx,8
 mov cx,DrawStringColumn
 jmp dst7
dst6:
 if need_osk ne 0
  call checkifcovered
  jc dst2
 endif
  mov ah,DrawStringTextModeColor
  cmp ax,223+32*256
  jnz dst5
  mov ax,221+2*256

 dst5.
  mov word ptr es:[di],ax
 dst2
  inc di
  inc di
  jmp dst4
 dst3.
  ret
```

```
ds1
 mov dsnextlineptr,0
 mov ah,drawstringheight
 mov scancountdown,ah
 mov scansdone,0
 mov si,drawstringptr
 xor cx,cx
 xor dx,dx
 mov maxdi,offset scanbuffer +80
 call getstringwidth
 mov bx,ax
 mov maxdi,offset scanbuffer
 test drawstringbitflags,16
 jz dsb1
 test drawstringbitflags,32+64+128
 jz dsb2
dsb1:
 test drawstringbitflags,16+64+128
 jnz ds1v1
dsb2
 mov ax,bx
 mov drawstringwidth,ax
ds1v1
 mov ax,drawstringwidth
ds1v2:
 mov cx,drawstringcolumn
 and cx,111b
 add ax,cx
 or ax,ax
 jz ds1v
 add ax,8
ds1vv
 shr ax,1
 shr ax,1
 shr ax,1

 add maxdi,ax
 cmp maxdi,offset scanbuffer+80
 jbe ds1v
 mov maxdi,offset scanbuffer+80
ds1v
 mov ax,drawstringwidth
 sub ax,bx
 jge ds1q
 xor ax,ax
ds1q
 xor cx,cx
 xor dx,dx
 test drawstringbitflags,32+64+128
 jz ds1z1

 test drawstringbitflags,32
 jz ds1a
ds1z1:
 xor cx,cx
 mov dx,ax
 jmp ds1z
ds1a
 test drawstringbitflags,64
 jz ds1b
 xor dx,dx
 sar ax,1
 adc dx,1
 add dx,ax
 mov cx,ax
 jmp ds1z
ds1b
 mov cx,ax
 xor dx,dx
ds1z
 mov PixelsToPadLeft,cx
 mov PixelsToPadRight,dx
ds8
 push PixelsToPadLeft
 pop LeftPaddingCountdown
 push PixelsToPadRight
 pop RightPaddingCountdown

 call clearscanbuffer
 call PrepareTabbing
 mov cl,byte ptr drawstringcolumn
 call LocateDrawstringPointer
 mov startingmask,dh
  mov cx,drawstringwidth
  add cx,drawstringcolumn
 mov ah,128
 and cl,111b
 ror ah,cl
 mov endingmask,ah
 xor dl,dl
 mov di,offset scanbuffer
 mov ax,LeftPaddingCountdown
 mov cx,ax
 DIVIDE_BY_8 ax
 add di,ax
 and cl,111b
 xor ch,ch
 mov si,drawstringptr
 jcxz ds4
 jmp ds11
ds4:
 lodsb
 or al,al
 jnz ds2a
 jmp ds2
ds2a:
 cmp al,13
 jnz ds2b
 jmp ds3
ds2b:
 cmp al,9
 jnz ds2e
 mov bx,pNextTabItem
 cmp word ptr [bx],0
 jz ds4
 mov al,dl
 stosb
 xor dl,dl
 mov cx,[bx]
 call LocateDrawstringPointer
 mov di,offset scanbuffer
 DIVIDE_BY_8 cx
 add di,cx
 inc bx
 inc bx
 mov pNextTabItem,bx
 jmp ds4
ds2e:
 cmp bDrawStringPWFlag,0
 jz ds2f
 mov al,"*"
ds2f:
 cmp al,32
 jb ds4
 ja ds4a
ds4b:
 jmp ds10
ds4a:
 cmp al,255
 je ds4b
if NEED_ALTKEYS ne 0
 cmp al,"&"
 jnz ds4c
 cmp bProcessUnderlines,0
 jz ds4c
 cmp byte ptr [si],0
 jz ds4c
 cmp byte ptr [si],"&"
 jnz ds4
ds4c:
endif

 sub al,32
 xor ah,ah
 add ax,ax
 mov bx,ax
 add bx,pCurrentFont
 mov ax,[bx+2]
 mov nextchrbitmap,ax
 mov bx,[bx]
 mov cl,byte ptr [bx]
 mov ch,byte ptr [bx+1]
 xor al,al
 cmp cl,128
 jae qqv
 mov al,ch
 shr al,1
 shr al,1
 shr al,1
 shr al,1
qqv:
 mov ah,scansdone
 cmp ah,al
 jae ds11d
 jmp ds11
ds11d:
 sub ah,al
 mov al,ah
 cmp cl,128
 jae zzv
 and ch,1111b
zzv:
 mul ch
 inc bx
 inc bx
 add bx,ax
 cmp bx,nextchrbitmap
 jb ds16
 cmp drawstringheight,0
 jnz ds11a
 mov allrowsdone,-1
 jmp ds11
ds11a:
if NEED_ALTKEYS ne 0

 cmp byte ptr [si-2],"&"
 jnz ds11b
 cmp byte ptr [si-3],"&"
 jz ds11b
 cmp bProcessUnderlines,0
 jz ds11b

 mov bx,drawstringptr
 inc bx
 cmp bx,si
 jz ds11b

 mov bl,scansdone
 mov bh,drawstringheight
 inc bl
 dec bh
 cmp bl,bh
 jb ds11c
 ja ds11b
 mov bl,[si-1]
 mov bUnderlinedCharacter,bl
 mov bx,offset bOnes
 jmp ds16
ds11c:
 mov bx,offset bZeros
 jmp ds16

ds11b:
endif
 jmp ds11

ds16:
 mov al,[bx]
ds17:
 mov ah,8
ds15:
 rol al,1
 jnc ds12
 or dl,dh
ds12:
 ror dh,1
 jnc ds13
 xchg al,dl
 cmp di,maxdi
 jae ds19
 stosb
ds19:
 mov al,dl
 xor dl,dl
ds13:
 dec cl
 jnz ds14
 jmp ds4
ds14:
 dec ah
 jnz ds15
 inc bx
 dec ch
 jnz ds16
 inc ch
 xor al,al
 jmp ds17
ds10:
 mov cl,drawstringspacewidth
ds11:
 xor ch,ch
ds6:
 ror dh,1
 jnc ds5
 mov al,dl
 cmp di,maxdi
 jae ds18
 stosb
ds18:
 xor dl,dl
ds5:
 loop ds6
 jmp ds4
ds3:
 mov dsnextlineptr,si
ds2:
ds2d1:
 cmp di,maxdi
 jae ds2d
 xchg ax,dx
 stosb
 xor al,al
 xchg ax,dx
ds2d:
 xor al,al
ds22de:
 cmp di,maxdi
 jae ds22df
 stosb
 jmp ds22de
ds22df:
ds20:
 mov finaldh,dh
 cmp allrowsdone,-1
 jnz ds23b
 jmp ds23
ds23b:
 mov dx,drawstringrow
 mov cx,drawstringcolumn
 mov si,maxdi
 dec si
    jge ds23qq
 cmp drawstringheight,0
 jnz ds23qq
    mov allrowsdone,-1
    jmp ds23
ds23qq:
 mov maxsi,si
 mov si,offset scanbuffer
ds23a:
 call pointscreendest
 mov bh,drawstringcolor
 vgaloadlatches
ds21:
if need_osk ne 0
 call CheckIfCovered
 jnc ds21a
else
 jmp ds21a
endif

ds21c:
 cmp si,maxsi
 jg ds22x
 lodsb
 jmp ds22a

ds21a:
 cmp si,maxsi
 jg ds22x
 mov al,es:[di]
 lodsb
 or al,al
 jz ds22
 push ax
 vgawritecolor bh
 pop ax
ds22:
 test drawstringbitflags,16
 jz ds22a
 mov ah,es:[di]
 cmp si,maxdi
 jnz ds22b

   not al
   mov ah,endingmask
   not ah
rr2:
   ror ah,1
   jnc rr1
   and al,ah
   jmp rr2
rr1:
   vgawritecolor drawstringbackcolor
rr3:
   jmp ds22a


ds22b:
 cmp si,offset scanbuffer + 1
 jnz ds22d
 mov ah,startingmask
 test ah,128
 jnz ds22d
ds22e
 rol ah,1
ds22e1
 or al,ah
 rol ah,1
 jnc ds22e1

ds22d:
 not al
 vgawritecolor drawstringbackcolor
ds22a:
 inc di
 jmp ds21
ds22x:
ds23:
 push ds
 pop es
 inc scansdone
 cmp allrowsdone,-1
 jz ds7
 cmp drawstringheight,0
 jz ds7a
 dec scancountdown
 jz ds7
ds7a:
 mov si,drawstringptr
 inc drawstringrow
 jmp ds8
ds7:
 mov si,dsnextlineptr
 or si,si
 jz ds8
```

```
 mov drawstringptr,si
 jmp ds1

ds0
 mov bDrawStringPWFlag,0
 ret
drawstring endp

GetStringWidth proc near
 public GetStringWidth
 call PrepareTabbing

 push si
 push di
 push dx
 push bx
 xor dx,dx
 mov di,pCurrentFont
gsw1
 lodsb
 or al,al
 jz gsw2
 cmp al,13
 jz gsw2
 cmp al,8
 jnz gsw1a
 mov bx,pNextTabItem
 cmp word ptr [bx],0
 jz gsw1
 mov dx,[bx]
 inc bx
 inc bx
 mov pNextTabItem,bx
 jmp gsw1
gsw1a:
 cmp al," "
 jb gsw1
 ja gsw3
gsw4
 mov al,[di]
gsw5
 xor ah,ah
 add dx,ax
 jmp gsw1
gsw3
 cmp al,255
 jz gsw4
 cmp al,"&"
 jnz gsw3a
 cmp bProcessUnderlines,0
 jz gsw3a
 cmp byte ptr [si],"&"
 jz gsw3a
 cmp byte ptr [si],0
 jz gsw3a
 jmp gsw1
gsw3a
 sub al,32
 xor ah,ah
 add ax,ax
 mov bx,di
 add bx,ax
 mov bx,[bx]
 mov al,[bx]
 jmp gsw5
gsw2
 mov ax,dx
 pop bx
 pop dx
 pop di
 pop si
 ret
GetStringWidth endp

clearscanbuffer proc near
 push ds
 pop es
 mov di,offset scanbuffer
 mov cx,80
 xor al,al
 rep stosb
 ret
clearscanbuffer endp

PrepareTabbing proc near
 push pDrawStringTabList
 pop pNextTabItem
 ret
PrepareTabbing endp

LocateDrawStringPointer proc near
 mov dh,128
 and cl,111b
 ror dh,cl
 ret
LocateDrawStringPointer endp

DrawSolidXORBox proc near
 public DrawSolidXorBox
 mov al,11111111b
 call DrawXORBox
 ret
DrawSolidXORBox endp

DrawXORBox proc near
 public DrawXorBox
 mov bPatternToUse,al
 mov cx,[si].wCurrentLeft
 cmp cx,[si].wCurrentRight
 jz dxb7
 mov dx,[si].wCurrentTop
 cmp dx,[si].wCurrentBottom
 jz dxb8a
 cmp bXorFill,-1
 jz dxb10

 call XORHorizontal

 mov dx,[si].wCurrentBottom
 dec dx
dxb8:
 cmp bScreenMode,VGA_MODE
 jz dxb8a

 inc dx

 mov ax,dx
 sub ax,[si].wCurrentTop
 cmp ax,8
 jge dxb8a
 jmp dxb8c
dxb8a:
 call XORHorizontal
dxb8c:
 mov cx,[si].wCurrentLeft
 jcxz dxb6
 cmp bScreenMode,VGA_MODE
 jnz dxb6
 dec cx
dxb6:
 call XORVertical
 mov cx,[si].wCurrentRight
 inc cx
dxb7:
 cmp bScreenMode,VGA_MODE
 jz dxb7a
 mov ax,[si].wCurrentRight
 sub ax,[si].wCurrentLeft
 cmp ax,8
 jl dxb13
  sub cx,8
 call XORVertical
 jmp dxb13
dxb7a:
 call XORVertical
dxb12:
dxb13:
 ret
dxb10:
 cmp dx,[si].wCurrentBottom
 jae dxb11
 push dx
 call XORHorizontal
 pop dx
 inc dx
 jmp dxb10
dxb11:
 mov bXorFill,0
 jmp dxb12
DrawXORBox endp

XORHorizontal proc near
 mov cx,[si].wCurrentLeft
 cmp bScreenMode,VGA_MODE
 jz xh0
 add cx,8
 call pointscreendest

 mov ax,[si].wCurrentRight
 DIVIDE_BY_8 ax
 xchg ax,cx
 sub cx,ax
txh2:
 call XORTextByte

 inc di
 inc di
 loop txh2
 ret
xh0
 call pointscreendest
 push cx
 mov al,bPatternToUse
 mov dashpattern,al
 mov cx,[si].wCurrentLeft
 and cl,111b
 jz xh1
 mov al,dashpattern
 shl al,cl
 shr al,cl
 mov dashpattern,al
xh1:
 pop cx
 mov ax,[si].wCurrentRight
 push ax
 push cx
 mov cx,ax
 mov al,bPatternToUse
 and cl,111b
 mov ch,7
 sub ch,cl
 jz xh2
 mov cl,ch
 sar al,cl
 sal al,cl
xh2:
 mov rightdashpattern,al
 pop cx
 pop ax
 DIVIDE_BY_8 ax
 inc ax
 sub ax,cx
 jz dxb1
 mov cx,ax
 VGASETXOR
dxb2:
if need_osk ne 0
 call CheckIfCovered
 jc dxb2a
endif
 mov al,es:[di]
 mov al,dashpattern
 vgawritecolor 15
dxb2a:
 inc di
 mov al,bPatternToUse
 cmp cx,2
 jnz dxb3
 mov al,rightdashpattern
dxb3.
 mov dashpattern,al
 loop dxb2
dxb1:
 VGALOADLATCHES
 ret
XORHorizontal endp

DrawDashedXORBox proc near
 public DrawDashedXORBox

 mov al,10101010b

 call DrawXORBox
 ret
DrawDashedXORBox endp

XORTextByte proc near
if need_osk ne 0
 call checkifcovered
 jc txh1
endif
 mov al,es:[di+1]
 mov ah,al
 not ah
 and ah,01111111b
 and al,10000000b
 or al,ah
 mov es:[di+1],al
txh1:
 ret
XORTextByte endp

XORVertical proc near
 mov dx,[si].wCurrentTop
 cmp bScreenMode,VGA_MODE
 jz xv0
tmxv1:
 push dx
 push cx
 call pointscreendest
 pop cx
 pop dx
 call XORTextByte
 add dx,8

 cmp dx,[si].wCurrentBottom
 jl tmxv1
 ret
xv0.
 push cx
 call pointscreendest
 pop cx
 mov bh,10000000b
 and cl,111b
 jz xv1
 ror bh,cl

xv1:
 VGASETXOR
 mov bl,bPatternToUse
 mov cx,[si].wCurrentTop
  inc cx
dxb5:
 cmp cx,[si].wCurrentBottom
 jae dxb4
if need_osk ne 0
 call CheckIfCovered
 jc dxb5a
endif
 mov al,es:[di]
 mov al,bl
 and al,bh
 vgawritecolor 15
dxb5a:
 add di,SCREEN_WIDTH_BYTES
 rol bl,1
 inc cx
if need_osk ne 0
 call NewRowForCheckIfCovered
endif
 jmp dxb5
dxb4.
 VGALOADLATCHES
 ret
XORVertical endp

end
Copr. 1995 Zenith Data Systems Corp.
.model small
include uiinclud.inc
DATASEG_BEGIN
extrn ControlDataStorageArea:byte
extrn rRegion:tREGION
extrn OSK:tControl
extrn bCoveredAreaOnly:byte
extrn bDrawStringPWFlag:byte
extrn bNullString:byte
extrn pCurrentFont:word
extrn pDrawStringTabList:word
extrn pNormFont:word
extrn pTabHandler:word
extrn pTabRegion:word
extrn rCursorRegion:tREGION
extrn uifont0:word
extrn wCoveredAreaTop:word
extrn wCursorTimer:word
extrn wKeyPressed:word
extrn wPenDownColumn:word
extrn wShortCutKey:word
extrn wHotKeyRightPixel:word
extrn pDelayedSetControl:word
extrn pDelayedSetRegion:word
bCursorActive    db 0
  public bCursorActive
bCursorState     db 0
bCursorPWFlag    db 0

bEditBoxType db 0
pEditBoxControl dw 0

pEditBoxFont dw uifont0
  public pEditBoxFont

wEditBoxLeftPixel dw 0
wEditBoxRightPixel dw 0
wEditBoxTopPixel dw 0
bEditBoxFGColor db 0
  public bEditBoxFGColor
bEditBoxBGColor db 15
wEditBufferSize dw 0
pEditBufferStart dw 0
wEditBufferInsertPoint dw 0
DATASEG_END
.code
extrn CheckIfOnlyOSK:near
extrn DoListBoxKey:near
extrn DoSlideBarLeftArrow:near
extrn DoSlideBarRightArrow:near
extrn DoSpaceBar:near
extrn DoSpinDown:near
extrn DoSpinUp:near
extrn DoTab:near
extrn DrawSolidXorBox:near
extrn DrawString:near
extrn GetTabControlType:near
extrn GoNextControl:near
extrn GoNextControl:near
extrn GoPreviousControl:near
extrn GoPreviousControl:near
```

```
extrn IsItButton:near
extrn IsItCheckBox:near
extrn IsItEditBox:near
extrn IsItListBox:near
extrn IsItSlideBar:near
extrn JumpOnAL:near
extrn PointNextTabControl:near
extrn PointPreviousTabControl:near
extrn ProtectOSK:near
extrn Repaint:near
extrn SetNumericControl:near
extrn SetTextControl:near


DrawEditBoxText proc near
if need_osk ne 0
 call ProtectOSK
endif

 mov si,pEditBufferStart
 mov bl,bEditBoxFGColor
 mov bh,bEditBoxBGColor
 or bh,WITHBACKCOLOR+LEFTJUSTIFIED
 mov dx,wEditBoxTopPixel
 mov cx,wEditBoxLeftPixel
 mov ax,wEditBoxRightPixel
 sub ax,cx
debt1:
 mov pCurrentFont,offset wfont0
 mov pDrawStringTabList,offset bNullString
 call DrawString
 ret
DrawEditBoxText endp

ChangeCursorState proc near
 push wCoveredAreaTop
 push word ptr bCoveredAreaOnly

if need_osk ne 0
 call protectOSK
endif

 mov si,offset rCursorRegion
 call DrawSolidXORBox
 not bCursorState
 mov wCursorTimer,0
 pop word ptr bCoveredAreaOnly
 pop wCoveredAreaTop
 ret
ChangeCursorState endp

DeleteEditBufferCharacter proc near
 push ds
 pop es
 call PointEditBufferCurrent
 or al,al
 jz dc1
 mov si,di
 inc si
 mov cx,pEditBufferStart
 add cx,wEditBufferSize
 dec cx
 sub cx,si
 inc cx
 jz dc1
 rep movsb
dc1:
 ret
DeleteEditBufferCharacter endp

DoBackSpaceEdit proc near

DoBackSpaceEdit:
 call DoLeftArrowEdit
 jc bs1
 call DoDelKeyEdit
bs1:
 ret
DoBackSpaceEdit endp

DoCursorFlash proc near
 public DoCursorFlash

 cmp bCursorActive,0
 jz dcf1
 cmp wCursorTimer,10
 jb dcf1
 call ChangeCursorState
dcf1:
 ret
DoCursorFlash endp

DoDelKeyEdit proc near
 call DeleteEditBufferCharacter
 clc
 ret
DoDelKeyEdit endp

DoEditBoxKey proc near

 mov pEditBoxControl,bx

 cmp [bx].ControlType,PWEDITBOX
 jnz debk3
 mov bDrawStringPWFlag,-1
debk3:

 cmp al,' '
 jae debk1
 call DoEditBoxSpecialKey
 jnc debk2
 ret
debk1:

 cmp bEditBoxType,NUMEDITBOX
 jnz debk1a
 cmp al,'0'
 jb debk99
 cmp al,'9'
 ja debk99
debk1a:

 push bx
 call InsertEditBufferCharacter
 pop bx

debk2:
 call StopCursor
 mov al,bEditBoxType
 mov si,pEditBoxControl

 cmp al,NUMEDITBOX
 jnz debk4
 push bx
 call SetNumericControl
 pop bx
 jmp debk10
debk4:

 cmp al,PWEDITBOX
 jz debk5
 call SetTextControl
 jmp debk6
debk5:
 mov pDelayedSetControl,si
 push pTabRegion
 pop pDelayedSetRegion
debk6:
debk10:
 call DrawEditBoxText
 mov di,offset rCursorRegion
 call ResumeCursor
debk99:
 ret
DoEditBoxKey endp

DoEditBoxSpecialKey proc near

 mov al,ah
 call JumpOnAL

 db UP_ARROW_SCAN_CODE
 dw offset debsUpArrow
 db DOWN_ARROW_SCAN_CODE
 dw offset debsDownArrow
 db LEFT_ARROW_SCAN_CODE
 dw offset debsLeftArrow
 db RIGHT_ARROW_SCAN_CODE
 dw offset debsRightArrow
 db DEL_SCAN_CODE
 dw offset debsDel
 db HOME_SCAN_CODE
 dw offset debsHome
 db END_SCAN_CODE
 dw offset debsEnd
 db BACKSPACE_SCAN_CODE
 dw offset debsBackSpace
 db 0
 stc
 ret

debsLeftArrow:
 call DoLeftArrowEdit
 ret
debsRightArrow:
 call DoRightArrowEdit
 ret
debsDel:
 call DoDelKeyEdit
 ret
debsHome:
 call DoHomeKeyEdit
 ret
debsEnd:
 call DoEndKeyEdit
 ret
debsBackSpace:
 call DoBackSpaceEdit
 ret

debsUpArrow:
 mov si,pEditBoxControl
 mov rRegion.pCurrentControl,si
 call GoNextControl
 jc debsua1
 cmp [si].ControlType,SPINUPBUTTON
 jnz debsua2
 call DoSpinUp
debsua2:
 call GoPreviousControl
debsua1:
 clc
 ret

debsDownArrow:
 mov si,pEditBoxControl
 mov rRegion.pCurrentControl,si
 call GoNextControl
 jc debsda1
 call GoNextControl
 jc debsda2
 cmp [si].ControlType,SPINDOWNBUTTON
 jnz debsda3
 call DoSpinDown
debsda3:
 call GoPreviousControl
debsda2:
 call GoPreviousControl
debsda1:
 clc
 ret
DoEditBoxSpecialKey endp

DoEndKeyEdit proc near

deke2:
 call PointEditBufferCurrent
 or al,al
 jz deke1
 inc wEditBufferInsertPoint
 jmp deke2
deke1:
 clc
 ret
DoEndKeyEdit endp

DoHomeKeyEdit proc near

 mov wEditBufferInsertPoint,0
 stc
 ret
DoHomeKeyEdit endp

DoKeyEvent proc near
 public DoKeyEvent
dke1:
 mov ax,wKeyPressed
if need_osk ne 0
 call CheckIfOnlyOSK
 jnc dke1b
 ret
dke1b:
endif

 cmp al,TABKEY
 jnz dke3
 mov pTabHandler,offset PointNextTabControl
 call DoTab
 ret
dke3:

 cmp ax,SHIFTTABKEY
 jnz dke4
 mov pTabHandler,offset PointPreviousTabControl
 call DoTab
 ret
dke4:

if NEED_ALTKEYS ne 0
 or al,al
 jnz dke4a
 call DoShortCutKey
 jnc dke4a
 ret
dke4a:
endif

 call GetTabControlType
 jnz dke1c
 ret
dke1c:

 call IsItEditBox
 jnz dke4a
 mov bEditBoxType,al
 mov ax,wKeyPressed
 call DoEditBoxKey
 ret
dke4a:

 call IsItListBox
 jnz dke4b
 mov ax,wKeyPressed
 call DoListBoxKey
 ret
dke4b:

 call IsItSlideBar
 jnz dke4e
 mov ax,wKeyPressed
 or al,al
 jnz dke4b1
 mov di,si
 mov si,bx
 cmp ah,LEFT_ARROW_SCAN_CODE
 jz dke4b2
 cmp ah,RIGHT_ARROW_SCAN_CODE
 jnz dke4b1
 call DoSlideBarRightArrow
 jmp dke4b1
dke4b2:
 call DoSlideBarLeftArrow
dke4b1:
 ret
dke4e:

 call IsItCheckBox
 jz dke4c
 call IsItButton
 jnz dke5
dke4c:
 mov ax,wKeyPressed
 cmp al,' '
 jnz dke2
 call DoSpacebar
 ret
dke2:
 cmp al,13
 jnz dke5
 call DoSpaceBar
 ret
dke5


 ret
DoKeyEvent endp

DoShortCutKey proc near
if NEED_ALTKEYS ne 0
 push ds
 pop es
 mov di,offset ScanCodeTable_End - 1
 mov cx,offset ScanCodeTable_End - offset
ScanCodeTable
 std
 push ax
 mov al,ah
 repnz scasb
 pop ax
 cld
 jnz dke6
 sub di,offset ScanCodeTable
 add di,offset AltKeyTable
 mov al,es:[di+1]
 mov ah,128
 mov wShortCutKey,ax

 mov pTabHandler,offset PointNextTabControl
 call DoTab1
 mov wShortCutKey,0
 jnc dke8
 jmp dke6ret

dke6:
 call GetTabControlType
 call IsItEditBox
 jnz dke7
 jmp dke6ret
dke7:
 mov ah,0
 mov al,' '
 mov wKeyPressed,ax
 jmp dke6
dke6ret
 stc
 ret
endif
dke8:
 clc
 ret
DoShortCutKey endp

DoLeftArrowEdit proc near

 cmp wEditBufferInsertPoint,0
 je la1
 stc
 jmp la2
la1:
```

```
 dec wEditBufferInsertPoint
 clc
la2
 ret
DoLeftArrowEdit endp

DoRightArrowEdit proc near

 call PointEditBufferCurrent
 or al,al
 jnz ewb0
 stc
 jmp short ra1
ewb0
 mov bx,wEditBufferInsertPoint
ewb1
 inc wEditBufferInsertPoint
 clc
ra1:
 ret
DoRightArrowEdit endp

GetInsertionPixelOffset proc near

 push si
 push dx
 push cx
 push bx
 mov si,pEditBufferStart
 mov bx,pEditBoxFont
 mov cx,wEditBufferInsertPoint
 xor dx,dx
 jcxz gip1
gip2
 lodsb
 or al,al
 jz gip1
 cmp al,' '
 jae gip3
 jb gip4
gip3
 cmp bDrawStringPWFlag,0
 jz gip3a
 mov al,'*'
gip3a:
 sub al,' '
 xor ah,ah
 add ax,ax
 mov bx,ax
 add bx,pEditBoxFont
 or ax,ax
 jnz gip5
 mov al,[bx]
 jmp gip6
gip5
 mov bx,[bx]
 mov al,[bx]
 xor ah,ah
gip6
 add dx,ax
gip4
 loop gip2
gip1
 mov ax,dx
 pop bx
 pop cx
 pop dx
 pop si
 ret
GetInsertionPixelOffset endp

InsertEditBufferCharacter proc near
 push ds
 pop es
 mov di,pEditBufferStart
 mov cx,wEditBufferSize
 dec cx
 add di,cx
 dec di
 cmp byte ptr [di],0
 jnz ic2
 mov si,di
 dec si
 mov bx,wEditBufferInsertPoint
 sub cx,bx
 jz ic2
 dec cx
 jl ic2
 je icx1
 std
 rep movsb
 cld
icx1:
 inc wEditBufferInsertPoint
 mov byte ptr [di],al
ic2:
 ret
InsertEditBufferCharacter endp

PointEditBufferCurrent proc near
 mov bx,word ptr wEditBufferInsertPoint
 mov di,pEditBufferStart
 add di,bx
 mov al,[di]
 ret
PointEditBufferCurrent endp

SetInsertionPointFromClick proc near

 push si
 push ax
 push bx
 push cx

 cmp cx,wEditBoxLeftPixel
 ja sipfc1
 xor ax,ax
 jmp sipfb88
sipfc1:

 sub cx,wEditBoxLeftPixel
 mov si,pEditBufferStart
sipfb3:
 lodsb
 or al,al
 jz sipfb2
 mov bx,pEditBoxFont
 cmp bDrawStringPWFlag,0
 jz sipfb0
 mov al,'*'
sipfb0:
 cmp al,' '
 je sipfb4
 jb sipfb3
 sub al,' '
 xor ah,ah
 add ax,ax
 add bx,ax
 mov bx,[bx]
 mov al,[bx]
 jmp short sipfb5
sipfb4
 mov al,[bx]
sipfb5
 xor ah,ah
 sub cx,ax
 jge sipfb3
sipfb2.

 dec si
 sub si,pEditBufferStart
 mov ax,si
sipfb88.
 mov wEditBufferInsertPoint,ax
 pop cx
 pop bx
 pop ax
 pop si
 ret
SetInsertionPointFromClick endp

StartCursor proc near
 public StartCursor
 mov si,pTabRegion
 mov bx,[si].pCurrentControl
 cmp [bx].ControlType,PWEDITBOX
 jnz sc0
 mov bDrawStringPWFlag,-1
 mov bCursorPWFlag,-1
 jmp short sc00
sc0
 mov bCursorPWFlag,0
sc00.
 mov ax,[bx].pStorageOffset
 mov pEditBufferStart,ax
 mov ax,[bx].wDataLength
 mov wEditBufferSize,ax
 mov ax,pNormFont
 mov pCurrentFont,ax
 mov wEditBufferInsertPoint,0

 mov di,offset rCursorRegion
 mov ax,[si].wCurrentTop
 inc ax
 inc ax
 inc ax
 inc ax
 mov [di].wCurrentTop,ax
 mov wEditBoxTopPixel,ax
 mov ax,[si].wCurrentBottom
 dec ax
 dec ax
 dec ax
 dec ax
 mov [di].wCurrentBottom,ax
 mov ax,[si].wCurrentRight
 sub ax,9
 mov wEditBoxRightPixel,ax
 mov ax,[si].wCurrentLeft
 add ax,8
 mov wEditBoxLeftPixel,ax

 mov cx,wPenDownColumn
 call SetInsertionPointFromClick
 call ResumeCursor
 mov bDrawStringPWFlag,0
 ret
StartCursor endp

ResumeCursor Proc Near
 public ResumeCursor
 mov al,bCursorPWFlag
 mov bDrawStringPWFlag,al

 push si
 xor ax,ax
 mov si,pTabRegion
 mov si,[si].pCurrentControl
 cmp byte ptr [si].ControlType,KEYEDITBOX
 pop si
 jnz rec1a
 mov ax,wHotKeyRightPixel
 or ax,ax
 jz rec1
 jmp rec1b
rec1a.
 call GetInsertionPixelOffset
rec1:
 add ax,wEditBoxLeftPixel
rec1b:
 mov [di].wCurrentLeft,ax
 mov [di].wCurrentRight,ax
 mov bCursorState,0
 mov bCursorActive,-1
 call ChangeCursorState
 mov bDrawStringPWFlag,0
 ret
ResumeCursor endp

StopCursor proc near
 public StopCursor

 cmp bCursorActive,0
 jz sc1
 cmp bCursorState,0
 jz sc1
 call ChangeCursorState
sc1.
 mov bCursorActive,0
 ret
StopCursor endp


end




Copr. 1995 Zenith Data Systems Corp.
.model small

include uibitequ.inc
include uiinclud.inc
DATASEG_BEGIN
extrn ControlDataStorageArea:byte


uifont0 label word
 public uifont0
 db 3
 db 16


 dw ch33,ch34,ch35,ch36,ch37,ch38,ch39
 dw
ch40,ch41,ch42,ch43,ch44,ch45,ch46,ch47,ch48,ch4
9
 dw
ch50,ch51,ch52,ch53,ch54,ch55,ch56,ch57,ch58,ch5
9
 dw
ch60,ch61,ch62,ch63,ch64,ch65,ch66,ch67,ch68,ch6
9
 dw
ch70,ch71,ch72,ch73,ch74,ch75,ch76,ch77,ch78,ch7
9
 dw
ch80,ch81,ch82,ch83,ch84,ch85,ch86,ch87,ch88,ch8
9
 dw
ch90,ch91,ch92,ch93,ch94,ch95,ch96,ch97,ch98,ch9
9
 dw
ch100,ch101,ch102,ch103,ch104,ch105,ch106,ch107
,ch108,ch109
 dw
ch110,ch111,ch112,ch113,ch114,ch115,ch116,ch117
,ch118,ch119
 dw
ch120,ch121,ch122,ch123,ch124,ch125,ch126,ch127
,ch128,ch129
 dw
ch130,ch131,ch132,ch133,ch134,ch135,ch136,ch137
,ch138,ch139
 dw
ch140,ch141,ch142,ch143,ch144,ch145,ch146,ch147
,ch148,ch149
 dw
ch150,ch151,ch152,ch153,ch154,ch155,ch156,ch157
,ch158,ch159
 dw
ch160,ch161,ch162,ch163,ch164,ch165,ch166,ch167
,ch168,ch169
 dw
ch170,ch171,ch172,ch173,ch174,ch175,ch176,ch177
,ch178,ch179
 dw
ch180,ch181,ch182,ch183,ch184,ch185,ch186,ch187
,ch188,ch189
 dw
ch190,ch191,ch192,ch193,ch194,ch195,ch196,ch197
,ch198,ch199
 dw
ch200,ch201,ch202,ch203,ch204,ch205,ch206,ch207
,ch208,ch209
 dw
ch210,ch211,ch212,ch213,ch214,ch215,ch216,ch217
,ch218,ch219
 dw
ch220,ch221,ch222,ch223,ch224,ch225,ch226,ch227
,ch228,ch229
 dw
ch230,ch231,ch232,ch233,ch234,ch235,ch236,ch237
,ch238,ch239
 dw
ch240,ch241,ch242,ch243,ch244,ch245,ch246,ch247
,ch248,ch249
 dw ch250,ch251,ch252,ch253,ch254,ch255


ch33 label byte
DB 4,021h
DB _XX_____
DB _XX_____
DB _XX_____
DB _XX_____
DB _XX_____
DB _XX_____
DB _XX_____
DB ________
DB _XX_____
DB _XX_____

ch34 label byte
DB 6,021h
DB XX__XX__
DB XX__XX__
DB XX__XX__
DB XX__XX__

ch35 label byte
DB 8,021h
DB __XX_XX_
DB __XX_XX_
DB _XXXXXXX
DB __XX_XX_
DB __XX_XX_
DB _XX_XX__
DB _XX_XX__
DB XXXXXXX_
DB _XX_XX__
DB _XX_XX__

ch36 label byte
DB 8,021h
DB ___XX___
DB __XXXX__
DB _XX__XX_
DB _XX__XX_
DB _XX_____
DB __XXXX__
DB _____XX_
DB _____XX_
DB _XX__XX_
DB __XXXX__
DB ___XX___

ch37 label byte
DB 11,022h
DB _XXX_____XX_____
DB XX_XX___XX______
DB XX_XX__X_X______
DB XX_XX_XX________
DB _XXX_XX_________
```

```
DB ___XX_X,XX_____
DB ___XX_XX_XX____
DB __XX__XX_XX____
DB _XX___XX_XX____
DB XX_____X,XX_____

ch38 label byte
DB 8,021h
DB ___XXX__
DB __XX_XX_
DB __XX_XX_
DB __XX_XX_
DB ___XXX__
DB __XXX___
DB _XX_XX_X
DB _XX__XXX
DB _XX__XX_
DB __XXXXXX

ch39 label byte
DB 4,021h
DB _XX____
DB _XX____
DB _XX____
DB _XX____

ch40 label byte
DB 4,021h
DB __XX___
DB _XX____
DB _XX____
DB _XX____
DB _XX____
DB _XX____
DB _XX____
DB _XX____
DB _XX____
DB _XX____
DB _XX____
DB _XX____
DB __XX___

ch41 label byte
DB 4,021h
DB XX_____
DB _XX____
DB _XX____
DB _XX____
DB _XX____
DB _XX____
DB _XX____
DB _XX____
DB _XX____
DB _XX____
DB _XX____
DB _XX____
DB XX_____

ch42 label byte
DB 6,021h
DB __XX___
DB XXXXXX__
DB __XX___
DB _XXXX__
DB _X__X__

ch43 label byte
DB 8,041h
DB ___XX__
DB ___XX__
DB ___XX__
DB _XXXXXX_
DB ___XX__
DB ___XX__
DB ___XX__

ch44 label byte
DB 4,0A1h
DB _XX____
DB _XX____
DB XX_____

ch45 label byte
DB 5,071h
DB XXXX___

ch46 label byte
DB 4,0A1h
DB _XX____
DB _XX____

ch47 label byte
DB 4,021h
DB __XX___
DB __XX___
DB __XX___
DB __XX___
DB _XX____
DB _XX____
DB _XX_____
DB _XX_____
DB XX______
DB XX______
DB XX______
DB XX______

ch48 label byte
DB 8,021h
DB __XXXX__
DB _XX__XX_
DB _XX__XX_
DB _XX__XX_
DB _XX__XX_
DB _XX__XX_
DB _XX__XX_
DB _XX__XX_
DB _XX__XX_
DB __XXXX__

ch49 label byte
DB 8,021h
DB ___XX___
DB _XXXX___
DB ___XX___
DB ___XX___
DB ___XX___
DB ___XX___
DB ___XX___
DB ___XX___
DB ___XX___
DB ___XX___

ch50 label byte
DB 8,021h
DB __XXXX__
DB _XX__XX_
DB _XX__XX_
DB _____XX_
DB ____XX__
DB ___XX___
DB __XX____
DB _XX_____
DB _XX_____
DB _XXXXXX_

ch51 label byte
DB 8,021h
DB __XXXX__
DB _XX__XX_
DB _____XX_
DB _____XX_
DB ___XXX__
DB _____XX_
DB _____XX_
DB _____XX_
DB _XX__XX_
DB __XXXX__

ch52 label byte
DB 8,021h
DB _____XX_
DB ____XXX_
DB ___XXXX_
DB ___XXXX_
DB __XX_XX_
DB __XX_XX_
DB _XX__XX_
DB _XXXXXX_
DB _____XX_
DB _____XX_

ch53 label byte
DB 8,021h
DB _XXXXXX_
DB _XX_____
DB _XX_____
DB _XX_____
DB _XXXXX__
DB _XX__XX_
DB _____XX_
DB _____XX_
DB _XX__XX_
DB __XXXX__

ch54 label byte
DB 8,021h
DB __XXXX__
DB _XX__XX_
DB _XX_____
DB _XX_____
DB _XXXXX__
DB _XX__XX_
DB _XX__XX_
DB _XX__XX_
DB _XX__XX_
DB __XXXX__

ch55 label byte
DB 8,021h
DB _XXXXXX_
DB _____XX_
DB ____XX_
DB ____XX_
DB ___XX__
DB ___XX__
DB ___XX__
DB __XX___
DB __XX___
DB __XX___

ch56 label byte
DB 8,021h
DB __XXXX_
DB _XX__XX_
DB _XX__XX_
DB _XX__XX_
DB __XXXX_
DB _XX__XX_
DB _XX__XX_
DB _XX__XX_
DB _XX__XX_
DB __XXXX_

ch57 label byte
DB 8,021h
DB __XXXX__
DB _XX__XX_
DB _XX__XX_
DB _XX__XX_
DB _XX__XX_
DB __XXXXX_
DB _____XX_
DB _____XX_
DB _XX__XX_
DB __XXXX__

ch58 label byte
DB 4,041h
DB _XX____
DB _XX____
DB _______
DB _______
DB _______
DB _______
DB _XX____
DB _XX____

ch59 label byte
DB 4,041h
DB _XX____
DB _XX____
DB _______
DB _______
DB _______
DB _______
DB _XX____
DB _XX____
DB XX_____

ch60 label byte
DB 8,031h
DB _____XX_
DB ____XX__
DB ___XX___
DB __XX____
DB _XX_____
DB __XX____
DB ___XX___
DB ____XX__
DB _____XX_

ch61 label byte
DB 8,051h
DB _XXXXXX_
DB ________
DB ________
DB _XXXXXX_

ch62 label byte
DB 8,031h
DB _XX_____
DB __XX____
DB ___XX___
DB ____XX__
DB _____XX_
DB ____XX__
DB ___XX___
DB __XX____
DB _XX_____

ch63 label byte
DB 8,021h
DB __XXXX__
DB _XX__XX_
DB _XX__XX_
DB _____XX_
DB ____XX__
DB ___XX___
DB ___XX___
DB ________
DB ___XX___
DB ___XX___

ch64 label byte
DB 14,012h
DB _____XXX,X______
DB ___XXX__XXX_____
DB __XX_______XX____
DB __XX__XX,X_XX____
DB _XX__XX_XX_XX___
DB _XX__XX_XX_XX___
DB _XX_XX__XX_XX___
DB _XX_XX_X,X__XX___
DB _XX_XX_X,X__XX___
DB __XX_XX_XXXX____
DB __XX____________
DB ___XXX___XXX____
DB _____XXX,XX______

ch65 label byte
DB 8,021h
DB ___XX___
DB ___XX___
DB __XXXX__
DB __XXXX__
DB __X__X__
DB _XX__XX_
DB _XX__XX_
DB _XXXXXX_
DB XX____XX
DB XX____XX

ch66 label byte
DB 10,022h
DB _XXXXXXX,_______
DB _XX____X,X______
DB _XX____X,X______
DB _XX____X,X______
DB _XXXXXXX,_______
DB _XX____X,X______
DB _XX____X,X______
DB _XX____X,X______
DB _XX____X,X______
DB _XXXXXXX,_______

ch67 label byte
DB 9,021h
DB ___XXXX_
DB __XX__XX
DB _XX____X
DB _XX_____
DB _XX_____
DB _XX_____
DB _XX_____
DB _XX____X
DB __XX__XX
DB ___XXXX_

ch68 label byte
DB 10,022h
DB _XXXXXX_,_______
DB _XX___XX,_______
DB _XX____X,X______
DB _XX____X,X______
DB _XX____X,X______
DB _XX____X,X______
DB _XX____X,X______
DB _XX____X,X______
DB _XX___XX,_______
DB _XXXXXX_,_______

ch69 label byte
DB 9,021h
DB _XXXXXXX
DB _XX_____
DB _XX_____
DB _XX_____
DB _XXXXXX_
DB _XX_____
DB _XX_____
DB _XX_____
DB _XX_____
DB _XXXXXXX

ch70 label byte
DB 9,021h
DB _XXXXXXX
DB _XX_____
DB _XX_____
DB _XX_____
DB _XXXXXX_
DB _XX_____
DB _XX_____
DB _XX_____
DB _XX_____
DB _XX_____
```

```
ch71 label byte
DB 10,022h
DB ___XXXXX________
DB __XX___X.X______
DB _XX_____X_______
DB _XX_____________
DB _XX_____________
DB _XX__XXX.X______
DB _XX____X.X______
DB _XX____X.X______
DB __XX___X.X______
DB ___XXXX_X_______

ch72 label byte
DB 10,022h
DB _XX____X.X______
DB _XX____X.X______
DB _XX____X.X______
DB _XX____X.X______
DB _XXXXXXXX.X_____
DB _XX____X.X______
DB _XX____X.X______
DB _XX____X.X______
DB _XX____X.X______
DB _XX____X.X______

ch73 label byte
DB 4,021h
DB _XX_____
DB _XX_____
DB _XX_____
DB _XX_____
DB _XX_____
DB _XX_____
DB _XX_____
DB _XX_____
DB _XX_____
DB _XX_____

ch74 label byte
DB 7,021h
DB ____XX__
DB ____XX__
DB ____XX__
DB ____XX__
DB ____XX__
DB ____XX__
DB ____XX__
DB XX__XX__
DB XX__XX__
DB _XXXX___

ch75 label byte
DB 9,022h
DB _XX___XX_________
DB _XX__XX__________
DB _XX_XX___________
DB _XXXX____________
DB _XXX_____________
DB _XXXX____________
DB _XX_XX___________
DB _XX__XX__________
DB _XX___XX_________
DB _XX____X.X_______

ch76 label byte
DB 8,021h
DB _XX_____
DB _XX_____
DB _XX_____
DB _XX_____
DB _XX_____
DB _XX_____
DB _XX_____
DB _XX_____
DB _XX_____
DB _XXXXXXX

ch77 label byte
DB 12,022h
DB _XX______XX_____
DB _XX______XX_____
DB _XXX____XXX_____
DB _XXX____XXX_____
DB _XXXX__X.XXX_____
DB _XXXX__X.XXX_____
DB _XX_XXXX_XX_____
DB _XX_XXXX_XX_____
DB _XX__XX__XX_____
DB _XX__XX__XX_____

ch78 label byte
DB 10,022h
DB _XX____X.X_______
DB _XXX___X.X_______
DB _XXXX__X.X_______
DB _XXXX__X.X_______
DB _XX_XX_X.X_______
DB _XX_XX_X.X_______
DB _XX__XXX.X_______
DB _XX__XXX.X_______
DB _XX___XX.X_______
DB _XX____X.X_______

ch79 label byte
DB 10,022h
DB ___XXXX_________
DB __XX__XX________
DB _XX____X.X______
DB _XX____X.X______
DB _XX____X.X______
DB _XX____X.X______
DB _XX____X.X______
DB _XX____X.X______
DB __XX__XX________
DB ___XXXX_________

ch80 label byte
DB 9,022h
DB _XXXXXXX_________
DB _XX____X.X_______
DB _XX____X.X_______
DB _XX____X.X_______
DB _XX____X.X_______
DB _XXXXXXX_________
DB _XX______________
DB _XX______________
DB _XX______________
DB _XX______________

ch81 label byte
DB 10,022h
DB ___XXXX__________
DB __XX__XX_________
DB _XX____X.X_______
DB _XX____X.X_______
DB _XX____X.X_______
DB _XX____X.X_______
DB _XX____X.X_______
DB _XX__XXX.X_______
DB __XX__XX_________
DB ___XXXXX.X_______

ch82 label byte
DB 10,022h
DB _XXXXXXX_________
DB _XX____X.X_______
DB _XX____X.X_______
DB _XX____X.X_______
DB _XX____X.X_______
DB _XXXXXXX_________
DB _XX____X.X_______
DB _XX____X.X_______
DB _XX____X.X_______
DB _XX_____XX_______

ch83 label byte
DB 8,021h
DB __XXXXX_
DB _XX___XX
DB _XX___XX
DB _XX_____
DB __XXX___
DB ____XXX_
DB ______XX
DB _XX___XX
DB _XX___XX
DB __XXXXX_

ch84 label byte
DB 8,021h
DB XXXXXXXX
DB ___XX___
DB ___XX___
DB ___XX___
DB ___XX___
DB ___XX___
DB ___XX___
DB ___XX___
DB ___XX___
DB ___XX___

ch85 label byte
DB 10,022h
DB _XX____X.X_______
DB _XX____X.X_______
DB _XX____X.X_______
DB _XX____X.X_______
DB _XX____X.X_______
DB _XX____X.X_______
DB _XX____X.X_______
DB _XX____X.X_______
DB __XX__XX_________
DB ___XXXX__________

ch86 label byte
DB 8,021h
DB XX____XX
DB _XX__XX_
DB _XX__XX_
DB _XX__XX_
DB __X__X__
DB __XXXX__
DB __XXXX__
DB ___XX___
DB ___XX___

ch87 label byte
DB 14,022h
DB XX___XX___XX_
DB XX___XX___XX_
DB XX___XX___XX_
DB _XX__XXXX_XX_
DB _XX__XXXX_XX_
DB __XX_X__X_XX_
DB __XXXX__XXXX_
DB ___XX___XX___
DB ___XX___XX___
DB ___XX___XX___

ch88 label byte
DB 9,022h
DB XX_____X.X_____
DB XX_____X.X_____
DB _XX___XX_______
DB __XX_XX________
DB ___XXX_________
DB ___XXX_________
DB __XX_XX________
DB _XX___XX_______
DB XX_____X.X_____
DB XX_____X.X_____

ch89 label byte
DB 10,022h
DB XX______XX_____
DB XX______XX_____
DB _XX____X.X_____
DB __XX__XX_______
DB ___XXXX________
DB _____XX________
DB _____XX________
DB _____XX________
DB _____XX________
DB _____XX________

ch90 label byte
DB 9,022h
DB XXXXXXXXX.X____
DB _______X.X_____
DB ______XX_______
DB _____XX________
DB ____XX_________
DB ___XX__________
DB __XX___________
DB _XX____________
DB XX_____________
DB XXXXXXXXX.X____

ch91 label byte
DB 4,021h
DB _XXX___
DB _XX____
DB _XX____
DB _XX____
DB _XX____
DB _XX____
DB _XX____
DB _XX____
DB _XX____
DB _XX____
DB _XX____
DB _XX____
DB _XXX___

ch92 label byte
DB 4,021h
DB XX_____
DB XX_____
DB XX_____
DB XX_____
DB _XX____
DB _XX____
DB _XX____
DB _XX____
DB __XX___
DB __XX___
DB __XX___
DB __XX___

ch93 label byte
DB 4,021h
DB XXX____
DB _XX____
DB _XX____
DB _XX____
DB _XX____
DB _XX____
DB _XX____
DB _XX____
DB _XX____
DB _XX____
DB _XX____
DB _XX____
DB XXX____

ch94 label byte
DB 5,021h
DB __X_____
DB _XXX____
DB XX_XX___

ch95 label byte
DB 8,0E1h
DB XXXXXXXX

ch96 label byte
DB 5,011h
DB _XXX____
DB __XX____
DB ___XX___

ch97 label byte
DB 8,051h
DB __XXXX__
DB _XX__XX_
DB ___XXXX_
DB __XX_XX_
DB _XX__XX_
DB _XX__XX_
DB __XXXXX_

ch98 label byte
DB 8,021h
DB _XX_____
DB _XX_____
DB _XX_____
DB _XXXXX__
DB _XX__XX_
DB _XX__XX_
DB _XX__XX_
DB _XX__XX_
DB _XX__XX_
DB _XXXXX__

ch99 label byte
DB 7,051h
DB __XXXX__
DB _XX__XX_
DB _XX_____
DB _XX_____
DB _XX_____
DB _XX__XX_
DB __XXXX__

ch100 label byte
DB 8,021h
DB _____XX_
DB _____XX_
DB _____XX_
DB __XXXXX_
DB _XX__XX_
DB _XX__XX_
DB _XX__XX_
DB _XX__XX_
DB _XX__XX_
DB __XXXXX_

ch101 label byte
DB 8,051h
DB __XXXX__
DB _XX__XX_
DB _XXXXXX_
DB _XX_____
DB _XX_____
DB _XX__XX_
DB __XXXX__

ch102 label byte
DB 4,021h
DB __XX____
DB _XX_____
DB _XX_____
DB XXXX____
DB _XX_____
DB _XX_____
DB _XX_____
DB _XX_____
DB _XX_____
DB _XX_____

ch103 label byte
DB 8,051h
DB __XXXXX_
DB _XX__XX_
```

DB _XX__XX_
DB _XX__XX_
DB _XX__XX_
DB _XX__XX_
DB __XXXXX_
DB _____XX_
DB _XX__XX_
DB __XXXX__ ch104 label byte
DB 8,021h
DB _XX_____
DB _XX_____
DB _XX_____
DB _XXXXX__
DB _XX__XX_
DB _XX__XX_
DB _XX__XX_
DB _XX__XX_
DB _XX__XX_
DB _XX__XX_ ch105 label byte
DB 4,021h
DB _XX_____
DB _XX_____
DB ________
DB _XX_____
DB _XX_____
DB _XX_____
DB _XX_____
DB _XX_____
DB _XX_____
DB _XX_____ ch106 label byte
DB 4,021h
DB _XX_____
DB _XX_____
DB ________
DB _XX_____
DB _XX_____
DB _XX_____
DB _XX_____
DB _XX_____
DB _XX_____
DB _XX_____
DB _XX_____
DB _XX_____
DB XX_____ ch107 label byte
DB 7,021h
DB _XX_____
DB _XX_____
DB _XX_____
DB _XX__XX_
DB _XX_XX__
DB _XXXX___
DB _XXX____
DB _XXXX___
DB _XX_XX__
DB _XX__XX_ ch108 label byte
DB 4,021h
DB _XX_____
DB _XX_____
DB _XX_____
DB _XX_____
DB _XX_____
DB _XX_____
DB _XX_____
DB _XX_____
DB _XX_____
DB _XX_____ ch109 label byte
DB 12,052h
DB _XXXXXXX.XX_____
DB _XX__XX__XX_____
DB _XX__XX__XX_____
DB _XX__XX__XX_____
DB _XX__XX__XX_____
DB _XX__XX__XX_____
DB _XX__XX__XX_____ ch110 label byte
DB 8,051h
DB _XXXXX__
DB _XX__XX_
DB _XX__XX_
DB _XX__XX_
DB _XX__XX_
DB _XX__XX_
DB _XX__XX_ ch111 label byte
DB 8,051h

DB __XXXX__
DB _XX__XX_
DB _XX__XX_
DB _XX__XX_
DB _XX__XX_
DB _XX__XX_
DB __XXXX__ ch112 label byte
DB 8,051h
DB _XXXXX__
DB _XX__XX_
DB _XX__XX_
DB _XX__XX_
DB _XX__XX_
DB _XX__XX_
DB _XXXXX__
DB _XX_____
DB _XX_____
DB _XX_____ ch113 label byte
DB 8,051h
DB __XXXXX_
DB _XX__XX_
DB _XX__XX_
DB _XX__XX_
DB _XX__XX_
DB _XX__XX_
DB __XXXXX_
DB _____XX_
DB _____XX_
DB _____XX_ ch114 label byte
DB 5,051h
DB _XXXX___
DB _XXX____
DB _XX_____
DB _XX_____
DB _XX_____
DB _XX_____
DB _XX_____ ch115 label byte
DB 8,051h
DB __XXXX__
DB _XX__XX_
DB _XX_____
DB __XXXX__
DB _____XX_
DB _XX__XX_
DB __XXXX__ ch116 label byte
DB 4,031h
DB _XX_____
DB _XX_____
DB XXXX____
DB _XX_____
DB _XX_____
DB _XX_____
DB _XX_____
DB _XX_____
DB __XX____ ch117 label byte
DB 8,051h
DB _XX__XX_
DB _XX__XX_
DB _XX__XX_
DB _XX__XX_
DB _XX__XX_
DB _XX__XX_
DB __XXXXX_ ch118 label byte
DB 8,051h
DB XX____XX
DB XX____XX
DB _XX__XX_
DB _XX__XX_
DB __XXXX__
DB __XXX___
DB ___XX__ ch119 label byte
DB 10,052h
DB XX_____XX_____
DB XX__XX__XX_____
DB _XX_XX_X.X_____
DB _XX_XX_X.X_____
DB _XXXXXXX.X_____
DB __XX__XX_____
DB __XX__XX_____ ch120 label byte
DB 8,051h
DB XX____XX

DB _XX__XX_
DB __XXXX__
DB ___XX___
DB __XXXX__
DB _XX__XX_
DB XX____XX ch121 label byte
DB 8,051h
DB XX____XX
DB XX____XX
DB _XX__XX_
DB _XX__XX_
DB __XXXX__
DB __XXXX__
DB ___XX___
DB ___XX___
DB __XX____
DB _XX_____ ch122 label byte
DB 8,051h
DB _XXXXXX_
DB _____XX_
DB ____XX__
DB ___XX___
DB __XX____
DB _XX_____
DB _XXXXXX_ ch123 label byte
DB 5,021h
DB ___XX___
DB __XX____
DB __XX____
DB __XX____
DB __XX____
DB __XX____
DB _XX_____
DB __XX____
DB __XX____
DB __XX____
DB __XX____
DB __XX____
DB ___XX___ ch124 label byte
DB 4,021h
DB _XX_____
DB _XX_____
DB _XX_____
DB _XX_____
DB _XX_____
DB _XX_____
DB _XX_____
DB _XX_____
DB _XX_____
DB _XX_____
DB _XX_____
DB _XX_____
DB _XX_____ ch125 label byte
DB 5,021h
DB XX______
DB _XX_____
DB _XX_____
DB _XX_____
DB _XX_____
DB _XX_____
DB __XX____
DB _XX_____
DB _XX_____
DB _XX_____
DB _XX_____
DB _XX_____
DB XX______ ch126 label byte
DB 5,021h
DB XXX_X___
DB X_XXX___ ch127 label byte
DB 4,031h
DB _XX_____
DB _XX_____
DB _XX_____
DB _XX_____
DB _XX_____
DB _XX_____
DB _XX_____
DB _XX_____
DB _XX_____ ch128 label byte
DB 9,021h
DB ___XXXX_
DB __XX__XX

DB _XX____X
DB _XX_____
DB _XX_____
DB _XX_____
DB _XX_____
DB _XX____X
DB __XX__XX
DB ___XXXX_
DB ____XX__
DB _____XX_
DB ___XXX__ ch129 label byte
DB 8,021h
DB _XX__XX_
DB _XX__XX_
DB ________
DB _XX__XX_
DB _XX__XX_
DB _XX__XX_
DB _XX__XX_
DB _XX__XX_
DB _XX__XX_
DB __XXXXX_ ch130 label byte
DB 8,011h
DB ___XXX__
DB ___XX___
DB __XX____
DB ________
DB __XXXX__
DB _XX__XX_
DB _XXXXXX_
DB _XX_____
DB _XX_____
DB _XX__XX_
DB __XXXX__ ch131 label byte
DB 8,011h
DB ___XX___
DB __XXXX__
DB _XX__XX_
DB ________
DB __XXXX__
DB _XX__XX_
DB ___XXXX_
DB __XX_XX_
DB _XX__XX_
DB _XX__XX_
DB __XXXXX_ ch132 label byte
DB 8,021h
DB _XX__XX_
DB _XX__XX_
DB ________
DB __XXXX__
DB _XX__XX_
DB ___XXXX_
DB __XX_XX_
DB _XX__XX_
DB _XX__XX_
DB __XXXXX_ ch133 label byte
DB 8,011h
DB __XXX___
DB ___XX___
DB ____XX__
DB ________
DB __XXXX__
DB _XX__XX_
DB ___XXXX_
DB __XX_XX_
DB _XX__XX_
DB _XX__XX_
DB __XXXXX_ ch134 label byte
DB 8,011h
DB ___XX___
DB __XXXX__
DB ___XX___
DB ________
DB __XXXX__
DB _XX__XX_
DB ___XXXX_
DB __XX_XX_
DB _XX__XX_
DB _XX__XX_
DB __XXXXX_ ch135 label byte
DB 7,051h
DB __XXXX__
DB _XX__XX_
DB _XX_____

```
DB _XX_____
DB _XX_____
DB _XX__XX_
DB __XXXX__
DB ___XX___
DB ____XX__
DB __XXX___

ch136 label byte
DB 8,011h
DB ___XX___
DB __XXXX__
DB _XX__XX_
DB ________
DB __XXXX__
DB _XX__XX_
DB _XXXXXX_
DB _XX_____
DB _XX_____
DB _XX__XX_
DB __XXXX__

ch137 label byte
DB 8,021h
DB _XX__XX_
DB _XX__XX_
DB ________
DB __XXXX__
DB _XX__XX_
DB _XXXXXX_
DB _XX_____
DB _XX_____
DB _XX__XX_
DB __XXXX__

ch138 label byte
DB 8,011h
DB __XXX___
DB ___XX___
DB ____XX__
DB ________
DB __XXXX__
DB _XX__XX_
DB _XXXXXX_
DB _XX_____
DB _XX_____
DB _XX__XX_
DB __XXXX__

ch139 label byte
DB 4,021h
DB X__X____
DB X__X____
DB ________
DB _XX_____
DB _XX_____
DB _XX_____
DB _XX_____
DB _XX_____
DB _XX_____
DB _XX_____

ch140 label byte
DB 4,011h
DB _XX_____
DB XXXX____
DB ________
DB ________
DB _XX_____
DB _XX_____
DB _XX_____
DB _XX_____
DB _XX_____
DB _XX_____
DB _XX_____

ch141 label byte
DB 4,011h
DB XXX_____
DB _XX_____
DB __XX____
DB ________
DB _XX_____
DB _XX_____
DB _XX_____
DB _XX_____
DB _XX_____
DB _XX_____
DB _XX_____

ch142 label byte
DB 8,001h
DB _XX__XX_
DB ________
DB ___XX___
DB ___XX___
DB __XXXX__
DB __XXXX__
DB __X__X__

DB _XX__XX_
DB _XX__XX_
DB _XXXXXX_
DB XX____XX
DB XX____XX

ch143 label byte
DB 8,001h
DB __XXXX__
DB ___XX___
DB ________
DB ___XX___
DB ___XX___
DB __XXXX__
DB __X__X__
DB _XX__XX_
DB _XX__XX_
DB _XXXXXX_
DB XX____XX
DB XX____XX

ch144 label byte
DB 8,001h
DB ____XX__
DB ___XX___
DB _XXXXXXX
DB _XX_____
DB _XX_____
DB _XX_____
DB _XXXXXX_
DB _XX_____
DB _XX_____
DB _XX_____
DB _XX_____
DB _XXXXXXX

ch145 label byte
DB 12,052h
DB __XXXXXX.XX______
DB _XX__XX_._XX_____
DB ___XXXXX.XXX_____
DB __XX_XX_._______
DB _XX__XX_._______
DB _XX__XX_._XX____
DB __XXXXXX.XX_____

ch146 label byte
DB 13,022h
DB ___XXXXX.XXXX____
DB ___XXXX_._______
DB __XX_XX_._______
DB __XX_XX_._______
DB __XX_XXX.XXX_____
DB _XX__XX_._______
DB _XX__XX_._______
DB _XXXXXX_._______
DB XX___XX_._______
DB XX___XXX.XXXX____

ch147 label byte
DB 8,011h
DB ___XX___
DB __XXXX__
DB _XX__XX_
DB ________
DB __XXXX__
DB _XX__XX_
DB _XX__XX_
DB _XX__XX_
DB _XX__XX_
DB _XX__XX_
DB __XXXX__

ch148 label byte
DB 8,021h
DB _XX__XX_
DB _XX__XX_
DB ________
DB __XXXX__
DB _XX__XX_
DB _XX__XX_
DB _XX__XX_
DB _XX__XX_
DB _XX__XX_
DB __XXXX__

ch149 label byte
DB 8,011h
DB __XXX___
DB ___XX___
DB ____XX__
DB ________
DB __XXXX__
DB _XX__XX_
DB _XX__XX_
DB _XX__XX_
DB _XX__XX_
DB _XX__XX_
DB __XXXX__

ch150 label byte
DB 8,011h
DB __XX____
DB __XXXX__
DB _XX__XX_
DB
DB _XX__XX_
DB _XX__XX_
DB _XX__XX_
DB _XX__XX_
DB _XX__XX_
DB _XX__XX_
DB __XXXXX_

ch151 label byte
DB 8,011h
DB __XXX___
DB __XX____
DB ___XX___
DB
DB _XX__XX_
DB _XX__XX_
DB _XX__XX_
DB _XX__XX_
DB _XX__XX_
DB _XX__XX_
DB __XXXXX_

ch152 label byte
DB 8,021h
DB _XX__XX_
DB _XX__XX_
DB ________
DB XX____XX
DB XX____XX
DB _XX__XX_
DB _XX__XX_
DB __XXXX__
DB __XXXX__
DB __XX____
DB __XX____
DB __XX____
DB _XX_____

ch153 label byte
DB 10,802h
DB __XX__XX_______
DB ______________
DB __XXXX________
DB __XX__XX_______
DB _XX____XX______
DB _XX____XX______
DB _XX____XX______
DB _XX____XX______
DB _XX____XX______
DB _XX____XX______
DB __XX__XX_______
DB __XXXX________

ch154 label byte
DB 10,802h
DB __XX__XX_______
DB ______________
DB _XX____XX______
DB _XX____XX______
DB _XX____XX______
DB _XX____XX______
DB _XX____XX______
DB _XX____XX______
DB _XX____XX______
DB _XX____XX______
DB __XX__XX_______
DB __XXXX________

ch155 label byte
DB 8,041h
DB ___XX___
DB __XXXX__
DB _XX_XXX_
DB _XX_X___
DB _XX_X___
DB _XXX____
DB _XXX_XX_
DB __XXXX__
DB __XX____

ch156 label byte
DB 8,021h
DB __XXX___
DB _XX_XX__
DB _XX_____
DB _XX_____
DB __XX____
DB _XXXX___
DB __XX____
DB _XX_____
DB _XX__XX_
DB _XXXXX__

ch157 label byte
DB 8,021h
DB XX____XX
DB XX____XX
DB _XX__XX_
DB _XX__XX_
DB XXXXXXXX
DB ___XX___
DB XXXXXXXX
DB ___XX___
DB ___XX___
DB ___XX___

ch158 label byte
DB 8,051h
DB _XXXXX__
DB _XX__XX_
DB _XX__XX_
DB _XX__XX_
DB _XX__XX_
DB _XX__XX_
DB _XXXXX__
DB _XX_____
DB _XX_____
DB _XX_____

ch159 label byte
DB 4,021h
DB __XX____
DB _XX_____
DB _XX_____
DB XXXX____
DB _XX_____
DB _XX_____
DB _XX_____
DB _XX_____
DB _XX_____
DB _XX_____

ch160 label byte
DB 8,011h
DB ___XXX__
DB ___XX___
DB __XX____
DB ________
DB __XXXX__
DB _XX__XX_
DB ___XXXX_
DB __XX_XX_
DB _XX__XX_
DB _XX__XX_
DB __XXXXX_

ch161 label byte
DB 4,011h
DB _XXX____
DB _XX_____
DB XX______
DB ________
DB _XX_____
DB _XX_____
DB _XX_____
DB _XX_____
DB _XX_____
DB _XX_____
DB _XX_____

ch162 label byte
DB 8,011h
DB ___XXX__
DB ___XX___
DB __XX____
DB ________
DB __XXXX__
DB _XX__XX_
DB _XX__XX_
DB _XX__XX_
DB _XX__XX_
DB _XX__XX_
DB __XXXX__

ch163 label byte
DB 8,011h
DB ___XXX__
DB ___XX___
DB __XX____
DB ________
DB _XX__XX_
DB _XX__XX_
DB _XX__XX_
DB _XX__XX_
DB _XX__XX_
DB _XX__XX_
DB __XXXXX_

ch164 label byte
DB 8,021h
DB _XXXX_X_
DB _X_XXXX_
```

```
DB ________
DB _XXXXX__
DB _XX__XX_
DB _XX__XX_
DB _XX__XX_
DB _XX__XX_
DB _XX__XX_
DB _XX__XX_

ch165 label byte
DB 10,002h
DB __X_XXXX________
DB ________________
DB _XX____X.X_______
DB _XXX___X.X_______
DB _XXXX__X.X_______
DB _XXXX__X.X_______
DB _XX_XX_X.X_______
DB _XX_XX_X.X_______
DB _XX__XXX.X_______
DB _XX__XXX.X_______
DB _XX___XX.X_______
DB _XX____X.X_______

ch166 label byte
DB 5,021h
DB __X_____
DB ___X____
DB __XX____
DB _X_X____
DB __XX____
DB ________
DB _XXX____

ch167 label byte
DB 5,021h
DB _XXX____
DB _X_X____
DB _X_X____
DB _X_X____
DB _XXX____
DB ________
DB _XXX____

ch168 label byte
DB 8,021h
DB ___XX___
DB ___XX___
DB ________
DB ___XX___
DB ___XX___
DB __XX____
DB _XX_____
DB _XX__XX_
DB _XX__XX_
DB __XXXX__

ch169 label byte
DB 8,0E1h
DB XXXXXXXX

ch170 label byte
DB 8,061h
DB _XXXXXX_
DB _____XX_
DB _____XX_

ch171 label byte
DB 11,022h
DB __XX_____XX_____
DB _XXX____XX______
DB __XX___X.X______
DB __XX__XX._______
DB __XX_XX.________
DB ____XX_X.X______
DB ___XX_X_XX______
DB __XX____XX______
DB _XX____X.X______
DB XX____XX.XX_____

ch172 label byte
DB 11,022h
DB __XX_____XX_____
DB _XXX____XX______
DB __XX___X.X______
DB __XX__XX._______
DB __XX_XX.________
DB ____XX__XX______
DB ___XX__X.XX_____
DB __XX__XX._X_____
DB _XX___XX.XX_____
DB XX_______XX_____

ch173 label byte
DB 4,021h
DB _XX_____
DB _XX_____
DB ________
DB _XX_____

DB _XX_____
DB _XX_____
DB _XX_____
DB _XX_____
DB _XX_____
DB _XX_____

ch174 label byte
DB 7,061h
DB __XX_XX_
DB _XX_XX__
DB XX_XX___
DB _XX_XX__
DB __XX_XX_

ch175 label byte
DB 7,061h
DB XX_XX___
DB _XX_XX__
DB __XX_XX_
DB _XX_XX__
DB XX_XX___

ch176 label byte
DB 8,0E1h
DB XXXXXXXX

ch177 label byte
DB 8,0E1h
DB XXXXXXXX

ch178 label byte
DB 8,0E1h
DB XXXXXXXX

ch179 label byte
DE - 021h
DB _XX_____
DB _XX_____
DB _XX_____
DB _XX_____
DB _XX_____
DB _XX_____
DB ________
DB _XX_____
DB _XX_____
DB _XX_____
DB _XX_____
DB _XX_____
DB _XX_____

ch180 label byte
DB 8,0E1h
DB XXXXXXXX

ch181 label byte
DB 8,0E1h
DB XXXXXXXX

ch182 label byte
DB 8,0E1h
DB XXXXXXXX

ch183 label byte
DB 8,0E1h
DB XXXXXXXX

ch184 label byte
DB 8,0E1h
DB XXXXXXXX

ch185 label byte
DB 8,0E1h
DB XXXXXXXX

ch 1.1 label byte
DB ?,0E1h
DB XXXXXXXX

ch187 label byte
DB 8,0E1h
DB XXXXXXXX

ch188 label byte
DB 8,0E1h
DB XXXXXXXX

ch189 label byte
DB 8,0E1h
DB XXXXXXXX

ch190 label byte
DB 8,0E1h
DB XXXXXXXX

ch191 label byte
DB 8,0E1h
DB XXXXXXXX

ch192 label byte
DB 8,0E1h
DB XXXXXXXX

ch193 label byte
DB 8,0E1h
DB XXXXXXXX

ch194 label byte
DB 8,0E1h
DB XXXXXXXX

ch195 label byte
DB 8,0E1h
DB XXXXXXXX

ch196 label byte
DB 8,0E1h
DB XXXXXXXX

ch197 label byte
DB 8,0E1h
DB XXXXXXXX

ch198 label byte
DB 8,0E1h
DB XXXXXXXX

ch199 label byte
DB 8,0E1h
DB XXXXXXXX

ch200 label byte
DB 8,0E1h
DB XXXXXXXX

ch201 label byte
DB 8,0E1h
DB XXXXXXXX

ch202 label byte
DB 8,0E1h
DB XXXXXXXX

ch203 label byte
DB 8,0E1h
DB XXXXXXXX

ch204 label byte
DB 8,0E1h
DB XXXXXXXX

ch205 label byte
DB 8,0E1h
DB XXXXXXXX

ch206 label byte
DB 8,0E1h
DB XXXXXXXX

ch207 label byte
DB 8,0E1h
DB XXXXXXXX

ch208 label byte
DB 8,0E1h
DB XXXXXXXX

ch209 label byte
DB 8,0E1h
DB XXXXXXXX

ch210 label byte
DB 8,0E1h
DB XXXXXXXX

ch211 label byte
DB 8,0E1h
DB XXXXXXXX

ch212 label byte
DB 8,0E1h
DB XXXXXXXX

ch213 label byte
DB 8,0E1h
DB XXXXXXXX

ch214 label byte
DB 8,0E1h
DB XXXXXXXX

ch215 label byte
DB 8,0E1h
DB XXXXXXXX

ch216 label byte
DB 8,0E1h
DB XXXXXXXX

ch217 label byte
DB 8,0E1h
DB XXXXXXXX

ch218 label byte
DB 8,0E1h
DB XXXXXXXX

ch219 label byte
DB 8,0E1h
DB XXXXXXXX

ch220 label byte
DB 8,0E1h
DB XXXXXXXX

ch221 label byte
DB 8,0E1h
DB XXXXXXXX

ch222 label byte
DB 8,0E1h
DB XXXXXXXX

ch223 label byte
DB 8,0E1h
DB XXXXXXXX

ch224 label byte
DB 8,0E1h
DB XXXXXXXX

ch225 label byte
DB 9,021h
DB __XXXX__
DB _XX__XX_
DB _XX__XX_
DB _XX__XX_
DB _XX_XX__
DB _XX__XX_
DB _XX__XX_
DB _XX__XX_
DB _XX__XX_
DB _XX_XX__

ch226 label byte
DB 8,0E1h
DB XXXXXXXX

ch227 label byte
DB 7,021h
DB __XXXX__
DB _XXXXX__
DB _XXXXX__
DB _XXXXX__
DB _XXXXX__
DB __XXXX__
DB ____XX__
DB ____XX__
DB ____XX__
DB ____XX__

ch228 label byte
DB 8,0E1h
DB XXXXXXXX

ch229 label byte
DB 8,0E1h
DB XXXXXXXX

ch230 label byte
DB 8,041h
DB _XX__XX_
DB _XX__XX_
DB _XX__XX_
DB _XX__XX_
DB _XX__XX_
DB _XX__XX_
DB _XX__XX_
DB _XXXXXXX
DB _XX_____
DB _XX_____
DB _XX_____

ch231 label byte
DB 8,0E1h
DB XXXXXXXX

ch232 label byte
DB 8,0E1h
DB XXXXXXXX

ch233 label byte
DB 8,0E1h
DB XXXXXXXX

ch234 label byte
DB 8,0E1h
DB XXXXXXXX
```

```
ch235 label byte
DB 8,0E1h
DB XXXXXXXX

ch236 label byte
DB 8,0E1h
DB XXXXXXXX

ch237 label byte
DB 10,022h
DB ___XXXXX_X_______
DB __XX__XX_________
DB _XX___XX_X_______
DB _XX__XXX_X_______
DB _XX_XX_X_X_______
DB _XX_XX_XX________
DB _XXXX__X_X_______
DB _XXX___X_X_______
DB __XX__XX_________
DB _XXXXXX__________

ch238 label byte
DB 8,0E1h
DB XXXXXXXX

ch239 label byte
DB 8,0E1h
DB XXXXXXXX

ch240 label byte
DB 8,0E1h
DB XXXXXXXX

ch241 label byte
DB 8,051h
DB ___XX___
DB ___XX___
DB _XXXXXX_
DB ___XX___
DB ___XX___
DB ________
DB _XXXXXX_

ch242 label byte
DB 8,0E1h
DB XXXXXXXX

ch243 label byte
DB 8,0E1h
DB XXXXXXXX

ch244 label byte
DB 8,0E1h
DB XXXXXXXX

ch245 label byte
DB 8,0E1h
DB XXXXXXXX

ch246 label byte
DB 8,0E1h
DB XXXXXXXX

ch247 label byte
DB 8,0E1h
DB XXXXXXXX

ch248 label byte
DB 5,021h
DB _XXX____
DB _X_X____
DB _X_X____
DB _XXX____

ch249 label byte
DB 4,061h
DB _XX_____
DB _XX_____

ch250 label byte
DB 4,061h
DB _XX_____
DB _XX_____

ch251 label byte
DB 8,0E1h
DB XXXXXXXX

ch252 label byte
DB 8,051h
DB _XXXXX__
DB _XX__XX_
DB _XX__XX_
DB _XX__XX_
DB _XX__XX_
DB _XX__XX_
DB _XX__XX_

ch253 label byte
DB 4,021h
DB _XX_____
DB X_XX____
DB __XX____
DB _XX_____
DB XXXX____

ch254 label byte
DB 8,0E1h
DB XXXXXXXX
ch255 label byte

DATASEG_END
end
Copr. 1995 Zenith Data Systems Corp.

.model small

include uibitequ.inc
include uiinclud.inc
DATASEG_BEGIN
extrn ControlDataStorageArea:byte

uifont1 label word
 public uifont1
 db 2
 db 10

 dw ch33,ch34,ch35,ch36,ch37,ch38,ch39
 dw
ch40,ch41,ch42,ch43,ch44,ch45,ch46,ch47,ch48,ch49
 dw
ch50,ch51,ch52,ch53,ch54,ch55,ch56,ch57,ch58,ch59
 dw
ch60,ch61,ch62,ch63,ch64,ch65,ch66,ch67,ch68,ch69
 dw
ch70,ch71,ch72,ch73,ch74,ch75,ch76,ch77,ch78,ch79
 dw
ch80,ch81,ch82,ch83,ch84,ch85,ch86,ch87,ch88,ch89
 dw
ch90,ch91,ch92,ch93,ch94,ch95,ch96,ch97,ch98,ch99
 dw
ch100,ch101,ch102,ch103,ch104,ch105,ch106,ch107
,ch108,ch109
 dw
ch110,ch111,ch112,ch113,ch114,ch115,ch116,ch117
,ch118,ch119
 dw
ch120,ch121,ch122,ch123,ch124,ch125,ch126,ch127
,ch128,ch129
 dw
ch130,ch131,ch132,ch133,ch134,ch135,ch136,ch137
,ch138,ch139
 dw
ch140,ch141,ch142,ch143,ch144,ch145,ch146,ch147
,ch148,ch149
 dw
ch150,ch151,ch152,ch153,ch154,ch155,ch156,ch157
,ch158,ch159
 dw
ch160,ch161,ch162,ch163,ch164,ch165,ch166,ch167
,ch168,ch169
 dw
ch170,ch171,ch172,ch173,ch174,ch175,ch176,ch177
,ch178,ch179
 dw
ch180,ch181,ch182,ch183,ch184,ch185,ch186,ch187
,ch188,ch189
 dw
ch190,ch191,ch192,ch193,ch194,ch195,ch196,ch197
,ch198,ch199
 dw
ch200,ch201,ch202,ch203,ch204,ch205,ch206,ch207
,ch208,ch209
 dw
ch210,ch211,ch212,ch213,ch214,ch215,ch216,ch217
,ch218,ch219
 dw
ch220,ch221,ch222,ch223,ch224,ch225,ch226,ch227
,ch228,ch229
 dw
ch230,ch231,ch232,ch233,ch234,ch235,ch236,ch237
,ch238,ch239
 dw
ch240,ch241,ch242,ch243,ch244,ch245,ch246,ch247
,ch248,ch249
 dw ch250,ch251,ch252,ch253,ch254,ch255

ch33 label byte
DB 3,011h
DB _X_____
DB _X_____
DB _X_____
DB _X_____
DB _X_____
DB _______
DB _X_____

ch34 label byte
DB 4,011h
DB _X_X____
DB _X_X____

ch35 label byte
DB 8,011h
DB __X_X___
DB __X_X___
DB _XXXXX__
DB __X_X___
DB _XXXXX__
DB __X_X___
DB __X_X___

ch36 label byte
DB 5,011h
DB ___X____
DB __XXX___
DB _X______
DB __XX____
DB ____X___
DB _X__X___
DB __XX____
DB __X_____

ch37 label byte
DB 10,012h
DB __XX____X_______
DB _X__X__X________
DB _X__X_X_________
DB __XX_X_XX_______
DB ____X_X__X______
DB ___X__X__X______
DB __X____XX_______

ch38 label byte
DB 8,011h
DB __XX____
DB _X__X___
DB _X__X___
DB __XX__XX
DB _X__X_X_
DB _X___X__
DB __XXX_X_

ch39 label byte
DB 2,011h
DB _X_____
DB _X_____

ch40 label byte
DB 3,011h
DB __X____
DB _X_____
DB _X_____
DB _X_____
DB _X_____
DB _X_____
DB _X_____
DB __X____

ch41 label byte
DB 3,011h
DB _X_____
DB __X____
DB __X____
DB __X____
DB __X____
DB __X____
DB __X____
DB _X_____

ch42 label byte
DB 5,011h
DB _X__X___
DB __XX____
DB __XX____
DB _X__X___

ch43 label byte
DB 6,021h
DB ___X____
DB ___X____
DB _XXXXX__
DB ___X____
DB ___X____

ch44 label byte
DB 2,071h
DB _X_____
DB _X_____

ch45 label byte
DB 3,041h
DB _XX_____

ch46 label byte
DB 2,071h
DB _X_____

ch47 label byte
DB 3,011h
DB __X____
DB __X____
DB __X____
DB __X____
DB _X_____
DB _X_____
DB _X_____

ch48 label byte
DB 5,011h
DB __XX____
DB _X__X___
DB _X__X___
DB _X__X___
DB _X__X___
DB _X__X___
DB __XX____

ch49 label byte
DB 5,011h
DB ___X____
DB __XX____
DB ___X____
DB ___X____
DB ___X____
DB ___X____
DB __XXX___

ch50 label byte
DB 5,011h
DB __XX____
DB _X__X___
DB ____X___
DB ___X____
DB __X_____
DB _X__X___
DB _XXXX___

ch51 label byte
DB 5,011h
DB __XX____
DB _X__X___
DB ____X___
DB ___X____
DB ____X___
DB _X__X___
DB __XX____

ch52 label byte
DB 5,011h
DB ____X___
DB ___XX___
DB __X_X___
DB _X__X___
DB _XXXX___
DB ____X___
DB ____X___

ch53 label byte
DB 5,011h
DB _XXXX___
DB _X______
DB _X______
DB __XX____
DB ____X___
DB _X__X___
DB __XX____

ch54 label byte
DB 5,011h
DB __XX____
DB _X______
DB _X______
DB _XXX____
DB _X__X___
DB _X__X___
DB __XX____

ch55 label byte
DB 5,011h
DB _XXXX___
DB _X__X___
DB ___X____
DB ___X____
DB __X_____
DB __X_____
DB __X_____
```

ch56 label byte
DB 5,011h
DB __XX___
DB _X__X__
DB _X__X__
DB __XX___
DB _X__X__
DB _X__X__
DB __XX___ ch57 label byte
DB 5,011h
DB __XX___
DB _X__X__
DB _X__X__
DB __XXX__
DB ____X__
DB ____X__
DB __XX___ ch59 label byte
DB 2,031h
DB _X______
DB ________
DB ________
DB ________
DB _X______ ch59 label byte
DB 2,031h
DB _X______
DB ________
DB ________
DB ________
DB _X______
DB _X______ ch60 label byte
DB 6,021h
DB _____X__
DB ___XX___
DB _XX_____
DB ___XX___
DB _____X__ ch61 label byte
DB 6,031h
DB _XXXX___
DB ________
DB _XXXX___ ch62 label byte
DB 8,021h
DB _X______
DB __XX____
DB ____XX__
DB __XX____
DB _X______ ch63 label byte
DB 5,011h
DB __XX___
DB _X__X__
DB ____X__
DB ___X___
DB __X____
DB _______
DB __X____ ch64 label byte
DB 8,012h
DB ___XXXX_________
DB __X_____X_______
DB _X__XXX_X_______
DB _X_X__X_X_______
DB _X_X__X_X_______
DB _X__XX_X________
DB __X_____________
DB ___XXXX_________ ch65 label byte
DB 8,011h
DB ____X___
DB ____X___
DB ___X_X__
DB ___X_X__
DB __XXXXX_
DB __X___X_
DB _XXX_XXX ch66 label byte
DB 7,011h
DB _XXXX___
DB __X__X__
DB __X__X__
DB __XXX___
DB __X__X__
DB __X__X__
DB _XXXX___ ch67 label byte
DB 7,011h
DB ___XXXX_
DB __X___X_
DB __X_____
DB __X_____
DB __X_____
DB __X___X_
DB ___XXX__ ch68 label byte
DB 8,011h
DB _XXXX___
DB __X__X__
DB __X___X_
DB __X___X_
DB __X___X_
DB __X__X__
DB _XXXX___ ch69 label byte
DB 7,011h
DB _XXXXX__
DB __X__X__
DB __X_____
DB __XXX___
DB __X_____
DB __X__X__
DB _XXXXX__ ch70 label byte
DB 6,011h
DB _XXXXX__
DB __X__X__
DB __X_____
DB __XXX___
DB __X_____
DB __X_____
DB _XXX____ ch71 label byte
DB 8,011h
DB ___XXXX_
DB __X___X_
DB __X_____
DB __X__XXX
DB __X___X_
DB __X___X_
DB ___XXX__ ch72 label byte
DB 8,011h
DB _XXX_XXX
DB __X___X_
DB __X___X_
DB __XXXXX_
DB __X___X_
DB __X___X_
DB _XXX_XXX ch73 label byte
DB 4,011h
DB _XXX____
DB __X_____
DB __X_____
DB __X_____
DB __X_____
DB __X_____
DB _XXX____ ch74 label byte
DB 5,011h
DB ___XXX__
DB ____X___
DB ____X___
DB ____X___
DB ____X___
DB __X_X___
DB __XX____ ch75 label byte
DB 8,011h
DB _XXX_XX_
DB __X__X__
DB __X_X___
DB __XXX___
DB __X__X__
DB __X___X_
DB _XXX__XX ch76 label byte
DB 6,011h
DB _XXX____
DB __X_____
DB __X_____
DB __X_____
DB __X_____
DB __X__X__
DB _XXXXX__ ch77 label byte
DB 10,012h
DB _XX_____XX_____
DB __XX___X_X_____
DB __XX___X_X_____
DB __X_X_X_X_____
DB __X_X_X_X_____
DB __X__X___X_____
DB _XXX_X_X_XX_____ ch78 label byte
DB 8,011h
DB _XX__XXX
DB __XX__X_
DB __XX__X_
DB __X_X_X_
DB __X__XX_
DB __X__XX_
DB _XXX__X_ ch79 label byte
DB 8,011h
DB ___XXX__
DB __X___X_
DB __X___X_
DB __X___X_
DB __X___X_
DB __X___X_
DB ___XXX__ ch80 label byte
DB 8,011h
DB _XXXX___
DB __X__X__
DB __X__X__
DB __XXX___
DB __X_____
DB __X_____
DB _XXX____ ch81 label byte
DB 8,011h
DB ___XXX__
DB __X___X_
DB __X___X_
DB __X___X_
DB __X___X_
DB __X___X_
DB ___XXX__
DB ____XXX_ ch82 label byte
DB 7,011h
DB _XXXX___
DB __X__X__
DB __X__X__
DB __XXX___
DB __X__X__
DB __X__X__
DB _XXX_XX_ ch83 label byte
DB 8,011h
DB ___XXX__
DB __X___X_
DB __X_____
DB ___XXX__
DB ______X_
DB __X___X_
DB __XXXX__ ch84 label byte
DB 8,011h
DB _XXXXX__
DB __X_X_X_
DB ___X____
DB ___X____
DB ___X____
DB ___X____
DB __XXX___ ch85 label byte
DB 8,011h
DB _XXX_XXX
DB __X___X_
DB __X___X_
DB __X___X_
DB __X___X_
DB __X___X_
DB ___XXX__ ch86 label byte
DB 8,011h
DB _XXX_XXX
DB __X___X_
DB __X___X_
DB ___X_X__
DB ___X_X__
DB ____X___
DB ____X___ ch87 label byte
DB 10,012h
DB _XXX___X_XX______
DB __X__X__X_______
DB __X__X__X_______
DB __X_X_X_X_______
DB __X_X_X_X_______
DB ___X___X________
DB ___X___X________ ch88 label byte
DB 8,011h
DB _XX___XX
DB __X___X_
DB ___X_X__
DB ____X___
DB ___X_X__
DB __X___X_
DB _XX___XX ch89 label byte
DB 8,011h
DB _XXX_XXX
DB __X___X_
DB ___X_X__
DB ___X_X__
DB ____X___
DB ____X___
DB ___XXX__ ch90 label byte
DB 6,011h
DB _XXXXX__
DB _X___X__
DB ____X___
DB ___X____
DB __X_____
DB _X___X__
DB _XXXXX__ ch91 label byte
DB 3,011h
DB _XX_____
DB _X______
DB _X______
DB _X______
DB _X______
DB _X______
DB _X______
DB _XX_____ ch92 label byte
DB 3,011h
DB _X______
DB _X______
DB _X______
DB _X______
DB __X_____
DB __X_____
DB __X_____ ch93 label byte
DB 3,011h
DB _XX_____
DB __X_____
DB __X_____
DB __X_____
DB __X_____
DB __X_____
DB __X_____
DB _XX_____ ch94 label byte
DB 5,001h
DB __XX____
DB _X__X___ ch95 label byte
DB 5,081h
DB XXXXX___ ch96 label byte
DB 3,001h
DB _X______
DB __X_____ ch97 label byte
DB 5,031h
DB __XX____
DB ____X___
DB __XXX___
DB _X__X___
DB __XXX___ ch98 label byte
DB 6,011h
DB XX______

DB _X_____
DB _XXX___
DB _X__X__
DB _X__X__
DB _X__X__
DB __XX___ ch99 label byte
DB 5,031h
DB __XX___
DB _X__X__
DB _X_____
DB _X__X__
DB __XX___ ch100 label byte
DB 5,011h
DB ___XX__
DB ____X__
DB __XXX__
DB _X__X__
DB _X__X__
DB _X__X__
DB __XXX__ ch101 label byte
DB 5,031h
DB __XX___
DB _X__X__
DB _XXXX__
DB _X_____
DB __XX___ ch102 label byte
DB 3,011h
DB __X____
DB _X_____
DB XXX____
DB _X_____
DB _X_____
DB _X_____
DB _XX____ ch103 label byte
DB 5,031h
DB __XXX__
DB _X__X__
DB _X__X__
DB __XXX__
DB ____X__
DB __XX___ ch104 label byte
DB 5,011h
DB XX_____
DB _X_____
DB _XXX___
DB _X__X__
DB _X__X__
DB _X__X__
DB _X__X__ ch105 label byte
DB 2,011h
DB _X_____
DB _______
DB XX_____
DB _X_____
DB _X_____
DB _X_____
DB _X_____ ch106 label byte
DB 2,011h
DB _X_____
DB _______
DB XX_____
DB _X_____
DB _X_____
DB _X_____
DB _X_____
DB _X_____ ch107 label byte
DB 5,011h
DB XX_____
DB _X_____
DB _X__X__
DB _X_X___
DB _XXX___
DB _X__X__
DB _X__X__ ch108 label byte
DB 2,011h
DB XX_____
DB _X_____
DB _X_____
DB _X_____

DB _X_____
DB _X_____
DB _X_____ ch109 label byte
DB 8,031h
DB X_XX_XX_
DB _X__X__X
DB _X__X__X
DB _X__X__X
DB _X__X__X ch110 label byte
DB 5,031h
DB X_XX___
DB _X__X__
DB _X__X__
DB _X__X__
DB _X__X__ ch111 label byte
DB 5,031h
DB __XX___
DB _X__X__
DB _X__X__
DB _X__X__
DB __XX___ ch112 label byte
DB > 031h
DB X_XX___
DB _X__X__
DB _X__X__
DB _XXX___
DB _X_____
DB _XX____ ch113 label byte
DB 5,031h
DB __XX___
DB _X__X__
DB _X__X__
DB __XXX__
DB ____X__
DB ___XX__ ch114 label byte
DB 4,031h
DB X_XX___
DB _X_X___
DB _X_____
DB _X_____
DB _XX____ ch115 label byte
DB 4,031h
DB __XX___
DB _X_____
DB _XXX___
DB ___X___
DB _XX____ ch116 label byte
DB 3,021h
DB _X_____
DB XXX____
DB _X_____
DB X_____
DB ; (_____
DB __X____ ch117 label byte
DB 5,031h
DB XX_XX__
DB _X__X__
DB _X__X__
DB _X__X__
DB __XXX__ ch118 label byte
DB 5,031h
DB X___X__
DB _X_X___
DB _X_X___
DB __X____
DB __X____ ch119 label byte
DB 8,031h
DB _XX_X_XX
DB _X__X__X
DB _X_X_X_X
DB __X___X_
DB __X___X_ ch120 label byte
DB 5,031h
DB XX_XX__
DB _X_X___

DB _X____
DB _X_X__
DB XX_XX__ ch121 label byte
DB 5,031h
DB _X__X__
DB _X__X__
DB _X__X__
DB __XX__
DB __X____
DB _X_____ ch122 label byte
DB 5,031h
DB _XXXX__
DB __X___
DB _X____
DB _X__X__
DB _XXXX__ ch123 label byte
DB 4,011h
DB __X___
DB _X____
DB _X____
DB _XX___
DB _X____
DB _X____
DB __X___ ch124 label byte
DB 2,011h
DB _X_____
DB _X_____
DB _X_____
DB _X_____
DB _X_____
DB _X_____
DB _X_____ ch125 label byte
DB 4,011h
DB _X_____
DB _X____
DB _X____
DB _XX___
DB _X____
DB _X____
DB _X____ ch126 label byte
DB 6,011h
DB __XX_X__
DB _X_XX__ ch127 label byte
DB 4,011h
DB _XX___
DB _XX___
DB _XX___
DB _XX___
DB _XX___
DB _XX___
DB _XX___ ch128 label byte
DB 7,011h
DB ___XXXX_
DB __X__X_
DB __X___
DB __X___
DB __X___
DB __X__X_
DB __XXX__
DB ___X___ ch129 label byte
DB 5,011h
DB _X__X__
DB ______
DB XX_XX__
DB _X__X__
DB _X__X__
DB _X__X__
DB __XXX__ ch130 label byte
DB 5,001h
DB __X___
DB __X___
DB ______
DB __XX___
DB _X__X__
DB _XXXX__
DB _X_____
DB __XX___ ch131 label byte

DB 5,001h
DB ___X____
DB __X_X___
DB ________
DB __XX____
DB ____X___
DB __XXX___
DB _X__X___
DB __XXX___ ch132 label byte
DB 5,011h
DB __X_X___
DB ________
DB __XX____
DB ____X___
DB __XXX___
DB _X__X___
DB __XXX___ ch133 label byte
DB 5,001h
DB __X_____
DB ___X____
DB ________
DB __XX____
DB ____X___
DB __XXX___
DB _X__X___
DB __XXX___ ch134 label byte
DB 5,001h
DB __X_X___
DB ___X____
DB ________
DB __XX____
DB ____X___
DB __XXX___
DB _X__X___
DB __XXX___ ch135 label byte
DB 5,031h
DB __XX____
DB _X__X___
DB _X______
DB _X__X___
DB __XX____
DB ___X____ ch136 label byte
DB 5,001h
DB __XX____
DB _X__X___
DB ________
DB __XX____
DB _X__X___
DB _XXXX___
DB _X______
DB __XX____ ch137 label byte
DB 5,011h
DB _X_X____
DB ________
DB __XX____
DB _X__X___
DB _XXXX___
DB _X______
DB __XX____ ch138 label byte
DB 5,001h
DB __X_____
DB ___X____
DB ________
DB __XX____
DB _X__X___
DB _XXXX___
DB _X______
DB __XX____ ch139 label byte
DB 2,011h
DB XX______
DB ________
DB XX______
DB _X______
DB _X______
DB _X______
DB _X______ ch140 label byte
DB 2,011h
DB XX______
DB ________
DB XX______
DB _X______

DB _X_____
DB _X_____
DB _X_____ ch141 label byte
DB 2,001h
DB X______
DB _X_____
DB _______
DB XX_____
DB _X_____
DB _X_____
DB _X_____
DB _X_____ ch142 label byte
DB 8,011h
DB ____X___
DB ____X___
DB ___X_X__
DB ___X_X__
DB __XXXXX_
DB __X___X_
DB _XXX_XXX ch143 label byte
DB 8,001h
DB ___X_X__
DB ____X___
DB ____X___
DB ___X_X__
DB ___X_X__
DB __XXXXX_
DB __X___X_
DB _XXX_XXX ch144 label byte
DB 7,001h
DB ___X____
DB _XXXXX__
DB __X__X__
DB __X_____
DB __XXX___
DB __X_____
DB __X__X__
DB _XXXXX__ ch145 label byte
DB 8,031h
DB __XX_XX_
DB ____X__X
DB __XXXXXX
DB _X__X___
DB __XX_XX_ ch146 label byte
DB 8,012h
DB ___XXXXX.X_______
DB ___XX__X_______
DB ___X_X_________
DB ___X_XXX_______
DB __XXXX_________
DB __X__X__X_______
DB _XX_XXXX.X______ ch147 label byte
DB 5,001h
DB __XX____
DB _X__X___
DB ________
DB __XX____
DB _X__X___
DB _X__X___
DB _X__X___
DB __XX____ ch148 label byte
DB 5,011h
DB _X__X___
DB ________
DB __XX____
DB _X__X___
DB _X__X___
DB _X__X___
DB __XX____ ch149 label byte
DB 5,001h
DB __X_____
DB ___X____
DB ________
DB __XX____
DB _X__X___
DB _X__X___
DB _X__X___
DB __XX____ ch150 label byte
DB 5,001h

Db __X_____
DB _X_X____
DB ________
DB XX_XX___
DB _X__X___
DB _X__X___
DB _X__X___
DB __XXX___ ch151 label byte
DB 5,001h
DB _X______
DB __X_____
DB ________
DB XX_XX___
DB _X__X___
DB _X__X___
DB _X__X___
DB __XXX___ ch152 label byte
DB 5,011h
DB _X__X___
DB ________
DB _X__X___
DB _X__X___
DB _X__X___
DB __XX____
DB __X_____
DB _X______ ch153 label byte
DB 8,011h
DB ___XXX__
DB __X___X_
DB __X___X_
DB __X___X_
DB __X___X_
DB __X___X_
DB ___XXX__ ch154 label byte
DB 8,011h
DB _XXX_XXX
DB __X___X_
DB __X___X_
DB __X___X_
DB __X___X_
DB __X___X_
DB ___XXX__ ch155 label byte
DB 5,021h
DB ___X____
DB __XX____
DB _X__X___
DB _X______
DB _X__X___
DB __XX____
DB __X_____ ch156 label byte
DB 5,011h
DB __X_____
DB _X_X____
DB _X______
DB _XXX____
DB __X_____
DB __X_____
DB _XXXX___ ch157 label byte
DB 5,011h
DB XX_XX___
DB X___X___
DB XXXXX___
DB _X_X____
DP .'XXXX___
DB __X_____
DB _XXX____ ch158 label byte
DB 5,031h
DB X_XX____
DB _X__X___
DB _X__X___
DB _XXX____
DB _X______
DB _XX_____ ch159 label byte
DB 3,011h
DB __X_____
DB _X______
DB XXX_____
DB _X______
DB _X______
DB _X______
DB _XX_____ ch160 label byte
DB 5,001h
DB __X___
DB _X____
DB ______
DB __XX__
DB ___X__
DB __XXX__
DB _X_X__
DB __XXX__ ch161 label byte
DB 2,001h
DB _X____
DB X_____
DB ______
DB XX____
DB _X____
DB _X____
DB _X____
DB _X____ ch162 label byte
DB 5,001h
DB __X___
DB _X____
DB ______
DB __XX__
DB _X_X__
DB _X_X__
DB _X_X__
DB __XX__ ch163 label byte
DB 5,001h
DB __X___
DB _X____
DB ______
DB XX_XX__
DB _X__X__
DB _X__X__
DB _X__X__
DB __XXX__ ch164 label byte
DB 5,001h
DB __X_X__
DB _X_X__
DB ______
DB X_XX__
DB _X__X__
DB _X__X__
DB _X__X__
DB _X__X__ ch165 label byte
DB 8,001h
DB __X_XX_
DB _XX__XXX
DB __XX__X_
DB __XX__X_
DB __X_X_X_
DB __X__XX_
DB __X__XX_
DB _XXX__X_ ch166 label byte
DB 3,011h
DB _X____
DB __X___
DB _XX___
DB _XX___
DB ______
DB _XX___ ch167 label byte
DB 3,011h
DB _XX___
DB _XX___
DB _XX___
DB _XX___
DB ______
DB _XX___ ch168 label byte
DB 5,021h
DB __X___
DB ______
DB __X___
DB _X____
DB _X____
DB _X__X__
DB __XX__ ch169 label byte
DB 5,081h
DB XXXXX__ ch170 label byte

DB 6,041h
DB _XXXXX__
DB _____X__ ch171 label byte
DB 8,011h
DB __X____X
DB _XX___X_
DB __X__X__
DB _XXXXXX_
DB ___X___X
DB __X___X_
DB _X___XXX ch172 label byte
DB 8,011h
DB __X____X
DB _XX___X_
DB __X__X__
DB _XXXX__X
DB ___X_X_X
DB __X__XXX
DB _X_____X ch173 label byte
DB 3,021h
DB _X______
DB ________
DB _X______
DB _X______
DB _X______
DB _X______
DB _X______ ch174 label byte
DB 5,051h
DB __X_X___
DB _X_X____
DB __X_X___ ch175 label byte
DB 5,061h
DB _X_X____
DB __X_X___
DB _X_X____ ch176 label byte
DB 5,081h
DB XXXXX___ ch177 label byte
DB 5,081h
DB XXXXX___ ch178 label byte
DB 5,081h
DB XXXXX___ ch179 label byte
DB 2,011h
DB _X______
DB _X______
DB _X______
DB ________
DB _X______
DB _X______
DB _X______ ch180 label byte
DB 5,081h
DB XXXXX___ ch181 label byte
DB 5,081h
DB XXXXX___ ch182 label byte
DB 5,081h
DB XXXXX___ ch183 label byte
DB 5,081h
DB XXXXX___ ch184 label byte
DB 5,081h
DB XXXXX___ ch185 label byte
DB 5,081h
DB XXXXX___ ch186 label byte
DB 5,081h
DB XXXXX___ ch187 label byte
DB 5,081h
DB XXXXX___

```
ch188 label byte
DB 5,081h
DB XXXXX___

ch189 label byte
DB 5,081h
DB XXXXX___

ch190 label byte
DB 5,081h
DB XXXXX___

ch191 label byte
DB 5,081h
DB XXXXX___

ch192 label byte
DB 5,081h
DB XXXXX___

ch193 label byte
DB 5,081h
DB XXXXX___

ch194 label byte
DB 5,081h
DB XXXXX___

ch195 label byte
DB 5,081h
DB XXXXX___

ch196 label byte
DB 5,081h
DB XXXXX___

ch197 label byte
DB 5,081h
DB XXXXX___

ch198 label byte
DB 5,081h
DB XXXXX___

ch199 label byte
DB 5,081h
DB XXXXX___

ch200 label byte
DB 5,081h
DB XXXXX___

ch201 label byte
DB 5,081h
DB XXXXX___

ch202 label byte
DB 5,081h
DB XXXXX___

ch203 label byte
DB 5,081h
DB XXXXX___

ch204 label byte
DB 5,081h
DB XXXXX___

ch205 label byte
DB 5,081h
DB XXXXX___

ch206 label byte
DB 5,081h
DB XXXXX___

ch207 label byte
DB 5,081h
DB XXXXX___

ch208 label byte
DB 5,081h
DB XXXXX___

ch209 label byte
DB 5,081h
DB XXXXX___

ch210 label byte
DB 5,081h
DB XXXXX___

ch211 label byte
DB 5,081h
DB XXXXX___

ch212 label byte
DB 5,081h
DB XXXXX___

ch213 label byte
DB 5,081h
DB XXXXX___

ch214 label byte
DB 5,081h
DB XXXXX___

ch215 label byte
DB 5,081h
DB XXXXX___

ch216 label byte
DB 5,081h
DB XXXXX___

ch217 label byte
DB 5,081h
DB XXXXX___

ch218 label byte
DB 5,081h
DB XXXXX___

ch219 label byte
DB 5,081h
DB XXXXX___

ch220 label byte
DB 5,081h
DB XXXXX___

ch221 label byte
DB 5,081h
DB XXXXX___

ch222 label byte
DB 5,081h
DB XXXXX___

ch223 label byte
DB 5,081h
DB XXXXX___

ch224 label byte
DB 5,081h
DB XXXXX___

ch225 label byte
DB 5,011h
DB __XX___
DB _X__X___
DB _X__X___
DB _X_X____
DB _X__X___
DB _X__X___
DB _X_X____

ch226 label byte
DB 5,081h
DB XXXXX___

ch227 label byte
DB 5,011h
DB __XXX___
DB _XXX____
DB _XXX____
DB __XX____
DB ___X____
DB ___X____
DB ___X____

ch228 label byte
DB 5,081h
DB XXXXX___

ch229 label byte
DB 5,081h
DB XXXXX___

ch230 label byte
DB 6,041h
DB _X__X___
DB _X__X___
DB _X__X___
DB _XXX_X__
DB _X______

ch231 label byte
DB 5,081h
DB XXXXX___

ch232 label byte
DB 5,081h
DB XXXXX___

ch233 label byte
DB 5,081h
DB XXXXX___

ch234 label byte
DB 5,081h
DB XXXXX___

ch235 label byte
DB 5,081h
DB XXXXX___

ch236 label byte
DB 5,081h
DB XXXXX___

ch237 label byte
DB 8,011h
DB ___XXXX_
DB __X__XX_
DB __X__XX_
DB __X_X_X_
DB __XX__X_
DB __XX__X_
DB __XXXX_

ch238 label byte
DB 5,081h
DB XXXXX___

ch239 label byte
DB 5,081h
DB XXXXX___

ch240 label byte
DB 5,081h
DB XXXXX___

ch241 label byte
DB 6,011h
DB ___X___
DB ___X___
DB _XXXXX__
DB ___X___
DB ___X___
DB _______

ch242 label byte
DB 5,081h
DB XXXXX___

ch243 label byte
DB 5,081h
DB XXXXX___

ch244 label byte
DB 5,081h
DB XXXXX___

ch245 label byte
DB 5,081h
DB XXXXX___

ch246 label byte
DB 5,081h
DB XXXXX___

ch247 label byte
DB 5,081h
DB XXXXX___

ch248 label byte
DB 3,011h
DB _X_____
DB X_X_____
DB _X_____

ch249 label byte
DB 2,041h
DB _X_____

ch250 label byte
DB 2,041h
DB _X_____

ch251 label byte
DB 5,081h
DB XXXXX___

ch252 label byte
DB 5,031h
DB X_XX___
DB _X__X__
DB _X__X__
DB _X__X__
DB _X__X__

ch253 label byte
DB 3,011h
DB XX_____
DB _X_____
DB _X_____
DB XXX_____

ch254 label byte
DB 5,081h
DB XXXXX___
ch255 label byte

DATASEG_END
end
Copr 1995 Zenith Data Systems Corp.

.model small

include uibtequ.inc
include uiincfud.inc

DATASEG_BEGIN
extrn ControlDataStorageArea:byte

uifont2 label word
 public uifont2
 db 6
 db 20

 dw ch33,ch34,ch35,ch36,ch37,ch38,ch39
 dw
ch40,ch41,ch42,ch43,ch44,ch45,ch46,ch47,ch48,ch4
9
 dw
ch50,ch51,ch52,ch53,ch54,ch55,ch56,ch57,ch58,ch5
9
 dw
ch60,ch61,ch62,ch63,ch64,ch65,ch66,ch67,ch68,ch6
9
 dw
ch70,ch71,ch72,ch73,ch74,ch75,ch76,ch77,ch78,ch7
9
 dw
ch80,ch81,ch82,ch83,ch84,ch85,ch86,ch87,ch88,ch8
9
 dw
ch90,ch91,ch92,ch93,ch94,ch95,ch96,ch97,ch98,ch9
9
 dw
ch100,ch101,ch102,ch103,ch104,ch105,ch106,ch107
,ch108,ch109
 dw
ch110,ch111,ch112,ch113,ch114,ch115,ch116,ch117
,ch118,ch119
 dw
ch120,ch121,ch122,ch123,ch124,ch125,ch126,ch127
,ch128,ch129
 dw
ch130,ch131,ch132,ch133,ch134,ch135,ch136,ch137
,ch138,ch139
 dw
ch140,ch141,ch142,ch143,ch144,ch145,ch146,ch147
,ch148,ch149
 dw
ch150,ch151,ch152,ch153,ch154,ch155,ch156,ch157
,ch158,ch159
 dw
ch160,ch161,ch162,ch163,ch164,ch165,ch166,ch167
,ch168,ch169
 dw
ch170,ch171,ch172,ch173,ch174,ch175,ch176,ch177
,ch178,ch179
 dw
ch180,ch181,ch182,ch183,ch184,ch185,ch186,ch187
,ch188,ch189
 dw
ch190,ch191,ch192,ch193,ch194,ch195,ch196,ch197
,ch198,ch199
 dw
ch200,ch201,ch202,ch203,ch204,ch205,ch206,ch207
,ch208,ch209
 dw
ch210,ch211,ch212,ch213,ch214,ch215,ch216,ch217
,ch218,ch219
 dw
ch220,ch221,ch222,ch223,ch224,ch225,ch226,ch227
,ch228,ch229
 dw
ch230,ch231,ch232,ch233,ch234,ch235,ch236,ch237
,ch238,ch239
 dw
ch240,ch241,ch242,ch243,ch244,ch245,ch246,ch247
,ch248,ch249
 dw ch250,ch251,ch252,ch253,ch254,ch255

ch33 label byte
DB 7,021h
DB ___X____
DB __XXX___
DB __XXX___
DB __XXX___
DB __XXX___
DB __XXX___
DB ___X____
```

DB ___X____
DB ___X____
DB ___X____
DB ________
DB __XXX___
DB __XXX___ ch34 label byte
DB 10,021h
DB __XX__XX
DB __XX__XX
DB __XX__XX
DB __XX__XX ch35 label byte
DB 12,022h
DB _____X__X_____
DB _____X__X_____
DB _____XX_XX_____
DB _____X___X_____
DB __XXXXXX_XXXX____
DB ____X___X_______
DB ___XX__X_X_______
DB ___X___X_______
DB XXXXXXXX_XX______
DB __X___X________
DB _XX__XX________
DB _X___X_________
DB _X___X_________ ch36 label byte
DB 12,012h
DB _____X_________
DB _____X_________
DB ____XXXX________
DB __XX_X__XX______
DB _XX__X___X______
DB _XX__X_________
DB _XXX_X_________
DB __XXXXXX________
DB _____XXXX_XX______
DB _____X__XXX_____
DB _____X___XX_____
DB _X___X___XX_____
DB _XX__X__XX______
DB ___XXXXX________
DB _____X_________
DB _____X_________ ch37 label byte
DB 20,023h
DB ____XXXX_______XX________
DB __XXX__X_XXXXXXXX_________
DB _XX______X____XX__________
DB _XX_____X_X___XX__________
DB XX______X____XX___________
DB XX____XX___XX___X_XXX_____
DB XXX__XX__XX__XXX___XX_____
DB _XXXX____XX__XX______X_____
DB _______X_X___XX____XX_____
DB _______XX____XX_____X_____
DB ______XX_____XX____XX_____
DB _____XX_____XXX__XX_______
DB ___XX________XXXX_________ ch38 label byte
DB 19,023h
DB ________X_XXXX_____________
DB _______XX___XX_____________
DB ______XX____XX_____________
DB ______XXX___XX_____________
DB _______XX_XX_______________
DB _______XX_X_____XXXX_XX_____
DB _____XX_X_XX____XX__________
DB __XXX____XX_____X___________
DB __XX______XXX__XX___________
DB _XX_________XXX_X___________
DB _XXX________XXX_____________
DB __XXX_______XXXX____XX______
DB ___XXXXX_XXX_XXXX____________ ch39 label byte
DB 6,021h
DB __XX____
DB __XX____
DB __XX____
DB __XX____ ch40 label byte
DB 8,021h
DB _____XX_
DB ____XX__
DB ___XX___
DB __XX____
DB __XX____
DB _XXX____
DB _XX_____
DB _XX_____
DB _XX_____

DB _XX_____
DB _XXX____
DB __XX____
DB __XX____
DB ___XX___
DB ____XX__
DB _____XX_ ch41 label byte
DB 8,021h
DB _XX_____
DB __XX____
DB ___XX___
DB ____XX__
DB ____XX__
DB ____XXX_
DB _____XX_
DB _____XX_
DB _____XX_
DB _____XX_
DB ____XXX_
DB ____XX__
DB ____XX__
DB ___XX___
DB __XX____
DB _XX_____ ch42 label byte
DB 12,012h
DB _____XX__________
DB __X__XX__X________
DB __XX_XX_XX________
DB ____XXXX__________
DB ____XXXX__________
DB __XX_XX_XX________
DB __X__XX__X________
DB _____XX__________ ch43 label byte
DB 14,042h
DB _______XX_________
DB _______XX_________
DB _______XX_________
DB _______XX_________
DB _XXXXXXX_XXXXX____
DB _______XX_________
DB _______XX_________
DB _______XX_________
DB _______XX_________ ch44 label byte
DB 6,0D1h
DB _XXX____
DB _XXX____
DB ___X____
DB __X_____
DB _X______ ch-.- label byte
DB ?,091h
DB _XXXXXX_ ch46 label byte
DB 6,0D1h
DB _XXX____
DB _XXX____ ch47 label byte
DB 7,031h
DB ______XX_
DB ______XX_
DB _____XX__
DB _____XX__
DB ____XX___
DB ____XX___
DB ___XX____
DB ___XX____
DB __XX_____
DB __XX_____
DB XX_______
DB XX_______ ch48 label byte
DB 12,022h
DB ____XXXX_________
DB __XX____XX_______
DB __XX____XX_______
DB _XX______XX______
DB _XX______XX______
DB _XX______XX______
DB _XX______XX______
DB _XX______XX______
DB _XX______XX______
DB _XX______XX______
DB __XX____XX_______
DB __XX____XX_______
DB ____XXXX_________ ch4Ə label byte

DB 12,022h
DB ______X________
DB ____XXX_______
DB __XX_XX_______
DB ____XX________
DB ____XX________
DB ____XX________
DB ____XX________
DB ____XX________
DB ____XX________
DB ____XX________
DB ____XX________
DB ____XX________
DB ____XX________
DB __XXXXXX_XX____ ch50 label byte
DB 12,022h
DB __XXXXX_______
DB __X____X_X_____
DB _X_______XX____
DB _________XX____
DB _________XX____
DB _________XX____
DB ________X_X____
DB ______XX_______
DB _____XX________
DB ___X___________
DB ___X___________
DB ___X_______X____
DB _XXXXXXX_XX____ ch51 label byte
DB 12,022h
DB __XXXXX_______
DB __XX____X_X_____
DB _XX______XX____
DB _________XX____
DB ________X_X____
DB _______XX______
DB ___XXXX_X______
DB _________XX____
DB __________XX___
DB __________XX___
DB __________XX___
DB _XXX______XX___
DB __XXXXXX_X______ ch52 label byte
DB 12,022h
DB _________XX_____
DB ________X_XX_____
DB _______X__XX_____
DB ______X___XX_____
DB _____X____XX_____
DB ____X_____XX_____
DB ___X______XX_____
DB __X_______XX_____
DB _XXXXXXXX_XXXX____
DB __________XX_____
DB __________XX_____
DB __________XX_____
DB __________XX_____ ch53 label byte
DB 12,022h
DB _____XXX_XXX_____
DB ____XX__________
DB ___XX___________
DB __XX____________
DB _XXXXXX_________
DB _____XXXX_X______
DB __________X_XX_____
DB ___________XXX_____
DB ____________XX_____
DB ____________XX_____
DB ___________XX_____
DB _XXX_______X_X_____
DB __XXXXXX_________ ch54 label byte
DB 12,022h
DB ______XX_X______
DB ____XX__________
DB ___XX___________
DB __XX____________
DB __XX___XX_XXX_X____
DB _XXXX___XX______
DB _XX______XX_____
DB _XX______XX_____
DB _XX______XX_____
DB _XX______XX_____
DB _XX______XX_____
DB __XX_____XX_____
DB ___XXXXX_X______ ch55 label byte
DB 12,022h
DB __XXXXXX_XXX_____
DB _X__________XX_____

DB _X______XX______
DB _________XX______
DB ________X_X______
DB ________X_X______
DB _______XX________
DB _______XX________
DB _____XX__________
DB _____XX__________
DB ____XX___________
DB ____XX___________
DB ____XX___________ ch56 label byte
DB 12,022h
DB ____XXXX_X_______
DB ___XX___XX______
DB __XX_____XX_____
DB __XX_____XX_____
DB __XXX____XX_____
DB ___XXX_X_X_______
DB ____XXXX________
DB __XX__XX_XX______
DB _XX______XXX_____
DB _XX_______XX_____
DB _XX_______XX_____
DB __XX_____XX______
DB ___XXXXX_X_______ ch57 label byte
DB 12,022h
DB ___XXXXX_X_______
DB __XX_____XX______
DB _XX_______XX_____
DB _XX_______XX_____
DB _XX_______XX_____
DB _XX_______XX_____
DB _XX_______XX_____
DB __XX____X_XXX_____
DB ___XXXX__XX_____
DB __________XX_____
DB _________X_X_______
DB ________XX_______
DB ___XXX___________ ch58 label byte
DB 7,061h
DB __XXX___
DB __XXX___
DB ________
DB ________
DB ________
DB ________
DB ________
DB __XXX___
DB __XXX___ ch59 label byte
DB 7,061h
DB __XXX___
DB __XXX___
DB ________
DB ________
DB ________
DB ________
DB ________
DB __XXX___
DB __XXX___
DB ____X___
DB ___X____
DB __X_____ ch60 label byte
DB 14,052h
DB ____________XXX___
DB __________XXX_____
DB _______XXX_X_______
DB ____XXX__________
DB _XXX______________
DB ___XXX__________
DB _______XXX_X_______
DB __________XXX_____
DB ____________XXX___ ch61 label byte
DB 14,062h
DB _XXXXXXX_XXXXX___
DB ________________
DB ________________
DB ________________
DB _XXXXXXX_XXXXX___ ch62 label byte
DB 14,052h
DB _XXX______________
DB ___XXX____________
DB _______XXX_X_______
DB __________XXX_____
DB ____________XXX___
DB __________XXX_____

```
DB _____XXX.X_______
DB ___XXX__._________
DB _XXX___.__________

ch63 label byte
DB 11,022h
DB ___XXXXX.________
DB __X____X.X_______
DB _XX_____XX_______
DB _XX_____XX_______
DB ________XX_______
DB _______X.X_______
DB ______XX_________
DB ______X._________
DB _____X.__________
DB _____X.__________
DB _________________
DB ____XXX._________
DB ____XXX._________

ch64 label byte
DB 23,023h
DB ________XXXXXXXX.X_______
DB _______XX.X________XXX____
DB ____XXX.______________XX____
DB __XX_________________XX___
DB __XX______XXXX_X.X___X___
DB __XX____XXX___XX.X___XX__
DB _XX_____X.X____XX____XX__
DB _XX_____X.X____XX____XX__
DB _XX___XX_______XX_____X__
DB _XX___XX_______XX_____XX__
DB _XX___XX.X___XXX.___XX____
DB __XX___X.XXXX__XX.XX______
DB __XX_______________________
DB ___XXX______________XX_____
DB _____XXX__________X.XXX____
DB ________X.XXXXXXXX.________

ch65 label byte
DB 17,023h
DB ________X_________________
DB _______X.XX_______________
DB ______XX.XXX______________
DB ______X._.XX______________
DB _____XX__XXX______________
DB _____X.___XX______________
DB ____XX____XXX_____________
DB ____X.____XX______________
DB ___XXXXX.XXXXXX___________
DB ___X._______XX____________
DB __XX________XXX___________
DB __X._________XX___________
DB XXXXX______XXXXX.X________

ch66 label byte
DB 16,022h
DB _XXXXXXX.XXX_____
DB ___XX______XX____
DB ___XX______XX____
DB ___XX______XX____
DB ___XX______XX____
DB ___XX______XX____
DB ___XXXXX.XXXX____
DB ___XX______XXX___
DB ___XX________XX_
DB ___XX________XX_
DB ___XX________XX_
DB ___XX_______XXX__
DB _XXXXXXX.XXXX____

ch67 label byte
DB 16,022h
DB _____XXX.XXXX__X_
DB ___XXX______XXXX_
DB __XX__________XX_
DB __XX___________X_
DB _XXX______________
DB _XX_______________
DB _XX_______________
DB _XX_______________
DB _XXX______________
DB __XX______________
DB __XX___________X_
DB ___XXX_______XX__
DB _____XXX.XXXX____

ch68 label byte
DB 17,022h
DB _XXXXXXX.XXXX____
DB ___XX_______XXX__
DB ___XX________XX_
DB ___XX________XX_
DB ___XX________XXX
DB ___XX_________XX
DB ___XX_________XX
DB ___XX_________XX
DB ___XX________XXX
DB ___XX________XX_

DB ___XX_______XX_
DB ___XX_____XXX__
DB _XXXXXXX.XXXX____

ch69 label byte
DB 15,022h
DB _XXXXXXX.XXXXXX__
DB ___XX_______XX___
DB ___XX________X___
DB ___XX____________
DB ___XX_____X______
DB ___XX_____X______
DB ___XXXXX.XXXX____
DB ___XX_____X______
DB ___XX_____X______
DB ___XX____________
DB ___XX________X___
DB ___XX_______XX___
DB _XXXXXXX.XXXXXX__

ch70 label byte
DB 13,022h
DB _XXXXXXX.XXXXX___
DB ___XX_______XX___
DB ___XX________X___
DB ___XX____________
DB ___XX_____X______
DB ___XX_____X______
DB ___XXXXX.XXX_____
DB ___XX_____X______
DB ___XX_____X______
DB ___XX____________
DB ___XX____________
DB ___XX____________
DB _XXXXXX._________

ch71 label byte
DB 17,023h
DB _____XXX.XXXX__X_________
DB ___XXX______XXXX_________
DB __XX__________XX_________
DB __XX___________X_________
DB _XXX_______________________
DB _XX________________________
DB _XX_________XXXXX.X________
DB _XX___________XX___________
DB _XXX__________XX___________
DB __XX__________XX___________
DB __XX__________XX___________
DB ___XXX_______XXX___________
DB _____XXX.XXXXX____________

ch72 label byte
DB 17,022h
DB _XXXXXX.__XXXXXX
DB ___XX________XX__
DB ___XX________XX__
DB ___XX________XX__
DB ___XX________XX__
DB ___XX________XX__
DB ___XXXXX.XXXXXX__
DB ___XX________XX__
DB ___XX________XX__
DB ___XX________XX__
DB ___XX________XX__
DB ___XX________XX__
DB _XXXXXX.__XXXXXX

ch73 label byte
DB 3,021h
DB _XXXXXX_
DB ___XX___
DB ___XX___
DB ___XX___
DB ___XX___
DB ___XX___
DB ___XX___
DB ___XX___
DB ___XX___
DB ___XX___
DB ___XX___
DB ___XX___
DB _XXXXXX_

ch74 label byte
DB 9,021h
DB __XXXXXX
DB ____XX__
DB ____XX__
DB ____XX__
DB ____XX__
DB ____XX__
DB ____XX__
DB ____XX__
DB ____XX__
DB ____XX__
DB ____XX__
DB XXX_X.__
DB _XXX____

ch75 label byte
DB 17,023h
DB _XXXXXX__XXXXXX______
DB __XX_______XX________
DB __XX_____X___________
DB __XX_____X___________
DB __XX____X____________
DB __XX___X_____________
DB __XX__X.X____________
DB __XX_X_XX____________
DB __XXX___XX___________
DB __XX_____XX__________
DB __XX______XX_________
DB __XX_______XXX_______
DB _XXXXXX___XXXXXX.X___

ch76 label byte
DB 15,022h
DB _XXXXXX________
DB __XX___________
DB __XX___________
DB __XX___________
DB __XX___________
DB __XX___________
DB __XX___________
DB __XX___________
DB __XX___________
DB __XX______X____
DB __XX______X____
DB __XX______XX___
DB _XXXXXXX.XXXXXX__

ch77 label byte
DB 21,023h
DB _XXXX__________XXXX___
DB __XXX_________X.XX____
DB __XXX_________X.XX____
DB __X.XX_______X_XX_____
DB __X_XX_______X_XX_____
DB __X__XX_____X__XX_____
DB __X__XX_____X__XX_____
DB __X___X.X___X__XX_____
DB __X___X.X__X___XX_____
DB __X____XX.X____XX_____
DB __X____XXXX____XX_____
DB __X_____XX_____XX_____
DB _XXXXX___XX___XX.XXXX__

ch78 label byte
DB 17,022h
DB _XXX_______XXXXX
DB __XXX_______X__
DB __XXX_______X__
DB __XXXX______X__
DB __X_XXX_____X__
DB __X__XX.X___X__
DB __X___X.XX__X__
DB __X____XXX_X__
DB __X_____XXX.X__
DB __X______XXXX__
DB __X_______XXX__
DB __X________XX__
DB _XXXXX_______X__

ch79 label byte
DB 17,022h
DB _____XXX.XXXX___
DB ___XXX_____XXX__
DB __XX_________XX_
DB __XX_________XX_
DB _XXX__________XXX
DB _XX___________XX
DB _XX___________XX
DB _XX___________XX
DB _XXX__________XXX
DB __XX_________XX_
DB __XX_________XX_
DB ___XXX_____XXX__
DB _____XXX.XXXX___

ch80 label byte
DB 13,022h
DB _XXXXXXX.XX_____
DB __XX____XXX____
DB __XX_____XXX___
DB __XX______XX___
DB __XX______XX___
DB __XX_____XXX___
DB __XX____XXX____
DB __XXXXX.XX_____
DB __XX___________
DB __XX___________
DB __XX___________
DB __XX___________
DB _XXXXXX________

ch81 label byte
DB 17,022h
DB _____XXX.XXXX___

DB ___XXX______XXX__
DB __XX__________XX_
DB __XX__________XX_
DB _XXX__________XXX
DB _XX___________XX
DB _XX___________XX
DB _XX___________XX
DB _XXX__________XXX
DB __XX__________XX_
DB __XX__________XX_
DB ___XXX______XXX__
DB _____XXX.XXXX____
DB _________XXXXX___
DB ____________XXXXX

ch82 label byte
DB 18,022h
DB _XXXXXXX.XXX_____
DB ___XX_____XXX___
DB ___XX______XXX__
DB ___XX________XX__
DB ___XX_______XXX__
DB ___XX______XXX___
DB ___XXXXX.XXX_____
DB ___XX____XX______
DB ___XX_____XX_____
DB ___XX______XX____
DB ___XX_______XX___
DB ___XX________XX__
DB _XXXXXX________XXXX

ch83 label byte
DB 13,022h
DB ___XXXXX.__X_____
DB __XX______XXX_____
DB _XX__________X_____
DB _XX__________X_____
DB __XX_______________
DB __XXXX_____________
DB ____XXXX.X_________
DB _________X.XXX_____
DB ____________XXX____
DB _X___________XX____
DB _X___________XX____
DB _XXX_______XX______
DB _X_XXXXX.XX________

ch84 label byte
DB 14,022h
DB XXXXXXXX.XXXXXX__
DB XX____XX_____XX__
DB X_____XX______X__
DB X_____XX______X__
DB ______XX_________
DB ______XX_________
DB ______XX_________
DB ______XX_________
DB ______XX_________
DB ______XX_________
DB ______XX_________
DB ______XX_________
DB ____XXXX.XX______

ch85 label byte
DB 17,022h
DB _XXXXXX_____XXXXX
DB ___XX__________X__
DB ___XX__________X__
DB ___XX__________X__
DB ___XX__________X__
DB ___XX__________X__
DB ___XX__________X__
DB ___XX__________X__
DB ___XX__________X__
DB ___XX__________X__
DB ____XX________X___
DB ____XXX______XX___
DB ______XX.XXX______

ch86 label byte
DB 17,023h
DB XXXXXX_______XXXX.X________
DB __XX____________X___________
DB __XXX__________XX___________
DB ___XX__________X____________
DB ___XXX________XX____________
DB ____XX________X_____________
DB ____XXX______XX_____________
DB _____XX______X______________
DB _____XXX___XX_______________
DB ______XX___X________________
DB ______XX.XXX________________
DB _______X.XX_________________
DB ________X.__________________

ch87 label byte
DB 22,023h
DB XXXXXX_X.XXXXX_____XXXXX__
DB __XX_____XX_________X_____
```

```
DB __XXX___XXX_____XX___
DB __XX____XX______X____
DB ___XXX__XXX____XX____
DB ____XX__XXX___X______
DB ____XXX__XXXX__XX____
DB _____XX__X__XX__X____
DB _____XXX_X__XXX_X____
DB ______XX,X___XXX_____
DB ______XX,X___XXX_____
DB _______X______X______
DB _______X______X______

ch88 label byte
DB 17,023h
DB XXXXXXX____XXXXX,X_______
DB __XXX________XX________
DB ___XXX______XX_________
DB ____XXX____XX__________
DB _____XXX__XX___________
DB ______XX,XXX___________
DB _______X,XX____________
DB ______XX,XXX___________
DB _____XX___XXX__________
DB ____XX_____XXX_________
DB ___XX_______XXX________
DB __XX_________XXX_______
DB XXXXXX____XXXXXX,X_______

ch89 label byte
DB 18,023h
DB XXXXXXX_______XXXX,XX______
DB __XXX__________XX________
DB ___XXX________XX_________
DB ____XXX______XX__________
DB _____XXX____XX___________
DB ______XX,X_XX____________
DB _______X,XXX_____________
DB ________XX_______________
DB ________XX_______________
DB ________XX_______________
DB ________XX_______________
DB ________XX_______________
DB ______XX,XXXX____________

ch90 label byte
DB 15,022h
DB _XXXXXXX,XXXXXX__
DB _XX_______XXX__
DB _X________XXX___
DB _X_______XXX____
DB _________XXX____
DB ________X,XX____
DB _______XX,X_____
DB ______XXX_______
DB _____XXX________
DB ____XXX_______X__
DB ___XXX________X__
DB __XXX________XX__
DB _XXXXXXX,XXXXXX__

ch91 label byte
DB 6,011h
DB __XXXXX_
DB __XX___
DB __XX___
DB __XX___
DB __XX___
DB __XX___
DB __XX___
DB __XX___
DB __XX___
DB __XX___
DB __XX___
DB __XX___
DB __XX___
DB __XX___
DB __XX___
DB __XXXXX_

ch92 label byte
DB 7,021h
DB XX______
DB _X______
DB _XX_____
DB __X_____
DB __XX____
DB ___X____
DB ___XX___
DB ____X___
DB ____XX__
DB _____X__
DB _____XX_
DB ______X_
DB ______X_

ch93 label byte
DB 6,011h
DB _XXXXX__
DB ____XX__
DB ____XX__
DB ____XX__
DB ____XX__
DB ____XX__
DB ____XX__
DB ____XX__
DB ____XX__
DB ____XX__
DB ____XX__
DB ____XX__
DB ____XX__
DB ____XX__
DB ____XX__
DB _XXXXX__

ch94 label byte
DB 11,022h
DB ____XXX__________
DB ___XX_XX_________
DB __XX___X,X_______
DB _XX______XX______

ch95 label byte
ch95 label byte
DB 18,003h
DB ___XXXXX,XXXXXXXX,XXX_____
DB __XX______________X,XX______
DB _XX______________XX,X_______
DB ________________XXX_________
DB _______________XXX__________
DB ______________XXX___________
DB _____________XXX____________
DB ____________XXX_____________
DB ___________XXX______________
DB __________X,XX______________
DB _________XX,X_______________
DB _______XXX__________________
DB _____XXX____________________
DB ___XXX______________XX______
DB __XXX______________XX_______
DB _XXXXXXX,XXXXXXXX,X_______

ch96 label byte
DB 6,031h
DB __XXX___
DB ____XX__

ch97 label byte
DB 11,062h
DB ____XXXX_________
DB __XX___X,X_______
DB __XX___X,X_______
DB _____XXX,X_______
DB __XXX__X,X_______
DB _XX____X,X_______
DB _XX____X,X_______
DB _XXX__XX,X_______
DB __XXXX_X,XX______

ch98 label byte
DB 12,012h
DB ___X____________
DB _XXX____________
DB __XX____________
DB __XX____________
DB __XX____________
DB __XX_XXX,X_______
DB __XXX__X,XX______
DB __XX_____XXX_____
DB __XX______XX_____
DB __XX______XX_____
DB __XX______XX_____
DB __XX______XX_____
DB __XXX____XX______
DB ____XXXX_________

ch99 label byte
DB 11,062h
DB ____XXXX_________
DB __XX___X,XX______
DB _XX______XX______
DB _XX______________
DB _XX______________
DB _XX______________
DB _XXX_____________
DB __XXX____XX______
DB ____XXXX_________

ch100 label byte
DB 12,012h
DB ________X_______
DB _______X,XX_____
DB ________XX______
DB ________XX______
DB ________XX______
DB ____XXX_XX______
DB __XX__XX,XX_____
DB _XX____X,XX_____
DB _XX_____XX______
DB _XX_____XX______
DB _XX_____XX______
DB _XXX____XX______
DB __XXX_X,XX______
DB ___XXX_XXX______

ch101 label byte
DB 11,062h
DB ____XXX__________
DB __XX__X,X________
DB _XX_____XX_______
DB _XXXXXXX,XX______
DB _XX______________
DB _XX______________
DB _XXX_____________
DB __XXX___XX_______
DB ____XXXX_________

ch102 label byte
DB 7,011h
DB ___XXX_
DB __X_XX_
DB __XX____
DB __XX____
DB __XX____
DB _XXXXX__
DB __XX____
DB __XX____
DB __XX____
DB __XX____
DB __XX____
DB __XX____
DB __XX____
DB __XX____
DB _XXXXX__

ch103 label byte
DB 12,062h
DB ___XXXXX________
DB __XX__X,XXX_____
DB _XX______XX_____
DB _XX______XX_____
DB __XX___X,X______
DB ___XXXXX________
DB _XX_____________
DB _XX_____________
DB _XXXXXXX,XXX____
DB _XX________XX___
DB XX__________XX___
DB XX__________XX___
DB _XXXXXXX,X_______

ch104 label byte
DB 12,012h
DB __X_____________
DB _XXX____________
DB __XX____________
DB __XX____________
DB __XX____________
DB __XX_XXX,X_______
DB __XXX___XX______
DB __XX____XX______
DB __XX____XX______
DB __XX____XX______
DB __XX____XX______
DB __XX____XX______
DB _XXXX__X,XXX_____

ch105 label byte
DB 6,021h
DB __XX___
DB __XX___
DB _______
DB _______
DB _XXX___
DB __XX___
DB __XX___
DB __XX___
DB __XX___
DB __XX___
DB __XX___
DB __XX___
DB _XXXX__

ch106 label byte
DB 6,021h
DB __XX___
DB __XX___
DB _______
DB _______
DB _XXX___
DB __XX___
DB __XX___
DB __XX___
DB __XX___
DB __XX___
DB __XX___
DB __XX___
DB __XX___
DB __XX___
DB __XX___
DB X_X_____
DB XX______

ch107 label byte
DB 12,012h
DB ___X______________
DB _XXX______________
DB __XX______________
DB __XX______________
DB __XX______________
DB __XX___X,XXX_____
DB __XX____X________
DB __XX__X__________
DB __XX_X___________
DB __XX_XX__________
DB __XXX_XX_________
DB __XX___X,X_______
DB __XX____XX_______
DB _XXXX__X,XXXX____

ch108 label byte
DB 6,011h
DB ___X____
DB _XXX____
DB __XX____
DB __XX____
DB __XX____
DB __XX____
DB __XX____
DB __XX____
DB __XX____
DB __XX____
DB __XX____
DB __XX____
DB __XX____
DB __XX____
DB _XXXX___

ch109 label byte
DB 18,063h
DB _XXX_XXX,X__XXXX__________
DB __XXX___XXX___XX_________
DB __XX____XX____XX_________
DB __XX____XX____XX_________
DB __XX____XX____XX_________
DB __XX____XX____XX_________
DB __XX____XX____XX_________
DB __XX____XX____XX_________
DB _XXXX__X,XXX__XXX,X_______

ch110 label byte
DB 12,062h
DB _XXX_XXX,X________
DB __XXX___XX_______
DB __XX____XX_______
DB __XX____XX_______
DB __XX____XX_______
DB __XX____XX_______
DB __XX____XX_______
DB __XX____XX_______
DB _XXXX__X,XXX_____

ch111 label byte
DB 12,062h
DB ____XXXX_________
DB __XX___X,XX______
DB _XX______XXX_____
DB _XX_______XX_____
DB _XX_______XX_____
DB _XX_______XX_____
DB _XXX______XX_____
DB __XXX___XX_______
DB ____XXXX_________

ch112 label byte
DB 12,062h
DB _XXX_XXX_________
DB __XXX__X,XX______
DB __XX____XXX_____
DB __XX_____XX_____
DB __XX_____XX_____
DB __XX_____XX_____
DB __XX_____XX_____
DB __XXX___XX______
DB __XX_XXX,X_______
DB __XX______________
DB __XX______________
DB __XX______________
```

```
DB _XXXX___________

ch113 label byte
DB 12,062h
DB ___XXXX___X______
DB __XX___X.XX______
DB _XX_____XX______
DB _XX_____XX______
DB _XX_____XX______
DB _XX_____XX______
DB _XXX____XX______
DB __XXX__X.XX______
DB ___XXXX_XX______
DB ________XX______
DB ________XX______
DB ________XX______
DB _______X.XXX_____

ch114 label byte
DB 8 061h
DB _XXX_XXX
DB __XXX_XX
DB __XX____
DB __XX____
DB __XX____
DB __XX____
DB __XX____
DB __XX____
DB _XXXX___

ch115 label byte
DB 10 062h
DB ___XXXX_X_______
DB _XX____X.X_______
DB _XX______X_______
DB __XXX____________
DB ___XXXX__________
DB _____XXX_________
DB _X______X.X_______
DB _XX_____X.X_______
DB _X_XXXX__________

ch116 label byte
DB 7.031h
DB ___X____
DB ___X____
DB __XX____
DB _XXXXX__
DB __XX____
DB __XX____
DB __XX____
DB __XX____
DB __XX____
DB __XX____
DB __XX____
DB ___XXX__

ch117 label byte
DB 12,062h
DB _XXX___X.XX______
DB __XX____XX______
DB __XX____XX______
DB __XX____XX______
DB __XX____XX______
DB __XX____XX______
DB __XX____XX______
DB __XX___X.XX______
DB ___XXXX_XXX_____

ch118 label byte
DB 11,062h
DB XXXXX___XXX_____
DB _XX______X______
DB __XX_____X_______
DB __XX_____X_______
DB ___XX__X________
DB ___XX__X________
DB ____XXX_________
DB ____XXX_________
DB _____X__________

ch119 label byte
DB 17,063h
DB XXXX__XX.XXX__XXX.X_______
DB _XX____X.X______X________
DB __XX____XX____X_________
DB __XX____XX____X_________
DB ___XX__X._XX__X_________
DB ___XX__X._XX__X_________
DB ____XXX___XXX____________
DB ____XXX___XXX____________
DB _____X______X____________

ch120 label byte
DB 12,062h
DB _XXXX__X.XXX_____
DB __XX_____XX______
DB ___XX__X_________
DB ____XXX__________

DB ____XX_______
DB ___X_XX______
DB __X__X.X_____
DB _XX___XX_____
DB _XXXX__X.XXX____

ch121 label byte
DB 11,062h
DB XXXX____XXX____
DB _XX_____X_____
DB _XX____X______
DB _XX___X______
DB __XX__X______
DB __XX__X______
DB ___XXX_______
DB ___XXX_______
DB ____X________
DB ___XX________
DB ____X________
DB XX_X_________
DB XXX__________

ch122 label byte
DB 11,062h
DB _XXXXXXX.XX____
DB _XX____X.X____
DB _X____XX______
DB ____XX_______
DB ____XX_______
DB ___XX________
DB __XX_____X____
DB _XX______XX____
DB _XXXXXXX.XX____

ch123 label byte
DB 10,011h
DB ____XX_
DB ___XX_
DB ___XX_
DB ___XX_
DB ___XX_
DB ___XX_
DB ___XX_
DB ___XX_
DB ___XX_
DB ___XX_
DB ___XX_
DB ___XX_
DB ___XX_
DB ___XX_
DB ___XX_
DB ___XX_
DB ____XX_

ch124 label byte
DB 6,011h
DB __XX__
DB __XX__
DB __XX__
DB __XX__
DB __XX__
DB __XX_-
DB __XX__
DB __XX__
DB __XX__
DB __XX__
DB __XX__
DB __XX__
DB __XX__
DB __XX__
DB __XX__
DB __XX__
DB __XX__
DB __XX__

ch125 label byte
DB 10,011h
DB ___XX__
DB ___XX_
DB ___XX_
DB ___XX_
DB ___XX_
DB ___XX_
DB ___XX_
DB ___XX_
DB ____XX_
DB ___XX_
DB ___XX_
DB ___XX_
DB ___XX_
DB ___XX_
DB ___XX_
DB ___XX_
DB ___XX_

ch126 label byte
DB 12,022h
DB _XXXX____X____
DB _XX_XX__XX____

DB _X____XX.XX______

ch127 label byte
DB 8,021h
DB __XXXX__
DB __XXXX__
DB __XXXX__
DB __XXXX__
DB __XXXX__
DB __XXXX__
DB __XXXX__
DB __XXXX__
DB __XXXX__
DB __XXXX__
DB __XXXX__
DB __XXXX__
DB __XXXX__

ch128 label byte
DB 18,022h
DB ______XXX.XXXX__X_
DB ___XXX________XXXX_
DB __XX__________XX_
DB __XX____________X_
DB _XXX______________
DB _XX_______________
DB _XX_______________
DB _XX_______________
DB _XXX______________
DB __XX______________
DB __XX__________X_
DB ___XXX_______XX__
DB _____XXX.XXXX_____
DB _________X_______
DB _________XXX_____
DB ____________XX____
DB ________X.XXX_____

ch129 label byte
DB 12,032h
DB ___XX__X.X_______
DB ___XX__X.X_______
DB __________________
DB _XXX___X.XX______
DB __XX____XX______
DB __XX____XX______
DB __XX____XX______
DB __XX____XX______
DB __XX____XX______
DB __XX____XX______
DB __XX___X.XX______
DB ___XXXX_XXX_____

ch130 label byte
DB 11,032h
DB _____XXX_________
DB ____XX___________
DB __________________
DB ____XXX__________
DB __XX___X.X_______
DB _XX_____XX______
DB _XXXXXXX.XX______
DB _XX_______________
DB _XX_______________
DB _XXX______________
DB __XXX___XX______
DB ____XXXX_________

ch131 label byte
DB 11,022h
DB _____X___________
DB ____XXX__________
DB ___X___X_________
DB __________________
DB ____XXXX_________
DB __XX___X.X_______
DB __XX___X.X_______
DB _____XXX.X_______
DB __XXX__X.X_______
DB _XX____X.X_______
DB _XX____X.X_______
DB _XXX__XX.X_______
DB __XXXX_X.XX______

ch132 label byte
DB 11,032h
DB __XX___X.X_______
DB __XX___X.X_______
DB __________________
DB ____XXXX_________
DB __XX___X.X_______
DB __XX___X.X_______
DB _____XXX.X_______
DB __XXX__X.X_______
DB _XX____X.X_______
DB _XX____X.X_______
DB _XXX__XX.X_______
DB __XXXX_X.XX______

ch133 label byte
DB 11,032h
DB __XXX___________
DB _____XX_________
DB __________________
DB ____XXXX_________
DB __XX___X.X_______
DB __XX___X.X_______
DB _____XXX.X_______
DB __XXX__X.X_______
DB _XX____X.X_______
DB _XX____X.X_______
DB _XXX__XX.X_______
DB __XXXX_X.XX______

ch134 label byte
DB 11,002h
DB ____XXX__________
DB ___XX_XX_________
DB ___X___X_________
DB ___XX_XX_________
DB ____XXX__________
DB __________________
DB ____XXXX_________
DB __XX___X.X_______
DB __XX___X.X_______
DB _____XXX.X_______
DB __XXX__X.X_______
DB _XX____X.X_______
DB _XX____X.X_______
DB _XXX__XX.X_______
DB __XXXX_X.XX______

ch135 label byte
DB 11,062h
DB ____XXXX_________
DB __XX___X.XX______
DB _XX_____XX______
DB _XX_______________
DB _XX_______________
DB _XX_______________
DB _XXX______________
DB __XXX___XX______
DB ____XXXX_________
DB _____X___________
DB _____XXX_________
DB _______X.X_______
DB ____XXXX_________

ch136 label byte
DB 11,022h
DB _____X___________
DB ____XXX__________
DB ___X___X_________
DB __________________
DB ____XXX__________
DB __XX___X.X_______
DB _XX_____XX______
DB _XXXXXXX.XX______
DB _XX_______________
DB _XX_______________
DB _XXX______________
DB __XXX___XX______
DB ____XXXX_________

ch137 label byte
DB 11,032h
DB __XX___X.X_______
DB __XX___X.X_______
DB __________________
DB ____XXX__________
DB __XX___X.X_______
DB _XX_____XX______
DB _XXXXXXX.XX______
DB _XX_______________
DB _XX_______________
DB _XXX______________
DB __XXX___XX______
DB ____XXXX_________

ch138 label byte
DB 11,032h
DB ___XXX___________
DB ______XX_________
DB __________________
DB ____XXX__________
DB __XX___X.X_______
DB _XX_____XX______
DB _XXXXXXX.XX______
DB _XX_______________
DB _XX_______________
DB _XXX______________
DB __XXX___XX______
DB ____XXXX_________

ch139 label byte
DB 6,031h
DB XX__XX__
DB XX__XX__
```

DB ________
DB _XXX____
DB __XX____
DB __XX____
DB __XX____
DB __XX____
DB __XX____
DB __XX____
DB __XX____
DB _XXXX___ ch140 label byte
DB 6,031h
DB _XXXX___
DB XX__XX__
DB ________
DB _XXX____
DB __XX____
DB __XX____
DB __XX____
DB __XX____
DB __XX____
DB __XX____
DB __XX____
DB _XXXX___ ch141 label byte
DB 6,031h
DB XXX_____
DB __XX____
DB ________
DB _XXX____
DB __XX____
DB __XX____
DB __XX____
DB __XX____
DB __XX____
DB __XX____
DB __XX____
DB _XXXX___ ch142 label byte
DB 17,003h
DB ____XX___XX______
DB _________________
DB _______X_________
DB ______X_XX_______
DB _____XX_XXX______
DB _____X___XX______
DB ____XX___XXX_____
DB ____X____XX______
DB ___XX____XXX_____
DB ___X_____XX______
DB __XXXXX_XXXXXX___
DB __X_______XX_____
DB __XX______XXX____
DB __X________XX____
DB XXXXX____XXXXX_X_ ch143 label byte
DB 17,003h
DB _____XX__XX______
DB _____X___X_______
DB _____XX__XX______
DB _______X_XX______
DB _____XX_XXX______
DB _____X___XX______
DB ____XX___XXX_____
DB ____X____XX______
DB ___XX____XXX_____
DB ___X_____XX______
DB __XXXXX_XXXXXX___
DB __X_______XX_____
DB __XX______XXX____
DB __X________XX____
DB XXXXX____XXXXX_X_ ch144 label byte
DB 15,002h
DB _______X_X_____
DB _______________
DB _XXXXXXX_XXXXXX_
DB __XX________XX_
DB __XX________X__
DB __XX___________
DB __XX_____X_____
DB __XX_____X_____
DB __XXXXX_XXX____
DB __XX_____X_____
DB __XX_____X_____
DB __XX___________
DB __XX_________X_
DB __XX________XX_
DB _XXXXXXX_XXXXXX_ ch145 label byte
DB 17,082h
DB ____XXXX___XXX___
DB __XX___X_XX___XX_

DB __XX___X_X____XX
DB _____XXX_XXXXXXXX
DB __XXX__X_X_______
DB _XX____X_X_______
DB _XX____X_XX______
DB _XXX__XX_XXX___XX
DB __XXXX_____XXXX__ ch146 label byte
DB 21,023h
DB ________X_XXXXXXXX_XXXX____
DB _______X__XX_______XX____
DB ______XX__XX_________X____
DB ______X___XX______________
DB _____XX___XX_________X_____
DB _____X____XX________X______
DB ____XX____XXXXXXX_XX_____
DB ____X_____XX________X______
DB ___XXXXX_XXX________X______
DB ___X______XX_______________
DB __XX______XX__________X____
DB __X_______XX_________XX____
DB XXXXX__X_XXXXXXXX_XXXX____ ch147 label byte
DB 12,022h
DB ______X_____
DB _____XXX____
DB ____X___X___
DB ____________
DB ____XXXX____
DB __XX___X_XX_
DB _XX_____XXX_
DB _XX______XX_
DB _XX______XX_
DB _XX______XX_
DB _XXX_____XX_
DB __XXX___XX__
DB ____XXXX____ ch148 label byte
DB 12,032h
DB ___XX__X_X__
DB ___XX__X_X__
DB ____________
DB ____XXXX____
DB __XX___X_XX_
DB _XX_____XXX_
DB _XX______XX_
DB _XX______XX_
DB _XX______XX_
DB _XXX_____XX_
DB __XXX___XX__
DB ____XXXX____ ch149 label byte
DB 12,032h
DB ___XXX______
DB _____XX_____
DB ____________
DB ____XXXX____
DB __XX___X_XX_
DB _XX_____XXX_
DB _XX______XX_
DB _XX______XX_
DB _XX______XX_
DB _XXX_____XX_
DB __XXX___XX__
DB ____XXXX____ ch150 label byte
DB 12,032h
DB ____XXX_____
DB ___XX_XX____
DB ____________
DB _XXX___X_XX_
DB __XX____XX__
DB __XX____XX__
DB __XX____XX__
DB __XX____XX__
DB __XX____XX__
DB __XX___X_XX_
DB ___XXXX_XXX_ ch151 label byte
DB 12,032h
DB ___XXX______
DB _____XX_____
DB ____________
DB _XXX___X_XX_
DB __XX____XX__
DB __XX____XX__
DB __XX____XX__
DB __XX____XX__
DB __XX____XX__
DB __XX___X_XX_
DB ___XXXX_XXX_ ch152 label byte
DB 11,032h
DB __XX__X_X_____
DB __XX__X_X_____
DB ______________
DB XXXX____XXX___
DB _XX_____X_____
DB __XX____X_____
DB __XX____X_____
DB ___XX__X______
DB ___XX__X______
DB ____XX_X______
DB ____XXX_______
DB ____XXX_______
DB _____X________
DB _____XX_______
DB ____X_________
DB XX_X__________
DB XXX___________ ch153 label byte
DB 17,002h
DB ______XX___XX____
DB _________________
DB _____XXX_XXXX____
DB ___XXX_____XXX___
DB __XX_________XX_
DB __XX_________XX_
DB _XXX_________XXX
DB _XX__________XX
DB _XX__________XX
DB _XX__________XX
DB _XXX_________XXX
DB __XX_________XX_
DB __XX_________XX_
DB ___XXX_____XXX__
DB _____XXX_XXXX____ ch154 label byte
DB 17,002h
DB ______XX____XX____
DB _________________
DB _XXXXXXX____XXXXX
DB ___XX________X___
DB ___XX________X___
DB ___XX________X___
DB ___XX________X___
DB ___XX________X___
DB ___XX________X___
DB ___XX________X___
DB ___XX________X___
DB ___XX________X___
DB ____XX______X____
DB _____XXX____XX___
DB ______XX_XXX_____ ch155 label byte
DB 12,042h
DB _______X____
DB _______X____
DB ____XXXX_X__
DB __XX___X_XX_
DB _XX___X_XX__
DB _XX___X_____
DB _XX___X_____
DB _XX__X______
DB _XX__X______
DB _XXX_X______
DB __XXX_____X_
DB ___XXXXX_X__
DB _____X______
DB ___X________ ch156 label byte
DB 12,022h
DB ______XX_X__
DB ______X___XX
DB ____XX____XX
DB ____XX______
DB ____XX______
DB ____XX______
DB ___XXXXXX_X_
DB ____XX______
DB ____XX______
DB ____XX______
DB __XXXX______X_
DB XX___XXXX_XXX
DB __XXXX_XX_XX_ ch157 label byte
DB 12,022h
DB XXXXX_____XXXX___
DB _XX_______X______
DB __XX______X______
DB ___XX___X________
DB ____XX_X_________
DB _____XX_X________
DB XXXXXXXX_XXXX____
DB _____XX__________
DB _____XX__________
DB XXXXXXXX_XXXX____
DB _____XX__________

DB _____XX______
DB _____XX______
DB ___XXXXX_X_____ ch158 label byte
DB 12,062h
DB _XXX_XXX________
DB __XXX__X_XX_____
DB __XX_____XXX____
DB __XX______XX____
DB __XX______XX____
DB __XX______XX____
DB __XX______XX____
DB __XXX____XX_____
DB __XX_XXX_X______
DB __XX____________
DB __XX____________
DB __XX____________
DB _XXXX___________ ch159 label byte
DB 7,011h
DB ____XXX_
DB ___X_XX_
DB __XX____
DB __XX____
DB __XX____
DB _XXXXX__
DB __XX____
DB __XX____
DB __XX____
DB __XX____
DB __XX____
DB __XX____
DB __XX____
DB _XXXXX__ ch160 label byte
DB 11,032h
DB _____XX_X______
DB _____XX________
DB ________________
DB ___XXXX________
DB __XX___X_X_____
DB __XX___X_X_____
DB _____XXX_X_____
DB __XXX__X_X_____
DB _XX____X_X_____
DB _XX____X_X_____
DB _XXX__XX_X_____
DB __XXXX_X_XX____ ch161 label byte
DB 6,031h
DB __XXX___
DB _XX_____
DB ________
DB _XXX____
DB __XX____
DB __XX____
DB __XX____
DB __XX____
DB __XX____
DB __XX____
DB __XX____
DB _XXXX___ ch162 label byte
DB 12,032h
DB _____XX_X_____
DB _____XX_______
DB ______________
DB ____XXXX______
DB __XX___X_XX___
DB _XX______XXX__
DB _XX______XX___
DB _XX______XX___
DB _XX______XX___
DB _XXX_____XX___
DB __XXX___XX____
DB ____XXXX______ ch163 label byte
DB 12,032h
DB _____XX_X_____
DB _____XX_______
DB ______________
DB _XXX___X_XX___
DB __XX____XX____
DB __XX____XX____
DB __XX____XX____
DB __XX____XX____
DB __XX____XX____
DB __XX___X_XX___
DB ___XXXX_XXX___ ch164 label byte
DB 12,032h

DB __XXX__X______
DB _X__XXX______
DB ____________
DB _XXX_XXX,X______
DB __XXX___XX______
DB __XX____XX______
DB __XX____XX______
DB __XX____XX______
DB __XX____XX______
DB __XX____XX______
DB __XX____XX______
DB _XXXX__X,XXX______ ch165 label byte
DB 17,002h
DB _____X__XXX_____
DB ________________
DB _XXX________XXXXX
DB __XXX_________X__
DB __XXX_________X__
DB ___XXXX_______X__
DB ___X_XXX______X__
DB ___X__XX,X____X__
DB ___X___X,XX___X__
DB ___X_____XXX__X__
DB ___X______XXX_X__
DB ___X_______XXXX__
DB ___X________XXX__
DB ___X_________XX__
DB _XXXXX________X__ ch166 label byte
DB 8,021h
DB __XXXX__
DB _XX__XX_
DB _____XX_
DB __XXXXX_
DB _XX__XX_
DB _XX__XX_
DB __XXX_XX
DB ________
DB _XXXXXX_ ch167 label byte
DB 8,021h
DB __XXXX__
DB _XX__XX_
DB _XX__XX_
DB _XX__XX_
DB _XX__XX_
DB _XX__XX_
DB __XXXX__
DB ________
'DB _XXXXXX_ ch168 label byte
DB 11,022h
DB ____XXX__________
DB ____XXX__________
DB ________________
DB _____X___________
DB _____X___________
DB ____X____________
DB ___XX____________
DB __XX_____________
DB _XX______________
DB _XX______XX______
DB _XX______XX______
DB __XX_____X_______
DB ___XXXXX_________ ch169 label byte
DB 12,0F2h
DB ________________
DB XXXXXXXX,XXXX____ ch170 label byte
DB 14,092h
DB _XXXXXXX,XXXXX____
DB ______________XX___
DB ______________XX___
DB ______________XX___ ch171 label byte
DB 16,022h
DB ___X_____________XX_
DB _XXX____________XX__
DB __XX__________XX___
DB __XX_________XX____
DB __XX________XX_____
DB _XXXX____XX________
DB ________X,X________
DB _______XX____XXX__
DB ______XX____X__XX_
DB _____XX_________XX_
DB ____XX__________XX__
DB __XX___________XX_X_
DB _XX____________XXXXX_ ch172 label byte
DB 16,022h
DB ___X______________XX_
DB _XXX_____________XX__
DB __XX___________XX___
DB __XX__________XX____
DB __XX________XX_____
DB _XXXX_____XX_______
DB ________X,X________
DB _______XX________XX_
DB ______XX________XXX_
DB _____XX________X_XX_
DB ____XX_______X__XX_
DB __XX____________XXXXX_
DB _XX_______________XX_ ch173 label byte
DB 7,021h
DB __XXX___
DB __XXX___
DB ________
DB ___X____
DB ___X____
DB ___X____
DB ___X____
DB __XXX___
DB __XXX___
DB __XXX___
DB __XXX___
DB __XXX___
DB ___X____ ch174 label byte
DB 12,072h
DB _____XX____XX______
DB ___XX____XX______
DB __XX____X,X_______
DB _XX____XX_________
DB __XX____X,X_______
DB ___XX____XX______
DB _____XX____XX_____ ch175 label byte
DB 12,072h
DB _XX___XX_________
DB __XX___X,X_______
DB ___XX___XX_______
DB _____XX____XX_____
DB ___XX___XX_______
DB __XX___X,X_______
DB _XX___XX_________ ch176 label byte
DB 12,0F2h
DB ________________
DB XXXXXXXX,XXXX____ ch177 label byte
DB 12,0F2h
DB ________________
DB XXXXXXXX,XXXX____ ch178 label byte
DB 12,0F2h
DB ________________
DB XXXXXXXX,XXXX____ ch179 label byte
DB 6,021h
DB __XX____
DB __XX____
DB __XX____
DB __XX____
DB __XX____
DB __XX____
DB __XX____
DB ________
DB ________
DB __XX____
DB __XX____
DB __XX____
DB __XX____
DB __XX____
DB __XX____
DB __XX____ ch180 label byte
DB 12,0F2h
DB ________________
DB XXXXXXXX,XXXX____ ch181 label byte
DB 12,0F2h
DB ________________
DB XXXXXXXX,XXXX____ ch182 label byte
DB 12,0F2h
DB ________________
DB XXXXXXXX,XXXX____ ch183 label byte
DB 12,0F2h
DB ________________
DB XXXXXXXX,XXXX____ ch184 label byte
DB 12,0F2h
DB ________________
DB XXXXXXXX,XXXX____ ch185 label byte
DB 12,0F2h
DB ________________
DB XXXXXXXX,XXXX____ ch186 label byte
DB 12,0F2h
DB ________________
DB XXXXXXXX,XXXX____ ch187 label byte
DB 12,0F2h
DB ________________
DB XXXXXXXX,XXXX____ ch188 label byte
DB 12,0F2h
DB ________________
DB XXXXXXXX,XXXX____ ch189 label byte
DB 12,0F2h
DB ________________
DB XXXXXXXX,XXXX____ ch190 label byte
DB 12,0F2h
DB ________________
DB XXXXXXXX,XXXX____ ch191 label byte
DB 12,0F2h
DB ________________
DB XXXXXXXX,XXXX____ ch192 label byte
DB 12,0F2h
DB ________________
DB XXXXXXXX,XXXX____ ch193 label byte
DB 12,0F2h
DB ________________
DB XXXXXXXX,XXXX____ ch194 label byte
DB 12,0F2h
DB ________________
DB XXXXXXXX,XXXX____ ch195 label byte
DB 12,0F2h
DB ________________
DB XXXXXXXX,XXXX____ ch196 label byte
DB 12,0F2h
DB ________________
DB XXXXXXXX,XXXX____ ch197 label byte
DB 12,0F2h
DB ________________
DB XXXXXXXX,XXXX____ ch198 label byte
DB 12,0F2h
DB ________________
DB XXXXXXXX,XXXX____ ch199 label byte
DB 12,0F2h
DB ________________
DB XXXXXXXX,XXXX____ ch200 label byte
DB 12,0F2h
DB ________________
DB XXXXXXXX,XXXX____ ch201 label byte
DB 12,0F2h
DB ________________
DB XXXXXXXX,XXXX____ ch202 label byte
DB 12,0F2h
DB ________________
DB XXXXXXXX,XXXX____ ch203 label byte
DB 12,0F2h
DB ________________
DB XXXXXXXX,XXXX____ ch204 label byte
DB 12,0F2h
DB ________________
DB XXXXXXXX,XXXX____ ch205 label byte
DB 12,0F2h
DB ________________
DB XXXXXXXX,XXXX____ ch206 label byte
DB 12,0F2h
DB ________________
DB XXXXXXXX,XXXX____ ch207 label byte
DB 12,0F2h
DB ________________
DB XXXXXXXX,XXXX____ ch208 label byte
DB 12,0F2h
DB ________________
DB XXXXXXXX,XXXX____ ch209 label byte
DB 12,0F2h
DB ________________
DB XXXXXXXX,XXXX____ ch210 label byte
DB 12,0F2h
DB ________________
DB XXXXXXXX,XXXX____ ch211 label byte
DB 12,0F2h
DB ________________
DB XXXXXXXX,XXXX____ ch212 label byte
DB 12,0F2h
DB ________________
DB XXXXXXXX,XXXX____ ch213 label byte
DB 12,0F2h
DB ________________
DB XXXXXXXX,XXXX____ ch214 label byte
DB 12,0F2h
DB ________________
DB XXXXXXXX,XXXX____ ch215 label byte
DB 12,0F2h
DB ________________
DB XXXXXXXX,XXXX____ ch216 label byte
DB 12,0F2h
DB ________________
DB XXXXXXXX,XXXX____ ch217 label byte
DB 12,0F2h
DB ________________
DB XXXXXXXX,XXXX____ ch218 label byte
DB 12,0F2h
DB ________________
DB XXXXXXXX,XXXX____ ch219 label byte
DB 12,0F2h
DB ________________
DB XXXXXXXX,XXXX____ ch220 label byte
DB 12,0F2h
DB ________________
DB XXXXXXXX,XXXX____ ch221 label byte
DB 12,0F2h
DB ________________
DB XXXXXXXX,XXXX____ ch222 label byte

```
DB 12,0F2h
DB ________________
DB XXXXXXXX_XXXX____

ch223 label byte
DB 12,0F2h
DB ________________
DB XXXXXXXX_XXXX____

ch224 label byte
DB 12,0F2h
DB ________________
DB XXXXXXXX_XXXX____

ch225 label byte
DB 12,022h
DB ____XXXX________
DB ___XX__X_X______
DB __XX____XX______
DB __XX____XX______
DB __XX____X_X_____
DB __XX__XX________
DB __XX____X_X_____
DB __XX_____XX_____
DB __XX______XX____
DB __XX______XX____
DB __XX______XX____
DB __XX_XX__XX_____
DB _XXX__XX_X______

ch226 label byte
DB 12,0F2h
DB ________________
DB XXXXXXXX_XXXX____

ch227 label byte
DB 11,022h
DB ___XXXXX_XX_____
DB __XXXX__X_______
DB _XXXXX__X_______
DB _XXXXX__X_______
DB _XXXXX__X_______
DB __XXXX__X_______
DB ___XXX__X_______
DB _____X__X_______
DB _____X__X_______
DB _____X__X_______
DB _____X__X_______
DB _____X__X_______
DB _____X__X_______
DB _____X__X_______

ch228 label byte
DB 12,0F2h
DB ________________
DB XXXXXXXX_XXXX____

ch229 label byte
DB 12,0F2h
DB ________________
DB XXXXXXXX_XXXX____

ch230 label byte
DB 12,072h
DB _XX______XX_____
DB _XX______XX_____
DB _XX______XX_____
DB _XX______XX_____
DB _XX______XX_____
DB _XX______XX_____
DB _XXX____X_XX____
DB _XXXXXXX__XXX___
DB _XX_____________
DB _XX_____________
DB _XX_____________
DB _XX_____________

ch231 label byte
DB 12,0F2h
DB ________________
DB XXXXXXXX_XXXX____

ch232 label byte
DB 12,0F2h
DB ________________
DB XXXXXXXX_XXXX____

ch233 label byte
DB 12,0F2h
DB ________________
DB XXXXXXXX_XXXX____

ch234 label byte
DB 12,0F2h
DB ________________
DB XXXXXXXX_XXXX____

ch235 label byte
DB 12,0F2h
DB ________________
DB XXXXXXXX_XXXX____

ch236 label byte
DB 12,0F2h
DB ________________
DB XXXXXXXX_XXXX____

ch237 label byte
DB 17,022h
DB _____XXX_XXXX_XX_
DB ___XXX______XXX__
DB __XX________XXXX_
DB __XX_______XX_XX_
DB _XXX______XX__XXX
DB _XX______XX____XX
DB _XX______X_____XX
DB _XX_____X_X____XX
DB _XXX__XX_______XXX
DB __XX_XX_______XX_
DB __XXXX_______XX_
DB ___XXX______XXX__
DB __XX_XXX_XXXX____

ch238 label byte
DB 12,0F2h
DB ________________
DB XXXXXXXX_XXXX____

ch239 label byte
DB 12,0F2h
DB ________________
DB XXXXXXXX_XXXX____

ch240 label byte
DB 12,0F2h
DB ________________
DB XXXXXXXX_XXXX____

ch241 label byte
DB 14,042h
DB ______XX________
DB ______XX________
DB ______XX________
DB ______XX________
DB _XXXXXXX_XXXXX___
DB ______XX________
DB ______XX________
DB ______XX________
DB ______XX________
DB ________________
DB _XXXXXXX_XXXXX___

ch242 label byte
DB 12,0F2h
DB ________________
DB XXXXXXXX_XXXX____

ch243 label byte
DB 12,0F2h
DB ________________
DB XXXXXXXX_XXXX____

ch244 label byte
DB 12,0F2h
DB ________________
DB XXXXXXXX_XXXX____

ch245 label byte
DB 12,0F2h
DB ________________
DB XXXXXXXX_XXXX____

ch246 label byte
DB 12,0F2h
DB ________________
DB XXXXXXXX_XXXX____

ch247 label byte
DB 12,0F2h
DB ________________
DB XXXXXXXX_XXXX____

ch248 label byte
DB 8,021h
DB __XXXX__
DB _XX__XX_
DB _XX__XX_
DB __XXXX__

ch249 label byte
DB 8,071h
DB ___XX___
DB ___XX___

ch250 label byte
DB 8,071h
DB ___XX___
DB ___XX___

ch251 label byte
DB 12,0F2h
DB ________________
DB XXXXXXXX_XXXX____

ch252 label byte
DB 12,062h
DB _XXX_XXX_X______
DB __XXX___XX______
DB __XX____XX______
DB __XX____XX______
DB __XX____XX______
DB __XX____XX______
DB __XX____XX______
DB __XX____XX______
DB __XX____XX______
DB _XXXX__X_XXX____

ch253 label byte
DB 7,021h
DB __XXX__
DB _X__XX_
DB ____XX_
DB ___XX__
DB __XX_X_
DB _XXXXX_

ch254 label byte
DB 12,0F2h
DB ________________
DB XXXXXXXX_XXXX____
ch255 label byte

DATASEG_END
end
Copr. 1995 Zenith Data Systems Corp.

.model small
include sibdequ.inc
include sinclud.inc

DATASEG_BEGIN
extrn ControlDataStorageArea:byte

slfont3 label word
public slfont3
db 6
db 0

dw ch33,ch34,ch35,ch36,ch37,ch38,ch39
dw
ch40,ch41,ch42,ch43,ch44,ch45,ch46,ch47,ch48,ch4
9
dw
ch50,ch51,ch52,ch53,ch54,ch55,ch56,ch57,ch58,ch5
9
dw
ch60,ch61,ch62,ch63,ch64,ch65,ch66,ch67,ch68,ch6
9
dw
ch70,ch71,ch72,ch73,ch74,ch75,ch76,ch77,ch78,ch7
9
dw ch80,ch81,ch82,ch83

ch33 label byte
DB 7,001h
DB ___X___
DB __XXX__
DB _XXXXX_
DB XXXXXXX_
DB __XXX__
DB __XXX__
DB __XXX__

ch34 label byte
DB 7,001h
DB __XXX__
DB __XXX__
DB __XXX__
DB XXXXXXX_
DB _XXXXX_
DB __XXX__
DB ___X___

if need_ask eq 0
ch35 label byte
else
ch35 label byte
db 15 , 2
db XXXXXXXX_XXXXXXX_
db X_____________X_
db X_XXXXXX_X_XXX_X_
db X_XXXXXX_X_XXX_X_
db X_XXXXXX_X_XXX_X_
db X_XXXXXX_X_XXX_X_
db X_____________X_
db XXXXXXXX_XXXXXXX_

ch36 label byte
db 11 , 2
db XXXXXXXX_XXX_____
db X__________X_____
db X_XXXXXX_X_X_____
db X_XXXXXX_X_X_____
db X_XXXXXX_X_X_____
db X_XXXXXX_X_X_____
db X__________X_____
db XXXXXXXX_XXX_____

ch37 label byte
db 13 , 2
db ____XXXX_XXXXX___
db ____X_________X___
db ____X_________X___
db ____X_________X___
db ____X_________X___
db XXXXXXXX_X___X___
db X_________XXXXX___
db X_________X_______
db X_________X_______
db X_________X_______
db X_________X_______
db XXXXXXXX_X_______

ch38 label byte
db 10 , 2
db _X_________X______
db XXX______XXX______
db _XXX____X_XX______
db __XXX_XX_X_______
db ___XXXXX_________
db _____XXX_________
db ___XXXXX_________
db __XXX_XX_X_______
db _XXX____X_XX______
db XXX______XXX______
db _X_________X______

ch39 label byte
db 18 , 3
db _XXXXX_________________________
db _XX____________________________
db _XX______XXX___XX_X___________
db _XXXX__X_X_XX_XX_XX___________
db _XX______XXX__XX_______________
db _XX__________XX_XX_____________
db _XX_____X_X_XX_XX_XX___________
db _XXXXX__XXX___XX_X____________

ch40 label byte
db 10 , 2
db _XXXXX__XX______
db _XX____X_XX______
db _XX______XX______
db _XXXX____XX______
db _XX______XX______
db _XX______XX______
db _XX______XX______
db _XX______XX______

ch41 label byte
db 13 , 2
db _XXXXX__XXXX____
db _XX____X_X__XX___
db _XX__________XX___
db _XXXX________XX___
db _XX________XX______
db _XX______XX_______
db _XX____X_X________
db _XX_____X_XXXXX___

ch42 label byte
db 13 , 2
db _XXXXX_X_XXXXX___
db _XX__________XX___
db _XX__________XX___
db _XXXX_____XXXX___
db _XX____________XX___
db _XX____________XX___
db _XX_____X_X__XX___
db _XX_______XXXX____

ch43 label byte
db 14 , 2
db _XXXXX_________XX___
db _XX__________XXX___
db _XX_________XXXX___
db _XXXX_____XX_XX___
db _XX_____X_X__XX___
db _XX_____X_XXXXXX__
db _XX____________XX___
db _XX____________XX___

ch44 label byte
db 13 , 2
db _XXXXX_X_XXXXX___
```

```
db _XX____X.X______
db _XX____X.X______
db _XXXX__X.XXXX___
db _XX_________XX__
db _XX_________XX__
db _XX____X.X__XX__
db _XX______XXXX___

ch45 label byte
db 13 , 2
db _XXXXX____XXX___
db _XX______XX_____
db _XX_____X.X_____
db _XXXX__X.XXXX___
db _XX____X.X__XX__
db _XX____X.X__XX__
db _XX____X.X__XX__
db _XX______XXXX___

ch46 label byte
db 13 , 2
db _XXXXX_X.XXXXX___
db _XX_________XX__
db _XX_________XX__
db _XXXX_______XX__
db _XX_________XX__
db _XX________XX___
db _XX________XX___
db _XX________XX___

ch47 label byte
db 13 , 2
db _XXXXX___XXXX___
db _XX____X.X__XX__
db _XX____X.X__XX__
db _XXXX_____XXXX___
db _XX____X.X__XX__
db _XX____X.X__XX__
db _XX____X.X__XX__
db _XX______XXXX___

ch48 label byte
db 13 , 2
db _XXXXX__XXXX____
db _XX____X.X__XX__
db _XX____X.X__XX__
db _XXXX__X.X__XX__
db _XX______XXXXX__
db _XX_________XX__
db _XX_________XX__
db _XX________XXX___

ch49 label byte
db 17 , 3
db _XXXXX__XX__XXXX_______
db _XX____X.XX_XX__X.X_______
db _XX_____XX_XX__X.X_______
db _XXXX___XX_XX__X.X_______
db _XX_____XX_XX__X.X_______
db _XX_____XX_XX__X.X_______
db _XX_____XX_XX__X.X_______
db _XX_____XX__XXXX_______

ch50 label byte
db 14 , 2
db _XXXXX__XX__XX__
db _XX____X.XX_XXX__
db _XX_____XX__XX__
db _XXXX___XX__XX__
db _XX_____XX__XX__
db _XX_____XX__XX__
db _XX_____XX__XX__
db _XX_____XX__XX__

ch51 label byte
db 17 , 3
db _XXXXX__XX__XXXX_______
db _XX____X.XX_XX__X.X______
db _XX_____XX_____X.X______
db _XXXX___XX____XX_______
db _XX_____XX__XX_________
db _XX_____XX_XX__________
db _XX_____XX_XX__________
db _XX_____XX_XXXXX.X_____

ch52 label byte
db 18 , 3
db _XXXXX________X.X_______
db _XX__XX_______X.X_______
db _XX__XX__XXXXX_XX.XX_____
db _XX__XX_XXX_____X.X_____
db _XXXXX___XX_____XX______
db _XX______XX_____X.X_____
db _XX______XX_____X.X_____
db _XX______XX______XX_____

ch53 label byte
DB 12,2
DB _XXXXXXX.XXX_____

DB XXXXX__X.XXXX___
DB XXXXX__X.XXXX___
DB XXXXX__X.XXXX___
DB XXXXX__X.XXXX___
DB XXXXX__X.XXXX___
DB XXX______XXX___
DB XXXX_____XXXX___
DB XXXXX__X.XXXX___
DB _XXXXXXXX.XXX___

ch54 label byte
db 8 , 1
db XXX__XXX
db XXX__XXX
db XXX__XXX
db XXX__XXX
db XXX__XXX
db XXX__XXX

ch55 label byte
db 30 , 4
db _XXXXX______________XX___
db _XX__XX_____________XX___
db _XX__XX_XXXXX_XX.X___XXX__XX_XX__
db _XXXXX__XXX__XX_XX_XX_XX__XXXX__
db _XX__XX_XX___XXX.XX__XXXX_XXX___
db _XX__XX_XX___XX_____XX_XX_XXX___
db _XX__XX_XX___XX_XX_XX_XX_XXXX___
db _XXXXX___XX____XX.X___XXXX_XX_XX__

ch56 label byte
db 20 , 3
db __XXXX______________XXX
db _XX_XX______________XX_
db _XX_______XX_XX__X.XX__XX_
db __XXXX__XX_XX_XX_XX_XX_
db _____XX_XX_XX__X.XX__XXX
db _____XX_XX_XX____XX_XXX
db _XX__XX_XX_XX_XX_XX_XX_
db __XXXX___XXXX__X.XX_XX_
db ____________XX__________
db ____________XXX_________

ch57 label byte
db 17 , 3
db ____X___________________
db ___XX___________________
db __XXX___________________
db _XXXXXXX.XXXXXXXX.X_____
db _XXXXXXX.XXXXXXXX.X_____
db _XXXXXXX.XXXXXXXX.X_____
db __XXXXXX.XXXXXXXX.X_____
db __XXX___________________
db ___XX___________________
db ____X___________________

ch58 label byte
db 15 , 2
db _XX_____________
db _XX_____________
db _XX_XXXX___XXX__
db _XX_XX_X.X_XX_XX_
db _XX_XX_X.X__XXX__
db _XX_XX_X.X____XX_
db _XX_XX_X.X_XX_XX_
db _XX_XX_X.X__XXX__

ch59 label byte
db 12,2
db XXXXXXXX.XXXX___
db XXXXXXXX.XXXX___
db XX______________
db XX_XXX__________
db XX_XXXXX________
db XX_XXXXX.XX_____
db XX_XX_XX________
db XX_______X.X____
db XX_______XX_____
db XX_______XX_____
db XX______________

ch60 label byte
db 8 , 1
db ___XX___
db __XXXX__
db _XXXXXX_
db XXXXXXXX
db ___XX___
db ___XX___
db ___XX___
db _XXXXXX_
db ___XX___
db _XXXXXX_
db ___XX___
db _XXXXXX_

ch61 label byte
DB 12,2

DB _XXXXXXX.XXX____
DB XXXXX__X.XXXX___
DB XXXX___X.XXXX___
DB XXX____X.XXXX___
DB XX__X__X.XXXX___
DB XXXXX__X.XXXX___
DB XXXXX__X.XXXX___
DB XXXXX__X.XXXX___
DB XXXXX__X.XXXX___
DB _XXXXXXX.XXX____

ch62 label byte
db 18 , 2
db _X___XX_________
db _X___XXX________
db _X__XXXX________
db _X_XXXXX.XXXXXXX_
db _X_XXXXX.XXXXXXX_
db _X__XXXX________
db _X___XXX_X______
db _X___XX__XX___X
db ________X_XXX___X
db __________XXXX___X
db _XXXXXXX.XXXXXX_X
db _XXXXXXX.XXXXXX_X
db __________XXXX___X
db ___________XXX___X
db ____________XX___X
db _____________X______

ch63 label byte
db 16 , 2
db _XXXX_________XXX
db _XX_XX________XX
db _XX_XX__XXX__XX
db _XX_XX_XX_XX_XX
db _XX_XX_XXXXX_XX
db _XX_XX_XX___XX
db _XX_XX_XX_XX_XX
db _XXXX___XXX__XX

ch64 label byte
db 12,2
db ________XX___
db XX______XX___
db _XX_____XX___
db __XX____XX___
db ___XX___XX___
db ___XX_X.X_XX____
db __XXXXXX.X_XX___
db ___XXXX.X_XX___
db ______XX.X_XX___
db __________XX___
db XXXXXXXX.XXXX___
db XXXXXXXX.XXXX___

ch65 label byte
db 8 , 1
db _XXXXXX_
db ___XX___
db _XXXXXX_
db ___XX___
db _XXXXXX_
db ___XX___
db ___XX___
db ___XX___
db XXXXXXXX
db _XXXXXX_
db __XXXX__
db ___XX___

ch66 label byte
db 9 , 2
db ____XX__________
db ___XXXX_________
db __XXXXXX________
db _XXXXXXX.X______
db ____XX__________
db ____XX__________
db ____XX__________
db ____XX__________
db ____XX__________

ch67 label byte
DB 23,3
DB _XXXXXXX.XXX______XX_____
DB XXXXX__X.XXXX___X.X__XX___
DB XXXXX__X.XXXX__XX.X__XXX__
DB XXXX_____XXXX__XX.XXXXXX__
DB XXXX_XX__XXXX_XXX.XXXXXXX_
DB XXX__XX___XXX_X_________X_
DB XXX________XXX_X____XX___X_
DB XX__XXXX___XX_X____XX___X_
DB XX__XXXX___XX__X_______X__
DB _XXXXXXX.XXX____X.XXXXX___

ch68 label byte
db 38 , 4
db _____X____________________________________

db ____XX______________________XXX__
db ___XXX______________________XXX__
db __XXXX______________________XXX__
db _XXXXXXX.XXXXXXXX.XXXXXXXX.XXXXXX__
db _XXXXXXX.XXXXXXXX.XXXXXXXX.XXXXXX__
db __XXXXXX.XXXXXXXX.XXXXXXXX.XXXXXX__
db __XXX______________________________
db ___XX______________________________
db _____X_____________________________

ch69 label byte
db 10 , 2
db ____X____________
db ___XX____________
db __XXX____________
db _XXXXXXX.XX______
db _XXXXXXX.XX______
db __XXX____________
db ___XX____________
db ____X____________

ch70 label byte
db 10, 2
db ______X__________
db ______XX_________
db ______XX.X_______
db _XXXXXXX.XX______
db _XXXXXXX.XX______
db ______XX.X_______
db ______XX_________
db ______X__________

ch71 label byte
db 15 , 2
db _______X.X_______
db ______XX.XX______
db _____XXX.XXX_____
db ____XXX__XXX_____
db ___XXX____XXX___
db __XXX_______XXX__
db _XXXXXX__XXXXXX_
db _XXXXXX__XXXXXX_
db _____XX__XX_____
db _____XX__XX_____
db _____XXX.XXX_____

ch72 label byte
db 15 , 2
db _________________
db _________________
db __XX__X.XX__XX__
db __XX___XX__XX__
db __XXXX__XX_XXXX_
db __XXXX__XX__XX__
db _XX__XX_XX__XX__
db _XXXXXX_XX__XX__
db _XX__XX_XX__XX__
db _XX__XX_XX___XX_
db _________________

ch73 label byte
db 20 , 3
db ________________________
db ________________________
db __XXXX__XX_______XXX____
db _XX__XX_XX________XX____
db _XX____X.XXX_XXXX.X_XX____
db _XX_____XX__XXX____XX____
db _XX_____XX__XX_____XX____
db _XX_____XX__XX_____XX____
db _XX__XX_XX__XX_____XX____
db __XXXX___XX_XX_____XX____
db ________________________

ch74 label byte
db 8 , 2
db ____XX__________
db ____XX__________
db ____XX__________
db ____XX__________
db ____XX__________
db _XXXXXXX.X______
db __XXXXXX________
db ___XXXX_________
db ____XX__________

ch75 label byte
db 16 , 2
db ____X____________
db ___XX__________XXX
db __XXX__________XXX
db _XXXX__________XXX
db XXXXXXXX.XXXXXXXX
db XXXXXXXX.XXXXXXXX
db _XXXXXXX.XXXXXXXX
db __XXX____________
db ___XX____________
db ____X____________
```

```
ch76 label byte
DB 4,1
DB ______
DB ______
DB _XXX___
DB _XX___
DB _XX___
DB _XX___
DB _XX___
DB _XX___
DB _XX___
DB _XX___
DB _XX___
DB _XX___
DB _XXX___

ch77 label byte
DB 4,01h
DB ______
DB ______
DB XXX____
DB _XX___
DB _XX___
DB _XX___
DB _XX___
DB _XX___
DB _XX___
DB _XX___
DB _XX___
DB _XX___
DB XXX____

ch78 label byte
db 4,1
db ______

ch79 label byte
db 7,1
db XXXXXXX_
db X_____X_
db X_XXX_X_
db X_XXX_X_
db X_XXX_X_
db X_XXX_X_
db X_____X_
db XXXXXXX_

ch80 label byte
db 16,2
db XXXXXXXX,XXXXXXXX
db XXXXXXXX,XXXXXXXX
db X______________X
db X______________X
db X______________X
db X______________X
db X______________X
db X______________X
db XXXXXXXX,XXXXXXXX

ch81 label byte
DB 8,1
DB ___XX___
DB ___XX___
DB ___XX___
DB _XXXXXX_
DB ___XX___
DB ___XX___
DB ___XX___

ch82 label byte
db 23,3
db __XXXXXX,XXXXXXXX,XXXXXX__
db _XXXXXXX,XXXXXXXX,XXXXXXX_
db _XX__________________XX_
db _XX__________________XX_
db _XX__________________XX_
db _XX__________________XX_
db _XX__________________XX_
db _XX__________________XX_
db _XXXXXXX,XXXXXXXX,XXXXXXX_
db __XXXXXX,XXXXXXXX,XXXXXX__

ch83 label byte

endif

DATASEG_END
end
Copr. 1995 Zenith Data Systems Corp.

.model small
include uibitsqu.inc
include uimclud.inc

DATASEG_BEGIN
extrn ControlDataStorageArea byte

uifont4 label word
public uifont4

db 6
db 0

dw ch33,ch34,ch35,ch36,ch37,ch38,ch39
dw
ch40,ch41,ch42,ch43,ch44,ch45,ch46,ch47,ch48,ch4
9
dw ch50,ch51,ch52,ch53,ch54

ch33 label byte
DB 16,002h
db XXXXXXXX,XXXXXXXX
db XXXXXXXX,XXXXXXXX

ch34 label byte

ch35 label byte
DB *,001h
db ~ dup(XX______)

ch36 label byte
db 22,3
db ______X,XXXXXXX______
db _____XXX,XXXXXXXX,X______
db ____XXXX___XXXXX,XX______
db ___XXX____XXXXX,XXX_____
db __XX______XXXXX,XXXX____
db _XX_______XXXXX,XXXXX___
db _XX_______XXXXX,XXXXX___
db XX________XXXXX,XXXXXX__
db XX________XXXXX,XXXXXX__
db XX________XXXXX,XXXXXX__
db XX________XXXXX,XXXXXX__
db XX________XXXXX,XXXXXX__
db XX________XXXXX,XXXXXX__
db _XX_______XXXXX,XXXXX___
db _XX_______XXXXX,XXXXX___
db __XX______XXXXX,XXXX____
db ___XXX____XXXXX,XXX_____
db ____XXXX___XXXXX,XX______
db _____XXX,XXXXXXXX,X______
db ______X,XXXXXXX______

ch37 label byte
db 40,5
db
______________XX________________
db
______________XX________________
db
______________XX________________
db
___XX___________XX___________XX___
db
___XXX______________________XXX___
db
___XXX______________________XXX___
db
____XX,X_______XXXXXXXX_______X,XX___
db
_____X,XX____XX,XXXXXXXX,XX____XX,X___
db
______XXX__XXX,XXXXXXXX,XXX__XXX____
db
_________XXXX,XXXXXXXX,XXXX________
db
________XXXXX,XXXXXXXX,XXXXX_______
db
________XXXXXX,XXXXXXXX,XXXXXX______
db
________XXXXXX,XXXXXXXX,XXXXXX______
db
________XXXXXXX,XXXXXXXX,XXXXXXX____
db
________XXXXXXX,XXXXXXXX,XXXXXXX____
db
XXXXXX___XXXXXXX,XXXXXXXX,XXXXXXX___
XXXXXX
db
XXXXXX___XXXXXXX,XXXXXXXX,XXXXXXX___
XXXXXX
db
________XXXXXXX,XXXXXXXX,XXXXXXX_____
____
db
________XXXXXXX,XXXXXXXX,XXXXXXX_____
____
db
_________XXXXXX,XXXXXXXX,XXXXXX______
____
db
_________XXXXXX,XXXXXXXX,XXXXXX______
____
db
__________XXXXX,XXXXXXXX,XXXXX________
__
db
___________XXXX,XXXXXXXX,XXXX__________
__
db
__________XXX__XXX,XXXXXXXX,XXX__XXX_____
____
db
_______X,XX____XX,XXXXXXXX,XX____XX,X____
__
db
______XX,X______XXXXXXXX______X,XX____
_
db
_____XXX_______________________XXX____
_
db
____XXX_______________________XXX____
_
db
____XX____________XX____________XX____
_
db
________________________XX________________
db
________________________XX________________
db
________________________XX________________

ch38 label byte
db 36,5
db
__________________________________________
db
__________________________________________
db
__________________________________________
db
_____________________XXXXX,X______________
_
db
________________________XX________________
db
XX__________XXXXX______XX________________
_
db
XX______________X______XX________________
_
db
XX______________X_____XXXXX,X____________
_
db
XX____________XXXXX______________________
_
db
XX_XXX___________________________________
_
db
XX_XXXX_XXXX______X______________________
__
db
XX_XXXXX,XXXXX_XX________________________
__
db
XX_XXXXX,XXXXXXXX____________________XX_
___
db
XX____________________________________XX____
db
XXXXXXXX,XXXXXXXX,XXXXXXXX,XXXXXXXX,X
XXX____
db
XXXXXXXX,XXXXXXXX,XXXXXXXX,XXXXXXXX,X
XXX____
db
XX____________________________________XX____
db
XX____________________________________XX____
db
XX____________________________________XX____
db
XX____________________________________XX____

ch39 label byte
db 30,4
db ___XXXXX,XXXXXXXX,XXXXXXXX,XXXX____
db __XXXXXX,XXXXXXXX,XXXXXXXX,XXXXX___
db __XXXXXX,XXXXXXXX,XXXXXXXX,XXXXX___
db __XXXXXX,XXXXXXXX,XXXXXXXX,XXXXX___
db __XXXX______________________XXXX___
db __XXXX______________________XXXX___
db __XXXX___XXXXX___XXXXX___XXXX___
db __XXXX___XXXXX___XXXXX___XXXX___
db __XXXX______________________XXXX___
db __XXXX____XX__________XX____XXXX___
db __XXXX______________________XXXX___
db __XXXX______________________XXXX___
db __XXXX________XX,XX_________XXXX___
db __XXXX______________________XXXX___
db __XXXX____XX____________XX___XXXX___
db __XXXX____XXXXXX,XXXXXX____XXXX___
db ___XXX_____XXXXX,XXXXX_____XXX____
db ___XXX______________________XXX____
db ___XXX______________________XXX____
db ___XXXXX,XXXXXXXX,XXXXXXXX,XXXX_____
db ____XXXX,XXXXXXXX,XXXXXXXX,XXX______
db _____XXX,XXXXXXXX,XXXXXXXX,XX_______

ch40 label byte
db 17,3
db _XX____________XX__________
db XXXX__________XXX,X________
db XXXXX_________XXXX,X_______
db _XXXXX_______XXXXX_________
db __XXXXX____XXXXX__________
db ___XXXXX_XXXXX____________
db _____XXXX,XXXXX____________
db ______XXX,XXXX_____________
db _______XX,XXX______________
db ______XXX,XXXX_____________
db _____XXXX,XXXXX____________
db ___XXXXX,_XXXXX____________
db __XXXXX____XXXXX__________
db _XXXXX_______XXXXX_________
db XXXXX_________XXXX,X_______
db XXXX__________XXX,X________
db _XX____________XX__________

ch41 label byte
db 78,10
db
__________________________________________________
__________________________
______________________________
db
____XXXX___XXXXX____XXX___X,XX_XXX___XXXX
___XX,XXXX___XX,XXXX_____XX
______X,XXXXXX______________
db
___XX____X,X___X___X,X___X_____X____X___X_____X_
X_________XX____XX____XX
X______XX____XXX,__________
db
_XX_______X___X______X___X______X____X___X_______
X__________XX______XX___XX
X_______XX_______X,X_________
db
_X_________X_____X___X______X____X___X_______)
___________XX_______XX___X_
XX_____XX________X__________
db
XX_________X___XX_____X______X_____X____XXX___
XX,XXX____XX______XX_X,X_
XX______XX__________XX________
db
XX_________X_XX_____X_______X_____X_______X_
X___________XX_______X___X__
_X______XX__________XX________
db
XX__________X___X_____X_______X_____X_________X_)
___________XX_XXX___XX,XX
XXX_____XX__________XX________
db
XX__________X____X_____X_______X____X___X____X_
X___________XX___________X___
_XX_____XX__________X__________
db
XX__________XX_____X____XXXX_____XXX___XXX_
_XX,XXXX___XX_________XX___
_XX_____XX_________X,X_________
db
_X_____________________________________________
__________XX__________X___
__XX___XX______XX____________
db
_XX________X_________________________________
__________XX_________X____
__XX___XXXXXXX____________
db
__XXX___X,XX___________________________________
________________________
```

```
_________________
db
____xxxx,________________________________
x,xxxxxxx,_____x___
_________________
db
___________________________________xxxxxxx
x,xxxxxxxx,xxxxxxxx,xx
xxxxxx,xxx_____,xxx____
db
_____________________xxx_____xxx,xxxxxx
xx,xxxxxxxx,xxxxxxxx,xx
xxxxxx,xxxxxxxx,xxxxxxx_
db
______________x,xxxxxxxx,xxxxxxxx,xxxx
xxxx,xxxxxxxx,xxxxxx____
__xxxx,xx__xxxx,xxxxx___
db
_________xxxxxx,xxxxxxxx,xxxxxxxx,xxx
xxxxx,xxxxx_xx,x________
_________________
db
______xx,xxxxxxxx,xxxxxxxx,xxxxxxxx,xx
xxxxx,_________________
_________________
db
__xxxxxx,xxxxxxxx,xxxxxxxx,xxxxxxxx,xx
___________________
_________________
db
xxxxxxxx,xxxxxxxx,xxx__xxx,xxx_________
__________________
_________________
db
xxxxxxxx,xxxxxxxx,x______________________
__________________
_________________
db
__xxxxxx,xxxxxx__________________________
_________________
_________________

ch42 label byte
db 38 . 5
db
xxxxxxxx,xxxxxxxx,xxxxxxxx,xxxxxxxx,x
xxxxx__
db
x_______________________________x__
db
x_______________________________x__
db
x________________________x,xxx__x_
-
db
x________________________x,xxx__x_
-
db
x_____xx,xxxxxxxx,xxxxxxxx,xx_____x,xxx
__x__
db
x____xxx,xxxxxxxx,xxxxxxxx,xxx____x,xxx
__x__
db
x____xxx,xxxxxxxx,xxxxxxxx,xxx____x,xxx
__x__
db
x____xxx,xxxxxxxx,xxxxxxxx,xxx____x,xxx
__x__
db
x____xxx,xxxxxxxx,xxxxxxxx,xxx____x,xxx
__x__
db
x____xxx,xxxxxxxx,xxxxxxxx,xxx____x,xxx
__x__
db
x____xxx,xxxxxxxx,xxxxxxxx,xxx____x,xxx
__x__
db
x____xxx,xxxxxxxx,xxxxxxxx,xxx____x,xxx
__x__
db
x____xxx,xxxxxxxx,xxxxxxxx,xxx____x,xxx
__x__
db
x____xxx,xxxxxxxx,xxxxxxxx,xxx____x,xxx
__x__
db
x____xxx,xxxxxxxx,xxxxxxxx,xxx____x,xxx
__x__
db
x____xxx,xxxxxxxx,xxxxxxxx,xxx____x,xxx
__x__
db
x____xxx,xxxxxxxx,xxxxxxxx,xxx____x,xxx
__x__
db
x_____xx,xxxxxxxx,xxxxxxxx,xx_____x,xxx
__x__
db
x______________________x,xxx__x_
-
db
x______________________x,xxx__x_
-
db
x_____________________xx,xxx__x_
-
db
x__xxxxx,x_________xxx,xxxxxxxx,xxx_
_x_
db
x__xx________________xxxxxxx,xxx__x
-
db
x__xxxxx,xxxxxxxx,xxxxxxxx,xxxxxxxx,xx
x__x_
db
x_________________________xx__x_
db
x_________________________xx__x_
db
x_________________x,xxxxxx__xx__x
-
db
x_________________xx,xxxxxxx__xx__x
-
db
x_________________xx,xxxxxxx__xx__x
-
db
x_________________x,xxxxxx__xx__x
-
db
x_________________________xx__x_
db
x_________________________xx__x_
db
x__xxxxx,xxxxxxxx,xxxxxxxx,xxxxxxxx,xx
x__x_
db
x__xxxxx,xxxxxxxx,xxxxxxxx,xxxxxxxx,xx
x__x_
db
x_______________________________x_
db
x_______________________________x_
db
xxxxxxxx,xxxxxxxx,xxxxxxxx,xxxxxxxx,x
xxxxx__

ch43 label byte
db 38 . 5
db
xxxxxxxx,xxxxxxxx,xxxxxxxx,xxxxxxxx,x
xxxxx__
db
x_______________________________x_
db
x__xxxxx,xxxxxxxx,xxxxxxxx,xxxxxxxx,xx
x__x_
db
x__xxxxx,xxxxxxxx,xxxxxxxx,xxxxxxxx,xx
x__x_
db
x__xxxxx,xxxxxxxx,xxxxxxxx,xxxxxxxx,xx
x__x_
db
x__xx__x,xxxxxxxx,xxxxxxxx,xxxxxxxx,xx
x__x_
db
x__x__x,xxxxxxxx,xxxxxxxx,xxxxxxxx,xx
x__x_
db
x____xx__xxxxxxx,xxxxxxxx,xxxxxxxx,xx
x__x_
db
x____xx____xxxxxx,xxxxxxxx,xxxxxxxx,xxx
_x_
db
x__xx______xxx,xxxxxxxx,xxxxxxxx,xxx
_x_
db
x__xx__________xxxxxxx,xxxxxxxx,xxx_
_x_
db
x__x_________________xxxxxxx,xxx__x
-
db
x__x_________________xxxxxx,xxx__x
-
db
x__x_________________xxxxxxx,xxx__x
-
db
x__xx______________xxx,xxxxxxxx,xxx_
x_
db
x__xxx__________________xx,xxxxxxxx,xxx__
x__
db
x__xxxx,________________x,xxxxxxxx,xxx__
x__
db
x__xxxxx_________________xxxxxxxx,xxx__
x__
db
x__xxxxx,x__________x_____xxxxxxx,xxx__
x__
db
x__xxxxx,xx__________xxxx____xxxxxx,xxx_
_x__
db
x__xxxxx,xxx______xxxxxxx___xxxxxxx,xxx
__x__
db
x__xxxxx,xxxxx__x,xxxxxxxx,x__________
_x__
db
x__xxxxx,xxxxxxxx,xxxxxxxx,x__xxxxx,x_
__x__
db
x__xxxxx,xxxxxxxx,xxxxxxxx,x_xx_xx_xx
__x__
db
x__xxxxx,xxxxxxxx,xxxxxxxx,x_xx_xx_xx
__x__
db
x__xxxxx,xxxxxxxx,xxxxxxxx,x_xx____xx_
_x__
db
x__xxxxx,xxxxxxxx,xxxxxxxx,x_xx_xx_xx
__x__
db
x__xxxxx,xxxxxxxx,xxxxxxxx,x_xx_xx_xx
__x__
db
x__xxxxx,xxxxxxxx,xxxxxxxx,x_xxxxxx,xx
__x__
db
x__xxxxx,xxxxxxxx,xxxxxxxx,x__xxxxx,x_
__x__
db
x__xxxxx,xxxxxxxx,xxxxxxxx,x__________
_x__
db
x__xxxxx,xxxxxxxx,xxxxxxxx,xx_________
__x__
db
x__xxxxx,xxxxxxxx,xxxxxxxx,xxxxxxxx,xx
x__x__
db
x__xxxxx,xxxxxxxx,xxxxxxxx,xxxxxxxx,xx
x__x__
db
x________________________________x__
db
x________________________________x__
db
x________________________________x__
db
xxxxxxxx,xxxxxxxx,xxxxxxxx,xxxxxxxx,x
xxxxx__

ch44 label byte
db 38 . 5
db
xxxxxxxx,xxxxxxxx,xxxxxxxx,xxxxxxxx,x
xxxxx__
db
x________________________________x__
db
x__xxxxx,xxxxxxxx,xxxxxxxx,xxxxxxxx,xx
x__x__
db
x__xxxxx,xxxxxxxx,xxxxxxxx,xxxxxxxx,xx
x__x__
db
x__xxxxx,xxxxx_xx,xxxxxxx_,xxxxxxxx,xx
x__x__
db
x__xxxxx,xxxx__xx,xxxxxxx__xxxxxxx,xx
x__x__
db
x__xxxxx,xxx___xx,xxxxxxx___xxxxxx,xxx
__x__
db
x__xxxxx,xx____xx,xxxxxxx____xxxxx,xxx
__x__
db
x__xxxxx,xx____xx,xxxxxxx____xxxxx,xxx
__x__
db
x__xxxxx,x_____xx,xxxxxxx_____xxxx,xxx_
_x__
db
x__xxxxx,x_____xx,xxxxxxx_____xxxx,xxx_
_x__
db
x__xxxxx,x_____xx,xxxxxxx_____xxxx,xxx_
_x__
db
x__xxxxx,x_____xx,xxxxxxx_____xxxx,xxx_
_x__
db
x__xxxxx,x_____xx,xxxxxxx_____xxxx,xxx_
_x__
db
x__xxxxx,xx_____x,xxxxxx______xxxxx,xxx_
_x__
db
x__xxxxx,xx______xxxxx________xxxxx,xxx_
_x__
db
x__xxxxx,xxx_________________xxxxxx,xxx__
x__
db
x__xxxxx,xxxx_________________xxxxxxx,xxx_
_x__
db
x__xxxxx,xxxxx_______________xxxxxxxx,xxx_
_x__
db
x__xxxxx,xxxxxx______________x,xxxxxxxx,xxx
__x__
db
x__xxxxx,xxxxxx__xxxxx__x,xxxxxxxx,xx
x__x__
db
x__xxxxx,xxxxxx__x______x,xxxxxxxx,xxx
__x__
db
x__xxxxx,xxxxxx__x______x,xxxxxxxx,xxx
__x__
db
x__xxxxx,xxxxxx__x______x,xxxxxxxx,xxx
__x__
db
x__xxxxx,xxxxxx__x______x,xxxxxxxx,xxx
__x__
db
x__xxxxx,xxxxxx__x______x,xxxxxxxx,xxx
__x__
db
x__xxxxx,xxxxxx__x______x,xxxxxxxx,xxx
__x__
db
x__xxxxx,xxxxxx__x______x,xxxxxxxx,xxx
__x__
db
x__xxxxx,xxxxxx__x______x,xxxxxxxx,xxx
__x__
db
x__xxxxx,xxxxxx__x______x,xxxxxxxx,xxx
__x__
db
x__xxxxx,xxxxxx__x______x,xxxxxxxx,xxx
__x__
db
x__xxxxx,xxxxxx__x______x,xxxxxxxx,xxx
__x__
db
x__xxxxx,xxxxxx__x______x,xxxxxxxx,xxx
__x__
db
x__xxxxx,xxxxxx__x______x,xxxxxxxx,xxx
__x__
db
x__xxxxx,xxxxxx__x______x,xxxxxxxx,xxx
__x__
db
x__xxxxx,xxxxxx__x______x,xxxxxxxx,xxx
__x__
db
x________________________________x__
db
x________________________________x__
db
xxxxxxxx,xxxxxxxx,xxxxxxxx,xxxxxxxx,x
xxxxx__

ch45 label byte
db 38 . 5
db
xxxxxxxx,xxxxxxxx,xxxxxxxx,xxxxxxxx,x
xxxxx__
db
x________________________________x__
db
x__xxxxx,xxxxxxxx,xxxxxxxx,xxxxxxxx,xx
x__x__
db
x__xxxxx,xxxxxxxx,xxxxxxxx,xxxxxxxx,xx
x__x__
db
x__xxxxx,xxxxxxxx,xxxxxxxx,xxxxxxxx,xx
x__x__
```

```
db
x__xxxxx.xxxxxxxx.xxxxxxxx.xxxxxxxx.xx
x__x__
db
x__xxxxx.xxxxxxxx.x________________
x__
db
x__xxxxx.xxxxx_____________________x
_
db
x__xxxxx.xx________________________x_
_
db
x__xxxxx___________________________x_
_
db
x__xxxx____________________________x_
_
db
x__xxxx____________________________x_
_
db
x__xxx__________xxxx_______________x_
_
db
x__xxx___________x__x___xxxxxxx.xxx__
x__
db
x__xxxxx.xxxxxxxx.xx__xxxx.xxxxxxxx.xx
x__x__
db
x__xxx__________x.xx__xxxx.xxxxxxxx.xxx_
_x__
db
x__xxx_____xxxx____________________x_
_
db
x__xxx______x______________________x_
_
db
x__xxxx____xx_xx.xxxxxxxx.xxxxxxxx.xx
x__x__
db
x__xxxxx.xxxx__xx.xxxxxx___xx___xx____
_x__
db
x__xxxxx.xxx__xxx.xxxxxx___xx___xx____
_x__
db
x__xxxxx.xxx__xxxx.xxxxxxxx.xxxxxxxx.xx
x__x__
db
x__xxxxx.xx__xxxx.xxxxxx___xx___xx____
_x__
db
x__xxxxx.xx__xxxxx.xxxxxx___xx___xx____
_x__
db
x__xxxxx.x__xxxxx.xxxxxxxx.xxxxxxxx.xx
x__x__
db
x__xxxxx.x__xxxxx.xxxxxx___xx___xx____
_x__
db
x__xxxxx.x_xxxxxx.xxxxxx___xx___xx____
_x__
db
x__xxxxx__xxxxxx.xxxxxx___xx___xx____
_x__
db
x__xxxxx__xxxxxx.xxxxxxxx.xxxxxxxx.xx
x__x__
db
x__xxxxx___________________________x_
_
db
x__xxxxx.xxxxxxxx.xxxxxxxx.xxxxxxxx.xx
x__x__
db
x__xxxxx___________________________x_
_
db
x__xxxxx___________________________x_
_
db
x__xxxxx___________________________x_
_
db
x__xxxxx___________________________x_
_
db
x__________________________________x__
db
x__________________________________x__
db
xxxxxxxx.xxxxxxxx.xxxxxxxx.xxxxxxxx.x
xxxxx__

ch46 label byte
db 38 , 5
db
xxxxxxxx.xxxxxxxx.xxxxxxxx.xxxxxxxx.x
xxxxx__
db
x__________________________________x__
db
x__xxxxx.xxxxxxxx.xxxx_____________
x__
db
x__xxxxx.xxxxxxxx.xxx______________x__
x__
db
x__xxxxx.xxxxxxxx.xx_______________xx__
x__
db
x__xxxxx.xxxxxxxx.x________________xxx__
x__
db
x__xxxxx.xxxxxxxx________________x.xxx__
x__
db
x__xxxxx.xxxxxxxx______________xx.xxx_
_x__
db
x__xxxxx.xxxxxxx___________________xx__
x__
db
x__xxxxx.xxxxxx____________________xxx__
x__
db
x__xxxxx.xxxxx__________________x.xxx__
x__
db
x__xxxxx.xxxx__________________xx.xxx__
x__
db
x__xxxxx.xxx_________________xxx.xxx__
x__
db
x__xxxxx.xxxxxxxx______________xxxx.xxx_
_x__
db
x__xxxxx.xxxxxxx_____________xxxxx.xxx_
_x_
db
x__xxxxx.xxxxxx____________xxxxxx.xxx_
_x__
db
x__xxxxx.xxxxx___________________xxx.xxx__
x__
db
x__xxxxx.xxxxx_________________xxxx.xxx__
x__
db
x__xxxxx.xxxx_________________xxxxx.xxx__
x__
db
x__xxxxx.xxx_______________xxxxxx.xxx__
x__
db
x__xxxxx.xx_______________xxxxxxx.xxx__
x__
db
x__xxxxx.x_______________xxxxxxxx.xxx__
x__
db
x__xxxxx_______________x.xxxxxxxx.xxx__
x__
db
x__xxxxx.xxxxxx_______xx.xxxxxxxx.xxx
__x__
db
x__xxxxx.xxxxx_______xxx.xxxxxxxx.xxx
__x__
db
x__xxxxx.xxxx______xxxx.xxxxxxxx.xxx
__x__
db
x__xxxxx.xxx______xxxxx.xxxxxxxx.xxx
__x__
db
x__xxxxx.xxx______xxxxxx.xxxxxxxx.xxx
__x_
db
x__xxxxx.xx______xxxxxxx.xxxxxxxx.xxx
__x__
db
x__xxxxx.x______xxxxxxxx.xxxxxxxx.xxx
__x__
db
x__xxxxx.x_____x.xxxxxxxx.xxxxxxxx.xxx
__x__
db
x__xxxxx______xx.xxxxxxxx.xxxxxxxx.xxx
__x__
db
x__xxxx_______xxx.xxxxxxxx.xxxxxxxx.xxx
__x__
db
x__xxx_______xxxx.xxxxxxxx.xxxxxxxx.xxx
__x__
db
x__________________________________x__
db
x__________________________________x__
db
xxxxxxxx.xxxxxxxx.xxxxxxxx.xxxxxxxx.x
xxxxx__

ch47 label byte
db 38 , 5
db
xxxxxxxx.xxxxxxxx.xxxxxxxx.xxxxxxxx.x
xxxxx__
db
x__________________________________x__
db
x__xxxxx.xxxxxxxx.xxxxxxxx.xxxxxxxx.xx
x__x__
db
x__xxxxx.xxxxxxxx.xxxxxxxx.xxxxxxxx.xx
x__x__
db
x__xxxx____________________________x_
_
db
x__xxx_____________________________x_
_
db
x__xxx_____________________________x_
_
db
x__xxx_____________________________x_
_
db
x__xxx_____________________________x_
_
db
x__xxx___xxxxxx.xxxxxxxx.xxxxxxxx.xx
x__x__
db
x__xxx___x__xxx.xxxxxxxx.xxxxxxxx.xxx
__x__
db
x__xxx___xxxxxx.xxxxxxxx.xxxxxxxx.xx
x__x__
db
x__xxx___x__xxx.xxxxxxxx.xxxxxxxx.xxx
__x__
db
x__xxx___xxxxxx.xxxxxxxx.xxxxxxxx.xx
x__x__
db
x__xxx___x__xxx.xxxxxxxx.xxxxxxxx.xxx
__x__
db
x__xxx___xxxxxx.xxxxxxxx.xxxxxxxx.xx
x__x__
db
x__xxx___x__xxx.xxxxxxxx.xxxxxxxx.xxx
__x__
db
x__xxx___xxxxxx.xxxxxxxx.xxxxxxxx.xx
x__x__
db
x__xxx___x__xxx.xxxxxxxx.xxxxxxxx.xxx
__x__
db
x__xxx___xxxxxx.xxxxxxxx.xxxxxxxx.xx
x__x__
db
x__xxx___x__xxx.xxxxxxxx.xxxxxxxx.xxx
__x__
db
x__xxx___xxxxxx.xxxxxxxx.xxxxxxxx.xx
x__x__
db
x__xxxx__x__xxx.xxxxxxxx.xxxxxxxx.xx
x__x__
db
x__xxxx___xxxxxx.xxxxxxxx.xxxxxxxx.xx
x__x__
db
x__xxxx___x__xxx.xxxxxxxx.xxxxxxxx.xx
x__x__
db
x__xxxx___xxxxxx.xxxxxxxx.xxxxxxxx.xx
x__x__
db
x__xxxx____________________________x_
db
x__xxxx____________________________x_
db
x__xxxx____________________________x_
db
x__xxxxx.x_________________________x_
_
db
x__xxxxx.xxxxxxxx.xxxxxxxx.xxxxxxxx.xx
x__x__
db
x__xxxxx.xxxxxxxx.xxxxxxxx.xxxxxxxx.xx
x__x__
db
x__xxxxx.xxxxxxxx.xxxxxxxx.xxxxxxxx.xx
x__x__
db
x__________________________________x__
db
x__________________________________x__
db
xxxxxxxx.xxxxxxxx.xxxxxxxx.xxxxxxxx.x
xxxxx__

ch48 label byte
db 35 , 5
db
____xx_____________________________
db
____xxx____________________________
db
____xxx__x_________________________
db
____xxx__x.xxx_____________________
_
db
____xx__xx.xxxxx___________________
_
db
____xx__xxx.xxxxxxxx.x_____________
_
db
____xx_xxxx.xxxxxxxx.xxxxxxxx.x_______
_
db
____xxxx.xxxxxxxx.xxxxxxxx.xx_______
_
db
____xxxx.xxxxxxxx.xxxxxxxx.x_______
_
db
_____xxx.xxxxxxxx.xxxxx_____________
_
db
______xx.xxxxxxxx.xxxxxx____________
_
db
_______x.xxxxxxxx.xxxxxxx_____________
_
db
________xxxxxxxx.xxxxxxxx____________
_
db
_________xxxxxxx.xxx__xxxx.x__________
_
db
__________xxxxxx.xx___xx.xx___________
_
db
____________xxxxx_____x.x_____________
_
db
______________xx_________xxxxxxx.xxx__
_
db
_______________________xx_____xxx__
_
db
_______________________x___x___xx__
db
_______________________x___xx___xx__
_
db
_______________________x___x___xx__
db
_______________________x___x___xx__
db
_______________________x___x___xx__
db
_______________________x___x___xx__
db
_______________________xx_____xxx__
_
```

```
db
_________________________XXXXXXX,XXXX__
_
db
__________________________XXXXXX,XXXX__
_

ch49 label byte
db 35 , 5
db
____XX_________________________________
db
___XXX_________________________________
db
__XXX__X_______________________________
db
__XXX__X,XXX___________________________
_
db
__XX__XX,XXXXX_________________________
_
db
_XX__XXX,XXXXXXXX,X____________________
_
db
_XX_XXXX,XXXXXXXX,XXXXXXXX,X___________
___
db
____XXXX,XXXXXXXX,XXXXXXXX,XX__________
___
db
____XXXX,XXXXXXXX,XXXXXXXX,X___________
___
db
_____XXX,XXXXXXXX,XXXXX________________
__
db
______XX,XXXXXXXX,XXXXXX_______________
__
db
_______X,XXXXXXXX,XXXXXXX______________
__
db
________XXXXXXXX,XXXXXXXX______________
___
db
_________XXXXXXX,XXX_XXXX,X____________
__
db
__________XXXXXX,XX___XX,XX____________
_
db
___________XXXXX_______X,X_____________
_
db
______________XX________XXXXXXX,XXX__
_
db
___________________________XX_____XXX__
_
db
___________________________X__XX___XX__
_
db
___________________________X__X__X__XX__
_
db
___________________________X_____X__XX___
db
___________________________X__XX___XX__
_
db
___________________________X__XX___XX__
_
db
___________________________X__XXXX__XX__
_
db
___________________________XX_____XXX__
_
db
__________________________XXXXXXX,XXXX__
_
db
__________________________XXXXXX,XXXX__
_

ch50 label byte
db 78 , 10
db
_______________________________________
______________
_______________
db
____XXXX__XXXXX___XXX__X,XX_XXX__XXXX
__XX,XXXX__XX,XXXX____XX
_____X,XXXXXX__________
db
```

```
__XX___X,X__X___X,X__X____X___X__X___X__
______XX___XX___XX
X_____XX___XXX________
db
_XX_____X__X____X__X____X___X__X______
X_______XX_____XX___XX
X_____XX______X,X_______
db
_X__________X_____X__X____X___X__X______X
_________XX_____XX__X_
XX____XX_______X_______
db
XX___________X__XX____X_____X___X___XXX__
XX,XXX___XX_____XX_X,X_
XX____XX________XX______
db
XX ____________X_XX_____X____X___X________X__
X__ _____XX______X__X__
_X_____XX_________XX______
db
XX_____________X__X_____X____X___X_______X__X
_________XX__XXX__XX,XX
XXX___XX________XX_______
db
XX_____________X___X____X_____X____X__X____X__
X__________XX_________X___
_XX___XX________X________
db
XX_____________XX___X___XXXX___XXX__XXX__
_XX,XXXX__XX_______XX___
_XX___XX_______X,X_________
db
_X________________________________________
________XX_______X___
__XX__XX_____XX__________
db
_XX_______X_______________________________
________XX______X___
__XX__XXXXXXX___________
db
__XXX__X,XX_______________________________
______________________
______________________
db
____XXXX__________________________________
__________________
____________________

ch51 label byte
db 38,5
db
_________________________________XXX,XXXX___
_
db
______________________________________XX____
db
_____________________________________XX______
db
_______________________XXX,XXX____X,X______
_
db
_________________XX,XXX_____XX____XX_______
_
db
XX______XXXX_____X_______X,X____XX________
_
db
XX________X_____X_______XX_____XXXX,XXXX__
_
db
XX_______X_____XX,XXX__XXX,XXX___________
_
db
XX_______XXXX______________________________
_
db
XX_XXX______________________________________
_
db
XX_XXXX_XXXX_____X__________________________
_
db
XX_XXXXX,XXXXX_XX__________________________
_
db
XX_XXXXX,XXXXXXXX___________________XX_
_
db
XX____________________________________XX____
db
XXXXXXXX,XXXXXXXX,XXXXXXXX,XXXXXXXX,X
XXX____
db
XXXXXXXX,XXXXXXXX,XXXXXXXX,XXXXXXXX,X
XXX____
db
XX____________________________________XX____
```

```
db
XX__________________________________XX____
db
XX__________________________________XX____
db
XX__________________________________XX____

ch52 label byte
db 18,2
db _XXXXXXX,XXXXXXX_
db X________________X
db X__XXXX___XXXX__X
db X___XX____XX___X
db X________________X
db X_____XX,XX_____X
db X_X____________X_X
db X__XXXXX,XXXXX__X
db X________________X
db _XXXXXXX,XXXXXXX_

ch53 label byte
db 11,2
db XX_______XX______
db _XX______XX______
db __XX___X,X_______
db ___XX_XX_________
db ____XX___________
db ___XX_XX_________
db __XX___X,X_______
db _XX______XX______
db XX_______XX______

ch54 label byte
DATASEG_END
end

Copr. 1995 Zenith Data Systems Corp
.model small
include winclud.inc

WORKBUF equ "                              ",0

VCENT=480/2

HCENT=640/2

DWIDE=MAXMESSAGELINE

DHIGH=248

DLEFT=HCENT-(DWIDE/2)

DTOP=VCENT-(DHIGH/2)


DATASEG_BEGIN
BEGIN_FORM_DEFINITIONS


mainform label tCONTROL
  public MainForm

mnuToolbar label tControl
  public mnuToolBar
  BEGIN_TOOLBAR %INVISIBLE,0,0,640,96
  FONT=BIGFONT
  ENGLISH
  CAPTION "CruisePAD Setup"


cmdAbout label tControl
  public cmdAbout
  MAKE_ABOUTBUTTON %NORMSTATE,0,0,32,33

CmdHost label tCONTROL
  public CmdHost
  BEGIN_TOOLBARBUTTON %ISDOWN,0,0,104,64

  GRAPHIC_CAPTION HOST_ICON
  FONT=SMALLFONT
  ENGLISH
  CAPTION "Host"

FrmHost label tCONTROL
  public FrmHost
  NEXTCONTROL=RES_SETUPS_HOST
  BEGIN_FORM

txtCurrentHost label tCONTROL
  public txtCurrentHost
```

```
 MAKE_UNFRAMED_EDITBOX
DISABLED,104,16,384,18,48
 ENGLISH
 CAPTION "Current Host:"

CmdDisconnect label tCONTROL
 public CmdDisconnect
 MAKE_COMMANDBUTTON
%NORMSTATE,520,%SAMETOP,88,24
 ENGLISH
 CAPTION "Disconnect"

ChkDimHost label tCONTROL
 public ChkDimHost
 NEXTCONTROL=GETSET_DIM_HOST_SCREEN
 MAKE_CHECKBOX 0,32,%NEXTTOP+8
 ENGLISH
 CAPTION "Dim host screen"


fraConnectionOptions label tControl
 public fraConnectionOptions
 BEGIN_FRAME
%NORMSTATE,0,%NEXTTOP+8,584,96
 MAKE_LINEBOX 0,18,0 ,584,1
 MAKE_LEFTLEGEND 0,32,12
 ENGLISH
 CAPTION "Connection:"


NEXTCONTROL=GETSET_HOST_CONNECTION_
TYPE + (0*256)
optNetwork label tCONTROL
  public optNetwork
  MAKE_OPTIONBUTTON 0,120,%SAMETOP
  ENGLISH
  CAPTION "Network"

optModem label tCONTROL
  public optModem

NEXTCONTROL=GETSET_HOST_CONNECTION_
TYPE + (1*256)
  MAKE_OPTIONBUTTON 0,200,%SAMETOP
  ENGLISH
  CAPTION "Modem"


NEXTCONTROL=GETSET_HOST_CONNECTION_
TYPE + (2*256)
optSerial label tCONTROL
  public optSerial
  MAKE_OPTIONBUTTON 0,280,%SAMETOP
  ENGLISH
  CAPTION "Serial"
END_FRAME

HOSTFRAMETOP=120

fraNetworkConnection label tControl
  public fraNetworkConnection
  BEGIN_FRAME
%NORMSTATE,32,HOSTFRAMETOP,480,96

lstNetworkGroups label tCONTROL
  public lstNetworkGroups

NEXTCONTROL=GETSET_NETWORK_GROUP_E
NTRY
  MAKE_LISTBOX %NORMSTATE,0,0,224,96+16
  ENGLISH
  CAPTION "Groups"

lstNetworkHosts label tCONTROL
  public lstNetworkHosts

NEXTCONTROL=GETSET_NETWORK_HOST_ENT
RY
  MAKE_LISTBOX %NORMSTATE,240,0,224,96+16
  ENGLISH
  CAPTION "Hosts"

cmdNetworkUpdate label tCONTROL
  public cmdNetworkUpdate
  MAKE_COMMANDBUTTON
%NORMSTATE,520-32,%SAMETOP+40,88,24
  ENGLISH
  CAPTION "Update List"

cmdNetworkConnect label tControl
  public cmdNetworkConnect
  MAKE_COMMANDBUTTON
%NORMSTATE,520-32,%NEXTTOP+8 ,88,24
  ENGLISH
  CAPTION "Connect"

END_FRAME
```

```
frsModemConnection label tControl
  public frsModemConnection
BEGIN_FRAME
%INVISIBLE,32,HOSTFRAMETOP,480,96

lstHostPhones label tCONTROL
  public lstHostPhones
NEXTCONTROL=GETSET_MODEM_HOST_DESC
_ENTRY
+(256*GETSET_MODEM_HOST_PHONE_ENTRY)
  MAKE_LISTBOX_NOSCROLL
%NORMSTATE,0,0,480,96+18
  SETTAB 280
  HOSTPHONECAPTION EQU "Hosts",9,"Phone"
  ENGLISH
  CAPTION HOSTPHONECAPTION

cmdEdit label tCONTROL
  public cmdEdit
  MAKE_COMMANDBUTTON
%NORMSTATE,520-32,%SAMETOP+48,88,24
  ENGLISH
  CAPTION "Edit..."

cmdModemConnect label tCONTROL
  public cmdModemConnect
  MAKE_COMMANDBUTTON
%NORMSTATE,520-32,%NEXTTOP+8,88,24
  ENGLISH
  CAPTION "Connect"

END_FRAME

frsSerialConnection label tControl
  public frsSerialConnection
  BEGIN_FRAME
%INVISIBLE,32,HOSTFRAMETOP,480,96

cmdSerialConnect label tCONTROL
  public cmdSerialConnect
  MAKE_COMMANDBUTTON
%NORMSTATE,520-32,0,88,24
  ENGLISH
  CAPTION "Connect"

END_FRAME

txtSerialHost label tCONTROL
  public txtSerialHost


END_FORM
END_TOOLBARBUTTON


cmdHotKeys label tControl
  public cmdHotKeys
  BEGIN_TOOLBARBUTTON
0,%TBBNEXTLEFT,%TBBSAMETOP,%TBBSAMEW
IDE,%TBBSAMEHIGH
  GRAPHIC_CAPTION HOTKEY_ICON
  FONT=SMALLFONT
  ENGLISH
  CAPTION "Hot Keys"

FrmHotKey label tCONTROL
  public FrmHotKey
  NEXTCONTROL=RES_SETUPS_HOTKEYS
  BEGIN_FORM

txtHOTKEY1 label tCONTROL
  public txtHOTKEY1

NEXTCONTROL=GETSET_USER_DEFINED_HOT_
ICON + 256*1
  MAKE_KEY_EDITBOX
%SKIPTAB,64+58-40-16,24,496-40 ,32
  GRAPHIC_CAPTION HAND1_ICON

cmdClearHotKey1 label tCONTROL
  public cmdClearHotKey1
  MAKE_COMMANDBUTTON
%SKIPTAB,%NEXTLEFT+8,%SAMETOP,48,32
  ENGLISH
  CAPTION "Clear"

txtHOTKEY2 label tCONTROL
  public txtHOTKEY2

NEXTCONTROL=GETSET_USER_DEFINED_HOT_
ICON + 256*2
  MAKE_KEY_EDITBOX
%SKIPTAB,64+58-40-16,%NEXTTOP+24,496-40,32
  GRAPHIC_CAPTION HAND2_ICON

cmdClearHotKey2 label tCONTROL
  public cmdClearHotKey2
  MAKE_COMMANDBUTTON
%SKIPTAB,%NEXTLEFT+8,%SAMETOP,48,32
  ENGLISH
  CAPTION "Clear"

END_FORM
END_TOOLBARBUTTON

cmdMaintenance label tControl
  public cmdMaintenance
  BEGIN_TOOLBARBUTTON
0,%TBBNEXTLEFT,%TBBSAMETOP,%TBBSAMEW
IDE,%TBBSAMEHIGH
  GRAPHIC_CAPTION MAINT_ICON
  FONT=SMALLFONT
  ENGLISH
  CAPTION "Maintenance"

FrmMaintenance label tCONTROL
  public FrmMaintenance
  NEXTCONTROL=RES_SETUPS_MAINTENANCE
  BEGIN_FORM

CmdCalibratePen label tCONTROL
  public CmdCalibratePen
  MAKE_COMMANDBUTTON
%NORMSTATE,8+40,16+8,96,24
  ENGLISH
  CAPTION "Calibrate Pen"

CmdRebootHost label tCONTROL
  public CmdRebootHost
  MAKE_COMMANDBUTTON
%NORMSTATE,%SAMELEFT,%NEXTTOP+20,%SA
MEWIDE,%SAMEHIGH
  ENGLISH
  CAPTION "Reboot Host"

CmdUpgrade label tCONTROL
  public CmdUpgrade
  MAKE_COMMANDBUTTON
%NORMSTATE,%SAMELEFT,%NEXTTOP+20,%SA
MEWIDE,%SAMEHIGH
  ENGLISH
  CAPTION "Upgrade"

  BEGIN_GROUPBOX
%NORMSTATE,312+8-88-40,24,304-8-16-8+88,96-1
6-24+32+64-24
  ENGLISH
  CAPTION "Network"

txtSecurityID label tCONTROL
  public txtSecurityID
  NEXTCONTROL=GETSET_SECURITY_ID
  MAKE_PW_EDITBOX
%NORMSTATE,72+8,16+8,56+88,24,20
  ENGLISH
  CAPTION "Security ID"

txtDomainID label tCONTROL
  public txtDomainID
  NEXTCONTROL=GETSET_DOMAIN_ID
  MAKE_NUM_EDITBOX
%NORMSTATE,%SAMELEFT,%SAMETOP+32+8,3
2,%SAMEHIGH,2
  ENGLISH
  CAPTION "Domain ID"

  MAKE_SPINUPBUTTON
%NORMSTATE+SKIPTAB,%NEXTLEFT,%SAMETO
P-4,16,16
  GRAPHIC_CAPTION UPARROWBITMAP

cmdDomainIDSpinUp label tCONTROL
  public cmdDomainIDSpinUp
  MAKE_SPINDOWNBUTTON
%NORMSTATE+SKIPTAB,%SAMELEFT,%NEXTTO
P,16,16
  GRAPHIC_CAPTION DNARROWBITMAP

lstFrameType label tCONTROL
  public lstFrameType

NEXTCONTROL=GETSET_FRAME_TYPE_ENTRY
  MAKE_LISTBOX_NOSCROLL
%NORMSTATE,72+72+88,16,88+16,96+16-24+4
  ENGLISH
  CAPTION "Frame Type"

  END_GROUPBOX

END_FORM
END_TOOLBARBUTTON

cmdModem label tControl
  public cmdModem
  BEGIN_TOOLBARBUTTON
0,%TBBNEXTLEFT,%TBBSAMETOP,%TBBSAMEW
IDE,%TBBSAMEHIGH
  GRAPHIC_CAPTION MODEM_ICON
  FONT=SMALLFONT
  ENGLISH
  CAPTION "Modem"

frmModem label tCONTROL
  public frmModem
  NEXTCONTROL=RES_SETUPS_MODEM
  BEGIN_FORM
  BEGIN_GROUPBOX
%NORMSTATE,16,24,288+8,64+8
  ENGLISH
  CAPTION "Dialing"

optTone label tCONTROL
  public optTone
    NEXTCONTROL=
GETSET_MODEM_TONE_OR_PULSE +(0*256)
    MAKE_OPTIONBUTTON 0,16,16
    ENGLISH
    CAPTION "Tone"

    NEXTCONTROL=
GETSET_MODEM_TONE_OR_PULSE +(1*256)
optPulse label tCONTROL
    public optPulse
    MAKE_OPTIONBUTTON
%NORMSTATE,%SAMELEFT,%NEXTTOP+12
    ENGLISH
    CAPTION "Pulse"

TxtPrefix label tCONTROL
  public TxtPrefix
    NEXTCONTROL=GETSET_MODEM_PREFIX
    MAKE_EDITBOX
%NORMSTATE,120,12,168,24,10
    ENGLISH
    CAPTION "Prefix"

TxtSuffix label tCONTROL
  public TxtSuffix
    NEXTCONTROL=GETSET_MODEM_SUFFIX
    MAKE_EDITBOX
%NORMSTATE,%SAMELEFT,%NEXTTOP+4,%SA
MEWIDE,%SAMEHIGH,%SAMELEN
    ENGLISH
    CAPTION "Suffix"

  END_GROUPBOX

LstManufacturer label tCONTROL
  public LstManufacturer


NEXTCONTROL=GETSET_MODEM_MANUFACTU
RER_ENTRY
  MAKE_LISTBOX
%NORMSTATE,328,24,140,104+4
  ENGLISH
  CAPTION "Manufacturer"

LstBaudRate label tCONTROL
  public LstBaudRate

NEXTCONTROL=GETSET_MODEM_BAUD_RATE_
ENTRY
  MAKE_LISTBOX
%NORMSTATE,488-16,%SAMETOP,%SAMEWIDE,
%SAMEHIGH
  ENGLISH
  CAPTION "Baud Rate"

  ANSWERONRINGCAPTION EQU "Answer",13,"on
Ring"
TxtAnswerOnRing label tCONTROL
  public TxtAnswerOnRing

NEXTCONTROL=GETSET_MODEM_ANSWER_ON
_RING
  MAKE_NUM_EDITBOX
%NORMSTATE,128-56-8,88+16+8,24,24,1
  ENGLISH
  CAPTION ANSWERONRINGCAPTION
  HOLDSAMETOP=SAMETOP
  MAKE_SPINUPBUTTON
%NORMSTATE+SKIPTAB,%NEXTLEFT,%SAMETO
P-4,16,16
  GRAPHIC_CAPTION UPARROWBITMAP
  MAKE_SPINDOWNBUTTON
%NORMSTATE+SKIPTAB,%SAMELEFT,%NEXTTO
P,16,16
  GRAPHIC_CAPTION DNARROWBITMAP

  RETRYLIMITCAPTION EQU "Retry",13,"Limit"
TxtRetryLimit label tCONTROL
  public TxtRetryLimit

NEXTCONTROL=GETSET_MODEM_RETRY_LIMIT
  MAKE_NUM_EDITBOX
%NORMSTATE,%NEXTLEFT+48,%SAMETOP-12,3
2,24,2
  ENGLISH
  CAPTION RETRYLIMITCAPTION
  HOLDSAMEWIDE=SAMEWIDE
  MAKE_SPINUPBUTTON
%NORMSTATE+SKIPTAB,%NEXTLEFT,%SAMETO
P-4,16,16
  GRAPHIC_CAPTION UPARROWBITMAP
  MAKE_SPINDOWNBUTTON
%NORMSTATE+SKIPTAB,%SAMELEFT,%NEXTTO
P,16,16
  GRAPHIC_CAPTION DNARROWBITMAP

  RETRYDELAYCAPTION EQU "Retry",13,"Delay"
TxtRetryDelay label tCONTROL
  public TxtRetryDelay

NEXTCONTROL=GETSET_MODEM_RETRY_DELA
Y
  MAKE_NUM_EDITBOX
%NORMSTATE,%SAMELEFT+64,SAMETOP-12,40,
24,3
  ENGLISH
  CAPTION RETRYDELAYCAPTION
  MAKE_SPINUPBUTTON
%NORMSTATE+SKIPTAB,%NEXTLEFT,%SAMETO
P-4,16,16
  GRAPHIC_CAPTION UPARROWBITMAP
  MAKE_SPINDOWNBUTTON
%NORMSTATE+SKIPTAB,%SAMELEFT,%NEXTTO
P,16,16
  GRAPHIC_CAPTION DNARROWBITMAP


frsModemCustom label tControl
  public frsModemCustom
BEGIN_FRAME
%INVISIBLE,32,%NEXTTOP+16,480,96

NEXTCONTROL=GETSET_CUSTOM_INIT_STRIN
G
  MAKE_EDITBOX
%NORMSTATE,104-8,0,320,24,40
  ENGLISH
  CAPTION "Initialization"


NEXTCONTROL=GETSET_CUSTOM_AUTOANSW
ER_STRING
  MAKE_EDITBOX
%NORMSTATE,%SAMELEFT,%NEXTTOP+4,208,2
4,10
  ENGLISH
  CAPTION "Auto Answer"


NEXTCONTROL=GETSET_CUSTOM_DISCONNEC
T_STRING
  MAKE_EDITBOX
%NORMSTATE,%SAMELEFT,%NEXTTOP+4,208,2
4,10
  ENGLISH
  CAPTION "Disconnect"


NEXTCONTROL=GETSET_CUSTOM_CONNECT_
STRING
  MAKE_EDITBOX
%NORMSTATE,%SAMELEFT,%NEXTTOP+4,208,2
4,10
  ENGLISH
  CAPTION "Connect Resp"

CmdDefault label tCONTROL
  public CmdDefault
  MAKE_COMMANDBUTTON
%NORMSTATE,520-32,%SAMETOP,88,24
  ENGLISH
  CAPTION "Default"

  END_FRAME

END_FORM
END_TOOLBARBUTTON


cmdPower label tControl
  public cmdPower
  BEGIN_TOOLBARBUTTON
0,%TBBNEXTLEFT,%TBBSAMETOP,%TBBSAMEW
IDE,%TBBSAMEHIGH
  GRAPHIC_CAPTION POWER_ICON
  FONT=SMALLFONT
  ENGLISH
  CAPTION "Power"

frmPower label tCONTROL
```

```
public frmPower
NEXTCONTROL=RES_SETUPS_POWER
BEGIN_FORM

MAKE_LEFTLEGEND 0,312,32
GRAPHIC_CAPTION %VLINE2X64

MAKE_LEFTLEGEND 0,312,SAMETOP+24
GRAPHIC_CAPTION %VLINE2X64

MAKE_LEFTLEGEND 0,312,SAMETOP+24+32
GRAPHIC_CAPTION %VLINE2X64

MAKE_LEFTLEGEND 0,72+4,32
GRAPHIC_CAPTION SLEEP_ICON
ENGLISH
CAPTION "Sleep Delay"

hsbSleep label tCONTROL
  public hsbSleep

NEXTCONTROL=GETSET_SLEEPMODE_PERIOD
+(8*256)
  MAKE_SLIDEBAR
0,%SAMELEFT-4,%SAMETOP+24,224+8-48,16+2

  MAKE_LEFTLEGEND
0 %SAMELEFT+4 %NEXTTOP+10
  CAPTION "1    2    4    6    8    12    16
Never"

  MAKE_LEFTLEGEND
0 %SAMELEFT+32 %SAMETOP+24
  CAPTION "Minutes of inactivity"

  MAKE_LEFTLEGEND 0,16 %SAMETOP+24
  CAPTION "Sleep is a low power state that
extends"

  MAKE_LEFTLEGEND
0 %SAMELEFT,%SAMETOP+16
  CAPTION "battery life  CruisePad will wake up
from sleep"

  MAKE_LEFTLEGEND
0,%SAMELEFT,%SAMETOP+16
  CAPTION "immediately after the display is
touched."

  MAKE_LEFTLEGEND 0,328+24+16+16,32
  GRAPHIC_CAPTION HIBERNATE_ICON
  ENGLISH
  CAPTION "Hibernate"

chkAutoShutoff label tCONTROL
  public chkAutoShutoff

NEXTCONTROL=GETSET_AUTOMATIC_SHUTOF
F
  MAKE_CHECKBOX 0,328+16,60
  ENGLISH
  HIBLEGEND equ "Auto hibernate after 60
minutes" 13,"of sleep"
  CAPTION HIBLEGEND

  MAKE_LEFTLEGEND
0 %SAMELEFT,%SAMETOP+40
  CAPTION "Hibernate is a very low power state"

  MAKE_LEFTLEGEND
0,%SAMELEFT,%SAMETOP+16
  CAPTION "that consumes almost no battery"

  MAKE_LEFTLEGEND
0,%SAMELEFT,%SAMETOP+16
  CAPTION "power. CruisePad will wake up from"

  MAKE_LEFTLEGEND
0,%SAMELEFT,%SAMETOP+16
  CAPTION "hibernate about 10 seconds after"

  MAKE_LEFTLEGEND
0,%SAMELEFT,%SAMETOP+16
  CAPTION "the display is touched."

END_FORM
END_TOOLBARBUTTON

cmdScreen label tControl
  public cmdScreen
  BEGIN_TOOLBARBUTTON
0,%TBBNEXTLEFT,%TBBSAMETOP,%TBBSAMEW
IDE,%TBBSAMEHIGH
  GRAPHIC_CAPTION SCREEN_ICON
  FONT=SMALLFONT
  ENGLISH
  CAPTION "Screen"

FrmScreen label tCONTROL

public FrmScreen
NEXTCONTROL=RES_SETUPS_SCREEN
BEGIN_FORM

MAKE_LEFTLEGEND 0,72+4,32
GRAPHIC_CAPTION BRIGHTNESS_ICON
ENGLISH
CAPTION "Brightness"

HsbBrightness label tCONTROL
  public HsbBrightness
  NEXTCONTROL=GETSET_BRIGHTNESS +
(24*256)
  MAKE_SPECTRUMBAR
0,%SAMELEFT-4,%SAMETOP+24,224+8-48+16,16
+2

  MAKE_LEFTLEGEND
0,%SAMELEFT-32,%NEXTTOP+8
  ENGLISH
  CAPTION "Dark"

  MAKE_LEFTLEGEND
0,%SAMELEFT+208,%SAMETOP
  ENGLISH
  CAPTION "Light"

  MAKE_LEFTLEGEND 0,312,32
  ENGLISH
  GRAPHIC_CAPTION %VLINE2X64

  MAKE_LEFTLEGEND 0,336+40+4,32
  GRAPHIC_CAPTION CONTRAST_ICON
  ENGLISH
  CAPTION "Contrast"

HsbContrast label tCONTROL
  public HsbContrast
  N".:TCONTROL= GETSET_CONTRAST
+(24*256)
  MAKE_SPECTRUMBAR
0,%SAMELEFT-4,%SAMETOP+24,224+8-48+16,16
+2
  MAKE_LEFTLEGEND
0,%SAMELEFT-32,%NEXTTOP+8
  ENGLISH
  CAPTION "Low"

  MAKE_LEFTLEGEND
0,%SAMELEFT+208,%SAMETOP
  ENGLISH
  CAPTION "High"

END_FORM
END_TOOLBARBUTTON

cmdToolBarClose label tControl
  public cmdToolBarClose
  MAKE_CLOSEBUTTON
%NORMSTATE,104*5+64+8,0,32,33
  GRAPHIC_CAPTION BIG_X_ICON

  ADJUST_TOOLBAR_WIDTH %TBBNEXTLEFT
END_TOOLBAR

frmFirstModalForm label tControl
  public frmFirstModalForm

frmPasswordBox label tControl
  public frmPasswordBox
  NEXTCONTROL=8000h

  CONTROL
FORM,%INVISIBLE,DLEFT,%DTOP+DHIGH/3+80
,DWIDE,%DHIGH*2/3+16,0

lblPasswordBox1 label tControl
  public lblPasswordBox1
  MAKE_CENTEREDLEGEND
%NORMSTATE,0,32,DWIDE,16
  CAPTION "Connect to."

txtPassword label tControl
  public txtPassword
  NEXTCONTROL=GETSET_PASSWORD
  MAKE_PW_EDITBOX
%NORMSTATE,140,%NEXTTOP+16,88,24,16
  CAPTION "Password"

  BEGIN_FRAME
%NORMSTATE,0,%NEXTTOP+16,DWIDE,24
cmdPasswordOKCancel_OK label tControl
  public cmdPasswordOKCancel_OK
  MAKE_COMMANDBUTTON
%NORMSTATE,DWIDE/2-64-16-24,0,84+24,24
  CAPTION "OK"

cmdPasswordOKCancel_Cancel label tControl
  public cmdPasswordOKCancel_Cancel
  MAKE_COMMANDBUTTON
%NORMSTATE,DWIDE/2+16-8,%SAMETOP,84+24,
24
  CAPTION "Cancel"

END_FRAME
  MAKE_CENTEREDLEGEND
%NORMSTATE,0,%NEXTFRAMETOP+16,DWIDE,1
6
  caption "Press 'OK' if no password."

END_FORM

frmPhoneBookEdit label tControl
  public frmPhoneBookEdit
  NEXTCONTROL=8000h
  CONTROL
FORM,%INVISIBLE,40+20,%DTOP+DHIGH/2+40,56
0-208,%DHIGH/2,0

txtPBDescription label tControl
  public txtPBDescription
  MAKE_EDITBOX
%NORMSTATE,96,16,88+69+40,24,20
  CAPTION "Description"

txtPBPhoneNumber label tControl
  public txtPBPhoneNumber
  MAKE_EDITBOX
%NORMSTATE,%SAMELEFT,%NEXTTOP+8,%SA
MEWIDE,%SAMEHIGH,20
  CAPTION "Phone #"

  BEGIN_FRAME
  %NORMSTATE,0,%NEXTTOP+16,DWIDE,24
   cmdPhoneBookOKCancel_OK label tControl
   public cmdPhoneBookOKCancel_OK
   MAKE_COMMANDBUTTON
  %NORMSTATE,DWIDE/2-64-16-24,0,84+24,24
   CAPTION "OK"

  cmdPhoneBookOKCancel_Cancel label tControl
   public cmdPhoneBookOKCancel_Cancel
   MAKE_COMMANDBUTTON
  %NORMSTATE,DWIDE/2+16-8,%SAMETOP,84+24,
  24
   CAPTION "Cancel"

  END_FRAME
  END_FORM


  END_FORM_DEFINITIONS

  ControlDataStorageArea label byte
   public ControlDataStorageArea
    db TOTALSTORAGE dup(0)

  DATASEG_END
  end


  Copr. 1995 Zenith Data Systems Corp.

  .MODEL SMALL
  include winclud.inc
  DATASEG_BEGIN
  extrn ControlDataStorageArea:byte
  extrn FirstStandardControl:tCONTROL
  extrn FontTable:word
  extrn LastStandardControl:tCONTROL
  extrn OSK:tControl
  extrn bCurrentControlType:byte
  extrn pNormFont:word
  extrn rREGION:tREGION
  extrn offont4:word
  extrn wCurrentFormBottom:word
  extrn wCurrentFormHeight:word
  extrn wGraphicCaptionHeight:word
  extrn wNormFontHeight:word
  extrn wPreviousFormBottom:word
  extrn wPreviousFormHeight:word
  extrn frmMessageBox:tCONTROL
  extrn frmMessageBox_end:tCONTROL

   bPreviewMode db 0
    public bPreviewMode
   pLastForm dw 0
    public pLastForm
   wLastFormTop dw 0
   wLastFormHeight dw 0
   wFormWidth dw 0
    public wFormWidth
   DATASEG_END

.code
extrn DrawOnButton:near
extrn DrawUpButton:near
extrn GetStringWidth:near
extrn PointControlCaption:near
extrn SetFontForCaption:near


 GetBitMapHeight proc near
  public GetBitMapHeight

  or al,al
  jz gch1
  sub al,32
  xor ah,ah
  add ax,ax
  add bx,ax
  mov di,[bx+2]
  mov bx,[bx]
  mov ah,[bx]
  mov al,[bx+1]
  cmp ah,128
  jae gch5
  and al,1111b
 gch5:
  xor ah,ah
  inc bx
  inc bx
  sub di,bx
  xchg ax,di
  xor dx,dx
  or di,di
  jz gch2
  div di
  jmp short gch3
 gch2:
  xor al,al
 gch1:
  xor ah,ah
 gch3:
  ret
 GetBitMapHeight endp

 GetCaptionHeight proc near
  public GetCaptionHeight

  push di
  push si
  push bx
  push dx
  or bx,bx
  jnz gch4
  xor ax,ax
  jmp gch1a
 gch4:
  mov al,[bx]
  shl al,1
  shr al,1
  shr al,1
  shr al,1
  shr al,1
  shr al,1
  xor ah,ah
  cmp al,11b * 2
  jnz gch6
  cmp bCurrentControlType,LEFTLEGEND
  jz gch9

  cmp bx,offset osk
  jae gch8

  cmp bx,offset frmMessageBox
  jb gch10
  cmp bx,offset frmMessageBox_end
  ja gch10
  jmp gch9
 gch10:
  cmp bx,offset FirstStandardControl
  jb gch7
  cmp bx,offset LastStandardControl
  jb gch9
 gch7:
  cmp bCurrentControlType,SPINUPBUTTON
  jz gch6
  cmp bCurrentControlType,SPINDOWNBUTTON
  jz gch6
 gch9:
  mov si,offset oifont4
  jmp gch8
 gch6:
  mov si,ax
  mov si,[si+offset FontTable]
 gch8:
  mov al,[si+1]
  xor ah,ah
  or al,al
  jnz gch1a
```

```
xchg bx,si
add si,3

lodsb
call GetBitMapHeight
gch1a
 pop dx
 pop bx
 pop si
 pop di
 ret
GetCaptionHeight endp

GetCaptionWidth proc near
 public GetCaptionWidth

 add bx,3
 push bx
 push si
 mov si,bx
 call GetStringWidth
 pop si
 pop bx
 ret
GetCaptionWidth endp

GetCombinedCaptionHeight proc near
 public GetCombinedCaptionHeight

 push bx
 push cx
 mov bx,cx
 call GetCaptionHeight
 mov wGraphicCaptionHeight,ax
 pop cx
 pop bx
 mov dx,ax
 push cx
 push dx
 call GetCaptionHeight
 pop dx
 pop cx
 add ax,dx
 ret
GetCombinedCaptionHeight endp

GetLegendHeight proc near
 public GetLegendHeight
 push ax
 push si
 push dx
 push cx
 call PointControlCaption
 jz glh1
 push cx
 or bx,bx
 jz glh2

 push si
 call Setfontforcaption
 mov cx,ax
 add bx,3
 mov si,bx
 mov bx,ax

glh4
 lodsb
 or al,al
 jz glh3
 cmp al,13
 jnz glh4
 add bx,cx
 jmp glh4
glh3:
 pop si
glh2:
 pop cx
 push bx
 mov bx cx
 call GetCaptionHeight
 pop bx
 cmp ax,bx
 jb glh5
 mov bx ax
glh5:
 jmp short glh8
glh1
 xor bx,bx
glh8:
 pop cx
 pop dx
 pop si
 pop ax
 ret
GetLegendHeight endp

GetNormFontHeight proc near
 public GetNormFontHeight
 push bx
 mov bx,pNormFont
 mov al,[bx+1]
 pop bx
 xor ah,ah
 mov wNormFontHeight,ax
 ret
GetNormFontHeight endp

SaveFormHeight proc near
 public SaveFormHeight

 push wCurrentFormHeight
 pop wPreviousFormHeight
 push wCurrentFormBottom
 pop wPreviousFormBottom
 ret
SaveFormHeight endp

AdjustBoxDimensions proc near
 public AdjustBoxDimensions
 mov cx,rRegion.wCurrentLeft
 mov dx,rRegion.wCurrentTop
 mov ax,rRegion.wCurrentWidth
 DIVIDE_BY_8 ax
 mov bl,al
 mov ax,rRegion.wCurrentHeight
 sar ax,1
 mov bh,al
 ret
AdjustBoxDimensions endp

AdjustButtonDimensions proc near
 public AdjustButtonDimensions
 push ax
 mov ax,rRegion.wCurrentHeight
 sub ax,BUTTONTOPHEIGHT +
BUTTONBOTTOMHEIGHT
 sar ax,1
 mov bh,al
 mov ax,rRegion.wCurrentWidth
 sub ax,BUTTONLEFTPIXELS +
BUTTONRIGHTPIXELS
 DIVIDE_BY_8 ax
 mov bl,al
 pop ax
 ret
AdjustButtonDimensions endp

AdjustFormHeight proc near
 public AdjustFormHeight


 mov al,[si].ControlType
 cmp al,FORM
 jnz rgo0b

 mov pLastForm,si
 mov bx,rRegion.wCurrentTop
 mov wLastFormTop,bx
 mov wLastFormHeight,0
 jmp rgo4aa

rgo0b:
 cmp al,FRAME
 jz rgo0bb
 mov bx,rRegion.wCurrentRight
 add bx,15
 and bl,11111000b
 cmp bx,wFormWidth
 jle rgo0bb
 mov wFormWidth,bx

rgo0bb:
 mov bx,rRegion.wCurrentBottom
 sub bx,wLastFormTop
 cmp bx,wLastFormHeight
 jle rgo4aa
 mov wLastFormHeight,bx
 add bx,24
 push si
 mov si,pLastForm
 or si,si
 jz rgo4ab
 test [si].ControlState,EXPLICITSIZE
 jnz rgo4ab
 mov [si].PixelHeight,bx
rgo4ab:
 pop si
rgo4aa
 ret
AdjustFormHeight endp
end


Copr 1995 Zenith Data Systems Corp.

.model small
.code
extrn Ascii2Bin:near
extrn Bin2ASCII:near

include uiinclud.inc

DATASEG_BEGIN
extrn ControlDataStorageArea:byte
DATASEG_END

.code

SetNumericControl proc near
 public SetNumericControl

 push ax
 push si
 mov ax,[si].ID
 push ax
 mov si,[si].pStorageOffset
 call Ascii2Bin
 pop ax
 SM_FUNCTION ax
 pop si
 pop ax
 ret
SetNumericControl endp

GetNumericControl proc near
 public GetNumericControl

 push ax
 mov ax,[SI].ID
 mov ah,80h
 SM_FUNCTION ax
 jl rab4a

 push cx
 push bx
 mov cl,byte ptr [si].wDataLength
 dec cl
 mov bx,[si].pStorageOffset
 call bin2ascii
 mov byte ptr [bx],0
 pop bx
 pop cx

rab4a:
 pop ax
 ret
GetNumericControl endp

SetTextControl proc near
 public SetTextControl
 push ax
 push si
 mov ax,[si].ID
 mov si,[si].pStorageOffset
 mov dx,ds
 SM_FUNCTION ax
 pop si
 pop ax
 ret
SetTextControl endp

GetTextControl proc near
 public GetTextControl

 push si
 push ax
 push dx
 push cx
 push di
 mov cx,[SI].wDataLength
 mov di,[SI].pStorageOffset
 dec cx
 jle gnuc1
 mov ax,[SI].ID
 mov ah,80h
 SM_FUNCTION ax
 jl gnuc1

 push es
 push ds
 push ds
 pop es
 mov ds,dx
 rep movsb
 pop ds
 pop es
gnuc1:
 pop di
 pop cx
 pop dx
 pop ax
 pop si
 ret
GetTextControl endp
end

Copr 1995 Zenith Data Systems Corp

.MODEL SMALL
.code
extrn AddControlToActiveList:near
extrn AdjustButtonDimensions:near
extrn DoPenEvent:near
extrn DrawLabel:near
extrn DrawString:near
extrn DrawSunkenFrame:near
extrn DrawTextBox:near
extrn FindRegionForControl:near
extrn GetNormFontHeight:near
extrn JumpOnAL:near
extrn PointControlCaption:near
extrn PopRegion:near
extrn PushRegion:near
extrn Repaint:near
extrn RepaintButton:near
extrn RestoreRegion:near
extrn SetControlTabList:near
extrn SetFontForCaption:near
extrn SetNewTabItem:near
extrn SetNewTabItem:near
extrn ShowTabBox:near
extrn StoreRegion:near
extrn UndoCurrentTabItem:near
include uiinclud.inc


DATASEG_BEGIN
extrn ControlDataStorageArea:byte
extrn bButtonForegroundColor:byte
extrn bCaptionForegroundColor:byte
extrn bCaptionForegroundColor:byte
extrn bCaptionForegroundColor:byte
extrn bIgnoringMove:byte
extrn bNullString:byte
extrn pCheckRegion:word
extrn pCurrentFont:word
extrn pNextActiveRegion:word
extrn pNormFont:word
extrn pTabRegion:word
extrn rActiveRegions:tRegion
extrn rREGION:tREGION
extrn rTabRegion:tREGION
extrn wNormFontHeight:word
extrn wPenCurrentRow:word

FirstStandardControl label tCONTROL
 public FirstStandardControl

VScrollControls label tCONTROL
NEXTCONTROL=32000
VsbBacking label tControl
 public vsbBacking
 MAKE_COMMANDBUTTON
%NORMSTATE,0,0,16,16*3

VsbUpArrow label tControl
 public vsbUparrow
 MAKE_SYMBOLBUTTON
%NORMSTATE,0,0,16,16
 GRAPHIC_CAPTION UPARROWBITMAP

VsbSlider label tControl
 public vsbSlider
 MAKE_COMMANDBUTTON
%NORMSTATE,0,%NEXTTOP,16,16

VsbDnArrow label tControl
 public VSBDnArrow
 MAKE_SYMBOLBUTTON
%NORMSTATE,0,%NEXTTOP,16,16
 GRAPHIC_CAPTION DNARROWBITMAP

LastStandardControl label tCONTROL
 public LastStandardControl



bListItemNormForeground db BLACK
bListItemNormBackground db WHITE
bListItemGrayedForeground db GRAY
bListItemGrayedBackground db WHITE
bListItemSelectedForeground db WHITE
bListItemSelectedBackground db BLACK


wListCurrentItem dw 0
 public wListCurrentItem

bListItemNoStore db 0

wHoldCurrentListIndex dw 0

wListGetSet dw 0
wListIndex dw 0
```

```
bListItemAttribute db 0

wListSlideRow dw 0
  public wListSlideRow

LISTITEMBUFFERSIZE equ 80

rListBoxItem tListBoxEntry <szListItemBuffer,0>
rListBoxItem1 tListBoxEntry <szListItemBuffer1,0>
rListBoxItem2 tListBoxEntry <szListItemBuffer2,0>

szListItemBuffer label byte
  db LISTITEMBUFFERSIZE+1 dup(0)
szListItemBuffer1 label byte
  public szListItemBuffer1
  db LISTITEMBUFFERSIZE+1 dup(0)
szListItemBuffer2 label byte
  public szListItemBuffer2
  db LISTITEMBUFFERSIZE+1 dup(0)

pPenDownListRegion dw 0
  public pPenDownListRegion
pPenUpListRegion dw 0
  public pPenUpListRegion
pPenDownListItem dw 0
  public pPenDownListItem
rListItemRegion tRegion <0,0,0,0,0,-1,0,0>

wAutoScrollTimer dw 0
  public wAutoScrollTimer
bAutoScrollMode db 0
  public bAutoScrollMode
bRepaintItemsOnly db 0
  public bRepaintItemsOnly

wCurrentMaxListItem dw 0
  public wCurrentMaxListItem
wCurrentTopListItem dw 0
wCurrentScrollBarHeight dw 0
bListRepaintNeeded db 0
pListGrayedItemSkipped dw 0
DATASEG_END

.code

AddListItemToActiveList proc near
  push si
  mov si,offset rListItemRegion
  call StoreRegion
  pop si
  ret
AddListItemToActiveList endp

RepaintListBox proc near
  public RepaintListBox


  cmp al,LISTBOX
  jz rlb1
  cmp al,LISTBOXNOSCROLL
  jz rlb1
  ret
rlb1

  push si
  push cx
  call GetListMaxAndTop
  push pNextActiveRegion
  pop pPenUpListRegion
  mov rRegion.bListItemFlags,128
  call AddControlToActiveList
  mov rRegion.bListItemFlags,0
  pop cx
  pop si

  call SetControlTabList

  push ax
  call AdjustButtonDimensions

rlb3a:
  cmp bRepaintItemsOnly,0
  mov bRepaintItemsOnly,0
  jnz rlb3i

  push dx
  push cx
  push bx
  add dx,20
  sub bh,10
  cmp al,LISTBOXNOSCROLL
  jz rlb2
  sub bl,2
rlb2
  call DrawTextBox
  pop bx
  pop cx
  pop dx
  push si
  push dx
  push cx
  push bx
  call DrawSunkenFrame
  pop bx
  pop cx
  pop dx
  pop si

  push cx
  call PointControlCaption
  pop cx
  jz rlb3
  or bx,bx
  jz rlb3
  call SetFontForCaption

  push si
  mov si,bx
  add si,3
  add cx,12
  add dx,4
  mov bl,bButtonForegroundColor
  xor bh,bh
  call drawlabel
  pop si

rlb3i
  pop ax
  push ax
  cmp al,LISTBOXNOSCROLL
  jz rlb3
  push si
  call PushRegion
  call DrawVerticalScrollBar
  call PopRegion
  pop si
rlb3.
  mov bx,si
  or bx,bx
  pop ax
  jnz rlb18
  jmp rlb4
rlb18.

  call GetListMaxItem

  push pNextActiveRegion
  pop [bx].pFirstRegionRecord

  mov rListItemRegion.pCurrentControl,si
  mov dx,rRegion.wCurrentTop
  add dx,21+3
  mov rListItemRegion.wCurrentTop,dx
  add dx,wNormFontHeight
  dec dx
  mov rListItemRegion.wCurrentBottom,dx
  mov cx,rRegion.wCurrentLeft
  a?? cx,4+4+1
  mov rListItemRegion.wCurrentLeft,cx
  mov cx,rRegion.wCurrentRight
  sub cx,(29+4+4+1)-8
  cmp [si].ControlType,LISTBOXNOSCROLL
  jnz rlb11
  add cx,16
rlb11
  mov rListItemRegion.wCurrentRight,cx
  mov ax,[bx].ID
  mov cx,[bx].wTopVisible
  inc cx
  mov rListItemRegion.wListItemIndex,cx
rlb14
  mov cx,rListItemRegion.wListItemIndex
  mov ax,[bx].ID
  mov rListItemRegion.wListHandle,ax
  mov rListItemRegion.wCurrentHeight,-1
  push bx
  push si
  or cx,cx
  jz rlb15a
  cmp cx,wCurrentMaxListItem
  jbe rlb15
rlb15a:
  mov rListItemRegion.wListItemIndex,0
  mov bl,0
  jmp rlb12
rlb15:
  call getlistdata
  cmp wCurrentMaxListItem,dx
  jnz rlb12
  or bl,4
rlb12:
  mov rListItemRegion.bListItemFlags,bl
  mov si,pNextActiveRegion
  call AddListItemToActiveList
  call DrawListItem
  pop si
  pop bx
  mov ax,wNormFontHeight
  push ax
  add ax,rListItemRegion.wCurrentBottom
  cmp ax,rRegion.wCurrentBottom
  pop ax
  ja rlb13
  add rListItemRegion.wCurrentTop,ax
  add rListItemRegion.wCurrentBottom,ax
  cmp rListItemRegion.wListItemIndex,0
  jz rlb14a
  inc rListItemRegion.wListItemIndex
rlb14a:
  jmp rlb14
rlb13
  mov ax,[si]
rlb4:
rlb8:
  ret
RepaintListBox endp

RepaintIndividualListBox proc near
  public RepaintIndividualListBox
  call FindRegionForControl
  jnc dilg1
  ret

dilg1:
  push pNextActiveRegion
  mov pNextActiveRegion,bx
  mov si,bx
  call RestoreRegion
  mov ax,[si]
  call RepaintListBox
  pop pNextActiveRegion
  clc
  ret
RepaintIndividualListBox endp

CopyListItemFromSM proc near
  push ds
  pop es
  mov ds,dx
  mov al,[si].cAttribute
  mov es:bListItemAttribute,al
  push cx
  mov cx,LISTITEMBUFFERSIZE
  or dx,dx
  jz glid4
  lds si,[si].lpszEntry
  mov ax,ds
  or ax,si
  jz glid4
  rep movsb

glid4:
  pop cx
  xor al,al
  stosb
  push es
  pop ds
  ret
CopyListItemFromSM endp

DoAutoScrollEvent proc near
  public DoAutoScrollEvent
  cmp wAutoScrollTimer,1
  jb dase99

  mov wAutoScrollTimer,0
  mov si,pTabRegion
  cmp bAutoScrollMode,1
  jnz dase1
  mov ax,[si].wCurrentBottom
  cmp wPenCurrentRow,ax
  jbe dase99
  call DoListDownArrow
  jmp short dase2
dase1:
  mov ax,[si].wCurrentTop
  cmp wPenCurrentRow,ax
  jae dase99
  call DoListUpArrow
dase2:
  jc dase99
  mov pClickRegion,si
dase99:
  ret
DoAutoScrollEvent endp

DoListBoxKey proc near
  public DoListBoxKey
  cmp al,' '
  jae dlbk1
  mov al,ah

  call JumpOnAL
  db UP_ARROW_SCAN_CODE
  dw offset dlbua
  db DOWN_ARROW_SCAN_CODE
  dw offset dlbda
  db 0
dlbk1
  ret

dlbua
  call DoListUpArrow
  jc dlbda1
  mov pClickRegion,si
  mov pPenUpListRegion,si
dlbda1:
  ret

dlbda:
  call DoListDownArrow
  jc dlbda2
  mov pClickRegion,si
  mov pPenUpListRegion,si
dlbda2:
  ret
DoListBoxKey endp

DoListDownArrow proc near


  mov si,pTabRegion
  or si,si
  jnz dlda1a
  jmp dlda1
dlda1a

  cmp [si].wListHandle,0
  jnz dlda1ax
  jmp dlda1
dlda1ax:
  cmp [si].wListItemIndex,0
  jnz dlda1x
  jmp dlda1
dlda1x:
  test [si].bListItemFlags,4
  jz dlda3
  jmp dlda1
dlda3:
  mov ax,[si].wListHandle
  mov bx,type rTabRegion
  cmp ax,[si+bx].wListhandle
  jnz dlda2
  add si,bx
  test [si].bListItemFlags,1
  jnz dlda3

dlda2a:
  clc
  ret
dlda2:
  push si
  mov bx,[si].pCurrentControl
  inc [bx].wTopVisible
  mov ax,[bx].pFirstRegionRecord
  mov cx,si
  mov si,ax
dlda3a:
  cmp si,cx
  je dlda4
  mov di,si
  add si,type rRegion
  mov dx,[si].wListItemIndex
  mov [di].wListItemIndex,dx
  mov dl,[si].bListItemFlags
  mov [di].bListItemFlags,dl
  jmp short dlda3a

dlda4:
  inc [si].wListItemIndex
  mov cx,[si].wListItemIndex
  mov ax,[si].wListHandle
  push si
  call GetListData
  pop si
  mov [si].bListItemFlags,bl
  mov cx,LIST_LAST_ITEM
  mov ax,[si].wListHandle
  push si
  call GetListData
  pop si
  cmp dx,[si].wListItemIndex
  jnz dlda5
  or [si].bListItemFlags,4
dlda5:
  mov bListRepaintNeeded,-1
  pop si
  sub si,type rTabRegion
  jmp dlda3
dlda1:
  stc
  ret
DoListDownArrow endp

DoListSlide proc near
```

```
public DoListSlide

push di
call FindListBoxForVSB
pop di

call GetListMaxAndTop
call GetListTopItemRange
cmp cx,1
jle dvs1
mov bx,cx
mov ax,wListSlideRow
mov dx,[di].wCurrentBottom
sub dx,29
cmp ax,dx
jle dvs3
mov ax,dx
dvs3
sub ax,[di].wCurrentTop
sub ax,16
jge dvs2
xor ax,ax
dvs2
mov dx,100
mul dx
mov cx,[di].wCurrentHeight
sub cx,2*16
div cx
mul bx
mov cx,100
div cx
cmp [si].wTopVisible,ax
jz dvs1
mov [si].wTopVisible,ax
mov bRepaintItemsOnly,-1
call RepaintIndividualListBox
dvs1:
ret
DoListSlide endp

DoListUpArrow proc near

mov si,pTabRegion
mov pListGrayedItemSkipped,si
or si,si
jnz diua1a
jmp diua1
diua1a:
cmp [si].wListHandle,0
jnz diua3
jmp diua1
diua3
cmp [si].wListItemIndex,1
jnz diua1b
jmp diua1
diua1b
cmp si,offset rActiveRegions
jbe diua2
mov bx,type rTabRegion
neg bx
mov ax,[si].wListHandle
cmp [si+bx].wListHandle,ax
jnz diua2
add si,bx
test [si].bListItemFlags,1
jz diua1c
cmp [si].wListItemIndex,1
jz diua1

cmp [si+bx].wListHandle,ax
jz diua1d
call ScrollDownList
mov si,pListGrayedItemSkipped
add si,type rTabRegion
jmp diua1c
diua1d:
jmp diua3
diua1c.
clc
ret
diua2:

call ScrollDownList
jmp diua3
diua1:
stc
ret
DoListUpArrow endp

DoVsbDnArrow proc near
public doVSBDnArrow
call FindListBoxForVSB
mov ax,[di].wListHandle
dvda3
cmp [di].wListHandle,ax
jnz dvda1
cmp [di].wListItemIndex,0
jz dvda2
test [di].bListItemFlags,4
jnz dvda2
add di,type rRegion
jmp dvda3
dvda1:
inc [si].wTopVisible
mov bRepaintItemsOnly,-1
call RepaintIndividualListBox
dvda2:
ret
DoVsbDnArrow endp

DoVsbUpArrow proc near
public doVSBUpArrow

call FindListBoxForVSB
cmp [si].wTopVisible,1
jb dvua2
dec [si].wTopVisible
mov bRepaintItemsOnly,-1
call RepaintIndividualListBox
dvua2:
ret
DoVsbUpArrow endp

FindListBoxForVSB proc near

dvus1:
add di,type rRegion
cmp [di].wLISTHANDLE,0
jz dvus1
mov si,[di].pCurrentControl
ret
FindListBoxForVSB endp

GetListData proc near
public GetListData
LIST_CURRENT_ITEM equ 0
LIST_LAST_ITEM    equ -1
push di
cmp cx,-1
jnz glx1
call GetListDataWork
jmp glx99
glx1:
cmp cx,0
jnz glx2
call GetListDataWork

mov wListCurrentItem,dx
not bl
and bl,1
or bl,2
jmp glx99

glx2:
mov bListItemNoStore,-1
push ax
push cx
xor cx,cx
call GetListDataWork
mov wHoldCurrentListIndex,ax
pop cx
pop ax
call GetListDataWork
not bl
and bl,1
cmp dx,wHoldCurrentListIndex
jnz glx3
or bl,2
glx3:
jmp glx99
glx99:
pop di
ret
GetListData Endp

GetListDataWork proc near
call CheckListDataAvailable
jns gld00

gld_wait1:
mov dx,0
ret
gld00.
mov wListGetSet,ax
mov bx,cx
mov ah,80h
SM_FUNCTION ax
jl gld1
cmp cx,-1
jnz gld2
mov dx,ax
ret
gld1
mov dx,0
ret
gld2:
cmp cx,0
jz tmp1
mov ax,cx
tmp1:
cmp bListItemNoStore,0
je gld2a
mov bListItemNoStore,0
ret
gld2a:
mov wListIndex,ax
mov ax,wListGetSet
mov di,offset szListItemBuffer
cmp ah,0
jz gld3
mov di,offset szListItemBuffer1
gld3:
call CopyListItemFromSM
mov ax,wListGetSet
or ah,ah
jz gld5

mov byte ptr szListItemBuffer2,0
mov al,ah
mov ah,80h
mov bx,cx
SM_FUNCTION ax
jl gld8
mov bx,dx
or ax,si
jz gld6
mov di,offset szListItemBuffer2
call CopyListItemFromSM

gld6:
push ds
pop es
mov si,offset szListItemBuffer1
mov di,offset szListItemBuffer
gld6a:
cmp di,offset szListItemBuffer +
LISTITEMBUFFERSIZE
jae gld6b
lodsb
or al,al
jz gld6b
stosb
jmp gld6a
gld6b:
mov si,offset szListItemBuffer2
gld6c:
cmp di,offset szListItemBuffer +
LISTITEMBUFFERSIZE
jae gld6d
mov al,9
stosb
gld6e:
cmp di,offset szListItemBuffer +
LISTITEMBUFFERSIZE
jae gld6d
lodsb
stosb
or al,al
jnz gld6e

gld6d:

gld5:
mov bl,bListItemAttribute
mov dx,wListIndex
mov si,offset szListItemBuffer
ret
GetListDataWork endp

HandleListPenUp proc near
public HandleListPenUp

mov si,pPenUpListRegion
or si,si
jnz hlpu1a
jmp hlpu1
hlpu1a:
mov ax,[si].pCurrentControl
or ax,ax
jnz hlpu1b
jmp hlpu1
hlpu1b:
call DoCustomListPenUp

hlpu1:
mov pPenUpListRegion,0
ret
HandleListPenUp endp

ListItemClick proc near
public ListItemClick

test [di].wListItemIndex,07FFFh
jnz lic1
jmp lic11
lic1:
test [di].bListItemFlags,1
jz lic2
jmp lic11
lic2:
cmp bListRepaintNeeded,-1
jz lic7

test [di].bListItemFlags,2
jz lic3
call ShowTabBox
jmp lic11
lic3:
call UndoCurrentTabItem
call ChangeListItem
mov si,di
call DrawListItem
call SetNewTabItem
jmp lic10

lic7:
mov bListRepaintNeeded,0
call UndoCurrentTabItem
inc bIgnoringMove
call ChangeListItem
mov si,[di].pCurrentControl
mov bRepaintItemsOnly,-1
call RepaintIndividualListBox
call SetNewTabItem
dec bIgnoringMove

lic10:
stc
jmp short lic12
lic11.
clc
lic12:
ret
ListItemClick endp

ChangeListItem proc near

call UndoOldCurrentListItem
or [di].bListItemFlags,2
mov cx,[di].wListItemIndex
mov ax,[di].wListHandle
push ax
push cx
call GetListData
pop cx
pop ax
call SetListCurrent
ret
ChangeListItem endp

ScrollDownList proc near

push si
mov bx,[si].pCurrentControl
dec [bx].wTopVisible
mov cx,si
mov ax,[si].wListHandle
mov bx,type rTabRegion
diua7:
cmp [si+bx].wListHandle,ax
jnz diua8
add si,bx
jmp diua7

diua8:
neg bx
diua9:
cmp si,cx
jz diua8
mov dx,[si+bx].wListItemIndex
mov [si].wListItemIndex,dx
mov dl,[si+bx].bListItemFlags
mov [si].bListItemFlags,dl
add si,bx
jmp short diua9
diua8:
dec [si].wListItemIndex
mov cx,[si].wListItemIndex
mov ax,[si].wListHandle
push si
call GetListData
pop si
mov [si].bListItemFlags,bl
mov cx,LIST_LAST_ITEM
mov ax,[si].wListHandle
push si
call GetListData
pop si
cmp dx,[si].wListItemIndex
jnz diua5
or [si].bListItemFlags,4
```

```
dlus5

 mov bListRepaintNeeded,-1
 pop si
 add si,type rTabRegion
 ret
ScrollDownList endp

SetListCurrent proc near
 public SetListCurrent
 cmp ah,0
 jnz slc1

 mov si,offset rListBoxItem
 push ax
 mov dx,ds
 mov ah,bListItemAttribute
 mov [si].cAttribute,ah
 mov word ptr [si].lpszEntry[0],offset
szListItemBuffer
 mov word ptr [si].lpszEntry[2],ds
 xor ah,ah
 mov bx,cx
 SM_FUNCTION ax
 pop ax
 ret

slc1
 mov si,offset rListBoxItem1
 push ax
 mov dx,ds
 mov ah,bListItemAttribute
 mov [si].cAttribute,ah
 mov word ptr [si].lpszEntry[0],offset
szListItemBuffer1
 mov word ptr [si].lpszEntry[2],ds
 xor ah,ah
 mov bx,cx
 SM_FUNCTION ax
 pop ax
 mov si,offset rListBoxItem2
 push ax
 mov si,ax
 mov dx,ds
 mov ah,bListItemAttribute
 mov [si].cAttribute,ah
 mov word ptr [si].lpszEntry[0],offset
szListItemBuffer2
 mov word ptr [si].lpszEntry[2],ds
 xor ah,ah
 mov bx,cx
 SM_FUNCTION ax
 pop ax
 ret
SetListCurrent endp

DrawVerticalScrollBar proc near
 public DrawVerticalScrollBar

 mov si,offset VsbBacking
 mov rRegion.pCurrentControl,si
 mov cx,rRegion.wCurrentRight
 sub cx,23
 ROUND_TO_BYTE_BOUNDARY cx

 mov rRegion.wCurrentLeft,cx
 push cx
 add cx,12
 dec cx
 mov rRegion.wCurrentRight,cx
 pop cx
 add rRegion.wCurrentTop,21
 mov dx,rRegion.wCurrentTop
 mov ax,rRegion.wCurrentHeight
 mov [si].TopPixel,dx
 sub ax,24
 mov rRegion.wCurrentHeight,ax
 mov wCurrentScrollBarHeight,ax
 mov [si].PixelHeight,ax
 mov ax,16
 mov rRegion.wCurrentWidth,ax
 mov ax,[si]
 call RepaintButton
 mov rRegion.bListItemFlags,128
 call AddControlToActiveList


 mov si,offset VsbUpArrow
 mov rRegion.pCurrentControl,si
 mov ax,16
 mov rRegion.wCurrentHeight,ax
 add ax,rRegion.wCurrentTop
 mov rRegion.wCurrentBottom,ax
 mov ax,[si]
 mov dx,rRegion.wCurrentTop
 mov cx,rRegion.wCurrentLeft
 call RepaintButton
 mov rRegion.bListItemFlags,128
call AddControlToActiveList
push rRegion.wCurrentBottom


mov si,offset VsbDnArrow
mov rRegion.pCurrentControl,si
mov dx,VsbBacking.TopPixel
add dx,VsbBacking.PixelHeight
mov rRegion.wCurrentBottom,dx
mov ax,16
sub dx,ax
mov rRegion.wCurrentTop,dx
mov rRegion.wCurrentHeight,ax
mov [si].TopPixel,dx
mov cx,rRegion.wCurrentLeft
mov ax,[si]
call RepaintButton
mov rRegion.bListItemFlags,128
call AddControlToActiveList
pop  rRegion.wCurrentBottom


 mov si,offset VsbSlider
 mov rRegion.pCurrentControl,si

 call GetListTopItemRange
 jg dts3
dts4:
 xor ax,ax
 jmp dts1
dts3:
 mov ax,100
 mov bx,wCurrentTopListItem
 or bx,bx
 jz dts4
 inc bx
 mul bx
 div cx
 mov dx,wCurrentScrollBarHeight
 sub dx,16*3
 mul dx
 mov cx,100
 div cx
dts1:
 add ax,rRegion.wCurrentBottom
 mov bx,rRegion.wCurrentTop
 sub bx,16
 cmp ax,bx
 jbe dts2
 mov ax,bx
dts2:
 mov rRegion.wCurrentTop,ax
 mov dx,ax
 add ax,rRegion.wCurrentHeight
 dec ax
 mov rRegion.wCurrentBottom,ax
 mov cx,rRegion.wCurrentLeft
 mov ax,[si]
 call RepaintButton
 mov rRegion.bListItemFlags,128
 call AddControlToActiveList
 ret
DrawVerticalScrollBar endp

GetListTopItemRange proc near

 call GetNormFontHeight
 mov cx,ax
 mov ax,wCurrentScrollBarHeight
 xor dx,dx
 div cx
 mov cx,wCurrentMaxListItem
 sub cx,ax
 inc cx
 ret
GetListTopItemRange endp

DrawListItem proc near
 public DrawListItem

 push si
 push bx
 push di
 mov di,si
 mov ax,[di].wListHandle
 mov cx,[di].wListItemIndex
 or cx,cx
 jnz dli1

 mov si,offset bNullString
 mov bl,0
 jmp dli2
dli1:
 call GetListData
dli2
 mov al,[di].bListItemFlags
 mov bl,bListItemNormForeground
 mov bh,bListItemNormBackground
 test al,1
 jz dli3
 mov bl,bListItemGrayedForeground
 mov bh,bListItemGrayedBackground
 jmp dli4
dli3:
 test al,2
 jz dli4
 mov bl,bListItemSelectedForeground
 mov bh,bListItemSelectedBackground
dli4:
 or bh,LEFTJUSTIFIED+WITHBACKCOLOR
 mov ax,[di].wCurrentRight
 mov cx,[di].wCurrentLeft
 sub ax,cx
 inc ax
 mov dx,[di].wCurrentTop
 push pNormFont
 pop pCurrentFont
 call DrawString
 pop di
 pop bx
 pop si
 ret
DrawListItem endp

GetListMaxItem proc near
 public GetListMaxItem

 push ax
 mov ax,[bx].ID
 mov cx,LIST_LAST_ITEM
 push dx
 push bx
 push si

 call GetListData
 mov wCurrentMaxListItem,dx
 pop si
 pop bx
 pop dx
 pop ax
 ret
GetListMaxItem endp

GetListMaxAndTop proc near
 public GetListMaxAndTop

 mov bx,si
 call GetListMaxItem
 push [si].wTopVisible
 pop wCurrentTopListItem
 ret
GetListMaxAndTop endp

UndoOldCurrentListItem proc near
 push si
 mov bx,[di].pCurrentControl
 mov si,[bx].pFirstRegionRecord
lic5:
 test [si].bListItemFlags,2
 jnz lic4
 mov ax,[si].wListHandle
 add si,type rRegion
 cmp ax,[si].wListHandle
 jz lic5

 jmp short lic6

lic4:
 and [si].bListItemFlags, not(2)
 call DrawListItem
lic6:
 pop si
 ret
UndoOldCurrentListItem endp

 end

 Copr. 1995 Zenith Data Systems Corp.

 .MODEL SMALL
 .CODE
 extrn PenOff:near
 extrn PenOn:near
 extrn HidePen:near
 extrn ActivatePen:near
 extrn CheckIfOnlyOSK:near
 extrn DoAutoScrollEvent:near
 extrn DoClickEvent:near
 extrn DoCursorFlash:near
 extrn DoKeyEvent:near
 extrn DoPenEvent:near
 extrn DoSpinDown:near
 extrn DoSpinUp:near
 extrn DoVSBDnArrow:near
 extrn FillScreenArea:near
 extrn GetNormFontHeight:near
 extrn GetTabControlType:near
 extrn HandleListPenUp:near
extrn Repaint:near
extrn RepaintAndSetTab:near
extrn RepaintOSKInMemory:near
extrn SendKey:near
extrn SendKeyDownScanCode:near
extrn SetFormHeights:near
extrn ShowPen:near
extrn DoVSBDnArrow:near
extrn DoVSBUpArrow:near

include usncled.inc

if need_tsr ne 0
ProgEnd segment public 'stack'
ProgEnd ends
endif

DATASEG_BEGIN
extrn ControlDataStorageArea:byte
extrn MainForm:tControl
extrn OSK:tControl
extrn VSBDnArrow:tControl
extrn VSBUpArrow:tControl
extrn bAutoScrollMode:byte
extrn bAutoScrollMode:byte
extrn bAutoScrollMode:byte
extrn bCursorActive:byte
extrn bPenEventHappened:byte
extrn bSuppressShow:byte
extrn pPenUpListRegion:word
extrn pPenUpListRegion:word
extrn pPenUpListRegion:word
extrn uifont0:word
extrn uifont1:word
extrn uifont2:word
extrn uifont3:word
extrn vsbUparrow:tControl
extrn wAutoScrollTimer:word
extrn wAutoScrollTimer:word
extrn wCoveredAreaTop:word
DATASEG_END


if need_tsr eq 0
 SET_PEN_EVENT_HANDLER = 0ch
 PEN_ACTIVATE_FUNCTION = 33h
endif

INSTALL_INT macro intnum
 jmp short $ + 6
old&intnum&int dd 0
 push ds
 mov ah,35h
 mov al,0&intnum&h
 int 21h
 mov word ptr cs:old&intnum&int,bx
 mov word ptr cs:old&intnum&int[2],es
 push cs
 pop ds
 mov dx,offset new&intnum&int
 mov ah,25h
 mov al,0&intnum&h
 int 21h
 pop ds
endm
REMOVE_INT macro intnum
 push ds
 mov dx,word ptr cs:old&intnum&int
 mov ds,word ptr cs:old&intnum&int[2]
 mov al,intnum&h
 mov ah,25h
 int 21h
 pop ds
endm

DATASEG_BEGIN

wPSPSegment dw 0
 public wPSPSegment


bTextMode  db 0
 public bTextMode

bLanguageToUse  db 0
 public bLanguageToUse

wCurrentResource dw 0
 public wCurrentResource
bNewDisplayRequested db 0
 public bNewDisplayRequested
wDisplayRequested dw 0
 public wDisplayRequested
bMessageBoxRequested db 0
 public bMessageBoxRequested
bRemoveMessageBoxRequested db 0
 public bRemoveMessageBoxRequested
bMessageBoxID db 0
 public bMessageBoxID
```

```
bMessageBoxResult db 0
  public bMessageBoxResult
bGetDataFromLocalStorage db 0
  public bGetDataFromLocalStorage
bDummyBlank db " ",0
  public bDummyBlank

wDivisors label word
dw 10000
dw 1000
wDivisors100 label word
dw 100
wTenWord label word
dw 10
dw 1

bNullString db 0,0
  public bNullString

wJumpTableBase dw 0


wCursorTimer dw 0
  public wCursorTimer

wTypamaticTimer dw 0
pTypamaticOSKControl dw 0
bTypamaticState db 0
  public bTypamaticState


bDoingEvents db 0
  public bDoingEvents
bPopUpRequired db 0
  public bPopUpRequired

wVideoStateBuffer dw 9 dup(0)
bOrgScreenMode db 0
bScreenMode db 0
  public bScreenMode
wScreenSegment dw 0
  public wScreenSegment


bMoveMode      db 0
  public bMoveMode
wMoveModePenRow dw 0
  public wMoveModePenRow
wMoveModePenColumn dw 0
  public wMoveModePenColumn

bNoDimensionUpdate db 0
  public bNoDimensionUpdate


wKeyPressed dw 0
  public wKeyPressed
bKeyChanged db 0
  public bKeyChanged

wShortCutKey        dw 0
  public wShortCutKey


rActiveRegions label tRegion
  public rActiveRegions
  db MAX_ACTIVE_CONTROLS * type tRegion
dup(0)

rMoveStartRegion tRegion <0,0,0,0,0,0,0,0>
  public rMoveStartRegion
rPushedRegion   tRegion <0,0,0,0,0,0,0,0>
  public rPushedRegion
rRegion         tRegion <0,0,0,0,0,0,0,0>
  public rREGION
rLegendRegion   tRegion <0,0,0,0,0,-1,0,0>
  public rLegendRegion
rTabRegion      tRegion <0,0,0,0,0,-1,0,0>
  public rTabRegion
rCursorRegion   tRegion <0,0,0,0,0,0,0,0>
  public rCursorRegion


pPenDownActiveRegion dw 0
  public pPenDownActiveRegion
pPenDownLegendRegion dw 0
  public pPenDownLegendRegion

pClickRegion dw 0
  public pClickRegion


pOSKFirstRegion dw -1
  public pOSKFirstRegion

pNextActiveRegion dw 0
  public pNextActiveRegion
pCurrentToolButtonRegion dw 0
  public pCurrentToolButtonRegion
pOrgTabRegion dw 0


pCurrentToolBarButton dw 0
  public pCurrentToolBarButton
pFirstControl   dw 0
  public pFirstControl

bLocalState   db 1
  public bLocalState

FontTable label word
  public FontTable
pNormFont    dw offset uifont0
  public pNormFont
pSmallFont   dw offset uifont1
pBigFont     dw offset uifont2
pGraphicFont dw offset uifont3
  public pGraphicFont

wNormFontHeight dw 0
  public wNormFontHeight


bFormColor      db FORM_COLOR,0
  public bFormColor
bShadowColor   db SHADOW_COLOR,0
  public bShadowColor
bOutLineColor  db OUTLINE_COLOR,0
  public bOutLineColor
bLightColor    db LIGHT_COLOR,0
  public bLightColor

bDesktopColor           db BLUE,0
  public bDeskTopColor
bIconForegroundColor    db BLACK,0
  public bIconForegroundColor
bIconBackgroundColor    db
WHITE+WITHBACKCOLOR,0
  public bIconBackgroundColor
bButtonForegroundColor  db BLACK,0
  public bButtonForegroundColor
bCaptionForegroundColor db BLACK,0
  public bCaptionForegroundColor
bCaptionBackgroundColor db GRAY,0
  public bCaptionBackgroundColor
bTitleForegroundColor   db BLACK,0
  public bTitleForegroundColor


bRepaintNeeded   db 0
  public bRepaintNeeded
bRepaintMode     db 0
  public bRepaintMode
bDontChangeProtection db 0
  public bDontChangeProtection
bDoingSpin db 0
  public bDoingSpin
bModalFlag db 0
  public bModalFlag
bModalFlagHold db 0
  public bModalFlagHold


pGraphicsCaption dw 0
  public pGraphicsCaption
pTextCaption     dw 0
  public pTextCaption
wShiftCaption    dw 0
  public wShiftCaption
wCaptionTop      dw 0
  public wCaptionTop
wGraphicCaptionHeight dw 0
  public wGraphicCaptionHeight
wGraphicLegendRight dw 0
  public wGraphicLegendRight


iIgnoreLevel      dw 0
  public iIgnoreLevel
iObjectLevel      dw 0
  public iObjectLevel

iTopAdders label word
  public iTopAdders
        dw 10 dup(0)
iLeftAdders label word
  public iLeftAdders
        dw 10 dup(0)
wDeltaLeft dw 0
  public wDeltaLeft
wDeltaTop  dw 0
  public wDeltaTop

if NEED_ALTKEYS ne 0
AltKeyTable label byte
  db "1234567890"
  db "QWERTYUIOP"
  db "ASDFGHJKL"
  db "ZXCVBNM"
AltKeyTable_end label byte

ScanCodeTable label byte
  db 120,121,122,123,124,125,126,127,128,129
  db 16,17,18,19,20,21,22,23,24,25
  db 30,31,32,33,34,35,36,37,38
  db 44,45,46,47,48,49,50
ScanCodeTable_end label byte
endif
DATASEG_END
.CODE
uimain proc far
  public UIMain

  mov ax,OURDATASEG
  mov ds,ax
  mov ax,5100h
  int 21h
  mov wPSPsegment,bx

  mov ah,0fh
  int 10h
  and al,1111111b
  mov bScreenMode,al
  mov bOrgScreenMode,al

 if need_tsr eq 0
  mov ah,0
  mov al,12h
  mov bScreenMode,al
  int 10h
 endif

   call ActivatePen

   call far ptr DoCustomStartups


   mov pFirstControl,offset MainForm
   call GetNormFontHeight
   call SetFormHeights

   call InstallInterrupts

 if need_tsr eq 0
   call showpen
   mov bRepaintNeeded,-1
   call doevents
   mov ah,0
   mov al,bOrgScreenMode
   and al,1111111b
   int 10h
   call DeinstallInterrupts
   mov ax,0
   int 33h
   ret
 else
   mov dx,ProgEnd
   sub dx,wPspSegment
   inc dx
   mov ax,03100h
   int 21h
 endif

 uimain endp


 DoEvents proc near
  public DoEvents


  mov bLocalState,1
 deloop:

  call far ptr DoCustomEvents
  jnc delp1
  jmp de100
 delp1:

   cmp bRepaintNeeded,0
   jz de4a
   call RepaintAndSetTab
 if need_osk ne 0
   call RepaintOSKInMemory
 endif
 de4a:


   call DoCursorFlash


   cmp bPenEventHappened,0
   jz de2

  call DoPenEvent
de2:


if need_tsr eq 0
 mov ah,1
 int 16h
 jz dpk1
 mov ah,0
 int 16h
 mov bKeyChanged,-1
 mov wKeyPressed,ax
endif
dpk1:


  cmp bTestMode,0
  jz de1
  cmp bKeyChanged,0
  jz de1
  call DoTestModeEvent
 de1:


  call CheckTypamaticState
  jnc cts3
  call DoTypamaticEvent
 cts3:
  cmp bAutoScrollMode,0
  jz cts1
  call DoAutoScrollEvent
 cts1:


  cmp wKeyPressed,0
  jz de6
  call GetTabControlType
  cmp al,KEYEDITBOX
  jz de6
  call DoKeyEvent
  mov wKeyPressed,0
 de6:


  cmp pClickRegion,0
  jz de5
  call DoClickEvent
  mov pClickRegion,0
  mov pPenDownActiveRegion,0
 de5
  cmp pPenUpListRegion,0
  jz de5a
  call HandleListPenUp
 de5a:


 de60

 if need_tsr ne 0
  cmp bRepaintNeeded,0
  jz de101
  jmp deloop
 de101:
  cmp bPopupRequired,0
  jz de100
 endif

  cmp bLocalState,0
  jz de100
  mov bPopupRequired,0
  jmp deloop
 de100:
  ret
 DoEvents endp

 DoTestModeEvent proc near


  mov ax,wKeyPressed
  cmp al,0
  jnz dke1a

  cmp ah,78h
  jb ctrk1
  cmp ah,7eh
  ja ctrk1
  jmp ctrk2
 ctrk1:
  cmp ah,47h
  jne dke1a
 ctrk2:
  mov bl,ah
  SM_FUNCTION SM_TEST_FUNCTION
 dke1a:
  ret
 DoTestModeEvent endp
```

```
CheckTypamaticState proc near
 cmp bTypamaticState,1
 ja  dte1
 jz  dte1a
dte1b:
 clc
 ret
dte1a:
 cmp wTypamaticTimer,8
 jb dte1b
 inc bTypamaticState
 jmp dte1b
dte1:
 cmp wTypamaticTimer,4
 jb dte1b
 stc
 ret
CheckTypamaticState endp

DoTypamaticEvent proc near


 mov si,pTypamaticOSKControl

if need_osk ne 0
 cmp si,offset OSK
 jb dte3
 call CheckIfOnlyOSK
 jnc dte2a
 call SendKeyDownScanCode
 jmp dte98
dte2a
 call SendKey
 jmp dte98
dte3
endif

 mov al,[si].ControlType

 cmp al,SPINUPBUTTON
 jnz dte3a
 call DoSpinUp
 jmp dte98
dte3a:

 cmp al,SPINDOWNBUTTON
 jnz dte3b
 call DoSpinDown
 jmp dte98
dte3b

 cmp si,offset vsbUpArrow
 jnz dte3c
 mov di,pPenDownActiveRegion
 call DoVSBUpArrow
 jmp dte98
dte3c:

 cmp si,offset vsbDnArrow
 jnz dte3d
 mov di,pPenDownActiveRegion
 call DoVSBDnArrow
 jmp dte98
dte3d:

 jmp dte99

dte98
 mov wTypamaticTimer,0
dte99
 ret
DoTypamaticEvent endp

SetTypaMatic proc near
 public SetTypaMatic
 mov pTypamaticOSKControl,si
 mov wTypamaticTimer,0
 mov bTypamaticState,1
 ret
SetTypamatic endp


ClearScreen proc near
 public ClearScreen

 CLEAR_RECTANGLE
0,0,SCREEN_WIDTH_BYTES,SCREEN_HEIGHT_P
IXELS,bDesktopColor
 ret
ClearScreen endp

BlackenScreen proc near
 public BlackenScreen
 cmp bScreenMode,VGA_MODE
 jnz bls1
```

```
 CLEAR_RECTANGLE
0,0,SCREEN_WIDTH_BYTES,SCREEN_HEIGHT_P
IXELS,0
bls1:
 ret
BlackenScreen endp


GetVGAState proc near

 public GetVGAState
if need_tsr ne 0
 cmp bScreenMode,VGA_MODE
 jz gvs0
 ret
gvs0:
 push ax
 push cx
 push bx
 push dx
 mov bx,offset wVideoStateBuffer
 mov dx,03ceh
 mov cl,0
gvs1:
 mov al,cl
 out dx,al
 inc dx
 in al,dx
 dec dx
 mov ah,al
 mov al,cl
 mov [bx],ax
 inc bx
 inc bx
 inc cl
 cmp cl,8
 jbe gvs1
 pop dx
 pop bx
 pop cx
 pop ax
endif
 ret
getvgastate endp


RestVGAState proc near
 public RestVGAState
 if need_tsr ne 0
 cmp bScreenMode,VGA_MODE
 jz rvs0
 ret
rvs0:
 push ax
 push cx
 push bx
 push dx
 mov bx,offset wVideoStateBuffer
 mov cx,8
 mov dx,03ceh
rvs1:
 mov ax,[bx]
 out dx,ax
 inc bx
 inc bx
 loop rvs1
 pop dx
 pop bx
 pop cx
 pop ax
endif
 ret
restvgastate endp

Ascii2Bin proc near
 public Ascii2Bin

 push cx
 xor bx,bx
 xor cx,cx
a2b1:
 lodsb
 cmp al,' '
 jz a2b1
 jb a2b3
a2b2:
 cmp al,'0'
 jb a2b3
 cmp al,'9'
 ja a2b3
 xor ah,ah
 sub al,'0'
 xchg bx,ax
 mul word ptr wTenWord
 push dx
 xchg cx,ax
 mul word ptr wTenWord
```

```
xchg ax,cx
pop dx
add cx,dx
add ax,bx
adc cx,0
xchg bx,ax
lodsb
jmp a2b2
a2b3:
 dec si
 mov dx,cx
 pop cx
 ret
Ascii2bin endp

Bin2Ascii proc near
 public Bin2ASCII

 push si
 push dx
 xor ch,ch
m4d0:
 mov si,offset wDivisors
 cmp cl,5
 jz m4d1
 inc si
 inc si
 cmp cl,4
 jz m4d1
 inc si
 inc si
 cmp cl,3
 jz m4d1
 inc si
 inc si
 cmp cl,2
 jz m4d1
 inc si
 inc si
 cmp cl,1
 jz m4d1
 jmp m4dx
m4d1:
 xor dx,dx
 div word ptr [si]
 or al,30h
 cmp al,'0'
 jnz m4d2a
 cmp cl,1
 jz m4d2
 cmp ch,-1
 jz m4d2
 jmp m4d3
m4d2a:
 mov ch,-1
m4d2:
 mov [bx],al
 inc bx
m4d3:
 inc si
 inc si
 mov ax,dx
 dec cl
 jnz m4d1
m4dx:
 pop dx
 pop si
 ret
Bin2Ascii endp


JumpOnAL proc near
 public JumpOnAL
          pop     wJumpTableBase
          push    si
          push    ax
          mov     si,wJumpTableBase
joal_rp:  mov     ah,cs:[si]
          or      ah,ah
          jz      joal_nm
          cmp     ah,al
          jz      joal_m
          add     si,3
          jmp     joal_rp
joal_nm:  inc     si
joal_nmr: mov     wJumpTableBase,si
          pop     ax
          pop     si
          push    wJumpTableBase
          ret
joal_m:   mov     ax,cs:[si+1]
          mov     si,ax
          jmp     joal_nmr
JumpOnAL  endp

JumpOnAX proc near
 public JumpOnAX
```

```
          pop     wJumpTableBase
          push    si
          push    ax
          push    bx
          mov     si,wJumpTableBase
joax_rp:  mov     bx,cs:[si]
          or      bx,bx
          jz      joax_nm
          cmp     ax,bx
          jz      joax_m
          add     si,4
          jmp     joax_rp
joax_nm:  inc     si
          inc     si
joax_nmr: mov     wJumpTableBase,si
          pop     bx
          pop     ax
          pop     si
          push    wJumpTableBase
          ret
joax_m:   mov     ax,cs:[si+2]
          mov     si,ax
          jmp     joax_nmr
JumpOnAX  endp


DisinstallInterrupts proc near
 public DisinstallInterrupts

 REMOVE_INT 1c

if NEED_CRITICAL ne 0
 remove_int 0
 remove_int 24
 remove_int 23
endif

if need_tsr ne 0
 REMOVE_INT 10
endif

 ret
DisinstallInterrupts endp


InstallInterrupts proc near
 INSTALL_INT 1c

if NEED_CRITICAL ne 0
 INSTALL_INT 0
 INSTALL_INT 24
 INSTALL_INT 23
endif

if need_tsr ne 0
 INSTALL_INT 10
endif
 ret
InstallInterrupts endp


New10Int proc far

if need_tsr ne 0
 jmp n10i1
int10active dw 0
n10i1:
 inc cs:int10active
 pushf
 call dword ptr cs:old10int
 dec cs:int10active
 jnz n10i2


 push ax
 push ds
 mov ax,OURDATASEG
 mov ds,ax
 call DoPopUp
 pop ds
 pop ax

n10i2:
endif
 iret

New10Int endp


New1cInt proc far
 push ax
 push ds
 mov ax,OURDATASEG
 mov ds,ax

 inc wCursorTimer
 inc wTypamaticTimer
 inc wAutoScrollTimer
 call far ptr DoCustomTimerProcedures
```

```
if need_tsr ne 0
 call CheckTypematicState
 jnc n8i4
 jmp n8i5
n8i4:
 cmp bAutoScrollMode,0
 jnz n8i5

 cmp bCursorActive,0
 jz n8i8
 cmp wCursorTimer,10
 jae n8i5
n8i8:
 call far ptr GetCustomPopUpRequest
 jc n8i5
n8i0:
 jmp n8i6
n8i5:
 mov bPopupRequired,-1
n8i6:
 call DoPopup
endif
n8i1:
 pop ds
 pop ax
 jmp dword ptr cs:Old1cInt
New1cInt endp

DoPopUp proc near
 public DoPopUp

if need_tsr ne 0
 cmp bPopupRequired,0
 jz n8i1a

 cmp cs:int10active,0
 jnz n8i1a
 cmp bDoingEvents,0
 jnz n8i1a
 cmp bLocalState,0
 jz n8i1a

 pushf
 cli
 inc bDoingEvents
 mov bPopupRequired,0
 sti

 push es
 push bp
 push bx
 push cx
 push dx
 push di
 push si

n8i2:

 extrn penentry:near
 call penentry

 cld
 call GetVgaState
 call DoEvents
 call RestVgaState
 extrn penexit:near
 call penexit
 pop si
 pop di
 pop dx
 pop cx
 pop bx
 pop bp
 pop es
 cli
 dec bDoingEvents
 popf
n8i1a:
endif
 ret
DoPopUp endp

if NEED_CRITICAL ne 0
fatal_error_code dw 0

New24Int    proc    far
 mov cs:fatal_error_code,di

 pop    bx
 pop    ax
 pop    ax
 pop    ax
 pop    bx
 pop    cx
 pop    dx
 pop    si
 pop    di
 pop    bp
 pop    ds
 pop    es
 mov    bp,sp
 mov    ax,[bp+4]
 push   ax
 popf
 mov    ax,[bp+2]
 mov    [bp]+4,ax
 mov    ax,[bp+0]
 mov    [bp+2],ax
 pop    ax
 mov    ax,1
 stc
 ret
New24Int    endp

New0Int     proc far
        mov   ax,0
        mov   dx,0
        iret
New0Int     endp

control_c_pressed db 0

New23Int proc far
        mov cs:control_c_pressed,-1
        iret
New23Int endp

endif

end
Copr. 1995 Zenith Data Systems Corp.

.MODEL SMALL
.code
extrn freescreen:near
extrn UpdateDimensions:near
extrn BlackenScreen:near
extrn DefineCoveredArea:near
extrn FindRegionForControl:near
extrn GetFirstControl:near
extrn GetNextControl:near
extrn GetNextControl:near
extrn fillLegend:near
extrn JumpOnAX:near
extrn PaintControlCaption:near
extrn Repaint:near
extrn SetNewTabItemWork:near
extrn SetProtectionForControl:near
extrn UndoCurrentTabItem:near
extrn CancelPenDown:near

include uinclud.inc
WORKBUF equ '                    ',0
VCENT=480/2
HCENT=640/2
DWIDE=MAXMESSAGELINE
DHIGH=248
DLEFT=HCENT-(DWIDE/2)
DTOP=VCENT-(DHIGH/2)
DATASEG_BEGIN
extrn ControlDataStorageArea:byte
extrn MainForm:tControl
extrn bCoveredAreaOnly:byte
extrn bDontChangeProtection:byte
extrn bFormColor:byte
extrn bMessageBoxID:byte
extrn bMessageBoxResult:byte
extrn bModalFlag:byte
extrn bModalFlagHold:byte
extrn pFirstControl:word
extrn pTabRegion:word
extrn pTabRegionHold:word
extrn wCoveredAreaTop:word
extrn wCoveredAreaTopHold:word
extrn wCurrentResource:word
extrn wCurrentResource:word
extrn wPreviousFormHeight:word
extrn rErrorMess1Header:tBUFFHEADER
extrn rErrorMess2Header:tBUFFHEADER
extrn rErrorMess3Header:tBUFFHEADER
extrn rErrorMess4Header:tBUFFHEADER
extrn rRegion:tregion

ISMStrucLen dw 0
pSMBufferStart dw 0,0
pSMBufferEnd   dw 0

wMessageBoxHeight dw 0
  public wMessageBoxHeight
pMessageBoxButtonFrame dw 0
 public pMessageBoxButtonFrame

wMessageContinuationSI dw 0
 public wMessageContinuationSI
wMessageContinuationDX dw 0
 public wMessageContinuationDX

BEGIN_FORM_DEFINITIONS

frmMessageBox label tControl
 public frmMessageBox
CURRENTFORM=$
 CONTROL
FORM,%NORMSTATE,DLEFT,DTOP,DWIDE,DHIG
H,0
lblMessageBox0 label tControl
 public lblMessageBox0
 MAKE_CENTEREDLEGEND
%INVISIBLE,0,16,DWIDE,16
 GRAPHIC_CAPTION SMALL_CRUZER

lblMessageBox1 label tControl
 MAKE_CENTEREDLEGEND
%NORMSTATE,0,32,DWIDE,16
 CAPTION %WORKBUF

lblMessageBox2 label tControl
 MAKE_CENTEREDLEGEND
%NORMSTATE,0,32+16*1,DWIDE,16
 CAPTION %WORKBUF

lblMessageBox3 label tControl
 MAKE_CENTEREDLEGEND
%NORMSTATE,0,32+16*2,DWIDE,16
 CAPTION %WORKBUF

lblMessageBox4 label tControl
 MAKE_CENTEREDLEGEND
%NORMSTATE,0,32+16*3,DWIDE,16
 CAPTION %WORKBUF

lblMessageBox5 label tControl
 MAKE_CENTEREDLEGEND
%NORMSTATE,0,32+16*4,DWIDE,16
 CAPTION %WORKBUF

lblMessageBox6 label tControl
 MAKE_CENTEREDLEGEND
%NORMSTATE,0,32+16*5,DWIDE,16
 CAPTION %WORKBUF

lblMessageBox7 label tControl
 MAKE_CENTEREDLEGEND
%NORMSTATE,0,32+16*6,DWIDE,16
 CAPTION %WORKBUF

lblMessageBox8 label tControl
 MAKE_CENTEREDLEGEND
%NORMSTATE,0,32+16*7,DWIDE,16
 CAPTION %WORKBUF

frMessageBoxOK label tControl
 public frMessageBoxOK
BEGIN_FRAME
%INVISIBLE,0,%NEXTTOP+8,DWIDE,24
cmdMessageBoxOK_OK label tControl
 public cmdMessageBoxOK_OK
 MAKE_COMMANDBUTTON
%NORMSTATE,DWIDE/2-32,0,64,24
 CAPTION "OK"
END_FRAME
frMessageBoxCancel label tControl
 public frMessageBoxCancel
BEGIN_FRAME
%INVISIBLE,0,%NEXTTOP+8,DWIDE,24
cmdMessageBoxCancel_Cancel label tControl
 public cmdMessageBoxCancel_Cancel
 MAKE_COMMANDBUTTON
%NORMSTATE,DWIDE/2-32,0,64,24
 CAPTION "Cancel"
END_FRAME
frMessageBoxOKCancel label tControl
 public frMessageBoxOKCancel
BEGIN_FRAME
%INVISIBLE,0,%NEXTTOP+8,DWIDE,24
cmdMessageBoxOKCancel_OK label tControl
 public cmdMessageBoxOKCancel_OK
 MAKE_COMMANDBUTTON
%NORMSTATE,DWIDE/2-64-16-24,0,64+24,24
 CAPTION "OK"
cmdMessageBoxOKCancel_Cancel label tControl
 public cmdMessageBoxOKCancel_Cancel
 MAKE_COMMANDBUTTON
%NORMSTATE,DWIDE/2+16-8,%SAMETOP,64+24,
24
 CAPTION "Cancel"
END_FRAME
frMessageBoxARI label tControl
 public frMessageBoxARI
BEGIN_FRAME
%INVISIBLE,0,%NEXTTOP+8,DWIDE,24
cmdMessageBoxARI_Abort label tControl
 public cmdMessageBoxARI_Abort
 MAKE_COMMANDBUTTON
%NORMSTATE,DWIDE/2-64-16-16,0,56,24
 CAPTION "Abort"
cmdMessageBoxARI_Retry label tControl
 public cmdMessageBoxARI_Retry
 MAKE_COMMANDBUTTON
%NORMSTATE,%NEXTLEFT+8,0,56,24
 CAPTION "Retry"
cmdMessageBoxARI_Ignore label tControl
 public cmdMessageBoxARI_Ignore
 MAKE_COMMANDBUTTON
%NORMSTATE,%NEXTLEFT+8,0,56,24
 CAPTION "Ignore"
END_FRAME
frMessageBoxYNC label tControl
 public frMessageBoxYNC
BEGIN_FRAME
%INVISIBLE,0,%NEXTTOP+8,DWIDE,24
cmdMessageBoxYNC_Yes label tControl
 public cmdMessageBoxYNC_Yes
 MAKE_COMMANDBUTTON
%NORMSTATE,DWIDE/2-64-16-16,0,56,24
 CAPTION "Yes"
cmdMessageBoxYNC_No label tControl
 public cmdMessageBoxYNC_No
 MAKE_COMMANDBUTTON
%NORMSTATE,%NEXTLEFT+8,0,56,24
 CAPTION "No"
cmdMessageBoxYNC_Cancel label tControl
 public cmdMessageBoxYNC_Cancel
 MAKE_COMMANDBUTTON
%NORMSTATE,%NEXTLEFT+8,0,56,24

 CAPTION "Cancel"
END_FRAME
frMessageBoxYNR label tControl
 public frMessageBoxYNR
BEGIN_FRAME
%INVISIBLE,0,%NEXTTOP+8,DWIDE,24
cmdMessageBoxYNR_Yes label tControl
 public cmdMessageBoxYNR_Yes
 MAKE_COMMANDBUTTON
%NORMSTATE,DWIDE/2-64-16-16,0,56,24
 CAPTION "Yes"
cmdMessageBoxYNR_No label tControl
 public cmdMessageBoxYNR_No
 MAKE_COMMANDBUTTON
%NORMSTATE,%NEXTLEFT+8,0,56,24
 CAPTION "No"
cmdMessageBoxYNR_Retry label tControl
 public cmdMessageBoxYNR_Retry
 MAKE_COMMANDBUTTON
%NORMSTATE,%NEXTLEFT+8,0,56,24
 CAPTION "Retry"
END_FRAME
frMessageBoxYesNo label tControl
 public frMessageBoxYesNo
BEGIN_FRAME
%INVISIBLE,0,%NEXTTOP+8,DWIDE,24
cmdMessageBoxYesNo_Yes label tControl
 public cmdMessageBoxYesNo_Yes
 MAKE_COMMANDBUTTON
%NORMSTATE,DWIDE/2-64-16-24,0,64+24,24
 CAPTION "Yes"
cmdMessageBoxYesNo_No label tControl
 public cmdMessageBoxYesNo_No
 MAKE_COMMANDBUTTON
%NORMSTATE,DWIDE/2+16-8,%SAMETOP,64+24,
24
 CAPTION "No"
END_FRAME
frMessageBoxRetryCancel label tControl
 public frMessageBoxRetryCancel
BEGIN_FRAME
%NORMSTATE,0,%NEXTTOP+8,DWIDE,24
cmdMessageBoxRetryCancel_Retry label tControl
 public cmdMessageBoxRetryCancel_Retry
 MAKE_COMMANDBUTTON
%NORMSTATE,DWIDE/2-64-16-24,0,64+24,24
 CAPTION "Retry"
cmdMessageBoxRetryCancel_Cancel label tControl
 public cmdMessageBoxRetryCancel_Cancel
 MAKE_COMMANDBUTTON
%NORMSTATE,DWIDE/2+16-8,%SAMETOP,64+24,
24
 CAPTION "Cancel"
END_FRAME
frmMessageBox_end label byte
 public frmMessageBox_end
END_FORM

END_FORM_DEFINITIONS
```

```
DATASEG_END

code

CopyMessageToMessageBox proc near

  push word ptr pFirstControl
  mov pFirstControl,offset frmMessageBox
  call GoFirstControl
smb5
  mov al,[si].ControlType
  call IsItLegend
  jnz smb4
  mov di,si
  call pointControlCaption
  or bx,bx
  jz smb4
sbm5a:
  push ds
  call ReadNextMessageLine
  jc smb6

  cmp al,2
  jbe sbm5b
  xor al,al
sbm5b
  add al,LEFTLEGEND
  mov es:[di].ControlType,al
  and es:[di].ControlState,not(INVISIBLE)
  mov ax,es:[di].TopPixel
  add ax,es:[di].PixelHeight
  mov es:wMessageBoxHeight,ax
  add bx,3
  mov di,bx
  mov cx,41

  rep movsb
  xor al,al
  stosb
  jmp smb7

smb6
  cmp es:wMessageContinuationDX,0
  jz sbm6a
  pop ds
  push es
  push di
  xor dx,dx
  xchg dx,wMessageContinuationDX
  xor si,si
  xchg si,wMessageContinuationSI
  push ax
  push bx
  call PrepareMessageForReading
  pop bx
  pop ax
  pop es
  pop di
  jmp sbm5a


sbm6a:
  or es:[di].ControlState,INVISIBLE

smb7:
  pop ds
smb4:
  call GoNextControl
  jnc smb5

  pop word ptr pFirstControl
  ret
CopyMessageToMessageBox endp

DrawMessageBox proc near
  public DrawMessageBox
  call CancelPenDown

  call UndoCurrentTabItem
  mov pFirstControl,offset frmMessageBox
  mov wPreviousFormHeight,0
  mov bFormColor,LT_CYAN
  call Repaint

  call GoFirstControl
dmb2
  cmp [si].ControlType,FRAME
  jnz dmb5
  test [si].ControlState,INVISIBLE
  jz dmb5

dmb6:
  call GoNextControl
  jc dmb3
  cmp [si].ControlType,ENDFRAME
  jnz dmb6
  jmp dmb4
dmb5:
  cmp [si].ControlType,COMMANDBUTTON
  jz dmb1
dmb4:
  call GoNextControl
  jnc dmb2
  jmp dmb3

dmb1:
  call FindRegionForControl
  mov si,bx
  call SetNewTabItemWork
dmb3:
  ret
DrawMessageBox endp

PointError proc near
  public PointError


  mov si,offset rErrorMess1Header
  inc ax
  jz se1
  mov si,offset rErrorMess2Header
  inc ax
  jz se1
  mov si,offset rErrorMess3Header
  inc ax
  jz se1
  mov si,offset rErrorMess4Header
se1
  mov dx,seg rErrorMess1Header
  ret
PointError endp

PrepareMessageBox proc near
  public PrepareMessageBox
  mov al,bModalFlag
  mov bModalFlagHold,al
  mov bModalFlag,0
  push pTabRegion
  pop pTabRegionHold

  push dx
  push si
  push bx
  call UndoCurrentTabItem
  mov pTabRegion,0
  pop bx
  pop si
  pop dx


  call SetMBXButtons
  call PrepareMessageForReading
  call CopyMessageToMessageBox
  mov ax,wMessageBoxHeight
  add ax,16
  mov bx,pMessageBoxButtonFrame
  or bx,bx
  jz smb8
  mov [bx].TopPixel,ax
  add ax,24+16
smb8
  mov frmMessageBox.PixelHeight,ax
  ret
PrepareMessageBox endp

PrepareMessageForReading proc near
  push ds
  pop es
  mov ds,di
  mov ax,[si].iStructLen
  mov es:iSMStrucLen,ax
  mov ax,[si].iBuffLen
  mov bx,word ptr [si].pBuffOff
  add ax,bx
  mov es:pSMBufferStart,bx
  mov es:pSMBufferEnd,ax
  mov ax,word ptr [si].pBuffOff[2]
  mov es:pSMBufferStart[2],ax
  push es
  pop ds
  ret
PrepareMessageForReading endp

ReadNextMessageLine proc near
  push ds
  pop es
  mov ax,pSMBufferStart
  cmp ax,pSMBufferEnd
  jb rnml1
  stc
  ret
rnml1
  mov ax,iSMStrucLen
  lds si,dword ptr pSMBufferStart
  add es:pSMBufferStart,ax
  mov al,[si].cAlignment
  lds si,dword ptr [si].pTextOff
  clc
  ret
ReadNextMessageLine endp

RemoveMessageBox proc near
  public RemoveMessageBox
  mov al,bModalFlagHold
  mov bModalFlag,al


  mov bMessageBoxID,0
  mov bDontChangeProtection,-1
  mov bx,offset frmMessageBox
  call DefineCoveredArea
  push wCoveredAreaTopHold
  pop wCoveredAreaTop
  mov bCoveredAreaOnly,-1
  mov pFirstControl,offset MainForm
  mov wPreviousFormHeight,480
  mov bFormColor,FORM_COLOR
  and wCurrentResource, not(256*128)
  cmp wCurrentResource,0
  jnz rmb1
  call BlackenScreen

  mov pTabRegion,0
  call freescreen
rmb1:

  call CheckScreenUpdateNeeded
  jnc rmb3
  call StopProtecting
rmb3:
  call Repaint
rmb2:
  call StopProtecting

  push pTabRegionHold
  pop si

  call SetNewTabItemWork
  ret
RemoveMessageBox endp

StopProtecting proc near
  public StopProtecting
  mov bDontChangeProtection,0
  mov wCoveredAreaTop,-1
  mov bCoveredAreaOnly,0
  ret
StopProtecting endp

ReportError proc near
  public ReportError
  call PointError
  mov bx,MBX_OK
  call PrepareMessageBox
  call DrawMessageBox
  ret
ReportError endp

ReportMessageClick proc near
  public ReportMessageClick
  mov al,bMessageBoxID
  push ax
  push bx
  cmp al,-1
  jnz rmc1
  mov bl,bMessageBoxResult
  xor bh,bh
  SM_FUNCTION
SM_REPORT_BUTTON_CLICKED
rmc1:
  pop bx
  pop ax
  cmp al,-1
  ret
ReportMessageClick endp

SetMBXButtons proc near

  push si
  push bx
  push word ptr pFirstControl
  mov pFirstControl,offset frmMessageBox

  call GoFirstControl
smb2:
  cmp [si].ControlType,FRAME
  jnz smb1
  or [si].ControlState,INVISIBLE
smb1:
  call GoNextControl
  jnc smb2
  pop word ptr pFirstControl
  pop bx
  pop si
  mov ax,bx
  or ax,ax
  jz smb100

  call JumpOnAX
  dw MBX_OK,offset smb_OK
  dw MBX_CANCEL,offset smb_CANCEL
  dw MBX_OKCANCEL,offset smb_OKCANCEL
  dw MBX_ABORTRETRYIGNORE,offset
smb_ABORTRETRYIGNORE
  dw MBX_YESNOCANCEL,offset
smb_YESNOCANCEL
  dw MBX_YESNORETRY,offset
smb_YESNORETRY
  dw MBX_YESNO,offset smb_YESNO
  dw MBX_RETRYCANCEL,offset
smb_RETRYCANCEL
  dw 0
  xor bx,bx
  jmp smb100

smb_OK:
  mov bx,offset fraMessageBoxOK
  jmp smb99

smb_CANCEL:
  mov bx,offset fraMessageBoxCancel
  jmp smb99

smb_OKCANCEL:
  mov bx,offset fraMessageBoxOKCancel
  jmp smb99

smb_ABORTRETRYIGNORE
  mov bx,offset fraMessageBoxARI
  jmp smb99

smb_YESNOCANCEL:
  mov bx,offset fraMessageBoxYNC
  jmp smb99

smb_YESNORETRY:
  mov bx,offset fraMessageBoxYNR
  jmp smb99

smb_YESNO
  mov bx,offset fraMessageBoxYesNo
  jmp smb99

smb_RETRYCANCEL:
  mov bx,offset fraMessageBoxRetryCancel
  jmp smb99


smb99
  and [bx].ControlState,not(INVISIBLE)

smb100:
  mov pMessageBoxButtonFrame,bx
  ret
SetMBXButtons endp

DoMessageBoxClick proc near
  public DoMessageBoxClick
  mov ax,si
  call JumpOnAX
  dw offset cmdMessageBoxOK_OK,offset
DoCmdMessageBoxOK
  dw offset cmdMessageBoxCancel_Cancel,offset
DoCmdMessageBoxCancel
  dw offset cmdMessageBoxOKCancel_OK,offset
DoCmdMessageBoxOK
  dw offset cmdMessageBoxOKCancel_Cancel,offset
DoCmdMessageBoxCancel
  dw offset cmdMessageBoxARI_Abort,offset
DoCmdMessageBoxAbort
  dw offset cmdMessageBoxARI_Retry,offset
DoCmdMessageBoxRetry
  dw offset cmdMessageBoxARI_Ignore,offset
DoCmdMessageBoxIgnore
  dw offset cmdMessageBoxYNC_Yes,offset
DoCmdMessageBoxYes
  dw offset cmdMessageBoxYNC_No,offset
DoCmdMessageBoxNo
  dw offset cmdMessageBoxYNC_Cancel,offset
DoCmdMessageBoxCancel
  dw offset cmdMessageBoxYNR_Yes,offset
DoCmdMessageBoxYes
  dw offset cmdMessageBoxYNR_No,offset
DoCmdMessageBoxNo
  dw offset cmdMessageBoxYNR_Retry,offset
DoCmdMessageBoxRetry
  dw offset cmdMessageBoxYesNo_Yes,offset
DoCmdMessageBoxYes
  dw offset cmdMessageBoxYesNo_No,offset
DoCmdMessageBoxNo
  dw offset
cmdMessageBoxRetryCancel_Retry,offset
DoCmdMessageBoxRetry
```

```
  dw offset
cmdMessageBoxRetryCancel_Cancel,offset
DoCmdMessageBoxCancel
  dw 0
DoCmdMessageBoxCancel:
  mov ah,MBB_CANCEL
  jmp dcmbc1
DoCmdMessageBoxAbort:
  mov ah,MBB_ABORT
  jmp dcmbc1
DoCmdMessageBoxRetry:
  mov ah,MBB_RETRY
  jmp dcmbc1
DoCmdMessageBoxIgnore:
  mov ah,MBB_IGNORE
  jmp dcmbc1
DoCmdMessageBoxYes:
  mov ah,MBB_YES
  jmp dcmbc1
DoCmdMessageBoxNo:
  mov ah,MBB_NO
  jmp dcmbc1
DoCmdMessageBoxOK:
  mov ah,MBB_OK
  jmp dcmbc1

dcmbc1:
  mov bMessageBoxResult,ah
  call ReportMessageClick
  jz dcmbc2
  call HandleMessageBoxClick
  ret

dcmbc2:
  call RemoveMessageBox
  ret
DoMessageBoxClick endp

END


Copr 1995 Zenith Data Systems Corp.

 model small
include uinclud.inc
DATASEG_BEGIN
extrn ControlDataStorageArea:byte

szErrorMess1 db "Function Not Supported",0
szErrorMess2 db "Internal Execution Error",0
szErrorMess3 db "Invalid Parameter Error",0
szErrorMess4 db "Unknown Error Code",0

ErrorMess1 label byte
 tMSGBOXBUFF <offset szErrorMess1,seg
szErrorMess1,MB_CENTERED>
MESSSIZE=$-ErrorMess1
rErrorMess1Header tBUFFHEADER <type
tMSGBOXBUFF,MESSSIZE,ErrorMess1>
  public rErrorMess1Header
ErrorMess2 label byte
 tMSGBOXBUFF <offset szErrorMess2,seg
szErrorMess2,MB_CENTERED>
MESSSIZE=$-ErrorMess2
rErrorMess2Header tBUFFHEADER <type
tMSGBOXBUFF,MESSSIZE,ErrorMess2>
  public rErrorMess2Header
ErrorMess3 label byte
 tMSGBOXBUFF <offset szErrorMess3,seg
szErrorMess3,MB_CENTERED>
MESSSIZE equ $-ErrorMess3
rErrorMess3Header tBUFFHEADER <type
tMSGBOXBUFF,MESSSIZE,ErrorMess3>
  public rErrorMess3Header
ErrorMess4 label byte
 tMSGBOXBUFF <offset szErrorMess4,seg
szErrorMess4,MB_CENTERED>
MESSSIZE equ $-ErrorMess4
rErrorMess4Header tBUFFHEADER <type
tMSGBOXBUFF,MESSSIZE,ErrorMess4>
  public rErrorMess4Header
szCalibrateULCMess1 label byte
 db "Touch the pen on the X in",0
szCalibrateULCMess2 label byte
 db "the upper left hand corner",0
szCalibrateULCMess3 label byte
 db "of the screen",0

CalibrateULC label byte
 tMSGBOXBUFF <offset szCalibrateULCMess1,seg
szCalibrateULCMess1,MB_CENTERED>
 tMSGBOXBUFF <offset szCalibrateULCMess2,seg
szCalibrateULCMess2,MB_CENTERED>
 tMSGBOXBUFF <offset szCalibrateULCMess3,seg
szCalibrateULCMess3,MB_CENTERED>
MESSSIZE1 equ $-CalibrateULC
rCalibrateULCHeader tBUFFHEADER <type
tMSGBOXBUFF,MESSSIZE1,CalibrateULC>
 public rCalibrateULCHeader
szCalibrateLRCMess1 label byte
 db "Touch the pen on the X in",0
szCalibrateLRCMess2 label byte
 db "the lower right hand corner",0
szCalibrateLRCMess3 label byte
 db "of the screen",0
CalibrateLRC label byte
 tMSGBOXBUFF <offset szCalibrateLRCMess1,seg
szCalibrateLRCMess1,MB_CENTERED>
 tMSGBOXBUFF <offset szCalibrateLRCMess2,seg
szCalibrateLRCMess2,MB_CENTERED>
 tMSGBOXBUFF <offset szCalibrateLRCMess3,seg
szCalibrateLRCMess3,MB_CENTERED>
MESSSIZE2 equ $-CalibrateLRC
rCalibrateLRCHeader tBUFFHEADER <type
tMSGBOXBUFF,MESSSIZE2,CalibrateLRC>
  public rCalibrateLRCHeader
szRebootMess1 label byte
 db "You are about to reboot",0
szRebootMess2 label byte
 db "your host machine ",0
szRebootMess3 label byte
 db "Remote rebooting could result",0
szRebootMess4 label byte
 db "in data loss on the host.",0
szRebootMess5 label byte
 db "Are you sure you want to continue?",0

RebootHost label byte
 tMSGBOXBUFF <offset szRebootMess1,seg
szRebootMess1,MB_CENTERED>
 tMSGBOXBUFF <offset szRebootMess2,seg
szRebootMess2,MB_CENTERED>
 tMSGBOXBUFF <offset szRebootMess3,seg
szRebootMess3,MB_CENTERED>
 tMSGBOXBUFF <offset szRebootMess4,seg
szRebootMess4,MB_CENTERED>
 tMSGBOXBUFF <offset szRebootMess5,seg
szRebootMess5,MB_CENTERED>
MESSSIZE3 equ $-RebootHost
rRebootHostHeader tBUFFHEADER <type
tMSGBOXBUFF,MESSSIZE3,RebootHost>
  public rRebootHostHeader

szUpgradeMess1 label byte
 db "You are about to upgrade",0
szUpgradeMess2 label byte
 db "your CruisePad.",0
szUpgradeMess3 label byte
 db "Interrupting this upgrade may cause",0
szUpgradeMess4 label byte
 db "problems that require a service call.",0
szUpgradeMess5 label byte
 db "Are you sure you want to continue?",0

Upgrade label byte
 tMSGBOXBUFF <offset szUpgradeMess1,seg
szUpgradeMess1,MB_CENTERED>
 tMSGBOXBUFF <offset szUpgradeMess2,seg
szUpgradeMess2,MB_CENTERED>
 tMSGBOXBUFF <offset szUpgradeMess3,seg
szUpgradeMess3,MB_CENTERED>
 tMSGBOXBUFF <offset szUpgradeMess4,seg
szUpgradeMess4,MB_CENTERED>
 tMSGBOXBUFF <offset szUpgradeMess5,seg
szUpgradeMess5,MB_CENTERED>
MESSSIZE4 equ $-Upgrade
rUpgradeHeader tBUFFHEADER <type
tMSGBOXBUFF,MESSSIZE4,Upgrade>
  public rUpgradeHeader
szUpgradeProgMess1 label byte
 db "Upgrading progress..."
szUpgradeProgressPercent db " 0% complete",0
 public szUpgradeProgressPercent
szUpgradeProgMess2 label byte
 db " ",0
szUpgradeProgMess3 label byte
 db "Interrupting this upgrade may cause",0
szUpgradeProgMess4 label byte
 db "problems that require a service call.",0


UpgradeProg label byte
 tMSGBOXBUFF <offset szUpgradeProgMess1,seg
szUpgradeProgMess1,MB_CENTERED>
 tMSGBOXBUFF <offset szUpgradeProgMess2,seg
szUpgradeProgMess2,MB_CENTERED>
 tMSGBOXBUFF <offset szUpgradeProgMess3,seg
szUpgradeProgMess3,MB_CENTERED>
 tMSGBOXBUFF <offset szUpgradeProgMess4,seg
szUpgradeProgMess4,MB_CENTERED>
MESSSIZE5 equ $-UpgradeProg

rUpgradeProgHeader tBUFFHEADER <type
tMSGBOXBUFF,MESSSIZE5,UpgradeProg>
  public rUpgradeProgHeader
szUpgradeCompMess1 label byte
 db "Upgrade Complete"
szUpgradeCompMess2 label byte
 db " ",0
szUpgradeCompMess3 label byte
 db "Rebooting CruisePad...",0
szUpgradeCompMess4 label byte
 db " ",0

UpgradeComp label byte
 tMSGBOXBUFF <offset szUpgradeCompMess1,seg
szUpgradeCompMess1,MB_CENTERED>
 tMSGBOXBUFF <offset szUpgradeCompMess2,seg
szUpgradeCompMess2,MB_CENTERED>
 tMSGBOXBUFF <offset szUpgradeCompMess3,seg
szUpgradeCompMess3,MB_CENTERED>
 tMSGBOXBUFF <offset szUpgradeCompMess4,seg
szUpgradeCompMess4,MB_CENTERED>,
MESSSIZE6 equ $-UpgradeComp

rUpgradeCompHeader tBUFFHEADER <type
tMSGBOXBUFF,MESSSIZE6,UpgradeCom>
  public rUpgradeCompHeader
szUpgradeNAMess1 label byte
 db "No flash upgrade is available",0
szUpgradeNAMess2 label byte
 db "on the currently active",0
szUpgradeNAMess3 label byte
 db "Host connection.",0

UpgradeNA label byte
 tMSGBOXBUFF <offset szUpgradeNAMess1,seg
szUpgradeNAMess1,MB_CENTERED>
 tMSGBOXBUFF <offset szUpgradeNAMess2,seg
szUpgradeNAMess2,MB_CENTERED>
 tMSGBOXBUFF <offset szUpgradeNAMess3,seg
szUpgradeNAMess3,MB_CENTERED>
MESSSIZE7 equ $-UpgradeNA

rUpgradeNAHeader tBUFFHEADER <type
tMSGBOXBUFF,MESSSIZE7,UpgradeNA>
  public rUpgradeNAHeader
pszProgressTable label word
 public pszProgressTable
 dw offset szCallConnected
 dw offset szCallDialing
 dw offset szCallWaiting
 dw offset szCallLogging
 dw offset szCallDisconnected
 dw offset szCallInvalidHost
 dw offset szCallInvalidPW
 dw offset szCallTimeout
 dw offset szCallBusy
 dw offset szCallNoCarrier
 dw offset szCallNoDialTone
 dw offset szCallWaitingRedial
pszProgressTable_End label word
 public pszProgressTable_End


szCallConnected     db   "Connected",0
szCallDialing       db   "Dialing",0
szCallWaiting       db   "Waiting",0
szCallLogging       db   "Logging In",0
szCallDisconnected  db   "Disconnected",0
szCallInvalidHost   db   "Invalid Host",0
szCallInvalidPW     db   "Invalid Password",0
szCallTimeout       db   "Connection Timeout",0
szCallBusy          db   "Busy",0
szCallNoCarrier     db   "No Carrier",0
szCallNoDialTone    db   "No Dial Tone",0
szCallWaitingRedial db   "Waiting for Redial",0
szInvalidProgress   db 0
  public szInvalidProgress
szCallProgressMess1 label byte
 db "Call progress..."
szCallProgressFill label byte
 public szCallProgressFill
 db PROGRESS_MAXLEN+1 dup(0)
CallProgress label byte
 tMSGBOXBUFF <offset szCallProgressMess1,seg
szCallProgressMess1,MB_CENTERED>
 MESSSIZE8 equ $-CallProgress
rCallProgressHeader tBUFFHEADER <type
tMSGBOXBUFF,MESSSIZE8,CallProgress>
  public rCallProgressHeader
szCalibrationXString db CALIBRATION_X,0
 public szCalibrationXString

szSerial db "Serial",0
 public szSerial
DATASEG_END

end


Copr. 1995 Zenith Data Systems Corp.

.model small
include uinclud.inc
TEXTMODEPGUP equ "Pg",24
TEXTMODEPGDN equ "Pg",25
KH= H100
DATASEG_BEGIN
extrn ControlDataStorageArea:byte
BEGIN_FORM_DEFINITIONS
osk label tcontrol
  public OSK
  CURRENTFORM=$
  NEXTCONTROL=RES_OSK_FULL
  CONTROL FORM,%(INVISIBLE or
MOVEABLE),0,4*16,486,0,160

cmdOSKAbout label tControl
  public cmdOSKAbout
  MAKE_SYMBOLBUTTON
%Normstate+Skiptab,0,0,24,KH
  ABOUTFACE equ "T",1,"T"
  GRAPHIC_CAPTION SMALL_KEYBOARD_ICON

  TEXTMODE_CAPTION aboutface

lblOSKSmallCruzer label tControl
  public lblOSKSmallCruzer
  MAKE_LEFTLEGEND
%NORMSTATE,%NEXTLEFT,%SAMETOP+6
  GRAPHIC_CAPTION SMALL_CRUZER
  TEXTMODE_CAPTION " CruisePAD"


cmdOSKFullKeyboard label tControl
 public cmdOSKFullKeyboard
MAKE_SYMBOLBUTTON
%GRAYED+ISDOWN+SKIPTAB+COMPENSATE,%
FROMRIGHT or
118,0,24,KH
  GRAPHIC_CAPTION FULL_KEYBOARD_ICON
  TEXTMODE_CAPTION "FT"
cmdOSKAlphaKeyboard label tControl
 public cmdOSKAlphaKeyboard
  MAKE_SYMBOLBUTTON
%NORMSTATE+SKIPTAB,NEXTLEFT,0,24,KH
  GRAPHIC_CAPTION SMALL_KEYBOARD_ICON
  TEXTMODE_CAPTION "AT"

cmdOSKNumKeyboard label tControl
  public cmdOSKNumKeyboard
  MAKE_SYMBOLBUTTON
%NORMSTATE+SKIPTAB,NEXTLEFT,0,24,KH
  GRAPHIC_CAPTION NUM_KEYBOARD_ICON
  TEXTMODE_CAPTION "NT"

cmdOSKReduce label tControl
  public cmdOSKReduce
  MAKE_SYMBOLBUTTON
%INVISIBLE+SKIPTAB,NEXTLEFT,0,24,KH
  GRAPHIC_CAPTION
REDUCE_KEYBOARD_ICON
  REDUCEICON equ "T",19,"T"
  TEXTMODE_CAPTION REDUCEICON


cmdOSKEnlarge label tControl
  public cmdOSKEnlarge
  MAKE_SYMBOLBUTTON
%NORMSTATE+SKIPTAB,NEXTLEFT,0,24,KH
  GRAPHIC_CAPTION
ENLARGE_KEYBOARD_ICON
  TEXTMODE_CAPTION REDUCEICON


  NEXTCONTROL=0
  MAKE_CLOSEBUTTON
%NORMSTATE+SKIPTAB,NEXTLEFT,0,24,KH
  GRAPHIC_CAPTION KEYBOARD_EXIT_ICON
  TEXTMODE_CAPTION "XT"
lblOSKChiselLine label tControl
  public lblOSKChiselLine
  MAKE_CHISELBOX %NORMSTATE
,0,%NEXTTOP,480-0,1


  BEGIN_FRAME
%NORMSTATE,0,%NEXTTOP,0,H50
  END_FRAME


  BEGIN_FRAME
%NORMSTATE,0,%NEXTFRAMETOP,0,0
  END_FRAME

  BEGIN_FRAME
%NORMSTATE,0,%SAMEFRAMETOP,8,0
  END_FRAME
frmAlphaKeyboard label tControl
  public frmAlphaKeyboard
  BEGIN_FRAME %NORMSTATE or
```

```
widen,%NEXTFRAMELEFT,%SAMEFRAMETOP,38,
100*6

oskfirstrow label tCONTROL
   public oskfirstrow
   MAKE_KEYBUTTON %NORMSTATE or WIDEN
or COMPENSATE,0,0,24,KH
   GRAPHIC_CAPTION ESC_KEY
   TEXTMODE_CAPTION "Esc"
   DEFINE_KEY 1,27,27,27,255


   MAKE_KEYBUTTON
%NORMSTATE,%NEXTLEFT+8,%SAMETOP,24,KH

   GRAPHIC_CAPTION F1_KEY
   TEXTMODE_CAPTION "F1"
   DEFINE_KEY 59,59,84,84,104


   MAKE_KEYBUTTON
%NORMSTATE,%NEXTLEFT,%SAMETOP,24,KH
   GRAPHIC_CAPTION F2_KEY
   TEXTMODE_CAPTION "F2"
   DEFINE_KEY 60,60,85,85,105

   MAKE_KEYBUTTON
%NORMSTATE,%NEXTLEFT,%SAMETOP,24,KH
   GRAPHIC_CAPTION F3_KEY
   TEXTMODE_CAPTION "F3"
   DEFINE_KEY 61,61,86,86,106

   MAKE_KEYBUTTON
%NORMSTATE,%NEXTLEFT,%SAMETOP,24,KH
   GRAPHIC_CAPTION F4_KEY
   TEXTMODE_CAPTION "F4"
   DEFINE_KEY 62,62,87,87,107

   MAKE_KEYBUTTON
%NORMSTATE,%NEXTLEFT+8,%SAMETOP,24,KH

   GRAPHIC_CAPTION F5_KEY
   TEXTMODE_CAPTION "F5"
   DEFINE_KEY 63,63,88,98,108

   MAKE_KEYBUTTON
%NORMSTATE,%NEXTLEFT,%SAMETOP,24,KH
   GRAPHIC_CAPTION F6_KEY
   TEXTMODE_CAPTION "F6"
   DEFINE_KEY 64,64,89,99,109

   MAKE_KEYBUTTON
%NORMSTATE,%NEXTLEFT,%SAMETOP,24,KH
   GRAPHIC_CAPTION F7_KEY
   TEXTMODE_CAPTION "F7"
   DEFINE_KEY 65,65,90,100,110

   MAKE_KEYBUTTON
%NORMSTATE,%NEXTLEFT,%SAMETOP,24,KH
   GRAPHIC_CAPTION F8_KEY
   TEXTMODE_CAPTION "F8"
   DEFINE_KEY 66,66,91,101,111

   MAKE_KEYBUTTON
%NORMSTATE,%NEXTLEFT+8,%SAMETOP,24,KH

   GRAPHIC_CAPTION F9_KEY
   TEXTMODE_CAPTION "F9"
   DEFINE_KEY 67,67,92,102,112

   MAKE_KEYBUTTON %NORMSTATE or
WIDEN,%NEXTLEFT,%SAMETOP,24,KH
   GRAPHIC_CAPTION F10_KEY
   TEXTMODE_CAPTION "F10"
   DEFINE_KEY 68,68,93,103,113

   MAKE_KEYBUTTON %NORMSTATE or
WIDEN,%NEXTLEFT,%SAMETOP,24,KH
   GRAPHIC_CAPTION F11_KEY
   TEXTMODE_CAPTION "F11"
   DEFINE_KEY 57h,133,135,137,139

   MAKE_KEYBUTTON %NORMSTATE or
WIDEN,%NEXTLEFT,%SAMETOP,24,KH
   GRAPHIC_CAPTION F12_KEY
   TEXTMODE_CAPTION "F12"
   DEFINE_KEY 58h,134,136,138,140

oskseconrow label tCONTROL
   public oskseconrow
   MAKE_KEYBUTTON %NORMSTATE or WIDEN
or
COMPENSATE,0,%NEXTTOP50,24,KH
   DEFINE_KEY 41,96,126,255,255

   MAKE_KEYBUTTON
%NORMSTATE,%NEXTLEFT,%SAMETOP,24,KH
   DEFINE_KEY 2,49,33,255,120

   MAKE_KEYBUTTON
%NORMSTATE,%NEXTLEFT,%SAMETOP,24,KH
   DEFINE_KEY 3,50,64,3,121

   MAKE_KEYBUTTON
%NORMSTATE,%NEXTLEFT,%SAMETOP,24,KH
   DEFINE_KEY 4,51,35,255,122

   MAKE_KEYBUTTON
%NORMSTATE,%NEXTLEFT,%SAMETOP,24,KH
   DEFINE_KEY 5,52,36,255,123

   MAKE_KEYBUTTON
%NORMSTATE,%NEXTLEFT,%SAMETOP,24,KH
   DEFINE_KEY 6,53,37,255,124

   MAKE_KEYBUTTON
%NORMSTATE,%NEXTLEFT,%SAMETOP,24,KH
   DEFINE_KEY 7,54,94,30,125

   MAKE_KEYBUTTON
%NORMSTATE,%NEXTLEFT,%SAMETOP,24,KH
   DEFINE_KEY 8,55,38,255,126

   MAKE_KEYBUTTON
%NORMSTATE,%NEXTLEFT,%SAMETOP,24,KH
   DEFINE_KEY 9,56,42,255,127

   MAKE_KEYBUTTON
%NORMSTATE,%NEXTLEFT,%SAMETOP,24,KH
   DEFINE_KEY 10,57,40,255,128

   MAKE_KEYBUTTON
%NORMSTATE,%NEXTLEFT,%SAMETOP,24,KH
   DEFINE_KEY 11,48,41,255,129

   MAKE_KEYBUTTON
%NORMSTATE,%NEXTLEFT,%SAMETOP,24,KH
   DEFINE_KEY 12,45,95,31,130

   MAKE_KEYBUTTON
%NORMSTATE,%NEXTLEFT,%SAMETOP,24,KH
   DEFINE_KEY 13,61,43,255,131

   MAKE_KEYBUTTON %NORMSTATE
,%NEXTLEFT,%SAMETOP,-1,KH
   GRAPHIC_CAPTION BS_KEY
   DEFINE_KEY 14,8, 8,127,255
   BACKSPACECAPTION equ 32,17,196,196
   TEXTMODE_CAPTION BACKSPACECAPTION
   SETWIDTHS 40,56,48,48

   MAKE_KEYBUTTON %NORMSTATE or WIDEN
or
COMPENSATE,0,%NEXTTOP,32,KH
   GRAPHIC_CAPTION TAB_KEY
   TEXTMODE_CAPTION " Tab"
   DEFINE_KEY 15,9,15,255,255

   MAKE_KEYBUTTON
%NORMSTATE,%NEXTLEFT,%SAMETOP,24,KH
   DEFINE_KEY 16,113,81,17,16

   MAKE_KEYBUTTON
%NORMSTATE,%NEXTLEFT,%SAMETOP,24,KH
   DEFINE_KEY 17,119,87,23,17

   MAKE_KEYBUTTON
%NORMSTATE,%NEXTLEFT,%SAMETOP,24,KH
   DEFINE_KEY 18,101,69, 5,18

   MAKE_KEYBUTTON
%NORMSTATE,%NEXTLEFT,%SAMETOP,24,KH
   DEFINE_KEY 19,114,82,18,19

   MAKE_KEYBUTTON
%NORMSTATE,%NEXTLEFT,%SAMETOP,24,KH
   DEFINE_KEY 20,116,84,20,20

   MAKE_KEYBUTTON
%NORMSTATE,%NEXTLEFT,%SAMETOP,24,KH
   DEFINE_KEY 21,121,89,25,21

   MAKE_KEYBUTTON
%NORMSTATE,%NEXTLEFT,%SAMETOP,24,KH
   DEFINE_KEY 22,117,85,21,22

   MAKE_KEYBUTTON
%NORMSTATE,%NEXTLEFT,%SAMETOP,24,KH
   DEFINE_KEY 23,105,73, 9,23

   MAKE_KEYBUTTON
%NORMSTATE,%NEXTLEFT,%SAMETOP,24,KH
   DEFINE_KEY 24,111,79,15,24

   MAKE_KEYBUTTON
%NORMSTATE,%NEXTLEFT,%SAMETOP,24,KH
   DEFINE_KEY 25,112,80,16,25

   MAKE_KEYBUTTON
%NORMSTATE,%NEXTLEFT,%SAMETOP,24,KH
   GRAPHIC_CAPTION LEFT_BRAKET_KEY
   TEXTMODE_CAPTION " ["
   DEFINE_KEY 26,91,123,27,255

   MAKE_KEYBUTTON
%NORMSTATE,%NEXTLEFT,%SAMETOP,24,KH
   GRAPHIC_CAPTION RIGHT_BRAKET_KEY
   TEXTMODE_CAPTION " ]"

   DEFINE_KEY 27,93,125,29,255

   MAKE_KEYBUTTON %NORMSTATE
,%NEXTLEFT,%SAMETOP,-1,KH
   DEFINE_KEY 43,92,124,28,255
   SETWIDTHS 32,40,40,32

OSKCapsLock label TControl
   public OSKCapslock

   MAKE_CAPSLOCKBUTTON %NORMSTATE or
WIDEN or
COMPENSATE,0,%NEXTTOP,40,KH
   GRAPHIC_CAPTION CAPS_KEY
   TEXTMODE_CAPTION " Caps"
   DEFINE_KEY 58,255,255,255,255

   MAKE_KEYBUTTON
%NORMSTATE,%NEXTLEFT,%SAMETOP,24,KH
   DEFINE_KEY 30,97,65, 1,30

   MAKE_KEYBUTTON
%NORMSTATE,%NEXTLEFT,%SAMETOP,24,KH
   DEFINE_KEY 31,115,83,19,31

   MAKE_KEYBUTTON
%NORMSTATE,%NEXTLEFT,%SAMETOP,24,KH
   DEFINE_KEY 32,100,68, 4,32

   MAKE_KEYBUTTON
%NORMSTATE,%NEXTLEFT,%SAMETOP,24,KH
   DEFINE_KEY 33,102,70, 6,33

   MAKE_KEYBUTTON
%NORMSTATE,%NEXTLEFT,%SAMETOP,24,KH
   DEFINE_KEY 34,103,71, 7,34

   MAKE_KEYBUTTON
%NORMSTATE,%NEXTLEFT,%SAMETOP,24,KH
   DEFINE_KEY 35,104,72, 8,35

   MAKE_KEYBUTTON
%NORMSTATE,%NEXTLEFT,%SAMETOP,24,KH
   DEFINE_KEY 36,106,74,10,36

   MAKE_KEYBUTTON
%NORMSTATE,%NEXTLEFT,%SAMETOP,24,KH
   DEFINE_KEY 37,107,75,11,37

   MAKE_KEYBUTTON
%NORMSTATE,%NEXTLEFT,%SAMETOP,24,KH
   DEFINE_KEY 38,108,76,12,38

   MAKE_KEYBUTTON
%NORMSTATE,%NEXTLEFT,%SAMETOP,24,KH
   DEFINE_KEY 39,59,58,255,255

   MAKE_KEYBUTTON
%NORMSTATE,%NEXTLEFT,%SAMETOP,24,KH
   DEFINE_KEY 40,39,34,255,255

   MAKE_KEYBUTTON %NORMSTATE
,%NEXTLEFT,%SAMETOP,-1,KH
   GRAPHIC_CAPTION ENTER_KEY
   ENTERKEYCAPTION equ
32,17,196,217,32,32,32
   TEXTMODE_CAPTION ENTERKEYCAPTION
   DEFINE_KEY 28,13,13,10,255
   SETWIDTHS 48,64,56,56

   MAKE_LSHIFTKEYBUTTON %NORMSTATE or
WIDEN or
COMPENSATE,0,%NEXTTOP,56,KH
   GRAPHIC_CAPTION SHIFT_KEY
   TEXTMODE_CAPTION " Shift  "
   DEFINE_KEY 42,255,255,255,255

   MAKE_KEYBUTTON
%NORMSTATE,%NEXTLEFT,%SAMETOP,24,KH
   DEFINE_KEY 44,122,90,26,44

   MAKE_KEYBUTTON
%NORMSTATE,%NEXTLEFT,%SAMETOP,24,KH
   DEFINE_KEY 45,120,88,24,45

   MAKE_KEYBUTTON
%NORMSTATE,%NEXTLEFT,%SAMETOP,24,KH
   DEFINE_KEY 46,99,67, 3,46

   MAKE_KEYBUTTON
%NORMSTATE,%NEXTLEFT,%SAMETOP,24,KH
   DEFINE_KEY 47,118,86,22,47

   MAKE_KEYBUTTON
%NORMSTATE,%NEXTLEFT,%SAMETOP,24,KH
   DEFINE_KEY 48,98,66, 2,48

   MAKE_KEYBUTTON
%NORMSTATE,%NEXTLEFT,%SAMETOP,24,KH
   DEFINE_KEY 49,110,78,14,49

   MAKE_KEYBUTTON
%NORMSTATE,%NEXTLEFT,%SAMETOP,24,KH
   DEFINE_KEY 50,109,77,13,50

   MAKE_KEYBUTTON
%NORMSTATE,%NEXTLEFT,%SAMETOP,24,KH
   DEFINE_KEY 51,44,60,255,255

   MAKE_KEYBUTTON
%NORMSTATE,%NEXTLEFT,%SAMETOP,24,KH
   DEFINE_KEY 52,46,62,255,255

   MAKE_KEYBUTTON
%NORMSTATE,%NEXTLEFT,%SAMETOP,24,KH
   DEFINE_KEY 53,47,63,255,255

   MAKE_RSHIFTKEYBUTTON %NORMSTATE
,%NEXTLEFT,%SAMETOP,-1,KH
   GRAPHIC_CAPTION SHIFT_KEY
   TEXTMODE_CAPTION " Shift  "
   DEFINE_KEY 54,255,255,255,255
   SETWIDTHS 56,72,64,64

ctrlkey1 label tcontrol
   public ctrlkey1
   MAKE_CTRLKEYBUTTON %NORMSTATE or
WIDEN or
COMPENSATE,0,%NEXTTOP,32,KH
   GRAPHIC_CAPTION CTRL_KEY
   TEXTMODE_CAPTION " Ctl"
   DEFINE_KEY 29,255,255,255,255

altkey1 label tcontrol
   public altkey1
   MAKE_ALTKEYBUTTON
%NORMSTATE,%NEXTLEFT+32,%SAMETOP,32,K
H
   GRAPHIC_CAPTION ALT_KEY
   DEFINE_KEY 56,255,255,255,255
   TEXTMODE_CAPTION "Alt  "

   MAKE_KEYBUTTON
%NORMSTATE,%NEXTLEFT,%SAMETOP,7*24,KH
   DEFINE_KEY 57,32,32,32,32

altkey2 label tcontrol
   public altkey2
   MAKE_ALTKEYBUTTON
%NORMSTATE,%NEXTLEFT,%SAMETOP,32,KH
   GRAPHIC_CAPTION ALT_KEY
   TEXTMODE_CAPTION "Alt  "
   DEFINE_KEY 0E0h*256+56,255,255,255,255

ctrlkey2 label tcontrol
   public ctrlkey2
   MAKE_CTRLKEYBUTTON %NORMSTATE
,%NEXTLEFT+24,%SAMETOP,-1,KH
   GRAPHIC_CAPTION CTRL_KEY
   TEXTMODE_CAPTION "Ctl"
   DEFINE_KEY 0E0h*256+29,255,255,255,255
   SETWIDTHS 32,48,40,40

   END_FRAME


tnoNumericKeyboard label tControl
   public tnoNumericKeyboard
   BEGIN_FRAME %NORMSTATE or
compensate,%NEXTFRAMELEFT,%SAMEFRAMET
OP,88,%H100*6

   MAKE_KEYBUTTON %NORMSTATE or
WIDEN,0,0,24,KH
   GRAPHIC_CAPTION PRT_KEY
   TEXTMODE_CAPTION "Prt"
   DEFINE_KEY 0E036h,255,255,255,255

OSKScrollLock label TControl
   public OSKScrollLock

   MAKE_SCROLLLOCKBUTTON %NORMSTATE
or
WIDEN,%NEXTLEFT,%SAMETOP,24,KH
   GRAPHIC_CAPTION SLK_KEY
   TEXTMODE_CAPTION "SLK"
   DEFINE_KEY 046h,255,255,255,255
```

```
    MAKE_KEYBUTTON %NORMSTATE or
WIDEN,%NEXTLEFT,%SAMETOP,24,KH
    GRAPHIC_CAPTION PSE_KEY
    TEXTMODE_CAPTION "Pse"
    DEFINE_KEY 0E046h,255,255,255,255


    MAKE_KEYBUTTON %NORMSTATE or
WIDEN,%NEXTLEFT,%SAMETOP,24,KH
    GRAPHIC_CAPTION SYSREQ_KEY
    TEXTMODE_CAPTION "Sys"
    DEFINE_KEY 105,255,255,255,255

OSKNumLock label TControl
    public OSKNumLock

    MAKE_NUMLOCKBUTTON %NORMSTATE or
WIDEN,0,%NEXTTOP50,24,KH
    GRAPHIC_CAPTION NLK_KEY
    TEXTMODE_CAPTION "NLK"
    DEFINE_KEY 045h,255,255,255,255

    MAKE_KEYBUTTON %NORMSTATE or
WIDEN,%NEXTLEFT,%SAMETOP,24,KH
    DEFINE_KEY 0E035h,47,47,255,255

    MAKE_KEYBUTTON %NORMSTATE or
WIDEN %NEXTLEFT,%SAMETOP,24,KH
    DEFINE_KEY 37h,42,42,255,255

    MAKE_KEYBUTTON %NORMSTATE or
WIDEN,%NEXTLEFT,%SAMETOP,24,KH
    DEFINE_KEY 4Ah,45,45,255,255

    MAKE_KEYBUTTON %NORMSTATE or
WIDEN,0,%NEXTTOP,24,KH
    GRAPHIC_CAPTION HM_KEY
    TEXTMODE_CAPTION "Hm"
    DEFINE_KEY 71,71,55,77h,255

    MAKE_KEYBUTTON %NORMSTATE or
WIDEN,%NEXTLEFT,%SAMETOP,24,KH
    GRAPHIC_CAPTION UA_KEY
    UACAPTION equ " ",24
    TEXTMODE_CAPTION UACAPTION
    DEFINE_KEY 72,72,56,255,255

    MAKE_KEYBUTTON %NORMSTATE or
WIDEN,%NEXTLEFT,%SAMETOP,24,KH
    GRAPHIC_CAPTION PGUP_KEY
    TEXTMODE_CAPTION TEXTMODEPGUP
    DEFINE_KEY 73,73,57,84h,255

  MAKE_KEYBUTTON %NORMSTATE or
WIDEN,%NEXTLEFT,%SAMETOP,24,KH*2
    DEFINE_KEY 4eh,43,43,255,255
    GRAPHIC_CAPTION PLUS_KEY
    PLUSCAPTION equ 32,43,32,222,13,32,32,32
    TEXTMODE_CAPTION PLUSCAPTION

    MAKE_KEYBUTTON %NORMSTATE or
WIDEN,0,%NEXTTOP or
PRIORFLAG,24,KH
    GRAPHIC_CAPTION LA_KEY
    LACAPTION equ " ",27
    TEXTMODE_CAPTION LACAPTION
    DEFINE_KEY 75,75,52,73h,255

    MAKE_KEYBUTTON %NORMSTATE or
WIDEN,%NEXTLEFT,%SAMETOP,24,KH
    GRAPHIC_CAPTION GRAPHIC_SPACER
    TEXTMODE_CAPTION " "

    DEFINE_KEY 76,76,53,255,255

  MAKE_KEYBUTTON %NORMSTATE or
WIDEN,%NEXTLEFT,%SAMETOP,24,KH
    GRAPHIC_CAPTION RA_KEY
    RACAPTION equ " ",26
    TEXTMODE_CAPTION RACAPTION
    DEFINE_KEY 77,77,54,74h,255

    MAKE_KEYBUTTON %NORMSTATE or
WIDEN,0,%NEXTTOP,24,KH
    GRAPHIC_CAPTION END_KEY
    TEXTMODE_CAPTION "End"
    DEFINE_KEY 79,79,49,75h,255

    MAKE_KEYBUTTON %NORMSTATE or
WIDEN,%NEXTLEFT,%SAMETOP,24,KH
    GRAPHIC_CAPTION DA_KEY
    DACAPTION equ " ",25
    TEXTMODE_CAPTION DACAPTION
    DEFINE_KEY 80,80,50,255,255

    MAKE_KEYBUTTON %NORMSTATE or
WIDEN,%NEXTLEFT,%SAMETOP,24,KH
    GRAPHIC_CAPTION PGDN_KEY
    TEXTMODE_CAPTION TEXTMODEPGDN
    DEFINE_KEY 81,81,51,76h,255


 MAKE_KEYBUTTON %NORMSTATE or
WIDEN,%NEXTLEFT,%SAMETOP,24,H200
    GRAPHIC_CAPTION ENT_KEY
    ENTCAPTION equ 69,110,116,222,13,32,32,32
    TEXTMODE_CAPTION ENTCAPTION

    DEFINE_KEY 0e01ch,13,13,10,255


    MAKE_KEYBUTTON
%NORMSTATE,0,%NEXTTOP or
PRIORFLAG,-1,KH
    GRAPHIC_CAPTION INS_KEY
    TEXTMODE_CAPTION "Ins   "
    DEFINE_KEY 82,82,48,255,255
    SETWIDTHS 48,64,64,64

    MAKE_KEYBUTTON %NORMSTATE or
WIDEN,%NEXTLEFT,%SAMETOP,24,KH
    GRAPHIC_CAPTION DEL_KEY
    TEXTMODE_CAPTION "Del"
    DEFINE_KEY 83,83,46,255,255


    END_FRAME

    END_FORM
 END_FORM_DEFINITIONS

 DATASEG_END

 end



 Copr 1995 Zenith Data Systems Corp

 .MODEL SMALL
 .code
 extrn AdjustButtonDimensions:near
 extrn Ascii2Bin:near
 extrn CheckIfCovered:near
 extrn DefineCoveredArea:near
 extrn DoPenUpEvent:near
 extrn Draw4Color:near
 extrn DrawString:near
 extrn DrawUpButton:near
 extrn FillScreenArea:near
 extrn GetTabControlType:near
 extrn GeFirstControl:near
 extrn GoNextControl:near
 extrn GoNextControl:near
 extrn Repaint:near
 extrn RepaintWork:near
 extrn ResetVGAState:near
 extrn SetCaptionPointers:near
 extrn SetFormHeights:near
 extrn SetNewTabItemWork1:near
 extrn SetNewTabItemWork:near
 extrn SetProtectionForControl:near
 extrn SetTypeMatic:near
 extrn UndoButtonDown:near
 extrn UndoCurrentTabItem:near
 extrn freescreen:near
 extrn reconfigureosk:near
 extrn usenormalcolors:near
 extrn repaintindividualcontrol:near

 include wimstud.inc


 DATASEG_BEGIN
 extrn bReportOSKDimensions:byte
 extrn bNextOSKConfiguration:byte
 extrn cmdHotKeys:tCONTROL
 extrn frmNumericKeyboard:tCONTROL
 extrn rCursorRegion:tREGION
 extrn cmdOSKFullKeyboard:tCONTROL
 extrn cmdOSKReduce:tCONTROL
 extrn cmdOSKEnlarge:tCONTROL
 extrn cmdOSKFullKeyboad:tCONTROL
 extrn frmOSKAlphaKeyboad:tCONTROL
 extrn frmOSKNumericKeyboad:tCONTROL
 extrn lblOSKSmallCruzer:tCONTROL
 extrn lblOSKChisetLine:tCONTROL
 extrn cmdOSKAbout:tCONTROL
 extrn cmdOSKNumKeyboard:tCONTROL
 extrn cmdOSKAlphaKeyboard:tCONTROL
 extrn frmAlphaKeyboard:tCONTROL
 extrn ControlDataStorageArea:byte
 extrn OSK:tControl

 extrn OSKCapsLock:tControl
 extrn OSKNumLock:tControl
 extrn OSKScrollLock:tControl

extrn AboutIcon:byte
extrn SmallAboutIcon:byte
extrn bCoveredAreaOnly:byte
extrn bDeskTopColor:byte
extrn bDontChangeProtection:byte
extrn bKeyChanged:byte
extrn bModulFlag:byte
extrn bNoDimensionUpdate:byte
extrn bPopUpRequired:byte
extrn bRepaintMode:byte
extrn bRepaintNeeded:byte
extrn bScreenMode:byte
extrn bShadowColor:byte
extrn pCurrentFont:word
extrn pCurrentToolBarButton:word
extrn pFirstControl:word
extrn pGraphicFont:word
extrn pNextActiveRegion:word
extrn pOSKFirstRegion:word
extrn pPenDownActiveRegion:word
extrn pTabRegion:word
extrn rActiveRegions:tRegion
extrn rREGION:tREGION
extrn rTabRegion:tREGION
extrn wIdentId:word
extrn wCoveredAreaLeft:word
extrn wCoveredAreaTop:word
extrn wCoveredAreaTopHold:word
extrn wCurrentResource:word
extrn wCurrentResource:word
extrn wFormWidth:word
extrn wKeyPressed:word
extrn wHotKeyRightPixel:word
extrn ctrlkey1:tCONTROL
extrn ctrlkey2:tCONTROL
extrn altkey1:tCONTROL
extrn altkey2:tCONTROL



bDontCenterOSK db 0
  public bDontCenterOSK

bIgnoreOSKShow db 0

ScanCodePasser label tSCANCODES
  public ScanCodePasser
        dw 400 dup(0)
SCANCODESIZE equ $-ScanCodePasser

ScanCodeHeader tBUFFHEADER <type
tSCANCODES,SCANCODESIZE,ScanCodePasser>
  public ScanCodeHeader

bResetHotKeyDataLength db 0

 public bResetHotKeyDataLength
bKeyboardCode db 0
 public bKeyboardCode

bKeyStatePrev dw 0

bOSKLastState db 0
 public bOSKLastState

bReleaseShift db 0
  public bReleaseShift

bKeyState db 0,0
  public bKeyState

bAltNumberCount db 0
  public bAltNumberCount

bAltNumberAccum db 0,0,0,0

bDontShowOSK db 0
  public bDontShowOSK

bEnlargeFlag db 0,0
  public bEnlargeFlag


wKeyWidth dw 0
  public wKeyWidth

bCaptionLetter  db " ",0,0
  public bCaptionLetter

bDummyCaption db 0,80 dup(0)
  public bDummyCaption

bBigCruzerWork db BIG_CRUZER,0
bSmallCruzerWork db SMALL_CRUZER,0
bKeyDownType db 0
DATASEG_END
 code

ShowOSKForClick proc near
  public ShowOSKForClick



  cmp bNextOSKConfiguration,0
  jz ssfc1
  push ax
  mov al,bNextOSKConfiguration
  and al,111b
  xor ah,ah
  mov bIgnoreOSKShow,-1
  call ReconfigureOSK
  mov bIgnoreOSKShow,0
  pop ax

ssfc1:
  cmp bDontShowOSK,0
  jnz dce4d

  cmp al,PWEDITBOX
  jz eeff

  cmp al,KEYEDITBOX
  jz eeff
  cmp bKeyboardCode,0
  jnz dce4d
eeff:

  test osk.ControlState,INVISIBLE
  jz dce4d

  mov ax,rCursorRegion.wCurrentTop


  cmp ax,480/2
  jae dce4d1
  mov ax,480
  sub ax,osk.PixelHeight
  jmp dce4d2
dce4d1:
  mov ax,0
dce4d2:
  mov osk.TopPixel,ax
  call ShowOSK
dce4d:
  ret
 ShowOSKForClick endp

 CancelOSKPenDown proc near
  public CancelOSKPenDown

   push si
   push bx
   push ax
   mov si,pPenDownActiveRegion
   cmp si,pOSKFirstRegion
   jb cepd1

   call DoPenUpEvent
 cepd1:
   pop ax
   pop bx
   pop si
   ret
 CancelOSKPenDown endp

 SetOSKReducedButtons proc near
  public SetOSKReducedButtons



  or cmdOSKReduce.ControlState,INVISIBLE
  and cmdOSKEnlarge.ControlState,not(INVISIBLE)
  ret
 SetOSKReducedButtons endp

 SetOSKEnlargedButtons proc near
  public SetOSKEnlargedButtons


  or cmdOSKEnlarge.ControlState,INVISIBLE
  and cmdOSKReduce.ControlState,not(INVISIBLE)
  ret
 SetOSKEnlargedButtons endp

 ReGrayOSKTypeButtons proc near
  public ReGrayOSKTypeButtons

  call hideOSK
  call RepaintUnderOSK
  or OSK.ControlState,INVISIBLE
  mov al,not(GRAYED+ISDOWN)
  and cmdOSKFullKeyboard.ControlState,al
  and cmdOSKAlphaKeyboard.ControlState,al
  and cmdOSKNumKeyboard.ControlState,al
  or [si].ControlState,GRAYED+ISDOWN
```

```
and frmAlphaKeyboard.ControlState,not(INVISIBLE)
and
frmNumericKeyboard.ControlState,not(INVISIBLE)
ret

ReGrayOSKTypeButtons endp

RetainOSKRightAndShow proc near
  public RetainOSKRightAndShow

  cmp bIgnoreOSKShow,-1
  jnz roras1
  ret
roras1:
  call SetOSKCoordinates
  cmp bReportOSKDimensions,0
  jz roras1b
   mov si,offset rREGION
    mov di,offset osk
    mov ax,[di].toppixel
     push dx
     extrn getmaxvalidscreenrow:near
     call getmaxvalidscreenrow
     cmp ax,dx
     jbe eeee
     mov ax,dx
      mov [di].toppixel,ax

 eeee
     pop dx
     mov [si].wCurrentTop,ax
     add ax,[di].pixelheight
     dec ax
     mov [si].wCurrentBottom,ax
     mov ax,[di].leftpixel
     mov [si].wCurrentLeft,ax
     add ax,[di].pixelwidth
     dec ax
     mov [si].wCurrentRight,ax
     cmp bScreenMode,12h
     jz rgr
     mov ax,16
     add [si].wCurrentRight,ax
      add ax,8
     add [si].wCurrentBottom,ax
 rgr
      extrn PassOSKDimensions:near
    call PassOSKDimensions
    jmp eer
 roras1b
  call ShowOSK

  cmp pTabRegion,0
  jz eer
  mov si,offset rTabRegion
  call SetNewTabItemWork1
 eer
  ret
 RetainOSKRightAndShow endp


 setoskcoordinates proc near
   public setoskcoordinates
   mov bx,offset OSK
   mov [bx].PixelHeight,0
   push osk.LeftPixel
   mov [bx].LeftPixel,0

   call ComputeOSKHeight
   pop osk.LeftPixel


   mov bx,OSK.PixelHeight

   cmp bDontCenterOSK,-1
   jz roras1a
   mov ax,640
   sub ax,OSK.PixelWidth
   sar ax,1
    ROUND_TO_BYTE_BOUNDARY ax
   mov OSK.LeftPixel,ax
  roras1a:
   mov ax,OSK.TopPixel
   add ax,bx
   cmp bScreenMode,12h
   jz roras3
   cmp ax,25*8
   jbe roras2
   mov ax,25*8
   sub ax,bx
   jmp roras4
  roras3:
   cmp ax,480
   jbe roras2
   mov ax,480
   sub ax,bx
  roras4:
   cmp bDontCenterOSK,-1
   mov bDontCenterOSK,0
   jz roras2
 mov OSK.TopPixel,ax
 roras2:
 ret
 setoskcoordinates endp

 DoHideOSK proc near
  public DoHideOSK

  test osk.ControlState,INVISIBLE
  jnz dho1

  call HideOSK
  call RepaintUnderOSK
  or OSK.ControlState,INVISIBLE
 dho1:
  and wCurrentResource,not(111b)
  ret
 DoHideOSK endp

 HideOSK proc near
  public HideOSK

  test osk.ControlState,INVISIBLE
  jnz hosk1
  push ax
  push si
  push bx
  mov di,pOSKFirstRegion
  cmp di,-1
  jz hok1
  call HideForm
  push pOSKFirstRegion
  pop pNextActiveRegion
  mov pOSKFirstRegion,-1
 hok1:
  pop bx
  pop si
  pop ax
 hosk1:
  ret
 HideOSK endp


 HideForm proc near
  public HideForm

  push di
  mov bx,[di].pCurrentControl
  push bx
  or [bx].ControlState,INVISIBLE
  call UnprotectOSK

  mov dx,[di].wCurrentTop
  mov cx,[di].wCurrentLeft
  mov bh,bDeskTopColor
  test wCurrentResource,not(111b)
  jnz hf1
   jmp noclear

  mov bh,0
  cmp bScreenMode,12h
  jz hf1

  mov bh,7

 hf1:
  mov ax,[di].wCurrentHeight
  mov si,[di].wCurrentRight
  sub si,cx
  inc si
  DIVIDE_BY_8 si

  call FillScreenArea
 noclear:
  pop bx
  pop di
  ret
 HideForm endp


 InterpretShift proc near
  public InterpretShift

  cmp IsNumericKey
  jnz is1
  test bl,NUM_LOCK_DOWN
  jz is1

  test bl,L_SHIFT_DOWN or R_SHIFT_DOWN
  jnz sld1
   mov al,dh
   ret
 sld1:

  and bl,not(L_SHIFT_DOWN or R_SHIFT_DOWN)
  mov ah,dl
  xor al,al
  ret

 if 0
  mov bh,bl
  and bl,not(L_SHIFT_DOWN or R_SHIFT_DOWN)
  not bh
  and bh,L_SHIFT_DOWN or R_SHIFT_DOWN
  or bl,bh
 endif

 is1:
  mov bh,dl
  sub bh,dh
  cmp bh,32
  jz sk2a
 is2:
  test bl,L_SHIFT_DOWN or R_SHIFT_DOWN
  jnz sk2c
  mov al,dl
  ret
 sk2c:
  mov al,dh
       cmp ah,dl
       jnz sk2c2
       mov ah,dh
       xor al,al
       jmp sk2c1
 sk2c2
     cmp al,ah
     jnz sk2c1
     xor al,al
 sk2c1:


   ret

  sk2a.
   xor bh,bh
   test bl,CAPS_LOCK_DOWN
   jz sk2b
   mov bh,-1
  sk2b
   test bl,L_SHIFT_DOWN or R_SHIFT_DOWN
   jz sk2d
   not bh
  sk2d
   or bh,bh
   jz sk2e
   mov al,dh
   ret
  sk2e
   mov al,dl
   ret
  InterpretShift endp

  ReShowOSK proc near
   public ReshowOSK

  push ax
  push si
    cmp pOSKFirstRegion,-1
    jnz eazz
    mov pOSKFirstRegion,offset rActiveRegions
  eazz:
  push pOSKFirstRegion
  pop pNextActiveRegion
  or osk.ControlState,INVISIBLE
  mov bRepaintMode,1

  call ShowOSK
  pop si
  pop ax
  ret
 ReShowOSK endp

 RepaintOSK proc near
   public RepaintOSK

  push bx
   push pNextActiveRegion
   pop pOSKFirstRegion
   push pFirstControl
   mov pFirstControl,offset OSK
    test OSK.ID,4
    jz red1
    mov bEnlargeFlag,-1
  red1:
   call RepaintWork
   mov bEnlargeFlag,0
   pop pFirstControl
   mov bx,wCurrentResource
   and bx,not(111b)
   or bx,OSK.ID
   mov wCurrentResource,bx
  pop bx
  ret
 RepaintOSK endp

DrawOSKLegend proc near
 public DrawOSKLegend

 push si
 push ax
 push rRegion.wCurrentHeight
 push rRegion.wCurrentWidth

 mov si,offset rRegion
 mov al,byte ptr OSK.ID
 and al,11b
 cmp al,2
 jnz rod8

 jmp rod2a
rod8:
 mov dx,[si].wCurrentTop
 mov cx,[si].wCurrentLeft

 add cx,24
 mov bx,20
 mov ax,OSK.PixelWidth
 sub ax,24*6
 cmp bEnlargeFlag,0
 jz rod3
 add bx,20-8
 sub ax,8*6
 add cx,8
rod3
 push si
 push bx
 mov rRegion.wCurrentHeight,bx
 mov rRegion.wCurrentWidth,ax
 call adjustbuttondimensions
 pop bx
 pop si
 mov ax,24
 cmp bEnlargeFlag,0
 jz rod4
 add ax,8
rod4:
 mov rRegion.wCurrentHeight,bx
 mov rRegion.wCurrentWidth,ax
 mov dx,[si].wCurrentTop
 mov cx,[si].wCurrentLeft
 call adjustbuttondimensions
 push si
 pop si
 push word ptr bshadowcolor
 mov bshadowcolor,3
 mov cx,[si].wCurrentLeft
 mov dx,[si].wCurrentTop
 add cx,8


 inc dx
 inc dx
 inc dx
 inc dx

 mov si,offset abouticon
 cmp bEnlargeFlag,0
 jnz rod5
 mov si,offset smallabouticon


rod5:
 push cx
 push dx
 call draw4color
 pop dx
 pop cx
 pop word ptr bshadowcolor
 cmp bEnlargeFlag,0
 jnz rod7
 mov si,offset bSmallCruzerWork
 add cx,32
 add dx,2
 jmp rod8
rod7:
 mov si,offset bBigCruzerWork
 add dx,4
 add cx,40

rod8:


 mov pCurrentFont,offset UIFont4
 call drawstring



rod2a:
 pop  rRegion.wCurrentWidth
 pop  rRegion.wCurrentHeight
 pop ax
 pop si
```

```
  ret
DrawOSKLegend endp

ShowOSK proc near
  public ShowOSK
  test osk.ControlState,INVISIBLE
  jz sosk1

  call DefineNewOSKArea


  call UseNormalColors
  call RepaintOSK
sosk1:
  ret
ShowOSK endp


DefineNewOSKArea proc near
  public DefineNewOSKArea
  mov bx,offset osk
  and [bx].ControlState,not(INVISIBLE)
  call ComputeOSKHeight
  mov ax,480
  cmp osk.TopPixel,ax
  jb so1a
  sub ax,OSK.PixelHeight
  mov osk.TopPixel,ax
so1a:
  call DefineCoveredArea
  ret
DefineNewOSKArea endp

ComputeOSKHeight proc near
  push bx
  test OSK.ID,4
  jz coh1
  mov bEnlargeFlag,-1
coh1:
  or cmdOSKAbout.ControlState,INVISIBLE
  or lblOSKSmallCruzer.ControlState,INVISIBLE
  mov lblOSKChiselLine.PixelWidth,8
  mov OSK.PixelWidth,8
  push pFirstControl
  mov pFirstControl,bx
  call SetFormHeights
  mov bEnlargeFlag,0
  mov ax,wFormWidth
  sub ax,OSK.LeftPixel
  ROUND_TO_BYTE_BOUNDARY ax
  cmp bScreenMode,12h
  jz coh2
 ;sub ax,16
coh2:
  mov OSK.PixelWidth,ax
  cmp bScreenMode,12h
  jnz so2a
  sub ax,16
  mov lblOSKChiselLine.PixelWidth,ax
  mov lblOSKChiselLine.LeftPixel,8
  sub osk.PixelHeight,16
  jmp so2
so2a:
  mov lblOSKChiselLine.PixelWidth,ax
  mov lblOSKChiselLine.LeftPixel,0
  mov al,byte ptr OSK.ID
  and al,11b
  cmp al,2
  jz so2a1
  and cmdOSKAbout.ControlState,not(INVISIBLE)
  and
lblOSKSmallCruzer.ControlState,not(INVISIBLE)
  mov cmdOSKAbout.TopPixel,0
so2a1:
  sub osk.PixelHeight,24+8
  cmp bEnlargeFlag,0
  jz so2
  sub osk.PixelHeight,8
so2:
  pop pFirstcontrol
so1:
  pop bx
  ret
ComputeOSKHeight endp

RepaintOSKInMemory proc near
  public RepaintOSKInMemory
  test osk.ControlState,INVISIBLE
  jnz do4


  mov bDontChangeProtection,-1
  call ProtectOSK
  call RepaintOSK
  mov bDontChangeProtection,0
do4:
  ret
RepaintOSKInMemory endp

SendKey proc near
  public SendKey


  push ax
  call SetKeyRegisters

  cmp cx,0FFFFh
  jnz sk01
  cmp dx,0FFFFh
  jnz sk01
  mov al,0

  jmp sk8a
sk01:
  test bl,ALT_DOWN
  jz sk1
  cmp ch,255
  jnz ska1
  test bl,NUM_LOCK_DOWN
  jz ska1
  cmp dh,"0"
  jb ska1
  cmp dh,"9"
  ja ska1
  mov bl,bAltNumberCount
  xor bh,bh
  add bx,offset bAltNumberAccum
  mov [bx],dh
  mov byte ptr [bx+1],0
  inc bAltNumberCount
  cmp bAltNumberCount,3
  jz ska2
  cmp byte ptr bAltNumberAccum,"3"
  jb ska4
  cmp bAltNumberCount,2
  jb ska4
ska2:
  call GetAltNumberValue
  cmp bx,255
  jbe ska3
ska4:
  jmp sk10
ska3:
  mov ax,bx
  jmp sk8a
ska1:
  cmp ch,255
  jz sk10
  mov ah,ch
  xor al,al
  jmp sk8
sk1:
  mov bAltNumberCount,0

  test bl,CTRL_DOWN
  jz sk2
  cmp cl,84
  jae sk1b


  cmp ah,dl
  jnz sk1a
sk1b:
  mov ah,cl
  xor al,al
  jmp sk8
sk1a:
  mov al,cl
  jmp sk8
sk2:
  test bl,NUM_LOCK_DOWN
  jz sk3
  call IsItNumericKey
  jz sk11

sk3:
  cmp ah,78
  jz sk11
  cmp ah,74
  jz sk11
  cmp ah,59+10
  jb sk11a
  jmp sk8a
sk11a:
  test bl,L_SHIFT_DOWN or R_SHIFT_DOWN
  jnz sk11


  cmp ah,59
  jb sk11
    mov al,0
    jmp sk8a
sk11:
  call InterpretShift
sk8:
  cmp al,255
  jz sk10
sk8a:
  mov wKeyPressed,ax
sk9:
  mov bKeyChanged,-1
sk10:
  pop ax
  ret
SendKey endp

GetAltNumberValue proc near
  public GetAltNumberValue

  mov bAltNumberCount,0
  push si
  mov si,offset bAltNumberAccum
  call Ascii2Bin
  pop si
  mov byte ptr bAltNumberAccum,0
  ret
GetAltNumberValue endp


SetKeyRegisters proc near
  public SetKeyRegisters

  mov cx,[si].pStorageOffset
  mov dx,[si].wDataLength

  mov ax,[si].id
  xchg ah,al
  mov bl,bKeyState
  ret
SetKeyRegisters endp

ProtectOSK proc near
  public ProtectOSK


  cmp pOSKFirstRegion,-1
  jz pca1
  test osk.ControlState,INVISIBLE
  jnz pca1
  push wCoveredAreaTopHold
  pop wCoveredAreaTop
  mov bCoveredAreaOnly,0
pca1:
  ret
ProtectOSK endp



ResetShiftKeys proc near

  push ax
  push si
  push rRegion.pCurrentControl
  push pFirstControl
  mov pFirstControl,offset OSK
  call GoFirstControl
  jc rsk1
rsk3:
  mov al,[si].ControlType
  cmp al,RSHIFTKEYBUTTON
  jb rsk2
  cmp al,ALTKEYBUTTON
  ja rsk2
  jne rsk3b
  cmp bAltNumberCount,0
  jz rsk3b

  jmp rsk2
rsk3b:
  test [si].ControlState,ISDOWN
  jz rsk2
  call CheckIfOnlyOSK
  jnc rsk3c
  call SendKeyUpScanCode
rsk3c:
  and [si].ControlState,not(ISDOWN)
rsk2:
  call GoNextControl
  jnc rsk3
rsk1:
  pop pFirstControl
  pop rRegion.pCurrentControl
  pop si
  pop ax
  ret
ResetShiftKeys endp




UnprotectOSK proc near
  public UnprotectOSK
  mov wCoveredAreaTop,-1
  mov bCoveredAreaOnly,0
  ret
UnprotectOSK endp

IsItNumericKey proc near
  public IsItNumericKey


  cmp ah,71
  jb iink2
  cmp ah,83
  ja iink2
  cmp ah,74
  jz iink2
  cmp ah,78
  jz iink2
  cmp ah,ah
  jmp iink1
iink2:
  or ah,ah
iink1:
  ret
IsItNumericKey endp

IsItNumericOnNumKeyPad proc near
  public IsItNumericOnNumKeypad
  test bKeyState,NUM_LOCK_DOWN
  jz iino1
  test bKeyState,L_SHIFT_DOWN or
R_SHIFT_DOWN
  jnz iino1
  call SetKeyRegisters
  call IsItNumericKey
  jz iino2
iino1:
  clc
  ret
iino2:
  stc
  ret
IsItNumericOnNumKeyPad endp

SetOSKKeyCaptionString proc near
  public SetOSKKeyCaptionString
  call SetKeyRegisters
  call InterpretShift

  cmp bScreenMode,VGA_MODE
  jnz dbc3a

  mov bx,offset bDummyCaption
  xor ah,ah
  mov [bx+3],ax
  jmp dbc3b

dbc3a:

  push si
  mov di,si
  mov si,offset bCaptionLetter
  mov byte ptr [si+1],al
  call SetKeyCaption
  pop si

dbc3b:
  xor cx,cx
  call SetCaptionPointers
  ret
SetOSKKeyCaptionString endp

SetKeyCaption proc near
  public SetKeyCaption


  push ax
  mov dx,rRegion.wCurrentHeight
  DIVIDE_BY_8 dx
  mov dh,dl
  mov bx,offset bDummyCaption
  mov cx,rRegion.wCurrentWidth
  mov ah,222
  cmp [di].ControlType,KEYBUTTON
  jae skc5
  mov ah,"["
skc5:
  DIVIDE_BY_8 cx
  dec cx
  cmp bEnlargeFlag,0
  jz skc0
  test [di].ControlState,WIDEN
  jnz skc0
  dec cx
skc0:
  test [di].ControlState,DOUBLEWIDEN
  jz skc0a
  inc cx
skc0a:
  mov wKeyWidth,cx
```

```
xor di,di
push ds
pop es
mov di,offset bDummyCaption+3

skc2:
lodsb
or al,al
jz skc1
stosb
inc di
loop skc2

skc2c:

cmp byte ptr [si],222
jnz skc1

skc2cc
add cx,wKeyWidth
inc cx
inc cx
jmp skc2

skc1

jcxz skc3
mov al,' '
skc4
stosb
inc di
loop skc4
skc3
cmp bEnlargeflag,0
jz skc3a


mov al,' '
cmp byte ptr [si],0
jz skc3aa
lodsb
skc3aa
stosb
inc di
skc3ab
dec dh
jz skc3b
mov al,13
stosb
mov al,220
cmp dh,1
jz skc3ab1
mov al ' '
skc3ab1
mov cl,dl
xor ch,ch
rep stosb
jmp skc3ab

skc3a.
mov al,ah
stosb
skc3b
xor al,al
stosb
pop ax
ret
SetKeyCaption endp

HandleOSKKeyPenUp proc near
public HandleOSKKeyPenUp

cmp al,FIRSTKEYTYPE
jbe dpe10b
cmp al,LASTKEYTYPE
ja dpe10b

cmp bReleaseShift,0
mov bReleaseShift,0
jz dpe9bb
call GetBitForShiftKey
cmp bl,ALT_DOWN
jnz dpu20
cmp bAltNumberCount,0
jz dpu20
push bx
push ax
call GetAltNumberValue
cmp bx,255
ja nrs1
mov wKeyPressed,bx
mov bKeyChanged,-1
mov bPopUpRequired,-1
nrs1:
pop ax
pop bx

dpu20
not bl
and bKeyState,bl
call UndoButtonDown
call CheckIfOnlyOSK
jnc dpu21
call SendKeyUpScanCode
dpu21.
mov bNoDimensionUpdate,-1

call SetBiosLockState

call ReShowOSK
mov bNoDimensionUpdate,0
mov bKeyChanged,-1
dpe9bb
jmp hopu1




dpe10b:
cmp al,KEYBUTTON
jnz hopu2
push word ptr bKeyState
pop word ptr bKeyStatePrev

test bKeystate L_SHIFT_DOWN +
R_SHIFT_DOWN + CTRL_DOWN +
ALT DOWN
jz . hopu3
call UndoButtonDown
call CheckIfOnlyOSK
jnc hopu4
call SendKeyUpScanCode
hopu4
jmp hopu1
hopu3
call undobuttondown
call CheckIfOnlyOSK
jnc hopu5
call SendKeyUpScanCode
hopu5
and bKeystate, not( L_SHIFT_DOWN +
R_SHIFT_DOWN + CTRL_DOWN +
ALT_DOWN )
cmp bAltNumberCount,0
jz dpe10be
or bKeystate,ALT_DOWN
dpe10be:
call ResetShiftKeys
mov bNoDimensionUpdate,-1

test bKeyStatePrev,L_SHIFT_DOWN +
R_SHIFT_DOWN
jnz hopu5a
call repaintctrlandalt
jmp hopu5b
hopu5a:
call ReShowOSK
hopu5b:
mov bNoDimensionUpdate,0
jmp hopu1
hopu2:
clc
ret
hopu1:
mov pPenDownActiveRegion,0
s .
re
HandleOSKKeyPenUp endp


repaintctrlandalt proc near
cmp osk.id,2
jz rcaa1
cmp osk.id,8
jz rcaa1
push si
push pPenDownActiveRegion
mov si,offset ctrlkey1
call repaintspecifickey
mov si,offset ctrlkey2
call repaintspecifickey
mov si,offset altkey1
call repaintspecifickey
mov si,offset altkey2
call repaintspecifickey
pop pPenDownActiveRegion
pop si
rcaa1:
ret
repaintctrlandalt endp


repaintspecifickey proc near
mov bx,pOSKFirstRegion
cmp bx,-1
jz rpsk2
rpsk1
cmp bx,pNextActiveRegion
jae rpsk2
cmp [bx].pCurrentControl,si
jz rpsk3
add bx,type rActiveRegions
jmp rpsk1
rpsk3:
mov pPenDownActiveRegion,bx
mov ax,[si]
call repaintindividualcontrol

rpsk2.
ret
repaintspecifickey endp

HandleOSKKeyPenDown proc near
public HandleOSKKeyPenDown
mov bKeyDownType,al

cmp al,KEYBUTTON
jb dpe9bb
cmp al,CAPSLOCKBUTTON
ja dpe9bb
call CheckHotKeyEdit
jnc dpe9gg
call far ptr DoHotKeyEdit
cmp al,KEYBUTTON
ja dpe9b
jmp dpe9x
dpe9gg.
cmp al,KEYBUTTON
jnz dpe9b
call SetTypeMatic
call CheckIfOnlyOSK
jnc dpe9g
call SendKeyDownScanCode
jmp dpe9x
dpe9g:
call SendKey
jmp dpe9x
dpe9bb:
cmp al,KEYBUTTON
dpe9b:
jb dpe9x
cmp al,CAPSLOCKBUTTON
ja dpe9x

call GetBitForShiftKey
or bKeyState,bl
call CheckHotKeyEdit
jc dpe9h
mov bNoDimensionUpdate,-1
call CheckIfOnlyOSK
jnc dpe9h
call SendKeyDownScanCode
dpe9h:
cmp bKeyDownType,ALTKEYBUTTON
jz dpe9hh
cmp bKeyDownType,CTRLKEYBUTTON
jnz dpe9hi
dpe9hh:
call repaintctrlandalt
jmp dpe9hj
dpe9hi:
call SetBiosLockState
call ReShowOSK
dpe9hj:
mov bNoDimensionUpdate 0
mov bKeyChanged,-1
dpe9x
ret
HandleOSKKeyPenDown endp

CheckHotKeyEdit proc near
public CheckHotKeyEdit

cmp pCurrentToolBarButton,offset cmdHotKeys
jnz qqii2
call CheckIfOnlyOSK
jc qqii2
cmp wHotKeyRightPixel,640-48-8
jae qqii2
push ax
push si
call GetTabControlType
cmp si,KEYEDITBOX
pop si
pop ax
jz qqii1
qqii2.
clc
ret
qqii1:
stc
ret
CheckHotKeyEdit endp

HandleOSKAlreadyDown proc near
public HandleOSKAlreadyDown
cmp al,KEYBUTTON
jbe dpe8ex
cmp al,CAPSLOCKBUTTON
ja dpe8ex
mov bReleaseShift,-1
push ax
call checkhotkeyedit
pop ax
jnc xxdd
cmp al,SCROLLLOCKBUTTON
jb xxdd


call far ptr DoHotKeyEdit


xxdd
stc
ret
dpe8ex:
clc
ret
HandleOSKAlreadyDown endp

GetBitForShiftKey proc near

push ax

mov bl,R_SHIFT_DOWN
sub al,RSHIFTKEYBUTTON
dpe8d:
jz dpe8c
shl bl,1
dec al
jmp dpe8d
dpe8c.
pop ax
ret
GetBitForShiftKey endp

CheckIfOnlyOSK proc near
public CheckIfOnlyOSK

test wCurrentResource,not(111b)
jnz dke1bx
cmp bModalFlag,-1
jz dke1bx
stc
ret
dke1bx
clc
ret
CheckIfOnlyOSK endp

SendKeyDownScanCode proc near
public SendKeyDownScanCode
push bx
push ax


call RestVgaState


mov bx,[si].ID


SM_FUNCTION SM_SET_KEYSTROKE
call IsItLockKey
jnz skds1
or bl,80h
SM_FUNCTION SM_SET_KEYSTROKE
skds1:
pop ax
pop bx
ret
SendKeyDownScanCode endp

IsItLockKey proc near
push bx
and bl,01111111b
cmp bx,58
jz iilk1
cmp bx,46h
jz iilk1
cmp bx,45h
iilk1:
pop bx
ret
IsItLockKey endp

SendKeyUpScanCode proc near
push ax
push bx

call restvgastate


mov bx,[si].ID
```

```
call IsItLockKey
jnz skusc1
SM_FUNCTION SM_SET_KEYSTROKE
skusc1:
or bl,10000000b
SM_FUNCTION SM_SET_KEYSTROKE
pop bx
pop ax
ret
SendKeyUpScanCode endp

DoCloseOSK proc near
  public DoCloseOSK

  call UndoCurrentTabItem
  and [si].ControlState,not(ISDOWN)
  call RaiseAllOSKKeys


  mov ax,wCurrentResource
  and al,111b
  mov bOSKLastState,al


  test wCurrentResource,not(111b)
  jnz dh1
  and wCurrentResource,not(111b)
    call freescreen
    jmp dh13

dh1

  push wCurrentResource
  call DoHideOSK
  cmp wCurrentResource,0
  jnz dh11
  call FreeScreen
  jmp dh12
dh11:
  mov bDontShowOSK,-1
dh12
  pop wCurrentResource
  mov si,pTabRegion
  call SetNewTabItemWork
dh13
  ret
DoCloseOSK endp



RaiseAllOSKKeys proc near

  push si
  push pFirstControl
  mov si,offset OSK
  mov pFirstControl,si
rao1:
  mov al,[si].ControlType
  cmp al,KEYBUTTON
  jb rao2
  cmp al,ALTKEYBUTTON
  ja rao2
  and [si].Controlstate,not(ISDOWN)
rao2:
  call GoNextControl
  jnc rao1
  pop pFirstControl
  pop si
  ret
RaiseAllOSKKeys endp

RepaintUnderOSK proc near
  public RepaintUnderOSK

 if need_osk ne 0
  push si
  push di
  push bx
  push wCoveredAreaTopHold
  pop wCoveredAreaTop
  mov bCoveredAreaOnly,-1
  or OSK.ControlState,INVISIBLE
  mov bRepaintNeeded,-1
  call Repaint
  and OSK.ControlState,not(INVISIBLE)
  pop bx
  pop di
  pop si
  call UnprotectOSK
 endif
  ret
RepaintUnderOSK endp


GetPhysicalKeyState proc near
  public GetPhysicalKeyState
  push ds
  push es
push bx
push ax
mov ax,OURDATASEG
mov ds,ax
mov bx,40h
mov es,bx
mov bx,017h
mov al,es:[bx]
and al,SCROLL_LOCK_DOWN or
NUM_LOCK_DOWN or CAPS_LOCK_DOWN
 mov ah,bKeyState
 mov bl,ah
 and ah,SCROLL_LOCK_DOWN or
NUM_LOCK_DOWN or CAPS_LOCK_DOWN
 cmp ah,al
 jz gpks0

 and bl,not (SCROLL_LOCK_DOWN or
NUM_LOCK_DOWN or
CAPS_LOCK_DOWN)
 or bl,al
 mov bKeyState,al

 and OskCapsLock.ControlState,not ISDOWN


 and OskNumLock.ControlState,not ISDOWN
 and OskScrollLock.ControlState,not ISDOWN

 test al,CAPS_LOCK_DOWN
 jz gpks1
 or OskCapsLock.ControlState,ISDOWN



gpks1:
 test al,NUM_LOCK_DOWN
 jz gpks2
 or OskNumLock.ControlState,ISDOWN
gpks2:
 test al,SCROLL_LOCK_DOWN
 jz gpks3
 or OskScrollLock.ControlState,ISDOWN
gpks3:
  cmp pOSKFirstRegion,-1
  jz gpks0
  call ReshowOSK


gpks0:
 pop ax
 pop bx
 pop es
 pop ds
 ret
GetPhysicalKeyState endp

SetBiosLockState proc near
  push es
  push bx
  push ax
  mov bx,40h
  mov es,bx
  mov bx,017h
  mov al,bKeyState
  and al,SCROLL_LOCK_DOWN or
NUM_LOCK_DOWN or CAPS_LOCK_DOWN
  mov ah,es:[bx]
  and ah,not(SCROLL_LOCK_DOWN or
NUM_LOCK_DOWN or
CAPS_LOCK_DOWN)
  or ah,al
  mov es:[bx],ah
  pop ax
  pop bx
  pop es
  ret
SetBiosLockState endp



end

Copr 1995 Zenith Data Systems Corp.


.MODEL SMALL
include uiinclud.inc
DATASEG_BEGIN
bCurrentShadowColor db DARKGRAY
  public bCurrentShadowColor
extrn wCurrentResource:word
extrn ControlDataStorageArea:byte
extrn rLegendRegion:tREGION
extrn FirstStandardControl:tCONTROL
extrn FontTable:word
extrn LastStandardControl:tCONTROL
extrn MainForm:tControl
extrn OSK:tControl
extrn bButtonForegroundColor:byte
extrn bCaptionForegroundColor:byte
extrn bCaptionForegroundColor:byte
extrn bCaptionForegroundColor:byte
extrn bCoveredAreaOnly:byte
extrn bCursorActive:byte
extrn bDontChangeProtection:byte
extrn bFormColor:byte
extrn bIconBackgroundColor:byte
extrn bIconForegroundColor:byte
extrn bLanguageToUse:byte
extrn bLightColor:byte
extrn bNullString:byte
extrn bOutLineColor:byte
extrn bPreviewMode:byte
extrn bPreviewMode:byte
extrn bRepaintMode:byte
extrn bRepaintNeeded:byte
extrn bScreenMode:byte
extrn bShadowColor:byte
extrn bShortNotchPattern:byte
extrn bSpectrumPattern:byte
extrn bTallNotchPattern:byte
extrn lIgnoreLevel:word
extrn iLeftAdders:word
extrn iObjectLevel:word
extrn iTopAdders:word
extrn pClickRegion:word
extrn pCurrentFont:word
extrn pCurrentToolButtonRegion:word
extrn pCurrentToolButtonRegion:word
extrn pDrawStringTabList:word
extrn pFirstControl:word
extrn pGraphicsCaption:word
extrn pLastForm:word
extrn pNextActiveRegion:word
extrn pTabHandler:word
extrn pTabRegion:word
extrn pTextCaption:word
extrn rActiveRegions:tRegion
extrn rREGION:tREGION
extrn uIfont4:word
extrn wCaptionTop:word
extrn wCaptionTop:word
extrn wCaptionTop:word
extrn wCurrentFontHeight:word
extrn wCurrentFormBottom:word
extrn wCurrentFormHeight:word
extrn wDeltaLeft:word
extrn wDeltaTop:word
extrn wFormWidth:word
extrn wGraphicCaptionHeight:word
extrn wGraphicLegendRight:word
extrn wGraphicLegendRight:word
extrn wGraphicLegendRight:word
extrn wShiftCaption:word
extrn wToolBarHeight:word
extrn wToolBarHeight:word
extrn frmMessageBox:tCONTROL
extrn frmMessageBox_end:tCONTROL
extrn UIFont3:word

extrn osksecondrow:tcontrol

bCurrentControlType db 0
  public bCurrentControlType
DATASEG_END
.code
extrn blockvideo:near
extrn unblockvideo:near

extrn DoClickEvent:near
extrn DoTab:near
extrn DrawIColor:near
extrn DrawLabel:near
extrn DrawString:near
extrn FindRegionForControl:near
extrn GetCaptionHeight:near
extrn GetCaptionWidth:near
extrn GetCombinedCaptionHeight:near
extrn GetControlRegion:near
extrn GetLabelWidth:near
extrn IsItNumericOnNumKeypad:near
extrn PaintNextTabControl:near
extrn PrepareClickRegisters:near
extrn ProtectOSK:near
extrn RepaintControl:near
extrn RepaintGroupObject:near
extrn RepaintOSKinMemory:near
extrn SetKeyCaption:near
extrn SetNewTabItem:near
extrn SetNewTabItem:near
extrn SetOSKKeyCaptionString:near
extrn ShowTabBox:near
extrn UnprotectOSK:near
extrn UpdateLegendRegion:near

DrawButtonCaption proc near
  public DrawButtonCaption

  xor ah,ah
  mov wShiftCaption,ax

  mov wGraphicCaptionHeight,0

  push si
  mov al,[si].ControlType
 if need_osk ne 0
  cmp al,KEYBUTTON
  jnz dbc5

  call IsItNumericOnNumKeyPad
  je dbc7

 endif
 dbc5:
  call PaintControlCaption
  jnz dbc99a


  mov al,[si].ControlType
 if need_osk ne 0
  cmp al,KEYBUTTON
  jnz dbc3

 dbc7
  call SetOSKKeyCaptionString
  jmp dbc99a

 endif

 dbc3:
 if need_aboutcon ne 0
  cmp al,ABOUTBUTTON
  jnz dbc4
  call DrawAboutIcon
  jmp dbc99
 endif

 dbc4:
  jmp dbc99

 dbc99a:
  cmp bScreenMode,VGA_MODE
  jz dbc99d


  mov dx,rRegion.wCurrentTop
  and dl,11111000b
  jmp dbc99e

 dbc99d:
  call GetCombinedCaptionHeight
  jnz dbc99b
  jmp dbc99

 dbc99b:
  mov dx,rRegion.wCurrentHeight
  sub dx,ax
  jge dbc99c
  jmp dbc99
 dbc99c:
  sar dx,1
  add dx,rRegion.wCurrentTop
  add dx,wShiftCaption
 dbc99e:
  mov wCaptionTop,dx
  mov bx,pGraphicsCaption
  or bx,bx
  jnz dbc1xx
  jmp dbc1
 dbc1xx:
 if need_osk ne 0
  cmp bScreenMode,VGA_MODE
  jz dbc8

  mov ah,16+1
  call PointControlMiscItem
  or bx,bx
  jz dbc1
  call SetFontForCaption

  push si
  mov di,si
  mov si,bx
  call SetKeyCaption
  pop si
  add bx,3

  mov cx,rRegion.wCurrentLeft
  mov dx,rRegion.wCurrentTop
  jmp dbc9



 dbc8.
```

```
endif

 call SetFontForCaption

 call GetCaptionWidth
 or ax,ax
 jz dbc1
 mov cx,rRegion.wCurrentWidth
 sub cx,ax
 jl dbc1
 sar cx,1
 jnc dbc6
 inc cx
dbc6
 mov dx,rRegion.wCurrentLeft
 ROUND_TO_BYTE_BOUNDARY dx
 add cx,dx
 dec cx
 add cx,wShiftCaption
 mov dx,wCaptionTop

dbc9
 push si
 push ax
 mov al,[si].ControlType
 mov di,si
 mov si,bx
 mov bl,bIconForegroundColor
 test [di].ControlState,DISABLED or GRAYED
 jz dbc2a
 mov bl,bShadowColor
dbc2a
 mov bh,bIconBackgroundColor
 cmp al,SYMBOLBUTTON
 jb dbc2
 xor bh,bh
dbc2
 pop ax
 call DrawString
 pop si

dbc1
 mov bx,pTextCaption
 or bx,bx
 jz dbc99
 call SetFontForCaption
 mov dx,wCaptionTop
 add dx,wGraphicCaptionHeight
 add ax,dx
 mov rLegendRegion.wCurrentBottom,ax
 add bx,3
 push si
 mov cx,rRegion.wCurrentLeft
 ROUND_TO_BYTE_BOUNDARY cx
 add cx,wShiftCaption
 mov ax,rRegion.wCurrentWidth
 mov si,bx
 mov bl,bButtonForegroundColor
 mov bh,CENTERED
 call UpdateLegendRegion
 call DrawLabel
 pop si
dbc99
 pop si
 ret
DrawButtonCaption endp

DrawEditBoxCaption proc near
 public DrawEditBoxCaption

 push rRegion.wCurrentLeft
 pop wGraphicLegendRight
 call PaintControlCaption
 jnz reb99b
 jmp debc1
reb99b
 or bx,bx
 jz reb3

 push cx
 call SetFontForCaption
 add bx,3
 push si
 mov si,bx
 call getlabelwidth
 mov dx,rRegion.wCurrentTop
 mov cx,rRegion.wCurrentLeft
 sub cx,ax
 mov wGraphicLegendRight,ax

 mov ax,rRegion.wCurrentHeight
 sar ax,1
 add dx,ax
 mov ax,wCurrentFontHeight
 sar ax,1
 sub dx,ax

 mov bl,bCaptionForegroundColor
 xor bh,bh
 call DrawLabel
 pop si
 pop cx

reb3
 jcxz debc1
 mov bx,cx
 push rRegion.wCurrentHeight
 pop wCurrentFontHeight
 call PositionGraphicCaption
 call PaintGraphicCaption

debc1:
 ret
DrawEditBoxCaption endp

DrawNotches proc near
 public DrawNotches

 push si
 push ax
 sub rRegion.wCurrentRight,8
 mov al,byte ptr [si+1]id
 mov cx,rRegion.wCurrentLeft
 cmp al,8
 mov ax,24
 je rsb2
 mov ax,8

rsb2:
 mov si,offset bTallNotchPattern
 cmp cx,rRegion.wCurrentLeft
 je rsb4
 add cx,ax
 cmp cx,rRegion.wCurrentRight
 jae rsb4a
 mov si,offset bShortNotchPattern
rsb4a
 sub cx,ax
rsb4:
 mov dx,rRegion.wCurrentBottom
 inc dx
 push cx
 push ax
 call draw4color
 pop ax
 pop cx
 add cx,ax
 cmp cx,rRegion.wCurrentRight
 jl rsb2
rsb3:
 add rRegion.wCurrentRight,8

 pop ax
 pop si
 ret
DrawNotches endp

DrawSpectrum proc near
 public DrawSpectrum

 push si
 mov dx,rRegion.wCurrentTop
 mov cx,rRegion.wCurrentLeft
 mov ax,rRegion.wCurrentBottom
 sub ax,3
 add cx,8
 add dx,5
rsb1:
 push ax
 push cx
 push dx
 mov si,offset bSpectrumPattern
 call draw4color
 pop dx
 pop cx
 pop ax

 inc dx
 inc dx
 cmp dx,ax
 jb rsb1
 pop si
 ret
DrawSpectrum endp

ForceTotalRepaint proc near
 public ForceTotalRepaint
 call ForceTotalRepaint1
 mov bRepaintNeeded,-1
 ret
ForceTotalRepaint endp


ForceTotalRepaint1 proc near
 public ForceTotalRepaint1

 mov pFirstControl,offset MainForm
 mov bFormColor,FORM_COLOR
 mov wCurrentFormHeight,0
 mov wCurrentFormBottom,0
 ret
ForceTotalRepaint1 endp


GetTabControlType proc near
 public GetTabControlType
 xor ax,ax
 mov si,pTabRegion
 or si,si

 jz gtct1
 mov bx,[si].pCurrentControl
 mov ax,[bx]
 or ax,ax
gtct1
 ret
GetTabControlType endp

GetTypeAndState proc near
 public GetTypeAndState

 mov di,si
 mov si,[si].pCurrentControl
 mov al,[si].ControlType
 mov ah,[si].ControlState
 ret
GetTypeAndState endp

GoFirstControl proc near
 public GoFirstControl


 mov si,pFirstControl
 mov rRegion.pCurrentControl,si
 clc
 ret
GoFirstControl endp

GoNextControl proc near
 public GoNextControl

 mov si,rRegion.pCurrentControl
 add si,type tControl
gnc3
 test byte ptr [si],128
 jz gnc1
 mov si,[si+1]
 jmp gnc3

gnc1
 cmp byte ptr [si],0
 jnz gnc2
 mov si,rRegion.pCurrentControl
 stc
 ret
gnc2:
 mov rRegion.pCurrentControl,si
 clc
 ret
GoNextControl endp

GoPreviousControl proc near
 public GoPreviousControl


 mov si,rRegion.pCurrentControl
gpc2
 mov al,[si-1]
 or al,al
 jnz gpc3
 stc
 ret
gpc3:
 cmp al,255
 jz gpc1

 mov si,[si-3]
 jmp gpc2
gpc1:
 sub si,type tControl
 mov rRegion.pCurrentControl,si
 clc
 ret
GoPreviousControl endp


IgnoreObject proc near
 cmp al,FIRST_ENDOFOBJECT
 jb io2
 cmp al,LAST_ENDOFOBJECT
 jbe io1
 cmp al,TOOLBARBUTTON
 jz io2
 ret
io1:
 dec iIgnoreLevel
 ret
io2:
 inc iIgnoreLevel
 ret
IgnoreObject endp

PaintGraphicCaption proc near
 public PaintGraphicCaption

 push si
 mov si,bx
 mov bl,bCaptionForegroundColor
 xor bh,bh
 call drawstring
 pop si
 ret
PaintGraphicCaption endp

PaintControlCaption proc near
 public PaintControlCaption
 push di
 push ax

 xor cx,cx
 xor di,di
 mov bx,si
 mov al,[bx]
 mov bCurrentControlType,al
 add bx,type tControl
pcc4:
 mov al,[bx]
 test al,128
 jnz pcc1
 or di,di
 jnz pcc5
 xor bx,bx
 jmp pcc2
pcc5:
 mov bx,di
 jmp short pcc2

pcc1:
 test al,16
 jnz pcc3

 mov ah,al
 and ah,GRAPHICFONT
 cmp ah,GRAPHICFONT
 jnz pcc8
 mov cx,bx
 jmp pcc3

pcc8:
 mov ah,al
 and ah,1111b
 cmp ah,bLanguageToUse
 jz pcc2
 or ah,ah
 jnz pcc3
 mov di,bx
pcc3:
 mov bx,[bx+1]
 jmp short pcc4
pcc2
 mov ax,bx
 or ax,cx
 call SetCaptionPointers
 pop ax
 pop di
 ret
PaintControlCaption endp

PaintControlMiscItem proc near
 public PaintControlMiscItem


 mov bx,si
 add bx,type tControl
pih4:
 mov al,[bx]

 test al,128
 jnz pih1
 sub bx,bx
 ret

pih1:
 and al,ah
 cmp al,ah
```

```
 jz plh2
 mov bx,[bx+1]
 jmp short plh4
plh2
 add bx 3
 or bx,bx
 ret
PaintControlMiscItem endp

PositionGraphicCaption proc near
 public PositionGraphicCaption


 call GetCaptionHeight
 mov wGraphicCaptionHeight,ax
 push wCurrentFontHeight
 call SetFontForCaption
 pop wCurrentFontHeight
 call GetCaptionWidth
 mov cx,wGraphicLegendRight
 sub cx,ax
 sub cx,8
 mov dx,rRegion.wCurrentTop
 mov ax,wGraphicCaptionHeight
 sar ax,1
 sub dx,ax
 mov ax,wCurrentFontHeight
 sar ax,1
 add dx,ax
 ret
PositionGraphicCaption endp

RePaint proc near
 public Repaint
 mov bCursorActive,0
 mov pNextActiveRegion,offset rActiveRegions
 call RepaintWork
 ret
Repaint Endp

RepaintAndSetTab proc near
 public RepaintAndSetTab
 call Repaint
 mov pTabRegion 0
 push pCurrentToolButtonRegion
 pop pClickRegion

 cmp pClickRegion,0
 jnz rast1
 push pNextActiveRegion
 pop pTabRegion
 mov pTabHandler,offset PointNextTabControl
 call DoTab
 ret
rast1
 call ShowTabBox
 mov pClickRegion,0
 ret
RepaintAndSetTab endp

RepaintForClick proc near
 public RepaintForClick

 push si
 mov bRepaintNeeded,-1
 call repaint

if need_osk ne 0
 call RepaintOSKInMemory
endif

 pop si

 call FindRegionForControl
 mov si,bx
 mov pClickRegion,si
 call PrepareClickRegisters
 call SetNewTabItem
 ret
RepaintForClick endp

RepaintWork proc near
 public RepaintWork

 mov iObjectLevel,0
 mov iIgnoreLevel,0
 call blockvideo

 call GoFirstControl
 jmp rp2

rp0:
 call GoNextControl
rp2:
 jnc rp1

 call unblockvideo
 mov bRepaintNeeded,0
 mov bRepaintMode,0
 mov bPreviewMode,0
 ret

rp1:
 mov al,[si].ControlType
 cmp iIgnoreLevel,0
 jz rp5
 call IgnoreObject
 jmp rp0

rp5
 mov ah,[si].ControlState
 cmp al,FIRST_ENDOFOBJECT
 jb rp8
 cmp al,LAST_ENDOFOBJECT
 ja rp7
 dec iObjectLevel
 jmp rp0

rp8
 call SetProtectionForControl
 call RepaintGroupObject
 jmp rp0

rp7
 call SetProtectionForControl
 call RepaintControl
 jmp rp0
RepaintWork endp

SetCaptionPointers proc near
 public SetCaptionPointers
 mov pTextCaption,bx
 mov pGraphicsCaption,cx
 ret
SetCaptionPointers endp

SetColorsForControl proc near
 public SetColorsForControl

 call UseNormalColors
 test ah,DISABLED or GRAYED
 jz rc13
 call UseGrayedColors
rc13:
 ret
SetColorsForControl endp

SetControlTabList proc near
 public SetControlTabList

 push ax
 push bx
 mov ah,16+2
 call PaintControlMiscItem
 jnz sctl1
 mov bx,offset bNullString
sctl1:
 mov pDrawStringTabList,bx
 pop bx
 pop ax
 ret
SetControlTabList endp

SetFontForCaption proc near
 public SetFontForCaption
 push bx
 mov al,[bx]
 and al,ANYFONT
 rol al,1
 rol al,1
 rol al,1
 rol al,1
 xor ah,ah
 cmp al,11b * 2
 jnz sflc1
 cmp bCurrentControlType,LEFTLEGEND
 jz sflc4
 cmp bx,offset OSK
 jne sflc1

 cmp bx,offset frmMessageBox
 jb sflc5
 cmp bx,offset frmMessageBox_end
 ja sflc5
 jmp sflc4
sflc5:
 cmp bx,offset FirstStandardControl
 jb sflc2
 cmp bx,offset LastStandardControl
 jb sflc1
sflc2:
 cmp bCurrentControlType,SPINUPBUTTON
 jz sflc1
 cmp bCurrentControlType,SPINDOWNBUTTON
 jz sflc1
sflc4:
 mov bx,offset wfont4
 jmp sflc3
sflc1:
 mov bx,offset FontTable
 add bx,ax
 mov bx,[bx]
sflc3:
 mov pCurrentFont,bx
 mov ax,[bx]
 mov al,ah
 xor ah,ah
 mov wCurrentFontHeight,ax
 pop bx
 ret
SetFontForCaption endp

SetFormHeights proc near
 public SetFormHeights
 mov bPreviewMode,-1
 mov si,pFirstControl
 push word ptr [si]
 and [si].ControlState,not(INVISIBLE)
 mov pLastForm,0
 mov wFormWidth,0
 push si
 call RepaintWork
 pop si
 pop word ptr [si]
 ret
SetFormHeights endp

SetProtectionForControl proc near
 public SetProtectionForControl

 cmp bDontChangeProtection,0
 jnz rp6b

if need_osk ne 0
 cmp si,offset OSK
 jne rp6a
 mov bCurrentShadowColor,DARKGRAY
 call protectOSK
 ret

rp6a:
 mov bCurrentShadowColor,DARKGRAY
 test wCurrentResource,not(111b)
 jnz rp6c

 mov bCurrentShadowColor,DARKGRAY+1

rp6c:
 call unprotectOSK
endif

rp6b:
 ret
SetProtectionForControl endp

StartNewObjectLevel proc near
 public StartNewObjectLevel

 push dx
 push cx
 inc iObjectLevel
 mov bx,iObjectLevel
 add bx,bx
 mov dx,wDeltaTop
 mov rTopAdders[bx],dx
 mov cx,wDeltaLeft
 mov rLeftAdders[bx],cx
 pop cx
 pop dx
 ret
StartNewObjectLevel endp

StartToolButtonObjectLevel proc near
 public StartToolButtonObjectLevel
 push wToolBarHeight
 pop wDeltaTop
 mov wDeltaLeft,0
 call StartNewObjectLevel
 ret
StartToolButtonObjectLevel endp

UseGrayedColors proc near
 public UseGrayedColors
 push ax
 mov al,bCurrentShadowColor

 mov bShadowColor,al

 mov bOutlineColor,al

 mov bLightColor,FORM_COLOR
 mov bButtonForeGroundColor,al
 pop ax
 ret
UseGrayedColors endp

UseNormalColors proc near
 public UseNormalColors

 push word ptr bCurrentShadowColor
 pop word ptr bShadowColor
 mov bOutlineColor,OUTLINE_COLOR
 mov bLightColor,LIGHT_COLOR
 mov bButtonForeGroundColor,OUTLINE_COLOR
 ret
UseNormalColors endp
end


Copr. 1985 Zenith Data Systems Corp.
.model small
.code
extrn DoPopUp:near
extrn RestVGAState:near

extrn SetHandCursor:near

include uinclud.inc


 DATASEG_BEGIN
 extrn ControlDataStorageArea:byte
 extrn bAwaitingMoveCompletion:byte
 extrn bDoingEvents:byte
 extrn bHourGlassMode:byte
 extrn bLocalState:byte
 extrn bMessageBoxID:byte
 extrn bPopUpRequired:byte
 extrn bScreenMode:byte

 bTimesHidden db 1

 bTriggerPenOnForClick db 0
  public bTriggerPenOnForClick

 bLeavePenOn db 0
  public bLeavePenOn


 bPenEventHappened    db 0
  public bPenEventHappened
 bPenEventType db 0
  public bPenEventType

 bIgnoringPen db 0
  public bIgnoringPen

 bIgnoringMove db 0
  public bIgnoringMove

 wPenCurrentColumn    dw 0
  public wPenCurrentColumn
 wPenCurrentRow       dw 0
  public wPenCurrentRow
 wPenDownColumn       dw 0
  public wPenDownColumn
 wPenDownRow          dw 0
  public wPenDownRow
 wPenUpColumn         dw 0
  public wPenUpColumn
 wPenUpRow            dw 0
  public wPenUpRow


 DATASEG_END

 .code

 ActivatePen proc near
  public ActivatePen
  push es
  mov ax,SET_PEN_EVENT_HANDLER
  mov dx,offset PenEventHandler
  push cs
  pop es
  mov cx,PENMOVED or PENUP or PENDOWN
  int PEN_ACTIVATE_FUNCTION
  pop es
  ret
 ActivatePen endp



 BlockVideo proc near
  public blockvideo

  push ax
  SM_FUNCTION SM_BLOCK_VIDEO_ACCESS
  pop ax
  ret
 BlockVideo endp

 UnblockVideo proc near
  public unblockvideo
  push ax
```

```
SM_FUNCTION SM_UNBLOCK_VIDEO_ACCESS

pop ax
ret
UnblockVideo endp

PenEventHandler proc far

 push ds
 push bx
 push dx
 mov bx,OURDATASEG
 mov ds,bx

 cmp bTriggerPenOnForClick,0
 jz peh00
 mov bLeavePenOn,-1
 mov bTriggerPenOnForClick,0
peh00

 cmp bAwaitingMoveCompletion,0
 jnz peh21

 cmp bIgnoringPen,0
 jnz peh21

 cmp bHourGlassMode,0
 jnz peh21

 cmp bLocalState,0
 jnz peh20

peh21:
 jmp peh3a

peh20
 cmp bScreenMode,VGA_MODE
 jz mmm

 ROUND_TO_BYTE_BOUNDARY dx
 jmp nnn

mmm
 call SetHandCursor
nnn

 cmp al,PENMOVED
 jnz peh0a
 mov bx,wPenCurrentColumn
 sub bx,cx
 jge peh0b
 neg bx
peh0b:
 cmp bx,4
 jge peh0a
 mov bx,wPenCurrentRow
 sub bx,dx
 jge peh0c
 neg bx
peh0c:
 cmp bx,2
 jge peh0a
 mov wPenCurrentColumn,cx
 mov wPenCurrentRow,dx
 jmp peh3a

peh0a
 mov bPenEventHappened,-1
 test al,(PENUP or PENDOWN)
 jz peh1

peh1
 or bPenEventType,al
 mov wPenCurrentColumn,cx
 mov wPenCurrentRow,dx
 test al,PENDOWN
 jz peh2
 mov wPenDownColumn,cx
 mov wPenDownRow,dx
peh2
 test al,PENUP
 jz peh3
 mov wPenUpColumn,cx
 mov wPenUpRow,dx
peh3.

if need_tsr ne 0
 mov bPopupRequired,-1
 pushf
 cli
 push ax
 call DoPopUp
 pop ax
 popf

endif

peh3a:
 pop dx
 pop bx
 pop ds
 ret
PenEventHandler endp

IgnorePen proc near
 public IgnorePen

 inc bIgnoringPen
 ret
IgnorePen endp

SetPenRowRegion proc near
 public SetPenRowRegion

 push ax
 mov ax,08h
 int PEN_FUNCTION
 pop ax
 ret
SetPenRowRegion endp

Se.. enColumnRegion proc near
 pu.:lc SetPenColumnRegion
 push ax
 mov ax,07h
 int PEN_FUNCTION
 pop ax
 ret
SetPenColumnRegion endp

ResumePen proc near
 public ResumePen
 dec bIgnoringPen
 ret
ResumePen endp

PenEntry proc near
 public PenEntry

 cmp bLeavePenOn,0
 jz p1
 cmp bTimesHidden,0
 jnz p1
 push ax
 mov ax,REMOVE_PEN_CURSOR
 int PEN_FUNCTION
 inc bTimesHidden
 pop ax
p1:
 ret
PenEntry endp

PenExit proc near
 public penexit

 cmp bLeavePenOn,0
 jz pex1
 c., bTimesHidden,0
 jz pex1
 push ax
 push cx

 mov cx,5
sgn:
 mov ax,DISPLAY_PEN_CURSOR
 int PEN_FUNCTION
 loop sgn
 pop cx
 mov bTimesHidden,0
 pop ax
pex1:
 ret
PenExit endp

end

Copr. 1995 Zenith Data Systems Corp.

.MODEL SMALL
include umclud.inc
DATASEG_BEGIN
extrn iLeftAdders:word
extrn iTopAdders:word
extrn ControlDataStorageArea:byte
extrn OSK:tControl
extrn SliderButton:byte
extrn bCoveredAreaOnly:byte
extrn bEnlargeFlag:byte
extrn bModalFlag:byte
extrn bPreviewMode:byte
extrn bPreviewMode:byte
extrn bScreenMode:byte
extrn bUnderlinedCharacter:byte
extrn tmFirstModalForm:tControl
extrn iObjectLevel:word
extrn pNextActiveRegion:word
extrn pOSKFirstRegion:word
extrn pPenDownActiveRegion:word
extrn pPenDownLegendRegion:word
extrn rActiveRegions:tRegion
extrn rLegendRegion:tRegion
extrn rPushedRegion:tRegion
extrn rREGION:tREGION
extrn wCoveredAreaBottom:word
extrn wCoveredAreaHeight:word
extrn wCoveredAreaLeft:word
extrn wCoveredAreaRight:word
extrn wCoveredAreaTop:word
extrn wCoveredAreaTopHold:word
extrn wCoveredAreaWidth:word
extrn wDeltaLeft:word
extrn wDeltaTop:word
extrn wPenDownColumn:word
extrn wPenDownRow:word

wToolbarHeight dw 0
 public wToolBarHeight
wCurrentFormHeight dw 0
 public wCurrentFormHeight
wCurrentFormBottom dw 0
 public wCurrentFormBottom
wPreviousFormHeight dw 0
 public wPreviousFormHeight
wPreviousFormBottom dw 0
 public wPreviousFormBottom

wCurrentFormLeft dw 0
 public wCurrentFormLeft
wCurrentFormRight dw 0
 public wCurrentFormRight

wNextTop dw 0
 public wNextTop
wPriorNextTop dw 0
wPriorPriorNextTop dw 0
wNextFrameTop dw 0
wNextLeft dw 0
wNextFrameLeft dw 0
wSameLeft dw 0
wSameHigh dw 0
wSameWide dw 0
wSameTop dw 0
wPriorSameTop dw 0
wPriorPriorSameTop dw 0
wSameFrameTop dw 0
extrn osktirstrow:tControl
extrn oskaecondrow:tControl

DATASEG_END
.code
extrn GetLabelWidth:near
extrn GetLegendHeight:near
extrn IsitLegend:near
extrn PointControlCheckbox:near
extrn ProtectOSK:near
extrn Repaint:near
extrn SetPenColumnRegion:near
extrn SetPenRowRegion:near

GetControlRegion proc near
 public GetControlRegion

 mov dx,[si].TopPixel
 call HandleTopConstants
 mov wDeltaTop,dx

 mov cx,wPriorSameTop
 mov wPriorPriorSameTop,cx
 mov cx,wPriorNextTop
 mov wPriorPriorNextTop,cx
 mov cx,wSameTop
 mov wPriorSameTop,cx
 mov cx,wNextTop
 mov wPriorNextTop,cx

 mov wSameTop,dx
 mov wNextTop,dx

 xor cx,cx
 cmp bScreenMode,VGA_MODE
 jz htm1
 cmp al,FORM
 jz htm1
 add cx,8
 add dx,8

htm1:

 mov bx,iObjectLevel
 add bx,bx
gcl2:
 add cx,iLeftAdders[bx]
 add dx,iTopAdders[bx]
 or bx,bx
 jz gcl1
 dec bx
 dec bx
 jmp short gcl2
gcl1:

 mov bx,[si].LeftPixel

 cmp al,FORM
 jnz gcl1d

 test bh,100b
 jz gcl1a
 or bh,11111000b
 jmp short gcl1a

gcl1d:
 call HandleLeftConstants

 test [si].LeftPixel,FROMRIGHT
 jz gcl1a
 cmp al,FORM
 jz gcl1a

if need_osk ne 0
 cmp bEnlargeFlag,0
 jz gcu8

 push ax
 push dx
 mov ax,4
 mul bx
 mov bx,3
 div bx
 mov bx,ax
 pop dx
 pop ax

endif

gcu8:
 cmp bPreviewMode,0
 jz gcu8a
 xor bx,bx
 jmp gcl1f

gcu8a:
 neg bx
 add bx,wCurrentFormRight
 sub bx,wCurrentFormLeft

if need_osk ne 0
 cmp bScreenMode,VGA_MODE
 jz gcl1a
 add bx,8
 cmp bEnlargeFlag,0
 jnz gcl1a
 sub bx,16

endif
gcl1a:
 cmp bScreenMode,VGA_MODE
 jz gcl1f

 mov cx,[si]

if need_osk ne 0

 test ah,COMPENSATE
 jz gcl1f
 cmp al,FORM
 jz gcl1f
 sub bx,8
 cmp bEnlargeFlag,0
 jz gcl1f
 sub bx,8
endif

gcl1f.
 mov wDeltaLeft,bx
 add cx,bx
```

```
gcl1b
 mov rRegion.wCurrentTop,dx
 mov rRegion.wCurrentLeft,cx
 mov wSameLeft,bx
 mov wNextLeft,bx

 mov bx,[si].PixelWidth

if need_osk ne 0

 cmp bx,-1
 jnz gcl4e

 push ax
 mov ah,16+3
 call PointControlMsgItem
 pop ax
 or bx,bx
 jz gcl4e4

 cmp bScreenMode,VGA_MODE
 jz gcl4e1
 cmp bEnlargeFlag,0
 jnz gcl4e3
 mov bx,[bx+4]
 jmp gcl4f
gcl4e3
 mov bx,[bx+6]
 jmp gcl4f

gcl4e1:

 cmp bEnlargeFlag,0
 jnz gcl4e2
 mov bx,[bx]
 jmp gcl4f
gcl4e2
 mov bx,[bx+2]
gcl4f
 jmp glc4a
gcl4e4
 mov bx,-1

endif

gcl4e.
 cmp bx,SAMEWIDE
 jnz gcl4
 mov bx,wSameWide
 jmp glc4a

gcl4
if need_osk ne 0

 cmp bEnlargeFlag,0
 jz gcl1e

 cmp al,FORM
 jz gcl1e
 cmp al,CHISELBOX
 jz gcl1e

 push dx
 push ax
 mov ax,4
 mul bx
 mov bx,3
 div bx
 mov bx,ax
 test bl,11b

 jz ewe
 add bx,8
 and bl,11111000b

ewe:
 pop ax
 pop dx

gcl1e
 cmp bScreenMode,VGA_MODE
 jz glc4a

 cmp bEnlargeFlag,0
 jnz glc4a

 test [si].ControlState,WIDEN
 jz glc4a
 test [si].ControlState,DOUBLEWIDEN
 jz glc4c
 add bx,8
glc4c
 add bx,8

endif

glc4a:
 and bl,11111100b
 mov wSameWide,bx
 mov rRegion.wCurrentWidth,bx
 add wNextLeft,bx
 add bx,cx
 dec bx
 mov rRegion.wCurrentRight,bx

if need_osk ne 0
 cmp bScreenMode,VGA_MODE
 jz gcu10

 test [si].ControlState,COMPENSATE
 jz glc4r
 test [si].LeftPixel,FROMRIGHT
 jnz glc4r
 sub wNextLeft,8

glc4r:

 test [si].ControlState,WIDEN
 jz gcu10
 test [si].ControlState,COMPENSATE
 jz gcu10b

 add wNextLeft,8
gcu10b

 cmp bEnlargeFlag,0
 jz gcu10
gcu10a:
 sub rRegion.wCurrentWidth,8
 sub rRegion.wCurrentRight,8
endif

gcu10.

 mov bx,[si].PixelHeight
 or bx,bx
 jnz gcu1

 call isdlegend
 jnz gcu1

 call GetLegendHeight
 jmp short gcu2

gcu1.

 call HandleHeightConstants

gcu2.
 mov rRegion.wCurrentHeight,bx
 mov wSameHigh,bx
 add wNextTop,bx
 add bx,dx
 dec bx
 mov rRegion.wCurrentBottom,bx

if need_osk ne 0
 cmp al,FORM
 jnz htf1
 cmp bScreenMode,VGA_MODE
 jz htf1
 mov bx,16
 add rRegion.wCurrentRight,bx
 add rRegion.wCurrentWidth,bx
 add bx,8
 add rRegion.wCurrentBottom,bx
 add rRegion.wCurrentHeight,bx

endif

htf1:
 cmp al,FRAME
 jnz glc4b
 push wNextLeft
 pop wNextFrameLeft
 push wNextTop
 pop wNextFrameTop
 push wSameTop
 pop wSameFrameTop

glc4b:
 ret
GetControlRegion endp

AddControlToActiveList proc near
 public AddControlToActiveList
 test ah,DISABLED
 jnz actal1

if NEED_ALTKEYS ne 0
 push ax
 mov al,bUnderLinedCharacter
 mov ah,128
 cmp al,"z"
 ja atal1
 cmp al,"a"
 jb atal1
 sub al,32
atal1:
 mov rRegion.wListItemIndex,ax
 pop ax
endif

 mov si,offset rRegion
 call StoreRegion

if NEED_ALTKEYS ne 0
 mov rRegion.wListItemIndex,0
 mov bUnderLinedCharacter,0
endif
actal1:
 ret
AddControlToActiveList endp

AddLegendToActiveList proc near
 public AddLegendToActiveList

 test ah,DISABLED or GRAYED
 jnz alta1

 push rRegion.pCurrentControl
 pop rLegendRegion.pCurrentControl

 mov rLegendRegion.wCurrentHeight,-1
 mov si,offset rLegendRegion
 call StoreRegion
alta1:
 ret
AddLegendToActiveList endp

CheckHeightEnlarge proc near
if need_osk ne 0

 cmp bEnlargeFlag,0
 jz gcl3e
 cmp bScreenMode,VGA_MODE
 jz che1

 cmp al,ABOUTBUTTON
 jz che1
 cmp al,COMMANDBUTTON
 jb che1
 jmp gcl3e

che1
 push ax
 push dx
 mov ax,5
 mul bx
 mov bx,3
 div bx
 mov bx,ax
 pop dx
 pop ax

endif

gcl3e:
 ret
CheckHeightEnlarge endp

CheckPenDownCoordinates proc near
 public CheckPenDownCoordinates

 mov pPenDownActiveRegion,0
 mov pPenDownLegendRegion,0
 mov ax,wPenDownColumn
 mov dx,wPenDownRow
 call SearchActiveRegions
 mov pPenDownActiveRegion,di
 mov si,di
 ret
CheckPenDownCoordinates endp

DefineCoveredArea proc near
 public DefineCoveredArea

 push ax
 mov ax,[bx].TopPixel

 mov wCoveredAreaTopHold,ax
 mov wCoveredAreaTop,-1
 add ax,[bx].PixelHeight
 mov wCoveredAreaBottom,ax
 mov ax,[bx].LeftPixel
 test ah,100b
 jz dca3
 or ah,11111000b
dca3:

push ax
DIVIDE_BY_8 ax
mov wCoveredAreaLeft,ax
pop ax
add ax,[bx].PixelWidth
dec ax
DIVIDE_BY_8 ax
mov wCoveredAreaRight,ax
mov ax,[bx].PixelHeight
mov wCoveredAreaHeight,ax
mov ax,[bx].PixelWidth
DIVIDE_BY_8 ax
mov wCoveredAreaWidth,ax
mov bCoveredAreaOnly,0
pop ax
ret
DefineCoveredArea endp

FindRegionForControl proc near
 public FindRegionForControl

 mov bx,offset rActiveRegions
uaob8:
 cmp bx,pOSKFirstRegion
 jae uaob4
 cmp bx,pNextActiveRegion
 jae uaob4
 cmp [bx].pCurrentControl,si
 jz uaob5
 add bx,type rActiveRegions
 jmp uaob8

uaob5.
 clc
 ret

uaob4:
 stc
 ret
FindRegionForControl endp

HandleHeightConstants proc near

 cmp bx,SAMEHIGH
 jnz gcl3
 cmp al,FRAME
 jz gcl3a
 mov bx,wSameHigh
gcl3a:
 ret

gcl3:
 cmp bx,H100
 jae gcl5
 ret

gcl5:
 cmp bScreenMode,VGA_MODE
 jz gcl8

 cmp bx,H50
 jnz gcl5e
 mov bx,H50TEXTHEIGHT
 ret

gcl5e:
 call CheckHeightEnlarge

 cmp bx,H100
 jnz gcl5a
 mov bx,H100TEXTHEIGHT
 ret

gcl5a:
 cmp bx,H166
 jnz gcl5b
 mov bx,H166TEXTHEIGHT
 ret

gcl5b:
 cmp bx,H200
 jnz gcl5c
 mov bx,H200TEXTHEIGHT
 ret

gcl5c:
 cmp bx,H333
 jnz gcl5d
 mov bx,H333TEXTHEIGHT
 ret

gcl5d:

 push dx
 push ax
 mov ax,bx
 xor dx,dx
```

```
mov bx,1200
div bx
mov bx,H100TEXTHEIGHT
mul bx
mov bx,ax
pop ax
pop dx
ret

gcl6:
 cmp bx,H50
 jnz gcl6e
 mov bx,H50VGAHEIGHT
 ret
gcl6e:
 call CheckHeightEnlarge
 cmp bx,H100
 jnz gcl6a
 mov bx,H100VGAHEIGHT
 ret

gcl6a:
 cmp bx,H188
 jnz gcl6b
 mov bx,H188VGAHEIGHT
 ret

gcl6b:
 cmp bx,H200
 jnz gcl6c
 mov bx,H200VGAHEIGHT
 ret

gcl6c:
 cmp bx,H333
 jnz gcl6d
 mov bx,H333VGAHEIGHT
 ret

gcl6d:

 push dx
 push ax
 mov ax,bx
 xor dx,dx
 mov bx,1200
 div bx
 mov bx,H100VGAHEIGHT
 mul bx
 mov bx,ax
 pop ax
 pop dx
 ret
HandleHeightConstants endp

HandleLeftConstants proc near

 test bh,11111100b
 jnz hlc1
 ret

hlc1:
 and bh,not(FROMRIGHT/256)

 cmp bx,SAMELEFT - 511
 jb hlc9

 cmp bx,NEXTLEFT - 511
 jb hlc4

 cmp bx,NEXTFRAMELEFT - 511
 jb hlc5

 jmp hlc6

 hlc4:

  sub bx,SAMELEFT
  add bx,wSameLeft
  jmp hlc9

 hlc5:
  sub bx,NEXTLEFT
  add bx,wNextLeft
  jmp hlc9

 hlc6:
  sub bx,NEXTFRAMELEFT
  add bx,wNextFrameLeft
  jmp hlc9

 hlc9:
  ret
 HandleLeftConstants endp

 HandleTopConstants proc near
 test dh,11111100b
jnz htc1
ret
htc1:
 test dh,80h
 jz htc2
 test dh,40h
 jz htc1a

 push wPriorPriorNextTop
 pop wNextTop
 push wPriorPriorSameTop
 pop wSameTop
 jmp htc1b

htc1a:
 push wPriorNextTop
 pop wNextTop
 push wPriorSameTop
 pop wSameTop

htc1b:
 and dh,not(80h+40h)

htc2:

 and dh,not(FROMRIGHT/256)

 cmp dx,SAMETOP - 511
 jb htc9

 cmp dx,NEXTTOP - 511
 jb htc4

 cmp dx,SAMEFRAMETOP - 511
 jb htc5

 cmp dx,NEXTFRAMETOP - 511
 jb htc6

 cmp dx,NEXTTOP50 - 511
 jb htc7

 jmp htc8
htc4:

 sub dx,SAMETOP
 add dx,wSameTop
 jmp htc9

htc5:
 sub dx,NEXTTOP
 add dx,wNextTop
 jmp htc9

htc6:
 sub dx,SAMEFRAMETOP
 add dx,wSameFrameTop
 jmp htc9

htc7:
 sub dx,NEXTFRAMETOP
 add dx,wNextFrameTop
 jmp htc9

htc8:
 sub dx,NEXTTOP50
 add dx,wNextTop
 cmp bScreenMode,VGA_MODE
 jnz htc8a
 add dx,H50VGAHEIGHT
 jmp htc9

htc8a:
 add dx,H50TEXTHEIGHT
 jmp htc9
htc9:
 ret
HandleTopConstants endp

PointAssociatedLegend proc near
 public PointAssociatedLegend

 push ax
 mov ax,[si].pCurrentControl
 add si,type rRegion
 cmp ax,[si].pCurrentControl
 pop ax
 ret
PointAssociatedLegend endp

PopRegion proc near
 public PopRegion
 mov si,offset rPushedRegion
 call RestoreRegion
 ret
PopRegion endp

PushRegion proc near
 public PushRegion
push si
push di
push ds
pop es
mov si,offset rRegion
mov di,offset rPushedRegion
mov cx,type rRegion
rep movsb
pop di
pop si
ret
PushRegion endp

RestorePenRegion proc near
 public RestorePenRegion
 xor cx,cx
 mov dx,639
 call SetPenColumnRegion
 xor cx,cx
 mov dx,479
 call SetPenRowRegion
 ret
RestorePenRegion endp

RestoreRegion proc near
 public RestoreRegion

 mov di,offset rRegion
 push ds
 pop es
 mov cx,type rRegion
 rep movsb
 mov cx,rRegion.wCurrentLeft
 mov dx,rRegion.wCurrentTop
 mov si,rRegion.pCurrentControl
 mov ax,[si]
 ret
RestoreRegion endp

SearchActiveRegions proc near
 public SearchActiveRegions

 push si
 xor di,di
 mov si,offset rActiveRegions

cpdc2:
 cmp si,pNextActiveRegion
 jae cpdc3

 cmp bModalFlag,0
 jz cpdc2a
 cmp [si].pCurrentControl,offset frmFirstModalForm
 jb cpdc1
cpdc2a:

 cmp cx,[si].wCurrentLeft
 jl cpdc1
 cmp cx,[si].wCurrentRight
 jg cpdc1
 cmp dx,[si].wCurrentTop
 jl cpdc1
 cmp dx,[si].wCurrentBottom
 jg cpdc1

 mov di,si

cpdc1:
 add si,type rActiveRegions
 jmp short cpdc2

cpdc3:
 or di,di
 pop si
 ret
SearchActiveRegions endp

StoreRegion proc near
 public StoreRegion

 mov di,pNextActiveRegion
 push ds
 pop es
 mov cx,type rRegion
 rep movsb
 mov pNextActiveRegion,di
 ret
StoreRegion endp

UpdateLegendRegion proc near
 public UpdateLegendRegion

 push bp
 push bx
 push ax
 mov bp,sp
 mov rLegendRegion.wCurrentTop,dx
mov rLegendRegion.wCurrentLeft,cx
call GetLabelWidth
test bh,CENTERED
jz ulb1

mov bx,[bp]
sar bx,1
add bx,rLegendRegion.wCurrentLeft
push ax
sar ax,1
sub bx,ax
mov rLegendRegion.wCurrentLeft,bx
pop ax
add ax,bx
jmp ulb2

ulb1:
 add ax,cx
ulb2:
 mov rLegendRegion.wCurrentRight,ax
 pop ax
 pop bx
 pop bp
 ret
UpdateLegendRegion endp
end
Copr 1995 Zenith Data Systems Corp

.model small
.code
extrn Repaint:near
extrn RepaintIndividualControl:near
extrn SetNewTabItem:near
extrn SetNewTabItem:near
extrn StoreRegion:near
extrn UndoCurrentTabItem:near



include wincluid.inc
DATASEG_BEGIN
extrn ControlDataStorageArea:byte
extrn pClickRegion:word
extrn pNextActiveRegion:word
extrn pPenDownActiveRegion:word
extrn rActiveRegions:tRegion
extrn rLegendRegion:tRegion
extrn rREGION:tREGION

DATASEG_END

.code

DoSlideBarPenDown proc near
 public DoSlideBarPenDown

 mov bx,[si].PixelWidth
 sub cx,[di].wCurrentLeft
 jge dsbpd2
 xor cx,cx
dsbpd2:
 sub bx,8
 cmp cx,bx
 jbe dsbpd4
 mov cx,bx
dsbpd4:

 mov ax,100
 mul cx
 div bx
  mov cl,byte ptr [si].id[1]
  xor ch,ch
  dec cx
 mul cx
 mov cx,100
 div cx
 cmp dx,50
 jb dsbpd1
 inc ax
dsbpd1:

 mov bx,[si].pStorageOffset
 cmp byte ptr [bx],al
 je dsbpd3
 call SetSlideBarPosition
dsbpd3:

 ret
DoSlideBarPenDown endp

SetSlideBarPosition proc near
 push bx
 push ax
 call UndoCurrentTabItem
 mov pClickRegion,di
```

```
pop ax
pop bx

mov byte ptr [bx],al
mov bl,al
xor bh,bh
mov ax,[si].ID
   xor ah,ah
SM_FUNCTION ax
mov ax,[si]
call RepaintIndividualControl

push pNextActiveRegion
mov di,pClickRegion
add di,type rRegion
mov pNextActiveRegion,di
mov rLegendRegion.pCurrentControl,si
mov si,offset rLegendRegion
call StoreRegion
pop pNextActiveRegion

call SetNewTabItem
mov pClickRegion,0
ret
SetSlideBarPosition endp

DoSlideBarRightArrow proc near
 public DoSlideBarRightArrow

 mov pPenDownActiveRegion,di
 mov bx,[si].pStorageOffset
 mov al,byte ptr [bx]
  push ax
  mov ah,byte ptr [si+1].d
  dec ah
  cmp al,ah
  pop ax
  jae dsbra1
  inc al
  call SetSlideBarPosition
dsbra1
 mov pPenDownActiveRegion,0
  ret
DoSlideBarRightArrow endp

DoSlideBarLeftArrow proc near
 public DoSlideBarLeftArrow
  mov pPenDownActiveRegion,di
  mov pClickRegion,di
  mov bx,[si].pStorageOffset
  mov al,byte ptr [bx]
  or al,al
  jz dsbla1
  dec al
  call SetSlideBarPosition
dsbla1:
   mov pPenDownActiveRegion,0
   ret
DoSlideBarLeftArrow endp
end


Copr 1995 Zenith Data Systems Corp
.MODEL SMALL
include uincludi.inc
DATASEG_BEGIN
extrn ControlDataStorageArea:byte
extrn bDoingSpin:byte
extrn pPenDownActiveRegion:word
extrn rActiveRegions:tRegion
extrn rRegion:tRegion
DATASEG_END


.code
extrn FindRegionForControl:near
extrn GoPreviousControl:near
extrn GoPreviousControl:near
extrn IsItEditBox:near
extrn RepaintIndividualControl:near
extrn SetNumericControl:near


DoSpinDown proc near
 public DoSpinDown
 push si
 call SetPreviousEditFieldForSpin
 jc dsd1

 cmp cx,4
 jb dsd13

 mov cx,10
dsd14:
 call DecrementAsciiField
 loop dsd14
 jmp dsd15
dsd13:
 call DecrementAsciiField
dsd15:
 call RepaintSpinnedEditBox
dsd1:
 pop si
 mov rRegion.pCurrentControl,si
 ret
DoSpinDown endp

DecrementAsciiField proc near


 push di
dsd11:
 dec di
 cmp di,bx
 jb dsd10
 mov al,[di]
 cmp al,"9"
 ja dsd11
 cmp al,"0"
 jb dsd11
 jz dsd12
 dec byte ptr [di]
 jmp dsd10
dsd12:
 mov byte ptr [di],"9"
 jmp dsd11
dsd10:
 pop di
 ret
DecrementAsciiField endp

DoSpinUp proc near
 public DoSpinUp

 push si
 call SetPreviousEditFieldForSpin
 jc dsu1
 cmp cx,4
 jb dsu13


 mov cx,10
dsu14:
 call IncrementAsciiField
 loop dsu14
 jmp dsu15

dsu13:
 call IncrementAsciiField

dsu15:
 call RepaintSpinnedEditBox
dsu1:
 pop si
 mov rRegion.pCurrentControl,si
 ret
DoSpinUp endp

SetPreviousEditFieldForSpin proc near


 mov rRegion.pCurrentControl,si
dsu2:
 call GoPreviousControl
 jnc dsu2a
 ret
dsu2a:
 mov ax,[si]
 call IsItEditBox
 jnz dsu2

 push ds
 pop es
 mov di,[si].wDataLength

 mov cx,di
 mov bx,[si].pStorageOffset
 add di,bx
 dec di
 push di

 push si
 mov si,bx
dsu4:
 cmp si,di
 ja dsu5
 lodsb
 or al,al
 jnz dsu4
dsu3:
 dec si

 std
dsu8
 movsb
 cmp si,bx
 jae dsu8
 mov al,"0"
dsu7:
 cmp di,bx
 jb dsu5
 stosb
 jmp dsu7
dsu5:
 cld
 pop si
 pop di
 clc
 ret
SetPreviousEditFieldForSpin endp

RepaintSpinnedEditBox proc near
 call SetNumericControl
 call FindRegionForControl
 jc dsu1c

 push pPenDownActiveRegion
 mov pPenDownActiveRegion,bx
 mov bDoingSpin,-1
 call RepaintIndividualControl
 mov bDoingSpin,0
 pop pPenDownActiveRegion
dsu1c:
 ret
RepaintSpinnedEditBox endp

IncrementAsciiField proc near

 push di
dsu11:
 dec di
 cmp di,bx
 jb dsu10
 mov al,[di]
 cmp al,"0"
 jb dsu11
 cmp al,"9"
 ja dsu11
 jz dsu12
 inc byte ptr [di]
 jmp dsu10
dsu12:
 mov byte ptr [di],"0"
 jmp dsu11
dsu10
 pop di
 ret
IncrementAsciiField endp
end


Copr. 1995 Zenith Data Systems Corp.

.MODEL SMALL
include uincludi.inc
DATASEG_BEGIN
extrn wHotKeyRightPixel:word
extrn ControlDataStorageArea:byte
extrn OSK:tControl
extrn VSBBacking:tControl
extrn VSBDnArrow:tControl
extrn VSBSlider:tControl
extrn bModalFlag:byte
extrn bPenEventHappened:byte
extrn tmFirstModalForm:tControl
extrn pClickRegion:word
extrn pNextActiveRegion:word
extrn pOSKFirstRegion:word
extrn rActiveRegions:tRegion
extrn rTabRegion:tREGION
extrn vsbBacking:tControl
extrn vsbSlider:tControl
extrn wPenDownColumn:word
extrn wPenDownRow:word
extrn wShortCutKey:word
extrn bMoveMode:byte
pTabHandler  dw 0
 public pTabHandler

pOrgTabRegion dw 0
pTabRegion dw 0
 public pTabRegion


pTabRegionHold dw 0
 public pTabRegionHold
wTabLoopCount dw 0
pDelayedSetControl dw 0
 public pDelayedSetControl
pDelayedSetRegion dw 0
 public pDelayedSetRegion
extrn rCursorRegion:tREGION

DATASEG_END


.CODE
extrn DoClickEvent:near
extrn DrawDashedXORBox:near
extrn DrawSolidXorBox:near
extrn FindRegionForControl:near
extrn PointAssociatedLegend:near
extrn ProtectOSK:near
extrn RetainOSKRightAndShow:near
extrn SetProtectionForControl:near
extrn ShowOSKForClick:near
extrn StartCursor:near
extrn StopCursor:near
extrn SetTextControl:near

DoTab proc near
 public DoTab


 mov wShortCutKey,0

DoTab1.

 mov wTabLoopCount,0

 mov wPenDownColumn,-1
 mov wPenDownRow,-1
 mov bPenEventHappened,0

 mov si,pTabRegion
 or si,si
 jnz hat3
 mov wShortCutKey,0
 stc
 ret

hat3.
 call word ptr pTabHandler


hat1:


if NEED_ALTKEYS ne 0
 cmp si,pTabRegion
 jnz hat6
 push ax
 mov ax,wShortCutKey
 cmp ax,[si].wListItemIndex
 pop ax
 jz hat2
 push pClickRegion
 mov pClickRegion,si
 call ShowTabBox
 pop pClickRegion
 stc
 ret
hat6:
 inc wTabLoopCount
 cmp wTabLoopCount,MAX_ACTIVE_CONTROLS
 jbe hat5
 stc
 ret
hat5.
 cmp wShortCutKey,0
 jz hat1b
 push ax
 mov ax,wShortCutKey
 cmp ax,[si].wListItemIndex
 pop ax
 jnz hat3
 mov wShortCutKey,0
hat1b.
endif

 test [si].bListItemFlags,128
 jnz hat1a
 cmp [si].wCurrentHeight,-1
 jnz hat2
 test [si].bListItemFlags,2
 jnz hat2
hat1a:
 call word ptr pTabHandler
 jnc hat1c
 ret

hat1c:
 jmp hat1

hat2:
 push pClickRegion
 mov pClickRegion,si
 call ShowTabBox
 pop pClickRegion
 clc
 ret
DoTab endp

IsItButton proc near
 public IsItButton
```

```
 cmp al,FIRSTBUTTONTYPE
 jb nb1
 cmp al,LASTBUTTONTYPE
 ja nb1
 cmp ax,ax
nb1:
 ret
IsItButton endp

IsItCheckBox proc near
 public IsItCheckBox

 cmp al,CHECKBOX
 jz icb1
 cmp al,OPTIONBUTTON
icb1:
 ret
IsItCheckBox endp

IsItEditBox proc near
 public IsItEditBox

 cmp al,FIRSTEDITBOXTYPE
 jb neb1
 cmp al,LASTEDITBOXTYPE
 ja neb1
 cmp ax,ax
neb1
 ret
IsItEditBox endp

IsItLegend proc near
 public IsItLegend
 cmp al,FIRSTLEGENDTYPE
 jb nl1
 cmp al,LASTLEGENDTYPE
 ja nl1
 cmp ax ax
il1
 ret
IsItLegend endp

IsItListBox proc near
 public IsItListBox

 cmp al,FIRSTLISTBOXTYPE
 jb nlb1
 cmp al,LASTLISTBOXTYPE
 ja nlb1
 cmp ax,ax
ilb1
 ret
IsItListBox endp



IsItSlideBar proc near
 public IsItSlideBar
 cmp al,SLIDEBAR
 jz isb1
 cmp al,SPECTRUMBAR
isb1:
 ret
IsItSlideBar endp

PointNextTabControl proc near
 public PointNextTabControl
 mov pOrgTabRegion,si
 jmp dke2bb
dke2b
 cmp si,pOrgTabRegion
 jnz dke2bb
 stc
 ret
dke2bb.
 add si,size rActiveRegions
 cmp si,pOSKFirstRegion
 jae dke2aa
 cmp si,pNextActiveRegion
 jb dke2a

dke2aa.
 mov si,offset rActiveRegions

dke2a
 call CheckSkipTab
 jnz dke2b
 clc
 ret
PointNextTabControl endp

PointPreviousTabControl proc near
 public PointPreviousTabControl
pptc2
 sub si,size rActiveRegions
 cmp si,offset rActiveRegions
 jae pptc1
 mov si,pNextActiveRegion
 sub si,size rActiveRegions
 cmp si,pOSKFirstRegion
 jb pptc1
 mov si,pOSKFirstRegion
 sub si,size rActiveRegions
pptc1:
 call CheckSkipTab
 jnz pptc2
 ret
PointPreviousTabControl endp

SetInitialTab proc near
 public SetInitialTab
 call FindRegionForControl
 jc sit1
 mov pClickRegion,bx
 push [bx].wCurrentTop
 pop rCursorRegion.wCurrentTop

 call DoClickEvent
sit1:
 ret
SetInitialTab endp

SetNewTabItem proc near
 public SetNewTabItem

 mov si,pClickRegion
 or si,si
 jz snti1
 call SetNewTabItemWork
snti1
 ret
SetNewTabItem endp

Se. ewTabItemWork proc near
 p. nic SetNewTabItemWork
 or si,si
 jz dce4a
 call SetTabControl
SetNewTabItemWork1:
 public SetNewTabItemWork1
 push si
 mov si,[si].pCurrentControl
 call SetProtectionForControl
 mov bx,si
 pop si
 mov ax,[bx]

 call ISITEDITBOX
 jnz dce4c
 push ax
 push wHotKeyRightPixel
 call ShowOSKForCLick
 pop wHotKeyRightPixel
 call STARTCURSOR
 pop ax
if need_osk ne 0
endif
 jmp dce4a
dce4c:

 call ISITLISTBOX
 jnz dce4e
 call DrawDashedXORBox
 jmp dce4a
dce4e:

 call ShowCommandButtonTabBox
 push bx
 mov bx,[si].pCurrentControl
 cmp [bx].ControlType,Toolbarbutton
 pop bx
 jz dce4a
 c .. PointAssociatedLegend
 jnz dce4a
dce4g:
 call DrawDashedXORBox
dce4a:

 ret
SetNewTabItemWork endp

SetTabControl proc near
 push si
 mov pTabRegion,si
 mov cx,type rTabRegion
 mov di,offset rTabRegion
 push ds
 pop es
 rep movsb
 pop si
 ret
SetTabControl endp

ShowCommandButtonTabBox proc near
 push bx
 push si
 mov bx,[si].pCurrentControl
 mov al,[bx]
 call ISITBUTTON
 jnz scitb1x
 cmp al,TOOLBARBUTTON
 jz scbt1a
 cmp al,SYMBOLBUTTON
 jb sctb1z
sctb1x:
 cmp al,closebutton
 jz scbt1q
 cmp al,aboutbutton
 jz scbt1q

 jmp scbt1
sctb1z:
 cmp bx,offset vsbSlider
 jnz scbt4
 add [si].wCurrentTop,4
 sub [si].wCurrentBottom,4
 add [si].wCurrentLeft,8
 sub [si].wCurrentRight,4
 call DrawDashedXorBox
 add [si].wCurrentRight,4
 sub [si].wCurrentLeft,8
 add [si].wCurrentBottom,4
 sub [si].wCurrentTop,4
 jmp scbt1
scbt4.

 cmp bx,offset vsbBacking
 jb scbt2
 cmp bx,offset vsbDnArrow
 ja scbt2
 jmp scbt1
scbt1r.
 mov cx,3
 mov dx,1
 jmp scbt1aa
scbt1q.
 mov cx,4
 mov dx,8
 jmp scbt1aa
scbt1a:
 mov cx,3
 mov dx,20
scbt1aa:
 xor ax,ax
 test [bx].ControlState,ISDOWN
 jz scbt2b
 inc ax
 inc ax
scbt2b:
 add cx,ax
 add dx,ax
 mov ax,-1

 jmp scbt2a
scbt2:

 mov cx,-1
 mov dx,0
 xor ax,ax
scbt2a:
 add [si].wCurrentTop,cx
 sub [si].wCurrentBottom,cx
 add [si].wCurrentLeft,dx
 sub [si].wCurrentRight,dx

 push dx
 push cx

 or ax,ax
 jz scbt5
 call DrawDashedXORBox
 jmp scbt6
scbt5:
 call DrawSolidXORBox
scbt6
 pop cx
 pop dx
 sub [si].wCurrentTop,cx
 add [si].wCurrentBottom,cx
 sub [si].wCurrentLeft,dx
 add [si].wCurrentRight,dx

scbt1:
 pop si
 pop bx
 ret


ShowCommandButtonTabBox endp

ShowTabBox proc near
 public ShowTabBox

 push ax
 mov ax,pClickRegion
 cmp ax,pOSKFirstRegion
 pop ax
 jae stbx1
 call UndoCurrentTabItem
 call SetNewTabItem
 call HandleDelayedSet
stbx1:
 ret
ShowTabBox endp

UndoCurrentTabItem proc near
 public UndoCurrentTabItem


If need_osk ne 0
 call ProtectOSK
endif

 push si
 push di
 mov si,pTabRegion
 or si,si
 jz stb1
 push si
 call StopCursor
 call ShowCommandButtonTabBox
 pop si
stb3:
 push si
 mov si,[si].pCurrentControl
 mov al,[si].ControlType
 pop si
 cmp al,Toolbarbutton
 jz stb1
 call IsItListBox
 jz stb2

 call PointAssociatedLegend
 jnz stb1
stb2:
 call DrawDashedXORBox

stb1.
 pop di
 pop si
 ret
UndoCurrentTabItem endp

CheckSkipTab proc near
 push bx
 mov bx,[si].pCurrentControl
 cmp bModalFlag,0
 jz cst1
 cmp bx,offset frmFirstModalForm
 jb cst2
cst1:
 mov bl,[bx].ControlState
 test bl,SKIPTAB or DISABLED or GRAYED
cst2
 pop bx
 ret
CheckSkipTab endp

HandleDelayedSet proc near
 public HandleDelayedSet

 cmp pDelayedSetControl,0
 jz hds1
 push ax
 push si
 cmp bMoveMode,0
 jnz hst2
 mov ax,pTabRegion
 cmp ax,pDelayedSetRegion
 jz hst2
 xor si,si
 mov si,pDelayedSetControl
 call SetTextControl
 mov pDelayedSetControl,0
hst2:
 pop si
 pop ax
hds1:
 ret
HandleDelayedSet endp
END
```

Copr 1995 Zenith Data Systems Corp.

```
________ equ 0
_______X equ 1
______X_ equ 2
______XX equ 3
```

```
_____X__ equ 4
_____X_X equ 5
_____XX_ equ 6
_____XXX equ 7
____X___ equ 8
____X__X equ 9
____X_X_ equ 10
____X_XX equ 11
____XX__ equ 12
____XX_X equ 13
____XXX_ equ 14
____XXXX equ 15
___X____ equ 16
___X___X equ 17
___X__X_ equ 18
___X__XX equ 19
___X_X__ equ 20
___X_X_X equ 21
___X_XX_ equ 22
___X_XXX equ 23
___XX___ equ 24
___XX__X equ 25
___XX_X_ equ 26
___XX_XX equ 27
___XXX__ equ 28
___XXX_X equ 29
___XXXX_ equ 30
___XXXXX equ 31
__X_____ equ 32
__X____X equ 33
__X___X_ equ 34
__X___XX equ 35
__X__X__ equ 36
__X__X_X equ 37
__X__XX_ equ 38
__X__XXX equ 39
__X_X___ equ 40
__X_X__X equ 41
__X_X_X_ equ 42
__X_X_XX equ 43
__X_XX__ equ 44
__X_XX_X equ 45
__X_XXX_ equ 46
__X_XXXX equ 47
__XX____ equ 48
__XX___X equ 49
__XX__X_ equ 50
__XX__XX equ 51
__XX_X__ equ 52
__XX_X_X equ 53
__XX_XX_ equ 54
__XX_XXX equ 55
__XXX___ equ 56
__XXX__X equ 57
__XXX_X_ equ 58
__XXX_XX equ 59
__XXXX__ equ 60
__XXXX_X equ 61
__XXXXX_ equ 62
__XXXXXX equ 63
_X______ equ 64
_X_____X equ 65
_X____X_ equ 66
_X____XX equ 67
_X___X__ equ 68
_X___X_X equ 69
_X___XX_ equ 70
_X___XXX equ 71
_X__X___ equ 72
_X__X__X equ 73
_X__X_X_ equ 74
_X__X_XX equ 75
_X__XX__ equ 76
_X__XX_X equ 77
_X__XXX_ equ 78
_X__XXXX equ 79
_X_X____ equ 80
_X_X___X equ 81
_X_X__X_ equ 82
_X_X__XX equ 83
_X_X_X__ equ 84
_X_X_X_X equ 85
_X_X_XX_ equ 86
_X_X_XXX equ 87
_X_XX___ equ 88
_X_XX__X equ 89
_X_XX_X_ equ 90
_X_XX_XX equ 91
_X_XXX__ equ 92
_X_XXX_X equ 93
_X_XXXX_ equ 94
_X_XXXXX equ 95
_XX_____ equ 96
_XX____X equ 97
_XX___X_ equ 98
_XX___XX equ 99
_XX__X__ equ 100
_XX__X_X equ 101
_XX__XX_ equ 102
_XX__XXX equ 103
_XX_X___ equ 104
_XX_X__X equ 105
_XX_X_X_ equ 106
_XX_X_XX equ 107
_XX_XX__ equ 108
_XX_XX_X equ 109
_XX_XXX_ equ 110
_XX_XXXX equ 111
_XXX____ equ 112
_XXX___X equ 113
_XXX__X_ equ 114
_XXX__XX equ 115
_XXX_X__ equ 116
_XXX_X_X equ 117
_XXX_XX_ equ 118
_XXX_XXX equ 119
_XXXX___ equ 120
_XXXX__X equ 121
_XXXX_X_ equ 122
_XXXX_XX equ 123
_XXXXX__ equ 124
_XXXXX_X equ 125
_XXXXXX_ equ 126
_XXXXXXX equ 127
X_______ equ 128
X______X equ 129
X_____X_ equ 130
X_____XX equ 131
X____X__ equ 132
X____X_X equ 133
X____XX_ equ 134
X____XXX equ 135
X___X___ equ 136
X___X__X equ 137
X___X_X_ equ 138
X___X_XX equ 139
X___XX__ equ 140
X___XX_X equ 141
X___XXX_ equ 142
X___XXXX equ 143
X__X____ equ 144
X__X___X equ 145
X__X__X_ equ 146
X__X__XX equ 147
X__X_X__ equ 148
X__X_X_X equ 149
X__X_XX_ equ 150
X__X_XXX equ 151
X__XX___ equ 152
X__XX__X equ 153
X__XX_X_ equ 154
X__XX_XX equ 155
X__XXX__ equ 156
X__XXX_X equ 157
X__XXXX_ equ 158
X__XXXXX equ 159
X_X_____ equ 160
X_X____X equ 161
X_X___X_ equ 162
X_X___XX equ 163
X_X__X__ equ 164
X_X__X_X equ 165
X_X__XX_ equ 166
X_X__XXX equ 167
X_X_X___ equ 168
X_X_X__X equ 169
X_X_X_X_ equ 170
X_X_X_XX equ 171
X_X_XX__ equ 172
X_X_XX_X equ 173
X_X_XXX_ equ 174
X_X_XXXX equ 175
X_XX____ equ 176
X_XX___X equ 177
X_XX__X_ equ 178
X_XX__XX equ 179
X_XX_X__ equ 180
X_XX_X_X equ 181
X_XX_XX_ equ 182
X_XX_XXX equ 183
X_XXX___ equ 184
X_XXX__X equ 185
X_XXX_X_ equ 186
X_XXX_XX equ 187
X_XXXX__ equ 188
X_XXXX_X equ 189
X_XXXXX_ equ 190
X_XXXXXX equ 191
XX______ equ 192
XX_____X equ 193
XX____X_ equ 194
XX____XX equ 195
XX___X__ equ 196
XX___X_X equ 197
XX___XX_ equ 198
XX___XXX equ 199
XX__X___ equ 200
XX__X__X equ 201
XX__X_X_ equ 202
XX__X_XX equ 203
XX__XX__ equ 204
XX__XX_X equ 205
XX__XXX_ equ 206
XX__XXXX equ 207
XX_X____ equ 208
XX_X___X equ 209
XX_X__X_ equ 210
XX_X__XX equ 211
XX_X_X__ equ 212
XX_X_X_X equ 213
XX_X_XX_ equ 214
XX_X_XXX equ 215
XX_XX___ equ 216
XX_XX__X equ 217
XX_XX_X_ equ 218
XX_XX_XX equ 219
XX_XXX__ equ 220
XX_XXX_X equ 221
XX_XXXX_ equ 222
XX_XXXXX equ 223
XXX_____ equ 224
XXX____X equ 225
XXX___X_ equ 226
XXX___XX equ 227
XXX__X__ equ 228
XXX__X_X equ 229
XXX__XX_ equ 230
XXX__XXX equ 231
XXX_X___ equ 232
XXX_X__X equ 233
XXX_X_X_ equ 234
XXX_X_XX equ 235
XXX_XX__ equ 236
XXX_XX_X equ 237
XXX_XXX_ equ 238
XXX_XXXX equ 239
XXXX____ equ 240
XXXX___X equ 241
XXXX__X_ equ 242
XXXX__XX equ 243
XXXX_X__ equ 244
XXXX_X_X equ 245
XXXX_XX_ equ 246
XXXX_XXX equ 247
XXXXX___ equ 248
XXXXX__X equ 249
XXXXX_X_ equ 250
XXXXX_XX equ 251
XXXXXX__ equ 252
XXXXXX_X equ 253
XXXXXXX_ equ 254
XXXXXXXX equ 255
Copr. 1995 Zenith Data Systems Corp.
NEED_ABOUTICON equ 1
NEED_OSK    equ 1
NEED_TSR    equ 1
NEED_GETSET equ 1
NEED_EDIT   equ 1
NEED_LISTS  equ 1
NEED_ALTKEYS equ 0
NEED_CRITICAL equ 0
DIAMOND_OPTBUTTONS   equ 1
CHECKMARK_CHECKBOXES equ 1

PENDRIVER_INTERRUPT equ 67h
SM_FUNCTION_INTERRUPT equ 68h

MAX_TOOLBARBUTTONS equ 6
PIXELS_PER_NOTCH equ 24
NOTCH_COUNT equ 9
MAXMESSAGELINE = 320
PROGRESS_MAXLEN equ 20


MB_ABOUT equ 1
MB_CREDITS equ 2
MB_CALIBRATEULC equ 3
MB_CALIBRATELRC equ 4
MB_REBOOT equ 5
MB_UPGRADE equ 6
MB_UPGRADE_PROGRESS equ 7
MB_UPGRADE_COMPLETE equ 8
MB_NOUPGRADE equ 9
MB_SHOWCALLPROGRESS equ 10

SM_ABORT_REQUEST_CONNECTION equ 24h
SM_BLOCK_VIDEO_ACCESS equ 58h
SM_CALIBRATE_LOWERRIGHT equ 000Ch
SM_CALIBRATE_UPPERLEFT equ 0ch
SM_CANCEL_CALIBRATION equ 00eh
SM_GET_ABOUT_DIALOG equ 063h
SM_GET_CONNECTION_STATUS equ 22h
SM_GET_HOST_LIST_STATUS equ 21h
SM_GET_INITIAL_SCREEN equ 08050h
SM_GET_KEYBOARD_STATUS equ 062h
SM_GET_MODEM_DEFAULTS equ 39h
SM_GET_NEXT_CREDITS_DIALOG equ 64h
SM_GET_PASSWORD_STATUS equ 25h
SM_GET_USER_INTERFACE_LANGUAGE equ
057h
SM_PERFORM_FLASH_UPDATE equ 13h
SM_REBOOT_HOST equ 011h
SM_REPORT_BUTTON_CLICKED equ 8055H
SM_REQUEST_ACTIVE_FLASH_UPGRADE equ
12h
SM_REQUEST_CONNECTION equ 23h
SM_REQUEST_DISCONNECTION equ 8023h
SM_REQUEST_UNLOAD equ 08053h
SM_SET_ACTIVE_STATUS equ 060h
SM_SET_KEYSTROKE equ 061h
SM_UNBLOCK_VIDEO_ACCESS equ 8058h
SM_UPDATE_DIMENSIONS equ 052h
SM_UPDATE_HOST_LIST equ 20h
SM_NOTIFY_NEW_SETUP equ 05ah

UI_CALIBRATION_COMPLETE equ 0Dh
UI_FLASH_UPDATE_PERCENTAGE equ 14h
UI_GET_SUI_VERSION_NUMBER equ 60h
UI_HIDE_MESSAGE_BOX equ 056h
UI_MOVE_OSK equ 05bh
UI_REQUEST_CLOSURE equ 053h
UI_REQUEST_DISPLAY equ 061h
UI_SHOW_MESSAGE_BOX equ 055h
UI_UPDATE_CONNECTION_STATUS equ 03bh
UI_SHOW_HIDE_BUSY_CURSOR equ 059h

RES_NO_SCREEN         EQU 0
RES_OSK_ALPHA         EQU 1
RES_OSK_NUM           EQU 2
RES_OSK_FULL          EQU 3
RES_OSK_BIG           EQU 4
RES_OSK_BIG_ALPHA     EQU 5
RES_OSK_BIG_NUM       EQU 6
RES_OSK_BIG_FULL      EQU 7
RES_SETUPS_HOST       EQU 1*8
RES_SETUPS_HOTKEYS    EQU 2*8
RES_SETUPS_MAINTENANCE EQU 3*8
RES_SETUPS_MODEM      EQU 4*8
RES_SETUPS_POWER      EQU 5*8
RES_SETUPS_SCREEN     EQU 6*8

GETSET_AUTOMATIC_SHUTOFF        equ 0fh
GETSET_BRIGHTNESS               equ 0bh
GETSET_CONTRAST                 equ 0ah
GETSET_CUSTOM_AUTOANSWER_STRING equ
36h
GETSET_CUSTOM_CONNECT_STRING    equ 38h
GETSET_CUSTOM_DISCONNECT_STRING equ
37h
GETSET_CUSTOM_INIT_STRING       equ 035h
GETSET_DIM_HOST_SCREEN          equ 0Ah
GETSET_DOMAIN_ID                equ 07h
GETSET_HOST_CONNECTION_TYPE     equ 02ah
GETSET_LOCK_HOST_KEYBOARD       equ 09h
GETSET_MODEM_ANSWER_ON_RING     equ
032h
GETSET_MODEM_BAUD_RATE_ENTRY    equ
28h
GETSET_MODEM_HOST_DESC_ENTRY    equ
25h
GETSET_MODEM_HOST_PHONE_ENTRY   equ
27h
GETSET_MODEM_MANUFACTURER_ENTRY equ
29h
GETSET_MODEM_PREFIX             equ 030h
GETSET_MODEM_RETRY_DELAY        equ 034h
GETSET_MODEM_RETRY_LIMIT        equ 033h
GETSET_MODEM_SUFFIX             equ 031h
GETSET_MODEM_TONE_OR_PULSE      equ 02fh
GETSET_NETWORK_GROUP_ENTRY      equ 2eh
GETSET_NETWORK_HOST_ENTRY       equ 2bh
GETSET_PASSWORD                 equ 02ch
GETSET_SECURITY_ID              equ 06h
GETSET_SLEEPMODE_PERIOD         equ 10h
GETSET_USER_DEFINED_HOT_ICON    equ 08h
GETSET_USER_ID                  equ 02dh
GETSET_FRAME_TYPE_ENTRY         equ 3ah

global AboutIcon:byte
global ColoredAboutIcon:byte

HLINE16X2        equ 33
VLINE2X64        equ 35
CONTRAST_ICON    equ 36
BRIGHTNESS_ICON  equ 37
SLEEP_ICON       equ 38
ABOUT_ICON       equ 39
BIG_X_ICON       equ 40
BIG_CRUZER       equ 41
HOST_ICON        equ 42
HOTKEY_ICON      equ 43
MAINT_ICON       equ 44
MODEM_ICON       equ 45
POWER_ICON       equ 46
SCREEN_ICON      equ 47
```

```
HAND1_ICON        equ 48
HAND2_ICON        equ 49
SMALL_CRUZER      equ 50
HIBERNATE_ICON    equ 51
SMALL_ABOUT       equ 52
CALIBRATION_X     equ 53

SPACEBAR_ICON     equ 82


Copr 1995 Zenith Data Systems Corp


SM_TEST_FUNCTION equ 0FFFFh
MB_LEFTJUSTIFIED equ 0
MB_CENTERED equ 1
MB_RIGHTJUSTIFIED equ 2


UPARROWBITMAP     equ 33
DNARROWBITMAP     equ 34

FULL_KEYBOARD_ICON equ 35
SMALL_KEYBOARD_ICON equ 36
REDUCE_KEYBOARD_ICON equ 37
KEYBOARD_EXIT_ICON equ 38
ESC_KEY equ 39
F1_KEY equ 40
F2_KEY equ 41
F3_KEY equ 42
F4_KEY equ 43
F5_KEY equ 44
F6_KEY equ 45
F7_KEY equ 46
F8_KEY equ 47
F9_KEY equ 48
F10_KEY equ 49
F11_KEY equ 50
F12_KEY equ 51
PRT_KEY equ 52
SLK_KEY equ 53
PSE_KEY equ 54
BREAK_KEY equ 55
SYSREQ_KEY equ 56
BS_KEY equ 57
INS_KEY equ 58
HM_KEY equ 59
PGUP_KEY equ 60
NLK_KEY equ 61
TAB_KEY equ 62
DEL_KEY equ 63
END_KEY equ 64
PGDN_KEY equ 65
UA_KEY equ 66
CAPS_KEY equ 67
ENTER_KEY equ 68
LA_KEY equ 69
RA_KEY equ 70
SHIFT_KEY equ 71
ALT_KEY equ 72
CTRL_KEY equ 73
DA_KEY equ 74
ENT_KEY equ 75
LEFT_BRAKET_KEY equ 76
RIGHT_BRAKET_KEY equ 77
GRAPHIC_SPACER equ 78
NUM_KEYBOARD_ICON equ 79
ENLARGE_KEYBOARD_ICON equ 80
PLUS_KEY equ 81


BUTTONTOPHEIGHT equ 3
BUTTONBOTTOMHEIGHT equ 3
BUTTONLEFTPIXELS equ 8
BUTTONRIGHTPIXELS equ 6
TITLEBARHEIGHT equ 32

RESET_PEN_DRIVER      equ 00h
DISPLAY_PEN_CURSOR    equ 01h
REMOVE_PEN_CURSOR     equ 02h
SET_PEN_EVENT_HANDLER = 20h
GET_CURSOR_HOTSPOT    equ 2Ah

PEN_FUNCTION equ 33h
PEN_ACTIVATE_FUNCTION =  87h

PENMOVED          equ 1
PENDOWN           equ 2
PENUP             equ 4

FORM_COLOR equ gray
SHADOW_COLOR equ darkgray
OUTLINE_COLOR equ black
LIGHT_COLOR equ  white

TEXTMODE_KEY_UP_COLOR equ 112
TEXTMODE_KEY_DOWN_COLOR equ 32

WITHBACKCOLOR  equ 16
LEFTJUSTIFIED  equ 32
CENTERED       equ 64
RIGHTJUSTIFIED equ 128


LEFT_ARROW_SCAN_CODE   equ 75
RIGHT_ARROW_SCAN_CODE  equ 77
DEL_SCAN_CODE          equ 83
HOME_SCAN_CODE         equ 71
END_SCAN_CODE          equ 79
UP_ARROW_SCAN_CODE     equ 72
DOWN_ARROW_SCAN_CODE   equ 80

BACKSPACE_SCAN_CODE    equ 14

SHIFTTABKEY   equ 0F00h
BACKSPACE     equ 8
TABKEY        equ 9

PAINTALL      equ 255
PAINTTOOLBARS equ 2
PAINTFORMS    equ 4
MAX_ACTIVE_CONTROLS equ 220


NORMSTATE    equ 0
GRAYED       equ 1
SKIPTAB      equ 2
DISABLED     equ 4
INVISIBLE    equ 8
ISDOWN       equ 16
WIDEN        equ 32
MOVEABLE     equ 64
COMPENSATE   equ 64
BACKFILL     equ 128
DOUBLEWIDEN  equ 128
EXPLICITSIZE equ 128


TOOLBAR      equ 1
FORM         equ 2
DIALOGBOX    equ 3
FRAME        equ 4
GROUPBOX     equ 5


ENDFRAME       equ 6
ENDDIALOGBOX   equ 7
ENDFORM        equ 8
ENDTOOLBAR     equ 9
ENDTOOLBARBUTTON equ 10
ENDOFOBJECT    equ 11

FIRST_ENDOFOBJECT equ ENDFRAME
LAST_ENDOFOBJECT equ ENDOFOBJECT

COMMANDBUTTON  equ 12
CANCELBUTTON   equ 13
TOOLBARBUTTON  equ 14
SYMBOLBUTTON   equ 15
SPINUPBUTTON   equ 16
SPINDOWNBUTTON equ 17

CLOSEBUTTON    equ 18
ABOUTBUTTON    equ 19
KEYBUTTON      equ 20


RSHIFTKEYBUTTON  equ 21
LSHIFTKEYBUTTON  equ 22
CTRLKEYBUTTON    equ 23
ALTKEYBUTTON     equ 24
SCROLLLOCKBUTTON equ 25
NUMLOCKBUTTON    equ 26
CAPSLOCKBUTTON   equ 27

FIRSTBUTTONTYPE equ COMMANDBUTTON
LASTBUTTONTYPE  equ CAPSLOCKBUTTON

FIRSTFOCUSABLEBUTTONTYPE equ
COMMANDBUTTON
LASTFOCUSABLEBUTTONTYPE equ
TOOLBARBUTTON

FIRSTKEYTYPE equ KEYBUTTON
LASTKEYTYPE equ CAPSLOCKBUTTON

CHECKBOX       equ 28
OPTIONBUTTON   equ 29

EDITBOX        equ 30
UCEDITBOX      equ 31
PWEDITBOX      equ 32
NUMEDITBOX     equ 33
KEYEDITBOX     equ 34
UNFRAMEDEDITBOX equ 35

FIRSTEDITBOXTYPE equ EDITBOX
LASTEDITBOXTYPE  equ UNFRAMEDEDITBOX

LISTBOX        equ 36
LISTBOXNOSCROLL equ 37
SPINBUTTON     equ 38

FIRSTLISTBOXTYPE equ LISTBOX
LASTLISTBOXTYPE  equ LISTBOXNOSCROLL

VSCROLLBAR     equ 39
SLIDEBAR       equ 40
SPECTRUMBAR    equ 41
PROGRESSBAR    equ 42

FIRSTSCROLLBARTYPE equ VSCROLLBAR
LASTSCROLLBARTYPE  equ PROGRESSBAR

TITLEBAR       equ 43

LEFTLEGEND     equ 44
CENTEREDLEGEND equ 45
RIGHTLEGEND    equ 46

CHISELBOX      equ 47

LINEBOX        equ 48
ICON           equ 49
SUNKENFRAME    equ 50

FIRSTLEGENDTYPE equ LEFTLEGEND
LASTLEGENDTYPE equ RIGHTLEGEND

NORMFONT       equ 0
SMALLFONT      equ 32
BIGFONT        equ 64
GRAPHICFONT    equ 32+64
ANYFONT        equ 32+64

ENGLISH_LANGUAGE equ 0
FRENCH_LANGUAGE equ 1
GERMAN_LANGUAGE equ 2

NORMFONT equ 0
SMALLFONT equ 32
BIGFONT  equ 64
GRAPHICFONT equ 32+64

VGA_MODE equ 12h
VGASEGMENT =0A000h
SCREEN_HEIGHT_PIXELS =480
SCREEN_WIDTH_BYTES =80
SCREEN_WIDTH_PIXELS = 640


SAMETOP        equ 4096
NEXTTOP        equ 4096+1024
SAMEFRAMETOP   equ 4096+1024*2
NEXTFRAMETOP   equ 4096+1024*3
NEXTTOP50      equ 4096+1024*4


PRIORFLAG      equ 08000h
PRIORPRIORFLAG equ 0C000h

SAMELEFT       equ 4096
NEXTLEFT       equ 8192
NEXTFRAMELEFT equ 4096+8192
FROMRIGHT      equ 16384

SAMEHIGH       equ 0

H100           equ 1200
H100TEXTHEIGHT equ 8
H100VGAHEIGHT  equ 20
H166           equ 2000
H166TEXTHEIGHT equ 16
H166VGAHEIGHT equ 33
H200           equ 2400
H200TEXTHEIGHT equ 16
H200VGAHEIGHT equ 40
H333           equ 4000
H333TEXTHEIGHT equ 32
H333VGAHEIGHT equ 66

H50            equ 8000h
H50TEXTHEIGHT equ 0
H50VGAHEIGHT equ 0

SAMEWIDE       equ 0
W100           equ 1200
W200           equ 2400
W300           equ 3600

MBB_OK     equ 001h
MBB_CANCEL equ 002h
MBB_ABORT  equ 004h
MBB_RETRY  equ 008h

MBB_IGNORE equ 010h
MBB_YES    equ 020h
MBB_NO     equ 040h

MBX_NOBUTTON equ 0
MBX_OK       equ MBB_OK
MBX_CANCEL   equ MBB_CANCEL
MBX_OKCANCEL equ MBB_OK or MBB_CANCEL
MBX_ABORTRETRYIGNORE equ MBB_ABORT or
MBB_RETRY or MBB_IGNORE
MBX_YESNOCANCEL equ MBB_YES or MBB_NO
or MBB_CANCEL
MBX_YESNORETRY equ MBB_YES or MBB_NO or
MBB_RETRY
MBX_YESNO equ MBB_YES or MBB_NO
MBX_RETRYCANCEL equ MBB_RETRY or
MBB_CANCEL

R_SHIFT_DOWN equ 1
L_SHIFT_DOWN equ 2
CTRL_DOWN equ 4
ALT_DOWN equ 8
SCROLL_LOCK_DOWN equ 16
NUM_LOCK_DOWN equ 32
CAPS_LOCK_DOWN equ 64
INS_STATE_ACTIVE equ 128

BLACK      equ 0
BLUE       equ 1
GREEN      equ 2
CYAN       equ 3
RED        equ 4
MAGENTA    equ 5
BROWN      equ 6
GRAY       equ 7
DARKGRAY   equ 8
LT_BLUE    equ 9
LT_GREEN   equ 10
LT_CYAN    equ 11
LT_RED     equ 12
LT_MAGENTA equ 13
YELLOW     equ 14
WHITE      equ 15


Copr. 1995 Zenith Data Systems Corp
ifndef MAJOR_VERSION
.code
extrn CheckListDataAvailable:far
extrn CheckScreenUpdateNeeded:far
extrn DeinstallInt08:far
extrn DoAfterRepaintingList:far
extrn DoBeforeRepaintingForm:far
extrn DoCustomControlPenDown:far
extrn DoCustomEvents:far
extrn DoCustomListPenUp:far
extrn DoCustomStartups:far
extrn DoCustomTimerProcedures:far
extrn DoHotKeyEdit:far
extrn DoSMFunction:far
extrn DoToolBarButtonClick:far
extrn DrawAboutIcon:far
extrn GetCustomEditBoxContents:far
extrn GetCustomPopupRequest:far
extrn HandleButtonClicks:far
extrn HandleMessageBoxClick:far
extrn RepaintCustomEditBoxContents:far
extrn TryUnload:far
endif
Copr. 1995 Zenith Data Systems Corp.
include uiforext.inc


DATASEG_BEGIN macro
UIDATA segment public 'data'
assume ds:UIDATA
ENDM

DATASEG_END macro
UIDATA ends
endm
OURDATASEG EQU UIDATA


include uicustom.inc
include uiequate.inc
include uistrucs.inc
include uimacros.inc


Copr. 1995 Zenith Data Systems Corp.


NEXTSTORAGE  = offset ControlDataStorageArea
TOTALSTORAGE = 0
NEXTCONTROL = 1
FRAMETOP = 0
```

```
FRAMELEFT = 0

SM_FUNCTION macro fnum
 mov ax,fnum
 call far ptr DoSMFunction
endm

ROUND_TO_BYTE_BOUNDARY macro r
 sar r,1
 sar r,1
 sar r,1
 sal r,1
 sal r,1
 sal r,1
endm

DIVIDE_BY_8 macro r
 sar r,1
 sar r,1
 sar r,1
endm

TEXTMODEINIT macro
 mov ax,0003h
 int 10h
endm

DEBUGGER macro
   push ax
   push cx
    textmodeinit
   pop cx
   pop ax
   int 3
endm

CLEAR_RECTANGLE macro
CLft CTop,CWi,CHi,Colr
 mov cx,CLft
 mov dx,CTop
 mov si,CWi
 mov ax,CHi
 mov bh,Colr
 call FillScreenArea
endm


vgainit macro
 mov ax,VGA_MODE
 int 10h
endm

vgaloadlatches macro
 mov dx,03ceh
 mov ax,0205h
 out dx,ax
 mov ax,0003h
 out dx,ax
endm

VGASETXOR macro
 mov dx,03ceh
 mov ax 0205h
 out dx,ax
 mov ax,0003h or (00011000b * 256)
 out dx,ax
endm

vgawritecolor macro colr
 mov ah,al
 mov al,8
 out dx,ax
 mov al,colr
 mov es:[di],al
endm


ENGLISH macro
LANGUAGE=ENGLISH_LANGUAGE
endm

FRENCH macro
LANGUAGE=FRENCH_LANGUAGE
endm

GERMAN macro
LANGUAGE=GERMAN_LANGUAGE
endm

ADJUST_FORM_HEIGHT MACRO NewHeight
CURRENTLOCATION=$
org CURRENTFORM + PixelHeight
   dw Newheight + FRAMETOP
org CURRENTLOCATION
endm


ADJUST_FORM_WIDTH MACRO NewWidth
CURRENTLOCATION=$
org CURRENTFORM + PixelWidth
   dw NewWidth + FRAMELEFT
org CURRENTLOCATION
endm


ADJUST_FRAME_WIDTH macro NewWidth
CURRENTLOCATION=$
org CURRENTFRAME + PixelWidth
   dw NewWidth
org CURRENTLOCATION
endm

ADJUST_TOOLBAR_WIDTH MACRO NewWidth
CURRENTLOCATION=$
org CURRENTTOOLBAR + PixelWidth
   dw NewWidth
org CURRENTLOCATION
endm

MAKE_CAPTION_STRUCTURE macro CaptionText
CAPTION_END_POINTER=$
 dw 0
 db CaptionText
 db 0
 dw THIS_CAPTION_START
 db 254
THIS_CAPTION_END=$
org CAPTION_END_POINTER
dw THIS_CAPTION_END
org THIS_CAPTION_END
LANGUAGE=0
endm

GRAPHIC_CAPTION macro CaptionText
THIS_CAPTION_START=$
 db 128 or GRAPHICFONT
 MAKE_CAPTION_STRUCTURE CaptionText
endm

CAPTION macro CaptionText
THIS_CAPTION_START=$
 db 128 or LANGUAGE or FONT
 MAKE_CAPTION_STRUCTURE CaptionText
endm


TEXTMODE_CAPTION macro tmcstring
THIS_MISC_ITEM_START =$
 db 128 or 16 or 1
MISC_ITEM_END_POINTER=$
 dw 0
 db tmcstring
 db 0
 dw THIS_MISC_ITEM_START
 db 253
THIS_MISC_ITEM_END=$
org MISC_ITEM_END_POINTER
dw THIS_MISC_ITEM_END
org THIS_MISC_ITEM_END
endm

SETTAB macro tabstop
THIS_MISC_ITEM_START =$
 db 128 or 16 or 3
MISC_ITEM_END_POINTER=$
 dw 0
 dw tabstop
 dw 0
 dw THIS_MISC_ITEM_START
 db 252
THIS_MISC_ITEM_END=$
org MISC_ITEM_END_POINTER
dw THIS_MISC_ITEM_END
org THIS_MISC_ITEM_END
endm


SETWIDTHS macro
graphwidth,textwidth,egraphwidth,etextwidth
THIS_MISC_ITEM_START =$
 db 128 or 16 or 3
MISC_ITEM_END_POINTER=$
 dw 0
 dw graphwidth
 dw textwidth
 dw egraphwidth
 dw etextwidth
 dw THIS_MISC_ITEM_START
 db 252
THIS_MISC_ITEM_END=$
org MISC_ITEM_END_POINTER
dw THIS_MISC_ITEM_END
org THIS_MISC_ITEM_END
endm

CONTROL macro
CTyp,CSta,CLft,CTop,CWi,CHi,CLen
STOREOFF = NEXTSTORAGE
if (CTyp eq CHECKBOX ) or (CTyp eq
OPTIONBUTTON )
 STORESZ = 1
elseif (CTyp ge FIRSTLISTBOXTYPE) and (CTyp le
LASTLISTBOXTYPE)
 STORESZ = 0
 STOREOFF=0
elseif (CTyp ge FIRSTEDITBOXTYPE) and (CTyp le
LASTEDITBOXTYPE)
 STORESZ = CLen + 1
elseif (CTyp ge FIRSTSCROLLBARTYPE) and
(CTyp le
LASTSCROLLBARTYPE)
 STORESZ = 1
else
 STORESZ = 0
endif
 CURRENTCONTROL=$
 tCONTROL
<CTyp,CSta,NEXTCONTROL,CLft,CTop,CWi,CHi,S
TORESZ,STOREOFF,0FFh>
 NEXTCONTROL=0
 FONT=NORMFONT
 LANGUAGE=0

SAMESTATE=CSta
SAMELEN=CLen
 NEXTSTORAGE = NEXTSTORAGE + STORESZ
 TOTALSTORAGE = TOTALSTORAGE +
STORESZ
endm


BEGIN_FORM_DEFINITIONS MACRO
 db 0
endm

END_FORM_DEFINITIONS MACRO
 db 0
endm


BEGIN_TOOLBAR macro CSta,CLft,CTop,CWi,CHi
CURRENTTOOLBAR=$
 CONTROL TOOLBAR,CSta,CLft,CTop,CWi,CHi,0
TBBOTTOM=Ctop+CHi
TBLEFT=CLft
TBWIDE=CWi
endm

BEGIN_TOOLBARBUTTON macro
CSta,CLft,CTop,CWi,CHi
 CONTROL
TOOLBARBUTTON,CSta,CLft,CTop+TITLEBARHEI
GHT,CWi,CHi,0
 TBBNEXTLEFT=CLft+CWi
 TBBSAMETOP=CTop
 TBBSAMEHIGH=CHi
 TBBSAMEWIDE=CWi
endm

BEGIN_FORM macro
 CURRENTFORM=$
 CONTROL FORM,0,0,0,8*104,0,0
endm

BEGIN_GROUPBOX macro
CSta,CLft,CTop,CWi,CHi
 CONTROL
GROUPBOX,CSta,CLft,CTop,CWi,CHi,0
endm


BEGIN_FRAME macro CSta,CLft,CTop,CWi,CHi
 FRAMETOP=CTop
 FRAMELEFT=CLft
 CURRENTFRAME=$
 CONTROL FRAME,CSta,CLft,CTop,CWi,CHi,0
endm

END_FORM macro
 CONTROL ENDFORM,0,0,0,0,0,0
endm

END_TOOLBARBUTTON macro
 CONTROL ENDTOOLBARBUTTON,0,0,0,0,0,0
endm

END_GROUPBOX macro
 CONTROL ENDOFOBJECT,0,0,0,0,0,0
endm

END_FRAME macro
 FRAMETOP=0
 FRAMELEFT=0
 CONTROL ENDFRAME,0,0,0,0,0,0
endm

END_TOOLBAR macro
 CONTROL ENDTOOLBAR ,0,0,0,0,0,0
endm

MAKE_UNFRAMED_EDITBOX macro
CSta,CLft,CTop,CWi,CHi,CLen
  CONTROL
UNFRAMEDEDITBOX,CSta,CLft,CTop,CWi,CHi,CLe
n
endm

MAKE_PW_EDITBOX macro
CSta,CLft,CTop,CWi,CHi,CLen
  CONTROL
PWEDITBOX CSta,CLft,CTop,CWi,CHi,CLen
endm

MAKE_KEY_EDITBOX macro
CSta,CLft,CTop,CWi,Chi
  CONTROL
KEYEDITBOX,CSta,CLft,CTop,CWi,Chi,800


endm

MAKE_NUM_EDITBOX macro
CSta,CLft,CTop,CWi,CHi,CLen
  CONTROL
NUMEDITBOX,CSta,CLft,CTop,CWi,CHi,CLen
endm

MAKE_EDITBOX macro
CSta,CLft,CTop,CWi,CHi,CLen
  CONTROL
EDITBOX,CSta,CLft,CTop,CWi,CHi,CLen
endm

MAKE_COMMANDBUTTON macro
CSta,CLft,CTop,CWi,CHi
  CONTROL
COMMANDBUTTON,CSta,CLft,CTop,CWi,CHi,0
endm

MAKE_SYMBOLBUTTON macro
CSta,CLft,CTop,CWi,CHi
  CONTROL
SYMBOLBUTTON,CSta,CLft,CTop,CWi,CHi,0
endm

MAKE_SPINUPBUTTON macro
CSta,CLft,CTop,CWi,CHi
  CONTROL
SPINUPBUTTON,CSta,CLft,CTop,CWi,CHi,0
endm

MAKE_SPINDOWNBUTTON macro
CSta,CLft,CTop,CWi,CHi
  CONTROL
SPINDOWNBUTTON,CSta,CLft,CTop,CWi,CHi,0
endm

MAKE_ABOUTBUTTON macro
CSta,CLft,CTop,CWi,CHi
  CONTROL
ABOUTBUTTON,CSta,CLft,CTop,CWi,CHi,0
endm

make_closebutton macro CSta,CLft,CTop,CWi,CHi
  control
CLOSEBUTTON,CSta,CLft,CTop,CWi,CHi,0
endm

MAKE_KEYBUTTON macro
CSta,CLft,CTop,CWi,CHi
  CURRENTKEY=$
  CONTROL
KEYBUTTON,CSta,CLft,CTop,CWi,CHi,0
endm

MAKE_LSHIFTKEYBUTTON macro
CSta,CLft,CTop,CWi,CHi
  CURRENTKEY=$
  CONTROL
LSHIFTKEYBUTTON,CSta,CLft,CTop,CWi,CHi,0
endm

MAKE_RSHIFTKEYBUTTON macro
CSta,CLft,CTop,CWi,CHi
  CURRENTKEY=$
  CONTROL
RSHIFTKEYBUTTON,CSta,CLft,CTop,CWi,CHi,0
endm

MAKE_CTRLKEYBUTTON macro
CSta,CLft,CTop,CWi,CHi
  CURRENTKEY=$
  CONTROL
CTRLKEYBUTTON,CSta,CLft,CTop,CWi,CHi,0
endm
```

```
MAKE_ALTKEYBUTTON macro
CSta,CLft,CTop,CWi,CHi
  CURRENTKEY=$
  CONTROL
ALTKEYBUTTON,CSta,CLft,CTop,CWi,CHi,0
endm

MAKE_CAPSLOCKBUTTON macro
CSta,CLft,CTop,CWi,CHi
  CURRENTKEY=$
  CONTROL
CAPSLOCKBUTTON,CSta,CLft,CTop,CWi,CHi,0
endm

MAKE_NUMLOCKBUTTON macro
CSta,CLft,CTop,CWi,CHi
  CURRENTKEY=$
  CONTROL
NUMLOCKBUTTON,CSta,CLft,CTop,CWi,CHi,0
endm

MAKE_SCROLLLOCKBUTTON macro
CSta,CLft,CTop,CWi,CHi
  CURRENTKEY=$
  CONTROL
SCROLLLOCKBUTTON,CSta,CLft,CTop,CWi,CHi,0
endm

MAKE_CHECKBOX macro CSta,CLft,CTop
  CONTROL CHECKBOX,CSta,CLft,CTop,16,16,0
endm

MAKE_OPTIONBUTTON macro CSta,CLft,CTop
  CONTROL
OPTIONBUTTON,CSta,CLft,CTop,16,16,0
endm

MAKE_LEFTLEGEND macro CSta,CLft,CTop
  CONTROL LEFTLEGEND,CSta,CLft,CTop,0,0,0
endm

MAKE_CHISELBOX macro CSta,CLft,CTop,CWi,Chi
  CONTROL
CHISELBOX,CSta,CLft,CTop,CWi,Chi,0
endm

MAKE_SUNKENFRAME macro
CSta,CLft,CTop,CWi,Chi
  CONTROL
SUNKENFRAME,CSta,CLft,CTop,CWi,Chi,0
endm

MAKE_CENTEREDLEGEND macro
CSta,Cft,CTop Cwi Chi
  CONTROL
CENTEREDLEGEND,CSta,CLft,CTop,CWi,Chi,0
endm

MAKE_ICON macro CSta,Cft,CTop
  CONTROL ICON,CSta,CLft,CTop,16,16,0
endm

MAKE_LISTBOX_NOSCROLL macro
CSta,CLft,CTop,CWi,CHi,CLen
  CONTROL
LISTBOXNOSCROLL,CSta,CLft,CTop,CWi,CHi,0
endm

MAKE_LISTBOX macro
CSta,CLft,CTop,CWi,CHi,CLen
  CONTROL LISTBOX,CSta,CLft,CTop,CWi,CHi,0
endm

MAKE_SPINBUTTON macro
CSta,CLft CTop,CWi,CHi,CLen
  CONTROL
SPINBUTTON,CSta,CLft,CTop,CWi,CHi,0
endm

MAKE_SPECTRUMBAR macro
CSta,CLft,CTop,CWi,CHi,CLen
  CONTROL
SPECTRUMBAR,CSta,CLft,CTop,CWi,CHi,0
endm

MAKE_SLIDEBAR macro
CSta,CLft,CTop,CWi,CHi,CLen
  CONTROL SLIDEBAR,CSta,CLft,CTop,CWi,CHi,0
endm

MAKE_LINEBOX macro CSta,CLft,CTop,CWi,CHi
  CONTROL LINEBOX,CSta,CLft,CTop,CWi,CHi,0
endm

DEFINE_KEY macro
ScnCode,NormVal,ShftVal CtrlVal,AltVal
 THIS_MISC_ITEM_START =$
 org CURRENTKEY + ID
 db ScnCode
 org CURRENTKEY + wDATALENGTH
 dw NormVal+ShftVal*256
 org CURRENTKEY + pStorageOffset
 dw CtrlVal+AltVal*256
 org THIS_MISC_ITEM_START
endm

DEFINE_ICON macro iconaddr
 THIS_MISC_ITEM_START = $
 org CURRENTCONTROL + ID
 dw iconaddr
 org THIS_MISC_ITEM_START
endm
```

Copr. 1995 Zenith Data Systems Corp.

```
tControl struc
ControlType    db ?
ControlState   db ?
ID             dw ?
LeftPixel      dw ?
TopPixel       dw ?
PixelWidth     dw ?
PixelHeight    dw ?
wDataLength    dw ?
pStorageOffset dw ?
ControlEOC     db ?
ends

wTopVisible equ pStorageOffset

pFirstRegionRecord equ wDataLength

tRegion struc
pCurrentControl dw ?
wCurrentTop     dw ?
wCurrentBottom  dw ?
wCurrentLeft    dw ?
wCurrentRight   dw ?
wCurrentHeight  dw ?
wCurrentWidth   dw ?
wListHandle     dw ?
wListItemIndex  dw ?
bListItemFlags  db ?
ends
tLISTBOXENTRY struc
lpszEntry dd 0
cAttribute db 0
ends

tMSGBOXBUFF struc
pTextOff dw 0
pTextSeg dw 0
cAlignment db 0
ends
tBUFFHEADER struc
iStructLen dw 0
iBuffLen   dw 0
pBuffOff   dd 0
ends

tHOSTLIST struc
lpsNodeAddress dd 0
lpszGroupName  dd 0
lpszHostName   dd 0
iHostVersion   dw 0
lpsSerial      dd 0
lpsReserved    dd 0
ends

tSCANCODES struc
iScanCode dw 0
ends
```

```
Copr 1995 Zenith Data Systems Corp

#define N_DIG (16)
#define BCD_BYTES (2+(N_DIG/2))
#define BCD_TOP (1+(N_DIG/2))
#define BCD_WORDS (1+(N_DIG/4))
#define BCD_BIAS (0x4000)

typedef word bcd[BCD_WORDS];
extern char _bcd_buf[];

#define bi(bs,q1,q2,q3,q4,xp) \
{(xp+BCD_BIAS-1)+((1 bs
(-1))<<14),0x##q4,0x##q3,0x##q2,0x##q1}

#define bi0 {0,0,0,0,0}
#define bi1 bi(+,1000,0,0,0,1)

#define bcdv(vn,bs,q1,q2,q3,q4,xp) \
bcd vn={(xp+BCD_BIAS-1)+((1 bs
(-1))<<14),0x##q4,0x##q3,0x##q2,0x##q1}

#define bcd2dec(x,s,integer,frac)
bcd2d(x,s,((integer)<<8)|(frac))

#define bc_abs(x) *((byte*)(x))+1)&=0x7f
#define bc_chs(x) *(((byte*)(x))+1)^=0x80
#define bc_mabs(x) *(((byte*)(x))+1)|=0x80
#define bc_sgn(x)  (char)(("int*)(x)<0)?'-':'+')
#define bc_isneg(x) (*(int*)(x)<0)
#define bc_ispos(x) (*(int*)(x)>0)
#define bc_is0(x) (!(*((char*)(x)+BCD_TOP)))
#define bc_not0(x) (*((char*)(x)+BCD_TOP))
#define bc_clr(x)
*(word*)(x)=*((word*)(x)+BCD_WORDS-1)=0
#define bc_m10(x) (*(word*)(x))++
#define bc_d10(x) (*(word*)(x))--
#define bc_m100(x) (*(word*)(x))+=2
#define bc_d100(x) (*(word*)(x))-=2
#define bc_mp(x,n) *(word*)(x)+=(n)
#define bc_dp(x,n) *(word*)(x)-=(n)
#define bc_nid(x)
((int)(*(int*)(x)&0x7fff)-BCD_BIAS+1))
#define bc_nfd(x)
((int)(-(*(int*)(x)&0x7fff)+BCD_BIAS-1+N_DIG))
#define bc_msd(x)
(char)(*((byte*)(x)+BCD_TOP)>>4))
#define bc_lsd(x) (char)(*((byte*)(x)+2)&0xf))

void bequ(bcd x,bcd y);
void badd(bcd x,bcd y, bcd z);
void bsub(bcd x,bcd y, bcd z);
void bmul(bcd x,bcd y, bcd z);
void bdiv(bcd x,bcd y, bcd z);
void bsqrt(bcd x, bcd y);
void bhalf(bcd x,bcd y);
int bcmp(bcd x, bcd y);
void bround(bcd x, int n);
void btrunc(bcd x, bcd y);
void bfrac(bcd x, bcd y);

char *bcd2e(bcd x, char *s, int nd);
char *bcd2d(bcd x, char *s, word fmt);
int bcd2asc(bcd x, int nd);
long bcd2l(bcd x);
char *asc2bcd(char *s, bcd x);
void i2bcd(int n, bcd x);
void w2bcd(word w, bcd x);
void l2bcd(long nn, bcd x);
void ul2bcd(dword ww, bcd x);
Copr. 1995 Zenith Data Systems Corp.

#define HM_BACKSP   0x0008
#define HM_ENTER    0x000D
#define HM_INVALID_KEY 0x00FE
#define HM_WIN_DONE_PW 0x00E0
#define HM_WIN_GET_STA 0x00E1
#define HM_WIN_GET_HOST 0x00E2
#define HM_OSKOCC_DEFINE_ACK_TO_HM
0x00E3
#define HM_OSKOCC_CLOSE_ACK_TO_HM
0x00E4
#define HM_OSKOCC_CLOSE_UNI_TO_HM
0x00E5

#define WM_POST_MSG    (0x0400 + 0x1900)
#define WM_WIN_KEY     (WM_USER + 0x1002)

#define WM_OSKOCC_DEFINE_ACK (WM_USER
+ 0x1003)
#define WM_OSKOCC_CLOSE_ACK  (WM_USER
+ 0x1004)
#define WM_OSKOCC_CLOSE_UNI  (WM_USER
+ 0x1005)

#define WM_ENABLE_CLOSE (WM_USER +
0x1010)

void FAR PASCAL SetHook(HWND);
void FAR PASCAL RemoveHook(void);
void FAR PASCAL SwitchFilter(int);
LRESULT CALLBACK CheckKeys (int nCode,
WORD wParam, LONG lParam);

void FAR PASCAL UnloadOSKOCCACK(void);

Copr 1995 Zenith Data Systems Corp.

#define HSE_VERI_BAD_PARM1 1
#define HSE_VERI_BAD_PARM2 2
#define HSE_VERI_BAD_PARM3 3
#define HSE_VERI_BAD_PARM4 4
#define HSE_VERI_BAD_PARM5 5
#define HSE_VERI_BAD_PARM6 6
#define HSE_CORRECT_SERIAL_NUMBER 0

#define HSE_CRC_RAND_LEN 8
#define HSE_SERIAL_LEN    10
Copr. 1995 Zenith Data Systems Corp.

#define SL_FT_E802_2 10
#define SL_FT_E802_3 11
#define SL_FT_EII    12
#define SL_FT_ESNAP  13

#define SL_FT_LEN_NVRAM 1
#define SL_FIELDOFFSET(struct, field) ((int)(
(&((struct)->field)) - ((char NEAR*)(struct)) ))

#define SL_LSL_CMD_E802_2
"/C=ETH8022.CFG\"
#define SL_LSL_CMD_E802_3
"/C=ETH8023.CFG\"
#define SL_LSL_CMD_EII    "/C=ETHII.CFG\"
#define SL_LSL_CMD_ESNAP
"/C=ETHSNAP.CFG\"

#define SL_LSL_CMD_LENGTH    18
Copr 1995 Zenith Data Systems Corp

typedef struct CALLVXDPARASTRUC
{
 int iCallID;
 int iIconOrFuncID;
 int iInt2FAPI;
};

typedef struct Win386_Startup_Info_Struc
{
 unsigned char SIS_Version_Major;
 unsigned char SIS_Version_Minor;
 unsigned long SIS_Next_Dev_Ptr;
 unsigned long SIS_Virt_Dev_File_Ptr;
 unsigned long SIS_Reference_Data;
 unsigned long SIS_Instance_Data_Ptr;
};

typedef struct HostSysStatus
{
 char cVideoMode;
 char cUserName[11];
 char cConnStatus;
 char cProtocolID;
};

#define HM_FLASH_FNSIZE 14
#define HM_FLASH_FNUM  32
#define HM_FILEBUFF_LEN 2048
#define HM_FLASH_NAME_LEN 40

typedef struct FILESET
{
 unsigned int iCheckSum[HM_FLASH_FNUM];
 int iErrorCode;
 char cFlashName[HM_FLASH_NAME_LEN];
 int iFlashNameLen;
 int iTotalProtectFiles;
 unsigned char cFileAttr[HM_FLASH_FNUM];
 int iProtectFileNum[HM_FLASH_FNUM];
 int iTotalPieces;
 int iTotalFiles;
 int iFileLen[HM_FLASH_FNUM];
 int iFileNameLen[HM_FLASH_FNUM];
 char
cFileName[HM_FLASH_FNUM][HM_FLASH_FNSIZ
E];
};

#define HM_ERR_LOG_MAX 10
typedef struct ERRORLOG
{
 char cErrorCode[5];
 char lLineNumber[5];
 char cModuleName[8];
 char cMsrce[10];
 char cMinute;
 char cHour;
 char cDay;
 char cMonth;
};

#define HM_BRCAST_RESP 20
#define HM_SERAIL_NUM_DEFA 1

#define HM_VERSION 100

#define HM_PATH_LEN 66

#define FALSE   0
#define TRUE    1
#define HM_OFF  0
#define ON      1
#define NULL    0

#define HM_DOS_MODE 0
#define HM_WINDOWS_MODE 1

#define HM_PM_DOSWIN    0
#define HM_PM_DOSWIN_ACK 1
#define HM_PM_FILEREQ   10
#define HM_PM_TOTALFILES 12
#define HM_PM_PATHREQ   13
#define HM_PM_PATHREP   14
#define HM_PM_FLASHOK   15
#define HM_PM_FLASH_NAMQ 20
#define HM_PM_FLASH_NAMP 21
#define HM_PM_FLASH_BREAK 22
#define HM_PM_HOSTCON   30
#define HM_PM_BLANKSCR  40
#define HM_PM_UNBLANKSCR 41
#define HM_PM_LOCKKBMO  42
#define HM_PM_UNLOCKKBMO 43
#define HM_PM_BLANKSCR_ACK  46
#define HM_PM_UNBLANKSCR_ACK 47
#define HM_PM_LOCKKBMO_ACK  48
#define HM_PM_UNLOCKKBMO_ACK 49
#define HM_PM_ERRORIN   50
#define HM_PM_ERRORREQ  51
#define HM_PM_OSK_DEFINE   60
#define HM_PM_OSK_DEFINE_ACK 61
#define HM_PM_OSK_CLOSE    62
#define HM_PM_OSK_CLOSE_ACK 63
#define HM_PM_OSK_CLOSE_UNI 64
#define HM_PM_OSK_CLOSE_UNI_ACK 65

#define HM_PASSWORD_LEN 20+1

#define HM_PM_LEN_ONE 84
#define HM_PM_LEN 158
#define HM_BC_LEN 35

#define HM_PM_FLASH_UNIT 5

#define HMUI_UNLOAD_HCS  0x01
#define HMUI_DISCONNECT  0x10
#define HMUI_WAIT_CALL_ENT 0x20
#define HMUI_GRP_HOST_NAME 0x30
#define HMUI_GET_STATUS  0x40
#define HMUI_PW_PROTECT  0x41
#define HMUI_INST_STATUS 0x42
#define HMUI_GET_ERRORMESS 0x50
#define HMUI_SET_SECU_ID 0x60
#define HMUI_GET_SECU_ID 0x61
#define HMUI_GET_SESSION 0x70

#define HM_EXIST_SI   0xf0e7
#define HM_EXIST_DI   0x3e5d
#define HM_EXIST_CX   0x3131

#define HM_GET_CUR_SS 30

#define HM_HMWIN_OSK          0x00A1
#define HM_HMWIN_OSKOCC_UNI_ACK 0x00A2

#define STK_SZ 5120

#define GetStack(p) ((void far*)(*((long
*)&(p->saved_sp))))

#define _FP_SEG(fp) (*((unsigned __far *)&(fp)+1))

#define _FP_OFF(fp) (*((unsigned __far *)&(fp)))

#define HM_CONNECT     3
#define HM_DISCONNECT  0
#define HM_WAITING     1

#define HM_PHN_REC_LEN  287
#define HM_PHN_NAME_OFF 2
#define HM_PHN_NAME_LEN 10
#define HM_PHN_PW_OFF   92
#define HM_PHN_PW_END   113

#define DWORD long
#define WORD unsigned short
#if defined( LOWORD )
 #undef LOWORD
#endif
#define LOWORD(l)        ((WORD)(DWORD)(l))

#if defined( HIWORD )
 #undef HIWORD
#endif

#define HIWORD(l)        ((WORD)((((DWORD)(l))
>> 16) &
0xFFFF))

#define HM_VHMCD_ID    0x33D8

#define HM_VHMCD_GV  0
#define HM_VHMCD_MSG  1

#define HM_WIN_DONE_PW  0xe0
#define HM_WIN_GET_STA  0x00e1
#define HM_WIN_GET_HOST 0x00e2
#define HM_OSKOCC_DEFINE_ACK_TO_HM
0x00E3
#define HM_OSKOCC_CLOSE_ACK_TO_HM
0x00E4
#define HM_OSKOCC_CLOSE_UNI_TO_HM
0x00E5
#define HM_VXD_GET_PROC 0xf0

#define HM_TEMP_FILE_NAME_LEN 8
#define HM_SARA_FLASH_BUFF 64
#define HM_FLASH_BUFF    1024
#define HM_DEFAULT_ICON  0x0010
#define HM_CONN_ICON     0x0020
#define HM_DISCONN_ICON  0x0030
#define HM_FLASH_ICON    0x0040
#define HM_FLASH_ICON_END 0x0041
#define HM_WAIT_ICON     0x0050
#define HM_HOST_CNT_ICON 0x0060

#define HM_SWITCH_OFF    0x0100

#define HM_ERROR_LOG_FILE "ERROR.LOG"
#define HM_PHONEBOOK_FILE "SESSION.PHN"
#define HM_SIG_STRING    "host_manager"
#define HM_HOSTCS_SIG    "COIS-HOST"
#define HM_HOSTDAT_HMAPI "HMAPI"
#define HM_HOSTDAT_CONFIG "configuration"
#define HM_HOSTDAT_GRP   "GROUPNAME"
#define HM_HOSTDAT_HOST  "HOSTNAME"
#define HM_HOSTDAT_VER   "VERSION"
#define HM_HOSTDAT_SERIAL "SERIALNUMBER"
#define HM_HOSTDAT_LEFT  "["
#define HM_HOSTDAT_RIGHT "]"
#define HM_SESSION_CFG_FN "SESSION.CFG"

#define HM_HCS_API     0x65
#define HM_HCS_SCRON   0xDE00
#define HM_HCS_SCROFF  0xDE01
#define HM_HCS_KBON    0xDE02
#define HM_HCS_KBOFF   0xDE03
#define HM_HCS_SENDPRI 0xDD00
#define HM_HCS_SYSPTR  0xDF00
#define HM_HCS_BROAD   0xE000
#define HM_HCS_UNLOAD  0xE300
#define HM_HCS_DISC    0xE200
#define HM_HCS_WAIT    0xE100
#define HM_HCS_SESSION 0xE400

#define HM_VER_STR     "Version 1.1"

#define ZR          0
#define HM_FILE_NOT_FOUND 2

#define HM_FLASH_READ_HDAT -10
#define HM_FLASH_POS_HDAT   -11
#define HM_FLASH_NOT_SOURCE  -21
#define HM_FLASH_OPEN_SOURCE -22
#define HM_FLASH_CLOSE_SOURCE -23
#define HM_FLASH_READ_SOURCE -24
#define HM_FLASH_POS_SOURCE  -25
#define HM_FLASH_CREATE_TEMP -30
#define HM_FLASH_WRITE_TEMP  -31
#define HM_FLASH_CLOSE_TEMP  -32
#define HM_FLASH_NO_FILES    -40
```

```
#define HM_FLASH_NO_CHECKSUM -50
#define HM_FLASH_BAD_CHECKSUM -51

#define HM_STUFF_ENTER      0x000D

#define HM_DOS_BUSY_TRY_TICKS   4

#define HM_INT_2F_START       0x1805
#define HM_INT_2F_TERMI       0x1805
#define HM_INT2F_ENTRY_API    0x1884

#define HM_DOS_WIN_TRIES      5*9+2
#define HM_UNI_CLOSE_TRIES    5*9+2
#define HM_TICKS_PER_TRY      9
#define HM_TICKS_PER_SECOND   18
#define HM_TICKS_TWO_SECOND   38
#define HM_WIN_STATUS_CHG_TRY  3

typedef struct sTrapRec88
{
  struct trap_rec sTrapRec88;
  char a[5];
  char b[35];
} ;

Copr 1995 Zenith Data Systems Corp.


#define MOVE_DATA 1
#define MOVE_CODE 2
#define MOVE_BOTH 3

extern   int lim_error;
extern   int _prog_handle;
int move_to_lim(int MinPages,int MaxPages,int
Method);
void _m2f_no_wait(void);
void _adjust_tmr(void);
extern   word _lim_tap

typedef   struct lim_ctl {
    int sys_handle;
    int page_cnt;
    int tot_pages;
    char active[2]
    word reserved1,
    word hi_code,
    word reserved2;
    word hi_data;
  } LIM_CTL;

extern _lim_ctl();
#define   TSR_LIM_CTL() *(word
far*)MK_FP(parent_code,(word)_lim_ctl)

int lim_present(void);
int lim_status(void);
word lim_window(void);
int lim_nfree(void);
int lim_alloc(int NoPages);
void lim_dealloc(int Handle);
void lim_map(int Handle,int Page,int Position)
int lim_version(void);
void lim_save_map(int Handle);
void lim_restore_map(int Handle);
int lim_tot_pages(void)
int lim_handles(void);
int lim_h_pages(int Handle)
int lim_h_counts(int *ResultOfs word ResultSeg);
void lim_get_map(void *Ofs,word Seg);
void lim_set_map(void *Ofs,word Seg);
void lim_swap_map(void *NewOfs,word
NewSeg void *OldOfs word
OldSeg).
int lim_map_size(void).

word fread(int Handle,void far *Buf,word Cnt);
word fwrite(int Handle,void far *Buf,word Cnt);
char far *fmem_find(int PatLen,void far *Pat,int
ArrLen,void far
*Arr);
word fstr_len(void far *Str);
word fstr_cp(void far *Src,void far *Dest);
word fstr_pos(char c,void far *s),
word fmem_cmp(void far *s1,void far *s2,word cnt);
char far *fmem_swap(void far *s1,void far *s2,word
cnt);
void get_fblk(int x_size, int y_size, word far *buf);
void put_fblk(int x_size, int y_size, word far *buf);
void swap_fblk(int x_size, int y_size, word far *buf);


typedef struct pctl_rec {
     char *Buf.
     word BufSize,
     word BufHigh.
     word BufCnt,
     char Flags.
     char ExCode;
     char FullWr,FullSts;
} PCTL_REC;

#define PF_ON   1
#define PF_PRINT  2
#define PF_DIRTY  0x40
#define PF_OVF   0x80

#define PXC_RDY      0x80
#define PXC_PAPER  0x20
#define PXC_SEL      0x10
#define PXC_ERR    0x08
#define PXC_TMO      0x01

install_ptrap(fp service,word stack_size,byte
lock_mask,PCTL_REC
*p).
extern PCTL_REC *_pctl;
extern word _printer_mask;
Copr. 1995 Zenith Data Systems Corp


#define    CLASS_MAGIC      0x484E
#define    MENU_MAGIC       0x554D

#define    ERR_SUCCESS     0
#define    ERR_INTERNAL    -1

#define    OSK_NOTCLOSING   0
#define    OSK_UNICLOSING   1
#define    OSK_MOVEALLOWED  0
#define    OSK_NOMOVEALLOWED 1



typedef struct
{
  HANDLE  hcNext,
  WORD    wSig,
  ATOM    atomCls;
  HANDLE  hDCE;
  WORD    cClsWnds;
  WNDCLASS wc
  WORD    cExtra[1];
} CLASS, NEAR * HCLASS,


typedef struct
{
  HWND    hwndNext;
  HWND    hwndChild,
  HCLASS  hClass,
  HANDLE  hProp;
  HWND    hwndLastActive,
  HANDLE  hScroll,
  HANDLE  hmemTaskQ,
  HRGN    hrgnUpdate;
  HANDLE  hDCE;
  HMENU   hmenuSystem;
  HWND    hwndOwner,
  RECT    rectWindow,
  RECT    rectClient,
  HPALETTE hPalette,
  WORD    wFlags.
  DWORD   rgfExStyle
  DWORD   rgfStyle;
  WORD    wID_Menu;
  HANDLE  hText,
  HWND    hwndParent,
  HANDLE  hInstance;
  FARPROC lpfnWndProc;
} WND_3_0 .


typedef struct
{
  HWND    hwndNext;
  HWND    hwndChild;
  HWND    hwndParent,
  HWND    hwndOwner,
  RECT    rectWindow,
  RECT    rectClient;
  HANDLE  hmemTaskQ;
  HRGN    hrgnUpdate;
  HCLASS  hClass;
  HANDLE  hInstance:
  FARPROC lpfnWndProc;
  DWORD   dwFlags:
  DWORD   rgfStyle
  DWORD   rgfExStyle;
  WORD    wID_Menu;
  HWND    hText;
  HANDLE  hScroll;
  HANDLE  hProp;
  HWND    hwndLastActive;
  HMENU   hmenuSystem;
} WND_3_1 ;

typedef struct
{
  WORD    wFlags;
  WORD    hIDorPopup;
  RECT    rectCapture;
  WORD    xTab;
  HANDLE  hCheckedBmp;
  HANDLE  hUncheckedBmp;
  HANDLE  hStrOrBmp;
  WORD    xULStart;
  WORD    cxULLen;
  WORD    cbItemLen;
} MENUITEM, FAR *LPMENUITEM;

typedef struct
{
  WORD    wFlags;
  WORD    iCurrSel;
  WORD    iCurrPopup;
  WORD    cbMenu,
  WORD    cxWidth;
  WORD    cyHeight,
  WORD    cItems;
  HWND    hwndOwner;
  MENUITEM *pItems;
} MENU_3_0 .

typedef struct
{
  HMENU   hmenuNext,
  WORD    wFlags
  WORD    wMagic;
  HANDLE  hTaskQ;
  WORD    cxWidth,
  WORD    cyHeight;
  WORD    cItems,
  HWND    hwndOwner;
  HANDLE  hItems;
  WORD    w12;
} MENU_3_1 ;

typedef void FAR *LPMENU,

typedef struct
{
  ATOM    atomID,
  HANDLE  hData,
  WORD    wFlags.
} PROPERTY,
typedef struct
{
  WORD cProps.
} PROPLIST,


typedef struct
{
  HANDLE  hdceNext;
  HWND    hwnd,
  HDC     hDC,
  BYTE    byFlags;
  BYTE    byInUse;
  BYTE    byDirty;
  BYTE    byBA,
  WORD    xOrigin,
  WORD    yOrigin,
  HWND    hwndTop,
  HRGN    hVisRgn;
} DCE, *HDCE,

typedef struct tagCALLWNDPROCPARMS
{
  LONG lParam;
  WORD wParam;
  WORD message,
  HWND hwnd;
} CALLWNDPROCPARMS, FAR
*LPCALLWNDPROCPARMS;

typedef enum tagHMMCODES
{
  HMM_OSKOCCDEFINECOMPLETE = WM_USER
+ 0x5000,
  HMM_OSKOCCCLOSECOMPLETE,
  HMM_OSKOCCUNICLOSECOMPLETE,
} HMMCODES;

int CALLBACK              LibMain( HINSTANCE
hInstance,
WORD wDataSeg, WORD cbHeapSize,
                          LPSTR
lpszCmdLine);
int CALLBACK __export __loadds WEP( int
nExitType );
long WINAPI  __export __loadds OccWndProc(
HWND hWnd, UINT
message, WPARAM wParam, LPARAM lParam );

HINSTANCE GetLibInst( void );
BYTE      IsMoveActive( void ).
BOOL      InitLibrary( HINSTANCE hInstance );
HWND      GetNoPaintWindow( void );
int       MoveOcclusion( LPRECT lprcCheckPos,
LPRECT lprcNewDimen
);
int       CreateOcclusion( LPRECT lprcCheckPos,
LPRECT
lprcNewDimen ),
int       UNICloseOcclusion( void ),
int       CheckWindowPos( LPRECT lprcPopupPos );
int       CheckOSKWindowPos( LPRECT
lprcNewNoPaintPos );

LPRECT GetMenuPos( HMENU hPopupMenu );
int   LocateMenuHeap( void );
BOOL   ContainsLocalHeap( WORD wSeg );
BOOL   IsMenuHeap( WORD wSel );
int   FindAddress( WORD wSel, HANDLE hHandle,
WORD FAR *pOfs,
WORD FAR *pSize );

BOOL IsMsgHookInstalled( void );
int InstallMsgHook( void );
int UninstallMsgHook( void ).
LRESULT CALLBACK __export __loadds
OSKGetMsgProc( int iCode,
WPARAM wParam, LPARAM lParam );

int WINAPI __export __loadds DefineOcclusion( int
xPos, int yPos,
int xWidth, int yHeight ).
int WINAPI __export __loadds CloseOcclusion( void
);
int WINAPI __export __loadds RegisterOSKOcc(
HWND hWndHM );


Copr. 1995 Zenith Data Systems Corp.
#ifndef __RPARM_H__

   #define __RPARM_H__

#define MAXLEN_ENTRY_NAME           10
#define MAXLEN_DIALOUT_LOGINID      10
#define MAXLEN_DIALOUT_PASSWORD     20
#define MAXLEN_TELEPHONE_NUMBER     36
#define MAXLEN_DIALIN_LOGINID       10
#define MAXLEN_DIALIN_PASSWORD      20
#define MAXLEN_REMOTE_DESCRIPTION   27
#define MAXLEN_DIRECTORY            56
#define MAXLEN_SERVICE              22
#define MAXLEN_NETBIOS_IP_ADDRESS   20
#define MAXLEN_TCP_IP_ADDRESS       12
#define MAXLEN_NETBIOS_CALL_NAME    16
#define MAXLEN_RPARM_SPARE          18

#define OPTIONS_DIALBACK          (1<<0)
#define OPTIONS_FILEACCESS_ALL     (0x00)
#define OPTIONS_FILEACCESS_SENDONLY
(0x01)
#define OPTIONS_FILEACCESS_RCVONLY
(0x10)
#define OPTIONS_FILEACCESS_NONE    (0x11)
#define OPTIONS_PHONEBOOK_ENCRYPT
(1<<3)

#define PORT_COM0             0
#define PORT_COM1             1
#define PORT_COM2             2
#define PORT_SPECIAL          3

#define BAUDRATE_300          0
#define BAUDRATE_1200         1
#define BAUDRATE_2400         2
#define BAUDRATE_4800         3
#define BAUDRATE_7200         4
#define BAUDRATE_9600         5
#define BAUDRATE_14400        6
#define BAUDRATE_19200        7
#define BAUDRATE_38400        8
#define BAUDRATE_57600        9
#define BAUDRATE_115200       10

#define TERMTYPE_REMOTE        0
#define TERMTYPE_TTY          1
#define TERMTYPE_VT100         2
#define TERMTYPE_VT102         3

#define DIAL_TONE            0
#define DIAL_PULSE           1

#define PROTOCOL_SPX           0
#define PROTOCOL_ASYNCH           7

#define INT14_COACS          0
```

```
#define INT14_EBIOS         1
#define INT14_CROSS         2
#define INT14_MID           3
#define INT14_BANYAN        4
#define INT14_CONTECH       5
#define INT14_PROTO         6

#define NETBIOS_ADAPTER_1       0
#define NETBIOS_ADAPTER_2       1

struct rparm
{
  char rprecno;
  char rpophon,

  char rpid[MAXLEN_ENTRY_NAME + 1];

  char rpdoid[MAXLEN_DIALOUT_LOGINID + 1];

  char rpdopw[MAXLEN_DIALOUT_PASSWORD +
1]

  char rpcaino[MAXLEN_TELEPHONE_NUMBER +
1]

  char rpdid[MAXLEN_DIALIN_LOGINID + 1];

  char rpdipw[MAXLEN_DIALIN_PASSWORD + 1];

  char rpdesc[MAXLEN_REMOTE_DESCRIPTION +
1];

  char rpphum;

  char rppotyp.

  char rpbrate

  char rptermtyp;

  char rpdtyp;

  char rpprotocol;

  char rpdirec[MAXLEN_DIRECTORY + 1];

  char rpserv[MAXLEN_SERVICE + 1];

  char rpinternet[MAXLEN_NETBIOS_IP_ADDRESS
+ 1];

  char rptype

  char rptcpnet[MAXLEN_TCP_IP_ADDRESS + 1];

  char
rpnetcname[MAXLEN_NETBIOS_CALL_NAME + 1];

  char rpnetadapt,

  char rpspare[MAXLEN_RPARM_SPARE];
}.

typedef struct rparm RPARM.

#endif
Copr. 1995 Zenith Data Systems Corp.

#define MAXLEN_DEFAULT_PATH          20
#define MAXLEN_FASTACCESS_REMOTEID 10
#define MAXLEN_DIRECTORY         65
#define MAXLEN_CALLID          10
#define MAXLEN_NETBIOS_NAME        16
#define MAXLEN_SPARE          21

#define MISC_USE_SOUND              (1<<0)
#define MISC_CON_DRIVER             (1<<1)
#define MISC_CLOCK_DISPLAY           (1<<2)
#define MISC_SCREEN_SIZE            (1<<3)
#define MISC_FAST_GRAPHICS           (1<<4)
#define MISC_FULL_SPEED             (1<<5)
#define MISC_SCREEN_BLANK_KB_DISABLED
(1<<6)
#define MISC_FILE_OVERWRITE_CHECK_OFF
(1<<7)

#define GPLANE_NONE             0
#define GPLANE_1               1
#define GPLANE_2               2
#define GPLANE_3               3
#define GPLANE_4               4

#define CTRL_ALT_RSHIFT          0
#define CTRL_ALT               1
#define CTRL_LSHIFT             2
#define CTRL_RSHIFT             3
#define CTRL_ALT_LSHIFT           4
#define ALT_LSHIFT             5
#define ALT_RSHIFT             6
#define LSHIFT_RSHIFT            7

#define DEFAULT_DRIVE_A           0
#define DEFAULT_DRIVE_B           1
#define DEFAULT_DRIVE_C           2

#define REBOOTONHANGUP_NEVER         0
#define REBOOTONHANGUP_ALWAYS        1
#define REBOOTONHANGUP_NORMAL        2
#define REBOOTONHANGUP_ABNORMAL       3

#define OPTIONS_COMPRESS_FILE_ON_XFER
(1<<0)
#define OPTIONS_CONSOLE_DRIVER
(1<<1)
#define OPTIONS_AUTO_DETERMINE_ANSI
(1<<2)
#define OPTIONS_REMOTE_MOUSE_SUPPORT
(1<<3)
#define OPTIONS_COM_PORT_MONITOR
(1<<4)

struct shad_cfg
{
   char dwdi;

   char dtype:

   char dscan;

   char brdr,
   char bgrd
   char fgrd,
   char uifbgrd:
   char uiffgrd,
   char sporn,
   char gplane;

   char adito;
   char keys;

   char drvl.

   char pdir[MAXLEN_DEFAULT_PATH + 1];

   char facc[MAXLEN_FASTACCESS_REMOTEID
+ 1].

   char sound.

   char pswd;

   char reboot;

   char notes;

   char bdrva,
   char dirac[MAXLEN_DIRECTORY + 1];

   char vmode;

   char scid[MAXLEN_CALLID + 1];

   char ringet;

   char inactiov

   char apflag.

   char sc_rate,

   int  uport,
   char usrq;
   char cwinec.

   char netname[MAXLEN_NETBIOS_NAME + 1];

   char spare[MAXLEN_SPARE];

};
Copr 1995 Zenith Data Systems Corp.

#define VOID        void
#define APIFUNCRET   VOID

#define FAR        _far
#define NEAR       _near
#define PASCAL     _pascal
#define CDECL      _cdecl

typedef int      BOOL

#if defined( TRUE )
  #undef TRUE
#endif

#if defined( FALSE )
  #undef FALSE
#endif

#if defined( FON )
  #undef ON
#endif

#if defined( FOFF )
  #undef OFF
#endif

#define TRUE      1
#define FALSE     0
#define FON       1
#define FOFF      0

typedef unsigned char     BYTE;

#if defined( WORD )
  #undef WORD
#endif

#if defined( DWORD )
  #undef DWORD
#endif
typedef unsigned long     DWORD;

typedef unsigned short    WORD.
typedef unsigned int      UINT;
typedef signed long       LONG
typedef void *            PVOID.
typedef void FAR*         LPVOID;

#define LOBYTE(w)       ((BYTE)(w))
#define HIBYTE(w)       ((BYTE)(((UINT)(w) >> 8)
& 0xFF))

#if defined( LOWORD )
  #undef LOWORD
#endif
#define LOWORD(l)
((WORD)(DWORD)(LPVOID)(l))

#if defined( HIWORD )
  #undef HIWORD
#endif

#define HIWORD(l)
((WORD)(((DWORD)(LPVOID)(l)) >> 16)
& 0xFFFF))

#define MAKELONG(low, high)
((LONG)(((WORD)(low)) |
(((DWORD)((WORD)(high))) << 16)))
#define MAKEWORD(low, high) ((WORD)low |
((WORD)high << 8))

#if defined( OFF )
  #undef OFF
#endif

#define OFF(lp)         (LOWORD( ( DWORD )(
BYTE FAR * )lp ))
#define SEG(lp)         (HIWORD( ( DWORD )(
BYTE FAR * )lp ))

#ifndef NOMINMAX
#ifndef max
#define max(a,b)        (((a) > (b)) ? (a) : (b))
#endif
#ifndef min
#define min(a,b)        (((a) < (b)) ? (a) : (b))
#endif
#endif

typedef UINT WPARAM;
typedef LONG LPARAM;
typedef LONG LRESULT;

#define MAKELPARAM(low, high)
((LPARAM)MAKELONG(low, high))
#define MAKELRESULT(low, high)
((LRESULT)MAKELONG(low, high))

#ifndef NULL
#define NULL          0
#endif

typedef char NEAR*       PSTR;
typedef char NEAR*       NPSTR;

typedef char FAR*        LPSTR.
typedef const char FAR*   LPCSTR;

typedef BYTE NEAR*       PBYTE;
```

```
typedef BYTE FAR*        LPBYTE;

typedef int NEAR*        PINT;
typedef int FAR*         LPINT;

typedef WORD NEAR*       PWORD;
typedef WORD FAR*        LPWORD;

typedef long NEAR*       PLONG;
typedef long FAR*        LPLONG;

typedef DWORD NEAR*      PDWORD;
typedef DWORD FAR*       LPDWORD;

#define MAKELP(sel, off)   ((void
FAR*)MAKELONG((off), (sel)))


#define STRFIELDOFFSET( struct, field )
(((NPSTR)(struct.field))-((NPSTR)&(struct)))
#define WORDFIELDOFFSET( struct, field )
(((NPSTR)&(struct.field))-((NPSTR)&struct))


#define AX( value ) _asm mov ax, value
#define BX( value ) _asm mov bx, value
#define CX( value ) _asm mov cx, value
#define DX( value ) _asm mov dx, value
#define ES( value ) _asm mov es, value
#define DS( value ) _asm mov ds, value
#define SI( value ) _asm mov si, value
#define DI( value ) _asm mov di, value

#define PSP_PARENT_PSP( psp ) *( int far * )( ( (
long )psp << 16
) + 0x16 )
#define PSP_TERMINATE( psp ) *( long far * )( ( (
long )psp << 16
) + 0x0A )

#if defined( PROD )
#define DEBUG_BREAK _asm nop
#define TRACE( s ) _asm nop
#else
#define DEBUG_BREAK _asm int 3
#define TRACE( s ) Trace( s )
#endif

typedef void ( FAR * FARPROC )();
typedef void ( FAR * FARCALLENTRY )();
typedef void ( * NEARPROC )();
typedef APIFUNCRET ( * APIFUNCPTR )( struct
REGW * );
typedef void ( * DOSBUSYCB )( void );
typedef void ( * VIDBUSYCB )( void );
typedef void ( * MODALMSGBOXCB )( int );
typedef int ( FAR * SUICB )( void );
typedef int ( FAR * PRXCB )( void );

#define SIG_SMSIGNATURE    "saratoga manager,
copyright zds"
#define SIG_RLNOEMSIGNATURE "Proxim OEM
Interface Enabler"
#define SIG_POSOFFSET      10
#define SIG_NEGOFFSET      10

#define SUI_MAXLENUSERID      10
#define SUI_MAXLENPASSWORD    20
#define SUI_MAXLENSECURITYID  20
#define SUI_MAXLENSECURITYSUI 20
#define SUI_MAXLENLBENTRY     80
#define SUI_MAXLENACTIVEUPD   80
#define SUI_MAXNUMSCANCODES   32

#define RLN_MAXLENNODEADDRESS 20

#define PRX_EVENTNUM 5
#define PRX_POLLFREQ 5

#define PRX_MAXLENROMVERSION 0x07
#define PRX_MAXLENMASTERNAME 11
#define PRX_MAXLENNODEADDRESS 8

#define PRX_CBSUSPEND       0x0000
#define PRX_CBRESUME        0x0001
#define PRX_CBPRXVARIABLES  0x0002
#define PRX_CBSETSECUREID   0x0003

#define PRX_NUMOFAVAILFRAMES 4
#define PRX_NOFRAMETYPE      0
#define PRX_FRAME8022        ( SL_FT_E802_2 )
#define PRX_FRAME8023        ( SL_FT_E802_3 )
#define PRX_FRAMEEN          ( SL_FT_EII )
#define PRX_FRAMESNAP        ( SL_FT_ESNAP )
#define PRX_FRAMEBASE        (
PRX_FRAME8022 )

#define PRX_NOLINKQUALITY  -1
#define PRX_DISCONNECTED   0x0000
#define PRX_LOWQUALITY     0x0001
#define PRX_HIGHQUALITY    0x0002

#define PRX_DOMAIN0      0
#define PRX_DOMAIN1      1
#define PRX_DOMAIN7      7

#define PRX_MAXDOMAINID   15
#define PRX_MINDOMAINID   0

#define SCS_MAXLENMSGBUFF     150
#define SCS_MAXLENNODEADD     21
#define SCS_MAXLENHOSTDATA    35
#define SCS_MAXLENPHONEBOOK   11
#define SCS_MAXLENGROUPNAME   8
#define SCS_MAXLENHOSTNAME    8
#define SCS_MAXLENHOSTVERSION 2
#define SCS_MAXLENSERIALNUM   10
#define SCS_MAXLENRESERVED    1
#define SCS_MAXLENFILENAME    128

#define SCS_OFFGROUPKEY     (
SCS_MAXLENNODEADD )
#define SCS_OFFHOSTKEY      (
SCS_MAXLENNODEADD +
SCS_MAXLENGROUPNAME + 1 )
#define SCS_OFFSERIALNUM    (
SCS_MAXLENNODEADD +
SCS_MAXLENGROUPNAME + 1 +
SCS_MAXLENHOSTNAME + 1 + 2 * sizeof(
BYTE ) )

typedef struct tagSCANCODE
{
  WORD wScanCode;
} SCANCODE;

typedef struct tagUICONFIGDATA
{
  WORD wBuffLen;
  BYTE nMajorVersionNum;
  BYTE nMinorVersionNum;
  unsigned int bAutoShutoff      : 1;
  unsigned int bConnectType      : 2;
  unsigned int bLockKbdMouse     : 1;
  unsigned int bDimScreen        : 1;
  unsigned int bLastConnPassword   1;
  unsigned int bReserved         : 10;
  BYTE nContrastIdx;
  BYTE nBrightnessIdx;
  BYTE nSleepTimeIdx;
  BYTE nDomainID;
  WORD wXUpperPenCalib;
  WORD wYUpperPenCalib;
  WORD wXLowerPenCalib;
  WORD wYLowerPenCalib;
  WORD wUILanguage;
  WORD wLastVersion;
  BYTE nLastOSKScreen;
  BYTE nLastOSKDlgScreen;
  BYTE nLastSetupDlgScreen;
  int xPosLastOSKScreen;
  int yPosLastOSKScreen;
  char szLastHostName[ SCS_MAXLENHOSTNAME
+ 1 ];
  char szSecurityID[ SUI_MAXLENSECURITYID + 1
];
  char szLastNodeAddress[
RLN_MAXLENNODEADDRESS + 1 ];
  BYTE nFrameType;
  SCANCODE aUDHotIcon1[
SUI_MAXNUMSCANCODES + 1 ];
  SCANCODE aUDHotIcon2[
SUI_MAXNUMSCANCODES + 1 ];
} UICONFIGDATA;

#define PND_OFFCALIB ( sizeof( WORD ) + sizeof(
BYTE ) * 2 +
sizeof( unsigned int ) + sizeof( BYTE ) * 4 );


typedef enum tagTHREADTYPEID
{
  SMD_NOTHREAD,
  SMD_ALLTHREADTYPES,
  SMD_POLLED,
  SMD_ONETIME,
  SMD_MANYTIMES,
  SMD_ONDEMAND,
} THREADTYPEID;

typedef enum tagSUIACTIONCODE
{
  SUI_NOACTION,
  SUI_NOSCREEN,
  SUI_LASTOSKSCREEN,
  SUI_LASTSETUPDLGSCREEN,
  SUI_LASTCONNECTION,
  SUI_SPECIFIEDSCREEN,
  SUI_DOPENCALIBRATION
  SUI_BADVIDEOMSG,
} SUIACTIONCODE;

typedef enum tagPREPSUISTATES
{
  SUI_NOPREPSTATE,
  SUI_SETINITHOSTOCC,
  SUI_CHECKMONITOROFF,
  SUI_DOMEMREALLOC,
  SUI_DOMEMDEALLOC,
  SUI_CHECKMEMDEALLOC,
  SUI_CHECKMEMREALLOC,
  SUI_CHECKFULLREPAINT,
  SUI_PREPSUCCESS,
  SUI_PREPERROR,
} PREPSUISTATES;

typedef enum tagUNLOADSUISTATES
{
  SUI_NOUNLOADSUISTATE,
  SUI_GETACTIVEUPDATE,
  SUI_DIMSCREEN,
  SUI_LOCKKBDMOUSE,
  SUI_UNLOADSUISUCCESS,
} UNLOADSUISTATES;

typedef enum tagCLEANUPSUISTATES
{
  SUI_NOCLEANUPSTATE,
  SUI_CHECKMEMCLEANUP,
  SUI_CHECKMONITORON,
  SUI_CHECKFULLPAINTCLEANUP,
  SUI_FULLSCREENREPAINT,
  SUI_CLEANUPSUCCESS,
  SUI_CLEANUPERROR,
} CLEANUPSUISTATES;

typedef enum tagCALIBPENSTATES
{
  SUI_INITIALCALIBSTATE,
  SUI_CHECKCALIB,
  SUI_CALIBSUCCESS,
  SUI_CALIBERROR,
} CALIBPENSTATES;

typedef enum tagFLASHUPDATESTATES
{
  FLU_NOFLUSTATE,
  FLU_SAFETYCHECK,
  FLU_INITMEM,
  FLU_ALLOCDOSMEM,
  FLU_SENDREOFLASHUPD,
  FLU_WAITFORTMPFLASHFILES,
  FLU_UPDATETMPFILEPERCENT,
  FLU_WAITFORNUMFILES,
  FLU_SENDREQPATH,
  FLU_WAITFORPATHFLASHFILE,
  FLU_RECEIVEHOSTFILE,
  FLU_FLASHIT,
  FLU_FLASHUPDATECOMPLETE,
  FLU_CLEAREEROM,
  FLU_REBOOT,
  FLU_BEGINERRORSTATES,
  FLU_RELEASEMEM,
  FLU_NOFLASHFILES,
  FLU_READHOSTDAT,
  FLU_MISSINGFILE,
  FLU_OUTOFDISKSPACE,
  FLU_FILECORRUPTED,
  FLU_NOCHECKSUM,
  FLU_HOSTUNKNOWNERR,
  FLU_NOACKTEMPFILESERROR,
  FLU_NOACKNUMFILESERROR,
  FLU_NOACKPATHERROR,
  FLU_NOACKRECEIVEFILEERROR,
  FLU_NOACKRECEIVEFATALERROR,
  FLU_FLASHFATALERROR,
  FLU_SENDPRMSGERROR,
  FLU_EEROMNOCLRERROR,
  FLU_MEMERROR,
  FLU_GETBATTERYINFOERROR,
  FLU_BATNOTATTACHEDERROR,
  FLU_BATCAPTOOLOWERROR,
  FLU_NOTONACERROR,
  FLU_NOCONNECTERROR,
  FLU_LINKTOOLOWERROR,
  FLU_1MEGSYSTEMERROR,
  FLU_2MEGSYSTEMERROR,
} FLASHUPDATESTATES;

typedef enum tagPROCMSGBOXSTATES
{
  SUI_NOPROCMSGBOXSTATE,
  SUI_HIDEMSGBOX,
  SUI_SHOWMSGBOXSTATE,
};

typedef enum tagSMISCANCODES
{
  SMI_SF1   = 0x003B,
  SMI_SF2,
  SMI_SF3,
  SMI_SF4,
  SMI_SF5,
  SMI_SF6,
  SMI_SF7,
  SMI_SF8,
  SMI_SF9,
  SMI_SF10,
  SMI_SALTQ = 0x0810,
} SMISCANCODES;


typedef struct tagAPIFUNC
{
  WORD          wFuncCode;
  APIFUNCPTR    lpAPIFunc;
} APIFUNC;

typedef struct tagEVENT
{
  NEARPROC      fpThread;
  APIFUNC       *aAPIFuncTable;
  THREADTYPEID  ThreadTypeId;
  LONG          lTimeLimit;
  LONG          lTimeCurrent;
  int           iInitRetryLimit;
  int           iRetryLimit;
  BYTE          nReenterCount;
  unsigned int bReentrant : 1;
  unsigned int bReserved  : 15;
} EVENT;

typedef struct tagPENCALIB
{
  WORD wXUpperPenCalib;
  WORD wYUpperPenCalib;
  WORD wXLowerPenCalib;
  WORD wYLowerPenCalib;
  WORD wHITopMargin;
  WORD wHIRightMargin;
  WORD wHIVertSpace;
  WORD wHIXWidth;
  WORD wHIYHeight;
} PENCALIB;

typedef struct trap_rec TRAPREC;

typedef struct tagZDSTRAPREC
{
  TRAPREC tr;

  char sAfterFill[ SIG_POSOFFSET - 5 ];

  char szSMAfterSignature[ sizeof(
SIG_SMSIGNATURE ) + 1 ];
} ZDSTRAPREC;

typedef struct tagPROXIMTRAPREC
{
  char sFill;
  char szSMBeforeSignature[ sizeof(
SIG_RLNOEMSIGNATURE ) - 8 ];

  TRAPREC tr;

} PROXIMTRAPREC;

typedef struct tagPROXIMVARIABLES
{
  LPSTR lpszSynchronizeFlag;
  LPSTR lpszRomVersion;
  LPSTR lpszLinkQuality;
} PROXIMVARIABLES;

typedef struct tagPROXIMNETCONFIGDATA
{
  BYTE nIRQ;
  BYTE nDomainID;
  BYTE nChannel;
  BYTE nSubChannel;
  BYTE nNodeType;
  WORD wPortAdd;
  WORD wInactivityTime;
  char szMasterName[
PRX_MAXLENMASTERNAME + 1 ];
  char sNodeAddress[
PRX_MAXLENNODEADDRESS ];
  BYTE nSocket;
  BYTE fInk365;
  WORD wMemAddress;
  BYTE nSniffTime;
} PROXIMNETCONFIGDATA;

typedef struct tagPROXIMVERSIONINFO
{
```

```
 WORD wMajorVersion;
 WORD wMinorVersion;
 LPSTR lpszModuleName;
} PROXIMVERSIONINFO;

typedef struct tagCALLREC
{
  char  cFarCallOpCode;
  char  aCallBack[ sizeof( FARPROC ) ];
  char  cFarRetOpCode;

  char aAfterFill[ SIG_POSOFFSET - ( sizeof(
FARPROC ) + 2 ) ];
  char szSMAfterSignature[ sizeof(
SIG_SMSIGNATURE ) + 1 ];
} CALLREC;

typedef struct tagEXECPARMS
{
  WORD wSegEnv;
  WORD wOffCmdLineTail;
  WORD wSegCmdLineTail;
  WORD wOffFCB1;
  WORD wSegFCB1;
  WORD wOffFCB2;
  WORD wSegFCB2;
} EXECPARMS;--

typedef struct tagBUFFHEADER
{
  int   iStructLen;
  int   iBuffLen;
  LPVOID Buff;
} BUFFHEADER

typedef struct tagPRIVATEMSGBUFF
{
  int iMsgID;
  int iBuffLen;
  char aMsgBuff[ SCS_MAXLENMSGBUFF ];
} PRIVATEMSGBUFF;

typedef struct tagCURRHOSTNAME
{
  LPSTR lpszNodeAddress;
  LPSTR lpszGroupName;
  LPSTR lpszHostName;
  UINT  iHostVersion;
  LPSTR lpsSerial;
  LPSTR lpsReserved;
} CURRHOSTNAME;

typedef struct tagHOSTDATABUFF
{
  char szGroupName[ SCS_MAXLENGROUPNAME
+ 1 ];
  char szHostName[ SCS_MAXLENHOSTNAME + 1
];
  BYTE nMinorVersion;
  BYTE nMajorVersion;
  char sHostSerial[ SCS_MAXLENSERIALNUM ];

  unsigned char bPasswordProtect : 1;
  unsigned char bNotInUseYet : 7;
  char sReserved[ SCS_MAXLENRESERVED ];
  char nHostStatus;
} HOSTDATABUFF;

typedef struct tagHOSTLISTBUFF
{
  char szNodeAddress[ SCS_MAXLENNODEADD ];
  HOSTDATABUFF HostDataBuff;
} HOSTLISTBUFF;

typedef struct tagHOSTLISTENTRIES
{
  int iNumEntries;
  HOSTLISTBUFF *aHostListBuff;
} HOSTLISTENTRIES;


typedef struct tagHOSTLISTBOXENTRY
{
  HOSTLISTBUFF HostListBuff;
  char nAttribute;
} HOSTLISTBOXENTRY;

typedef struct tagHOSTLISTBOXENTRIES
{
  int iNumEntries;
  HOSTLISTBOXENTRY aHostListBoxEntries[];
} HOSTLISTBOXENTRIES;

typedef struct tagLISTBOXENTRY
{
  char far *lpszEntry;
  char nAttribute;
} LISTBOXENTRY;

#pragma pack(1)
typedef struct tagMSGBOXBUFF
{
  char far *lpszText;
  char nAlignment;
} MSGBOXBUFF;
#pragma pack()

typedef struct tagSYSTEMSTATUSBUFF
{
  BYTE nCurrentVidMode;
  char szLastConnect[ SCS_MAXLENPHONEBOOK
];
  BYTE nCallProgress;
  BYTE nProtocolId;
  BYTE fAbortRequestConnect;
} SYSTEMSTATUSBUFF;

typedef struct tagOCCLUDETEXT
{
  int yULRow;
  int xULCol;
  int yLRRow;
  int xLRCol;
} OCCLUDETEXT;

typedef struct tagOCCLUDEDOSGRAPHICS
{
  int xULDos;
  int yULDos;
  int xLRDos;
  int yLRDos;
} OCCLUDEDOSGRAPHICS;

typedef struct tagOCCLUDERWIN
{
  int xULWin;
  int yULWin;
  int xLRWin;
  int yLRWin;
} OCCLUDERWIN;

typedef union tagOCCLUDEUNION
{
  OCCLUDETEXT occText;
  OCCLUDEDOSGRAPHICS occDosGraph;
  OCCLUDERWIN occRWin;
} OCCLUDEUNION;

#pragma pack(1)
typedef struct tagMCB
{
  unsigned char cType;
  WORD        wOwner;
  WORD        wSize;
  unsigned char aUnused[3];
  unsigned char aDOS4[8];
} MCB;
#pragma pack()

#define SHC_SPKRPOLLFREQ       0x0005

#define SHC_NVRAMSEG           0xF000
#define SHC_NVRAMOFF           0x0000
#define SHC_MAXLENNVRAM        0x1E0
#define SHC_SEGEQUIPTABLE      0x0040
#define SHC_OFFSCREENROWS      0x0084
#define SHC_OFFCHARSCANLINES   0x0085
#define SHC_ADDSCREENROWS      0x00000484
#define SHC_ADDCHARSCANLINES   0x00000485

#define SHC_MAXLENHEAP         20000
#define SHC_MAXLENKBBUFF       16

#define SHC_VIDSTATEFUNC       0x1C

#define SHC_VIDEOHARDWARE      0x01
#define SHC_VIDEODATAAREA      0x02
#define SHC_COLORPALREGS       0x04

#define SHC_SIZEOFBUFF         0x00
#define SHC_SAVEVIDEO          0x01
#define SHC_RESTOREVIDEO       0x02

#define SHC_VIDSTATEBLOCKSIZE  0x40

#define SHC_XVGARES            640
#define SHC_YVGARES            480

#define SHC_DEFCONTRASTIDX     11
#define SHC_DEFBRIGHTNESSIDX   23

#define SHC_HIMEMSEG           0xC000

#define SMD_SCHEDULERS         0x01
#define SMD_HOTKEYS            0x02
#define SMD_GENERALTRAPS       0x04
#define SMD_COMMSVCS           0x08
#define SMD_INTSSVCS           0x10
#define SMD_MOUSEKWATCH        0x20
#define SMD_FARCALLS           0x40
#define SMD_SYSMASK            0x80

#define SMD_FULLREENTER    SMD_INTSSVCS
#define SMD_NOREENTRANCE   (
SMD_SCHEDULERS | SMD_HOTKEYS |
SMD_GENERALTRAPS |\
                    SMD_COMMSVCS |
SMD_INTSSVCS |
SMD_MOUSEKWATCH | \
                    SMD_FARCALLS )

#define SMD_REENTERSCHED   (
SMD_HOTKEYS | SMD_FARCALLS |
SMD_GENERALTRAPS |\
                    SMD_COMMSVCS |
SMD_INTSSVCS |
SMD_MOUSEKWATCH )

#define SMD_MAXRECOUNTSCHED 1
#define SMD_MAXTHREADS      17
#define SMD_REUSETHREADS    12

#define SMD_DISPATFREQ     ( DWORD )3

#define SMD_IRET           0
#define SMD_OLDINT         1
#define SMD_EITHER         2

#define SMD_EVENTSTACKLIMIT 10

#define SMD_DOSINT          0x21
#define SMD_DOSEXEC         0x4B00
#define SMD_DOSALLOCMEM     0x4800
#define SMD_DOSFREEMEM      0x4900
#define SMD_GETLISTOFLISTS  0x5200

#define SMD_GETSETALLOCSTRAT 0x5800
#define SMD_GETALLOCSTRAT    0x0000
#define SMD_SETALLOCSTRAT    0x0001
#define SMD_ALLOCFIRSTFIT    0x0000
#define SMD_ALLOCBESTFIT     0x0001
#define SMD_ALLOCLASTFIT     0x0002

#define SMD_CALLOPCODE     ( BYTE )0x9A
#define SMD_RETOPCODE      ( BYTE )0xCB

#define SMD_THREADACTIVE   0xFFFF

#define SMD_NOACTIVETHREAD -1

#define PCB_BEGINCRITICAL  disable_ints();
#define PCB_ENDCRITICAL    enable_ints();

#define SMI_GETMASK        0x8000

#define SMI_SUIINTNUM      0x0088
#define SMI_SUIPOLLFREQ    0
#define SMI_SUIEVENTNUM    0

#define SMI_SUINOTLOADED   0
#define SMI_SUILOADING     1
#define SMI_SUIUNLOADING   2
#define SMI_SUILOADED      3
#define SMI_SUIDEACTIVATING 4
#define SMI_SUIINACTIVE    5

#define SMI_SUIMAXMSGBOXLINES 6

#define SMI_SETCONTRAST      0x000A
#define SMI_GETCONTRAST      0x800A
#define SMI_SETBRIGHTNESS    0x000B
#define SMI_GETBRIGHTNESS    0x800B
#define SMI_SETAUTOSHUTOFF   0x000F
#define SMI_GETAUTOSHUTOFF   0x800F -
#define SMI_SETSLEEPTIME     0x0010
#define SMI_GETSLEEPTIME     0x8010
#define SMI_REBOOTHOST       0x0011
#define SMI_ACTIVEUPDATE     0x0012
#define SMI_DOUPDATE         0x0013


#define SMI_UPDATEHOSTLIST   0x0020

#define SMI_GETHOSTLISTSTAT  0x0021
#define SMI_AVAILABLE        0x0000
#define SMI_INPROGRESS       0x0001
#define SMI_BLANK            0x0002

#define SMI_CALIBUPLEFT      0x000C
#define SMI_CALIBLOWRIGHT    0x800C
#define SMI_CALIBCANCEL      0x000E
#define SMI_CALIBPOLLFREQ    0x0001


#define SMI_GETCONNECTSTAT   0x0022
#define SMI_SCSDISCONNECTED  0x00
#define SMI_SCSWAITINGFORCONNECT 0x01
#define SMI_SCSDIALING       0x02
#define SMI_SCSCONNECTED     0x03
#define SMI_SCSLOGGINGIN     0x04
#define SMI_SCSNETWARESPX    0x00
#define SMI_SCSASYNC         0x07
#define SMI_CONNECTED        0x00
#define SMI_DIALING          0x01
#define SMI_WAITINGFORCONNECT 0x02
#define SMI_LOGGINGIN        0x03
#define SMI_DISCONNECTED     0x04
#define SMI_INVALIDHOST      0x05
#define SMI_INVALIDPASSWORD  0x06
#define SMI_CONNECTTIMEOUT   0x07
#define SMI_BUSY             0x08
#define SMI_NOCARRIER        0x09
#define SMI_NODIALTONE       0x0A
#define SMI_WAITINGFORREDIAL 0x0B
#define SMI_NETWARESPX       0x00
#define SMI_MODEM            0x01
#define SMI_SERIAL           0x02

#define SMI_REQUESTCONNECT   0x0023


#define SMI_REQUESTDISCO     0x8023
#define SMI_ABORTREQCONNECT  0x0024
#define SMI_GETPASSWORDSTAT  0x0025
#define SMI_LBSETMODEMDESC   0x0026
#define SMI_LBGETMODEMDESC   0x8026
#define SMI_LBSETPHONELIST   0x0027
#define SMI_LBGETPHONELIST   0x8027
#define SMI_LBSETMODEMMANU   0x0028
#define SMI_LBGETMODEMMANU   0x8028
#define SMI_LBSETMODEMBAUD   0x0029
#define SMI_LBGETMODEMBAUD   0x8029
#define SMI_LBSETNETGROUP    0x002A
#define SMI_LBGETNETGROUP    0x802A
#define SMI_LBSETNETHOST     0x002B
#define SMI_LBGETNETHOST     0x802B

#define SMI_SETCONNECTTYPE   0x002C
#define SMI_GETCONNECTTYPE   0x802C
#define SMI_NETWORKCONNECT   0x0000
#define SMI_MODEMCONNECT     0x0001
#define SMI_SERIALCONNECT    0x0002

#define SMI_SETUSERID        0x002D
#define SMI_GETUSERID        0x802D
#define SMI_SETPASSWORD      0x002E
#define SMI_GETPASSWORD      0x802E
#define SMI_SETMODEMTONE     0x002F
#define SMI_GETMODEMTONE     0x802F
#define SMI_SETMODEMPREFIX   0x0030
#define SMI_GETMODEMPREFIX   0x8030
#define SMI_SETMODEMSUFFIX   0x0031
#define SMI_GETMODEMSUFFIX   0x8031
#define SMI_SETMODEMRINGS    0x0032
#define SMI_GETMODEMRINGS    0x8032
#define SMI_SETMODEMRETRY    0x0033
#define SMI_GETMODEMRETRY    0x8033
#define SMI_SETMODEMDELAY    0x0034
#define SMI_GETMODEMDELAY    0x8034
#define SMI_SETMODEMINITSTR  0x0035
#define SMI_GETMODEMINITSTR  0x8035
#define SMI_SETMODEMAUTOSTR  0x0036
#define SMI_GETMODEMAUTOSTR  0x8036
#define SMI_SETMODEMDISCOSTR 0x0037
#define SMI_GETMODEMDISCOSTR 0x8037
#define SMI_SETCONNECTRSPSTR 0x0038
#define SMI_GETCONNECTRSPSTR 0x8038
#define SMI_GETMODEMDEFAULTS 0x0039
#define SMI_LBGETNETFRAMETYPE 0x803A
#define SMI_LBSETNETFRAMETYPE 0x003A

#define SMI_UPDATEDIMLOC     0x0052
#define SMI_REQUESTUNLOAD    0x0053
#define SMI_UNLOADDENIED     0x0001
#define SMI_UNLOADACCEPTED   0x0000

#define SMI_SETMSGBOXRETCODE 0x0056
#define SMI_SETUILANGUAGE    0x0057
#define SMI_GETUILANGUAGE    0x8057
#define SMI_UIUSENGLISH      0x00

#define SMI_SETVIDEOBLOCK    0x0058
#define SMI_CLEARVIDEOBLOCK  0x8058

#define SMI_NOTIFYSCRCODE    0x005A

#define SMI_SETACTIVESTAT    0x0080
#define SMI_SETKEYSTROKE     0x0081

#define SMI_GETKEYBOARDSTAT  0x8082
#define SMI_KBDNOTPRESENT    0x00
#define SMI_KBDPRESENT       0x01

#define SMI_GETABOUTDIALOG   0x0083
#define SMI_GETNEXTCREDITS   0x0084
#define SMI_SETUDHOTICON     0x0085
```

```
#define SMI_GETUDHOTICON    0x8065
#define SMI_SETSECURITYID   0x0066
#define SMI_GETSECURITYID   0x8066
#define SMI_SETDOMAINID     0x0067
#define SMI_GETDOMAINID     0x8067
#define SMI_SETLOCKKBDMOUSE 0x0068
#define SMI_GETLOCKKBDMOUSE 0x8068
#define SMI_DISABLEDLOCKKBDMOUSE 0x0000
#define SMI_ENABLEDLOCKKBDMOUSE 0x0001

#define SMI_SETDIMSCREEN    0x006A
#define SMI_GETDIMSCREEN    0x806A
#define SMI_DISABLEDDIMSCREEN 0x0000
#define SMI_ENABLEDDIMSCREEN 0x0001

#define SMI_SCSINTNUM       0x0068
#define SMI_SCSPOLLFREQ     8
#define SMI_SCSEVENTNUM     1

#define SMI_SCSLOADING      0x0100
#define SMI_SCSINACTIVE     0x0000
#define SMI_SCSACTIVE       0x0001

#define SMI_SCSNOWAITFORDOS FALSE
#define SMI_SCSWAITFORDOS   TRUE

#define SMI_SCSABORTCONN    { 0x1b, 0x1b, 0x1b }

#define SMI_SLLOADSUI       0x0500
#define SMI_SLPOLLFREQ      2

#define SMI_SLENABLEKBD     0x0501
#define SMI_SLGETFRAMETYPE  0x0502
#define SMI_SLDEFINEOLDVIDVECTOR 0x0503
#define SMI_SLGETMLIDSTATUS 0x0504

#define SMI_EVENTLOOPBASE   0x4000
#define SMI_UNLOADOSK       ( SMI_EVENTLOOPBASE + 1 )
#define SMI_CHANGETOBADVIDEO ( SMI_EVENTLOOPBASE + 2 )
#define SMI_CHANGETOGOODVIDEO ( SMI_EVENTLOOPBASE + 3 )

#define SMI_PRIMSGBASE      0x5000
#define SMI_REQFLASHUPD     ( SMI_PRIMSGBASE + HM_PM_FILEREQ )
#define SMI_ACKFLASHBREAK   ( SMI_PRIMSGBASE + HM_PM_FLASH_BREAK )
#define SMI_ACKTOTALFILES   ( SMI_PRIMSGBASE + HM_PM_TOTALFILES )
#define SMI_REQPATHFROMIDX  ( SMI_PRIMSGBASE + HM_PM_PATHREQ )
#define SMI_ACKPATHASSTRING ( SMI_PRIMSGBASE + HM_PM_PATHREP )
#define SMI_REQACTIVEUPDATE ( SMI_PRIMSGBASE + HM_PM_FLASH_NAMQ )
#define SMI_ACKACTIVEUPDATE ( SMI_PRIMSGBASE + HM_PM_FLASH_NAMP )
#define SMI_REQFLASHDONE    ( SMI_PRIMSGBASE + HM_PM_FLASHOK )
#define SMI_REQNOTIFYDOSWIN ( SMI_PRIMSGBASE + HM_PM_DOSWIN )
#define SMI_REQOCCDEFINE    ( SMI_PRIMSGBASE + HM_PM_OSK_DEFINE )
#define SMI_ACKOCCDEFINE    ( SMI_PRIMSGBASE + HM_PM_OSK_DEFINE_ACK )
#define SMI_REQOCCCLOSE     ( SMI_PRIMSGBASE + HM_PM_OSK_CLOSE )
#define SMI_ACKOCCCLOSE     ( SMI_PRIMSGBASE + HM_PM_OSK_CLOSE_ACK )
#define SMI_REQUNIOCCCLOSE  ( SMI_PRIMSGBASE + HM_PM_OSK_CLOSE_UNI )
#define SMI_ACKUNIOCCCLOSE  ( SMI_PRIMSGBASE + HM_PM_OSK_CLOSE_UNI_ACK )

#define SMI_BEGRLNINTNUM    0x0080
#define SMI_ENDRLNINTNUM    0x0090
#define SMI_RLNPOLLFREQ     0
#define SMI_RLNEVENTNUM     3

#define SMI_PNDINTNUM       0x006A
#define SMI_PNDPOLLFREQ     0
#define SMI_PNDEVENTNUM     2

#define SMI_PNDLOADING      0x0001

#define SMI_PRXINTNUM       0x0080

#define SMI_PRXEVENTNUM     8
#define SMI_PRXPOLLFREQ     0

#define SMI_PRXPOWERMANCB   0x0000
#define SMI_PRXUNLOADING    0x0001
#define SMI_PRXNETCONFIG    0x0002
#define SMI_PRXXCHGREVINFO  0x0003

#define SUI_INTNUM          0x0065
#define SUI_POLLFREQ        0
#define SUI_EVENTNUM        4
#define SUI_CLEANUPEVENTNUM 10
#define SUI_PRIMSGPOLLFREQ  5
#define SUI_MSGBOXPOLLFREQ  2
#define SUI_PROCMSGBOXPOLLFREQ 1

#define SUI_MSGBOXCONNECTTIMEOUT 20
#define SUI_LOGINTIMEOUT    120

#define SUI_CALIBPOINTDONE  0x000D
#define SUI_XCALIBPOINT     4
#define SUI_YCALIBPOINT     4

#define SUI_UPDATEFLASHPRCNT 0x0014
#define SUI_DISPLAYDIALOG   0x0051

#define SUI_CLOSEDIALOG     0x0053
#define SUI_NOUNLOADSUI     0
#define SUI_UNLOADSUI       1

#define SUI_SHOWMSGBOX      0x0055

#define SUI_NOSLEEPSLIDERIDX 8

#define SUI_UPDATECONNECTSTATUS 0x0038

#define SUI_HIDEMSGBOX      0x0058
#define SUI_LEFTJUSTIFIED   0
#define SUI_CENTERJUSTIFIED 1
#define SUI_RIGHTJUSTIFIED  2
#define SUI_NOBUTTONS       0x0000
#define SUI_OK              0x0001
#define SUI_CANCEL          0x0002
#define SUI_ABORT           0x0004
#define SUI_RETRY           0x0008
#define SUI_IGNORE          0x0010
#define SUI_YES             0x0020
#define SUI_NO              0x0040

#define SUI_SHOWHIDEBUSYCURSOR 0x0059
#define SUI_BUSYCURSORON    0
#define SUI_BUSYCURSOROFF   1

#define SUI_MOVEOSK         0x005B

#define SUI_GETSUIVERSION   0x0069

#define SUI_PARTIALDIALOGSET 0x0001
#define SUI_FULLDIALOGSET   0x0000

#define SUI_OSKASSETUPDIALOGMASK 0x8000
#define SUI_OSKUNICLOSEMASK 0x4000
#define SUI_OSKVIDCHANGEMASK 0x2000
#define SUI_OSKWINGRAPHICSMASK 0x1000

#define SUI_NOSCREEN        0x0000

#define SUI_SMALLALPHA      0x0001
#define SUI_YULSMALLALPHA   0x0040
#define SUI_XULSMALLALPHA   0x0089
#define SUI_YLRSMALLALPHA   0x00E3
#define SUI_XLRSMALLALPHA   0x01F7

#define SUI_SMALLNUMERIC    0x0002
#define SUI_YULSMALLNUMERIC 0x0040
#define SUI_XULSMALLNUMERIC 0x0100
#define SUI_YLRSMALLNUMERIC 0x00E3
#define SUI_XLRSMALLNUMERIC 0x017F

#define SUI_SMALLFULL       0x0003
#define SUI_YULSMALLFULL    0x0040
#define SUI_XULSMALLFULL    0x0050
#define SUI_YLRSMALLFULL    0x00E3
#define SUI_XLRSMALLFULL    0x022F

#define SUI_BIGALPHA        0x0005
#define SUI_YULBIGALPHA     0x0040
#define SUI_XULBIGALPHA     0x0049
#define SUI_YLRBIGALPHA     0x013E
#define SUI_XLRBIGALPHA     0x0237

#define SUI_BIGNUMERIC      0x0006
#define SUI_YULBIGNUMERIC   0x0040
#define SUI_XULBIGNUMERIC   0x00E8
#define SUI_YLRBIGNUMERIC   0x013E
#define SUI_XLRBIGNUMERIC   0x018F

#define SUI_BIGFULL         0x0007
#define SUI_YULBIGFULL      0x0040
#define SUI_XULBIGFULL      0x0080
#define SUI_YLRBIGFULL      0x013E
#define SUI_XLRBIGFULL      0x027F

#define SUI_WINDOWSOSK      0x01
#define SUI_DOSOSK          0x02
#define SUI_SETUPDLG        0x03

#define SUI_PENCALIBRATION  0x0006

#define SUI_LOGIN           0x0009

#define SUI_HOSTSELECTION   0x0008
#define SUI_HOTKEYS         0x0010
#define SUI_MAINTANENCE     0x0018
#define SUI_POWER           0x0020
#define SUI_MODEM           0x0028
#define SUI_SCREEN          0x0030

#define SUI_SETUPDLGMASK    0x00F8
#define SUI_OSKMASK         0x0007

#define SUI_UDHOTICON1      0x0001
#define SUI_UDHOTICON2      0x0002
#define SUI_UDHOTICONIDEF   { 0x0011, 0x0001, 0x0017, 0x0007, 0x0031, 0x0081, \
                              0x001C, 0x009C }
#define SUI_MAXLENDEFHOTICON 0x0010

#define IsOSK( code )       ( LOBYTE( code ) <= SUI_BIGFULL && \
                              LOBYTE( code ) > SUI_NOSCREEN )
#define IsOSKAsSetupDlg( code ) ( ( code & SUI_OSKASSETUPDIALOGMASK ) && IsOSK( code ) )
#define IsOSKUniClose( code ) ( ( code & SUI_OSKUNICLOSEMASK ) && IsOSK( code ) )
#define IsOSKVidChange( code ) ( ( code & SUI_OSKVIDCHANGEMASK ) && IsOSK( code ) )
#define IsOSKWinGraphics( code ) ( ( code & SUI_OSKWINGRAPHICSMASK ) && IsOSK( code ) )
#define IsSetupDlg( code )  ( LOBYTE( code ) > SUI_BIGFULL )
#define IsNoScreen( code )  ( LOBYTE( code ) == SUI_NOSCREEN )

#define IsOSKVideoSupported( code ) ( code == SUI_TEXTVIDMODE )

#define SUI_LOADSUIINTNUM   0
#define SUI_LOADSUIPOLLFREQ 1L
#define SUI_LOADSUIMAXRETRY 10
#define SUI_CLEANUPMAXRETRY 1000
#define SUI_LOADSUI
#define SUI_CANCELCONNPOLLFREQ 8
#define SUI_CANCELCONNMAXRETRY 25
#define SUI_UNLOADSUIPOLLFREQ 1L

#define SUI_EXECNAME        "SARUI.EXE"

#define SUI_INITIALVIDMODE  0x12
#define SUI_TEXTVIDMODE     0x03
#define SUI_CLEARBIT        0x80

#define SUI_OSKNOTVISIBLE   0x00
#define SUI_OSKVISIBLE      0x01

#define SUI_LBENTRYENABLED  1
#define SUI_LBENTRYDISABLED 0

#define SUI_LBCURRENTRY     -1

typedef enum tagOCCTYPE
{
  SUI_NOOCCTYPE,
  SUI_OCCDOSTEXT,
  SUI_OCCDOSGRAPHICS,
  SUI_OCCRWIN,
} OCCTYPE;

#define SCS_INTNUM          0x0068
#define SCS_ACCEPTED        1
#define SCS_REJECTED        0
#define SCS_DISCOEVENTNUM   7
#define SCS_DISCOPOLLFREQ   3
#define SCS_LOADSCSPOLLFREQ 1
#define SCS_PRIMSGEVENTNUM  8
#define SCS_PRIMSGPOLLFREQ  1
#define SCS_FILEMEMPOLLFREQ 1
#define SCS_VIDBLOCKPOLLFREQ 1
#define SCS_VIDBLOCKMAXRETRY 32

#define SCS_HOSTCTRLPOLLFREQ 2
#define SCS_HOSTCTRLMAXRETRY 10
#define SCS_WAITSUIPOLLFREQ 1
#define SCS_WAITACKPOLLFREQ 1
#define SCS_WAITACKMAXRETRY 20
#define SCS_DOHOSTOCCPOLLFREQ 1
#define SCS_DOHOSTOCCMAXRETRY 3
#define SCS_SENDPMPOLLFREQ  2
#define SCS_SENDPMMAXRETRY  3

#define SCS_REQUESTHOSTLIST 0x3800
#define SCS_HOSTLISTNUMOFFSET 2

#define SCS_CANCELREQHOSTLIST 0x3A00

#define SCS_SMAKECON        0x0C01

#define SCS_DISCODISABLECON 0x0800

typedef enum tagCONNERROR
{
  SCS_NOCONNERROR,
  SCS_ERRSMAKECON,
  SCS_ERRMONTITOR,
  SCS_ERRFULLSCRPAINT,
  SCS_ERRTIMEOUT,
  SCS_ERRUSERABORT,
  SCS_ERRPASSWORD,
  SCS_ERRLOGINID,
  SCS_ERRUNSUPVIDMODE,
  SCS_ERRUNKNOWN,
} CONNERROR;

typedef enum tagSCOSCONNERROR
{
  SCS_NOLOGINERROR = 0,
  SCS_PASSWORDREJECTED = 15,
  SCS_LOGINIDREJECTED,
  SCS_LOGINUSERREJECTED,
  SCS_REMOTEDISCONNECTED,
  SCS_RESPONSETIMEOUT,
  SCS_UNSUPPORTEDVIDMODE = 47,
  SCS_OUTSIDERANGE = 255,
} SCOSCONNERROR;

#define SCS_SCSREMOTECTRL   0
#define SCS_SCSTTY          1
#define SCS_SCSVT100        2
#define SCS_SCSVT102        3
#define SCS_SPX             0
#define SCS_ASYNCH          7

#define SCS_STRDEFUSERID    "DEFAULT___"

#define SCS_FREEMEM         0x4200

#define SCS_FREEOSKMEM      0x4300

#define SCS_SETBUSY         0x4400
#define SCS_SETIDLE         0x4600

#define SCS_FULLREPAINT     0x4800

#define SCS_SETSCROLLING    0x4700
#define SCS_DISABLESCROLL   0x00
#define SCS_ENABLESCROLL    0x01

#define SCS_OCCLUDE2        0x4C00

#define SCS_DLGFREEMEMPERCENT 100
#define SCS_OSKFREEMEMPERCENT 25

#define SCS_WIDTHOFTEXTCHAR 8
#define SCS_HEIGHTOFTEXTCHAR 16
#define SCS_OSKTEXTCHARHEIGHT 8
#define SCS_OSKTEXTCHARWIDTH 8

#define SCS_SCOSVIDEO       0x3D00
#define SCS_SCOSVIDBLOCK    1
#define SCS_SCOSVIDUNBLOCK  0

#define SCS_SETUPSYSSTATBUFF 0x3E00

#define SCS_REBOOTHOST      0x4100

#define SCS_MONITOROFF      0x1E00
#define SCS_MONITORON       0x2000
#define SCS_LOCALKBDOFF     0x0001
#define SCS_LOCALKBDON      0x0000

#define SCS_SENDKBDSCANCODE 0x2b00

#define SCS_XFERFILE        0x3100
#define SCS_TOHOST          0x0000
#define SCS_TOSARATOGA      0x0001
```

```
#define SCS_REBOOTHOST      0x4100

#define SCS_LOCKHOST        0x0200
#define SCS_UNLOCKKBDMOUSE  0x0000
#define SCS_LOCKKBDMOUSE    0x0001
#define SCS_UNBLANKDISPLAY  0x0002
#define SCS_BLANKDISPLAY    0x0003

#define SCS_SENDPRIMSG      0x3800

#define SCS_ERRNOLOCATION   0xFF00

#define SCS_REPAINTREQUIRED 0x0001
#define SCS_NOREPAINTREQUIRED 0x0000

#define SCS_NOUPDATEICON    0
#define SCS_UPDATEICON      1
#define SCS_NOCONNECTREQUESTED FALSE
#define SCS_CONNECTREQUESTED   TRUE

#define SCS_RETAINERROR     FALSE
#define SCS_CLEARERROR      TRUE

#define SCS_HOSTNOSTATUS    0
#define SCS_HOSTAVAILABLE   'a'
#define SCS_HOSTCONNECTED   'c'
#define SCS_HOSTUNAVAILABLE 'n'

#define FLU_POLLFREQ        1
#define FLU_PRIMSGPOLLFREQ  5
#define FLU_MAXRETRY        60
#define FLU_MAXACTUPDREQ    (
FLU_MAXRETRY - 5 )
#define FLU_MODACTUPDREQ    5
#define FLU_MODPCNTTMPFILE  8
#define FLU_MAXPCNTTMPFILE  (
FLU_MAXRETRY / 2 )
#define FLU_MAXUPDREQ       (
FLU_MAXRETRY / 2 )
#define FLU_MODPATHREQ      8

#define FLU_MAXPATHREQ      (
FLU_MAXRETRY / 2 )
#define FLU_MAXRECVFILEREQ  (
FLU_MAXRETRY - 3 )
#define FLU_MAXFLASHIT      ( FLU_MAXRETRY
- 5 )
#define FLU_MAXCLEAREEROM   (
FLU_MAXRETRY - 3 )
#define FLU_MAXDOSBUSY      (
FLU_MAXRETRY - 5 )
#define FLU_TIMEOUTPRIMSG   2

#define FLU_SIZEFLASHSECTOR 0x10000L

#define FLU_FLASHFILEID     'T'

#define FLU_NUMBERUNKNOWN   -1
#define FLU_ERRHOSTBASE     (
HM_FLASH_READ_HDAT )
#define FLU_ERRREADHOSTDAT  (
HM_FLASH_READ_HDAT )
#define FLU_ERRMISSINGFILE  (
HM_FLASH_NOT_SOURCE )
#define FLU_ERRNOFLASHFILES (
HM_FLASH_NO_FILES )
#define FLU_ERROUTOFDISKSPACE (
HM_FLASH_CREATE_TEMP )
#define FLU_ERRFILECORRUPTED (
HM_FLASH_BAD_CHECKSUM )
#define FLU_ERRNOCHECKSUM   (
HM_FLASH_NO_CHECKSUM )

#define FLU_2MEGTHREASHHOLD 16
#define FLU_1MEGEXTENDEDRAM 1000

#define PND_INTNUM          0x0067
#define PND_POLLFREQ        2
#define PND_EVENTNUM        5

#define PND_SLEEPPOLLFREQ   8
#define PND_GETDATA         0x0010
#define PND_PENUP           0x03
#define PND_PENDOWN         0x01
#define PND_PENDOWNMOVE     0x03
#define PND_NOICON          -1
#define PND_ICONSLEEP       0x0000
#define PND_ICONSETUP       0x0001
#define PND_ICONOSK         0x0002
#define PND_ICONPALLETTE    0x0003
#define PND_ICONSPEAKER     0x0004
#define PND_ICONLRMOUSE     0x0005
#define PND_ICONHOSTCTRLMODE 0x0006
#define PND_UDEF1           0x0007
#define PND_UDEF2           0x0008

#define PND_SETDEVICEMODE   0x0011
#define PND_MOUSEMODE       0
#define PND_PENMODE         1

#define PND_SETVIDEOMODE    0x0012

#define PND_SETUPDLGMODE    0x0013
#define PND_SETUPDLGOFF     0
#define PND_SETUPDLGON      1

#define PND_SETMOUSEBUTTON  0x0016
#define PND_LEFTMOUSE       0x0000
#define PND_RIGHTMOUSE      0x0001

#define PND_OSKDIMEN        0x0018

#define PND_HOSTMODE        0x0019
#define PND_DOSAPP          0x0000
#define PND_MSWINDOWS3X     0x0001
#define PND_MSWFW           0x0002
#define PND_MSPENWINDOWS    0x0003
#define PND_MSWINDOWS95     0x0004

#define PND_SETEVENTHANDLER 0x0020

#define PND_SETCALIBMODE    0x0030
#define PND_CALIBUL         0x00
#define PND_CALIBLR         0x01

#define PND_GETCALIBSTAT    0x0031
#define PND_CALIBULSTAT     0x0001
#define PND_CALIBLRSTAT     0x0002
#define PND_CALIBVALID      0x0004
#define PND_CALIBDONEINVALID 1
#define PND_CALIBDONEVALID  0
#define PND_CALIBNOTDONE    -1

#define PND_ENABLENEWCALIB  0x0032

#define PND_HOTICONCONFIG   0x0041
#define PND_MAXXDIGITIZER   3500
#define PND_MAXYDIGITIZER   3500
#define PND_NUMHOTICONS     9
#define PND_TOPMARGIN       50
#define PND_RIGHTMARGIN     4
#define PND_VERTSPACING     75
#define PND_HEIGHT          200
#define PND_WIDTH           400

#define PND_XUPPERPENCALIB  0x0252
#define PND_YUPPERPENCALIB  0x037F
#define PND_XLOWERPENCALIB  0x0C38
#define PND_YLOWERPENCALIB  0x0D7D

#define SMU_ERRORFREQ       1000
#define SMU_ERRORDUR        64
#define SMU_QSCAN           0x10
#define SMU_ALTQSCAN        ( SMU_QSCAN +
M_LA )

#define DBT_INTNUM          0
#define DBT_POLLFREQ        1
#define DBT_MAXRETRY        10

#define INI_INTNUM          0
#define INI_POLLFREQ        8

#define HLD_POLLFREQ        15
#define HLD_MAXRETRIES      5

#define HLD_MAXNUMHOSTENTRIES 100
#define HLD_MAXLENHOSTENTRY (
SCS_MAXLENNODEADD +
SCS_MAXLENHOSTDATA )

#define HLD_VALIDSERIALS    0
#define HLD_DUPLICATESERIALS 1
#define HLD_INVALIDSERIALS  2

#define HLD_NOHOSTAVAIL     -1
#define HLD_NOTINGROUP      -1
#define HLD_NOHOSTSELECTED  0

#define PMS_WINDOWSLOADED   0x0001

#define SBS_INTNUM          0x0015
#define SBS_SLINTNUM        0x006B
#define SBS_PENNOTIFYPOLLFREQ 2
#define SBS_SARATOGAFUNC    0xE000
#define SBS_MEMORYTOEEPROM  0x0003
#define SBS_EEPROMTOMEMORY  0x0004
#define SBS_ADJUSTBRIGHTNESS 0x0006
#define SBS_ADJUSTCONTRAST  0x0007
#define SBS_SUSPENDFLAGPTR  0x0010
#define SBS_ENADISSPEAKER   0x000A
#define SBS_ENADISRIGHTMOUSE 0x000B

#define SBS_GETBATTERYINFO  0x0005
#define SBS_GETBATTERYINFOERROR 0L
#define SBS_IBPSTATEMASK    0x00000000

#define SBS_ACDCSTATEMASK
0x00400000
#define SBS_SLOWCHARGEMASK
0x00200000
#define SBS_FASTCHARGEMASK
0x00100000
#define SBS_BATTERYATTACHEDMASK
0x000000FF
#define SBS_BATTERYCAPACITYMASK
0x0000FF00

#define SBS_VIDMODEMASK     0x80

#define SBS_BATTERYATTACHED 1L
#define SBS_BATTERYFLASHMINCAP 40

#define SBS_NOINT15BATTERYINFO (
SBS_ACDCSTATEMASK | 0x00000001 |
0x00008400 )

#define SBS_GETSYSRESUMEBIT 0x001E
#define SBS_CLEARSYSRESUMEBIT 0x001F
#define SBS_NORMALBOOT      0x0000
#define SBS_RESUMING        0x0001

#define SBS_GOTOSLEEP       0x0012
#define SBS_GOTOSUSPEND     0x000E
#define SBS_GOTOSUSPENDSAVE 0x000F

#define SBS_WAITINGICON     0x000C
#define SBS_WAITINGICONOFF  0
#define SBS_WAITINGICONON   1

#define SBS_ENABLEKBD       0x0015

#define SBS_TOWERWAVESICON  0x000D
#define SBS_TOWEROFF        0x0000
#define SBS_TOWERON         0x0001
#define SBS_TOWERLOWBLINK   0x0003
#define SBS_TOWERMEDBLINK   0x0005
#define SBS_TOWERHIGHBLINK  0x0007
#define SBS_WAVESOFF        0x0000
#define SBS_WAVESON         0x0001
#define SBS_WAVESLOWBLINK   0x0003
#define SBS_WAVESMEDBLINK   0x0005
#define SBS_WAVESHIGHBLINK  0x0007

#define SBS_VIDINTNUM       0x0010
#define SBS_VIDEO           0x1200
#define SBS_VIDEOPALLETTE   0x0000

#define SBS_ENABLEDISABLEWRITE 0x0006
#define SBS_ENABLEWRITE     0x0001
#define SBS_DISABLEWRITE    0x0000

#define SBS_SARATOGAFLASH   0xE100
#define SBS_FLASHNOTEXT     0x0000
#define SBS_FLASHWITHTEXT   0x0001
#define SBS_FLASHAVAILABLE  0x0002
#define SBS_FLASHAVAILRETCODE 0x00E1

#define SBS_1MEGBASESECTOR  0x70
#define SBS_2MEGBASESECTOR  0x60

#define SBS_FLASHSUCCESS    0x00
#define SBS_FLASHACNOTATTACHED 0x01
#define SBS_FLASHERASEERROR 0x02
#define SBS_FLASHPROGERROR  0x03

#define SBS_SETPOWERENABLE  0x0017
#define SBS_POWERMANDISABLED 0
#define SBS_POWERMANENABLED 1
#define SBS_POWERMANONDCONLY 2

#define SBS_SETDOZETIMEOUT  0x0019
#define SBS_DOZEDISABLED    0
#define SBS_DOZE1SECONDS    1
#define SBS_DOZE4SECONDS    2
#define SBS_DOZE8SECONDS    3
#define SBS_DOZE16SECONDS   4

#define SBS_SETSLEEPTIMEOUT 0x001b
#define SBS_SLEEPDISABLED   0
#define SBS_SLEEPIN1MIN     1
#define SBS_SLEEPIN2MIN     2
#define SBS_SLEEPIN4MIN     3
#define SBS_SLEEPIN6MIN     4
#define SBS_SLEEPIN8MIN     5
#define SBS_SLEEPIN12MIN    6
#define SBS_SLEEPIN16MIN    7

#define SBS_SETSUSPENDTIMEOUT 0x001d
#define SBS_SUSPENDDISABLED 0
#define SBS_SUSPENDIN5MIN   1
#define SBS_SUSPENDIN10MIN  2
#define SBS_SUSPENDIN15MIN  3
#define SBS_SUSPENDIN20MIN  4
#define SBS_SUSPENDIN30MIN  5
#define SBS_SUSPENDIN40MIN  6

#define SBS_SUSPENDIN60MIN  7

#define SBS_LENMOUSECFGDATA 8
#define SBS_OFFMOUSECFGDATA 0
#define SBS_OFFUICFGDATA    8

#define SBS_DEFVIDPALLETTE  0x00
#define SBS_INVVIDPALLETTE  0x03
#define SBS_MAXNUMVIDPAL    0x05

#define SBS_GETBIOSVERSION  0x0000

#define SBS_SIZEOFEXTENDEDMEM 0x8800

#define SBS_SETVIDEOMODEFUNCS 0x00
#define SBS_LOWTEXTVIDMODE  0x00
#define SBS_HIGHTEXTVIDMODE 0x03

#define SBS_MISCELLANEOUSFUNCS 0x12
#define SBS_SETSCANLINESTEXTMODE 0x30
#define SBS_200SCANLINES    0
#define SBS_350SCANLINES    1
#define SBS_400SCANLINES    2

#define SBS_CHARACTERGENFUNCS 0x11
#define SBS_8X14FONTAFTERMODE 0x11
#define SBS_8X8FONTAFTERMODE 0x12
#define SBS_8X16FONTAFTERMODE 0x14

#define SBS_CMOSREADHIGHBYTE 0x31
#define SBS_CMOSREADLOWBYTE 0x30
#define SBS_CMOSPORT        0x0070
#define SBS_CMOSEXTENDEDMEM 0x0071

#define SBS_TELETYPE        0x0E
#define SBS_RELOCATEDSCRADD 0xFE

#define SBS_DRIVERSLOADING  1
#define SBS_SUILOADING      2

#define CRU_RETURNWITHIRET  0
#define CRU_REFLECTINT      2

#define CRU_ONBUSYIRET      0
#define CRU_ONBUSYOLDINT    1
#define CRU_ONBUSYEITHER    2

#define CRU_COLDBOOT        1
#define CRU_WARMBOOT        0

#define FNA_NOTFOUND        -1

#define SRT_MAXLENSWAPBUFF 35

#define PMI_REQSCSBLANKSCR  (
HM_PM_BLANKSCR )
#define PMI_REQSCSUNBLANKSCR (
HM_PM_UNBLANKSCR )
#define PMI_REQSCSLOCKKBMO  (
HM_PM_LOCKKBMO )
#define PMI_REQSCSUNLOCKKBMO (
HM_PM_UNLOCKKBMO )

#define PMI_REQFLASHUPD     (
HM_PM_FILEREQ )
#define PMI_ACKTOTALFILES   (
HM_PM_TOTALFILES )
#define PMI_REQPATHFROMIDX  (
HM_PM_PATHREQ )
#define PMI_ACKPATHASSTRING (
HM_PM_PATHREP )
#define PMI_REQFLASHDONE    (
HM_PM_FLASHOK )
#define PMI_REQACTIVEUPGRADE (
HM_PM_FLASH_NAMQ )
#define PMI_ACKACTIVEUPGRADE (
HM_PM_FLASH_NAMP )

#define PMI_REQHOSTCONTROL  (
HM_PM_HOSTCON )

#define PMI_ACKNOTIFYDOSWIN (
HM_PM_DOSWIN_ACK )

#define PMI_REQOCCDEFINE    (
HM_PM_OSK_DEFINE )
#define PMI_ACKOCCDEFINE    (
HM_PM_OSK_DEFINE_ACK )
#define PMI_REQOCCCLOSE     (
HM_PM_OSK_CLOSE )
#define PMI_ACKOCCCLOSE     (
HM_PM_OSK_CLOSE_ACK )
#define PMI_REQUNIOCCCLOSE  (
HM_PM_OSK_CLOSE_UNI )
#define PMI_ACKUNIOCCCLOSE  (
HM_PM_OSK_CLOSE_UNI_ACK )

#define PMI_NOACK           0
#define PMI_ACKEDTRUE       1
```

```
#define PMI_ACKEDFALSE        -1

#define SID_INTNUM            3
#define SID_FUNCNUM           0x0900
#define SID_OUTSTRING         0x0010
#define SID_SISIG             0x4847
#define SID_DISIG             0x4A4D

#define STR_SEPARATOR         '|'
#define STR_SMVERSIONNAME     "1.00"
#define STR_SMVERSIONNUM      "1.00"
#define STR_SMABOUTBOX        "|Copyright (c)
1994-1995 Zenith
Data|Systems Corporation||System Software Version
%s|BIOS Version
%x.%x|"
#define STR_SMMODULENAME      "Saratoga
Man"
#define STR_FLUNOFLASHFILES   "The Flash
Upgrade is not
available on|the CruisePAD Host.|"
#define STR_FLUREADHOSTDAT    "A file called
HOST.DAT is
unreadable on|the CruisePAD Host.|"
#define STR_FLUMISSINGFLASH   "The Flash
Upgrade is missing a
file on|the CruisePAD Host.|"
#define STR_FLUOUTOFDISKSPACE "The
CruisePAD Host is out of disk
space.|"
#define STR_FLUFILECORRUPTED  "One or more
of the upgrade files
on the|CruisePAD Host have been corrupted.|"
#define STR_FLUNOCHECKSUM     "The
\"checksum\" for one or more
of the|upgrade files on the CruisePAD Host
is|missing.|"
#define STR_FLUHOSTNOACK      "The
CruisePAD Host does not
acknowledge|the upgrade request.|"
#define STR_FLUSENDPRIMSG     "An error
occured when
communicating|with the CruisePAD Host.|"
#define STR_FLUNOAC           "The CruisePAD is
not plugged
in.|"
#define STR_FLUFLASHERASE     "An error
occured when attempting
to|erase the Flash ROMS.|Contact Customer
Support.|"
#define STR_FLUFLASHPROG      "An error
occured when attempting
to|program the Flash ROMS.|Contact Customer
Support.|"
#define STR_FLUEEROMNOCLR     "An error
occured when clearing
the|CruisePAD EEROM.|"
#define STR_FLURAMALLOCATION  "An error
occured when attempting
to|allocate RAM.|"
#define STR_FLUFLASHUNKNOWN   "An
unspecified error has occured
when|updating the Flash ROMS.|"
#define STR_FLUUNKNOWNERROR   "An
unspecified error occured.|"
#define STR_FLUUNKNOWNHOSTERR "An
unspecified error occured on
the|CruisePAD Host.|"
#define STR_FLUNOACKTMPERROR  "An error
occured when
processing|the CruisePAD upgrade files on
the|Host.|"
#define STR_FLUNOACKNUMFILEERR "An error
occured while
waiting|for the Host to report the number of|upgrade
files.|"
#define STR_FLUNOACKPATHERROR "An error
occured while
waiting|for the Host to report the path name|of an
upgrade
file.|"
#define STR_FLUNOACKRECVFILEERR "An error
occured when
transferring|files from the CruisePAD Host.|"
#define STR_FLUNOACKRECVFATAL "The
upgrade has failed.  You
may|attempt the upgrade again, but do not|turn off
CruisePAD
until it is|successful.|"
#define STR_FLU1MEGSYSERROR   "This
CruisePAD is a 1 MB
system|and will not support a 2 MB upgrade.|"
#define STR_FLU2MEGSYSERROR   "This
CruisePAD is a 2 MB
system|and will not support a 1 MB upgrade.|"
#define STR_FLUGETBATINFOERROR "An error
occured when
attempting|to determine the status of the
CruisePAD|battery.|"

#define STR_FLUNOBATERROR     "A battery
must be inserted in
CruisePAD.|"
#define STR_FLUBATTOOLOWERROR "The
battery must be at least
2/5|charged.|"
#define STR_FLUUNKNOWNBATERROR "An error
occured when
determining|the status of the CruisePAD|battery.|"
#define STR_FLUNOCONNECTERROR "The
CruisePAD is not connected to
a|CruisePAD Host.|"
#define STR_FLULINKTOOLOWERROR "The
connection to the CruisePAD
Host is|too weak.|"
#define STR_FLUNOTINDOSAPP    "The
CruisePAD Host is not at
the|DOS prompt.|"
#define STR_HLDDUPSERIALNUMS  "Duplicate
CruisePAD Host serial
numbers|were detected.  Please verify that
all|installations are
valid.|"
#define STR_HLDINVSERIALNUMS  "Invalid
CruisePAD Host serial
numbers|were detected.  Please verify that
all|installations are
valid.|"
#define STR_SUIFRAMETYPE      "The new Frame
Type will not take
effect|until CruisePAD is restarted (double|tap of the
Sleep Hot
Icon).|"
#define STR_SUISECURITYID     "The Security ID
may not be
changed|until after CruisePAD is disconnected.|"
#define STR_SUIDOMAINID       "The new Domain
ID will not take
effect|until CruisePAD is restarted (double|tap of the
Sleep Hot
Icon).|"
#define STR_SUIESTABLISHCONN  "Attempting to
establish the
requested|connection...||Press the CANCEL button
to abort.|"
#define STR_SUIRESUMINGCONN   "Attempting
to resume the last
active|connection...||Press the CANCEL button to
abort.|"
#define STR_SUIRESUMINGCONN2  "Attempting
to resume the last
active|connection...|"
#define STR_SUILOADERROR1     "\nError: An
error occurred when
attempting to load the CruisePAD User Interface.\n"

#define STR_SUILOADERROR2     "\nError: The
SUI may only be
loaded from within the Saratoga Loader.\n"
#define STR_SUICONNECTFAILED  "The
attempted connection
failed.|"
#define STR_SUICONNECTTIMEOUT "The
CruisePAD Host is not
responding to|the connection request.|"
#define STR_SUICANCELINPROG   "The
attempted connection is
being|canceled.||Please wait...|"
#define STR_SUIPASSWORDREJECTED "The
password entered is
invalid.|"
#define STR_SUILOGINIDREJECTED "The login
ID is invalid.|"
#define STR_SUIUNSUPVIDMODE   "The
CruisePAD Host is in an
unsupported|video mode.|"
#define STR_SUIHOSTVERTOOLOW  "The
version number of the
CruisePAD Host|software is too low.  Please
install|an update disk
for version|%s|or higher.|"
#define STR_SUICONNECTERRUNKNOWN "An
error occurred when
attempting|to connect to the CruisePAD Host.|"
#define STR_SUINOHOSTSELECTED "No
CruisePAD Host was selected
Please|select a Host from the Hostlist box and try
again.|"
#define STR_SUIBADVIDEOMSG    "The
CruisePAD Host has switched
to a|video mode which is not supported by
the|CruisePAD.|"

#define STR_STRMAXLENERR      182

#define GEN_SMMAJORVERSIONNUM    1
#define GEN_SMMINORVERSIONNUM    0x00
#define GEN_HMEXPMAJORVERSIONNUM 1
#define GEN_HMEXPMINORVERSIONNUM 0x00

#define GEN_CARRYFLAG         0x100
#define GEN_MAXLENTEMPSTR     128

int     InitDispatcher( void );
int     ShutDownDispatcher( void );
void    InstallRecs( void );
int     AddThread( int iIdx, NEARPROC fpThread,
APIFUNC
aAPIFuncTable[],
                THREADTYPEID ThreadTypeId,
BOOL fReentrant,
LONG lTimeLimit,
                int iRetryLimit );
int     DelThread( int iIdx );
BYTE    IsThreadActive( int iIdx );
void    ResetTime( int iIdx );
int     SetRetryLimit( int iIdx, int iNewRetryLimit );
BYTE    GetRetryLimit( int iIdx );
BYTE    GetInitRetryLimit( int iIdx );
int     ResetRetryLimit( int iIdx );
int     SetTimeLimit( int iIdx, LONG lNewTimeLimit
);
THREADTYPEID GetThreadType( int iIdx );
NEARPROC GetThreadAddress( int iIdx );
void    PushEventNum( int iEventId );
int     PopEventNum( void );
int     GetTempEventNum( void );

void    Dispatch( THREADTYPEID, int iThreadIdx
);
WORD    TrapService( struct trap_rec
*CurrTrapRec );
void    FCallService( WORD wAX );
void    KbdService( WORD wHotKey );
void    ClockTick( void );
void    DecClockReCount( void );
WORD    GetLastKey( void );

void    SetDispatchActive( BOOL
bNewDispatchActive );
BOOL    GetDispatchActive( void );

void    CrankGear( BYTE *, char * );

APIFUNC * GetPNDFuncTable( void );
BYTE    GetCurrHostMode( void );
void    CheckPenDriver( void );
void    SetPNDActiveStatus( BOOL fPenDriverStat
);
BOOL    GetPNDActiveStatus( void );
int     GetHotIcon( void );
APIFUNCRET PenDriverLoading( struct REGW
*CallerRegs );
void    InitPND( void );
void    InitPNDTrapRec( void );
TRAPREC * GetPNDTrapRec( void );
int     GetHotIcon( void );
int     SetDeviceMode( int iPenMode );
int     NotifyVideoMode( int fVideoMode );
int     SetSetupDigMode( int iDigMode );
int     SetOSKMode( OCCLUDEUNION *OccArea,
OCCTYPE OccType );
int     SetPenButtonMode( BYTE
nNewPenButtonMode );
int     SetMouseButtonMode( void );
int     SetHostMode( int iHostMode );
int     SetCalibMode( int iCalibMode, int xCalibPnt,
int
yCalibPnt );
int     GetCalibState( int iCalibMode, int
*xUpperCol, int
*yUpperRow,
                int *xLowerCol, int *yLowerRow
);
int     EnableNewCalib( BOOL fEnableNewCalib );
int     ActivateSleepMode( void );
void    WaitForSleep( void );

APIFUNC * GetSCSFuncTable( void );
void    CheckScanDriver( void );
void    SetSCSActiveStatus( BOOL
fNewSCSActive );
BOOL    GetSCSActiveStatus( void );

void    SetSCOSNotified( BYTE
fNewSCOSNotified );
BOOL    GetUpdatingConnectStatus( void );

void    SetUpdatingConnectStatus( BOOL
fNewStatus );

void    SetConnectRequested( BOOL
fNewConnectRequested, BYTE
nUpdateIcon );
BOOL    GetConnectRequested( void );
NPSTR   GetPrivateMsgBuff( int *iBuffLen );
char    GetConnectErrCode( void );

int     GetSCOSErrNo( BYTE fClearError );
void    SetFullRepaint( int iNewFullRepaintDone );
void    InitSCSTrapRec( void );
TRAPREC * GetSCSTrapRec( void );
void    InitSCSCallRec( void );
void FAR  SCSEventLoopService( void );
void FAR  SCSRecvMsgService( void );
APIFUNCRET SCSLoading( struct REGW
*CallerRegs );
APIFUNCRET AckFlashBreak( struct REGW
*CallerRegs );
APIFUNCRET AckTotalFlashFiles( struct REGW
*CallerRegs );
APIFUNCRET AckPathFlashFile( struct REGW
*CallerRegs );
APIFUNCRET AckActiveUpdate( struct REGW
*CallerRegs );
APIFUNCRET AckOccDefine( struct REGW
*CallerRegs );
APIFUNCRET AckOccClose( struct REGW
*CallerRegs );
APIFUNCRET UnloadOSK( struct REGW
*CallerRegs );
APIFUNCRET ChangeToBadVideo( struct REGW
*CallerRegs );
APIFUNCRET NotifyDosWin( struct REGW
*CallerRegs );
APIFUNCRET NotifyUniOccClose( struct REGW
*CallerRegs );

int     PrepPrivateMessage( struct REGW
*CallerRegs );
void    SetupSCOS( void );
int     SetupSCOSErrNo( int FAR *iMemLocation );
int     BlockSCOSVideo( BYTE fVideoStatus );
void    WaitVidUnblock( void );
int     DoHostControlMode( BOOL
fHostControlStatus );
void    WaitForHostControl( void );
int     MakeTheConnection( BOOL
fNewMonStatus, BOOL
fNewLocalKbdStatus );
int     ResumeTheConnection( void );
void    DoVersionMsgBox( void );
void    CBExecConnect( void );
void    WaitForCancelConnect( void );
void    CBLoginButtonPressed( int iButtonCode );
void    CBMsgBoxButtonPressed( int iButtonCode
);
void    DoNextScreen( void );
void    DoExecConnect( void );
void    WaitForSUIUnload( void );
int     SetMonitor( BOOL fNewMonStatus, BOOL
fNewLocalKbdStatus );
void    CBExecMonitor( void );
int     CheckMonitor( void );
int     SetSCSMemory( int iNewFreeMemPercent,
int iNewOSKType,
BYTE nDosBusy );
void    CBExecSCSMemory( void );
BOOL    CheckSCSMemory( void );
void    WaitForStatusChange( void );
int     RequestFullRepaint( BYTE
fRepaintRequired, WORD
wScreenCode );
void    CBFullRepaint( void );
int     CheckFullRepaint( void );
int     DiscoDisableConnection( void );
void    WaitForDisco( void );
int     SendPrivateMessage( int iMsgId, int
iBuffLen, char
*szMsgBuff );
void    WaitForSendPM( void );
int     GetSCSCallProgress( void );
int     GetSCSProtocolId( void );
int     GetSCSVideoMode( void );
void    SetSCSAbortFlag( BYTE
fNewAbortRequest );
int     ReceiveHostFile( char *szHostFileName,
LPSTR
sFileBuff, LONG lFileSize );
int     SendUDHotIcon( int iHotIconID );
int     GetNumScanCodes( SCANCODE FAR
*pScanCodes );
int     SendScanCode( BYTE nScanCode );
int     SendLockKbdMouse( BOOL bLocked );
int     SendDimScreen( BOOL bDimmed );
int     RequestAbortConnect( void );
CONNERROR  TranslateConnectError( void );

int     SetSCSSaraStatus( int iNewStatus );
int     SetSCSFullRepaint( void );
int     SetSCSScrolling( BYTE nScrollStatus );
int     SetSCSOcclude( OCCLUDEUNION *occ, int
iOccType );
int     DefineSCSOcclude( OCCLUDEUNION *occ,
int iOccType,
BYTE fRepaint );
```

```
void      SetSCOSNotified( BYTE
fNewSCOSNotified );
void      SetOccDefineAcked( char
nOccDefineStatus );
char      GetOccDefineAcked( void );
void      SetOccCloseAcked( char nOccCloseStatus
);
char      GetOccCloseAcked( void );
void      SetOSKVisible( char nNewOSKStatus );
int       CreateOccludedArea( void *OccMap, int
iCurrVidMode,
int iFreeMem );
int       SetWinHostOcclude( OCCLUDERWIN
*OccRWIN );
void      WaitForDefineOcc( void );
int       CloseHostOcclude( void );
void      WaitForCloseOcc( void );
int       SetIndHostOcclude( int iScrCode );
int       SetDOSGraphHostOcclude(
OCCLUDEDOSGRAPHICS
*OccDosGraphics );
void      DoDOSGraphHostOcclude( void );
int       SetDOSTextHostOcclude( OCCLUDETEXT
*OccDosText );
int       SetSCSHostOcclude( OCCLUDEUNION
*occ, int iNewOccType,
BYTE fNewRepaintRequired );
void      DoSCSHostOcclude( void );


LONG       GetOldVidVector( void );
APIFUNCRET   SLGetFrameType( struct REGW
*CallerRegs );
APIFUNCRET   SLGetMLIDStatus( struct REGW
*CallerRegs );
APIFUNCRET   SLDefineOldVidVector( struct
REGW *CallerRegs );
APIFUNCRET   SLEnableKbd( struct REGW
*CallerRegs );
APIFUNCRET   SLLoadSUI( struct REGW
*CallerRegs );
void       CBExecLoadSUI( void );

void       GetForegroundRegs( struct REGW
*InRegs );
void       SetForegroundRegs( struct REGW
*OutRegs );
void       Trace( char *szOutStr );
void       CallAPIFunction( APIFUNC
aAPIFuncTable[] );
APIFUNCPTR   GetAPIFunction( APIFUNC
aAPIFuncTable[], struct REGW
*pCallerRegs );
int        ErrorBeep( void );
void       DoSpkrRestore( void );
int        SMDosBusy( DOSBUSYCB fnCallBack );
void       SMCheckDosBusy( void );
int        SMVideoBusy( VIDBUSYCB fnCallBack );
void       SMCheckVideoBusy( void );
int        GetVideoMode( BOOL fSaveState );
void       SetReentrancy( BOOL fEnable );
int        RestoreVideoMode( void );
WORD       SetVideoMode( BYTE
nRequestedMode )
int        VideoState( char *sVidBuff, char
nDataType  char
nOperation );
int        JimExec( char szProgName[], char
szCmdLnParm[] );
WORD       GetFreeMCB( WORD wNumPara );
int        SetFreeMCB( WORD wSegment );
int        StuffKeyStr( char * );
BOOL       IsGetFunction( struct REGW
*CallerRegs );
char       *ParseForFileName( char *szPathName );
BOOL       IsNodeAddressBlank( char
*sNodeAddress );
int        DoModalMsgBox( MODALMSGBOXCB
fnCallBack, int
iMsgBoxTimeOut );
void       WaitForOK( void );
int        AbsToZero( int lValue );
int        SetMemStrategy( int iStatCode );

void SetPenSpkFreq( void );

APIFUNC *   GetSUIFuncTable( void );
CALLREC FAR *GetSUICallRec( void );
TRAPREC     *GetSUIMouseTrapRec( void );
int         GetCurrActionCode( void );
WORD        GetCurrScrCode( void );
void        SetCurrScrCode( WORD
wNewScreenCode );
char        GetSUIStatus( void );
void        InitSUICallRec( void )
void        RestoreOldSUIIntVec( void );
BOOL        GetSUIReady( void );

APIFUNCRET   SetActiveStatus( struct REGW
*CallerRegs );
APIFUNCRET   RequestUnload( struct REGW
*CallerRegs );
APIFUNCRET   RequestConnDisco( struct REGW
*CallerRegs );
void         DoNoHostSetMsgBox( void );
APIFUNCRET   GetConnectStatus( struct REGW
*CallerRegs );
APIFUNCRET   BlockUnblockVideo( struct REGW
*CallerRegs );

BOOL       GetVideoBlocked( void );
int        LoadSUI( SUIACTIONCODE
NewActionCode, WORD
wNewScreenCode );
void       WaitForSUIAutoLoad( void );
void       WaitForPrepSUI( void );
void       CBExecSUI( void );
void       CBExecLoadScreen( void );
void       DoLoadScreen( void );
int        UnloadSUI( BYTE nNewResidentStatus );
void       WaitForUnloadSUI( void );
void       CBExecUnloadSUI( void );
void       WaitForSUILoad( void );
void       SUITerminateAddress( void );
void       CleanupUnloadSUI( void );
void       WaitForCleanupSUI( void );

void       SetDomainWarning( BYTE
fNewDomainWarning );
void       SetSecurityWarning( BYTE
fNewSecurityWarning );
void       SetMsgBoxReturnCode( BYTE
nNewReturnCode );
BYTE       GetMsgBoxReturnCode( void );

APIFUNCRET   SetSUIMBRetCode( struct REGW
*CallerRegs );
APIFUNCRET   SetKeyStroke( struct REGW
*CallerRegs );
APIFUNCRET   GetSetUDHotIcon( struct REGW
*CallerRegs );
APIFUNCRET   GetSetSecurityID( struct REGW
*CallerRegs );
APIFUNCRET   GetSetDomainID( struct REGW
*CallerRegs );
APIFUNCRET   GetSetLockKbdMouse( struct
REGW *CallerRegs );
APIFUNCRET   GetSetDimScreen( struct REGW
*CallerRegs );
APIFUNCRET   GetSetConnectType( struct REGW
*CallerRegs );
APIFUNCRET   GetKeyBoardStatus( struct REGW
*CallerRegs );
APIFUNCRET   GetAboutDialog( struct REGW
*CallerRegs );
AF~ JNCRET   GetSetUDHotIcon( struct REGW
*CallerRegs );
APIFUNCRET   GetSetUILanguage( struct REGW
*CallerRegs );
APIFUNCRET   RebootHost( struct REGW
*CallerRegs );
APIFUNCRET   GetPasswordStatus( struct REGW
*CallerRegs );
APIFUNCRET   GetSetUserId( struct REGW
*CallerRegs );
APIFUNCRET   GetSetPassword( struct REGW
*CallerRegs );
APIFUNCRET   UpdateHostList( struct REGW
*CallerRegs );
APIFUNCRET   GetHostListStatus( struct REGW
*CallerRegs );
APIFUNCRET   LBGetSetNetGroup( struct REGW
*CallerRegs );
APIFUNCRET   LBGetSetNetHost( struct REGW
*CallerRegs );
APIFUNCRET   UpdateDimenLoc( struct REGW
*CallerRegs );
APIFUNCRET   GetSetContrast( struct REGW
*CallerRegs );
APIFUNCRET   GetSetBrightness( struct REGW
*CallerRegs );
APIFUNCRET   GetSetAutoShutOff( struct REGW
*CallerRegs );
APIFUNCRET   GetSetSleepTime( struct REGW
*CallerRegs );

int        EnableBusyCursor( int iStatus );
int        DoMessageBox( NPSTR szMsgText, int
iScrCode, char
nAlignment,
                    int iButtons,
MODALMSGBOXCB
fnCallBack, int iMsgBoxTimeOut );
void       ProcessMessageBox( NPSTR
szNewMsgText, int iScrCode,
char nNewAlignment,
                    int iNewButtons )

int        OpenMessageBox( NPSTR szMsgText, int
iScrNumber,
char nAlignment, int iButtons );
int        FillMsgBoxBuff( MSGBOXBUFF
MsgBoxBuff[], char
*szMsgText, char nAlignment );
int        HideMessageBox( void );
int        UpdateSUIConnectStatus( void );

APIFUNCRET LBGetSetNetFrameType( struct
REGW *CallerRegs );
APIFUNCRET NotifyScreenCode( struct REGW
*CallerRegs );

APIFUNCRET   CalibratePen( struct REGW
*CallerRegs );
APIFUNCRET   CalibrateCancel( struct REGW
*CallerRegs );
void         WaitForPenCalib( void );

APIFUNC    *GetPRXFuncTable( void );
BOOL       GetPRXActiveStatus( void );
void       InitPRXTrapRec( void );
TRAPREC    *GetPRXTrapRec( void );
void       CheckSystem( void );

APIFUNCRET   RegisterPowerMan CB( struct
REGW *CallerRegs );
void         WaitForPRXSetup( void );
APIFUNCRET   PreaimDriverUnload( struct REGW
*CallerRegs );
APIFUNCRET   NetConfigData( struct REGW
*CallerRegs );
APIFUNCRET   XchgRevInfo( struct REGW
*CallerRegs );

int        NotifySuspend( void );
int        NotifyResume( void );
int        SetSecurityID( char *szNewSecurityID );
BOOL       IsSynchronized( void );
LPSTR      GetRomVersion( void );
int        GetLinkQuality( void );

void       SetCurrHostName( char
*szNewCurrHostName );
char *     GetCurrHostName( void );
char       GetRequestHostList( void );
void       SetRequestHostList( int );
int        GetLBCurrHost( void );
void       SetLBCurrHost( int iNewLBCurrHost );
int        GetLBCurrGroup( void );
void       SetLBCurrGroup( int iNewLBCurrGroup );
char *     GetLBGroup( int iGroupNum );
char *     GetLBHost( int iHostNum );
int        GetLBHostStatus( int iHostNum );
int        SetLBHostStatus( int iHostNum, BYTE
nNewHostStatus
);
char *     GetCurrNodeAddress( void );
WORD       GetCurrHostVersionNum( void );
BOOL       IsPWRequired( void );
int        GetNumHostEntries( void );
int        GetNumGroupEntries( void );
int        GetGroupIdx( int iGroup );
int        GetGroupNum( int iHostIdx );
int        GetHostIdx( int iHostNum );
int        SortGroupHost( void );
int        SortSerialNums( void );
int        ValidateSerialNums( void );
int        RequestHostList( void );
void       DoSendHLReq( void );
void       WaitForHLD( void );
int        SendRequestHostList( void );
int        CancelRequestHostList( void );
int        SaveNewHosts( void );
int        FindNodeAddress( HOSTLISTENTRIES
*pHostListEntries,
char *szKeyNodeAddress );
LONG       FindFirstAvailHost(
HOSTLISTENTRIES
*pHostListEntries );
int        AllocHLMem( HOSTLISTENTRIES
*HostListEntries, int
iNumEntries );
int        GetStatusHLInMem( void );
void       SetStatusHLInMem( int
iNewHostListStatus );
void       FreeHLMem( HOSTLISTENTRIES * );
void       FreeAllHLMem( void );
BOOL       IsZeroString( char szString[] );

char       GetEEPROMInited( void );
void       InitUIConfigData( void );
void       InitEEPROM( void );
void       InitSUI( void );
void       InitSaratoga( BYTE ninitType );
int        GetEEMouseConfig( void );
int        SetEEMouseConfig( PENCALIB *pc );
int        SetEEUIData( void );

int        GetEEUIData( UICONFIGDATA
*CurrUIConfigData );
int        ClearEEPROM( void );

int        SetContrast( BYTE nContrastIdx );
int        SetBrightness( BYTE nBrightnessIdx );
int        SetDozeTimeout( BYTE nDozeIdx );
int        SetPowerEnable( BYTE nPowerMenuIdx );
int        SetSleepTimeout( BYTE nSleepIdx );
int        SetSuspendTimeout( BYTE nSuspendIdx
);
void       Set2MegFlash( BOOL fNew2MegFlash );
BOOL       IsFlashSupported( void );
int        FlashSector( LPSTR sFlashImageBuff, int
iCurrFlashFile );
int        EnableFlashWrite( BOOL fEnable );
int        RotatePallette( void );
int        ToggleSpeaker( void );
BYTE       GetRightMouseStatus( void );
int        EnableRightMouseButton( BYTE
nNewRightMouseButton );
int        SetTowerIcon( BYTE nTowerStatus, BYTE
nWavesStatus
);
int        DoSleep( void );
int        DoSuspend( BOOL fSaveEEROMData );
int        SetSuspendFlagPointer( void );
void       SetSuspendFlag( BOOL fStatus );
BOOL       GetSuspendFlag( void );
int        GetSystemResumeBit( void );
int        ClearSystemResumeBit( void );
int        SetWaitingIcon( BYTE nWaitingIconStatus,
BYTE
fBusyCursor );
int        EnableKbdAfterBoot( void );
LONG       GetBatteryInfo( void );
WORD       GetSizeOfExtendedMem( void );
int        GetBIOSVersion( void );

void FAR   SUICallService( void );
int        GetPendingEvent( void );

APIFUNCRET   DoUpdate( struct REGW
*CallerRegs );
APIFUNCRET   RequestActiveUpdate( struct REGW
*CallerRegs );

void       WaitForActiveUpdate( void );
void       GetFlashImageBuff( void );
void       WaitForFlashUpdate( void );
void       WaitForFlashError( void );
void       ReleaseFlashMem( void );
int        UpdateTmpFilePercentage( int
iNewTmpFilePercent );
int        UpdateFlashPercentage( int iFlashFileNum
);
int        GetActiveUpdate( void );
void       WaitForActiveUpdate( void );
int        SetPathFlashFile( LPSTR
szNewPathFlashFile );
int        SetTotalFlashFiles( int
iNewTotalFlashFiles );
int        SetNameActiveUpdate( LPSTR
szNewActiveUpdate );
char       *GetNameActiveUpdate( void );
int        SetTmpFilePercent( int iNewPercent );
int        GetTmpFilePercent( void );
int        GetTotalFlashFiles( void );
char       *GetPathFlashFile( void );
FLASHUPDATESTATES CheckFlashPowerState(
void );

void       InitVIDTrapRec( void );
TRAPREC    *GetVIDTrapRec( void );
char       GetYCharRes( void );
char       GetXCharRes( void );
int        GetYScreenRes( int iVideoMode );
int        GetXScreenRes( int iVideoMode );
int        GetCurrVidMode( void );
BOOL       VIDTrapService( void );
void       AlertModePenNotify( void );
void       WaitForPenNotify( void );

int SortList( int wTotalEntries, int wEntrySize, int
wPrimeOffset,
        int wSecondOffset, char *cpEntryBuff );
int SwapEntries( char *cpEntry1, char *cpEntry2, int
wEntrySize
);
long GetEntryOffset( int wTotalEntries, int
wEntrySize, int
wKeyOffset,
                int wKeyNumber, char *cpEntryBuff
);

int PatchMCB( void );
int SetMemStrategy( int iStatCode );

int _and_or_8g( char mask );
```

```
extern THREADTYPEID ActiveThreadType;
extern char szSMSignature[];
extern char szSMVersionName[];
extern char szSMVersionNum[];
extern char szSMModuleName[];
extern char szSUIExecName[];
extern char nRLNmtNum;
extern char szTempStr[];
extern char szTempMsgStr[];
extern char szNullStr[];
extern char szPassword[ SUI_MAXLENPASSWORD
+ 1 ];
extern char szSCSAbortConn[];
extern UICONFIGDATA UIConfigData;
extern WORD aHotKeys[];
extern WORD RDATA;
extern MREG MEventOutArgs;
extern FARCALLENTRY lpfnFarCallEntry;
extern SUICB lpfnSUICallBack;
extern LISTBOXENTRY ListBoxEntry
extern MSGBOXBUFF MsgBoxBuff[];
extern BUFFHEADER BuffHead;
extern WORD wScreenCode;
extern WORD wOldScreenCode;

#define ERR_SUCCESS         0
#define ERR_NOTSUPPORTED    -1
#define ERR_INTERNAL        -2
#define ERR_INVALIDPARM     -3
#define ERR_OUTOFMEM        -4
#define ERR_VERSIONMISMATCH -5
#define ERR_UPGRADENOTAVAIL -6
#define ERR_SCSBUSY         -7
#define ERR_SCSOCCFAILED    -8
#define ERR_SCSSCROLLING    -9
#define ERR_SCSIDLE         -10
#define ERR_SCSFULLREPAINT  -11
#define ERR_INPROGRESS      -15000

#define ERR_PNDINTERNAL     -2


typedef enum
{
  TIMEOUT_ERROR,
  TIMEOUT_AVAILABLE,
  TIMEOUT_NOTAVAILABLE,
  TIMEOUT_RUNNING,
  TIMEOUT_FIRED

} TIMEOUT;

typedef enum
{
  TF_SET,
  TF_RESET,
  TF_CHECK

} TIMEOUT_FLAG;

TIMEOUT TimerManager (TIMEOUT_FLAG
fTimeout, int iThreadIdx, long
secs);
Copr. 1995 Zenith Data Systems Corp.
typedef struct mem_rec {
      word block_type;
      word owner;
      word size;
      word hdr_seg;
} MEM_REC;
extern char _dos_version[];
word   get_master_env(void);
void   keep_env(void);
word   get_command_psp(void);
int    get_app_name(word AppPSP,void
*AppFname);
extern char far *_cur_app_name;
word   get_dos_mem(word MinSize,MEM_REC
*State);
void   ret_dos_mem(MEM_REC *State);
extern word mouse_size;
word   max_app_mem(void);
dword  calc_app_mem(void);
word   get_app_mem(void *MouseBuf,int
Handle,word LimSeg,word
Min,word Max);
extern word app_MCB,_spw_switch;
extern byte _load_imask[];
void   far *get_app_ptr(void);
void   ret_app_mem(void *MouseBuf,int Handle,fp
ErrorFunct);
int    get_lim_mem(int Handle,int Page,int Cnt,word
Loc,word
LimSeg);
extern word lim_MCB;
int    ret_lim_mem(word Ctl);

int    spawn(void *Program,void *CmdLn,word
Env,word FreeMCB);

int    spawn_ar(void *Program,void *CmdLn);
word   shrink_mem(word NewStackSize);

int    spawn_in(void *Program,word Env,int
BufHandle);
void   prep_shared_mem(word SharedSize);
extern void *shared_mem;
void   far *get_shared_mem(void);
word   split_mcb(word OrigMCB,word NoPara);
void   far *fill_wrd(void far *Mem,word Filler,word
Cnt);

int    make_dos_idle(void *DosStateBuf);
void   undo_dos_idle(void *DosStateBuf);
extern word _dos_idle_len;
void   _no_dos_rdy(void);

word   save_gs(word Handle,word LimSeg,word
Mode,dword Fpos,void
far *TmpBuf);
word   restore_gs(word Handle,word LimSeg,word
Mode,dword
Fpos,void far *TmpBuf);
void   saved_gs_on(void);
extern word _min_vram,_max_vram,_min_graphics;
int    is_graphics(void);
extern word MinVram,_MaxVram,_MinGraphics;
void   init_video(fp SetRetrace);
void   toggle_hkeys(void);
void   get_rgb_colors(void *RGB_buf,int StartReg,int
RegCnt);
void   set_rgb_colors(void *RGB_buf,int StartReg,int
RegCnt);
char   *save_com(word BasePort,void *Buf6);
char   *restore_com(word BasePort,void *Buf6);

typedef struct Mreg { word ax,bx,cx,dx,es,di,si; }
MREG;
word   mouse(MREG *InArgs,MREG *OutArgs);
void   get_mouse(void *StateBuffer);
void   set_mouse(void *StateBuffer);
   install_mouse(fp Service,word StkSize,byte
LockMask);
word   mouse_event(word Trigger)

int    is_network(void);
char   netw_swap_eoj(char NewEOJ);
int    get_npf_server(void);
void   set_npf_server(int Server);
Copr. 1995 Zenith Data Systems Corp.

#define MAX_CHANNELS 16


typedef struct chain {
  char *ch_buf;
  word ch_size;
  word ch_cnt;
} CHAIN;

typedef struct buf_ctl {
  char *Buf;
  char *Top;
  char *Put;
  char *Get;
  word Size;
  word Cnt;
  word CntCnt;
  CHAIN *Chain;
} BUF_CTL;

typedef struct ser_ctl {
  int SerPort2;
  char IRQ;
  char SerChanNum;
  char XmtCtl,FlowCtl;
  char ErrCtl;
  char RingCtl;
  char SerIntMask;
  char ServReq;
  int UserField;
  fp RingService;
  fp XmtService;
  fp RcvService;
  fp ErrService;
  fp BoyEntry[4];
  int LibWork[4];
  int StatusWord;
  BUF_CTL rcv;
  BUF_CTL xmt;
} SER_CTL;


typedef struct ser_pctl {
  int SerPort2;
  char *BufPtr;
  word ReqCnt;
  word PoolCnt;
  word StartTicks;
  int ErrorSts;
  char XmtCtl;
  char PollCtl;
} SER_PCTL;


#define BD_50    0x900
#define BD_75    0x600
#define BD_110   0x417
#define BD_134   0x359
#define BD_150   0x300
#define BD_300   0x180
#define BD_600   0xc0
#define BD_1200     0x60
#define BD_1800     0x40
#define BD_2000     0x3a
#define BD_2400     0x30
#define BD_3600     0x20
#define BD_4800     0x18
#define BD_7200     0x10
#define BD_9600     0xc
#define BD_19200 0x6
#define BD_38400 0x3
#define BD_56K   0x2
#define BD_115K  0x1


#define DF_PAR_N  0
#define DF_PAR_O  0x8
#define DF_PAR_E  0x18
#define DF_PAR_M  0x28
#define DF_PAR_S  0x38

#define DF_STOP1  0
#define DF_STOP2  4

#define DF_D5  0
#define DF_D6  1
#define DF_D7  2
#define DF_D8  3

#define DF_8N1 (DF_D8+DF_PAR_N+DF_STOP1)


#define IFC_DTR         1
#define IFC_RTS         2
#define IFC_DTR_DROPPED 4
#define IFC_XOFF    8
#define IFC_XOFF_SENT   0x10

#define OFC_WATCH_XOFF  0x20
#define OFC_GOT_XOFF    0x40
#define OFC_LOCK    0x80


#define SR_RCV_HI  0x01
#define SR_RCV_OVF 0x02
#define SR_XMT_LO  0x04
#define SR_XMT_EMP 0x08
#define SR_RING    0x10
#define SR_ERR     0x20


#define SIM_RCV      1
#define SIM_XMT      2
#define SIM_ERR    4
#define SIM_RING   8


#define IND_RING   0
#define IND_XMT       1
#define IND_RCV       2
#define IND_ERR       3


#define MC_LOOP    0x10
#define MC_GP2  0x08
#define MC_GP1  0x04
#define MC_RTS 0x02
#define MC_DTR 0x01


#define STA_TXE       0x4000
#define STA_TBE       0x2000
#define STA_BREAK   0x1000
#define STA_FRAM_ERR    0x0800
#define STA_PAR_ERR 0x0400
#define STA_OVR_ERR 0x0200
#define STA_RxRDY  0x0100

#define STA_DCD       0x80
#define STA_RING   0x40
#define STA_DSR       0x20
#define STA_CTS       0x10
#define STA_D_DCD  0x08
#define STA_D_RING 0x04
#define STA_D_DSR  0x02
#define STA_D_CTS  0x01

#define STA_RCV_ERR 0x1E00


#define NUL   0
#define SOH   1
#define STX   2
#define ETX   3
#define EOT   4
#define ENQ   5
#define ACK   6
#define BEL   7
#define BS    8
#define HT    9
#define LF    0xA
#define VT    0xB
#define FF    0xC
#define CR    0xD
#define SO    0xE
#define SI    0xF
#define DLE   0x10
#define DC1   0x11
#define DC2   0x12
#define DC3   0x13
#define DC4   0x14
#define NAK   0x15
#define SYN   0x16
#define ETB   0x17
#define CAN   0x18
#define EM    0x19
#define SUB   0x1A
#define ESC   0x1B
#define FS    0x1C
#define GS    0x1D
#define RS    0x1E
#define US    0x1F
#define SP    0x20
#define DEL   0x7F
#define CTLQ  0x11
#define CTLS  0x13
#define XON   0x11
#define XOFF  0x13


extern SER_CTL *sctl;
extern int _sleep_frame;


install_ser(word stk_sz,byte mask,SER_CTL *sc);
install_2ser(word stk_sz,byte mask,SER_CTL *sc);
install_ser1s(word stk_sz,byte mask,SER_CTL
*sc,int NoChan);
install_ser2s(word stk_sz,byte mask,SER_CTL
*sc,int No1,int
No2);
install_mser(word stk_sz,byte mask,SER_CTL *sc,int
NoChan,int
IdPort);
install_mbser(word stk_sz,byte mask,SER_CTL
*sc,int NoChan,int
IdPort);

void uninstall_ser(void);
void break_on(void);
void break_off(void);
void set_baud(word BaudDivisor, byte DataFormat);
void set_dtr_rts(char ModemControl);
char get_dtr_rts(void);
void prog_8250(void *CommandList);
char fifo_ctl(char FifoCmd);
int  ser_sts(void);
int  ser_in(void);
int  ser_out(char c);
int  ser_inwt(word WaitTicks);
int  ser_outwt(char c, word WaitTicks);
int  ser_rcv_fast(SER_PCTL *CurrentPctl);
int  ser_xmt_fast(SER_PCTL *CurrentPctl);
void set_ibuf(void *InBuf,word BufSize,word CntCnt);
void set_ichain(CHAIN *InChain);
char *feed_ichain(void *InBlock,word InCnt);
int  wrap_ichain(CHAIN *InChain,void *OvfStart);
void set_obuf(void *OutBuf,word BufSize,word
CntCnt);
```

```
void set_ochain(CHAIN *OutChain).
void enable_rcvx(void);
int  send_xon(void).
void enable_rcv(void);
void disable_rcv(void)
void enable_xmtx(void).
void enable_xmt(void);
void disable_xmt(void).
void ser_ints_on(void);
void ser_ints_off(void);
int  flush_uart(void);
void restart_xmt(void).
void restart_ints(void).
int  ser_get(void).
int  ser_get_last(void);
int  ser_put(char c);
char *ser_puts(void *s);
int  ser_rcv_blk(word ByteCnt,word WaitTicks);
int  ser_xmt_blk(word ByteCnt,word WaitTicks);
int  bit_get(void *BitMap,int BitNum).
void bit_set(void *BitMap,int BitNum);
int  bit_tog(void *BitMap,int BitNum);
dword     set_quick_tmr(void);
void rst_quick_tmr(dword OldIntVect);
void upd_quick_tmr(void).
dword     set_quick_kbd(void)
void rst_quick_kbd(dword OldIntVect);
void tk_int_off(char intMask).
void tk_int_on(void)
void set_irc_lev(char TopLevel);
word xm_cksum(void *Buf,word ByteCnt).
word xm_crc(void *Buf,word ByteCnt);
void sleep(void).
void awake(void);
int  sleeping(void)
#define   reset_sleep() _sleep_frame=0.


char pak_scr_buf(word *ScrBuf,int WordCnt).
void unpak_scr_buf(word *ScrBuf,int WordCnt,char
VidAttr).
int  remove_blanks(void *Str).
char *str_arv(void *Str,int,int N_th).
char *str2heap(void *Str);
char *mem2heap(void *Str,int Cnt);
void _even_heap(void).

extern   _dummy_ret().


void set_scr_len(int NoLines).
void reset_ansi(void);
void save_ansi(dword *AnsiState).
void restore_ansi(dword *AnsiState);
void ansi_chr(char c).
int  in_ansi_cmd(void);

extern  fp ansi_xtra
extern    int ansi_no_args
extern  char ansi_args[].



void reset_vt100(void);
void save_vt100(dword *VT100State);
void restore_vt100(dword *VT100State);
void vt100_chr(char c);
int  in_vt100_cmd(void).

extern  fp vt100_xtra;
extern    int vt100_no_args;
extern  char vt100_args[];
Copr 1995 Zenith Data Systems Corp.

PD_PSEO_FREQUENCY      EQU 0200h
PD_TIMER2_16BIT_MODE   EQU 0B6h
PD_SPK_DELAY           EQU 4

PD_CURSOR_TOTAL_LEN EQU 3
PD_CURSOR_TOTAL_HGT EQU 16
PD_CUR_IMAGE_SAVE_BUFF EQU 09F00h
PD_CUR_IMAGE_PROC_BUFF EQU 09F30h

PD_REDUCE_MAX      EQU  2

PD_OSKUICALI_PT_BD_X EQU 10
PD_OSKUICALI_PT_BD_Y EQU 10

PD_TOP_MARGIN       EQU  0
PD_RIGHT_MARGIN     EQU  24
PD_ICON_LENGTH      EQU  1000
PD_ICON_SPACE       EQU  0
PD_HOT_ICON_NUMBER  EQU  8

PD_DELAY_PITCH    EQU  1
```

```
PD_TIME_TICK_SEG EQU  0040h
PD_TIME_TICK_OFF EQU  006Ch
PD_TIME_TICK_BD  EQU  18

PD_PIXEL_BD      EQU  10

PD_SM_INIT   EQU  0001h
PD_SM_NOTIFY EQU  0002h

PD_CALI_OFF_MIN EQU 180

PD_SM_SIG_OFF  EQU   10
PD_SM_INT      EQU   006Ah

PD_IRQ_5       EQU   5
PD_23579       EQU   23579

PD_OXD         EQU   4000
PD_OYD         EQU   4000
PD_CXD         EQU   1000
PD_CYD         EQU   1000

PD_10000       EQU   10000

PD_NO_HOT_ICON EQU   -1

PD_01_PAGE_SIZE EQU   11
PD_23_PAGE_SIZE EQU   12
PD_80        EQU   80
PD_40        EQU   40
PD_01_LENGTH   EQU   80
PD_23_LENGTH   EQU   160
PD_12H_LENGTH  EQU   80
PD_01_SHIFT    EQU   4
PD_23_SHIFT    EQU   3
PD_0123_SHIFT  EQU   3

PD_B800H      EQU   0B800h
PD_BC00H      EQU   0B800h
PD_A000H      EQU   0A000h
PD_45_PAGE1   EQU   0B800h
PD_45_PAGE2   EQU   0BA00h
PD_8K       EQU   0200h
PD_16K      EQU   0400h
PD_32K      EQU   0800h

PD_SENSE_X    EQU   50
PD_SENSE_X    EQU   50
PD_THRESHOLD   EQU   64

PD_8       EQU   8
PD_640      EQU   640
PD_639      EQU   639
PD_624      EQU   624
PD_200      EQU   200
PD_199      EQU   199
PD_350      EQU   350
PD_349      EQU   349
PD_480      EQU   480
PD_479      EQU   479
PD_464      EQU   464
PD_460      EQU   460
PD_320      EQU   320
PD_319      EQU   319
PD_304      EQU   304

PD_ON       EQU   1
PD_OFF      EQU   0
PD_YES      EQU   1
PD_NO       EQU   0
PD_RIGHT     EQU   1
PD_LEFT     EQU   0
PD_DOWN      EQU   1
PD_UP       EQU   0
PD_ZERO      EQU   0
PD_ONE      EQU   1
PD_TWO      EQU   2
PD_NONE      EQU   -1

PD_HOT_SPOT_X  EQU   1
PD_HOT_SPOT_Y  EQU   0

PD_PS2      EQU   4

PD_SEQUE_ADDR_REG EQU  03C4h
PD_SEQUE_DATA_REG EQU  03C5h
PD_GRAPH_ADDR_REG EQU  03CEh
PD_GRAPH_DATA_REG EQU  03CFh

PD_TXT_SCR_MASK EQU   077FFh
PD_TXT_CUR_MASK EQU   07700h

PD_HALF640    EQU   320
PD_HALF480    EQU   240
PD_HALF200    EQU   100
PD_HALF350    EQU   175

PD_FUNC50MK    EQU    0FC2Ch
```

```
PD_MOUSE_TYPE  EQU   0400h
PD_MOUSE_VER   EQU   0820h


PD_VERSION          EQU  '1.0'
PD_VER_MAJOR         EQU  '0'
PD_VER_MINOR        EQU  '1'
PD_ALREADY_IN       EQU  0
PD_REMOVE_MESSAGE      EQU   1
PD_NOT_IN_MEM       EQU  2
PD_REMOVE_ERROR       EQU   3
PD_CMD_LINE_ERR      EQU   4
PD_LOAD_OK     EQU  5
PD_SM_NOT           EQU   8

sIntVectorReplace struc
 iIntNum      db    ?
 iOldISRoffset dw     ?
 iOldISRseg    dw     ?
 iNewISRoffset dw     ?
sIntVectorReplace ends

mIntVectorReplace MACRO imIntNum, fpmOldISR,
fpmNewISR
     db     &imIntNum
 fpmOldISR  dd     0
     dw     &fpmNewISR
ENDM

sPanelConfig struc
 xUL         dw  ?
 yUL         dw  ?
 xLR         dw  ?
 yLR         dw  ?
 nTopMargin    dw  ?
 nRightMargin  dw  ?
 nVertSpace    dw  ?
 nHlLength     dw  ?
 nHlWidth      dw  ?
sPanelConfig ends

SetEGAWriteReadMode  macro
 mov  dx, PD_GRAPH_ADDR_REG
 mov  al, 5
 out  dx, al
 inc  dx
 mov  al, ah
 out  dx, al
 endm

SetEGABitMask  macro
 mov  dx, PD_GRAPH_ADDR_REG
 mov  al, 8
 out  dx, al
 inc  dx
 mov  al, ah
 out  dx, al
 endm

SetEGAColorMask  macro
 mov  dx, PD_SEQUE_ADDR_REG
 mov  al, 2
 out  dx, al
 inc  dx
 mov  al, 0fh
 out  dx, al
 endm

SaveEGARegister  macro
 mov  dx, PD_GRAPH_ADDR_REG
 in  al, dx
 mov  cs:[bx+2], al
 mov  al, 5
 out  dx, al
 inc  dx
 in  al, dx
 mov  cs:[bx], al
 dec  dx
 mov  al, 8
 out  dx, al
 inc  dx
 in  al, dx
 mov  cs:[bx+1], al
 mov  dx, PD_SEQUE_ADDR_REG
 in  al, dx
 mov  cs:[bx+4], al
 mov  al, 2
 out  dx, al
 inc  dx
 in  al, dx
 mov  cs:[bx+3], al
 endm

RestoreEGARegister  macro
 mov  dx, PD_GRAPH_ADDR_REG
 mov  al, 5
 out  dx, al
 inc  dx
 mov  al, cs:[bx]
```

```
out  dx, al
dec  dx
mov  al, 8
out  dx, al
inc  dx
mov  al, cs:[bx+1]
out  dx, al
dec  dx
mov  al, cs:[bx+2]
out  dx, al
mov  dx, PD_SEQUE_ADDR_REG
mov  al, 2
out  dx, al
inc  dx
mov  al, cs:[bx+3]
out  dx, al
dec  dx
mov  al, cs:[bx+4]
out  dx, al
endm

SaveEntryRegisters  macro
 push  ax
 push  bx
 push  cx
 push  dx
 push  di
 push  si
 endm

RestoreEntryRegisters  macro
 pop si
 pop di
 pop dx
 pop cx
 pop bx
 pop ax
 endm



Copr. 1995 Zenith Data Systems Corp
 page ,80
 title PENDRV.ASM - Pen Driver of Saratoga
 .286


.model small

include pd.inc
.stack
.code

ORG 100h

startaddr       label   byte
imTxtScrMask   dw     077FFh
imTxtCurMask   dw     07700h
iHardstart     dw     8
iHardEnd       dw     7

iVertScrPixels  dw     200
iVertcharPixels dw     8

iVideoMode     dw     0
iLanguage      dw     0

iCrtPage      dw     0
iCursorFlag    dw     -1

iHotspotX      dw     1
iHotspotY      dw     0

iHoriMin       dw     0
iHoriMax       dw     639
iVertMin       dw     0
iVertMax       dw     199

iMulX          dw     2133
iMulY          dw     580

iXpos          dw     0
iYpos          dw     0
iLastX         dw     0
iLastY         dw     0

iLastTickCount  dw     -1080

iLeftTouchCount    dw  0
iRightTouchCount   dw  0
iLeftUnTouchCount  dw  0
iRightUnTouchCount dw  0
iHookcs            dw  0
iHookSUI           dw  0
iCallMask      dw      0
fpMouseEventHandler dd  0
fpSaraMouseHandler  dd  0

iXposFSL       dw     0
```

```
iYposF5L        dw      0
iXposF6L        dw      0
iYposF6L        dw      0
iXposF5R        dw      0
iYposF5R        dw      0
iXposF6R        dw      0
iYposF6R        dw      0
iXMickey11      dw      0
iYMickey11      dw      0
iRatioHM        dw      0
iRatioVM        dw      0
iFirstF11       dw      1
iSensitivityX   dw      50
iSensitivityY   dw      50
iThreshold      dw      64

imScr12Mask     dw      00fffh
    dw      00fffh
    dw      007ffh
    dw      003ffh
    dw      001ffh
    dw      000ffh
    dw      0007fh
    dw      0003fh
    dw      0001fh
    dw      0000fh
    dw      000ffh
    dw      0087fh
    dw      0087fh
    dw      0fc3fh
    dw      0fc3fh
    dw      0fe3fh
imCur12Mask     dw      00000h
    dw      02000h
    dw      03000h
    dw      03800h
    dw      03c00h
    dw      03e00h
    dw      03f00h
    dw      03f80h
    dw      03fc0h
    dw      03e00h
    dw      03600h
    dw      02300h
    dw      00300h
    dw      00180h
    dw      00180h
    dw      00000h

PD_STATE_siZE EQU ($-startaddr)

iDropMode       dw      0


bLeftBit12h     db      0ffh
    db      07fh
    db      03fh
    db      01fh
    db      00fh
    db      007h
    db      003h
    db      001h

bRightBit12h    db      0ffh
    db      0feh
    db      0fch
    db      0f8h
    db      0f0h
    db      0e0h
    db      0c0h
    db      080h

imGSMaskDefs    dw      00fffh
    dw      00fffh
    dw      007ffh
    dw      003ffh
    dw      001ffh
    dw      000ffh
    dw      0007fh
    dw      0003fh
    dw      0001fh
    dw      0000fh
    dw      000ffh
    dw      0087fh
    dw      0087fh
    dw      0fc3fh
    dw      0fc3fh
    dw      0fe3fh
imGCMaskDefs    dw      00000h
    dw      02000h
    dw      03000h
    dw      03800h
    dw      03c00h
    dw      03e00h
    dw      03f00h
    dw      03f80h
    dw      03fc0h
    dw      03e00h
    dw      03600h
    dw      02300h
    dw      00300h
    dw      00180h
    dw      00180h
    dw      00000h


imScrt5Mask     dw      0ffffh
    dw      0cfffh
    dw      003ffh
    dw      003ffh
    dw      000ffh
    dw      000ffh
    dw      0003fh
    dw      0003fh
    dw      0000fh
    dw      0003fh
    dw      0003fh
    dw      0c03fh
    dw      0fc0fh
    dw      0fc0fh
    dw      0ff3fh
    dw      0ffffh

imCur45Mask     dw      00000h
    dw      00000h
    dw      03000h
    dw      03000h
    dw      03c00h
    dw      03c00h
    dw      03f00h
    dw      03f00h
    dw      03fc0h
    dw      03f00h
    dw      03300h
    dw      00300h
    dw      000c0h
    dw      000c0h
    dw      00000h
    dw      00000h

ifWindows       dw      0

imTempMask      dw      0
ifEvenOddRow    dw      0
iColNum         dw      0
iBit0Off456     dw      0
iBit1Off456     dw      0
iEvenOff456     dw      0
iOddOff456      dw      0

iMouseVideoList dw      0
ifLeftRight     dw      0

iMousePenMode   dw      0

ifOSKUICalt     dw      0

ifUIActive      dw      0

ifOSKActive     dw      0
ifOSKMode       dw      0
iOSKULX         dw      0
iOSKULY         dw      0
iOSKLRX         dw      0
iOSKLRY         dw      0

iHotIconWidth   dw      300
iHotIconLength  dw      1000
iHotTopMargin   dw      0
iHotRightMargin dw      20
iHotIconspace   dw      0
iHotRedusimul   dw      0
iHotIconID      dw      -1
iHiIdsave       dw      -1

iButtonDown         dw 1
iButtonUpTrigger    dw 4
iButtonDownTrigger  dw 2
iButtonMoveTrigger  dw 1

iReduceFactor   dw      0

ifMouEmuBusy    dw      0

bport61h        db      0
bfspeaker       dw      0
bfspeakerCount  dw      0

bspensignature  db      '<SaraPen>'
PD_SIG_LEN equ $ - bspensignature

wTSRorigPsp     dw      0

iTouch          dw      0
iLastTouch      dw      0


iXposRaw        dw      0


iYposRaw        dw      0

iXposRawBak     dw      0
iYposRawBak     dw      0
iTouchBak       dw      0
if_up_or_not    dw      0

iCursorX        dw      0
iCursorY        dw      0
iCursorCover    dw      0
iCurResOffset   dw      0
iBitPosCur      dw      0
iCountBitCur    dw      0
bBitMask12h     db 4 dup (?)
iCurSav12hCount dw      0
bCurSave12h     db 192 dup (?)
iColumnCount12h dw      0
iRowCount12h    dw      0
iCursorBytes    dw      0
iRealCurHeight  dw      0
iRealCurWidth   dw      0

linputFlag      db      0
align2          db      0

bByte1          db      0
bByte2          db      0
bByte3          db      0
bByte4          db      0

ifCalMaskUI     dw      0

ifCalibrate     dw      -1
iCaliStatus     dw      0
iCaliOffULX     dw      0
iCaliOffULY     dw      0
iCaliOffLRX     dw      0
iCaliOffLRY     dw      0

iMinX           dw      200
iMinY           dw      200
iMaxX           dw      3300
iMaxY           dw      3600
iMinXTmp        dw      0
iMinYTmp        dw      0
iMaxXTmp        dw      4095
iMaxYTmp        dw      4095

iGraResX        dw      0
iGraResY        dw      0
iGraCurdiffX    dw      0
iGraCurdiffY    dw      0
iGralenX        dw      0
iPagesize       dw      0
iSavePageOff    dw      0

iComPort        dw      768
iIRQNumber      db      5


bSaveVGABMR     db      0
bSaveVGAMR      db      0
bSaveVGARMSR    db      0
bSaveVGADRR     db      0
bSaveVGAMMR     db      0

iMinXByte12h dw 0
iMaxXByte12h dw 79

iOffsetintoANDMask dw 0
iOffsetintoXORMask dw 0
iCurMaskSkip12h        dw 0

iCurWidth12h dw 0
iCurHeight12h dw 0
iLineSkip12hCur   dw 0
iCurOffset12h dw 0

bCurImageBuffer db  16*3*8*2 dup (?)
bEGARegBuff db  8 dup (?)

align4          db      0

wCmd33Table     label   word
  dw      func330
  dw      func331
  dw      func332
  dw      func333
  dw      func334
  dw      func335
  dw      func336
  dw      func337
  dw      func338
  dw      func339
  dw      func3310
  dw      func3311
  dw      func3312
  dw      end33isr
  dw      end33isr


dw      func3315
dw      func3316
dw      end33isr
dw      end33isr
dw      func3319
dw      func3320
dw      func3321
dw      func3322
dw      func3323
dw      func3324
dw      func3325
dw      func3326
dw      func3327
dw      end33isr
dw      func3329
dw      func3330
dw      func3331
dw      func3332
dw      func330
dw      func3334
dw      func3335
dw      func3336
dw      func3337
dw      func3338
dw      func3339
dw      func3340
dw      func3341
dw      func3342
dw      end33isr
dw      end33isr
dw      end33isr
dw      end33isr
dw      func3347
dw      end33isr
dw      func3349
dw      func3350
dw      end33isr
dw      end33isr

sSMsignature db 'saratoga manager, copyright zds'
        db 0
PD_SM_SIG_LEN equ ($-sSMsignature)

align5          db      0

wTSRreplaceVectorTable label   word
  mintVectorreplace     33h, fpOldint33h,
fpNewint33h
  mintVectorreplace     67h, fpOldint67h,
fpNewint67h
  mintVectorreplace     0Dh, fpOldint0Dh,
fpNewint0Dh
PD_TSR_repLACE_NUM equ ($-
wTSRreplaceVectorTable)/(size
sintVectorreplace)


public fpNewint67h
fpNewint67h proc far

  jmp $+PD_SM_SIG_OFF+33
  db  'Pen Drv '
  db  'saratoga pen driver copyright zds'

  cmp ax,0010h
  jne @F
  mov bx,iHotIconID
  mov iHotIconID,PD_NO_HOT_ICON
  jmp end67isr
 @@:
  cmp ax,0011h
  jne @F
  mov iMousePenMode,bx
  jmp end67isr
 @@:
  cmp ax,0012h
  je  iam6712
  jmp after6712
 iam6712:
  cmp bx,0012h
  jle over1_endof6712
  jmp endof6712
 over1_endof6712:
  cmp bx,0
  jge over2_endof6712
  jmp endof6712
 over2_endof6712:
  cmp bx,0006h
  jle okmodein67
  cmp bx,000Dh
  jge over3_endof6712
  jmp  endof6712
 over3_endof6712:

 okmodein67

   call _RestoreCursor

   mov iVideoMode,bx
```

```
mov iCRTPage,PD_ZERO

cmp iVideoMode,0004h
jge setvmd4orhigh

mov iGraResX,PD_639

cmp si, PD_ZERO
je  not_chg_scan_lines
mov iVertScrPixels, di
and cx, 00ffh
mov iVertcharPixels, cx

mov ax, di
div cl
cmp al, 25
jne not_25_line_mode
mov iVertScrPixels, PD_200
mov iVertcharPixels, PD_8

not_25_line_mode

not_chg_scan_lines:
 mov ax, iVertScrPixels
 dec ax
 mov iGraResY, ax

 jmp ends6712
setvmd4orhigh

 mov iGraResX,PD_639
 mov iGraResY,PD_479
 mov iGraCurdiffX,PD_624
 mov iGralenX,PD_80

 cmp bx,000Dh
 jne endd05
 mov iGraResX,PD_319
 mov iGraCurdiffX,PD_304
 mov iGraResY,PD_199
 mov iGralenX,PD_40
 mov iPagesize,PD_8K
 jmp gfs6712
endd05
 cmp bx,000Eh
 je  ms640200
 cmp bx,0006h
 jg  mschkfh
ms640200
 mov iGraResY,PD_199
 mov iPagesize,PD_16K
 jmp gfs6712
mschkfh
 cmp bx,000Fh
 jne @F
 mov iGraResY,PD_349
 mov iPagesize,PD_32K
 jmp gfs6712
@@:
 cmp bx,0010h
 jne gfs6712
 mov iGraResY,PD_349
 mov iPagesize,PD_32K
gfs6712
 mov ax,iGraResY
 sub ax,15
 mov iGraCurdiffY,ax
ends6712

 call _SetModeData
 call _ShowCursor

endof6712
 jmp end67isr

after6712:
 cmp ax,0013h
 jne end6713
 cmp bx, iUIActive
 je  notdo6712
 mov iUIActive,bx
 add iOSKUICall, bx
 cmp bx, PD_ZERO
 jne notdo6712
 dec iOSKUICall
notdo6712:
 jmp end67isr
end6713.

 cmp ax,0016h
 jne end6716
 cmp iLeftRight,PD_LEFT
 je  @f
 mov iLeftRight,PD_LEFT
 mov iButtonDown,1
 mov iButtonDownTrigger,2
 mov iButtonUpTrigger,4
 jmp end67isr
@@
 mov iLeftRight,PD_RIGHT
 mov iButtonDown,2
 mov iButtonDownTrigger,8
 mov iButtonUpTrigger,16
 jmp end67isr

end6716:
 cmp ax,0018h
 je  iosint6718h
 jmp end6718h
iosint6718h.
 mov ax,si
 add ax,bx
 add ax,cx
 add ax,dx
 cmp ax,PD_ZERO
 jne noroskl8
 mov iOSKActive,PD_ZERO
 jmp end67isr
noroskl8
 mov iOSKActive,PD_ONE
 mov iOSKULX,bx
 mov iOSKULY,cx
 mov iOSKLRX,dx
 mov dx,si
 mov iOSKLRY,dx
 push ax
 push bx
 push cx
 push dx
 push si
 push di

 mov ax, iOSKUICall
 mov iOSKUICall, PD_OFF
 push ax

 mov  ax, PD_479
 sub  ax, dx
 mov  dx, 1
 cmp  ax, cx
 jle  @F
 mov  dx, PD_480
@@:
 mov ax, iButtonMoveTrigger
 mov bx, 0
 mov cx, PD_320
 push cx
 push dx
 sub cx, iXpos
 sub dx, iYpos
 sal dx, 1
 mov si, cx
 mov di, dx
 pop dx
 pop cx
 call _CallHandler
 cli
 pop ax
 mov iOSKUICall, ax

 pop  di
 pop  si
 pop  dx
 pop  cx
 pop  bx
 pop  ax
 jmp end67isr
end6718h
 cmp ax,0019h
 jne end6719h
 mov iWindows,bx
 jmp end67isr
end6719h:
 cmp ax,0020h
 jne end6720h

 mov iHookSUI,PD_ON
 mov ax,es
 cmp dx,PD_ZERO
 jne @F
 cmp ax,PD_ZERO
 jne @F
 mov iHookSUI,PD_OFF
@@:
 mov iCallMaskUI,cx
 mov word ptr fpSaraMouseHandler+2,ax
 mov word ptr fpSaraMouseHandler,dx
 jmp end67isr

end6720h:
 cmp ax,0030h
 jne end6730
 cmp bx,PD_ONE
 jg  nook6730
 cmp bx,PD_ZERO
 jl  nook6730
 inc iOSKUICall
 mov iCalibrate,bx
 mov iCalStatus,PD_ZERO
 cmp bx,PD_ONE
 je  itiscalilr
 call _RestoreCursor
 mov iCallOffULX,cx
 mov iCallOffULY,dx
 mov ax, 0
 jmp tojmpend67isr
itiscalilr:
 mov iCallOffLRX,cx
 mov iCallOffLRY,dx
 sub cx, iCallOffULX
 cmp cx, PD_Call_OFF_MIN
 jl  calloffdiffbad
 sub dx, iCallOffULY
 cmp dx, PD_Call_OFF_MIN
 jl  calloffdiffbad
 mov ax, 0
 jmp tojmpend67isr
calloffdiffbad:
 mov ax, 2
 jmp tojmpend67isr
nook6730:
 mov ax, 1
tojmpend67isr:
 jmp end67isr
end6730:

 cmp ax,0031h
 jne end6731
 mov bx,iCalStatus
 test bx,0002h
 jz  @F
 mov cx,iMinXTmp
 mov dx,iMinYTmp
 mov ax,iMaxXTmp
 mov si,ax
 mov ax,iMaxYTmp
 mov di,ax
@@:
 jmp end67isr
end6731:
 cmp ax,0032h
 jne end6732
 cmp bx,PD_ONE
 jne @F
 mov bx,iMinXTmp
 mov iMinX,bx
 mov bx,iMaxXTmp
 mov iMaxX,bx
 mov bx,iMinYTmp
 mov iMinY,bx
 mov bx,iMaxYTmp
 mov iMaxY,bx

     mov  iHoticonspace, PD_ICON_spACE
     push ax
     push dx
     mov  ax, bx
     sub  ax, iMinYTmp
     mov  dx, 0
     mov  bx, PD_HOT_ICON_NUMBER
     div  bx
     mov  iHoticonWidth, ax
     pop  dx
     pop  ax

 call _CalcCali
@@
 jmp end67isr
end6732:


end67isr:
 iret
fpNewint67h    endp

public _CalcCali
_CalcCali proc near
 push ax
 push bx
 push dx

 cmp  iVideoMode,000Eh
 jg   @F
 mov  iMinXTmp,PD_199
 jmp  endsetmcc
@@:
 cmp  iVideoMode,0010h
 jg   @F
 mov  iMinXTmp,PD_349
 jmp  endsetmcc
@@:
 mov  iMinXTmp,PD_479
endsetmcc:
 mov  ax,PD_10000
 mov  bx,PD_639
 mul  bx
 mov  bx,iMaxX
 sub  bx,iMinX
 cmp  bx, dx
 jle  calccalidiv0
 div  bx
 push ax

 mov  ax,PD_10000
 mul  iMinXTmp
 mov  bx,iMaxY
 sub  bx,iMinY
 cmp  bx, dx
 jle  calccalidiv01
 div  bx
 mov  iMulY,ax
 pop  ax
 mov  iMulX,ax
 clc
 jmp  calccalidivok
calccalidiv01.
 pop  ax
calccalidiv0
 stc
calccalidivok:
 pop  dx
 pop  bx
 pop  ax

 ret
_CalcCali endp

public fpNewint0Dh
fpNewint0Dh proc far
 push ax
 push bx
 push cx
 push dx
 push es
 push ds
 push si
 push di
 push bp

 mov dx, iComPort
 in al,dx

 push ax

 mov dx, 32
 mov al, 32
 out dx, al

 cmp bfspeaker, 0
 je  up_no_spk_toggle

 inc bfspeakerCount
 cmp bfspeakerCount, PD_SPK_DELAY
 jne up_no_spk_toggle

 mov al, bport61h
 out 61h, al
 mov bfspeaker, 0
 mov bfspeakerCount, 0

up_no_spk_toggle:

 pop  ax


 sti

 call _AssembleByte
 jcxz  not_complete_godd_pt
 call _MouseManager
not_complete_godd_pt.


 pop bp
 pop di
 pop si
 pop ds
 pop es
 pop dx
 pop cx
 pop bx
 pop ax

 cli

 iret

fpNewint0Dh       endp

_MouseManager proc near


 cmp iMouEmuBusy, 1
 je  extmousemanager

 mov iMouEmuBusy, 1
```

```
mov ax, iXposRawBak
mov iXposRaw, ax
mov ax, iYposRawBak
mov iYposRaw, ax
mov ax, iTouchBak
mov iTouch, ax

neg ax
inc ax
sub if_up_or_not, ax

call _MouseEmulator


cmp if_up_or_not, 1
jne freemouseemulator
mov iTouch, 0
mov if_up_or_not, 0

sti
call _MouseEmulator

freemouseemulator:
mov fMouEmuBusy, 0

exitmousemanager:
ret

_MouseManager endp

_AssembleByte proc near

cmp iInputFlag,1
je char_2nd
cmp iInputFlag,2
je char_3rd
cmp iInputFlag,3
je char_4th
cmp al,80h
jae over_bad_char
jmp bad_char
over_bad_char:
cmp al,0C0h
jae char_1st

cmp iTouchBak, 0
je not_use_2nd_up

cmp bfspeaker, 0
je up_no_spk_tog
mov al, bport61h
out 61h, al
mov bfspeaker, 0
mov bfspeakerCount, 0
up_no_spk_tog

mov iTouchBak,0
mov if_up_or_not, 1
mov iInputFlag,0
mov cx PD_ONE
ret
not_use_2nd_up:
mov cx, 0
ret

char_1st:
mov bByte1,al

jmp goodnotlast

char_2nd:
cmp al,128
jae bad_char

mov bByte2,al

jmp goodnotlast

char_3rd
cmp al,32
jae bad_char

mov bByte3,al

jmp goodnotlast

char_4th:
cmp al,128
jae bad_char

mov bByte4,al


mov ah bByte1
shr ax 1
and ax,0F80h
or al,bByte2
mov iXposRawBak,ax
mov ah,bByte3
shr ax,1
and ax,0F80h
or al,bByte4
mov iYposRawBak,ax
mov iInputFlag,0
mov iTouchBak,PD_DOWN



mov cx,PD_ONE
ret
goodnotlast
inc iInputFlag
mov cx,PD_ZERO
ret
bad_char:
mov iInputFlag,0
mov cx,PD_ZERO
ret
_AssembleByte endp

public _spkTone
_spkTone proc near
cli
in al, 61h
mov bport61h, al
or al, 3
out 61h, al
mov bfspeaker, 1
sti
ret
_spkTone endp

_MouseEmulator proc near

cmp iTouch,PD_ZERO
jne over_upproproc
jmp upproproc
over_upproproc:

mov ax,iYposRaw
sub ax,iMinY
cmp ax,PD_ZERO
jge @F
xor ax,ax
@@
mul iMuly
mov bx,PD_10000
div bx
cmp ax, iGraResY
jl @F
mov ax, iGraResY
dec ax
@@:
mov iYpos,ax

mov ax,iXposRaw
sub ax,iMinX
cmp ax,PD_ZERO
jge @F
xor ax,ax
@@:
mul iMulx
mov bx,PD_10000
div bx
cmp ax, iGraResX
jl @F
mov ax, iGraResX
dec ax
@@:
mov iXpos,ax

cmp iDropMode,PD_ON
jne over_predropmode
jmp predropmode
over_predropmode:


cmp iLastTouch,PD_DOWN
jne over_not_h_c_o
jmp not_h_c_o
over_not_h_c_o:


cmp iCalibrate,PD_NONE
je notcalibinmenu
mov iDropMode,PD_ON

call _spkTone

ret
notcalibinmenu:

mov ax,iMinX
cmp ax,iXposRaw
jle endchkhoticon
mov iDropMode,PD_ON
sub ax,iXposRaw
cmp ax,iHotRightMargin
jl endnothoticon
sub ax,iHotRightMargin
cmp ax,iHoticonLength
jg endnothoticon
mov ax,iYposRaw
sub ax,iMiny
sub ax,iHotTopMargin
cmp ax,0
jl endnothoticon
mov bx,iHoticonWidth
adc bx,iHoticonspace
xor dx,dx
div bx
cmp dx,iHoticonWidth
jge endnothoticon
mov iHildsave,ax
jmp endyeshoticon
endnothoticon:
mov iHildsave,PD_23579
endyeshoticon:
ret
endchkhoticon:


call _spkTone

cmp iOSKActive,PD_ZERO
je endoskchk
mov ax,iXpos
cmp ax,iOSKULX
jl endoskchk
cmp ax,iOSKLRX
jg endoskchk
mov ax,iYpos
cmp ax,iOSKULY
jl endoskchk
cmp ax,iOSKLRY
jg endoskchk
mov iOSKMode,PD_ON
inc iOSKUICali
jmp afterbchk
endoskchk.

not_h_c_o

mov ax,iHoriMax
cmp ax,iXpos
jge @F
mov iXpos,ax
@@
mov ax,iHoriMin


cmp ax,iXpos
jle @F
mov iXpos,ax
@@:
mov ax,iVertMax
cmp ax,iYpos
jge @F
mov iYpos,ax
@@
mov ax,iVertMin
cmp ax,iYpos
jle @F
mov iYpos,ax
@@:
afterbchk:

cmp iLastTouch,PD_ZERO
je over_stilldown
jmp stilldown
over_stilldown:

endchkdck:

cmp iLeftRight,PD_LEFT
jne addright
inc iLeftTouchCount
mov ax, iXpos
mov iXposF5L,ax
mov ax,iYpos
mov iYposF5L,ax
jmp endcountbut
addright:
inc iRightTouchCount
mov ax, iXpos
mov iXposF5R,ax
mov ax,iYpos
mov iYposF5R,ax
endcountbut:

cli
call _RestoreCursor
call _ShowCursor
sti
mov ax,iButtonMoveTrigger
mov bx,0
mov cx,iXpos
sub cx,iLastX
mov dx,iYpos
sub dx,iLastY
sal dx,1
mov si,cx
mov di,dx
mov cx,iXpos
mov dx,iYpos
call _CallHandler

buttdownmess.
mov ax,iButtonDownTrigger
mov bx,iButtonDown
mov si,0
mov di,0
mov cx,iXpos
mov dx,iYpos
call _CallHandler

mov iReduceFactor,PD_ONE
jmp updateptret

doesdroppt.
mov iReduceFactor, PD_ZERO
jmp jumpret

stilldown:

cmp iReduceFactor, PD_ZERO
jne doesdroppt
mov iReduceFactor, PD_ONE

mov cx,iXpos
sub cx,iLastX
mov dx,iYpos
sub dx,iLastY
sal dx,1
mov si,cx
mov di,dx

cmp iOSKUICali, 0
je not_oskuicali_for_move
cmp cx, 0
jge @F
neg cx
@@.
cmp cx, PD_OSKUICALI_PT_BD_X
jg oskuicali_not_close_downs
cmp dx, 0
jge @F
neg dx
@@
cmp dx, PD_OSKUICALI_PT_BD_Y
jg over_after_update_xy
jmp after_update_xy
over_after_update_xy:

oskuicali_not_close_downs:
mov dx, di
mov cx, si

not_oskuicali_for_move:
cmp dx,PD_ZERO
jne notsamepos
jcxz sameposnc
notsamepos:

mov cx,iXpos
mov dx,iYpos
mov ax,iButtonMoveTrigger
mov bx,iButtonDown
call _CallHandler

cli
call _RestoreCursor
call _ShowCursor
sti

sameposnc:
jmp updateptret



upproproc:
mov iReduceFactor,0
mov iDropMode,PD_OFF

cmp iHildsave,PD_NO_HOT_ICON
je endjudgehi
cmp iHildsave,PD_23579
je @F
mov ax,iMinX
cmp ax,iXposRaw
jl @F
mov ax,iHildsave
mov iHoticonID,ax
@@:
```

```
mov iHildsave,PD_NO_HOT_ICON
mov iHotRedusmul,PD_ZERO
mov iLastTouch,PD_ZERO
ret
endjudgeht:
 cmp ifLeftRight,PD_LEFT
 je addleftun
 inc iRightUnTouchCount
 mov ax,iLastX
 mov iXposF8R,ax
 mov ax,iLastY
 mov iYposF8R,ax
 jmp endaddun
addleftun:
 inc iLeftUnTouchCount
 mov ax,iLastX
 mov iXposF8L,ax
 mov ax,iLastY
 mov iYposF8L,ax
endaddun:
 mov ax,iButtonUpTrigger
 mov bx,0
 mov cx,iXpos
 mov dx,iYpos
 mov si,0
 mov di,0
 call _CallHandler

 cmp ifCalibrate,PD_NONE
 je @F
 call _Calibration
 dec iOSKUICall
 mov ifCalibrate,PD_NONE
 jmp updateptrel
@@:
 cmp ifOSKMode,PD_ON
 jne uposkmodeisoff
 mov ax,iXpos
 cmp ax,iOSKULX
 jl uposkcurhide
 cmp ax,iOSKLRX
 jg uposkcurhide
 mov ax,iYpos
 cmp ax,iOSKULY
 jl uposkcurhide
 cmp ax,iOSKLRY
 jle setuposkmodeparm
uposkcurhide:
 cli
 Call _RestoreCursor
 sti
setuposkmodeparm:
 mov ifOSKMode,PD_OFF
 dec iOSKUICall
uposkmodeisoff:

updateptrel:
 mov ax,iXpos
 mov iLastX,ax
 mov ax,iYpos
 mov iLastY,ax
after_update_xy:

j14ckck:
 mov ax,iTouch
 mov iLastTouch,ax

jumpret:
 ret
prodrapmode:
 cmp iHildsave,PD_NO_HOT_ICON
 je realdrop
 mov ax,iMinX
 cmp ax,iXposRaw
 jge realdrop

 mov iHildsave,PD_23578

 inc iHotRedusmul

 cmp iHotRedusmul,4
 jne realdrop
 mov iHotRedusmul,PD_ZERO

 cmp ifWindows,PD_ONE
 jne @F

 mov ax,iButtonMoveTrigger
 mov bx,0
 mov cx,iXpos
 sub cx,iLastX
 mov dx,iYpos
 sub dx,iLastY
 sal dx,1
 mov si,cx
 mov di,dx
 mov cx,iXpos
 mov dx,iYpos
```

```
 call _CallHandler
 jmp updateptrel

@@:
 cli
 call _RestoreCursor
 call _ShowCursor
 sti
 jmp updateptrel

realdrop:
 ret
_MouseEmulator endp

_Calibration proc near

 cmp ifCalibrate,PD_ZERO
 jne notcalnul
 mov ax,iXposRaw
 mov iMinXTmp,ax
 mov ax,iYposRaw
 mov iMinYTmp,ax
 mov iCaliStatus,0005h
 jmp retcalib
notcalnul:
 cmp ifCalibrate,PD_ONE
 je over_retcalib
 jmp retcalib
over_retcalib:
 mov ax,iYposRaw
 cmp ax,iMinYTmp
 jge @F
 mov bx,iMinYTmp
 mov iMinYTmp,ax
 xchg ax,bx
@@:
 mov iMaxYTmp,ax
 mov ax,iXposRaw
 cmp ax,iMinXTmp
 jge @F
 mov bx,iMinXTmp
 mov iMinXTmp,ax
 xchg ax,bx
@@:
 mov iMaxXTmp,ax

 sub ax,iMinXTmp
 mul iCaliOffULX
 mov bx,iCaliOffLRX
 sub bx,iCaliOffULX
 div bx
 push ax
 mov ax,iMaxYTmp
 sub ax,iMinYTmp
 mul iCaliOffULY
 mov bx,iCaliOffLRY
 sub bx,iCaliOffULY
 div bx
 push ax
 mov ax,iMaxXTmp
 sub ax,iMinXTmp
 mov bx,PD_639
 sub bx,iCaliOffLRX
 mul bx
 mov bx,iCaliOffLRX
 sub bx,iCaliOffULX
 div bx
 push ax
 mov ax,iMaxYTmp
 sub ax,iMinYTmp
 mov bx,PD_479
 sub bx,iCaliOffLRY
 mul bx
 mov bx,iCaliOffLRY
 sub bx,iCaliOffULY
 div bx
 add iMaxYTmp,ax
 pop ax
 add iMaxXTmp,ax
 pop ax
 sub iMinYTmp,ax
 pop ax
 sub iMinXTmp,ax

 mov ax,iMaxXTmp
 sub ax,iMinXTmp
 cmp ax,PD_CXD
 jl notvcab
 mov ax,iMaxYTmp
 sub ax,iMinYTmp
 cmp ax,PD_CYD
 jl notvcab

 mov ax,iMinX
 sub ax,iMinXTmp
 cmp ax,PD_ZERO
 jge @F
 mov ax,iMinXTmp
 sub ax,iMinX
```

```
@@:
 cmp ax,PD_CXD
 jg notvcab

 mov ax,iMinY
 sub ax,iMinYTmp
 cmp ax,PD_ZERO
 jge @F
 mov ax,iMinYTmp
 sub ax,iMinY
@@:
 cmp ax,PD_CYD
 jg notvcab

 mov iCaliStatus,0006h
 jmp endestc
notvcab:
 mov iCaliStatus,0002h
endestc:
retcalib:
 ret
_Calibration endp

_CallHandler proc near

 push di
 push si
 push bp
 push ds
 push es

 push ax
 mov ax,@data
 mov ds,ax
 pop ax

 cmp iOSKUICall,PD_ON
 jl msubueo
 cmp iHookSUI,PD_OFF
 je endmsubcall

 call dword ptr fpSaraMouseHandler
 sti
 jmp endmsubcall

msubueo:
 cmp iHookes,PD_OFF
 je endmsubcall
 call dword ptr fpMouseEventHandler
endmsubcall:
 pop es
 pop ds
 pop bp
 pop si
 pop di
 ret
_CallHandler endp

public fpNewInt33h
fpNewInt33h proc far
 push es
 push ds
 push si
 push di

 cmp ax,PD_ZERO
 jge over_end33isr
 jmp end33isr
over_end33isr:
 cmp ax,52
 jle over1_end33isr
 jmp end33isr
over1_end33isr:

 shl ax,PD_ONE
 lea di,uCmd33Table
 add di,ax
 jmp word ptr cs:[di]

func330:
 mov iHookes,PD_OFF
 mov iCallMask,0

 call _RestoreCursor

 mov iCursorFlag,-1

 mov imTxtScrMask,PD_TXT_SCR_MASK
 mov imTxtCurMask,PD_TXT_CUR_MASK

 mov iHotspotX,PD_HOT_spOT_X
 mov iHotspotY,PD_HOT_spOT_Y

 push cx
 mov cx,32
 xor bx,bx
f330loop:
 mov ax,imGSMaskData[bx]
 mov imScr12Mask[bx],ax
```

```
 add bx,PD_TWO
 loop f330loop
 pop cx

 push ds
 push cs
 pop ds
 call _build_cursor_image
 pop ds

 mov iRatioHM,8
 mov iRatioVM,16

 mov iXposF5L,PD_ZERO
 mov iYposF5L,PD_ZERO
 mov iXposF6L,PD_ZERO
 mov iYposF6L,PD_ZERO
 mov iXposF5R,PD_ZERO
 mov iYposF5R,PD_ZERO
 mov iXposF6R,PD_ZERO
 mov iYposF6R,PD_ZERO
 mov iLeftTouchCount,PD_ZERO
 mov iRightTouchCount,PD_ZERO
 mov iLeftUnTouchCount,PD_ZERO
 mov iRightUnTouchCount,PD_ZERO

 call _SetModeData

 mov iThreshold,PD_THRESHOLD
 cmp si,33
 je @F
 mov iCrtPage,PD_ZERO
@@:
 mov ax,-1
 mov bx,2
 jmp end33isr

func331:
 cmp iCursorFlag,0
 je n_c_cur
 inc iCursorFlag
 call _ShowCursor
n_c_cur:
 jmp end33isr

func332:
 call _RestoreCursor
 dec iCursorFlag
 jmp end33isr

func333:
 mov bx,iTouch
 cmp ifLeftRight,PD_LEFT
 je @F
 shl bx,1
@@:
 mov cx,iXpos
 mov dx,iYpos
 jmp end33isr

func334:
 cmp cx,iHoriMin
 jge @F
 mov cx,iHoriMin
@@:
 cmp cx,iHoriMax
 jle @F
 mov cx,iHoriMax
@@:
 cmp dx,iVertMin
 jge @F
 mov dx,iVertMin
@@:
 cmp dx,iVertMax
 jle @F
 mov dx,iVertMax
@@:
 mov iXpos,cx
 mov iLastX,cx
 mov iYpos,dx
 mov iLastY,dx

 call _RestoreCursor
 call _ShowCursor
 jmp end33isr

func335:
 xor ax,ax
 cmp bx,PD_ZERO
 jne f5right
 mov bx,iLeftTouchCount
 mov iLeftTouchCount,0
 mov cx,iXposF5L
 mov dx,iYposF5L
 cmp ifLeftRight,PD_LEFT
 jne f5right
 mov ax,iTouch
 jmp endf5
f5right:
```

```
 cmp bx,1
 jne f5center
 mov bx,iRightTouchCount
 mov iRightTouchCount,0
 mov cx,iXposF5R
 mov dx,iYposF5R
 cmp iLeftRight,PD_Right
 jne f5center
 mov ax,iTouch
 sal ax,1
 jmp endf5
f5center
 xor bx,bx
 xor cx,cx
 xor dx,dx
endf5
 jmp end33isr

func336:
 xor ax,ax
 cmp bx,0
 jne f6right
 mov bx,iLeftUnTouchCount
 mov iLeftUnTouchCount,0
 mov cx,iXposF6L
 mov dx,iYposF6L
 cmp iLeftRight,PD_LEFT
 jne f6right
 mov ax,iTouch
 jmp endf6
f6right:
 cmp bx,1
 jne f6center
 mov bx,iRightUnTouchCount
 mov iRightUnTouchCount,0
 mov cx,iXposF6R
 mov dx,iYposF6R
 cmp iLeftRight,PD_Right
 jne f6center
 mov ax,iTouch
 sal ax,1
 jmp endf6
f6center
 xor bx,bx
 xor cx,cx
 xor dx,dx
endf6
 jmp end33isr

func337:
 mov iHoriMin,cx
 mov iHoriMax,dx
 cmp dx,cx
 jge @F
 mov iHoriMin,dx
 mov iHoriMax,cx
@@
 shr cx, 1
 shr cx, 1
 shr cx, 1
 mov iMinXByte12h, cx
 shr dx, 1
 shr dx, 1
 shr dx, 1
 mov iMaxXByte12h, dx
 jmp end33isr

func338:
 mov iVertMin,cx
 mov iVertMax,dx
 cmp dx,cx
 jge @F
 mov iVertMin,dx
 mov iVertMax,cx
@@:
 jmp end33isr

func339
 mov iHotspotX,bx
 mov iHotspotY,cx

 mov cx,32
 mov di,dx
 xor bx,bx
f339loop:
 mov ax, word ptr es:[di]
 mov imScr12Mask[bx], ax
 add di,2
 add bx,2
 loop f339loop

 push ds
 push cs
 pop ds
 call _build_cursor_image
 pop ds

 cli
 call _RestoreCursor
 call _ShowCursor
 sti

 jmp end33isr

func3310:
 cmp bx,0
 jne sethwcur
 mov imTxtScrMask,cx
 mov imTxtCurMask,dx
 jmp endfnc10
sethwcur:
 mov iHardstart,cx
 mov iHardEnd,dx
 mov bx,cx
 mov cx,8
 sal bx,cl
 mov cx,bx
 and dx,00ffh
 or cx,dx
 mov ax,0100h
 int 10h
endfnc10:
 jmp end33isr


func3311:
 cmp iFirstF11,1
 je first11c
 mov cx,iXpos
 sub cx,iXMickey11
 mov dx,iYpos
 sub dx,iYMickey11
 sal dx,1
 jmp endf11p
first11c:
 mov cx,0
 mov dx,0
 mov iFirstF11,0
endf11p:
 mov ax,iXpos
 mov iXMickey11,ax
 mov ax,iYpos
 mov iYMickey11,ax
 jmp end33isr

func3312:
 mov ax,es
 mov iHookes,PD_ON
 cmp dx,PD_ZERO
 jne @F
 c. > ax,PD_ZERO
 jn. @F
 mov iHookes,PD_OFF
@@.
 mov iCallMask,cx
 mov word ptr fpMouseEventHandler+2,ax
 mov word ptr fpMouseEventHandler,dx
 jmp end33isr

func3315
 mov iRatioHM,cx
 mov iRatioVM,dx
 jmp end33isr

func3316.
 jmp end33isr

func3319
 cmp dx,0
 jg @F
 mov dx,PD_THResHOLD
@@:
 mov iThreshold,dx
 jmp end33isr

func3320:
 mov iHookes,PD_ON
 mov ax,iCallMask
 mov iCallMask,cx
 mov cx,ax
 push bx
 mov bx,es
 cmp dx,PD_ZERO
 jne @F
 cmp bx,PD_ZERO
 jne @F
 mov iHookes,PD_OFF
@@:
 mov ax,word ptr fpMouseEventHandler+2
 mov word ptr fpMouseEventHandler+2,bx
 mov es,ax
 pop bx
 mov ax,word ptr fpMouseEventHandler
 mov word ptr fpMouseEventHandler,dx
 mov dx,ax
 jmp end33isr

func3321.
 mov bx,PD_STATE_siZE
 jmp end33isr

func3322:
 push cx
 pushf
 cld
 mov di,dx
 lea si,startaddr
 mov cx,PD_STATE_siZE
  rep movsb
 popf
 pop cx
 jmp end33isr

func3323:
 push cx
 lea di,startaddr
 mov cx, PD_STATE_siZE
 mov si,dx
f23copy:
 mov al,es:[si]
 mov [di],al
 inc di
 inc si
 loop f23copy
 pop cx
 jmp end33isr

func3324.
 inc cx
 jmp end33isr

func3325:
 mov cx,0
 jmp end33isr

func3326:
 mov iSensitivityX,bx
 mov iSensitivityY,cx
 mov iThreshold,dx
 jmp end33isr

func3327:
 mov bx,iSensitivityX
 mov cx,iSensitivityY
 mov dx,iThreshold
 jmp end33isr

func3328
 mov iCrtPage,bx
 jmp end33isr

func3330.
 mov bx,iCrtPage
 jmp end33isr

func3331:
 mov ax,-1
 jmp end33isr

func3332:
 jmp end33isr

func3334:
 mov iLanguage,bx
 jmp end33isr

func3335.
 mov bx,iLanguage
 jmp end33isr

func3336.
 mov bx,PD_MOUSE_VER
 mov cx,PD_MOUSE_TYPE
 jmp end33isr

func3337:
 mov ax,0100h
 jmp end33isr

func3338:
 mov bx,0
 mov cx,iHoriMax
 mov dx,iVertMax
 jmp end33isr

func3339:
 cmp iVideoMode,3
 jge @F
 cmp iCursorFlag,PD_ZERO
 jne @F
 mov ax,imTxtScrMask
 mov bx,imTxtCurMask
 jmp gm3339
@@
 mov ax,iHardstart
 mov bx,iHardEnd
gm3339.
 xor cx,cx
 xor dx,dx
 jmp end33isr

func3340
 cmp cx,0
 jl endf40
 cmp cx,0012h
 jg endf40
 cmp cx,000dh
 jge goenf40
 cmp cx,0007h
 jge endf40
goenf40
 mov iVideoMode,cx
 call _SetModeData
 mov cx,0
endf40:
 jmp end33isr

func3341:
 cmp cx,0
 jne @F
 mov cx,1
 jmp endf41list
@@
 inc iMouseVideoList
 cmp iMouseVideoList,7
 jne @F
 mov iMouseVideoList,13
@@:
 cmp iMouseVideoList,20
 jne @F
 mov iMouseVideoList,0
@@:
 mov cx,iMouseVideoList
endf41list:
 mov bx,0
 mov dx,0
 jmp end33isr

func3342:
 mov ax,iCursorFlag
 mov bx,iHotspotX
 mov cx,iHotspotY
 mov dx,PD_PS2
 jmp end33isr

func3347:
 mov iCrtPage,0
 mov ax,-1
 mov iHardstart,8
 mov iHardEnd,7
 jmp end33isr

func3348:
 mov ax,iHoriMin
 mov bx,iVertMin
 mov cx,iHoriMax
 mov dx,iVertMax
 jmp end33isr

func3350:
 mov ax,PD_FUNC50MK
 jmp end33isr

end33isr
 pop di
 pop si
 pop ds
 pop es
 iret

fpNewInt33h endp

_ShowCursor proc near

 cmp iCursorFlag,PD_ZERO
 je @F
 ret
@@
 cmp iOSKUICall,PD_ON
 jge notshowcalicur
 cmp iWindows,PD_ZERO
 je doesshowcursor
 ret
notshowcalicur:
 cmp iCalibrate, PD_NONE
 je doesshowcursor
 ret
doesshowcursor:
 cmp iVideoMode,0012h
 jne showcurnot12h
 sti
 call _PositionCursor
 cli
 call _show_12h_cursor
 ret
```

```
showcurmol12h:
 push ax
 push bx
 push cx
 push dx
 push es
 push si
 push di

 cmp iVideoMode,0003h
 jle over_showgcur
 jmp showgcur
over_showgcur

 mov ax,PD_B800H
 mov es,ax
 mov ax,iCrtPage

 cmp iVideoMode,1
 jg  showm23

 mov cl,PD_01_PAGE_siZE
 shl ax,cl
 mov bx,ax

 mov ax, iYpos
 mov cx, iVertcharPixels
 div cl
 and ax, 00ffh

 mov cl,PD_01_LENGTH
 mul cl
 add bx,ax
 mov ax,iXpos
 mov cl,PD_01_SHIFT
 shr ax,cl
 shl ax,1
 add ax,bx
 mov si,ax
 mov iCurResOffset,ax
 mov ax,es:[si]
 mov iCursorCover,ax
 and ax,imTxtScrMask
 xor ax,imTxtCurMask
 mov es:[si],ax
 jmp endshowc
showm23
 mov cl,PD_23_PAGE_siZE
 shl ax,cl
 mov bx,ax

 mov ax, iYpos
 mov cx, iVertcharPixels
 div cl
 and ax, 00ffh

 mov cl,PD_23_LENGTH
 mul cl
 add bx,ax
 mov ax,iXpos
 mov cl,PD_23_SHIFT
 shr ax,cl
 shl ax,1
 add ax,bx
 mov si,ax
 mov iCurResOffset,ax
 mov ax,es:[si]
 mov iCursorCover,ax
 and ax,imTxtScrMask
 xor ax,imTxtCurMask
 mov es:[si],ax
 jmp endshowc
showgcur

 mov ax,iXpos
 sub ax,iHotspotX
 cmp ax,iHoriMin
 jge @F
 mov ax,iHoriMin
@@
 mov iCursorX,ax

 mov ax,iYpos
 sub ax,iHotspotY
 cmp ax,iVertMin
 jge @F
 mov ax,iVertMin
@@
 mov iCursorY,ax

 mov ax,PD_A000H
 mov es,ax

 cmp iVideoMode,0011h
 jge begsgc

 cmp iVideoMode,0005h
 jle @F
 mov ax,iCRTPage
 mul iPagesize
 add ax,PD_A000H
 mov es,ax
 mov ax,iSavePageOff
@@:
 cmp iVideoMode,0005h
 jg  @F
 and iCursorX,0fffeh
@@:
 cmp iVideoMode,000Dh
 jne not640320
 mov ax,iXpos
 shr ax,PD_ONE
 sub ax,iHotspotX
 cmp ax,iHoriMin
 jge @F
 mov ax,iHoriMin
@@:
 mov iCursorX,ax
not640320:

begsgc:
 mov ax,iCursorY
 mul iGrslenX
 mov bx,ax
 mov ax,iCursorX
 mov cl,3
 shr ax,cl
 add ax,bx

 mov si,ax
 mov iCurResOffset,ax
 mov ax,iCursorX
 and ax,0007h
 mov iBitPosCur,ax
 mov bx,8
 sub bx,ax
 mov iCountBitCur,bx

 mov iRealCurWidth,16
 mov ax,iGrsCurdiffX
 cmp ax,iCursorX
 jge @F
 mov ax,iGrsResX
 sub ax,iCursorX
 mov iRealCurWidth,ax
@@:

 mov iCursorBytes,1
 mov ax,iCountBitCur
 cmp ax,iRealCurWidth
 jge @F
 add ax,8
 inc iCursorBytes
 cmp ax,iRealCurWidth
 jge @F
 inc iCursorBytes
@@:

 mov iRealCurHeight,16
 mov ax,iGrsCurdiffY
 cmp ax,iCursorY
 jge @F
 mov ax,iGrsResY
 sub ax,iCursorY
 mov iRealCurHeight,ax
@@:

 call _SaveVGARegister

 mov di,iBitPosCur
 mov dl,bLeftBit12h[di]

 cmp iCursorBytes,1
 jg  @F
 mov ax,iCountBitCur
 sub ax,iRealCurWidth
 mov di,ax
 mov al,bRightBit12h[di]
 and al,dl
 mov bBitMask12h,al
 jmp endbit12h
@@:
 mov bBitMask12h,dl

 cmp iCursorBytes,2
 jg  @F
 mov ax,iCountBitCur
 add ax,8
 sub ax,iRealCurWidth
 mov di,ax
 mov dl,bRightBit12h[di]
 mov bBitMask12h+1,dl
 jmp endbit12h
@@:
 mov bBitMask12h+1,0ffh

 mov ax,iCountBitCur
 add ax,16
 sub ax,iRealCurWidth
 mov di,ax
 mov dl,bRightBit12h[di]
 mov bBitMask12h+2,dl
endbit12h:


 mov cx,3
 cmp iVideoMode,0012h
 je  curresld
 cmp iVideoMode,0006h
 jg  over_escdto12h
 jmp escdto12h
over_escdto12h:
 cmp iVideoMode,000Fh
 jne @F
 mov cx,2
@@:
 cmp iVideoMode,0011h
 jne curresld
 xor cx,cx
curresld:
 mov dl,0
bitplaneloop:
 push cx

 mov ah,cl
 mov al,4
 mov dx,PD_GRAPH_addR_REG
 out dx,ax

 mov ax,0100h
 shl ax,cl
 mov al,2
 mov dx,PD_SEQUE_addR_REG
 out dx,ax

 mov si,iCurResOffset
 push si

 mov cx,iCursorBytes
 mov iColumnCount12h,0
columnloop:
 push cx

 mov al,8
 mov bx,iColumnCount12h
 mov ah,bBitMask12h[bx]
 mov dx,PD_GRAPH_addR_REG
 out dx,ax

 mov cx,iRealCurHeight
 mov iRowCount12h,0
byteloop.
 push cx

 mov dl,es:[si]

 mov bCurSave12h[di],dl
 inc di

 mov bx,iRowCount12h
 mov ax,imScr12Mask[bx]
 cmp iColumnCount12h,0
 jne @F
 mov cx,iBitPosCur
 shr ah,cl
 and dl,ah

 mov ax,imCur12Mask[bx]
 shr ah,cl
 xor ah,dl
 mov es:[si],ah
 jmp end12hdm
@@:
 mov cx,iCountBitCur
 cmp iColumnCount12h,1
 jne @F
 shl ax,cl
 and dl,ah

 mov ax,imCur12Mask[bx]
 shl ax,cl
 xor ah,dl

 mov es:[si],ah
 jmp end12hdm
@@:
 add cl,8
 shl ax,cl
 and dl,ah

 mov ax,imCur12Mask[bx]
 shl ax,cl
 xor ah,dl
 mov es:[si],ah

 end12hdm:
 add si,iGrslenX

 inc iRowCount12h
 inc iRowCount12h

 pop cx
 dec cx
 cmp cx,0
 jne byteloop


 inc iColumnCount12h
 add si,iColumnCount12h

 pop cx
 pop si
 inc si
 push si
 dec cx
 cmp cx,0
 je  over_columnloop
 jmp columnloop
over_columnloop:
 pop si

 pop cx
 dec cx
 cmp iVideoMode,000Fh
 jne @F
 dec cx
@@
 cmp cx,0
 jl  over_bitplaneloop
 jmp bitplaneloop
over_bitplaneloop.

 call _ResVGARegister
 jmp endshowc

escdto12h

 mov ax,iCursorY
 mov bx,ax
 and bx,0001h
 mov iEvenOddRow,bx
 mov bCurSave12h,bl
 shr ax,1
 mov cx,PD_80
 mul cx
 add ax,2000h
 mov iOddOff456,ax

 mov ax,iCursorY
 inc ax
 shr ax,1
 mov cx,PD_80
 mul cx
 mov iEvenOff456,ax

 mov ax,iCursorX
 mov cl,3
 shr ax,cl
 mov iColNum,ax

 mov iBit1Off456,ax

 mov ax,iColNum
 and ax,0001h
 mov iColNum,ax
 mov bCurSave12h+1,al

 mov ax,PD_B800H
 mov es,ax

 mov di,2
 mov cx,iCursorBytes
 mov iColumnCount12h,0
bitplane4th:
 push cx
 mov ax,iColNum

 cmp iVideoMode,0006h
 jne @F
 mov ax,PD_ZERO
@@:

 mov cl,8
 shl ax,cl
 mov cl,ah
 mov al,4
 mov dx,PD_GRAPH_addR_REG
 out dx,ax

 mov ax,0100h
 shl ax,cl
 mov al,2
 mov dx,PD_SEQUE_addR_REG
 out dx,ax
```

```
mov al,8
mov bx,iColumnCount12h
mov ah,bBitMask12h[bx]
mov dx,PD_GRAPH_addR_REG
out dx,ax

cmp iColNum,PD_ONE
je @F
mov ax,iBit1Off458
mov iColNum,PD_ONE
jmp m6hbitp
@@:
mov ax,iBit1Off458
mov iColNum,PD_ZERO
m6hbitp:
 add ax,iColumnCount12h
 mov si,ax

 mov cx,iRealCurHeight
 mov iRowCount12h,0
colloop6h:
 push cx

 push si
 cmp iEvenOddRow,PD_ONE
 je @F
 add si,iEvenOff458
 mov iEvenOddRow,PD_ONE
 jmp m6nsgc
@@:
 add si,iOddOff458
 mov iEvenOddRow,PD_ZERO
in6hsgc:

 mov dl,es:[si]

 mov bCurSave12h[di],dl
 inc di

 mov bx,iRowCount12h
 cmp iVideoMode,0006h
 jne gomsx45
 mov ax,imCur12Mask[bx]
 mov imTempMask,ax
 mov ax,imScr12Mask[bx]
 jmp got458mak
gomsk45
 mov ax,imCur45Mask[bx]
 mov imTempMask,ax
 mov ax,imScr45Mask[bx]
got458mak:
 cmp iColumnCount12h,0
 jne @F
 mov cx,iBitPosCur
 shr ah,cl
 and dl,ah

 mov ax,imTempMask
 shr ah cl
 xor ah,dl
 mov es:[si],ah
 jmp end08hdm
@@:
 mov cx,iCountBitCur
 cmp iColumnCount12h,1
 jne @F
 shl ax,cl
 and dl,ah

 mov ax,imTempMask
 shl ax,cl
 xor ah,dl

 mov es:[si],ah
 jmp end06hdm
@@:
 add cl,9
 shl ax,cl
 and dl,ah

 mov ax,imTempMask
 shl ax,cl
 xor ah,dl
 mov es:[si],ah
end08hdm:
 inc iRowCount12h
 inc iRowCount12h

 pop si
 test iRowCount12h,0002h
 jnz @F
 add si,PD_80
@@:
 pop cx
 dec cx
 cmp cx,0
 je over_colloop6h
 jmp colloop6h
over_colloop6h:

 inc iColumnCount12h
 add si,iColumnCount12h
 pop cx
 dec cx
 cmp cx,0
 je over_bitplane8h
 jmp bitplane8h
over_bitplane8h:
 call _ResVGARegister
 jmp endshowc
endshowc:
 pop di
 pop si
 pop es
 pop dx
 pop cx
 pop bx
 pop ax
 ret
_ShowCursor endp

_RestoreCursor proc near
 cmp iCursorFlag,PD_ZERO
 je @F
 ret
@@:
 cmp iOSKUICab,PD_ON
 jge restoskui
 cmp iWindows,PD_ZERO
 je @F
 ret
@@:
restoskui
 c.. iVideoMode,0012h
 j.. restorecurnot12h
 call _restore_12h_cursor
 ret

restorecurnot12h:
 push ax
 push bx
 push cx
 push dx
 push es
 push si

 cmp iVideoMode,3
 jg resgcur
 mov ax,PD_B800H
 mov es,ax
 mov bx,iCurResOffset
 mov ax,iCursorCover
 mov es:[bx],ax
 jmp endrcur
resgcur:
 mov ax,PD_A000H
 mov es,ax

 call _SaveVGARegister

 cmp iVideoMode,000Dh
 jl rgcnetdto12h

 mov ax,0ff08h
 mov dx,PD_GRAPH_addR_REG
 out dx,ax

 mov cx,4
 xor bx,bx

 c.. iVideoMode,0012h
 je greslres

 cmp iVideoMode,0011h
 jne @F
 mov cx,1
 jmp greslres
@@:
 mov ax,iSavePageOff
 cmp iVideoMode,000Fh
 jne greslres
 mov cx,3
greslres:

bitpicurloop:
 push cx

 dec cx
 mov ax,0100h
 shl ax,cl
 mov al,2
 mov dx,PD_SEQUE_addR_REG
 out dx,ax

 mov si,iCurResOffset
 push si

 mov cx,iCursorBytes
colresloop:
 push cx

 mov cx,iRealCurHeight
byteresloop:

 mov al,bCurSave12h[bx]
 inc bx
 mov es:[si],al

 add si,iGraiseX

 loop byteresloop

 pop cx
 pop si
 inc si
 push si
 loop colresloop
 pop si

 pop cx
 cmp iVideoMode,000Fh
 jne @F
 dec cx
@@:
 loop bitpicurloop
 call _ResVGARegister
 jmp endrcur

rgcnetdto12h:

 mov ax,PD_B800H
 mov es,ax

 mov ax,0ff08h
 mov dx,PD_GRAPH_addR_REG
 out dx,ax

 xor ax,ax
 mov al,bCurSave12h
 mov iEvenOddRow,ax
 mov al,bCurSave12h+1
 mov iColNum,ax
 mov bx,2
 mov cx,iCursorBytes
 mov iColumnCount12h,0
bitresto6h:
 push cx
 mov cx,iColNum
 cmp iVideoMode,0006h
 jne @F
 mov cx,PD_ZERO
@@:

 mov ax,0100h
 shl ax,cl
 mov al,2
 mov dx,PD_SEQUE_addR_REG
 out dx,ax

 cmp iColNum,PD_ONE
 je @F
 mov ax,iBit1Off458
 mov iColNum,PD_ONE
 jmp in6hresbitp
@@:
 mov ax,iBit1Off458
 mov iColNum,PD_ZERO
in6hresbitp:
 add ax,iColumnCount12h
 mov si,ax

 mov cx,iRealCurHeight
 mov iRowCount12h,0
collpre6h:
 push cx

 push si
 cmp iEvenOddRow,PD_ONE
 je @F
 add si,iEvenOff458
 mov iEvenOddRow,PD_ONE
 jmp in6hregeres
@@:
 add si,iOddOff458
 mov iEvenOddRow,PD_ZERO
in6hregeres:
 mov al,bCurSave12h[bx]
 inc bx
 mov es:[si],al

 inc iRowCount12h
 inc iRowCount12h

 pop si
 test iRowCount12h,0002h
 jnz @F
 add si,PD_80
@@:
 pop cx
 dec cx
 cmp cx,0
 jne collpre6h

 inc iColumnCount12h
 add si,iColumnCount12h

 pop cx
 dec cx
 cmp cx,0
 je over_bitresto6h
 jmp bitresto6h
over_bitresto6h:
 call _ResVGARegister
 jmp endrcur

endrcur:
 pop si
 pop es
 pop dx
 pop cx
 pop bx
 pop ax
 ret
_RestoreCursor endp

_SaveVGARegister PROC NEAR
 mov dx,PD_GRAPH_addR_REG
 mov al,5
 out dx,al
 inc dx
 in al,dx
 mov bSaveVGAMR,al
 and al,11110100b
 out dx,al

 mov dx,PD_GRAPH_addR_REG
 mov al,3
 out dx,al
 inc dx
 in al,dx
 mov bSaveVGADRR,al
 xor al,al
 out dx,al

 mov al,4
 mov dx,PD_GRAPH_addR_REG
 out dx,al
 inc dx
 in al,dx
 mov bSaveVGARMSR,al

 mov al,2
 mov dx,PD_SEQUE_addR_REG
 out dx,al
 inc dx
 in al,dx
 mov bSaveVGAMMR,al

 mov al,8
 mov dx,PD_GRAPH_addR_REG
 out dx,al
 inc dx
 in al,dx
 mov bSaveVGABMR,al

 ret
_SaveVGARegister endp

_ResVGARegister PROC NEAR
 mov dx,PD_GRAPH_addR_REG
 mov al,5
 mov ah,bSaveVGAMR
 out dx,ax

 mov dx,PD_GRAPH_addR_REG
 mov al,3
 mov ah,bSaveVGADRR
 out dx,ax

 mov al,4
 mov dx,PD_GRAPH_addR_REG
 mov ah,bSaveVGARMSR
 out dx,ax

 mov al,2
 mov dx,PD_SEQUE_addR_REG
 mov ah,bSaveVGAMMR
 out dx,ax

 mov al,8
 mov dx,PD_GRAPH_addR_REG
 mov ah,bSaveVGABMR
 out dx,ax
```

```
ret
_ResVGARegister endp

_show_12h_cursor proc near
 SaveEntryRegisters
 push bp
 push es
 push ds
 mov bx, offset bEGARegBuff
 SaveEGARegister

 mov ah, 1
 SetEGAWriteReadMode
 SetEGAColorMask

 mov di, PD_CUR_IMAGE_SAVE_BUFF
 mov bx, PD_CUR_IMAGE_PROC_BUFF
 mov si, [iCurOffset12h]
 mov dx, [iLineSkip12hCur]

 mov ax, PD_A000H
 mov es, ax
 mov ah, byte ptr [iCurHeight12h]
 mov cx, [iCurWidth12h]
 push es
 pop ds

 mov bp, cx
backup_image_12h:
 mov cx, bp
backup_image_12h_line:
 movsb
 mov [bx], al
 inc bx
 loop backup_image_12h_line
 add si, dx
 dec ah
 jnz backup_image_12h

 pop ds
 mov ah, 0
 SetEGAWriteReadMode
 mov si, [iOffsetintoANDMask]
 mov bx, [iOffsetintoXORMask]
 mov di, PD_CUR_IMAGE_PROC_BUFF
 mov bp, [iCurHeight12h]

Cursor12hLines:
 push cx
 pop ds
 mov cx, [iCurWidth12h]
Cursor12hOneLine:
 mov ah, byte ptr es:[di]
 lodsb
 mov ah, al
 not ah
 SetEGABitMask
 mov byte ptr es:[di], 0
 SetEGAColorMask
 mov al, byte ptr cs:[bx]
 inc bx
 stosb
 SetEGAColorMask
 loop Cursor12hOneLine

 add si, [iCurMaskSkip12h]
 add bx, [iCurMaskSkip12h]
 dec bp
 jnz Cursor12hLines

 push es
 mov ah, 1
 SetEGAWriteReadMode
 mov ah, 0ffh
 SetEGABitMask
 mov si, PD_CUR_IMAGE_PROC_BUFF
 mov di, [iCurOffset12h]
 mov dx, [iCurHeight12h]
 mov bx, [iLineSkip12hCur]
 mov ax, [iCurWidth12h]
 mov ax, es
 mov ds, ax
 mov ax, cx
Cursor12hWrite:
 mov cx, ax
 rep movsb
 add di, bx
 dec dx
 jnz Cursor12hWrite

 pop ds
 pop es

 mov bx, offset bEGARegBuff
 RestoreEGARegister
 pop bp
 RestoreEntryRegisters
 ret
_show_12h_cursor endp

_restore_12h_cursor proc near
 SaveEntryRegisters
 mov bx, offset bEGARegBuff
 SaveEGARegister
 mov ah, 1
 SetEGAWriteReadMode
 SetEGAColorMask
 mov si, PD_CUR_IMAGE_SAVE_BUFF
 mov di, [iCurOffset12h]
 mov dx, [iCurHeight12h]
 mov bx, [iLineSkip12hCur]
 mov cx, [iCurWidth12h]

 push ds
 push es
 mov ax, PD_A000H
 mov ds, ax
 mov es, ax
 mov ax, cx

restore_12h_loop1:
 mov cx, ax
 rep movsb
 add di, bx
 dec dx
 jnz restore_12h_loop1

 pop es
 pop ds
 mov bx, offset bEGARegBuff
 RestoreEGARegister
 RestoreEntryRegisters
 ret
_restore_12h_cursor endp

_PositionCursor proc near
 push bp
 mov bp, sp
 SaveEntryRegisters

 mov ax, iXpos
 sub ax, iHotspotX
 mov bx, ax
 mov dx, ax
 and dx, 7
 pu11 dx

 sar ax, 1
 sar ax, 1
 sar ax, 1

 mov cx, ax
 dec cx
 add cx, PD_CURSOR_TOTAL_LEN

 cmp ax, [iMinXByte12h]
 jl clipxleft12h

 cmp cx, [iMaxXByte12h]
 jg clipxright12h

 push ax
 mov [iCurWidth12h], PD_CURSOR_TOTAL_LEN
 xor ax, ax
 push ax
 jmp clipx12hover

clipxleft12h:
 push [iMinXByte12h]
 mov dx, [iMinXByte12h]
 sub dx, ax
 mov cx, PD_CURSOR_TOTAL_LEN
 sub cx, dx
 mov [iCurWidth12h], cx
 push dx
 jmp clipx12hover

clipxright12h:
 sub cx, [iMaxXByte12h]
 push ax
 mov dx, PD_CURSOR_TOTAL_LEN
 sub dx, cx
 mov [iCurWidth12h], dx
 xor ax, ax
 push ax
clipx12hover:

 mov ax, iYpos
 sub ax, iHotspotY

 mov bx, ax
 add bx, PD_CURSOR_TOTAL_HGT
 dec bx

 cmp ax, [iVertMin]
 jl clipytop12h

 mov cx, [iVertMax]
 cmp bx, cx
 jg clipybottom12h

 push ax
 mov [iCurHeight12h], PD_CURSOR_TOTAL_HGT
 xor ax, ax
 push ax
 jmp clipy12hover

clipytop12h:
 push [iVertMin]
 mov dx, [iVertMin]
 sub dx, ax
 mov cx, PD_CURSOR_TOTAL_HGT
 sub cx, dx
 mov [iCurHeight12h], cx
 push dx
 jmp clipy12hover

clipybottom12h:
 push ax
 sub bx, cx
 mov dx, PD_CURSOR_TOTAL_HGT
 sub dx, bx
 mov [iCurHeight12h], dx
 xor ax, ax
 push ax
clipy12hover:

 mov bp, sp
 mov ax, [bp+2]
 mov cx, PD_80
 mul cx
 add ax, [bp+6]
 mov [iCurOffset12h], ax

 mov ax, PD_80
 sub ax, [iCurWidth12h]
 mov [iLineSkip12hCur], ax

 mov ax, PD_CURSOR_TOTAL_LEN
 sub ax, [iCurWidth12h]
 mov [iCurMaskSkip12h], ax

 lea bx, bCurImageBuffer
 mov cx, PD_CURSOR_TOTAL_LEN *
PD_CURSOR_TOTAL_HGT * 2
 mov ax, [bp+8]
 mul cx
 add bx, ax
 add bx, [bp+4]

 mov ax, [bp+0]
 mov cx, PD_CURSOR_TOTAL_LEN
 mul cx
 add bx, ax
 mov [iOffsetintoANDMask], bx

 add bx, PD_CURSOR_TOTAL_LEN *
PD_CURSOR_TOTAL_HGT
 mov [iOffsetintoXORMask], bx

 add sp, 10
 RestoreEntryRegisters
 pop bp
 ret
_PositionCursor endp

_SetModeData proc near
 mov iHorMin,0
 mov iVertMin,0
 mov iXpos,PD_HalF640
 mov iLastX,PD_HalF640
 mov iHorMax,PD_639

 mov iMinXByte12h, 0
 mov iMaxXByte12h, 79

 cmp iVideoMode,14
 jg v14_or_higher
 cmp iVideoMode, 3
 jg not_tv_0123
 mov ax, iVertSerPixels
 dec ax
 mov iVertMax, ax
 mov iMulY, ax
 shr ax, 1
 mov iYpos, ax
 mov iLastY, ax
 jmp m_v_mode

not_tv_0123:
 mov iVertMax,PD_199
 mov iMulY,PD_199
 mov iYpos,PD_HalF200
 mov iLastY,PD_HalF200
 jmp m_v_mode

v14_or_higher:
 cmp iVideoMode,16
 jg @F
 mov iVertMax,PD_349
 mov iMulY,PD_349
 mov iYpos,PD_HalF350
 mov iLastY,PD_HalF350
 jmp m_v_mode
@@:
 mov iVertMax,PD_479
 mov iMulY,PD_479
 mov iYpos,PD_HalF480
 mov iLastY,PD_HalF480
m_v_mode:
 push ax
 push bx
 push dx
 mov ax,PD_10000
 mul iMulY
 mov bx,iMaxY
 sub bx,iMinY
 cmp bx, PD_ZERO
 je setmodedata0
 div bx
 mov iMulY,ax

 mov ax,PD_10000
 mov bx,PD_639
 mul bx
 mov bx,iMaxX
 sub bx,iMinX
 cmp bx, PD_ZERO
 je setmodedata0
 div bx
 mov iMulX,ax
 clc
 jmp setmodedataok
setmodedata0:
 stc
setmodedataok:
 pop dx
 pop bx
 pop ax
 ret
_SetModeData endp

_build_cursor_image proc far
 push bp
 mov bp, sp
 SaveEntryRegisters
 push ds
 push es

 push ds
 pop es
 lea dx, imScr12Mask

 mov cx, 16
 les di, bCurImageBuffer
 mov si, dx
 mov bl, 0ffh
build_cur_swap_scr:
 lodsw
 xchg al, ah
 stosw
 mov al, bl
 stosb
 loop build_cur_swap_scr
 mov cx, 16
build_cur_swap_mask:
 lodsw
 xchg al, ah
 stosw
 mov al, 0
 stosb
 loop build_cur_swap_mask

 mov ax, es
 mov ds, ax
 lea si, bCurImageBuffer
 mov cx, 16*2*7
build_cur_image:
 mov dx, 3
 mov bx, di
 clc
build_cur_image_x:
 lodsb
 rcr al, 1
 stosb
 dec dx
 jnz build_cur_image_x
 jnc build_cur_image_xend
 or byte ptr es:[bx], 10000000b
build_cur_image_xend:
 loop build_cur_image

 pop es
 pop ds
 RestoreEntryRegisters
 pop bp
 ret
```

```
_build_cursor_image endp

installTSR SEGMENT public 'CODE'
    assume cs:installTSR, ds:@code

public MainInstall
MainInstall proc far
  mov ax,@code
  mov ds,ax
  mov wTSRongPsp,es

  cld
  call checkCommandLine
  jc ins_remove
  call Existcheck
  jc ins_error

  call InterfacesM
  jc sm_not
  call InstallISR

  mov al,PD_LOAD_OK
  call PrintInstallMsg

  call _build_cursor_image

  call _SetPenspkFreq

  mov dx installTSR
  sub dx wTSRongPsp
  add dx 2
  mov ax 3100h
  int 21h
ins_remove:
  or al,al
  jge pm_err
  call RemoveDriver
  jmp pm_err
sm_not:
  mov al,PD_SM_not
  jmp pm_err
ins_error:
  mov al,PD_alREADY_IN
pm_err:
  call PrintInstallMsg
  inc al
  mov ah,4ch
  int 21h
MainInstall endp

checkCommandLine proc near
    push ds
    push es
    push es
    pop ds
    mov ax @data
    mov es,ax

    mov si,0080h
    lodsb
    cbw
    xchg cx,ax
    jcxz clnopara
clsearch:
    lodsb
    cmp al,' '
    jb clnopara
    je clsearch
    cmp al,'-'
    jne notvalbcl

    lodsb
    or al,' '
    cmp al,'u'
    je deinstall
notvalbcl:
    mov al,PD_CMD_LINE_ERR
    jmp clerror
deinstall:
    mov al,-1
clerror:
    stc
    jmp clreturn
clnopara:
    clc
clreturn:
    pop es
    pop ds
    ret
checkCommandLine endp

Existcheck proc near
  push bx
  push cx
  push dx
  push di
  push si
  push ds
  push es
  mov ax,@code
  mov ds,ax
  mov dx,0080h
  mov bx,ds
ai_0:
  mov si,offset bspensignature
  inc byte ptr [si]
  mov ax,[si]
ai_1:
  mov es,dx
  cmp ax,es:[si]
  je ai_3
ai_2:
  inc dx
  cmp dx,bx
  jb ai_1
  c'.
  jn;> ai_ret

ai_3
  mov cx,PD_SIG_LEN
  mov di,si
  push si
  repe cmpsb
  pop si
  je ai_4
  jcxz ai_4
  jmp ai_2
ai_4:
  mov ax,es
  stc
ai_ret:
  pop es
  pop ds
  pop si
  pop di
  pop dx
  pop cx
  pop bx
  ret
Existcheck endp

InterfacesM proc near
  push bx
  push cx
  push dx
  push di
  push si
  push ds
  push es

  mov ax,356ah
  int 21h
  add bx,PD_SM_siG_OFF
  mov si,offset sSMsignature
  m ~ di,bx
  cl..
  mov cx,PD_SM_siG_LEN
  repe cmpsb
  jnz smsigret
  mov ax,PD_SM_INIT
  int 6ah
  mov es,dx
  mov ax,word ptr es:[si]
  mov iMinX,ax
  mov ax,word ptr es:[si+2]
  mov iMinY,ax
  mov ax,word ptr es:[si+4[
  mov iMaxX,ax
  mov ax,word ptr es:[si+6]
  mov iMaxY,ax
  mov ax,word ptr es:[si+8]
  mov ax,word ptr es:[si+10]
  mov ax,word ptr es:[si+12]
  mov ax,word ptr es:[si+14]
  mov ax,word ptr es:[si+16]

      mov ax, iMaxY
      sub ax, iMinY
      mov dx, 0
      mov bx, PD_HOT_ICON_NUMBER
      div bx
      mov iHotIconWidth, ax

  mov ax,PD_10000
  mov bx,PD_839
  mul bx
  mov bx,iMaxX
  sub bx,iMinX
  cmp bx, PD_ZERO
  je smsigret
  div bx
  mov iMulX,ax

  m-v· ax,PD_10000
  m-v bx,PD_199
  mul bx
  mov bx,iMaxY
  sub bx,iMinY
  cmp bx, PD_ZERO
  je smsigret
  div bx
  mov iMulY,ax
  clc
  jmp smifaceret
smsigret:
  stc
smifaceret:
  pop es
  pop ds
  pop si
  pop di
  pop dx
  pop cx
  pop bx
  ret
InterfacesM endp

public InstallISR
InstallISR proc near
  push es
  mov si,offset wTSRreplaceVectorTable
  mov cx,PD_TSR_repLACE_NUM
initsetvec:
  mov al,[si].iIntNum
  mov ah,35h
  int 21h
  mov [si].xOldISRoffset,bx
  mov [si].xOldISRseg,es

  mov dx,[si].iNewISRoffset
  mov ah,25h
  int 21h

  add si,size smIVectorreplace
  loop initsetvec
  pop es

  mov dx,0021h
  jmp short $+2
  jmp short $+2
  jmp short $+2
  in al,dx
  and al,0DFh
  mov dx,0021h
  jmp short $+2
  jmp short $+2
  jmp short $+2
  out dx,al

  ret
InstallISR endp

RemoveDriver proc near
  call Existcheck
  jnc notinsrem

  mov es,ax

  mov ax,PD_SM_notIFY
  int 6ah

  call DeinstallISR

  push es
  mov es,es:wTSRongPsp
  mov es,ax
  mov es,es:[2ch]
  mov ah,49h
  int 21h
  pop es

  mov ax,es:wTSRorigPsp
  push es
  mov es,ax
  mov ah,49h
  int 21h
  pop es
  je removebad
  mov al,PD_REmovE_MesSAGE
  jmp removeret

removebad:
  mov al,PD_REmovE_ERRor
  jmp removeret

notinsrem:
  mov al,PD_not_IN_MEM
removeret:
  ret
RemoveDriver endp

public _SetPenspkFreq
_SetPenspkFreq proc near
  mov al, PD_TIMER2_16BIT_MODE
  cli
  out 43h, al
  jmp short $+2
  mov ax, PD_PSEO_FREQUENCY
  out 42h al
  jmp short $+2
  mov al, ah
  out 42h, al
  sti
  ret
_SetPenspkFreq endp

public DeinstallISR
DeinstallISR proc near
  push cx
  push dx
  push di
  push si
  push ds

  mov dx,0021h
  jmp short $+2
  jmp short $+2
  jmp short $+2
  in al,dx
  or al,20h
  mov dx,0021h
  out dx,al

  mov cx,PD_TSR_repLACE_NUM
  mov si,offset wTSRreplaceVectorTable
deinsloop:
  mov al,es:[si].iIntNum
  lds dx,dword ptr es:[si].xOldISRoffset
  mov ah,25h
  int 21h
  add si,size smIVectorreplace
  loop deinsloop

  pop ds
  pop si
  pop di
  pop dx
  pop cx
  ret
DeinstallISR endp

PrintInstallMsg proc near
  push ax
  push ds

  push cs
  pop ds

  push ax

  mov cx,cs:install_msg_title[2]
  mov dx,cs:install_msg_title[0]
  sub cx,dx
  mov bx,1
  mov ah,40h
  int 21h

  pop ax
  xor bx,bx
  mov bl,al
  shl bx,1
  mov cx,cs:install_msg_index[bx+2]
  mov dx,cs:install_msg_index[bx]
  sub cx,dx
  mov bx,1
  mov ah,40h
  int 21h
  pop ds
  pop ax
  ret
PrintInstallMsg endp

install_msg_title label word
dw msgtitle
dw msgtitleend

msgtitle  db 0Dh,0ah,'Saratoga Pen Driver Version '
     db PD_VERsiON
     db 0Dh,0ah
     db 'Copyright (C) 1995 Zenith Data Systems
Corp. All rights
reserved.',0Dh,0ah
     db 0Dh,0ah
msgtitleend label byte


install_msg_index label word
dw msg0, msg1, msg2, msg3
dw msg4, msg5, msg6
dw msgend

msg0  db 'Saratoga Pen Driver was already
loaded.',0Dh,0ah
msg1  db 'Saratoga Pen Driver was removed from
memory.',0Dh,0ah
```

```
msg2  db 'Saratoga Pen Driver is not in memory
now.',0Dh,0ah
msg3  db 'Error for attempting remove.',0Dh,0ah
msg4  db 'Unknown command line option.',0Dh,0ah

msg5  db 'Saratoga Pen Driver was successfully
loaded.',0Dh,0ah
msg6  db 'Saratoga Pen Driver was not loaded.
Saratoga Manager
was not detected.',0Dh,0ah
msgend label byte

InstallTSR ends
    end MainInstall
```

```
Copr 1995 Zenith Data Systems Corp

#include "pcx.h"
#include <stdio.h>
#include <stdlib.h>
#include <conio.h>
#include <io.h>
#include <string.h>
#include <dos.h>
#include <malloc.h>
#include <time.h>

#if defined( _MSC_VER )
#pragma warning( disable : 4704 )
#endif

void sleep( clock_t wait );
void stretch_text( char fEnable );

#define VIDEO 0x10
#ifdef __cplusplus
  extern "C" {
#endif
void Decode16(void);
void Decode256(void);
void DecodeSVGA256(void);
#ifdef __cplusplus_
}
#endif


#ifdef __cplusplus
  extern "C" {
#endif
int Margin,
int far *Scratch,
unsigned int BytesPerLine
unsigned int VideoSeg, VideoOffs,
unsigned int DataLength;
unsigned int ColumnCount.
unsigned int Plane,
unsigned char RepeatCount;
int ScreenWidth;
int LineEnd,
#ifdef __cplusplus
}
#endif

int file_error,
unsigned int WindowEnd, WindowStep, WindowPos,
int BytesPerScanLine,
int StartCol, XMax:
int far *LineBuf,
unsigned int LineBufSeg, LineBufOffs, LineBufIndex,
char WriteWindow,
unsigned int buffer_size;
const num_modes = 11;
union REGS inregs, outregs;
struct SREGS segregs;
FILE *pcx_file;
pathstr pcx_filename,
char *error_str;
int pic_width;
int our_modes[num_modes] = {0x0D, 0x0E, 0x10,
0x12, 0x13, 0x100,
0x101,
                0x102, 0x103, 0x105, 0x107};



rgb_struct rgb_pal[15];
pcx_header_struct pcx_header,
VESA_info_struct VESA_info;
mode_info_struct mode_info;

typedef rgb_struct cregisters[256];
cregisters rgb256;


void video_off(int vid_status)
{
inregs.h.ah = 0x12;
inregs.h.bl = 0x36;
inregs.h.al = vid_status,
int86(VIDEO, &inregs, &outregs);
}

int detect_VESA(VESA_info_struct *VESA_rec)
{
  inregs.x.ax = 0x4F00;
  segregs.es = FP_SEG(VESA_rec);
  inregs.x.di = FP_OFF(VESA_rec);
  int86x(VIDEO, &inregs, &outregs, &segregs);
  if (outregs.h.ah) return 0;
  return(!strncmp( ( const char far *
)VESA_rec->signature,
"VESA", 4));
}


int detect_VGA(void)
{
inregs.h.ah = 0x1A,
inregs.h.al = 0;
int86(VIDEO, &inregs, &outregs);
return(outregs.h.al != 0x1A);
}


int hardware_supports(unsigned int mode)
{
  unsigned int far *modeptr;

  if (mode >= 0x100) {
    if (detect_VESA(&VESA_info)) {
      modeptr = VESA_info.mode_list_ptr;
      do {
    if (*modeptr++ == mode) return 1;
      } while (*modeptr != 0xFFFF);
    }
    return 0;
  }
  return 1;
}

int we_support(unsigned int mode)
{
  int x;
  int in_there = 0;

  for (x = 0; x < num_modes; x++) {
    if (mode == ( unsigned int )our_modes[x])
in_there = 1; }
  return in_there;
}

int fits(pcx_header_struct header)
{
  return((header.xmax < header.hres) &&
(header.ymax <
header.vres)),
}

void try_it(unsigned int mode, unsigned int *m)
{
  if ((hardware_supports(mode)) &&
(we_support(mode)))
    *m = mode,
  return;
}

unsigned int best_mode(pcx_header_struct header)

{
  unsigned int m;

   if (header.num_planes == 1) {
     m = 0x13;
     if ((header.hres > 320) || (!fits(header)))
try_it(0x101,
&m);
     if ((header.hres > 640) || (!fits(header)))
try_it(0x103,
&m];
     if ((header.hres > 800) || (!fits(header)))
try_it(0x105,
&m);
     if ((header.hres > 1024) || (!fits(header)))
try_it(0x107,
&m);
    } else if (header.num_planes == 4) {
     m = (header.hres <= 320) ? 0x0D : 0x0E;
     if ((header.vres > 200) || (!fits(header)))
 try_ i 0x10, &m);
     if ((header.vres > 350) || (!fits(header)))
try_it(0x12, &m);
     if ((header.vres > 480) || (!fits(header)))
try_it(0x102,
&m],
    } else {
     file_error = 5;
     m = 0xFFFF;
    }
    return m;
   }

void get_mode_info(unsigned int mode,
mode_info_struct *m)
{
  inregs.x.ax = 0x4F01;
  inregs.x.cx = mode;
  segregs.es = FP_SEG(m);
  inregs.x.di = FP_OFF(m),
  int86x(VIDEO, &inregs, &outregs, &segregs);
switch(mode) {
  case 0x100: m->yres = 400; break;
  case 0x101: m->yres = 480; break;
  case 0x102: m->yres = 600; break;
  case 0x103: m->yres = 600; break;
  case 0x105: m->yres = 768; break;
  case 0x107: m->yres = 1024;
  }
 return;
}

int get_mode(void)
{
 int curr_mode;

 if (detect_VESA(&VESA_info)) {
  inregs.x.ax = 0x4F03;
  int86(VIDEO, &inregs, &outregs);
  curr_mode = outregs.x.bx;
  curr_mode &= 0x3FFF;
  if (hardware_supports(curr_mode) && (curr_mode
>= 0x100))
   return curr_mode;
 }
 inregs.h.ah = 0x0F;
 int86(VIDEO, &inregs, &outregs);
 return outregs.h.al;
}

void set_mode(int mode, int options)
{
 if (mode >= 0x100) {
  if (options & save_mem) mode |= 0x8000;
  inregs.x.ax = 0x4F02;
  inregs.x.bx = mode;
 } else {
  if (options & save_mem) mode |= 0x80;
  inregs.x.ax = mode;
  inregs.h.ah = 0;
 }
 int86(VIDEO, &inregs, &outregs);
 return;
}

void put_window(int step, char window)
{
 inregs.x.ax = 0x4f05;
 inregs.h.bh = 0;
 inregs.h.bl = window;
 inregs.x.dx = step;
 int86(VIDEO, &inregs, &outregs);
}


void set_color_registers(cregisters rgb)
{

 inregs.h.ah = 0x10;
 inregs.h.al = 0x12;
 segregs.es = FP_SEG(rgb);
 inregs.x.dx = FP_OFF(rgb);
 inregs.x.bx = 0;

 inregs.x.ax = 0x40;

 int86x(VIDEO, &inregs, &outregs, &segregs);
 return;
}

void set_palette(unsigned char *palette)
{

 inregs.h.ah = 0x10;
 inregs.h.al = 0x02;


 segregs.es = FP_SEG(palette);
 inregs.x.dx = FP_OFF(palette);
 int86x(VIDEO, &inregs, &outregs, &segregs);
 return;
}

long get_256_palette(FILE *the_file, cregisters
rgb256)


{
 unsigned char palette_flag;
 long palette_start;
 int x;

 palette_start = filelength(fileno(the_file)) - 769;
 fseek(the_file, palette_start, SEEK_SET);
 palette_flag = getc(the_file);
 if ((palette_flag != 12) || (pcx_header.version < 5)
   || (fread(rgb256, 3, 256, the_file) < 256)) {
   file_error = 2;
   return 0;
 }
 for (x = 0; x < 256, x++) {
   rgb256[x].r >>= 2,
   rgb256[x].g >>= 2;
   rgb256[x].b >>= 2,
 }
 return palette_start;
}


FILE *open_file(pathstr pic_file_name, char
*file_mode,
      pcx_header_struct *header)
{
 FILE *f;

 f = fopen(pic_file_name, file_mode),
 if (f != NULL) fread(header, 1, 128, f);
 return f,
}

char *report_error(int error)
{
  switch(error) {
   case 1: return "Could not open file.\n";
   case 2: return "No palette information in file.\n";
   case 3: return "Picture is too wide for requested
video
mode.\n";
   case 4: return "Number of colors in file does not
match
selected mode.\n";
   case 5. return "Unsupported picture format.\n";
   default: return "Undefined error.\n";
   }
}

void get_margin(int screenwd, int *margin, int
*line_end,
            pcx_header_struct header)
{

  *line_end = header.bytes_per_line,
  *margin = screenwd - *line_end,
  if (*margin < 0) file_error = 3;
  return,
}

unsigned int set_buffer_size(void)
{
  unsigned int buf;
  void far *bufptr;

  buf = 64512;
  if ((bufptr = malloc(buf)) == NULL)
  {
    cmd_error( "\nERROR: Insufficient memory to
display the
requested image.\n" );
    exit(1);
  }
  else
    free(bufptr);

  return buf;
}

long get_first_pix(pcx_header_struct header, int
optns,
            int screenwid, int screenht)


{

  long first_pix = 0;
  int picwid, picht;

  picwid = header.xmax - header.xmin + 1;
  if (header.bits_per_plane == 1) picwid /= 8;
  picht = header.ymax - header.ymin;
  if (picht < screenht) {
    if (!(optns & vcenter))
      first_pix += (long)header.ymin * screenwid;
    else first_pix += (long)(screenht-1-picht) / 2 *
 screenwid;
   };
   if (picwid < screenwid) {
    if (!(optns & hcenter)) first_pix += header.xmin;
    else first_pix += (screenwid - picwid) / 2;
   };
 return first_pix;
 }
```

```
int read_16(FILE *pic_file, unsigned int mode,
unsigned int
options)
{
  TRACE( "NOTICE: Entered read_16\n" );

  typedef unsigned char palette_bytes[3];

  char nOldSequencer;
  unsigned char entry, gun, pcx_code;
  unsigned char pal_regs[17];
  unsigned int screen_height;

  if (pcx_header.num_planes != 4) return 4;
  if (mode == 0x100) {
    get_mode_info(mode, &mode_info);
    ScreenWidth = mode_info.bytes_per_line;
    screen_height = mode_info.yres;
  } else
  switch(mode) {
    case 0x00: ScreenWidth = 40; screen_height =
200; break;
    case 0x0E: ScreenWidth = 80; screen_height =
200; break;
    case 0x10: ScreenWidth = 80; screen_height =
350; break;
    case 0x12: ScreenWidth = 80; screen_height =
480; break;
  }
  get_margin(ScreenWidth, &Margin, &LineEnd,
pcx_header);
  if (file_error) return file_error;
  VideoOffs = (unsigned int)
get_first_pix(pcx_header, options,
ScreenWidth, screen_height);
  VideoSeg = 0xA000;

  stretch_text( 0 );

  outp(0x3C4, 2);
  Plane = 1;
  outp(0x3C5, Plane);



  for (entry = 0; entry < 16; entry++) {
    for (gun = 0; gun < 3; gun++) {
      pcx_code = ((unsigned char
*)(&pcx_header.palette[entry]))[gun];
      switch (gun) {
    case 0: rgb_pal[entry].r = pcx_code >> 2; break;
    case 1: rgb_pal[entry].g = pcx_code >> 2; break;
    case 2: rgb_pal[entry].b = pcx_code >> 2;
      }
    }
    pal_regs[entry] = entry;
  }
  pal_regs[16] = 0;

  TRACE( "NOTICE: Changing RGB values in color
registers \n" );

  nOldSequencer = inp(0x3C4);
  set_color_registers((rgb_struct *)rgb_pal);
  outp(0x3C4, nOldSequencer);

  nOldSequencer = inp(0x3C4);
  set_palette(pal_regs);
  outp(0x3C4, nOldSequencer);



  BytesPerLine = pcx_header.bytes_per_line;
  RepeatCount = 0;
  ColumnCount = 0;
  buffer_size = set_buffer_size();
  Scratch = (int far*)malloc(buffer_size);
  fseek(pic_file, 128, SEEK_SET);

  do {
    DataLength = fread(Scratch, 1, buffer_size,
pic_file);
    Decode16();
  } while (!feof(pic_file));
  free(Scratch);

  outp(0x3C5, 0xF);

  stretch_text( 1 );

  return 0;
}


int read_256(FILE *pic_file, unsigned int mode,
unsigned int
options)
{
  long palette_start, total_read;

  if (pcx_header.num_planes != 1) return 4;
  palette_start = get_256_palette(pic_file, rgb256);
  if (!palette_start) return 2;
  ScreenWidth = 320;
  get_margin(ScreenWidth, &Margin, &LineEnd,
pcx_header);
  if (file_error) return file_error;
  fseek(pic_file, 128, SEEK_SET);
  total_read = 128;
  RepeatCount = 0;
  set_color_registers(rgb256);
  VideoOffs = (unsigned int
)get_first_pix(pcx_header, options,
ScreenWidth, 200);
  VideoSeg = 0xA000;
  buffer_size = set_buffer_size();
  Scratch = (int far*)malloc(buffer_size);
  do {
    DataLength = fread(Scratch, 1, buffer_size,
pic_file);
    total_read += DataLength;
    if (total_read > palette_start)
      DataLength -= (unsigned int)(total_read -
palette_start);
    Decode256();
  } while ((!feof(pic_file)) && (total_read <
palette_start));
  free(Scratch);
  if (mode);
  return 0;
}


#ifdef registered_version
  #include "svga256.h"
#else

int read_SVGA256(FILE *pic_file, unsigned int
mode, unsigned int
options)
{
  set_mode(3, no_options);
  printf("Support for this video mode is not
available.\n" );
  return 0;
}
#endif


int read_it(pathstr pic_file_name, int mode, int
options)
{
  FILE *pcx_file

  file_error = 0;
  pcx_file = open_file(pic_file_name, "rb",
&pcx_header);
  if (pcx_file == NULL) return 1;
  if ((pcx_header.bits_per_plane < 8) &&
(pcx_header.num_planes
== 1)) {
    fclose(pcx_file);
    return 5;
  }
  if (mode == auto_set) mode =
best_mode(pcx_header);
  set_mode(mode, options);
  switch(mode) {
    case 0x0D:
    case 0x0E:
    case 0x10:
    case 0x12:
    case 0x102: file_error = read_16(pcx_file, mode,
options);
      break;
    case 0x13: file_error = read_256(pcx_file, mode,
options);
      break;
    case 0x100:
    case 0x101:
    case 0x103:
    case 0x105:
    case 0x107: file_error = read_SVGA256(pcx_file,
mode,
options);
      break;
  }
  if (options & blackout) video_off(0);
  fclose(pcx_file);
  return file_error;
}


void sleep( clock_t wait )
{
  clock_t goal;
  goal = wait + clock();
  while( goal > clock() );
}

void stretch_text(char fEnable)
{
  inregs.x.ax = 0xa007;

  if ( fEnable )
    inregs.x.bx = 0x0100;
  else
    inregs.x.bx = 0x0000;

  int86(VIDEO, &inregs, &outregs);
}

#if defined( _DEBUG )
void Trace( char *szOutStr )
{
  inregs.x.ax = SID_FUNCNUM | SID_OUTSTRING;
  inregs.x.si = SID_SISIG;
  inregs.x.di = SID_DISIG;
  segregs.ds = SEG( szOutStr );
  inregs.x.dx = OFF( szOutStr );

  int86x( SID_INTNUM, &inregs, &outregs, &segregs
);
}
#endif

#if defined( _MSC_VER )
#pragma warning( default : 4704 )
#endif
Copr 1995 Zenith Data Systems Corp.


#include "pcx.h"
#include <dos.h>
#include <errno.h>
#include <conio.h>
#include <stdio.h>
#include <string.h>
#include <stdlib.h>

void cmd_error(char *msg) {
  puts(msg);
  exit(1);
}

void main(int argc, char *argv[])
{
  int pcx_mode = auto_set;
  int start_mode = get_mode();
  int err = 0;
  int n = 0;
  char file_name[80];
  char drive[_MAX_DRIVE];
  char dir[_MAX_DIR];
  char file[_MAX_FNAME];
  char ext[_MAX_EXT];
  VESA_info_struct VESA_inf;


  if (!detect_VGA) cmd_error("VGA card required.");

  if (argc > 1) {
    strcpy(file_name, argv[1]);
    _splitpath(file_name, drive, dir, file, ext);
    if (*ext == NULL) {
      strcpy(ext, ".PCX");
      _makepath(file_name, drive, dir, file, ext);
    }
    if (argc > 2) {
      sscanf(argv[2], "%i", &n) ;
      if (n) pcx_mode = n;
    }
    if ((!two_support(pcx_mode)) && (pcx_mode !=
auto_set))
      cmd_error("The requested video mode is not
supported by
this program.");
    if (pcx_mode >= 0x100) {
      if (!detect_VESA(&VESA_inf))
    cmd_error("VESA BIOS extensions not found.
Your video card
may require\n"
      "a program (typically called VESA.COM) to be
loaded so
that\n"
      "Super-VGA images can be displayed without a
special
driver.");
      if (!hardware_supports(pcx_mode))
    cmd_error("Your card or VESA BIOS does not
support the
requested"
              " video mode.");
    }
    err = read_it(file_name, pcx_mode, hcenter |
vcenter |
blackout);
    if(err) printf(report_error(err));
  }
  else
    cmd_error("Usage:\nsv filename[.pcx] [mode]");
  return;
}

Copr 1995 Zenith Data Systems Corp.



IFDEF PASCAL
.MODEL TPASCAL
ELSE
.MODEL LARGE, C
ENDIF

.DATA
        extrn DataLength: word
        extrn Scratch: dword
        extrn Plane: word
        extrn VideoOffs: word
        extrn VideoSeg: word
        extrn Margin: word
        extrn ScreenWidth: word
        extrn LineEnd: word
        extrn RepeatCount: byte
        extrn ColumnCount: word
      extrn BytesPerLine: word
.CODE
    PUBLIC  Decode16
    PUBLIC  Decode256
      LOCALS


Decode16 PROC



push    si
push    di
push    bp


@@startproc:
mov     bp, Plane
mov     di, VideoOffs
mov     ah, byte ptr BytesPerLine
mov     dx, ColumnCount
mov     bx, DataLength
xor     cx, cx
mov     cl, RepeatCount
les     si, Scratch
mov     es, VideoSeg
add     bx, si
cld
cmp     cl, 0
jne     @@multi_data
jmp short @@getbyte


@@writebyte
stosb
inc     dl
cmp     dl, ah
je      @@doneline
loop    @@writebyte
jmp short @@getbyte
@@doneline:
shl     bp, 1
cmp     bp, 8
jle     @@setindex
mov     bp, 1
add     di, Margin
mov     dx, ScreenWidth
add     LineEnd, dx
jmp short @@setplane
@@setindex:
sub     di, dx
@@setplane:
push    ax
cli
mov     ax, bp
mov     dx, 3C5h
out     dx, al
sti
pop     ax
xor     dx, dx
loop    @@writebyte


@@getbyte:
cmp     si, bx
je      @@exit
```

```
push    ds
push    si
lds     si, Scratch
pop     si
lodsb
pop     ds
cmp     al, 192
jb      @@one_data
xor     al, 192
mov     cl, al
cmp     si, bx
je      @@exit
@@multi_data
push    ds
push    si
lds     si, Scratch
pop     si
lodsb
pop     ds
jmp     @@writebyte
@@one_data:
mov     cl, 1
jmp     @@writebyte

@@exit:
mov     Plane, bp
mov     RepeatCount, cl
mov     ColumnCount, dx
mov     VideoOffs, di
pop     bp
pop     di
pop     si
ret

Decode16 ENDP

Decode256 PROC

push    si
push    di
push    bp

lds     si, Scratch
mov     bx, DataLength
add     bx, si
mov     es, VideoSeg
mov     di, VideoOffs
xor     cx, cx
mov     cl, RepeatCount
cld
cmp     cl, 0
jne     @@multi_data

@@getbyte
cmp     di, LineEnd
jb      @@NotLineEnd
add     di, Margin
mov     dx, ScreenWidth
add     LineEnd, dx
@@NotLineEnd:
cmp     si, bx
je      @@exit
push    ds
push    si
lds     si, Scratch
pop     si
lodsb
pop     ds
cmp     al, 192
jb      @@one_data
xor     al, 192
mov     cl, al
cmp     si, bx
je      @@exit
@@multi_data:
push    ds
push    si
lds     si, Scratch
pop     si
lodsb
pop     ds
rep     stosb
jmp     @@getbyte
@@one_data:
stosb
jmp     @@getbyte

@@exit:
mov     VideoOffs, di
mov     RepeatCount, cl
pop     bp
pop     di
pop     si
ret

Decode256 ENDP

END

Copr. 1995 Zenith Data Systems Corp.
#include <stdio.h>


typedef int        BOOL;

#if defined( TRUE )
 #undef TRUE
#endif

#if defined( FALSE )
 #undef FALSE
#endif

#if defined( FON )
 #undef ON
#endif

#if defined( FOFF )
 #undef OFF
#endif

#if defined( FAR )
 #undef FAR
#endif

#define TRUE     1
#define FALSE    0
#define FON      1
#define FOFF     0

typedef unsigned char      BYTE;

#define FAR        far

#if defined( WORD )
 #undef WORD
#endif

#if defined( DWORD )
 #undef DWORD
#endif
typedef unsigned long      DWORD;

typedef unsigned short     WORD;
typedef unsigned int       UINT;
typedef signed long        LONG;
typedef void *             PVOID;
typedef void FAR *         LPVOID;

#define LOBYTE(w)          ((BYTE)(w))
#define HIBYTE(w)          ((BYTE)(((UINT)(w) >> 8)
& 0xFF))

#if defined( LOWORD )
 #undef LOWORD
#endif
#define LOWORD(l)
((WORD)(DWORD)(LPVOID)(l))

#if defined( HIWORD )
 #undef HIWORD
#endif

#define HIWORD(l)
((WORD)(((DWORD)(LPVOID)(l)) >> 16)
& 0xFFFF))

#define MAKELONG(low, high)
((LONG)(((WORD)(low)) |
(((DWORD)((WORD)(high))) << 16)))
#define MAKEWORD(low, high) ((WORD)(low |
((WORD)high << 8))

#if defined( OFF )
 #undef OFF
#endif

#define OFF(fp)          (LOWORD( ( DWORD )(
BYTE FAR * )fp ))
#define SEG(fp)          (HIWORD( ( DWORD )(
BYTE FAR * )fp ))

typedef char pathstr[80];

struct rgb_struct {
  unsigned char r, g, b;
};


struct pcx_header_struct {
  unsigned char signature, version, code,
bits_per_plane;
  int xmin, ymin, xmax, ymax;
  int hres, vres;
  rgb_struct palette[16];
  unsigned char reserved, num_planes;
  int bytes_per_line;
  unsigned char other_stuff[60];
};
struct VESA_info_struct {
  unsigned char signature[4];
  int   version;
  int far *oem_ptr;
  unsigned char capabilities[4];
  unsigned int far *mode_list_ptr;
  unsigned char reserved[256];

};

struct mode_info_struct {
  int  attributes;
  unsigned char windowA_atts, windowB_atts;
  unsigned int granule_kb, window_size;
  unsigned int windowA_start, windowB_start;
  int  far *function_ptr;
  unsigned int bytes_per_line;
  unsigned int xres, yres;
  unsigned char other_stuff[234];
};


int read_it(pathstr pic_file_name, int mode, int
options);
FILE *open_file(pathstr pic_file_name, char
*file_mode,
        pcx_header_struct *header);
int get_mode(void);
void set_mode(int mode, int options);
char *report_error(int error);
int we_support(unsigned int mode);
int hardware_supports(unsigned int mode);
int detect_VESA(VESA_info_struct *VESA_rec);
int detect_VGA(void);
void cmd_error(char *msg);


#define no_options 0
#define save_mem   1
#define hcenter    2
#define vcenter    4
#define blackout   8

#define auto_set   0

#define SID_INTNUM          3
#define SID_FUNCNUM          0x0800
#define SID_OUTSTRING        0x0010
#define SID_SISIG           0x4847
#define SID_DISIG           0x4A4D

#if defined( _DEBUG )
void Trace( char *szOutStr );
#endif

#if !defined( _DEBUG )
#define DEBUG_BREAK _asm nop
#define TRACE( s ) _asm nop
#else
#define DEBUG_BREAK _asm int 3
#define TRACE( s ) Trace( s )
#endif
```